US008655756B2

(12) United States Patent
Seubert et al.

(10) Patent No.: US 8,655,756 B2
(45) Date of Patent: Feb. 18, 2014

(54) CONSISTENT SET OF INTERFACES DERIVED FROM A BUSINESS OBJECT MODEL

(75) Inventors: Michael Seubert, Sinsheim (DE); Jochen Rasch, Sandhausen (DE); Axel Kuehl, Nussloch (DE); Gabriel Alvarez, Hockenheim (DE); Markus Biehler, Landau (DE); Andreas Bold, Ludwigshafen (DE); Andreas Brossler, Gaiberg (DE); Daniel Buchmann, Pfinztal (DE); Renzo Colle, Rastatt (DE); Stefan Elfner, Heidelberg (DE); Werner Gnan, Angelbachtal (DE); Antonia Gross, Vuβloch (DE); Toralf Grossmann, Wiesloch (DE); Gerhard Gschwender, Bangalore (IN); Joerg Hendricks, Montreal (CA); Wolf Hengevoss, Wiesloch (DE); Stephan Hetzer, Östringen (DE); Christine Hofmann, Karlsruhe (DE); Volker Jaeck, Nussloch (DE); Bernhard Kelnberger, Rauenberg (DE); Johann Kemmer, Muehlhausen (DE); Joachim Kenntner, Heidelberg (DE); Karsten Koetter, Heidelberg (DE); Thilo Kraehmer, Heidelberg (DE); Corinne Kuster, Muehlhausen/Kraichgau (DE); Christoph Lehner, Heidelberg (DE); Thomas Maag, Reilingen (DE); Otto Makris, Heidelberg (DE); Andreas Morsch, Mannheim (DE); Wolfgang Nieswand, Muehlhausen (DE); Thomas Nitschke, Nussloch (DE); Markus Peter, St. Leon-Rot (DE); Georg Podhajsky, Philippsburg (DE); Dominic Poetschke, Ettlingen (DE); Uwe Pyka, Sinsheim-Hilsbach (DE); Ruediger Radcke, Budapest (HU); Gregor Rieken, Walldorf (DE); Gerd Ritter, Heidelberg (DE); Paola Sala, Heidelberg (DE); Daniela Schapler, St. Leon-Rot (DE); Matthias Schmitt, Speyer (DE); Andreas Schneider, Bobenheim-Roxheim (DE); Arnulf Schueler, Heidelberg (DE); Dagmar Schultze, Heidelberg (DE); Ralf Sievers, Walldorf (DE); Gunther Stuhec, Heidelberg (DE); Frank Thome, Karlsruhe (DE); Andre Wagner, Sinsheim (DE); Rudolf Winkel, Walldorf (DE); Tao Yu, Walldorf (DE); Jens Zachmann, Walldorf (DE); Theo Zimmerman, Wiesloch (DE); Michael Zoeller, Rauenberg (DE)

(73) Assignee: SAP AG, Walldorf (DE)

( * ) Notice: Subject to any disclaimer, the term of this patent is extended or adjusted under 35 U.S.C. 154(b) by 1353 days.

(21) Appl. No.: 11/145,464

(22) Filed: Jun. 3, 2005

(65) Prior Publication Data

US 2006/0085336 A1 Apr. 20, 2006

Related U.S. Application Data

(60) Provisional application No. 60/577,453, filed on Jun. 4, 2004, provisional application No. 60/581,252, filed on Jun. 18, 2004, provisional application No. 60/582,949, filed on Jun. 25, 2004, provisional application No. 60/656,598, filed on Feb. 25, 2005, provisional application No. 60/669,310, filed on Apr. 7, 2005.

(51) Int. Cl.
*G06Q 40/00* (2012.01)

(52) U.S. Cl.
CPC .................................... *G06Q 40/00* (2013.01)
USPC ........................................................ 705/35

(58) Field of Classification Search
USPC ........................................................ 705/35
See application file for complete search history.

*Primary Examiner* — Ella Colbert
*Assistant Examiner* — Abdulmajeed Aziz
(74) *Attorney, Agent, or Firm* — Fish & Richardson P.C.

(57) ABSTRACT

Methods and systems consistent with the present invention provide a data processing system having a business object model reflecting the data used during a business transaction. Consistent interfaces are generated from the business object model. These interfaces are suitable for use across industries, across businesses, and across different departments within a business during a business transaction.

43 Claims, 495 Drawing Sheets

(56) References Cited

U.S. PATENT DOCUMENTS 3,223,321 A 12/1965 Baumgartner
5,126,936 A 6/1992 Champion et al.
5,210,686 A 5/1993 Jernigan
5,247,575 A 9/1993 Sprague et al.
5,255,181 A 10/1993 Chapman et al.
5,321,605 A 6/1994 Chapman et al.
5,463,555 A 10/1995 Ward et al.
5,586,312 A 12/1996 Johnson et al.
5,787,237 A 7/1998 Reilly
5,812,897 A 9/1998 Nishio
5,812,987 A 9/1998 Luskin et al.
5,966,695 A 10/1999 Melchione et al.
5,970,465 A 10/1999 Dietrich et al.
5,970,475 A 10/1999 Barnes et al.
5,983,284 A 11/1999 Argade
6,047,264 A 4/2000 Fisher et al.
6,049,838 A 4/2000 Miller et al.
6,073,137 A 6/2000 Brown et al.
6,092,196 A 7/2000 Reiche
6,104,393 A 8/2000 Santos-Gomez
6,115,690 A * 9/2000 Wong ................................ 705/7
6,125,391 A 9/2000 Meltzer et al.
6,138,118 A 10/2000 Koppstein et al.
6,154,732 A 11/2000 Tarbox
6,167,563 A 12/2000 Fontana et al.
6,182,133 B1 1/2001 Horvitz
6,208,345 B1 3/2001 Sheard et al.
6,222,533 B1 4/2001 Notani et al.
6,226,675 B1 5/2001 Meltzer et al.
6,229,551 B1 5/2001 Huang
6,311,165 B1 10/2001 Coutts et al.
6,327,700 B1 12/2001 Chen et al.
6,331,972 B1 12/2001 Harris et al.
6,332,163 B1 12/2001 Bowman-Amuah
6,424,979 B1 7/2002 Livingston et al.
6,434,159 B1 8/2002 Woodward et al.
6,438,594 B1 8/2002 Bowman-Amuah
6,446,045 B1 9/2002 Stone et al.
6,542,912 B2 4/2003 Meltzer et al.
6,591,260 B1 7/2003 Schwarzhoff et al.
6,601,234 B1 7/2003 Bowman-Amuah
6,606,744 B1 8/2003 Mikurak
6,671,673 B1 12/2003 Baseman et al.
6,687,734 B1 2/2004 Sellink et al.
6,691,151 B1 2/2004 Cheyer et al.
6,725,122 B2 4/2004 Mori et al.
6,738,747 B1 5/2004 Tanaka et al.
6,745,229 B1 6/2004 Gobin et al.
6,747,679 B1 6/2004 Finch et al.
6,750,885 B1 6/2004 Finch et al.
6,763,353 B2 7/2004 Li et al.
6,764,009 B2 7/2004 Melick et al.
6,775,647 B1 8/2004 Evans et al.
6,859,931 B1 2/2005 Cheyer et al.
6,868,370 B1 3/2005 Burbridge et al.
6,889,197 B2 5/2005 Lidow
6,895,438 B1 5/2005 Ulrich
6,904,399 B2 6/2005 Cooper et al.
6,907,395 B1 6/2005 Hunt et al.
6,937,992 B1 8/2005 Benda et al.
6,954,736 B2 10/2005 Menninger et al.
6,970,844 B1 11/2005 Bierenbaum
7,003,474 B2 2/2006 Lidow
7,020,594 B1 3/2006 Chacon
7,031,998 B2 4/2006 Archbold
7,039,606 B2 5/2006 Hoffman et al.
7,076,449 B2 7/2006 Tsunenari et al.
7,120,896 B2 10/2006 Budhiraja et al.
7,131,069 B1 10/2006 Rush et al.
7,184,964 B2 2/2007 Wang
7,197,740 B2 3/2007 Beringer et al.
7,206,768 B1 4/2007 deGroeve et al.
7,225,240 B1 5/2007 Fox et al.
7,249,044 B2 7/2007 Kumar et al.
7,249,157 B2 7/2007 Stewart et al.
7,269,569 B2 9/2007 Spira et al.
7,292,965 B1 11/2007 Mehta et al.
7,293,254 B2 11/2007 Bloesch et al.
7,321,864 B1 1/2008 Gendler
7,324,966 B2 1/2008 Scheer
7,353,180 B1 4/2008 Silverstone et al.
7,356,492 B2 4/2008 Hazi et al.
7,363,271 B2 4/2008 Morimoto
7,370,315 B1 5/2008 Lovell et al.
7,376,601 B1 5/2008 Aldridge
7,376,604 B1 5/2008 Butcher
7,376,632 B1 5/2008 Sadek et al.
7,379,931 B2 5/2008 Morinville
7,383,201 B2 6/2008 Matsuzaki et al.
7,383,990 B2 6/2008 Veit
7,406,358 B2 7/2008 Preiss
7,415,697 B1 8/2008 Houlding
7,481,367 B2 1/2009 Fees et al.
7,509,278 B2 3/2009 Jones
7,515,697 B2 4/2009 Eng et al.
7,516,088 B2 4/2009 Johnson et al.
7,529,699 B2 5/2009 Fuse et al.
7,536,325 B2 5/2009 Randell et al.
7,536,697 B2 5/2009 Wiseman et al.
7,546,520 B2 6/2009 Davidson et al.
7,546,575 B1 6/2009 Dillman et al.
7,574,383 B1 8/2009 Parasnis et al.
7,624,371 B2 11/2009 Kulkarni et al.
7,627,504 B2 12/2009 Brady et al.
7,634,482 B2 12/2009 Mukherjee et al.
7,640,291 B2 12/2009 Maturana et al.
7,644,390 B2 1/2010 Khodabandehloo et al.
7,657,406 B2 2/2010 Tolone et al.
7,657,445 B1 2/2010 Goux
7,668,761 B2 2/2010 Jenkins et al.
7,672,888 B2 3/2010 Allin et al.
7,681,176 B2 3/2010 Wills et al.
7,693,586 B2 4/2010 Dumas et al.
7,703,073 B2 4/2010 Illowsky et al.
7,742,985 B1 6/2010 Digrigoli et al.
7,747,980 B2 6/2010 Illowsky et al.
7,765,156 B2 7/2010 Staniar et al.
7,765,521 B2 7/2010 Bryant
7,788,145 B2 8/2010 Wadawadigi et al.
7,788,319 B2 8/2010 Schmidt et al.
7,797,698 B2 9/2010 Diament et al.
7,805,383 B2 9/2010 Veit et al.
7,814,142 B2 10/2010 Mamou et al.
7,822,682 B2 10/2010 Arnold et al.
7,835,971 B2 11/2010 Stockton et al.
7,853,491 B2 12/2010 Wittmer et al.
7,865,426 B2 1/2011 Volpert
7,873,965 B2 1/2011 Hayton et al.
7,895,209 B2 2/2011 Spence et al.
7,904,350 B2 3/2011 Ayala et al.
7,925,985 B2 4/2011 Moore
7,941,236 B2 5/2011 Spearman
2001/0042032 A1 11/2001 Crawshaw et al.
2002/0013721 A1 1/2002 Dabbiere et al.
2002/0026394 A1 * 2/2002 Savage et al. ................... 705/34

2002/0042756 A1 4/2002 Kumar et al.
2002/0046053 A1 4/2002 Hare et al.
2002/0052754 A1 5/2002 Joyce et al.
2002/0072988 A1 6/2002 Aram
2002/0078046 A1 6/2002 Uluakar et al.
2002/0087481 A1 7/2002 Harif
2002/0087483 A1 7/2002 Harif
2002/0099634 A1 7/2002 Coutts et al.
2002/0107765 A1 8/2002 Walker
2002/0107826 A1 8/2002 Ramachandran et al.
2002/0112171 A1 8/2002 Ginter et al.
2002/0133368 A1 9/2002 Strutt et al.
2002/0138318 A1 9/2002 Ellis et al.
2002/0138358 A1 9/2002 Scheer
2002/0143598 A1 10/2002 Scheer
2002/0147668 A1 10/2002 Smith et al.
2002/0152104 A1 10/2002 Ojha et al.
2002/0152145 A1 10/2002 Wanta et al.
2002/0156693 A1 10/2002 Stewart et al.
2002/0156930 A1 10/2002 Velasquez
2002/0157017 A1 10/2002 Mi et al.
2002/0161907 A1 10/2002 Moon
2002/0169657 A1 11/2002 Singh et al.
2002/0184070 A1 12/2002 Chen et al.
2002/0186876 A1 12/2002 Jones et al.
2002/0188486 A1 12/2002 Gil et al.
2002/0194045 A1 12/2002 Shay et al.
2003/0004799 A1 1/2003 Kish
2003/0009754 A1 1/2003 Rowley et al.
2003/0069648 A1 4/2003 Douglas et al.
2003/0074271 A1 4/2003 Viswanath et al.
2003/0084127 A1 5/2003 Budhiraja et al.
2003/0086594 A1 5/2003 Gross
2003/0120502 A1 6/2003 Robb et al.
2003/0120665 A1 6/2003 Fox et al.
2003/0126077 A1 7/2003 Kantor et al.
2003/0167193 A1 9/2003 Jones et al.
2003/0171962 A1 9/2003 Hirth et al.
2003/0172007 A1 9/2003 Helmolt et al.
2003/0172135 A1 9/2003 Bobick et al.
2003/0195815 A1 10/2003 Li et al.
2003/0204452 A1 10/2003 Wheeler
2003/0208389 A1 11/2003 Kurihara et al.
2003/0212602 A1 11/2003 Schaller
2003/0212614 A1 11/2003 Chu et al.
2003/0216978 A1 11/2003 Sweeney et al.
2003/0220875 A1 11/2003 Lam et al.
2003/0229522 A1 12/2003 Thompson et al.
2003/0229550 A1 12/2003 DiPrima et al.
2003/0233290 A1 12/2003 Yang et al.
2003/0233295 A1 12/2003 Tozawa et al.
2003/0236748 A1 12/2003 Gressel et al.
2004/0015366 A1 1/2004 Wiseman et al.
2004/0015367 A1 1/2004 Nicastro et al.
2004/0024662 A1 2/2004 Gray et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0111304 A1 6/2004 Meka et al.
2004/0133445 A1 7/2004 Rajan et al.
2004/0138942 A1 7/2004 Pearson et al.
2004/0148227 A1 7/2004 Tabuchi et al.
2004/0153359 A1 8/2004 Ho et al.
2004/0172360 A1 9/2004 Mabrey et al.
2004/0172510 A1 9/2004 Nagashima et al.
2004/0181470 A1 9/2004 Grounds
2004/0187140 A1 9/2004 Aigner et al.
2004/0220910 A1 11/2004 Zang et al.
2004/0254945 A1 12/2004 Schmidt et al.
2004/0267714 A1 12/2004 Frid et al.
2005/0010501 A1 1/2005 Ward
2005/0015273 A1 1/2005 Iyer
2005/0021366 A1* 1/2005 Pool et al. ......................... 705/1
2005/0033588 A1 2/2005 Ruiz et al.
2005/0038744 A1 2/2005 Viijoen
2005/0049903 A1 3/2005 Raja
2005/0060408 A1 3/2005 McIntyre et al.
2005/0065828 A1 3/2005 Kroswek et al.
2005/0071262 A1 3/2005 Kobeh et al.
2005/0080640 A1 4/2005 Bhaskaran et al.
2005/0108085 A1 5/2005 Dakar et al.
2005/0114829 A1 5/2005 Robin et al.
2005/0125310 A1 6/2005 Hazi et al.
2005/0131947 A1 6/2005 Laub et al.
2005/0159997 A1 7/2005 John
2005/0160104 A1 7/2005 Meera et al.
2005/0171833 A1 8/2005 Jost et al.
2005/0177435 A1 8/2005 Lidow
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0240592 A1 10/2005 Mamou et al.
2005/0246240 A1 11/2005 Padilla
2005/0256753 A1 11/2005 Veit et al.
2006/0004802 A1 1/2006 Phillips et al.
2006/0004934 A1 1/2006 Guldner et al.
2006/0005098 A1 1/2006 Lotz et al.
2006/0020515 A1 1/2006 Lee et al.
2006/0026586 A1 2/2006 Remmel et al.
2006/0036941 A1 2/2006 Neil
2006/0047574 A1 3/2006 Sundaram et al.
2006/0047598 A1* 3/2006 Hansen .......................... 705/37
2006/0059005 A1 3/2006 Horn et al.
2006/0059059 A1 3/2006 Horn et al.
2006/0059060 A1 3/2006 Horn et al.
2006/0064344 A1 3/2006 Lidow
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0089886 A1 4/2006 Wong
2006/0095373 A1 5/2006 Venkatasubramanian et al.
2006/0129978 A1 6/2006 Abrari et al.
2006/0143029 A1 6/2006 Akbay et al.
2006/0184435 A1 8/2006 Mostowfi
2006/0206352 A1 9/2006 Pulianda
2006/0212376 A1 9/2006 Snyder et al.
2006/0280302 A1 12/2006 Baumann et al.
2006/0282360 A1 12/2006 Kahn et al.
2007/0011650 A1 1/2007 Hage et al.
2007/0027742 A1 2/2007 Emuchay et al.
2007/0043583 A1 2/2007 Davulcu et al.
2007/0055688 A1 3/2007 Blattner

| | | | | |
|---|---|---|---|---|
| 2007/0075916 | A1 | 4/2007 | Bump et al. | |
| 2007/0078799 | A1 | 4/2007 | Huber-Buschbeck et al. | |
| 2007/0094261 | A1 | 4/2007 | Phelan et al. | |
| 2007/0112574 | A1 | 5/2007 | Greene | |
| 2007/0124227 | A1 | 5/2007 | Dembo et al. | |
| 2007/0129978 | A1 | 6/2007 | Shirasu et al. | |
| 2007/0132585 | A1 | 6/2007 | Llorca et al. | |
| 2007/0150332 | A1 | 6/2007 | Grichnik et al. | |
| 2007/0150387 | A1 | 6/2007 | Seubert et al. | |
| 2007/0150836 | A1 | 6/2007 | Deggelmann et al. | |
| 2007/0150855 | A1 | 6/2007 | Jeong | |
| 2007/0156428 | A1 | 7/2007 | Brecht-Tillinger et al. | |
| 2007/0156475 | A1 | 7/2007 | Berger et al. | |
| 2007/0156493 | A1 | 7/2007 | Tebbe et al. | |
| 2007/0156500 | A1 | 7/2007 | Merkel et al. | |
| 2007/0156538 | A1 | 7/2007 | Peter et al. | |
| 2007/0156545 | A1 | 7/2007 | Lin | |
| 2007/0156550 | A1 | 7/2007 | Der Emde et al. | |
| 2007/0156552 | A1 | 7/2007 | Manganiello | |
| 2007/0156690 | A1 | 7/2007 | Moser et al. | |
| 2007/0165622 | A1 | 7/2007 | O'Rourke et al. | |
| 2007/0174145 | A1 | 7/2007 | Hetzer et al. | |
| 2007/0197877 | A1 | 8/2007 | Decorte et al. | |
| 2007/0214065 | A1* | 9/2007 | Kahlon et al. | 705/28 |
| 2007/0225949 | A1 | 9/2007 | Sundararajan et al. | |
| 2007/0226090 | A1 | 9/2007 | Stratton | |
| 2007/0233541 | A1 | 10/2007 | Schorr et al. | |
| 2007/0233574 | A1 | 10/2007 | Koegler et al. | |
| 2007/0233575 | A1 | 10/2007 | Berger et al. | |
| 2007/0255639 | A1 | 11/2007 | Seifert | |
| 2007/0265860 | A1 | 11/2007 | Herrmann et al. | |
| 2007/0265862 | A1 | 11/2007 | Freund et al. | |
| 2007/0294159 | A1 | 12/2007 | Cottle | |
| 2008/0005012 | A1 | 1/2008 | Deneef | |
| 2008/0017722 | A1 | 1/2008 | Snyder et al. | |
| 2008/0021754 | A1 | 1/2008 | Horn et al. | |
| 2008/0040243 | A1 | 2/2008 | Chang et al. | |
| 2008/0046104 | A1 | 2/2008 | Van Camp et al. | |
| 2008/0046421 | A1 | 2/2008 | Bhatia et al. | |
| 2008/0065437 | A1 | 3/2008 | Dybvig | |
| 2008/0120129 | A1 | 5/2008 | Seubert et al. | |
| 2008/0120190 | A1 | 5/2008 | Joao et al. | |
| 2008/0120204 | A1 | 5/2008 | Conner et al. | |
| 2008/0133303 | A1 | 6/2008 | Singh et al. | |
| 2008/0154969 | A1 | 6/2008 | DeBie | |
| 2008/0162266 | A1 | 7/2008 | Griessmann et al. | |
| 2008/0162382 | A1 | 7/2008 | Clayton et al. | |
| 2008/0184265 | A1 | 7/2008 | Kasi et al. | |
| 2008/0196108 | A1 | 8/2008 | Dent et al. | |
| 2008/0215354 | A1 | 9/2008 | Halverson et al. | |
| 2008/0243578 | A1 | 10/2008 | Veit | |
| 2008/0288317 | A1 | 11/2008 | Kakar | |
| 2009/0006203 | A1 | 1/2009 | Fordyce et al. | |
| 2009/0063287 | A1 | 3/2009 | Tribout et al. | |
| 2009/0077074 | A1 | 3/2009 | Hosokawa | |
| 2009/0089198 | A1 | 4/2009 | Kroutik | |
| 2009/0164497 | A1 | 6/2009 | Steinmaier et al. | |
| 2009/0189743 | A1 | 7/2009 | Abraham et al. | |
| 2009/0192858 | A1 | 7/2009 | Johnson | |
| 2009/0192926 | A1 | 7/2009 | Tarapata | |
| 2009/0193432 | A1 | 7/2009 | McKegney et al. | |
| 2009/0222360 | A1 | 9/2009 | Schmitt et al. | |
| 2009/0248431 | A1 | 10/2009 | Schoknecht et al. | |
| 2009/0248547 | A1 | 10/2009 | Doenig et al. | |
| 2009/0271245 | A1 | 10/2009 | Joshi et al. | |
| 2009/0300578 | A1 | 12/2009 | Neil | |
| 2009/0326988 | A1 | 12/2009 | Barth et al. | |
| 2010/0014510 | A1 | 1/2010 | Boreli et al. | |
| 2010/0070324 | A1 | 3/2010 | Bock et al. | |
| 2010/0070336 | A1 | 3/2010 | Koegler et al. | |
| 2010/0070391 | A1 | 3/2010 | Storr et al. | |
| 2010/0070395 | A1 | 3/2010 | Elkeles et al. | |
| 2010/0106555 | A1 | 4/2010 | Mneimneh et al. | |
| 2010/0161425 | A1 | 6/2010 | Sideman | |
| 2011/0046775 | A1 | 2/2011 | Bailey et al. | |

FOREIGN PATENT DOCUMENTS

| | | |
|---|---|---|
| CN | 1501296 | 6/2004 |
| CN | 1609866 | 4/2005 |
| CN | 1632806 | 6/2005 |
| CN | 1767537 | 5/2006 |
| CN | 101174957 | 5/2008 |

OTHER PUBLICATIONS

FSML—Financial Services Markup Language (Jul. 14, 1999) http://xml.coverpages.org/FSML-v1500a.pdf.*

International Search Report and Written Opinion of the International Searching Authority issued in corresponding International Application No. PCT/US05/21481; May 29, 2007; 6 pages.

Notification of Transmittal of the International Search Report and the Written Opinion Of the International Searching Authority or the Declaration (1 page); International Search Report (2 pages); Written Opinion of the International Searching Authority (3 pages); all mailed by on May 29, 2007 in PCT International Application No. PCT/US05/21481, filed on Jun. 17, 2005 (Total 6 pages).

Notification of Transmittal of the International Search Report and the Written Opinion of the International Searching Authority or the Declaration (1 page); International Search Report (3 pages); and Written Opinion of the International Searching Authority (4 pages); all mailed on May 12, 2006 in PCT International Application No. PCT/US05/22137 filed on Jun. 25, 2005 (Total 8 pages).

Notification of Transmittal of the International Search Report and The Written Opinion of the International Searching Authority, or the Declaration (1 page); International Search Report (6 pages); and Written Opinion of the International Searching Authority (10 pages); all mailed on Apr. 30, 2008 in PCT International Application No. PCT/US 07/11378 filed on May 11, 2007 (total 17 pages).

Zencke, Peter, *Engineering a Business Process Platform*, SAP AG 2005, Engineering BPP, [Online] Previously Available at URL <www.sap.com/community/pub/webcast/2006_01_16_Analyst_Summit_Vegas/2006_01_16_Analyst_Summit_Vegas_009.pdf>. (36 pages).

UML in the .com Enterprise: Modeling CORBA, Components, XML/XMI and Metadata Workshop, http://www.omg.org/news/meetings/workshops/uml_presentations.htm.

Brahim Medjahed, et al., Business-to-business interactions: issues and enabling technologies, The VLDB Journal, Apr. 3, 2003, pp. 59-85, vol. 12, No. 1, Springer-Verlag New York, Inc.

Brahim Medjahed, et al., Composing Web Services on the Semantic Web, The VLDB Journal, Sep. 23, 2003, pp. 333-351, vol. 12, No. 4, Springer-Verlag New York, Inc.

Marc Born, et al., Customizing UML for Component Design, www.dot-profile.de, UML Workshop—Palm Springs, CA, Nov. 2000.

Gerti Kappel, et al., A Framework for Workflow Management Systems Based on Objects, Rules and Roles, ACM Comput. Surv., Mar. 2000, p. 27, vol. 32, ACM Press.

Aaron Skonnard, et al., BizTalk Server 2000: Architecture and Tools for Trading Partner Integration, 2000, ms-help://MS.MSDNQTR.2003APR.1033/dnmag00/htmal/biztalk.htm.

Microsoft, Creating an XML Web Service Proxy, 2001, mshelp://MS.MSDNQTR.2003APR.1033/cpguide/html/cpconcreatingwebserviceproxy.htm.

Proceedings of OMG Workshops, pp. 1-3, http://www.omg.org/news/meetings/workshops/proceedings.htm.

Bart Meltzer, et al., XML and Electronic Commerce: Enabling the Network Economy, SIGMOD Record, Dec. 1998, pp. 21-24, vol. 27, No. 4, ACM Press.

Michael N. Huhns, et al., Automating Supply-Chain Management, Jul. 15-19, 2002, pp. 1017-1024.

Eva Soederstroem, Standardising the business vocabulary of standards, 2002, pp. 1048-1052, SAC, Madrid, Spain.

Remi Bastide, et al., Formal Specification of CORBA Services: Experience and Lessons Learned, 2000, pp. 105-117.

Robert J. Glushko, et al., An XML Framework for Agent-based E-commerce, Mar. 1999, pp. 106-114, vol. 42, No. 3.

Alberto Coen-Porisini, et al., A Formal Approach for Designing CORBA-Based Applications, ACM Transactions on Software Engineering and Methodology, Apr. 2003, pp. 107-151, vol. 12, No. 2.

J. Yang, et al., Service Deployment for Virtual Enterprises, 2001, pp. 107-115.
Alan H. Karp, E-Speak E-xplained, Communications of the ACM, Jul. 2003, pp. 113-119, vol. 46, No. 7, ACM Press.
David Gillibrand, Essential Business Object Design, Communication of the ACM, Feb. 2000, pp. 117-119, vol. 43, No. 2, ACM Press.
James Cole, et al., Extending Support for Contracts in ebXML, 2001, pp. 119-127.
Elisabetta DiNitto, et al., Deriving Executable Process Descriptions from UML, May 19-25, 2002, pp. 155-165.
Markus Stumptner, et al., On the Road to Behavior-Based Integration, CRPIT '31: Proceedings of the First Asian-Pacific Conference on Conceptual Modeling, Jan. 2004, pp. 15-22, Australian Computer Society, Inc., Dunedin, New Zealand.
Sanjay Gosain, et al., The Impact of Common E-Business Interfaces, Communication of the ACM, Dec. 2003, pp. 186-195, vol. 46, No. 12, ACM Press.
Suresh Damodaran, B2B Integration over the Internet with XML—RosettaNet Successes and Challenges, May 17-22, 2004, pp. 188-195.
Wolfgang Schulze, et al., Standardising on Workflow-Management—The OMG Workflow Management Facility, SIGGROUP Bulletin, Apr. 1998, pp. 24-30, vol. 19, No. 1, ACM Press.
Jeff Sutherland, Business Objects in Corporate Information Systems, ACM Computing Surveys, Jun. 1995, pp. 274-276, vol. 27, No. 2.
Ali Arsanjani, Developing and Integrating Enterprise Components and Services, Communications of the ACM, Oct. 2002, pp. 31-34, vol. 45, No. 10, ACM Press.
Dan Jong Kim, et al., A Comparison of B2B E-Service Solutions, Communications of the ACM, Dec. 2003, pp. 317-324, vol. 46, No. 12, ACM Press.
Wilhelm Hasselbring, Information System Integration, Communication of the ACM, Jun. 2000, pp. 33-38, vol. 43, No. 6, ACM Press.
Navid Khosravi, et al., An Approach to Building Model Driven Enterprise Systems in Nebras Enterprise Framework, OOPSLA '02: Companion of the 17$^{th}$ Annual ACM SIGPLAN Conference on Object-Oriented Programming, Systems, Languages, and Applications, Nov. 4-8, 2002, pp. 32-33, ACM Press, Seattle, Washington.
K. Hogg, et al., An Evaluation of Web Services in the Design of a B2B Application, 2004, pp. 331-340.
Volker Gruhn, Workflow Management based on Process Model Repositories, 1998, pp. 379-388.
Hyoungdo Kim, Conceptual Modeling and Specification Generation for B2B Business Processes Based on ebXML, SIGMOD Record, Mar. 2002, pp. 37-42, vol. 31, No. 1, ACM Press.
Jon Siegel, OMG Overview: CORBA and the OMA in Enterprise Computing, Communications of the ACM, Oct. 1998, pp. 37-43, vol. 41, No. 10, ACM Press.
Jian Yang, et al., Interoperation Support for Electronic Business, Communication of the ACM, Jun. 2000, pp. 39-47, vol. 43, No. 6, ACM Press.
Keith Levi, et al., A Goal-Driven Approach to Enterprise Component Identification and Specification, Communication of the ACM, Oct. 2002, pp. 45-52, vol. 45, No. 10, ACM Press.
Koichi Terai, et al., Coordinating Web Services Based on Business Models, 2003, pp. 473-478.
Lerina Aversano, et al., Introducing eServices in Business Process Models, Jul. 15-19, 2002, pp. 481-488.
Christoph Quix, et al., Business Data Management for Business-to-Business Electronic Commerce, SIGMOD Record, Mar. 2002, pp. 49-54, vol. 31, No. 1, ACM Press.
Jeff Sutherland, Why I Love the OMG: Emergence of a Business Object Component Architecture, StandardView, Mar. 1998, pp. 4-13, vol. 6, No. 1, ACM Press.
Asuman Dogac, et al., An ebXML Infrastructure Implementation through UDDI Registries and RosettaNet PIPs, Jun. 4-6, 2002, pp. 512-523.
Jinyoul Lee, et al., Enterprise Integration with ERP and EAI, Communications of the ACM, Feb. 2003, pp. 54-60, vol. 46, No. 2, ACM Press.
Lars G. Bratthall, et al., Integrating Hundred's of Products through One Architecture—The Industrial IT Architecture, May 19-25, 2002, pp. 604-614.
Peter Fingar, Component-Based Frameworks for E-Commerce, Communications of the ACM, Oct. 2000, pp. 61-66, vol. 43, No. 10, ACM Press.
David Sprott, Componentizing the Enterprise Application Packages, Communications of the ACM, Apr. 2000, pp. 63-69, vol. 43, No. 4, ACM Press.
Aniruddha Gokhale, et al., Applying Model-Integrated Computing to Component Middleware and Enterprise Applications, Communications of the ACM, Oct. 2002, pp. 65-70, vol. 45, No. 10, ACM Press.
Christoph Bussler, The Role of B2B Engines in B2B Integration Architectures, SIGMOD Record, Mar. 2002, pp. 67-72, vol. 31, No. 1, ACM Press.
Ning He, et al., B2B Contract Implementation Using Windows DNS, 2001, pp. 71-79.
Paul Fremantle, et al., Enterprise Services, Communications of the ACM, Oct. 2002, pp. 77-82, vol. 45, No. 10, ACM Press.
David Trastour, et al., Semantic Web Support for the Business-to-Business E-Commerce Lifecycle, May 7-11, 2002, pp. 89-98.
Dirk Jaeger, et al., Using UML for Software Process Modeling, pp. 91-108.
Zaw Z. Han, et al., Interoperability from Electronic Commerce to Litigation Using XML Rules, 2003, pp. 93-94.
David A. Carlson, Designing XML Vocabularies with UML, 2000, pp. 95-96.
Michael Stonebraker, Too Much Middleware, SIGMOD Record, Mar. 2002, pp. 97-106, vol. 31, No. 1, ACM Press.
Zakaria Maamar, et al., Toward Intelligent Business Objects, Communications of the ACM, Oct. 2000, pp. 99-101, vol. 43, No. 10, ACM Press.
Jay M. Tenenbaum, et al., Eco System: An Internet Commerce Architecture, 1997, pp. 48-55.
Anat Eyal, et al., Integrating and Customizing Heterogeneous E-Commerce Applications, The VLDB Journal, Aug. 2001, pp. 16-38, vol. 10, No. 1, Springer-Verlag New York, Inc.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390).
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.

International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Preliminary Report on Patentability under Chapter I issued in International Application No. PCT/US2005/022137 on Dec. 28, 2006; 5 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 11/864,871 on Apr. 21, 2010; 20 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 12/060,171 on Jul. 1, 2010; 19 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Newton's Telecom Dictionary; 18th Edition; 2002; pp. 347, 454.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cohen et al.; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=repl<ype=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pp. [online] http://www.lionbridge.com/NR/rdonlyres/4940BE1F/DA46/412E/AB16/F049BD865CA1/0/PBMW FAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,236 on Oct. 28, 2010; 19 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967,483 on Aug. 20, 2010; 10 pages.
Office Action issued in U.S. Appl. No. 11/967, 483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.

Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
Communication Pursuant to Article 94(3) issued in European Application No. 05757432.9 on Apr. 12, 2011; 5 pages.
Communication Pursuant to Article 94(3) issued in European Application No. 05766672.9 on Jul. 14, 2011; 4 pages.
Notice of Allowance issued in U.S. Appl. No. 12/147,395 on May 4, 2011; 10 pages.
Office Action issued in related U.S. Appl. No. 12/334,175 on May 27, 2011; 12 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.
Office Action issued in U.S. Appl. No. 12/147,378 on Jun. 17, 2011; 10 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/323,116 on Jan. 27, 2012; 7 pages.
Notice of Allowance issued in U.S. Appl. No. 12/323,139 on Mar. 14, 2012; 10 pages.
Office Action issued in U.S. Appl. No. 12/571,140 on Sep. 26, 2011; 14 pages.
Notice of Allowance issued in U.S. Appl. No. 12/571,140 on Mar. 20, 2012; 16 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in related U.S. Appl. No. 12/060,054 on Dec. 7, 2011; 15 pages.
Office Action issued in U.S. Appl. No. 12/060,144 on Jun. 23, 2011; 16 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,192 on Sep. 6, 2011; 18 pages.
Notice of Allowance issued in U.S. Appl. No. 12/060,192 on Mar. 2, 2012; 18 pages.
Notice of Allowance issued in related U.S. Appl. No. 12/060,178 on Sep. 2, 2011; 9 pages.
Office Action issued in related U.S. Appl. No. 12/060,062 on Jul. 13, 2011; 16 pages.
Notice of Allowance issued in U.S. Appl. No. 12/060,062 on Mar. 20, 2012; 16 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in related U.S. Appl. No. 11/864,866 on Jul. 22, 2011; 6 pages.
Notice of Allowance issued in related U.S. Appl. No. 11/864,866 on Mar. 13, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jul. 7, 2011; 11 pages.
Notice of Allowance issued in related U.S. Appl. No. 11/864,832 on Jan. 9, 2012; 12 pages.
Office Action issued in related U.S. Appl. No. 11/864,863 on Jul. 21, 2011; 29 pages.
Office Action issued in related U.S. Appl. No. 11/864,863 on Dec. 22, 2011; 20 pages.
Notice of Allowance issued in related U.S. Appl. No. 11/803,178 on May 17, 2011; 13 pages.
Notice of Allowance issued in U.S. Appl. No. 11/640,422 on Sep. 29, 2011; 7 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Notice of Allowance issued in related U.S. Appl. No. 12/147,449 on Apr. 28, 2011; 9 pages.
Notice of Allowance issued in related U.S. Appl. No. 11/731,E357 on Apr. 11, 2011; 8 pages.

Office Action issued in U.S. Appl. No. 12/147,414 on Apr. 14, 2011; 30 pages.
Notice of Allowance issued in U.S. Appl. No. 12/323,139 on Mar. 4, 2011; 13 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,155 on May 10, 2011; 8 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/775,821 on Feb. 4, 2011; 4 pages.
Office Action issued in U.S. Appl. No. 11/864,811 on Mar.' 8, 2011; 10 pages.

* cited by examiner

Fig. 25

| CCT | | Category | Obj. Class | Prop. Term | Rep. Term | Type | Type Name | Lgth. | Card. | Remarks |
|---|---|---|---|---|---|---|---|---|---|---|
| Amount 2500 | | Complex Type 2504 | | Amount 2510 | Content 2514 | xsd 2518 | decimal 2522 | 22.6 2526 | | |
| | Currency Code 2502 | Attribute 2506 | Amount 2508 | Currency 2512 | Code 2516 | xsd 2520 | token 2524 | 3 2528 | 1 2530 | Mandatory 2532 |

Fig. 26a

| CCT | | Category | Obj. Class | Prop. Term | Rep. Term | Type | Type Name | Card. | Remarks |
|---|---|---|---|---|---|---|---|---|---|
| Binary-Object 2600 | | complex Type 2612 | | Binary-Object 2634 | Content 2646 | xsd 2658 | base64 binary 2670 | | |
| | mime Code 2602 | Attribute 2614 | Binary-Object 2624 | Mime 2636 | Code 2648 | xsd 2660 | token 2672 | 0..1 2680 | Necessary when Binary Object is represented as an element value 2688 |
| | charSet Code 2604 | Attribute 2616 | Binary-Object 2626 | Character Set 2638 | Code 2650 | xsd 2662 | token 2674 | 0..1 2682 | Necessary when Binary Object is represented as an element value and comprises text data 2690 |
| | format 2606 | Attribute 2618 | Binary-Object 2628 | Format 2640 | Text 2652 | xsd 2664 | token 2675 | 0..1 2684 | Optional 2692 |

Fig. 26b

| CCT | | | Obj. Class | Prop. Term | Rep. Term | Type | Type Name | Card. | Remarks |
|---|---|---|---|---|---|---|---|---|---|
| | filename 2608 | Attribute 2620 | Binary-Object 2630 | Filename 2642 | Text 2654 | xsd 2666 | string 2676 | 0..1 2686 | Not defined in ebXML CCTS 1.8 (but is to be submitted); conforms with IETF RFC 1341 2694 |
| | URI 2610 | Attribute 2622 | Binary-Object 2632 | Uniform Resource 2644 | Identifier 2656 | xsd 2668 | anyURI 2678 | | Necessary when referencing a remote Binary Object 2696 |

Fig. 27

| CCT | | Category | Obj. Class | Prop. Term | Rep. Term | Type | Type Name | Card. | Remarks |
|---|---|---|---|---|---|---|---|---|---|
| Code 2700 | | complex Type 2712 | | Code 2734 | Content 2746 | xsd 2750 | token 2770 | | |
| | listID 2702 | Attribute 2714 | CodeList 2724 | Identification 2736 | Identifier 2748 | xsd 2760 | token 2772 | 0..1 2782 | Optional 2792 |
| | listVersion ID 2704 | Attribute 2716 | CodeList 2726 | Version 2738 | Identifier 2750 | xsd 2762 | token 2774 | 0..1 2784 | Optional 2794 |
| | listAgency ID 2706 | Attribute 2718 | CodeList Agency 2728 | Identification 2740 | Identifier 2752 | xsd 2764 | token 2776 | 0..1 2786 | Optional 2796 |
| | listAgency - SchemeID 2708 | Attribute 2720 | CodeList Agency 2730 | Scheme 2742 | Identifier 2754 | xsd 2766 | token 2778 | 0..1 2788 | Optional 2797 |
| | listAgency -Scheme AgencyID 2710 | Attribute 2722 | CodeList Agency 2732 | Scheme Agency 2744 | Identifier 2756 | xsd 2768 | token 2780 | 0..1 2790 | Optional 2798 |

Fig. 28

| CCT | Category | Prop. Term | Rep. Term | Type | Type Name |
|---|---|---|---|---|---|
| DateTime 2800 | simpleType 2802 | DateTime 2804 | Content 2806 | xsd 2808 | dateTime 2810 |

Fig. 29

| CCT | | Cat. | Obj. Class | Prop. Term | Rep. Term | Type | Type Name | Lgth. | Card. | Remarks |
|---|---|---|---|---|---|---|---|---|---|---|
| Electronic Address 2900 | | complex Type 2906 | | Electronic Address 2916 | Content 2922 | xsd 2930 | anyURI 2934 | | | |
| | protocol ID 2902 | Attribute 2908 | Electronic Address 2912 | Protocol 2918 | Identifier 2924 | xsd 2930 | token 2936 | | 0..1 2942 | Optional 2946 |
| | language Code 2904 | Attribute 2910 | Electronic Address 2914 | Language 2920 | Code 2926 | xsd 2932 | language 2938 | 2..9 2940 | 0..1 2944 | Optional 2948 |

Fig. 30a

| CCT | | Cat. | Obj. Class | Prop. Term | Rep. Term | Type | Data-type | Lgth. | Card. | Remarks |
|---|---|---|---|---|---|---|---|---|---|---|
| Identifier 3000 | | complex Type 3012 | Identifier 3024 | Identifier 3036 | Content 3048 | xsd 3060 | token 3072 | | | |
| | scheme ID 3002 | Attribute 3014 | Identification Scheme 3026 | Identification 3038 | Identifier 3050 | xsd 3062 | token 3074 | 1..60 3084 | 0..1 3090 | Optional 3095 |
| | scheme Version ID 3004 | Attribute 3016 | Identification Scheme 3028 | Version 3040 | Identifier 3052 | xsd 3064 | token 3076 | 1..15 3086 | 0..1 3091 | Optional 3096 |
| | scheme Agency ID 3006 | Attribute 3018 | Identification Scheme-Agency 3030 | Identification 3042 | Identifier 3054 | xsd 3066 | token 3078 | 1..60 3087 | 0..1 3092 | Optional 3097 |

Fig. 30b

| CCT | | Cat. | Obj. Class | Prop. Term | Rep. Term | Type | Data-type | Lgth. | Card. | Remarks |
|---|---|---|---|---|---|---|---|---|---|---|
| | scheme Agency-Scheme ID 3008 | Attribute 3020 | Identification Scheme-Agency 3032 | Scheme 3044 | Identifier 3056 | xsd 3068 | token 3080 | 1..60 3088 | 0..1 3093 | Optional 3098 |
| | scheme Agency-Scheme Agency ID 3010 | Attribute 3022 | Identification Scheme-Agency 3034 | Scheme Agency 3046 | Identifier 3058 | xsd 3070 | token 3082 | 3 3089 | 0..1 3094 | Optional 3099 |

Fig. 31

| CCT | | Cat. | Obj. Class | Type | Type Name |
|---|---|---|---|---|---|
| Indicator 3100 | Simple Type 3102 | Indicator 3104 | Content 3106 | xsd 3108 | Boolean 3110 |

Fig. 32

| CCT | | Cat. | Obj. Class | Prop. Term | Rep. Term | Data Type | Lgth. | Card. | Remarks |
|---|---|---|---|---|---|---|---|---|---|
| Measure 3200 | | Complex Type 3204 | | Measure 3210 | Content 3214 | xsd: decimal 3218 | 13.6 3222 | | |
| | Unit Code 3202 | Attribute 3206 | Quantity 3208 | Unit 3212 | Code 3216 | xsd: token 3220 | 1..3 3224 | 1 3226 | Mandatory 3228 |

Fig. 33

| CCT | Cat. | Prop. Term | Rep. Term | Data Type |
|---|---|---|---|---|
| Numeric 3300 | Complex Type 3302 | Numeric 3304 | Content 3306 | xsd: decimal 3308 |

Fig. 34

| CCT | | Cat. | Obj. Class | Prop. Term | Rep. Term | Data Type | Lgth. | Card. | Remarks |
|---|---|---|---|---|---|---|---|---|---|
| Quantity 3400 | | Complex Type 3404 | | Quantity 3410 | Content 3414 | xsd: decimal 3418 | 13.6 3422 | | |
| | Unit Code 3402 | Attribute 3406 | Quantity 3408 | Unit 3412 | Code 3416 | xsd: token 3420 | 1..3 3424 | 1 3426 | Mandatory 3428 |

Fig. 35

| CCT | | Cat. | Prop. Term | Rep. Term | Type | Type Name | Lgth. | Card. | Remarks |
|---|---|---|---|---|---|---|---|---|---|
| Text 3500 | | Complex Type 3504 | Text 3508 | Content 3512 | xsd 3516 | string 3520 | ∞ 3524 | | |
| | Language Code 3502 | Attribute 3506 | Language 3510 | Code 3514 | xsd 3518 | language 3522 | 2..9 3526 | 0..1 3528l | Optional 3530 |

Fig. 36

| GDT | Prop. | Rep./ Assn. | Type | Type Name | Lgth. | Remarks |
|---|---|---|---|---|---|---|
| Acceptance Status Code 3600 | Acceptance Status Code 3602 | Code 3604 | CCT 3606 | Code 3608 | 2 3610 | Restricted 3612 |

Fig. 37

| GDT | | Cat. | Obj. Class | Prop. | Rep./Assn | Type | Type Name | Lgth. | Card. |
|---|---|---|---|---|---|---|---|---|---|
| Accounting Object Set 3700 | | | Accounting Object Set 3706 | | Details 3712 | | | | |
| | Cost Center ID 3702 | Element 3704 | Cost Center 3708 | Identification 3710 | Identifier 3714 | CCT 3716 | Identifier 3718 | 1..32 3720 | 0..1 3722 |

Fig. 38

| GDT | Prop. | Rep./Assn | Type | Type Name | Lgth. | Remarks |
|---|---|---|---|---|---|---|
| Action Code 3802 | Action 3804 | Code 3806 | CCT 3808 | Code 3810 | 2 3812 | Restricted 3814 |

Fig. 39

| GDT | Prop. | Rep./ Assn. | Type |
|---|---|---|---|
| Active Indicator 3902 | Active Indicator 3904 | Indicator 3906 | CCT: Indicator 3908 |

Fig. 40a

| GDT | | | Cat. | Obj. Class | Prop. | Rep./ Assn. | Type | Type Name | Lgth. | Card. | Remarks |
|---|---|---|---|---|---|---|---|---|---|---|---|
| Address 4000a | | | | Address 4000b | | Details 4000c | | | | | |
| | Organisation Formatted Name 4002a | | E 4002b | Address 4002c | Organisation Formatted Name 4002d | Name 4002e | CCT 4002f | Text 4002g | ..40 4002h | 0..4 4002i | Restricted 4002j |
| | Person Name 4003a | | E 4003b | Address 4003c | Person Name 4003d | Person Name 4003e | GDT 4003f | Person Name 4003g | | 0..1 4003h | |
| | Functional Title Name 4004a | | E 4004b | Address 4004c | Functional Title Name 4004d | Name 4004e | CCT 4004f | Text 4004g | ..40 4004h | 0..1 4004i | Restricted 4004j |
| | Department Name 4005a | | E 4005b | Address 4005c | Department Name 4005d | Name 4005e | CCT 4005f | Text 4005g | ..40 4005h | 0..1 4005i | Restricted 4005j |
| | Office 4006a | | E 4006b | Address 4006c | Office 4006d | Details 4006e | | | | 0..1 4006f | |
| | | Building ID 4007a | E 4007b | Office 4007c | Building Identification 4007d | Identifier 4007e | CCT 4007f | Identifier 4007g | 1..10 4007h | 0..1 4007i | Restricted 4007j |

Fig. 40b

| | | Cat. | Obj. Class | Prop. | Rep./ Assn. | Type | Type Name | Lgth. | Card. | Remarks |
|---|---|---|---|---|---|---|---|---|---|---|
| | Floor ID 4008a | E 4008b | Office 4008c | Floor Identification 4008d | Identifier 4008e | CCT 4008f | Identifier 4008g | 1..10 4008h | 0..1 4008i | Restricted 4008j |
| | Room ID 4009a | E 4008b | Office 4008c | Room Identification 4008d | Identifier 4008e | CCT 4008f | Identifier 4008g | 1..10 4008h | 0..1 4008i | Restricted 4008j |
| | In-house Mail ID 4010a | E 4010b | Office 4010c | In-house Mail Identification 4010d | Identifier 4010d | CCT 4010e | Identifier 4010f | 1..10 4010g | 0..1 4010h | Restricted 4010i |
| | Correspon-dence Short Name 4011a | E 4011b | Office 4011c | Correspon-dence Short Name 4011d | Name 4011e | CCT 4011f | Text 4011f | ..10 4011g | 0..1 4011h | Restricted 4011i |
| Physical Address 4012a | | E 4012b | Address 4012c | Physical Address 4012d | Details 4012e | | | | 0..1 4012f | |
| | Country Code 4013a | E 4013b | Physical Address 4013c | Country Code 4013d | Code 4013e | GDT 4013f | Country Code 4013g | | 0..1 4013h | |
| | Region Code 4014a | E 4014b | Physical Address 4014c | Region Code 4014d | Code 4014e | GDT 4014f | Region Code 4014g | | 0..1 4014h | |

Fig. 40c

| | | Cat. | Obj. Class | Prop. | Rep./ Assn. | Type | Type Name | Lgth. | Card. | Remarks |
|---|---|---|---|---|---|---|---|---|---|---|
| | Street Postal Code 4015a | E 4014b | Physical Address 4015c | Street Zip Code 4015d | Code 4015e | CCT 4015f | Code 4015g | 1..10 4015h | 0..1 4015i | Restricted 4015j |
| | PO Box Postal Code 4016a | E 4016b | Physical Address 4016c | PO Box Zip Code 4016d | Code 4016e | CCT 4016f | Code 4016g | 1..10 4016h | 0..1 4016i | Restricted 4016j |

Fig. 40d

| | | Cat. | Obj. Class | Prop. | Rep./ Assn. | Type | Type Name | Lgth. | Card. | Remarks |
|---|---|---|---|---|---|---|---|---|---|---|
| | Company Postal Code 4017a | E 4017b | Physical Address 4017c | Company Zip Code 4017d | Code 4017e | CCT 4017f | Code 4017g | 1..10 4017h | 0..1 4017i | Restricted 4017j |
| | City Name 4018a | E 4018b | Physical Address 4018c | City Name 4018d | Name 4018e | CCT 4018f | Text 4018g | ..40 4018h | 0..1 4018i | Restricted 4018j |
| | Additional City Name 4019a | E 4019b | Physical Address 4019c | Additional City Name 4019d | Name 4019e | CCT 4019f | Text 4019g | ..40 4019h | 0..1 4019i | Restricted 4019j |
| | District Name 4020a | E 4020b | Physical Address 4020c | District Name 4020d | Name 4020e | CCT 4020f | Text 4020g | ..40 4020h | 0..1 4020i | Restricted 4020j |
| | PO Box ID 4021a | E 4021b | Physical Address 4021c | PO Box Identifica-tion 4021d | Identifier 4021e | CCT 4021f | Identifier 4021g | 1..10 4021h | 0..1 4021i | Restricted 4021j |
| | PO Box Indicator 4022a | E 4022b | Physical Address 4022c | PO Box Indicator 4022d | Indicator 4022e | CCT 4022f | Indicator 4022g | | 0..1 4022h | |

Fig. 40e

| | | Cat. | Obj. Class | Prop. | Rep./ Assn. | Type | Type Name | Lgth. | Card. | Remarks |
|---|---|---|---|---|---|---|---|---|---|---|
| | PO Box Country Code 4023a | E 4023b | Physical Address 4023c | PO Box Country Code 4023d | Code 4023e | GDT 4023f | Country Code 4023g | | 0..1 4023h | |
| | PO Box Region Code 4024a | E 4024b | Physical Address 4024c | PO Box Region Code 4024d | Code 4024e | GDT 4024f | Region Code 4024g | | 0..1 4024h | |
| | PO Box City Name 4025a | E 4025b | Physical Address 4025c | PO Box City Name 4025d | Name 4025e | CCT 4025f | Text 4025g | ..40 4025h | 0..1 4025i | Restricted 4025j |
| | Street Name 4026a | E 4026b | Physical Address 4026c | Street Name 4026d | Name 4026e | CCT 4026f | Text 4026g | ..60 4026h | 0..1 4026i | Restricted 4026j |
| | Street Prefix Name 4027a | E 4027b | Physical Address 4027c | Street Prefix Name 4027d | Name 4027e | CCT 4027f | Text 4027g | ..40 4027h | 0..2 4027i | Restricted 4027j |
| | Street Suffix Name 4028a | E 4028b | Physical Address 4028c | Street Suffix Name 4028d | Name 4028e | CCT 4028f | Text 4028g | ..40 4028h | 0..2 4028i | Restricted 4027j |

Fig. 40f

| | | Cat. | Obj. Class | Prop. | Rep./ Assn. | Type | Type Name | Lgth. | Card. | Remarks |
|---|---|---|---|---|---|---|---|---|---|---|
| | House ID 4029a | E 4029b | Physical Address 4029c | House Identifica-tion 4029d | Identifier 4029e | CCT 4029f | Identifier 4029g | 1..10 4029h | 0..1 4029i | Restricted 4029j |
| | Additional House ID 4030a | E 4030b | Physical Address 4030c | Additional House Identifica-tion 4030d | Identifier 4030e | CCT 4030f | Identifier 4030g | 1..10 4030h | 0..1 4030i | Restricted 4030j |
| | Building ID 4031a | E 4031b | Physical Address 4031c | Building Identifica-tion 4031d | Identifier 4031e | CCT 4031f | Identifier 4031g | 1..20 4031h | 0..1 4031i | Restricted 4031j |
| | Floor ID 4032a | E 4032b | Physical Address 4032c | Floor Identifica-tion 4032d | Identifier 4032e | CCT 4032f | Identifier 4032g | 1..10 4032h | 0..1 4032i | Restricted 4032j |
| | Room ID 4033a | E 4033b | Physical Address 4033c | Room Identifica-tion 4033d | Identifier 4033e | CCT 4033f | Identifier 4033g | 1..10 4033h | 0..1 4033i | Restricted 4033j |
| | Care Of Name 4034a | E 4034b | Physical Address 4034c | Care Of Name 4034d | Name 4034e | CCT 4034f | Text 4034g | ..40 4034h | 0..1 4034i | Restricted 4034j |

Fig. 40g

| | | Cat. | Obj. Class | Prop. | Rep./ Assn. | Type | Type Name | Lgth. | Card. | Remarks |
|---|---|---|---|---|---|---|---|---|---|---|
| | Description 4035a | E 4035b | Physical Address 4035c | Description 4035d | Text 4035e | GDT 4035f | Description 4035g | | 0.. un bounded 4035h | |
| Tax Jurisdiction Code 4036a | | E 4036b | Address 4036c | Tax Jurisdiction Code 4036d | Code 4036e | GDT 4036f | Tax-Juris-diction Code 4036g | | 0..1 4036h | |

Fig. 40h

| | | | Cat. | Obj. Class | Prop. | Rep./ Assn. | Type | Type Name | Card. |
|---|---|---|---|---|---|---|---|---|---|
| Time Zone Difference Value 4037a | | | E 4037b | Address 4037c | Time Zone Difference Value 4037d | Value 4037e | GDT 4037f | Time Zone Difference Value 4037g | 0..1 4037h |
| Geo Coor-dinates 4038a | | | E 4038b | Address 4038c | Geo Coordinates 4038d | Geo Coordinates 4038e | GDT 4038f | Geo Coordinates 4038g | 0..1 4038h |
| Communi-cation 4039a | | | E 4039b | Address 4039c | Communication 4039d | Details 4030e | | | 0..1 4039f |
| | Corres-pondence Language Code 4040a | | E 4040b | Commu-nication 4040c | Corres-pondence Language Code 4040d | Code 4040e | GDT 4040f | Language Code 4040g | 0..1 4040h |
| | Telephone 4041a | | E 4041b | Communi-cation 4041c | Telephone 4041d | Details 4041e | | | 0..un-bounded 4041f |
| | | Number 4042a | E 4042b | Telephone 4042c | Phone Number 4042d | Phone Number 4042e | GDT 4042f | Phone Number 4042g | 1 4042h |
| | | Number Default Indicator 4043a | E 4043b | Telephone 4043c | Number Default Indicator 4043d | Indicator 4043e | CCT 4043f | Indicator 4043g | 1 4043h |

Fig. 40i

| | | | Cat. | Obj. Class | Prop. | Rep./ Assn. | Type | Type Name | Card. |
|---|---|---|---|---|---|---|---|---|---|
| | | Number Description 4044a | E 4044b | Telephone 4044c | Number Description 4044d | Text 4044e | GDT 4044f | Description 4044g | 0.. un-bounded 4044h |
| | | Number Usage Denial Indicator 4045a | E 4045b | Telephone 4045c | Number Usage Denial Indicator 4045d | Indicator 4045e | CCT 4045f | Indicator 4045g | 1 4045h |
| | Mobile Phone 4046a | | E 4046b | Communi-cation 4046c | Mobile Phone 4046d | Details 4046e | | | 0.. un-bounded 4046f |
| | | Number 4047a | E 4047b | Mobile phone 4047c | Phone Number 4047d | Phone Number 4047e | GDT 4047f | Phone Number 4047g | 1 4047h |
| | | Number Default Indicator 4048a | E 4048b | Mobile phone 4048c | Number Default Indicator 4048d | Indicator 4048e | CCT 4048f | Indicator 4048g | 1 4048h |
| | | Number Description 4049a | E 4049b | Mobile phone 4049c | Number Description 4049d | Text 4049e | GDT 4049f | Description 4049g | 0.. un-bounded 4049h |

Fig. 40j

| | | | Cat. | Obj. Class | Prop. | Rep./ Assn. | Type | Type Name | Card. |
|---|---|---|---|---|---|---|---|---|---|
| | | Number Usage Denial Indicator 4050a | E 4050b | Mobile phone 4050c | Number Usage Denial Indicator 4050d | Indicator 4050e | CCT 4050f | Indicator 4050g | 1 4050h |
| | Facsimile 4051a | | E 4051b | Communi-cation 4051c | Facsimile 4051d | Details 4051e | | | 0.. un-bounded 4051f |
| | | Number 4052a | E 4052b | Facsimile 4052c | Phone Number 4052d | Phone Number 4052e | GDT 4052f | Phone Number 4052g | 1 4052h |

Fig. 40k

| | | Cat. | Obj. Class | Prop. | Rep./ Assn. | Type | Type Name | Card. | Re-marks |
|---|---|---|---|---|---|---|---|---|---|
| | Number Default Indicator 4053a | E 4053b | Facsimile 4053c | Number Default Indicator 4053d | Indicator 4053e | CCT 4053f | Indicator 4053g | 1 4053h | |
| | Number Description 4054a | E 4054b | Facsimile 4054c | Number Description 4054d | Text 4054e | GDT 4054f | Description 4054g | 0.. un-bounded 4054h | |
| | Number Usage Denial Indicator 4055a | E 4055b | Facsimile 4055c | Number Usage Denial Indicator 4055d | Indicator 4055e | CCT 4055f | Indicator 4055g | 1 4055h | |
| Email 4056a | | E 4056b | Communi-cation 4056c | Email 4056d | Details 4056e | | | 0.. un-bounded 4056f | |
| | Address 4057a | E 4057b | Email 4057c | Email Address 4057d | Email Address 4057e | GDT 4057f | Email Address 4057g | 1 4057g | |
| | Address Default Indicator 4058a | E 4058b | Email 4058c | Email Address Default-Indicator 4058d | Indicator 4058e | CCT 4058f | Indicator 4058g | 1 4058h | |
| | Address Description 4059a | E 4059b | Email 4059c | Email Address Description 4059d | Text 4059e | GDT 4059f | Description 4059g | 0.. un-bounded 4059h | |

Fig. 40I

| | | Cat. | Obj. Class | Prop. | Rep./ Assn. | Type | Type Name | Card. | Remarks |
|---|---|---|---|---|---|---|---|---|---|
| | Address Usage Denial Indicator 4060a | E 4060b | Email 4060c | Email Address Usage Denial Indicator 4060d | Indicator 4060e | CCT 4060f | Indicator 4060g | 1 4060g | |

Fig. 40m

| | | Cat. | Obj. Class | Prop. | Rep./ Assn. | Type | Type Name | Card. |
|---|---|---|---|---|---|---|---|---|
| Web 4061a | | E 4061b | Communication 4061c | Web 4061d | Details 4061e | | | 0.. un-bounded 4061f |
| | Address 4062a | E 4062b | Web 4062c | Web Address 4062d | Address 4062e | GDT 4062f | Web Address 4062g | 1 4062h |
| | Address Default Indicator 4063a | E 4063b | Web 4063c | Address Default Indicator 4063d | Indicator 4063e | CCT 4063f | Indicator 4063g | 1 4063h |
| | Address Description 4064a | E 4064b | Web 4064c | Address Description 4064d | Text 4064e | GDT 4064f | Description 4064g | 0.. un-bounded 4064h |

Fig. 41

| GDT | | Cat. | Obj. Class | Prop. | Rep./ Assn. | Type | Type Name | Lgth. | Card. | Remarks |
|---|---|---|---|---|---|---|---|---|---|---|
| Adjustment Reason Code 4100 | | | | Adjustment Reason 4114 | Code 4122 | CCT 4130 | Code 4138 | 0..35 4146 | | Restricted 4156 |
| | List ID 4102 | Attribute 4108 | | Identification 4116 | Identifier 4124 | xsd 4132 | token 4140 | 1..60 4148 | 0..1 4152 | |
| | List Version ID 4104 | Attribute 4110 | | Version 4118 | Identifier 4126 | xsd 4134 | token 4142 | 1..15 4150 | 0..1 4154 | |
| | List Agency ID 4106 | Attribute 4112 | | Identification 4120 | Identifier 4128 | xsd 4136 | token 4144 | 1..60 4152 | 0..1 4158 | |

Fig. 42

| GDT | Prop. | Rep./ Assn. | Type | Type Name |
|---|---|---|---|---|
| Allowed Indicator 4200 | Allowed 4202 | Indicator 4204 | CCT 4206 | Indicator 4208 |

Fig. 43

| GDT | Prop. | Rep./ Assn. | Type | Type Name |
|---|---|---|---|---|
| Amount 4300 | Amount 4302 | Amount 4304 | CCT 4306 | Amount 4308 |

Fig. 44

| GDT | Prop. | Rep./ Assn. | Type | Type Name |
|---|---|---|---|---|
| Amount Balance Indicator 4400 | Amount Balance 4402 | Indicator 4404 | CCT 4406 | Indicator 4408 |

Fig. 45

| GDT | Obj. Class | Prop. | Rep./ Assn. | Type | Type Name | Lgth. |
|---|---|---|---|---|---|---|
| Aspect ID 4500 | Aspect 4502 | Identification 4504 | Identifier 4506 | CCT 4508 | Identifier 4510 | 1..40 4512 |

Fig. 46

| CCT | | Cat. | Obj. Class | Prop. | Rep/ Assn. | Type | Type Name | Lgth. | Card. | Remarks |
|---|---|---|---|---|---|---|---|---|---|---|
| Attach -ment 4600 | | | | Attachment 4602 | Binary Object 4604 | xsd 4606 | normalized String 4608 | | | Title 4610 |
| | Id 4612 | A 4614 | Attachment 4616 | Identification 4618 | Identifier 4620 | xsd 4622 | string 4624 | 1..35 4626 | 1 4628 | Must be unique as used for references using the manifest 4630 |
| | Filename 4632 | A 4634 | Attachment 4636 | Filename 4638 | Text 4640 | xsd 4642 | String 4644 | ..70 4646 | 0..1 4648 | |

Fig. 47

| CDT | Obj. Class Qual. | Obj. Class | Prop. | Rep./ Assn. | Type | Type Name |
|---|---|---|---|---|---|---|
| Attachment Web Address 4700 | Attachment 4702 | Web Address 4704 | Address 4706 | Electronic Address 4708 | GDT 4710 | Web Address 4712 |

Fig. 48

| GDT | Cat. | Obj. Class | Prop. Term | Rep. Term | Type | Data Type | Lgth. |
|---|---|---|---|---|---|---|---|
| Batch ID 4800 | Complex Type 4802 | Batch 4804 | Identification 4806 | Identifier 4808 | CCT 4810 | Identifier 4812 | 1..10 4814 |
| | Attribute 4818 | Identification Scheme 4820 | Identification 4822 | Identifier 4824 | xsd 4826 | token 4828 | |
| | Attribute 4836 | Identification Scheme 4838 | Version 4840 | Identifier 4842 | xsd 4844 | token 4846 | |
| | Attribute 4854 | Identification Scheme Agency 4856 | Identification 4858 | Identifier 4860 | xsd 4862 | token 4864 | |
| | Attribute 4872 | Identification Scheme Agency 4874 | Scheme 4876 | Identifier 4878 | xsd 4880 | token 4882 | |
| | Attribute 4890 | Identification Scheme Agency 4892 | Scheme Agency 4894 | Identifier 4896 | xsd 4898 | token 4899 | |

Fig. 49

| GDT | Obj. Class | Prop. | Rep./ Assn. | Type | Type Name | Lgth. |
|---|---|---|---|---|---|---|
| Bidding Condition Code 4900 | Bidding 4902 | Condition 4904 | Code 4906 | CCT 4908 | Code 4910 | 2 4912 |

Fig. 50a

| GDT | | Cat. | Obj. Class | Prop. | Rep./ Assn. | Type | Type Name | Lgth. | Card. |
|---|---|---|---|---|---|---|---|---|---|
| Business Document Message Header 5000 | | | Business Document Message 5002 | Header 5004 | Details 5006 | GDT 5008 | | | |
| | ID 5010 | E 5012 | Business Document Message 5014 | Identification 5016 | Identifier 5018 | GDT 5020 | Business Document Message ID 5022 | 1..35 5024 | 1..1 5026 |
| | Refer-ence ID 5028 | E 5030 | Business Document Message 5032 | Reference Identification 5034 | Identifier 5036 | GDT 5038 | Business Document Message ID 5040 | 1..35 5042 | 0..1 5044 |

Fig. 50b

| GDT | | Cat. | Obj. Class | Prop. | Rep./ Assn. | Type | Type Name | Lgth. | Card. |
|---|---|---|---|---|---|---|---|---|---|
| | Creation Date Time 5046 | E 5048 | Business Document Message 5050 | Creation Date Time 5052 | Date Time 5054 | GDT 5056 | Date Time 5058 | | 1..1 5060 |
| | Sender Party 5062 | E 5064 | Business Document Message 5066 | Sender 5068 | Party 5070 | GDT 5072 | Business Document Message Header Party 5074 | | 0..1 5076 |
| | Recipient Party 5078 | E 5080 | Business Document Message 5082 | Recipient 5084 | Party 5086 | GDT 5088 | Business Document Message Header Party 5090 | | 0..n 5092 |

Fig. 51a

| GDT | | Cat. | Obj. Class | Prop. | Rep./ Assn. | Type | Type Name | Lgth. | Card. |
|---|---|---|---|---|---|---|---|---|---|
| Business Document Message Header Party 5100 | | | Business Document Message Header Party 5102 | Details 5104 | | | | | |
| | Internal ID 5106 | E 5108 | Business Document Message Header Party 5110 | Internal Identification 5112 | Identifier 5114 | GDT 5116 | Party Internal ID 5118 | | 0..1 5120 |
| | Standard ID 5122 | E 5124 | Business Document Message Header Party 5126 | Standard Identification 5128 | Identifier 5130 | GDT 5132 | Party Standard ID 5134 | | 0..n 5136 |

Fig. 51b

| GDT | | Cat. | Obj. Class | Prop. | Rep./ Assn. | Type | Type Name | Lgth. | Card. |
|---|---|---|---|---|---|---|---|---|---|
| | Contact Person 5138 | E 5140 | Business Document Message Header Party 5142 | Contact Person 5144 | Contact Person 5146 | GDT 5148 | Contact Person 5152 | | 0..1 5152 |

Fig. 52a

| GDT | | Cat. | Obj. Class | Prop. Term | Rep. Term | Type | Type Name | Lgth. | Card. |
|---|---|---|---|---|---|---|---|---|---|
| Business Document Message ID 5200 | | Complex Type 5202 | Business Document Message 5204 | Identification 5206 | Identifier 5208 | CCT 5210 | Identifier 5212 | 1..35 5214 | Restricted 5216 |
| | Scheme ID 5218 | Attribute 5220 | Identification Scheme 5222 | Identification 5224 | Identifier 5226 | xsd 5228 | token 5230 | 1..60 5232 | 0..1 5234 |

Fig. 52b

| GDT | | Cat. | Obj. Class | Prop. Term | Rep. Term | Type | Type Name | Lgth. | Card. |
|---|---|---|---|---|---|---|---|---|---|
| | Scheme Agency ID 5236 | Attribute 5238 | Identification Scheme Agency 5240 | Identification 5242 | Identifier 5244 | xsd 5246 | token 5248 | 1..60 5250 | 0..1 5252 |
| | Scheme Agency Scheme Agency ID 5254 | Attribute 5256 | Identification Scheme Agency 5258 | Scheme Agency 5260 | Identifier 5262 | xsd 5264 | token 5266 | 3 5268 | 0..1 5270 |

Fig. 53

| GDT | Obj. Class | Prop. | Rep./ Assn. | Type | Type Name |
|---|---|---|---|---|---|
| Business Transaction Blocked Indicator 5300 | Business Transaction 5302 | Blocked Indicator 5304 | Indicator 5306 | CCT 5308 | Indicator 5310 |

Fig. 54

| GDT | | Prop. | Rep./ Assn. | Type | Type Name |
|---|---|---|---|---|---|
| Completed Indicator 5400 | | Completed Indicator 5402 | Indicator 5404 | CCT 5406 | Indicator 5408 |

Fig. 55

| GDT | | Obj. Class | Prop. | Rep./ Assn. | Type Name | Lgth. | Remarks |
|---|---|---|---|---|---|---|---|
| Business Transaction-Document Group ID 5500 | Business Transaction Document 5502 | Group Identification 5504 | Identifier 5506 | CCT 5508 | Identifier 5510 | 1..10 5512 | Restricted 5514 |

Fig. 56a

| GDT | | Cat. | Obj. Class | Prop. | Rep./ Assn. | Type | Type Name | Lgth. | Card. | Remarks |
|---|---|---|---|---|---|---|---|---|---|---|
| Business Transaction Document ID 5600 | | | Business Transaction Document 5602 | Identifi- cation 5604 | Identifier 5606 | CCT 5608 | Identifier 5610 | 1..35 5612 | | Restricted 5614 |
| | Scheme ID 5616 | A 5618 | Identifi- cation Scheme 5620 | Identifi- cation 5622 | Identifier 5624 | xsd 5626 | token 5628 | 1..60 5630 | 0..1 5632 | |
| | Scheme Agency ID 5634 | A 5636 | Identifi- cation Scheme Agency 5638 | Identifi- cation 5640 | Identifier 5642 | xsd 5644 | token 5646 | 1..60 5648 | 0..1 5650 | |
| | Scheme Agency Scheme ID 5652 | A 5654 | Identifi- cation Scheme Agency 5656 | Scheme 5658 | Identifier 5660 | xsd 5662 | token 5664 | 1..60 5666 | 0..1 5668 | |

Fig. 56b

| GDT | | Cat. | Obj. Class | Prop. | Rep./ Assn. | Type | Type Name | Lgth. | Card. | Remarks |
|---|---|---|---|---|---|---|---|---|---|---|
| | Scheme Agency Scheme Agency ID 5670 | A 5672 | Identifi-cation Scheme Agency 5674 | Scheme Agency 5676 | Identifier 5678 | xsd 5680 | token 5682 | 3 5684 | 0..1 5686 | |

Fig. 57

| GDT | Obj. Class | Prop. | Rep./ Assn. | Type | Type Name | Lgth. | Remarks |
|---|---|---|---|---|---|---|---|
| Business Transaction Document Item Group ID 5700 | Business-Transaction Document Item 5702 | Group Identification 5704 | Identifier 5706 | CCT 5708 | Identifier 5710 | 3 5712 | Restricted 5714 |

Fig. 58

| CDT | Obj. Class Qual. | Obj. Class | Prop. | Rep./ Assn. | Type | Type Name | Lgth. | Remarks |
|---|---|---|---|---|---|---|---|---|
| Business Transaction Document Item Hierarchy Relationship Type Code 5800 | Business Transaction Document Item Hierarchy 5802 | Relationship 5804 | Type Code 5806 | Code 5808 | GDT 5810 | Relationship Type Code 5812 | 3 5814 | Restricted 5816 |

Fig. 59

| GDT | Obj. Class | Prop. | Rep./ Assn. | Type | Type Name | Lgth. | Remarks |
|---|---|---|---|---|---|---|---|
| Business Transaction Document Item ID 5900 | Business-Transaction Document Item 5902 | Identification 5904 | Identifier 5906 | CCT 5908 | Identifier 5910 | 1..10 5912 | Restricted 5914 |

Fig. 60

| GDT | Obj. Class | Prop. | Rep./ Assn. | Type | Type Name | Lgth. | Remarks |
|---|---|---|---|---|---|---|---|
| Business Transaction Document Item Schedule Line ID 6000 | Business Transaction Document Item Schedule Line 6002 | Identification 6004 | Identifier 6006 | CCT 6008 | Identifier 6010 | 1..4 6012 | Restricted 6014 |

Fig. 61

| GDT | Obj. Class | Prop. | Rep./ Assn. | Type | Type Name |
|---|---|---|---|---|---|
| Third Party Indicator 6100 | Business Transaction Document Item 6102 | Third Party Deal Indicator 6104 | Indicator 6106 | CCT 6108 | Indicator 6110 |

Fig. 62

| GDT | Obj. Class | Prop. | Rep./ Assn. | Type | Type Name | Lgth. | Remarks |
|---|---|---|---|---|---|---|---|
| Business Transaction Document Item Type Code 6200 | Business Transaction Document Item 6202 | Type 6204 | Code 6206 | CCT 6208 | Code 6210 | ..3 6212 | Restricted 6214 |

Fig. 63a

| CDT | | Cat. | Obj. Class | Prop. Qualifier | Prop. | Rep./ Assn. | Type | Type Name | Card. |
|---|---|---|---|---|---|---|---|---|---|
| Business Transaction -Document Location 6300 | | | Business Transaction Document Location 6302 | | | Details 6304 | | | |
| | Internal ID 6306 | E 6308 | Business Transaction Document Location 6310 | Internal 6312 | Identification 6314 | Identifier 6316 | CDT 6318 | Location Internal ID 6320 | 0..1 6322 |
| | Standard ID 6324 | E 6326 | Business Transaction Document Location 6328 | Standard 6330 | Identification 6332 | Identifier 6334 | CDT 6336 | Location Standard ID 6338 | 0..n 6340 |

Fig. 63b

| CDT | | Cat. | Obj. Class | Prop. Qualifier | Prop. | Rep./ Assn. | Type | Type Name | Card. |
|---|---|---|---|---|---|---|---|---|---|
| | Buyer ID 6342 | E 6344 | Business Transaction Document Location 6346 | Buyer 6348 | Identification 6350 | Identifier 6352 | CDT 6354 | Location Party ID 6356 | 0..1 6358 |
| | Seller ID 6360 | E 6364 | Business Transaction Document Location 6364 | Seller 6366 | Identification 6368 | Identifier 6370 | CDT 6372 | Location Party ID 6374 | 0..1 6376 |
| | Product Recipient ID 6378 | E 6380 | Business Transaction Document Location 6390 | Product Recipient 6392 | Identification 6394 | Identifier 6396 | CDT 6398 | Location Party ID 6399 | 0..1 6301A |
| | Vendor ID 6302A | E 6303A | Business Transaction Document Location 6304A | Vendor 6305A | Identification 6306A | Identifier 6307A | CDT 6308A | Location Party ID 6309A | 0..1 6310A |
| | Bill To ID 6311A | E 6312A | Business Transaction -Document Location 6313A | Bill To 6314A | Identification 6315A | Identifier 6316A | CDT 6317A | Location Party ID 6318A | 0..1 6319A |

Fig. 63c

| CDT | | Cat. | Obj. Class | Prop. Qualifier | Prop. | Rep./ Assn. | Type | Type Name | Card. |
|---|---|---|---|---|---|---|---|---|---|
| | Bill From ID 6320A | E 6321A | Business Transaction Document Location 6322A | Bill From 6323A | Identification 6324A | Identifier 6325A | CDT 6326A | Location Party ID 6327A | 0..1 6328A |
| | Bidder ID 6329A | E 6330A | Business Transaction Document Location 6331A | Bidder 6332A | Identification 6333A | Identifier 6334A | CDT 6335A | Location Party ID 6336A | 0..1 6337A |
| | Address 6338A | E 6339A | Business Transaction Document Location 6340A | | Address 6340A | Address 6341A | GDT 6342A | Address 6343A | 0..1 6344A |
| | Note 6345A | E 6346A | Business Transaction Document Location 6347A | | Note 6348A | Text 6349A | GDT 6350A | Note 6351A | 0..1 6352A |

Fig. 64a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Party 6400 | | | Business Transaction Document Party 6402 | | | Details 6404 | | | |
| | Internal ID 6406 | E 6408 | Business Transaction Document Party 6410 | Internal 6412 | Identification 6414 | Identifier 6416 | CDT 6418 | Party Internal ID 6420 | 0..1 6422 |
| | Standard ID 6424 | E 6426 | Business Transaction Document Party 6428 | Standard 6430 | Identification 6432 | Identifier 6434 | CDT 6436 | Party Standard ID 6438 | 0..n 6440 |
| | Buyer ID 6442 | E 6444 | Business Transaction Document Party 6446 | Buyer 6448 | Identification 6450 | Identifier 6452 | CDT 6454 | Party Party ID 6456 | 0..1 6458 |

Fig. 64b

| CDT | | Cat. | Obj. Class | Prop. Qualifier | Prop. | Rep./ Assn. | Type | Type Name | Card. |
|---|---|---|---|---|---|---|---|---|---|
| | Seller ID 6460 | E 6462 | Business Transaction Document Party 6464 | Seller 6466 | Identification 6468 | Identifier 6470 | CDT 6472 | Party Party ID 6474 | 0..1 6476 |
| | Product Recipient ID 6478 | E 6480 | Business Transaction Document Party 6482 | Product Recipient 6484 | Identification 6486 | Identifier 6488 | CDT 6490 | Party Party ID 6492 | 0..1 6494 |
| | Vendor ID 6496 | E 6498 | Business Transaction Document Party 6499 | Vendor 6401A | Identification 6402A | Identifier 6403A | CDT 6404A | Party Party ID 6405A | 0..1 6406A |
| | Bill To ID 6407A | E 6408A | Business Transaction Document Party 6409A | Bill To 6410A | Identification 6411A | Identifier 6412A | CDT 6413A | Party Party ID 6414A | 0..1 6415A |
| | Bill From ID 6416A | E 6417A | Business Transaction Document Party 6418A | Bill From 6419A | Identification 6420A | Identifier 6421A | CDT 6422A | Party Party ID 6423A | 0..1 6424A |

Fig. 64c

| CDT | | Cat. | Obj. Class | Prop. Qualifier | Prop. | Rep./ Assn. | Type | Type Name | Card. |
|---|---|---|---|---|---|---|---|---|---|
| | Bidder ID 6425A | E 6426A | Business Transaction Document Party 6427A | Bidder 6428A | Identification 6429A | Identifier 6430A | CDT 6431A | Party Party ID 6432A | 0..1 6433A |
| | Address 6434A | E 6435A | Business Transaction Document Party 6436A | | Address 6437A | Address 6438A | AGDT 6440A | Address 6441A | 0..1 6442A |
| | Contact Person 6443A | E 6444A | Business Transaction Document Party 6445A | | Contact Person 6446A | Contact Person 6447A | CDT 6448A | Contact Person 6449A | 0..1 6450A |

Fig. 65

| GDT | Obj. Class | Prop. | Rep./ Assn. | Type | Type Name |
|---|---|---|---|---|---|
| Business Transaction Document-Pricing Indicator 6500 | Business Transaction Document 6502 | Pricing Indicator 6504 | Indicator 6506 | CCT 6508 | Indicator 6510 |

Fig. 66a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Product 6600 | | | Business Transaction Document Product 6602 | | | Details 6604 | | | |
| | Internal ID 6606 | E 6608 | Business Transaction Document Product 6610 | Internal 6612 | Identification 6614 | Identifier 6616 | CDT 6618 | Product Internal ID 6620 | 0..1 6622 |
| | Standard ID 6624 | E 6626 | Business Transaction Document Product 6628 | Standard 6630 | Identification 6632 | Identifier 6634 | CDT 6636 | Product Standard ID 6638 | 0..n 6640 |
| | Buyer ID 6642 | E 6644 | Business Transaction Document Product 6646 | Buyer 6648 | Identification 6650 | Identifier 6652 | CDT 6654 | Product Party ID 6656 | 0..1 6658 |
| | Seller ID 6660 | E 6662 | Business Transaction Document Product 6664 | Seller 6666 | Identification 6668 | Identifier 6670 | CDT 6672 | Product Party ID 6674 | 0..1 6676 |

Fig. 66b

| CDT | | Cat. | Obj. Class | Prop. Qualifier | Prop. | Rep./ Assn. | Type | Type Name | Card. |
|---|---|---|---|---|---|---|---|---|---|
| | Product Recipient ID 6678 | E 6680 | Business Transaction Document Product 6682 | Product Recipient 6684 | Identification 6686 | Identifier 6688 | CDT 6690 | Product Party ID 6692 | 0..1 6694 |
| | Vendor ID 6696 | E 6698 | Business Transaction Document Product 6699 | Vendor 6601A | Identification 6602A | Identifier 6603A | CDT 6604A | Product Party ID 6605A | 0..1 6606A |
| | Manufacturer ID 6607A | E 6608A | Business Transaction Document Product 6609A | Manu-facturer 6610A | Identification 6611A | Identifier 6612A | CDT 6613A | Product Party ID 6614A | 0..1 6615A |
| | Bill To ID 6616A | E 6617A | Business Transaction Document Product 6618A | Bill To 6619A | Identification 6620A | Identifier 6621A | CDT 6622A | Product Party ID 6623A | 0..1 6624A |
| | Bill From ID 6625A | E 6626A | Business Transaction Document Product 6627A | Bill From 6628A | Identification 6629A | Identifier 6630A | CDT 6631A | Product Party ID 6632A | 0..1 6633A |

Fig. 66c

| CDT | | Cat. | Obj. Class | Prop. Qualifier | Prop. | Rep./ Assn. | Type | Type Name | Card. |
|---|---|---|---|---|---|---|---|---|---|
| | Bidder ID 6634A | E 6635A | Business Transaction Document Product 6636A | Bidder 6637A | Identification 6638A | Identifier 6639A | CDT 6640A | Product Party ID 6641A | 0..1 6642A |
| | Type Code 6643A | E 6644A | Business Transaction Document Product 6645A | | Type Code 6646A | Code 6647A | GDT 6648A | Product Type Code 6649A | 0..1 6650A |
| | Note 6651A | E 6652A | Business Transaction Document Product 6653A | | Note 6654A | Note 6655A | GDT 6656A | Note 6657A | 0..1 6658A |
| Flat include of movement data | Change ID 6659A | E 6660A | Business Transaction Document Product 6661A | | Change Identification 6662A | Identifier 6663A | GDT 6664A | Product Change ID 6667A | 0..1 6666A |
| | Discontinuation Indicator 6666A | E 6667A | Business Transaction Document Product 6668A | | Discontinuation 6669A | Indicator 6670A | GDT 6671A | Product Discon-tinuation Indicator 6672A | 0..1 6673A |

Fig. 66d

| CDT | | Cat. | Obj. Class | Prop. Qualifier | Prop. | Rep./ Assn. | Type | Type Name | Card. |
|---|---|---|---|---|---|---|---|---|---|
| | Package Quantity 6674A | E 6675A | Business Transaction Document Product 6676A | Package 6677A | Quantity 6678A | Quantity 6679A | GDT 6680A | Quantity 6681A | 0..1 6682A |

Fig. 67a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Product Cat. 6700 | | | Business Transaction Document Product Cat. 6702 | | | Details 6704 | | | |
| | Internal ID 6706 | E 6708 | Business Transaction Document Product Cat. 6710 | Internal 6712 | Identification 6714 | Identifier 6716 | CDT 6718 | Product Cat. Internal ID 6720 | 0..1 6722 |
| | Standard ID 6724 | E 6726 | Business Transaction Document Product Cat. 6728 | Standard 6730 | Identification 6732 | Identifier 6734 | CDT 6736 | Product Cat. Standard ID 6738 | 0..n 6740 |

Fig. 67b

| CDT | | Cat. | Obj. Class | Prop. Qualifier | Prop. | Rep./ Assn. | Type | Type Name | Card. |
|---|---|---|---|---|---|---|---|---|---|
| | Buyer ID 6742 | E 6744 | Business Transaction Document Product Cat. 6746 | Buyer 6748 | Identification 6750 | Identifier 6752 | CDT 6754 | Product Cat. Party ID 6756 | 0..1 6758 |
| | Seller ID 6760 | E 6762 | Business Transaction Document Product Cat. 6764 | Seller 6768 | Identification 6768 | Identifier 6770 | CDT 6772 | Product Cat. Party ID 6774 | 0..1 6776 |
| | Product Recipient ID 6778 | E 6780 | Business Transaction Document Product 6782 | Product Recipient 6784 | Identification 6786 | Identifier 6788 | CDT 6790 | Product Cat. Party ID 6792 | 0..1 6794 |
| | Vendor ID 6796 | E 6798 | Business Transaction Document Product 6799 | Vendor 6701A | Identification 6702A | Identifier 6703A | CDT 6704A | Product Cat. Party ID 6705A | 0..1 6706A |
| | Bill To ID 6707A | E 6708A | Business Transaction Document Product 6709A | Bill To 6710A | Identification 6711A | Identifier 6712A | CDT 6713A | Product Cat. Party ID 6714A | 0..1 6715A |

Fig. 67c

| CDT | | Cat. | Obj. Class | Prop. Qualifier | Prop. | Rep./ Assn. | Type | Type Name | Card. |
|---|---|---|---|---|---|---|---|---|---|
| | Bill From ID 6716A | E 6717A | Business Transaction Document Product 6718A | Bill From 6719A | Identification 6720A | Identifier 6721A | CDT 6722A | Product Cat.-Party ID 6723A | 0..1 6724A |
| | Bidder ID 6725A | E 6726A | Business Transaction Document Product 6727A | Bidder From 6728A | Identification 6729A | Identifier 6730A | CDT 6731A | Product Cat.-Party ID 6732A | 0..1 6733A |

Fig. 68

| GDT | Cat. | Obj. Class | Prop. | Rep./ Assn. | Type | Type Name |
|---|---|---|---|---|---|---|
| Business Transaction Document Public Indicator 6800 | | Business Transaction Document 6802 | Public Indicator 6804 | Indicator 6806 | CCT 6808 | Indicator 6810 |

Fig. 69

| GDT | | Cat. | Obj. Class | Prop. | Rep./ Assn. | Type | Type Name | Card. |
|---|---|---|---|---|---|---|---|---|
| Business Transaction Document-Reference 6900 | | | Business Transaction Document Reference 6902 | | Details 6904 | | | |
| | ID 6906 | E 6908 | Business Transaction Document Reference 6910 | Identification 6912 | Identifier 6914 | GDT 6916 | Business Transaction Document ID 6918 | 0..1 6920 |
| | Item ID 6922 | E 6924 | Business Transaction Document Reference 6926 | Item Identification 6928 | Identifier 6930 | GDT 6932 | Business Transaction Document-Item ID 6934 | 0..n 6936 |

Fig. 70

| GDT | Obj. Class | Prop. | Rep./ Assn. | Type | Type Name |
|---|---|---|---|---|---|
| Business Transaction Document Settlement Relevance Indicator 7000 | Business Transaction Document 7002 | Settlement Relevance Indicator 7004 | Indicator 7006 | CCT 7008 | Indicator 7010 |

Fig. 71a

| CDT | | Cat. | Obj. Class | Prop. Qualifier | Prop. | Rep/ Assn. | Type | Type Name | Ca rd. |
|---|---|---|---|---|---|---|---|---|---|
| Business Transaction -Document Ship From Location 7100 | | | Business Transaction -Document Ship From Location 7102 | | | Details 7104 | | | |
| | Internal ID 7106 | E 7108 | Business Transaction Document Ship From Location 7110 | Internal 7112 | Identifica-tion 7114 | Identifier 7116 | CDT 7118 | Location Internal ID 7120 | 0..1 7122 |
| | Standard ID 7124 | E 7126 | Business Transaction -Document Ship From Location 7128 | Standard 7130 | Identificatio n 7132 | Identifier 7134 | CDT 7136 | Location Standard ID 7138 | 0..n 7140 |

Fig. 71b

| CDT | | Cat. | Obj. Class | Prop. Qualifier | Prop. | Rep/ Assn. | Type | Type Name | Ca rd. |
|---|---|---|---|---|---|---|---|---|---|
| | Buyer ID 7142 | E 7144 | Business Transaction Document Ship From Location 7146 | Buyer 7148 | Identification 7150 | Identifier 7152 | CDT 7154 | Location Party ID 7156 | 0..1 7158 |
| | Seller ID 7160 | E 7162 | Business Transaction Document Ship From Location 7164 | Seller 7166 | Identification 7168 | Identifier 7172 | CDT 7172 | Location Party ID 7174 | 0..1 7176 |
| | Product Recipient ID 7178 | E 7180 | Business Transaction Document Ship From Location 7182 | Product Recipient 7184 | Identification 7186 | Identifier 7188 | CDT 7190 | Location Party ID 7192 | 0..1 7194 |

Fig. 71c

| CDT | | Cat. | Obj. Class | Prop. Qualifier | Prop. | Rep/ Assn. | Type | Type Name | Ca rd. |
|---|---|---|---|---|---|---|---|---|---|
| | Vendor ID 7196 | E 7198 | Business Transaction Document Ship From Location 7199 | Vendor 7101A | Identifica-tion 7102A | Identifier 7103A | CDT 7104A | Location Party ID 7105A | 0..1 7106A |
| | Address 7107A | E 7108A | Business Transaction Document Ship From Location 7109A | | Address 7110A | Address 7111A | GDT 7112A | Address 7113A | 0..1 7114A |
| | Note 7115A | E 7116A | Business Transaction Document Ship From Location 7117A | | Note 7118A | Text 7119A | GDT 7120A | Note 7121A | 0..1 7122A |

Fig. 71d

| CDT | | Cat. | Obj. Class | Prop. Qualifier | Prop. | Rep/ Assn. | Type | Type Name | Card. |
|---|---|---|---|---|---|---|---|---|---|
| | Loading Location 7123A | E 7124A | Business Transaction Document Ship From Location 7125A | | Loading Location 7126A | Business Transaction-Document Location 7127A | GDT 7128A | Business Transaction Document Location 7129A | 0..1 7130A |

Fig. 72a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Ship To Location 7200 | | | Business Transaction Document Ship To Location 7202 | | | Details 7204 | | | |

Fig. 72b

| CDT | | Cat. | Obj. Class | Prop. Qualifier | Prop. | Rep./ Assn. | Type | Type Name | Card. |
|---|---|---|---|---|---|---|---|---|---|
| | Internal ID 7206 | E 7208 | Business Transaction Document Ship To Location 7210 | Internal 7212 | Identification 7214 | Identifier 7216 | CDT 7218 | Location Internal ID 7220 | 0..1 7222 |
| | Standard ID 7224 | E 7226 | Business Transaction Document Ship To Location 7228 | Standard 7230 | Identification 7232 | Identifier 7234 | CDT 7236 | Location Standard ID 7238 | 0..n 7240 |
| | Buyer ID 7242 | E 7244 | Business Transaction Document Ship To Location 7246 | Buyer 7248 | Identification 7250 | Identifier 7252 | CDT 7254 | Location Party ID 7256 | 0..1 7258 |

Fig. 72c

| CDT | | Cat. | Obj. Class | Prop. Qual. | Prop. | Rep./ Assn. | Type | Type Name | Card. |
|---|---|---|---|---|---|---|---|---|---|
| | Seller ID 7260 | E 7262 | Business TransactionDocument Ship To Location 7264 | Seller 7266 | Identification 7268 | Identifier 7270 | CDT 7272 | Location Party ID 7274 | 0..1 7276 |
| | Product Recipient ID 7278 | E 7280 | Business TransactionDocument Ship To Location 7282 | Product Recipient 7284 | Identification 7286 | Identifier 7288 | CDT 7290 | Location Party ID 7292 | 0..1 7294 |
| | Vendor ID 7296 | E 7298 | Business Transaction Document Ship To Location 7299 | Vendor 7201A | Identification 7201A | Identifier 7202A | CDT 7203A | Location Party ID 7204A | 0..1 7205A |

Fig. 72d

| CDT | | Cat. | Obj. Class | Prop. Qual. | Prop. | Rep./ Assn. | Type | Type Name | Card. |
|---|---|---|---|---|---|---|---|---|---|
| | Address 7206A | E 7207A | Business Transaction Document Ship To Location 7208A | | Address 7209A | Address 7210A | GDT 7211A | Address 7212A | 0..1 7213A |
| | Note 7214A | E 7215A | Business Transaction Document Ship To Location 7216A | | Note 7217A | Text 7218A | GDT 7219A | Note 7220A | 0..1 7221A |
| | Unloading Location 7222A | E 7223A | Business Transaction Document Ship To Location 7224A | | Unloading Location 7224A | Business Transaction Document Location 7226A | GDT 7227A | Business Transaction Document Location 7228A | 0..1 7229A |

Fig. 73a

| CDT | | Cat. | Obj. Class | Prop. Qual. | Prop. | Rep./ Assn. | Type | Type Name | Card. |
|---|---|---|---|---|---|---|---|---|---|
| Business Transaction Document Trans-shipment Location 7300 | | | Business Transaction Document Trans-shipment Location 7302 | | | Details 7304 | | | |
| | Internal ID 7306 | E 7308 | Business Transaction Document Trans-shipment Location 7310 | Internal 7312 | Identification 7314 | Identifier 7316 | CDT 7318 | Location Internal ID 7320 | 0..1 7322 |
| | Standard ID 7324 | E 7326 | Business Transaction Document Trans-shipment Location 7328 | Standard 7328 | Identification 7330 | Identifier 7332 | CDT 7334 | Location Standard ID 7336 | 0..n 7338 |

Fig. 73b

| CDT | | Cat. | Obj. Class | Prop. Qual. | Prop. | Rep./Assn. | Type | Type Name | Card. |
|---|---|---|---|---|---|---|---|---|---|
| | Buyer ID 7340 | E 7342 | Business Transaction Document Trans-shipment Location 7344 | Buyer 7346 | Identification 7348 | Identifier 7350 | CDT 7352 | Location Party ID 7354 | 0..1 7356 |
| | Seller ID 7358 | E 7360 | Business Transaction Document Trans-shipment Location 7362 | Seller 7364 | Identification 7366 | Identifier 7368 | CDT 7370 | Location Party ID 7374 | 0..1 7374 |
| | Product Recipient 7376 | E 7378 | Business Transaction Document Trans-shipment Location 7380 | Product Recipient 7382 | Identification 7384 | Identifier 7386 | CDT 7388 | Location Party ID 7390 | 0..1 7392 |

Fig. 73c

| CDT | | Cat. | Obj. Class | Prop. Qual. | Prop. | Rep./ Assn. | Type | Type Name | Card. |
|---|---|---|---|---|---|---|---|---|---|
| | Vendor ID 7394 | E 7396 | Business Transaction Document Trans-shipment Location 7398 | Vendor 7399 | Identification 7301A | Identifier 7302A | CDT 7303A | Location Party ID 7304A | 0..1 7305A |
| | Address 7306A | E 7307A | Business Transaction Document Trans-shipment Location 7308A | | Address 7309A | Address 7310A | GDT 7311A | Address 7312A | 0..1 7313A |
| | Note 7314A | E 7315A | Business Transaction Document Trans-shipment Location 7316A | | Note 7317A | Text 7318A | GDT 7319A | Note 7320A | 0..1 7321A |

Fig. 73d

| CDT | | Cat. | Obj. Class | Prop. Qual. | Prop. | Rep./ Assn. | Type | Type Name | Card. |
|---|---|---|---|---|---|---|---|---|---|
| | Loading Location 7322A | E 7323A | Business Transaction Document Trans-shipment Location 7324A | | Loading Location 7325A | Business Transaction-Document Location 7326A | GDT 7327A | Business TransactionDocument Location 7328A | 0..1 7329A |
| | Unloading Location 7330A | E 7331A | Business Transaction Document Trans-shipment Location 7332A | | Unloading Location 7333A | Business Transaction-Document Location 7334A | GDT 7335A | Business TransactionDocument Location 7336A | 0..1 7337A |

Fig. 74

| GDT | Obj. Class | Prop. | Rep./ Assn. | Type | Type Name | Lgth. | Remarks |
|---|---|---|---|---|---|---|---|
| Business Transaction Document Type Code 7400 | Business Transaction Document 7402 | Type 7404 | Code 7406 | CCT 7408 | Code 7410 | ..3 7412 | Restricted 7414 |

Fig. 75

| GDT | Obj. Class | Prop. | Rep./ Assn. | Type | Type Name | Lgth. | Remarks |
|---|---|---|---|---|---|---|---|
| Business Transaction Execution Status Code 7500 | Business Transaction 7502 | Execution Status Code 7504 | Code 7506 | CCT 7508 | Code 7510 | 1 7512 | Restricted 7514 |

Fig. 76

| GDT | Obj. Class | Prop. | Rep./ Assn. | Type | Type Name | Lgth. | Remarks |
|---|---|---|---|---|---|---|---|
| Business Transaction Priority Code 7600 | Business Transaction 7602 | Priority Code 7604 | Code 7606 | CCT 7608 | Code 7608 | 1 7610 | Restricted 7612 |

Fig. 77

| GDT | Obj. Class | Prop. | Rep./ Assn. | Type | Type Name | Lgth. | Remarks |
|---|---|---|---|---|---|---|---|
| Business Transaction Type Code 7700 | Business Transaction 7702 | Type Code 7704 | Code 7706 | CCT 7708 | Code 7710 | 4 7712 | Restricted 7714 |

Fig. 78

| GTD | | Cat. | Obj. Class | Prop. | Rep./ Assn. | Type | Type Name | Lgth. | Card. |
|---|---|---|---|---|---|---|---|---|---|
| Cash Discount 7800 | | | Cash Discount 7802 | | Details 7804 | | | | |
| | Days Value 7806 | E 7808 | Cash Discount 7810 | Days 7812 | Value 7814 | GDT 7816 | Integer Value 7818 | 1..3 7820 | 1 7822 |
| | Percent 7824 | E 7826 | Cash Discount 7828 | Percent 7830 | Percent 7832 | GDT 7834 | Percent 7836 | Max. 5/3 7838 | 1 7840 |

Fig. 79

| GDT | | Cat. | Obj. Class | Prop. | Rep./ Assn. | Type | Data Type | Lgth. | Card. |
|---|---|---|---|---|---|---|---|---|---|
| Cash Discount Terms 7900 | | | Cash Discount Terms 7902 | | Details 7904 | | | | |
| | Payment Baseline Date 7906 | E 7908 | Cash Discount Terms 7910 | Payment Baseline Date 7912 | Date 7914 | GDT 7916 | Date 7918 | | 0..1 7920 |
| | Maximum Cash Discount 7922 | E 7924 | Cash Discount Terms 7926 | Maximum Cash Discount 7928 | Details 7930 | GDT 7932 | Cash Discount 7934 | | 0..1 7936 |
| | Normal Cash Discount 7938 | E 7940 | Cash Discount Terms 7942 | Normal Cash Discount 7944 | Details 7946 | GDT 7948 | Cash Discount 7950 | | 0..1 7952 |
| | Full Payment Due Days Value 7954 | E 7956 | Cash Discount Terms 7960 | Full Payment Due Days 7962 | Value 7964 | GDT 7966 | Integer Value 7968 | 1..3 7970 | 0..1 7972 |

Fig. 80a

| GDT | | Cat. | Obj. Class | Prop. | Rep./ Assn. | Type | Type Name | Lgth. | Card. | Remarks |
|---|---|---|---|---|---|---|---|---|---|---|
| Catalogue ID 8000 | | | Catalog 8002 | Identification 8004 | Identifier 8006 | CCT 8008 | Identifier 8010 | 1..40 8012 | | Restricted 8014 |
| | Scheme ID 8016 | A 8018 | Identification Scheme 8020 | Identification 8022 | Identifier 8024 | xsd 8026 | token 8028 | 1..60 8030 | 0..1 8032 | |
| | Scheme Agency ID 8034 | A 8036 | Identification Scheme Agency 8038 | Identification 8040 | Identifier 8042 | xsd 8044 | token 8046 | 1..60 8048 | 0..1 8050 | |
| | Scheme Agency Scheme ID 8052 | A 8054 | Identification Scheme Agency 8056 | Scheme 8058 | Identifier 8060 | xsd 8062 | token 8064 | 1..60 8066 | 0..1 8068 | |

Fig. 80b

| GDT | | Cat. | Obj. Class | Prop. | Rep./ Assn. | Type | Type Name | Lgth. | Card. | Remarks |
|---|---|---|---|---|---|---|---|---|---|---|
| | Scheme Agency Scheme Agency ID 8070 | A 8072 | Identification Scheme Agency 8074 | Scheme Agency 8076 | Identifier 8078 | xsd 8080 | token 8082 | 3 8084 | 0..1 8086 | |

Fig. 81

| GDT | Obj. Class | Prop. | Rep./ Assn. | Type | Type Name | Lgth. | Remarks |
|---|---|---|---|---|---|---|---|
| Catalogue Item ID 8100 | Catalogue Item 8102 | Identification 8104 | Identifier 8106 | CCT 8108 | Identifier 8110 | 1..40 8112 | Restricted 8114 |

Fig. 82

| GDT | | Cat. | Obj. Class | Prop. | Rep./ Assn. | Type | Type Name | Card. |
|---|---|---|---|---|---|---|---|---|
| Catalogue Reference 8200 | | | Catalogue Reference 8202 | | Details 8204 | | | |
| | ID 8206 | E 8208 | Catalogue Reference 8210 | Identification 8212 | Identifier 8214 | GDT 8216 | Catalogue ID 8218 | 1 8220 |
| | Item ID 8222 | E 8224 | Catalogue Reference 8226 | Item Identification 8228 | Identifier 8230 | GDT 8232 | Catalogue Item ID 8234 | 0..n 8236 |

Fig. 83

| GDT | Obj. Class | Prop. | Rep./ Assn. | Type | Type Name | Lgth. | Remarks |
|---|---|---|---|---|---|---|---|
| Catalogue Schema ID 8300 | Catalogue Schema 8302 | Identification 8304 | Identifier 8306 | CCT 8308 | Identifier 8310 | 1..40 8312 | Restricted 8314 |

Fig. 84

| GDT | Obj. Class | Prop. | Rep./ Assn. | Type | Type Name | Lgth. | Remarks |
|---|---|---|---|---|---|---|---|
| Catalogue Schema Type Code 8400 | Catalogue Schema 8402 | Type 8404 | Code 8406 | CCT 8408 | Code 8410 | 2 8412 | Restricted 8414 |

Fig. 85

| GDT | Obj. Class | Prop. | Rep./ Assn. | Type | Type Name | Lgth. | Remarks |
|---|---|---|---|---|---|---|---|
| Catalogue Section ID 8500 | Catalogue Section 8502 | Identification 8504 | Identifier 8506 | CCT 8508 | Identifier 8510 | 1..40 8512 | Restricted 8514 |

Fig. 86

| GDT | Obj. Class | Prop. | Rep./ Assn. | Type | Type Name | Lgth. | Remarks |
|---|---|---|---|---|---|---|---|
| Catalogue Section Type ID 8600 | Catalogue Section Type 8602 | Identification 8604 | Identifier 8606 | CCT 8608 | Identifier 8610 | 1..40 8612 | Restricted 8614 |

Fig. 87

| GDT | Obj. Class | Prop. | Rep./ Assn. | Type | Type Name | Lgth. | Remarks |
|---|---|---|---|---|---|---|---|
| Catalogue Type Code 8700 | Catalog 8702 | Type 8704 | Code 8706 | CCT 8708 | Code 8710 | 2 8712 | Restricted 8714 |

Fig. 88

| GDT | Obj. Class | Prop. | Rep./ Assn. | Type | Type Name | Lgth. | Remarks |
|---|---|---|---|---|---|---|---|
| Catalogue View ID 8800 | Catalogue View 8802 | Identification 8804 | Identifier 8806 | CCT 8808 | Identifier 8810 | 1..40 8812 | Restricted 8814 |

Fig. 89

| GDT | Obj. Class | Prop. | Rep./ Assn. | Type | Type Name |
|---|---|---|---|---|---|
| Complete Transmission Indicator 8900 | Complete Transmission 8902 | Indicator 8904 | Indicator 8906 | CCT 8908 | Indicator 8910 |

Fig. 90

| GDT | Prop. Term | Rep./ Assn. | Type | Type Name |
|---|---|---|---|---|
| Consignment Indicator 9000 | Consignment Indicator 9002 | Indicator 9004 | CCT 9006 | Indicator 9008 |

Fig. 91a

| CDT | | Cat. | Obj. Class | Prop. Qual. | Prop. | Rep./ Assn. | Type | Type Name | Card. |
|---|---|---|---|---|---|---|---|---|---|
| Contact Person 9100 | | | Contact Person 9102 | | | Details 9104 | | | |
| | Internal ID 9106 | E 9108 | Contact Person 9110 | Internal 9112 | Identification 9114 | Identifier 9116 | CDT 9118 | Contact Person Internal ID 9120 | 0..1 9122 |
| | Buyer ID 9124 | E 9126 | Contact Person 9128 | Buyer 9130 | Identification 9132 | Identifier 9134 | CDT 9136 | Contact Person Party ID 9138 | 0..1 9140 |
| | Seller ID 9142 | E 9144 | Contact Person 9146 | Seller 9148 | Identification 9150 | Identifier 9152 | CDT 9154 | Contact Person Party ID 9156 | 0..1 9158 |
| | Product Recipient ID 9160 | E 9162 | Contact Person 9164 | Product Recipient 9166 | Identification 9168 | Identifier 9170 | CDT 9172 | Contact Person Party ID 9174 | 0..1 9176 |

Fig. 91b

| CDT | | Cat. | Obj. Class | Prop. Qual. | Prop. | Rep./ Assn. | Type | Type Name | Card. |
|---|---|---|---|---|---|---|---|---|---|
| | Vendor ID 9178 | E 9180 | Contact Person 9182 | Vendor 9184 | Identification 9186 | Identifier 9188 | CDT 9190 | Contact Person Party ID 9192 | 0..1 9194 |
| | Bill To ID 9196 | E 9198 | Contact Person 9199 | Bill To 9101A | Identification 9102A | Identifier 9103A | CDT 9104A | Contact Person Party ID 9105A | 0..1 9106A |
| | Bill From ID 9107A | E 9108A | Contact Person 9109A | Bill From 9110A | Identification 9111A | Identifier 9112A | CDT 9113A | Contact Person Party ID 9114A | 0..1 9115A |
| | Bidder ID 9116A | E 9117A | Contact Person 9118A | Bidder 9119A | Identification 9120A | Identifier 9121A | CDT 9122A | Contact Person Party ID 9123A | 0..1 9124A |
| | Address 9125A | E 9126A | Contact Person 9127A | | Address 9128A | Address 9129A | AGDT 9130A | Address 9131A | 0..1 9132A |

Fig. 92

| GDT | | Cat. | Obj. Class | Prop. | Rep./ Assn. | Type | Type Name | Lgth. | Card. | Remarks |
|---|---|---|---|---|---|---|---|---|---|---|
| Contact Person ID 9200 | | | Contact Person 9202 | Identification 9204 | Identifier 9206 | CCT 9208 | Identifier 9210 | 1..60 9212 | | Restricted 9214 |
| | scheme ID 9216 | A 9218 | Identification Scheme 9220 | Identification 9222 | Identifier 9224 | xsd 9226 | token 9228 | 1..60 9230 | 0..1 9232 | |
| | scheme Agency ID 9234 | A 9236 | Identification Scheme Agency 9238 | Identification 9240 | Identifier 9242 | xsd 9244 | token 9246 | 1..60 9248 | 0..1 9250 | |
| | scheme Agency Scheme ID 9252 | A 9254 | Identification Scheme Agency 9256 | Scheme 9258 | Identifier 9260 | xsd 9262 | token 9264 | 1..60 9266 | 0..1 9268 | |
| | scheme Agency Scheme Agency ID 9270 | A 9272 | Identification Scheme Agency 9274 | Scheme Agency 9276 | Identifier 9278 | xsd 9280 | token 9282 | 3 9284 | 0..1 9286 | |

Fig. 93

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Contact Person Internal ID 9300 | | | Contact Person 9302 | Internal 9304 | Identification 9306 | Identifier 9308 | GDT 9310 | Contact Person ID 9312 | 1..32 9314 | | Restricted 9316 |
| | scheme ID 9318 | A 9320 | Identification Scheme 9322 | | Identification 9324 | Identifier 9326 | xsd 9328 | token 9330 | 1..60 9332 | 0..1 9334 | |
| | scheme Agency ID 9336 | A 9338 | Identification Scheme Agency 9340 | | Identification 9342 | Identifier 9344 | xsd 9346 | token 9348 | 1..60 9350 | 0..1 9352 | |

Fig 94

| CDT | Obj. Class | Prop. Qual. | Prop. | Rep./ Assn. | Type | Type Name | Lgth. | Remarks |
|---|---|---|---|---|---|---|---|---|
| Contact Person Party ID 9400 | Contact Person 9402 | Party 9404 | Identification 9406 | Identifier 9408 | GDT 9410 | Contact Person ID 9412 | 1..60 9414 | Restricted 9416 |

Fig 95

| GDT | Rep./ Assn. Qual. | Rep./ Assn. | Type | Type Name | Lgth. |
|---|---|---|---|---|---|
| Counter Value 9500 | Counter 9502 | Value 9504 | xsd 9506 | non Negative Integer 9508 | 1..9 9510 |

Fig. 96

| GDT | Rep./ Assn. | Type | Type Name | Lgth. | Card. | Remarks |
|---|---|---|---|---|---|---|
| Country Code 9600 | Country 9602 | Code 9604 | CCT 9606 | Code 9608 | 2..3 9610 | Restricted 9612 |

Fig. 97

| GDT | Obj. Class | Prop. | Rep./ Assn. | Type | Type Name | Lgth. |
|---|---|---|---|---|---|---|
| Credit Agency Report Query Reason Code 9700 | Credit Agency Report Query 9702 | Reason 9704 | Code 9706 | CCT 9708 | Code 9710 | 2 9712 |

Fig. 98

| GDT | Obj. Class | Prop. | Rep./ Assn. | Type | Type Name |
|---|---|---|---|---|---|
| Credit Agency Report Retrieval Permission Indicator 9800 | Credit Agency Report 9802 | Retrieval Permission 9804 | Indicator 9806 | CCT 9808 | Indicator 9810 |

Fig. 99

| GDT | | Cat. | Obj. Class | Prop. | Rep./ Assn. | Type | Type Name | Lgth. | Card. | Remarks |
|---|---|---|---|---|---|---|---|---|---|---|
| Credit Agency Report Scoring 9900 | | | Credit Agency Report 9902 | Scoring 9904 | Details 9906 | | | | | |
| | Score Card ID 9908 | E 9910 | Credit Agency Report Scoring 9912 | Score Card Identification 9914 | Identifier 9916 | GDT 9918 | Score Card ID 9920 | 1..20 9922 | 0..1 9924 | |
| | Result Value 9926 | E 9928 | Credit Agency Report Scoring 9930 | Result 9932 | Value 9934 | GDT 9936 | Decimal Value 9938 | 6.2 9940 | 1 9942 | Restricted 9944 |
| | Descrip-tion 9946 | E 9948 | Credit Agency Report Scoring 9950 | Description 9952 | Text 9954 | GDT 9956 | Description 9958 | | 0..1 9960 | |

Fig. 100

| GDT | Obj. Class | Prop. | Rep./ Assn. | Type | Type Name | Lgth. |
|---|---|---|---|---|---|---|
| Credit Commitment Type Code 10000 | Credit Commitment 10002 | Type 10004 | Code 10006 | CCT 10008 | Code 10010 | 3 10012 |

Fig. 101

| GDT | | Cat. | Obj. Class | Prop. | Rep./ Assn. | Type | Type Name | Lgth. | Card. |
|---|---|---|---|---|---|---|---|---|---|
| Credit Rating Code 10100 | | | Credit 10102 | Rating 10104 | Code 10106 | CCT 10108 | Code 10110 | 1..10 10112 | 1 10114 |
| | list Agency ID 10116 | A 10118 | Code List Agency 10120 | Identification 10122 | Identifier 10124 | xsd 10126 | token 10128 | 1..60 10130 | 0..1 10132 |
| | list Agency Scheme Agency ID 10134 | A 10136 | Code List Agency 10138 | Scheme Agency 10140 | Identifier 10142 | xsd 10144 | token 10146 | 3 10148 | 0..1 10150 |

Fig. 102

| GDT | | Cat. | Obj. Class | Prop. | Rep./ Assn. | Type | Type Name | Lgth. | Card. |
|---|---|---|---|---|---|---|---|---|---|
| Credit Risk Class Code 10200 | | | Credit 10202 | Risk Class 10204 | Code 10206 | CCT 10208 | Code 10210 | 10 10212 | 1 10214 |
| | list Agency ID 10216 | A 10218 | Code List Agency 10220 | Identification 10222 | Identifier 10224 | xsd 10226 | token 10228 | 1..60 10230 | 0..1 10232 |
| | list Agency Scheme Agency ID 10234 | A 10236 | Code List Agency 10238 | Scheme Agency 10240 | Identifier 10242 | xsd 10244 | token 10246 | 3 10248 | 0..1 10250 |

Fig. 103

| GDT | Obj. Class | Prop. | Rep./ Assn. | Type | Type Name | Lgth. | Remarks |
|---|---|---|---|---|---|---|---|
| Credit Segment Internal ID 10300 | Credit Segment 10302 | Internal Identification 10304 | Identifier 10306 | CCT 10308 | Identifier 10310 | 1..10 10312 | Restricted 10314 |

Fig. 104

| GDT | Obj. Class | Prop. | Rep./Assn. | Type | Type Name | Lgth. |
|---|---|---|---|---|---|---|
| Credit Worthiness Change Reason Code 10400 | Credit Worthiness 10402 | Change Reason 10404 | Code 10406 | CCT 10408 | Code 10410 | 2 10412 |

Fig. 105

| GDT | Obj. Class | Prop. | Rep./Assn. | Type | Type Name | Lgth. |
|---|---|---|---|---|---|---|
| Credit Worthiness Checking Rule Code 10500 | Credit Worthiness 10502 | Checking Rule 10504 | Code 10506 | CCT 10508 | Code 10510 | 2 10512 |

Fig. 106

| GDT | Obj. Class | Prop. | Rep./Assn. | Type | Type Name | Lgth. |
|---|---|---|---|---|---|---|
| Credit Worthiness Checking Severity Code 10600 | Credit Worthiness 10602 | Checking Severity 10604 | Code 10606 | CCT 10608 | Code 10610 | 1 10612 |

Fig. 107

| GDT | Obj. Class | Prop. | Rep./ Assn. | Type | Type Name |
|---|---|---|---|---|---|
| Credit Worthiness Indicator 10700 | Credit Worthiness 10702 | Indicator 10704 | Indicator 10706 | CCT 10708 | Indicator 10710 |

Fig. 108

| GDT | Obj. Class | Prop. | Rep./ Assn. | Type | Type Name | Lgth. | Remarks |
|---|---|---|---|---|---|---|---|
| Currency Code 10800 | Currency 10802 | Code 10804 | Code 10806 | CCT 10808 | Code 10810 | 3 10812 | Restricted 10814 |

Fig. 109

| GDT | | Cat. | Obj. Class | Prop. | Rep./ Assn. | Type | Type Name | Lgth. | Card. |
|---|---|---|---|---|---|---|---|---|---|
| Dangerous Goods 10900 | | | Dangerous Goods 10902 | | Details 10904 | | | | |
| | ID 10906 | E 10908 | Dangerous Goods 10910 | Identification 10912 | Identifier 10914 | GDT 10916 | Dangerous Goods ID 10918 | 4 10920 | 0..1 10922 |
| | Regulations Code 10924 | E 10926 | Dangerous Goods 10928 | Regulations 10930 | Code 10932 | GDT 10934 | Dangerous Goods Regulation Code 10936 | 1..3 10938 | 0..1 10940 |
| | Class ID 10942 | E 10944 | Dangerous Goods 10946 | Class 10948 | Identifier 10950 | CCT 10952 | Identifier 10954 | 1..3 10956 | 0..1 10958 |
| | Division ID 10960 | E 10962 | Dangerous Goods 10964 | Division 10966 | Identifier 10968 | CCT 10970 | Identifier 10972 | 1..6 10974 | 0..1 10976 |

Fig. 110

2.75.4 Structure

| GDT | Obj. Class | Prop. | Rep./ Assn. | Type | Type Name | Lgth. |
|---|---|---|---|---|---|---|
| Dangerous Goods ID 11000 | Dangerous Goods 11002 | Identification 11004 | Identifier 11006 | CCT 11008 | Identifier 11010 | 4 11012 |

Fig. 111

| GDT | Obj. Class | Prop. | Rep./ Assn. | Type | Type Name | Lgth. | Card. |
|---|---|---|---|---|---|---|---|
| Dangerous Goods Indicator 11100 | Dangerous Goods 11102 | Indicator 11104 | Indicator 11106 | CCT 11108 | Indicator 11110 | 1 11112 | 0..1 11114 |

Fig. 112

| GDT | Obj. Class | Prop. | Rep./ Assn. | Type | Type Name | Lgth. |
|---|---|---|---|---|---|---|
| Dangerous Goods Regulations Code 11200 | Dangerous Goods 11202 | Regulations 11204 | Code 11206 | CCT 11208 | Code 11210 | 1..3 11212 |

Fig. 113

| GDT | Prop. | Rep./ Assn. | Type | Type Name |
|---|---|---|---|---|
| Date 11300 | Date 11302 | Date 11304 | CCT 11306 | Date 11308 |

Fig. 114

| GDT | | Cat. | Obj. Class | Prop. | Rep./ Assn. | Type | Type Name | Card. |
|---|---|---|---|---|---|---|---|---|
| Date Period 11400 | | | Date Period 11402 | Details 11404 | | | | |
| | Start Date 11406 | E 11408 | Time Period 11410 | Start Date 11412 | Date 11414 | GDT 11416 | Date 11418 | 0..1 11420 |
| | End Date 11422 | E 11424 | Date Period 11426 | End Date 11428 | Date 11430 | GDT 11432 | Date 11434 | 0..1 11436 |
| | Duration 11438 | E 11440 | Date Period 11442 | Duration 11444 | Duration 11446 | GDT 11448 | Duration 11450 | 0..1 11452 |

Fig. 115

| GDT | Prop. | Rep./ Assn. | Type | Type Name |
|---|---|---|---|---|
| Date Time 11500 | Date Time 11502 | Date Time 11504 | CCT 11506 | Date Time 11508 |

Fig. 116

| GDT | | Cat. | Obj. Class | Prop. | Rep./ Assn. | Type | Type Name | Card. |
|---|---|---|---|---|---|---|---|---|
| Date Time Period 11600 | | | Date Time Period 11602 | Details 11604 | | | | |
| | Start Date Time 11606 | E 11608 | Date Time Period 11610 | Start Date Time 11612 | Date Time 11614 | GDT 11616 | Date Time 11618 | 0..1 11620 |
| | End Date Time 11622 | E 11624 | Date Time Period 11626 | End Date Time 11628 | Date Time 11630 | GDT 11632 | Date Time 11634 | 0..1 11636 |
| | Duration 11638 | E 11640 | Date Time Period 11642 | Duration 11644 | Duration 11646 | GDT 11648 | Duration 11650 | 0..1 11652 |

Fig. 117

| GDT | Rep./Assn. Qual. | Rep./ Assn. | Type | Type Name |
|---|---|---|---|---|
| Decimal Value 11700 | Decimal 11702 | Value 11704 | xsd 11706 | Decimal 11708 |

Fig. 118

| GDT | Prop. | Rep./ Assn. | Type | Type Name |
| --- | --- | --- | --- | --- |
| Deleted Indicator 11800 | Deleted Indicator 11802 | Indicator 11804 | CCT 11806 | Indicator 11808 |

Fig. 119

| GDT | Obj. Class | Prop. | Rep./ Assn. | Type | Type Name | Lgth. |
| --- | --- | --- | --- | --- | --- | --- |
| Delivery Schedule Type Code 11900 | Delivery Schedule 11902 | Type 11904 | Code 11906 | CCT 11908 | Code 11910 | 1 11912 |

Fig. 120a

| GDT | | | Cat. | Obj. Class | Prop. | Rep./ Assn. | Type | Type Name | Card. |
|---|---|---|---|---|---|---|---|---|---|
| Delivery Terms 12000 | | | | Delivery Terms 12002 | | Details 12004 | | | |
| | Delivery Item Group ID 12006 | | E 12008 | Delivery Terms 12010 | Order Item Group Identification 12012 | Identifier 12014 | GDT 12012 | Business Transaction Document Item Group ID 12014 | 0...1 12016 |
| | Delivery Priority Code 12018 | | E 12020 | Delivery Terms 12022 | Delivery Priority Code 12024 | Code 12026 | GDT 12028 | Business Transaction Priority Code 12030 | 0...1 12032 |
| | Incoterms 12034 | | E 12036 | Delivery Terms 12038 | Incoterms 12040 | Incoterms 12042 | GDT 12044 | Incoterms 12046 | 0...1 12048 |
| | Partial Delivery 12050 | | E 12052 | Delivery Terms 12054 | Partial Delivery 12056 | Partial Delivery 12058 | GDT 12060 | Partial Delivery 12062 | 0...1 12064 |
| | Quantity Tolerance 12066 | | E 12068 | Delivery Terms 12070 | Quantity Tolerance 12072 | Quantity Tolerance 12074 | GDT 12076 | Quantity Tolerance 12078 | 0...1 12080 |

Fig. 120b

| GDT | | | Cat. | Obj. Class | Prop. | Rep./ Assn. | Type | Type Name | Card. |
|---|---|---|---|---|---|---|---|---|---|
| | Maximum Lead Time Duration 12082 | | E 12084 | Delivery Terms 12086 | Maximum Lead Time 12088 | Duration 12090 | GDT 12092 | Duration 12094 | 0...1 12096 |
| | Transport 12098 | | E 12099 | Delivery Terms 12001A | Transport 12002A | Details 12003A | | | 0..1 12004A |
| | | Service Level Code 12005A | E 12006A | Transport 12007A | Service Level Code 12008A | Code 12009A | GDT 12010A | Transport Service Level Code 12011A | 0...1 12012A |
| | | Mode Code 12013A | E 12014A | Transport 12015A | Mode Code 12016A | Code 12017A | GDT 12018A | Transport Mode Code 12019A | 0...1 12020A |
| | | Means Description Code 12021A | E 12022A | Transport 12023A | Means Description Code 12024A | Code 12025A | GDT 12026A | Transport Means Description Code 12027A | 0...1 12028A |
| | Description 12029A | | E 12030A | Delivery Terms 12031A | Description 12032A | Description 12033A | GDT 12034A | Description 12035A | 0...1 12036A |

Fig. 121

| GDT | | Cat. | Obj. Class | Prop. | Rep./ Assn. | Type | Type Name | Card. | Remarks |
|---|---|---|---|---|---|---|---|---|---|
| Description 12100 | | | Description 12102 | | Text 12104 | CCT 12106 | Text 12108 | | Restricted 12110 |
| | Language Code 12112 | A 12114 | Description 12116 | language Code 12118 | Code 12120 | xsd 12122 | Language 12124 | 1 12126 | |

Fig. 122

| GDT | Rep./Assn. Qual. | Rep./ Assn. | Type | Type Name | Lgth. |
|---|---|---|---|---|---|
| Digit Number Value 12200 | Digit Number 12202 | Value 12204 | xsd 12206 | Non-Negative Integer 12208 | 1..2 12210 |

Fig. 123

| GDT | Prop. | Rep./ Assn. | Type | Type Name |
|---|---|---|---|---|
| Direct Material Indicator 12300 | Direct Material Indicator 12302 | Indicator 12304 | CCT 12306 | Indicator 12308 |

Fig. 124

| GDT | Obj. Class | Prop. | Rep./ Assn. | Type | Type Name |
|---|---|---|---|---|---|
| Dunning Counter Value 12400 | Dunning 12402 | Counter 12404 | Value 12406 | GDT 12408 | Counter Value 12410 |

Fig. 125

| GDT | Obj. Class | Prop. | Rep./ Assn. | Type | Type Name | Lgth. |
|---|---|---|---|---|---|---|
| Dunning Level Value 12500 | Dunning 12502 | Level 12504 | Value 12506 | CCT 12508 | Numeric 12510 | 1 12512 |

Fig. 126

| GDT | Prop. | Rep./ Assn. | Type | Type Name |
|---|---|---|---|---|
| Duration 12600 | Duration 12602 | Date Time 12604 | xsd 12606 | Duration 12608 |

Fig. 127

| GDT | | Cat. | Obj. Class | Prop. | Rep./ Assn. | Type | Type Name | Card. | Remarks |
|---|---|---|---|---|---|---|---|---|---|
| Email Address 12700 | | | Email 12702 | Address 12704 | Electronic Address 12706 | CCT 12708 | Electronic Address 12710 | | Restricted 12712 |
| | Protocol Code 12714 | A 12716 | Email 12718 | Protocol 12720 | Code 12722 | xsd 12724 | token 12726 | 0..1 12728 | Default: EM (smtp) 12730 |

Fig. 128

| GDT | Prop. Qual. | Rep./ Assn. | Type | Type Name |
|---|---|---|---|---|
| Evaluated Receipt Settlement Indicator 12800 | Evaluated Receipt 12802 | Settlement 12804 | CCT 12806 | Indicator 12808 |

Fig. 129

| GDT | | Cat. | Obj. Class | Prop. | Rep./ Assn. | Type | Type Name | Lgth. | Card. |
|---|---|---|---|---|---|---|---|---|---|
| Exchange Rate 12900 | | | Exchange Rate 12902 | | Details 12904 | | | | |
| | Unit Currency 12906 | E 12908 | Exchange Rate 12910 | Unit Currency 12912 | Code 12914 | GDT 12916 | Currency Code 12918 | | 1 12920 |
| | Quoted Currency 12922 | E 12924 | Exchange Rate 12926 | Quoted Currency 12928 | Code 12930 | GDT 12932 | Currency Code 12934 | | 1 12936 |
| | Rate 12938 | E 12940 | Exchange Rate 12942 | Rate 12944 | Rate 12946 | xsd 12948 | Decimal 12950 | 14.14 12952 | 1 12954 |
| | Quotation Date Time 12956 | E 12958 | Exchange Rate 12960 | Quotation Date Time 12962 | Date Time 12964 | GDT 12966 | Date Time 12968 | | 0..1 12970 |

Fig. 130

| GDT | Obj. Class | Rep./ Assn. | Type | Type Name | Lgth. | Remarks |
|---|---|---|---|---|---|---|
| Exponential Rep. Type Code 13000 | Exponential Rep.Type 13002 | Code 13004 | CCT 13006 | Code 13008 | 1 13010 | Restricted 13012 |

Fig. 131

| GDT | Prop. | Rep./ Assn. | Type | Type Name |
|---|---|---|---|---|
| Fixed Indicator 13100 | Fixed 13102 | Indicator 13104 | CCT 13106 | Indicator 13108 |

Fig. 132

| GDT | Rep./ Assn. Qual. | Rep./ Assn. | Type | Type Name |
|---|---|---|---|---|
| Float Value 13200 | Float 13202 | Value 13204 | xsd 13206 | Float 13208 |

Fig. 133

| GDT | Obj. Class Qual. | Obj. Class | Prop. | Rep./ Assn. | Type | Type Name | Lgth. | Remarks |
|---|---|---|---|---|---|---|---|---|
| Follow Up Business Transaction Document Requirement Code 13300 | Follow Up 13302 | Business Transaction Document 13304 | Require- ment 13306 | Code 13308 | CCT 13310 | Code 13312 | 2 13314 | Enumer- ation = “01 02 03 04 05“ 13316 |

Fig. 134

| CDT | Obj. Class Qual. | Obj. Class | Prop. | Rep./ Assn. | Type | Type Name | Lgth. | Remarks |
|---|---|---|---|---|---|---|---|---|
| Follow Up Message Requirement Code 13400 | Follow Up 13402 | Message 13404 | Requirement 13406 | Code 13408 | CCT 13410 | Code 13412 | 2 13414 | Restricted 13416 |

Fig. 135

| GDT | | Cat. | Obj. Class | Prop. | Rep./ Assn. | Type | Type Name | Card. |
|---|---|---|---|---|---|---|---|---|
| Geo Coordinates 13500 | | | Geo Coordinates 13502 | | Details 13504 | | | |
| | Latitude Measure 13506 | E 13508 | Geo Coordinates 13510 | Latitude 13512 | Measure 13514 | GDT 13516 | Measure 13518 | 1 13520 |
| | Longitude Measure 13522 | E 13524 | Geo Coordinates 13526 | Longitude 13528 | Measure 13530 | GDT 13532 | Measure 13534 | 1 13536 |

Fig. 136a

| | Data Type | | Obj. Class | Prop. Qual. | Prop. | Rep./ Assn. | Type | Type Name | Lgth. | Card. | Remarks |
|---|---|---|---|---|---|---|---|---|---|---|---|
| Handling Unit 13600 | | | Handling Unit 13602 | | | Details 13604 | | | | | |
| | ID 13606 | | Handling Unit 13608 | | Identifi-cation 13610 | Identifier 13612 | GDT 13614 | Identifier 13616 | 1..20 13618 | 1 13620 | |
| | Load Carrier 13622 | | Handling Unit 13624 | | | | | | | 1 13626 | |
| | | Product 13626 | Load Carrier 13628 | | Product 13630 | | GDT | Business Transaction Document Product 13632 | | 1 13634 | Restricted 13636 |
| | Height Measure 13638 | | Handling Unit 13640 | Height 13642 | Measure 13644 | Measure 13646 | GDT 13648 | Measure 13650 | 19.6 13652 | 0..1 13654 | |

Fig. 136b

| | Data Type | | | Obj. Class | Prop. Qual. | Prop. | Rep./ Assn. | Type | Type Name | Lgth. | Card. | Remarks |
|---|---|---|---|---|---|---|---|---|---|---|---|---|
| | Lgth. Measure 13656 | | | Handling Unit 13658 | Lgth. 13660 | Measure 13662 | Measure 13664 | GDT 13666 | Measure 13668 | 19.6 13670 | 0..1 13672 | |
| | Width Measure 13674 | | | Handling Unit 13676 | Width 13678 | Measure 13680 | Measure 13682 | GDT 13684 | Measure 13686 | 19.6 13688 | 0..1 13690 | |
| | Gross Volume Measure 13692 | | | Handling Unit 13694 | Volume 13696 | Measure 13698 | Measure 13699 | GDT 13601A | Measure 13602A | 19.6 13603A | 0..1 13604A | |
| | Gross Weight Measure 13605A | | | Handling Unit 13606A | Weight 13607A | Measure 13608A | Measure 13609A | GDT 13610A | Measure 13611A | 19.6 13612A | 0..1 13613A | |
| | Additional Packaging 13614A | | | Handling Unit 13615A | | | | | | | 0..n 13616A | |

Fig. 136c

| Data Type | | | | Obj. Class | Prop. Qual. | Prop. | Rep./ Assn. | Type | Type Name | Lgth. | Card. | Remarks |
|---|---|---|---|---|---|---|---|---|---|---|---|---|
| | | Product 13616A | | Additional Packaging 13617A | | Product 13618A | | GDT 13619A | Business Transaction Document Product 13620A | | 1 13621A | Restricted 13622A |
| | | Quantity 13623A | | Additional Packaging 13624A | | Quantity 13625A | Quantity 13626A | GDT 13627A | Quantity 13628A | 19.6 13629A | 1 13630A | |
| | Lower Level Hand-ling Unit 13631A | | | Handling Unit 13632A | | | | | | | 0..n 13633A | |

Fig. 136d

| | Data Type | | | Obj. Class | Prop. Qual. | Prop. | Rep./ Assn. | Type | Type Name | Lgth. | Card. | Remarks |
|---|---|---|---|---|---|---|---|---|---|---|---|---|
| | | ID 13634A | | Lower Level Handling Unit 13635A | | Identifica-tion 13636A | Identifier 13637A | GDT 13638A | Handling Unit ID 13639A | 1..20 13640A | 1 13641A | |

Fig. 136e

| | Data Type | | | Obj. Class | Prop. Qual. | Prop. | Rep./ Assn. | Type | Type Name | Lgth. | Card. | Remarks |
|---|---|---|---|---|---|---|---|---|---|---|---|---|
| | Load 13642A | | | Handling Unit 13643A | | Load 13644A | | | | | 0..n 13645A | |
| | Business Transaction Document Reference 13645A | | | Load 13646A | | Business Transac- tion Docu- ment 13647A | | GDT 13648A | Business Transaction Document Reference 13649A | | 1 13650A | |
| | | ID 13651A | | Business Transaction Document 13652A | | Identific- ation 13653A | Identifier 13654A | GDT 13655A | Business Transaction Document ID 13656A | 1..35 13657A | 0..1 13658A | |
| | | Item ID 13659A | | Business Transaction Document Item 13660A | | Identifica- tion 13661A | Identifier 13662A | GDT 13663A | Business Transaction Document Item ID 13664A | 1..10 13665A | 1 13666A | |
| | Quantity 13666A | | | Load 13667A | | Quantity 13668A | Quantity 13669A | GDT 13670A | Quantity 13671A | 19.6 13672A | 1 13673A | |

Fig. 137

| GDT | | Cat. | Obj. Class | Prop. | Rep./ Assn. | Type | Data Type | Lgth. | Card. | Remarks |
|---|---|---|---|---|---|---|---|---|---|---|
| Incoterms 13700 | | | Incoterms 13702 | | Details 13704 | | | | | |
| | Classification Code 13706 | E 13708 | Incoterms 13710 | Classification 13712 | Code 13714 | CCT 13716 | Code 13718 | 3 13720 | 1 13722 | Restricted 13724 |
| | Transfer Location Name 13726 | E 13728 | Incoterms 13730 | Transfer Location Name 13732 | Name 13734 | GDT 13736 | Name 13738 | 1..28 13740 | 0..1 13742 | Restricted 13744 |

Fig. 138

| GDT | Obj. Class | Prop. | Rep./ Assn. | Type | Type Name |
|---|---|---|---|---|---|
| Information Outdated Indicator 13800 | Information 13802 | Outdated Indicator 13804 | Indicator 13806 | CCT 13808 | Indicator 13810 |

Fig. 139

| GDT | Rep./ Assn. Qual. | Rep./ Assn. | Type | Type Name |
|---|---|---|---|---|
| Integer Value 13900 | Integer 13902 | Value 13904 | xsd 13906 | Integer 13908 |

Fig. 140

| GDT | | Cat. | Obj. Class | Prop. | Rep./ Assn. | Type | Type Name | Lgth. | Card. | Remarks |
|---|---|---|---|---|---|---|---|---|---|---|
| Interface Element ID 14000 | | | Interface Element 14002 | | Identifier 14004 | CCT 14006 | Identifier 14008 | 1..40 14010 | | Restricted 14012 |
| | Scheme ID 14014 | A 14016 | Identification Scheme 14018 | | Identifier 14020 | xsd 14022 | token 14024 | 1..60 14026 | 0..1 14028 | |
| | Scheme Agency ID 14030 | A 14032 | Identification Scheme Agency 14034 | | Identifier 14036 | xsd 14038 | token 14040 | 1..60 14042 | 0..1 14044 | |
| | Scheme Agency Scheme ID 14046 | A 14048 | Identification Scheme Agency 14050 | Scheme 14052 | Identifier 14054 | xsd 14056 | token 14058 | 1..60 14060 | 0..1 14062 | |
| | Scheme Agency Scheme Agency ID 14064 | A 14066 | Identification Scheme Agency 14068 | Scheme Agency 14070 | Identifier 14072 | xsd 14074 | token 14076 | 3 14078 | 0..1 14080 | |

Fig. 141

| GDT | Prop. | Rep./ Assn. | Type | Type Name | Lgth. | Remarks |
|---|---|---|---|---|---|---|
| Interval Boundary Type Code 14100 | Interval Boundary Type 14102 | Code 14104 | CCT 14106 | Code 14108 | 1 14110 | Restricted 14112 |

Fig. 142

| GDT | Obj. Class | Prop. | Rep./ Assn. | Type | Type Name | Lgth. | Remarks |
|---|---|---|---|---|---|---|---|
| Inventory Usability Status Code 14200 | Inventory 14202 | Usability Status 14204 | Code 14206 | CCT 14208 | Code 14210 | 1..2 14212 | Restricted 14214 |

Fig. 143

| GDT | Obj. Class | Prop. | Rep./ Assn. | Type | Type Name |
|---|---|---|---|---|---|
| Invoice Cancellation Invoice Indicator 14300 | Invoice 14302 | Cancellation Invoice Indicator 14304 | Indicator 14306 | CCT 14308 | Indicator 14310 |

Fig. 144

| GDT | Obj. Class | Prop. | Rep./ Assn. | Type | Type Name |
|---|---|---|---|---|---|
| Invoice IntraCorporate Indicator 14400 | Invoice 14402 | IntraCorporate Indicator 14404 | Indicator 14406 | CCT 14408 | Indicator 14410 |

Fig. 145

| GDT | Obj. Class | Prop. Term | Rep. | Type | Type Name | Lgth. |
|---|---|---|---|---|---|---|
| Language Code 14500 | Language 14502 | Identification 14504 | Code 14506 | xsd 14508 | language 14510 | 2..9 14512 |

Fig. 146

| GDT | Prop. | Rep./ Assn. | Type |
|---|---|---|---|
| Language Dependency Indicator 14600 | Language Dependency 14602 | Indicator 14604 | CCT: Indicator 14606 |

Fig. 147

| GDT | Obj. Class | Prop. | Rep./ Assn. | Type | Type Name | Lgth. |
|---|---|---|---|---|---|---|
| Legal Event Type Code 14700 | Legal Event 14702 | Type 14704 | Code 14706 | CCT 14708 | Code 14710 | 2 14712 |

Fig. 148

| GDT | | Cat. | Obj. Class | Prop. | Rep./ Assn. | Type | Type Name | Lgth. | Card. | Remarks |
|---|---|---|---|---|---|---|---|---|---|---|
| Location ID 14800 | | | Location 14802 | Identification 14804 | Identifier 14806 | CCT 14808 | | 20 14812 | | Restricted 14814 |
| | Scheme ID 14816 | A 14818 | Identification Scheme 14820 | Identification 14822 | Identifier 14824 | xsd 14826 | token 14828 | 0..60 14830 | 0..1 14832 | |
| | Scheme Agency ID 14834 | A 14836 | Identification Scheme Agency 14838 | Identification 14840 | Identifier 14842 | xsd 14844 | token 14846 | 0..60 14850 | 0..1 14852 | |
| | Scheme Agency Scheme ID 14854 | A 14856 | Identification Scheme Agency 14858 | Scheme 14860 | Identifier 14862 | xsd 14864 | token 14866 | 0..60 14868 | 0..1 14870 | |
| | Scheme Agency-Scheme Agency ID 14872 | A 14874 | Identification Scheme Agency 14876 | Scheme Agency 14878 | Identifier 14880 | xsd 14882 | token 14884 | 3 14886 | 0..1 14888 | |

Fig. 149

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Location Internal ID 14900 | | | Location 14902 | Internal 14904 | Identifi-cation 14906 | Identifier 14908 | GDT 14910 | Location ID 14912 | 1..32 14914 | | Restricted 14916 |
| | Scheme ID 14918 | A 14920 | Identification Scheme 14920 | | Identifi-cation 14922 | Identifier 14924 | xsd 14926 | token 14928 | 1..60 14930 | 0..1 14932 | |
| | Scheme Agency ID 14934 | A 14936 | Identification Scheme Agency 14938 | | Identifi-cation 14938 | Identifier 14940 | xsd 14942 | token 14944 | 1..60 14946 | 0..1 14948 | |

Fig. 150

| CDT | Obj. Class | Prop. Qual. | Prop. | Rep./ Assn. | Type | Type Name | Lgth. | Remarks |
|---|---|---|---|---|---|---|---|---|
| Location Party ID 15000 | Location 15002 | Party 15004 | Identification 15006 | Identifier 15008 | GDT 15010 | Location ID 15012 | 1..20 15014 | Restricted 15016 |

Fig. 151

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Location Standard ID 15100 | | | Location 15102 | Standard 15104 | Identification 15106 | Identifier 15108 | GDT 15110 | Location ID 15112 | 13 15114 | | Restricted 15116 |
| | Scheme Agency ID 15118 | A 15120 | Identification Scheme Agency 15122 | | Identification 15124 | Identifier 15126 | xsd 15128 | token 15130 | 3 15132 | 1 15134 | |

Fig. 152

| GDT | | Cat. | Obj. Class | Prop. | Rep./ Assn. | Type | Type Name | Lgth. | Card. | Remarks |
|---|---|---|---|---|---|---|---|---|---|---|
| Log Item 15200 | | | | | Details 15202 | | | | | |
| | Type ID 15204 | E 15206 | Log Item 15208 | Type Identification 15210 | Identifier 15212 | CCT 15214 | Identifier 15216 | 1..40 15218 | 0..1 15220 | Restricted 15222 |
| | Severity Code 15224 | E 15226 | Log Item 15228 | Severity 15230 | Code 15232 | GDT 15234 | Log Item Severity Code 15236 | | 0..1 15238 | |
| | Note 15240 | E 15242 | Log Item 15244 | Note 15246 | Note 15248 | GDT 15250 | Note 15252 | 1..200 15254 | 1 15256 | Restricted 15258 |
| | Web Address 15260 | E 15262 | Log Item 15264 | Web Address 15266 | Web Address 15268 | CCT 15270 | Web Address 15272 | | 0..1 15274 | |

Fig. 153

| GDT | Obj. Class | Prop. | Rep./ Assn. | Type | Type Name | Lgth. |
|---|---|---|---|---|---|---|
| Log Item Severity Code 15300 | Log Item 15302 | Severity 15304 | Code 15306 | CCT 15308 | Code 15310 | 1 15312 |

Fig. 154

| GDT | | Cat. | Obj. Class | Prop. | Rep./ Assn. | Type | Type Name | Lgth. | Card. |
|---|---|---|---|---|---|---|---|---|---|
| Measure 15400 | | | | | Measure 15402 | xsd 15404 | decimal 15406 | 13.6 15408 | |
| | Unit Code 15410 | A 15412 | Measure 15414 | Unit 15416 | Code 15418 | xsd 15420 | token 15422 | 1..3 15424 | 1 15426 |

Fig. 155

| GDT | Obj. Class | Rep./ Assn. | Type | Type Name | Lgth. |
|---|---|---|---|---|---|
| Measure Unit Code 15500 | Measure Unit 15502 | Code 15504 | xsd 15506 | token 15508 | 1..3 15510 |

Fig. 156

| GDT | Obj. Class | Prop. | Rep./ Assn. | Type | Type Name | Lgth. | Remarks |
|---|---|---|---|---|---|---|---|
| Measure Unit Meaning Code 15600 | Measure Unit 15602 | Meaning 15604 | Code 15606 | CCT 15608 | Code 15610 | 3 15612 | Restricted 15614 |

Fig. 157

| GDT | Obj. Class | Prop. | Rep./ Assn. | Type | Type Name | Lgth. | Remarks |
|---|---|---|---|---|---|---|---|
| Message Type Code 15700 | Message 15702 | Type Code 15704 | Code 15706 | CCT 15708 | Code 15710 | 4 15712 | Restricted 15714 |

Fig. 158

| GDT | | Cat. | Obj. Class | Prop. | Rep./ Assn. | Type | Type Name | Lgth. | Card. |
|---|---|---|---|---|---|---|---|---|---|
| Name 15800 | | | Name 15802 | | Text 15804 | CCT 15806 | Text 15808 | | |
| | Language Code 15810 | A 15812 | Name 15814 | language Code 15816 | Code 15818 | xsd 15820 | language 15822 | 2..5 15824 | 0..1 15826 |

Fig. 159

| GDT | Prop. | Rep./ Assn. | Type | Type Name | Remarks |
|---|---|---|---|---|---|
| Note 15900 | Note 15902 | Text 15904 | CCT 15906 | Text 15908 | Restricted 15910 |

Fig. 160

| GDT | Obj. Class | Prop. | Rep./ Assn. | Type | Type Name | Lgth. | Remarks |
|---|---|---|---|---|---|---|---|
| Object Structure Relationship Type Code 16000 | Object Structure Relationship 16002 | Type Code 16004 | Code 16006 | CCT 16008 | Code 16010 | 3 16012 | Restricted 16014 |

Fig. 161

| GDT | Rep./Assn. Qual. | Rep./ Assn. | Type | Type Name | Lgth. |
|---|---|---|---|---|---|
| Ordinal Number Value 16100 | Ordinal Number 16102 | Value 16104 | xsd 16106 | Positive Integer 16108 | 1..9 16110 |

Fig. 162

| GDT | Cat. | Obj. Class | Prop. | Rep./ Assn. | Type | Type Name | Lgth. | Card. | Remarks |
|---|---|---|---|---|---|---|---|---|---|
| Partial Delivery 16200 | | Partial Delivery 16202 | | Details 16204 | | | | | |
| | E 16206 | Partial Delivery 16208 | Maximal Number 16210 | Integer 16212 | GDT 16214 | Integer Value 16216 | 1 16218 | 0..1 16220 | Zero not allowed 16222 |
| | E 16224 | Partial Delivery 16226 | Unlimited Indicator 16228 | Indicator 16230 | GDT 16232 | Value Unlimited Indicator 16234 | 1 16236 | 0..1 16238 | |

Fig. 163

| GDT | | Cat. | Obj. Class | Prop. | Rep./ Assn. | Type | Type Name | Lgth. | Card. | Remarks |
|---|---|---|---|---|---|---|---|---|---|---|
| Party ID 16300 | | | Party 16302 | Identification 16304 | Identifier 16306 | CCT 16308 | Identifier 16310 | 1..60 16312 | | Restricted 16314 |
| | scheme ID 16316 | A 16318 | Identification Scheme 16320 | Identification 16322 | Identifier 16324 | xsd 16326 | token 16328 | 1..60 16330 | 0..1 16332 | |
| | scheme Agency ID 16334 | A 16336 | Identification Scheme Agency 16338 | Identification 16340 | Identifier 16342 | xsd 16344 | token 16346 | 1..60 16348 | 0..1 16350 | |
| | scheme Agency Scheme ID 16352 | A 16354 | Identification Scheme Agency 16356 | Scheme 16358 | Identifier 16360 | xsd 16362 | token 16364 | 1..60 16366 | 0..1 16368 | |
| | scheme Agency Scheme Agency ID 16370 | A 16372 | Identification Scheme Agency 16374 | Scheme Agency 16376 | Identifier 16378 | xsd 16380 | token 16382 | 3 16384 | 0..1 16386 | |

Fig. 164

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Party Internal ID 16400 | | | Party 16402 | Internal 16404 | Identification 16406 | Identifier 16408 | GDT 16410 | Party ID 16412 | 1..32 16414 | | Restricted 16416 |
| | scheme ID 16418 | A 16420 | Identification Scheme 16422 | | Identification 16424 | Identifier 16426 | xsd 16428 | token 16430 | 1..60 16432 | 0..1 16434 | |
| | scheme Agency ID 16436 | A 16438 | Identification Scheme Agency 16440 | | Identification 16442 | Identifier 16444 | xsd1 16446 | token 16448 | 1..60 16450 | 0..1 16452 | |

Fig. 165

| CDT | Obj. Class | Prop. Qual. | Prop. | Rep./ Assn. | Type | Type Name | Lgth. | Remarks |
|---|---|---|---|---|---|---|---|---|
| Party Party ID 16500 | Party 16502 | Party 16504 | Identification 16506 | Identifier 16508 | GDT 16510 | Party ID 16512 | 1..60 16514 | Restricted 16516 |

Fig. 166

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Party Standard ID 16600 | | | Party 16602 | Standard 16604 | Identifica-tion 16606 | Identifier 16608 | GDT 16610 | Party ID 16612 | 1..13 16614 | | Restricted 16616 |
| | scheme Agency ID 16618 | A 16620 | Identification Scheme Agency 16622 | | Identifica-tion 16624 | Identifier 16626 | xsd 16628 | token 16630 | 3 16632 | 1 16634 | |

Fig. 167

| GDT | | Cat. | Obj. Class | Prop. | Rep./ Assn. | Type | Type Name | Lgth. | Card. | Remarks |
|---|---|---|---|---|---|---|---|---|---|---|
| Payment Card 16700 | | | Payment Card 16702 | | Details 16704 | | | | | |
| | ID 16706 | E 16708 | Payment Card 16710 | Identification 16712 | Identifier 16714 | GDT 16716 | Payment Card ID 16718 | | 1 16720 | |
| | Reference ID 16722 | E 16724 | Payment Card 16726 | Reference Identification 16728 | Identifier 16730 | CCT 16732 | Identifier 16734 | 1..25 16736 | 0..1 16738 | Restricted 16740 |
| | Sequence ID 16740 | E 16742 | Payment Card 16744 | Sequence Identification 16746 | Identifier 16748 | CCT 16750 | Identifier 16752 | 1..10 16754 | 0..1 16756 | Restricted 16758 |
| | Holder 16760 | E 16762 | Payment Card 16764 | Holder 16766 | Text 16768 | CCT 16770 | text 16772 | 1..40 16774 | 0..1 16776 | |
| | Expiration Date 16778 | E 16780 | Payment Card 16782 | Expiration Date 16784 | Date 16786 | GDT 16788 | Date 16790 | | 1 16792 | |

Fig. 168

| GDT | | Cat. | Obj. Class | Prop. | Rep./ Assn. | Type | Type Name | Lgth. | Card. | Remarks |
|---|---|---|---|---|---|---|---|---|---|---|
| Payment Card ID 16800 | | E 16802 | Payment Card 16804 | Identification 16806 | Identifier 16808 | CCT 16810 | Identifier 16812 | 1..25 16814 | 1 16816 | Restricted 16818 |
| | scheme ID 16820 | A 16822 | Identification Scheme 16824 | Identification 16826 | Identifier 16828 | xsd 16830 | token 16832 | 1..60 16834 | 1 16836 | |
| | scheme Agency ID 16838 | A 16840 | Identification Scheme Agency 16842 | Identification 16844 | Identifier 16846 | xsd 16848 | token 16850 | 1..60 16852 | 1 16854 | |
| | scheme Agency Scheme ID 16856 | A 16858 | Identification Scheme Agency 16860 | Scheme 16862 | Identifier 16864 | xsd 16866 | token 16868 | 1..60 16870 | 0..1 16872 | |
| | scheme Agency Scheme Agency ID 16874 | A 16876 | Identification Scheme Agency 16878 | Scheme Agency 16880 | Identifier 16882 | xsd 16884 | token 16886 | 3 16888 | 0..1 16890 | |

Fig. 169

| CDT | Obj. Class | Prop. | Rep./ Assn. | Type | Type Name | Lgth. | Remarks |
|---|---|---|---|---|---|---|---|
| Payment Form Code 16900 | Payment 16902 | Form Code 16904 | Code 16906 | CCT 16908 | Code 16910 | 2 16912 | Restricted 16914 |

Fig. 170

| GDT | Cat. | Rep./ Assn. | Type | Type Name | Lgth. |
|---|---|---|---|---|---|
| Percent 17000 | E 17002 | Percent 17004 | xsd 17006 | decimal 17008 | 10.6 17010 |

Fig. 171a

| GDT Person-Name | | | Cat. | Obj. Class | Prop. | Rep./ Assn. | Type | Type Name | Lgth. | Card. | Remarks |
|---|---|---|---|---|---|---|---|---|---|---|---|
| Person Name 17100 | | | E 17102 | Person Name 17104 | | Details 17106 | | | | | |
| | Formatted Name 17108 | | E 17110 | Person Name 17112 | For-matted Name 17114 | Name 17116 | xsd 17118 | string 17120 | ..80 17122 | 0..1 17124 | |
| | Legal Name 17126 | | E 17128 | Person Name 17130 | Legal Name 17132 | Name 17134 | xsd 17136 | string 17138 | ..80 17140 | 0..1 17142 | |
| | Given Name 17144 | | E 17146 | Person Name 17148 | Given Name 17150 | Name 17152 | xsd 17154 | string 17156 | ..40 17158 | 0..un-bounded 17160 | |
| | Preferred Given Name 17162 | | E 17164 | Person Name 17166 | Pre-ferred Given Name 17168 | Name 17170 | xsd 17172 | string 17174 | ..40 17176 | 0..1 17178 | |
| | Middle Name 17180 | | E 17182 | Person Name 17184 | Middle Name 17186 | Name 17188 | xsd 17190 | string 17192 | ..40 17194 | 0..un-bounded 17196 | |

Fig. 171b

| GDT Person-Name | | | Cat. | Obj. Class | Prop. | Rep./ Assn. | Type | Type Name | Lgth. | Card. | Remarks |
|---|---|---|---|---|---|---|---|---|---|---|---|
| | Family 17198 | | E 17101 | Person Name 17103 | Family 17105 | Detail 17107 | | | | 0.. un-bounded 17109 | |
| | | Family Name 17111 | E 17113 | Family 17113 | Family Name 17115 | Name 17117 | xsd 17119 | string 17121 | ..40 17123 | 1 17125 | |
| | | Primary Indicator 17127 | E 17129 | Family 17131 | Family Name Primary Code 17133 | Code 17135 | CCT 17137 | Indicator 17139 | 1 17141 | 0..1 17143 | No default value 17145 |
| | | Family Name Prefix 17147 | E 17149 | Family 17151 | Family Name Prefix 17153 | Text 17155 | xsd 17157 | string 17159 | ..20 17161 | 0..1 17163 | Different from the HR-XML Proposal 17165 |
| | Affix 17167 | | E 17169 | Person Name 17171 | Affix 17173 | Detail 17175 | | | | 0.. un-bounded 17177 | |
| | | Affix Name 17179 | E 17181 | Affix 17183 | Affix 17185 | Name 17187 | xsd 17189 | string 17191 | ..20 17193 | 1 17195 | |

Fig. 171c

| GDT Person Name | | | Cat. | Obj. Class | Prop. | Rep./ Assn. | Type | Type Name | Lgth. | Card. | Remarks |
|---|---|---|---|---|---|---|---|---|---|---|---|
| | | Affix Code 17197 | E 17199 | Affix 17102a | Affix Code 17104a | Code 17106a | CCT 17108a | Code 17110a | 1..20 17112a | 1 17114a | |

Fig. 172

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Event ID 17200 | | | Personnel Time Event 17202 | Identification 17204 | Identifier 17206 | GDT 17208 | Identifier 17210 | 1..40 17212 | | Restricted 17214 |
| | scheme ID 17216 | A 17218 | Identification Scheme 17220 | Identification 17222 | Identifier 17224 | xsd 17226 | token 17227 | 1..60 17230 | 0..1 1 17232 | |
| | scheme Agency ID 17234 | A 17236 | Identification Scheme Agency 17238 | Identification 17240 | Identifier 17242 | xsd 17244 | token 17246 | 1..60 17248 | 0..1 17250 | |

Fig. 173

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Event Type ID 17300 | | | Personnel Time Event Type 17302 | Identification 17304 | Identifier 17306 | GDT 17308 | Identifier 17310 | 1..40 17312 | | Restricted 17314 |
| | scheme ID 17316 | A 17318 | Identification Scheme 17320 | Identification 17322 | Identifier 17324 | xsd 17326 | token 17328 | 1..60 17330 | 0..1 17332 | |
| | scheme Agency ID 17334 | A 17336 | Identification Scheme Agency 17338 | Identification 17340 | Identifier 17342 | xsd 17344 | token 17346 | 1..60 17348 | 0..1 17350 | |

Fig. 174

| GDT | | Cat. | Obj. Class | Prop. | Rep./ Assn. | Type | Type Name | Lgth. | Card. | Remarks |
|---|---|---|---|---|---|---|---|---|---|---|
| Personnel Time ID 17400 | | | Personnel Time 17402 | Identification 17404 | Identifier 17406 | GDT 17408 | Identifier 17410 | 1..40 17412 | | Restricted 17414 |
| | scheme ID 17416 | A 17418 | Identification Scheme 17420 | Identification 17422 | Identifier 17424 | xsd 17426 | token 17428 | 1..60 17430 | 0..1 17432 | |
| | scheme Agency ID 17434 | A 17436 | Identification Scheme Agency 17438 | Identification 17440 | Identifier 17442 | xsd 17444 | token 17446 | 1..60 17448 | 0..1 17450 | |

Fig. 175

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Type ID 17500 | | | Personnel Time Type 17502 | Identification 17504 | Identifier 17506 | GDT 17508 | Identifier 17510 | 1..40 17512 | | Restricted 17514 |
| | scheme ID 17516 | A 17518 | Identifica-tion Scheme 17520 | Identification 17522 | Identifier 17524 | xsd 17526 | token 17528 | 1..60 17530 | 0..1 17532 | |
| | scheme Agency ID 17534 | A 17536 | Identifica-tion Scheme Agency 17538 | Identification 17540 | Identifier 17542 | xsd 17544 | token 17546 | 1..60 17548 | 0..1 17550 | |

Fig. 176

| GDT | | Cat. | Obj. Class | Prop. | Rep./ Assn. | Type | Type Name | Lgth. | Card. | Remarks |
|---|---|---|---|---|---|---|---|---|---|---|
| Phone Number 17600 | | | Phone Number 17602 | | Details 17604 | | | | | |
| | Area ID 17606 | E 17608 | Phone Number 17610 | Phone Number Area 17612 | Identifier 17614 | CCT 17616 | Identifier 17618 | 1..10 17620 | 0..1 17622 | Restricted 17624 |
| | Subscriber ID 17626 | E 17628 | Phone Number 17630 | Phone Number Sub- scriber 17632 | Identifier 17634 | CCT 17636 | Identifier 17638 | 1..30 17640 | 0..1 17642 | Restricted 17644 |
| | Extension ID 17646 | E 17648 | Phone Number 17650 | Phone Number Exten- sion 17652 | Identifier 17654 | CCT 17656 | Identifier 17658 | 1..10 17660 | 0..1 17662 | Restricted 17664 |
| | Country Code 17666 | E 17668 | Phone Number 17670 | Phone Number Country 17672 | Code 17674 | GDT 17676 | Country Code 17678 | | 0..1 17680 | |

Fig. 177

| GDT | | Cat. | Obj. Class | Prop. | Rep./ Assn. | Type | Type Name |
|---|---|---|---|---|---|---|---|
| Price 17700 | | | Price 17702 | | Details 17704 | | |
| | Amount 17706 | E 17708 | Price 17710 | Amount 17712 | Amount 17714 | GDT 17716 | Amount 17718 |
| | Base Quantity 17720 | E 17722 | Price 17724 | Base 17726 | Quantity 17728 | GDT 17730 | Quantity 17732 |

Fig. 178

| GDT | | Cat. | Obj. Class | Prop. | Rep./ Assn. | Type | Type Name | Lgth. | Card. |
|---|---|---|---|---|---|---|---|---|---|
| Price Component 17800 | | C 17802 | Price Component 17804 | | Details 17806 | | | | |
| | Type Code 17808 | E 17810 | Price Component 17812 | Type Code 17814 | Code 17816 | GDT 17818 | Price Component Type Code 17820 | 4 17822 | 1 17824 |
| | Description 17826 | E 17828 | Price Component 17830 | Description 17832 | Text 17834 | GDT 17836 | Description 17838 | | 0..1 17840 |
| | Base Amount 17842 | E 17844 | Price Component 17846 | Base Amount 17848 | Amount 17850 | GDT 17852 | Amount 17854 | | 0..1 17856 |
| | Percent 17858 | E 17860 | Price Component 17862 | Percent 17864 | Percent 17866 | GDT 17868 | Percent 17870 | | 0..1 17872 |
| | Amount 17874 | E 17876 | Price Component 17878 | Amount 17880 | Amount 17882 | GDT 17884 | Amount 17886 | | 1 17888 |

Fig. 179

| GDT | Obj. Class | Prop. | Rep./ Assn. | Type | Type Name | Lgth. |
|---|---|---|---|---|---|---|
| Price Component Type Code 17900 | Price Component 17902 | Type Code 17904 | Code 17906 | CCT 17908 | Code 17910 | 4 17912 |

Fig. 180

| CDT | | | Cat. | Obj. Class Qual. | Obj. Class | Prop. | Rep./ Assn. | Type | Type Name | Card. | Remarks |
|---|---|---|---|---|---|---|---|---|---|---|---|
| Price Time Series 18000 | | | | Price 18002 | Time Series 18004 | | Details 18006 | GDT 18008 | Time Series 18010 | | Restricted 18012 |
| | Item 18014 | | E 18016 | | Time Series 18018 | Item 18020 | Details 18022 | | | 1..n 18024 | |
| | | Validity-Period 18026 | E 18028 | | Time Series 18030 | Validity Period 18032 | Details 18034 | GDT 18036 | Date Time Period 18038 | 1 18040 | |
| | | Price 18040 | E 18042 | | Time Series 18042 | Price 18044 | Price 18046 | GDT 18048 | Price 18050 | 1 18052 | |
| | | Fixed-Indicator 18054 | E 18056 | | Time Series 18058 | Fixed Indicator 18060 | Indicator 18062 | GDT 18064 | Fixed Indicator 18066 | 0..1 18068 | |

Fig. 181a

| GDT | | | Cat. | Obj. Class | Prop. | Rep./ Assn. | Type | Type Name | Card. |
|---|---|---|---|---|---|---|---|---|---|
| Procure-ment Cost Upper Limit 18100 | | | | Procure-ment Cost 18102 | Upper Limit 18104 | Details 18106 | | | |
| | Overall Limit 18108 | | E 18110 | Procure-ment Cost Upper Limit 18112 | Overall Limit 18114 | Details 18116 | | | 1 18118 |
| | | Amount 18120 | E 18122 | Overall Limit 18124 | Amount 18124 | Amount 18126 | GDT 18128 | Amount 18130 | 0..1 18132 |
| | | Amount Unlimited Indicator 18134 | E 18136 | Overall Limit 18138 | Amount Unlimited Indicator 18140 | Indicator 18142 | GDT 18144 | Value Unlimited Indicator 18146 | 0..1 18148 |
| | | Expected Amount 18150 | E 18152 | Overall Limit 18154 | Expected Amount 18156 | Amount 18158 | GDT 18160 | Amount 18162 | 0..1 18164 |

Fig. 181b

| GDT | | | Cat. | Obj. Class | Prop. | Rep./ Assn. | Type | Type Name | Card. |
|---|---|---|---|---|---|---|---|---|---|
| | Contract Partial Limit 18166 | | E 18168 | Procure-ment Cost Upper Limit 18170 | Contract Partial Limit 18172 | Details 18174 | | | 0..n 18176 |
| | | Amount 18178 | E 18180 | Contract Partial Limit 18182 | Amount 18184 | Amount 18186 | GDT 18188 | Amount 18190 | 0..1 18192 |
| | | Amount Unlimited Indicator 18194 | E 18196 | Contract Partial Limit 18198 | Amount Unlimited Indicator 181100 | Indicator 181102 | GDT 181104 | Value Unlimited 181106 | 0..1 181108 |
| | | Contract Refer-ence 181110 | E 181112 | Contract Partial Limit 181114 | Contract Reference 181116 | Business Transaction Document Reference 181118 | GDT 181120 | Business Trans-action Document Reference 181122 | 1 181124 |

Fig. 181c

| GDT | | | Cat. | Obj. Class | Prop. | Rep./ Assn. | Type | Type Name | Card. |
|---|---|---|---|---|---|---|---|---|---|
| | Miscel-laneous Partial Limit 181126 | | E 181128 | Procure-ment Cost Upper Limit 181130 | Miscellane-ous Partial Limit 181132 | Details 181134 | | | 0..1 181136 |
| | | Amount 181138 | E 181140 | Miscel-laneous Partial Limit 181142 | Amount 181144 | Amount 181146 | GDT 181148 | Amount 181150 | 0..1 181152 |
| | | Amount Unlimited Indicator 181154 | E 181156 | Miscel-laneous Partial Limit 181158 | Amount Unlimited Indicator 181160 | Indicator 181162 | GDT 181164 | Value Unlimited Indicator 181166 | 0..1 181168 |

Fig. 182a

| GDT | | Cat. | Obj. Class | Prop. | Rep./ Assn. | Type | Data Type | Lgth. | Card. | Remarks |
|---|---|---|---|---|---|---|---|---|---|---|
| Product Cat. ID 18200 | | | Product Cat. 18202 | Identification 18204 | Identifier 18206 | CCT 18208 | Identifier 18210 | 1..40 18212 | | Restricted 18214 |
| | scheme ID 18216 | A 18218 | Identification Scheme 18220 | Identification 18222 | Identifier 18228 | xsd 18230 | token 18232 | 1..60 18234 | 0..1 18236 | |
| | Scheme Version ID 18238 | A 18240 | Identification Scheme 18242 | Version 18244 | Identifier 18246 | xsd 18248 | token 18250 | 1..15 18252 | 0..1 18254 | |
| | scheme Agency ID 18256 | A 18258 | Identification Scheme Agency 18260 | Identification 18262 | Identifier 18264 | xsd 18266 | token 18268 | 1..60 18270 | 0..1 18272 | |

Fig. 182b

| GDT | | Cat. | Obj. Class | Prop. | Rep./ Assn. | Type | Data Type | Lgth. | Card. | Remarks |
|---|---|---|---|---|---|---|---|---|---|---|
| | scheme Agency Scheme ID 18274 | A 18276 | Identification Scheme Agency 18278 | Scheme 18280 | Identifier 18282 | xsd 18284 | token 18286 | 1..60 18288 | 0..1 18290 | |
| | scheme Agency Scheme Agency ID 18292 | A 18294 | Identification Scheme Agency 18296 | Scheme Agency 18298 | Identifier 18201 | xsd 18203 | token 18205 | 3 18207 | 0..1 18209 | |

Fig. 183

| CDT | | Cat. | Obj. Class | Prop. | Rep./ Assn. | Type | Type Name | Lgth. | Card. | Remarks |
|---|---|---|---|---|---|---|---|---|---|---|
| Product Cat. Internal ID 18300 | | | Product Cat. 18302 | Internal Identification 18304 | Identifier 18306 | GDT 18308 | Product Cat. ID 18310 | 1..40 18312 | | Restricted 18314 |
| | scheme ID 18316 | A 18318 | Identification Scheme 18320 | Identification 18322 | Identifier 18324 | xsd 18326 | token 18328 | 1..60 18330 | 0..1 18332 | |
| | scheme Agency ID 18334 | A 18336 | Identification Scheme Agency 18338 | Identification 18340 | Identifier 18342 | xsd 18344 | token 18346 | 1..60 18348 | 0..1 18350 | |

Fig. 184

| CDT | Obj. Class | Prop. Qual. | Prop. | Rep./ Assn. | Type | Type Name | Lgth. | Remarks |
|---|---|---|---|---|---|---|---|---|
| Product Cat. Party ID 18400 | Product Cat. 18402 | Party 18404 | Identification 18406 | Identifier 18408 | GDT 18410 | Product Cat. ID 18412 | 1..40 18414 | Restricted 18416 |

Fig. 185

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Cat. Stan-dard ID 18500 | | | Product Cat. 18502 | Standard 18504 | Identification 18506 | Identifier 18508 | GDT 18510 | Product Cat. ID 18512 | 1..40 18514 | | Restricted 18516 |
| | scheme ID 18518 | A 18520 | Identification Scheme 18522 | | Identification 18524 | Identifier 18526 | xsd 18528 | token 18530 | 1..60 18532 | 0..1 18534 | |
| | Scheme Version ID 18536 | A 18538 | Identification Scheme 18540 | | Version 18542 | Identifier 18544 | xsd 18546 | token 18548 | 1..15 18550 | 0..1 18552 | |
| | scheme Agency ID 18554 | A 18556 | Identification Scheme Agency 18558 | | Identification 18560 | Identifier 18562 | xsd 18564 | token 18566 | 3 18568 | 1 18570 | |

Fig. 186

| GDT | Cat. | Obj. Class | Prop. | Rep./ Assn. | Type | Type Name | Lgth. | Remarks |
|---|---|---|---|---|---|---|---|---|
| Product Change ID 18600 | E 18602 | Product Change 18604 | Identification 18606 | Identifier 18608 | CCT 18610 | Identifier 18612 | 1..32 18614 | Restricted 18616 |

Fig. 187

| GDT | Obj. Class | Prop. | Rep./ Assn. | Type | Type Name | Lgth. | Remarks |
|---|---|---|---|---|---|---|---|
| Product Demand Influencing Event Status Code 18700 | Product Demand Influencing Event 18702 | Status 18704 | Code 18706 | CCT 18708 | Code 18710 | 1..35 18712 | Restricted 18714 |

Fig. 188

| GDT | Obj. Class | Prop. | Rep./ Assn. | Type | Type Name | Lgth. | Remarks |
|---|---|---|---|---|---|---|---|
| Product Demand Influencing Event Type Code 18800 | Product Demand Influencing Event 18802 | Type 18804 | Code 18806 | CCT 18808 | Code 18810 | 1..35 18812 | Restricted 18814 |

Fig. 189

| GDT | Obj. Class | Prop. | Rep./ Assn. | Type | Type Name |
|---|---|---|---|---|---|
| Product Discontinuation Indicator 18900 | Product 18902 | Discontinuation 18904 | Indicator 18906 | CCT 18908 | Indicator 18910 |

Fig. 190a

| GDT | | Cat. | Obj. Class | Prop. | Rep./ Assn. | Type | Type Name | Lgth. | Card. | Remarks |
|---|---|---|---|---|---|---|---|---|---|---|
| Product ID 19000 | | | Product 19002 | Identifi-cation 19004 | Identifier 19006 | CCT 19008 | Identifier 19010 | 1..60 19012 | | Restricted 19014 |
| | scheme ID 19016 | A 19018 | Identification Scheme 19020 | Identifi-cation 19022 | Identifier 19024 | xsd 19026 | token 19028 | 1..60 19030 | 0..1 19032 | |
| | scheme Agency ID 19034 | A 19036 | Identification Scheme Agency 19038 | Identifi-cation 19040 | Identifier 19042 | xsd 19044 | token 19046 | 1..60 19048 | 0..1 19050 | |

Fig. 190b

| GDT | | Cat. | Obj. Class | Prop. | Rep./ Assn. | Type | Type Name | Lgth. | Card. | Remarks |
|---|---|---|---|---|---|---|---|---|---|---|
| | scheme Agency Scheme ID 19052 | A 19054 | Identification Scheme Agency 19056 | Scheme 19058 | Identifier 19060 | xsd 19062 | token 19064 | 1..60 19066 | 0..1 19068 | |
| | scheme Agency Scheme Agency ID 19070 | A 19072 | Identification Scheme Agency 19074 | Scheme Agency 19076 | Identifier 19078 | xsd 19080 | token 19082 | 3 19084 | 0..1 19086 | |

Fig. 191

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Internal ID 19100 | | | Product 19102 | Internal 19104 | Identification 19106 | Identifier 19108 | GDT 19110 | Product ID 19112 | 1..60 19114 | | Restricted 19116 |
| | scheme ID 19118 | A 19120 | Identification Scheme 19122 | | Identification 19124 | Identifier 19126 | xsd 19128 | token 19130 | 1..60 19132 | 0..1 19134 | |
| | scheme Agency ID 19136 | A 19138 | Identification Scheme Agency 19140 | | Identification 19140 | Identifier 19142 | xsd 19144 | token 19146 | 1..60 19148 | 0..1 19150 | |

Fig. 192

| CDT | Obj. Class | Prop. Qual. | Prop. | Rep./ Assn. | Type | Type Name | Lgth. | Remarks |
|---|---|---|---|---|---|---|---|---|
| Product Party ID 19200 | Product 19202 | Party 19204 | Identification 19206 | Identifier 19208 | GDT 19210 | Product ID 19212 | 1..60 19214 | Restricted 19216 |

Fig. 193

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Standard ID 19300 | | | Product 19302 | Standard 19304 | Identifi-cation 19306 | Identifier 19308 | GDT 19310 | Product ID 19312 | 1..14 19314 | | Restricted 19316 |
| | scheme ID 19318 | Attribute 19320 | Identification Scheme 19322 | | Identifi-cation 19324 | Identifier 19326 | xsd 19328 | token 19330 | 1..60 19332 | 0..1 19334 | |
| | scheme Agency ID 19336 | Attribute 19338 | Identification Scheme Agency 19340 | | Identifi-cation 19342 | Identifier 19344 | xsd 19346 | token 19348 | 3 19350 | 1 19352 | |

Fig. 194a

| GDT | | Cat. | Obj. Class | Prop. | Rep./ Assn. | Type | Type Name | Lgth. | Card. |
|---|---|---|---|---|---|---|---|---|---|
| Product Tax 19400 | | | Product Tax 19401 | | Details 19402 | | | | |
| | Country Code 19403 | Element 19404 | Product Tax 19405 | Country Code 19406 | Code 19407 | GDT 19408 | Country Code 19409 | | 0..1 19410 |
| | Jurisdiction Code 19411 | Element 19412 | Product Tax 19413 | Tax Jurisdiction Code 19414 | Code 19415 | GDT 19416 | Tax Jurisdiction Code 19417 | | 0..1 19418 |
| | Type Code 19419 | Element 19420 | Product Tax 19421 | Type Code 19422 | Code 19423 | GDT 19424 | Product Tax Type Code 19425 | | 0..1 19426 |
| | Type Description 19427 | Element 19428 | Product Tax 19429 | Type Description 19430 | Text 19431 | GDT 19432 | Description 19433 | | 0..1 19434 |
| | Base Amount 19435 | Element 19436 | Product Tax 19437 | Base Amount 19438 | Amount 19439 | GDT 19440 | Amount 19441 | | 0..1 19442 |

Fig. 194b

| GDT | | Cat. | Obj. Class | Prop. | Rep./ Assn. | Type | Type Name | Lgth. | Card. |
|---|---|---|---|---|---|---|---|---|---|
| | Percent 19443 | Element 19444 | Product Tax 19445 | Percent 19446 | Percent 19447 | GDT 19448 | Percent 19449 | | 0..1 19450 |
| | Amount 19451 | Element 19452 | Product Tax 19453 | Amount 19454 | Amount 19455 | GDT 19456 | Amount 19457 | | 0..1 19458 |
| | NonDeductible Percent 19459 | Element 19460 | Product Tax 19461 | NonDeductible Percent 19462 | Decimal 19463 | GDT 19464 | Percent 19465 | | 0..1 19466 |
| | Non Deductible Amount 19467 | Element 19468 | Product Tax 19469 | NonDeductible Amount 19470 | Amount 19471 | GDT 19472 | Amount 19473 | | 0..1 19474 |
| | Business Transaction Document Item Group ID 19475 | Element 19476 | Product Tax 19477 | Business Transaction Document Item Group Identification 19478 | Identifier 19479 | GDT 19480 | Business Transaction Document Item Group ID 19481 | | 0..1 19482 |

Fig. 194c

| GDT | | Cat. | Obj. Class | Prop. | Rep./ Assn. | Type | Type Name | Lgth. | Card. |
|---|---|---|---|---|---|---|---|---|---|
| | Triangu-lation Indicator 19483 | Element 19484 | Product Tax 19485 | Triangu-lation 19486 | Indicator 19487 | CCT 19488 | Indicator 19489 | | 0..1 19490 |
| | Legally Required Phrase 19491 | Element 19492 | Product Tax 19493 | Legally Required Phrase 19494 | Text 19495 | CCT 19496 | Text 19497 | 1..256 19498 | 0..1 19499 |

Fig. 195

| GDT | Obj. Class | Prop. | Rep./ Assn. | Type | Type Name | Lgth. | Remarks |
|---|---|---|---|---|---|---|---|
| Product Tax Event Type Code 19500 | Product Tax Event 19502 | Type Code 19504 | Code 19506 | CCT 19508 | Code 19510 | 3..6 19512 | Restricted 19514 |

Fig. 196

| GDT | Obj. Class | Prop. | Rep./ Assn. | Type | Type Name | Lgth. | Remarks |
|---|---|---|---|---|---|---|---|
| Product Tax Type Code 19600 | Product tax Type 19602 | Code 19604 | Code 19606 | CCT 19608 | Code 19610 | 3 19612 | Restricted 19614 |

Fig. 197

| GDT | Cat. | Obj. Class | Prop. | Rep./ Assn. | Type | Type Name | Lgth. | Remarks |
|---|---|---|---|---|---|---|---|---|
| Product Type Code 19700 | Element 19702 | Product 19704 | Type 19706 | Code 19708 | CCT 19710 | Code 19712 | 1..2 19714 | Restricted 19716 |

Fig. 198

| GDT | Obj. Class | Prop. | Rep./ Assn. | Type | Type Name | Lgth. | Remarks |
|---|---|---|---|---|---|---|---|
| Promotion ID 19800 | Promotion 19802 | Identification 19804 | Identifier 19806 | CCT 19808 | Identifier 19810 | 1..35 19812 | Restricted 19814 |

Fig. 199a

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Prop. 19900 | | | | | | Details 19901 | | | | | |
| | Action Code 19902 | Attribute 19903 | Prop. 19904 | | Action 19905 | Code 19906 | GDT 19907 | Action-Code 19908 | | 0..1 19909 | |
| | ID 19910 | Element 19911 | Prop. 19912 | | Iden-tification 19913 | Prop.ID 19914 | GDT 19915 | Prop.ID 19916 | | 1 19917 | |
| | Version ID 19918 | Element 19919 | Prop. 19920 | | Version Iden-tification 19921 | Version ID 19922 | GDT 19923 | Version ID 19924 | | 0..1 19925 | |
| | Definition Class Re-ference 19926 | Element 19927 | Prop. 19928 | | Definition Class Reference 19929 | Prop. Definition Class Refer-ence 19930 | GDT 19931 | Prop.Def-inition Class Ref-erence 19932 | | 0..1 19933 | |
| | Revision ID 19934 | Element 19935 | Prop. 19936 | | Revision identifi-cation 19937 | Identifier 19938 | CCT 19939 | Identifier 19940 | 1..10 19941 | 0..1 19942 | Restrict-ed 19943 |

Fig. 199b

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Version Date Time 19952 | Element 19953 | Prop. 19954 | | Version 19955 | Date Time 19956 | GDT 19957 | Date Time 19958 | | 0..1 19959 | |
| | Revision Date Time 19960 | Element 19961 | Prop. 19962 | | Revisio n 19963 | Date Time 19964 | GDT 19965 | Date Time 19966 | | 0..1 19967 | |
| | Subject Area Code 19968 | Element 19969 | Prop. 19970 | | Subject Area 19971 | Code 19972 | GDT 19973 | Subject Area Code 19974 | | 0..n 19975 | |
| | Preferred Name 19976 | Element 19977 | Prop. 19978 | Preferred 19979 | Name 19980 | Name 19981 | GDT 19982 | Name 19983 | | 1..n 19984 | |
| | Syno-nymous Name 19985 | Element 19986 | Prop. 19987 | Synony-mous 19988 | Name 19989 | Name 19990 | GDT 19991 | Name 19992 | | 0..n 19993 | |
| | Abbre-viation Name 19994 | Element 19995 | Prop. 19996 | Abbrevia-tion 19997 | Name 19998 | Name 19999 | GDT 19901a | Name 19902a | | 0..n 19903a | |

Fig. 199c

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Defining Description 19904a | Element 19905a | Prop. 19906a | Defining 19907a | Description 19908a | Description 19909a | GDT 19910a | Description 19911a | | 0..n 19912a | |
| | Additional Description 19913a | Element 19914a | Prop. 19915a | Additional 19916a | Description 19917a | Description 19918a | GDT 19919a | Description 19920a | | 0..n 19921a | |
| | Usage Description 19922a | Element 19923a | Prop. 19924a | Usage 19925a | Description 19926a | Description 19927a | GDT 19928a | Description 19929a | | 0..n 19930a | |
| | Preferred Symbol Note 19931a | Element 19932a | Prop. 19933a | Preferred 19934a | Symbol 19935a | Note 19936a | GDT 19937a | Note 19938a | | 0..1 19939a | |
| | Synonymous Symbol Note 19940a | Element 19941a | Prop. 19942a | Synonymal 19943a | Symbol 19944a | Note 19945a | GDT 19946a | Note 19947a | | 0..n 19948a | |

Fig. 199d

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Definition Source Docu- ment Web Address 19949a | Element 19950a | Prop. 19951a | Definition Source 19952a | Docu- ment 19953a | Web Address 19954a | GDT 19955a | Web Address 19956a | | 0..1 19957a | |
| | Icon Attach- ment 19958a | Element 19959a | Prop. 19960a | | Icon 19961a | Attach- ment 19962a | GDT 19963a | Attach- ment 19964a | | 0..1 19965a | |
| | Figure Attach- ment 19966a | Element 19967a | Prop. 19968a | | Figure 19969a | Attach- ment 19970a | GDT 19971a | Attach- ment 19972a | | 0..1 19973a | |
| | Prop. Data Type 19974a | Element 19975a | Prop. 19976a | | Prop. Data Type 19977a | Prop. Data Type 19978a | GDT 19979a | Prop. Data Type 19980a | | 0..1 19981a | |
| | Prop. Data Type Refer- ence 19982a | Element 19983a | Prop. 19984a | | Prop. Data Type Refer- ence 19985a | Prop. Data Type Refer- ence 19986a | GDT 19987a | Prop. Data Type Refer- ence 19988a | | 0..1 19989a | |

Fig. 199e

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Measure Unit Meaning Code 19990a | Element 19991a | Prop. 19992a | | Measure Unit Meaning 19993a | Code 19994a | GDT 19995a | Measure Unit Meaning Code 19996a | | 0..1 19997a | |
| | Depend-ing Prop. Refer-ence 19998a | Element 19999a | Prop. 19901b | Depend-ing 19902b | Prop. Iden-tification 19903b | Prop Iden-tification 19904b | GDT 19905b | Prop. Refer-ence 19906b | | 0..n 19907b | |
| | Con-straining Prop. Refer-ence 19908b | Element 19909b | Prop. 19910b | Con-straining 19911b | Prop. Iden-tification 19912b | Prop. Iden-tification 19913b | GDT 19914b | Prop. Reference 19915b | | 0..n 19916b | |
| | Aspect ID 19917b | Element 19918b | Prop. 19919b | | Aspect Iden-tification 19920b | Identifier 19921b | GDT 19922b | Aspect ID 19923b | | 0..n 19924b | only for catalogue 19925b |

Fig. 199f

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Target Interface Element ID 19926b | Element 19927b | Prop. 19928b | | Target Interface Element Iden-tification 19929b | Identifier 19930b | GDT 19931b | Interface Element ID 19932b | | 0..n 19933b | only for catalogue 19934b |
| | Multiple Value Indicator 19935b | Element 19936b | Prop. 19937b | | Multiple Value Indication 19938b | Indicator 19939b | GDT 19940b | Prop. Multiple Value Indicator 19941b | | 0..1 19942b | only for catalogue 19943b |
| | Text Search-able Indicator 19944b | Element 19946b | Prop. 19947b | | Text Search-able Indication 19948b | Indicator 19949b | GDT 19950b | Text Search-able Indicator 19951b | | 0..1 19952b | only for catalogue 19953b |
| | Para-metric Search-able Indicator 19954b | Element 19955b | Prop. 19956b | | Para-metric Search-able Indication 19957b | Indicator 19958b | GDT 19959b | Prop. Para-metric Search-able Indicator 19960b | | 0..1 19961b | only for catalogue 19962b |

Fig. 199g

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Valuation Required Indicator 19963b | Element 19964b | Prop. 19965b | | Valuation Required Indication 19966b | Indicator 19967b | GDT 19968b | Prop. Valuation Required Indicator 19969b | | 0..1 19970b | only for catalogue 19971b |

Fig. 200a

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| Prop. Data Type 20000 | | | | | | | | Details 20001 | | | | |
| | Action Code 20002 | | Attribute 20003 | Prop. Data Type 20004 | | Action 20005 | | Code 20006 | GDT 20007 | Action Code 20008 | | 0..1 20009 |
| | ID 20010 | | Element 20011 | Prop. Data Type 20012 | | Identification 20013 | | Identifier 20014 | GDT 20015 | Prop. Data Type ID 20016 | | 0..1 20017 |
| | Version ID 20018 | | Element 20019 | Prop. Data Type 20020 | | Version Identification 20021 | | Version ID 20022 | GDT 20023 | Version ID 20024 | | 0..1 20025 |
| | Preferred Name 20026 | | Element 20027 | Prop. Data Type 20028 | Preferred 20029 | Name 20030 | | Name 20031 | GDT 20032 | Name 20033 | | 1..n 20034 |
| | Synonymous Name 20035 | | Element 20036 | Prop. Data Type 20037 | Synonymous 20038 | Name 20039 | | Name 20040 | GDT 20041 | Name 20042 | | 0..n 20043 |

Fig. 200b

| CDT | | | Cat. | Obj. Class | Prop. Qual. | Prop. | Rep./ Qual. | Assn. Rep./ Assn. | Type | Type Name | Lgth. | Card. |
|---|---|---|---|---|---|---|---|---|---|---|---|---|
| | Short Name 20044 | | Element 20045 | Prop. Data Type 20046 | Short 20047 | Name 20048 | | Name 20049 | GDT 20050 | Name 20051 | | 0..n 20052 |
| | Icon Attach-ment 20053 | | Element 20054 | Prop. Data Type 20055 | | Icon 20056 | | Attach-ment 20057 | GDT 20058 | Attachment 20059 | | 0..1 20060 |
| | Des-cription 20061 | | Element 20062 | Prop. Data Type 20063 | | Des-cription 20064 | | Des-cription 20065 | GDT 20066 | Descrip-tion 20067 | | 0..n 20068 |
| | Usage Des-cription 20069 | | Element 20070 | Prop. Data Type 20071 | Usage 20072 | Des-cription 20073 | | Des-cription 20074 | GDT 20075 | Descrip-tion 20076 | | 0..n 20077 |
| | Format Code 20078 | | Element 20079 | Prop. Data Type 20080 | | Format 20081 | | Code 20082 | GDT 20083 | Prop. Data Type Format Code 20084 | | 1..1 20085 |

Fig. 200c

| CDT | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|
| | Language Dependency Indicator 20086 | Element 20087 | Prop. Data Type 20087 | | Language Dependency 20089 | | Indicator 20090 | GDT 20091 | Language Dependency Indicator 20092 | | 0..1 20093 |
| | Maximum Total Digit Number Value 20094 | Element 20095 | Prop. Data Type 20096 | Maximum Total 20097 | Digit Number 20098 | Digit Number 20099 | Value 20001a | GDT 20002a | Digit Number Value 20003a | | 0..1 20004a |
| | Lower Case Allowed Indicator 20015a | Element 20016a | Prop. Data Type 20017a | | Lower Case Allowed 20018a | | Indicator 20019a | GDT 20020a | Indicator 20021a | | 0..1 20022a |
| | Negative Value Allowed Indicator 20023a | Element 20024a | Prop. Data Type 20025a | | Negative Value Allowed 20026a | | Indicator 20027a | GDT 20028a | Indicator 20029a | | 0..1 20030a |

Fig. 200d

| CDT | | Cat. | Obj. Class | Prop. Qual. | Prop. | Rep./Assn. Qual. | Rep./ Assn. | Type | Type Name | Lgth. | Card. |
|---|---|---|---|---|---|---|---|---|---|---|---|
| | Measure Unit Code 20031a | Element 20032a | Prop. Data Type 20033a | | Measure Unit 20034a | | Code 20035a | GDT 20036a | Measure Unit Code 20037a | | 0..1 20038a |
| | Currency Code 20039a | Element 20040a | Prop. Data Type 20041a | | Currency 20042a | | Code 20043a | GDT 20044a | Currency Code 20045a | | 0..1 20046a |
| | Expo-nential Rep. Type Code 20047a | Element 20048a | Prop. Data Type 20049a | | Exponential Rep. Type 20050a | | Code 20051a | GDT 20052a | Exponen-tial Rep. Type Code 20053a | | 0..1 20054a |
| | Expo-nent Integer Value 20055a | Element 20056a | Prop. Data Type 20057a | | Expo-nent 20058a | Integer 20059a | Value 20060a | GDT 20061a | Integer Value 20062a | | 0..1 20063a |
| | Interval Value Allowed Indicator 20064a | Element 20065a | Prop. Data Type 20066a | Interval 20067a | Value Allowed 20068a | | Indicator 20069a | GDT 20070a | Indicator 20071a | | 0..1 20072a |

Fig. 200e

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Frac-tional Digit Present-ation Accu-racy Indicator 20073a | | Element 20074a | Prop. Data Type 20075a | Frac-tional Digit 20076a | Present-ation Accu-racy 20077a | | Indicator 20078a | GDT 20079a | Indicator 20080a | | 0..1 20081a |
| | Regular Expres-sion 20082a | | Element 20083a | Prop. Data Type 20084a | | Regular Expres-sion 20085a | | Text 20086a | GDT 20087a | Note 20088a | | 0..1 20089a |
| | Separa-tor Usage Indicator 20090a | | Element 20091a | Prop. Data Type 20092a | | Sepa-rator Usage 20093a | | Indicator 20094a | GDT 20095a | Indicator 20096a | | 0..1 20097a |
| | Tupel Lgth. Value 20098a | | Element 20099a | Prop. Data Type 20001b | | Tupel Lgth 20002b | Tupel Lgth. 20003b | Value 20004b | GDT 20005b | Tupel Lgth. Value 20006b | | 0..1 20007b |

Fig. 200f

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Com-ponent Prop. Defini-tion Class Refer-ence 20008b | | Element 20009b | Prop. Data Type 20010b | Com-ponent 20011b | Prop. Defini-tion Class Refer-ence 20012b | | Prop. Definition Class Refer-ence 20013b | GDT 20014b | Prop. Definition Class Reference 20015b | | 0..1\| 20016b |
| | Com-ponent Prop. 20017b | | Element 20018b | Prop. Data Type 20019b | Com-ponent 20020b | Prop. Refer-ence 20021b | | Prop. Refer-ence 20022b | GDT 20023b | Prop. Reference 20024b | | 0..n 20025b |
| | | Refer-ence 20026b | Element 20027b | Com-ponent Prop. 20028b | | Prop. Refer-ence 20029b | | Prop. Refer-ence 20030b | GDT 20031b | Prop. Reference 20032b | | 1 20033b |
| | | Ordinal Number Value 20034b | Element 20035b | Compo-nent Prop. 20036b | | Ordinal Number 20037b | | Value 20038b | GDT 20039b | Ordinal Number Value 20040b | | 0..1 20041b |

Fig. 200g

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Allowed Prop. Value Element 20042b | | Element 20043b | Prop. Data Type 20044b | Allowed 20045b | Prop. Value Structure 20046b | | Details 20047b | | | | 0..n 20048b |
| | | Prop. Value 20049b | Element 20050b | Prop. Value Structure 20051b | | Prop. Value 20052b | | Prop. Value 20053b | GDT 20054b | Prop. Value 20055b | | 1 20056b |
| | | Default Value Indicator 20057b | Element 20058b | Prop. Value Structure 20059b | | Default Value 20060b | | Indicator 20061b | GDT 20062b | Indicator 20063b | | 0..1 20064b |
| | | Net Element ID 20065b | Element 20066b | Prop. Value Structure 20067b | | Net Element Identifi-cation 20068b | | Identifier 20069b | CCT 20070b | Identifier 20071b | 5 20072b | 0..1 20073b |

Fig. 200h

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | | Preced-ing Net Element ID 20074b | Element 20075b | Prop. Value Structure 20076b | Preced-ing 20077b | Netel-ment Ideniti-fication 20078b | | Identi-fier 20079b | CCT 20080b | Identifier 20081b | 5 20082b | 0..n 20083b |
| | Allowed Prop. Valua-tion 20084b | | Element 20085b | Prop. Data Type 20086b | Allowed 20087b | Prop. Valua-tion 20088b | | Prop. Valua-tion 20089b | GDT 20090b | Prop. Valua-tion 20091b | | 0..n 20092b |

Fig. 201

| GDT | Obj. Class | Prop. | Rep./ Assn. | Type | Type Name | Lgth. | Remarks |
|---|---|---|---|---|---|---|---|
| Prop. Data Type Format Code 20100 | Prop. Data Type 20102 | Format 20104 | Code 20106 | CCT 20108 | Code 20110 | 10 20112 | Restricted 20114 |

Fig. 202

| GDT | | Cat. | Obj. Class | Prop. | Rep./ Assn. | Type | Type Name | Lgth. | Card. | Remarks |
|---|---|---|---|---|---|---|---|---|---|---|
| Prop. Data Type ID 20200 | | | Prop. Data Type 20202 | Identifica-tion 20204 | Identifier 20206 | CCT 20208 | Identifier 20210 | 1..50 20212 | | Restricted 20214 |
| | Scheme Agency ID 20216 | Attribute 20218 | Identification Scheme-Agency 20220 | Identifica-tion 20222 | Identifier 20224 | xsd 20226 | token 20228 | 1..60 20230 | 1 20232 | |
| | Scheme Agency Scheme ID 20234 | Attribute 20236 | Identification Scheme-Agency 20238 | Scheme 20240 | Identifier 20242 | xsd 20244 | token 20246 | 1..60 20248 | 0..1 20250 | |
| | Scheme Agency Scheme Agency ID 20252 | Attribute 20254 | Identification Scheme-Agency 20256 | Scheme Agency 20258 | Identifier 20260 | xsd 20262 | token 20264 | 3 20266 | 0..1 20268 | |

Fig. 203

| GDT | | Cat. | Obj. Class | Prop. | Rep./ Assn. | Type | Type Name | Card. |
|---|---|---|---|---|---|---|---|---|
| Prop. Data Type Reference 20300 | | | Prop. Data Type Reference 20302 | | Details 20304 | | | |
| | ID 20306 | Element 20308 | Prop. Data Type Reference 20310 | Identification 20312 | Identifier 20314 | GDT 20316 | Prop. Data Type ID 20318 | 1 |
| | Version ID 20320 | Element 20322 | Prop. Data Type Reference 20324 | Version Identification 20326 | Identifier 20328 | GDT 20330 | Version ID 20332 | 0..1 20334 |

Fig. 204a

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| Prop. Definition Class 20400 | | | | | | | Details 20401 | | | | | |
| | Action Code 20402 | | Attribute 20403 | Prop. Definition Class 20404 | | Action 20405 | Code 20406 | GDT 20407 | Action Code 20408 | | 0..1 20409 | |
| | ID 20410 | | Element 20411 | Prop. Definition Class 20412 | | Identifi- cation 20413 | Prop. Definition Class ID 20414 | GDT 20415 | Prop. Definition Class ID 20416 | | 1..1 20417 | |
| | Version ID 20418 | | Element 20419 | Prop. Definition Class 20420 | | Version Identifi- cation 20421 | Version ID 20422 | GDT 20423 | Version ID 20424 | | 0..1 20425 | |
| | Revision ID 20426 | | Element 20427 | Prop. Definition Class 20428 | | Revision Identifi- cation 20429 | Identifier 20430 | CCT 20431 | Identifier 20432 | 1..10 20433 | 0..1 20434 | Restricted 20435 |
| | Creation Date Time 20436 | | Element 20437 | Prop. Definition Class 20438 | | Creation Date Time 20439 | Date Time 20440 | GDT 20441 | Date Time 20442 | | 0..1 20443 | |

Fig. 204b

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | Version Date Time 20444 | | Element 20445 | Prop. Definition Class 20446 | | Version Date Time 20447 | Date Time 20448 | GDT 20449 | Date Time 20450 | | 0..1 20451 | |
| | Revision Date Time 20452 | | Element 20453 | Prop. Definition Class 20454 | | Revision Date Time 20455 | Date Time 20456 | GDT 20457 | Date Time 20458 | | 0..1 20459 | |
| | Preferred Name 20460 | | Element 20461 | Prop. Definition Class 20462 | Preferred 20463 | Name 20464 | Name 20465 | GDT 20466 | Name 20467 | | 1..n 20468 | |
| | Synonymous Name 20469 | | Element 20470 | Prop. Definition Class 20471 | Synonymous 20472 | Name 20473 | Name 20474 | GDT 20475 | Name 20476 | | 0..n 20477 | |
| | Short Name 20478 | | Element 20479 | Prop. Definition Class 20480 | Short 20481 | Name 20482 | Name 20483 | GDT 20484 | Name 20485 | | 0..n 20486 | |

Fig. 204c

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Icon Attach-ment 20487 | Ele-ment 20488 | Prop. Definition Class 20489 | Icon 20490 | Attach-ment 20491 | Attach-ment 20492 | GDT 20493 | Attach-ment 20494 | | 0..1 20495 | |
| | Defining Des-cription 20496 | Ele-ment 20497 | Prop. Definition Class 20498 | Defining 20499 | Des-cription 20401a | Des-cription 20402a | GDT 20403a | Des-cription 20404a | | 0..n 20405a | |
| | Source Docu-ment Web Address 20406a | Ele-ment 20407a | Prop. Definition Class 20408a | Source 20409a | Docu-ment 20410a | Web Address 20411a | CCT 20412a | Web Address 20413a | | 0..1 20414a | |
| | Additional Descrip-tion 20415a | Element 20416a | Prop. Definition Class 20417a | Addi-tional 20418a | Des-cription 20419a | Des-cription 20420a | GDT 20421a | Des-cription 20422a | | 0..n 20423a | |
| | Usage Descrip-tion 20424a | Element 20425a | Prop. Definition Class 20426a | Usage 20427a | Des-cription 20428a | Des-cription 20429a | GDT 20430a | Des-cription 20431a | | 0..n 20432a | |

Fig. 204d

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Type Code 20433a | Element 20434a | Prop. Definition Class 20435a | | Type 20436a | Code 20437a | GDT 20438a | Prop. Definition Class Type Code 20439a | | 0..1 20440a | |
| | Simplified Graphic Attach-ment 20441a | Ele-ment 20442a | Prop. Definition Class 20443a | Simp-lified Graphic 20444a | Attach-ment 20445a | Attachment 20446a | GDT 20447a | Attach-ment 20448a | | 0..1 20449a | |
| | Subject Area Code 20450a | Ele-ment 20451a | Prop. Definition Class 20452a | Topic 20453a | Subject Area 20454a | Code 20455a | GDT 20456a | Subject Area Code 20457a | | 0..n 20458a | |
| | Parent Prop. Definition Class Refer-ence 20459a | Ele-ment 20460a | Prop. Definition Class 20461a | Parent 20462a | Definition Class Reference 20463a | Prop. Definition Class Reference 20464a | GDT 20465a | Prop. Definition Class Refer-ence 20466a | | 0..1 20467a | |
| | Defined Prop. 20468a | Ele-ment 20469a | Prop. Definition Class 20470a | | Defined Prop. 20471a | Details 20472a | | | | 0..n 20473a | |

Fig. 204e

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | | Refer-ence 20474a | Element 20475a | Defined Prop. 20476a | | Reference 20477a | Prop. Reference 20478a | GDT 20479a | Prop. Refer-ence 20480a | | 1..1 20481a | |
| | | Ordinal Number Value 20482a | Element 20483a | Defined Prop. 20484a | | Ordinal Number 20485a | Value 20486a | GDT 20487a | Ordinal Number Value 20488a | | 0..1 20489a | |
| | | Sub-Hierarchy Definition Indicator 20490a | Element 20491a | Defined Prop. 20492a | | Sub-Hier-archy 20493a | Definition 20494a | CCT 20495a | Indicator 20496a | | 0..1 20497a | |
| | | Visibility Indicator 20498a | Element 20499a | Defined Prop. 20401b | | Visibility 20402b | Indicator 20403b | CCT 20404b | Indicator 20405b | | 0..1 20406b | |

Fig. 204f

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | Hierarchy Prop. Valuation 20407b | | Element 20408b | Prop. Definition Class 20409b | Hier-archy 20410b | Prop. Valuation 20411b | Prop. Valuation 20412b | GDT 20413b | Prop. Valuation 20414b | | 0..n 20415b | |

Fig. 205

| GDT | | Cat. | Obj. Class | Prop. | Rep./ Assn. | Type | Type Name | Lgth. | Card. | Remarks |
|---|---|---|---|---|---|---|---|---|---|---|
| Prop. Definition Class ID 20500 | | | Prop. Definition Class 20502 | Identifi-cation 20504 | Identifier 20506 | CCT 20508 | Identifier 20510 | 1..50 20512 | | Restricted 20514 |
| | Scheme Agency ID 20516 | Attribute 20518 | Identifi-cation Scheme Agency 20520 | Identifi-cation 20522 | Identifier 20524 | xsd 20526 | token 20528 | 1..60 20530 | 1 | |
| | Scheme Agency Scheme ID 20532 | Attribute 20534 | Identifi-cation Scheme Agency 20536 | Scheme 20538 | Identifier 20540 | xsd 20542 | token 20544 | 1..60 20546 | 0..1 20548 | |
| | Scheme Agency Scheme Agency ID 20550 | Attribute 20552 | Identifi-cation Scheme Agency 20554 | Scheme Agency 20556 | Identifier 20558 | xsd 20560 | token 20562 | 3 20564 | 0..1 20566 | |

Fig. 206

| GDT | | Cat. | Obj. Class | Prop. | Rep./ Assn. | Type | Type Name | Card. |
|---|---|---|---|---|---|---|---|---|
| Prop. Definition Class Reference 20600 | | | Prop. Definition Class Reference 20602 | | Details 20604 | | | |
| | ID 20606 | Element 20608 | Prop. Definition Class Reference 20610 | Identification 20612 | Identifier 20614 | GDT 20616 | Prop. Definition Class ID 20618 | 1 20620 |
| | Version ID 20622 | Element 20624 | Prop. Definition Class Reference 20626 | Version Identification 20628 | Identifier 20630 | GDT 20632 | Version ID 20634 | 0..1 20636 |

Fig. 207

| GDT | Obj. Class | Rep./ Assn. | Type | Type Name | Lgth. | Remarks |
|---|---|---|---|---|---|---|
| Definition Class Type Code 20700 | Definition Class Type 20702 | Code 20704 | CCT 20706 | Code 20708 | 1 20710 | Restricted 20712 |

Fig. 208

| GDT | | Cat. | Obj. Class | Prop. | Rep./ Assn. | Type | Type Name | Lgth. | Card. | Remarks |
|---|---|---|---|---|---|---|---|---|---|---|
| Prop. ID 20800 | | | Prop. 20802 | Identifi-cation 20804 | Identifier 20806 | CCT 20808 | Identifier 20810 | 1..50 20812 | | Restricted 20814 |
| | Scheme Agency ID 20816 | Attribute 20818 | Identifi-cation Scheme-Agency 20820 | Identifi-cation 20822 | Identifier 20824 | xsd 20826 | token 20828 | 1..60 20830 | 1..1 20832 | |
| | Scheme Agency Scheme ID 20834 | Attribute 20836 | Identifi-cation Scheme-Agency 20838 | Scheme 20840 | Identifier 20842 | xsd 20844 | token 20846 | 1..60 20848 | 0..1 20850 | |
| | Scheme Agency Scheme Agency ID 20852 | Attribute 20854 | Identifi-cation Scheme-Agency 20856 | Scheme Agency 20858 | Identifier 20860 | xsd 20862 | token 20864 | 3 20866 | 0..1 20868 | |

Fig. 209

| GDT | Obj. Class | Prop. | Rep./ Assn. | Type Name |
|---|---|---|---|---|
| Prop. Multiple Value Indicator 20900 | Prop. 20902 | Multiple Value 20904 | Indicator 20906 | Indicator 20908 |

Fig. 210

| GDT | Obj. Class | Prop. | Rep./ Assn. | Type | Type Name |
|---|---|---|---|---|---|
| Prop. Parametric Searchable Indicator 21000 | Prop. 21002 | Parametric Searchable 21004 | Indicator 21006 | CCT 21008 | Indicator 21010 |

Fig. 211

| GDT | | Cat. | Obj. Class | Prop. | Rep./ Assn. | Type | Type Name | Card. |
|---|---|---|---|---|---|---|---|---|
| Prop. Reference 21100 | | | Prop. Reference 21102 | | Details 21104 | | | |
| | ID 21106 | Element 21108 | Prop. Reference 21110 | Identification 21112 | Identifier 21114 | GDT 21116 | Prop. ID 21118 | 1..1 21120 |
| | Version ID 21122 | Element 21124 | Prop. Reference 21126 | Version Identification 21128 | Version ID 21130 | GDT 21132 | Version ID 21134 | 0..1 21136 |
| | Definition Class Reference 21138 | Element 21140 | Prop. Reference 21142 | Definition Class Reference 21144 | Definition Class Reference 21146 | GDT 21148 | Definition Class Reference 21150 | 0..1 21152 |

Fig. 212a

| GDT | | Cat. | Obj. Class | Prop. | Rep./ Assn. | Type | Type Name | Lgth. | Card. |
|---|---|---|---|---|---|---|---|---|---|
| Prop. Valuation 21200 | | | Prop. Valuation 21202 | | Details 21204 | | | | |
| | Action Code 21206 | Attribute 21208 | Prop. Valuation 21210 | Action 21212 | Code 21214 | GDT 21216 | Action Code 21218 | | 0..1 21220 |
| | ID 21222 | Element 21224 | Prop. Valuation 21226 | Identifi- cation 21228 | Identifier 21230 | CCT 21232 | Identifier 21234 | 1..10 21236 | 0..1 21238 |

Fig. 212b

| GDT | | Cat. | Obj. Class | Prop. | Rep./ Assn. | Type | Type Name | Lgth. | Card. |
|---|---|---|---|---|---|---|---|---|---|
| | Parent ID 21240 | Element 21242 | Prop. Valuation 21244 | Parent Identification 21246 | Identifier 21248 | CCT 21250 | Identifier 21252 | 1..10 21254 | 0..1 21256 |
| | Prop. Reference 21258 | Element 21260 | Prop. Valuation 21262 | Prop. Reference 21264 | Reference 21266 | GDT 21268 | Prop. Reference 21270 | | 1 21272 |
| | Prop. Value 21274 | Element 21276 | Prop. Valuation 21278 | Prop. Value 21280 | Prop. Value 21282 | GDT 21284 | Prop. Value 21286 | | 0..n 21288 |

Fig. 213

| GDT | Obj. Class | Prop. | Rep./ Assn. | Type | Type Name |
|---|---|---|---|---|---|
| Prop. Valuation Required Indicator 21300 | Prop. 21302 | Valuation Required 21304 | Indicator 21306 | CCT 21308 | Indicator 21310 |

Fig. 214a

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| Prop. Value 21400 | | | Ele-ment 21401 | Prop. Value 21402 | | | | Details 21403 | | | |
| | Amount Specifi-cation 21404 | | Ele-ment 21405 | Prop. Value 21406 | | Amount Specifi-cation 21407 | | Details 21408 | | | 0..1 21409 |
| | | Amount 21410 | Ele-ment 21411 | Amount Specifi-cation 21412 | | Amount 21413 | | Amount 21414 | GDT 21415 | Amount 21416 | 0..1 21417 |
| | | Lower Amount 21418 | Ele-ment 21419 | Amount Specifi-cation 21420 | Lower 21421 | Amount 21422 | | Amount 21423 | GDT 21424 | Amount 21425 | 0..1 21426 |
| | | Upper Amount 21427 | Ele-ment 21428 | Amount Specifi-cation 21429 | Upper 21430 | Amount 21431 | | Amount 21432 | GDT 21433 | Amount 21434 | 0..1 21435 |
| | Quan-tity Specifi-cation 21436 | | Ele-ment 21437 | Prop. Value 21438 | | Quantity Specifi-cation 21439 | | Details 21440 | | | 0..1 21441 |

Fig. 214b

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Quantity 21442 | Element 21443 | Quantity Specification 21444 | | Quantity 21445 | | Quantity 21446 | GDT 21447 | Quantity 21448 | 0..1 21449 |
| | | Lower Quantity 21450 | Element 21451 | Quantity Specification 21452 | Lower 21453 | Quantity 21454 | | Quantity 21455 | GDT 21456 | Quantity 21457 | 0..1 21458 |
| | | Upper Quantity 21459 | Element 21460 | Quantity Specification 21461 | Upper 21462 | Quantity 21463 | | Quantity 21464 | GDT 21465 | Quantity 21466 | 0..1 21467 |
| | Decimal Specification 21468 | | Element 21469 | Prop. Value 21470 | | Numeric Specification 21471 | | Details 21472 | | | 0..1 21473 |
| | | Decimal Value 21474 | Element 21475 | Decimal Specification 21476 | | Decimal Value 21477 | Decimal 21478 | Value 21479 | GDT 21480 | Decimal Value 21481 | 0..1 21482 |

Fig. 214c

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Lower Decimal Value 21483 | Element 21484 | Decimal Specification 21485 | Lower 21486 | Decimal Value 21487 | Decimal 21488 | Value 21489 | GDT 21490 | Decimal Value 21491 | 0..1 21492 |
| | | Upper Decimal Value 21493 | Ele ment 21494 | Decimal Specification 21495 | Upper 21496 | Decimal Value 21497 | Decimal 21498 | Value 21499 | GDT 21401a | Decimal Value 21402a | 0..1 21403a |
| | Float Specific-ation 21404a | | Element 21405a | Prop. Value 21406a | | Float Specification 21407a | | Details 21408a | | | 0..1 21409a |
| | | Float Value 21410a | Element 21411a | Float Specification 21412a | | Float Value 21413a | Float 21414a | Value 21415a | GDT 21416a | Float Value 21417a | 0..1 21418a |

Fig. 214d

| GDT | | | Cat. | Obj. Class | Prop. Qual. | Prop. | Rep./ Asso. Qual. | Rep./ Assn. | Type | Type Name | Card. |
|---|---|---|---|---|---|---|---|---|---|---|---|
| | | Lower Float Value 21419a | Ele-ment 21420a | Float Specifi-cation 21421a | Lower 21422a | Float Value 21423a | Float 21424a | Value 21425a | GDT 21426a | Float Value 21427a | 0..1 21428a |
| | | Upper Float Value 21429a | Ele-ment 21430a | Float Specifi-cation 21431a | Upper 21432a | Float Value 21433a | Float 21434a | Value 21435a | GDT 21436a | Float Value 21437a | 0..1 21438a |
| | In-eger Specifi-cation 21439a | | Ele-ment 21440a | Prop. Value 21441a | | Integer Specifi-cation 21442a | | Details 21443a | | | 0..1 21444a |
| | | Integer Value 21445a | Ele-ment 21446a | Integer Specifi-cation 21447a | | Integer Value 21448a | Integer 21449a | Value 21450a | GDT 21451a | Integer Value 21452a | 0..1 21453a |
| | | Lower Integer Value 21454a | Ele-ment 21455a | Integer Specifi-cation 21456a | Lower 21457a | Integer Value 21458a | Integer 21459a | Value 21460a | GDT 21461a | Integer Value 21462a | 0..1 21463a |

Fig. 214e

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Upper Integer Value 21464a | Ele-ment 21465a | Integer Specifi-cation 21466a | Upper 21467a | Integer Value 21468a | Integer 21469a | Value 21470a | GDT 21471a | Integer Value 21472a | 0..1 21473a |
| | Date Specifi-cation 21474a | | Ele-ment 21475a | Prop. Value 21476a | | Date Specifi-cation 21477a | | Details 21478a | | | 0..1 21479a |
| | | Date 21480a | Ele-ment 21481a | Date Specifi-cation 21482a | | | | Date 21483a | GDT 21484a | Date 21485a | 0..1 21486a |
| | | Start Date 21487a | Ele-ment 21488a | Date Specifi-cation 21489a | | Start 21490a | | Date 21491a | GDT 21492a | Date 21493a | 0..1 21494a |
| | | End Date 21495a | Ele-ment 21496a | Date Specifi-cation 21497a | | End 21498a | | Date 21499a | GDT 21401b | Date 21402b | 0..1 21403b |

Fig. 214f

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Time Specification 21404b | | Element 21405b | Prop. Value 21406b | | Time Specification 21407b | | Details 21408b | | | 0..1 21409b |
| | | Time 21410b | Element 21411b | Time Specification 21412b | | | | Time 21413b | GDT 21414b | Time 21415b | 0..1 21416b |
| | | Start Time 21417b | Element 21418b | Time Specification 21419b | | Start 21420b | | Time 21421b | GDT 21422b | Time 21423b | 0..1 21424b |
| | | End Time 21425b | Element 21426b | Time Specification 21427b | | End 21428b | | Time 21429b | GDT 21430b | Time 21431b | 0..1 21432b |
| | Date Time Specification 21433b | | Element 21434b | Prop. Value 21435b | | Date Time Specification 21436b | | Details 21437b | | | 0..1 21438b |

Fig. 214g

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Date Time 21439b | Ele-ment 21440b | Date Time Specifi-cation 21441b | | | | Date Time 21442b | GDT 21443b | Date Time 21444b | 0..1 21445b |
| | | Start Date Time 21446b | Ele-ment 21447b | Date Time Specifi-cation 21448b | | Start 21449b | | Date Time 21450b | GDT 21451b | Date Time 21452b | 0..1 21453b |
| | | End Date Time 21454b | Ele-ment 21455b | Date Time Specifi-cation 21456b | | End 21457b | | Date Time 21458b | GDT 21459b | Date Time 21460b | 0..1 21461b |
| | Name Specifi-cation 21462b | | Ele-ment 21463b | Prop. Value 21464b | | Name Specifi-cation 21465b | | Details 21466b | | | 0..1 21467b |
| | | Name 21468b | Ele-ment 21469b | Name Specifi-cation 21470b | | Name 21471b | | Name 21472b | GDT 21473b | Name 21474b | 0..1 21475b |

Fig. 214h

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Indicator Specification 21476b | | Element 21477b | Prop. Value 21478b | | Indicator Specification 21479b | | Details 21480b | | | 0..1 21481b |
| | | Indicator 21482b | Element 21483b | Indicator Specification 21484b | | Indicator 21485b | | Indicator 21486b | GDT 2 1587b | Indicator 21488b | 0..1 21489b |
| | Interval Type Code 21490b | | Element 21491b | Prop. Value 21492b | | Interval Type 21493b | | Code 21494b | GDT 21495b | Interval Type Code 21496b | 0..1 21497b |
| | Preferred Name 21498b | | Element 21499b | Prop. Value 21401c | | Preferred Name 21402c | | Name 21403c | GDT 21404c | Name 21405c | 0..n 21406b |
| | Synonymous Name 21407c | | Element 21408c | Prop. Value 21409c | | Synony-mous Name 21410c | | Name 21411c | GDT 21412c | Name 21413c | 0..n 21414c |

Fig. 214i

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Abbrev-iation Name 21415c | | Ele-ment 21416c | Prop. Value 21417c | | Abbrevi-ation Name 21418c | | Name 21419c | GDT 21420c | Name 21421c | 0..n 21422c |
| | Icon Attach-ment 21423c | | Ele-ment 21424c | Prop. Value 21425c | | Icon 21426c | | Attach-ment 21427c | GDT 21428c | Attach-ment 21429c | 0..1 21430c |
| | Attach-ment Web Ad-dress 21431c | | Ele-ment 21432c | Prop. Value 21433c | | Attach-ment 21434c | | Web Add-ress 21435c | GDT 21436c | Web Add-ress 21437c | 0..1 21438c |

Fig. 215

| GDT | Cat. | Obj. Class | Prop. | Rep./ Assn. | Type | Lgth. | Card. | Remarks |
|---|---|---|---|---|---|---|---|---|
| Purchase Order Ordered Indicator 21500 | | Purchase Order 21502 | Ordered Indicator 21504 | Indicator 21506 | CCT: Indicator 21508 | | | |

Fig. 216

| CDT | Cat. | Obj. Class | Prop. | Rep./ Assn. | Type | Type Name | Lgth. | Card. | Remarks |
|---|---|---|---|---|---|---|---|---|---|
| Purchasing Group ID 21600 | | Purchasing Group 21602 | Identification 21604 | Identifier 21606 | CCT 21608 | Identifier 21610 | 1..20 21612 | | |

Fig. 217

| GDT | | Cat. | Obj. Class | Prop. | Rep./ Assn. | Type | Type Name | Lgth. | Card. | Remarks |
|---|---|---|---|---|---|---|---|---|---|---|
| Quantity 21700 | | | | | Quantity 21702 | xsd 21704 | Decimal 21706 | 13.6 21708 | | |
| | unit Code 21710 | Attribute 21712 | Quantity 21714 | Unit 21716 | Code 21718 | xsd 21720 | token 21722 | 1..3 21724 | 1 21726 | |

Fig. 218

| GDT | Cat. | Obj. Class | Prop. | Rep./ Assn. | Type | Type Name | Lgth. | Card. | Remarks |
|---|---|---|---|---|---|---|---|---|---|
| Quantity Discrep-ancy Code 21800 | | Quantity 21802 | Discrepancy 21804 | Code 21806 | CCT 21808 | Code 21810 | 1.4 21812 | | Restricted 21814 |

Fig. 219

| CDT | | | Cat. | Obj. Class Qual. | Obj. Class | Prop. Qual. | Prop. | Rep./ Assn Qual. | Rep./ Assn. | Type | Type Name | Lgth. | Card. | Remarks |
|---|---|---|---|---|---|---|---|---|---|---|---|---|---|---|
| Quantity-Time Series 21900 | | | | Quan-tity 21902 | Time Series 21904 | | | | Details 21906 | GDT 21908 | Time Series 21910 | | | Restricted 21912 |
| | Item 21914 | | Element 21916 | | Time Series 21918 | | Item 21920 | | Details 21922 | | | | 1..n 21924 | |
| | | Validity Period 21926 | Element 21928 | | Time Series 21930 | | Validity Period 21932 | | Details 21934 | GDT 21936 | Date Time Period 21938 | | 1 21940 | |
| | | Quantity 21942 | Element 21944 | | Time Series 21946 | | Quantity 21948 | | Quanti-ty 21950 | GDT 21952 | Quantity 21954 | | 1 21956 | |
| | | Fixed-Indicator 21958 | Element 21960 | | Time Series 21962 | | Fixed Indicator 21964 | | Indica-tor 21966 | GDT 21968 | Fixed Indicator 21970 | | 0..1 21972 | |

Fig. 220

| GDT | | Cat. | Obj. Class | Prop. | Rep./ Assn. | Type | Type Name | Lgth. | Card. | Remarks |
|---|---|---|---|---|---|---|---|---|---|---|
| Quantity Toler- ance 22000 | | | Quantity Tolerance 22002 | Details 22004 | Details 22006 | | | | | |
| | Over Percent 22008 | Element 22010 | Quantity Tolerance 22012 | Over 22014 | Percent 22016 | GDT 22018 | GDT: Percent 22020 | | 0..1 22022 | |
| | Over Percent Unlimited- Indicator 22024 | Element 22026 | Quantity Tolerance 22028 | Over Percen Unlimited 22030 | Indicator 22032 | GDT 22034 | GDT: Value Unlimited Indicator 22036 | | 0..1 22038 | |
| | Under Percent 22040 | Element 22042 | Quantity Tolerance 22044 | Under 22046 | Percent 22048 | GDT 22050 | GDT: Percent 22052 | | 0..1 22054 | |

Fig. 221

| GDT | | Cat. | Obj. Class | Prop. | Rep./ Assn. | Type | Type Name | Lgth. | Card. | Remarks |
|---|---|---|---|---|---|---|---|---|---|---|
| Recurrence 22100 | | | Recurrence 22102 | | Details 22104 | | | | | |
| | Duration 22106 | | Recurrence 22108 | Duration 22110 | Duration 22112 | GDT 22114 | Duration 22116 | | 1 22118 | |
| | Value 22120 | | Recurrence 22122 | Value 22124 | Value 22126 | GDT 22128 | Integer Value 22130 | 1..3 22132 | 1 22134 | |

Fig. 222

| GDT | | Cat. | Obj. Class | Prop. Term | Rep./ Assn. | Type | Type Name | Lgth. | Card. | Remarks |
|---|---|---|---|---|---|---|---|---|---|---|
| Region Code 22200 | | | Region 22202 | Identifica-tion 22204 | Code 22206 | CCT 22208 | Code 22210 | | | |
| | listID 22212 | Attribute 22214 | Code List 22216 | Identifica-tion 22218 | Identifier 22220 | xsd 22222 | token 22224 | 1..60 22226 | 0..1 22228 | |
| | list Version ID 22230 | Attribute 22232 | Code List 22234 | Version 22236 | Identifier 22238 | xsd 22240 | token 22242 | 1..15 22244 | 0..1 22246 | |
| | list Agency ID 22248 | Attribute 22250 | Code List Agency 22252 | Identifica-tion 22254 | Identifier 22256 | xsd 22258 | token 22260 | 1..60 22262 | 0..1 22264 | |
| | list Agency SchemeID 22266 | Attribute 22268 | Code List Agency 22270 | Scheme 22272 | Identifier 22274 | xsd 22276 | token 22278 | 1..60 22280 | 0..1 22282 | |
| | list Agency Scheme AgencyID 22284 | Attribute 22286 | Code List Agency 22288 | Scheme Agency 22290 | Identifier 22292 | xsd 22294 | token 22296 | 3 22298 | 0..1 22201 | |

Fig. 223

| GDT | Cat. | Obj. Class | Prop. | Rep./Assn. | Type | Type Name | Lgth. | Card. | Remarks |
|---|---|---|---|---|---|---|---|---|---|
| RequiredIndicator 22300 | | | Required 22302 | Indicator 22304 | CCT 22306 | Indicator 22308 | | | |

Fig. 224a

| CDT | | | | Cat. | Obj. Class Qual. | Obj. Class | Prop. Qual. | Prop. | Rep./ Assn Qual. | Rep./ Assn. | Type | Type Name | Lgth. | Card. | Remarks |
|---|---|---|---|---|---|---|---|---|---|---|---|---|---|---|---|
| Revision Quantity -Time Series 22400 | | | | | Revision Quantity 22402 | Time Series 22404 | | | | Details 22406 | GDT 22408 | Time Series 22410 | | | Restricted 22412 |
| | Item 22414 | | | Element 22416 | | Time Series 22418 | | Item 22420 | | Details 22422 | | | | 1..n 22424 | |
| | | Validity Period 22426 | | Element 22428 | | Time Series 22430 | | Validity Period 22432 | | Details 22434 | GDT 22436 | Date Time Period 22438 | | 1 22440 | |
| | | | Start Date Time 22442 | Element 22444 | | Time Series 22446 | | Validity Period Start 22448 | | Date Time 22450 | GDT 22452 | Date Time 22454 | | 1 22456 | |
| | | | End Date Time 22458 | Element 22460 | | Time Series 22462 | | Validity Period End 22464 | | Date Time 22466 | GDT 22468 | Date Time 22470 | | 1 22472 | |
| | | Quantity 22474 | | Element 22476 | | Time Series 22478 | | Quantity 22480 | | Quantity 22482 | GDT 22484 | Quantity 22486 | | 1 22488 | |

Fig. 224b

| CDT | | | | Cat. | Obj. Class Qual. | Obj. Class | Prop. Qual. | Prop. | Rep./ Assn. Qual. | Rep./ Assn. | Type | Type Name | Lgth. | Card. | Remarks |
|---|---|---|---|---|---|---|---|---|---|---|---|---|---|---|---|
| | | Fixed-Indicator 22490 | | Element 22492 | | Time Series 22494 | | Fixed Indicator 22496 | | Indicator 22498 | GDT 22401 | Fixed Indicator 22403 | | 0..1 22405 | |
| | | Adjustment-Reason Code 22407 | | Element 22409 | | Time Series 22411 | | Adjustment Reason 22413 | | Code 22415 | GDT 22417 | Adjustment Reason Code 22419 | | 0..1 22421 | |
| | | Note 22423 | | Element 22425 | | Time Series 22427 | | Note 22429 | | Note 22431 | GDT 22433 | Note 22435 | | 0..1 22437 | |

Fig. 225

| GDT | Cat. | Obj. Class | Prop. | Rep./ Assn. | Type | Type Name | Lgth. | Card. | Remarks |
|---|---|---|---|---|---|---|---|---|---|
| Scale Axis Interval Boundary Type Code 22500 | | Scale Axis 22502 | Interval Boundary Type Code 22504 | Code 22506 | CCT 22508 | Code 22510 | 1 22512 | | Restricted 22514 |

Fig. 226

| GDT | Cat. | Obj. Class | Prop. | Rep./ Assn. | Type | Type Name | Lgth. | Card. | Remarks |
|---|---|---|---|---|---|---|---|---|---|
| ScheduleLine Commitment Code 22600 | | Schedule Line 22602 | Commitment 22604 | Code 22606 | CCT 22608 | Code 22610 | 1..3 22612 | | Restricted 22614 |

Fig. 227

| GDT | Cat. | Obj. Class | Prop. | Rep./ Assn. | Type | Type Name | Lgth. | Card. | Remarks |
|---|---|---|---|---|---|---|---|---|---|
| ScoreCardID 22700 | | Score Card 22702 | Identification 22704 | Identifier 22706 | CCT 22708 | Identifier 22710 | 1..20 22712 | | Restricted 22714 |

Fig. 228

| GDT | Cat. | Obj. Class | Prop. | Rep./ Assn. | Type | Type Name | Lgth. | Card. | Remarks |
|---|---|---|---|---|---|---|---|---|---|
| SubContracting Indicator 22800 | | Sub Contracting 22802 | Indicator 22804 | Indicator 22806 | CCT 22808 | Indicator 22810 | | | |

Fig. 229

| GDT | Cat. | Obj. Class | Prop. | Rep./ Assn. | Type | Type Name | Lgth. | Card. | Remarks |
|---|---|---|---|---|---|---|---|---|---|
| SubHierarchy Definition Indicator 22900 | | | SubHierarchy Definition 22902 | Indicator 22904 | CCT 22906 | Indicator 22908 | | | |

Fig. 230

| GDT | Cat. | Obj. Class | Prop. | Rep./ Assn. | Type | Type Name | Lgth. | Card. | Remarks |
|---|---|---|---|---|---|---|---|---|---|
| Subject Area Code 23000 | | Subject Area 23002 | | Code 23004 | CCT 23006 | Code 23008 | 9 23010 | | Restricted 23012 |

Fig. 231

| GDT | | Cat. | Obj. Class | Prop. | Rep./ Assn. | Type | Type Name | Lgth. | Card. | Re-marks |
|---|---|---|---|---|---|---|---|---|---|---|
| Tax Jurisdic-tion Code 23100 | | Element 23102 | Tax Jurisdic-tion Code 23104 | Tax Jurisdic-tion Code 23106 | Code 23108 | CCT 23110 | Code 23112 | 1..15 23114 | | |
| | listID 23116 | Attribute 23118 | Code List 23120 | Identifica-tion 23122 | Identifier 23124 | xsd 23126 | token 23128 | 1..60 23130 | 0..1 23132 | Option-al 23134 |
| | list Version ID 23136 | Attribute 23138 | Code List 23140 | Version 23142 | Identifier 23144 | xsd 23146 | token 23148 | 1..15 23150 | 0..1 23152 | Option-al 23154 |
| | list Agency ID 23156 | Attribute 23158 | Code List Agency 23160 | Identifica-tion 23162 | Identifier 23164 | xsd 23166 | token 23168 | 1..60 23170 | 0..1 23172 | Option-al 23174 |
| | list Agency Scheme ID 23176 | Attribute 23178 | Code List Agency 23180 | Scheme 23182 | Identifier 23184 | xsd 23186 | token 23188 | 1..60 23190 | 0..1 23192 | Option-al 23194 |
| | list Agency Scheme Agency ID 23196 | Attribute 23198 | Code List Agency 23101 | Scheme Agency 23103 | Identifier 23105 | xsd 23107 | token 23109 | 3 23111 | 0..1 23113 | Option-al 23115 |

Fig. 232

| GDT | | Cat. | Obj. Class | Prop. | Rep./ Assn. | Type | Type Name | Lgth. | Card. | Remarks |
|---|---|---|---|---|---|---|---|---|---|---|
| Tex Searchable Indicator 23200 | | | | Text Searchable 23202 | Indicator 23204 | CCT 23206 | Indicator 23208 | | | |

Fig. 233

| GDT | | Cat. | Obj. Class | Prop. | Rep./ Assn. | Type | Type Name | Lgth. | Card. | Remarks |
|---|---|---|---|---|---|---|---|---|---|---|
| Time 23300 | | | | Time 23302 | DateTime 23304 | CCT 23306 | Time 23308 | | | |

Fig. 234

| GDT | | Cat. | Obj. Class | Prop. | Rep./ Assn. | Type | Type Name | Lgth. | Card. | Remarks |
|---|---|---|---|---|---|---|---|---|---|---|
| Time Period 23400 | | | Time Period 23402 | Details 23404 | | | | | | |
| | Start Time 23406 | Element 23408 | Time Period 23410 | Start Time 23412 | Time 23414 | GDT 23416 | Time 23418 | | 0..1 23420 | |
| | End Time 23422 | Element 23424 | Time Period 23426 | End Time 23428 | Time 23430 | GDT 23432 | Time 23434 | | 0..1 23436 | |
| | Duration 23438 | Element 23440 | Time Period 23442 | Duration 23444 | Duration 23446 | GDT 23448 | Duration 23450 | | 0..1 23452 | |

Fig. 235a

| GDT | | | Cat. | Obj. Class | Prop. | Rep./ Assn. | Type | Type Name | Lgth. | Card. | Remarks |
|---|---|---|---|---|---|---|---|---|---|---|---|
| Time-Series 23500 | | | | Time Series 23502 | | Details 23504 | | | | | |
| | Item 23506 | | Element 23508 | Time Series 23510 | Item 23512 | Details 23514 | | | | 1..n 23516 | |
| | | Validity Period 23518 | Element 23520 | Time Series 23522 | Validity Period 23524 | Details 23526 | GDT 23528 | Date Time Period 23530 | | 1 23532 | |
| | | Quantity 23534 | Element 23536 | Time Series 23538 | Quantity 23540 | Quantity 23542 | GDT 23544 | Quantity 23546 | | 0..1 23548 | |

Fig. 235b

| GDT | | | Cat. | Obj. Class | Prop. | Rep./ Assn. | Type | Type Name | Lgth. | Card. | Remarks |
|---|---|---|---|---|---|---|---|---|---|---|---|
| | | Price 23550 | Element 23552 | Time Series 23554 | Price 23556 | Price 23558 | GDT 23560 | Price 23562 | | 0..1 23564 | |
| | | Fixed-Indicator 23566 | Element 23568 | Time Series 23570 | Fixed Indicator 23572 | Indicator 23574 | GDT 23576 | Fixed Indicator 23578 | | 0..1 23580 | |
| | | Adjust-ment-Reason Code 23582 | Element 23584 | Time Series 23586 | Adjustment Reason 23588 | Code 23590 | GDT 23592 | Adjustment Reason Code 23594 | | 0..1 23594 | |
| | | Note 23596 | Element 23598 | Time Series 23501 | Note 23503 | Note 23505 | GDT 23507 | Note 23509 | | 0..1 23511 | |

Fig. 236

| GDT | Cat. | Obj. Class | Prop. | Rep./ Assn. | Type | Type Name | Lgth. | Card. | Remarks |
|---|---|---|---|---|---|---|---|---|---|
| Time Zone Difference Value 23600 | | | Time Zone Difference 23602 | Value 23604 | GDT 23606 | Decimal Value 23608 | 2.2 23610 | | Max.Value 12 Min. Value 12 23612 |

Fig. 237

| GDT | Cat. | Obj. Class | Prop. | Rep./Assn. Qual. | Rep./ Assn. | Type | Type Name | Lgth. | Card. | Remarks |
|---|---|---|---|---|---|---|---|---|---|---|
| Total Number Value 23700 | | | | Total Number 23702 | Value 23704 | xsd 23706 | nonNegative Integer 23708 | 1..9 23710 | | |

Fig. 238

| GDT | Cat. | Obj. Class | Prop. | Rep./ Assn. | Type | Type Name | Lgth. | Card. | Remarks |
|---|---|---|---|---|---|---|---|---|---|
| Transmis-sion ID 23800 | | Transmission 23802 | Identification 23804 | Identifier 23806 | CCT 23808 | Identifier 23810 | 1..40 23812 | | Restricted 23814 |

Fig. 239

| GDT | | Cat. | Obj. Class | Prop. | Rep./ Assn. | Type | Type Name | Lgth. | Card. | Remarks |
|---|---|---|---|---|---|---|---|---|---|---|
| Transport Means 23900 | | | Transport-Means 23902 | Details 23904 | Details 23906 | | | | | |
| | ID 23908 | Element 23910 | Transport-Means 23912 | Identifi-cation 23914 | Identifier 23916 | CCT 23918 | Identifier 23920 | 1..20 23922 | 0..1 23924 | Restricted 23926 |
| | Description Code 23928 | Element 23930 | Transport-Means 23932 | Descrip-tion 23934 | Code 23936 | GDT 23938 | Transport Means Descrip-tionCode 23940 | | 1 23942 | |

Fig. 240

| GDT | Cat. | Obj. Class | Prop. | Rep./ Assn. | Type | Type Name | Lgth. | Card. | Remarks |
|---|---|---|---|---|---|---|---|---|---|
| Transport Means Description Code 24000 | | Transport Means 24002 | Description 24004 | Code 24006 | CCT 24008 | Code 24010 | 1□ 4 24012 | | Restricted 24014 |

Fig. 241

| GDT | Cat. | Obj. Class | Prop. | Rep./ Assn. | Type | Type Name | Lgth. | Card. | Remarks |
|---|---|---|---|---|---|---|---|---|---|
| Transport Mode Code 24100 | | Transport Mode 24102 | Code 24104 | Code 24106 | CCT 24108 | Code 24110 | 1..2 24112 | | Restricted 24114 |

Fig. 242

| GDT | Cat. | Obj. Class | Prop. | Rep./ Assn. | Type | Type Name | Lgth. | Card. | Remarks |
|---|---|---|---|---|---|---|---|---|---|
| Transport Service Level Code 24200 | | Transport 24202 | Service Level Code 24204 | Code 24206 | CCT 24208 | Code 24210 | 1..2 24212 | | Restricted 24214 |

Fig. 243

| GDT | | Cat. | Obj. Class | Prop. | Rep./ Assn. | Type | Type Name | Lgth. | Card | Remarks |
|---|---|---|---|---|---|---|---|---|---|---|
| Transport Tracking 24300 | | | Transport Tracking 24302 | Details 24304 | Details 24306 | | | | | |
| | ID 24308 | Element 24310 | Transport Tracking 24312 | Identifi-cation 24314 | Identifier 24316 | CCT 24318 | Identifier 24320 | 1..35 24322 | 1 | Restricted 24324 |
| | Web Address 24326 | Element 24328 | Transport Tracking 24330 | Web Address 24332 | Electronic Address 24334 | GDT 24336 | Web Address 24338 | | 0..1 24340 | |

Fig. 244

| GDT | | Cat. | Obj. Class | Prop. | Rep./Assn. Qual. | Rep./ Assn. | Type | Type Name | Lgth. | Card. | Remarks |
|---|---|---|---|---|---|---|---|---|---|---|---|
| Tuple Lgth. Value 24400 | | | | | Tuple Lgth. 24402 | Value 24404 | xsd 24406 | nonNegative Integer 24408 | 1..2 24410 | | |

Fig. 245

| GDT | Cat. | Obj. Class | Prop. | Rep./ Assn. | Type | Type Name | Lgth. | Card. | Remarks |
|---|---|---|---|---|---|---|---|---|---|
| Unplanned Item Permission Code 24500 | | Unplanned Item 24502 | Permission Code 24504 | Code 24506 | CCT 24508 | Code 24510 | 2 24512 | | Restricted 24514 |

Fig. 246

| GDT | Cat. | Obj. Class | Prop. | Rep./ Assn. | Type | Type Name | Lgth. | Card. | Remarks |
|---|---|---|---|---|---|---|---|---|---|
| Value Difference Indicator 24600 | | | Value Difference 24602 | Indicator 24604 | CCT 24606 | Indicator 24608 | | | |

Fig. 247

| GDT | Cat. | Obj. Class | Prop. | Rep./ Assn. | Type | Type Name | Lgth. | Card. | Remarks |
|---|---|---|---|---|---|---|---|---|---|
| Value Unlimited Indicator 24700 | | Value 24702 | Unlimited Indicator 24704 | Indicator 24706 | CCT 24708 | Indicator 24710 | | | |

Fig. 248

| GDT | Cat. | Obj. Class | Prop. | Rep./ Assn. | Type | Type Name | Lgth. | Card. | Remarks |
|---|---|---|---|---|---|---|---|---|---|
| VersionID 24800 | Element 24802 | Version 24804 | Identifica-tion 24806 | Identifier 24808 | CCT 24810 | Identifier 24812 | 1..32 24814 | | Restricted 24816 |

Fig. 249

| GDT | Cat. | Obj. Class | Prop. | Rep./ Assn. | Type | Type Name | Lgth. | Card. | Remarks |
|---|---|---|---|---|---|---|---|---|---|
| Visible Indicator 24900 | | | Visible 24902 | Indicator 24904 | CCT 24906 | Indicator 24908 | | | |

Fig. 250

| GDT | | Cat. | Obj. Class | Prop. | Rep./ Assn. | Type | TypeName | Lgth. | Card. | Remarks |
|---|---|---|---|---|---|---|---|---|---|---|
| Web Address | | | Web Address 25002 | Address 25004 | Electronic Address 25006 | CCT 25008 | Electronic Address 25010 | 1.255 25012 | | Restricted 25014 |
| | language Code 25016 | Attribut 25018 | Web Address 25020 | Language Code 25022 | Code 25024 | xsd 25026 | Language 25028 | 2..9 25030 | 0..1 25032 | |

Fig. 251

| GDT | | Cat. | Obj. Class | Prop. | Rep./ Assn. | Type | Type Name | Lgth. | Card. | Remarks |
|---|---|---|---|---|---|---|---|---|---|---|
| Work Agreement ID 25100 | | | Work Agreement 25102 | Identification 25104 | Identifier 25106 | GDT 25108 | Identifier 25110 | 1..40 25112 | | Restricted 25114 |
| | Scheme ID 25116 | Attribute 25118 | Identification Scheme 25120 | Identification 25122 | Identifier 25124 | xsd 25126 | token 25128 | 1..60 25130 | 0..1 25132 | |
| | Scheme Agency ID 25134 | Attribute 25136 | Identification Scheme Agency 25138 | Identification 25140 | Identifier 25142 | xsd 25144 | token 25146 | 1..60 25148 | 0..1 25150 | |

FIG. 280A

| Package 28000 | L. 1 28002 | L. 2 28004 | L. 3 28006 | L. 4 28008 | L. 5 28010 | Card. 28012 | Type 28014 | Name 28016 |
|---|---|---|---|---|---|---|---|---|
| Invoice Message 28018 | Invoice Message 28020 | | | | | | MDT 28022 | InvoiceMessage 28024 |
| Message Header 28026 | | Message Header 28030 | | | | 0..1 28032 | GDT 28034 | MessageHeader 28036 |
| | | | MessageID 28038 | | | 1 28040 | GDT 28042 | MessageID 28044 |
| | | | Reference MessageID 28046 | | | 0..1 28048 | GDT 28050 | MessageID 28052 |
| | | | Creation DateTime 28054 | | | 1 28056 | GDT 28058 | DateTime 28060 |
| | | | Sender Party 28062 | | | 0..1 28064 | GDT 28066 | BusinessDocument MessageHeaderParty 28068 |
| | | | Recipient Party 28070 | | | 0..1 28072 | GDT 28074 | BusinessDocument MessageHeaderParty 28076 |

FIG. 280B

| InvoiceMessage 28018 | | | | | |
|---|---|---|---|---|---|
| Invoice 28028 | Invoice 28078 | | 1 28079 | GDT 28080 | Invoice 28081 |
| | | ID 28082 | 1 28084 | GDT 28086 | BusinessTransactionDocumentID 28088 |
| | | BillToID 28090 | 0..1 28092 | GDT 28094 | BusinessTransactionDocumentID 28096 |
| | | TypeCode 28098 | 1 28000A | GDT 28002A | BusinessTransactionDocumentTypeCode 28004A |
| | | DateTime 28006A | 1 28008A | GDT 28010A | DateTime 28012A |
| | | Cancellation InvoiceIndicator 28014A | 0..1 28016A | GDT 28018A | InvoiceCancellationInvoiceIndicator 28020A |
| | | Acceptance StatusCode 28022A | 0..1 28024A | GDT 28026A | AcceptanceStatusCode 28028A |
| | | Note 28030A | 0..1 28032A | GDT 28034A | Note 28036A |

FIG. 280C

| | | | | | |
|---|---|---|---|---|---|
| InvoiceMessage | | 28018 | | | |
| Invoice | | 28028 | | | |
| Party 28038A | BillToParty 28056A | 1 28058A | GDT 28060A | BusinessTransactionDocumentParty 28062A | |
| | BillFromParty 28064A | 1 28066A | GDT 28068A | BusinessTransactionDocumentParty 28070A | |
| | BuyerParty 28072A | 0..1 28074A | GDT 28076A | BusinessTransactionDocumentParty 28078A | |
| | SellerParty 28080A | 0..1 28082A | GDT 28084A | BusinessTransactionDocumentParty 28086A | |
| | ProductRecipient Party 28088A | 0..1 28090A | GDT 28092A | BusinessTransactionDocumentParty 28094A | |
| | VendorParty 28096A | 0..1 28098A | GDT 28000B | BusinessTransactionDocumentParty 28002B | |
| | ManufacturerParty 28004B | 0..1 28006B | GDT 28008B | BusinessTransactionDocumentParty 28010B | |
| | PayerParty 28012B | 0..1 28014B | GDT 28016B | BusinessTransactionDocumentParty 28018B | |
| | PayeeParty 28020B | 0..1 28022B | GDT 28024B | BusinessTransactionDocumentParty 28026B | |
| | CarrierParty 28028B | 0..1 28030B | GDT 28032B | BusinessTransactionDocumentParty 28034B | |

FIG. 280D

| | | | | | | | | |
|---|---|---|---|---|---|---|---|---|
| InvoiceMessage | | | | | | | | |
| 28018 | | | | | | | | |
| Invoice 28028 | | | | | | | | |
| Location 28040A | | ShipToLocation 28036B | | | 0..1 28038B | GDT 28040B | BusinessTransactionDocumentLocation 28042B |
| | | ShipFrom Location 28044B | | | 0..1 28046B | GDT 28048B | BusinessTransactionDocumentLocation 28050B |
| Delivery Information 28042A | | DeliveryTerms 28052B | | | 0..1 28054B | GDT 28056B | DeliveryTerms 28058B |
| Payment Information 28044A | | CashDiscount Terms 28060B | | | 0..1 28062B | GDT 28064B | CashDiscountTerms 28066B |
| | | PaymentForm 28068B | | | 0..1 28070B | GDT 28071B | PaymentForm 28072B |
| Price Information 28046A | | Price 28088B | | | 1 28090B | | |
| | | | GrossAmount 28092B | | 1 28094B | GDT 28096B | Amount 28098B |

FIG. 280E

| | | | | | | |
|---|---|---|---|---|---|---|
| InvoiceMessage 28018 | | | | | | |
| Invoice 28028 | | | | | | |
| Price Information 28046A | | NetAmount 28000C | 1 28002C | GDT 28004C | Amount 28006C |
| | | TaxAmount 28008C | 0..1 28010C | GDT 28012C | Amount 28014C |
| | | ExchangeRate 28016C | 0...1 28018C | GDT 28020C | ExchangeRate 28022C |
| Tax 28048A | ProductTax 28024C | | 0..n 28026C | GDT 28028C | ProductTax 28030C |
| Attachment 28050A | Attachment 28032C | | 0..n 28034C | GDT 28036C | Attachment 28038C |
| Description 28052A | Description 28040C | | 0..1 28042C | GDT 28044C | Description 28046C |
| | Confirmed Description 28048C | | 0..1 28050C | GDT 28052C | Description 28054C |
| Item 28054A | Item 28056C | | 1..n 28057C | GDT 28058C | InvoiceItem 28059C |
| | | ID 28060C | 1 28062C | GDT 28064C | BusinessTransaction DocumentItemID 28066C |

FIG. 280F

| | | | | | |
|---|---|---|---|---|---|
| InvoiceMessage 28018 | | | | | |
| Invoice 28028 | | | | | |
| Item 28054A | BillToID 28068C | | 0..1 28070C | GDT 28072C | BusinessTransaction DocumentItemPartyID 28074C |
| | TypeCode 28076C | | 1 28078C | GDT 28080C | BusinessTransaction DocumentItemTypeCode 28082C |
| | Quantity 28084C | | 0..1 28086C | GDT 28088C | Quantity 28090C |
| | Hierarchy Relationship 28092C | | 0..1 28094C | | |
| | | ParentItemID 28096C | 1 28098C | GDT 28000D | BusinessTransaction DocumentItemID 28002D |
| | | TypeCode 28004D | 1 28006D | CDT 28008D | ItemHierarchyRelationship TypeCode 28010D |
| | Delivery Period 28012D | | 0..1 28014D | GDT 28016D | DateTimePeriod 28018D |
| Product Information 28020D | Product 28038D | | 0..1 28040D | GDT 28042D | Product 28044D |

FIG. 280G

| | | | | | |
|---|---|---|---|---|---|
| InvoiceMessage | 28018 | | | | |
| Invoice | 28028 | | | | |
| Item | 28054A | | | | |
| Product Information 28020D | Product Category 28046D | | 0..1 28048D | GDT 28050D | ProductCategory 28052D |
| Price Information 28022D | Price 28054D | | 0..1 28056D | | |
| | | GrossAmount 28058D | 0..1 28060D | GDT 28062D | Amount 28064D |
| | | NetAmount 28066D | 1 28068D | GDT 28070D | Amount 28072D |
| | | TaxAmount 28074D | 0..1 28076D | GDT 28078D | Amount 28080D |
| | | NetUnitPrice 28082D | 0..1 28084D | GDT 28086D | Price 28088D |
| | | Component 28006E | 0..n 28008E | | |

FIG. 280H

InvoiceMessage 28018

Invoice 28028

Item 28054A

| | | | | |
|---|---|---|---|---|
| Tax 28024D | ProductTax 28014E | 0..n 28016E | GDT 28018E | ProductTax 28020E |
| Party 28026D | BuyerParty 28022E | 0..1 28024E | GDT 28026E | BusinessTransactionDocument Party 28028E |
| | SellerParty 28030E | 0..1 28032E | GDT 28034E | BusinessTransactionDocument Party 28036E |
| | ProductRecipientParty 28038E | 0..1 28040E | GDT 28042E | BusinessTransactionDocument Party 28044E |
| | VendorParty 28046E | 0..1 28048E | GDT 28050E | BusinessTransactionDocument Party 28052E |
| | ManufacturerParty 28054E | 0..1 28056E | GDT 28058E | BusinessTransactionDocument Party 28060E |
| | CarrierParty 28062E | 0..1 28064E | GDT 28066E | BusinessTransactionDocument Party 28068E |

FIG. 280I

| | | | | |
|---|---|---|---|---|
| InvoiceMessage 28018 | | | | |
| Invoice 28028 | | | | |
| Item 28054A | | | | |
| Location 28028D | ShipToLocation 28070E | 0..1 28072E | GDT 28074E | BusinessTransactionDocumentLocation 28076E |
| | ShipFromLocation 28078E | 0..1 28080E | GDT 28082E | BusinessTransactionDocumentLocation 28084E |
| Delivery Information 28030D | DeliveryTerms 28086E | 0..1 28088E | GDT 28090E | DeliveryTerms 28092E |
| Business Trans-action Document Reference 28032D | PurchaseOrder Reference 28094E | 0..n 28096E | GDT 28098E | BusinessTransactionDocumentReference 28000F |
| | SalesOrder Reference 28002F | 0..n 28004F | GDT 28006F | BusinessTransactionDocumentReference 28008F |
| | DeliveryReference 28010F | 0..1 28012F | GDT 28014F | BusinessTransactionDocumentReference 28016F |
| | Service Acknowledgement Reference 28018F | 0..1 28020F | GDT 28022F | BusinessTransactionDocumentReference 28024F |

FIG. 280J

| | | | | |
|---|---|---|---|---|
| InvoiceMessage 28018 | | | | |
| Invoice 28028 | | | | |
| Item 28054A | | | | |
| Business Transaction Document Reference 28032D | OriginInvoice Reference 28026F | 0..1 28028F | GDT 28030F | BusinessTransactionDocumentReference 28032F |
| | PurchaseContract Reference 28034F | 0..1 28036F | GDT 28038F | BusinessTransactionDocumentReference 28040F |
| | SalesContract Reference 28042F | 0..1 28044F | GDT 28046F | BusinessTransactionDocumentReference 28048F |
| | BuyerProduct Catalogue Reference 28050F | 0..1 28052F | GDT 28054F | CatalogueReference 28056F |
| | SellerProduct CatalogReference 28058F | 0..1 28060F | GDT 28062F | CatalogueReference 28064F |
| Attachment 28034D | Attachment 28066F | 0..n 28068F | GDT 28070F | Attachment 28072F |
| Description 28036D | Description 28074F | 0..1 28076F | GDT 28078F | Description 28080F |

Fig. 290A

| Package 29000 | L1 29002 | L2 29004 | L3 29006 | L4 29008 | L5 29010 | Occ. 29012 | Datatype name 29014 |
|---|---|---|---|---|---|---|---|
| Purchase Requirement Message 29016 | Purchase Requirement Message 29018 | | | | | | MDT: PurchaseRequirement Message 29020 |
| Purchase Requirement 29022 | | Purchase Requirement 29024 | | | | 1 29026 | PurchaseRequirement 29028 |
| | | | ID 29030 | | | 1 29032 | BusinessTransactionDocumentID 29034 |
| | | | Creation-Date Time 29036 | | | 1 29038 | DateTime 29040 |
| | | | Note 29042 | | | 0..1 29044 | Note 29046 |
| Party 29048 | | | BuyerParty 29054 | | | 0..1 29056 | BusinessTransactionDocumentParty 29058 |
| | | | | Stan-dardID 29060 | | 0..n 29062 | PartyStandardID 29064 |

Fig. 290B

| | | | | | | |
|---|---|---|---|---|---|---|
| Purchase Requirement Message 29016 | | | | | | |
| Purchase Requirement 29022 | | | | | | |
| Party 29048 | | InternalID 29066 | | 0..1 29068 | PartyInternalID 29070 |
| | | Address 29072 | | 0..1 29074 | Address 29076 |
| | | ContactPerson 29078 | | 0..1 29080 | ContactPerson 29082 |
| | | | InternalID 29084 | 0..n 29086 | ContactPersonInternalID 29088 |
| | | | Address 29090 | 0..1 29092 | Address 29094 |
| | SellerParty 29096 | | | 0..1 29098 | BusinessTransactionDocumentParty 29000A |
| | ProposedSeller Party 29002A | | | 0..1 29004A | BusinessTransactionDocumentParty 29006A |
| | RequestorParty 29008A | | | 0..1 29010A | BusinessTransactionDocumentParty 29012A |
| | Product RecipientParty 29014A | | | 0..1 29016A | BusinessTransactionDocumentParty 29018A |

Fig. 290C

| | | | | |
|---|---|---|---|---|
| Purchase Requirement Message 29016 | | | | |
| Purchase Requirement 29022 | | | | |
| Party 29048 | ManufacturerParty 29020A | | 0..1 29022A | BusinessTransactionDocumentParty 29024A |
| Location 29050 | ShipToLocation 29026A | | 0..1 29028A | BusinessTransactionDocumentLocation 29030A |
| | | StandardID 29032A | 0..1 29034A | LocationStandardID 29036A |
| | | InternalID 29038A | 0..1 29040A | LocationStandardID 29042A |
| | | Address 29044A | 0..1 29046A | Address 29048A |
| | ShipFromLocation 29050A | | 0..1 29052A | BusinessTransactionDocumentLocation 29054A |
| Item 29052 | Item 29056A | | 1..n 29058A | PurchaseRequirementItem 29060A |
| | | ID 29062A | 1 29064A | BusinessTransactionDocumentItemID 29066A |
| | | ThirdPartyDeal Indicator 29068A | 0..1 29070A | BusinessTransactionDocumentItem ThirdPartyDealIndicator 29072A |
| | | DirectMaterial Indicator 29074A | 0..1 29076A | DirectMaterialIndicator 29078A |

Fig. 290D

| | | | | |
|---|---|---|---|---|
| Purchase Requirement Message 29016 | | | | |
| Purchase Requirement 29022 | | | | |
| Item 29052 | HierarchyRelationship 29080A | | 0..1 29082A | |
| | | ParentItemID 29084A | 1 29086A | BusinessTransactionDocumentItemID 29088A |
| | | TypeCode 29090A | 1 29092A | BusinessTransactionDocumentItem HierarchyRelationshipTypeCode 29094A |
| Product 29096A | Product 29012B | | 0..1 29014B | BusinessTransactionDocumentProduct 29016B |
| | | StandardID 29018B | 0..n 29020B | ProductStandardID 29022B |
| | | InternalID 29024B | 0..1 29026B | ProductInternalID 29028B |
| | | TypeCode 29030B | 0..1 29032B | ProductTypeCode 29034B |
| | | Note 29036B | 0..1 29038B | Note 29040B |
| | ProductCategory 29042B | | 0..1 29044B | BusinessTransactionDocumentProduct Category 29046B |

Fig. 290E

| | | | | |
|---|---|---|---|---|
| Purchase Requirement Message 29016 | | | | |
| Purchase Requirement 29022 | | | | |
| Item 29052 | | | | |
| Product 29096A | | StandardID 29048B | 0..n 29050B | ProductCategoryStandardID 29052B |
| | | InternalID 29054B | 0..n 29056B | ProductCategoryInternalID 29058B |
| Price 29098A | Price 29060B | | 0..1 29062B | |
| | | NetUnitPrice 29064B | 0..1 29066B | Price 29068B |
| | ProcurementCostUpper Limit 29070B | | 0..1 29072B | ProcurementCostUpperLimit 29074B |
| Party 29000B | BuyerParty 29076B | | 0..1 29078B | BusinessTransactionDocumentParty 29080B |
| | SellerParty 29082B | | 0..1 29084B | BusinessTransactionDocumentParty 29086B |
| | ProposedSellerParty 29088B | | 0..1 29090B | BusinessTransactionDocumentParty 29092B |
| | RequestorParty 29094B | | 0..1 29096B | BusinessTransactionDocumentParty 29098B |

Fig. 290F

Purchase Requirement Message 29016

Purchase Requirement 29022

Item 29052

| | | | |
|---|---|---|---|
| Party 29000B | ProductRecipientParty 29000C | 0..1 29002C | BusinessTransactionDocumentParty 29004C |
| | ManufacturerParty 29006C | 0..1 29008C | BusinessTransactionDocumentParty 29010C |
| Location 29002B | ShipFromLocation 29012C | 0..1 29014C | BusinessTransactionDocumentLocation 29016C |
| | ShipToLocation 29018C | 0..1 29020C | BusinessTransactionDocumentLocation 29022C |
| BusinessTransaction DocumentReference 29004B | PurchaseContract Reference 29024C | 0..1 29026C | BusinessTransactionDocument Reference 29028C |
| | OriginPurchaseOrder Reference 29030C | 0..1 29032C | BusinessTransactionDocument Reference 29034C |
| Attachment 29006B | AttachmentWebAddress 29036C | 0..1 29038C | AttachmentWebAddress 29040C |
| Description 29008B | Description 29042C | 0..1 29044C | Description 29046C |
| | InternalDescription 29048C | 0..1 29050C | Description 29052C |

Fig. 290G

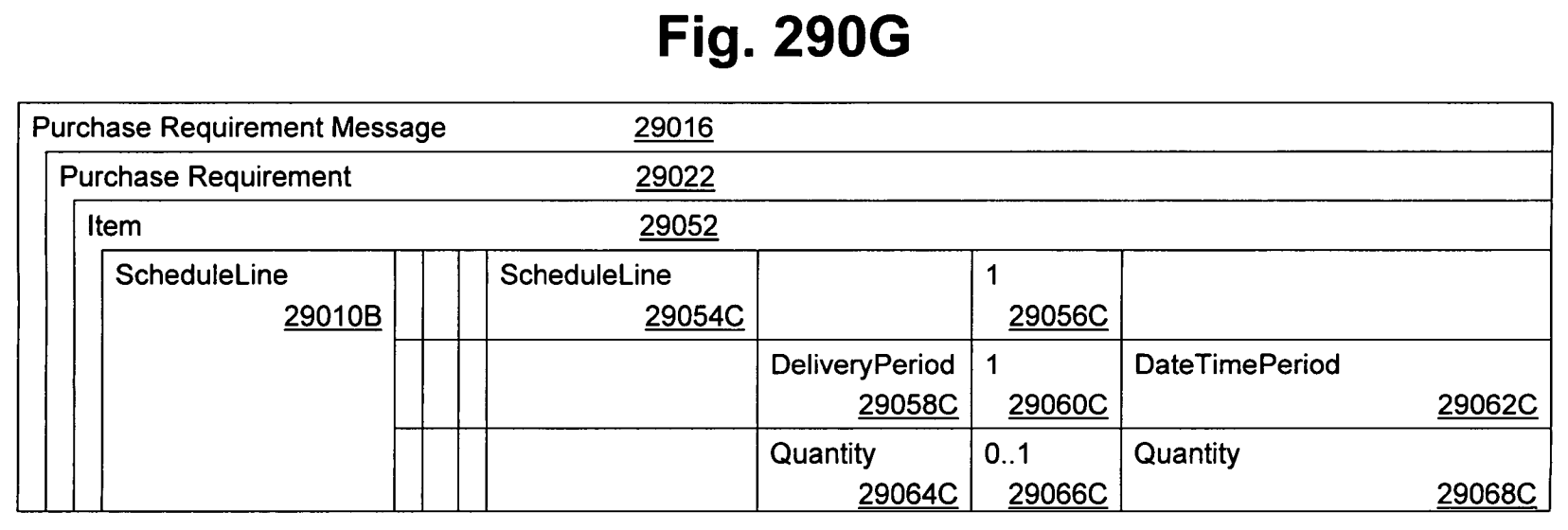

| | | | | |
|---|---|---|---|---|
| Purchase Requirement Message 29016 | | | | |
| Purchase Requirement 29022 | | | | |
| Item 29052 | | | | |
| ScheduleLine 29010B | ScheduleLine 29054C | | 1 29056C | |
| | | DeliveryPeriod 29058C | 1 29060C | DateTimePeriod 29062C |
| | | Quantity 29064C | 0..1 29066C | Quantity 29068C |

Fig. 293A

| Package 29300 | L1 29302 | L2 29304 | L3 29306 | L4 29308 | L5 29310 | L6 29312 | Occ. 29314 | SAP GDT 29316 |
|---|---|---|---|---|---|---|---|---|
| SourceOf Supply Message 29318 | Source Of Supply Message 29320 | | | | | | | MDT: SourceOfSupplyMessage 29322 |
| SourceOf Supply 29324 | | Source Of Supply 29326 | | | | | 1..n 29328 | GDT: SourceOfSupply 29330 |
| | | | Active Indicator 29332 | | | | 1 29334 | GDT: ActiveIndicator 29336 |
| | | | Deleted Indicator 29338 | | | | 1 29340 | GDT: Deleted Indicator 29342 |
| | | | Sourcing PriorityCode 29344 | | | | 0..1 29346 | GDT: BusinessTransaction PriorityCode 29348 |
| | | | ValidityPeriod 29350 | | | | 1 29352 | GDT: DateTimePeriod 29354 |
| | | | Target Quantity 29356 | | | | 0..1 29358 | GDT: Quantity 29360 |

Fig. 293B

SourceOf Supply Message 29318

| | | | |
|---|---|---|---|
| SourceOfSupply 29324 | TargetAmount 29362 | 0..1 29364 | GDT: Amount 29366 |
| | GoodsReceiptProcessing Duration 29368 | 0..1 29370 | GDT: Duration 29372 |
| | PlannedDeliveryDuration 29374 | 0..1 29376 | GDT: Duration 29378 |
| BusinessTransaction DocumentReference 29380 | PurchaseContractReference 29390 | 0..1 29392 | GDT: BusinessTransaction DocumentReference 29394 |
| | SchedulingAgreementReference 29396 | 0..1 29398 | GDT: BusinessTransaction DocumentReference 29300A |
| Party 29382 | BuyerParty 29302A | 0..1 29304A | GDT: BusinessTransaction DocumentParty 29306A |
| | SellerParty 29308A | 0..1 29310A | GDT: BusinessTransaction DocumentParty 29312A |
| Location 29384 | ShipToLocation 29314A | 0..n 29316A | GDT: BusinessTransaction DocumentLocation 29318A |

Fig. 293C

| | | | | | |
|---|---|---|---|---|---|
| Source Of Supply Message 29318 | | | | | |
| Source Of Supply 29324 | | | | | |
| Location 29384 | ShipFrom Location 29320A | | 0..n 29322A | GDT: BusinessTransaction DocumentLocation 29324A |
| Product Information 29386 | Product 29326A | | 0..1 29328A | GDT: BusinessTransaction DocumentProduct 29330A |
| | Product Category 29332A | | 0..1 29334A | GDT: ProductCategory 29336A |
| Price Information 29388 | Price 29338A | | 0..n 29340A | |
| | | ShipToLocation 29342A | 0..1 29344A | GDT: BusinessTransaction DocumentLocation 29346A |
| | | ValidityPeriod 29348A | 1 29350A | GDT: DateTimePeriod 29352A |
| | | FixedCosts Amount 29354A | 0..1 29356A | GDT: Amount 29358A |
| | | NetUnitPrice 29360A | 0..1 29362A | GDT: Price 29364A |

Fig.293D

| | | | | |
|---|---|---|---|---|
| Source Of Supply Message 29318 | | | | |
| Source Of Supply 29324 | | | | |
| Price Information 29388 | Scale 29366A | | 0..1 29368A | |
| | AxisInterval Boundary Type Code 29370A | | 1 29372A | GDT: ScaleAxisInterval BoundaryTypeCode 29374A |
| | Line 29376A | | 1..n 29378A | |
| | | Quantity 29380A | 1 29382A | GDT: Quantity 29384A |
| | | NetUnitPrice 29386A | 1 29388A | GDT: Price 29390A |

Fig. 297A

| Package 29700 | L1 29702 | L2 29704 | L3 29706 | L4 29708 | L5 29710 | L6 29712 | L7 29714 | Oc. 29716 | Type 29718 | Name 29720 |
|---|---|---|---|---|---|---|---|---|---|---|
| Purchase Order Message 29722 | Purchase Order Message 29724 | | | | | | | | MDT 29726 | Purchase Order Message 29728 |
| Message Header 29730 | | Message Header 29734 | | | | | | 1 29736 | AGDT 29738 | Business Document Message Header 29740 |
| | | | MessageID 29742 | | | | | 1 29744 | GDT 29746 | Business Document MessageID 29748 |
| | | | Reference ID 29750 | | | | | 0..1 29752 | GDT 29754 | Business Document MessageID 29756 |
| | | | Creation DateTime 29758 | | | | | 1 29760 | GDT 29762 | DateTime 29764 |

Fig. 297B

| PurchaseOrderMessage 29722 | | | | | | | | | | |
|---|---|---|---|---|---|---|---|---|---|---|
| Message Header 29730 | | | Sender Party 29766 | | | | | 0..1 29768 | AGDT 29770 | BusinessDocument MessageHeaderParty 29772 |
| | | | | InternalID 29774 | | | | 0..1 29776 | CDT 29778 | PartyInternalID 29780 |
| | | | | StandardID 29782 | | | | 0..n 29784 | CDT 29786 | PartyStandardID 29788 |
| | | | | Contact Person 29790 | | | | 0..1 29792 | CDT 29794 | ContactPerson 29796 |
| | | | | | BuyerID 29798 | | | 0..1 29700A | CDT 29702A | ContactPersonPartyID 29704A |
| | | | | | SellerID 29706A | | | 0..1 29708A | CDT 29710A | ContactPersonPartyID 29712A |
| | | | | | Address 29714A | | | 0..1 29716A | AGDT 29718A | Address 29720A |
| | | | Recipient Party 29722A | | | | | 0..n 29724A | AGDT 29726A | BusinessDocument MessageHeaderParty 29728A |
| Purchase Order 29732 | | Purchase Order 29730A | | | | | | 1 29732A | AGDT 29734A | PurchaseOrder 36736A |

Fig. 297C

PurchaseOrderMessage 29722

| | | | | |
|---|---|---|---|---|
| Purchase Order 29732 | ID 29738A | 1 29740A | GDT 29742A | BusinessTransaction DocumentID 29744A |
| | SellerID 29746A | 0..1 29748A | GDT 29750A | BusinessTransaction DocumentID 29752A |
| | BuyerPostingDateTime 29754A | 0..1 29756A | GDT 29758A | DateTime 29760A |
| | BuyerLastChangeDate Time 29762A | 0..1 29764A | GDT 29766A | DateTime 29768A |
| | SellerPostingDateTime 29770A | 0..1 29772A | GDT 29774A | DateTime 29776A |
| | SellerLastChangeDate Time 29778A | 0..1 29780A | GDT 29782A | DateTime 29784A |
| | AcceptanceStatusCode 29786A | 0..1 29788A | GDT 29790A | AcceptanceStatusCode 29792A |
| | Note 29794A | 0..1 29796A | GDT 29798A | Note 29700B |

Fig. 297D

PurchaseOrderMessage 29722

| | | | | | | |
|---|---|---|---|---|---|---|
| Purchase Order 29732 | ItemList Complete Transmission Indicator 29702B | | 0..1 29704B | GDT 29706B | Complete Transmission Indicator 29708B |
| Party 29710B | BuyerParty 29726B | | 0..1 29728B | AGDT 29730B | BusinessTransaction DocumentParty 29732B |
| | | StandardID 29734B | 0..n 29736B | CDT 29738B | PartyStandardID 29740B |
| | | BuyerID 29742B | 0..1 29744B | CDT 29746B | PartyPartyID 29748B |
| | | SellerID 29750B | 0..1 29752B | CDT 29754B | PartyPartyID 29756B |
| | | Address 29758B | 0..1 29760B | AGDT 29762B | Address 29764B |
| | | Contact Person 29766B | 0..1 29768B | CDT 29770B | ContactPerson 29772B |

Fig. 297E

| | | | | | |
|---|---|---|---|---|---|
| PurchaseOrderMessage 29722 | | | | | |
| PurchaseOrder 29732 | | | | | |
| Party 29710B | | BuyerID 29790B | 0..1 29792B | CDT 29794B | ContactPersonPartyID 29796B |
| | | SellerID 29798B | 0..1 29700C | CDT 29702C | ContactPersonPartyID 29704C |
| | | Address 29706C | 0..1 29708C | AGDT 29710C | Address 29712C |
| | SellerParty 29714C | | 0..1 29716C | AGDT 29720C | BusinessTransaction DocumentParty 29722C |
| | Product Recipient Party 29724C | | 0..1 29726C | AGDT 29728C | BusinessTransaction DocumentParty 29730C |
| | VendorParty 29732C | | 0..1 29734C | AGDT 29736C | BusinessTransaction DocumentParty 29738C |

Fig. 297F

| | | | | | |
|---|---|---|---|---|---|
| PurchaseOrderMessage 29722 | | | | | |
| PurchaseOrder 29732 | | | | | |
| Party 29710B | ManufacturerParty 29740C | | 0..1 29742C | AGDT 29744C | BusinessTransactionDocumentParty 29746C |
| | BillToParty 29748C | | 0..1 29750C | AGDT 29752C | BusinessTransactionDocumentParty 29754C |
| | PayerParty 29756C | | 0..1 29758C | AGDT 29760C | BusinessTransactionDocumentParty 29762C |
| | CarrierParty 29764C | | 0..1 29766C | AGDT 29768C | BusinessTransactionDocumentParty 29770C |
| Location 29712B | ShipToLocation 29772C | | 0..1 29774C | AGDT 29776C | BusinessTransactionDocumentShipToLocation 29778C |
| | | StandardID 29780C | 0..n 29782C | CDT 29784C | LocationStandardID 29786C |
| | | BuyerID 29788C | 0..1 29790C | CDT 29792C | LocationPartyID 29794C |
| | | SellerID 29796C | 0..1 29798C | CDT 29700D | LocationPartyID 29702D |

Fig. 297G

| | | | | | | |
|---|---|---|---|---|---|---|
| PurchaseOrderMessage 29722 | | | | | | |
| PurchaseOrder 29732 | | | | | | |
| Location 29712B | | Address 29704D | | 0..1 29706D | AGDT 29708D | Address 29710D |
| | ShipFrom Location 29712D | | | 0..1 29714D | AGDT 29716D | BusinessTransaction DocumentShipFrom Location 29718D |
| Delivery Information 29714B | Delivery Terms 29720D | | | 0..1 29722D | AGDT 29724D | DeliveryTerms 29726D |
| | | Delivery ItemGroup ID 29728D | | 0..1 29730D | GDT 29732D | BusinessTransaction DocumentItemGroup ID 29734D |
| | | Delivery Priority Code 29736D | | 0..1 29738D | GDT 29740D | BusinessTransaction PriorityCode 29742D |
| | | Incoterms 29744D | | 0..1 29746D | GDT 29748D | Incoterms 29750D |
| | | | Classification Code 29752D | 1 29754D | | |

Fig. 297H

| | | | | | | | | | | |
|---|---|---|---|---|---|---|---|---|---|---|
| PurchaseOrderMessage 29722 | | | | | | | | | | |
| PurchaseOrder 29732 | | | | | | | | | | |
| Delivery Information 29714B | | | | | TransferLocation Name 29756D | | | 0..1 29758D | | |
| | | | | Partial Delivery 29760D | | | | 0..1 29762D | AGDT 29764D | PartialDelivery 29766D |
| | | | | | MaximalNumber 29768D | | | 0..1 29770D | | |
| | | | | | Unlimited Indicator 29772D | | | 0..1 29774D | GDT 29776D | UnlimitedIndicator 29778D |
| | | | | Quantity Tolerance 29780D | | | | 0..1 29782D | AGDT 29784D | QuantityTolerance 29786D |
| | | | | | OverPercent 29788D | | | 0..1 29790D | GDT 29792D | Percent 29794D |
| | | | | | OverPercent Unlimited Indicator 29796D | | | 0..1 29798D | GDT 29700E | UnlimitedIndicator 29702E |

Fig. 297I

| | | | | | |
|---|---|---|---|---|---|
| PurchaseOrderMessage 29722 | | | | | |
| PurchaseOrder 29732 | | | | | |
| Delivery Information 29714B | | UnderPercent 29704E | 0..1 29706E | GDT 29708E | Percent 29710E |
| | Maximum LeadTime Duration 29712E | | 0..1 29714E | GDT 29716E | Duration 29718E |
| | Transport 29720E | | 0..1 29722E | | |
| | | ServiceLevel Code 29724E | 0..1 29726E | GDT 29728E | TransportServiceLevel Code 29730E |
| | | ModeCode 29732E | 0..1 29734E | GDT 29736E | TransportModeCode 29738E |
| | | Means DescriptionCode 29740E | 0..1 29742E | GDT 29744E | TransportMeans DescriptionCode 29746E |
| | Description 29748E | | 0..1 29750E | GDT 29752E | Description 29754E |
| | | LanguageCode 29756E | 1 29757E | | |

Fig. 297J

PurchaseOrderMessage 29722

PurchaseOrder 29732

| | | | | | | |
|---|---|---|---|---|---|---|
| Delivery Information 29714B | Cash Discount Terms 29758E | | | 0..1 29760E | AGDT 29762E | CashDiscount Terms 29764E |
| | | PaymentBase LineDate 29766E | | 0..1 29768E | GDT 29770E | Date 29772E |
| | | MaximumCash Discount 29774E | | 0..1 29776E | GDT 29778E | CashDiscount 29780E |
| | | | DaysValue 29782E | 1 29783E | | |
| | | | Percent 29784E | 1 29785E | GDT 29786E | Percent 29788E |
| | | NormalCash Discount 29790E | | 0..1 29792E | GDT 29794E | CashDiscount 29796E |
| | | | DaysValue 29798E | 1 29700F | | |

Fig. 297K

PurchaseOrderMessage 29722

PurchaseOrder 29732

| | | | | | |
|---|---|---|---|---|---|
| Delivery Information 29714B | | | Percent 29702F | 1 29704F | GDT 29706F | Percent 29708F |
| | | FullPayment DueDays Value 29710F | | 0..1 29712F | | |
| Payment Information 16B | Payment Form 29714F | | | 0..1 29716F | | |
| | | Code 29718F | | 1 29720F | GDT 29722F | PaymentFormCode 29724F |
| | | Payment Card 29726F | | 0..1 29728F | AGDT 29730F | PaymentCard 29732F |
| | | | ID 29734F | 1 29736F | GDT 29738F | PaymentCardID 29740F |
| | | | ReferenceID 29742F | 0..1 29744F | | |
| | | | SequenceID 29746F | 0..1 29748F | | |

Fig. 297L

| | | | | | | | |
|---|---|---|---|---|---|---|---|
| PurchaseOrderMessage 29722 | | | | | | | |
| PurchaseOrder 29732 | | | | | | | |
| Payment Information 16B | | | | Holder 29750F | 0..1 29752F | | |
| | | | | Expiration Date 29754F | 1 29756F | GDT 29758F | Date 29760F |
| Attachment 29718B | Attachment 29762F | | | | 0..n 29764F | GDT 29766F | Attachment 29768F |
| | | ID 29770F | | | 1 29772F | | |
| | | Filename 29774F | | | 0..1 29776F | | |
| Description 29720B | Description 29778F | | | | 0..1 29780F | GDT 29782F | Description 29784F |
| | | LanguageCode 29786F | | | 1 29788F | | |
| | Confirmation Description 29790F | | | | 0..1 29792F | GDT 29794F | Description 29796F |
| | | LanguageCode 29798F | | | 1 29700G | | |

Fig. 297M

| | | | | |
|---|---|---|---|---|
| PurchaseOrderMessage 29722 | | | | |
| PurchaseOrder 29732 | | | | |
| FollowUp Business Transaction Document 29722B | FollowUpPurchase OrderConfirmation 29702G | | 0..1 29704G | | |
| | | Requirement Code 29706G | 1 29708G | GDT 29710G | FollowUpMessage RequirementCode 29712G |
| | FollowUpDespatched DeliveryNotification 29714G | | 0..1 29716G | | |
| | | Requirement Code 29718G | 1 29720G | GDT 29722G | FollowUpMessage RequirementCode 29724G |
| | FollowUpService Acknowledgement Request 29726G | | 0..1 29728G | | |

Fig. 297N

PurchaseOrderMessage 29722

PurchaseOrder 29732

| | | | | | |
|---|---|---|---|---|---|
| FollowUp Business Transaction Document 29722B | | Requirement Code 29734G | 1 29736G | GDT 29738G | FollowUpMessage RequirementCode 29740G |
| | FollowUp Invoice Request 29742G | | 0..1 29744G | | |
| | | Requirement Code 29746G | 1 29748G | GDT 29750G | FollowUpMessage RequirementCode 29752G |
| | | Evaluated Receipt Settlement Indicator 29754G | 0..1 29756G | GDT 29758G | EvaluatedReceiptSettlement Indicator 29760G |
| Item 29724B | Item 29762G | | 0..n 29764G | AGDT 29766G | PurchaseOrderItem 29768H |
| | | ID 29770G | 0..1 29772G | GDT 29774G | BusinessTransaction DocumentItemID 29776G |
| | | SellerID 29778G | 0..1 29780G | GDT 29782G | BusinessTransaction DocumentItemID 29784G |

Fig. 297O

| | | | | |
|---|---|---|---|---|
| PurchaseOrderMessage 29722 | | | | |
| PurchaseOrder 29732 | | | | |
| Item 29724B | | | | |
| ActionCode 29786G | | 1 29788G | GDT 29790G | ActionCode 29792G |
| AcceptanceStatus Code 29794G | | 0..1 29796G | GDT 29798G | AcceptanceStatusCode 29700H |
| UnplannedItem PermissionCode 29702H | | 0..1 29704H | GDT 29706H | UnplannedItem PermissionCode 29708H |
| Hierarchy Relationship 29710H | | 0..1 29712H | | |
| | ParentItemID 29714H | 0..1 29716H | GDT 29718H | BusinessTransaction DocumentItemID 29720H |
| | ParentItem SellerID 29722H | 0..1 29724H | GDT 29726H | BusinessTransaction DocumentItemID 29728H |
| | TypeCode 29730H | 1 29732H | GDT 29734H | BusinessTransaction DocumentItemHierarchy RelationshipTypeCode 29736H |

Fig. 297P

PurchaseOrderMessage 29722

PurchaseOrder 29732

Item 29724B

| | | | | | |
|---|---|---|---|---|---|
| Product Information 29738H | Product 29750H | | 0..1 29751H | GDT 29752H | BusinessTransaction DocumentProduct 29753H |
| | | StandardID 29754H | 0..n 29755H | CDT 29756H | ProductStandardID 29757H |
| | | BuyerID 29758H | 0..1 29759H | CDT 29760H | ProductPartyID 29761H |
| | | SellerID 29762H | 0..1 29763H | CDT 29764H | ProductPartyID 29765H |
| | | ManufacturerID 29766H | 0..1 29768H | CDT 29770H | ProductPartyID 29772H |
| | | TypeCode 29774H | 0..1 29776H | GDT 29778H | ProductTypeCode 29780H |
| | | Note 29782H | 0..1 29784H | GDT 29786H | Note 29788H |
| | Product Category 29790H | | 0..1 29792H | GDT 29794H | BusinessTransaction DocumentProductCategory 29796H |
| | | StandardID 29798H | 0..n 29700I | CDT 29702I | ProductCategoryStandardID 29704I |

Fig. 297Q

PurchaseOrderMessage 29722

PurchaseOrder 29732

Item 29724B

| | | | | | | | |
|---|---|---|---|---|---|---|---|
| Product Information 29738H | | BuyerID 29706I | | | 0..1 29708I | CDT 29710I | ProductCategory PartyID 29712I |
| | | SellerID 29714I | | | 0..1 29716I | CDT 29718I | ProductCategory PartyID 29720I |
| Price Information 29740H | Price 29722I | | | | 0..1 29724I | | |
| | | NetUnitPrice 29726I | | | 0..1 29728I | AGDT 29730I | Price 29732I |
| | | | Amount 29734I | | 1 29736I | GDT 29738I | Amount 29740I |
| | | | | Currency Code 29742I | 1 | | |
| | | | Base Quantity 29744I | | 1 29746I | GDT 29748I | Quantity 29750I |

Fig. 297R

| | | | | | | | |
|---|---|---|---|---|---|---|---|
| PurchaseOrderMessage 29722 | | | | | | | |
| PurchaseOrder 29732 | | | | | | | |
| Item 29724B | | | | | | | |
| Price Information 29740H | | | | UnitCode 29752I | 1 29754I | | |
| | Confirmed Price 29756I | | | | 0..1 29758I | | |
| | | NetUnit Price 29760I | | | 0..1 29762I | AGDT 29764I | Price 29766I |
| | | | Amount 29768I | | 1 29770I | GDT 29772I | Amount 29774I |
| | | | | Currency Code .29776I | 1 29778I | | |
| | | | Base Quality 29782I | | 1 29784I | GDT 29786I | Quantity 29788I |
| | | | | UnitCode 29790I | 1 29792I | | |

Fig. 297S

| | | | | | |
|---|---|---|---|---|---|
| PurchaseOrderMessage | 29722 | | | | |
| PurchaseOrder | 29732 | | | | |
| Item | 29724D | | | | |
| Party 29736H | BuyerParty 29794I | 0..1 29796I | AGDT 29798I | BusinessTransactionDocumentParty 29700J | |
| | SellerParty 29702J | 0..1 29704J | AGDT 29706J | BusinessTransactionDocumentParty 29708J | |
| | Product RecipientParty 29710J | 0..1 29712J | AGDT 29714J | BusinessTransactionDocumentParty 29716J | |
| | VendorParty 29718J | 0..1 29720J | AGDT 29722J | BusinessTransactionDocumentParty 29724J | |
| | Manufacturer Party 29726J | 0..1 29728J | AGDT 29730J | BusinessTransactionDocumentParty 29732J | |
| | BillToParty 29734J | 0..1 29736J | AGDT 29738J | BusinessTransactionDocumentParty 29740J | |
| | PayerParty 29742J | 0..1 29744J | AGDT 29746J | BusinessTransactionDocumentParty 29748J | |
| | CarrierParty 29750J | 0..1 29752J | AGDT 29754J | BusinessTransactionDocumentParty 29756J | |

Fig. 297T

PurchaseOrderMessage 29722

PurchaseOrder 29732

Item 29724D

| | | | | | |
|---|---|---|---|---|---|
| Location 29738H | ShipTo Location 29758J | | 0..1 29760J | AGDT 29762J | BusinessTransactionDocumentShipToLocation 29764J |
| | ShipFrom Location 29766J | | 0..1 29768J | AGDT 29770J | BusinessTransactionDocumentShipFromLocation 29772J |
| Delivery Information 29740H | Delivery Terms 29774J | | 0..1 29776J | AGDT 29778J | DeliveryTerms 29780J |
| Business Transaction Document Reference 29742H | Quote Reference 29782J | | 0..1 29784J | AGDT 29786J | BusinessTransactionDocument Reference 29788J |
| | | ID 29790J | 1 29792J | GDT 29794J | BusinessTransactionDocumentID 29796J |
| | | ItemID 29798J | 0..n 29700K | GDT 29702K | BusinessTransactionDocumentItem ID 29704K |
| | Purchase Contract Reference 29706K | | 0..n 29708K | AGDT 29710K | BusinessTransactionDocument Reference 29712K |

Fig. 297U

PurchaseOrderMessage 29722

PurchaseOrder 29732

Item 29724D

| | | | | | |
|---|---|---|---|---|---|
| Business Transaction Document Reference 29742H | | ID 29714K | 1 29716K | GDT 29718K | BusinessTransactionDocumentID 29720K |
| | | ItemID 29722K | 0..n 29724K | GDT 29726K | BusinessTransactionDocumentItem ID 29728K |
| | Sales Contract Reference 29730K | | 0..n 29732K | AGDT 29734K | BusinessTransactionDocument Reference 29736K |
| | | ID 29738K | 1 29740K | GDT 29742K | BusinessTransactionDocumentID 29744K |
| | | ItemID 29746K | 0..n 29748K | GDT 29750K | BusinessTransactionDocumentItem ID 29752K |
| | Origin Purchase Order Reference 29754K | | 0..1 29756K | AGDT 29758K | BusinessTransactionDocument Reference 29760K |
| | | ID 29762K | 1 29764K | GDT 29766K | BusinessTransactionDocumentID 29768K |

Fig. 297V

PurchaseOrderMessage 29722

PurchaseOrder 29732

Item 29724D

| | | | | | |
|---|---|---|---|---|---|
| Business Transaction Document Reference 29742H | | ItemID 29770K | 0..n 29772K | GDT 29774K | BusinessTransaction DocumentItemID 29776K |
| | BuyerProduct Catalogue Reference 29778K | | 0..1 29780K | AGDT 29782K | CatalogueReference 29784K |
| | | ID 29786K | 1 29788K | GDT 29790K | CatalogueID 29792K |
| | | ItemID 29794K | 0..n 29796K | GDT 29798K | CatalogueItemID 29700L |
| | SellerProduct Catalogue Reference 29702L | | 0..1 29704L | AGDT 29706L | CatalogueReference 29708L |
| | | ID 29710L | 1 29712L | GDT 29714L | CatalogueID 29716L |
| | | ItemID 29718L | 0..n 29720L | GDT 29722L | CatalogueItemID 29724L |

Fig. 297W

| | | | | | | | |
|---|---|---|---|---|---|---|---|
| PurchaseOrderMessage | 29722 | | | | | | |
| PurchaseOrder | 29732 | | | | | | |
| Item | 29724D | | | | | | |
| Attachment 29744H | Attachment 29726L | | | | 0..n 29728L | AGDT 29732L | Attachment 29734L |
| Description 29746H | Description 29736L | | | | 0..1 29738L | GDT 29740L | Description 29742L |
| | | Language Code 29744L | | | 1 29746L | | |
| | Confirmation Description 29748L | | | | 0..1 29750L | GDT 29752L | Description 29754L |
| | | Language Code 29756L | | | 1 29758L | | |
| Schedule Line 29748H | ScheduleLine 29760L | | | | 0..n 29762L | AGDT 29764L | PurchaseOrderItem ScheduleLine 29766L |
| | | ID 29768L | | | 0..1 29770L | GDT 29772L | BusinessTransaction DocumentItem ScheduleLineID 29774L |

Fig. 297X

PurchaseOrderMessage 29722

PurchaseOrder 29732

Item 29724D

| | | | | |
|---|---|---|---|---|
| SellerID 29776L | | 0..1 29778L | GDT 29780L | BusinessTransactionDocumentItemScheduleLineID 29782L |
| DeliveryPeriod 29784L | | 1 29786L | AGDT 29788L | DateTimePeriod 29790L |
| | StartDateTime 29792L | 0..1 29794L | GDT 29796L | DateTime 29798L |
| | EndDateTime 29700M | 0..1 29702M | GDT 29704M | DateTime 29706M |
| | Duration 29708M | 0..1 29710M | GDT 29712M | Duration 29714M |
| Quantity 29716M | | 0..1 29718M | GDT 29720M | Quantity 29722M |
| | UnitCode 29724M | 1 29726M | | |

(All rows above are within ScheduleLine 29748H.)

Fig. 300A

| Package 30000 | L1 30002 | L2 30004 | L3 30006 | L4 30008 | L5 30010 | Card 30012 | Type 30014 | DTN 30016 | PIDEX 30018 |
|---|---|---|---|---|---|---|---|---|---|
| Service Acknowledge-mentMessage 30020 | Service Acknow-ledgement Message 30022 | | | | | | MDT 30024 | Service Acknowledge-mentMessage 30026 | |
| Message Header 30028 | | Message Header 30032 | | | | 1 30034 | AGDT 30036 | Business Document MessageHeader 30038 | |
| | | | ID 30040 | | | 1 30042 | GDT 30044 | Business Document MessageID 30046 | |
| | | | ReferenceID 30048 | | | 0..1 30050 | GDT 30052 | Business Document MessageID 30054 | |
| | | | Creation DateTime 30056 | | | 1 30058 | GDT 30060 | DateTime 30062 | |
| | | | SenderParty 30064 | | | 0..1 30066 | AGDT 30068 | BusinessDocu-mentMessage HeaderParty 30070 | |

Fig. 300B

| ServiceAcknowledgementMessage 30020 | | | | | | | |
|---|---|---|---|---|---|---|---|
| Message Header 30028 | | | InternalID 30072 | | 0..1 30074 | CDT 30076 | PartyInternalID 30078 |
| | | | StandardID 30080 | | 0..n 30082 | CDT 30084 | PartyStandardID 30086 |
| | | | Contract Person 30088 | | 0..1 30090 | AGDT 30092 | ContactPerson 30094 |
| | | | | BuyerID 30096 | 0..1 30098 | CDT 30000A | ContactPersonParty ID 30002A |
| | | | | VendorID 30004A | 0..1 30006A | CDT 30008A | ContactPersonParty ID 30010A |
| | | | | Address 30012A | 0..1 30014A | AGDT 30016A | Address 30018A |
| | | Recipient Party 30020A | | | 0..n 30022A | AGDT 30024A | BusinessDocument MessageHeaderParty 30026A |
| Service Acknow-Ledgement 30030 | Service Acknow-ledgement 30028A | | | | 1 30030A | AGDT 30032A | Service Acknowledgement 30034A |

Fig. 300C

| ServiceAcknowledgementMessage 30020 | | | | | | |
|---|---|---|---|---|---|---|
| Service Acknow-ledgement 30030 | ID 30036A | | 1 30038A | GDT 30040A | BusinessTrans-actionDocumentID 30042A | FieldTicketProperties-FieldTicketNumber 30044A |
| | BuyerID 30046A | | 0..1 30048A | GDT 30050A | BusinessTrans-actionDocumentID 30052A | |
| | Creation DateTime 30054A | | 0..1 30056A | GDT 30058A | DateTime 30060A | FieldTicketProperties-FieldTicketDate 30062A |
| | Acceptance StatusCode 30064A | | 0..1 30066A | GDT 30068A | AcceptanceStatus Code 30070A | FieldTicketResponse LineItem-LineStatus Code 30072A |
| | Note 30074A | | 0..1 30076A | GDT 30078A | Note 30080A | |
| Party 30082A | BuyerParty 30092A | | 0..1 30094A | AGDT 30096A | BusinessTransac-tionDocumentParty 30098A | PartnerInformation (all Parties) 30000B |
| | | StandardID 30002B | 0..n 30004B | CDT 30006B | PartyStandardID 30008B | |

Fig. 300D

| | | | | | | | | | |
|---|---|---|---|---|---|---|---|---|---|
| ServiceAcknowledgementMessage 30020 | | | | | | | | | |
| ServiceAcknowledgement 30030 | | | | | | | | | |
| Party 30082A | | | | BuyerID 30010B | | 0..1 30012B | CDT 30014B | PartyPartyID 30016B | |
| | | | | SellerID 30018B | | 0..1 30020B | CDT 30022B | PartyPartyD 30024B | |
| | | | | Address 30026B | | 0..1 30028B | AGDT 30030B | Address 30032B | |
| | | | | Contract Person 30034B | | 0..1 30036B | AGDT 30038B | ContactPerson 30040B | |
| | | | | | BuyerID 30042B | 0..1 30044B | CDT 30046B | ContactPersonPartyID 30048B | |
| | | | | | SellerID 30050B | 0..1 30052B | CDT 30054B | ContactPersonPartyID 30056B | |
| | | | | | Address 30058B | 0..1 30060B | AGDT 30062B | Address 30064B | |
| | | | Seller Party 30066B | | | 0..1 30068B | AGDT 30070B | BusinessTransaction DocumentParty 30072B | Partner Information 30074B |

Fig. 300E

ServiceAcknowledgementMessage 30020

ServiceAcknowledgement 30030

| | | | | | |
|---|---|---|---|---|---|
| Party 30082A | Product Recipient Party 30076B | | 0..1 30078B | AGDT 30080B | BusinessTransaction DocumentParty 30082B | PartnerInformation 30084B |
| | Vendor Party 30086B | | 0..1 30088B | AGDT 30090B | BusinessTransaction DocumentParty 30092B | PartnerInformation and partially CountryOfOrigin 30094B |
| | Manufacture rParty 30096B | | 0..1 30098B | AGDT 30000C | BusinessTransaction DocumentParty 30002C | PartnerInformation 30004C |
| Location 30084A | ShipTo Location 30006C | | 0..1 30008C | AGDT 30010C | BusinessTransaction DocumentLocation 30012C | partially : Country OfFinalDestination 30014C |
| | | StandardID 30016C | 0..n 30018C | CDT 30020C | LocationStandardID 30022C | |
| | | BuyerID 30024C | 0..1 30026C | CDT 30028C | LocationPartyID 30030C | |
| | | SellerID 30032C | 0..1 30034C | CDT 30036C | LocationPartyID 30038C | |
| | | Address 30040C | 0..1 30042C | AGDT 30044C | Address 30046C | |
| Attach-ment 30086A | Attachment 30048C | | 0..n 30050C | AGDT 30052C | Attachment 30054C | FieldTicketProperties -Attachment 30056C |

Fig. 300F

ServiceAcknowledgementMessage 30020

ServiceAcknowledgement 30030

| | | | | | | |
|---|---|---|---|---|---|---|
| Description 30088A | Description 30058C | | 0..1 30060C | GDT 30062C | Description 30064C | FieldTicket Properties-Comment and -JobSummary 30066C |
| | Confirmation Description 30068C | | 0..1 30070C | GDT 30072C | Description 30074C | |
| Item 30090A | Item 30076C | | 0..n 30078C | AGDT 30080C | Service Acknowledgement Item 30082C | |
| | | ID 30084C | 1 30086C | GDT 30088C | Business Transaction DocumentItemID 30090C | FieldTicket LineItem-LineItem Number 30092C |
| | | BuyerID 30094C | 0..1 30096C | GDT 30098C | Business Transaction DocumentItemID 30000D | |

Fig. 300G

| | | | | | | |
|---|---|---|---|---|---|---|
| ServiceAcknowledgementMessage 30020 | | | | | | |
| ServiceAcknowledgement 30030 | | | | | | |
| Item 30090A | ServiceEntry Completed Indicator 30002D | | 0..1 30004D | GDT 30006D | Business Transaction CompletedID 30008D | |
| | Delivery Period 30010D | | 0..1 30012D | GDT 30014D | DateTimePeriod 30016C | FieldTicketLineItem-ServiceDateTime 30018D |
| | Quantity 30020D | | 0..1 30022D | GDT 30024D | Quantity 30026D | FieldTicketProperties-FieldTicketQuantity 30028D |
| | Hierarchy Relationship 30030D | | 0..1 30032D | | | realized with FieldTicket SubLineItem 30034D |
| | | ParentItem ID 30036D | 0..1 30038D | GDT 30040D | Business Transaction DocumentItem ID 30042D | |

Fig. 300H

| | | | | | | | | | | |
|---|---|---|---|---|---|---|---|---|---|---|
| ServiceAcknowledgementMessage 30020 | | | | | | | | | | |
| | ServiceAcknowledgement 30030 | | | | | | | | | |
| | | Item 30090A | | | | | ParentItem BuyerID 30044D | 0..1 30046D | GDT 30048D | BusinessTransaction DocumentItemID 30050D |
| | | | | | | | TypeCode 30052D | 1 30054D | GDT 30056D | BusinessTransaction DocumentItem HierarchyRelationship TypeCode 30058D |

Fig. 300I

ServiceAcknowledgementMessage 30020

ServiceAcknowledgement 30030

Item 30090A

| | | | | | |
|---|---|---|---|---|---|
| Product Information 30060D | Product 30074D | | 0..1 30076D | AGDT 30078D | Business Transaction DocumentProduct 30080D | FieldTicketPro-perties-LineItem Information 30082D |
| | | StandardID 30084D | 0..n 30086D | CDT 30088D | ProductStandardID 30090D | |
| | | BuyerID 30092D | 0..1 30094D | CDT 30096D | ProductPartyID 30098D | |
| | | SellerID 30000E | 0..1 30002E | CDT 30004E | ProductPartyID 30006E | |
| | | Manufacturer ID 30008E | 0..1 30010E | CDT 30012E | ProductPartyID 30014E | |
| | | TypeCode 30016E | 0..1 30018E | GDT 30020E | ProductTypeCode 30022E | |
| | | Note 30024E | 0..1 30026E | GDT 30028E | Note 30030E | |
| | Product Category 30032E | | 0..1 30034E | AGDT 30036E | Business Transaction DocumentProduct Category 30038E | |

Fig. 300J

| | | | | | | |
|---|---|---|---|---|---|---|
| ServiceAcknowledgementMessage 30020 | | | | | | |
| ServiceAcknowledgement 30030 | | | | | | |
| Item 30090A | | | | | | |
| Product Information 30060D | | Standard ID 30040E | 0..n 30042E | CDT 30044E | ProductCategory StandardID 30046E | |
| | | BuyerID 30048D | 0..1 30050E | CDT 30052E | ProductCategory PartyID 30054E | |
| | | SellerID 30056E | 0..1 30058E | CDT 30060E | ProductCategory PartyID 30062E | |
| Price Information 30062D | Price 30064E | | 0..1 30066E | | | FieldTicketLine Item-Pricing 30068E |
| | | NetUnit Price 30070E | 0..1 30072E | AGDT 30074E | Price 30076E | partially: PrimaryCurrency 30078E |
| Party 30064D | Buyer Party 30080E | | 0..1 30082E | AGDT 30084E | BusinessTransaction DocumentParty 30086E | PartnerInformation 30088E |
| | Seller Party 30090E | | 0..1 30092E | AGDT 30094E | BusinessTransaction DocumentParty 30096E | PartnerInformation 30098E |

Fig. 300K

| | | | | | |
|---|---|---|---|---|---|
| ServiceAcknowledgementMessage 30020 | | | | | |
| ServiceAcknowledgement 30030 | | | | | |
| Item 30090A | | | | | |
| Party 30064D | ProductRecipientParty 30000F | 0..1 30002F | AGDT 30004F | BusinessTransactionDocumentParty 30006F | PartnerInformation 30008F |
| | VendorParty 30010F | 0..1 30012F | AGDT 30014F | BusinessTransactionDocumentParty 30016F | PartnerInformation and partially– CountryOfOrigin 30018F |
| | ManufacturerParty 30020F | 0..1 30022F | AGDT 30024F | BusinessTransactionDocumentParty 30026F | PartnerInformation 30028F |
| Location 30066D | ShipToLocation 30030F | 0..1 30032F | AGDT 30034F | BusinessTransactionDocumentLocation 30036F | |
| BusinessTransactionDocumentReference 30068D | PurchaseOrderReference 30038F | 0..1 30040F | AGDT 30042F | BusinessTransactionDocumentReference 30044F | FieldTicketLineItem-PurchaseOrderInformation 30046F |
| | PurchaseContractReference 30048F | 0..1 30050F | AGDT 30052F | BusinessTransactionDocumentReference 30054F | FieldTicketLineItem-ReferenceInformation 30056F |

Fig. 300L

| | | | | | | |
|---|---|---|---|---|---|---|
| ServiceAcknowledgementMessage | | 30020 | | | | |
| ServiceAcknowledgement | | 30030 | | | | |
| Item | | 30090A | | | | |
| Business Transaction Document Reference 30068D | SalesContract Reference 30058F | 0..1 30060F | AGDT 30062F | BusinessTransaction DocumentReference 30064F | | |
| | BuyerProduct Catalogue Reference 30066F | 0..1 30068F | AGDT 30070F | CatalogueReference 30072F | | |
| | SellerProduct Catalogue Reference 30074F | 0..1 30076F | AGDT 30078F | CatalogueReference 30080F | | |
| Attachment 30070D | Attachment 30082F | 0..n 30084F | AGDT 30086F | Attachment 30088F | FieldTicketLineItem-Attachment 30090F | |
| Description 30072D | Description 30092F | 0..1 30094F | GDT 30096F | Description 30098F | FieldTicketLineItem-Comment and JobSummary 30000G | |
| | Confirmation Description 30002G | 0..1 30004G | GDT 30006G | Description 30008G | | |

Fig. 306A

| Package 30600 | L 1 30602 | L2 30604 | L3 30606 | L4 30608 | L5 30610 | L6 30612 | Occ 30614 | Type 30616 | Name 30618 |
|---|---|---|---|---|---|---|---|---|---|
| RFQMessage 30620 | RFQ Message 30622 | | | | | | | MDT 30624 | RFQMessage 30626 |
| Message Header 30628 | | Message Header 30632 | | | | | 1 30634 | AGDT 30636 | BusinessDocument MessageHeader 30638 |
| | | | ID 30640 | | | | 1 30642 | GDT 30644 | BusinessDocument MessageID 30646 |
| | | | Reference ID 30648 | | | | 0..1 30650 | GDT 30652 | BusinessDocument MessageID 30654 |
| | | | Creation DateTime 30656 | | | | 1 30658 | GDT 30660 | DateTime 30662 |
| | | | Sender Party 30664 | | | | 0..1 30666 | AGDT 30668 | BusinessDocument MessageHeader Party 30670 |
| | | | | InternalID 30672 | | | 0..1 30674 | CDT 30676 | PartyInternalID 30678 |

Fig. 306B

| RFQMessage 30620 | | | | | | | |
|---|---|---|---|---|---|---|---|
| Message Header 30628 | | | StandardID 30680 | | 0..n 30682 | CDT 30684 | PartyStandardID 30686 |
| | | | Contact Person 30688 | | 0..1 30690 | AGDT 30692 | ContactPerson 30694 |
| | | | | Internal ID 30696 | 0..n 30698 | CDT 30600A | ContactPerson InternalID 30602A |
| | | | | BuyerID 30604A | 0..1 30606A | CDT 30608A | ContactPersonPartyID 30610A |
| | | | | BidderID 30612A | 0..1 30614A | CDT 30616A | ContactPersonPartyID 30618A |
| | | | | Address 30620A | 0..1 30622A | AGDT 30624A | Address 30626A |
| | | RecipientParty 30628A | | | 0..n 30630A | AGDT 30632A | BusinessDocument MessageHeaderParty 30634A |
| RFQ 30630 | RFQ 30636A | | | | 1 30638A | AGDT 30640A | RFQ 30642A |
| | | ID 30644A | | | 1 30646A | GDT 30648A | BusinessTransaction DocumentID 30650A |

Fig. 306C

RFQMessage 30620

| | | | | | | | | | |
|---|---|---|---|---|---|---|---|---|---|
| RFQ 30630 | | | PostingDateTime 30652A | | | | 0..1 30654A | GDT 30656A | DateTime 30658A |
| | | | LastChangeDateTime 30660A | | | | 0..1 30662A | GDT 30664A | DateTime 30666A |
| | | | PublishDateTime 30668A | | | | 0..1 30670A | GDT 30672A | DateTime 30674A |
| | | | DisplayDateTime 30676A | | | | 0..1 30678A | GDT 30680A | DateTime 30682A |
| | | | BiddingStartDateTime 30684A | | | | 0..1 30686A | GDT 30688A | DateTime 30690A |
| | | | QuoteSubmissionDateTime 30692A | | | | 1 30694A | GDT 30696A | DateTime 30698A |
| | | | QuoteOpeningDateTime 30600B | | | | 0..1 30602B | GDT 30604B | DateTime 30606B |
| | | | QuoteBindingDateTime 30608B | | | | 0..1 30610B | GDT 30612B | DateTime 30614B |
| | | | ContractValidityPeriod 30616B | | | | 0..1 30618B | GDT 30620B | DateTimePeriod 30622B |
| | | | Note 30624B | | | | 0..1 30626B | GDT 30628B | Note 30630B |

Fig. 306D

| | | | | | |
|---|---|---|---|---|---|
| RFQMessage 30620 | | | | | |
| RFQ 30630 | RFQPublicIndicator 30632B | 1 30634B | GDT 30636B | BusinessTransaction DocumentPublicIndicator 30638B |
| | QuoteUnplannedItem PermissionCode 30640B | 0..1 30642B | GDT 30644B | UnplannedItemPermission Code 30646B |
| | QuotePriceBidding ConditionCode 30648B | 1 30650B | GDT 30652B | BiddingConditionCode 30654B |
| | QuoteQuantityBidding ConditionCode 30656B | 1 30658B | GDT 30660B | BiddingConditionCode 30662B |
| | QuoteItemBidding ConditionCode 30664B | 1 30666B | GDT 30668B | BiddingConditionCode 30670B |
| | ContractTargetAmount 30672B | 0..1 30674B | GDT 30676B | Amount 30678B |
| Party 30680B | BuyerParty 30600C | 0..1 30602C | AGDT 30604C | BusinessTransaction DocumentParty 30606C |

Fig. 306E

RFQMessage 30620

RFQ 30630

| Party | | | | | | |
|---|---|---|---|---|---|---|
| Party 30680B | | StandardID 30608C | | 0..n 30610C | CDT 30612C | PartyStandardID 30614C |
| | | BuyerID 30616C | | 0..1 30618C | CDT 30620C | PartyPartyID 30622C |
| | | BidderID 30624C | | 0..1 30626C | CDT 30628C | PartyPartyID 30630C |
| | | Address 30632C | | 0..1 30634C | AGDT 30636C | Address 30638C |
| | | ContactPerson 30640C | | 0..1 30642C | AGDT 30644C | ContactPerson 30646C |
| | | | BuyerID 30648C | 0..1 30650C | CDT 30652C | ContactPersonPartyID 30654C |
| | | | BidderID 30656C | 0..1 30658C | CDT 30660C | ContactPersonPartyID 30662C |
| | | | Address 30664C | 0..1 30666C | AGDT 30668C | Address 30670C |
| | BidderParty 30672C | | | 0..1 30674C | AGDT 30676C | BusinessTransaction DocumentParty 30678C |

Fig. 306F

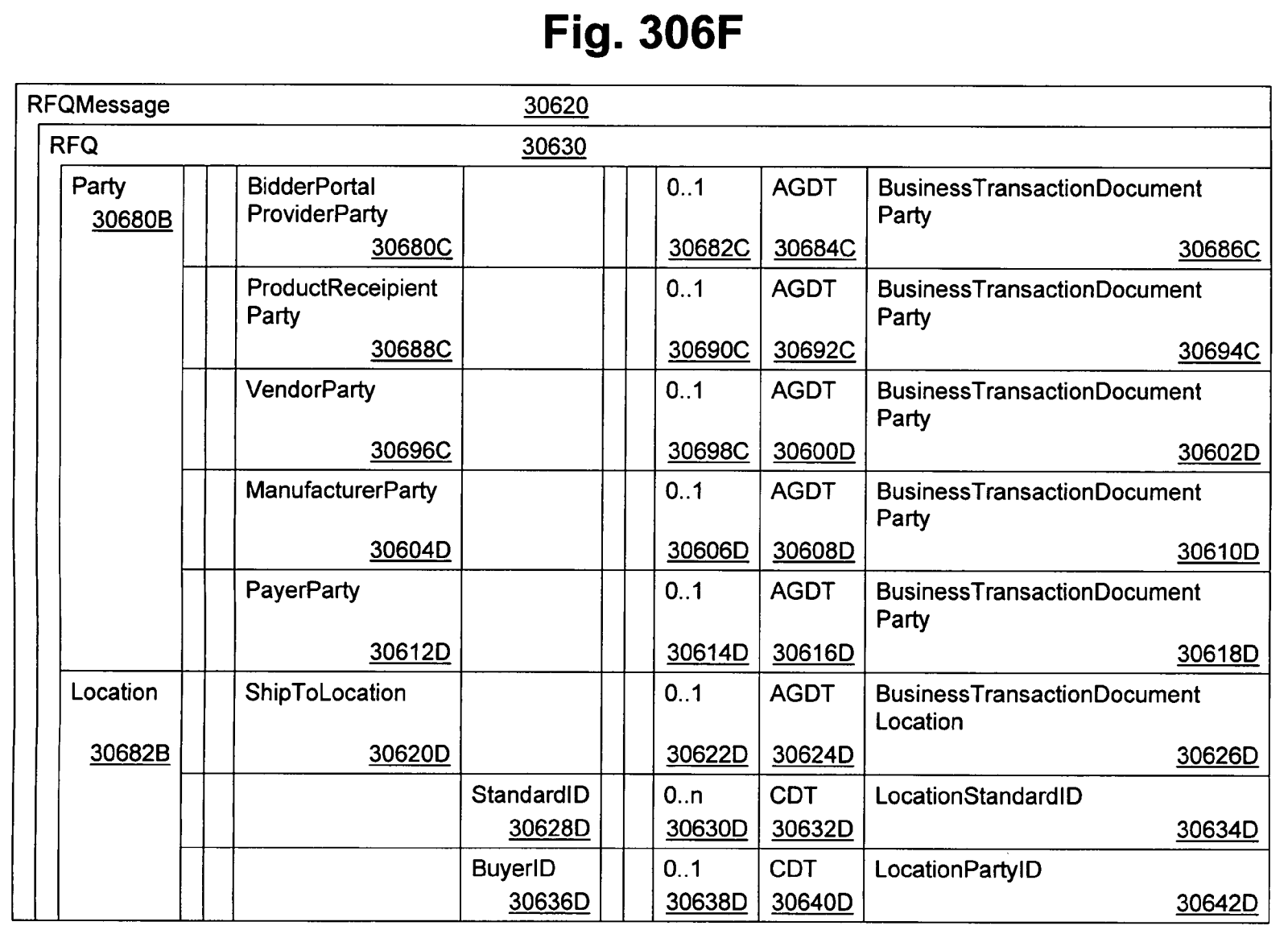

| | | | | | |
|---|---|---|---|---|---|
| RFQMessage | | 30620 | | | |
| RFQ | | 30630 | | | |
| Party 30680B | BidderPortal ProviderParty 30680C | | 0..1 30682C | AGDT 30684C | BusinessTransactionDocument Party 30686C |
| | ProductReceipient Party 30688C | | 0..1 30690C | AGDT 30692C | BusinessTransactionDocument Party 30694C |
| | VendorParty 30696C | | 0..1 30698C | AGDT 30600D | BusinessTransactionDocument Party 30602D |
| | ManufacturerParty 30604D | | 0..1 30606D | AGDT 30608D | BusinessTransactionDocument Party 30610D |
| | PayerParty 30612D | | 0..1 30614D | AGDT 30616D | BusinessTransactionDocument Party 30618D |
| Location 30682B | ShipToLocation 30620D | | 0..1 30622D | AGDT 30624D | BusinessTransactionDocument Location 30626D |
| | | StandardID 30628D | 0..n 30630D | CDT 30632D | LocationStandardID 30634D |
| | | BuyerID 30636D | 0..1 30638D | CDT 30640D | LocationPartyID 30642D |

Fig. 306G

RFQMessage 30620

RFQ 30630

| | | | | | | |
|---|---|---|---|---|---|---|
| Location 30682B | | BidderID 30644D | 0..1 30646D | CDT 30648D | LocationPartyID 30650D |
| | | Address 30652D | 0..1 30654D | AGDT 30656D | Address 30658D |
| Delivery Information 30684B | DeliveryTerms 30660D | | 0..1 30662D | AGDT 30664D | DeliveryTerms 30666D |
| | | Incoterms 30668D | 0..1 30670D | GDT 30672D | Incoterms 30674D |
| Payment Information 30686B | CashDiscount Terms 30676D | | 0..1 30678D | AGDT 30680D | CashDiscountTerms 30682D |
| | | MaximumCashDiscount 30684D | 0..1 30686D | GDT 30688D | CashDiscount 30690D |
| | | NormalCashDiscount 30692D | 0..1 30694D | GDT 30696D | CashDiscount 30698D |
| | | FullPaymentDueDays Value 30600E | 0..1 30602E | | |
| | PaymentForm 30604E | | 0..1 30606E | | |

Fig. 306H

RFQMessage 30620

RFQ 30630

| | | | | | |
|---|---|---|---|---|---|
| Payment Information 30686B | | Code 30608E | 1 30610E | GDT 30612E | PaymentFormCode 30614E |
| Product Information 30688B | Product Category 30616E | | 0..1 30618E | GDT 30620E | BusinessTransactionDocument Product Category 30622E |
| | | Standard ID 30624E | 0..n 30626E | CDT 30628E | ProductCategoryStandardID 30630E |
| | | BuyerID 30632E | 0..1 30634E | CDT 30636E | ProductCategoryPartyID 30638E |
| | | Bidder ID 30640E | 0..1 30642E | CDT 30644E | ProductCategoryPartyID 30646E |
| Business Transaction Document Reference 30690B | Quote Reference 30648E | | 0..1 30650E | GDT 30652E | BusinessTransactionDocument Reference 30654E |
| | | ID 30656E | 1 30658E | GDT 30660E | BusinessTransactionDocument ID 30662E |

Fig. 306I

| | | | | | |
|---|---|---|---|---|---|
| RFQMessage 30620 | | | | | |
| RFQ 30630 | | | | | |
| FollowUp Business Transaction Document 30692B | FollowUp Purchase Order 30664E | | 0..1 30666E | | |
| | | Requirement Code 30668E | 1 30670E | GDT 30672E | FollowUpBusinessTransaction DocumentRequirementCode 30674E |
| | FollowUp Purchase Document 30676E | | 0..1 30678E | | |
| | | Requirement Code 30680E | 1 30682E | GDT 30684E | FollowUpBusinessTransaction DocumentRequirementCode 30686E |
| Attachment 30694B | Attachment 30688E | | 0..n 30690E | GDT 30692E | Attachment 30694E |
| Description 30696B | Description 30696E | | 0..1 30698E | GDT 30600F | Description 30602F |
| Item 30698B | Item 30604F | | 0..n 30606F | AGDT 30608F | RFQItem 30610F |

Fig. 306J

| | | | | | | |
|---|---|---|---|---|---|---|
| RFQMessage 30620 | | | | | | |
| RFQ 30630 | | | | | | |
| Item 30698B | ID 30612F | | 1 30614F | GDT 30616F | BusinessTransactionDocument ItemID 30618F |
| | Contract TargetAmount 30620F | | 0..1 30622F | GDT 30624F | Amount 30626F |
| | Hierarchy Relationship 30628F | | 0..1 30630F | | |
| | | ParentItemID 30632F | 1 30634F | GDT 30636F | BusinessTransactionDocument ItemID 30638F |
| | | TypeCode 30640F | 1 30642F | GDT 30644F | BusinessTransationDocument ItemHierarchyRelationshipType Code 30646F |
| Product Information 30648F | Product 30664F | | 0..1 30666F | GDT 30668F | BusinessTransactionDocument Product 30670F |
| | | StandardID 30672F | 0..n 30674F | CDT 30676F | ProductStandardID 30678F |

Fig. 306K

| | | | | | |
|---|---|---|---|---|---|
| RFQMessage 30620 | | | | | |
| RFQ 30630 | | | | | |
| Item 30698B | | | | | |
| Product Information 30648F | | BuyerID 30680F | 0..1 30682F | CDT 30684F | ProductPartyID 30686F |
| | | BidderID 30688F | 0..1 30690F | CDT 30692F | ProductPartyID 30694F |
| | | Manufacturer ID 30696F | 0..1 30698F | CDT 30600G | ProductPartyID 30602G |
| | | TypeCode 30604G | 0..1 30606G | GDT 30608G | ProductTypeCode 30610G |
| | | Note 30612G | 0..1 30614G | GDT 30616G | Note 30618G |
| | Product Category 30620G | | 0..1 30622G | GDT 30624G | BusinessTransactionDocument Product 30626G |
| | | StandardID 30628G | 0..n 30630G | CDT 30632G | ProductCategoryStandardID 30634G |
| | | BuyerID 30636G | 0..1 30638G | CDT 30640G | ProductCategoryPartyID 30642G |

Fig. 306L

RFQMessage 30620

RFQ 30630

Item 30698B

| | | | | |
|---|---|---|---|---|
| Product Information 30648F | BidderID 30644G | 0..1 30646G | CDT 30648G | ProductCategoryPartyID 30650G |
| Party 30650F | BuyerParty 30652G | 0..1 30654G | AGDT 30656G | BusinessTransactionDocument Party 30658G |
| | BidderParty 30660G | 0..1 30662G | AGDT 30664G | BusinessTransactionDocument Party 30666G |
| | ProductRecipient Party 30668G | 0..1 30670G | AGDT 30672G | BusinessTransactionDocument Party 30674G |
| | VendorParty 30676G | 0..1 30678G | AGDT 30680G | BusinessTransactionDocument Party 30682G |
| | ManufacturerParty 30684G | 0..1 30686G | AGDT 30688G | BusinessTransactionDocument Party 30690G |
| Location 30652F | ShipToLocation 30692G | 0..1 30694G | AGDT 30696G | BusinessTransactionDocument Location 30698G |

Fig. 306M

| | | | | | |
|---|---|---|---|---|---|
| RFQMessage 30620 | | | | | |
| RFQ 30630 | | | | | |
| Item 30698B | | | | | |
| Location 30652F | | StandardID 30600H | 0..n 30602H | CDT 30604H | LocationStandardID 30606H |
| | | BuyerID 30608H | 0..1 30610H | CDT 30612H | LocationPartyID 30614H |
| | | BidderID 30616H | 0..1 30618H | CDT 30620H | LocationPartyID 30622H |
| | | Address 30624H | 0..1 30626H | AGDT 30628H | Address 30630H |
| DeliveryInformation 30654F | DeliveryTerms 30632H | | 0..1 30634H | AGDT 30636H | DeliveryTerms 30638H |
| | | MaximumLead TimeDuration 30640H | 0..1 30642H | GDT 30644H | Duration 30646H |
| | | Incoterms 30648H | 0..1 30650H | GDT 30652H | Incoterms 30654H |
| BusinessTransaction Document Reference 30656F | Quote Reference 30656H | | 0..1 30658H | GDT 30660H | BusinessTransaction Document Reference 30662H |

Fig. 306N

| | | | | | | | |
|---|---|---|---|---|---|---|---|
| RFQMessage | | | 30620 | | | | |
| RFQ | | | 30630 | | | | |
| Item | | | 30698B | | | | |
| Business Transaction Document Reference 30656F | | | ID 30664H | 1 30666H | GDT 30668H | BusinessTransactionDocumentID 30670H | |
| | | | ItemID 30672H | 0..n 30674H | GDT 30676H | BusinessTransactionDocument ItemID 30678H | |
| | | PurchaseContract Reference 30680H | | 0..1 30682H | GDT 30684H | BusinessTransactionDocument Reference 30686H | |
| | | | ID 30688H | 1 30690H | GDT 30692H | BusinessTransactionDocumentID 30694H | |
| | | | ItemID 30696H | 0..n 30698H | GDT 30600I | BusinessTransactionDocument ItemID 30602I | |
| | | BuyerProduct Catalogue Reference 30604I | | 0..1 30606I | AGDT 30608I | CatalogueReference 30610I | |
| | | | ID 30612I | 1 30614I | GDT 30616I | CatalogueID 30618I | |

Fig. 306O

| | | | | | |
|---|---|---|---|---|---|
| RFQMessage 30620 | | | | | |
| RFQ 30630 | | | | | |
| Item 30698B | | | | | |
| Business Transaction Document Reference 30656F | | ItemID 30620I | 0..n 30622I | GDT 30624I | CatalogueItemID 30626I |
| Attachment 30658F | Attachment 30628I | | 0..n 30630I | GDT 30632I | Attachment 30634I |
| Description 30660F | Description 30636I | | 0..1 30638I | GDT 30640I | Description 30642I |
| Schedule Line 30662F | ScheduleLine 30644I | | 0..1 30646I | AGDT 30648I | RFQItemScheduleLine 30650I |
| | | ID 30652I | 0..1 30654I | GDT 30656I | BusinessTransactionDocument ItemScheduleLineID 30658I |
| | | Delivery Period 30660I | 1 30662I | AGDT 30664I | DateTimePeriod 30666I |
| | | Quantity 30668I | 0..1 30670I | GDT 30672I | Quantity 30674I |

Fig. 307A

| Package 30700 | L1 30702 | L2 30704 | L3 30706 | L4 30708 | L5 30710 | Card 30712 | Type 30714 | Name 30716 |
|---|---|---|---|---|---|---|---|---|
| RFQ Cancellation Message 30718 | RFQ Cancellation Message 30720 | | | | | | MDT 30722 | RFQCancelation Message 30724 |
| Message Header 30726 | | Message Header 30730 | | | | 1 30732 | AGDT 30734 | BusinessDocument MessageHeader 30736 |
| | | | ID 30738 | | | 1 30740 | GDT 30742 | BusinessDocument MessageID 30744 |
| | | | ReferenceID 30746 | | | 0..1 30748 | GDT 30750 | BusinessDocument MessageID 30752 |
| | | | Creation DateTime 30754 | | | 1 30756 | GDT 30758 | DateTime 30760 |
| | | | SenderParty 30762 | | | 0..1 30764 | AGDT 30766 | BusinessDocument MessageHeaderParty 30768 |

Fig. 307B

| RFQ Cancellation Message 30718 | | | | | | | | |
|---|---|---|---|---|---|---|---|---|
| Message Header 30726 | | | | InternalID 30770 | | 0..1 30772 | CDT 30774 | PartyInternalID 30776 |
| | | | | Standard ID 30778 | | 0..n 30780 | CDT 30782 | PartyStandardID 30784 |
| | | | | Contact 30786 | | 0..1 30788 | GDT 30790 | ContactPerson 30792 |
| | | | | | Internal ID 30794 | 0..n 30796 | CDT 30798 | ContactPerson InternalID 30700A |
| | | | | | BuyerID 30702A | 0..1 30704A | CDT 30706A | ContactPersonPartyID 30708A |
| | | | | | BidderID 30710A | 0..1 30712A | CDT 30714A | ContactPersonPartyID 30716A |
| | | | | | Address 30718A | 0..1 30720A | AGDT 30722A | Address 30724A |
| | | | Recipient Party 30726A | | | 0..n 30728A | AGDT 30730A | BusinessDocument MessageHeaderParty 30732A |

Fig. 307C

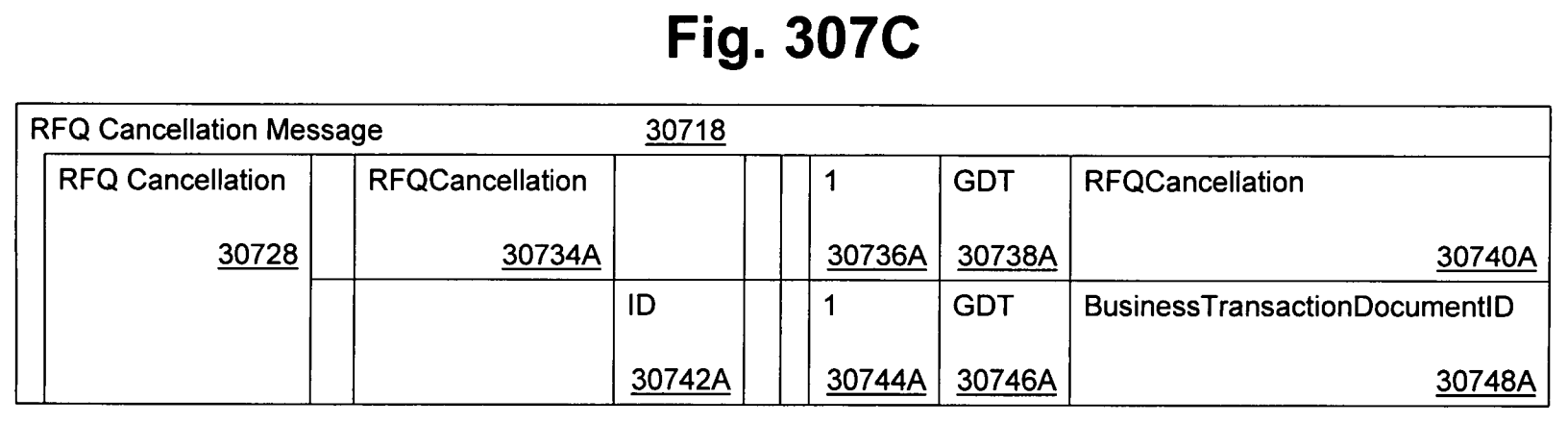

RFQ Cancellation Message 30718

| | | | | | | | | |
|---|---|---|---|---|---|---|---|---|
| RFQ Cancellation 30728 | | RFQCancellation 30734A | | | | 1 30736A | GDT 30738A | RFQCancellation 30740A |
| | | | ID 30742A | | | 1 30744A | GDT 30746A | BusinessTransactionDocumentID 30748A |

Fig. 308A

| Package 30800 | L. 1 30802 | L. 2 30804 | L. 3 30806 | L. 4 30808 | L. 5 30810 | L. 6 30812 | Card 30814 | Type 30816 | Name 30818 |
|---|---|---|---|---|---|---|---|---|---|
| Quote Message 30820 | Quote Message 30822 | | | | | | | MDT 30824 | QuoteMessage 30826 |
| Message Header 30828 | | Message Header 30832 | | | | | 1 30834 | AGDT 30836 | Business Document MessageHeader 30838 |
| | | | ID 30840 | | | | 1 30842 | GDT 30844 | Business Document MessageID 30846 |
| | | | Reference ID 30848 | | | | 0..1 30850 | GDT 30852 | Business Document MessageID 30854 |
| | | | Creation DateTime 30856 | | | | 1 30858 | GDT 30860 | DateTime 30862 |
| | | | SenderParty 30864 | | | | 0..1 30866 | AGDT 30868 | Business Document MessageHeader Party 30870 |

Fig. 308B

QuoteMessage 30820

| Level 1 | Level 2 | Level 3 | Level 4 | Level 5 | Cardinality | Type | Data Type |
|---|---|---|---|---|---|---|---|
| Message Header 30828 | | | InternalID 30872 | | 0..1 30874 | CDT 30876 | PartyInternalID 30878 |
| | | | StandardID 30880 | | 0..n 30882 | CDT 30884 | PartyStandardID 30886 |
| | | | Contact 30888 | | 0..1 30890 | GDT 30892 | ContactPerson 30894 |
| | | | | InternalID 30896 | 0..n 30898 | CDT 30800A | ContactPersonInternalID 30802A |
| | | | | BuyerID 30804A | 0..1 30806A | CDT 30808A | ContactPersonPartyID 30810A |
| | | | | BidderID 30812A | 0..1 30814A | CDT 30816A | ContactPersonPartyID 30818A |
| | | | | Address 30820A | 0..1 30822A | AGDT 30824A | Address 30826A |
| | | Recipient Party 30828A | | | 0..n 30830A | AGDT 30832A | BusinessDocument MessageHeaderParty 30834A |
| Quote 30830 | Quote 30836A | | | | 1 30838A | AGDT 30840A | Quote 30842A |
| | | ID 30844A | | | 1 30846A | GDT 30848A | BusinessTransaction DocumentID 30850A |

Fig. 308C

| QuoteMessage 30820 | | | | | | |
|---|---|---|---|---|---|---|
| Quote 30830 | PostingDateTime 30852A | | 0..1 30854A | GDT 30856A | DateTime 30858A |
| | LastChangeDateTime 30860A | | 0..1 30862A | GDT 30864A | DateTime 30866A |
| | BindingDateTime 30868A | | 0..1 30870A | GDT 30872A | DateTime 30874A |
| | Note 30876A | | 0..1 30878A | GDT 30880A | Note 30882A |
| | ContractTargetAmount 30884A | | 0..1 30886A | GDT 30888A | Amount 30890A |
| Party 30892A | BuyerParty 30810B | | 0..1 30812B | AGDT 30814B | BusinessTransactionDocument Party 30816B |
| | | StandardID 30818B | 0..n 30820B | CDT 30822B | PartyStandardID 30824B |
| | | BuyerID 30826B | 0..1 30828B | CDT 30830B | PartyPartyID 30832B |
| | | BidderID 30834B | 0..1 30836B | CDT 30838B | PartyPartyID 30840B |

Fig. 308D

| | | | | | | |
|---|---|---|---|---|---|---|
| QuoteMessage 30820 | | | | | | |
| Quote 30830 | | | | | | |
| Party 30892A | | Address 30842B | | 0..1 30844B | AGDT 30846B | Address 30848B |
| | | Contact 30850B | | 0..1 30852B | GDT 30854B | ContactPerson 30856B |
| | | | BuyerID 30858B | 0..1 30860B | CDT 30862B | PartyPartyID 30864B |
| | | | BidderID 30866B | 0..1 30868B | CDT 30870B | PartyPartyID 30872B |
| | | | Address 30874B | 0..1 30876B | AGDT 30878B | Address 30880B |
| | BidderParty 30882B | | | 0..1 30884B | AGDT 30886B | BusinessTransaction Document Party 30888B |
| | BidderPortal ProviderParty 30890B | | | 0..1 30892B | AGDT 30894B | BusinessTransaction DocumentParty 30896B |
| | ProductRecipient Party 30898B | | | 0..1 30800C | AGDT 30802C | BusinessTransaction DocumentParty 30804C |

Fig. 308E

| | | | | | |
|---|---|---|---|---|---|
| QuoteMessage 30820 | | | | | |
| Quote 30830 | | | | | |
| Party 30892A | VendorParty 30806C | | 0..1 30808C | AGDT 30810C | BusinessTransactionDocument Party 30812C |
| | ManufacturerParty 30814C | | 0..1 30816C | AGDT 30818C | BusinessTransactionDocument Party 30820C |
| | PayerParty 30822C | | 0..1 30824C | AGDT 30826C | BusinessTransactionDocument Party 30828C |
| Location 30894A | ShipToLocation 30830C | | 0..1 30832C | AGDT 30834C | BusinessTransactionDocument Location 30836C |
| | | StandardID 30838C | 0..n 30840C | CDT 30842C | LocationStandardID 30844C |
| | | BuyerID 30846C | 0..1 30848C | CDT 30850C | LocationPartyID 30852C |
| | | BidderID 30854C | 0..1 30856C | CDT 30858C | LocationPartyID 30860C |
| | | Address 30862C | 0..1 30864C | AGDT 30866C | Address 30868C |

Fig. 308F

| | | | | | | |
|---|---|---|---|---|---|---|
| QuoteMessage | | 30820 | | | | |
| Quote | | 30830 | | | | |
| Delivery Information 30896A | DeliveryTerms 30870C | | 0..1 30872C | AGDT 30874C | DeliveryTerms 30876C |
| | | Incoterms 30878C | 0..1 30880C | GDT 30882C | Incoterms 30884C |
| Payment Information 30898A | CashDiscountTerms 30886C | | 0..1 30888C | AGDT 30890C | CashDiscountTerms 30892C |
| | | MaximumCash Discount 30894C | 0..1 30896C | GDT 30898C | CashDiscount 30800D |
| | | NormalCash Discount 30802D | 0..1 30804D | GDT 30806D | CashDiscount 30808D |
| | | FullPaymentDue DaysValue 30810D | 0..1 30812D | | |
| | PaymentForm 30814D | | 0..1 30816D | | |
| | | Code 30818D | 1 30820D | GDT 30822D | PaymentFormCode 30824D |

Fig. 308G

| | | | | | |
|---|---|---|---|---|---|
| QuoteMessage 30820 | | | | | |
| Quote 30830 | | | | | |
| Product Information 30800B | Product Category 30826D | | 0..1 30828D | GDT 30830D | BusinessTransaction DocumentProductCategory 30832D |
| | | StandardID 30834D | | CDT 30836D | ProductCategoryStandardID 30838D |
| | | BuyerID 30840D | | CDT 30842D | ProductCategoryPartyID 30844D |
| | | BidderID 30846D | | CDT 30848D | ProductCategoryPartyID 30850D |
| Business Transaction Document Reference 30802B | RFQReference 30852D | | 0..1 30854D | GDT 30856D | BusinessTransaction DocumentReference 30858D |
| | | ID 30860D | 1 30862D | GDT 30864D | BusinessTransaction DocumentID 30866D |
| Attachment 30804B | Attachment 30868D | | 0..n 30870D | GDT 30872D | Attachment 30874D |
| Description 30806B | Description 30876D | | 0..1 30878D | GDT 30880D | Description 30882D |
| Item 30808B | Item 30884D | | 0..n 30886D | AGDT 30888D | QuoteItem 30890D |

Fig. 308H

| | | | | | |
|---|---|---|---|---|---|
| QuoteMessage 30820 | | | | | |
| Quote 30830 | | | | | |
| Item 30808B | ID 30892D | | 1 30894D | GDT 30896D | BusinessTransaction DocumentItemID 30898D |
| | ContractTarget Amount 30800E | | 0..1 30802E | GDT 30804E | Amount 30806E |
| | Hierarchy Relationship 30808E | | 0..1 30810E | | |
| | | ParentItemID 30812E | 1 30814E | GDT 30816E | BusinessTransaction DocumentItemID 30818E |
| | | TypeCode 30820E | 1 30822E | GDT 30824E | BusinessTransaction DocumentItemHierarchy RelationshipTypeCode 30826E |
| Product Information 30828E | Product 30846E | | 0..1 30848E | | BusinessTransaction DocumentProduct 30850E |
| | | StandardID 30852E | 0..n 30854E | CDT 30856E | ProductStandardID 30858E |

Fig. 308I

QuoteMessage 30820

Quote 30830

Item 30808B

| | | | | | | | | |
|---|---|---|---|---|---|---|---|---|
| Product Information 30828E | | | | BuyerID 30860E | | 0..1 30862E | CDT 30864E | ProductPartyID 30866E |
| | | | | BidderID 30868E | | 0..1 30870E | CDT 30872E | ProductPartyID 30874E |
| | | | | ManufacturerID 30876E | | 0..1 30878E | CDT 30880E | ProductPartyID 30882E |
| | | | | TypeCode 30884E | | 0..1 30886E | GDT 30888E | ProductTypeCode 30890E |
| | | | | Note 30892E | | 0..1 30894E | GDT 30896E | Note 30898E |
| | | | Product Category 30800F | | | 0..1 30802F | | BusinessTransaction DocumentProduct 30804F |
| | | | | StandardID 30806F | | 0..n 30808F | CDT 30810F | ProductCategory StandardID 30812F |
| | | | | BuyerID 30814F | | 0..1 30816F | CDT 30818F | ProductCategoryPartyID 30820F |

Fig. 308J

QuoteMessage 30820

Quote 30830

Item 30808B

| | | | | | |
|---|---|---|---|---|---|
| Product Information 30828E | | BidderID 30822F | | CDT 30824F | ProductCategoryPartyID 30826F |
| Price Information 30830E | Price 30828F | | 0..1 30830F | | |
| | | NetUnitPrice 30832F | 0..1 30834F | AGDT 30836F | Price 30838F |
| Party 30832E | BuyerParty 30840F | | 0..1 30842F | AGDT 30844F | BusinessTransactionDocument Party 30846F |
| | BidderParty 30848F | | 0..1 30850F | AGDT 30852F | BusinessTransactionDocument Party 30854F |
| | Product Recipient Party 30856F | | 0..1 30858F | AGDT 30860F | BusinessTransactionDocument Party 30862F |
| | VendorParty 30864F | | 0..1 30866F | AGDT 30868F | BusinessTransactionDocument Party 30870F |

Fig. 308K

QuoteMessage 30820

Quote 30830

Item 30808B

| | | | | | |
|---|---|---|---|---|---|
| Party 30832E | Manufacturer Party 30872F | | 0..1 30874F | AGDT 30876F | BusinessTransaction DocumentParty 30878F |
| Location 30834E | ShipToLocation 30880F | | 0..1 30882F | AGDT 30884F | BusinessTransaction DocumentLocation 30886F |
| | | StandardID 30888F | 0..n 30890F | CDT 30892F | LocationStandardID 30894F |
| | | BuyerID 30896F | 0..1 30898F | CDT 30800G | LocationPartyID 30802G |
| | | BidderID 30804G | 0..1 30806G | CDT 30808G | LocationPartyID 30810G |
| | | Address 30812G | 0..1 30814G | AGDT 30816G | Address 30818G |
| Delivery Information 30836E | DeliveryTerms 30820G | | 0..1 30822G | AGDT 30824G | DeliveryTerms 30826G |
| | | MaximumLead TimeDuration 30828G | 0..1 30830G | GDT 30832G | Duration 30834G |

Fig. 308L

| | | | | | |
|---|---|---|---|---|---|
| QuoteMessage 30820 | | | | | |
| Quote 30830 | | | | | |
| Item 30808B | | | | | |
| Delivery Information 30836E | | Incoterms 30836G | 0..1 30838G | GDT 30840G | Incoterms 30842G |
| Business Transaction Document Reference 30838E | RFQ Reference 30844G | | 0..1 30846G | GDT 30848G | BusinessTransaction DocumentReference 30850G |
| | | ID 30852G | 1 30854G | GDT 30856G | BusinessTransaction DocumentID 30858G |
| | | ItemID 30860G | 0..n 30862G | GDT 30864G | BusinessTransaction DocumentItemID 30866G |
| Attachment 30840E | Attachment 30868G | | 0..n 30870G | GDT 30872G | Attachment 30874G |
| Description 30842E | Description 30876G | | 0..1 30878G | GDT 30880G | Description 30882G |
| Schedule Line 30844E | Schedule Line 30884G | | 0..1 30886G | AGDT 30888G | QuoteItemScheduleLine 30890G |

Fig. 308M

| | | | | |
|---|---|---|---|---|
| QuoteMessage 30820 | | | | |
| Quote 30830 | | | | |
| Item 30808B | | | | |
| Schedule Line 30844E | ID 30892G | 0..1 30894G | GDT 30896G | BusinessTransaction DocumentItemScheduleLineID 30898G |
| | Delivery Period 30800H | 1 30802H | AGDT 30804H | DateTimePeriod 30806H |
| | Quantity 30808H | 0..1 30810H | GDT 30812H | Quantity 30814H |

Fig. 309A

| Package 30900 | L1 30902 | L2 30904 | L3 30906 | L4 30908 | L5 30910 | L6 30912 | Card 30914 | Type 30916 | Name 30918 |
|---|---|---|---|---|---|---|---|---|---|
| RFQResult Message 30920 | RFQResult Message 30922 | | | | | | | MDT 30924 | RFQResultMessage 30926 |
| Message Header 30928 | | Message Header 30932 | | | | | 1 30934 | AGDT 30936 | BusinessDocument MessageHeader 30938 |
| | | | ID 30940 | | | | 1 30942 | GDT 30944 | BusinessDocument MessageID 30946 |
| | | | Reference ID 30948 | | | | 0..1 30950 | GDT 30952 | BusinessDocument MessageID 30954 |
| | | | Creation DateTime 30956 | | | | 1 30958 | GDT 30960 | DateTime 30962 |
| | | | Sender Party 30964 | | | | 0..1 30966 | AGDT 30968 | BusinessDocument MessageHeader Party 30970 |

Fig. 309B

| RFQResultMessage 30920 | | | | | | | | |
|---|---|---|---|---|---|---|---|---|
| Message Header 30928 | | | InternalID 30972 | | 0..1 30974 | CDT 30976 | PartyInternalID 30978 |
| | | | StandardID 30980 | | 0..n 30982 | CDT 30984 | PartyStandardID 30986 |
| | | | Contact 30988 | | 0..1 30990 | GDT 30992 | ContactPerson 30994 |
| | | | | InternalID 30996 | 0..n 30998 | CDT 30900A | ContactPersonInternalID 30902A |
| | | | | BuyerID 30904A | 0..1 30906A | CDT 30908A | ContactPersonPartyID 30910A |
| | | | | BidderID 30912A | 0..1 30914A | CDT 30916A | ContactPersonPartyID 30918A |
| | | | | Address 30920A | 0..1 30922A | AGDT 30924A | Address 30926A |
| | | Recipient Party 30928A | | | 0..n 30930A | AGDT 30932A | BusinessDocumentMessage HeaderParty 30934A |

Fig. 309C

RFQResultMessage 30920

| | | | | | | | |
|---|---|---|---|---|---|---|---|
| RFQ Result 30930 | RFQ Result 30936A | | | | 1 30938A | AGDT 30940A | RFQResult 30942A |
| | | ID 30944A | | | 1 30946A | GDT 30948A | BusinessTransaction DocumentID 30950A |
| Party 30952A | | Bidder Party 30958A | | | 0..1 30960A | AGDT 30962A | BusinessTransaction DocumentParty 30964A |
| Descrip-tion 30954A | | Description 30966A | | | 0..1 30968A | GDT 30970A | Description 30972A |
| Item 30956A | | Item 30974A | | | 0..n 30976A | AGDT 30978A | RFQResultItem 30980A |
| | | | ID 30982A | | 1 30984A | GDT 30986A | BusinessTransaction DocumentItemID 30988A |
| | | | Hierarchy Relationship 30990A | | 0..1 30992A | | |
| | | | | Parent ItemID 30994A | 1 30996A | GDT 30998A | BusinessTransaction DocumentItemID 30900B |

Fig. 309D

| | | | | | | |
|---|---|---|---|---|---|---|
| RFQResultMessage 30920 | | | | | | |
| RFQResult 30930 | | | | | | |
| Item 30956A | | | TypeCode 30902B | 1 30904B | GDT 30906B | BusinessTransactionDocumentItemHierarchyRelationshipTypeCode 30908B |
| | Business Trans-action Document Reference 30910B | Quote Reference 30914B | | 0..1 30916B | GDT 30918B | BusinessTransactionDocumentReference 30920B |
| | | | ID 30922B | 1 30924B | GDT 30926B | BusinessTransactionDocumentID 30928B |
| | | | ItemID 30930B | 0..n 30932B | GDT 30934B | BusinessTransactionDocumentItemID 30936B |
| | Schedule Line 30912B | ScheduleLine 30938B | | 0..1 30940B | AGDT 30942B | RFQResultItemScheduleLine 30944B |
| | | | ID 30946B | 0..1 30948B | GDT 30950B | BusinessTransactionDocumentItemScheduleLineID 30952B |
| | | | Delivery Period 30954B | 1 30956B | AGDT 30958B | DateTimePeriod 30960B |
| | | | Quantity 30962B | 0..1 30964B | GDT 30966B | Quantity 30968B |

CONSISTENT SET OF INTERFACES DERIVED FROM A BUSINESS OBJECT MODEL

CROSS-REFERENCE TO RELATED APPLICATIONS

The following identified U.S. patent applications are relied upon and are incorporated herein by reference in this application in their entirety:

U.S. Patent Application No. 60/577,453, entitled "Interfaces Derived from a Business Object Model Shared by the Heterogeneous Applications," filed on Jun. 4, 2004.

U.S. Patent Application No. 60/581,252, entitled "Interfaces Derived from a Business Object Model Shared by Heterogeneous Applications," filed on Jun. 18, 2004.

U.S. Patent Application No. 60/582,949, entitled "Interfaces Derived from a Business Object Model Shared by Heterogeneous Applications," filed on Jun. 25, 2004.

U.S. Patent Application No. 60/656,598, entitled "Interfaces Derived from a Business Object Model Shared by Heterogeneous Applications," filed on Feb. 25, 2005.

U.S. Patent Application No. 60/669,310, entitled "Interfaces Derived from a Business Object Model Shared by Heterogeneous Applications," filed on Apr. 7, 2005.

TABLE OF CONTENTS

I. Cross-Reference To Related Applications
II. Field Of The Invention
III. Background
IV. Summary Of The Invention
V. Brief Description Of The Drawings
VI. Detailed Description
A. Overview
B. Implementation Details
1. Message Overview
a) Message Categories
(1) Information
(2) Notification
(3) Query
(4) Response
(5) Request
(6) Confirmation
b) Message Choreography
(1) Master Data Management
(2) Purchasing and Sales
(a) Source of Supply, Purchase Requirement, and Purchase Order
(b) Product Demand, Product Forecast and Product Activity
(c) RFQ and Quote
(d) Purchasing
(e) Sales
(f) Vendor Managed Inventory/Responsive Replenishment
(3) Delivery and Goods Movement
(a) Advanced Shipment Notification and Proof of Delivery
(b) Service Acknowledgement
(c) Inventory Change
(4) Invoice and Payment and Financials
(a) Billing Due
(b) Invoicing Due
(c) Invoice
(d) Invoice Accounting and Payment Due
(e) Tax Due
(f) Credit Worthiness, Credit Agency Report, Credit Payment, and Credit Commitment
(5) Human Capital Management
(a) Personnel Time Sheet
2. Components of the Business Object Model
a) Data Types
(1) CoreComponentTypes (CCTs)
(a) Amount
(b) BinaryObject
(c) Code
(d) DateTime
(e) ElectronicAddress
(f) Identifier
(g) Indicator
(h) Measure
(i) Numeric
(j) Quantity
(k) Text
(2) Global Data Types
(a) Acceptance Status Code
(b) AccountingObjectSet
(c) ActionCode
(d) ActiveIndicator
(e) Address
(f) AdjustmentReasonCode
(g) AllowedIndicator
(h) Amount
(i) AmountBalanceIndicator
(j) AspectID
(k) Attachment
(l) AttachmentWebAddress
(m) BatchID
(n) BiddingConditionCode
(o) BusinessDocumentMessageHeader
(p) BusinessDocumentMessageHeaderParty
(q) BusinessDocumentMessageID
(r) BusinessTransactionBlockedIndicator
(s) CompletedIndicator
(t) BusinessTransactionDocumentGroupID
(u) BusinessTransactionDocumentID
(v) BusinessTransactionDocumentItemGroupID
(w) BusinessTransactionDocumentItemHierarchy RelationshipTypeCode
(x) BusinessTransactionDocumentItemID
(y) BusinessTransactionDocumentItemSchedule LineID
(z) ThirdPartyIndicator
(aa) BusinessTransactionDocument-ItemTypeCode
(bb) BusinessTransactionDocumentLocation
(cc) BusinessTransactionDocumentParty
(dd) BusinessTransactionDocument-PricingIndicator
(ee) BusinessTransactionDocumentProduct
(ff) BusinessTransactionDocument-ProductCategory
(gg) BusinessTransactionDocument-PublicIndicator
(hh) BusinessTransactionDocumentReference
(ii) BusinessTransactionDocumentSettlement RelevanceIndicator
(jj) BusinessTransactionDocument-ShipFromLocation
(kk) BusinessTransactionDocument-ShipToLocation
(ll) BusinessTransactionDocumentTransshipment Location (mm) BusinessTransactionDocumentTypeCode
(nn) BusinessTransactionExecutionStatusCode
(oo) BusinessTransactionPriorityCode
(pp) BusinessTransactionTypeCode
(qq) CashDiscount
(rr) CashDiscountTerms
(ss) CatalogueID
(tt) CatalogueItemID
(uu) CatalogueReference
(vv) CatalogueSchemaID
(ww) CatalogueSchemaTypeCode
(xx) CatalogueSectionID
(yy) CatalogueSectionTypeID
(zz) CatalogueTypeCode
(aaa) CatalogueViewID
(bbb) CompleteTransmissionIndicator
(ccc) ConsignmentIndicator
(ddd) ContactPerson
(eee) ContactPersonID
(fff) ContactPersonInternalID
(ggg) ContactPersonPartyID
(hhh) CounterValue
(iii) CountryCode
(jjj) CreditAgencyReportQueryReasonCode
(kkk) CreditAgencyReportRetrievalPermissionIndicator
(lll) CreditAgencyReportScoring
(mmm) CreditCommitmentTypeCode
(nnn) CreditRatingCode
(ooo) CreditRiskClassCode
(ppp) CreditSegmentInternalID
(qqq) CreditWorthinessChangeReasonCode
(rrr) CreditWorthinessCheckingRuleCode
(sss) CreditWorthinessCheckingSeverityCode
(ttt) CreditWorthinessIndicator
(uuu) CurrencyCode
(vvv) DangerousGoods
(www) DangerousGoodsID
(xxx) DangerousGoodsIndicator
(yyy) DangerousGoodsRegulationsCode
(zzz) Date
(aaaa) DatePeriod
(bbbb) DateTime
(cccc) DateTimePeriod
(dddd) DecimalValue
(eeee) DeletedIndicator
(ffff) DeliveryScheduleTypeCode
(gggg) DeliveryTerms
(hhhh) Description
(iiii) DigitNumberValue
(jjjj) DirectMaterialIndicator
(kkkk) DunningCounterValue
(llll) DunningLevelValue
(mmmm) Duration
(nnnn) EmailAddress
(oooo) EvaluatedReceiptSettlementIndicator
(pppp) ExchangeRate
(qqqq) ExponentialRepresentationTypeCode
(rrrr) FixedIndicator
(ssss) FloatValue
(tttt) FollowUpBusinessTransactionDocumentRequirementCode
(uuuu) FollowUpMessageRequirementCode
(vvvv) GeoCoordinates
(wwww) HandlingUnit
(xxxx) Incoterms
(yyyy) InformationOutdatedIndicator
(zzzz) IntegerValue
(aaaaa) InterfaceElementID
(bbbbb) IntervalBoundaryTypeCode
(ccccc) InventoryUsabilityStatusCode
(ddddd) InvoiceCancellationInvoiceIndicator
(eeeee) InvoiceIntraCorporateIndicator
(fffff) LanguageCode
(ggggg) LanguageDependencyIndicator
(hhhhh) LegalEventTypeCode
(iiiii) LocationID
(jjjjj) LocationInternalID
(kkkkk) LocationPartyID
(lllll) LocationStandardID
(mmmmm) LogItem
(nnnnn) LogItemSeverityCode
(ooooo) Measure
(ppppp) MeasureUnitCode
(qqqqq) MeasureUnitMeaningCode
(rrrrr) MessageTypeCode
(sssss) Name
(ttttt) Note
(uuuuu) ObjectStructureRelationshipTypeCode
(vvvvv) OrdinalNumberValue
(wwwww) PartialDelivery
(xxxxx) PartyID
(yyyyy) PartyInternalID
(zzzzz) PartyPartyID
(aaaaaa) PartyStandardID
(bbbbbb) PaymentCard
(cccccc) PaymentCardID
(dddddd) PaymentFormCode
(eeeeee) Percent
(ffffff) PersonName
(gggggg) PersonnelTimeEventID
(hhhhhh) PersonnelTimeEventTypeID
(iiiiii) PersonnelTimeID
(jjjjjj) PersonnelTimeTypeID
(kkkkkk) PhoneNumber
(llllll) Price
(mmmmmm) PriceComponent
(nnnnnn) PriceComponentTypeCode
(oooooo) PriceTimeSeries
(pppppp) ProcurementCostUpperLimit
(qqqqqq) ProductCategoryID
(rrrrrr) ProductCategoryInternalID
(ssssss) ProductCategoryPartyID
(tttttt) ProductCategoryStandardID
(uuuuuu) ProductChangeID
(vvvvvv) ProductDemandInfluencingEventStatusCode
(wwwwww) ProductDemandInfluencingEventTypeCode
(xxxxxx) ProductDiscontinuationIndicator
(yyyyyy) ProductID
(a) Proprietary ID, Standard Agency
(zzzzzz) ProductInternalID
(aaaaaaa) CDT ProductPartyID
(bbbbbbb) ProductStandardID
(ccccccc) GDT ProductTax
(ddddddd) ProductTaxEventTypeCode
(eeeeeee) ProductTaxTypeCode
(fffffff) ProductTypeCode
(ggggggg) PromotionID
(hhhhhhh) Property
(iiiiiii) PropertyDataType
(jjjjjjj) PropertyDataTypeFormatCode
(kkkkkkk) PropertyDataTypeID (lllllll) PropertyDataTypeReference
(mmmmmmm) PropertyDefinitionClass
(nnnnnnn) PropertyDefinitionClassID
(ooooooo) PropertyDefinitionClassReference
(ppppppp) PropertyDefinitionClassTypeCode
(qqqqqqq) PropertyID
(lllllll) PropertyMultipleValueIndicator
(sssssss) PropertyParametricSearchableIndicator
(ttttttt) PropertyReference
(uuuuuuu) PropertyValuation
(vvvvvvv) PropertyValuationRequiredIndicator
(wwwwwww) PropertyValue
(xxxxxxx) PurchaseOrderOrderedIndicator
(yyyyyyy) PurchasingGroupID
(zzzzzzz) Quantity
(aaaaaaaa) QuantityDiscrepancyCode
(bbbbbbbb) QuantityTimeSeries
(cccccccc) QuantityTolerance
(dddddddd) Recurrence
(eeeeeeee) RegionCode
(ffffffff) RequiredIndicator
(gggggggg) RevisionQuantityTimeSeries
(hhhhhhhh) ScaleAxisIntervalBoundaryTypeCode
(iiiiiiii) ScheduleLineCommitmentCode
(jjjjjjjj) ScoreCardID
(kkkkkkkk) SubContractingIndicator
(llllllll) SubHierarchyDefinitionIndicator
(mmmmmmmm) SubjectAreaCode
(nnnnnnnn) TaxJurisdictionCode
(oooooooo) TextSearchableIndicator
(pppppppp) Time
(qqqqqqqq) TimePeriod
(rrrrrrrr) TimeSeries
(ssssssss) TimeZoneDifferenceValue
(tttttttt) TotalNumberValue
(uuuuuuuu) TransmissionID
(vvvvvvvv) TransportMeans
(wwwwwwww) TransportMeansDescriptionCode
(xxxxxxxx) TransportModeCode
(yyyyyyyy) TransportServiceLevelCode
(zzzzzzzz) TransportTracking
(aaaaaaaaa) TupleLengthValue
(bbbbbbbbb) UnplannedItemPermissionCode
(ccccccccc) ValueDifferenceIndicator
(ddddddddd) ValueUnlimitedIndicator
(eeeeeeeee) VersionID
(fffffffff) VisibleIndicator
(ggggggggg) WebAddress
(hhhhhhhhh) WorkAgreementID
b) Entities
c) Packages
d) Relationships
(1) Cardinality of Relationships
(2) Types of Relationships
(a) Composition
(b) Aggregation
(c) Association
(3) Specialization
e) Structural Patterns
(1) Item
(2) Hierarchy
3. Creation of the Business Object Model
AdditionalRecipientID
ContactPersonID
RecipientAddress
4. Structure of the Business Object Model
5. Interfaces Derived from Business Object Model
6. Use of an Interface
7. Use of Interfaces Across Industries
C. Exemplary Interfaces
a) Purchase Requirement Interfaces
(1) Message Types
(a) Purchase Requirement Request
(b) Purchase Requirement Confirmation
(2) Message Choreography
(3) Message Data Type Purchase Requirement Message
(a) Purchase Requirement Party Package
(i) Buyer Party
(ii) Seller Party
(iii) Proposed Seller Party
(iv) Requestor Party
(v) Product Recipient Party
(vi) Manufacturer Party
(b) Purchase Requirement Location Package
(i) Ship To Location
(ii) Ship From Location
(c) Purchase Requirement Package
(i) Purchase Requirement Item
(ii) Hierarchy Relationship
(iii) Purchase Requirement Item Product Information Package
(a) Product
(b) Product Category
(iv) Purchase Requirement Item Price Information Package
(a) Price
(b) Procurement Cost Upper Limit
(v) Purchase Requirement Item Party Package
(vi) Purchase Requirement Item Location Package
(vii) Purchase Requirement Item Business Transaction Document Reference Package
(a) Purchase Contract Reference
(b) Origin Purchase Order Reference
(viii) Purchase Requirement Item Attachment Package
(ix) Purchase Requirement Item Description Package
(x) Purchase Requirement Item Schedule Line Package
(4) Message Data Type Element Structure
b) Source of Supply Notification Interface
(1) Message Choreography
(2) Message Data Type Source of Supply Message
(a) Message Header package
(b) Source of Supply Package
(i) Business Transaction Document Reference
(c) Purchase Contract Reference
(a) Scheduling Agreement Reference
(ii) Party
(a) Buyer Party
(b) Seller party
(iii) Location
(iv) Product Information
(v) Price Information
(a) Price
(b) Price Scale
(c) Price Scale Line
(3) Message Data Type Element Structure
c) Purchase Order Interfaces
(1) Message Types
(a) Purchase Order Request
(b) Purchase Order Change Request
(c) Purchase Order Cancellation Request
(d) Purchase Order Confirmation (2) Message Choreography
(a) Process Flow
(b) Error Handling
(c) Message Operations
(3) Message Data Type Purchase Order Message
(a) Message Header Package
(b) Purchase Order Package
(i) Purchase Order Party Package
(ii) Purchase Order Location Package
(iii) Purchase Order Delivery Information Package
(iv) Purchase Order Payment Information Package
(v) Purchase Order Attachment Package
(vi) Purchase Order Description Package
(vii) Purchase Order Follow Up Message Package
(viii) Purchase Order Item Package
(a) Hierarchy Relationship
(b) Purchase Order Item Product Information Package
(c) Purchase Order Item Price Information Package
(d) Purchase Order Item Batch Package
(e) Purchase Order Item Configuration Package
(f) Purchase Order Item Party Package
(g) Purchase Order Item Location Package
(h) Purchase Order Item Delivery Information Package
(i) Purchase Order Item Business Transaction Document Reference Package
(j) Purchase Order Item Attachment Package
(k) Purchase Order Item Description Package
(l) Purchase order Item Schedule Line Package
(4) Message Data Type Purchase Order Cancellation Message
d) Service Acknowledgement Interfaces
(1) Message Choreography
(2) Message Data Type Service Acknowledgement Message
(a) Message Header Package
(b) Service Acknowledgement Package
(i) Service Acknowledgement Party Package
(ii) Service Acknowledgement Location Package
(iii) Service Acknowledgement Attachment Package
(iv) Service Acknowledgement Description Package
(v) Service Acknowledgement Item Package
(a) Hierarchy Relationship
(b) Service Acknowledgement Item Product Information Package
(c) Service Acknowledgement Item Price Information Package
(d) Service Acknowledgement Item Party Package
(e) Service Acknowledgement Item Location Package
(f) Service Acknowledgement Item Business Transaction Document Reference Package
(g) Service Acknowledgement Item Attachment Package
(h) Service Acknowledgement Item Description Package
(3) Message Data Type Element Structure
e) RFQ, RFQ Cancellation, RFQ Result, Quote Interfaces
(1) Message Choreography
(2) Message Data Type RFQ Message
(a) Message Header Package
(i) RFQ Package
(ii) RFQ Party Package
(iii) RFQ Location Package
(iv) RFQ Delivery Information Package
(v) RFQ Payment Information package
(vi) RFQ Product Information Package
(vii) RFQ Business Transaction Document Reference Package
(viii) RFQ Follow-Up Business Transaction Document Package
(ix) RFQ Attachment Package
(x) RFQ Description Package
(xi) RFQ Item Package
(a) RFQ Item Product Information Package
(b) RFQ Item Party Package
(c) RFQ Item Location Package
(d) RFQ Item Delivery Information Package
(e) RFQ Item Business Transaction Document Reference Package
(f) RFQ Item Attachment Package
(g) RFQ Item Description Package
(h) RFQ Item Schedule Line Package
(3) Message Data Type RFQ Cancellation Message
(a) Message Header Package
(b) RFQ Cancellation Package
(4) Message Data Type Quote Message
(a) Message Header Package
(b) Quote Package
(i) Quote Party Package
(ii) Quote Location Package
(iii) Quote Delivery Information Package
(iv) Quote Payment Information Package
(v) Quote Product Information Package
(vi) Quote Business Transaction Document Reference Package
(vii) Quote Attachment Package
(viii) Quote Description Package
(ix) Quote Item Package
(a) Quote Item Product Information Package
(b) Quote Item Price Information Package
(c) Quote Item Party Package
(d) Quote Item Location Package
(e) Quote Item Delivery Information Package
(f) Quote Item Business Transaction Document Reference Package
(g) Quote Item Attachment Package
(h) Quote Item Description Package
(i) Quote Item Schedule Line Package
(5) Message Data Type RFQ Result Message
(a) Message Header Package
(b) RFQ Result Package
(i) RFQ Result Party Package
(ii) RFQ Result Description Package
(iii) RFQ Result Item Package
(a) RFQ Result Item Business Transaction Document Reference Package
(b) RFQ Result item Schedule Line Package
(6) Message Data Type Element Structure
(a) Data Type RFQ Message
(b) Data Type RFQ Cancellation Message
(c) Data Type Quote Message
(d) Data Type RFQ Result Message
VII. ABSTRACT OF THE DISCLOSURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the generation and use of consistent interfaces derived from a business object model. More particularly, the invention relates to the generation and use of consistent interfaces that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

The United Nations established the United Nations Centre for Trade Facilitation and Electronic Business ("UN/CEFACT") to improve worldwide coordination for the exchange of information. The primary focus of UN/CEFACT is to facilitate national and international transactions by simplifying and harmonizing processes, procedures and information flow to contribute to the growth of global commerce. UN/CEFACT is still in its early stages of developing such a harmonized system. Additional information regarding UN/CEFACT can be found at http://www.unece.org/cefact/.

Currently many standards exist, which offer a variety of interfaces used to exchange business information. Most of these interfaces, however, apply to only one specific industry, and are not consistent between the different standards. Moreover, a number of these interfaces are not consistent within an individual standard. Thus, there is a need for the harmonization of interfaces across these standards and across various industries.

SUMMARY OF THE INVENTION

Methods and systems consistent with the present invention facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjoint, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax.

Methods and systems consistent with the present invention generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Methods and systems consistent with the present invention provide a consistent set of interfaces that are suitable for use with more than one industry. This consistency is reflected at a structural level as well as through the semantic meaning of the elements in the interfaces.

Methods and systems consistent with the present invention provide an object model and, from this object model, derive two or more interfaces that are consistent.

Methods and systems consistent with the present invention provide a consistent set of interfaces suitable for use with a business scenario that spans across the components within a company. These components, or business entities, may be heterogeneous.

Additionally, methods and systems consistent with the present invention provide a consistent set of interfaces suitable for use with different businesses.

In accordance with methods consistent with the present invention, a method is provided for generating an invoice request in a data processing system. The method comprises the steps of providing a data structure comprising an invoice message entity and an invoice package, wherein the invoice package comprises an invoice entity, a party package and an item package, wherein the party package comprises a bill-to-party entity and a bill-from-party entity and the item package comprises an item entity arranged hierarchically using a hierarchy relationship and a price information package, wherein the price information package comprises a price entity, receiving values for the fields in the data structure, and storing the values into the data structure to generate the invoice request.

In accordance with methods consistent with the present invention, a method is provided for generating an invoice confirmation in a data processing system. The method comprises the steps of receiving an invoice request, responsive to the receiving step, providing a data structure comprising an invoice message entity and an invoice package, wherein the invoice package comprises an invoice entity, a party package and an item package, wherein the party package comprises a bill-to-party entity and a bill-from-party entity and the item package comprises an item entity arranged hierarchically using a hierarchy relationship and a price information package, wherein the price information package comprises a price entity, receiving values for the fields in the data structure, and storing the values into the data structure to generate the invoice confirmation.

Other systems, methods, features and advantages of the invention will be or will become apparent to one with skill in the art upon examination of the following figures and detailed description. It is intended that such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 25-251 depict the data type structures in accordance with methods and systems consistent with the present invention;

FIGS. 280A-K depict the element structure for the Invoice interfaces in accordance with methods and systems consistent with the present invention;

FIGS. 290A-G depict the element structure for the Purchase Requirement interfaces in accordance with methods and systems consistent with the present invention;

FIGS. 293A-D depict the element structure for the Source of Supply interface in accordance with methods and systems consistent with the present invention;

FIGS. 297A-Y depict the element structure for the Purchase Order interfaces in accordance with methods and systems consistent with the present invention;

FIGS. 300A-L depict the element structure for the Service Acknowledgement interfaces in accordance with methods and systems consistent with the present invention;

FIGS. 306A-O depict the element structure for the RFQ interfaces in accordance with methods and systems consistent with the present invention;

FIGS. 307A-C depict the element structure for the RFQ Cancellation interfaces in accordance with methods and systems consistent with the present invention;

FIGS. 308A-M depict the element structure for the Quote interfaces in accordance with methods and systems consistent with the present invention;

FIGS. 309A-D depict the element structure for the RFQ Request interfaces in accordance with methods and systems consistent with the present invention;

DETAILED DESCRIPTION

Figure 1:
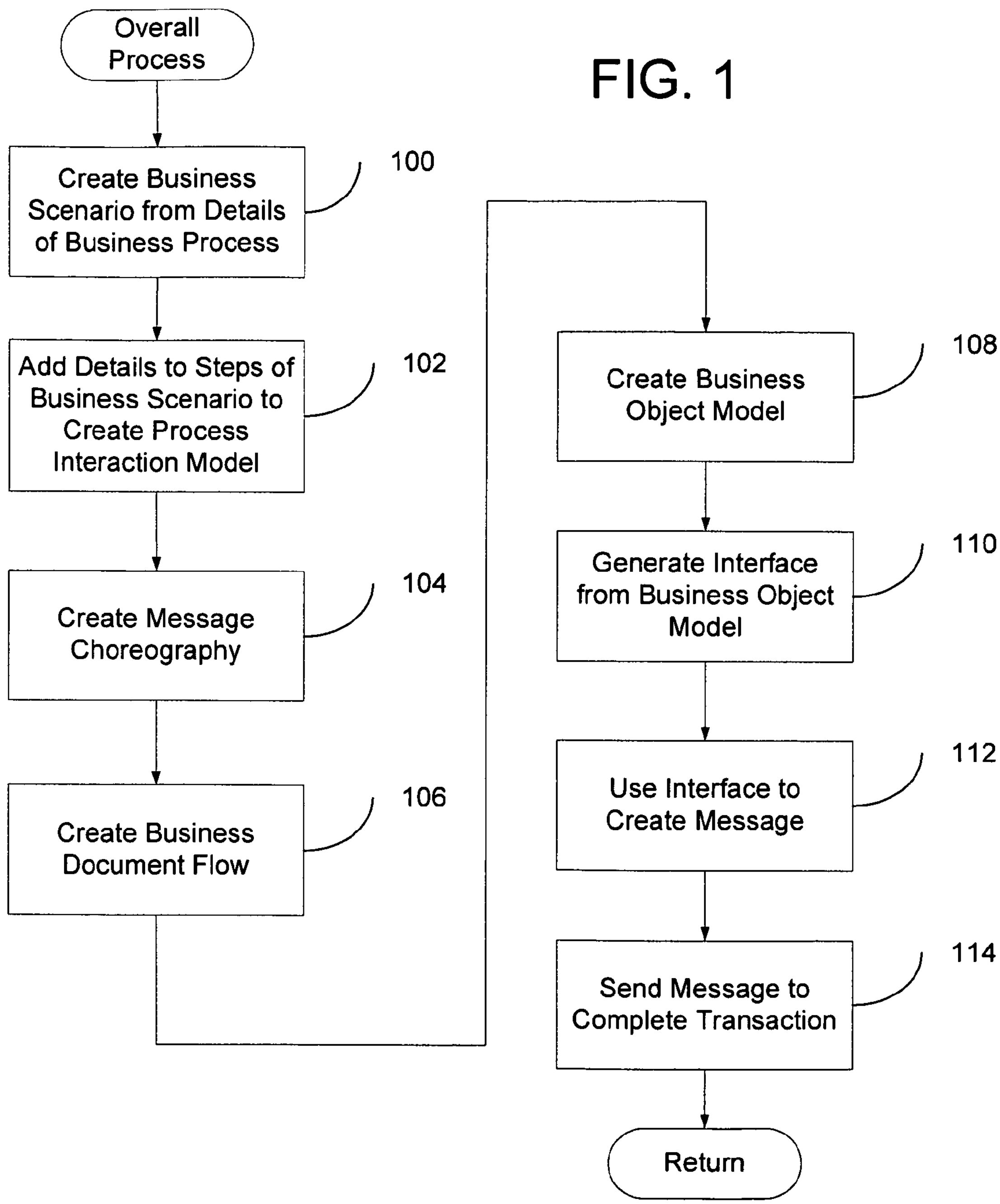
FIG. 1 depicts a flow diagram of the overall steps performed by methods and systems consistent with the present invention.

Reference will now be made in detail to an implementation consistent with the present invention as illustrated in the accompanying drawings. Wherever possible, the same reference numbers will be used throughout the drawings and the following description to refer to the same or like parts.

A. Overview

Methods and systems consistent with the present invention facilitate e-commerce by providing consistent interfaces that are suitable for use across industries, across businesses, and across different departments within a business during a business transaction. To generate consistent interfaces, methods and systems consistent with the present invention utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Without cross-component consistency, different conceptual approaches lead to different interface structures, resulting in incompatible interfaces. For example, FIGS. 1A-C depict three different approaches to a transport condition 102*a*, 102*b*, 102*c*, which specifies how products are to be transported. The transport condition 102*a*, 102*b*, 102*c*, considers a business partner 104*a*, 104*b*, 104*c*, a product 106*a*, 106*b*, 106*c*, and a combination of the business partner and the product 108*a*, 108*b*, 108*c*.

As depicted in FIG. 1A, the transport condition 102*a* may depend on the business partner 104*a*. Alternatively, as depicted in FIG. 1B, the transport condition 102*b* may depend on the product 106*b*. As a third alternative, the transport condition 102*c* may depend on the combination of the business partner and the product 108*c*. These three conceptual models represent three different object models that may be used to derive interfaces.

Figure 1A:
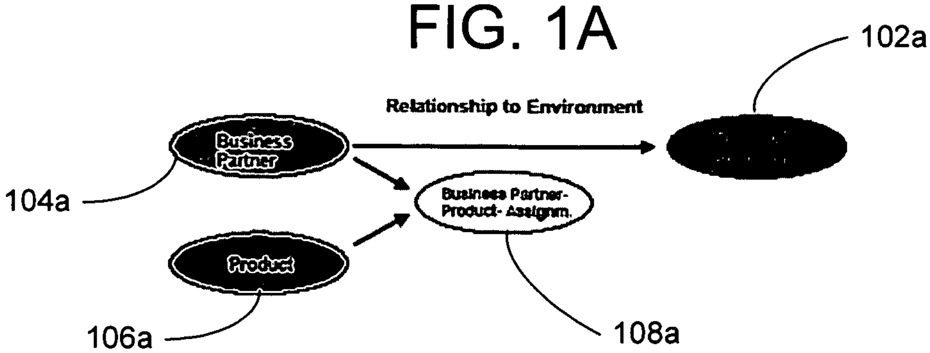
FIGS. 1A-1G depict problems that may arise without the use of consistent interfaces.
Figure 1B:
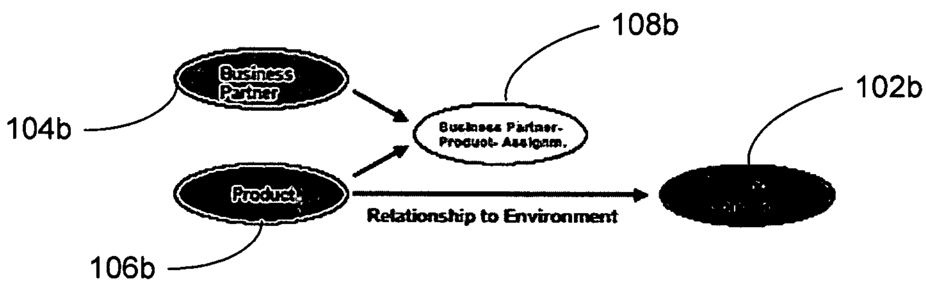
Figure 1C:
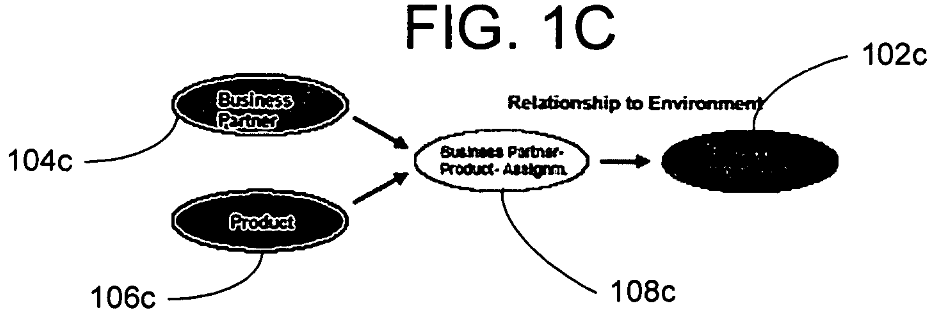
Figure 1D:
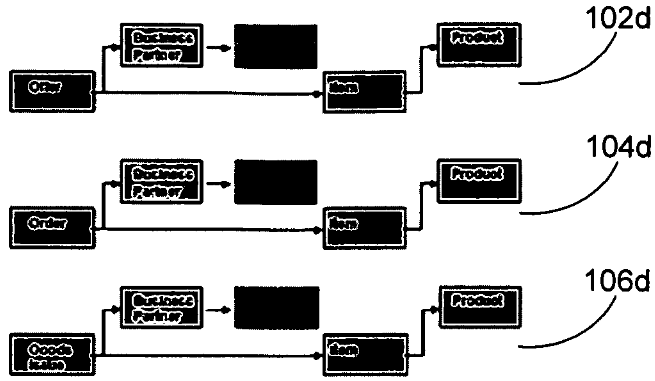
Figure 1E:
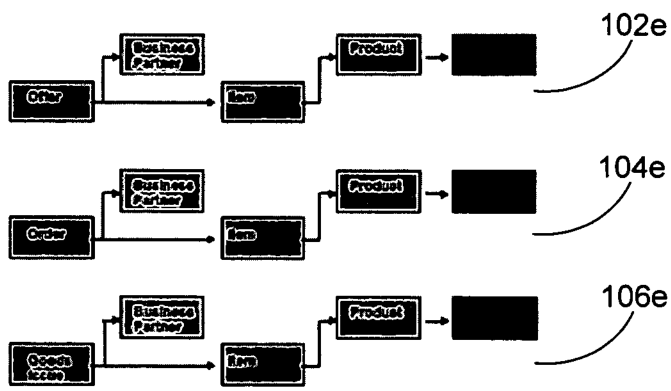
Figure 1F:
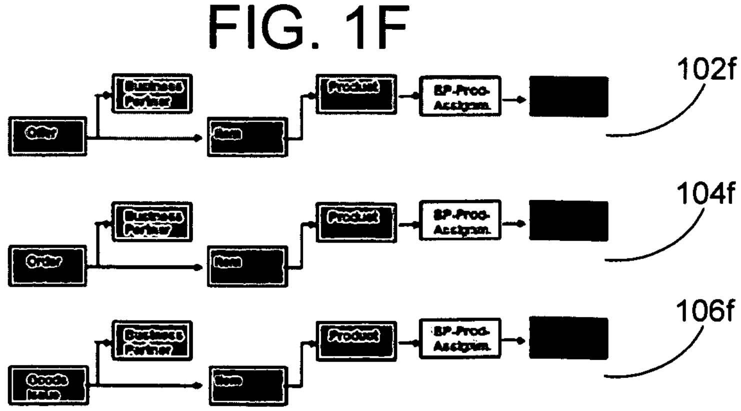
Figure 1G:
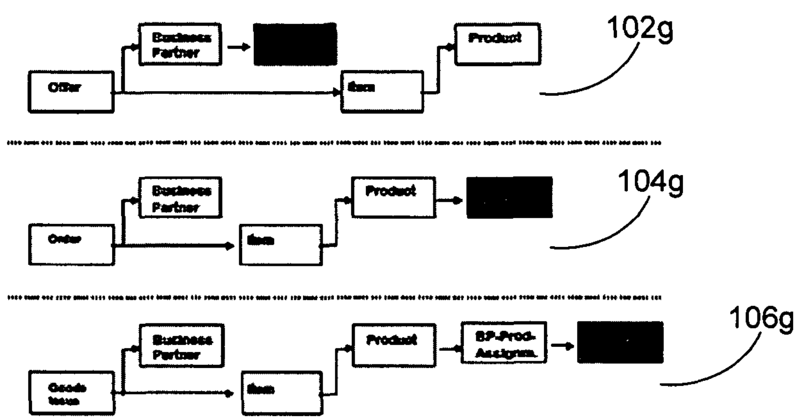

FIGS. 1D-F depict the resulting consistent interfaces from these object models. In particular, FIG. 1D depicts an interface for quotations 102*d*, an interface for purchase orders 104*d* and an interface for goods issued 106*d* derived using the conceptual model depicted in FIG. 1A. FIG. 1E depicts these same respective interfaces 102*e*, 104*e*, 106*e* derived using the conceptual model depicted in FIG. 1B. FIG. 1F depicts these same respective interfaces 102*f*, 104*f*, 106*f* derived using the conceptual model depicted in FIG. 1C. As depicted in FIG. 1G, inconsistent interfaces 102*g*, 104*g*, 106*g* result without a cross-component understanding of a transport condition.

FIG. 1 depicts a flow diagram of the overall steps performed by methods and systems consistent with the present invention. Initially, to generate the business object model, design engineers study the details of a business process, and model the business process using a "business scenario" (step

Figure 2:
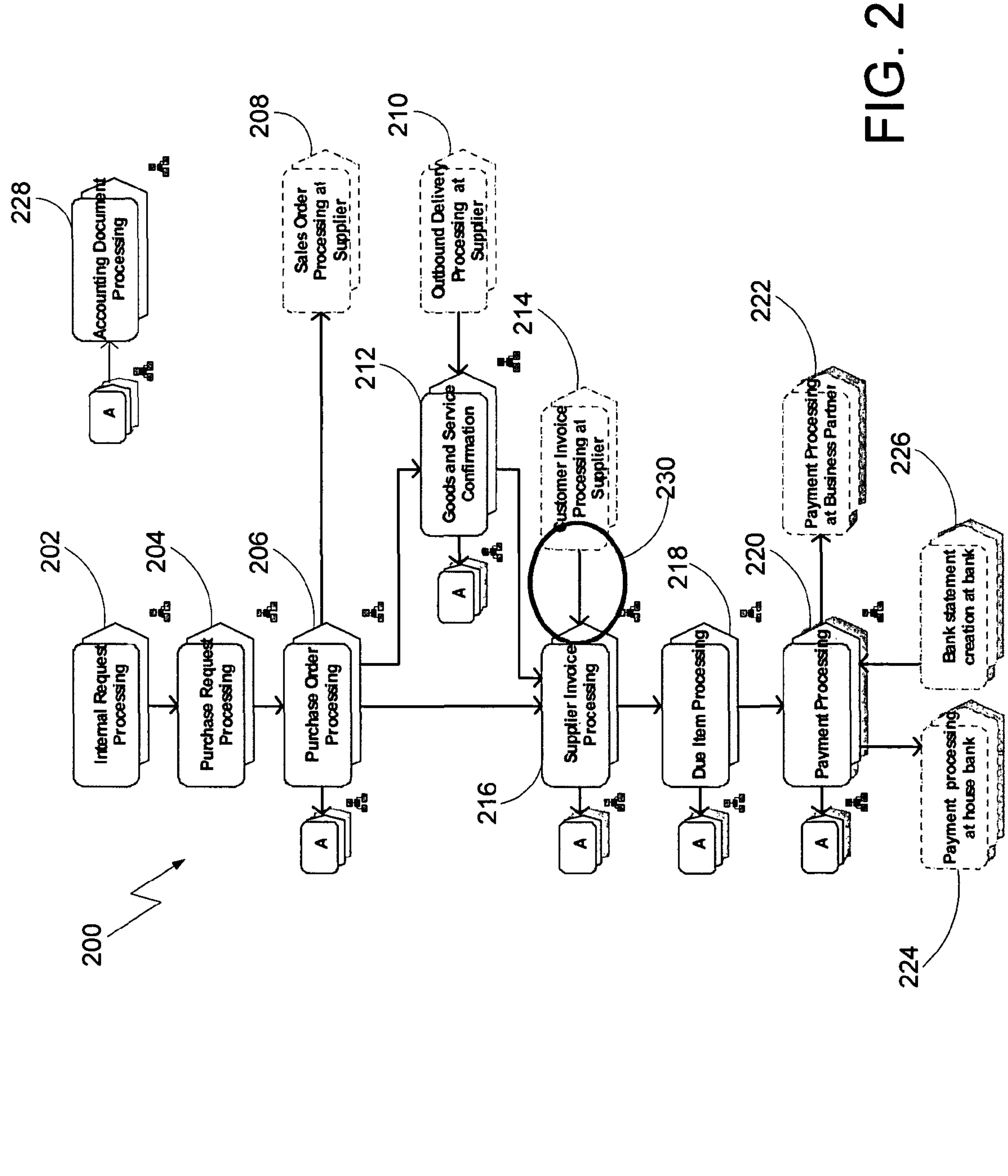
FIG. 2 depicts a scenario variant model in accordance with methods and systems consistent with the present invention.

100). The business scenario identifies the steps performed by the different business entities during a business process. Thus, the business scenario is a complete representation of a clearly defined business process. For example, in FIG. 2, a scenario variant model is used to depict an illustrative business scenario for a Maintenance Repair Operation ("MRO") Procurement 200. The developers use these scenario variant models to depict the individual process steps performed by the business entities during the business process.

For an MRO Procurement, the customer initially processes an internal request (step 202). The internal request corresponds to the customer's internal documentation for the requested maintenance or repair. The customer then processes a purchase request (step 204). The purchase request corresponds to the customer's internal documentation for a specific product or service related to the maintenance or repair. Next, the customer processes a purchase order (step 206), which is sent to the supplier. This prompts the supplier to process a sales order (step 208). The sales order is the supplier's internal documentation regarding the requested product or service. After processing the sales order, the supplier processes an outbound delivery (step 210), which is the supplier's internal documentation identifying the products or services that will be provided to the customer. The supplier then sends a goods and services confirmation to the customer (step 212). Next, the supplier processes a customer invoice (step 214) and sends the invoice to the customer. Upon receiving the invoice, the customer processes the supplier invoice (step 216). The customer also processes a due item (step 218). The due item summarizes the information regarding the product or service ordered by the customer. Next, the customer processes the payment (step 220) by sending the payment information to the business partner and sending the payment information to the house bank. After receiving the payment information, the business partner processes the payment (step 222), and the bank processes the payment (step 224). The bank also creates a bank statement (step 226) and forwards the bank statement information to the customer. During the MRO Procurement, the customer also processes an accounting document (step 228). The accounting document is the customer's internal documentation regarding the payment to the supplier.

Figure 3:
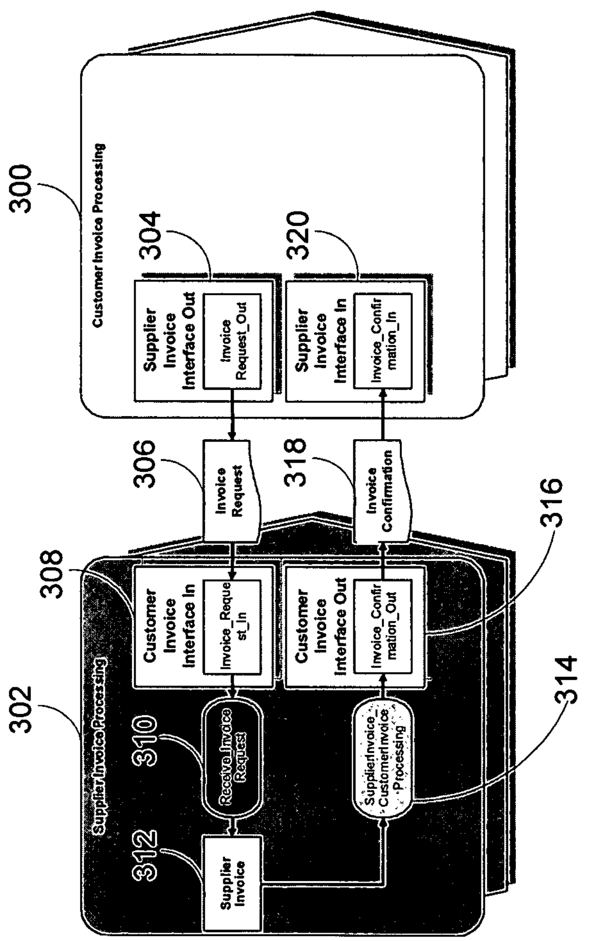
FIG. 3 depicts a process interaction model for invoice processing in accordance with methods and systems consistent with the present invention.

Returning to the overall process in FIG. 1, after creating the business scenario, the developers add details to each step of the business scenario (step 102). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components. For example, FIG. 3 depicts the process interaction model for the invoice processing 230 between the supplier 300, which processes the customer invoice, and the customer 302, which processes the supplier invoice.

The supplier uses an Invoice Request Out interface 304 to send an Invoice Request message 306 to the customer. The customer uses the Invoice Request In interface 308 to receive the Invoice Request message (step 310), and to create an internal instantiation of the supplier invoice 312. The customer processes the supplier invoice (step 314), and uses an Invoice Confirmation Out interface 316 to send an Invoice Confirmation 318 to the supplier. The supplier uses an Invoice Confirmation In interface 320 to receive the Invoice Confirmation 318.

Returning to FIG. 1, after creating the process interaction model, the developers create a "message choreography" (step 104), which depicts the messages transmitted between the two components in the process interaction model. The developers then represent the transmission of the messages between the components during a business process in a "business document flow" (step 106). Thus, the business document flow illustrates the flow of information between the business entities during a business process.

Figure 4:
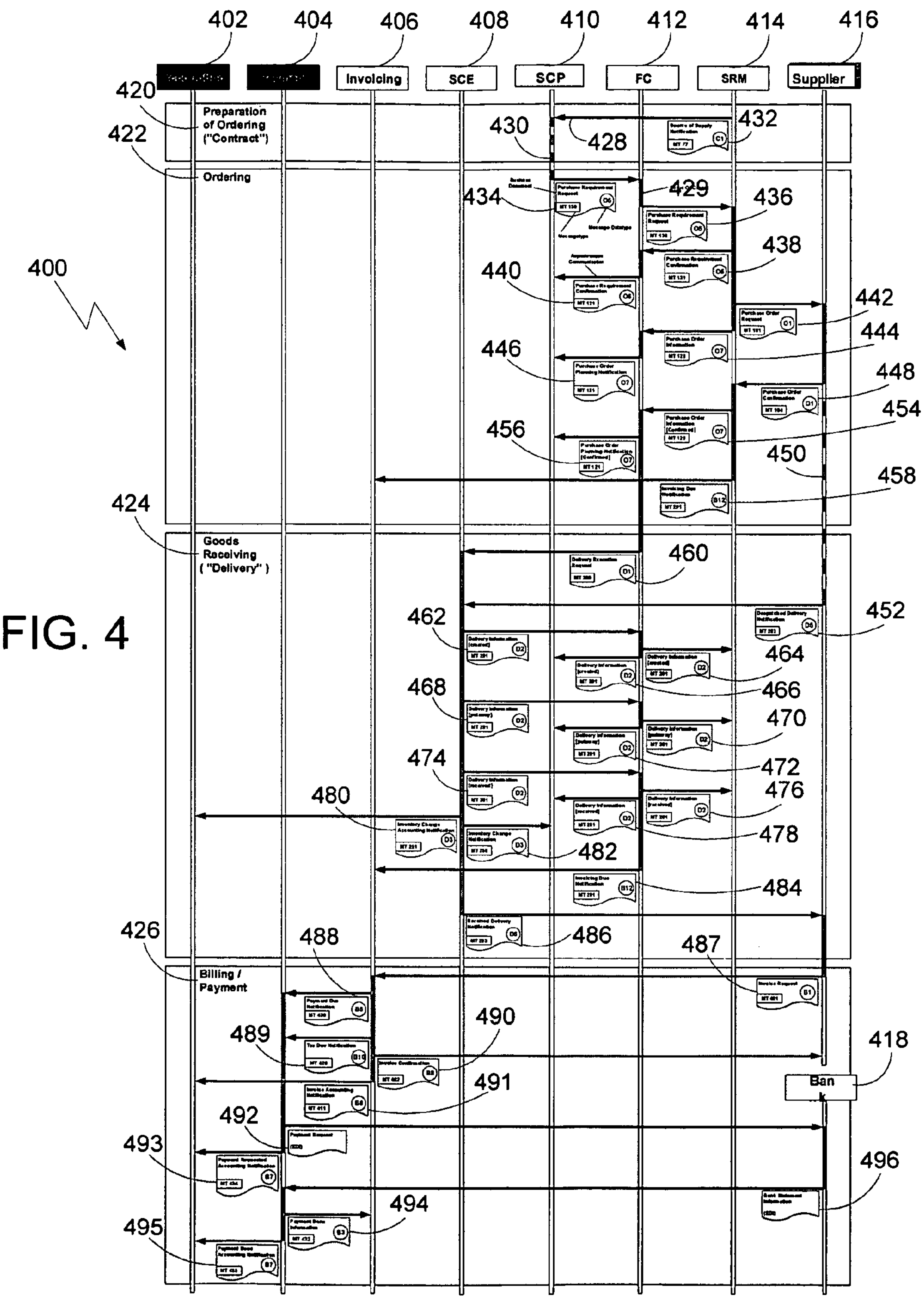
FIG. 4 depicts an exemplary business document flow for an invoice request in accordance with methods and systems consistent with the present invention.

FIG. 4 depicts an exemplary business document flow 400 for the process of purchasing a product or service. The business entities involved with the illustrative purchase process include Accounting 402, Payment 404, Invoicing 406, Supply Chain Execution ("SCE") 408, Supply Chain Planning ("SCP") 410, Fulfillment Coordination ("FC") 412, Supply Relationship Management ("SRM") 414, Supplier 416, and Bank 418. The business document flow 400 is divided into four different transactions: Preparation of Ordering ("Contract") 420, Ordering 422, Goods Receiving ("Delivery") 424, and Billing/Payment 426. In the business document flow, arrows 428 represent the transmittal of documents. Each document reflects a message transmitted between entities. The process flow follows the focus of control, which is depicted as a solid vertical line (e.g., 429) when the step is required, and a dotted vertical line (e.g., 430) when the step is optional.

During the Contract transaction 420, the SRM 414 sends a Source of Supply Notification 432 to the SCP 410. This step is optional, as illustrated by the optional control line 430 coupling this step to the remainder of the business document flow 400.

During the Ordering transaction 422, the SCP 410 sends a Purchase Requirement Request 434 to the FC 412, which forwards a Purchase Requirement Request 436 to the SRM 414. The SRM 414 then sends a Purchase Requirement Confirmation 438 to the FC 412, and the FC 412 sends a Purchase Requirement Confirmation 440 to the SCP 410. The SRM 414 also sends a Purchase Order Request 442 to the Supplier 416, and sends Purchase Order Information 444 to the FC 412. The FC 412 then sends a Purchase Order Planning Notification 446 to the SCP 410. The Supplier 416, after receiving the Purchase Order Request 442, sends a Purchase Order Confirmation 448 to the SRM 414, which sends a Purchase Order Information confirmation message 454 to the FC 412, which sends a message 456 confirming the Purchase Order Planning Notification to the SCP 410. The SRM 414 then sends an Invoice Due Notification 458 to Invoicing 406.

During the Delivery transaction 424, the FC 412 sends a Delivery Execution Request 460 to the SCE 408. The Supplier 416 could optionally 450 send a Despatched Delivery Notification 452 to the SCE 408. The SCE 408 then sends a message 462 to the FC 412 notifying the FC 412 that the request for the Delivery Information was created. The FC 412 then sends a message 464 notifying the SRM 414 that the request for the Delivery Information was created. The FC 412 also sends a message 466 notifying the SCP 410 that the request for the Delivery Information was created. The SCE 408 sends a message 468 to the FC 412 when the goods have been set aside for delivery. The FC 412 sends a message 470 to the SRM 414 when the goods have been set aside for delivery. The FC 412 also sends a message 472 to the SCP 410 when the goods have been set aside for delivery.

The SCE 408 sends a message 474 to the FC 412 when the goods have been delivered. The FC 412 then sends a message 476 to the SRM 414 indicating that the goods have been delivered, and sends a message 478 to the SCP 410 indicating that the goods have been delivered. The SCE 408 then sends an Inventory Change Accounting Notification 480 to Accounting 402, and an Inventory Change Notification 482 to the SCP 410. The FC 412 sends an Invoice Due Notification 484 to Invoicing 406, and SCE 408 sends a Received Delivery Notification 486 to the Supplier 416.

During the Billing/Payment transaction 426, the Supplier 416 sends an Invoice Request 487 to Invoicing 406. Invoicing 406 then sends a Payment Due Notification 488 to Payment 404, a Tax Due Notification 489 to Payment 404, an Invoice Confirmation 490 to the Supplier 416, and an Invoice Accounting Notification 491 to Accounting 402. Payment 404 sends a Payment Request 492 to the Bank 418, and a Payment Requested Accounting Notification 493 to Accounting 402. Bank 418 sends a Bank Statement Information 496 to Payment 404. Payment 404 then sends a Payment Done Information 494 to Invoicing 406 and a Payment Done Accounting Notification 495 to Accounting 402.

Within a business document flow, business documents having the same or similar structures are marked. For example, in the business document flow 400 depicted in FIG. 4, Purchase Requirement Requests 434, 436 and Purchase Requirement Confirmations 438, 440 have the same structures. Thus, each of these business documents is marked with an "O6." Similarly, Purchase Order Request 442 and Purchase Order Confirmation 448 have the same structures. Thus, both documents are marked with an "O1." Each business document or message is based on a message type. The message type is identified within the rectangle within each of the business documents depicted in the business document flow. For example, Source of Supply Notification 432 is based on message type 77, as reflected by "MT 77." A list of various message types with their corresponding codes and a description of each message type is provided below.

| Code | Name | Description |
|---|---|---|
| 0077 | Source of Supply Notification | A SourceOfSupplyNotification is a notice to Supply Chain Planning about available sources of supply. |
| 0080 | Catalogue Update Notification | A CatalogueUpdateNotification is a notice from a catalogue provider to an interested party about a new catalogue transmitted in the message or about changes to an existing catalogue transmitted in the message. |
| 0081 | Catalogue Publication Request | A CataloguePublicationRequest is a request from catalogue authoring to the Catalogue Search Engine (the publishing system) to publish a new or changed catalogue or to delete an already published catalogue (the catalogue is possibly split into several transmission packages). |
| 0082 | CataloguePublication TransmissionPackage Notification | A CataloguePublicationTransmissionPackageNotification is the notification of the Catalogue Search Engine (the publishing system) to Catalogue Authoring about a package of a catalogue publication transmission and information about the reception of this package and the validity of its content. |
| 0083 | CataloguePublication Confirmation | A CataloguePublicationConfirmation is the confirmation of the Catalogue Search Engine (the publishing system) to Catalogue Authoring whether the publication or deletion of a catalogue requested by a CataloguePublicationRequest was successful or not. |
| 0084 | CataloguePublication Transmission CancellationRequest | A CataloguePublicationTransmissionCancellationRequest is the request of Catalogue Authoring to Catalogue Search Engine (the publishing system) to cancel the transmission of a catalogue and to restore an earlier published state (if such exists) of the catalogue. Moreover, no more packages are sent for this transmission. |
| 0085 | CataloguePublication TransmissionCancellation Confirmation | A CataloguePublicationTransmissionCancellationConfirmation is the confirmation of Catalogue Search Engine (the publishing system) whether the transmission of a catalogue has been cancelled successfully and an earlier published state of this catalogue (if such exists) has been restored or not. |
| 0086 | CataloguePublication TransmissionItemLock Request | A CataloguePublicationTransmissionItemLockRequest is the request of Catalogue Authoring to lock single items of the catalogue contained in the catalogue publication transmission. |
| 0087 | Catalogue Publication Transmission Item Lock Confirmation | A CataloguePublicationTransmissionItemLockConfirmation is the confirmation of Catalogue Search Engine (the publishing system) to Catalogue Authoring whether single items of the catalogue contained in the catalogue publication transmission could be locked or not. To lock means that if the catalogue is not yet published the items must not be published and if the catalogue is already published, the publication of these items must be revoked. |
| 0101 | Purchase Order Request | A PurchaseOrderRequest is a request from a purchaser to a seller to deliver goods or provide services. |
| 0102 | Purchase Order Change Request | A Purchase OrderChangeRequest is a change to a purchaser's request to the seller to deliver goods or provide services. |
| 0103 | Purchase Order Cancellation Request | A PurchaseOrderCancellationRequest is the cancellation of a purchaser's request to the seller to deliver goods or provide services. |

-continued

| Code | Name | Description |
|---|---|---|
| 0104 | Purchase Order Confirmation | A PurchaseOrderConfirmation is a confirmation, partial confirmation, or change from a seller to the purchaser, regarding the requested delivery of goods or provision of services. |
| 0120 | Purchase Order Information | A PurchaseOrderInformation is information from a purchasing system for interested recipients about the current state of a purchase order when creating or changing a purchase order, confirming a purchase order or canceling a purchase order. |
| 0121 | Purchase Order Planning Notification | A PurchaseOrderPlanningNotification is a message by means of which planning applications are notified about those aspects of a purchase order that are relevant for planning. |
| 0130 | Purchase Requirement Request | A PurchaseRequirementRequest is a request from a requestor to a purchaser to (externally) procure products (materials, services) (external procurement). |
| 0131 | Purchase Order Requirement Confirmation | A PurchaseRequirementConfirmation is a notice from the purchaser to the requestor about the degree of fulfillment of a requirement. |
| 0140 | Product Demand Influencing Event Notification | A ProductDemandInfluencingEventNotification is a notification about an event which influences the supply or demand of products. |
| 0141 | Product Forecast Notification | A ProductForecastNotification is a notification about future product demands (forecasts). |
| 0142 | Product Forecast Revision Notification | A ProductForecastRevisionNotification is a notification about the revision of future product demands (forecasts). |
| 0145 | Product Activity Notification | A ProductActivityNotification is a message which communicates product-related activities of a buyer to a vendor. Based on this, the vendor can perform supply planning for the buyer. |
| 0151 | RFQ Request | An RFQRequest is the request from a purchaser to a bidder to participate in a request for quotation for a product. |
| 0152 | RFQ Change Request | An RFQChangeRequest is a change to the purchaser's request for a bidder to participate in the request for quotation for a product. |
| 0153 | RFQ Cancellation Request | An RFQCancellationRequest is a cancellation by the purchaser of a request for quotation for a product. |
| 0154 | RFQ Result Notification | An RFQResultNotification is a notification by a purchaser to a bidder about the type and extent of the acceptance of a quote or about the rejection of the quote. |
| 0155 | Quote Notification | A QuoteNotification is the quote of a bidder communicated to a purchaser concerning the request for quotation for a product by the purchaser. |
| 0160 | Sales Order Fulfillment Request | A SalesOrderFulfillmentRequest is a request (or change or cancellation of such a request) from a selling component to a procuring component, to fulfill the logistical requirements (e.g., available-to-promise check, scheduling, requirements planning, procurement, and delivery) of a sales order. |
| 0161 | Sales Order Fulfillment Confirmation | A SalesOrderFulfillmentConfirmation is a confirmation, partial confirmation or change from the procuring component to the selling component, regarding a sales order with respect to which procurement has been requested. |
| 0185 | Order ID Assignment Notification | An OrderIDAssignmentNotification is a message that allows a buyer to assign a vendor order numbers for identifying "purchase orders generated by the vendor." |
| 0200 | Delivery Execution Request | A DeliveryExecutionRequest is a request to a warehouse or supply chain execution to prepare and execute the outbound delivery of goods or the acceptance of an expected or announced inbound delivery. |
| 0201 | Delivery Information | A DeliveryInformation is a message about the creation, change, and execution status of a delivery. |
| 0202 | Despatched Delivery Notification | A DespatchedDeliveryNotification is a notification communicated to a product recipient about the planned arrival, pickup, or issue date of a ready-to-send delivery, including details about the content of the delivery. |
| 0203 | Received Delivery Notification | A ReceivedDeliveryNotification is a notification communicated to a vendor about the arrival of the delivery sent by him to the product recipient, including details about the content of the delivery. |
| 0210 | Delivery Schedule Notification | A DeliveryScheduleNotification is a message that is sent from a buyer to a vendor to notify the latter about the quantity of a product to be delivered with a certain liability at a certain date in accordance with a given scheduling agreement between buyer and vendor. |
| 0213 | Vendor Generated Order Notification | A VendorGeneratedOrderNotification is a message that is used by a vendor/seller to transfer the replenishment order that he has initiated and planned to a customer/buyer so that the latter can create a purchase order. The notification sent |

-continued

| Code | Name | Description |
|---|---|---|
| | | by the vendor/seller to the customer/buyer regarding the planned replenishment order can be regarded as a "purchase order generated by the seller." |
| 0214 | Vendor Generated Order Confirmation | VendorGeneratedOrderConfirmation is the confirmation from a customer/buyer that a purchase order has been created for the replenishment order initiated and planned by his vendor/seller.<br>This confirmation from the customer/buyer for a "purchase order generated by the seller" can be regarded as a "purchase order" in the traditional sense, which, in turn, triggers the corresponding fulfillment process at the vendor/seller. |
| 0216 | Replenishment Order Notification. | A ReplenishmentOrderNotification is a message that is used by Logistics Planning (SCP, vendor) to transfer a replenishment order planned for a customer/buyer to Logistics Execution (SCE, vendor) in order to trigger further processing for the order and prepare the outbound delivery. |
| 0217 | Replenishment Order Confirmation | A ReplenishmentOrderConfirmation is a message that is used by Logistics Execution (SCE, vendor) to confirm to Logistics Planning (SCP, vendor) that a replenishment order that is planned for a customer/buyer can be fulfilled. |
| 0240 | Service Acknowledgement Request | A ServiceAcknowledgementRequest is a request by a seller to a purchaser to confirm the services recorded. |
| 0241 | Service Acknowledgement Confirmation | A ServiceAcknowledgementConfirmation is a confirmation (or rejection) of the services recorded. |
| 0250 | Inventory Change Notification | An InventoryChangeNotification is a summery of detailed information about inventory changes in inventory management, which is required for logistics planning. |
| 0251 | Inventory Change Accounting Notification | An InventoryChangeAccountingNotification is a summary of aggregated information about inventory changes in inventory management, which is required for financials. |
| 0252 | Inventory Change Accounting Cancellation Request | An InventoryChangeAccountingCancellationRequest is a request for the full cancellation of posting information previously sent to financials with respect to a goods movement. |
| 0290 | Billing Due Notification | A BillingDueNotification is a notification about billing-relevant data communicated to an application in which the subsequent operative processing of billing takes place. |
| 0291 | Invoicing Due Notification | An InvoicingDueNotification is a notification about invoicing-relevant data communicated to an application in which the operative verification and creation of invoices takes place, and/or in which "self billing" invoices (evaluated receipt settlement) are created. |
| 0292 | Billing Due Cancellation Request | A BillingDueCancellationRequest is a request for the full cancellation of a BillingDueNotification previously sent to billing. |
| 0293 | Invoicing Due Cancellation Request | An InvoicingDueCancellationRequest is a request for the full cancellation of an InvoicingDueNotification previously sent to invoice verification. |
| 0401 | Invoice Request | An InvoiceRequest is a legally binding notice about accounts receivable or accounts payable for delivered goods or provided services - typically a request that payment be made for these goods or services. |
| 0402 | Invoice Confirmation | An InvoiceConfirmation is the response of a recipient of an invoice to the bill-from-party by which the invoice as a whole is confirmed, rejected, or classified as "not yet decided." |
| 0410 | Invoice Issued Information | An InvoiceIssuedInformation is information about provided services, delivered products, or credit or debit memo request items that have been billed, the items of an invoice that have been used for this, and the extent to which they have been billed. |
| 0411 | Invoice Accounting Notification | An InvoiceAccountingNotification is a notification to financials about information on incoming or outgoing invoices from invoice verification or billing. |
| 0412 | Invoice Accounting Cancellation Request | An InvoiceAccountingCancellationRequest is a request for the full cancellation of posting information previously sent to financials, regarding an incoming or outgoing invoice or credit memo. |
| 0420 | Tax Due Notification | A TaxDueNotification communicates data from tax determination and calculation relevant for tax reports and tax payments to the tax register of a company. |
| 0430 | Payment Due Notification | A PaymentDueNotification notifies an application (Payment), in which subsequent operative processing of payments take place, about due dates (accounts receivable and accounts payable) of business partners. |

-continued

| Code | Name | Description |
|---|---|---|
| 0450 | Credit Agency Report Query | A CreditAgencyReportQuery is an inquiry to a credit agency concerning the credit report for a business partner. |
| 0451 | Credit Agency Report Response | A CreditAgencyReportResponse is a response from a credit agency concerning the inquiry about the credit report for a business partner. |
| 0452 | Credit Worthiness Query | A CreditWorthinessQuery is an inquiry to credit management concerning the credit worthiness of a business partner. |
| 0453 | Credit Worthiness Response | A CreditWorthinessResponse is a response from credit management concerning the inquiry about the credit worthiness of a business partner. |
| 0454 | Credit Worthiness Change Information | A CreditWorthinessChangeInformation is information about changes of the credit worthiness of a business partner. |
| 0455 | Credit Commitment Query | A CreditCommitmentQuery is an inquiry from credit management concerning existing payment obligations of a business partner. |
| 0456 | Credit Commitment Response | A CreditCommitmentResponse is a response concerning an inquiry from credit management about existing payment obligations of a business partner. |
| 0457 | Credit Commitment Record Notification | A CreditCommitmentRecordNotification is a notice to credit management about existing payment obligations of business partners. |
| 0458 | Credit Worthiness Critical Parties Query | A CreditWorthinessCriticalPartiesQuery is an inquiry to credit management about business partners, for which the credit worthiness has been rated as critical. |
| 0459 | Credit Worthiness Critical Parties Response | A CreditWorthinessCriticalPartiesResponse is a response from credit management concerning an inquiry about business partners, for which the credit worthiness has been rated as critical. |
| 0460 | Credit Payment Record Notification | A CreditPaymentRecordNotification is a notice to credit management about the payment behavior of business partners. |
| 0601 | Personnel Time Sheet Information | A PersonnelTimeSheetInformation communicates recorded personnel times and personnel time events from an upstream personnel time recording system to personnel time management. |

From the business document flow, the developers identify the business documents having identical or similar structures, and use these business documents to create the business object model (step 108). The business object model includes the objects contained within the business documents. These objects are reflected as packages containing related information, and are arranged in a hierarchical structure within the business object model, as discussed below.

Methods and systems consistent with the present invention then generate interfaces from the business object model (step 110). The heterogeneous programs use instantiations of these interfaces (called "business document objects" below) to create messages (step 112), which are sent to complete the business transaction (step 114). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages exceed the standards, and thus provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the present invention create consistent interfaces by generating the interfaces from a business object model. Details regarding the creation of the business object model, the generation of an interface from the business object model, and the use of an interface generated from the business object model are provided below.

Figure 5:
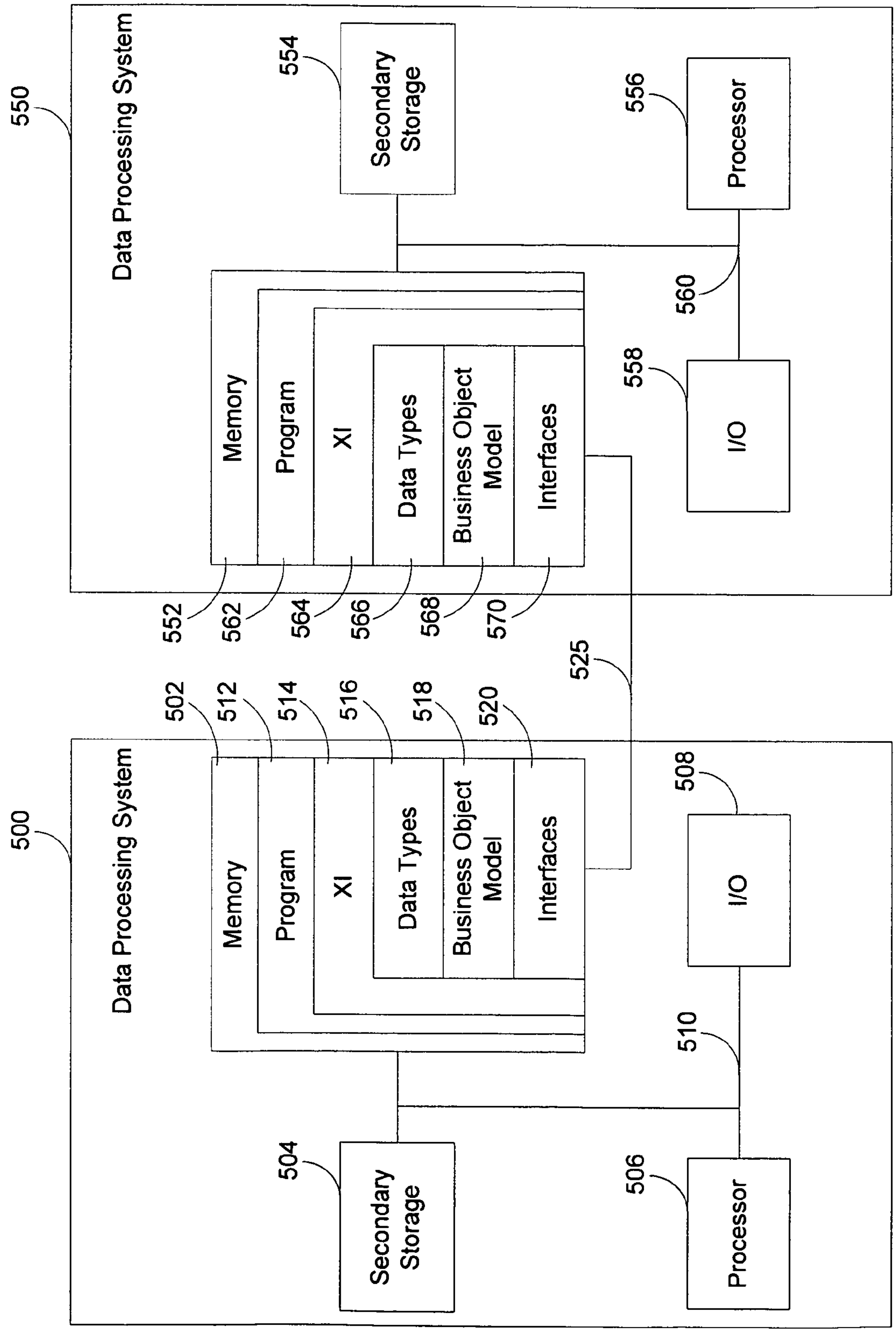
FIG. 5 depicts exemplary data processing systems suitable for practicing methods and systems consistent with the present invention.

FIG. 5 depicts two exemplary data processing systems 500, 550 suitable for practicing methods and systems consistent with the present invention. Data processing system 500 includes a main memory 502, a secondary storage device 504, a processor 506, and an input/output (I/O) device 508. Likewise, data processing system 550 includes a main memory 552, a secondary storage device 554, a processor 556, and an input/output (I/O) device 558. Each data processing system 500, 550 may further comprise standard input devices, such as a keyboard, a mouse or a speech processing means (each not illustrated). The internal components of each data processing system 500, 550 exchange information with one another via system buses 510, 560. The components are standard in most computer systems suitable for use with practicing methods and configuring systems consistent with the present invention. One skilled in the art will recognize that data processing systems 500, 550 may contain additional or different components.

Memory 502 includes program 512, which is an application program that facilitates the transfer of information between business entities. Memory 552 similarly includes program 562, which is an application program that facilitates the transfer of information between business entities. For example, program 512 could be an accounting program that transfers information to program 562, which could be a manufacturing program. Although depicted in two separate data processing systems 500, 550, one having skill in the art will appreciate that programs 512, 562 can reside in the same data processing system, the same computer, and even in the same memory. Each program 512, 562 may comprise or may be included in one or more code sections containing instructions for performing their respective operations. While programs 512, 562 are described as being implemented as software, the present implementation may be implemented as a combination of hardware and software or hardware alone.

Memory 502 also includes an exchange infrastructure ("XI") 514, which is an infrastructure that supports the technical interaction of business processes across heterogeneous system environments. XI centralizes the communication between components within a business entity and between different business entities. If necessary, XI carries out the mapping between the messages. XI is a publicly available product sold by SAP AG, Walldorf, Germany. Similarly, memory 552 includes an XI 564. XI 514, 564 integrates different versions of systems implemented on different platforms (e.g., Java® and ABAP). XI 514, 564 is based on an open architecture, and makes use of open standards, such as XML™ and Java® environments. XI 514, 564 offers services that are useful in a heterogeneous and complex system landscape. In particular, XI 514, 564 offers a runtime infrastructure for message exchange, configuration options for managing business processes and message flow, and options for transforming message contents between sender and receiver systems. XML is a trademark of the Massachusetts Institute of Technology, Institut National de Recherche en Informatique et en Automatique, and Keio University. Java is a registered trademark of Sun Microsystems, Inc. All names used herein may be trademarks or registered trademarks of their respective companies.

XI 514, 564 stores data types 516, 566, a business object model 518, 568, and interfaces 520, 570. The details regarding the business object model are described below. Data types 516, 566 are the building blocks for the business object model 518, 568. The business object model 518, 568 is used to derive consistent interfaces 520, 570. XI 514, 564 allows for the exchange of information from a first company having one computer system to a second company having a second computer system over network connection 525 by using the standardized interfaces 520, 570.

Although not shown in FIG. 5, like all data processing systems, data processing systems 500, 550 have operating systems that control their operations, including the execution of programs 512, 562 by processors 506, 556. Also, although aspects of one implementation consistent with the principles of the present invention are described herein with programs 512, 562 stored in main memories 502, 552, one skilled in the art will appreciate that all or part of systems and methods consistent with the present invention may be stored on or read from other computer-readable media, such as secondary storage devices 504, 554, like hard disks, floppy disks, and CD-ROM; a carrier wave received from a network, such as the Internet; or other forms of ROM or RAM, either currently known or later developed. Finally, although specific components of data processing system 500, 550 have been described, one skilled in the art will appreciate that a data processing system suitable for use with the methods and systems consistent with the present invention may contain additional or different components.

Methods and systems consistent with the present invention provide and use interfaces 520, 570 derived from the business object model 518, 568 suitable for use with more than one business area, for example different departments within a company such as finance, or marketing. Also, they are suitable across industries and across businesses. Interfaces 520, 570 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs.

a) Message Categories

Figure 6:
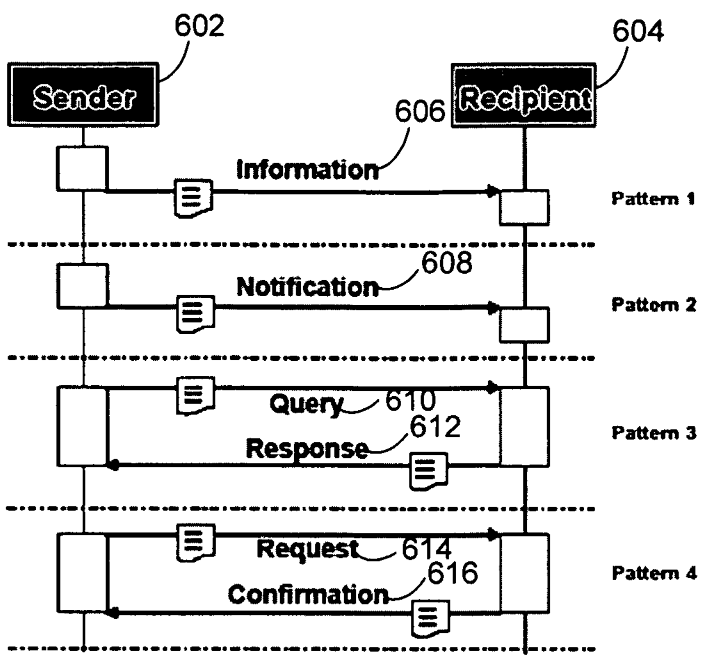
FIG. 6 depicts message categories in accordance with methods and systems consistent with the present invention.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

Figure 7:
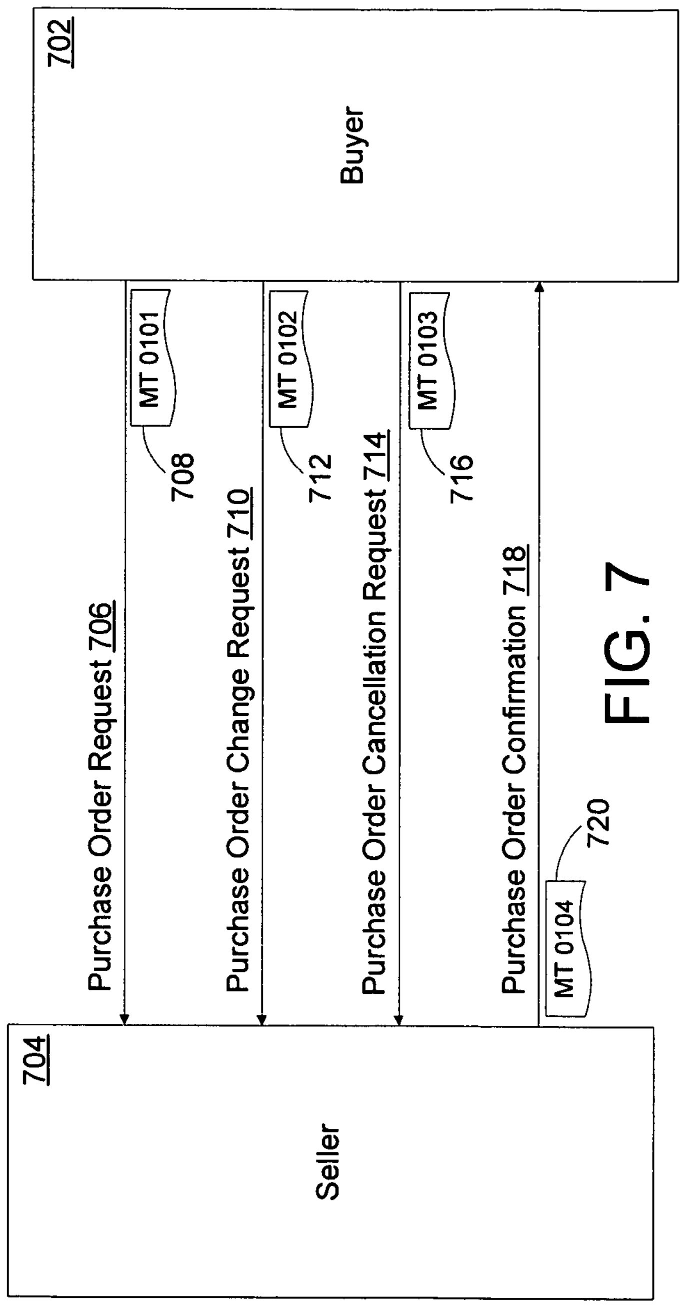
FIG. 7 depicts a message choreography for a purchase order scenario in accordance with methods and systems consistent with the present invention.

For example, the message choreography 700 for a purchase order scenario between buyer 702 and seller 704 is depicted in FIG. 7. A Purchase Order Request Message 706 is the request from the buyer 702 to the seller 704 to deliver goods or render services. The message type 708 of the Purchase Order Request Message 706 is 0101, as defined above. The Purchase Order Change Request Message 710 requests a change of a previous purchase order request or purchase order change request message. The message type 712 of the Purchase Order Change Request Message 710 is 0102. The Purchase Order Cancellation Request Message 714 is the cancellation of the request of the buyer 702 to the seller 704 to deliver goods or render services. The message type 716 of the Purchase Order Cancellation Request Message 714 is 0103. The Purchase Order Confirmation Message 718 is a confirmation, a partial confirmation, or a change with respect to the delivery of goods or the rendering of services that were requested or cancelled. The message type 720 of the Purchase Order Confirmation Message 718 is 0104.

Illustrative message choreographies that cover a number of transactions are presented below.

(1) Master Data Management

Figure 8:
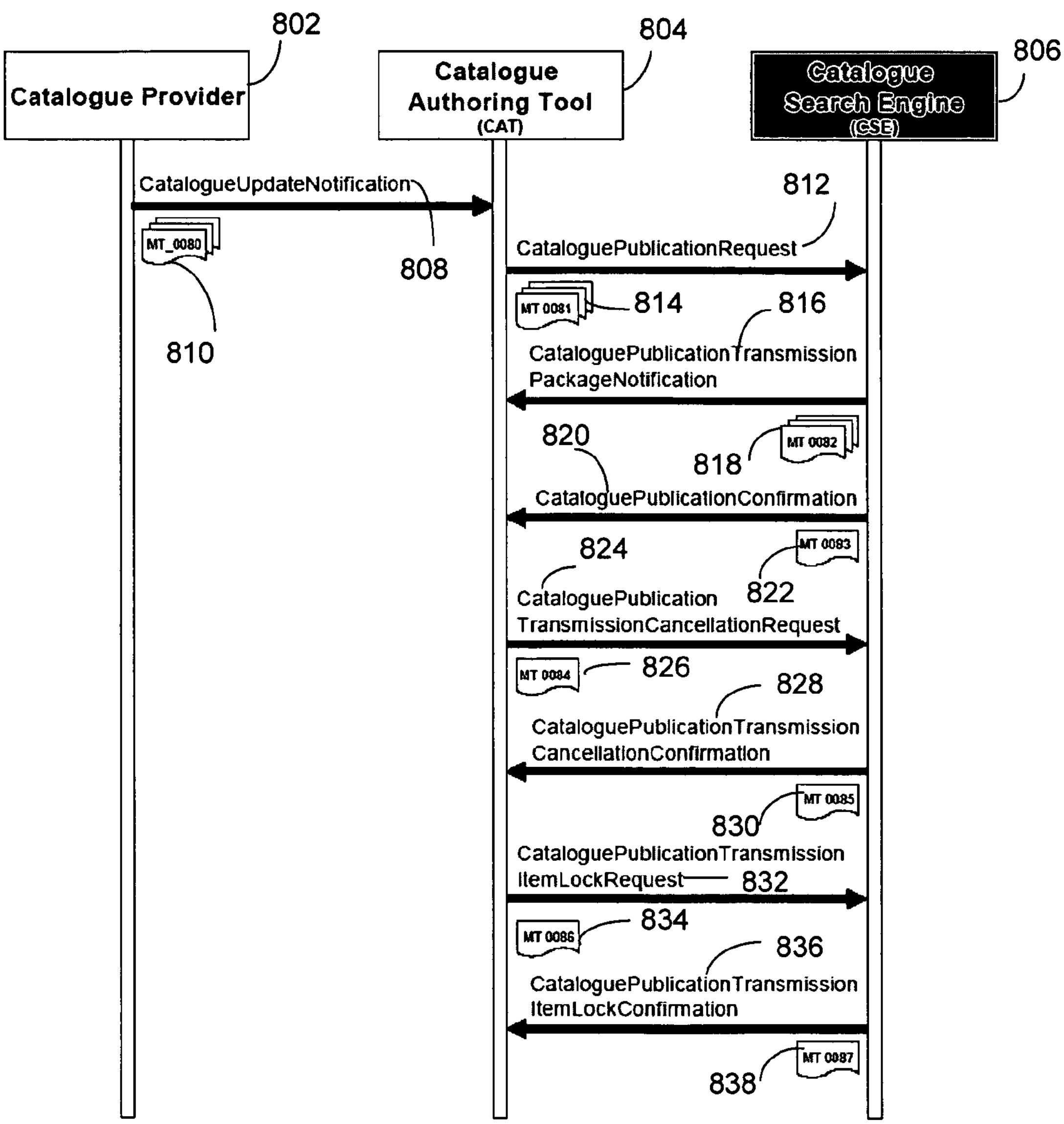
FIG. 8 depicts a message choreography of a Master Data Management in accordance with methods and systems consistent with the present invention.

FIG. 8 depicts the message choreography of a Master Data Management. The Master Data Management choreography involves three components: a Catalogue Provider 802, a Catalogue Authoring Tool (CAT) 804, and a Catalogue Search Engine (CSE) 806. The Catalogue Provider 802 sends a CatalogueUpdateNotification message 808 to the CAT 804. The message type 810 of the CatalogueUpdateNotification message 808 is 0080, i.e., a notice from a catalogue provider to an interested party about a new catalogue transmitted in the message or about changes to an existing catalogue transmitted in the message. The message type 810 can be divided into multiple messages. The CAT 804 then sends a CataloguePublicationRequest message 812 to the CSE 806. The message type 814 of the CataloguePublicationRequest message 812 is 0081, i.e., a request from catalogue authoring to the Catalogue Search Engine (the publishing system) to publish a new or changed catalogue or to delete an already published catalogue (the catalogue is possibly split into several transmission packages). The message type 814 also can be divided into multiple messages.

The CSE 806 sends a CataloguePublicationTransmissionPackageNotification message 816 to the CAT 804. The message type 818 of the CataloguePublicationTransmissionPackageNotification message 816 is 0082, i.e., the notification of the Catalogue Search Engine (the publishing system) to Catalogue Authoring about a package of a catalogue publication transmission and information about the reception of this package and the validity of its content. The message type 818 can be divided into multiple messages.

The CSE 806 sends a CataloguePublicationConfirmation message 820 to the CAT 804. The message type 822 of the CataloguePublicationConfirmation message 820 is 0083, i.e., the confirmation of the Catalogue Search Engine (the publishing system) to the Catalogue Authoring whether the publication or deletion of a Catalogue requested by a CataloguePublicationRequest 812 was successful or not.

The CAT 804 sends a CataloguePublicationTransmissionCancellationRequest message 824 to the CSE 806. The message type 826 of the CataloguePublicationTransmissionCancellationRequest message 824 is 0084, i.e., the request of Catalogue Authoring to Catalogue Search Engine (the publishing system) to cancel the transmission of a Catalogue and to restore an earlier published state (if such exists) of the Catalogue. Moreover, no more packages are sent for this transmission.

The CSE 806 sends a CataloguePublicationTransmissionCancellationConfirmation message 828 to the CAT 804. The message type 830 of the CataloguePublicationTransmissionCancellationConfirmation message 828 is 0085, i.e., the confirmation of Catalogue Search Engine (the publishing system) whether the transmission of a Catalogue has been cancelled successfully and an earlier published state of this catalogue (if such exists) has been restored or not.

The CAT 804 sends a CataloguePublicationTransmissionItemLockRequest message 832 to the CSE 806. The message type 834 of the CataloguePublicationTransmissionItemLockRequest message 832 is 0086, i.e., the request of Catalogue Authoring to lock single items of the catalogue contained in the catalogue publication transmission.

The CSE 806 sends a CataloguePublicationTransmissionItemLockConfirmation message 836 to the CAT 804. The message type 838 of the CataloguePublicationTransmissionItemLockConfirmation message 836 is 0087, i.e., the confirmation of Catalogue Search Engine (the publishing system) to Catalogue Authoring whether single items of the catalogue contained in the catalogue publication transmission could be locked or not. If an item of the catalogue is locked and the catalogue is not yet published, the items must not be published. If the catalogue is already published, the publication of these items must be revoked.

Figure 9:
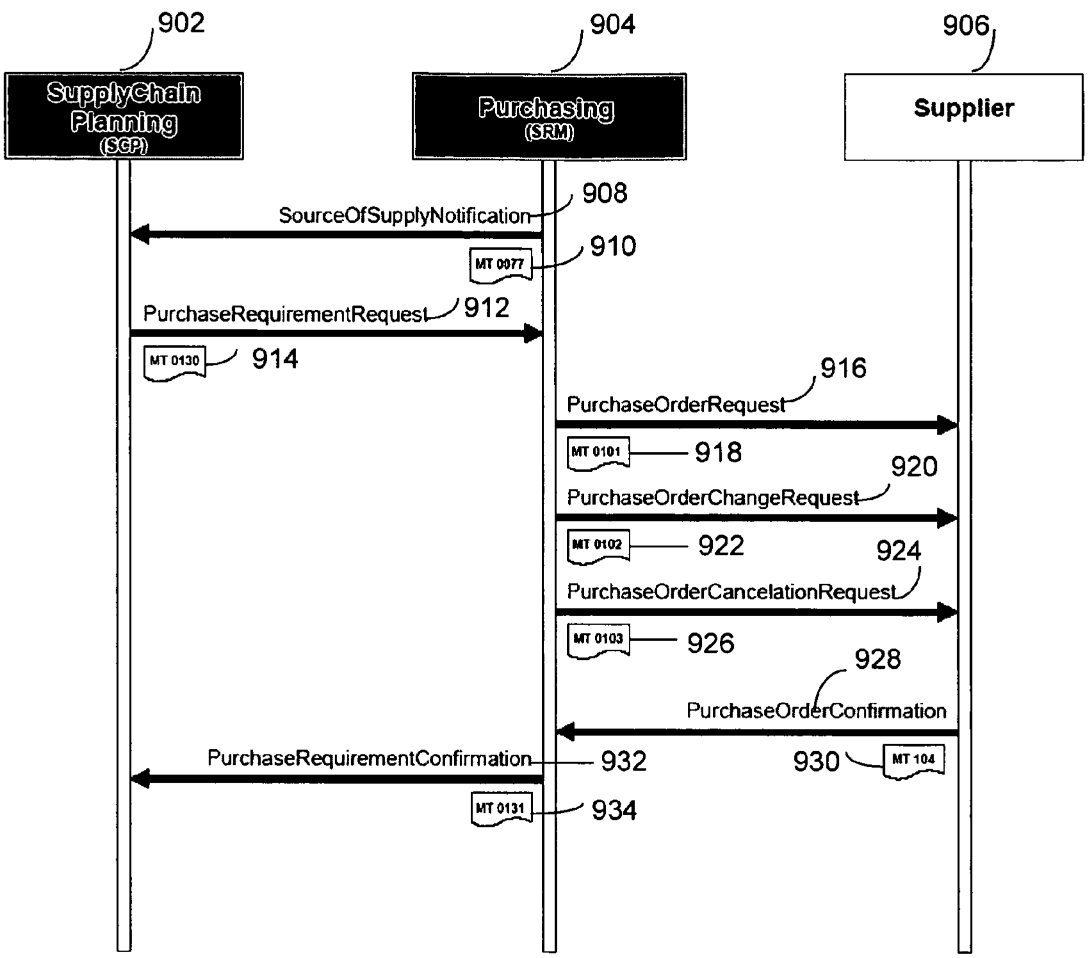
FIG. 9 depicts a message choreography of a Source of Supply, Purchase Requirement, and Purchase Order in accordance with methods and systems consistent with the present invention.

(2) Purchasing and Sales (a) Source of Supply, Purchase Requirement, and Purchase Order FIG. 9 depicts the message choreography of a Source of Supply, Purchase Requirement, and Purchase Order. The Source of Supply, Purchase Requirement, and Purchase Order choreography involves three components: Supply Chain Planning (SCP) 902, Purchasing (SRM) 904, and a Supplier 906.

The SRM 904 sends a SourceOfSupplyNotification message 908 to the SCP 902. The message type 910 of the SourceOfSupplyNotification message 908 is 0077, i.e., a notice to Supply Chain Planning about available sources of supply.

The SCP 902 sends a PurchaseRequirementRequest message 912 to the SRM 904. The message type 914 of the PurchaseRequirementRequest message 912 is 0130, i.e., a request from a requestor to a purchaser to (externally) procure products (materials, services) (external procurement).

The SRM 904 sends a PurchaseOrderRequest message 916 to the Supplier 906. The message type 918 of the PurchaseOrderRequest message 916 is 0101, i.e., a request from a purchaser to a seller to deliver goods or provide services.

The SRM 904 sends a PurchaseOrderChangeRequest message 920 to the Supplier 906. The message type 922 of the PurchaseOrderChangeRequest message 920 is 0102, i.e., a change to a purchaser's request to the seller to deliver goods or provide services.

The SRM 904 sends a PurchaseOrderCancellationRequest message 924 to the Supplier 906. The message type 926 of the PurchaseOrderCancellationRequest message 924 is 0103, i.e., the cancellation of a purchaser's request to the seller to deliver goods or provide services.

The Supplier 906 sends a PurchaseOrderConfirmation message 928 to the SRM 904. The message type 930 of the PurchaseOrderConfirmation message 928 is 0104, i.e., a confirmation, partial confirmation, or change from a seller to the purchaser, regarding the requested delivery of goods or provision of services.

The SRM 904 sends a PurchaseRequirementConfirmation message 932 to the SCP 902. The message type 934 of the PurchaseRequirementConfirmation message 932 is 0131, i.e., a notice from the purchaser to the requester about the degree of fulfillment of a requirement.

(b) Product Demand, Product Forecast and Product Activity

Figure 10:
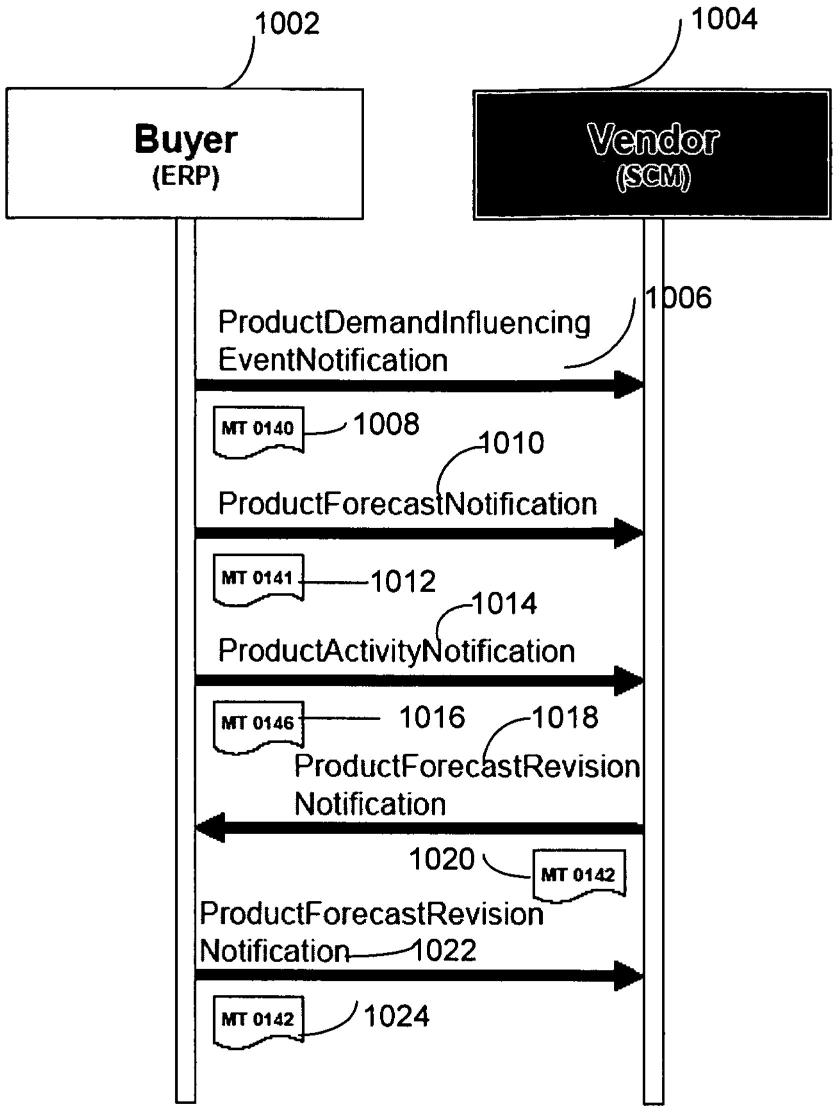
FIG. 10 depicts a message choreography of a Product Demand, Product Forecast and Product Activity in accordance with methods and systems consistent with the present invention.

FIG. 10 depicts the message choreography of a Product Demand, Product Forecast and Product Activity. The Product Demand, Product Forecast and Product Activity choreography involves two components: a Buyer (ERP) 1002 and a Vendor (SCM) 1004.

The Buyer 1002 sends a ProductDemandInfluencingEventNotification message 1006 to the Vendor 1004. The message type 1008 of the ProductDemandInfluencingEventNotification message 1006 is 0140, i.e., a notification about an event which influences the supply or demand of products.

The Buyer 1002 sends a ProductForecastNotification message 1010 to the Vendor 1004. The message type 1012 of the ProductForecastNotification message 1010 is 0141, i.e., a notification about future product demands (forecasts).

The Buyer 1002 sends a ProductActivityNotification message 1014 to the Vendor 1004. The message type 1016 of the ProductActivityNotification message 1014 is 0145, i.e., a message which communicates product-related activities of a buyer to a vendor. Based on this, the vendor can perform supply planning for the buyer.

The Vendor 1004 sends a ProductForecastRevisionNotification message 1018 to the Buyer 1002. The message type 1020 of the ProductForecastRevisionNotification message 1018 is 0142, i.e., a notification about the revision of future product demands (forecasts).

The Buyer 1002 sends the ProductForecastRevisionNotification message 1022 to the Vendor 1004. The message type 1024 of the ProductForecastRevisionNotification message 1022 is 0142.

(c) RFQ and Quote

Figure 11:
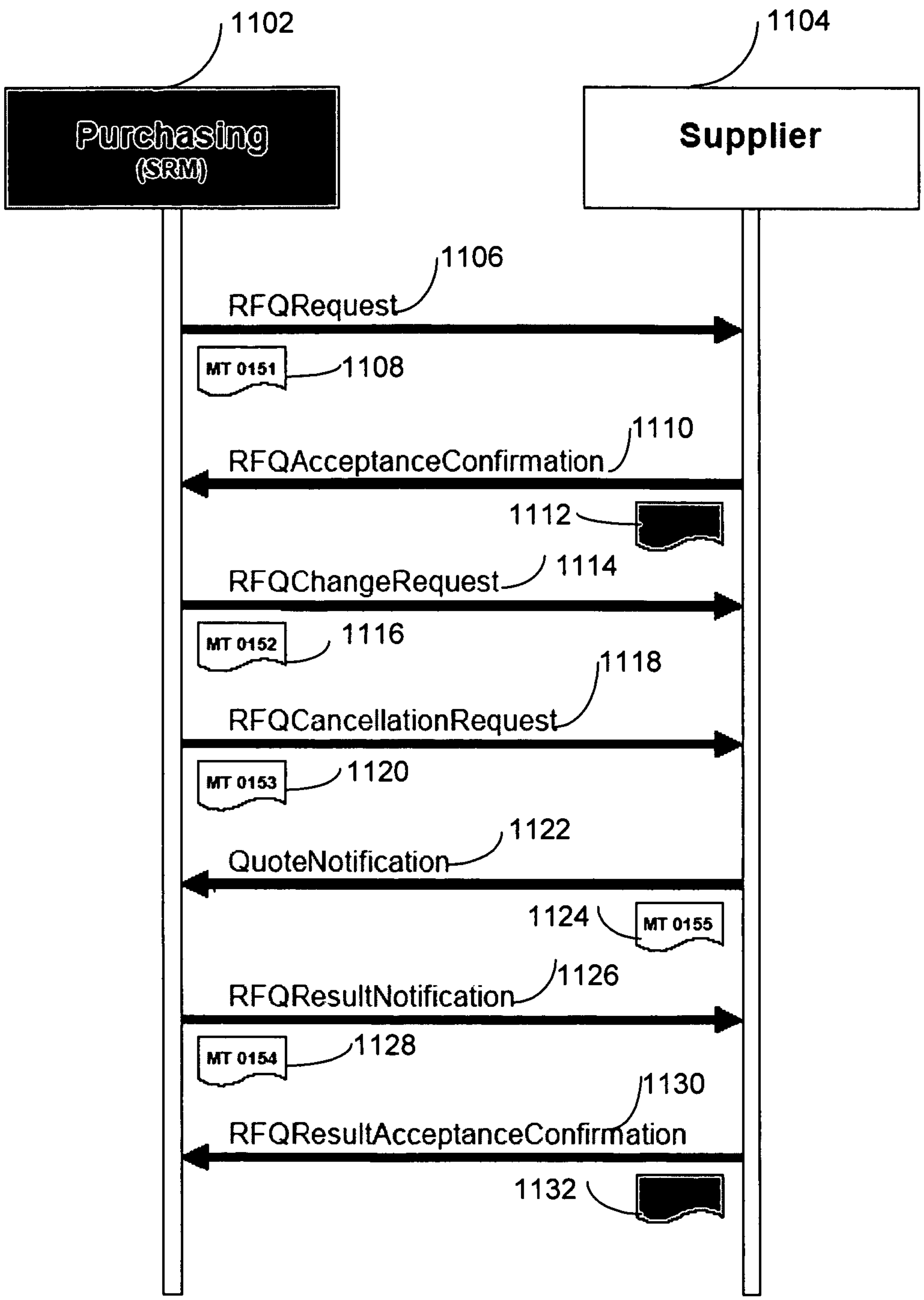
FIG. 11 depicts a message choreography of a RFQ and Quote in accordance with methods and systems consistent with the present invention.

FIG. 11 depicts the message choreography of a RFQ and Quote. The RFQ and Quote choreography involves two components: Purchasing (SRM) 1102 and a Supplier 1104.

The SRM 1102 sends a RFQRequest message 1106 to the Supplier 1104. The message type 1108 of the RFQRequest message 1106 is 0151, i.e., the request from a purchaser to a bidder to participate in a request for quotation for a product.

The Supplier 1104 sends a RFQAcceptanceConfirmation message 1110 to the SRM 1102. The message type of the RFQAcceptanceConfirmation message 1110 can be any conventional RFQ Acceptance Confirmation 1112.

The SRM 1102 sends a RFQChangeRequest message 1114 to the Supplier 1104. The message type 1116 of the RFQChangeRequest message 1114 is 0152, i.e., a change to the purchaser's request for a bidder to participate in the request for quotation for a product.

The SRM 1102 sends a RFQCancellationRequest message 1118 to the Supplier 1104. The message type 1120 of the RFQCancellationRequest message 1118 is 0153, i.e., a cancellation by the purchaser of a request for quotation for a product.

The Supplier 1104 sends a QuoteNotification message 1122 to the SRM 1102. The message type 1124 of the QuoteNotification message 1122 is 0155, i.e., the quote of a bidder communicated to a purchaser concerning the request for quotation for a product by the purchaser.

The SRM 1102 sends a RFQResultNotification message 1126 to the Supplier 1104. The message type 1128 of the RFQResultNotification message 1126 is 0154, i.e., a notification by a purchaser to a bidder about the type and extent of the acceptance of a quote or about the rejection of the quote.

The Supplier 1104 sends a RFQResultAcceptanceConfirmation message 1130 to the SRM 1102. The message type of the RFQResultAcceptanceConfirmation message 1130 can be any conventional RFQ Result Acceptance Confirmation 1132.

(d) Purchasing

Figure 12:
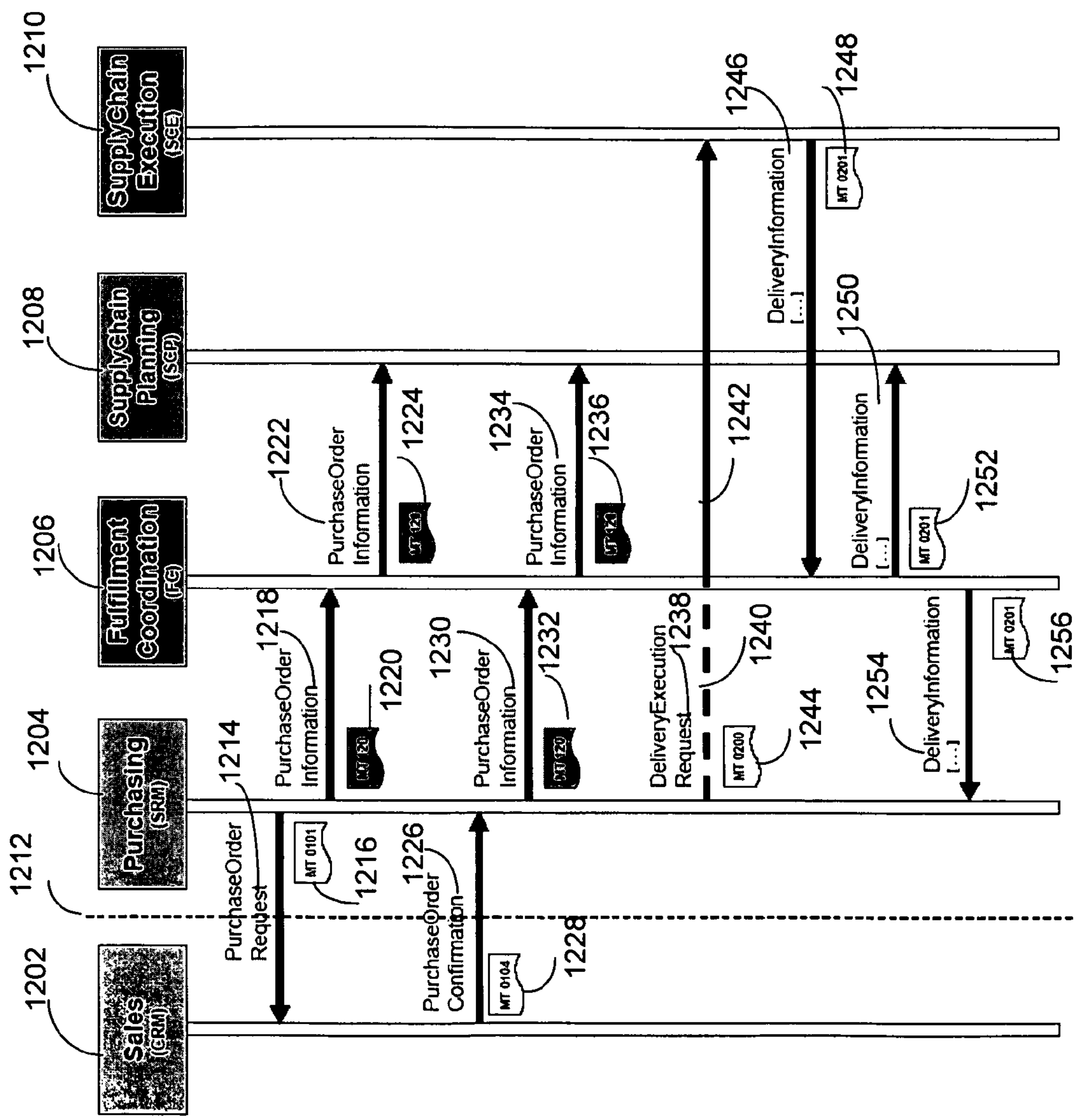
FIG. 12 depicts a message choreography of Purchasing in accordance with methods and systems consistent with the present invention.

FIG. 12 depicts the message choreography of Purchasing. The Purchasing choreography involves five components: Sales (CRM) 1202, Purchasing (SRM) 1204, Fulfillment Coordination (FC) 1206, Supply Chain Planning (SCP) 1208, and Supply Chain Execution (SCE) 1210. Line 1212 denotes a company border. Thus, one company includes Sales 1202, while another company includes SRM 1204, FC 1206, SCP 1208, and SCE 1210.

The SRM 1204 sends a PurchaseOrderRequest message 1214 to the CRM 1202. The message type 1216 of the PurchaseOrderRequest message 1214 is 0101, i.e., a request from a purchaser to a seller to deliver goods or provide services.

The SRM 1204 sends a PurchaseOrderInformation message 1218 to the FC 1206. The message type 1220 of the PurchaseOrderInformation message 1218 is 0120, i.e., information from a purchasing system for interested recipients about the current state of a purchase order when creating or changing a purchase order, confirming a purchase order or canceling a purchase order.

The FC 1206 sends the PurchaseOrderInformation message 1222 to the SCP 1208. The message type 1224 of the PurchaseOrderInformation message 1222 is message type 0120.

The CRM 1202 sends a PurchaseOrderConfirmation message 1226 to the SRM 1204. The message type 1228 of the PurchaseOrderConfirmation message 1226 is 0104, i.e., a confirmation, partial confirmation, or change from a seller to the purchaser, regarding the requested delivery of goods or provision of services.

The SRM 1204 sends a PurchaseOrderInformation message 1230 to the FC 1206. The message type 1232 of the PurchaseOrderInformation message 1230 is 0120, described above.

The FC 1206 sends the PurchaseOrderInformation message 1234 to the SCP 1208. The message type 1236 of the PurchaseOrderInformation message 1234 is 0120.

The FC 1206 sends a DeliveryExecutionRequest message 1238 to the SCE 1210, as depicted by line 1242. Alternatively, the SRM 1204 may send the DeliveryExecutionRequest message 1238 to the SCE 1210, as depicted by broken line 1240. The message type 1244 of the DeliveryExecutionRequest message 1238 is 0200, i.e., a request to a warehouse or supply chain execution to prepare and execute the outbound delivery of goods or the acceptance of an expected or announced inbound delivery.

The SCE 1210 sends a DeliveryInformation message 1246 to the FC 1206. The message type 1248 of the DeliveryInformation message 1246 is 0201, i.e., a message about the creation, change, and execution status of a delivery.

The FC 1206 sends a DeliveryInformation message 1250 to the SCP 1208. The message type 1252 of the DeliveryInformation message is 0201.

The FC 1206 sends a DeliveryInformation message 1254 to the SRM 1204. The message type 1256 of the DeliveryInformation message 1254 is 0201.

(e) Sales

Figure 13:
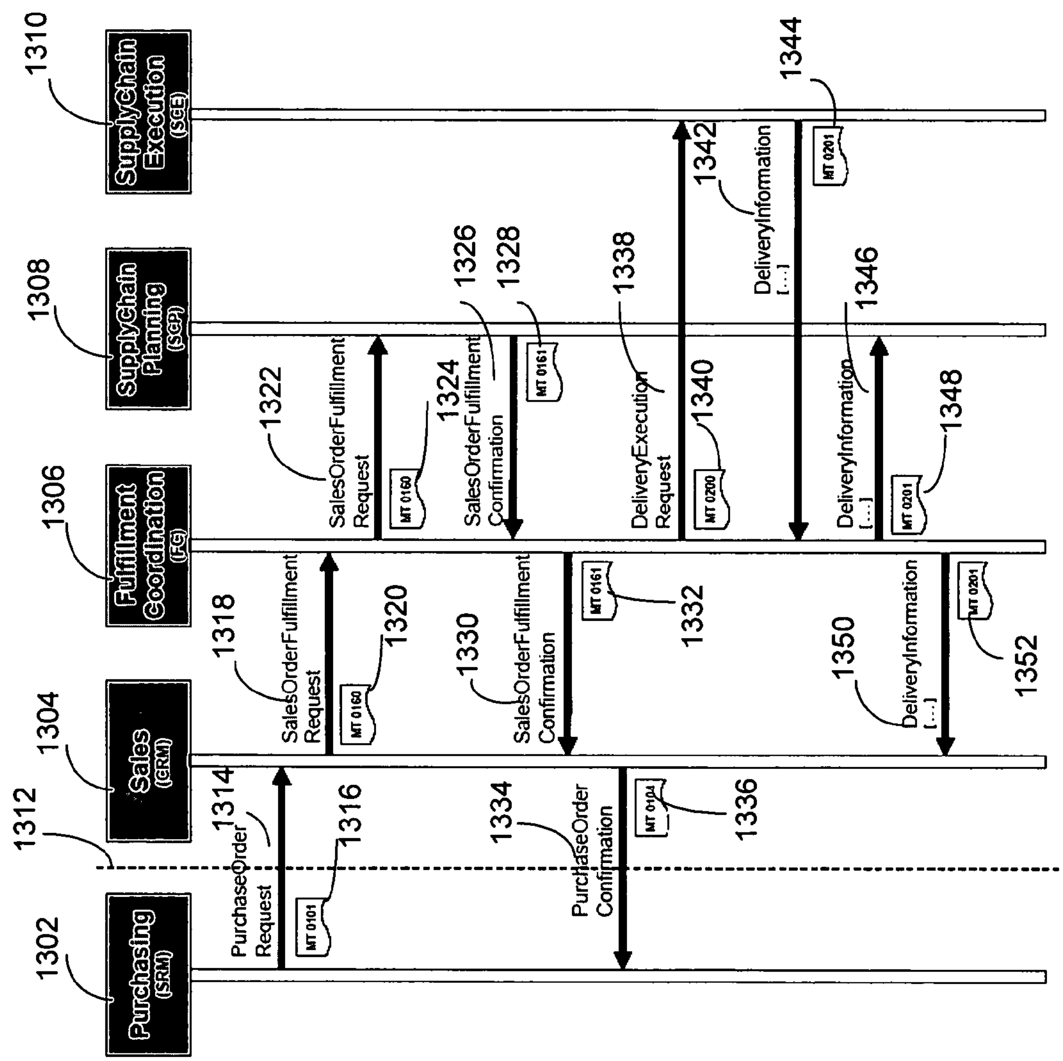
FIG. 13 depicts a message choreography of Sales in accordance with methods and systems consistent with the present invention.

FIG. 13 depicts the message choreography of Sales. The Sales choreography involves five components: Purchasing (SRM) 1302, Sales (CRM) 1304, Fulfillment Coordination (FC) 1306, Supply Chain Planning (SCP) 1308, and Supply Chain Execution (SCE) 1310. Line 1312 denotes a company border. Thus, one company includes SRM 1302, while another company includes CRM 1304, FC 1306, SCP 1308, and SCE 1310.

The SRM 1302 sends a PurchaseOrderRequest message 1314 to the CRM 1304. The message type 1316 of the PurchaseOrderRequest message 1314 is 0101, i.e., a request from a purchaser to a seller to deliver goods or provide services.

The CRM 1304 sends a SalesOrderFulfillmentRequest message 1318 to the FC 1306. The message type 1320 of the SalesOrderFulfillmentRequest message 1318 is 0160, i.e., a request (or change or cancellation of such a request) from a selling component to a procuring component, to fulfill the logistical requirements (for example, available-to-promise check, scheduling, requirements planning, procurement, and delivery) of a sales order.

The FC 1306 sends the SalesOrderFulfillmentRequest message 1322 to the SCP 1308. The message type 1324 of the SalesOrderFulfillmentRequest message 1322 is 0160.

The SCP 1308 sends a SalesOrderFulfillmentConfirmation message 1326 to the FC 1306. The message type 1328 of the SalesOrderFulfillmentConfirmation message 1326 is 0161, i.e., a confirmation, partial confirmation or change from the procuring component to the selling component, regarding a sales order with respect to which procurement has been requested.

The FC 1306 sends the SalesOrderFulfillmentConfirmation message 1330 to the CRM 1304. The message type 1332 of the SalesOrderFulfillmentConfirmation message 1330 is 0161.

The CRM 1304 sends a PurchaseOrderConfirmation message 1334 to the SRM 1302. The message type 1336 of the PurchaseOrderConfirmation message 1334 is 0104, i.e., a confirmation, partial confirmation, or change from a seller to the purchaser, regarding the requested delivery of goods or provision of services.

The FC 1306 sends a DeliveryExecutionRequest message 1338 to the SCE 1310. The message type 1340 of the DeliveryExecutionRequest message 1338 is 0200, i.e., a request to a warehouse or supply chain execution to prepare and execute the outbound delivery of goods or the acceptance of an expected or announced inbound delivery.

The SCE 1310 sends a DeliveryInformation message 1344 to the FC 1306. The message type 1346 of the DeliveryInformation message 1344 is 0201, i.e., a message about the creation, change, and execution status of a delivery.

The FC 1306 sends the DeliveryInformation message 1348 to the SCP 1308. The message type 1350 of the DeliveryInformation message 1348 is 0201, i.e., a message about the creation, change, and execution status of a delivery.

The FC 1306 also sends the DeliveryInformation message 1352 to the CRM 1304. The message type 1354 of the DeliveryInformation message 1352 is 0201.

(f) Vendor Managed Inventory/Responsive Replenishment

Figure 14:
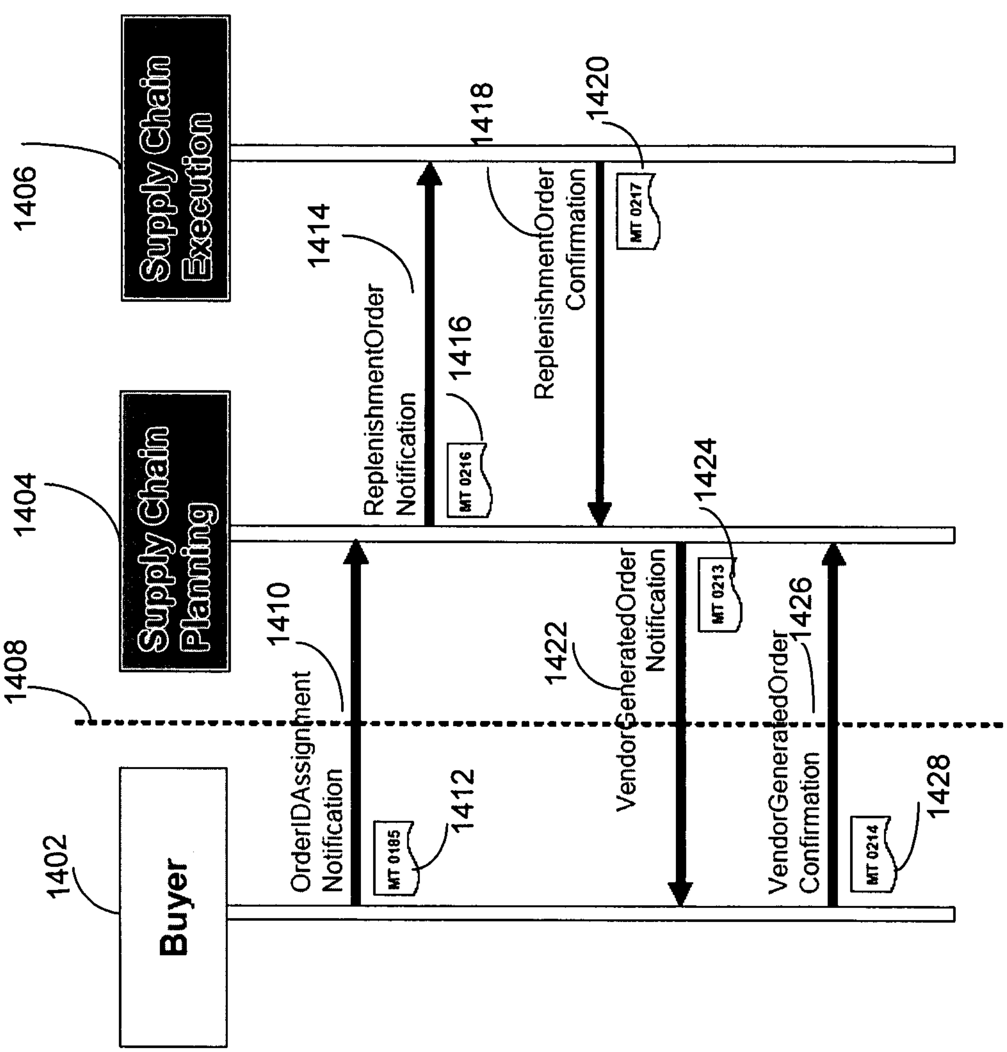
FIG. 14 depicts a message choreography of a Vendor Managed Inventory/Responsive Replenishment in accordance with methods and systems consistent with the present invention.

FIG. 14 depicts the message choreography of a Vendor Managed Inventory/Responsive Replenishment. The Vendor Managed Inventory/Responsive Replenishment choreography involves three components: a Buyer 1402, Supply Chain Planning 1404, and Supply Chain Execution 1406. Line 1408 denotes a company border. Thus, one company includes Buyer 1402, while another company includes Supply Chain Planning 1404 and Supply Chain Execution 1406.

The Buyer 1402 sends an OrderIDAssignmentNotification message 1410 to Supply Chain Planning 1404. The message type 1412 of the OrderIDAssignmentNotification message 1410 is 0185, i.e., a message that allows a buyer to assign a vendor order numbers for identifying "purchase orders generated by the vendor."

Supply Chain Planning 1404 sends a ReplenishmentOrderNotification message 1414 to Supply Chain Execution 1406. The message type 1416 of the ReplenishmentOrderNotification message 1414 is 0216, i.e., a message that is used by Logistics Planning (SCP, vendor) to transfer a replenishment order planned for a customer/buyer to Logistics Execution (SCE, vendor) in order to trigger further processing for the order and prepare the outbound delivery.

Supply Chain Execution 1406 sends a ReplenishmentOrderConfirmation message 1418 to Supply Chain Planning 1404. The message type 1420 of the ReplenishmentOrderConfirmation message 1418 is 0217, i.e., a message that is used by Logistics Execution (SCE, vendor) to confirm to Logistics Planning (SCP, vendor) that a replenishment order that is planned for a customer/buyer can be fulfilled.

Supply Chain Planning 1404 sends a VendorGeneratedOrderNotification message 1422 to the Buyer 1402. The message type 1424 of the VendorGeneratedOrderNotification message 1422 is 0213, i.e., a message that is used by a vendor/seller to transfer the replenishment order that he has initiated and planned to a customer/buyer so that the latter can create a purchase order. The notification sent by the vendor/seller to the customer/buyer regarding the planned replenishment order can be regarded as a "purchase order generated by the seller."

The Buyer 1402 sends a VendorGeneratedOrderConfirmation message 1426 to Supply Chain Planning 1404. The message type 1428 of the VendorGeneratedOrderConfirmation message 1426 is 0214, i.e., VendorGeneratedOrderConfirmation is the confirmation from a customer/buyer that a purchase order has been created for the replenishment order initiated and planned by his vendor/seller. This confirmation from the customer/buyer for a "purchase order generated by the seller" can be regarded as a "purchase order" in the traditional sense, which, in turn, triggers the corresponding fulfillment process at the vendor/seller.

Figure 15:
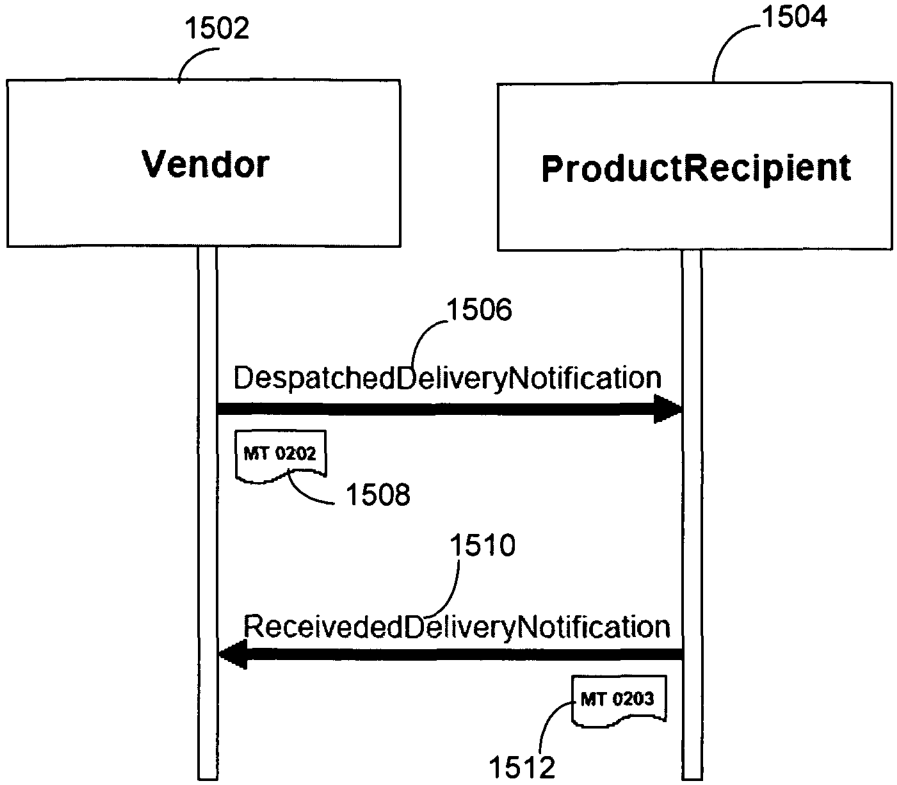
FIG. 15 depicts a message choreography of an Advanced Shipment Notification and Proof of Delivery in accordance with methods and systems consistent with the present invention.

(3) Delivery and Goods Movement (a) Advanced Shipment Notification and Proof of Delivery FIG. 15 depicts the message choreography of an Advanced Shipment Notification and Proof of Delivery. The Advanced Shipment Notification and Proof of Delivery choreography involves two components: a Vendor 1502 and a Product Recipient 1504.

The Vendor 1502 sends a DespatchedDeliveryNotification message 1506 to the Product Recipient 1504. The message type 1508 of the DespatchedDeliveryNotification message 1506 is 0202, i.e., a notification communicated to a product recipient about the planned arrival, pickup, or issue date of a ready-to-send delivery, including details about the content of the delivery.

The Product Recipient 1504 sends a ReceivedDeliveryNotification message 1510 to the Vendor 1502. The message type 1512 of the ReceivedDeliveryNotification message 1510 is 0203, i.e., a notification communicated to a vendor about the arrival of the delivery sent by him to the product recipient, including details about the content of the delivery.

(b) Service Acknowledgement

Figure 16:
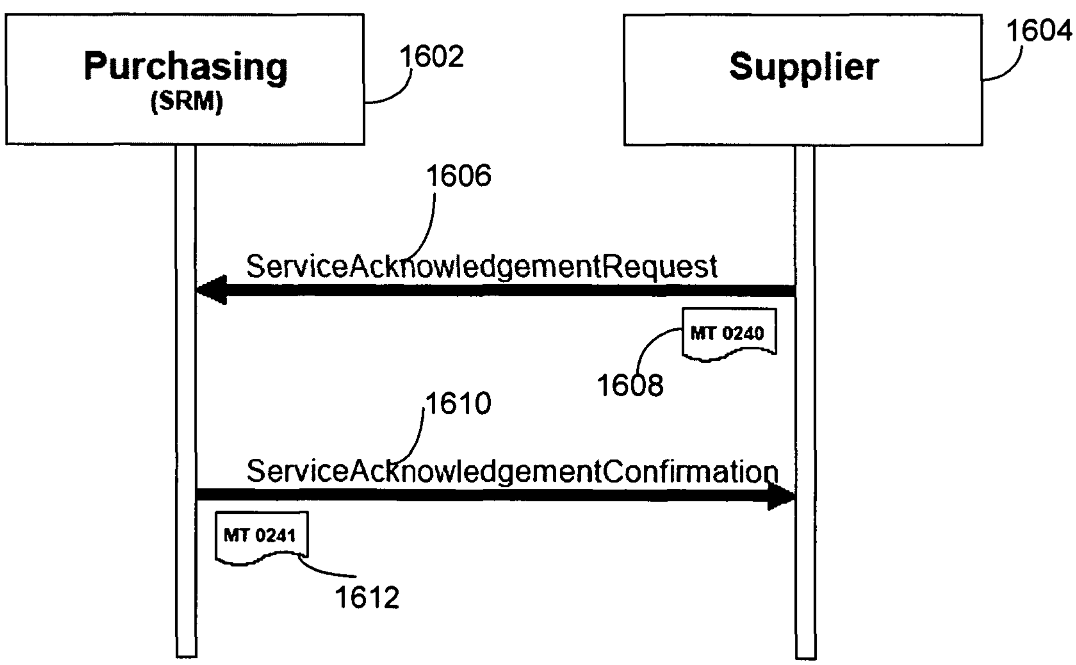
FIG. 16 depicts a message choreography of a Service Acknowledgement in accordance with methods and systems consistent with the present invention.

FIG. 16 depicts the message choreography of a Service Acknowledgement. The Service Acknowledgement choreography involves two components: Purchasing (SRM) 1602 and a Supplier 1604.

The Supplier 1604 sends a ServiceAcknowledgementRequest message 1606 to the SRM 1602. The message type 1608 of the ServiceAcknowledgementRequest message 1606 is 0240, i.e., a request by a seller to a purchaser to confirm the services recorded.

The SRM 1602 sends a ServiceAcknowledgementConfirmation message 1610 to the Supplier 1604. The message type 1612 of the ServiceAcknowledgementConfirmation message 1610 is 0241, i.e., a confirmation (or rejection) of the services recorded.

(c) Inventory Change

Figure 17:
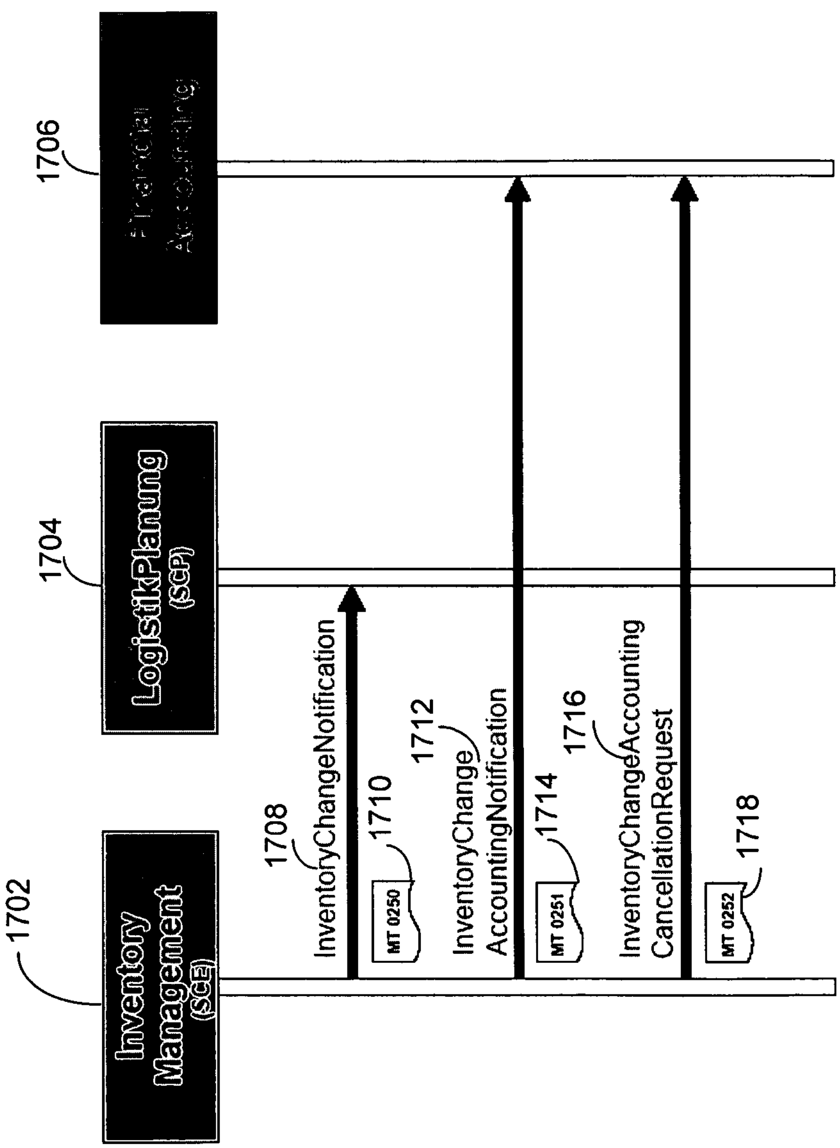
FIG. 17 depicts a message choreography of an Inventory Change in accordance with methods and systems consistent with the present invention.

FIG. 17 depicts the message choreography of an Inventory Change. The Inventory Change choreography involves three components: Inventory Management (SCE) 1702, Logistic Planning (SCP) 1704 and Financial Accounting 1706.

The SCE 1702 sends an InventoryChangeNotification message 1708 to the SCP 1704. The message type 1710 of the InventoryChangeNotification message 1708 is 0250, i.e., a summery of detailed information about inventory changes in inventory management, which is required for logistics planning.

The SCE 1702 sends an InventoryChangeAccountingNotification message 1712 to Financial Accounting 1706. The message type 1714 of the InventoryChangeAccountingNotification message 1712 is 0251, i.e., a summary of aggregated information about inventory changes in inventory management, which is required for financials.

The SCE 1702 sends an InventoryChangeAccountingCancellationRequest message 1716 to Financial Accounting 1706. The message type 1718 of the InventoryChangeAccountingCancellationRequest message 1716 is 0252, i.e., a request for the full cancellation of posting information previously sent to financials with respect to a goods movement.

(4) Invoice and Payment and Financials (a) Billing Due

Figure 18:
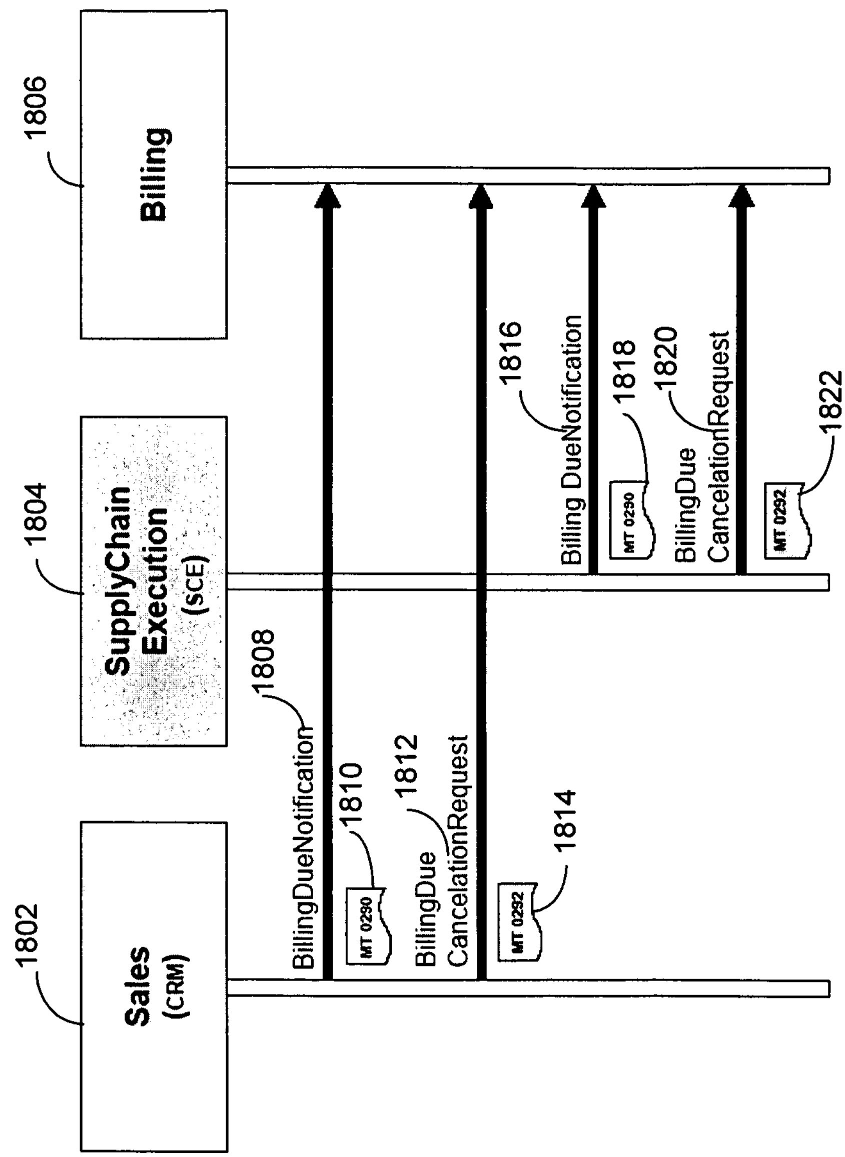
FIG. 18 depicts a message choreography of Billing Due in accordance with methods and systems consistent with the present invention.

FIG. 18 depicts the message choreography of Billing Due. The Billing Due choreography involves three components: Sales (CRM) 1802, Supply Chain Execution (SCE) 1804, and Billing 1806.

The CRM 1802 sends a BillingDueNotification message 1808 to Billing 1806. The message type 1810 of the BillingDueNotification message 1808 is 0290, i.e., a notification about billing-relevant data communicated to an application in which the subsequent operative processing of billing takes place.

The CRM 1802 sends a BillingDueCancellationRequest message 1812 to Billing 1806. The message type 1814 of the BillingDueCancellationRequest message 1812 is 0292, i.e., a request for the full cancellation of a BillingDueNotification previously sent to billing.

The SCE 1804 sends a BillingDueNotification message 1816 to Billing 1806. The message type 1818 of the BillingDueNotification message 1816 is 0290, i.e., a notification about billing-relevant data communicated to an application in which the subsequent operative processing of billing takes place.

The SCE 1804 sends a BillingDueCancellationRequest message 1820 to Billing 1806. The message type 1822 of the BillingDueCancellationRequest message 1820 is 0292, i.e., a request for the full cancellation of a BillingDueNotification previously sent to billing.

(b) Invoicing Due

Figure 19:
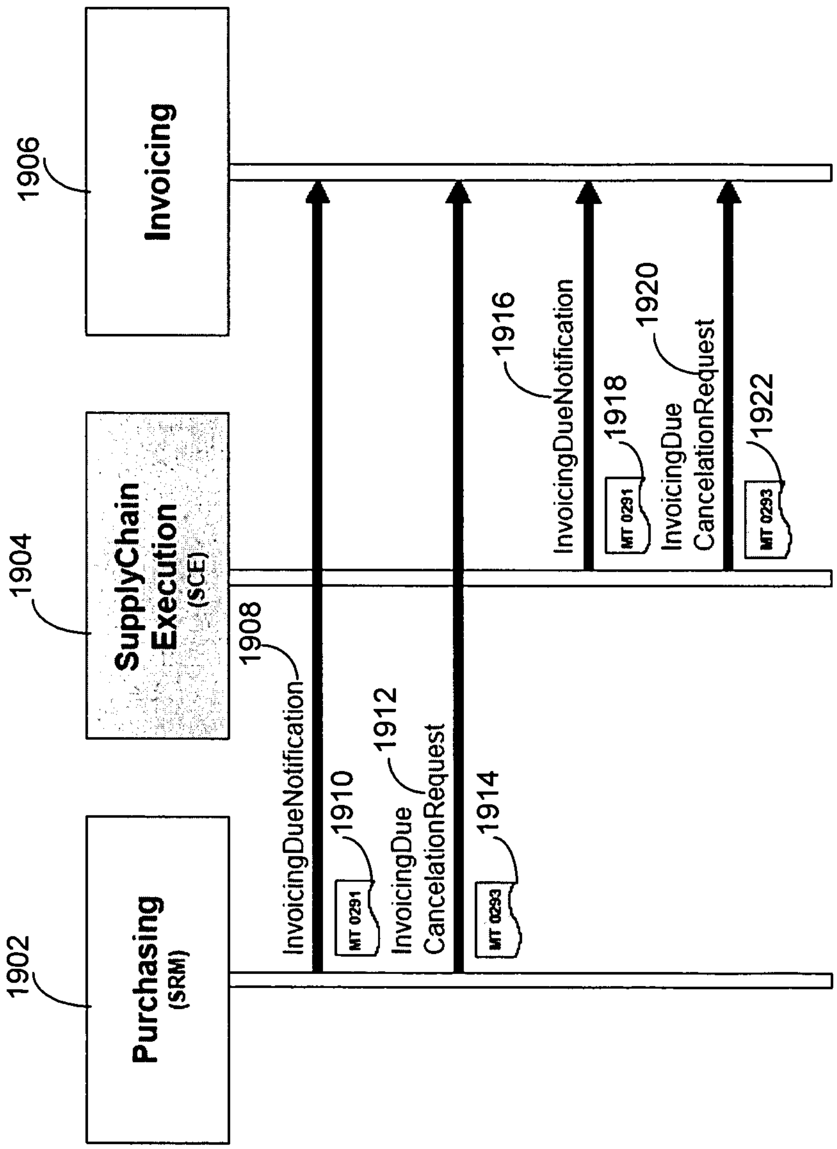
FIG. 19 depicts a message choreography of Invoicing Due in accordance with methods and systems consistent with the present invention.

FIG. 19 depicts the message choreography of Invoicing Due. The Invoicing Due choreography involves three components: Purchasing (SRM) 1902, Supply Chain Execution (SCE) 1904, and Invoicing 1906.

The SRM 1902 sends an InvoicingDueNotification message 1908 to Invoicing 1906. The message type 1910 of the InvoicingDueNotification message 1908 is 0291, i.e., a notification about invoicing-relevant data communicated to an application in which the operative verification and creation of invoices takes place, and/or in which "self billing" invoices (evaluated receipt settlement) are created.

The SRM 1902 sends an InvoicingDueCancellationRequest message 1912 to Invoicing 1906. The message type 1914 of the InvoicingDueCancellationRequest message 1912 is 0293, i.e., a request for the full cancellation of an InvoicingDueNotification previously sent to invoice verification.

The SCE 1904 sends an InvoicingDueNotification message 1916 to Invoicing 1906. The message type 1918 of the InvoicingDueNotification message 1916 is 0291, i.e., a notification about invoicing-relevant data communicated to an application in which the operative verification and creation of invoices takes place, and/or in which "self billing" invoices (evaluated receipt settlement) are created.

The SCE 1904 sends an InvoicingDueCancellationRequest message 1920 to Invoicing 1906. The message type 1922 of the InvoicingDueCancellationRequest message 1920 is 0293, i.e., a request for the full cancellation of an InvoicingDueNotification previously sent to invoice verification.

(c) Invoice

Figure 20:
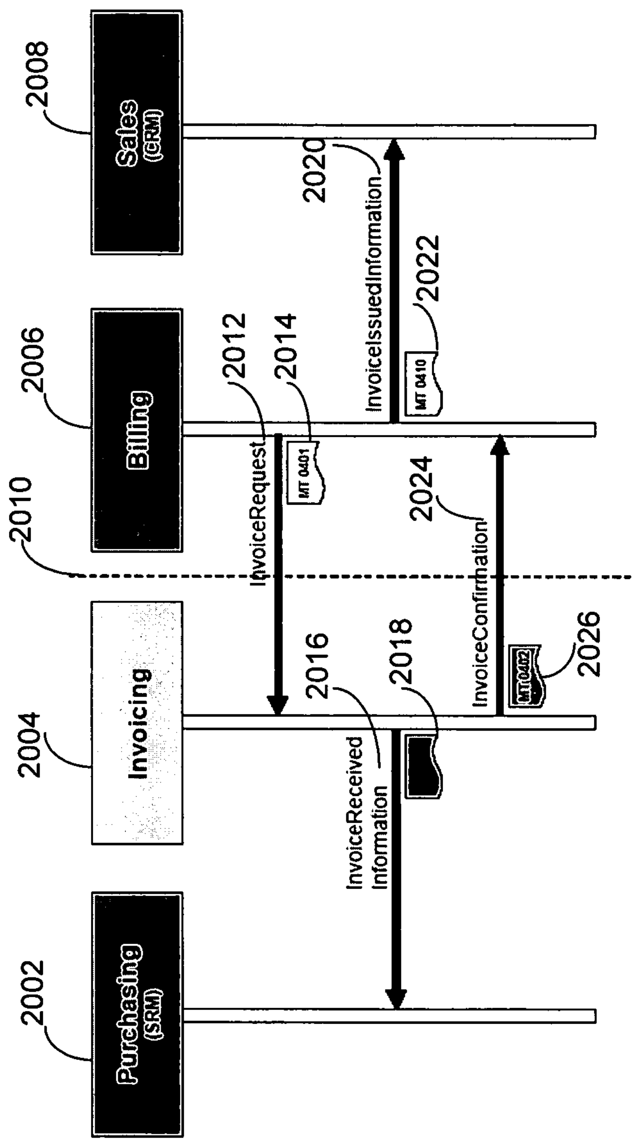
FIG. 20 depicts a message choreography of an Invoice in accordance with methods and systems consistent with the present invention.

FIG. 20 depicts the message choreography of an Invoice. The Invoice choreography involves four components: Purchasing (SRM) 2002, Invoicing 2004, Billing 2006, and Sales (CRM) 2008. Line 2010 denotes a company border. Thus, one company includes SRM 2002 and Invoicing 2004, while another company includes Billing 2006 and CRM 2008.

Billing 2006 sends an InvoiceRequest message 2012 to Invoicing 2004. The message type 2014 of the InvoiceRequest message 2012 is 0401, i.e., a legally binding notice about accounts receivable or accounts payable for delivered goods or provided services—typically a request that payment be made for these goods or services.

Invoicing 2004 sends an InvoiceReceivedInformation message 2016 to the SRM 2002. The message type 2018 of the InvoiceReceivedInformation message 2016 can be a conventional Invoice Received Information.

Billing 2006 sends an InvoiceIssuedInformation message 2020 to Sales 2008. The message type 2022 of the InvoiceIssuedInformation message 2020 is 0410, i.e., information about provided services, delivered products, or credit or debit memo request items that have been billed, the items of an invoice that have been used for this, and the extent to which they have been billed.

Invoicing 2004 sends an InvoiceConfirmation message 2024 to Billing 2006. The message type 2026 of the InvoiceConfirmation message 2024 is 0402, i.e., the repose of a recipient of an invoice to the bill-from-party by which the invoice as a whole is confirmed, rejected, or classified as 'not yet decided.'

(d) Invoice Accounting and Payment Due

Figure 21:
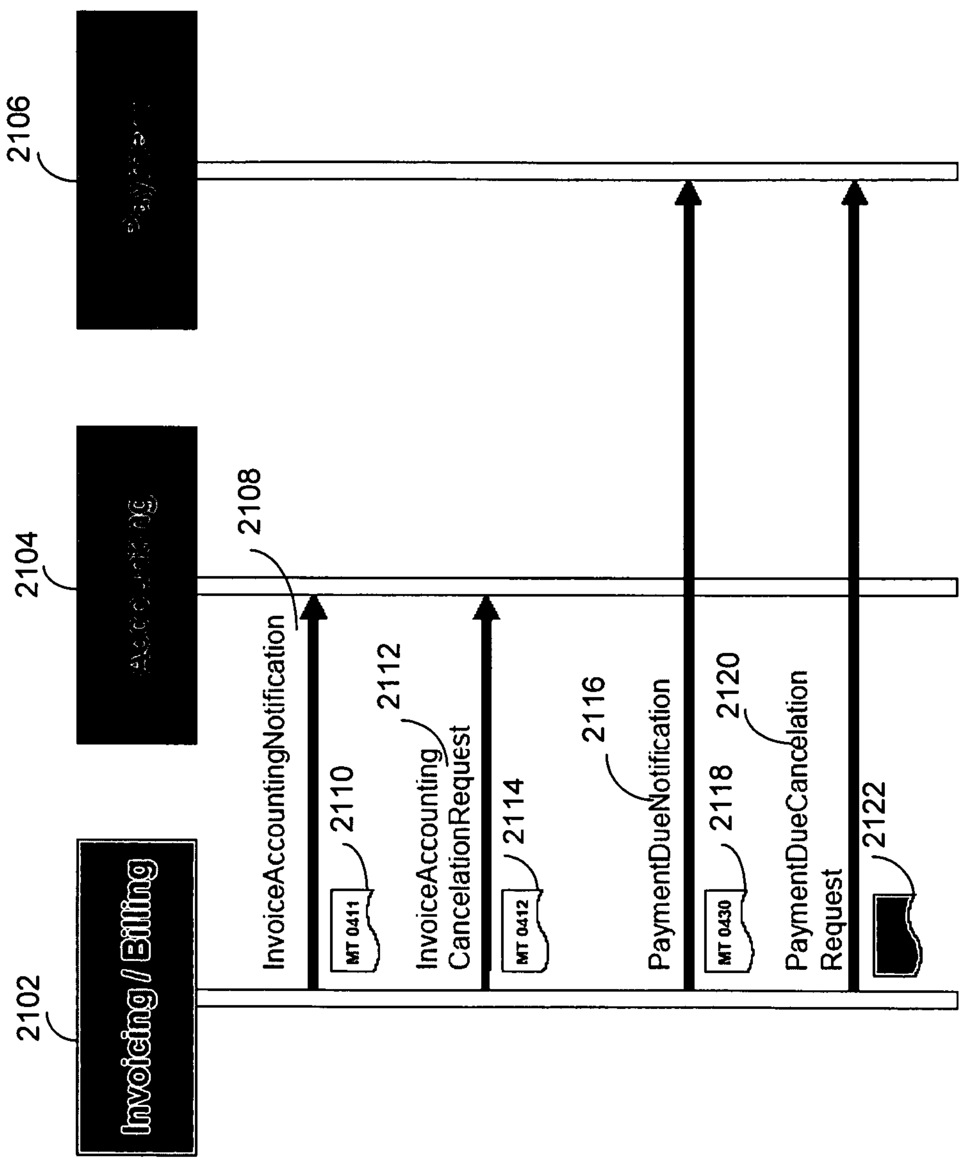
FIG. 21 depicts a message choreography of Invoice Accounting and Payment Due in accordance with methods and systems consistent with the present invention.

FIG. 21 depicts the message choreography of Invoice Accounting and Payment Due. The Invoice Accounting and Payment Due choreography involves three components: Invoicing/Billing 2102, Accounting 2104 and Payment 2106.

Invoicing/Billing 2102 sends an InvoiceAccountingNotification message 2108 to Accounting 2104. The message type 2110 of the InvoiceAccountingNotification message 2108 is 0411, i.e., a notification to financials about information on incoming or outgoing invoices from invoice verification or billing.

Invoicing/Billing 2102 sends an InvoiceAccountingCancellationRequest message 2112 to Accounting 2104. The message type 2114 of the InvoiceAccountingCancellationRequest message 2112 is 0412, i.e., a request for the full cancellation of posting information previously sent to financials, regarding an incoming or outgoing invoice or credit memo.

Invoicing/Billing 2102 sends a PaymentDueNotification message 2116 to Payment 2106. The message type 2118 of the PaymentDueNotification message 2116 is 0430, i.e., the PaymentDueNotification notifies an application (Payment), in which subsequent operative processing of payments take place, about due dates (accounts receivable and accounts payable) of business partners.

Invoicing/Billing 2102 sends a PaymentDueCancellationRequest message 2120 to Payment 2106. The message type 2122 of the PaymentDueCancellationRequest message 2120 can be any conventional Payment Due Cancellation Request.

(e) Tax Due

Figure 22:
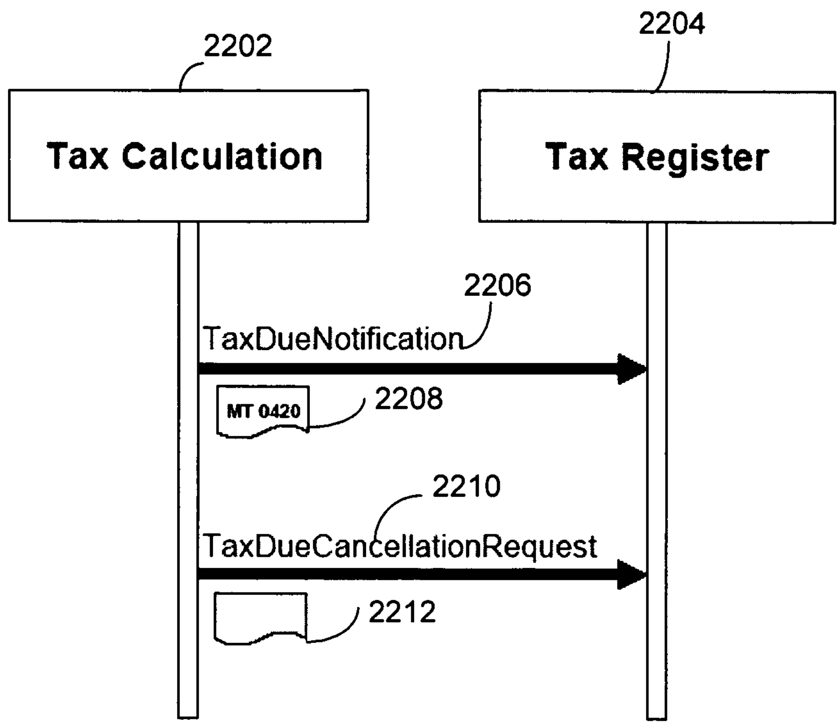
FIG. 22 depicts a message choreography of Tax Due in accordance with methods and systems consistent with the present invention.

FIG. 22 depicts the message choreography of Tax Due. The Tax Due choreography involves two components: Tax Calculation 2202 and Tax Register 2204.

Tax Calculation 2202 sends a TaxDueNotification message 2206 to the Tax Register 2204. The message type 2208 of the TaxDueNotification message 2206 is 0420, i.e., the TaxDueNotification communicates data from tax determination and calculation relevant for tax reports and tax payments to the tax register of a company.

Tax Calculation 2202 sends a TaxDueCancellationRequest message 2210 to the Tax Register 2204. The message type 2212 of the TaxDueCancellationRequest message 2210 can be any conventional Tax Due Cancellation Request.

Figure 23:
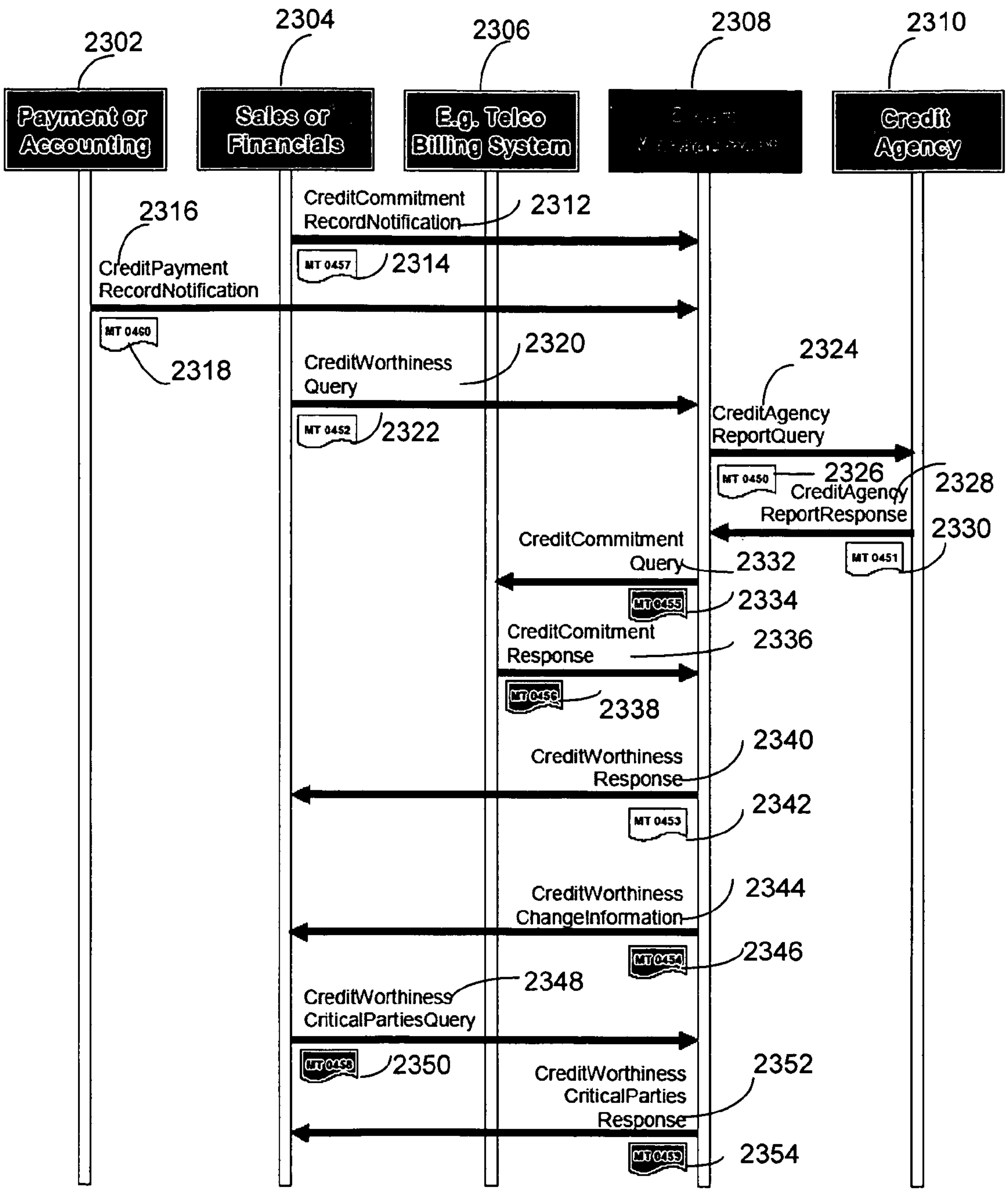
FIG. 23 depicts a message choreography of Credit Worthiness, Credit Agency Report, Credit Payment, and Credit Commitment in accordance with methods and systems consistent with the present invention.

(f) Credit Worthiness, Credit Agency Report, Credit Payment, and Credit Commitment FIG. 23 depicts the message choreography of Credit Worthiness, Credit Agency Report, Credit Payment, and Credit Commitment. The Credit Worthiness, Credit Agency Report, Credit Payment, and Credit Commitment choreography involves five components: Payment or Accounting 2302, Sales or Financials 2304, a Billing System (e.g., Telco) 2306, Credit Management 2308, and Credit Agency 2310.

Sales or Financials 2304 sends a CreditCommitmentRecordNotification message 2312 to Credit Management 2308. The message type 2314 of the CreditCommitmentRecordNotification message 2312 is 0457, i.e., a notice to credit management about existing payment obligations of business partners.

Payment or Accounting 2302 sends a CreditPaymentRecordNotification message 2316 to Credit Management 2308. The message type 2318 of the CreditPaymentRecordNotification message 2316 is 0460, i.e., a notice to credit management about the payment behavior of business partners.

Sales or Financials 2304 sends a CreditWorthinessQuery message 2320 to Credit Management 2308. The message type 2322 of the CreditWorthinessQuery message 2320 is 0452, i.e., an inquiry to credit management concerning the credit worthiness of a business partner.

Credit Management 2308 sends a CreditAgencyReportQuery message 2324 to Credit Agency 2310. The message type 2326 of the CreditAgencyReportQuery message 2324 is 0450, i.e., an inquiry to a credit agency concerning the credit report for a business partner.

Credit Agency 2310 sends a CreditAgencyReportResponse message 2328 to Credit Management 2308. The message type 2330 of the CreditAgencyReportResponse message 2328 is 0451, i.e., a response from a credit agency concerning the inquiry about the credit report for a business partner.

Credit Management 2308 sends a CreditCommitmentQuery message 2332 to the Billing System 2306. The message type 2334 of the CreditCommitmentQuery message 2332 is 0455, i.e., an inquiry from credit management concerning existing payment obligations of a business partner.

The Billing System 2306 sends a CreditCommitmentResponse message 2336 to Credit Management 2308. The message type 2338 of the CreditCommitmentResponse message 2336 is 0456, i.e., a response concerning an inquiry from credit management about existing payment obligations of a business partner.

Credit Management 2308 sends a CreditWorthinessResponse message 2340 to Sales or Financials 2304. The message type 2342 of the CreditWorthinessResponse message 2340 is 0453, i.e., a response from credit management concerning the inquiry about the credit worthiness of a business partner.

Credit Management 2308 sends a CreditWorthinessChangeInformation message 2344 to Sales or Financials 2304. The message type 2346 of the CreditWorthinessChangeInformation message 2344 is 0454, i.e., information about changes of the credit worthiness of a business partner.

Sales or Financials 2304 sends a CreditWorthinessCriticalPartiesQuery message 2348 to Credit Management 2308. The message type 2350 of the CreditWorthinessCriticalPartiesQuery message 2348 is 0458, i.e., an inquiry to credit management about business partners, for which the credit worthiness has been rated as critical.

Credit Management 2308 sends a CreditWorthinessCriticalPartiesResponse message 2352 to Sales or Financials 2304. The message type 2354 of the CreditWorthinessCriticalPartiesResponse message 2352 is 0459, i.e., a response from credit management concerning an inquiry about business partners, for which the credit worthiness has been rated as critical.

(5) Human Capital Management (a) Personnel Time Sheet

Figure 24:
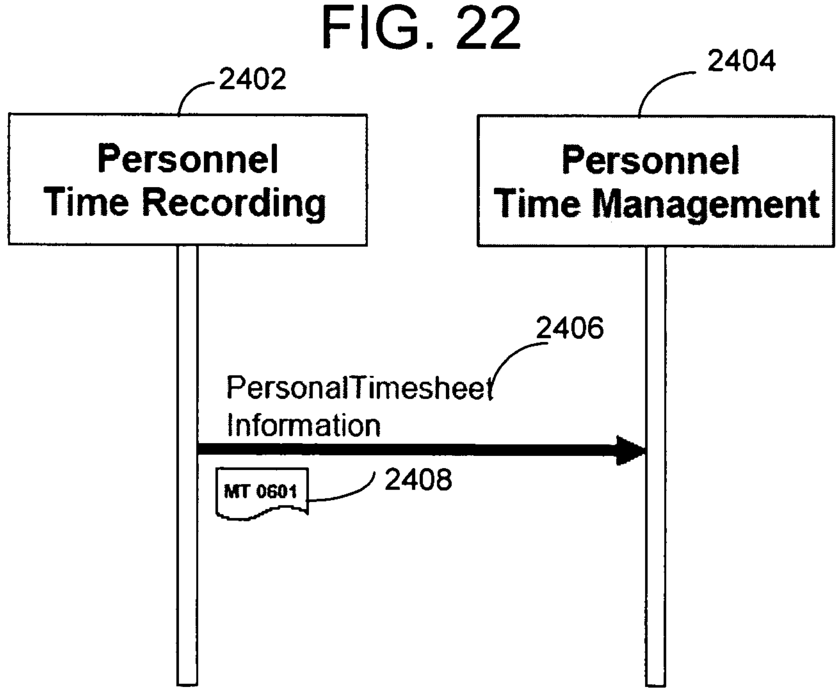
FIG. 24 depicts a message choreography of a Personnel Time Sheet in accordance with methods and systems consistent with the present invention.

FIG. 24 depicts the message choreography of a Personnel Time Sheet. The Personnel Time Sheet choreography involves two components: Personnel Time Recording 2402 and Personnel Time Management 2404.

Personnel Time Recording 2402 sends a PersonalTimeSheetInformation message 2406 to Personnel Time Management 2404. The message type 2408 of the PersonalTimeSheetInformation message 2406 is 0601, i.e., the PersonnelTimeSheetInformation communicates recorded personnel times and personnel time events from an upstream personnel time recording system to personnel time management.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object is a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

The following sections © SAP AG.

a) Data Types

Data types are used to type object entities and interfaces with a structure. This typing can include business semantic. For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is constructed with reference to a use, and is thus a use-specific assembly of GDTs and CDTs. The data types can be aggregated to complex data types.

To achieve a harmonization across business objects and interfaces, the same subject matter is always typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

(1) CoreComponentTypes (CCTs)

(a) Amount

A CCT Amount 2500 is used to represent amounts, costs, remunerations, and fees. A CCT Amount 2500 includes an amount with the corresponding currency unit. An example of the CCT Amount 2500 is: <Amount currencyCode="EUR">777.95</Amount>, which represents the amount 777.95 Euros.

The structure of CCT Amount 2500 is depicted in FIG. 25. CCT Amount 2500 includes the attribute currencyCode 2502. For CCT Amount 2500, the Category is complexType 2504, the Property is Amount 2510, the Representation/Association is Content 2514, the Type is xsd 2518, the Type Name is decimal 2522, and the Length can have a maximum 22 predecimal places and 6 decimal places 2626.

For the currencycode 2502, the Category is Attribute 2506, the Object Class is Amount 2508, the Property is Currency 2512, the Representation/Association is Code 2516, the Type is xsd 2520, the Type Name is token 2524, and the Length is three 2528. The Cardinality between CCT Amount 2500 and currencyCode 2502 is one 2530. CurrencyCode 2502 is mandatory 2532. CurrencyCode 2502 requires the currency to always be specified.

(b) BinaryObject

A CCT BinaryObject 2600 includes a finite data stream of any number of characters in binary notation (octets). CCT BinaryObject 2600 can be delivered to a partner using two methods: (1) an implicit representation as an element value; or (2) as a MIME attachment within a message, with a unique URI-based reference to the corresponding attachment. An example for CCT BinaryObject 2600 is a representation of CCT BinaryObject 2600 as an element value based on base64 encoding is:

```
<BinaryObject typeCode="application/zip" name="photos.zip" >
    T2xkIE1hY0RvbmFsZCBoYWQgYSBmYXJtCkUgSS
    BFIEkgTwpBbmQgb24gaGlzIGZhcm0gaGUgaGFk
    IHNvbWUgZHVja3MKRSBJIEUgSSBPCldpdGggYS
    BxdWFjayBxdWFjayBoZXJlLAphIHF1YWNrIHF1
    YWNrIHRoZXJlLApldmVyeSB3aGVyZSBhIHF1YW
    NrIHF1YWNrCkUgSSBFIEkgTwo=
</BinaryObject>.
```

An example of a reference to CCT BinaryObject 2600 that is delivered as a MIME attachment within a message is:

<BinaryObject uri="cid:a34ccrt@15.4.9.92/s445"/>.

The element value of CCT BinaryObject 2600 is based on the XML-scheme-specific built-in data type xsd: base64binary. This enables any binary data to be represented using base64 encoding. This is done using the base64 Content-Transfer-Encoding procedure.

The structure of CCT BinaryObject 2600 is depicted in FIG. 26. CCT BinaryObject 2600 includes attributes mimeCode 2602, charSetCode 2604, format 2606, filename 2608, and URI 2610. For CCT BinaryObject 2600, the Category is complexType 2612, the Property is Binary-Object 2634, the Representation/Association is Content 2646, the Type is xsd 2658, and the Type Name is base64binary 2670.

MimeCode 2602 identifies the medium type (image, audio, video, application) of the binary content according to the MIME type definition in IETF RFC 2046 and the corresponding MIME type recommendations. For mimeCode 2602, the Category is Attribute 2614, the Object Class is Binary-Object 2625, the Property is mime 2636, the Representation/Association is Code 2648, the Type is xsd 2660, the Type Name is token 2672, and the Cardinality may be 0 or 1 2680. Mimecode 2602 is necessary when CCT BinaryObject 2600 is represented as an element value (see 2688).

CharSetCode 2604 identifies the specific character set of text data. For CharSetCode 2604, the Category is Attribute 2616, the Object Class is Binary-Object 2626, the Property is Character Set 2638, the Representation/Association is Code 2650, the Type is xsd 2662, the Type Name is token 2674, and the Cardinality may be 0 or 1 2680. CharSetCode 2604 is necessary when CCT BinaryObject 2600 is represented as an element value and comprises text data (see 2690).

Format 2606 describes the format of the binary content if the format is not clear or unique from the "mimeCode." For Format 2606, the Category is Attribute 2618, the Object Class is Binary-Object 2628, the Property is Format 2640, the Representation/Association is Text 2652, the Type is xsd 2664, the Type Name is token 2675, and the Cardinality may be 0 or 1 2684. Format 2606 may be optional (see 2692).

Filename 2608 contains the corresponding name or file name of the binary content according to the MIME protocol. For filename 2608, the Category is Attribute 2620, the Object Class is Binary-Object 2630, the Property is Filename 2642, the Representation/Association is Text 2654, the Type is xsd 2666, the Type Name is string 2676, and the Cardinality is may be 0 or 1 2686. Filename 2608 is not defined in ebXML CCTS 1.8, but it is to be submitted. Filename 2608 also conforms with IETF RFC 1341(see 2694).

URI 2610 references the physical location of CCT BinaryObject 2600 if this is represented as a MIME attachment in a SOAP message or in an ebXML-MSG message. The syntax of the URI is defined in the IETF RFC 2396recommendation and is as follows: <scheme>.<scheme-specific part>. For URI 2610, the Category is Attribute 2622, the Object Class is Binary-Object 2632, the Property is Uniform Resource 2644, the Representation/Association is Identifier 2656, the Type is xsd 2668, and the Type Name is anyURI 2678. URI 2610 is necessary when referencing a remote CCT BinaryObject 2600 (see 2696).

As enumerated by the Internet Assigned Numbers Authority (IANA), November 2002, various MIME types are available for mimeCode 2602. For example one MIME type may be iso-8859-n, where n is a placeholder for the number of the relevant ISO character set from 1 to 9. Another example MIME type is us-ascii.

Various URI schemes are also available for the scheme-specific part in the URI, as enumerated by the IANA. For example, one available scheme is cid which is a content identifier. Another available scheme is uuid, which is a Universal Unique Identifier Scheme.

CCT BinaryObject 2600 can be used for binary data and all types of binary files. This includes graphics (such as diagrams, mathematic curves, and the like), pictures (such as photos, passport photos, and the like), sound recordings, video recordings, and documents in binary notation (such as PDF, DOC, and XLS files). The primary Representation/Association for CCT BinaryObject 2600 is BinaryObject. Additional secondary Representation/Associations may be Graphic, Picture, Sound and Video.

The useful data in Binary Object 2600 may be delivered either as an element value using base64 octet representation or as a MIME attachment. In certain embodiments, CCT BinaryObject 2600 is not used to reference a file that is located on a Web server. The global data type "WebAddress" is available for this purpose. If CCT BinaryObject 2600 is in a MIME attachment, the URI 2610 may reference the corresponding "Content ID" of the respective MIME attachment. For this purpose, URI scheme cid may be used, which identifies a freely defined "Content ID". URI scheme uuid may also be used for this purpose. Uuid identifies a unique identification in accordance with UUID guidelines.

It is not necessary to specify the "typeCode" and "fileName" attributes in a MIME attachment, since this information is contained in the MIME attachment itself.

(c) Code

A CCT Code 2700 is a character string of letters, numbers, special characters (except escape sequences), and symbols. It represents a definitive value, a method, or a property description in an abbreviated or language-independent form. An example for the CCT Code 2700 is: a Standard Code/Standard Agency is <SecurityErrorCode listID="DE 0571" listAgencyID="6">4</SecurityErrorCode>.

An example of a Proprietary Code/Standard Agency is <SecurityErrorCode listID="SEC" listAgencyID="065055766" listAgencySchemeID="DUNS" listAgencySchemeAgencyID="016">ANS</SecurityErrorCode>.

An example of a Proprietary Code/Proprietary Agency is <SecurityErrorCode listID="SEC" listAgencyID="4711" listAgencySchemeID="PartyA" listAgencySchemeAgencyID="ZZZ">ER05</SecurityErrorCode>

The structure of CCT Code 2700 is depicted in FIG. 27. CCT Code 2700 includes Attributes listID 2702, listVersionID 2704, listAgencyID 2706, listAgency-SchemeID 2708, and listAgency-SchemeAgencyID 2710. For CCT Code 2700, the Category is complexType 2712, the Property is Code 2734, the Representation/Association is Content 2746, the Type is xsd 2758, and the Type Name is token 2770.

ListID 2702 identifies a list of the codes that belong together. ListID 2702 is unique within the agency that manages this code list. For listID 2702, the Category is Attribute 2714, the Object Class is CodeList 2724, the Property is Identification 2736, the Representation/Association is Identifier 2748, the Type is xsd 2760, the Type Name is token 2772, and the Cardinality is may be 0 or 1 2782. The attribute ListID may be optional (see 2792).

ListVersionID 2704 identifies the version of a code list. For listVersion ID 2704, the Category is Attribute 2716, the Object Class is CodeList 2726, the Property is Version 2738, the Representation/Association is Identifier 2750, the Type is xsd 2762, the Type Name is token 2774, and the Cardinality may be 0 or 1 2784. The attribute ListVersionID may be optional (see 2792).

ListAgencyID 2706 identifies the agency that manages the code list. The agencies from DE 3055 are used as the default (without roles). For listAgencyID 2706, the Category is Atribute 2718, the Object Class is CodeListAgency 2728, the Property is Identification 2740, the Representation/Association is Identifier 2752, the Type is xsd 2764, the Type Name is token 2776, and the Cardinality is may be 0 or 1 2786. The attribute ListAgencyID may be optional (see 2796).

ListAgencySchemeID 2708 identifies the identification scheme that represents the context that is used to identify the agency. For listAgencySchemeID 2708, the Category is Attribute 2720, the Object Class is CodeListAgency 2730, the Property is Scheme 2742, the Representation/Association is Identifier 2754, the Type is xsd 2766, the Type Name is token 2778, and the Cardinality is may be zero or one 2788. The attribute ListVersionAgencyID may be optional (see 2797).

ListAgencySchemeAgencyID identifies the agency that manages the listAgencySchemeID. This attribute can contain values from DE 3055 (excluding roles). For listAgencySchemeAgencyID 2710, the Category is Attribute 2722, the Object Class is CodeListAgency 2732, the Property is SchemeAgency 2744, the Representation/Association is Identifier 2756, the Type is xsd 2768, the Type Name is token 2780, and the Cardinality may be zero or one 2790. The attribute listAgencySchemeAgencyID may be optional (see 2798).

The CCT Code 2700 data type is used for elements that are used in the communication between partners or systems to enable a common coded value representation in place of texts, methods, or properties. This code list should be relatively stable, and not subject to frequent or significant changes (for example, CountryCode, LanguageCode, and so on). If the agency that manages the code list is not named explicitly, but is specified by using a role, this is done in the tag name.

Standardized codes and proprietary codes may be represented by CCT Code 2700. For standardized codes whose code lists are managed by an agency from the DE 3055 code list, listID 2702 identifies the code list for the standard code, listVersionID 2704 identifies the version of the code list, and listAgencyID 2706 identifies the agency from DE 3055 (excluding roles). For proprietary codes whose code lists are managed by an agency that is identified using a standard, listID 2702 identifies a code list for the proprietary code, listVersionID 2704 identifies a version of the code list, listAgencyID 2706 identifies standardized ID for the agency (such as the company that manages the proprietary code list), listAgencySchemeID 2708 identifies the identification scheme for the schemeAgencyID, and listAgencySchemeAgencyID 2710 identifies the agency from DE 2055 that manages the standardized ID 'listAgencyID'. For proprietary codes whose code lists are managed by an agency that is identified without the use of a standard, list ID 2702 identifies a code list for the proprietary code, listVersionID 2704 identifies a version of the code list, listAgencyID 2706 identifies a proprietary ID for the agency (such as the company that manages the proprietary code list), list AgencySchemeID 2708 identifies the identification scheme for the schemeAgencyID, and listAgencySchemeAgencyID 2710 identifies 'ZZZ' which is mutually defined from DE 3055.

For proprietary codes whose code lists are managed by an agency that is specified using a role or not at all, listID 2702 identifies an identification scheme for the proprietary identifier, and listVersionID 2704 identifies a version of the identification scheme. The role is specified as a prefix in the tag name. If there is more than one code list, listID and listVersionID can be used as attributes. No attributes are required if there is only one code list.

The representation term for the CCT Code 2700 is Code.

If CCT Code 2700 is used as a basis to define a specific code GDT that combines parts of standard code lists of different standardization organizations, and the complied lists are not disjunctive, attributes listID 2702, listVersionID 2704, and listAgencyID 2706 may be included in the GDT. However, these attributes may not be required in the GDT if the compiled lists are not disjunctive but, in each interface that uses the GDT, the lists supported by the interface are disjunctive.

To be able to represent values, methods, and property descriptions as code, the corresponding code list may be consistent and, unlike identifier lists, subject to very few changes to its content. In certain embodiments, CCT Code 2700 is not used to uniquely identify any logical or real objects. In some cases it may not be possible to differentiate clearly between Identifier and Code for coded values. This is particularly applicable if a coded value is used to uniquely identify an object and, at the same time, this coded value is used to replace a longer text. For example, this includes the coded values for "Country," "Currency," "Organization," "Region," and the like. If the list of coded values in this case is consistent, then the GDT Code can be used for the individual coded values.

For example, a passport number (PassportId) is an "Identifier," because a) it identifies a (real) object, namely, a natural person, and b) the list of passport numbers is constantly growing as new passport numbers are issued. A country code (CountryCode or CountryId) may be either an Identifier or a Code. The country code uniquely identifies a real object, namely, the country. However, the country code itself is also a replacement for the respective (unique) country name. Therefore, it is also a Code. Since the code list is relatively consistent, the country name should be represented as a Code. Changes are caused by political events and such changes are few in comparison to those relating to natural persons. A process code (ProcessCode) is a Code, because a) it describes a method type and not an object, and b) the list of process codes seldom changes.

(d) DateTime

A CCT DateTime 2800 is the time stamp, accurate to the second, of a calendar day. An example for CCT DateTime 2800 is: the following code represents Apr. 19, 2002 at 3:30, in Berlin:

<DateTime>2002-04-19T15:30:00+01:00</DateTime>.

The structure of CCT DateTime 2800 is depicted in FIG. 28. The Category for CCT DateTime 2800 is simpleType 2802, the Property is DateTime 2804, the Representation/Association is Content 2806, the Type is xsd 2808, and the Type Name is dateTime 2810.

The CCT DateTime 2800 core component type uses the W3C built-in data type xsd:dateTime. This is structured in accordance with the extended representation of ISO 8601. However, unlike in xsd:date, in certain embodiments, negative years or years are not represented with more than 4 numeric values in "Date." The extended representation may be represented as CCYY-MM-DDThh:mm:ss(.sss)Z or CCYY-MM-DDThh:mm:ss(.sss)(+/−)hh:mm (for example, 2002-04-19T15:30:00Z or 2002-04-19T10:30:00+05:00, respectively).

The extended representation uses CC for century (00-99); YY for year (00-99); MM for month (01-12); DD for day (01-28 for month 02; 01-29 for month 02 when the year is a leap year; 01-30 for months 04, 06, 09, and 11; 01-31 for months 01, 03, 05, 07, 08, 10, and 12); a hyphen between the year, month, and day; a separator “T” between the date and time; hh for hours (00-23); mm for minutes (00-59); ss for seconds (00-59); sss for one or more characters after the decimal point to represent fractions of a second; a colon between the hours, minutes, and seconds; Z to specify when the represented time is also the UTC time; +hh:mm to specify when the represented time is a local time that is ahead of UTC time; and −hh:mm to specify when the represented time is a local time that is behind UTC time.

The time stamp may be indicated without additional information (Z, +hh:mm, −hh:mm) relative to the coordinated world time (UTC time). In certain embodiments, this time stamp is not then be converted to the respective local time and is therefore for information purposes.

Ranges Day, Time, Minutes, Seconds, and Time Zone are defined for DateTime. Day represents all dates from the Gregorian calendar. Time represents exactly 24 hours (0-23). Minutes represents exactly 60 minutes (0-59). Seconds represents exactly 60 seconds (0-59). Time zone may be expressed in UTC (Coordinated Universal Time). If DateTime represents a local time, the time difference with respect to UTC time may also be specified.

CCT DateTime 2800 is used for exact time stamps that may contain the day and time. It may be, the creation date/time, receipt date/time, processing date/time, delivery date/time, expiry date/time, and the like. The primary representation term for the CCT DateTime 2800 is DateTime. Additional secondary representation terms are Date and Time. Date is a calendar representation of a particular day. The Built-In Data Type of Date is xsd:date and a restriction is length=10. Time is a time stamp, accurate to the second, of a particular time. The Built-In Data Type for Time is xsd:time.

The coordinated world time or coordinated universal time (UTC) is currently the uniform basis for time specifications that are used internationally. It is based on the route of the sun and is an extremely constant time unit. The mean solar time at the Greenwich meridian can be used as an approximate guide value for UTC.

The Gregorian calendar is currently used primarily in the western world and is an approximation of the complicated calculation of a “tropical year.” The mean of the “tropical year” is 365.2422 days. The Gregorian calendar, in use since 1582, defines the rules for leap years.

(e) ElectronicAddress

A CCT ElectronicAddress 2900 is a unique digital address that is represented by the Unified Resource Identifier (URI). An example for CCT ElectronicAddress 2900 in http format is:

```
<Address>
    http://www.sap.com/InterfaceRepository/ElectronicAddresses/
    description.htm
</Address>
One example representation of an X.400 address is:
<Address protocolID="XF" >
    mailto:c=DE;a=SAP;p=SAP;o=EXCHANGE;s=STUHEC;
    g=GUNTHER
</Address>.
```

The structure of CCT ElectronicAddress 2900 is depicted in FIG. 29. CCT ElectronicAddress 2900 includes attributes protocolID 2902 and languageCode 2904. The Category for CCT ElectronicAddress 2900 is complexType 2906, the Property is ElectronicAddress 2916, the RepresentationlAssociation is Content 2922, the Type is xsd 2928 and the Type Name is anyURI 2934.

For protocolID 2902, the Category is Attribute 2908, the Object Class is ElectronicAddress 2912, the Property is Protocol 2918, the Representation/Association is Identifier 2924, the Type is xsd 2930, the Type Name is token 2936, and the Cardinality between the CCT Electronic Address 2900 and protocolID 2902 is zero or one 2942. The protocolID Attribute 2902 may be optional (see 2946).

For languageCode 2904, the Category is Attribute 2908, the Object Class is ElectronicAddress 2914, the Property is Langauge 2920, the Representation/Association is Code 2926, the Type is xsd 2932, the Type Name is language 2938, the Length is from two to nine 2940, and the Cardinality between CCT Electronic Address 2900 and languageCode 2904 is zero or one 2944. The langaugeCode Attribute 2904 may be optional (see 2948).

The syntax for CCT Electronic Address 2900 is specified in the IETF RFC 2396. A URI consists of the scheme (in other words, how to access a resource), followed by a colon and the scheme-specific part. The scheme-specific part is relevant for the service that is connected to the particular scheme. A resource can have multiple URIs. One reason may be that a resource exists physically at multiple locations, due to mirroring, or it may be addressed using different protocols, which are specified by the scheme name. For example, a file can be referenced using http and ftp.

A URI is therefore generally constructed as <scheme>:<scheme-specific part>. The following is an example of a URL with typical partial expression types:

```
<scheme>://<user>:<password>@<host>:<port>/<path>?<query>;
<argument>=<value>&<argument>=<value>#<fragment>.
```

URI schemes that are available include ftp, http, mailto, File, cid, mid, nfs, https, uuid. Additional URI schemes that are currently not required include Gopher, News, nntp, telnet, wais, prospere, z39.50s, z39.50r, vemmi, service, imap, acap, rtsp, tip, pop, data, dav, opaquelocktoken, sip, tel, fax, modem, Idap, soap.beep, soap.beeps, urn, go, afs, tn3270, and mailserver.

If the above-listed URI schemes are not sufficient to determine the address protocol, one can either apply for another URI scheme in accordance with the guidelines of IETF RFC 2717, or define the corresponding protocol type more exactly by specifying the “protocolID” attribute as well. For this protocol type, the codes from the UN/EDIFACT DE 3155 “Communication Address Code Qualifier” code list are used. These codes include AB, AF, AN, AO, EM, EI, FT, GM, IM, SW, and XF. AB refers to Communications number assigned by Societe Internationale de Telecommunications Aeronautiques (SITA). AD refers to the AT&T mailbox identifier. AF refers to the switched telecommunications network of the United States Department of Defense. AN refers to the ODETTE File Transfer Protocol. AO refers to identification of the Uniform Resource Location (URL) Synonym: World wide web address. EM refers to the Electronic Mail Exchange of mail by electronic means (SMTP). EI refers to the number identifying the service and service user of an EDI transmission. FT refers to the file transfer access method according to ISO. GM refers to the GEIS (General Electric Information Service) mailbox. IM refers to the Internal mail address/number. SW refers to communications address assigned by Society for Worldwide Interbank Financial Telecommunications s.c. XF refers to the X.400 address.

No codings currently exist for ms (Microsoft Mail) and ccmail protocols, although respective coding proposals are expected to be submitted to the UN/CEFACT Forum for standardization.

If the attachment is a document or text, attribute languageCode 2904 may be used to represent the language of the attachment in accordance with IETF RFC 1766 or IETF RFC 3066.

CCT ElectronicAddress 2900 is a core component type that can be used to represent global data types (GDTS) for email addresses, Web sites, and documents or information provided on Web sites. The representation term for the CCT ElectronicAddress 2900 is ElectronicAddress.

In certain embodiments, CCT ElectronicAddress 2900 is not used as a reference component for binary data that is sent as an additional MIME attachment. The CCT BinaryObject 2900 is available for this purpose.

(f) Identifier

A CCT Identifier 3000 is a unique identification of an object within an identification scheme that is managed by an agency. There may be multiple identification schemes for identifying an object. An example for CCT Identifier 3000 is: a Standard Identifier/Standard Agency is <ProductID schemeID="GTIN" schemeAgencyID="113">10614141000415</ProductId>. One example of a Proprietary Identifier/Standard Agency is <ProductID schemeID="householdappliance" schemeAgencyID="065055766" schemeAgencySchemeID="DUNS" schemeAgencySchemeAgencyID="016">123</ProductId>. One example of a Proprietary Identifier/Proprietary Agency is <ProductID schemeID="householdappliance" schemeAgencyID="4711" schemeAgencySchemeID="PartyA" schemeAgencySchemeAgencyID="ZZZ">456</ProductId>.

The structure of CCT Identifier 3000 is depicted in FIG. 30. CCT Identifier 3000 includes Attributes schemeID 3002, schemeVersionID 3004, schemeAgencyID 3006, schemeAgency-SchemeID 3008, and schemeAgency-SchemeAgencyID 3010. For CCT Identifier 3000, the Category is complexType 3012, the Object Class is Identifier 3024, the Property is identifier 3036, the Representation/Association is Content 3048, the Type is xsd 3060, and the Datatype is token 3072.

SchemeID 3002 identifies an identification scheme. The identification scheme represents the context that is used to identify an object. SchemeID is unique within the agency that manages this identification scheme. For schemeID, the Category is Attribute 3014, the Object Class is Identification-Scheme 3026, the Property is Identification 3038, the Representation/Association is Identifier 3050, the Type is xsd 3062, the Datatype is token 3074, and the Length is from one to sixty 3084. The Cardinality between the CCT Identifier 3000 and schemeID 3002 is zero or one 3090. The schemeID attribute 3002 may be optional (see 3095).

SchemeVersionID 3004 identifies the version of an identification scheme. For schemeVersionID, the Category is Attribute 3016, the Object Class is IdentificationScheme 3028, the Property is Version 3040, the Representation/Association is Identifier 3052, the Type is xsd 3064, the Data-type is token 3076, and the Length is from one to fifteen 3086. The Cardinality between the CCT Identifier 3000 and Scheme-Version ID is zero or one 3091. The schemeVersionID attribute 3004 may be optional (see 3096).

SchemeAgencyID 3006 identifies the agency that manages an identification scheme. The agencies from DE 3055 are used as the default, but in certain embodiments the roles defined in DE 3055 are not used. For schemeAgencyID, the Category is Attribute 3018, the Object Class is Identification-Scheme-Agency 3030, the Property is Identification 3042, the Representation/Association is Identifier 3054, the Type is xsd 3066, the Datatype is token 3078, and the Length is between one to sixty 3087. The Cardinality between the CCT Identifier 3000 and schemeAgencyID 3006 is zero or one 3092. The schemeAgencyID attribute 3006 may be optional (see 3097).

SchemeAgencySchemeID 3008 identifies the identification scheme that represents the context that is used to identify the agency. For schemeAgencySchemeID, the Category is Attribute 3020, the Object Class is IdentificationScheme-Agency 3032, the Property is Scheme 3044, the Representation/Association is Identifier 3056, the Type is xsd 3068, the Datatype is token 3080, and the Length is from one to sixty 3088. The Cardinality between CCT Identifier 3000 and schemeAgencySchemeID 3008 is zero or one 3093. The SchemeAgencySchemeID attribute 3008 may be optional (see 3098).

SchemeAgencySchemeAgencyID 3010 identifies the agency that manages the SchemeAgencySchemeID. This attribute can contain values from DE 3055 (excluding roles). For SchemeAgencySchemeAgencyID, the Category is Attribute 3022, the Object Class is IdentificationScheme-Agency 3034, the Property is SchemeAgency 3046, the Representation/Association is Identifier 3058, the Type is xsd 3070, the Data-type is token 3082, and the Length is three 3089. The Cardinality between the CCT Identifier and SchemeAgencySchemeAgencyID 3010 is zero or one 3099. The SchemeAgencySchemeAgencyID attribute 3010 may be optional (see 3099).

The CCT Identifier 3000 data type is used for elements or attributes that are used in the communication between partners or systems to enable unique identification of logical or real objects. The number of types should not be limited, but continues to grow (e.g., ProductId, OrderId, . . . ). New IDs are continually added.

If the agency that manages the identification scheme is not explicitly identified, but is specified using a role, this is done in the tag name.

Standardized and proprietary identifiers can be represented. For standardized identifiers whose identification schemes are managed by an agency from the DE 3055 code list, schemeID 3002 identifies an identification scheme for the standard identifier, schemeVersionID 3004 identifies a version of the identification scheme, and schemeAgencyID 3006 identifies an agency from DE 3055 (excluding roles). For proprietary identifiers whose identification schemes are managed by an agency that is identified using a standard, schemeID 3002 identifies an identification scheme for the proprietary identifier, schemeVersionID 3004 identifies a version of the identification scheme, schemeAgencyID 3006 identifies a standardized ID for the agency (normally the company that manages the proprietary identifier), schemeAgencySchemeID 3008 identifies an identification scheme for the schemeAgencyID, and schemeAgency-SchemeAgencyID 3010 identifies an agency from DE 3055 that manages standardized ID 'schemeAgencyID'. For proprietary identifiers whose identification schemes are managed by an agency that is identified without the use of a standard, schemeID 3002 identifies an identification scheme for the proprietary identifier, schemeVersionID 3004 identifies a version of the identification scheme, schemeAgencyID 3006 identifies a proprietary ID for the agency (normally the company that manages the proprietary identifier), schemeAgencySchemeID 3008 identifies an identification scheme for the schemeAgencyID, and schemeAgency-SchemeAgencyID 3010 identifies 'ZZZ' which is mutually defined from DE 3055.

For proprietary identifiers whose identification schemes are managed by an agency that is specified using a role or not at all, schemeID 3002 identifies an identification scheme for the proprietary identifier and schemeVersionID 3004 identifies a version of the identification scheme. The role is specified as a prefix in the tag name. If there is more than one identification scheme, schemeID 3002 and schemeVersionID 3004 can be used as attributes. No attributes are required if there is one identification scheme.

The representation term for the CCT "Identifier" is Identifier.

(g) Indicator

A CCT Indicator 3100 is the binary encoded specification of a fact that has the value '0' or '1', i.e., 'true' or 'false'. An example for the CCT Indicator 3100 is: <Indicator>true</Indicator>.

The structure of CCT Indicator 3100 is depicted in FIG. 31. The Category for CCT Indicator 3100 is simpleType 3102, the Property is Indicator 3104, the Representation/Association is Content 3106, the Type is xsd 3108, and the Type Name is Boolean 3110.

CCT Indicator 3100 can have either the value 'true' ('1') or 'false' ('0'). CCT Indicator 3100 is used for binary classifications, indicators, flags, and the like. The representation term for the CCT "Indicator" is Indicator.

(h) Measure

CCT Measure 3200 is a physical measure value with the corresponding measurement unit. One example of CCT Measure 3200 is <Measure unitCode="KG">100</Measure>

The structure of Measure 3200 is depicted in FIG. 32. The Category for CCT Measure 3200 is complex Type 3204, the Property is Measure 3210, the Representation/Association is Content 3214, the Datatype is xsd:decimal 3218, and the length is 13 predecimal digits and 6 decimal values. Measure 3200 also includes attribute unitCode 3202. For Attribute unitCode 3202, the Category is Attribute 3206, the Object Class is Quantity 3206, the Property is Unit 3212, the representation term is Code 3216, the Datatype is xsd:token 3220, the length is 1 to 3 3224, and the Cardinality is one 3226.

Positive and negative quantities can be used by using the built-in data type "xsd:decimal." Negative values may be prefixed with a negative sign ("–"). However, positive values do not require a positive sign "+" prefix. Measurement units are represented in the attribute "unitCode," in accordance with UN/ECE Recommendation #20.

Measure is used for the representation of measure values with physical sizes (meters, centimeters, kilograms). The Representation/Association for the CCT "Measure" is Measure.

Measure should not be confused with Quantity. In contrast to Measure, Quantity is used for the definition of quantity values or units. Quantities can on the one hand be piece sizes, such as packets, containers, and the like. but also physical sizes (meters, centimeters, kilograms).

(i) Numeric

A CCT Numeric 3300 is a decimal value. An example of the CCT Numeric 3300 is: <Numeric>123.345</Numeric>.

The structure of CCT Numeric 3300 is depicted in FIG. 33. The Category for CCT Numeric 3300 is complexType 3302, the Property is Numeric 3304, the Representation/Association is Content 3306, and the Datatype is xsd:decimal 3308.

Positive and negative numeric values can be used by using the built-in data type "xsd:decimal." Negative values may be prefixed with a negative sign ("–"). However, positive values do not require a positive sign "+" prefix. The decimal sign may be represented as a period The primary representation term for CCT Numeric 3300 is Numeric. Other secondary representation terms are Value, Rate, and Percent.

In certain embodiments, CCT Numeric 3300 is not used for an indication of quantity, measure or amount.

(j) Quantity

A CCT Quantity 3400 is a quantity with the corresponding quantity unit. An example of the CCT Quantity 3400 is: <Quantity unitCode="CT">100</Quantity>(CT=Carton).

The structure of CCT Quantity 3400 is depicted in FIG. 34. CCT Quantity 3400 includes attribute unitCode 3402. For the CCT Quantity 3400, the Category is Complex Type 3404, the Property is Quantity 3410, the Representation/Association is Content 3414, the Data Type is xsd:decimal 3418, and the Length is thirteen predecimal and six decimal places 3422.

For the Attribute unitCode 3402, the Category is Attribute 3406, the Object Class is Quantity 3406, the Property is Unit 3412, the Representation/Association is Code 3416, the Datatype is xsd:token 3420, and the Length is from one to three 3424. The Cardinality between the CCT Quantity 3400 and unitCode 3402 is one 3426. The attribute unitCode 3402 is mandatory (see 3428).

Positive and negative quantities can be used by using the built-in data type "xsd:decimal." Negative values may be prefixed with a negative sign ("–"). However, positive values do not require a positive sign "+" prefix. Measurement units are represented in the attribute "unitCode," in accordance with UN/ECE Recommendation #20 or X12 355.

CCT Quantity 3400 is used for the representation of quantity values or units. This can involve physical sizes (meters, centimeters, kilograms) or piece sizes, such as packets, containers, and the like. The representation term for the CCT Quantity 3400 is Quantity.

CCT Quantity 3400 should not be confused with Measure. In contrast to Quantity, Measure is used for the definition of physical properties, such as sizes (temperature, lengths, and the like.) and weights of a part, product or article.

(k) Text

A CCT Text 3500 is a character string with an optional language specification. An example for CCT Text 3500 is: <Text languageCode="DE">Text is a character string with optional language specification. </Text>.

The structure of CCT Text 3500 is depicted in FIG. 35. CCT Text 3500 includes Attribute languageCode 3502. For CCT Text 3500, the Category is complexType 3504, the Property is Text 3508, the Representation/Association is Content 3512, the Type is xsd 3516, the Type Name is string 3520, and the Length is infinity 3524.

If the attachment is a document or text, languageCode 3502 can be used to show the language of the attachment in accordance with IETF RFC 1766 or IETF RFC 3066. For languagecode 3502, the Category is Attribute 3506, the Property is Language 3510, the Type is xsd 3518, the Type Name is language 3522, and the Length is from two to nine 3526. The Cardinality between the CCT Text 3500 and languagecode 3502 is zero or one 3528. Attribute languageCode 3502 may be optional (see 3530).

The primary representation term for the CCT Text 3500 include Amount, BinaryObject, Code, DateTime, Identifier, Indicator, Measure, Numeric, Quantity, and Text. Additional secondary representation terms include Graphic, Picture, Sound, Video, Date, Time, Value, Rate, Percent, and Name. The character length for CCT Text 3500 is not defined.

(2) Global Data Types (a) AcceptanceStatusCode

The GDT AcceptanceStatusCode 3600 is a coded representation of the status of the acceptance by a communication partner regarding a business transaction that has been transmitted to that partner. An example for GDT AcceptanceStatusCode 3600 is: <AcceptanceStatusCode>AP</AcceptanceStatusCode>.

The structure of GDT AcceptanceStatusCode 3600 is depicted in FIG. 36. For GDT AcceptanceStatusCode 3600, the Property is Acceptance Status Code 3602, the Representation/Association is Code 3604, the Type is CCT 3606, the Type Name is Code 3608, and the Length is two 3610. AcceptanceStatusCode CCT 3600 may be restricted (see 3612).

The possible values for GDT AcceptanceStatusCode 3600 may be a selection from the UN/EDIFACT code list DE 4343. Three codes that may be used are AP, AJ, and RE. AP means the business transaction transmitted by the communication partner has been accepted, AJ means a decision regarding the business transaction transmitted by the communication partner has not (yet) been made, and RE means the business transaction transmitted by the communication partner has been rejected.

GDT AcceptanceStatusCode 3600 may be used as a business status instead of as a technical acknowledgment of a message. GDT AcceptanceStatusCode 3600 also may be used as an immediate response to individual messages in bilateral negotiation processes between communication partners.

In an embodiment, GDT AcceptanceStatusCode 3600 is a proprietary selection from the UN/EDIFACT code list DE 4343. Addition of codes to this selection from the code list may require the approval of the Process Integration Council (PIC).

(b) AccountingObjectSet

A GDT AccountingObjectSet 3700 is a set of different account assignment objects. An account assignment object is a business object to which changes in value from business transactions may be assigned in accounting. An example of GDT AccountingObjectSet 3700 is:

```
<AccountingObjectSet>
    <CostCenterID>CC1000</CostCenterID>
    ..........
</AccountingObjectSet>.
```

The structure of GDT AccountingObjectSet 3700 is depicted in FIG. 37. GDT AccountingObjectSet 3700 includes an element CostCenterID 3702. For GDT AccountingObjectSet 3700, the Object Class is Accounting Object Set 3706 and the Representation/Association is Details 3712.

For CostCenterID 3702, the Category is Element 3704, the Object Class is Cost Center 3708, the Property is Identification 3710, the Representation/Association is identifier 3714, the Type is CCT 3716, the Type is identifier 3718, and the Length is from one to thirty-two 3720. The Cardinality between the GDT AccountingObjectSet 3700 and CostCenterID 3702 is zero or one 3722.

The data type GDT AccountingObjectSet 3700 provides the identifier for multiple types of account assignment objects including cost center (organizational unit for which costs arise), sales order, project, asset, task, funds center, and profit center. Identifiers are optional, but at least one identifier may be specified.

The data type GDT AccountingObjectSet 3700 may be used for account assignment, i.e., to assign an amount or quantity to a set of account assignment objects. The amount or quantity is assigned to account assignment objects of the GDT AccountingObjectSet 3700 according to accounting rules. For example, expenses from the purchase of office materials can be transferred to Accounting once the incoming invoice for the materials has been checked and then assigned to a cost center CC1000 and a profit center PC3050 there.

Applications that distribute an amount to several AccountingObjectSets (e.g., as percentages) may perform this distribution themselves and transfer the partial amounts, each with a separate AccountingObjectSet, to accounting. An example of a percentage distribution to several AccountingObjectSets is 40% to cost center CC1000 and profit center PC3050, 20% to cost center CC2000 and task IO0815, and 40% to cost center CC3000

(c) ActionCode

A GDT ActionCode 3802 is a coded representation of an instruction to the recipient of a message about how to process a transmitted business object.

An example for GDT ActionCode 3802 is:

```
<Item actionCode='04'>
    <ID>10</ID>
    <!--... Further Elements ...-->
</Item>
```

The structure of ActionCode 3802 is depicted in FIG. 38. For GDT ActionCode 3802, the Property is Action 3804, the Representation/Assocation is Code 3806, the Type is CCT 3808, the Type Name is Code, and the Length is two 3812. GDT ActionCode 3802 may be a restricted GDT (see 3814).

In an embodiment, GDT ActionCode 3802 can have a value from 01 to 06. The name for code 01 is Create and means that the element is to be created at the recipient. The element does not exist at the recipient. The element ID and data is transferred. The name for code 02 is Change and means that the element is to be changed at the recipient. The element exists at the recipient. The element ID and data is transferred. The name for the code 03 is Delete and means the element is to be deleted at the recipient. The element exists at the recipient. The element ID is transferred; data is transferred with the exception of elements that are mandatory due to their cardinality. The name for the code 04 is Save and means the element is to be saved at the recipient. The element can exist at the recipient. If the element already exists there, it is changed. If it does not exist there, it is created. The name for code 05 is Remove and means the element is to be deleted at the recipient. The element can exist at the recipient. If it exists, it is deleted. The element ID is transferred; data is not transferred with the exception of elements that are mandatory due to their cardinality. The name for code 06 is No Action and means that no action is to be carried out for the element at the recipient. The element exists at the recipient. The element ID and data is transferred.

ActionCodes may be used under one another in a hierarchy of elements. The following table lists the combinations that may be allowed (X) and not allowed (-).

| | Parent | | | | | | |
|---|---|---|---|---|---|---|---|
| | ActionCode | 01 | 02 | 03 | 04 | 05 | 06 |
| Child | 01 | X | X | — | X | — | — |
| | 02 | — | X | — | X | — | — |
| | 03 | — | X | — | X | — | — |
| | 04 | X(1) | X | — | X | — | X(2) |
| | 05 | — | X | — | X | — | — |
| | 06 | — | X | — | X | — | — |

For the table above, note (1) indicates that the code can have the meaning of the code "01" (Create). Note (2) in the table indicates that, to ensure compatibility with regard to enhancements, code "04" (Save) is allowed because this code is the default code if no code is transferred. A sender preferably does not set this code. A recipient preferably handles this code as a code "06" (No Action).

Also, regarding the table above, no further codes occur under code "03" (Delete) or "05" (Remove) because, apart from the element ID, no further data is transferred. A recipient checks the existence of an element using the rules described for the individual codes and generates an error if necessary. A recipient checks the validity of the codes in a hierarchy of elements according to the rules described and generates an error if necessary. A recipient ignores elements and ActionCodes transferred under a code "03" (Delete) or "05 (Remove) and behaves as if these elements and ActionCodes had not been transferred. A syntax check is allowed for these elements.

The actions requested at the recipient can have names that are typically used in the business context of a message, as long as this does not change the semantics of the ActionCodes defined above. For example, "Annul" or "Cancel" can be used instead of "Delete". An ActionCode is an attribute of the element to which it refers.

The ActionCodes "01" (Create), "02" (Change), "03" (Delete), and "06" (No Action) may model strict semantics that lead to errors at the recipient if the elements corresponding to the actions requested by the sender exist ("01") or do not exist ("02", "03", "06") at the recipient. Using strict semantics, therefore, may require that the sender have and use information about the messages it has already sent. The ActionCodes "04" (Save) and "05" (Remove) model soft semantics that, in an embodiment, do not lead to errors if the respective elements do not exist at the recipient. These soft semantics, therefore, do not require that the sender have and use information about the messages it has already sent. In an embodiment, an ActionCode that is not filled in a message instance or does not exist in an interface may be assumed to be "04" (Save). This ensures compatibility when enhancing interfaces to include an ActionCode.

In some messages, the action at the top level may be represented in the name of the message type rather than by an ActionCode. These messages behave semantically as if the ActionCode were at the level of the transferred BusinessTransactionDocument (for example: a message of the message type PurchaseOrderChangeRequest behaves semantically as if an ActionCode "02" (Change) were specified at the PurchaseOrder level).

An ActionCode may be used with a CompleteTransmissionIndicator for the parent element. For information about the combined use of CompleteTransmissionIndicator and ActionCode, see the description herein for the CompleteTransmissionIndicator. The ActionCode, can also be used for an element whose parent element does not have a CompleteTransmissionIndicator. In this case, the child elements of the parent element are transferred, not just the changed child elements.

The ActionCode may be used for elements that remain uniquely identifiable across several messages in a business process or that can only occur once in a message (cardinality 0 . . . 1 or 1). If an element cannot be clearly identified, it is documented explicitly when the ActionCode is used.

In an embodiment, the ActionCodes "03" (Delete) and "05" (Remove) do not stipulate that the recipient delete the respective element physically. However, once the element has been deleted, the recipient application handles further transmitted ActionCodes as if the element has been physically deleted. For example, in the case of the ActionCode "01" (Create), it is possible to create a new element with the same identification as the deleted element. Exceptions to this ActionCode behavior are explained and documented in the corresponding description of the interface or message type.

(d) ActiveIndicator

A GDT ActiveIndicator 3902 indicates whether an object is commercially active and whether it can be used in a process or not. An example of GDT ActiveIndicator 3902 is: <ActiveIndicator>true</ActiveIndicator>.

The structure of GDT ActiveIndicator 3902 is depicted in FIG. 39. For the GDT ActiveIndicator 3902, the Property is Active Indicator 3904, the Representation/Association is Indicator 3906, and the Type is CCT:Indicator 3908. GDT ActiveIndicator 3902 can have values 1 (true) or 0 (false). True means the object is active and false means the object is not active.

GDT ActiveIndicator 3902 is used to label objects that can be commercially active or inactive, for example, sources of supply. In the context of an interface, there may be a description of which object the GDT ActiveIndicator 3902 refers to and what it means in terms of business.

(e) Address

A GDT Address 4000*a* contains structured information about types of addresses. This information includes details about addressees, the postal address, and the physical location and communication connections.

The structure of GDT Address 4000*a* is depicted in FIG. 40. GDT Address 4000*a* includes elements OrganisationFormattedName 4002*a*, PersonName 4003*a*, FunctionalTitleName 4004*a*, DepartmentName 4005*a*, Office 4006*a*, PhysicalAddress 4012*a*, TaxJurisdictionCode 4036*a*, TimeZoneDifferenceValue 4037*a*, GeoCoordinates 4038*a*, and Communication 4039*a*. For the GDT Address 4000*a*, the Object Class is Address 4000*b* and the Representation/Association is Details 4000*c*.

Within the global data type GDT Address 4000*a*, OrganisationFormattedName 4002*a* contains the name of an organization (for example, a company or corporate body) as a part of the address. For example, this might be the address of a business partner. For OrganisatoinFormattedName 4002*a*, the Category is Element 4002*b*, the Object Class is Address 4002*c*, the Property is Organisation Formatted Name 4002*d*, the Representation/Association is Name 4002*e*, the Type is CCT 4002*f*, the Type Name is text 4002*g*, and the Length is from zero to forty 4002*h*. The Cardinality between the GDT Address 4000*a* and OrganisatoinFormattedName 4002*b* is from zero to four 4003*i*. OrganisationFormattedName may be restricted (see 4002*j*).

PersonName 4003*a* contains the parts of a natural person's name. For PersonName 4003*a*, the Category is Element 4003*b*, the Object Class is Address 4003*c*, the Property is Person Name 4003*d*, the Representation/Association is Person Name 4003*e*, the Type is GDT 4003*f*, and the Type Name is Person Name 4003*g*. The Cardinality between the GDT Address 4000*a* and PersonName 4003*a* is zero or one 4003*h*.

FunctionalTitleName 4004*a* contains the function of a contact person and can be a part of the address of the contact person in the organization. For the FunctionalTitleName 4004*a*, the Category is Element 4004*b*, the Object Class is Address 4004*c*, the Property is Functional Title Name 4004*d*, the Representation/Association is Name 4004*e*, the Type is CCT 4004*f*, the Type Name is Text 4004*g*, and the Length is from zero to forty 4004*h*. The Cardinality between the GDT Address 4000*a* and FunctionalTitleName 4004*a* is zero or one 4004*i*. FunctionalTitleName may be restricted (see 4004*j*).

DepartmentName 4005*a* contains the department of a contact person and can be a part of the address of the contact person in the organization. For the DepartmentName 4005*a*, the Category is Element 4005*b*, the Object Class is Address 4005*c*, the Property is Department Name 4005*d*, the Representation/Association is Name 4005*e*, the Type is CCT 4005*f*, the Type Name is text 4005*g*, and the Length is from zero to forty 4005*h*. The Cardinality between the GDT Address 4000*a* and DepartmentName 4005*a* is zero or one 4005*i*. DepartmentName may be restricted (see 4005*j*).

Office 4006*a* contains information that describes the working environment of a contact person as well as information for addressing or identifying this person within the organization. For Office 4006*a*, the Category is Element 4006*b*, the Object Class is Address 4006*c*, the Property is Office 4006*d*, and the Representation/Association is Details 4006*e*. The Cardinality between the GDT Address 4000*a* and Office 4006*a* is zero or one 4006*f*. Office can also comprise BuildingID 4007*a*, FloorID 4008*a*, RoomID 4009*a*, InhouseMailID 4010*a*, and CorrespondenceShortName 4011*a*.

BuildingID 4007*a* is the number or ID of the building in the address of a contact person. For BuildingID 4007*a*, the Category is Element 4007*b*, the Object Class is Office 4007*c*, the Property is Building Identification 4007*d*, the Representation/Association is Identifier 4007*e*, the Type is CCT 4007*f*, the Type Name is identifier 4007*g*, and the Length is from one to ten 4007*h*. The Cardinality between the GDT Address 4000*a* and BuildingID 4007*a* is zero or one 4007*i*. BuildingID may be restricted (see 4007*j*).

FloorID 4008*a* refers to the floor of the building in the address of a contact person. For FloorID 4008*a*, the Category is Element 4008*b*, the Object Class is Office 4008*c*, the Property is Floor Identification 4008*d*, the Representation/Association is Identifier 4008*e*, the Type is CCT 4008*f*, the Type Name is Identifier 4008*g*, and the Length is from one to ten 4008*h*. The Cardinality between the GDT Address 4000*a* and FloorID 4008*a* is zero or one 4008*i*. FloorID may be restricted (see 4008*j*).

RoomID 4009*a* specifies the room number in the address of a contact person. For RoomID 4009*a*, the Category is Element 4009*b*, the Object Class is Office 4009*c*, the Property is Room Identification 4009*d*, the Representation/Association is Identifier 4009*e*, the Type is CCT 4009*f*, the Type Name is Identifier 4009*g*, and the Length is from one to ten 4009*h*. The Cardinality between the GDT Address 4000*a* and RoomID 4009*a* is zero or one 4009*i*. RoomID may be restricted (see 4009*j*).

InhouseMailID 4010*a* specifies an internal mail address. For InhouseMailID 4010*a*, the Category is Element 4010*b*, the Object Class is Office 4010*c*, the Property is Inhouse Identification 4010*d*, the Representation/Association is Identifier 4010*e*, the Type is CCT 4010*f*, the Type Name is Identifier 4010*g*, and the Length is from one to ten 4010*h*. The Cardinality between the GDT Address 4000*a* and InhouseMailID 4010*a* is zero or one 4010*i*. InHouseMailID may be restricted (see 4010*j*).

CorrespondenceShortName 4011*a* is the short name of the contact person for use in correspondence. This short name can be used both internally and externally. For CorrespondenceShortName 4011*a*, the Category is Element 4011*b*, the Object Class is Office 4011*c*, the Property is Correspondence Short Name 4011*d*, the Representation/Association is Name 4011*e*, the Type is CCT 4011*f*, the Type Name is text 4011*g*, and the Length is from zero to ten 4011*h*. The Cardinality between the GDT Address 4000*a* and CorrespondenceShortName 4011*a* is zero or one 4011*i*. CorrespondenceShortName may be restricted (see 4011*j*).

PhysicalAddress 4012*a* contains the postal address data of a physical location. For the PhysicalAddress 4012*a*, the Category is Element 4012*b*, the Object Class is Address 4012*c*, the Property is Physical Address 4012*d*, and the Representation/Association is Details 4012*e*. The Cardinality between the GDT Address 4000*a* and PhysicalAddress 4012*a* is zero or one 4012*f*.

PhysicalAddress 4012*a* also comprises CountryCode 4013*a*, RegionCode 4014*a*, StreetPostalCode 4015*a*, POBoxPostalCode 4016*a*, CompanyPostalCode 4017*a*, CityName 4018*a*, AdditionalCityName 4019*a*, DistrictName 4020*a*, POBoxID 4021*a*, POBoxIndicator 4022*a*, POBoxCountryCode 4023*a*, POBoxRegionCode 4034*a*, POBoxCityName 4035*a*, StreetName 4036*a*, StreetPrefixName 4037*a*, StreetSuffixName 4038*a*, HouseID 4039*a*, AdditionalHouseID 4040*a*, BuildingID 4041*a*, FloorID 4042*a*, RoomID 4043*a*, CareOfName 4044*a*, and Description 4045*a*. For each, the category is Element (4013*b*-4045*b*) and the Object Class is Physical Address (4013*c*-4045*c*).

CountryCode 4013*a* is the country code of the address in accordance with ISO 3166-1. For the CountryCode 4013*a*, the Property is CountryCode 4013*d*, the Representation/Association is Code 4013*e*, the Type is GDT 4013*f*, and the Type Name is CountryCode 4013*g*. The Cardinality between the GDT Address 4000*a* and CountryCode 4013*a* is zero or one 4013*h*.

RegionCode 4014*a* is the code for the region of the country in the address. This specification may be part of the address, e.g., in the US. For RegionCode 4014*a*, the Property is RegionCode 4014*d*, the Representation/Association is Code 4014*e*, the Type is GDT 4014*f*, and the Type Name is RegionCode 4014*g*. The Cardinality between the GDT Address 4000*a* and RegionCode 4014*a* is zero or one 4014*h*.

StreetPostalCode 4015*a* is the zip code in the street address. The rules for zip codes are country-specific. For StreetPostalCode 4015*a*, the Property is Street Zip Code 4015*d*, the Representation/Association is Code 4015*e*, the Type is CCT 4015*f*, the Type Name is Code 4015*g*, and the Length is from one to ten 4015*h*. The Cardinality between GDT Address 4000*a* and StreetPostalCode 4015*a* is zero or one 4015*i*. StreetPostalCode 4015*a* may be restricted (see 4015*j*).

POBoxPostalCode 4016*a* is the box zip code. For POBoxPostalCode 4016*a*, the Property is PO Box Zip Code 4016*d*, the Representation/Association is Code 4016*e*, the Type is CCT 4016*f*, the Type Name is Code 4016*g*, and the Length is from one to ten 4016*h*. The Cardinality between GDT Address 4000*a* and POBoxPostalCode 4016*a* is zero or one 4016*i*. POBoxPostalCode 4016*a* may be restricted (see 4016*j*).

CompanyPostalCode 4017*a* is the zip code of the company when the receiver is an organization with its own zip code. For CompanyPostalCode 4017*a*, the Property is Company Zip Code 4017_d_, the Representation/Association is Code 4017_e_, the Type is CCT 4017_f_, the Type Name is Code 4017_g_, and the Length is from one to ten 4017_h_. The Cardinality between GDT Address 4000_a_ and CompanyPostalCode 4017_a_ is zero or one 4017_i_. CompanyPostalCode 4015_a_ may be restricted (see 4017_j_).

CityName 4018_a_ is the name of the city in the address. For the CityName 4018_a_, the Property is City Name 4018_d_, the Representation/Association is Name 4018_e_, the Type is CCT 4018_f_, the Type Name is Text 4018_g_, and the Length is from zero to forty 4018_h_. The Cardinality between GDT Address 4000_a_ and CityName 4018_a_ is zero or one 4018_i_. CityName 4018_a_ may be restricted (see 4018_j_).

AdditionalCityName 4019_a_ is the name of the city of residence if it differs from the city in the postal address. AdditionalCityName may have different semantics (field HOME_CITY in the ADRC) and therefore may not be handled using Cardinality. It is analogous to AdditionalHouseID. For AdditionalCityName 4019_a_, the Property is Additional City Name 4019_d_, the Representation/Association is Name 4019_e_, the Type is CCT 4019_f_, the Type Name is Text 4019_g_, and the Length is from zero to forty 4019_h_. The Cardinality between the GDT Address 4000_a_ and AdditionalCityName 4019_a_ is zero or one 4019_i_. AdditionalCityName 4019_a_ may be restricted (see 4019_j_).

DistrictName 4020_a_ is the name of the district. For DistrictName 4020_a_, the Property is District Name 4020_d_, the Representation/Association is Name 4020_e_, the Type is CCT 4020_f_, the Type Name is Text 4020_g_, and the Length is from zero to forty 4020_h_. The Cardinality between the GDT Address 4000_a_ and DistrictName 4020_a_ is zero or one 4020_i_. DistrictName 4020_a_ may be restricted (see 4020_j_).

POBoxID 4021_a_ is the number of the post-office box. For POBoxID 4021_a_, the Property is PO Box Identification 4021_d_, the Representation/Association is Identifier 4021_e_, the Type is CCT 4021_f_, the Type Name is Identifier 4021_g_, and the Length is from one to ten 4021_h_. The Cardinality between the GDT Address 4000_a_ and POBoxID 4021_a_ is zero or one 4021_i_. CityName 4021_a_ may be restricted (see 4021_j_).

POBoxIndicator 4022_a_ specifies whether the post-office box has a number that is unknown. For POBoxIndicator 4018_a_, the Property is PO Box Indicator 4018_d_, the Representation/Association is Indicator 4018_e_, the Type is CCT 4018_f_, and the Type Name is Indicator 4018_g_. The Cardinality between GDT Address 4000_a_ and POBoxIndicator 4022 is zero or one 4018_h_.

POBoxCountryCode 4023_a_ is the country code for the post-office box in the address. For POBoxCountryCode 4023_a_, the Property is PO Box Country Code 4023_d_, the Representation/Association is Code 4023_e_, the Type is GDT 4023_f_, and the Type Name is CountryCode 4023_g_. The Cardinality between GDT Address 4000_a_ and POBoxCountryCode 4023_a_ is zero or one 4023_h_.

POBoxRegionCode 4024_a_ is the code for the region of the country for the post-office box in the address. For the POBoxRegionCode 4024_a_, the Property is PO Box Region Code 4024_d_, the Representation/Association is Code 4024_e_, the Type is GDT 4024_f_, and the Type Name is Region Code 4024_g_. The Cardinality between GDT Address 4000_a_ and POBoxRegionCode 4024_a_ is zero or one 4024_h_.

POBoxCityName 4025_a_ is the name of the city for the post-office box in the address. For the POBoxCityName 4025_a_, the Property is PO Box City name 4025_d_, the Representation/Association is Name 4025_e_, the Type is CCT 4025_f_, the Type Name is Text 4025_g_, and the Length is from zero to forty 4025_h_. The Cardinality between GDT Address 4000_a_ and POBoxCityName 4025_a_ is zero or one 4025_i_. POBoxCityName 4025_a_ may be restricted (see 4025_j_).

StreetName 4026_a_ is the name of the street in the address. For the StreetName 4026_a_, the Property is Street name 4026_d_, the Representation/Association is Name 4026_e_, the Type is CCT 4026_f_, the Type Name is Text 4026_g_, and the Length is from zero to sixty 4026_h_. The Cardinality between GDT Address 4000_a_ and StreetName 4026_a_ is zero or one 4026_i_. POBoxCityName 4026_a_ may be restricted (see 4026_j_).

StreetPrefixName 4027_a_ is an additional prefix in the address and precedes the street name in the previous line. For the StreetPrefixName 4027_a_, the Property is Street Prefix Name 4027_d_, the Representation/Association is Name 4027_e_, the Type is CCT 4027_f_, the Type Name is Text 4027_g_, and the Length is from zero to forty 4027_h_. The Cardinality between GDT Address 4000_a_ and StreetPrefixName 4027_a_ is from zero to two 4027_i_. StreetPrefixName 4027_a_ may be restricted (see 4027_j_)

StreetSuffixName 4028_a_ is an additional suffix in the address and comes after the street name in the subsequent line. For the StreetSuffixName 4028_a_, the Property is Street Suffix Name 4028_d_, the Representation/Association is Name 4028_e_, the Type is CCT 4028_f_, the Type Name is Text 4028_g_, and the Length is from zero to forty 4028_h_. The Cardinality between GDT Address 4000_a_ and StreetSuffixName 4028_a_ is from zero to two 4028_i_. StreetPrefixName 4028_a_ may be restricted (see 4028_j_).

HouseID 4029_a_ is the house number for the street in the address. For the HouseID 4029_a_, the Property is House Identification 4029_d_, the Representation/Association is Identifier 4029_e_, the Type is CCT 4029_f_, the Type Name is Identifier 4029_g_, and the Length is from one to ten 4029_h_. The Cardinality between GDT Address 4000_a_ and HouseID 4029_a_ is zero or one 4029_i_. HouseID 4029_a_ may be restricted (see 4029_j_).

AdditionalHouseID 4030_a_ is an addition to the house number, e.g., apartment number. For the AdditionalHouseID 4030_a_, the Property is Additional House Identification 4030_d_, the Representation/Association is Identifier 4030_e_, the Type is CCT 4030_f_, the Type Name is Identifier 4030_g_, and the Length is from one to ten 4030_h_. The Cardinality between GDT Address 4000_a_ and AdditionalHouseID is zero or one 4030_i_. AdditionalHouseID 4030_a_ may be restricted (see 4030_j_).

BuildingID 4031_a_ is the number or abbreviation for a building, e.g., WDF03. For the BuildingID 4030_a_, the Property is Building Identification 4030_d_, the Representation/Association is Identifier 4030_e_, the Type is CCT 4030_f_, the Type Name is Identifier 4030_g_, the Length is from one to twenty 4030_h_. The Cardinality between GDT Address 4000_a_ and BuildingID 4031_a_ is zero or one 4030_i_. BuildingID 4030_a_ may be restricted (see 4030_j_).

FloorID 4032_a_ is the number of the floor in the building. For the FloorID 4032_a_, the Property is Floor Identification 4032_d_, the Representation/Association is Identifier 4032_e_, the Type is CCT 4032_f_, the Type Name is Identifier 4032_g_, and the Length is from one to ten 4032_h_. The Cardinality between GDT Address 4000_a_ and FloorID 4032_a_ is zero or one 4032_i_. FloorID 4032_a_ may be restricted (see 4032_j_).

RoomID 4033_a_ is the number of the room in the building. For the RoomID 4033_a_, the Property is Room Identification 4033_d_, the Representation/Association is Identifier 4033_e_, the Type is CCT 4033_f_, the Type Name is Identifier 4033_g_, and the Length is from one to ten 4033_h_. The Cardinality between GDT Address 4000_a_ and RoomID 4033_a_ is zero or one 4033_i_. RoomID 4033_a_ may be restricted (see 4033_j_).

CareOfName 4034*a* is a different receiver when the receiver is not the same as the addressee. For the CareofName 4034*a*, the Property is Care of name 4034*d*, the Representation/Association is Name 4034*e*, the Type is CCT 4034*f*, the Type Name is Text 4034*g*, and the Length is from zero to ten 4034*h*. The Cardinality between the GDT Address 4000*a* and CareOfName 4034*a* is zero or one 4034*i*. CareofName 4034*a* may be restricted (see 4034*j*).

Description 4035*a* is an addition to the address that refers to any special details. For the Description 4030*a*, the Property is Description 4030*d*, the Representation/Association is Text 4030*e*, the Type is GDT 4030*f*, and the Type Name is Description 4030*g*. The Cardinality between GDT Address 4000*a* and Description 4035*a* is unbounded 4030*h*.

TaxJurisdictionCode 4036*a* is the tax jurisdiction code belonging to the address. This code is used in various countries and can normally be derived uniquely from the address. However, it is dependent on the code list of the provider. A country can have multiple code-list providers. For the TaxJurisdictionCode 4036*a*, the Category is Element 4036*b*, the Object Class is Address 4036*c*, the Property is Tax Jurisdiction Code 4036*d*, the Representation/Association is Code 4036*e*, the Type is GDT 4046*f*, and the Type Name is TaxJurisdictionCode 4036*g*. The Cardinality between the GDT Address 4000*a* and TaxJurisdictionCode 4036*a* is zero or one 4036*h*.

TimeZoneDifferenceValue 4037*a* is the difference (in hours) between the local time zone of the location defined by PhysicalAddress 4012*a* and UTC (Coordinated Universal Time). For the TimeZoneDifferenceValue 4037*a*, the Category is Element 4037*b*, the Object Class is Address 4037*c*, the Property is Time Zone Difference Value 4037*d*, the Representation/Association is Value 4037*e*, the Type is GDT 4037*f*, and the Type Name is TimeZoneDifferenceValue 4037*g*. The Cardinality between the GDT Address 4000*a* and TimeZoneDifference Value 4037*a* is zero or one 4037*h*.

GeoCoordinates 4038*a* contains the geographic data, i.e., longitude and latitude, specified in accordance with the WGS84 reference system, with which a location on the globe can be determined. LatitudeMeasure is the geographic latitude in degrees. LongitudeMeasure is the Geographic longitude in degrees. The measurement unit degrees for each is specified by the attribute "unitCode" Southern latitudes are generally negative and northern latitudes are generally positive. Also, western longitudes are negative and eastern longitudes are positive. Positive values do not require a positive sign (+) for a prefix. However, negative values may have a negative sign (−) for a prefix. The unitCode "DD" corresponds to the unit for the degree of an angle (UN/CEFACT Rec. #20). For the GeoCoordinates 4038*a*, the Category is Element 4038*b*, the Object Class is Address 4038*c*, the Property is GeoCoordinates 4038*d*, the Representation/Association is GeoCoordinates 4038*e*, the Type is GDT 4038*f*, and the Type Name is GeoCoordinates 4038*g*. The Cardinality between the GDT Address 4000*a* and GeoCoordinates 4038*a* is zero or one 4038*h*.

Communication 4049*a* contains information about communication paths with which a person or organization can be reached. For the Communication 4049*a*, the Category is Element 4049*b*, the Object Class is Address 4049*c*, the Property is Communication 4049*d*, and the Representation/Association is Details 4049*e*. The Cardinality between the GDT Address 4000*a* and Communication 4049 is zero or one 4049*f*. Communication 4049*a* is comprised of CorrespondenceLanguageCode 4040*a*, Telephone 4042*a*, MobilePhone 4047*a*, Facsimile 4052*a*, email 4058*a*, and Web 4063*a*.

CorrespondenceLanguageCode 4040*a* specifies the language for written correspondence. For CorrespondenceLanguageCode 4040*a*, the Category is Element 4040*b*, the Object Class is Communication 4040*c*, the Property is Correspondence Language Code 4040*d*, the Representation/Association is Code 4040*e*, the Type is GDT 4040*f*, and the Type Name is LanguageCode 4040*g*. The Cardinality may be zero or one 4040*h*.

Telephone 4042*a* contains one telephone number in each instance. For Telephone 4042*a*, the Category is Element 4042*b*, the Object Class is Communication 4042*c*, the Property is Telephone 4042*d*, and the Representation/Association is Details 4042*e*. The Cardinality between the GDT Address 4000*a* and Telephone 4042*a* is unbounded 4042*f*. Telephone is comprised of Number 4043*a*, NumberDefaltIndicator 4044*a*, NumberDescription 4045*a*, and NumberUsageDenialIndicator 4046*a*.

For Number 4043*a*, the Category is Element 4043*b*, the Object Class is telephone 4043*c*, the Property is Phone Number 4043*d*, the Representation/Assocation is Phone Number 4043*e*, the Type is GDT 4043*f*, and the Type Name is Phone Number 4043*g*. The Cardinality between the GDT Address 4000*a* and Number 4043*a* is one 4043*h*.

NumberDefaultIndicator 4044*a* indicates whether a telephone number is the default number for the address. In certain embodiments, there may be a default telephone number, provided the address contains a telephone number. The default value is "false." For NumberDefaultIndicator 4044*a*, the Category is Element 4044*b*, the Object Class is Telephone 4044*c*, the Property is Number Default Indicator 4044*d*, the Representation/Association is Indicator 4044*e*, the Type is CCT 4044*f*, and the Type Name is Indicator 4044*g*. The Cardinality between the GDT Address 4000*a* and NumberDefaultIndicator 4044*a* is one 4044*h*.

NumberDescription 4045*a* is an addition to the telephone number that refers to special details or that contains other unstructured information. For NumberDescription 4045*a*, the Category is Element 4045*b*, the Object Class is telephone 4045*c*, the Property is Number Description 4045*d*, the Representation/Association is Text 4045*e*, the Type is GDT 4045*f*, and the Type Name is Description 4045*g*. The Cardinality between the GDT Address 4000*a* and NumberDescription 4045*a* is unbounded 4045*h*.

NumberUsageDenial 4046*a* indicates whether the telephone number may be used or not. If this indicator is set to "true," this means that, in accordance with the legal requirements of the respective country, the telephone number may not be used. There are exceptions, however. For example, return calls requested by the business partner or calls made for service purposes may still be permitted. Furthermore, it is advisable to save telephone numbers so that calls from business partners can still be identified, even if this indicator is set. The default is "false." For NumberUsageDenial 4046*a*, the Category is Element 4046*b*, the Object Class is telephone 4046*c*, the Property is Number Usage Denial Indicator 4046*d*, the Representation/Association is Indicator 4046*e*, the Type is CCT 4046*f*, and the Type Name is Indicator 4046*g*. The Cardinality between the GDT Address 4000*a* and NumberUsageDenial 4046*a* is one 4046*h*.

MobilePhone 4047*a* contains a mobile phone number in each instance. For MobilePhone 4047*a*, the Category is Element 4047*b*, the Object Class is Communication 4047*c*, the Property is Mobile Phone 4047*d*, and the Representation/Association is Details 4047*e*. The Cardinality between the GDT Address 4000*a* and MobilePhone 4047*a* is unbounded 4047*f*. MobilePhone 4047*a* is also comprised of Number

4048*a*, NumberDefaultIndicator 4049*a*, NumberDescription 4050*a*, and NumberUsageDenialIndicator 4051*a*.

For Number 4048*a*, the Category is Element 4048*b*, the Object Class is Mobilephone 4048*c*, the Property is Phone Number 4048*d*, the Representation/Association is Phone Number 4048*e*, the Type is GDT 4048*f*, and the Type Name is Phone Number 4048*g*. The Cardinality between the GDT Address 4000*a* and Number 4048*a* is one 4048*h*.

NumberDefaultIndicator 4049*a* indicates whether a mobile phone number is the default mobile phone number for the address. In certain embodiments, there may be a default mobile phone number, provided the address contains a mobile phone number. For NumberDefaultIndicator 4049*a*, the Category is Element 4049*b*, the Object Class is Mobilephone 4049*c*, the Property is Number Default Indicator 4049*d*, the Representation/Association is Indicator 4049*e*, the Type is CCT 4049*f*, and the Type Name is Indicator 4049*g*. The Cardinality between the GDT Address 4000*a* and NumberDefaultIndicator 4049*a* is one 4049*h*.

NumberDescription 4050*a* is an addition to the mobile phone number that refers to special details or that contains other unstructured information. For NumberDescription 4050*a*, the Category is Element 4050*b*, the Object Class is Mobilephone 4050*c*, the Property is Number Description 4050*d*, the Representation/Association is Text 4050*e*, the Type is GDT 4050*f*, and the Type Name is Description 4050*g*. The Cardinality between the GDT Address 4000*a* and NumberDescription 4050*a* is unbounded 4050*h*.

NumberUsageDenialIndicator 4051*a* indicates whether the mobile phone number may be used or not. If this indicator is set to "true," this means that, in accordance with the legal requirements of the respective country, the mobile phone number may not be used. There are exceptions, however. For example, return calls requested by the business partner or calls made for service purposes may still be permitted. Further, mobile phone numbers may be saved so that calls from business partners and the like can still be identified, even if the indicator is set. For NumberUsageDenial 4051*a*, the Category is Element 4051*b*, the Object Class is Mobilephone 4051*c*, the Property is Number Usage Denial Indicator 4051*d*, the Representation/Association is Indicator 4051*e*, the Type is CCT 4051*f*, and the Type Name is Indicator 4051*g*. The Cardinality between the GDT Address 4000*a* and NumberUsageDenialIndicator 4051*a* is one 4051*h*.

Facsimile 4052*a* contains a fax number in each instance. For Facsimile 4052*a*, the Category is Element 4052*b*, the Object Class is Communication 4052*c*, the Property is Facsimile 4052*d*, and the Representation/Association is Details 4052*e*. The Cardinality between the GDT Address 4000*a* and Facsimile 4052*a* is unbounded 4052*f*. Facsimile 4052*a* is also comprised of Number 4053*a*, NumberDefaultIndicator 4054*a*, NumberDescription 4055*a*, and NumberUsageDenialIndicator 4056*a*.

For Number 4053*a*, the Category is E 4053*b*, the Object Class is Facsimile 4053*c*, the Property is Phone Number 4053*d*, the Representation/Associateion is Phone Number 4053*e*, the Type is GDT 4053*f*, the Type Name is Phone Number 4053*g*, and the Cardinality between the GDT Address 4000*a* and Number 4053*a* is one 4053*h*.

NumberDefaultIndicator 4054*a* indicates whether a fax number is the default number for the address. In certain embodiments, there is a default fax number, provided the address contains a fax number. For NumberDefaultIndicator 4054*a*, the Category is Element 4054*b*, the Object Class is Facsimile 4054*c*, the Property is Number Default Indicator 4054*d*, the Representation/Association is Indicator 4054*e*, the Type is CCT 4054*f*, and the Type Name is Indicator 4054*g*. The Cardinality between the GDT Address 4000*a* and NumberDefaultIndicator 4054*a* is one 4054*h*.

NumberDescription 4055*a* is an addition to the fax number that refers to special details or that contains other unstructured information. For NumberDescription 4055*a*, the Category is Element 4055*b*, the Object Class is Facsimile 4055*c*, the Property is Number Description 4055*d*, the Representation/Association is Text 4055*e*, the Type is GDT 4055*f*, and the Type Name is Description 4055*g*. The Cardinality between the GDT Address 4000*a* and NumberDescription 4055*a* is unbounded 4055*h*.

NumberUsageDenial 4056*a* indicates whether the fax number may be used or not. If this indicator is set to "true," this means that, in accordance with the legal requirements of the respective country, the fax number may not be used. There are exceptions, however. For example, response faxes requested by the business partner or faxes sent for service purposes and the like may still be permitted. Furthermore, it is advisable to save fax numbers so that faxes sent by business partners and the like can still be identified, even if the indicator is set. For NumberUsageDenial 4056*a*, the Category is Element 4056*b*, the Object Class is Facsimile 4056*c*, the Property is Number Usage Denial Indicator 4056*d*, the Representation/Association is Indicator 4056*e*, the Type is CCT 4056*f*, and the Type Name is Indicator 4056*g*. The Cardinality between the GDT Address 4000*a* and NumberUsageDenial 4056*a* is one 4056*h*.

Email 4058*a* contains an email address in each instance. For Email 4058*a*, the Category is Element 4058*b*, the Object Class is Communication 4058*c*, the Property is Email 4058*d*, and the Representation/Association is Details 4058*e*. The Cardinality between the GDT Address 4000*a* and Email 4058*a* is unbounded 4058*h*. Email 4058 also comprises Address 4059*a*, AddressDefaultIndicator 4060*a*, AddressDescription 4061*a*, and AddressUsageDenialIndicator 4062*a*.

Address 4059*a* specifies the email address. For Address 4059*a*, the Category is Element 4059*b*, the Object Class is Email 4059*c*, the Property is Email Address 4059*d*, the Representation/Association is Email Address 4059*e*, the Type is GDT 4059*f*, and the Type Name is Email Address 4059*g*. The Cardinality between the GDT Address 4000*a* and Address 4059*a* is one 4053*h*.

AddressDefaultIndicator 4060*a* indicates whether an email address is the default email address for this address. There may be a default email address, provided there are any email addresses for this address. For AddressDefaultIndicator 4060*a*, the Category is Element 4060*b*, the Object Class is Email 4060*c*, the Property is Email Address Default Indicator 4060*d*, the Representation/Association is Indicator 4060*e*, the Type is CCT 4060*f*, and the Type Name is Indicator 4060*g*. The Cardinality between the GDT Address 4000*a* and AddressDefaultIndicator 4060*a* is one 4060*h*.

AddressDescription 4061*a* is an addition to the email address that refers to special details or that contains other unstructured information. For AddressDescription 4061*a*, the Category is Element 4061*b*, the Object Class is Email 4061*c*, the Property is Email Address Description 4061*d*, the Representation/Association is Text 4061*e*, the Type is GDT 4061*f*, and the Type Name is Description 4061*g*. The Cardinality between the GDT Address 4000*a* and AddressDescription 4061*a* is unbounded 4061*h*.

AddressUsageDenialIndicator 4062*a* indicates whether the e-mail address may be used or not. If this indicator is set to "true," this means that, in accordance with the legal requirements of the respective country, the email address may not be used. There are exceptions, for example, responses to email enquiries may still be permitted. Furthermore, email addresses may be saved so that emails sent by business partners and the like can still be identified, even if the indicator is set. For AddressUsageDenialIndicator 4062_a_, the Category is Element 4062_b_, the Object Class is Email 4062_c_, the Property is Email address Usage Denial Indicator 4062_d_, the Representation/Association is Indicator 4062_e_, the Type is CCT 4062_f_, and the Type Name is Indicator 4062_g_. The Cardinality between the GDT Address 4000_a_ and AddressUsageDenialIndicator 4062_a_ is one 4062_h_.

Web 4063_a_ contains a Web address in each instance. For Web 4063_a_, the Category is Element 4063_b_, the Object Class is Communication 4063_c_, the Property is Web 4063_d_, and the Representation/Association is Details 4063_e_. The Cardinality between the GDT Address 4000_a_ and Web 4063_a_ is unbounded 4063_f_. Web 4063_a_ is also comprised of Address 4064_a_, AddressDefaultIndicator 4065_a_, and AddressDescription 4066_a_.

Address 4064_a_ specifies the URI of a Web site. The length is long enough to accommodate a generated URI. For Address 4064_a_, the Category is Element 4064_b_, the Object Class is Web 4064_c_, the Property is Web Address 4064_d_, the Representation/Association is Address 4064_e_, the Type is GDT 4064_f_, and the Type Name is Web Address 4064_g_. The Cardinality between the GDT Address 4000_a_ and Address 4064_a_ is one 4064_h_.

AddressDefaultIndicator 4065_a_ indicates whether a Web address is the default Web address for this address. There may be a default Web address, provided the address contains a Web address. For AddressDefaultIndicator 4065_a_, the Category is Element 4065_b_, the Object Class is Web 4065_c_, the Property is Address Default Indicator 4065_d_, the Representation/Association is Indicator 4065_e_, the Type is CCT 4065_f_, and the Type Name is Indicator 4065_g_. The Cardinality between the GDT Address 4000_a_ and AddressDefaultIndicator 4065_a_ is one 4065_h_.

Address Description 4066_a_ is an addition to the Web address that refers to special details or that contains other unstructured information. For AddressDescription 4066_a_, the Category is Element 4066_b_, the Object Class is Web 4066_c_, the Property is Address Description 4066_d_, the Representation/Association is Text 4066_e_, the Type is GDT 4066_f_, and the Type Name is Description 4066_g_. The Cardinality between the GDT Address 4000_a_ and Address Description 4066_a_ is unbounded 4066_h_.

An example of GDT Address 4000_a_ is:

```
<Address>
    <OrganisationFormattedName>Systems, Applications
and Products</OrganisationFormattedName>
    <OrganisationFormattedName>in Data
Processing</OrganisationFormattedName>
    <PersonName>
        <FormattedName>Mr. Paul John Tester</FormattedName>
        <LegalName>Paul John Tester</LegalName>
        <GivenName></GivenName>
        <PreferredGivenName>Paul</PreferredGivenName>
        <MiddleName>John</MiddleName>
        <Family>
            <FamilyName>Tester</FamilyName>
            <PrimaryIndicator>true</PrimaryIndicator>
            <FamilyNamePrefix></FamilyNamePrefix>
        </Family>
        <Affix>
            <AffixName>Mr.</AffixName>
            <AffixCode>FormOfAddress</AffixCode>
        </Affix>
    </PersonName>
    <FunctionalTitleName>Sales Manager</FunctionalTitleName>
    <DepartmentName>Sales Department</DepartmentName>
    <Office>
        <BuildingID>WDF01</BuildingID>
        <FloorID>2</FloorID>
        <RoomID>G2.01</RoomID>
        <InhouseMailID>SCM IBD 2</ InhouseMailID >
        <CorrespondenceShortName>TeP</CorrespondenceShortName>
    </Office>
    <PhysicalAddress>
        <CountryCode>MX</CountryCode>
        <RegionCode>DIF</RegionCode>
        <StreetPostalCode>01210</StreetPostalCode>
        <CityName>Mexico</CityName>
        <DistrictName> Santa Fé </DistrictName>
        <StreetName>Piso Col Pena Blanca</StreetName>
        <StreetPrefixName>Edificio Plaza Reforma Santy
Fé</StreetPrefixName>
        <StreetPrefixName>Prologacion Paseo de la
Reforma</StreetPrefixName>
        <HouseID>No 600-2°</HouseID>
    </PhysicalAddress>
    <TaxJurisdictionCode listID="," listVersionID="," listAgencyID =","
listAgencySchemeID=","listAgencySchemeAgencyID="">123456789101112
</TaxJurisdictionCode>
    <TimeZoneDifferenceValue>+08:00</TimeZoneDifferenceValue>
    <GeoCoordinates>
        <LatitudeMeasure unitCode="DD">40.23232300000</LatitudeMeasure>
        <LongitudeMeasure
```

-continued

```
unitCode="DD">123.12121200000</LongitudeMeasure>
          </GeoCoordinates>
          <Communication>
               <Telephone>
               <TelephoneNumber>
                    <AreaID>6227</AreaID>
                    <SubscriberID>7</SubscriberID>
                    <ExtensionID>47474</ExtensionID>
                    <CountryCode>DE</ CountryCode>
               </TelephoneNumber>
               <TelephoneNumberDefaultIndicator>1
</TelephoneNumberDefaultIndicator>
               <Description></ Description>
               <UsageDenialIndicator>0</UsageDenialIndicator>
          </Telephone>
          <MobilePhone>
               <MobilePhoneNumber>
                    <AreaID>170</AreaID>
                    <SubscriberID>1234567</SubscriberID>
                    <ExtensionID></ExtensionID>
                    <CountryCode>DE</ CountryCode>
               </MobilePhoneNumber>
               <MobilePhoneNumberDefaultIndicator>1
</MobilePhoneNumberDefaultIndicator>
               <Description></Description>
               <UsageDenialIndicator>0</UsageDenialIndicator>
          </MobilePhone>
          <Facsimile>
               <FacsimileNumber>
                    <AreaID>6227</AreaID>
                    <SubscriberID>78</SubscriberID>
                    <ExtensionID>99999</ExtensionID>
                    <CountryCode>DE</ CountryCode>
               </FacsimileNumber>
               <FacsimileNumberDefaultIndicator>1
</FacsimileNumberDefaultIndicator>
               <Description>Secretary</Description>
               <UsageDenialIndicator>0</UsageDenialIndicator>
          </Facsimile>
          <EmailAddress>paul.tester@sap.com</EmailAddress>
<EmailAddressDefaultIndicator>1</EmailAddressDefaultIndicator>
               <Description></Description>
               <UsageDenialIndicator>0</UsageDenialIndicator>
          <Web>
               <WebAddress>http://www.sap.com</WebAddress>
               <WebAddressDefaultIndicator>1</WebAddressDefaultIndicator>
               <Description>Official information</Description>
          </Web>
     </Communication>
</Address>.
```

This example address produces the following result, which can be printed out for a label:

Systems, Applications and Products in Data Processing
Mr. Paul John Tester
Sales Manager
Edificio Plaza Reforma Santa Fé
Prolongacion Paseo de la Reforma
No 600-2° Piso Col Pena Blanca
Santa Fé 01210
Mexico, DIF.

Note that some fields, such as TaxJurisdictionCode and TimeZoneValueDifference, may not be used even if they have been completed. If BuyerParty is an organization then PersonName may be empty. If BuyerParty is a natural person then OrganisationFormattedName may be empty.

The addresses of technical objects, which describe a physical location, are represented by an appropriate field selection, e.g., the address of the organization without OrganisationFormattedName and Communication.

(f) AdjustmentReasonCode

The GDT AdjustmentReasonCode 4100 is a coded representation for the reason for an adjustment. An example of GDT AdjustmentReasonCode 4100 is: <AdjustmentReasonCode>CANCELED_PROMOTION</AdjustmentReasonCode>.

The structure of GDT AdjustmentReasonCode 4100 is depicted in FIG. 41.

The illustrative code is general and can be used in many contexts. The standard code list to be used in an interface depends on the particular context. In an embodiment, a standard code list is used. If an interface supports one of the lists or if the supported code lists are disjunctive, none of the attributes may be required for identification of the particular standard code lists.

For the use of GDTs in revisions of forecast time series, the possible code values are subsets of the "Adjustment Reason Code List" of the "EAN.UCC XML Business Message Standards, version 1.3 (July 2003)." These include CANCELED_PROMOTION, DISCONTINUED_PRODUCT, DISTRIBUTION_ISSUE, EXPANDED_PROMOTION, FORWARD_BUY, INVENTORY_POLICY_CHANGE, NEW_LOCATION, NEW_PRODUCT, NEW_PROMOTION, ORDER_POLICY_CHANGE, OVERSTOCK_CONDITION, PRICE_CHANGE, PRO- DUCT_CHANGEOVER, PRODUCTION_ISSUE, REDUCED_PROMOTION, REVISED_PLAN, REVISED_PROMOTION, STORE_CLOSURE, TRANSPORTATION_ ISSUE and WEATHER_RELATED_EVENT. For each use of the above, the context and code list used may be documented.

(g) AllowedIndicator

A GDT AllowedIndicator 4200 indicates whether something, such as a specific procedure, operation or status, is allowed or not. An example of GDT AllowedIndicator 4200 is: <LowerCaseAllowedIndicator>true</LowerCaseAllowedIndicator>.

The structure of GDT Allowed Indicator 4200 is depicted in FIG. 42. For the GDT Allowed Indicator 4200, the Property is Allowed 4202, the Representation/Association is Indicator 4204, the Type is CCT 4206, and the Type Name is Indicator 4208.

The GDT AllowedIndicator 4200 can have the values true or false. True means that something is allowed while false means that something is not allowed. For each GDT AllowedIndicator 4200, what is allowed or not allowed may be indicated precisely. This is reflected in an appropriate name prefix. For example, a NegativeValueAllowedIndicator specifies whether negative numeric values are allowed, while a LowerCaseAllowedIndicator specifies whether lower-case letters are allowed.

The GDT AllowedIndicator 4200 may be used to indicate whether a customer is allowed to submit an online purchase order in lower-case letters. In the context of an interface, the business significance of "what is allowed" may be described for the AllowedIndicator in addition to using the name prefix.

(h) Amount

A GDT Amount 4300 is an amount with the corresponding currency unit. An example of GDT Amount 4300 is: <OrderedAmount currencyCode="EUR">777.95</OrderedAmount>.

The structure of GDT Amount 4300 is depicted in FIG. 43. For the GDT Amount 4300, the Property is Amount 4302, the Representation/Association is Amount 4304, the Type is CCT 4306, and the Type Name is Amount 4308.

GDT Amount 4300 is used to represent amounts, costs, remunerations, and fees. The amount value in GDT Amount 4300 may be represented with a maximum of 22 predecimal places and 6 decimal places. Both positive and negative amounts can be used. Amount 4300 may also include the attribute currencyCode which refers to the currency unit in accordance with the ISO 4217three-character code. A currency may be specified.

(i) AmountBalanceIndicator

A GDT AmountBalanceIndicator 4400 indicates whether an amount is a balance or not. An example of GDT AmountBalanceIndicator 4400 is: <AmountBalanceIndicator>true</AmountBalanceIndicator>.

The structure of GDT AmountBalanceIndicator 4400 is depicted in FIG. 44. For the GDT AmountBalanceIndicator 4400, the Property is Amount Balance 4402, the Representation/Association is Indicator 4404, the Type is CCT 4406, and the Type Name Indicator is 4408.

BalanceIndicator can have either the value true or false. True signifies that the amount specified is a balance. False signifies that the amount specified is not a balance. GDT Amount 4400 can be used to indicate whether the balance of all open receivables is transferred in a message to a party or whether the amount transferred is an individual receivable. A balance amount may also be positive or negative. In the context of an interface, the amount to which the GDT Amount 4400 refers and the business significance of the balance may be described.

(j) AspectID

A GDT AspectID 4500 is a unique identifier for an aspect. An aspect determines a selection of attributes relevant for the aspect for a predefined object type. An example of GDT AspectID 4500 is: <AspectID>DETAIL</AspectID>.

The structure of GDT AspectID 4500 is depicted in FIG. 45. For the GDT AspectID 4500, the Object Class is Aspect 4502, the Property is Identification 4504, the Representation/Association is Identifier 4506, the Type is CCT 4508, the Type Name is Identifier 4510 and the length is from one to forty 4512.

In one embodiment, when a catalog is published, a GDT AspectID 4500 can be used as the CatalogueItemAspectID to specify which properties (and their values) are to be displayed in the view for a catalog item. For example, in a product catalog, the "LIST" aspect contains those product properties that are required to select a product from a list quickly. The "DETAIL" aspect contains all the properties, while the "COMPARISON" aspect contains those that are useful for comparing the details of two products.

A distinction should also be made between an aspect and a "view." A view of a predefined object is a restriction of the object's attributes. An aspect is a semantic criterion that is used to decide which attributes belong to a particular object view. When a given aspect is applied to various object types, the result is a view. For this reason, an aspect usually has many different views.

(k) Attachment

A CCT Attachment 4600 is an arbitrary document type that is related to either the whole message or just a particular part. An example of CCT Attachment 4600 is: <Attachment id="sampleAttachment.xml">Some Attachment</Attachment>.

The structure of CCT Attachment 4600 is depicted in FIG. 46. The CCT Attachment 4600 includes attributes id 4612 and filename 4632. For the CCT Attachment 4600, the Property is Attachment 4602, the Representation/Association is Binary Object 4604, the Type is xsd 4606, the Type Name is normalizedString 4608. The CCT Attachment 4600 is Title 4610.

Attribute id 4612 uniquely identifies the binary content within the message that corresponds to the SOAP or ebXML messaging protocols. For the CCT Id 4612, the Category is Attribute 4614, the Object Class is Attachment 4616, the Property is Identification 4618, the Representation/Association is Identifier 4620, the Type is xsd 4622, the Type Name is string 4624, the Length is from one to thirty five 4626, the Cardinality is one 4628. The CCT Id 4612 may be unique as used for references using the manifest 4630.

Attribute filename 4632 contains the relevant name or file name of the binary content. The structure of CCT Filename 4632 is depicted in FIG. 46. For the CCT Filename 4632, the Category is Attribute 4634, the Object Class is Attachment 4636, the Property is Filename 4638, the Representation/Association is Text 4640, the Type is xsd 4642, the Type Name is String 4644, the length is up to seventy 4646, and the Cardinality is zero or one 4648.

The element value of CCT BinaryObject 4600 is based on the XML-scheme-specific built-in data type xsd:normalizedString and can be used to represent an intelligible title or name of the binary object.

The attachment may be sent in the same message in the form of a MIME attachment. The technical referencing is done using the manifest of the respective message protocol (SOAP or ebXML messaging). The value from the "id"

attribute is used as the referencing code. Every attachment may have this attribute and the identifiers may be unique in the same document instance.

Attachments are similar to the attachments in electronic message transfer (for example, STMP). The attachments may be documents that can be read by humans, such as word-processing documents, spreadsheet documents, presentation documents, and the like. These documents can be in many different formats (e.g., doc, pdf, ppt, xls, and the like.).

The binary data streams of Attachment should not be stored on a Web server as a file. The global data type "WebAddress" is available for this purpose.

(l) AttachmentWebAddress

A CDT AttachmentWebAddress 4700 is a Web address for a document of any type that is related to the transmitted message or part of the message, but is not itself transmitted as part of the message. An example of CDT AttachmentWebAddress 4700 is: <AttachmentWebAddress>http://www.abc-.com/Attachments/HelloWorld.txt</AttachmentWebAddress>.

The structure of CDT AttachmentWebAddress 4700 is depicted in FIG. 47. For the CDT Attachment Web Address 4700, the Object Class Qualification is Attachment 4702, the Object Class is Web Address 4704, the Property is Address 4706, the Representation/Association is Electronic Address 4708, the Type is GDT 4710,and the Type Name is Web Address 4712.

The specification of an CDT AttachmentWebAddress 4700 may support http and https URI schemes. The CDT AttachmentWebAddress 4700 may also be used to transmit a link to an attachment, instead of transmitting the attachment itself. The recipient can use the transmitted link to access the attachment.

When using an CDT AttachmentWebAddress 4700 in an interface or GDT, how the link is to be interpreted may be described. For example, as a simple link to enable the user to display the attachment on the interface, as a request to the recipient system to load the attachment from the specified address as soon as possible, whether there are restrictions on how long the attachment is available at the specified URL, or whether and by whom the attachment can be changed.

(m) BatchID

A GDT BatchID 4800 is a unique identifier for one batch in the context of a material number. Batches are non-reproducible, homogenous subsets of a product, whose characteristics lie within the batch characteristics defined for the product. An example of GDT BatchID 4800 is: <BatchID>CH20021015</BatchID>.

The structure of GDT BatchID 4800 is depicted in FIG. 48. For the GDT BatchID 4800, the Category is Complex Type 4802, the Object Class is Batch 4804, the Property is Identification 4806, the Representation/Association is Identifier 4808, the Type is CCT 4810, the Data Type is Identifier 4812, the Length is from one to ten 4814.

The GDT BatchID 4800 may comprise letters, numbers, and displayable special characters, with the possible exception of "*," "&," and, " ". The identifier may be uppercase and the GDT BatchID 4800 may not begin with blank characters or contain consecutive blank characters. The GDT BatchID 4800 value range includes combinations of the permitted characters up to a maximum length of 10 characters.

SchemeID identifies an identification scheme. The identification scheme represents the context that is used to identify an object. SchemeID may be unique within the agency that manages this identification scheme. The structure of GDT schemeID 4816 is depicted in FIG. 48. For the GDT schemeID 4816, the Category is Attribute 4818, the Object Class is Identification Scheme 4820, the Property is Identification 4822, the Representation/Association is Identifier 4824, the Type is xsd 3126, the Data Type is Token 4828, the Cardinality is zero or one 4830. The GDT schemeID 4816 may be Optional 4832.

SchemeVersionID identifies the version of an identification scheme. The structure of GDT schemeVersionID 4834 is depicted in FIG. 48. For the GDT schemeVersionID 4834, the Category is Attribute 4836, the Object Class is Identification Scheme 4838, the Property is Version 4840, the Representation/Association is Identifier 4842, the Type is xsd 4844, the Data Type is Token 4846, and the Cardinality is zero or one 4848. The GDT schemeVersionID 4834 may be optional 4850.

SchemeAgencyID identifies the agency that manages an identification scheme. The agencies from DE 3055 may be used as the default, but the roles defined in DE 3055 may not be used. GDT BatchID 4800 may be unique within the identification scheme that is managed by schemeAgencyID. For the GDT schemeAgencyID 4852, the Category is Attribute 4854, the Object Class is IdentificationSchemeAgency 4856, the Property is Identification 4858, the Representation/Association is Identifier 4860, the Type is xsd 4862, the Data Type is Token 4864, and the Cardinality is zero or one 4866. The GDT schemeAgencyID 4852 may be optional 4868.

SchemeAgencySchemeID identifies the identification scheme that represents the context for agency identification. For the GDT schemeAgencySchemeID 4870, the Category is Attribute 4872, the Object Class is IdentificationSchemeAgency 4874, the Property is Scheme 4876, the Representation/Association is Identifier 4878, the Type is xsd 4880, the Data Type is Token 4882, and the Cardinality is zero or one 4884. The GDT schemeAgencySchemeID 4870 may be optional 4886.

SchemeAgencySchemeAgencyID identifies the agency that manages the SchemeAgencySchemeID. This attribute may contain values from DE 3055 (excluding roles). For the GDT schemeAgencySchemeAgencyID 4888, the Category is Attribute 4890, the Object Class is IdentificationSchemeAgency 4892, the Property is SchemeAgency 4894, the Representation/Association is Identifier 4896, the Type is xsd 4898, the Data Type is Token 4899, and the Cardinality is zero or one 4801A. The GDT schemeAgencySchemeAgencyID 4888 may be optional 4802A.

The GDT BatchID 4800 may be used to identify batches. Specifying attributes may be optional. By default, the system may assume that the batch identified by the GDT BatchID 4800 is a manufacturer batch and therefore no attributes are required.

(n) BiddingConditionCode

The GDT BiddingConditionCode 4900 is a coded representation of the bidding conditions for a bid invitation property. An example of GDT BiddingConditionCode 4900 is: <QuoteQuantityBiddingConditionCode>01</QuoteQuantityBiddingConditionCode>.

The structure of GDT Bidding Condition Code 4900 is depicted in FIG. 49. For the GDT Bidding Condition Code 4900, the Object Class is Bidding 4902, the Property is Condition 4904, the Representation/Association is Code 4906, the Type is CCT 4908, the Type Name is Code 4910, and the Length is two 4912.

The GDT BiddingConditionCode 4900 may have the values 01 through 04. 01 means that a bid is mandatory for a bid invitation property, and the property valuation may not be changed. 02 means a bid is mandatory for a bid invitation property, and the property valuation can be changed. 03 means a bid may be optional for a bid invitation property, and the property valuation cannot be changed. 04 means a bid may be optional for a bid invitation property, and the property valuation can be changed Illustrative bid invitation properties for which bidding conditions can be specified may include quantity, price, and terms of delivery. When the GDT BiddingConditionCode 4900 is applied to a bid invitation property, it is identified in the prefix, e.g., QuoteQuantityBiddingConditionCode. A default procedure should be specified for each usage of a GDT BiddingConditionCode 4900.

The GDT BiddingConditionCode 4900 may be a proprietary code list with fixed predefined values. Changes to the permitted values may involve changes to the interface.

(o) BusinessDocumentMessageHeader

A GDT BusinessDocumentMessageHeader 5000 comprises business information from the perspective of the sender application for identifying a business document within a message (if applicable, with a reference to a previous instance of a business document within a previous message), information about the sender, and any information about the receiver. An example of GDT BusinessDocumentMessageHeader 5000 is:

```
<PurchaseOrderRequest>
    <MessageHeader>
        <ID schemeID="INVOIC">00000000123456</ID>
        <ReferenceID schemeID="ORDER">00000000123455
        </ReferenceID>
        <CreationDateTime>2003-10-21T12:21Z+01:00</ID>
            <SenderParty>
                <StandardID schemeAgencyID="016">4711
                </StandardID>
                <ContactPerson>
                    <InternalID schemeID="PartyID"
schemeAgencyID="MPL_002">820</InternalID>
                    <Address>...</Address>
                </ContactPerson>
            </SenderParty>
            <RecipientParty>
                <InternalID schemeID="PartyID"
schemeAgencyID="BPL_300">747</InternalID>
                <ContactPerson>
                    <InternalID schemeID="PartyID"
schemeAgencyID="BPL_300">737</InternalID>
                    <Address>...</Address>
                </ContactPerson>
            </RecipientParty>
        </MessageHeader>
        ....
    </PurchaseOrderRequest>.
```

The structure of GDT Business Document Message Header 5000 is depicted in FIG. 50. The GDT Business Document Message Header 5000 includes elements ID 5010, ReferenceID 5028, CreationDateTime 5046, SenderParty 5062, and RecipientParty 5078. For the GDT Business Document Message Header 5000, the Object Class is Business Document Message 5002, the Property is Header 5004, the Representation/Association is Details 5006, the Type is GDT 5008.

ID 5010 is the identifier for the instance of the business document within a (technical) message that is generated by the business application level at the sender. For the ID 5010, the Category is Element 5012, the Object Class is Business Document Message 5014, the Property is Identification 5016, the Representation/Association is Identifier 5018, the Type is GDT 5020, the Type Name is Business Document Message ID 5022, the Length is from one to thirty-five 5024, and Cardinality is zero or one 5026.

ReferenceID 5028 is the identifier of another instance of a business document in another (technical) message that the BusinessDocument references (a BusinessDocument can link to another BusinessDocumentMessage to represent a business interrelation or a dependency). For the Reference ID 5028, the Category is Element 5030, the Object Class is Business Document Message 5032, the Property is Reference Identification 5034, the Representation/Association is Identifier 5036, the Type is GDT 5038, the Type Name is Business Document Message ID 5040, the Length is from one to thirty-five 5042, and the Cardinality is zero or one 5044.

CreationDateTime 5046 is a date and time stamp (to the second) for when a message is created for the business document within the business application. For the GDT Creation Date Time 5046, the Category is Element 5048, the Object Class is Business Document Message 5050, the Property is Creation Date Time 5052, the Representation/Association is Date Time 5054, the Type is GDT 5056, the Type Name is Date Time 5058, the Cardinality is one 5060.

SenderParty 5062 is the party that creates and sends the BusinessDocument at business application level. SenderParty contains a unique sender identification. The identifiers contained in SenderParty can also be used for internal forwarding at application level. The contact person in it contains the necessary direct contact information in case there are problems or errors during processing of the respective BusinessDocument. For the GDT Sender Party 5062, the Category is Element 5064, the Object Class is Business Document Message 5066, the Property is Sender 5068, the Representation/Association is Party 5070, the Type is GDT 5072, the Type Name is Business Document Message Header Party 5074, the Cardinality is zero or one 5076.

RecipientParty 5078 is the party that receives and processes the BusinessDocument at business application level. RecipientParty may contain a unique receiver identification. The identifiers contained in RecipientParty can also be used for internal forwarding at application level. The contact person in it contains the contact information in case there are problems or errors during processing of the respective BusinessDocument. The structure of GDT Recipient Party 5078 is depicted in FIG. 50. For the GDT Recipient Party 5078, the Category is Element 5080, the Object Class is Business Document Message 5082, the Property is Recipient 5084, the Representation/Association is Party 5086, the Type is GDT 5088, the Type Name is Business Document Message Header Party 5090, the Cardinality is from zero to n 5092.

BusinessDocuments used for B2B scenarios may use the GDT BusinessDocumentMessageHeader 5000. If required, GDT BusinessDocumentMessageHeader 5000 can also be used in BusinessDocuments intended for A2A scenarios.

GDT BusinessDocumentMessageHeader 5000 may be used for numerous purposes. For example, GDT BusinessDocumentMessageHeader 5000 may be used for forwarding to the relevant position or target person within a business application, for tracing and monitoring of a BusinessDocument and its processing status at business application level, and for managing and monitoring business processes.

GDT BusinessDocumentMessageHeader 5000 may also be used for administration and error handling. The unique identification can be used for referencing and in the case of errors at business application level, the contact person in SenderParty or RecipientParty can be contacted directly. The name, telephone number, e-mail address, fax number, and the like. can be transmitted by the GDT BusinessDocumentMessageHeader 5000 for this purpose.

GDT BusinessDocumentMessageHeader 5000 may also be used for converting general information to other standards, such as IDoc, UN/CEFACT, ANSI X.12, ODETTE, TRADACOMMS, xCBL, OAG BODs, and RosettaNet-PIPs. These are standards that represent reference data for the business application level according to predefined conventions. In an embodiment, this may be guaranteed if the general header information of a BusinessDocument is identical to the envelope or header information of the respective default message.

The ReferenceID is used to represent references that originate from the succession of BusinessDocuments in the BusinessDocument choreography. This may include query/response or request/confirmation messages. The respective interface document may identify the previous BusinessDocument to which the ReferenceID refers, i.e., what the reference specified by the BusinessDocument reference means.

Comparing GDT BusinessDocumentMessageHeader 5000 to the header information from the message transfer protocols such as "Reliable Messaging," "OASIS ebXML MSG," "OASIS ebXML CPP/CPA," and "Rosetta Net RNIF 2.0," demonstrates that the GDT BusinessDocumentMessageHeader 5000 may contain redundant information compared to these technical transfer protocols. However, the GDT BusinessDocumentMessageHeader 5000 may be used at business application level instead of at a technical level. The information in this case is information that can be sent, received, and processed at this level.

GDT BusinessDocumentMessageHeader 5000 may be based on UN/CEFACT Standard BusinessDocumentMessage Header Technical Specification—Working Draft—Revision 2.2.5" dated 26 Nov. 2003. The ID (BusinessDocumentMessageID) of the GDT BusinessDocumentMessageHeader 5000 may be distinguishable from the technical Messaged (the XI message). Specifically the BusinessDocumentMessageID is issued by the business application and is stable over the entire lifetime of the BusinessDocument. It also remains unchanged even when the message is sent via multiple, successive middleware systems. The technical Messaged is issued at the level of the technical middleware system and generally changes each time the BusinessDocument is resent or forwarded by a middleware system and when the BusinessDocument is split into multiple technical messages by a middleware system.

(p) BusinessDocumentMessageHeaderParty

A GDT BusinessDocumentMessageHeaderParty 5100 is information about a party that is responsible for sending or receiving a BusinessDocument at a business application level. GDT BusinessDocumentMessageHeaderParty 5100 contains the necessary general business information about an involved sender or receiver party. A party is typically a natural person, organization, or business partner group in which a company has a business or intra-enterprise interest. This could be a person, organization, or group within or outside of the company. An example of GDT BusinessDocumentMessageHeaderParty 5100 is:

```
<PurchaseOrderRequest>
    <MessageHeader>
        <SenderParty>
            <StandardID schemeAgencyID="016">4711
            </StandardID>
            <ContactPerson>
                <InternalID schemeID="PartyID"
schemeAgencyID="MPL_002">820</InternalID>
                <Address>...</Address>
            </ContactPerson>
        </SenderParty>
        <RecipientParty>
```

-continued

```
                <InternalID schemeID="PartyID"
schemeAgencyID="BPL_300">747</InternalID>
                <ContactPerson>
                    <InternalID schemeID="PartyID"
schemeAgencyID="BPL_300">737</InternalID>
                    <Address>...</Address>
                </ContactPerson>
            </RecipientParty>
            ...
        </MessageHeader>
        ....
    </PurchaseOrderRequest>.
```

In the above example, for SenderParty, schemeAgencyID="016" can correspond to Dun & Bradstreet according to the code list DE 3055. For RecipientParty: schemeID="PartyID" specifies that the scheme "PartyID" was used to identify the party. schemeAgencyID="BPL__300" specifies that the scheme was assigned by the SAP CMDM system "BPL__300."

The structure of GDT Business Document Message Header Party 5100 is depicted in FIG. 51. For the GDT Business Document Message Header Party 5100, the Object Class is Business Document Message Header Party 5102 and the Property is Details 5104.

InternalID 5106 refers to the proprietary identifier used when SenderParty or RecipientParty use common master data (Extended Enterprise) or when they are in alignment with regard to the semantics and use of InternalID. For the GDT Internal ID 5106, the Category is Element 5108, the Object Class is Business Document Message Header Party 5110, the Property is Internal Identification 5112, the Representation/Association is Identifier 5114, the Type is GDT 5116, the Type Name is Party Internal ID 5118, and the Cardinality is zero or one 5120.

StandardID 5122 refers to the standardized identifier for SenderParty or RecipientParty of the organization based on the code list DE 3055. For the GDT Standard ID 5122, the Category is Element 5124, the Object Class is Business Document Message Header Party 5126, the Property is Standard Identification 5128, the Representation/Association is Identifier 5130, the Type is GDT 5132, the Type Name is Party Standard ID 5134, and the Cardinality is from zero to n 5136.

ContactPerson refers to the contact person of the party. For the GDT Contact Person 5138, the Category is Element 5140, the Object Class is Business Document Message Header Party 5142, the Property is Contact Person 5144, the Representation/Association is Contact Person 5146, the Type is GDT 5148, the Type Name is Contact Person 5150, and the Cardinality is zero or one 5152.

The GDT BusinessDocumentMessageHeaderParty 5100 may be used in the BusinessDocumentMessageHeader of a BusinessDocument. This GDT is meant for defining the SenderParty or RecipientParty. The different IDs of a GDT BusinessDocumentMessageHeaderParty 5100 may identify the same party.

A party may be identified using an InternalID or Standard ID. InternalID is when SenderParty and RecipientParty use common master data or are in alignment with regard to the semantics and use of InternalID. StandardID is when SenderParty and RecipientParty can manage standardized identifiers. Of all of the IDs available to the SenderParty, generally those IDs the RecipientParty is expected to understand are used in a BusinessDocument. Either company-internal ID or a standardized ID can be used for identification.

GDT BusinessDocumentMessageHeaderParty 5100 can be used for the details and identification of the sender or recipient of a BusinessDocument. Furthermore, additional information about the contact person, including address, can be defined, which makes it possible to contact this person directly should any problems or errors occur when validating or processing the inbound BusinessDocument.

(q) BusinessDocumentMessageID

A GDT BusinessDocumentMessageID 5200 may be a unique identifier of a business document in a message that is issued by the sender business application. An example of GDT BusinessDocumentMessageID 5200 is:

```
<PurchaseOrderRequest>
    <MessageHeader>
        <ID
            schemeID="ORDER"
            schemeAgencyID="124224"
            schemeAgencySchemeAgencyID="12232344">
            00000000000001
        </ID>
        ...
    </MessageHeader>
    ....
</PurchaseOrderRequest>.
```

The structure of GDT Business Document Message ID 5200 is depicted in FIG. 52. For the GDT Business Document Message ID 5200, the Category is Complex Type 5202, the Object Class is Business Document Message 5204, the Property is Identification 5206, the Representation/Association is Identifier 5208, the Type is CCT 5210, the Type Name is Identifier 5212, the Length is from one to thirty-five 5214. The GDT Business Document Message ID 5200 may be a restricted GDT.

SchemeID 5218 identifies an identification scheme. These identification schemes may be provided by a code list, such as the SAP MessageTypes. The "schemeID" attribute is not required if the GDT BusinessDocumentMessageID 5200 is unique within a schemeAgencyID. For the GDT Scheme ID 5218, the Category is Attribute 5220, the Object Class is Identification Scheme 5222, the Property is Identification 5224, the Representation/Association is Identifier 5226, the Type is xsd 5228, the Type Name is Token 5230, the Length is from one to sixty 5232, and the Cardinality is zero or one 5234.

SchemeAgencyID 5236 may be covered by the agency ID of the sender. If this agency manages multiple business systems, the schemeAgencyID contains the unique identification of the respective business system from which the BusinessDocument was sent. For the GDT Scheme Agency ID 5236, the Category is Attribute 5238, the Object Class is Identification Scheme Agency 5240, the Property is Identification 5242, the Representation/Association is Identifier 5244, the Type is xsd 5246, the Type Name is Token 5248, and the Length is from one to sixty 5250. The Cardinality between the GDT BusinessDocumentMessageID 5200 and SchemeAgencyID is zero or one 5252.

SchemeAgencySchemeAgencyID contains the unique identification of the agency that manages the schemeAgencyID. This attribute may contain values from DE 3055 (excluding roles). This attribute is not required if this information comes unequivocally from the sender.

The format of GDT BusinessDocumentMessageID 5200 identification is a sequential number comprising a maximum of 35 characters. The number may be positive. This representation complies with the UN/EDIFACT conventions (see DE 0340 (Interactive Message Reference Number)).

The GDT BusinessDocumentMessageID 5200 is a unique identification for at least the entire lifetime of a BusinessDocument. The identification is generated by the respective business application of the creator and, in an embodiment, may not be created or interpreted by the technical message transfer systems.

The technical MessageID depends on the respective technical transfer protocol and may not be associated with the GDT BusinessDocumentMessageID 5200. When a technical message is sent, the BusinessDocument is the payload in the message. The MessageID can change as a result of the forwarding mechanisms of the respective middleware systems or the different transfer protocols used.

In the inbound direction, mapping can be performed to the in-house message code. In the outbound direction, there are various scenarios. If a Sender is known because it is given by SenderParty, schemeID 5202 identifies the message type. If a Sender is unknown because it is not given by SenderParty and Identification of business level at the sender is standardized, then schemeID 5202 identifies the message type, schemeAgencyID 5204 identifies the standardized ID for the agency that generates the MessageID, and schemeAgencySchemeAgencyID 5206 identifies the agency from DE 3055 that manages the standardized ID schemeAgencyID. If a Sender is unknown because it is not given by SenderParty and identification of business level at the sender is proprietary, then schemeID 5202 identifies the message type, schemeAgencyID 5204 identifies the proprietary ID for the agency that generates the MessageID, and schemeAgencySchemeAgencyID 5206 identifies 'ZZZ' which is mutually defined from DE 3055.

If a Sender has multiple business systems that are unique within an agency (for example: System Landscape Directory), then schemeID 5202 identifies the message type and schemeAgencyID 5204 identifies the unique ID of the business system that may be unique within an agency. In this scenario, uniqueness is ensured by the sender and the Sender is not required in internal communication.

(r) BusinessTransactionBlockedIndicator

A GDT BusinessTransactionBlockedIndicator 5300 indicates whether or not the execution of a business transaction is blocked. An example of GDT BusinessTransactionBlockedIndicator 5300 is: <DeliveryExecutionBlockedIndicator>true</DeliveryExecutionBlockedIndicator>.

The structure of GDT Business Transaction Blocked Indicator 5300 is depicted in FIG. 53. For the GDT Business Transaction Blocked Indicator 5300, the Object Class is Business Transaction 5302, the Property is Blocked Indicator 5304, the Representation/Association is Indicator 5306, the Type is CCT 5308, and the Type Name is Indicator 5310.

GDT BusinessTransactionBlockedIndicator 5300 may have the value true or false. True indicates that the execution of a business transaction is blocked. False indicates that the execution of a business transaction is not blocked.

The GDT BusinessTransactionBlockedIndicator 5300 can be used in various environments, such as in delivery and in billing. In a delivery environment, this data type is used by a requesting application (e.g., Sales) to send a delivery request to Supply Chain Execution (e.g., for planning purposes) at an early stage, but, at the same time, to inform Supply Chain Execution that the delivery should not be executed yet since several points still have to be clarified with the customer, necessary papers are missing, or the customer's credit limit has been exceeded or has not yet been checked.

In a billing environment, this data type is used by a requesting application (e.g., Sales) to set up a billing due list in billing but, at the same time, to specify that billing may not yet be executed. It is possible that the requesting application first executes a release procedure, that the customer-specific prices have not yet been determined, that certain necessary documents have not yet been received (letter of credit procedure), or that the customer's credit limit has been exceeded.

(s) CompletedIndicator

A GDT CompletedIndicator 5400 indicates whether an object is completed in a business sense or not. GDT CompletedIndicator 5400 may relate to business translations (for example, invoice creation, delivery, sourcing) or to objects that have the character of a transaction (for example, product catalog transfer in multiple steps). An example of GDT CompletedIndicator 5400 is: <CompletedIndicator>false</CompletedIndicator>.

The structure of GDT CompletedIndicator 5400 is depicted in FIG. 54. For GDT CompletedIndicator 5400, the Property is Completed Indicator 5402, the Representation/Association is Indicator 5404, the Type is CCT 5406, and the Type Name is Indicator 5408.

The GDT CompletedIndicator 5400 can have the values true or false. True indicates that an object is completed. False indicates that an object is not completed.

The GDT CompletedIndicator 5400 is used to indicate that the processing of an object has been completed, even if further processing steps are being run in a different context (for example, sourcing for a requirement may be completed but procurement of the requirement calls for further process steps). In various embodiments, for various objects a CompletedIndicator or a CancelledIndicator can be used depending on whether it is desired to emphasize that processing of the object has been completed properly (CompletedIndicator) or that the object has been canceled in the sense of an exception situation (CancelledIndicator).

From the context of the interface in which a GDT CompletedIndicator 5400 is used, the object to which the CompletedIndicator refers is described, its business significance is described, and whether a set CompletedIndicator can be undone in a follow-on message is described.

(t) BusinessTransactionDocumentGroupID

A GDT BusinessTransactionDocumentGroupID 5500 may uniquely identify a group of business documents that are to be considered as one group within a business process. An example of GDT BusinessTransactionDocumentGroupID 5500 is: <DeliveryGroupID>4711</DeliveryGroupID>.

The structure of GDT Business Transaction Document Group ID 5500 is depicted in FIG. 55. For the GDT Business Transaction Document Group ID 5500, the Object Class is Business Transaction Document 5502, the Property is Group Identification 5504, the Representation/Association is Indicator 5506, the Type is CCT 5508, the Type Name is Identifier 5510, the Length is from one to ten 5512. The GDT Business Transaction Document Group ID 5500 may be a restricted GDT.

GDT BusinessTransactionDocumentGroupID 5500 is used to identify documents that belong together to enable them to be processed together by the application. "BusinessTransactionDocument" is replaced by the description of each document in the XML instance, e.g., "PurchaseOrder" for a purchase order, "Delivery" for a delivery, and the like.

(u) BusinessTransactionDocumentID

A GDT BusinessTransactionDocumentID 5600 is a unique identifier for a document in a business transaction. An example for GDT BusinessTransactionDocumentID 5600 is: <OrderID schemeID='Orders' schemeAgencyID='123456789'schemeAgencyScheme AgencyID='16'>5400000012</OrderID> which assigns the identifier 5400000012 to the OrderID having an "Orders" identification scheme, "123456789" as the agency managing the identification scheme, and 16 as the identification scheme that represents the context that is used to identify the agency.

The structure of GDT Business Transaction Document ID 5600 is depicted in FIG. 56. For the GDT Business Transaction Document ID 5600, the Object Class is Business Transaction Document 5602, the Property is Identification 5604, the Representation/Association is Identifier 5606, the Type is CCT 5608, the Type Name is Identifier 5610, and the Length is from one to thirty-five 5612. The GDT Business Transaction Document ID 5600 may be a restricted GDT.

For the GDT Scheme ID 5616, the Category is Attribute 5618, the Object Class is Identification Scheme 5620, the Property is Identification 5622, the Representation/Association is Identifier 5624, the Type is xsd 5626, the Type Name is Token 5628, and the Length is from one to sixty 5630. The Cardinality is zero or one 5632.

For the GDT Scheme Agency ID 5634, the Category is Attribute 5636, the Object Class is Identification Scheme Agency 5638, the Property is Identification 5640, the Representation/Association is Identifier 5642, the Type is xsd 5644, the Type Name is Token 5646, the Length is from one to sixty 5648, and the Cardinality is zero or one 5650.

For the GDT Scheme ID 5616, the Category is Attribute 5618, the Object Class is Identification Scheme 5620, the Property is Identification 5622, the Representation/Association is Identifier 5624, the Type is xsd 5626, the Type Name is Token 5628, and the Length is from one to sixty 5630. The Cardinality is zero or one 5632.

For the GDT Scheme Agency Scheme ID 5652, the Category is Attribute 5654, the Object Class is Identification Scheme Agency 5656, the Property is Scheme 5658, the Representation/Association is Identifier 5660, the Type is xsd 5662, the Type Name is Token 5664, and the Length is from one to sixty 5666. The Cardinality is zero or one 5668.

For the GDT Scheme Agency ID 5670, the Category is Attribute 5672, the Object Class is Identification Scheme Agency 5674, the Property is Scheme Agency 5676, the Representation/Association is Identifier 5678, the Type is xsd 5680, the Type Name is Token 5682, and the Length is three 5684. The Cardinality is zero or one 5686.

A business process uses GDT BusinessTransactionDocumentID 5600 to uniquely identify a document, such as a purchase order or an invoice in a business transaction. A partner uses a GDT BusinessTransactionDocumentID 5600 to inform another partner of the identification of a business transaction document in an initial step, e.g., when creating data for the business transaction or sending it for the first time. The second partner can use this identifier to reference the business transaction document in the subsequent process.

In an embodiment, there may be no standardized IDs for transaction data. The attributes schemeID, schemeAgencyID, schemeAgencySchemeID, and schemeAgencySchemeAgencyID are used in the same way as for the CCT Identifier to define the context for which a GDT BusinessTransactionDocumentID 5600 is guaranteed to be unique.

In the XML instance, "BusinessTransactionDocument" is replaced by the description of the respective document, e.g., "PurchaseOrder" for a purchase order, "Delivery" for a delivery, and the like.

(v) BusinessTransactionDocumentItemGroupID

A GDT BusinessTransactionDocumentationGroupID 5700 uniquely identifies a group of business document items that are to be characterized as a group within a business document. An example of GDT BusinessTransactionDocumentationGroupID 5700 is: <DeliveryItemGroupID>123</DeliveryItemGroupID>.

The structure of GDT Business Transaction Document Item Group ID 5700 is depicted in FIG. 57. For the GDT Business Transaction Document Item Group ID 5700, the Object Class is Business Transaction Document Item 5702, the Property is Group Identification 5704, the Representation/Association is Identifier 5706, the Type is CCT 5708, the Type Name is Identifier 5710, and the Length is three 5712. The GDT Business Transaction Document Item Group ID 5700 may be restricted.

A freely-definable numeric sequence may be used for display purposes. In an embodiment, it is a 3-digit, numeric text field. Leading zeros are also displayed. However, according to the current definition in R/3 in the processing applications "order" and "delivery," a 3-figure, numeric text field (NUMC3) having a freely-definable 3-character string using the character set {"0," "1," "2," "3," "4," "5," "6," "7," "8," "9"} may be used. Otherwise, a corresponding mapping may be necessary, but it might not be unique due to the use of a larger number of characters. In this case, the uniqueness may have to be ensured explicitly. This requirement, however, may not be ensured explicitly per definition/data type and therefore may be documented.

The GDT BusinessTransactionDocumentationGroupID 5700 is used to indicate the items of a business document that belong together for a unique identification of this item grouping in subsequent steps. For example, delivery groups are used to check the availability of materials that may be delivered together. Items that belong to the same delivery group may be delivered at the same time. Therefore, from the point of view of the availability check, the products/materials selected in the highlighted items may be available in sufficient quantities at the same time on the requested date so that the requirement can be fulfilled.

In the XML instance, the "BusinessTransactionDocument" is replaced by the description of the respective document, e.g., "PurchaseOrder" for a purchase order, "Delivery" for a delivery, and the like.

(w) BusinessTransactionDocumentItemHierarchy RelationshipTypeCode

A CDT BusinessTransactionDocumentItemHierarchyRelationshipTypeCode 5800 is a coded representation of the business type of a hierarchical relationship between items of a BusinessTransactionDocument. An example of CDT BusinessTransactionDocumentItemHierarchyRelationshipTypeCode 5800 in the context of a purchase order item is: <HierarchyRelationshipTypeCode>001</HierarchyRelationshipTypeCode>.

The structure of CDT Business Transaction Document Item Hierarchy Relationship Type Code 5800 is depicted in FIG. 58. For the CDT Business Transaction Document Item Hierarchy Relationship Type Code 5800, the Object Class Qualification is Business Transaction Document Item Hierarchy 5802, the Object Class is Relationship 5804, the Property is Type Code 5806, the Representation/Association is Code 5808, the Type is GDT 5810, the Type is Relationship Type Code 5812, and the Length is three 5814. The CDT Business Transaction Document Item Hierarchy Relationship Type Code 5800 may be restricted.

The GDT BusinessTransactionDocumentItemHierarchyRelationshipTypeCode 5800 is based on the GDT ObjectStructureRelationshipTypeCode. Elements of type BusinessTransactionDocumentItemHierarchyTypeCode can have values 001, 002, 003, or 006. 001 means that the relationship is a bill of material relationship, 002 means the relationship is a grouping relationship (one object in this relationship is part of a logical grouping to another object), 003 means the relationship is a discount in kind relationship, and 006 means the relationship is a substitution product relationship.

The CDT BusinessTransactionDocumentItemHierarchyRelationshipTypeCode 5800 is used together with a ParentItemID to map item hierarchies. An item hierarchy is a tree of subordinated items, where the BusinessTransactionDocumentHierarchyRelationshipTypeCode 5800 describes the meaning of the hierarchical level of an item.

When using the CDT BusinessTransactionDocumentItemHierarchyRelationshipTypeCode 5800, which types of lower-level items are permitted in each use context and which integrity conditions apply to items in a hierarchy of a particular CDT BusinessTransactionDocumentItemHierarchyRelationshipTypeCode 5800 may be explicitly defined. In particular, it may be specified how hierarchies with different BusinessTransactionDocumentItemHierarchyRelationshipTypeCodes can be combined with each other. For example: When a bill of material hierarchy and a grouping hierarchy exist for one item, and when a grouping hierarchy exists for an item.

In an embodiment, there may be one hierarchy for each item, that is, the same CDT BusinessTransactionDocumentItemHierarchyRelationshipTypeCode 5800 is specified for lower-level items. However, there are exceptions to this rule. A purchase order can contain items that have both a bill of material hierarchy and a discount in kind hierarchy. In an embodiment, the CDT BusinessTransactionDocumentItemHierarchyRelationshipTypeCode 5800 may be a proprietary code list with fixed predefined values. In that case, changes to the permitted values may involve changes to the interface.

In the XML instance, "BusinessTransactionDocument" is replaced by the description of the specific business transaction document, for example "PurchaseOrder" for a purchase order, "Delivery" for a delivery, and the like.

(x) BusinessTransactionDocumentItemID

A GDT BusinessTransactionDocumentItemID 5900 is a unique identifier of an item or sub item of a document within a business transaction and is unique in the context of the business transaction. An example of BusinessTransactionDocumentItemID is: <ItemID>13</ItemID>.

The structure of GDT Business Transaction Document Item ID 5900 is depicted in FIG. 59. For the GDT Business Transaction Document Item ID 5900, the Object Class is Business Transaction Document Item 5902, the Property is Identification 5904, the Representation/Association is Identifier 5906, the Type is CCT 5908, the Type Name is Identifier 5910, and the Length is from one to ten 5912. The GDT Business Transaction Document Item ID 5900 may be restricted 5914.

GDT BusinessTransactionDocumentItemID 5900 is a sequence of numbers with a maximum of ten characters. Leading zeros may not be significant at the recipient and may not be sent.

Business transactions, such as purchase orders or invoices, may be divided into items and sub items. GDT BusinessTransactionDocumentItemID 5900 is used in a business process to identify uniquely an item or sub item within a business transaction. A partner uses its GDT BusinessTransactionDocumentItemID 5900 to inform the other partner of its identification of the item in an initial step, for example, when creating an item or transmitting it for the first time. The second partner can then use this identifier to reference the respective item of the document in the subsequent process.

In the XML instance, "BusinessTransactionDocument" is replaced by the description of the respective document, e.g., "PurchaseOrder" for a purchase order, "Delivery" for a delivery, and the like.

(y) BusinessTransactionDocumentItemSchedule LineID

A GDT BusinessTransactionDocumentItemScheduleLineID 6000 is a unique identifier that uses a deadline to identify the schedule line of a document item within a business transaction. An example of GDT BusinessTransactionDocumentItemScheduleLineID 6000 is: <PurchaseOrderItemScheduleLineID>0001</PurchaseOrderItemScheduleLineID>.

The structure of GDT Business Transaction Document Item Schedule Line ID 6000 is depicted in FIG. 60. For the GDT Business Transaction Document Item Schedule Line ID 6000, the Object Class is Business Transaction Document Item Schedule Line 6002, the Property is Identification 6004, the Representation/Association is Identifier 6006, the Type is CCT 6008, the Type Name is Identifier 6010, the Length is from one to four 6012. The GDT Business Transaction Document Item Schedule Line ID 6000 may be restricted 6014.

Documents such as purchase orders, sales orders, or invoices are divided into items. Items are then further divided according to schedule lines. Each of these schedule lines specifies a deadline and relevant product quantities for this deadline.

"BusinessTransactionDocument" is replaced by the description of each document in the XML instance, e.g., "PurchaseOrder" for a purchase order, "Delivery" for a delivery, and the like.

(z) ThirdPartyIndicator

A GDT ThirdPartyIndicator 6100 indicates whether or not a document item is used in the context of a third-party deal. An example of GDT ThirdPartyIndicator 6100 in the context of a document item is: <ThirdPartyDealIndicator>true</ThirdPartyDealIndicator>.

The structure of GDT Third Party Indicator 6100 is depicted in FIG. 61. For the GDT Third Party Indicator 6100, the Object Class is Business Transaction Document Item 6102, the Property is third Party Deal Indicator 6104, the Representation/Association term is Indicator 6106, the Type is CCT 6108, and the Type Name is Identifier 6110. The GDT ThirdPartyIndicator 6100 can have the values true or false. True indicates that the object is used in the context of a third-party deal. False indicates that the object is not used in the context of a third-party deal.

The GDT ThirdPartyIndicator 6100 is used to indicate that a document item is used in the context of a third-party deal. A third-party deal may be a process in which a company processes a sales order via a third party rather than fulfilling it directly itself. The context to which the BusinessTransactionDocumentItemThirdPartyDealIndicator refers may be clear from the usage of the GDT.

(aa) BusinessTransactionDocumentItemTypeCode

The GDT BusinessTransactionDocumentItemTypeCode 6200 is a coded representation of the type of an item in a document that occurs in business transactions. The document item type describes the business nature of similar document items and defines the basic features of the document items of this type. An example of GDT BusinessTransactionDocumentItemTypeCode 6200 is: <BusinessTransactionDocumentItemTypeCode>001</BusinessTransactionDocumentItemTypeCode>.

The structure of GDT Business Transaction Document Item Type Code 6200 is depicted in FIG. 62. For the GDT Business Transaction Document Item Type Code 6200, the Object Class is Business Transaction Document Item 6202, the Property is Type 6204, the Representation/Association is Code 6206, the Type is CCT 6208, the Type Name is Code 6210, and the Length is three 6212. The GDT Business Transaction Document Item Type Code 6200 may be restricted 6214.

GDT BusinessTransactionDocumentItemTypeCode 6200 can have a value from 001 to 004. 001 identifies a purchase order item that specifies an ordered product or additional information on ordered products. This includes information on free goods, substitute products and value limits. 002 identifies an invoice item that specifies prices and taxes for a delivered product (including completed work) and, if necessary, more information on this product. 003 identifies a credit memo item that specifies refunded prices and taxes for a delivered product (including completed work) and, if necessary, more information on this product. 004 identifies a delivery cost item that specifies delivery costs incurred by the purchaser on top of the actual product costs. There may be a differentiation between shipping costs, customs duty costs, and miscellaneous costs, such as packaging and insurance.

Certain combinations of a GDT BusinessTransactionDocumentItemTypeCode 6200 and a BusinessTransactionDocumentTypeCode may be allowed. For example, if BusinessTransactionDocumentTypeCode is 001, BusinessTransactionDocumentItemTypeCode may be 001. If BusinessTransactionDocumentTypeCode is 004, BusinessTransactionDocumentItemTypeCode may be 002, 003, or 004. If BusinessTransactionDocumentTypeCod is 005, BusinessTransactionDocumentItemTypeCode may be 001.

The GDT BusinessTransactionDocumentItemTypeCode 6200 categorizes an item in a document that is sent if the concrete semantic meaning of the item or sub-item is not defined by the message itself or if semantically different items can occur in one message. In particular, there are documents in applications that contain items with different types so that it may not be enough to specify the type of the complete document. For example, in addition to a "standard" invoice item for an ordered product, an invoice can contain a delivery costs item that is to be shown separately.

In an example, in R/3, the BusinessTransactionDocumentItemTypeCode 6200 corresponds to VBTYP+POSAR in Sales or BSTYP in Purchasing or MRM_REFERENZBELEG in Invoice Verification, and the like, at a less detailed level.

(bb) BusinessTransactionDocumentLocation

A CDT BusinessTransactionDocumentLocation 6300 contains the information that is exchanged in business documents about a location relevant for business transactions. This information identifies the location and its address. The identification may be a company-internal ID, a standardized ID, or one or several partner-specific IDs. A location is a logical or a physical place. An ID for a location assigned by a party identifies in the name the role the assigning party plays in the business transaction. At present, the role descriptions are Buyer, Seller, ProductRecipient, Vendor, BillTo, and BillFrom. An example of CDT BusinessTransactionDocumentLocation 6300 is:

```
<InventoryChange>
    ...
    <Location>
        <StandardID schemeAgencyID="016">4711</StandardID>
        <BuyerID>9873</BuyerID>
        <Address>...</Address>
    <Location>
<InventoryChange>.
```

The structure of CDT Business Transaction Document Location 6300 is depicted in FIG. 63. For the CDT Business Transaction Document Location 6300, the Object Class is Business Transaction Document Location 6302 and the Representation/Association is Details 6304.

For the Internal ID 6306, the Category is Element 6308, the Object Class is Business Transaction Document Location 6310, the Property Qualifier is Internal 6312, the Property is Identification 6314, the Representation/Association is Identifier 6316, the Type is CDT 6318, and the Type Name is Location Internal ID 6320. The Cardinality is zero or one 6322.

For the Standard ID 6324, the Category is Element 6326, the Object Class is Business Transaction Document Location 6328, the Property Qualifier is Standard 6330, the Property is Identification 6332, the Representation/Association is Identifier 6334, the Type is CDT 6336, and the Type Name is Location Standard ID 6338. The Cardinality is from zero to n. 6340.

For the Buyer ID 6342, the Category is Element 6344, the Object Class is Business Transaction Document Location 6346, the Property Qualifier is Buyer 6363, the Property is Identification 6350, the Representation/Association is Identifier 6352, the Type is CDT 6354, and the Type Name is Location Party ID 6356. The Cardinality is zero or one 6358.

For the Seller ID 6360, the Category is Element 6362, the Object Class is Business Transaction Document Location 6364, the Property Qualifier is Seller 6366, the Property is Identification 6368, the Representation/Association is Identifier 6370, the Type is CDT 6372, and the Type Name is Location Party ID 6374. The Cardinality is zero or one 6376.

For the Seller ID 6360, the Category is Element 6362, the Object Class is Business Transaction Document Location 6364, the Property Qualifier is Seller 6366, the Property is Identification 6368, the Representation/Association is Identifier 6370, the Type is CDT 6372, and the Type Name is Location Party ID 6374. The Cardinality is zero or one 6376.

For the Product Recipient ID 6378, the Category is Element 6380, the Object Class is Business Transaction Document Location 6390, the Property Qualifier is Product Recipient 6392, the Property is Identification 6394, the Representation/Association is Identifier 6396, the Type is CDT 6398, and the Type Name is Location Party ID 6399. The Cardinality is zero or one 6301A.

For the Vendor ID 6302A, the Category is Element 6303A, the Object Class is Business Transaction Document Location 6304A, the Property Qualifier is Vendor 6305A, the Property is Identification 6306A, the Representation/Association is Identifier 6307A, the Type is CDT 6308A, and the Type Name is Location Party ID 6309A. The Cardinality is zero or one 6310A.

For the Bill To ID 6311A, the Category is Element 6312A, the Object Class is Business Transaction Document Location 6313A, the Property Qualifier is Bill To 6314A, the Property is Identification 6315A, the Representation/Association is Identifier 6316A, the Type is CDT 6317A, and the Type Name is Location Party ID 6318A. The Cardinality is zero or one 6319A.

For the Bill From ID 6320A, the Category is Element 6321A, the Object Class is Business Transaction Document Location 6322A, the Property Qualifier is Bill From 6323A, the Property is Identification 6324A, the Representation/Association is Identifier 6325A, the Type is CDT 6326A, and the Type Name is Location Party ID 6327A. The Cardinality is zero or one 6328A.

For the Bidder ID 6329A, the Category is Element 6330A, the Object Class is Business Transaction Document Location 6331A, the Property Qualifier is Bidder 6332A, the Property is Identification 6333A, the Representation/Association is Identifier 6334A, the Type is CDT 6335A, and the Type Name is Location Party ID 6336A. The Cardinality is zero or one 6337A.

For the Address 6338A, the Category is Element 6339A, the Object Class is Business Transaction Document Location 6340A, the Property is Address 6341A, the Representation/Association is Address 6342A, the Type is GDT 6343A, and the Type Name is Address 6344A. The Cardinality is zero or one 6345A.

For the Note 6346A, the Category is Element 6347A, the Object Class is Business Transaction Document Location 6348A, the Property is Note 6349A, the Representation/Association is Text 6350A, the Type is GDT 6351A, and the Type Name is Note 6352A. The Cardinality is zero or one 6353A.

InternalID refers to a proprietary identifier that is used when both sender and recipient can access shared master data (extended enterprise). Standard ID refers to a standardized identifier, whose identification schemes may be managed by an agency from the DE 3055 code list. Buyer ID refers to an identifier that is used by the BuyerParty proprietarily for this location. SellerID refers to an identifier that is used by the SellerParty proprietarily for this location. ProductRecipientID refers to an identifier that is used by the ProductRecipientParty proprietarily for this location. VendorID refers to an identifier that is used by the VendorParty proprietarily for this location. BillToID refers to an identifier that is used by the BillToParty proprietarily for this location. BillFromID refers to an identifier that is used by the BillFromParty proprietarily for this location. BidderID refers to an identifier that is used by the BidderParty proprietarily for this location. Address is an address that describes the location by specifying information such as postal address, geographic coordinates, or any other information that specifies a location. Note refers to an additional information such as direction.

When defining addresses, organization addresses may be supported. The different IDs of a CDT BusinessTransactionDocumentLocation 6300 identify the same location. A location may be identified by the InternalID when sender and recipient can access shared master data, by the StandardID when sender and recipient can manage standardized identifiers, or by the PartyIDs: when sender and recipient are interested in the PartyIDs assigned by the parties involved. From all of the IDs available to the sender, the IDs that the recipient is expected to understand may be used.

(cc) BusinessTransactionDocumentParty

A CDT BusinessTransactionDocumentParty 6400 contains the information that is exchanged—in accordance with common business understanding—in business documents about a party involved in business transactions. This information is used to identify the party and the party's address, as well as the party's contact person and the contact person's address. This identification can take place using an internal ID, a standardized ID, or IDs assigned by the parties involved. A party is a natural person, organization, or business partner group in which a company has a business or intra-enterprise interest. This could be a person, organization, or group within or outside of the company. An ID assigned by a party identifies in the name the role the assigning party plays in the business transaction. At present, the roles are Buyer, Seller, ProductRecipient, Vendor, BillTo, BillFrom and Bidder. An example of CDT BusinessTransactionDocumentParty 6400 is:

```
<PurchaseOrder>
    ...
    <BuyerParty>
        <StandardID schemeAgencyID="016">4711</StandardID>
        <BuyerID>9873</BuyerID>
        <SellerID>487847</SellerID>
        <Address>...</Address>
        <ContactPerson>
            <BuyerID>9874</BuyerID>
            <SellerID>487848</SellerID>
            <Address>...</Address>
        </ContactPerson>
    </BuyerParty>
</PurchaseOrder>.
```

In this example, schemeAgencyID="016" corresponds to Dun&Bradstreet according to code list D3055 that means that the DUNS number is assigned by Dun&Bradstreet. The following is a second example of BusinessTransactionDocumentParty:

```
<PurchaseOrder>
    ...
    <BuyerParty>
        <InternalID schemeID="PartyID"
schemeAgencyID="BPL__300">747</InternalID>
        <Address>...</Address>
        <ContactPerson>
            <InternalID schemeID="PartyID"
schemeAgencyID="BPL__300">737</InternalID>
            <Address>...</Address>
        </ContactPerson>
    </BuyerParty>
<PurchaseOrder>.
```

In this example, schemeID="PartyID" indicates that the scheme "PartyID" was used to identify the party and schemeAgencyID="BPL__300" indicates that the scheme was assigned by the SAP CMDM system "BPL__300."

The examples above show the XML instance of the GDT BusinessTransactionDocumentParty within a purchase order for different identification types (standard ID, party IDs, internal ID). In this scenario, the party assumes the role of Buyer.

The structure of CDT Business Transaction Document Party 6400 is depicted in FIG. 64. For the CDT Business Transaction Document Party 6400, the Category is Element 6408, the Object Class is Business Transaction Document Party 6402, and the Representation/Association is Details 6404.

For the Internal ID 6406, the Category is Element 6408, the Object Class is Business Transaction Document Party 6470, the Property Qualifier is Internal 6412, the Property is Identification 6414, the Representation/Association is Identifier 6416, the Type is CDT 6418, and the Type Name is Party Internal ID 6420. The Cardinality is zero or one 6422.

For the Standard ID 6424, the Category is Element 6426, the Object Class is Business Transaction Document Party 6428, the Property Qualifier is Standard 6430, the Property is Identification 6432, the Representation/Association is Identifier 6434, the Type is CDT 6436, and the Type Name is Party Standard ID 6438. The Cardinality is from zero to n. 6440.

For the Buyer ID 6442, the Category is Element 6444, the Object Class is Business Transaction Document Party 6446, the Property Qualifier is Buyer 6448, the Property is Identification 6450, the Representation/Association is Identifier 6452, the Type is CDT 6454, and the Type Name is Party ID 6456. The Cardinality is zero or one 6458.

For the Seller ID 6460, the Category is Element 6462, the Object Class is Business Transaction Document Party 6464, the Property Qualifier is Seller 6466, the Property is Identification 6468, the Representation/Association is Identifier 6470, the Type is CDT 6472, and the Type Name is Party Party ID 6474. The Cardinality is zero or one 6476.

For the Product Recipient ID 6478, the Category is Element 6480, the Object Class is Business Transaction Document Party 6482, the Property Qualifier is Product Recipient 6484, the Property is Identification 6486, the Representation/Association is Identifier 6488, the Type is CDT 6490, and the Type Name is Party Party ID 6492. The Cardinality is zero or one 6494.

For the Vendor ID 6496, the Category is Element 6498, the Object Class is Business Transaction Document Party 6499, the Property Qualifier is Vendor 6401A, the Property is Identification 6402A, the Representation/Association is Identifier 6403A, the Type is CDT 6404A, and the Type Name is Party Party ID 6405A. The Cardinality is zero or one 6406A.

For the Bill To ID 6407A, the Category is Element 6408A, the Object Class is Business Transaction Document Party 6409A, the Property Qualifier is Bill To 6410A, the Property is Identification 6411A, the Representation/Association is Identifier 6412A, the Type is CDT 6413A, and the Type Name is Party Party ID 6414A. The Cardinality is zero or one 6415A.

For the Bill From ID 6416A, the Category is Element 6417A, the Object Class is Business Transaction Document Party 6418A, the Property Qualifier is Bill From 6419A, the Property is Identification 6420A, the Representation/Association is Identifier 6421A, the Type is CDT 6422A, and the Type Name is Party Party ID 6423A. The Cardinality is zero or one 6424A.

For the Bidder ID 6425A, the Category is Element 6426A, the Object Class is Business Transaction Document Party 6427A, the Property Qualifier is Bidder 6428A, the Property is Identification 6429A, the Representation/Association is Identifier 6430A, the Type is CDT 6431A, and the Type Name is Party Party ID 6432A. The Cardinality is zero or one 6433A.

For the Address 6434A, the Category is Element 6435A, the Object Class is Business Transaction Document Party 6436A, the Property is Address 6437A, the Representation/Association is Address 6438A, the Type is GDT 6440A, and the Type Name is Address 6441A. The Cardinality is zero or one 6424A.

For the Contact Person 6443A, the Category is Element 6444A, the Object Class is Business Transaction Document Party 6445A, the Property is Contact Person 6446A, the Representation/Association is Contact Person 6447A, the Type is CDT 6448A, and the Type Name is Contact Person 6464A. The Cardinality is zero or one 6450A.

InternalID refers to a proprietary identifier that is used when both sender and recipient can access shared master data (extended enterprise). StandardID refers to a standardized identifier for this party, whose identification scheme may be managed by an agency from the DE 3055 code list. BuyerID refers to an identifier that is used by the BuyerParty for this party. SellerID refers to an identifier that is used by the SellerParty for this party. ProductRecipientID refers to an identifier that is used by the ProductRecipientParty for this party. VendorID refers to an identifier that is used by the VendorParty for this party. BillToID refers to an identifier that is used by the BillToParty for this party. BillFromID referes to an identifier that is used by the BillFromParty for this party. BidderID refers to an identifier that is used by the BidderParty for this party. Address refers to the address of the party. ContactPerson refers to a contact person of the party.

The different IDs of a CDT BusinessTransactionDocumentParty 6400 may identify the same party. A party may be identified by InternalID when sender and recipient can access shared master data, by StandardID when sender and recipient can manage standardized identifiers, or by PartytPartyIDs when sender and recipient are interested in the PartyIDs assigned by the parties involved. Of the IDs available to the sender, IDs that the recipient is expected to understand may be used in a message.

The parties involved in a business transaction assume a specific role that is also specified for them in the corresponding business documents. For example, BuyerParty is a party that buys goods or services, SellerParty is a party that sells goods or services, CreditorParty is a party that is authorized to claim goods, services or payment for a debt owed to it, DebtorParty is a party that is obliged to provide goods, services or payment for a debt it owes, ProductRecipientParty is a party to which goods are delivered or for which services are provided, VendorParty is a party that delivers goods or provides services, ManufacturerParty is a party that manufactures goods, PayerParty is a party that pays for goods or services, PayeeParty is a party that receives a payment for goods or services, BillToParty is a party to which the invoice for goods or services is sent, BillFromParty is a party that creates the invoice for goods or services, CarrierParty is a party that transports goods, RequestorParty is a party that requests the procurement of goods or services, PortalProviderParty is a party that runs a portal that brings business partners together for a business transaction, CatalogueProviderParty is a party that compiles a catalogue, BidderParty is a party that bids for goods or services, and OwnerParty is a party that has tangible or intangible assets as property.

The CDT BusinessTransactionDocumentParty 6400 is used in messages for internal and external communication to transmit required information about the parties involved.

(dd) BusinessTransactionDocumentPricingIndicator

The GDT BusinessTransactionDocumentPricingIndicator 6500 indicates whether pricing/price determination should be performed for all items or for selected items in a business transaction. An example of GDT BusinessTransactionDocumentPricingIndicator 6500 is: dicator>.

The structure of GDT Business Transaction Document Pricing Indicator 6500 is depicted in FIG. 65. For the GDT Business Transaction Document Pricing Indicator 6500, the Object Class is Business Transaction Document 6502, the Property is Pricing Indicator 6504, the Representation/Association is Indicator 6506, the Type is CCT 6508, and the Type Name is Indicator 6510.

The GDT BusinessTransactionDocumentPricingIndicator 6500 can have the values true or false. True indicates that the pricing/price determination should be performed. False indicates that the pricing/price determination should not be performed.

Business documents or items in business documents for which pricing/price determination can be performed are linked to the purchase or sale of products. Illustrative examples are order, delivery and transport documents and their items.

(ee) BusinessTransactionDocumentProduct

A CDT BusinessTransactionDocumentProduct 6600 contains the information that is exchanged—for example, in accordance with common business understanding—in business documents about a product. This information identifies the product and product type, and describes the product. This identification can occur using an internal ID, a standardized ID, or IDs assigned by the parties involved. A product is either a tangible or intangible good, and is a part of the business activities of a company. It can be traded and contributes directly or indirectly to value added. An ID assigned by a party identifies in the name the role the assigning party plays in the business transaction. At present, the roles are Buyer, Seller, ProductRecipient, Vendor, Manufacturer, BillTo, BillFrom and Bidder. An example of CDT BusinessTransactionDocumentProduct 6600 is:

Example 1

Standard ID, PartyIDs

```
<PurchaseOrder>
    ...
    <Product>
        <StandardID schemeAgencyID="009">4711</StandardID>
        <BuyerID>A6B7915634654</BuyerID>
        <SellerID>234532358B4</SellerID>
        <ManufacturerID>6546</ManufacturerID>
        <Type Code>1</TypeCode>
        <Note>SAP NetWeaver</Note>
    </Product>
</PurchaseOrder>.
```

In this example, schemeAgencyID="009" corresponds to "EAN" according to code list DE 3055, and TypeCode="1" indicates it is the product type "Material."

The following is a second example of CDT BusinessTransactionDocumentProduct 6600:

Example 2

Internal ID

```
<PurchaseOrder>
    ...
    <Product>
        <InternalID schemeID="ProductGUID"
schemeAgencyID="MPL__002">
1C743CEC501F6A4D8826C7EC5A8554B9</InternalID>
        <TypeCode>1</TypeCode>
        <Note>SAP NetWeaver</Note>
    </Product >
</PurchaseOrder>.
```

In this example, schemeID="PartyGUID" indicates that the scheme "ProductGUID" was used to identify the product and schemeAgencyID="MPL__002" indicates that the scheme was assigned by the business system "MPL__002."

The structure of CDT Business Transaction Document Product 6600 is depicted in FIG. 66. For the CDT Business Transaction Document Product 6600, the Object Class is Business Transaction Document Product 6602, and the Representation/Association is Details 6604.

For the Internal ID 6606, the Category is Element 6608, the Object Class is Business Transaction Document Product 6610, the Property Qualifier is Internal 6612, the Property is Identification 6614, the Representation/Association is Identifier 6616, the Type is CDT 6618, and the Type Name is Product Internal ID 6620. The Cardinality is zero or one 6622.

For the Standard ID 6624, the Category is Element 6626, the Object Class is Business Transaction Document Product 6628, the Property Qualifier is Standard 6630, the Property is Identification 6632, the Representation/Association is Identifier 6634, the Type is CDT 6636, and the Type Name is Product Standard ID 6638. The Cardinality is from zero to n. 6640.

For the Buyer ID 6642, the Category is Element 6644, the Object Class is Business Transaction Document Product 6646, the Property Qualifier is Buyer 6648, the Property is Identification 6650, the Representation/Association is Identifier 6652, the Type is CDT 6654, and the Type Name is Product Party ID 6656. The Cardinality is zero or one 6658.

For the Seller ID 6660, the Category is Element 6680, the Object Class is Business Transaction Document Product 6664, the Property Qualifier is Seller 6666, the Property is Identification 6668, the Representation/Association is Identifier 6670, the Type is CDT 6672, and the Type Name is Product Party ID 6674. The Cardinality is zero or one 6676.

For the Product Recipient ID 6678, the Category is Element 6680, the Object Class is Business Transaction Document Product 6682, the Property Qualifier is Product Recipient 6684, the Property is Identification 6686, the Representation/Association is Identifier 6688, the Type is CDT 6690, and the Type Name is Product Party ID 6692. The Cardinality is zero or one 6694.

For the Vendor ID 6696, the Category is Element 6698, the Object Class is Business Transaction Document Product 6699, the Property Qualifier is Vendor 6601A, the Property is Identification 6602A, the Representation/Association is Identifier 6603A, the Type is CDT 6604A, and the Type Name is Product Party ID 6605A. The Cardinality is zero or one 6606A.

For the Manufacturer ID 6607A, the Category is Element 6608A, the Object Class is Business Transaction Document Product 6609A, the Property Qualifier is Manufacturer 6610A, the Property is Identification 6611A, the Representation/Association is Identifier 6612A, the Type is CDT 6613A, and the Type Name is Product Party ID 6614A. The Cardinality is zero or one 6615A.

For the Bill To ID 6616A, the Category is Element 6617A, the Object Class is Business Transaction Document Product 6618A, the Property Qualifier is Bill To 6619A, the Property is Identification 6620A, the Representation/Association is Identifier 6621A, the Type is CDT 6622A, and the Type Name is Product Party ID 6623A. The Cardinality is zero or one 6624A.

For the Bill From ID 6625A, the Category is Element 6626A, the Object Class is Business Transaction Document Product 6627A, the Property Qualifier is Bill From 6628A, the Property is Identification 6629A, the Representation/Association is Identifier 6630A, the Type is CDT 6631A, and the Type Name is Product Party ID 6632A. The Cardinality is zero or one 6633A.

For the Bidder ID 6634A, the Category is Element 6635A, the Object Class is Business Transaction Document Product 6636A, the Property Qualifier is Bidder 6637A, the Property is Identification 6639A, the Representation/Association is Identifier 6639A, the Type is CDT 6640A, and the Type Name is Product Party ID 6641A. The Cardinality is zero or one 6642A.

For the Type Code 6643A, the Category is Element 6644A, the Object Class is Business Transaction Document Product 6645A, the Property is Type Name Code 6646A, the Representation/Association is Code 6647A, the Type is GDT 6648A, and the Type Name is Product Type Code 6649A. The Cardinality is zero or one 6650A.

For the Note 6651A, the Category is Element 6652A, the Object Class is Business Transaction Document Product 6653A, the Property is Note 6654A, the Representation/Association is Note 6655A, the Type is GDT 6656A, and the Type Name is Note 6657A. The Cardinality is zero or one 6658A.

For the Change ID 6659A, the Category is Element 6660A, the Object Class is Business Transaction Document Product 6661A, the Property is Change Identification 6662A, the Representation/Association is Identifier 6663A, the Type is GDT 6664A, and the Type Name is product Change ID 6665A. The Cardinality is zero or one 6666A.

For the Discontinuation Indicator 6666A, the Category is Element 6667A, the Object Class is Business Transaction Document Product 6668A, the Property is Discontinuation 6669A, the Representation/Association is Indicator 6670A, the Type is GDT 6671A, and the Type Name is product Discontinuation Indicator 6672A. The Cardinality is zero or one 6673A.

For the Package Quantity 6674A, the Category is Element 6675A, the Object Class is Business Transaction Document Product 6676A, the Property Qualifier is Package 6677A, the Property is Quantity 6678A, the Representation/Association is Quantity 6679A, the Type term is GDT 6680A, and the Type Name term is Quantity 6681A. The Cardinality is zero or one 6682A.

InternalID refers to a proprietary identifier for the product that is used when both sender and recipient can access shared master data (extended enterprise). StandardID refers to a standardized identifier for this product, whose identification scheme may be managed by an agency from the DE 3055 code list. BuyerID refers to an identifier that is used proprietarily by the BuyerParty for this product. SellerID refers to an identifier that is used proprietarily by the SellerParty for this product. ProductRecipientID refers to an identifier that is used proprietarily by the ProductRecipientParty for this product. VendorID refers to an identifier that is used proprietarily by the VendorParty for this product. ManufacturerID refers to an identifier that is used proprietarily by the ManufacturerParty for this product. BillToID refers to an identifier that is used proprietarily by the BillToParty for this product. BillFromID refers to an identifier that is used proprietarily by the BillFromParty for this product. BidderID refers to an identifier that is used proprietarily by the BidderParty for this product. Type Code refers to coded representation of the type of a product such as "1" for material and "2" for service product. Note refers to a product description. ChangeID refers to an unique identifier for a change to a product that has no effect on the properties that are relevant for the user. DiscontinuationIdicator indicates whether the offering of a product is to be discontinued, i.e., removed from the line. PackageQuantity refers to an amount per container (package amount). The amount per container may be necessary if different package quantities are relevant, but the same product ID can have different package quantities depending on the item. This information is also variable movement data at time of the message.

The different IDs of a CDT BusinessTransactionDocumentProduct 6600 may identify the same product. Identification of a product can take place by an InternaID when sender and recipient can access shared master data, by a StandardID when sender and recipient can manage standardized identifiers, or by a ProductPartyIDs when sender and recipient are interested in the ProductIDs assigned by the parties involved. Of all of the IDs available to the sender, IDs that the recipient is expected to understand may be used in a message.

(ff) BusinessTransactionDocumentProductCategory

A CDT BusinessTransactionDocumentProductCategory 6700 contains the information that is exchanged—for example, in accordance with common business understanding—in business documents about a product category. It identifies the product category using an internal ID, a standard ID, and IDs assigned by parties involved. A product category is a division of products according to objective criteria. An ID assigned by a party identifies in the name the role the assigning party plays in the business transaction. At present, roles are Buyer, Seller, ProductRecipient, Vendor, BillTo, BillFrom and Bidder. An example of CDT BusinessTransactionDocumentProductCategory 6700 is:

```
<BusinessTransactionDocumentProductCategory>
    <StandardID schemeID="UNSPSC" schemeVersionID="11.0"
schemeAgencyID="257">4711</StandardID>
    <BuyerID>1234</BuyerID>
    <SellerID>2345</SellerID>
</BusinessTransactionDocumentProductCategory>.
```

In this example, SchemeID="UNSPSC" indicates that it is the scheme "United Nations Standard Product and Services Classification Code", SchemeVersionID="11.0" indicates the version of the scheme, and schemeAgencyID="257" corresponds to the Agency "ECCMA" (Electronic Commerce Code Management Association) according to the code list DE 3055.

The structure of CDT Business Transaction Document Product Category 6700 is depicted in FIG. 67. For the CDT Business Transaction Document Product Category 6700, the Object Class is Business Transaction Document Product Category 6702, and the Representation/Association term is Details 6704.

For the Internal ID 6706, the Category is Element 6708, the Object Class is Business Transaction Document Product Category 6710, the Property Qualifier term is Internal 6712, the Property is Identification 6714, the Representation/Association term is Identifier 6716, the Type term is CDT 6718, and the Type Name term is Product Category Internal ID 6720. The Cardinality is zero or one 6722.

For the Standard ID 6724, the Category is Element 6726, the Object Class is Business Transaction Document Product Category 6728, the Property Qualifier term is Standard 6730, the Property is Identification 6732, the Representation/Association term is Identifier 6734, the Type term is CDT 6736, and the Type Name is Product Category Standard ID 6738. The Cardinality is from zero to n 6740.

For the Buyer ID 6742, the Category is Element 6744, the Object Class is Business Transaction Document Product Category 6746, the Property Qualifier term is Buyer 6748, the Property is Identification 6750, the Representation/Association term is Identifier 6767, the Type term is CDT 6754, and the Type Name is Product Category Party ID 6756. The Cardinality is zero or one 6758.

For the Seller ID 6760, the Category is Element 6762, the Object Class is Business Transaction Document Product Category 6764, the Property Qualifier term is Seller 6766, the Property is Identification 6768, the Representation/Association term is Identifier 6770, the Type term is CDT 6772, and the Type Name term is Product Category Party ID 6774. The Cardinality is zero or one 6776.

For the Product Recipient ID 6778, the Category is Element 6780, the Object Class is Business Transaction Document Product Category 6782, the Property Qualifier term is Product Recipient 6784, the Property is Identification 6786, the Representation/Association term is Identifier 6788, the Type term is CDT 6790, and the Type Name term is Product Category Party ID 6792. The Cardinality is zero or one 6794.

For the Vendor ID 6796, the Category is Element 6798, the Object Class is Business Transaction Document Product Category 6799, the Property Qualifier term is Vendor 6701A, the Property is Identification 6702A, the Representation/Association term is Identifier 6703A, the Type term is CDT 6704A, and the Type Name term is Product Category Party ID 6705A. The Cardinality is zero or one 6706A.

For the Bill To ID 6707A, the Category is Element 6708A, the Object Class is Business Transaction Document Product Category 6709A, the Property Qualifier term is Bill To 6710A, the Property is Identification 6711A, the Representation/Association term is Identifier 6712A, the Type term is CDT 6713A, and the Type Name term is Product Category Party ID 6714A. The Cardinality is zero or one 6715A.

For the Bill From ID 6716A, the Category is Element 6717A, the Object Class is Business Transaction Document Product Category 6718A, the Property Qualifier term is Bill From 6719A, the Property is Identification 6720A, the Representation/Association term is Identifier 6721A, the Type term is CDT 6722A, and the Type Name term is Product Category Party ID 6723A. The Cardinality is zero or one 6724A.

For the Bidder ID 6725A, the Category is E 6726A, the Object Class is Business Transaction Document Product Category 6727A, the Property Qualifier term is Bidder From 6728A, the Property is Identification 6729A, the Representation/Association term is Identifier 6730A, the Type term is CDT 6731A, and the Type Name term is Product Category Party ID 6732A. The Cardinality is zero or one 6733A.

InternalID refers to a proprietary identifier for the product category that is used when both sender and recipient can access shared master data (extended enterprise). StandardID refers to a standardized identifier for this product category whose identification scheme may be managed by an agency from the DE 3055 code list. BuyerID refers to an identifier that is used proprietarily by the BuyerParty for this product category. SellerID refers to an identifier that is used proprietarily by the SellerParty for this product category. ProductRecipientID refers to an identifier that is used proprietarily by the ProductRecipientParty for this product category. VendorID refers to an identifier that is used proprietarily by the VendorParty for this product category. BillToID refers to an identifier that is used proprietarily by the BillToParty for this product category. BillFromID refers to an identifier that is used proprietarily by the BillFromParty for this product category. BidderID refers to an identifier that is used proprietarily by the BidderParty for this product category.

The different IDs of a CDT BusinessTransactionDocumentProductCategory 6700 may identify the same product category. A product category may be identified by the ProductCategoryInternalID when sender and recipient can access shared master data, by the ProductCategoryStandardID when sender and recipient can manage standardized identifiers, or by the ProductCategoryPartyIDs when sender or recipient are interested in the ProductCategoryIDs assigned by the parties involved. Of the IDs available to the sender, IDs that the recipient is expected to understand may be used in a message. At least one ID may be specified.

The CDT BusinessTransactionDocument-ProductCategory 6700 is used in messages for internal and external communication to transmit required information about a product category.

(gg) BusinessTransactionDocumentPublicIndicator

A GDT BusinessTransactionDocumentPublicIndicator 6800 indicates whether or not a business document is public. "Public" in this case means that access to the business document is not restricted in any way and the document is published in a standard place. An example of GDT BusinessTransactionDocumentPublicIndicator 6800 is: <RFQPublicIndicator>true</RFQPublicIndicator>.

The structure of CDT Business Transaction Document Public Indicator 6800 is depicted in FIG. 68. For the CDT Business Transaction Document Public Indicator 6800, the Object Class is Business Transaction Document 6802, the Property is Public Indicator 6804, the Representation/Association term is Indicator 6806, the Type term is CCT 6808, and the Type Name term is Indicator.

GDT BusinessTransactionDocumentPublicIndicator 6800 may have the value true or false. True indicates that the business document is public. False indicates that the business document is not public.

The GDT BusinessTransactionDocumentPublicIndicator 6800 may be used in a bid invitation to indicate whether the bid invitation is open to the public or limited to an exclusive group of participants. It therefore indicates to potential participants whether the group of fellow bidders may be restricted in advance.

When the GDT is used, the name component "BusinessTransactionDocument" is replaced with an actual BusinessTransactionDocumentType, e.g., PurchaseOrder, RFQ, and the like.

(hh) BusinessTransactionDocumentReference

A GDT BusinessTransactionDocumentReference 6900 is a unique reference to other business documents that are important within the respective business process. Furthermore, it is also possible to have references to one or more line items within the same business document. An example of GDT BusinessTransactionDocumentReference 6900 is:

```
<PurchaseOrderReference>
    <ID>102321</ID>
    <ItemID>1</ItemID>
</PurchaseOrderReference>.
```

The structure of CDT Business Transaction Document Reference 6900 is depicted in FIG. 69. For the CDT Business Transaction Document Reference 6900, the Object Class is Business Transaction Document Reference 6902, and the Representation/Association term is Details 6904.

For the ID 6906, the Category is Element 6908, the Object Class is Business Transaction Document Reference 6910, the Property is Identification 6912, the Representation/Association term is Identifier 6914, the Type term is GDT 6916, and the Type Name is Business Transaction Document ID 6918. The Cardinality is zero or one 6920.

For the Item ID 6922, the Category is Element 6924, the Object Class is Business Transaction Document Reference 6926, the Property is Item Identification 6928, the Representation/Association term is Identifier 6930, the Type term is GDT 6932, and the Type Name is Business Transaction Document Item ID 6934. The Cardinality is from zero to n 6936.

The business process role of the issuer of the referenced document does not occur in the GDT; rather, it is defined explicitly in the name, such as PurchaseContractReference and SalesContractReference. "DocumentReference" can be used for referencing relevant documents within a business process. They are used as a reference asset for the respective business document. It is also possible to reference the individual items of the respective documents. For example, within the "Order" document, references can be created to the business documents "Quote," "Contract," "PurchaseOrder," as well as to their individual item lines.

"BusinessTransactionDocument" may be replaced by the description of each document in the XML instance, e.g., "PurchaseOrder" for a purchase order, "Delivery" for a delivery, and the like.

(ii) BusinessTransactionDocumentSettlement Relevance-Indicator

A GDT BusinessTransactionDocument-SettlementRelevanceIndicator 7000 indicates whether a given Business Transaction document or one of its items should be settled or not. Settlement incorporates both billing and invoice verification. An example of GDT BusinessTransactionDocumentSettlementRelevanceIndicator 7000 is: <BusinessTransactionDocumentSettlementRelevance Indicator>true</BusinessTransactionDocument-SettlementRelevanceIndicator>.

The structure of GDT Business Transaction Document Settlement Relevance Indicator 7000 is depicted in FIG. 70. For the GDT Business Transaction Document Settlement Relevance Indicator 7000, the Object Class is Business Transaction Document 7002, the Property is Settlement Relevance Indicator 7004, the Representation/Association term is Indicator 7006, the Type term is CCT 7008, and the Type Name term is Indicator 7010.

The GDT BusinessTransactionDocument-SettlementRelevanceIndicator 7000 may have the value true or false. True indicates that the document or an item in the document should be settled. False indicates that the document or an item in the document should not be settled.

The GDT BusinessTransactionDocument-SettlementRelevanceIndicator 7000 may be applied to business documents that are created when products are ordered, goods are delivered, or services are provided, or that transmit information from such business documents. It can be applied to the entire document or to individual items.

If it is transmitted with the value "true" for an entire document or one of that document's items, the whole document or the marked item is settled. References are used to ensure that additional information is taken into account.

If the indicator is transmitted with the value "false" for an entire document or one of that document's items, then the whole document or the marked item is not settled. References can be used to ensure that transmitted information is also taken into account during settlement of documents/items that are transmitted with an indicator with value 'true'.

In one example, if an Order Management credit memo request prompts the creation of a credit memo in billing, then the credit memo request will be transferred with the indicator value set to "true."

In another example, if an Order Management standard order needs to be taken into account during the billing of the deliveries that resulted from it, then that standard order is transferred with the indicator set to "false," and the subsequent delivery document with the indicator set to "true." The references in the delivery document to the items in the standard order ensure that the standard order is then taken into account during settlement.

In an example, the BusinessTransactionDocumentSettlementRelevanceIndicator corresponds to “billing relevance” in R/3 or CRM, with which it is additionally possible, however, to control which quantities should be settled when.

(jj) BusinessTransactionDocumentShipFromLocation

A CDT BusinessTransactionDocumentShipFromLocation 7100 contains the information that is exchanged in business documents about a location relevant for business transactions and from which goods or services are shipped. The information identifies the location, its address, and, if necessary, a different loading location. The identification may be a company-internal ID, a standardized ID, or one or more partner-specific IDs. A location is a logical or a physical place. An ID assigned by a party identifies in the name the role the assigning party occupies in the business transaction. Roles may include Buyer, Seller, ProductRecipient, and Vendor. An example of CDT BusinessTransactionDocumentShipFromLocation 7100 is:

```
<ReplenishmentOrder>
    ...
    <ShipFromLocation>
        <StandardID schemeAgencyID="016">4711</StandardID>
        <BuyerID>9873</BuyerID>
        <SellerID>487847</SellerID>
        <Address>...</Address>
        <LoadingLocation>...</LoadingLocation>
    <ShipFromLocation>
<ReplenishmentOrder>.
```

The structure of CDT Business Transaction Document Ship From Location 7100 is depicted in FIG. 71. For the CDT Business Transaction Document Ship From Location 7100, Object Class is Business Transaction Document Ship From Location 7102, and the Representation/Association term is Details 7104.

For the Internal ID 7106, the Category is Element 7108, the Object Class is Business Transaction Document Ship From Location 7110, the Property Qualifier term is Internal 7112, the Property is Identification 7114, the Representation/Association term is Identifier 7116, the Type term is CDT 7118, and the Type Name term is Location Internal ID 7120. The Cardinality is zero or one 7122.

For the Standard ID 7124, the Category is Element 7126, the Object Class is Business Transaction Document Ship From Location 7128, the Property Qualifier term is Standard 7130, the Property is Identification 7132, the Representation/Association term is Identifier is 7134, the Type term is 7136, and the Type Name term is Location Standard ID 7138. The Cardinality is zero or one 7140.

For the Buyer ID 7142, the Category is Element 7144, the Object Class is Business Transaction Document Ship From Location 7146, the Property Qualifier term is Buyer 7148, the Property is Identification 7150, the Representation/Association term is Identifier 7152, the Type term is CDT 7154, and the Type Name term is Location Party ID 7156. The Cardinality is zero or one 7158.

For the Seller ID 7160, the Category is Element 7162, the Object Class is Business Transaction Document Ship From Location 7164, the Property Qualifier term is Seller 7166, the Property is Identification 7168, the Representation/Association term is Identifier 7170, the Type term is CDT 7172, and the Type Name term is Location Party ID 7174. The Cardinality is zero or one 7176.

For the Product Recipient ID 7178, the Category is Element 7180, the Object Class is Business Transaction Document Ship From Location 7182, the Property Qualifier term is Product Recipient 7184, the Property is Identification 7186, the Representation/Association term is Identifier 7188, the Type term is CDT 7190, and the Type Name term is Location Party ID 7192. The Cardinality is zero or one 7194.

For the Vendor ID 7196, the Category is Element 7198, the Object Class is Business Transaction Document Ship From Location 7199, the Property Qualifier term is Vendor 7101A, the Property is Identification 7102A, the Representation/Association term is Identifier 7103A, the Type term is CDT 7104A, the and Type Name term is Location Party ID 7105A. The Cardinality is zero or one 7106A.

For the Address 7107A, the Category is Element 7108A, the Object Class is Business Transaction Document Ship From Location 7109A, the Property is Address 7110A, the Representation/Association term is Address 7111A, the Type term is GDT 7112A, and the Type Name term is Address 7113A. The Cardinality is zero or one 7114A.

For the Note 7115A, the Category is Element 7116A, the Object Class is Business Transaction Document Ship From Location 7117A, the Property is Note 7118A, the Representation/Association term is Text 7119A, the Type term is GDT 7120A, and the Type Name term is Note 7121A. The Cardinality is zero or one 7122.

For the Loading Location 7123A, the Category is Element 7124A, the Object Class is Business Transaction Document Ship From Location 7125A, the Property is Loading Location 7126A, the Representation/Association term Business Transaction Document Location 7127A, the Type term is GDT 7128A, and the Type Name term is Business Transaction Document Location 7129A. The Cardinality is zero or one 7130A.

InternalD refers to a proprietary identifier that is used when both sender and recipient can access shared master data (extended enterprise). StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. LoadingLocation refers to one loading location. The loading locations is a location itself and can be identified proprietarily or partner-specifically.

When defining addresses, organization addresses are supported. The different IDs of a BusinessTransactionDocumentShipFromLocation may identify the same location. A location may be identified by the InternalID when sender and recipient can access shared master data, by the StandardID when sender and recipient can manage standardized identifiers or by the PartyIDs when sender and recipient are interested in the PartyIDs assigned by the parties involved. Of the IDs available to the sender, those that the recipient is expected to understand may be used.

(kk) BusinessTransactionDocumentShipToLocation

A CDT BusinessTransactionDocumentShipToLocation 7200 contains the information that is exchanged in business documents about a location relevant for business transactions and to which goods or services are shipped. This information identifies the location, its address and, if necessary, a different unloading location. The identification may be a company-internal ID, a standardized ID, or one or many partner-specific IDs. A location is a logical or a physical place. An ID assigned by a party identifies in the name the role the assigning party plays in the business transaction. Roles include Buyer, Seller, Product-Recipient, and Vendor. An example of CDT BusinessTransactionDocumentShipToLocation 7200 is:

```
<ReplenishmentOrder>
    ...
    <ShipToLocation>
        <StandardID schemeAgencyID="016">4711</StandardID>
        <SellerID>487847</SellerID>
        <Address>...</Address>
        <UnloadingLocation>...</UnloadingLocation>
    </ShipToLocation>
</ReplenishmentOrder>.
```

The structure of CDT Business Transaction Document Ship To Location 7200 is depicted in FIG. 72. For the CDT Business Transaction Document Ship To Location 7200, Object Class is Business Transaction Document Ship To Location 7202, and the Representation/Association term is Details 7204.

For the CDT Internal ID 7206, the Category is Element 7208, the Object Class is Business Transaction Document Ship To Location 7210, the Property Qualifier term is Internal 7212, the Property is Identification 7214, the Representation/Association term is Identifier 7216, the Type term is CDT 7218, and the Type Name term is Location Internal ID 7220. The Cardinality is zero or one 7222.

For the CDT Standard ID 7224, the Category is Element 7226, the Object Class is Business Transaction Document Ship To Location 7228, the Property Qualifier term is Standard 7230, the Property is Identification 7232, the Representation/Association term is Identifier 7234, the Type term is CDT 7236, the Type Name term is Location Standard ID 7238, and the Cardinality is zero or one 7240.

For the Buyer ID 7242, the Category is E 7244, the Object Class is Business Transaction Document Ship To Location 7246, the Property Qualifier term is Buyer 7248, the Property is Identification 7250, the Representation/Association term is Identifier 7252, the Type term is CDT 7254, the Type Name term is Location Party ID 7256, and the Cardinality is zero or one 7258.

For the Seller ID 7260, the Category is Element 7262, the Object Class is Business Transaction Document Ship To Location 7264, the Property Qualifier term is Seller 7266, the Property is Identification 7268, the Representation/Association term is Identifier 7270, the Type term is CDT 7272, the Type Name term is Location Party ID 7274, and the Cardinality is zero or one 7276.

For the Product Recipient ID 7278, the Category is Element 7280, the Object Class is Business Transaction Document Ship To Location 7282, the Property Qualifier term is Product Recipient 7284, the Property is Identification 7286, the Representation/Association term is Identifier 7288, the Type term is CDT 7290, the Type Name term is Location Party ID 7292, and the Cardinality is zero or one 7294.

For the Vendor ID 7296, the Category is Element 7298, the Object Class is Business Transaction Document Ship To Location 7299, the Property Qualifier term is Vendor 7201A, the Property is Identification 7201A, the Representation/Association term is Identifier 7202, the Type term is CDT 7203A, the Type Name term is Location Party ID 7204, and the Cardinality is zero or one 7205A.

For the Address 7206A, the Category is E 7207A, the Object Class is Business Transaction Document Ship To Location 7208A, the Property is Address 7209A, the Representation/Association term is Address 7210A, the Type term is GDT 7211, the Type Name term is Address 7212A, and the Cardinality is zero or one 7213A.

For the Note 7214A, the Category is Element 7215A, the Object Class is Business Transaction Document Ship To Location 7216, the Property is Note 7217A, the Representation/Association term is 7218A, the Type term is GDT 7219A, the Type Name term is Note 7220A, and the Cardinality is zero or one 7221A.

For the Unloading Location 7222A, the Category is Element 7223A, the Object Class is Business Transaction Document Ship To Location E 7224A, the Property is Unloading Location 7225A, the Representation/Association term is Business Transaction Document Location 7226A, the Type term is GDT 7227A, the Type Name term is Business Transaction Document Location 7228A, and the Cardinality is zero or one 7229A.

InternalID refers to a proprietary identifier that is used when both sender and recipient can access shared master data. StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. UnLoadingLocation refers to an unloading location. The unloading location is a location itself and therefore can be identified proprietarily or partner-specifically.

When defining addresses, organization addresses may be supported. The different IDs of a CDT BusinessTransactionDocumentShipToLocation 7200 may identify the same location. A location may be identified by the InternalID when sender and recipient can access shared master data, by the StandardID when sender and recipient can manage standardized identifiers, or by the PartyIDs when sender and recipient are interested in the IDs assigned by the parties involved. Of the IDs available to the sender, those that the recipient is expected to understand may be used.

(ll) BusinessTransactionDocumentTransshipment Location

A CDT BusinessTransactionDocumentTransshipmentLocation 7300 contains the information that is exchanged in business documents about a relevant location for business transactions where goods are transshipped (unloaded and reloaded). This information identifies the location, its address, a loading location, and an unloading location. The identification may be a company-internal ID, a standardized ID, or one or more partner-specific IDs. A location is a logical or a physical place. An ID assigned by a party identifies in the name the role the assigning party plays in the business transaction. Roles include Buyer, Seller, ProductRecipient, and Vendor. An example of CDT BusinessTransactionDocumentTransshipmentLocation 7300 is:

```
<ReplenishmentOrder>
    ...
    <TransshipmentLocation>
        <StandardID schemeAgencyID="016">4711</StandardID>
        <Address>...</Address>
        <LoadingLocation>...</LoadingLocation>
        <UnloadingLocation>...</UnloadingLocation>
    <TransshipmentLocation>
</ReplenishmentOrder>.
```

The structure of CDT Business Transaction Document Transshipment Location 7300 is depicted in FIG. 73. For the CDT Object Class is 7302, the Representation/Association term is Details 7304.

For the Internal ID 7306, the Category is Element 7308, the Object Class is Business Transaction Document Transship Location 7310, the Property Qualifier term is Internal 7312, the Property is Identification 7314, the Representation/Association term is Identifier 7316, the Type term is CDT 7318, the Type Name term is Location Internal ID 7320, and the Cardinality is zero or one 7322.

For the Standard ID 7324, the Category is Element 7326, the Object Class is Business Transaction Document Transship Location 7328, the Property Qualifier term is Internal 7328, the Property is Identification 7330, the Representation/Association term is Identifier 7332, the Type term is CDT 7334, the Type Name term is Location Internal ID 7336, and the Cardinality is zero or one 7338.

For the Buyer 7340, the Category is Element 7342, the Object Class is Business Transaction Document Transship Location 7344, the Property Qualifier term is Buyer 7346, the Property is Identification 7348, the Representation/Association term is Identifier 7350, the Type term is CDT 7352, the Type Name term is Location Party ID 7354, and the Cardinality is zero or one 7356.

For the Seller ID 7358, the Category is Element 7360, the Object Class is Business Transaction Document Transship Location 7362, the Property Qualifier term is Seller 7364, the, Property is Identification 7366, the Representation/Association term is Identifier 7368, the Type term is CDT 7370, the Type Name term is Location Party ID 7372, and the Cardinality is zero or one 7374.

For the Product Recipient 7376, the Category is Element 7378, the Object Class is Business Transaction Document Transship Location 7380, the Property Qualifier term is Product Recipient 7382, the Property is Identification 7384, the Representation/Association term is Identifier 7386, the Type term is CDT 7388, the Type Name term is Location Party ID 7390, and the Cardinality is zero or one 7392.

For the Vendor ID 7394, the Category is Element 7396, the Object Class is Business Transaction Document Transship Location 7398, the Property Qualifier term is Vendor 7399, the Property is Identification 7301A, the Representation/Association term is Identifier 7302A, the Type term is CDT 7303A, the Type Name term is Location Party ID 7304A, and the Cardinality is zero or one 7305A.

For the Address 7306A, the Category is Element 7307A, the Object Class is Business Transaction Document Transship Location 7308A, the Property is 7309A, the Representation/Association term is Address 7310A, the Type term is GDT 7311A, the Type Name term is Address 7312A, and the Cardinality is zero or one 7313A.

For the Note 7314A, the Category is Element 7315A, the Object Class is Business Transaction Document Transship Location 7316A, the Property is Note 7317A, the Representation/Association term is Text 7318A, the Type term is GDT 7319A, the Type Name term is Note 7320A, and the Cardinality is zero or one 7321A.

For the Loading Location 7322A, the Category is Element 7323A, the Object Class is Business Transaction Document Transship Location 7324A, the Property is Loading Location 7325A, the Representation/Association term is Business Transaction Document Location 7326A, the Type term is GDT 7327A, the Type Name term is Business Transaction Document Location 7328A, and the Cardinality is zero or one 7329A.

For the Unloading Location 7330A, the Category is Element 7331A, the Object Class is Business Transaction Document Transshipment Location 7332A, the Property is Unloading Location 7333A, the Representation/Association term is Business Transaction Document Location 7334A, the Type is GDT 7335A, the Type Name is Business Transaction Document Location 7336A, and the Cardinality is zero or one 7337A.

InternalID refers to a proprietary identifier that is used when both sender and recipient can access shared master data. StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. LoadingLocation refers to one loading location, which is a location itself and can be identified proprietarily or partner-specifically. UnLoadingLocation refers to an unloading location, which is also a location itself and therefore can be identified proprietarily or partner-specifically.

When defining addresses, organization addresses may be supported. The different IDs of a CDT BusinessTransactionDocumentTransshipmentLocation 7300 may identify the same location. A location may be identified by the InternalID when sender and recipient can access shared master data, by the StandardID when sender and recipient can manage standardized identifiers, or by the PartyIDs when sender and recipient are interested in the IDs assigned by the parties involved. Of the IDs available to the sender, those that the recipient is expected to understand may be used.

(mm) BusinessTransactionDocumentTypeCode

The GDT BusinessTransactionDocumentTypeCode 7400 is a coded representation of the type of a document that occurs in business transactions. The document type describes the nature of similar documents and defines the basic features of the documents of this type. An example of GDT BusinessTransactionDocumentTypeCode 7400 is: <BusinessTransactionDocumentTypeCode>001</BusinessTransactionDocumentTypeCode>.

The structure of GDT Business Transaction Document Type Code 7400 is depicted in FIG. 74. For the GDT Business Transaction Document Type Code 7400, the Object Class is Business Transaction Document 7402, the Property is Type 7404, the Representation/Association term is Code 7406, the Type term is CCT 7408, the Type Name term is Code 7410, the Length is three 7412. The GDT Business Transaction Document Type Code 7400 may be restricted 7414.

GDT BusinessTransactionDocumentTypeCode 7400 may have a value from 001 and 005. 001 indicates a purchase order. In an example, a PurchaseOrder is a request from a buying party to a seller to provide or deliver certain quantities of products on one or several dates. For the buying party, the commitments resulting from the request are legally binding for a certain period. On acceptance by the seller, they are binding for both parties. 002 indicates a sales contract, which is a framework agreement with a customer concerning the supply of products in a certain period. 003 indicates a Quote, which is an offer from a selling party to a buying party to supply or deliver products at predefined conditions. 004 indicates an invoice, which may be a legally binding notification concerning claims or liabilities for delivered products and services rendered. 005 indicates a credit memo, which is a notification to a beneficiary regarding an invoice that reduces the balance of the payment or liabilities.

The GDT BusinessTransactionDocumentTypeCode 7400 is used, for example, to categorize business transaction documents into messages if the document type is not already apparent based on the message. Applications provide "service-driven" interfaces—the messages of these interfaces can be filled from various applications from different underlying documents. However, the "service" application has to know the type of business transaction document in question such as the document type from which the message arose. For example DeliveryExecutionRequest refers to a consistent request to Logistics to prepare and execute goods receipts or deliveries, BillingDueNotification refers to a creation of the billing due list based on data from various applications and business documents, and PaymentDueNotification refers to a creation of payment dues based on data from various applications and business documents.

Messages correspond to business documents. Such a business document contains a business document object. A business document object may be a Business Transaction Document or a Master Data Document. The GDT BusinessTransactionDocumentTypeCode 7400 categorizes the Business Transaction Document.

In an example, in R/3, the BusinessTransactionDocumentTypeCode corresponds in principle, to VBTYP in Sales or BSTYP in Purchasing or MRM_REFERENZBELEG in Invoice Verification, and the like. The Code Names defined in the code list may also be used in the tag names of the XML instance for references to Business Transaction Documents.

(nn) BusinessTransactionExecutionStatusCode

The GDT BusinessTransactionExecutionStatusCode 7500 is an encoded representation of the status of the execution of a business transaction. An example of GDT BusinessTransactionExecutionStatusCode 7500 is: <GoodsIssueExecutionStatusCode>3</GoodsIssueExecutionStatusCode>.

The structure of GDT Business Transaction Execution Status Code 7500 is depicted in FIG. 75. For the GDT Business Transaction Execution Status Code 7500, the Object Class is Business Transaction 7502, the Property is Execution Status Code 7504, the Representation/Association term is Code 7506, the Type term is CCT 7508, the Type Name term is Code 7510, and the Length is one 7512. The GDT Business Transaction Execution Status Code 7500 may be restricted 7514.

GDT BusinessTransactionExecutionStatusCode 7500 may have a proprietary code of 1, 2, or 3. 1 indicates that the execution of a business transaction has not yet started, 2 indicates that a business transaction is currently being executed, and 3 indicates that the execution of a business transaction has been completed.

When using the GDT BusinessTransactionExecutionStatusCode 7500 for a certain business transaction, the part of the name "BusinessTransaction" of the GDT is replaced by the English description of the business transaction. In an embodiment, business transactions from the code list of the GDT BusinessTransactionTypeCode 7500 are allowed. For example, the execution status of a "GoodsIssue" is specified by the GoodsIssueExecutionStatusCode and the execution status of a "GoodsPutaway" is specified by the GoodsPutawayExecutionStatusCode.

The execution status of a business transaction in Sales (Sales and Delivery) may be represented in R/3 by the data element STATV.

GDT BusinessTransactionBlockedIndicator 5300 indicates whether or not the execution of a business transaction is blocked. While the GDT BusinessTransactionExecutionStatusCode 7500 indicates the current execution status of a business transaction, the GDT BusinessTransactionBlockedIndicator 5300 shows whether or not the execution of a business transaction should start or be continued. For example, when a delivery is requested, it can also be requested that the delivery not be executed.

GDT BusinessTransactionCompletedIndicator 5400 indicates whether or not the execution of a business transaction has been completed. This indicator specifies whether or not a business transaction is regarded as completed, regardless of its execution status. For example, a delivery that is being executed can be considered completed, even though the entire quantity has not been delivered.

(oo) BusinessTransactionPriorityCode

The GDT BusinessTransactionPriorityCode 7600 is a coded representation of the ranking of a business transaction in terms of its urgency. The assignment of a priority always creates a sequence such that a unique predecessor-successor relationship exists between the individual values of a priority and they can be sorted uniquely. An example of GDT BusinessTransactionPriorityCode 7600 is: <PriorityCode>1</PriorityCode>.

The structure of GDT Business Transaction Priority Code 7600 is depicted in FIG. 76. For the GDT Business Transaction Priority Code 7600, the Object Class is Business Transaction 7602, the Property is Priority Code 7604, the Representation/Association term is Code 7606, the Type term is CCT 7608, the Type Name term is Code 7608, and the Length is one 7610. The GDT Business Transaction Priority Code 7600 may be restricted 7612.

For example, business transactions that are assigned a higher priority are more important, are required more urgent or have to be carried out first and are therefore considered first or are given preference during selection and processing.

The codes that may be used for GDT BusinessTransactionPriorityCode 7600 are 1, 2, 3, and 7. 1 means the transaction is to be done immediately, 2 means it is to be performed before any non-urgent task, 3 means it is to be done as routine work, and 7 means it is a low priority. The sequence of urgency is: 1, 2, 3, 7.

Priorities are assigned in nearly all business areas such as to specify delivery priorities, the urgency of an e-mail, posting priorities, deduction priorities, or urgency of a problem. For example, the delivery of product ABC is of particular importance to customer 4711. Therefore orders/order items containing this product are treated with preference and receive the delivery priority "immediate."

Since information describing priorities can be communicated in many different areas, the definition is kept general. In particular, in certain circumstances, the context determines which standard and therefore with which code list the "PriorityCode" should be communicated (e.g., "very high," "high," "medium," "low," or "A," . . . , "Z"). In an embodiment, proprietary code lists are used that were agreed upon by the communication partners individually.

For example, in the area of R/3 shipping, a delivery priority of the type NUMC, length 2.0, is used with codes 01 (High), 02 (Normal) and 03 (Low).

"BusinessTransaction" is replaced in the XML instance by the description of the respective business transaction, e.g., "delivery" (see Use for BusinessTransactionPriorityCodeDelivery in DeliveryTerms).

(pp) BusinessTransactionTypeCode

The GDT BusinessTransactionTypeCode 7700 is a coded representation of the type of a business transaction. A business transaction is a self-sufficient, logical commercial transaction that results in a value change, a quantity change, or an event. An example of GDT BusinessTransactionTypeCode 7700 is: <BusinessTransactionTypeCode>0001</BusinessTransactionTypeCode>.

The structure of BusinessTransactionTypeCode is depicted in FIG. 77. For the GDT Business Transaction Execution Status Code 7700, the Object Class is Business Transaction 7702, the Property is Execution Status Code 7704, the Representation/Association term is Code 7706, the Type term is CCT 7708, the Type Name term is Code 7710, and the Length is one 7712. The GDT Business Transaction Execution Status Code 6000 may be restricted 7714 GDT.

GDT BusinessTransactionTypeCode 7700 is based on a proprietary code list. The data type is used for internal business processes or A2A interfaces. One possible value for BusinessTransactionTypeCode is 0001, which refers to Service Entry. A service entry is an entry for the type and scope of services provided by a seller. The entry is the basis for creating an invoice. A ServiceAcknowledgementRequest message can be sent based on the entry.

A GDT BusinessTransactionTypeCode 7700 may be used to provide accounting with information about the type of a business transaction, the quantities, amounts, and other data from this business transaction. In accounting, the business transaction type is a central control element for the document structure, account determination, and the like.

For a business application area (e.g., accounting), the GDT BusinessTransactionTypeCodes 7700 have the same level of detail. This means that there may be no refinement or grouping relationships between the codes of an area. The codes to be used from the code list in the interface are defined for each interface that uses the GDT BusinessTransactionTypeCode 7700. For every interface that uses the GDT BusinessTransactionTypeCode 7700 the admissable codes may be specified in the interface documentation.

Business transactions create or change BusinessTransactionDocuments. The data types GDT BusinessTransactionTypeCode 7700 and BusinessTransactionDocumentTypeCode are therefore closely related. Since complex business transactions (e.g., confirmation of a production order) create or change several business documents, however, in an embodiment, it may not be possible to create a simple (1:1 or 1:n) relationship between the code lists of these data types.

(qq) CashDiscount

A GDT CashDiscount 7800 is an agreement on the percentage of cash discount that is granted during a sales transaction when payment takes place within a certain number of days after the baseline date for payment has passed. An example of GDT CashDiscount 7800 is:

```
<MaximumCashDiscount>
    <DaysValue>15</DaysValue>
    <Percent>1.75</Percent>
</MaximumCashDiscount>.
```

The structure of GTD CashDiscount is depicted in FIG. 78. For the GDT Cash Discount term 7802 and the Representation/Association term is Code 7804.

GDT CashDiscount 7800 includes elements DaysValue and Percent from the core component type 'numeric'. DaysValue is the number of days after the baseline payment date has passed. The number of days can be a whole number from 1 to 999.

For the Days Value Code 7806, the Category is Element, the Object Class is Cash Discount 7810, the Property is Days 6004, the Representation/Association term is Code 7814, the Type term is GDT 7816, the Type Name term is Code 7818, and the Length is from one to three 7820. The Cardinality is zero or one 7822.

Percent is the cash discount percentage rate. It is a decimal number with a maximum of two places before the decimal point and three places after the decimal point. For the Percent Code 7806, the Category is Element, the Object Class is Cash Discount 7828, the Property is Percent 6004, the Representation/Association term is Percent 783214, the Type term is GDT 783416, the Type Name term is Percent 7836, and the Length is maximum five digits with three places after the decimal point 7838. The Cardinality is zero or one 7840.

GDT CashDiscount 7800 is used in the Global Data Type CashDiscountTerms to define cash discount levels.

(rr) CashDiscountTerms

GDT CashDiscountTerms 7900 are payment conditions for goods and services. An example of GDT CashDiscountTerms 7900 is:

```
<CashDiscountTerms>
    <MaximumCashDiscount>
        <DaysValue>15</DaysValue>
        <Percent>1.75</Percent>
    </MaximumCashDiscount>
    <NormalCashDiscount>
        <DaysValue>30</DaysValue>
        <Percent>0.50</Percent>
    </NormalCashDiscount>
    <FullPaymentDueDaysValue>40</FullPaymentDueDaysValue>
</ CashDiscountTerms>.
```

The structure of GDT CashDiscountTerms 7900 is depicted in FIG. 79. The GDT Payment Baseline Date Terms 7900 includes elements scheme 7908, the Cash Discount term is 7910, the Property Payment Baseline Date term is 7912, the Representation/Association Date term is 7914, the Type term is GDT 7916, the Type Name term is Date 7918. The Cardinality is zero or one 7920.

For the GDT Maximum Cash Discount term is 7922 and includes element scheme 7924, the Cash Discount term is 7926, the Property Maximum Cash Discount term is 7928, the Representation/Association Details term is 7930, the Type term is GDT 7932, the Type Name term is Cash Discount 7934. The Cardinality is zero or one 7936.

For the GDT Maximum Cash Discount term is 7938 and includes element scheme 7940, the Cash Discount term is 7942, the Property Normal Cash Discount term is 7944, the Representation/Association Details term is 7946, the Type term is GDT 7948, the Type Name term is Cash Discount 7950. The Cardinality is zero or one 7952.

For the GDT Full Payment Due Days Value term is 7954 and includes element scheme 7956, the Cash Discount term is 7960, the Property Full Payment Due Days term is 7928, the Representation/Association Value term is 7964, the Type term is GDT 7966, the Type Name term is Integer Value 7934, the Length is from one and 7970. The Cardinality is zero or one 7972.

PaymentBaselineDate refers to a payment baseline date such as the date from which the payment periods run. MaximumCashDiscount refers to the maximum cash discount for rapid payments. NormalCashDiscount refers to the normal cash discount. FullPaymentDueDaysValue refers to the number of days after the payment baseline date within which the full payment (e.g., of an invoice) should take place.

MaximumCashDiscount may be present when NormalCashDiscount is offered, as well. Therefore, NormalCashDiscount may be used if a cash discount percentage rate is specified. If both MaximumCashDiscount and NormalCashDiscount are specified, MaximumCashDiscount.DaysValue may be <NormalCashDiscount.DaysValue, and MaximumCashDiscount.Percent may be > NormalCashDiscount.Percent. MaximumCashDiscount.DaysValue<=NormalCash Discount.DaysValue<=FullPaymentDueDaysValue may be true. The number of days in FullPaymentDueDaysValue can be a whole number from 1 to 999. PaymentBaselineDate is specified when conditions for a concrete payment are transmitted, e.g., for an invoice. This element does not apply when the payment baseline date has not yet been set such as in the case of an order.

GDT CashDiscountTerms 7900 are used to establish payment conditions, e.g., for an order or when creating an invoice for goods and services.

(ss) CatalogueID

A GDT CatalogueID 8000 is a unique identifier for a catalog. A catalog is a systematically arranged directory of objects of a particular type that are identified uniquely within the catalog. An example of GDT CatalogueID 8000 is: <CatalogueID schemeID='ProductCatalogues' schemeAgencyID='123456789'schemeAgencyScheme AgencyID='16'>MyProducts2002</CatalogueID>.

The structure of GDT CatalogueID 8000 is depicted in FIG. 80. For the GDT CatalogueID 8000 the Object Class Catalog term is 8002, the Property Identification term is 8004, the Representation/Association Identifier term is 8006, the Type term is CCT 8008, the Type Name term is Identifier 8010, and the Length is from one to forty 8012. The CatalogueID may be restricted 8014.

GDT schemeID 8016 includes attribute scheme 8018, the Object Class Catalog term is 8020, the Property Identification term is 8022, the Representation/Association Identifier term is 8024, the Type term is xsd 8026, the Type Name term is Token 8028, the Length is from one to 60 8030. The Cardinality is zero or one 8032.

GDT schemeAgencyID 8034 includes attribute scheme 8036, the Object Class IndentificationSchemeAgency term is 8038, the Property Identification term is 8040, the Representation/Association Identifier term is 8042, the Type term is xsd 8044, the Type Name term is Token 8046, the Length is from 1 to 60 and 8048. The Cardinality is zero or one 8050.

GDT schemeAgencySchemeID 8052 includes attribute scheme 8054, the Object Class IdentificationSchemeAgency term is 8056, the Property Scheme term is 8058, the Representation/Association Identifier term is 8060, the Type term is xsd 8062, the Type Name term is Token 8064, the Length is from 1 to 60 and 8066. The Cardinality is zero or one 8068.

GDT schemeAgencySchemeAgencyID 8070 includes attribute scheme 8072, the Object Class Identification-SchemeAgency term is 8074, the Property SchemeAgency term is 8076, the Representation/Association Identifier term is 8078, the Type term is xsd 8080, the Type Name term is Token 8082, the Length is three 8084. The Cardinality is zero or one 8086.

GDT CatalogueID 8000 is from the core component type (CCT) Identifier. CatalogueID is used to identify a catalog uniquely. Examples of typical catalogs are electronic product or vendor catalogs. The attributes schemeID, schemeAgencyID, schemeAgencySchemeID, and schemeAgency-SchemeAgencyID are used in the same way as planned for the CCT Identifier, in order to define the context for which a CatalogueID is guaranteed to be unique.

(tt) CatalogueItemID

A GDT CatalogueItemID 8100 is the unique identifier for an object within a catalog and is unique within the context of the catalog. An example of GDT CatalogueItemID 8100 is: <CatalogueItemID>1AXX3332-0</CatalogueItemID>.

The structure of GDT CatalogueItemID 8100 is depicted in FIG. 81. For the GDT CatalogueItemId 8160, the Object Class CatalogueItem term is 8102, the Property Identification term is 8104, the Representation/Association Identifier term is 8106, the Type term is CCT 8108, the Type Name term is Identifier 8110, and the Length is from one to forty 8112. The GDT CatalogueItemID 8100 is 8114.

GDT CatalogueItemID 8100 is from the CCT Identifier. CatalogueItemID is a character string that has a maximum length of 40 characters and that conforms to the rules defined for xsd:token. CatalogueItemID is used to identify an object uniquely within a catalog.

(uu) CatalogueReference

A GDT CatalogueReference 8200 is a unique reference to a catalog or to an object within a catalog. A catalog is a list of objects of a particular type that are uniquely identified within the list and that have access functions for this list. An example of GDT CatalogueReference 8200 is:

```
<CatalogueReference>
  <CatalogueID schemeID='ProductCatalogues'
schemeAgencyID='123456789' schemeAgencySchemeAgencyID='16'>
MyProducts2002</CatalogueID>
 <CatalogueItemID>1AXX3332-0</CatalogueItemID>
 </CatalogueReference>.
```

The structure of GDT CatalogueReference 8200 is depicted in FIG. 82. For the GDT CatalogueReference 8200 the Object Class is CatalogueReference 8202 and the Representation/Association is Details 8204.

For ID 8206, the Category is Element 8208, the Object Class is CatalogueReference 8210, the Property Identification term is 8212, the Representation/Association term is Identifier 8214, the Type term is GDT 8216, the Type Name term is CatalogueID 8218, and the Cardinality is one 8220.

For ItemID 8222, the Category is Element 8224, the Object Class CatalogueReference term is 8226, the Property Item term is Identification 8228, the Representation/Association Identifier term is 8230, the Type term is GDT 8232, the Type Name term is CatalogueItemID 8234, and the Cardinality is from 0 to n 8236.

GDT CatalogueReference 8200 can be used to reference a catalog or an item within a catalog. For example, the "Order" document can contain references to a vendor's product catalog.

(vv) CatalogueSchemaID

A GDT CatalogueSchemaID 8300 is a unique identifier for a catalog schema. A catalog schema defines the structure of a catalog by means of sections which group together similar catalog objects, relationships between sections, and attributes which can be assigned to all the catalog items or to catalog items within a particular section. An example of GDT CatalogueSchemaID 8300 is: <CatalogueSchemaID>UNSPC</CatalogueSchemaID>.

The structure of GDT CatalogueSchemaID 8300 is depicted in FIG. 83. For the GDT CatalogueSchemeID 8300, the Object Class Catalogue Schema term is 8302, the Property is Identification 8304, the Representation/Association term is Identifier 8306, the Type term is CCT 8308, the Type Name term is Identifier 8310, the Length is from one to 40 8312, and the Cardinality is unrestricted 8314.

Characters used for GDT CatalogueSchemaID 8300 may include upper and lowercase characters from A to Z (without German umlauts), digits from 0 to 9,– (minus sign), _ (underscore), /, \, and . (period). No distinction is made between upper and lowercase characters.

GDT CatalogueSchemaID 8300 is used to identify a catalog schema uniquely within the catalog.

(ww) CatalogueSchemaTypeCode

The GDT CatalogueSchemaTypeCode 8400 is a coded representation of the type of a catalog schema. An example of GDT CatalogueSchemaTypeCode 8400 is: <CatalogueSchemaTypeCode>01</CatalogueSchemaTypeCode>.

The structure of GDT CatalogueSchemaTypeCode 8400 is depicted in FIG. 84. For the GDT CatalogueSchemeID 8400, the Object Class Catalogue Schema term is 8402, the Property is Type 8404, the Representation/Association term is Code 8406, the Type term is CCT 8408, the Type Name term is Code 8410, and the Length is two 8412. The GDT CatalogueSchemaTypeCode 8400 may be restricted 8414.

Valid values for GDT CatalogueSchemaTypeCode 8400 are 01 and 02. 01 is a neutral schema, which is a schema without identifying the business significance. 02 is a schema for good groups.

(xx) CatalogueSectionID

A GDT CatalogueSectionID 8500 is a unique identifier for a catalog section. A catalog section is a means of structuring the contents of a catalog using a particular system. A section can contain additional sections, as well as catalog items and the attributes that describe the types of the items. An example of GDT CatalogueSectionID 8500 is: <CatalogueSectionID>Bicycles</CatalogueSectionID>.

The structure of GDT CatalogueSectionID 8500 is depicted in FIG. 85. For the GDT CatalogueSectionID 8500 the Object Class Catalogue Section term is 8502, the Property is Identification 8504, the Representation/Association term is Identifier 8506, the Type term is CCT 8510, the Type Name term is Identifier 8510, and the Length is from one to forty 8512. The GDT CatalogueSectionID 8500 may be a restricted GDT.

The characters allowed for GDT CatalogueSectionID 8500 are upper and lowercase characters from A to Z (without German umlauts), digits from 0 to 9,– (minus sign), _ (underscore), /, \, and . (period). No distinction is made between upper and lowercase characters.

GDT CatalogueSectionID 8500 is used to identify a section uniquely within a catalog schema.

(yy) CatalogueSectionTypeID

A GDT CatalogueSectionTypeID 8600 is a unique identifier for a catalog section type. A catalog section type describes the nature of a catalog sections and defines a set of attributes that is assigned to a section of this type. An example of GDT CatalogueSectionTypeID 1700 is: <CatalogueSectionTypeID>Vehicles<CatalogueSectionTypeID>.

The structure of GDT CatalogueSectionTypeID 8600 is depicted in FIG. 86. For the GDT CatalogueSectioTypeID 8600 the Object Class is Catalogue Section Type 8602, the Property is Identification 8604, the Representation/Association term is Identifier 6906, the Type term is CCT 8608, the Type Name term is Identifier 8610, and the Length is one 8612. The GDT CatalogueSectionTypeID 8600 may be a restricted GDT.

The characters allowed for GDT CatalogueSectionTypeID 8600 are upper and lowercase characters from A to Z (without German umlauts), digits from 0 to 9,– (minus sign), _ (underscore), /, \, and . (period). No distinction is made between upper and lowercase characters. No distinction is made between upper and lowercase characters.

The GDT CatalogueSectionTypeID 7100 may be unique in the context of the catalog.

(zz) CatalogueTypeCode

The GDT CatalogueTypeCode 8700 is a coded representation of the type of a catalog. This is determined by its business purpose, from which the basic attributes are derived. An example of GDT CatalogueTypeCode 8700 is: <CatalogueTypeCode>01</CatalogueTypeCode>.

The structure of GDT CatalogueTypeCode 8700 is depicted in FIG. 87. For the GDT CatalogueTypeCode 8700 the Object Class is Catalog 8702, the Property is Type 8704, the Representation/Association term is Identifier 8706, the Type term is CCT 8708, the Type Name term is Code 8710, and the Length is one 8712. The GDT CatalogueTypeCode 8700 may be a restricted GDT.

Valid values for GDT CatalogueTypeCode 8700 are 01, 02, and 03. 01 refers to a catalog compiled by a company for its own use when purchasing products, 02 refers to a product catalog for one vendor for a purchasing company, and 03 refers to a purchase contract product catalog that contains those products that are included in a special contract with the conditions agreed in the contract. In one example, a purchasing catalog (code 01) could be SAP-B2B, for example. The company uses this catalog for purchasing. The products contained in the catalog can come from different vendors.

(aaa) CatalogueViewID

A GDT CatalogueViewID 8800 is a unique identifier for a catalog view. A catalog view is a subset of the information contained in the catalog. The view is determined by its catalog schemes, sections, and catalog items. In addition, individual attributes can be excluded from a view. An example of GDT CatalogueViewID 8800 is: <CatalogueViewID>ManagerView</CatalogueViewID>.

The structure of GDT CatalogueViewID 8800 is depicted in FIG. 88. For the GDT CatalogueViewID 8800, the Object Class is Catalogue View 8802, the Property is Identification 8804, the Representation/Association term is Identifier 8806, the Type term is CCT 8808, the Type Name term is Identifier 8810, the Length is from one to forty 8812, and CatalogueViewID 8800 may be restricted 8814.

The characters allowed for GDT CatalogueViewID 8800 are upper and lowercase characters from A to Z (without German umlauts), digits from 0 to 9, – (minus sign), _ (underscore), /, \, and . (period). No distinction is made between upper and lowercase characters. No distinction is made between upper and lowercase characters.

The GDT CatalogueViewID 8800 may be in the context of the catalog to which the view belongs.

(bbb) CompleteTransmissionIndicator

The GDT CompleteTransmissionIndicator 8900 indicates whether an object transferred in a message or a transmitted list of similar objects is transmitted in its entirety or not. “Complete Transmission” means the complete transmission of data of the object that is relevant for the message type. “Complete Transmission” is independent of whether the data at the sender have changed since the last transmission. An example of GDT CompleteTransmissionIndicator 8900 is: CompleteTransmissionIndicator>true</CompleteTransmissionIndicator>.

The structure of GDT CompleteTransmissionIndicator 8900 is depicted in FIG. 89. For the GDT CompleteTransmission Indicator 8900, the Object Class is Complete Transmission 8902, the Property is Indicator 8904, the Representation/Association term is Indicator 8906, the Type term is CCT 8908, and the Type Name term is Indicator 8910.

The GDT CompleteTransmissionIndicator 8900 can have the value true or false. True indicates that the objects indicated by the indicator are transmitted in their entirety. False indicates that the objects indicated by the indicator are not transmitted in their entirety.

The GDT CompleteTransmissionIndicator 8900 is used for the business document object or for lists of objects. The GDT CompleteTransmissionIndicator 8900 can be used in various ways. First, it can be used for the leading business object of a message data type (business document object), to display its complete or incomplete transmission. In this example, the GDT CompleteTransmissionIndicator 8900 is an element of the business document object. If it is set to “true,” then a business document object that already exists at the recipient of the message is replaced completely by the transmitted business document object. If it is set to “false,” then those elements of the business document object that already exist at the recipient of the message for which data is transmitted are updated. All elements for which no data is transmitted remain unchanged.

In another example, GDT CompleteTransmissionIndicator 8900 may be used for a list of similar objects, to display the complete or incomplete transmission of the list. In this example, the GDT CompleteTransmissionIndicator 8900 is an element of the object that contains the list and has the name “xListCompleteTransmissionIndicator,” where “x” is the name of the listed objects. If the GDT CompleteTransmissionIndicator 8900 is set to “true,” the list is transmitted in its entirety with all objects. Objects that are not transmitted are implicitly considered to be deleted. Transmitted objects of the list can have an ActionCode, which may be fixed at the value “01” (Create). If the GDT CompleteTransmissionIndicator 8900 is set to “false,” the list is not transmitted in its entirety with all objects. Objects that are not transmitted are considered to be unchanged. New objects or objects to be changed or deleted are transmitted. The action that is to be taken for an object in the list is controlled by the value of the assigned ActionCode, where either the hard or soft semantic may be used exclusively.

A GDT CompleteTransmissionIndicator 8900 that exists in a message type but is not filled is assumed by default to be “true.” This ensures compatibility when enhancing interfaces to include a GDT CompleteTransmissionIndicator 8900. The GDT CompleteTransmissionIndicator 8900 can be used at different hierarchy levels within a message type. In order to ensure compatibility when enhancing interfaces with additional CompleteTransmissionIndicators, higher-level and lower-level CompleteTransmissionIndicators are not interdependent.

The following is one usage example of GDT CompleteTransmissionIndicator 8900:

```
<BusinessTransactionDocumentChangeRequest>
  <BusinessTransactionDocument>
    <ID>4800000123</ID>
    ...
  <ItemListCompleteTransmissionIndicator>false
</ItemListCompleteTransmissionIndicator>
    <Item>
      <ID>10</ID>
      <ActionCode>02</ActionCode>
      ...
  <ScheduleLineListCompleteTransmissionIndicator>true
</ScheduleLineListCompleteTransmissionIndicator>
      <ScheduleLine>
        <ID>1</ID>
        <ActionCode>01</ActionCode>
        ...
      </ScheduleLine>
      <ScheduleLine>
        <ID>3</ID>
        <ActionCode>01</ActionCode>
        ...
      </ScheduleLine>
    </Item>
    <Item>
      <ID>30</ID>
      <ActionCode>02</ActionCode>
      ...
  <ScheduleLineListCompleteTransmissionIndicator>false
</ScheduleLineListCompleteTransmissionIndicator>
      <ScheduleLine>
        <ID>3</ID>
        <ActionCode>03</ActionCode>
      </ScheduleLine>
    </Item>
  </BusinessTransactionDocument>
</BusinessTransactionDocumentChangeRequest>
```

In the usage example above, the message requests a change to the business transaction 4800000123. New or changed items in the business transaction, or items to be deleted, are transmitted in the message (ItemListCompleteTranmissionIndicator=“false”). Item 10 is to be changed (ActionCode=“02”). In item 10, all schedule lines are transmitted (ScheduleLineListCompleteTranmissionIndicator=“true”). The ActionCode is fixed at “01” (Create) in schedule lines 1 and 3 of item 10 because ScheduleLineListCompleteTranmissionIndicator=“true.” Schedule line 2 is deleted implicitly, because it is not transmitted. Item 20 remains unchanged, because it is not transmitted. Item 30 is to be changed (ActionCode=“02”). In item 20, new or changed schedule lines, or schedule lines to be deleted are transmitted (ScheduleLineListCompleteTranmissionIndicator=“false”). Schedule lines 1 and 2 of item 30 remain unchanged, because they are not transmitted. Schedule line 3 of item 30 is deleted (ActionCode=“03”).

The default case for a message is complete transmission and this may be supported by every system. A business process can thus be recreated in the event of errors. To improve performance, support for the complete transmission at the segment level should detailed according to the performance requirements.

Which objects the GDT CompleteTransmissionIndicator 8900 refers to may be recognizable from the context of the interface in which a CompleteTransmissionIndicator is used. The meaning of a complete transmission of an object may be defined.

(ccc) ConsignmentIndicator

The GDT ConsignmentIndicator 9000 indicates whether the transaction form of the consignment is present or not. In an example, "Consignment" is a transaction form in which the vendor stores a material stock at the ordering party at the vendor's expense. The vendor is the owner of the materials until they are withdrawn from the consignment stores. The vendor is notified of the withdrawals at regular time intervals and the withdrawals are then settled accordingly. An example of GDT ConsignmentIndicator 9000 is: <ConsignmentIndicator>true</ConsignmentIndicator>.

The structure of ConsignmentIndicator is depicted in FIG. 90. For the GDT Consignmentindicator 9000, the Property term is Consignment Indicator 9002, the Representation/Association term is Indicator 9004, the Type term is CCT 9006, and the Type Name term is Indicator 9008.

The GDT ConsignmentIndicator 9000 can have the values true or false. True indicates that the transaction form of consignment is present. False indicates that the transaction form of consignment is not present.

(ddd) ContactPerson

A CDT ContactPerson 9100 is a natural person who is the contact person during the execution of business processes. CDT ContactPerson 9100 identifies the contact person and the contact person's address. Identification can occur using an internal ID and using IDs assigned by the parties involved. An ID assigned by a party identifies in the name the role the assigning party plays in the business transaction. Roles include Buyer, Seller, ProductRecipient, Vendor, BillTo, BillFrom and Bidder. An example of CDT ContactPerson 9100 is:

Example 1

PartyIDs

```
<ContactPerson>
    <BuyerID>9874</BuyerID>
    <SellerID>487848</SellerID>
    <Address>...</Address>
</ContactPerson>
Example 2) Internal ID
<ContactPerson>
    <InternalID schemeID="ContactPersonID"
schemeAgencyID="BPL__300">737</InternalID>
    <Address>...</Address>
</ContactPerson>
```

In the above examples, schemeID="ContactPersonID" specifies that the scheme CDT ContactPersonID 9100 was used to identify the party, and schemeAgencyID="BPL 300" specifies that the scheme was assigned by the SAP CMDM system "BPL__300."

The structure of CDT ContactPerson 9100 is depicted in FIG. 91. The CDT ContactPerson 9100 includes elements InternalID 9106, BuyerID 9124, SellerID 9142, ProductRecipientID 9160, VendorID 9178, BillToID 9196, BillFromID 9107A, BidderID 9116A, and Address 9125A. For the CDT ContactPerson 9100, the Object Class is Contact Person 9102 and the Representation/Association term is Details 9104.

For the InternalId 9106, the Category is Element 9108, the Object Class is Contact Person 9110, the Property Qualifier term is Internal 9112, the Property is Identification 9114, the Representation/Association term is Identifier 9116, the Type term is CDT 9118, and the Type Name is ContactPersonInternalID 9120. The Cardinality between the CDT ContactPerson 9100 and the InternalID 9106 is zero or one 9122.

For the BuyerID 9124, the Category is Element 9126, the Object Class is Contact Person 9128, the Property Qualifier term is Buyer 9130, the Property is Identification 9132, the Representation/Association term is Identifier 9134, the Type term is CDT 9136, and the Type Name term is ContactPersonPartyID 9138. The Cardinality between the CDT ContactPerson 9100 and BuyerID 9124 is zero or one 9140.

For the SellerID 9142, the Category is Element 9144, the Object Class is Contact Person 9146, the Property Qualifier term is Seller 9148, the Property is Identification 9150, the Representation/Association term is Identifier 9152, the Type term is CDT 9154, and the Type Name is ContactPersonPartyID 9156. The Cardinality between the CDT ContactPerson 9100 and SellerID 9142 is zero or one 9158.

For the ProductRecipientID 9160, the Category is Element 9162, the Object Class is Contact Person 9164, the Property Qualifier term is Product Recipient 9166, the Property is Identification 9168, the Representation/Association term is Identifier 9170, the Type term is CDT 9172, and the Type Name is ContactPersonPartyID 9174. The Cardinality between the CDT ContactPerson 9100 and ProductRecipientID 9160 is zero or one 9176.

For the VendorID 9178, the Category is Element 9180, the Object Class is Contact Person 9182, the Property Qualifier term is Vendor 9184, the Property is Identification 9186, the Representation/Association term is Identifier 9188, the Type term is CDT 9190, and the Type Name term is ContactPersonPartyID 9192. The Cardinality between the CDT ContactPerson 9100 and VendorID 9178 is zero or one 9194.

For the BillToID 9196, the Category is Element 9198, the Object Class is 9199, the Property Qualifier term is 9101A, the Property is 9102A, the Representation/Association term is Identifier 9103A, the Type term is CDT 9104A, and the Type Name is ContactPersonPartyID 9105A. The Cardinality between the CDT ContactPerson 9100 and BillToID 9196 is zero or one 9106A.

For the BillFromID 9107A, the Category is Element 9108A, the Object Class is Contact Person 9109A, the Property Qualifier term is BillFrom 911A, the Property is Identification 9111A, the Representation/Association term is Identifier 9112A, the Type term is CDT 9113A, and the Type Name term is ContactPersonPartyID 9114A. The Cardinality between the CDT ContactPerson 9100 and BillFromID 9107A is zero or one 9115A.

For the BidderID 9116A, the Category is Element 9117A, the Object Class is Contact Person 9118A, the Property Qualifier term is Bidder 9119A, the Property is Identification 9120A, the Representation/Association term is Identifier 9121A, the Type term is CDT 9122A, and the Type Name term is ContactPersonPartyID 9123A. The Cardinality between the CDT ContactPerson 9100 and BidderID 9116A is zero or one 9124A.

For the Address 9125A, the Category is Element 9126A, the Object Class is Contact Person 9127A, the Property is Address 9128A, the Representation/Association term is Address 9129A, the Type term is AGDT 9130A, and the Type Name term is Address 9131A. The Cardinality between the CDT ContactPerson 9100 and Address 9125A is zero or one 9132A.

InternalID refers to a proprietary identifier for the CDT ContactPerson 9100 that is used when both sender and recipient can access shared master data (extended enterprise). This may be a personnel number. BuyerID refers to an identifier that is used by the BuyerParty for this CDT ContactPerson 9100. SellerID refers to an identifier that is used by the SellerParty for this CDT ContactPerson 9100. ProductRecipientID refers to an identifier that is used by the ProductRecipientParty for this CDT ContactPerson 9100. VendorID refers to an identifier that is used by the VendorParty for this CDT ContactPerson 9100. BillToID refers to an identifier that is used by the BillToParty for this ContactPerson. BillFromID refers to an identifier that is used by the BillFromParty for this ContactPerson. BidderID refers to an identifier that is used by the BidderParty for this party. Address refers to a contact person's address The different IDs of a BusinessTransactionDocumentParty may identify the same CDT ContactPerson 9100. There is no StandardID for a CDT ContactPerson 9100. A contact person can therefore be identified using an internal ID, as well as by an ID assigned by an involved party. Thus, a CDT ContactPerson 9100 may be identified by the InternalID when sender and recipient can access shared master data or by the ContactPersonPartyIDs when sender and recipient are interested in the PartyIDs assigned by the parties involved Of the IDs available to the sender, IDs the recipient is expected to understand may be used in a message.

The address includes the elements of a personal address.

(eee) ContactPersonID

A GDT ContactPersonID 9200 is a unique identifier for a contact person. GDT ContactPersonID 9200 is a natural person who is the contact person during the execution of business processes. GDT-ContactPersonID 9200 identifies the contact person and the contact person's address. An example of GDT ContactPersonID 9200 is:

```
<ContactPersonID schemeID="PartyID"
schemeAgencyID="BPL__300" schemeAgencySchemeAgencyID="ZZZ">
    4711
</ContactPersonID>
```

In the above example, 4711 refers to a contact person in system BPL_300, and ZZZ refers to a proprietary Agency.

The structure of GDT ContactPersonID 9200 is depicted in FIG. 92. The GDT ContactPersonID 9200 includes attributes schemeID 9216, schemeAgencyID 9234, schemeAgencySchemeID 9252 and schemeAgencySchemeAgencyID 9270. For the GDT ContactPersonID 9200, the Object Class is ContactPerson 9202, the Property is Identification 9204, the Representation/Association term is Identifier 9206, the Type term is CCT 9208, the Type Name term is Identifier 9210, the Length is from 1 to 60 9212. The GDT ContactPersonID 9200 may be restricted 9214.

For the schemeID 9216, the Category is Attribute 9218, the Object Class is IdentificationScheme 9220, the Property is Identification is 9222, the Representation/Association term is Identifier 9224, the Type term is xsd 9226, the Type Name term is Token 9228, and the Length is from one to sixty 9230. The Cardinality between the ContactPersonID 9200 and the schemeID 9216 is zero or one 9232.

For the schemeAgencyID 9234, the Category is Attribute A9273, the Object Class is IdentificationSchemeAgency 9238, the Property is Identification 9240, the Representation/Association term is Identifier 9242, the Type term is xsd 9244, the Type Name term is Token 9246, and the Length is from one to sixty 9248. The Cardinality between the ContactPersonID is zero or one 9250.

For the schemeAgencySchemeID 9252, the Category is Attribute A9254, the Object Class is IdentificationSchemeAgency 9256, the Property is Scheme 9258, the Representation/Association term is Identifier 9260, the Type term is xsd 9262, the Type Name term is Token 9264, and the Length is from one to sixty 9266. The Cardinality is zero or one 9268.

For the schemeAgencySchemeAgencyID 9270, the Category is Attribute A9272, the Object Class is IdentificationSchemeAgency 9274, the Property is SchemeAgency 9276, the Representation/Association term is Identifier 9278, the Type term is xsd 9280, the Type Name term is Token 9282, and the Length is three 9284. The Cardinality is zero or one 9286.

Contact persons may be used as contact persons for a party, not for products, and the like. ContactPerson also identifies a contact person for a party. This can take place explicitly within the GDT BusinessTransactionDocumentParty or implicitly in a message. In the latter case, the party for which the contact person is being specified may be clear.

In an SAP MDM example, a contact person is a subtype of a party and can be identified like a party using a GUID or a PartyID.

(fff) ContactPersonInternalID

A CDT ContactPersonInternalID 9300 is a proprietary identifier for a contact person. ContactPerson is a natural person who is the contact person during the execution of business processes. An example of a CDT ContactPersonInternalID 9300 is:

GUID of a contact person:

<ContactPersonInternalID schemeID="PartyGUID"schemeAgencyID="MPL__002">1C743CEC501F6A4D8826C7EC5A8554B9</ContactPersonInt ernalID> In the above example, schemeID="PartyGUID" indicates that the scheme "PartyGUID" was used to identify the contact person, and schemeAgencyID="MPL__002" indicates that the scheme was assigned by the business system "MPL__002."

The following is another example of a CDT ContactPersonInternalID 9300:

Party ID of a contact person:

<ContactPersonInt ernalID schemeID="PartyID" schemeAgencyID="MPL__002">4711</ContactPersonInternalID>

The structure of CDT ContactPersonInternalID 9300 is depicted in FIG. 93. The CDT ContactPersonInternalID 9300 includes attributes schemeID 9318 and schemeAgencyID 9336. For the CDT ContactPersonInternalID 9300, the Object Class is ContactPerson 9302, the Property Qualifier term is Internal 9304, the Property is Identification 9306, the Representation/Association term is Identifier 9308, the Type term is GDT 9310, the Type Name term is ContactPersonID 9312, and the Length is from one to thirty-two 9314. The CDT ContactPersonInternalID 9300 may be restricted 9316.

For the schemeID 9318, the Category is Attribute 9320, the Object Class is IdentificationScheme 9322, the Property is Identification 9324, the Representation/Association term is Identifier 9326, the Type term is xsd 9328, the Type Name term is Token 9330, and the length is from one to sixty 9332. The Cardinality is zero or one 9334.

For the schemeAgencyID 9336, the Category is Attribute 9338, the Object Class is IdentificationSchemeAgency 9340, the Property is Identification 9342, the Representation/Association term is Identifier 9344, the Type term is xsd 9346, the Type Name term is Token 9348, and the Length is from one to sixty 9350. The Cardinality is zero or one 9352.

In an example, the attributes of a ContactPersonInternalID may be filled in as follows in an SAP MDM. Scheme 'PartGUID' identifies a contact person using a Global Unique Identifier. SchemeID 'PartyID' identifies a contact person using an identification number. SchemeAgencyID is a business system in which the identifier was assigned.

The CDT ContactPersonInternalID 9300 represents a projection of the CDT ContactPersonID 9300, in which the attributes 'schemeID' and 'schemeAgencyID' are contained for describing an internally assigned ID. If an attribute is not explicitly assigned in the use of the CDT, it may be determined through the context.

The InternalID is used when both sender and recipient can access shared master data, e.g., during internal communication. In an SAP MDM example, a contact person is a subtype of a party and can be identified like a party using a GUID or a PartyID.

(ggg) ContactPersonPartyID

A CDT ContactPersonPartyID 9400 is an identifier for a contact person and is assigned by a party. ContactPerson is a natural person who is the contact person during the execution of business processes. ContactPerson identifies the contact person and the contact person's address. An example of CDT ContactPersonPartyID 9400 is: <ContactPersonSellerID>4711</ContactPersonSellerID>.

The structure of CDT ContactPersonPartyID 9400 is depicted in FIG. 94. For the CDT ContactPersonPartyID 9400, the Object Class is ContactPerson 9402, the Property Qualifier term is Party 9404, the Property is Identification 9406, the Representation/Association term is Identifier 9408, the Type term is GDT 9410, the Type Name term is ContactPersonID 9412, and the Length is from one to sixty 9414. The CDT ContactPersonPartyID 9400 may be restricted 9416.

The ContactPersonPartyID is the proprietary identifier assigned by a party. The party (in its role) that assigned this identifier may be derived from the context of the message that the ContactPersonPartyID uses.

CDT ContactPersonPartyID 9400 limits the general identifier 'ContactPersonID'. In contrast to 'ContactPersonInternalID', the use of 'ContactPersonPartyID' within ContactPerson is also role-dependent (e.g., as an ID assigned by the Buyer).

The party that assigns the ID is indicated by its role. The name component 'Party' in ContactPersonPartyID is replaced with the corresponding role (e.g., ContactPersonSellerID). SchemeID and schemeVersionID may also be included as attributes if there is a need for differentiating between several schemes.

(hhh) CounterValue

A GDT CounterValue 9500 specifies a value that counts a number that changes in fixed increments. An example of GDT CounterValue 9500 is: <CounterValue>42</CounterValue>.

The structure of GDT CounterValue 9500 is depicted in FIG. 95. For the GDT CounterValue 9500, the Representation/Association Qualifier term is Counter 9502, the Representation/Association term is Value 9504, the Type term is xsd 9506, the Type Name term is nonNegativeInteger 9508, and the Length is from one to nine 9510.

GDT CounterValue 9500 is a qualified basic GDT that is based on the secondary Representation/Association Value of the CCT Numeric and a restriction of xsd:decimal. Non-negative whole numbers less than one billion may be permitted.

GDT CounterValue 9500 may be used to count dunning notices to a debtor, orders in a queue, or telephone calls that have to be billed. GDT CounterValue 9500 can count forwards and backwards. Changes to a CounterValue may be made in steps of +1 or −1. The permitted value range can be restricted depending on how the GDT CounterValue 9500 is used.

While GDT CounterValue 9500 focuses on dynamic changes to numbers, TotalNumberValue describes a static number at a given time or for a given period. The incremental increase in a set by one element at a time, which can be counted using the CounterValue, can generate linear ordering of the elements in the set, which is reflected in the item numbers of the elements (OrdinalNumberValue).

(iii) CountryCode

The GDT CountryCode 9600 is a coded representation of a country defined by either national or administrative/political borders. An example of GDT CountryCode is: <CountryCode>DE</CountryCode>.

The structure of GDT CountryCode 9600 is depicted in FIG. 96. For the GDT CountryCode 9600, the Property is Country 9602, the Representation/Association term is Code 9604, the Type term is CCT 9606, the Type Name term is Code 9608, and the Length is from two to three 9610. The GDT CountryCode 9600 may be restricted 9612.

GDT CountryCode 9600 may be represented using an alphabetical two-character code based on ISO 3166-1. ISO 3166-1 may be the default code list.

GDT CountryCode 9600 is used to identify a country defined by national or administrative/political borders in a physical address, or to identify a country of origin.

(jjj) CreditAgencyReportQueryReasonCode

The GDT CreditAgencyReportQueryReasonCode 9700 is the coded representation of the reason for a query to a credit agency for credit information. An example of GDT CreditAgencyReportQueryReasonCode 9700 is: <CreditAgencyReportQueryReasonCode>01</CreditAgencyReportQueryReasonCode>.

The structure of GDT CreditAgencyReportQueryReasonCode 9700 is depicted in FIG. 97. For the GDT CreditAgencyReportQueryReasonCode 9700, the Object Class is Credit Agency Report Query 9702, the Property is Reason 9704, the Representation/Association term is Code 9706, the Type term is CCT 9708, the Type Name term is Code 9710, and the Length is two 9712.

In an example, the value range of the GDT CreditAgencyReportQueryReasonCode 9700 consists of a proprietary code list. Possible values are 01 and 02. 01 refers to a business initiation and 02 refers to an existing business connection.

(kkk) CreditAgencyReportRetrievalPermissionIndicator

A GDT CreditAgencyReportRetrievalPermissionIndicator 9800 indicates whether a party has consented to have credit information about it obtained. An example of GDT CreditAgencyReportRetrievalPermissionIndicator 9800 is: <CreditAgencyReportRetrievalPernissionIndicator>true</CreditAgencyReportRetrievalPermiss ionIndicator>

The structure of GDT CreditAgencyReportRetrievalPermissionIndicator 9800 is depicted in FIG. 98. For the GDT CreditAgencyReportRetrievalPermissionIndicator 9800, the Object Class is Credit Agency Report 9802, the Property is RetrievalPermission 9804, the Representation/Association term is Indicator 9806, the Type term is CCT 9808, the Type Name term is Indicator 9810.

GDT CreditAgencyReportRetrievalPermissionIndicator 9800 may have the value true or false. True indicates that a party has consented for credit information about it to be obtained. False indicates that a party has not consented for credit information about it to be obtained.

Obtaining credit information from a credit agency such as Dun & Bradstreet or Schufa may be performed, particularly for new business partners or for transactions with larger volumes. To comply with the legal requirements of the country concerned, explicit consent by the business partner may be required. The existence of the CreditAgencyReportRetrievalPermissionIndicator indicates whether this consent has been provided.

(lll) CreditAgencyReportScoring

A GDT CreditAgencyReportScoring 9900 is the rating of a party for credit information using a scorecard. A scorecard is a scheme used by a credit agency for assessing a party using different characteristics. Several individual characteristics are examined for each scorecard, which means that several scorecards may be needed for a comprehensive rating. This results in more scorings. An example of GDT CreditAgencyReportScoring 9900 is:

```
<CreditAgencyReportScoring>
<ScoreCardID>5</ScoreCardID>
<ResultValue>85</ResultValue>
<Description languageCode="EN">ScoreCard for real estate
</Description>
</CreditAgencyReportScoring>.
```

The structure of GDT CreditAgencyReportScoring 9900 is depicted in FIG. 99. The GDT CreditAgencyReportScoring 9900 includes attributes ScoreCardId 9908, ResultValue 9926 and Description 9946. For the GDT CreditAgencyReportScoring 9900, the Object Class is CreditAgencyReport 9902, the Property is Scoring 9904, and the Representation/Association term is Details 9906.

For the ScoreCardID 9908, the Category is Attribute Element 9910, the Object Class is Credit Agency Reporting Scoring 9912, the Property is Score Card Identification 9914, the Representation/Association term is Identifier 9916, the Type term is GDT 9918, the Type Name term is ScoreCardID 9920, and the Length is from one to twenty 9922. The Cardinality is zero or one 9924.

For the ResultValue 9926, the Category is Attribute Element 9928, the Object Class is Credit Agency Report Scoring 9930, the Property is Result 9932, the Representation/Association term is Value 9934, the Type term is GDT 9936, the Type Name term is DecimalValue 9938, and the Length is maximum six predecimal digits with two decimal digits 9940. The Cardinality is one 9942. The GDT CreditAgencyReportScoring 9900 may be restricted 9944.

ScoreCardID identifies the scorecard used by the credit agency. ResultValue is the rating result calculated by the credit agency using the scorecard. Description is the description of scoring. ResultValue is unique in the context of the scorecard. The element ScoreCardID may not be required if this is already determined by the context.

(mmm) CreditCommitmentTypeCode

The GDT CreditCommitmentTypeCode 10000 is the coded representation of the type of a payment obligation (liability). An example of GDT CreditCommitmentTypeCode 10000 is: <CreditCommitmentTypeCode>001</CreditCommitmentTypeCode>.

The structure of GDT CreditCommitmentTypeCode 10000 is depicted in FIG. 100. For the GDT CreditCommitmentTypeCode 10000, the Object Class is Credit Commitment 10002, the Property is Type 10004, the Representation/Association term is Code 10006, the Type term is CCT 10008, the Type Name term is Code 10010, and the Length is three 10012.

The value range for the GDT CreditCommitmentTypeCode 10000 may consist of a proprietary code list. Possible values are 001 through 005. 001 means liability from a sales order, 002 means liability from an accounting open item (receivable from delivery and service), 003 means liability from a special general ledger transaction (down payment, collateral), 004 means liability from a delivery, and 005 means liability from a billing document.

GDT CreditCommitmentTypeCode 10000 may be used to inform central credit management about the type of payment obligation. The GDT CreditCommitmentTypeCode 10000 may be a proprietary code list with fixed predefined values. Changes to the permitted values involve changes to the interface. This code list may correspond to the entries in table UKM_COMM_TYPE in SAP FSCM Credit Management.

(nnn) CreditRatingCode

The GDT CreditRatingCode 10100 is the coded representation of the rating of the creditworthiness of a party. An example of GDT CreditRatingCode 10100 is: <CreditRatingCode listAgencyID="016">5A1</CreditRatingCode>.

The structure of GDT CreditRatingCode 10100 is depicted in FIG. 101. The GDT CreditRatingCode 10100 includes attributes listAgencyID 10116 and listAgencySchemeAgencyID 10134. For the GDT CreditRatingCode 10100, the Object Class is Credit 10102, the Property is Rating 10104, the Representation/Association term is Code 10106, the Type term is CCT 10108, the Type Name term is Code 10110, and the Length is from one to ten 10112. The Cardinality is one 10114.

For the listAgencyID 10116, the Category is Attribute 10118, the Object Class is Code List Agency 10120, the Property is Identification 10122, the Representation/Association term is Identifier 10124, the Type term is xsd 10126, the Type Name term is Token 10128, and the Length is from one to sixty 10130. The Cardinality is zero or one 10132.

For the listAgencySchemeAgencyID 10134, the Category is Attribute 10136, the Object Class is Code List Agency 10138, the Property is Scheme Agency 10140, the Representation/Association term is Identifier 10142, the Type term is xsd 10144, the Type Name term is Token 10146, and the Length is three 10148. The Cardinality is zero or one 10150.

The CreditRatingCode may be a proprietary code list of a credit agency, but may also be a company's credit management code list. The individual values of the code represent a score value, for example, a ranking using German school report card grades (1="very good" through 6="unsatisfactory") or percentage points. However, there are also codes whose meaning is explained separately. Code lists that may be used for CreditRatingCode include, for example, Dun & Bradstreet Rating Code, Schufa, Bürgel, Credireform, and Mutually agreed code lists.

For Dun & Bradstreet Rating Code, the ListAgencyID is 016. For Schufa, the ListAgency ID is 344149856 and the ListAgencySchemeAgencyID is 016. For Bürgel, the ListAgency ID is the DUNS number from Bürgel and the ListAgencySchemeAgencyID is 016. For Creditreform, the ListAgency ID is 325636231 and the ListAgencySchemeAgencyID is 016. For Mutually agreed code lists, the ListAgencyID is ZZZ.

(ooo) CreditRiskClassCode

The GDT CreditRiskClassCode 10200 is the coded representation for the risk of non-payment. An example of GDT CreditRiskClassCode 10200 is: <CreditRiskClassCode listAgencyID="016">A</CreditRiskClassCode>.

The structure of GDT CreditRiskClassCode 10200 is depicted in FIG. 102. The GDT CreditRiskClassCode 10200 includes attributes listAgencyID 10216 and listAgencySchemeAgencyID 10234. For the GDT CreditRiskClassCode 10200, the Object Class is Credit 10202, the Property is RiskClass 10204, the Representation/Association term is Code 10206, the Type term is CCT 10208, the Type Name term is Code 10210, and the Length is ten 10212. The Cardinality is one 10214.

For the listAgencyID 10216, the Category is Attribute 10218, the Object Class is Code List Agency 10220, the Property is Identification 10222, the Representation/Association term is Identifier 10224, the Type term is xsd, the Type Name term is Token 10228, and the Length is from one to sixty 10230. The Cardinality is zero or one 10232.

For the listAgencySchemeAgencyID 10234, the Category is Attribute 10236, the Object Class is Code List Agency 10238, the Property is Scheme Agency 10240, the Representation/Association term is Identifier 10242, the Type term is xsd 10244, the Type Name term is Token 10246, and the Length is three 10248. The Cardinality is zero or one 10250.

The CreditRiskClassCode may be a proprietary code list of a credit agency, but may also be a company's credit management code list. The individual values of the code represent a risk class, for example, "high," "medium," or "low." However, there are also codes whose meaning is explained separately. Codes that may be used for CreditRiskClassCode include, for example, include Dun & Bradstreet Rating Code, Schufa, Bürgel, Credireform, and Mutually agreed code lists.

For Dun & Bradstreet Rating Code, the ListAgencyID is 016. For Schufa, the ListAgency ID is 344149856 and the ListAgencySchemeAgencyID is 016. For Bürgel, the ListAgency ID is the DUNS number from Bürgel and the ListAgencySchemeAgencyID is 016. For Creditreform, the ListAgency ID is 325636231 and the ListAgencySchemeAgencyID is 016. For Mutually agreed code lists, the ListAgencyID is ZZZ.

GDT CreditRiskClassCode 10200 is used to represent the risk of non-payment involved in a business transaction. The risk of non-payment refers to the party involved in the business transaction concerned.

(ppp) CreditSegmentInternalID

A GDT CreditSegmentInternalID 10300 is a proprietary identifier for a credit segment. A credit segment groups a company's business transactions from the perspective of credit assignment and control. An example of GDT CreditSegmentInternalID 10300 is <CreditSegmentInternalID>2000</CreditSegmentInternalID>

The structure of GDT CreditSegmentInternalID 10300 is depicted in FIG. 103. For the GDT Credit Segment Internal ID 10300, the Object Class is Credit Segment 10302, the Property is Internal Identification 10304, the Representation/Association term is Identifier 10306, the Type term is CCT 10308, the Type Name term is Identifier 10310, and the Length is from one to ten 10312. The GDT Credit Segment Internal ID 10300 may be restricted 10314.

In one embodiment, the credit segment ID is assigned by a company's credit manager(s). For this reason, schemeID and schemeAgencyID attributes may not be required.

A company's business transactions may be grouped into a small number of credit segments (from 1 to 5). In credit control, telecommunications companies often distinguish between the product categories such as "fixed network" and "mobile business." Other grouping criteria may be the selling organization (SellerParty) or creditor (CreditorParty).

GDT CreditSegmentInternalID 10300 is used when both sender and recipient can access shared master data.

(qqq) CreditWorthinessChangeReasonCode

The GDT CreditWorthinessChangeReasonCode 10400 is the coded representation of the reason for a change in the creditworthiness of a party. An example of GDT CreditWorthinessChangeReasonCode 10400 is: <CreditWorthinessChangeReasonCode>CL</CreditWorthinessChangeReasonCode>.

The structure of GDT CreditWorthinessChangeReasonCode 10400 is depicted in FIG. 104. For the GDT Credit Worthiness Change Reason Code 10400, the Object Class is Credit Worthiness 10402, the Property is Change Reason 10404, the Representation/Association term is Code 10406, the Type term is CCT 10408, the Type Name term is Code 10410, and the Length is two 10412.

GDT CreditWorthinessChangeReasonCode 10400 may be represented by a proprietary code list. Possible values are 01 through 13. 01 means the creditworthiness in Credit Management was changed. 02 means the validity period of the creditworthiness in Credit Management has expired. 03 means the creditworthiness at a credit agency was changed. 04 means the validity period of the creditworthiness at a credit agency has expired. 05 means the risk class in Credit Management was changed. 06 means the credit limit was changed (manually or automatically). 07 means the validity period of the credit limit has expired. 08 means the credit limit utilization has changed. 09 means the credit limit utilization has fallen below 100%. 10 means the credit limit utilization has exceeded 100%. 11 means the credit representative has requested a change to the credit limit; this change is currently in the approval process. 12 means the rule governing the creditworthiness check that is defined in the master data of a party was changed. 13 means a negative response was received regarding the creditworthiness of a party. Changes to the permitted values require changes to the interface.

(rrr) CreditWorthinessCheckingRuleCode

The GDT CreditWorthinessCheckingRuleCode 10500 is the coded representation of the check procedure to be used to determine creditworthiness. An example of GDT CreditWorthinessCheckingRuleCode 10500 is: <CreditWorthinessCheckingRuleCode>02</CreditWorthinessCheckingRuleCode>.

The structure of GDT CreditWorthinessCheckingRuleCode 10500 is depicted in FIG. 105. For the GDT Credit Worthiness Checking Rule Code 10500, the Object Class is Credit Worthiness 10502, the Property is Checking Rule 10504, the Representation/Association term is Code 10506, the Type term is CCT 10508, the Type Name term is Code 10510, and the Length is two 10512.

The value range of the GDT CreditWorthinessCheckingRuleCode 10500 may comprise a proprietary code list. Possible values are 01 through 04. 01 refers to a procedure for determining the creditworthiness of new business customers. 02 refers to a procedure for determining the creditworthiness of existing business customers. 03 refers to a procedure for determining the creditworthiness of new private customers. 04 refers to a procedure for determining the creditworthiness of existing private customers. Changes to the permitted values involve changes to the interface.

GDT CreditWorthinessCheckingRuleCode 10500 is used, e.g., when querying the creditworthiness of a business partner, to define the procedure for determining the score and the credit limit.

(sss) CreditWorthinessCheckingSeverityCode

The GDT CreditWorthinessCheckingSeverityCode 10600 is the coded representation of the severity of the checking procedure for determining creditworthiness. An example of GDT CreditWorthinessCheckingSeverityCode 10600 is: <CreditWorthinessCheckingSeverityCode>3</CreditWorthinessCheckingSeverityCode>.

The structure of GDT CreditWorthinessCheckingSeverityCode 10600 is depicted in FIG. 106. For the GDT Credit Worthiness Checking Severity Code 10600, the Object Class is Credit Worthiness 10602, the Property is Checking Severity 10604, the Representation/Association term is Code 10606, the Type term is CCT 10608, the Type Name term is Code 10610, and the Length is one 10612.

The value range of the GDT CreditWorthinessCheckingSeverityCode 10600 may comprise a proprietary code list.

Possible values are 1, 2 or 3. 1 refers to checks with low severity. 2 refers to checks with medium severity. 3 refers to checks with high severity. Thus, the following linear order (from low to high severity) applies for the severity of the checking procedure for determining creditworthiness: 1<2<3. Changes to the permitted values may involve changes to the interface.

The GDT CreditWorthinessCheckingSeverityCode 10600 may be used when querying the creditworthiness of a business partner, in order to define the severity of the creditworthiness check. For example, if a high severity check is to be performed for a goods issue, but a low severity check is to be performed for a bid.

(ttt) CreditWorthinessIndicator

A GDT CreditWorthinessIndicator 10700 indicates whether a party is creditworthy or not. An example of GDT CreditWorthinessIndicator 10700 is: <CreditWorthinessIndicator>true</CreditWorthinessIndicator>.

The structure of GDT CreditWorthinessIndicator 10700 is depicted in FIG. 107. For the GDT Credit Worthiness Indictor 10700, the Object Class is Currency 9302, the Property is Indicator 10704, the Representation/Association term is Indicator 10706, the Type term is CCT 10708, and the Type Name term is Indicator 10710.

GDT CreditWorthinessIndicator 10700 may have the values true or false. True indicates that a party is creditworthy. False indicates that a party is not creditworthy.

Prior to the sale, rental, or lease of a product, one may check a business partner's creditworthiness. The GDT CreditWorthinessIndicator 10700 indicates whether or not the business partner is creditworthy.

(uuu) CurrencyCode

The GDT CurrencyCode 10800 is a coded representation of the currency. An example of GDT CurrencyCode 10800 is: <PaymentCurrencyCode>EUR</PaymentCurrencyCode>.

The structure of GDT CurrencyCode 10800 is depicted in FIG. 108. For the GDT Currency Code 10800, the Object Class is Currency 10802, the Property is Code 10804, the Representation/Association term is Code 10806, the Type term is CCT 10808, the Type Name term is Code 10810, and the Length is three 10812. The GDT Currency Code 10800 may be restricted 10814.

GDT CurrencyCode 10800 represents a three-character code according to ISO 4217. GDT Amount contains a currency. However, an additional currency can be specified with GDT CurrencyCode 10800. This may be used, for example, for the specification of an alternative payment currency in the message "Payment Due Notification."

(vvv) DangerousGoods

GDT DangerousGoods 10900 are substances or objects that, due to their properties, present a danger to public safety, to the life and health of people and animals, or to the safety of things. An example of GDT DangerousGoods 10900 is:

```
< DangerousGoods >
    <ClassID>1</ ClassID >
    <SubClassID >3</SubClassID >
</ DangerousGoods >.
```

The structure of DangerousGoods is depicted in FIG. 109. The GDT DangerousGoods 10900 includes elements ID, RegulationsCode, ClassID, and DivisionID. For the GDT Dangerous Goods 10900, the Object Class is Dangerous Goods 10902 and the Representation/Association term is Details 10904.

For the ID 10906, the Category is Element 10908, the Object Class is Dangerous Goods 10910, the Property is Identification 10912, the Representation/Association term is Identifier 10914, the Type term is GDT 10916, the Type Name term is Dangerous Goods ID 10918, the Length is four 10920, and the Cardinality is zero or one 10922.

For the GDT Regulations Code 10924, the Category is Element 10926, the Object Class is Dangerous Goods 10928, the Property is Regulations 10930, the Representation/Association term is Code 10932, the Type term is GDT 10934, the Type Name term is Dangerous Goods Regulation Code 10936, the Length is from one to three 10938 and the Cardinality is zero or one 10940.

For the GDT Class ID 10942, the Category is Element 10944, the Object Class is Dangerous Goods 10946, the Property is Class 10948, the Representation/Association term is Identifier 10950, the Type term is CCT 10952, the Type Name term is Identifier 10954, the Length is from one to three 10956, and the Cardinality is zero or one 10958.

For the GDT Division ID 10960, the Category is Element 10962, the Object Class is Dangerous Goods 10964, the Property is Division 10966, the Representation/Association term is Identifier 10968, the Type term is CCT 10970, the Type Name term is Identifier 10972, the Length is from one to six 10974, and the Cardinality is zero or one 10976.

ID identifies a hazardous material using the United Nations Dangerous Goods (UNDG) Identifier. RegulationsCode is a coded representation of national or international dangerous goods rules or regulations according to the UN/EDIFACT code list 8273 "Dangerous goods regulations code." ClassID identifies a dangerous goods class, for example, class 2 (Gases). DivisionID identifies a breakdown of the dangerous goods class, for example, division 3 (Toxic Gases). The value ranges and the use of elements "ClassID" and "DivisionID" can differ from system to system and may not have a standardized norm.

If the RegulationCode is specified, ClassID may be filled in and, if necessary, DivisionID of this RegulationCode may be filled in. In one embodiment, dangerous goods rules or regulations can be used that have a maximum of a two steps in their classification scheme. The information DangerousGoods may be a requirement for an appropriate and environmentally-friendly handling, transport, and storage of a product, that is or contains a dangerous good.

GDT DangerousGoods 10900 can be used with the GDT DangerousGoodsIndicator 10900 in that the GDT DangerousGoodsIndicator 10900 displays that dangerous goods are contained in a delivery, while the GDT DangerousGoods 10900 provides more detail about the danger posed by a delivery item. "Dangerous Goods" is the usual name for dangerous goods/materials at national and international level. In the USA, however, the term "Hazardous Materials" is also common. The terms "Dangerous Goods" and "Hazardous Materials" and variants of these two are not used to differentiate between the transport of dangerous goods and the storage of dangerous goods.

(www) DangerousGoodsID

A GDT DangerousGoodsID 11000 is the unique identifier for a dangerous good, using the United Nations Dangerous Goods (UNDG) Number. An example of GDT DangerousGoodsID 11000 is: <DangerousGoodsID>2453</DangerousGoodsID>.

The structure of GDT DangerousGoodsID 11000 is depicted in FIG. 110. For the GDT Dangerous Goods ID 11000, the Object Class is Dangerous Goods 11002, the Property is Identification 11004, the Representation/Association term is Identifier 11006, the Type term is CCT 11008, the Type Name term is Identifier 11010 and the Length is four 11012.

(xxx) DangerousGoodsIndicator

A GDT DangerousGoodsIndicator 11100 indicates whether dangerous goods are contained in a combination of products or not. An example of GDT DangerousGoodsIndicator 11100 is: <DangerousGoodsIndicator>true</DangerousGoodsIndicator>.

The structure of GDT DangerousGoodsIndicator 11100 is depicted in FIG. 111. For the GDT Dangerous Goods Indicator 11100, the Object Class is Dangerous Goods 11102, the Property is Indicator 11104, the Representation/Association term is Indicator 11106, the Type term is CCT 11108, the Type Name term is Indicator 11110, the Length is one 11112, and the Cardinality is zero or one 11114.

GDT DangerousGoodsIndicator 11100 may have the values true or false. True indicates that a combination of products contains dangerous goods. False indicates that a combination of products contains no dangerous goods.

If the indicator is set, the stipulations for the corresponding dangerous good are valid for the combination. These stipulations may be determined by analyzing the message using the GDT DangerousGoods 11100.

GDT DangerousGoodsIndicator 11100 may be used with the GDT DangerousGoods in that the GDT DangerousGoodsIndicator 11100 displays that dangerous goods are contained in a combination, and the GDT DangerousGoods provides more detail about the danger posed by a delivery item.

(yyy) DangerousGoodsRegulationsCode

The GDT DangerousGoodsRegulationsCode 11200 is the coded representation of a national or international dangerous goods rules or regulations according to the UN/EDIFACT code list 8273 "Dangerous goods regulations code" An example of GDT DangerousGoodsRegulationsCode 11200 is: <DangerousGoodsRegulationsCode>GVS</DangerousGoodsRegulationsCode>.

The structure of GDT DangerousGoodsRegulationsCode 11200 is depicted in FIG. 112. For the GDT Dangerous Goods Regulation Code 11200, the Object Class is Dangerous Goods 11202, the Property is Regulations 11204, the Representation/Association term is Code 11206, the Type term is CCT 11208, the Type Name is Code 11210 and the Length is from one to three 11212.

In an embodiment, the possible values for GDT DangerousGoodsRegulationsCode 11200 are described in the UN/EDIFACT code list 8273 "Dangerous goods regulations code." These include ADR, ADS, ADT, ADU, AGS, ANR, ARD, CFR, COM, GVE, GVS, ICA, IMD, RGE, RID, UI, and ZZZ.

(zzz) Date

A GDT Date 11300 is the specification of an exact day in the Gregorian calendar. An example of GDT Date 11300 is: <OrderDate>2002-04-19</OrderDate>.

The structure of GDT Date 11300 is depicted in FIG. 113. For the GDT Date 11300, the Property is Date 11302, the Representation/Association term is Date 11304, the Type term is CCT 11306, and the Type Name term is Date 11308.

The GDT Date 11300 uses the W3C built-in data type xsd:date. This is structured according to the extended representation of ISO 8601.

The extended representation of Date is CCYY-MM-DD, for example, 2002-04-19. The extended representation uses the literals CC for century, YY for year, MM for month, and DD for day. There may also be a hyphen between the year, month, and day.

In an embodiment, years are represented by a four-character code and the years 0001 to 9999 are supported. Leading positive or negative signs before the year are not supported. Time zones prefixed with the time-zone-character "Z" may not be supported for the date.

GDT Date 11300 is used to represent points in time or time stamps in which the day may be exact.

(aaaa) DatePeriod

A GDT DatePeriod 11400 is a period that is defined by two points in time. These points in time are expressed in calendar days. This time period is determined by a start time and an end time, a start time with a duration, or a duration with an end time. An example of GDT DatePeriod 11400 is:

```
<HolidayPeriod>
    <StartDate>2003-07-01</StartDate>
    <EndDate>2003-10-25</EndDate>
</HolidayPeriod>.
```

The structure of GDT DatePeriod 11400 is depicted in FIG. 114. The GDT DatePeriod 11400 includes elements StartDate, EndDate, and Duration. For the GDT Date Period 11400, the Object Class is Date Period 11402 and the Property is Details 11404.

For the GDT Start Date 11406, the Category is Element 11408, the Object Class is Time Period 11410, the Property is Start Date 11412, the Representation/Association term is Date 11414, the Type term is GDT 11416, the Type Name term is Date 11418, and the Cardinality is zero or one 11420.

For the GDT End Date 11422, the Category is Element 11424, the Object Class is Date Period 11426, the Property is End Date 11428, the Representation/Association term is Date 11430, the Type term is GDT 11432, the Type Name term is Date 11434, and the Cardinality is zero or one 11436.

For the GDT Duration 11438, the Category is Element 11440, the Object Class is Date Period 11442, the Property is Duration 11444, the Representation/Association term is Duration 11446, the Type term is GDT 11448, the Type Name term is Duration 11450, and the Cardinality is zero or one 11452.

GDT DatePeriod 11400 is an aggregation and includes the sub-elements StartDate, EndDate, and Duration. StartDate represents the start date in the time unit based on the extended representation of ISO 8601. EndDate represents the end date in the time unit based on the extended representation of ISO 8601. Duration represents the relative duration based on convention ISO 8601. The following conventions may be used: years (nY), months (nM) and days (nD), hours (nH), minutes (nM) and seconds (n.nnnS). One example of Duration is <Duration>P1H7M9T</Duration>

The sub-elements in GDT DatePeriod 11400 are optional. However, the representation can include one of the following tuples: StartDate and EndDate, StartDate and Duration, or EndDate and Duration. EndDate may be greater than or equal to the StartDate. For example, <StartDate>2003-07-01</StartDate>, <EndDate>2003-10-35</EndDate>.

Period can be used to specify a time period that can be expressed using two predefined dates or one date and one relative duration. This period may be the start and end dates of a holiday or the start date and duration in days of a temporary work contract.

The time of day is not specified in GDT DatePeriod 11400. For this reason, two business partners may agree unambiguously when a date period begins and when it ends. For example, it can begin at 00:00:00 and end at 23:59:59. The term "Date" in the "Object Class" of the CDT is redundant. Therefore, it comprises the term "Period." This is because the term "Date" is given by the "Property" of the sub-elements. As a result, the semantic of this CDT is unique.

(bbbb) DateTime

A GDT DateTime 11500 is the specification of an accurate-to-the-second time stamp of a calendar day. An example of GDT DateTime 11500 is: <ConstructionDateTime>2002-04-19T15:30:00+01:00</ConstructionDateTime>.

The structure of GDT DateTime 11500 is depicted in FIG. 115. For GDT Date Time 11500, the Property is Date Time 11502, the Representation/Association term is Date Time 11504, the Type term is CCT 11506, the Type Name term is Date Time 11508.

The GDT DateTime 11500 core component may be based on the W3C "built-in datatype" xsd:dateTime. This is structured according to the extended representation of ISO 8601. The extended representation is CCYY-MM-DDThh:mm:ss(.sss)Z or CCYY-MM-DDThh:mm:ss(.sss)(+/−)hh:mm (for example, 2002-04-19T15:30:00Z or 2004-04-19T10:30:00+05:00, respectively).

The extended representation uses the literals CC for century (00-99), YY for year (00-99), MM for month (01-12), and DD for day (01-28 in month 02; 01-29 in month 02 when the year is a leap year; 01-30 for months 04, 06, 09, and 11; 01-31 for months 01, 03, 05, 07, 08, 10, and 12), hh for hours (00-23), mm for minutes (00-59), ss for seconds (00-59), and .sss for fractions of a second (up to three decimal places after the decimal). In addition, there may be a hyphen between the year, month, and day. A separator "T" may be used between the date and time. Z specifies when the time represented is also UTC time. Also, +hh:mm specifies when the represented time is a local time that is ahead of UTC time, and −hh:mm specifies when the represented time is a local time that is behind UTC time.

The time stamp can be specified without the additional specifications (Z, +hh:mm, −hh:mm) relating to the coordinated world time (UTC time). In an embodiment, this time stamp is not converted to the respective local time and is therefore for information purposes.

The following value ranges are defined for DateTime: Day represents all dates from the Gregorian calendar, Time represents exactly 24 hours (0-23), Minutes represents exactly 60 minutes (0-59), Seconds represents exactly 60 seconds (0-59), and Time may be expressed in UTC.

Years are represented by a four-character code (0001 to 9999). In an embodiment, leading positive or negative signs before the year are not supported. According to these constraints, the regular expression restricts the character pattern of date and time to the following:

```
[0-9]{4}-[0-9]{2}-[0-9]{2}T[0-9]{2}[0-9]{2}:[0-9]
    {2}[0-9]{2}:[0-9]{2}[0-9]{2}(.[0-9]*)?([Z±][0-
    9]{2}[0-9]{2}:[0-9]{2}[0-9]{2})?
```

Nevertheless, meaningless data such as 0000-00-00T00:00Z can be represented by this regular expression. However, explicit restrictions mean that this is not possible for the built-in data type "xsd:dateTime".

GDT DateTime 11500 is used for exact time stamps that contain the day and time. For example, creation date/time, receipt date/time, processing date/time, delivery date/time, expiry date/time, and the like.

The primary representation term for the CCT "DateTime" is DateTime. Additional secondary representation terms are Date, which represents a calendar value for a single day and has a built-in data type xsd:date and a length of 10, and Time, which represents a to-the-second time value and has a built-in data type xsd:time.

In the case of a business transaction, DateTime may arise in a specific business role. In the element name, these roles are placed in front of the term "DateTime", whereby additional context-specific qualifiers may also be added. For example, PlannedArrivalDateTime is a date/time of a planned arrival.

Times that are relevant in logistics execution are described in their logistical sequence in the table below. Further roles of DateTime are also described in alphabetical order.

| DateTime Role | English Name | Definition |
|---|---|---|
| PositioningDateTime | Material availability date/time | Date/time at which goods are made available for packing and picking. |
| IssueDateTime | Issue date/time | Date/time at which something is issued. |
| PickingDateTime | Picking date/time | Date/time at which goods are picked. |
| PackingDateTime | Packing date/time | Date/time at which goods are packed. |
| CarrierHandoverDateTime | Date/time of handover to the carrier | Date/time at which something is handed over to the carrier. |
| PickupDateTime | Pickup date/time | Date/time at which goods are picked up. |
| LoadingDateTime | Loading date/time | Date/time at which goods are loaded. |
| YardDepartureDateTime | Date/time when something leaves the yard | Date/time of departure of a closed area outside the warehouse in which vehicles are loaded and unloaded. |
| ArrivalDateTime | Arrival date/time | Date/time at which something arrives. |
| DeliveryDateTime | Delivery date/time | Date/time at which a delivery takes place. |
| ReceiptDateTime | Receipt date/time | Date/time at which something is received. |
| YardArrivalDateTime | Date/time of arrival in the yard | Date/time of arrival in a closed area outside the warehouse in which vehicles are loaded and unloaded. |
| UnloadingDateTime | Unloading date/time | Date/time at which goods are unloaded. |
| UnpackingDateTime | Unpacking date/time | Date/time at which goods are unpacked. |
| PutawayDateTime | Putaway date/time | Date/time at which goods are put away. |
| AvailabilityDateTime | Availability date/time | Date/time at which something is available. |
| AdvertisementDateTime | Advertisement date/time | Date/time at which something is advertised. |

-continued

| DateTime Role | English Name | Definition |
|---|---|---|
| ChangeDateTime | Change date/time | Date/time at which something is changed. |
| CreationDateTime | Creation date/time | Date/time at which something is created. |
| ExecutionDateTime | Execution date/time | Date/time at which something is executed. |
| OrderingDateTime | Ordering date/time | Date/time at which an order is expected or takes place. |
| PlannedDateTime | Planned date/time | Date/time for which something is planned. |
| ValidityDateTime | Validity date/time | Date/time at which something is valid. |

The coordinated world time or coordinated universal time (UTC) is the standardized basis for time specifications that are used internationally. It is based on solar time and is an extremely constant time unit. The mean solar time at the Greenwich meridian can be taken as an approximate guide value for UTC. UTC replaced Greenwich Mean Time (GMT) in 1972 as it was more accurate.

The Gregorian calendar is used predominantly in the western world today and is an approximation of the complicated calculation of a tropical year. The length of a mean tropical year is 365.2422 days. The Gregorian calendar determines the rules for leap years and was introduced in 1582.

(cccc) DateTimePeriod

A GDT DateTimePeriod 11600 is a period that is defined by two points in time. These points in time are expressed by time stamps, accurate to the second, together with calendar days. The time period is determined by a start time and an end time, a start time with a duration, or a duration with an end time. An example of GDT DateTimePeriod 11600 is:

```
<ContractValidityPeriod>
    <StartDateTime>2003-03-01T12:00:00</StartDateTime>
    <EndDateTime>2005-06-15T12:00:00</EndDateTime>
</ContractValidityPeriod>.
```

The structure of GDT DateTimePeriod 11600 is depicted in FIG. 116. The GDT DateTimePeriod 11600 includes elements StartDateTime 11606, EndDateTime 11622, and Duration 11638. For GDT Date Time Period 11600, the Object Class is Date Time Period 11602, and the Property is Details 11604.

For GDT Start Date Time 11606, the Category is Element 11608, the Object Class is Date Time Period 11610, the Property term is Start Date Time 11612, the Representation/Association term is Date Time 11614, the Type term is GDT 11616, the Type Name term is Date Time 11618, and the Cardinality is zero or one 11620.

For GDT End Date Time 11622, the Category is Element 11624, the Object Class is Date Time Period 11626, the Property term is End Date Time 11628, the Representation/Association term is Date Time 11630, the Type term is GDT 11632, the Type Name term is Date Time 11634, and the Cardinality is zero or one 11636.

For GDT Duration 11638, the Category is Element 11640, the Object Class is Date Time Period 11642, the Property term is Duration 11644, the Representation/Association term is Duration 11646, the Type term is GDT 11648, the Type Name term is Duration 11650, and the Cardinality is zero or one 11652.

GDT DateTimePeriod 11600 is an aggregation and includes the sub-elements StartDateTime, EndDateTime, and Duration. StartDateTime represents the accurate-to-the-second start time on a calendar day based on the extended representation ISO 8601. EndDateTime represents the accurate-to-the-second end time on a calendar day based on the extended representation ISO 8601.

Duration represents the relative duration based on convention ISO 8601. Other representation conventions for year (nY), month (nM), and day (nD) can be used. One example of duration is <Duration>P1H7M9T12H10M13.3S</Duration>.

The sub-elements in GDT DateTimePeriod 11600 are optional. However, the representation can include one of the following date sets: StartDateTime and EndDateTime, StartDateTime and Duration, and EndDateTime and Duration.

The time stamp (EndDateTime) may be greater than or equal to the start time stamp (StartDateTime) (both accurate to the second). For example, <StartDateTime>2003-03-01T12:00:00</StartDateTime>, <EndDateTime>2005-06-15T18:30:00</EndDateTime> or <StartDateTime>2003-03-01T12:00:00</StartDateTime>, <EndDateTime>2005-03-01T12:00:00</EndDateTime>.

Period can be used to specify a time period and can be expressed using two time stamps (both accurate to the second) or one accurate-to-the-second time stamp and one relative duration. This period might be the validity of a contract, which is expressed by a start and end time.

In the case of a business transaction, DateTimePeriod arises in a specific business role. In the element name, these roles are placed in front of the term Period, whereby additional context-specific qualifiers could also be added, for example, PlannedArrivalPeriod is a period of a planned arrival.

The logistical sequence or the overlapping time periods, which may be relevant in logistical execution, are described in this sequence in the table below. Further roles of DateTimePeriod are then shown in alphabetical order.

| Period Role | English Name | Definition |
|---|---|---|
| TransportPlanningPeriod | Transportation planning period | Period in which transportation planning takes place. |
| PositioningPeriod | Material availability period | Period in which goods are made available for packing and picking. |
| IssuePeriod | Issue period | Period in which something is issued. |
| PickingPeriod | Picking period | Period in which goods are picked. |

-continued

| Period Role | English Name | Definition |
|---|---|---|
| PackingPeriod | Packing period | Period in which goods are packed. |
| CarrierHandoverPeriod | Period for handover to the carrier | Period in which something is handed over to the carrier. |
| PickupPeriod | Pickup period | Period in which goods are picked up. |
| LoadingPeriod | Loading period | Period in which goods are loaded. |
| YardDeparturePeriod | Period when something leaves the yard | Period of departure of a closed area outside the warehouse in which vehicles are loaded and unloaded. |
| ShippingPeriod | Shipping period | Period in which goods are shipped (between ship-from location, ship-to location, and possibly transshipment location). |
| ArrivalPeriod | Arrival period | Period in which something arrives. |
| DeliveryPeriod | Delivery period | Period in which a delivery takes place. |
| ReceiptPeriod | Receipt period | Period in which something is received. |
| YardArrivalPeriod | Period of arrival in the yard | Period of arrival in a closed area outside the warehouse in which vehicles are loaded and unloaded. |
| UnloadingPeriod | Unloading period | Period in which goods are unloaded. |
| UnpackingPeriod | Unpacking period | Period in which goods are unpacked. |
| PutawayPeriod | Putaway period | Period in which goods are put away. |
| AvailabilityPeriod | Availability period | Period in which something is available. |
| AdvertisementPeriod | Advertisement period | Period in which something is advertised. |
| ExecutionPeriod | Execution period | Period in which something is executed. |
| OrderingPeriod | Ordering period | Period in which an order is expected/takes place. |
| PlannedPeriod | Planned period | Period for which something is planned. |
| PlanningPeriod | Planning period | Period in which something is planned. |
| ValidityPeriod | Validity period | Period in which something is valid. |

TransportPlanningPeriod can include PositioningPeriod, PickingPeriod, and PackingPeriod. IssuePeriod can include PickingPeriod, PackingPeriod, LoadingPeriod, and YardDeparturePeriod. PickupPeriod can include LoadingPeriod and YardDeparturePeriod. CarrierHandoverPeriod can include LoadingPeriod, YardDeparturePeriod, and ShippingPeriod. DeliveryPeriod, ArrivalPeriod, and ReceiptPeriod can include YardArrivalPeriod, UnloadingPeriod, UnpackingPeriod, and PutawayPeriod.

The term DateTime in Object Class Term may be obsolete in GDTs. Therefore, this term comprises Period. This is because the term DateTime is given by the sub-elements using Property Term. As a result, the semantic of these GDTs may be unique.

(dddd) DecimalValue

A GDT DecimalValue 11700 is a numeric value represented as a decimal. An example of GDT DecimalValue 11700 is:

```
<PropertyValue>
    <DecimalValue>3.14159</DecimalValue>
</PropertyValue>.
```

The structure of GDT DecimalValue 11700 is depicted in FIG. 117. For the GDT Decimal Value 11700, the Representation/Association Qualifier term is Decimal 11702, the Representation/Association term is Value 11704, the Type term is xsd 11706, and the Type Name term is Decimal 11708.

GDT DecimalValue 11700 is a qualified basic GDT that is based on the secondary Representation/Association Value of the CCT Numeric. GDT DecimalValue 11700 is used if the reference to the decimal representation of the element based on GDT DecimalValue 11700 is both meaningful and desired from a semantic perspective. This is the case with mathematical/scientific and technical numeric values. The Decimal qualifier then forms part of the relevant element name.

Numeric business values may not be defined using their decimal representation; rather, this representation is derived implicitly from the semantics of the numeric value. Examples of this include Price or ExchangeRate. In this case, GDT DecimalValue 11700 is not used.

(eeee) DeletedIndicator

A GDT DeletedIndicator 11800 indicates whether an object has been logically deleted or not. An example of GDT DeletedIndicator 11800 is: <DeletedIndicator>false</DeletedIndicator>.

The structure of GDT DeletedIndicator 11800 is depicted in FIG. 118. For the GDT Deleted Indicator 11800, the Property is Deleted Indicator 11802, the Representation/Association term is Indicator 11804, the Type term is CCT 11806, and the Type Name term is Indicator 11808.

The GDT DeletedIndicator 11800 can have the values true or false. True indicates that the object has been logically deleted. False indicates that the object has not been logically deleted.

In the context of an interface, there may be a description of which object the GDT DeletedIndicator 11800 refers to, its business meaning, and whether a set DeletedIndicator can be canceled in a subsequent message.

(ffff) DeliveryScheduleTypeCode

The GDT DeliveryScheduleTypeCode 11900 is a coded representation of the type of a delivery schedule. This type describes the (business) character of a delivery schedule and defines its fundamental properties. An example of GDT DeliveryScheduleTypeCode 11900 is:

```
<DeliverySchedule>
    <ID>4711</ID>
    <TypeCode>2</TypeCode>
    ...
</DeliverySchedule>.
```

The structure of GDT DeliveryScheduleTypeCode 11900 is depicted in FIG. 119. For GDT Delivery Schedule Type Code 11900, the Object Class is Delivery Schedule 11902, the Property is Type 11904, the Representation/Association term is Code 11906, the Type term is CCT 11908, the Type Name term is Code 11910, and the Length is one 11912.

The value ranges of the GDT DeliveryScheduleTypeCode 11900 may consist of a proprietary code list. Possible values are 1 or 2. 1 refers to a delivery schedule for the short-, medium- and/or long-term area on the basis of daily, weekly and/or monthly time specifications. 2 refers to a delivery schedule for just-in-time deliveries on the basis of time specifications throughout the day, if necessary, in terms of minutes.

The GDT DeliveryScheduleTypeCode 11900 is used within the scheduling-agreement-based release ordering to communicate the business character of a delivery schedule to a vendor. It may be used, for example, in the automotive industry.

(gggg) DeliveryTerms

The GDT DeliveryTerms 12000 summarizes conditions and agreements formulated at the time of the order that apply for the execution of the delivery and transport of ordered goods and the associated services and activities. An example of GDT DeliveryTerms 12000 is:

```
<DeliveryTerms>
    <DeliveryItemGroupID>123</DeliveryItemGroupID>
    <DeliveryPriorityCode>1</DeliveryPriorityCode>
    <Incoterms>
        <ClassificationCode listID=“Incoterms” listVersionID=“2000”
listAgencyID=“4”> FOB
        </ClassificationCode >
        <TransferLocationName langCode=“de”> Hamburg
</TransferLocationName>
    </Incoterms>
    <PartialDelivery>
        <MaximalNumber>9</MaximalNumber>
    </PartialDelivery>
    <QuantityTolerance>
        <OverPercent>33.0</OverPercent>
        <UnderPercent>1.0</UnderPercent>
    </ QuantityTolerance>
    < MaximumLeadTimeDuration> P2M5D </ MaximumLeadTimeDuration>
    <Transport>
        <ServiceLevelCode listID=“DE 4219” listVersionID=“D.02B”
listAgencyID=“6”> 1 </ ServiceLevelCode>
        <ModeCode listID=“DE 8067” listVersionID=“D.02B”
listAgencyID=“6”> 1 </ ModeCode>
        <MeansDescriptionCode listID=“DE 8179” listVersionID=“D.02B”
listAgencyID=“6”> 4
        </MeansDescriptionCode>
    <Transport>
    <Description langCode=“de”>
        This is a German description text.
    </Description>
</DeliveryTerms >.
```

In the above example, ListAgencyID=“4” describes “ICC/WBO”, ListAgencyID=“6” describes “UN/ECE”, listVersionID=“D.02B” describes UN/EDIFACT standard directory Year 2002, Version B, listID=“DE 4219” describes UN/EDIFACT “Transport Service Priority Code”, listID=“DE 8067” describes UN/EDIFACT “Transport Mode Name Code”, listID=“DE 8179” describes UN/EDIFACT “Transport Means Description Code”, and MaximumLeadTimeDuration=P2M5D describes a duration of 2 months 5 days.

The structure of GDT DeliveryTerms 12000 is depicted in FIG. 120. For GDT Delivery Terms 12000, the Object Class is Delivery Terms 12002 and the Representation/Association term is Details 12004.

For GDT Delivery Item Group ID 12006, the Category is Element 12008, the Object Class is Delivery Terms 12010, the Property is Order Item Group Identification 12012, the Representation/Association term is Identifier 12014, the Type term is GDT 12012, the Type Name term is Business Transaction Document Item Group ID 12014, and the Cardinality is zero or one 12016.

For GDT Delivery Priority Code 12018, the Category is Element 12020, the Object Class is Delivery Terms 12022, the Property is Delivery Priority Code 12024, the Representation/Association term is Code 12026, the Type term is GDT 12028, the Type Name term is Business Transaction Priority Code 12030 and the Cardinality is zero or one 12032.

For GDT Incoterms 12034, the Category is Element 12036, the Object Class is Delivery Terms 12038, the Property is Incoterms 12042, the Representation/Association term is Incoterms 12042, the Type term is GDT 12044, the Type Name term is Incoterms 12046 and the Cardinality is zero or one 12048.

For GDT Partial Delivery 12050, the Category is Element 12052, the Object Class is Delivery Terms 12054, the Property is Partial Delivery 12056, the Representation/Association term is Partial Delivery 12058, the Type term is GDT 12060, the Type Name term is Partial Delivery 12062, and the Cardinality is zero or one 12064.

For GDT Quantity Tolerance 12066, the Category is Element 12068, the Object Class is Delivery Terms 12070, the Property is Quantity Tolerance 12072, the Representation/Association term is Quantity Tolerance 12074, the Type term is GDT 12076, the Type Name term is Quantity Tolerance 12078, and the Cardinality is zero or one 12080.

For GDT Maximum Lead Time Duration 12082, the Category is Element 12084, the Object Class is Delivery Terms 12086, the Property is Maximum Lead Time 12088, the Representation/Association term is Duration 12090, the Type term is GDT 12092, the Type Name term is Duration 12094, and the Cardinality is zero or one 12096.

For GDT Transport 12098, the Category is Element 12099, the Object Class is Delivery Terms 12001A, the Property is Transport 12002A, the Representation/Association term is Details 12003A, and the Cardinality is zero or one 12004A.

For GDT Service Level Code 12005A, the Category is Element 12006A, the Object Class is Transport 12007A, the Property is Service Level Code 12008A, the Representation/Association term is Code 12009A, the Type term is GDT 12010A, the Type Name term is Transport Service Level Code 12011A, and the Cardinality is zero or one 12012A.

For GDT Mode Code 12013A, the Category is Element 12014A, the Object Class is Transport 12015A, the Property is Mode Code 12016A, the Representation/Association term is Code 12017A, the Type term is GDT 12018A, the Type Name term is Transport Mode Code 12019A, and the Cardinality is zero or one 12020A.

For GDT Means Description Code 12021A, the Category is Element 12022A, the Object Class is Transport 12023A, the Property is Means Description Code 12024A, the Representation/Association term is Code 12025A, the Type term is GDT 12026A, the Type Name term is Transport Means Description Code 12027A, and the Cardinality is zero or one 12028A.

For GDT Description 12029A, the Category is Element 12030A, the Object Class is Delivery Terms 12031A, the Property is Description 12032A, the Representation/Association term is Description 12033A, the Type term is GDT 12034A, the Type Name term is Description 12035A, and the Cardinality is zero or one 12036A.

DeliveryItemGroupID is a unique identifier for a group of items to be delivered together. DeliveryPriorityCode is a priority/urgency of the delivery/delivery item according to the requirements of the buyer. Incoterms is a standard contract formula for the terms of delivery. PartialDelivery is the maximum number of partial deliveries that may/can be carried out to deliver the ordered quantity of an item. QuantityTolerance is the tolerated difference between a requested quantity and an actual quantity.

MaximumLeadTimeDuration is the maximum lead time from the time of the order to the receipt of the delivery. This duration can be specified in a contract award or can be agreed upon in a supply contract and defines the binding basis for calculating the latest possible received delivery date for a given order date.

Transport: ServiceLevelCode is in terms of delivery of goods, agreed/defined services concerning the speed of the delivery. Transport: ModeCode describes how the delivery is to be made and the transportation mode to be used for the delivery, but may not define a specific route or means of transport. Transport: MeansDescriptionCode is the means of transport category to be used to move goods or persons. Description is the natural readable text for providing additional information about a delivery/delivery item.

GDT DeliveryTerms 12000 contain detailed information on the agreed delivery conditions (Incoterms), delivery modalities (accepted number of partial deliveries, delivery priority, grouping requests for deliveries, tolerances for quantity deviations) and transport modalities (such as shipping/transport type and means of transport to be used). Moreover, additional information can be specified as freeform text. Specifying an element of the structure may be optional.

Using the information in GDT DeliveryTerms 12000, the involved business partners (buyer and seller) agree on outline conditions for purchase orders regarding the delivery and transportation of the ordered products/goods. They determine and influence the flow of the subsequent logistical processes.

GDT DeliveryTerms 12000 are used at header and item level. A specification at item level overwrites the corresponding specification at header level.

(hhhh) Description

A GDT Description 12100 is natural-language text. An example of GDT Description 12100 is:

<OrderDescription langCode="en">

A character string with a specified language. </OrderDescription>.

The structure of GDT Description 12100 is depicted in FIG. 121. For GDT Description 12100, the Object Class is Description 12102, the Representation/Association term is Text 12104, the Type term is CCT 12106, the Type Name term is Text 12108. The GDT Description 12100 may be restricted 12110.

GDT Description 12100 contains an attribute "languagecode" for determining the appropriate language of the element content. The language code is based on RFC 3066. For GDT Language Code 12112, the Category is A 12114, the Object Class is Description 12116, the Property is Language Code 12118, the Representation/Association term is Code 12120, the Type term is xsd 12122, the Type Name term is Language 12124, and the Cardinality is one 12126.

GDT Description 12100 may be used for handling information, readable additional information on the structured information, or descriptions of services and products.

The character length of GDT Description 12100 may not defined and would therefore be system-dependent. In an embodiment, GDT Description 12100 may not be used for transmitting proprietary control information, coded and mutually agreed on values, detailed descriptions of values that could otherwise be represented as coded values or identifiers, or numerical values.

(iiii) DigitNumberValue

A GDT DigitNumberValue 12200 is the number of digits used to represent a real value or whole number. An example of GDT DigitNumberValue 12200 is: <DigitNumberValue>7</DigitNumberValue>.

The structure of GDT DigitNumberValue 12200 is depicted in FIG. 122. For GDT Digit Number Value 12200, the Representation/Association Qualifier term is Digit Number 12202, the Representation/Association term is Value 12204, the Type term is xsd 12206, the Type Name term is non Negative Integer 12208, and the Length is from one to two 12210.

GDT DigitNumberValue 12200 is a qualified basic GDT based on the secondary Representation/Association Value of the CCT Numeric and a restriction of xsd:decimal. Nonnegative whole numbers less than one hundred may be permitted.

GDT DigitNumberValue 12200 may be used to describe the format for representing decimal values (e.g., total number of digits, number of decimal places) or floating point numbers (e.g., mantissa length).

(jjjj) DirectMaterialIndicator

A GDT DirectMaterialIndicator 12300 indicates whether a material is used as a direct material in the context of a process or not. A direct material is a product of the type "material" that is used directly in the production of products and that affects the value of the finished product in terms of manufacturing costs. An example of DirectMaterialIndicator is: <DirectMaterialIndicator>true</DirectMaterialIndicator>.

The structure of GDT DirectMaterialIndicator 12300 is depicted in FIG. 123. For GDT Direct Material Indicator 12300, the Property is Direct Material Indicator 12302, the Representation/Association term is Indicator 12304, the Type term is CCT 12306 and the Type Name term is Indicator 12308.

The GDT DirectMaterialIndicator 12300 can have the values true or false. True indicates that a material is used as a direct material in the context of a process. False indicates that a material is not used as a direct material in the context of a process. The GDT DirectMaterialIndicator 12300 is to be used for products of type "material." The GDT DirectMaterialIndicator 12300 may be used to indicate whether a material or material type listed in a purchase order item is used as a direct material in the context of a process. In an embodiment, the DirectMaterialIndicator is not an attribute of a material. A material can be treated as a direct material in some processes and not in others.

The context to which the DirectMaterialIndicator refers may be identified from the usage of the GDT.

(kkkk) DunningCounterValue

A GDT DunningCounterValue 12400 is the number of dunning notices sent. An example of GDT DunningCounterValue 12400 is: <DunningCounterValue>2</DunningCounterValue>.

The structure of GDT DunningCounterValue 12400 is depicted in FIG. 124. For GDT Dunning Counter Value 12400, the Object Class is Dunning 12402, the Property is Counter 12404, the Representation/Association term is Value 12406, the Type term is GDT 12408 and the Type Name term is Counter Value 12410.

In an embodiment, non-negative, whole number values are permitted for GDT DunningCounterValue 12400.

GDT DunningCounterValue 12400 specifies the number of dunning notices that have been sent to one or more business partners in a specified period with regard to one or more receivables. In a company, for example, this information is sent from Current Account Accounting to Credit Management.

Several dunning notices can exist for a receivable. These dunning notices are also grouped by dunning level (DunningLevelValue). However, the dunning level does not have to increase automatically each time a dunning notice is sent.

(llll) DunningLevelValue

A GDT DunningLevelValue 12500 is the level of intensity with which a party is urged to pay existing receivables. An example of GDT DunningLevelValue 12500 is: <DunningLevelValue>4</DunningLevelValue>.

The structure of GDT DunningLevelValue 12500 is depicted in FIG. 125. For GDT Dunning Level Value 12500, the Object Class is Dunning 12502, the Property is Level 12504, the Representation/Association term is Value 12506, the Type term is CCT 12508, the Type Name term is Numeric 12510, and the Length is one 12512.

Non-negative, whole number values from 0 to a maximum value may be permitted for GDT DunningLevelValue 12500. Also, the maximum value may not exceed 9. For the dunning level, the following linear order applies: 0<1<2< . . . < maximum value.

The GDT DunningLevelValue 12500 conveys the relative intensity of a dunning notice based on a linear integer scale between zero and a specified maximum value.

Dunning is a process for contacting customers to collect unpaid bills. It generally starts at the first level with a payment reminder and progresses to dunning notices and even threats as payments become more overdue. Overall, dunning levels are first regulated and prescribed by country-specific laws. Within the scope of the statutory regulations, however, a dunning company can also define several additional dunning levels that differ in the form of the dunning notice, e.g., a friendly payment reminder at level 1 and a more abrupt payment reminder at level 2.

The GDT DunningLevelValue 12500 may not define a DunningLevelCode that is then used to define the semantics of individual dunning levels. Since these semantics can differ from country to country and company to company, a DunningLevelCode can be defined using additional attributes such as schemeAgencyID. In contrast, the use of the GDT DunningLevelValue 12500 presupposes that the semantic of a conveyed dunning level is either known to the sender and recipient or is not relevant in the given context.

(mmmm) Duration

A GDT Duration 12600 is a period of time of a particular length without a fixed start or end time. This period of time is expressed in years, months, days, hours, minutes, seconds, and fractions of a second. An example of GDT Duration 12600 is: <TravelDuration>PT23H12M</TravelDuration>.

The structure of GDT Duration 12600 is depicted in FIG. 126. For GDT Duration 12600, the Property is Duration 12602, the Representation/Association term is Date Time 12604, the Type term is xsd 12606, and the Type Name term is Duration 12608.

GDT Duration 12600 is based on the "built-in data type" of W3C xsd:duration. This is structured according to the extended representation of ISO 8601. The representation of GDT Duration 12600 is PnYnMnDTnHnMnS, for example, P12Y12M2DT4H12M40S. The representation uses the literals P for the duration and may precede every duration value, nY for duration in years, nM for the duration in months, nD for the duration in days, T for the time period in hours, minutes, and seconds. nH for the duration in hours, nM for the duration in minutes, nS for the duration in seconds. nS may also be substituted with n.nnnS where the decimal point precedes fractions of seconds. Tenths (nS), hundredths (nS), and thousandths (nnnS) of a second can be shown. The number prefix (n) in each case is the duration in fractions of a second.

Time values that are not required may not be represented. For example, P12Y1M. When hours, minutes, and/or seconds are represented, "T" may precede the time values. For example, PT23H12M or P3Y1MT9H.

GDT Duration 12600 describes a time period with a particular length of an event or process. For instance, working time, duration of stay, or processing time. However, it may not be dependent on a fixed point in time.

(nnnn) EmailAddress

A GDT EmailAddress 12700 is the abbreviation for Electronic Mail Address and represents a digital and unique address in a mailbox system. An example of GDT EmailAddress 12700 is:

---

><EmailAddress>
mailto:gunther.stuhec@sap.com
</EmailAddress.

---

The structure of GDT EmailAddress 12700 is depicted in FIG. 127. The GDT EmailAddress 12700 includes attribute protocolCode 12714. For GDT Email Address 12700, the Object Class is Email 12702, the Property is Address 12704, the Representation/Association term is Electronic Address 12706, the Type term is CCT 12708, the Type Name term is Electronic Address 12710. The GDT Email Address 12700 may be restricted 12712.

For GDT Protocol Code 12714, the Category is Attribute 12716, the Object Class is Email 12718, the Property is Protocol 12720, the Representation/Association term is Code 12722, the Type term is xsd 12724, the Type Name term is Token 12726, the Cardinality is zero or one 12728. The GDT Protocol Code 12714 is in default: EM (smtp) 12730.

The element content for GDT EmailAddress 12700 is structured using URL conventions. The syntax is specified in the IETF RFC 2396 recommendation. The additional attribute "protocolCode" is not necessary. The scheme is the uriType "mailto:." The part following the colon is the scheme-specific part that represents the respective email address.

If the email address is not based on the SMTP address, another URI scheme according to the IETF RFC 2717 specifications can be applied or the relevant email address can be indicated by an additional "protocolCode" attribute.

Various codes may be used for protocolCode for specification of an address representation of a particular message protocol. For this email address type, the codes from the UN/EDIFACT DE 3155 "Communication Address Code Qualifier" code list may be used. It is not necessary to state the attribute because "EM" is the default value for the SMTP protocol. The main codes are AB (SITA), AD (AT&T mailbox), AF (U.S. Defense Switched Network), AN (ODETTE File Transfer Protocol), AO (Uniform Resource Location), EI (EDI transmission), EM (Electronic Mail Exchange of mail by electronic means), FT (File transfer access method according to ISO), GM (General Electric Information Service), IM (Internal mail), SW (S.W.I.F.T.) and XF (X.400 address).

(oooo) EvaluatedReceiptSettlementIndicator

An GDT EvaluatedReceiptSettlementIndicator 12800 indicates whether the evaluated receipt settlement (ERS) procedure is to be used for settlement or not. An example of GDT EvaluatedReceiptSettlementIndicator 12800 is: <EvaluatedReceiptSettlementIndicator>false</EvaluatedReceiptSettlementIndicator>.

The structure of GDT EvaluatedReceiptSettlementIndicator 12800 is depicted in FIG. 128. For GDT Evaluated Receipt Settlement Indicator 12800, the Property Qualifier term is Evaluated Receipt 12802, the Representation/Association term is Settlement 12804, the Type term is CCT 12806 and the Type Name term is Indicator 12808.

The GDT EvaluatedReceiptSettlementIndicator 12800 can have the values true or false. True indicates that the evaluated receipt settlement (ERS) procedure is to be used for settlement. False indicates the evaluated receipt settlement (ERS) procedure shall not be used for settlement.

In the ERS procedure, payment is made directly on receipt of the goods, without the need for an invoice.

(pppp) ExchangeRate

GDT ExchangeRate 12900 is the representation of an exchange rate between two currencies. An example of GDT ExchangeRate 12900 is:

```
<ExchangeRate>
<UnitCurrency>EUR</UnitCurrency>
<QuotedCurrency>USD</QuotedCurrency>
<Rate>1.1234</Rate>
</ExchangeRate>.
```

The structure of GDT ExchangeRate 12900 is depicted in FIG. 129. The GDT ExchangeRate 12900 includes elements UnitCurrency 12906, QuotedCurrency 12922, Rate 12938, and QuotationDateTime 12956. For GDT Exchange Rate 12900, the Object Class is Exchange Rate 12902 and the Representation/Association term is Details 12904.

For GDT Unit Currency 12906, the Category is Element 12908, the Object Class is Exchange Rate 12910, the Property is Unit Currency 12912, the Representation/Association term is Code 12914, the Type term is GDT 12916, the Type Name term is Currency Code 12918, and the Cardinality is one 12920.

For GDT Quoted Currency 12922, the Category is Element 12924, the Object Class is Exchange Rate 12926, the Property is Quoted Currency 12928, the Representation/Association term is Code 12930, the Type term is GDT 12932, the Type Name term is Currency Code 12934, and the Cardinality is one 12936.

For GDT Rate 12938, the Category is Element 12940, the Object Class is Exchange Rate 12942, the Property is Rate 12944, the Representation/Association term is Rate 12946, the Type term is xsd 12948, the Type Name term is Decimal 12950, the Length is fourteen 12952, and the Cardinality is one 12954.

For GDT Quotation Date Time 12956, the Category is Element 12958, the Object Class is Exchange Rate 12960, the Property is Quotation Date Time 12962, the Representation/Association term is Date Time 12964, the Type term is GDT 12966, the Type Name term is Date Time 12968, and the Cardinality is zero or one 12970.

UnitCurrency refers to the "Leading currency." QuotedCurrency refers to the "Following currency." Rate refers to the exchange rate between these currencies. This corresponds to the price at which one unit of the currency UnitCurrency can be changed into the currency QuotedCurrency. QuotationDateTime refers to the exchange rate date and time when the exchange rate was defined. Specifying an exchange rate date may be optional.

One example use of GDT ExchangeRate 12900 is when an incoming invoice was received with currency Dollar. A different currency is to be used for the payment. The GDT ExchangeRate 12900 between invoice and payment currency may be transmitted to the Payment System. Another example is when current exchange rates are transmitted to an ERP system daily from a provider such as Reuters.

The exchange rate is calculated using the formula: 1 UnitCurrency=Rate* QuotedCurrency.

(qqqq) ExponentialRepresentationTypeCode

The GDT ExponentialRepresentationTypeCode 13000 is a coded representation for how a number is displayed in exponential form in base 10. An example of GDT ExponentialRepresentationTypeCode 13000 is: <ExponentialRepresentationTypeCode>1</ExponentialRepresentationTypeCode>.

The structure of GDT ExponentialRepresentationTypeCode 13000 is depicted in FIG. 130. For GDT Exponential Representation Type Code 13000, the Object Class is Exponential Representation Type 13002, the Representation/Association term is Code 13004, the Type term is CCT 13006, the Type Name term is Code 13008, the Length is one 13010. The GDT Exponential Representation Type Code 13000 may be restricted 13012.

An exponential form in base 10 comprises the mantissa, as a real number with predecimal and decimal places, and a whole number exponent for base 10, where the mantissa and exponent are separated by "E–". In English, the mantissa is specified with a decimal point and a comma is used for thousands.

GDT ExponentialRepresentationTypeCode 13000 can have the values 1, 2 or 3. 1 means exactly one predecimal place in the mantissa. 2 means one fixed predefined exponent. 3 means a maximum of three predecimal places in the mantissa. If the template is exceeded when code 3 is used, the exponent is increased by 3.

The GDT ExponentialRepresentationTypeCode 13000 regulates the format of an exponential number (e.g., on a monitor or printout) but does not affect the technical representation when data is transferred or stored. The format is not a function of the user, but of the purpose and consequently of the instance of the data type.

The GDT ExponentialRepresentationTypeCode 13000 corresponds to the coding for the exponential representation type in R/3 classification. In the case of code 2, the GDT PropertyDataType may also contain an additional attribute, which contains the value of the exponent.

(rrrr) FixedIndicator

A GDT FixedIndicator 13100 indicates whether a value/object is fixed or not. 'Fixed' means that the value/object is limited in its use, for example, it may not be changed. An example of GDT FixedIndicator 13100 is: <FixedIndicator>true</FixedIndicator>.

The structure of GDT FixedIndicator 13100 is depicted in FIG. 131. For GDT Fixed Indicator 13100, the Property is Fixed 13102, the Representation/Association term is Indicator 13104, the Type term is CCT 13106 and the Type Name is Indicator 13108.

GDT FixedIndicator 13100 can have the values true or false. True indicates a value/object is fixed. False indicates a value/object is not fixed. The business meaning of the fixing may be specified in the context of the interface.

(ssss) FloatValue

A GDT FloatValue 13200 is a numeric value represented as a floating point number. An example of GDT FloatValue 13200 is:

```
<PropertyValue>
    <FloatValue>6.02214E+23</FloatValue>
</PropertyValue>.
```

The structure of GDT FloatValue 13200 is depicted in FIG. 132. For GDT Float Value 13200, the Representation/Association Qualifier term is Float 13202, the Representation/Association term is Value 13204, the Type term is xsd 13206, the Type Name term is Float 13208.

GDT FloatValue 13200 is a qualified basic GDT based on the secondary Representation/Association Value of the CCT Numeric. GDT FloatValue 13200 is used if the explicit reference to the floating point representation of the element based on GDT FloatValue 13200 is both meaningful and desired from a semantic perspective. This is the case with mathematical and technical numeric values. The Float qualifier then becomes part of the element name.

Numeric business values are not generally defined using their floating point representation. Instead, this representation derives implicitly from the semantics of the numeric value. An example of this is Measure. FloatValue is not used if this is the case.

(tttt) FollowUpBusinessTransactionDocument RequirementCode

The GDT FollowUpBusinessTransactionDocumentRequirementCode 13300 is a coded representation of the need for a follow-up document. An example of GDT FollowUpBusinessTransactionDocumentRequirementCode 13300 is: <FollowUpInvoiceRequirementCode>01</FollowUpInvoiceRequirementCode>.

The structure of GDT FollowUpBusinessTransactionDocumentRequirementCode 13300 is depicted in FIG. 133. For GDT FollowUp Business Transaction Document Requirement Code 13300, the Object Class Qualification term is Follow Up 13302, the Object Class is Business Transaction Document 13304, the Property is Requirement 13306, the Representation/Association term is Code 13308, the Type term is CCT 13310, the Type Name term is Code 13312, and the Length is 2 13314. The GDT FollowUp Business Transaction Document Requirement Code 13300 Enumeration="01 02 03 04 05" 13316.

The GDT FollowUpBusinessTransactionDocumentRequirementCode 13300 can have the values 01 through 05. 01 means the follow-up document is required in the subsequent process. 02 means the follow-up document is expected in the subsequent process, but optional. 03 means the follow-up document may be optional. 04 means the follow-up document is not expected, but can be received and processed. 04 means the follow-up document is forbidden, therefore it cannot be received or processed.

The GDT FollowUpDocumentRequirementCode 13300 is used to control the exchange of documents within a business process at runtime. It may refer from the context in which it is used to a follow-up document. When the GDT is used in a document, "BusinessTransactionDocument" is replaced by the respective follow-up document, for example, Invoice. A default procedure may be specified every time a GDT FollowUpBusinessTransactionRequirementCode 13300 is used.

For example in an order process, the buyer uses a GDT FollowUpDocumentRequirementCode 13300 in the purchase order to specify that an order confirmation is "unexpected." This means that the buyer does not expect a confirmation as part of the business transaction but is able to receive and file a confirmation.

The GDT FollowUpBusinessTransactionDocumentRequirementCode 13300 may be a proprietary code list with fixed predefined values. Changes to the permitted values involve changes to the interface.

In addition to the GDT FollowUpBusinessTransactionDocumentRequirementCode 13300, which refers to follow-up documents, there is also a GDT FollowUpMessageRequirementCode, which refers to follow-up messages. When used in a message, a check may be performed to determine which of these GDTs may be used.

(uuuu) FollowUpMessageRequirementCode

The GDT FollowUpMessageRequirementCode 13400 is a coded representation of the necessity of a follow-up message. An example of GDT FollowUpMessageRequirementCode 13400 is: <FollowUpInvoiceRequestRequirementCode>01</FollowUpInvoiceRequestRequirementCode>.

The structure of GDT FollowUpMessageRequirementCode is 13400 depicted in FIG. 134. For GDT FollowUp Message Requirement Code 13400, the Object Class Qualification term is Follow Up 13402, the Object Class is Message 13404, the Property is Requirement 13406, the Representation/Association term is Code 13408, the Type term is CCT 13410, the Type Name term is Code 13412, and the Length is 2 13414. The GDT FollowUp Message Requirement Code 13400 may be restricted 13416.

GDT FollowUpMessageRequirementCode 13400 can have the values 01 through 05. 01 means the follow-up message is necessary in the subsequent process. 02 means the follow-up message is expected in the subsequent process, but is optional. 03 means the follow-up message may be optional. 04 means the follow-up message is not expected, but can be received and processed. 05 means the follow-up message is forbidden, therefore it cannot be received or processed.

The GDT FollowUpMessageRequirementCode 13400 is used to control the exchange of messages within a business process at runtime. It may always refer from the context in which it is used to a follow-up message. When the GDT is used in a document, "Message" is replaced by the respective follow-up message, for example, InvoiceRequest. The follow-up message names that are permitted are listed in the GDT:MessageTypeCode.

A default procedure may be specified every time a GDT FollowUpMessageRequirementCode 13400 is used. For example, in an order process, the buyer uses a GDT FollowUpMessageRequirementCode 13400 in the purchase order to specify that an order confirmation is "unexpected." This means that the buyer does not expect an confirmation as part of the business transaction but is able to receive and file a confirmation.

The GDT FollowUpMessageRequirementCode 13400 may be a proprietary code list with fixed predefined values. Changes to the permitted values involve changes to the interface.

In addition to the GDT FollowUpMessageRequirementCode 13400, which refers to follow-up messages, there is also a GDT FollowUpBusinessTransactionDocumentRequirementCode, which refers to follow-up documents. When used in a message, a check may be performed to determine which of these GDTs may be used.

(vvvv) GeoCoordinates

GDT GeoCoordinates 13500 contain the geographic data, in other words longitude and latitude specified as per the WGS84 reference system, which enables one to determine a position on the globe. An example of GDT GeoCoordinates 13500 is:

```
<GeoCoordinates>
    <LatitudeMeasure unitCode="DD">40.23232300000</
    LatitudeMeasure>
    <LongitudeMeasure unitCode="DD">123.12121200000</
    LongitudeMeasure>
</GeoCoordinates>.
```

In the above example, the unitCode "DD" corresponds to the unit degree of an angle.

The structure of GDT GeoCoordinates 13500 is depicted in FIG. 135. The GDT GeoCoordinates 13500 includes elements LatitudeMeasure and Longitude Measure. For GDT GeoCoordinates 13500, the Object Class is GeoCoordinates 13502, the Representation/Association term is Details 13504.

LatitudeMeasure refers to the geographic latitude in degrees. The degrees unit of measurement is specified by the attribute "unitCode." For GDT Latitude Measure 13506, the Category is E 13508, the Object Class is GeoCoordinates 13510, the Property is Latitude 13512, the Representation/Association term is Measure 13514, the Type term is GDT 13516, the Type Name term is Measure 13518, the Cardinality is one 13520.

LongitudeMeasure refers to the Geographic longitude in degrees. The degrees unit of measurement is specified by the attribute "unitCode." For GDT Longitude Measure 13522, the Category is E 13524, the Object Class is GeoCoordinates 13526, the Property is Longitude 13528, the Representation/Association term is Measure 13530, the Type term is GDT 13532, the Type Name term is Measure 13534, the Cardinality is one 13536.

In general, southern latitudes are negative and northern latitudes are positive. Western longitudes are negative and eastern longitudes are positive. It is also not necessary to use the positive sign (+) for positive values. Negative values may have a negative sign (−) for a prefix.

The specification of longitude and latitude corresponds to spherical coordinates. The definition range for LatitudeMeasure is −90 to +90. The definition range for LongitudeMeasure is −180 to +180. Specifications outside the definition range, for example, +190 for longitude or −100 for latitude, may result in an error.

GDT GeoCoordinates 13500 may be used in the field of transport planning. The geodata are determined from the address data of a customer to calculate the time required for transport, the distance to be covered, and the speed of the means of transport used.

Another usage is may be to locate suitable garages in the case of an accident or breakdown in a specific area. The garages are geo-coded using their addresses and are available for such an enquiry.

(wwww) HandlingUnit

A HandlingUnit 13600 is a physical unit of packaging materials (load carrier, additional packaging materials) and the packaged products (type "Material"). An example of HandlingUnit 13600 is:

Example 1

Handling Unit with a Load of 10 Boxes of a Product

```
<HandlingUnit>
    <ID>4711</ID>
    <LoadCarrier>
        <Product>
            <StandardID
schemeAgencyID="DUNS">123456789</StandardID>
        </Product>
    </LoadCarrier>
    <Load>
        <BusinessTransactionDocumentReference>
            <ItemID>LF800001</ItemID>
        </BusinessTransactionDocumentReference>
        <Quantity unitCode="CT" >10</Quantity>
    </Load>
</HandlingUnit>.
Example 2: Handling Unit with Lower-Level Handling Unit
<HandlingUnit>
    <ID>4712</ID>
    <LoadCarrier>
        <Product>...</Product>
    </LoadCarrier>
    <LowerLevelHandlingUnit>
        <ID>4711</ID>
    </LowerLevelHandlingUnit>
</HandlingUnit>.
```

The structure of HandlingUnit 13600 is depicted in FIG. 136. For Handling Unit 13600, the Object Class is Handling Unit 13602, the Representation/Association term is Details 13604.

ID identifies the handling unit. For ID 13606, the Object Class is Handling Unit 13608, the Property is Identification 13610, the Representation/Association term is Identifier 13612, the Type term is GDT 13614, the Type Name term is Identifier 13616, the Length is from one to twenty 13618, and the Cardinality is one 13620.

LoadCarrier refers to the device with which physical objects can be stored or transported. Examples of load carriers include crates, nestings, containers, mesh box pallets, and pallets. For Load Carrier 13622 the Object Class is Handling Unit 13624, and the Cardinality is one 13626.

LoadCarrierProduct refers to the product ID of the load carrier. For Product 13626, the Object Class is Load Carrier 13628, the Property is Product 13630, the Type term is GDT, the Type Name term is Business Transaction Document Production 13632, and the Cardinality is one 13634. The Product 13626 may be restricted 13636.

HeightMeasure refers to the height of the handling unit. For Height Measure 13638, the Object Class is Handling Unit 13640, the Property Qualifier term is Height 13642, the Property is Measure 13644, the Representation/Association term is Measure 13646, the Type term is GDT 13648, the Type Name term is Measure 13650, the Length is maximum 19 predecimal and 6 decimal digits 13652, and the Cardinality is zero or one 13654.

LengthMeasure refers to the length of the handling unit. For Length Measure 13656, the Object Class is Handling Unit 13658, the Property Qualifier term is Length 13660, the Property is Measure 13662, the Representation/Association term is Measure 13664, the Type term is GDT 13666, the Type Name term is Measure 13668, the Length is maximum 19 predecimal and 6 decimal digits 13670, and the Cardinality is zero or one 13672.

WidthMeasure refers to the width of the handling unit. For Width Measure 13674, the Object Class is Handling Unit 13676, the Property Qualifier term is Width 13678, the Property is Measure 13680, the Representation/Association term is Measure 13682, the Type term is GDT 13684, the Type Name term is Measure 13686, the Length is maximum 19 predecimal and 6 decimal digits 13688, and the Cardinality is zero or one 13690.

GrossVolumeMeasure refers to the total volume of the load carrier for a closed load carrier (wire basket) or total of packaging material and the contents for open packaging materials (pallets). For Gross Volume Measure 13692, the Object Class is Handling Unit 13694, the Property Qualifier term is Length 13696, the Property is Measure 13698, the Representation/Association term is Measure 13699, the Type term is GDT 13601, the Type Name term is Measure 13602A, the Length is maximum 19 predecimal and 6 decimal digits 13603A, and the Cardinality is zero or one 13604A.

GrossWeightMeasure refers to the total weight of packaging material and complete contents. For Gross Weight Measure 13605A, the Object Class is Handling Unit 13606A, the Property Qualifier term is Weight 13607A, the Property is Measure 13608A, the Representation/Association term is Measure 13609A, the Type term is GDT 13610A, the Type Name term is Measure 13611A, the Length is maximum 19 predecimal and 6 decimal digits 13612A, and the Cardinality is zero or one 13613A.

AdditionalPackaging refers to additional packaging materials. Together with the load carrier used, these are intended for fulfilling the requirements of the materials to be packed in terms of fixing, securing, and filling. With the load carrier, they constitute the packaging of a handling unit (examples: lid, intermediate layers, frames, shrink-wrap, padding material). For Additional Packaging 13614A, the Object Class is Handling Unit 13615A, and the Cardinality is from zero to n 13616A.

AdditionalPackaging Product refers to the product ID of a packaging material/additional packaging material. For Product 13616A, the Object Class is Additional Packaging 13617A, the Property is Product 13618A, the Type term is GDT 13619A, the Type Name term is Business Transaction Document Product 13620A, and the Cardinality is one 13621A. The Product 13616A may be restricted 13622A.

For Quantity 13623A, the Object Class is Additional Packaging 13624A, the Property is Quantity 13625A, the Property/Association term is Quantity 13626A, the Type term is GDT 13627A, the Type Name term is Quantity 13628A, the Length is maximum 19 predecimal and 6 decimal digits 13629A, and the Cardinality is one 13630A.

AdditionalPackaging Quantity refers to the quantity of a packaging material/additional packaging material used in the specified handling unit.

A handling unit can consist of an empty load carrier. It is therefore beneficial to specify the HandlingUnitID and the load carrier, whereas packed products (loads), lower-level handling units, packaging materials, and additional packaging materials are optional. LowerLevelHandlingUnit refers to a lower-level handling unit for displaying a hierarchy of handling units. For Lower Level Handling Unit 13631A, the Object Class is Handling Unit 13632A, and the Cardinality is from zero to n 13633A.

For ID 13634A, the Object Class is Lower Level Handling Unit 13635A, the Property is Identification 13636A, the Representation/Association term is Identifier 13637A, the Type term is GDT 13638A, the Type Name term is Handling Unit ID 13639A, the Length is from one to twenty 13640A, and the Cardinality is one 13641A.

Load refers to the load (quantity of a product) packed in the specified handling unit without lower-level handling units. The load in a handling unit is characterized by referencing the item in a business document that contains information about the type and quantity of a product. For Load 13642A, the Object Class is Handling Unit 13643A, the Property is Load 13644A, and the Cardinality is from zero to n 13645A.

LoadBusinessTransactionDocumentReference is a reference to the item in a business document that contains more specific details to the load packed in the handling unit. For Business Transaction Document Reference 13645A, the Object Class is Load 13646A, the Property is Business Transaction Document 13647A, the Type term is GDT 13648A, the Type Name term is Business Transaction Document Reference 13649A, the Cardinality is one 13650A.

For ID 13651A, the Object Class is Business Transaction Document 13652A, the Property is Identification 13653A, the Representation/Association term is Identifier 13654A, the Type term is GDT 13655A, the Type Name term is Business Transaction Document ID 13656A, the Length is from one to thirty-five 13657A, and the Cardinality is zero or one 13658A.

For Item ID 13659A, the Object Class is Business Transaction Document Item 13660A, the Property is Identification 13661A, the Representation/Association term is Identifier 13662A, the Type term is GDT 13663A, the Type Name term is Business Transaction Document Item ID 13664A, the Length is from one to ten 13665A, and the Cardinality is one 13666A.

AdditionalPackaging Quantity refers to the quantity of a packaging material/additional packaging material used in the specified handling unit.

LoadQuantity refers to the quantity of the load packed in the specified handling unit without lower-level handling units. For Quantity 13666A, the Object Class is Load 13667A, the Property is Quantity 13668A, the Representation/Association term is Quantity 13669A, the Type term is GDT 13670A, the Type Name term is Quantity 13671A, the Length is from maximum 19 predecimal and 6 decimal digits 13672A, and the Cardinality is one 13673A.

In an embodiment, the product quantity in the referenced item is not less than the LoadQuantity specified in the HandlingUnit 13600. If the business document referenced in the handling unit directly concerns the document in which the handling unit is used, the identification of the business document (but not of the item) can be left out.

HandlingUnit 13600 maps the packaging/packaging hierarchy of products. The HandlingUnit 13600 simplifies logistics processes: It enables the production- or sales-controlled combination of various products/same products with inconsistent packaging sizes in physical storage units or delivery units; and, using the link to batch numbers and serial numbers, it enables an improved logistical check, which may be necessary for effective processing.

The structure of the GDTs HandlingUnit 13600 is compatible with the "packaging" in the DELVRY03 IDoc. A handling unit has a unique scanable identification number that can be used to call up data for the handling unit.

(xxxx) Incoterms

GDT Incoterms 13700 are commercial contract formulae for the delivery conditions that correspond to the rules compiled by the International Chamber of Commerce (ICC). An example of Incoterms is:

```
<Incoterms>
    <ClassificationCode>FOB</ClassificationCode >
    <TransferLocationName>Hamburg</TransferLocationName>
</Incoterms>.
```

The structure of GDT Incoterms 13700 is depicted in FIG. 137. The GDT Incoterms 13700 includes elements ClassificationCode and TransferLocationName. For GDT Incoterms 13700, the Object Class is Incoterms 13702 and the Representation/Association term is Details 13704.

ClassificationCode refers to the coded representation of the internationally used abbreviation for characterizing delivery conditions. ClassificationCode is a three-character field and can accept the values EXW (Ex Works), FCA (Free Cargo), FAS (Free Alongside Ship), FOB (Free on Board), CFR (Cost & Freight), CIF (Cost, Insurance & Freight to named destination), CPT (Freight, Carriage paid to destination), CIP (Freight, Carriage, Insurance to destination), DAF (Delivery at frontier—Named place), DES (Delivered Ex Ship—Named port of destination), DEQ (Delivered Ex Quay—Duty paid, Named port), DDU (Delivered duty unpaid to destination), DDU (Delivered duty unpaid to destination). For Classification Code 13706, the Category is E 13708, the Object Class is Incoterms 13710, the Property is Classification 13712, the Representation/Association term is Code 13714, the Type term is CCT 13716, the Type Name term is Code 13718, the Length is three 13720, and the Cardinality is one 13722. The Classification Code 13706 may be restricted 13724.

TransferLocationName refers to a place (place, port of shipment, port of destination, place of destination) to which the above code refers. For example, it may refer to the port of shipment in the case of FOB. For Transfer Location Name 13726, the Category is Element 13728, the Object Class is Incoterms 13730, the Property is Transfer Location Name 13732, the Representation/Association term is Name 13734, the Type term is GDT 13736, the Type Name term is Name 13738, the Length is from one to twenty-eight 13740, and the Cardinality is zero or one 13742. The Transfer Location Name 13726 may be restricted 13744.

GDT Incoterms 13700 are used in the transmission of an order to establish the delivery conditions agreed upon by the business partners.

(yyyy) InformationOutdatedIndicator

A GDT InformationOutdatedIndicator 13800 indicates whether information is outdated or not. An example of GDT InformationOutdatedIndicator 13800 is: <InformationOutdatedIndicator>false</InformationOutdatedIndicator>.

The structure of GDT InformationOutdatedIndicator 13800 is depicted in FIG. 138. For GDT Information Outdated Indicator 13800, the Object Class is Information 13802, the Property is OutdatedIndicator 13804, the Representation/Association term is Indicator 13806, the Type term is CCT 13808, and the Type Name term is Indicator 13810.

The GDT InformationOutdatedIndicator 13800 can have the values true or false. True indicates that information contained in the message is outdated. False indicates that information contained in the message is not outdated.

One example is the purchase order information message, which also contains confirmed quantities and deadlines. The InformationOutdatedIndicator indicates whether the confirmed quantities and deadlines relate to the current PO information or whether the PO has been changed since the last confirmation was received.

It may be clear from the context of the interface which information is outdated. This can be done by extending the name (e.g., ConfirmationInformationOutdatedIndicator).

(zzzz) IntegerValue

An GDT IntegerValue 13900 is an integer. An integer can be regarded as a numerical decimal value without decimal places. An example of GDT IntegerValue 13900 is:

```
<PropertyValue>
    <IntegerValue>42</IntegerValue>
</PropertyValue>.
```

The structure of GDT IntegerValue 13900 is depicted in FIG. 139. For GDT IntegerValue 13900, the Representation/Association Qualifier term is Integer 13902, the Representation/Association term is Value 13904, the Type term is xsd 13906, and the Type Name term is Integer 13908.

GDT IntegerValue 13900 is a qualified basic GDT based on the secondary Representation/Association Value of the CCT Numeric. IntegerValue is used when the explicit reference to the integer representation of the element based on IntegerValue is both meaningful and desired from a semantic perspective. This is the case with rounded or estimated values. The Integer qualifier then becomes part of the relevant element name.

Generally, numeric business values are not defined using their integer representation. Instead, this representation is derived implicitly from the semantics of the numeric value. Examples of this include OrdinalNumberValue or DunningCounterValue. In this case, GDT IntegerValue 13900 is not used.

(aaaaa) InterfaceElementID

An GDT InterfaceElementID 14000 is a unique identifier for an element in an interface. An example of GDT InterfaceElementID 14000 is:

<InterfaceElementID schemeID='Open Catalog Interface' schemeAgencyID='23456789' schemeAgencySchemeID='DUNS' schemeAgencySchemeAgencyID='016'>NEW_ITEM-DESCRIPTION</InterfaceElementID>.

The structure of GDT InterfaceElementID 14000 is depicted in FIG. 140. For GDT InterfaceElementID 14000, the Object Class is Interface Element 14002, the Representation/Association term is Identifier 14004, the Type term is CCT 14006, the Type Name term is Identifier 14008, and the Length is from one to forty 14010. The GDT Interface Element ID 14000 may be restricted 14012.

For Scheme ID 14014, the Category term is Attribute 14016, the Object Class is Identification Scheme 14018, the Representation/Association term is Identifier 14020, the Type term is xsd 14022, the Type Name term is Token 14024, the Length is from one to sixty 14026, and the Cardinality is zero or one 14028.

For Scheme Agency ID 14030, the Category term is Attribute 14032, the Object Class is Identification Scheme Agency 14034, the Representation/Association term is Identifier 14036, the Type term is xsd 14038, the Type Name term is Token 14040, the Length is from one to sixty 14042, and the Cardinality is zero or one 14044.

For Scheme Agency Scheme ID 14046, the Category term is Attribute 14048, the Object Class is Identification Scheme Agency 14050, the Property is Scheme 14052, the Representation/Association term is Identifier 14054, the Type term is xsd 14056, the Type Name term is Token 14058, the Length is from one to sixty 14060, and the Cardinality is zero or one 14062.

For Scheme Agency Scheme Agency ID 14064, the Category term is Attribute 14066, the Object Class is Identification Scheme Agency 14068, the Property is Scheme Agency 14070, the Representation/Association term is Identifier 14072, the Type term is xsd 14074, the Type Name term is Token 14076, the Length is three 14078, and the Cardinality is zero or one 14080.

The permitted values depend on the corresponding interface and may be taken from its documentation. The attribute schemeID identifies the interface, schemeAgencyID identifies the issuer of the interface, which may be unique in the context of the attributes schemeAgencySchemeID and schemeAgencySchemeAgencyID. For more information about the use of the attributes schemeID, schemeAgencyID, schemeAgencySchemeID, and schemeAgencySchemeAgencyID, see the discussion for the CCT Identifier.

In an embodiment, the GDT InterfaceElementID 14000 may not be used to refer to elements of XML interfaces. If necessary, there may be an examination of how an element of an XML interface is identified and how the attributes are to be used in this case. GDT InterfaceElementID 14000 is used to assign references to interface elements of various e-procurement systems to characteristics within a catalog. For example, the "Open Catalog Interface" can be used to link Web-based purchasing catalogs to an e-procurement system. A user calls up a catalog from the e-procurement system, searches for products in this catalog, and makes a selection. When this is transmitted to the virtual shopping cart of the e-procurement system (user purchase order), characteristics of the product are transmitted to the e-procurement using the above-mentioned interface. The GDT InterfaceElementID 14000 contains the interface element identification of the calling e-procurement system for each characteristic and enables the characteristics to be assigned correctly to the elements of the e-procurement interface.

(bbbbb) IntervalBoundaryTypeCode

An GDT IntervalBoundaryTypeCode 14100 is a coded representation of an interval boundary type. An example of GDT IntervalBoundaryTypeCode 14100 is: <IntervalBoundaryTypeCode>3</IntervalBoundaryTypeCode>.

The structure of GDT IntervalBoundaryTypeCode 14100 is depicted in FIG. 141. For the GDT Interval Boundary Type Code 14100, the Property is Interval Boundary Type 14102, the Representation/Association is Code 14104, the Type is CCT 14106, the Type Name is Code 14108, and the Length is one 14110. The GDT IntervalBoundaryTypeCode 14100 may be a restricted GDT.

An element of type GDT IntervalBoundaryTypeCode 14100 can have the values 1 through 9. 1 corresponds to a single value X. 2 corresponds to an interval with a closed lower interval boundary and an open upper interval boundary; [X,Y). 3 corresponds to an interval with a closed upper and lower interval boundary; [X,Y]. 4 corresponds to an interval with an open upper and lower interval boundary; (X,Y). 5 corresponds to an interval with an open lower interval boundary and a closed upper interval boundary; (X,Y]. 6 corresponds to an interval with an unlimited lower boundary and an open upper boundary; <X. 7 corresponds to an interval with an unlimited lower boundary and a closed upper boundary; <=x. 8 corresponds to an interval with an open lower boundary and an unlimited upper boundary; >X. 9 corresponds to an interval with a closed lower boundary and an unlimited upper boundary; >=X.

The values that are expressed by the interval relationship may belong to the same ordinal scale. The meaning of scale values established by the GDT IntervalBoundaryTypeCode 14100 is used to describe intervals by their boundaries. One use relates to property values and property valuations.

The GDT IntervalBoundaryTypeCode 14100 may be a proprietary code list with fixed predefined values. Changes to the permitted values may involve changes to the interface.

(ccccc) InventoryUsabilityStatusCode

The GDT InventoryUsabilityStatusCode 14200 is the encoded representation of the usability of a warehouse inventory for company-specific business processes. An example of GDT InventoryUsabilityStatusCode 14200 is: <InventoryUsabilityStatusCode>1</InventoryUsabilityStatusCode>.

The structure of GDT InventoryUsabilityStatusCode 14200 is depicted in FIG. 142. For the GDT Inventory Usability Status Code 14200, the Object Class is Inventory 14202, the Property is Usability Status 14204, the Representation/Association Code is 14206, the Type CCT is 14208, the Type Name is Code 14210, and the Length is from one to two 14212. The GDT InventoryUsabilityStatusCode 14200 may be a restricted GDT.

The value range of the GDT InventoryUsabilityStatusCode 14200 may comprise a proprietary code list. Possible values are 1 through 6. 1 means the stock can be used as necessary for business processes. 2 means the stock is blocked for business processes. 3 means the usage of stock is subject to certain restrictions. 4 means the InventoryUsabilityStatusCode of the stock is not defined more precisely, i.e., no other status is specified. 4 means the stock is in quality inspection. 6 means the stock is a goods return. Depending on the coded value, certain business processes can be allowed for a warehouse stock, however, others may not be allowed.

The usage can be clarified using a concrete business process as an example: At a goods receipt for a purchase order, the GDT InventoryUsabilityStatusCode 14200 "quality inspection" is assigned to the stock delivered since Quality Control may inspect the quality of the received stock. Depending on this inspection, parts of the stock are then posted to the GDT InventoryUsabilityStatusCode 14200 "unrestricted use" or "blocked." The GDT InventoryUsabilityStatusCode 14200 is used for transmitting stock changes from Inventory Management to Accounting and to Logistics Planning. Different InventoryUsabilityStatusCodes can cause a different stock valuation in Accounting and are handled differently in planning.

A warehouse inventory is a quantity of material at a certain location. For example, 17 pieces of material "42" at storage location "17-05-72".

(ddddd) InvoiceCancellationInvoiceIndicator

An GDT InvoiceCancellationInvoiceIndicator 14300 indicates whether an invoice is a cancellation invoice or not. An example of GDT InvoiceCancellationInvoiceIndicator 14300 is: <InvoiceCancellationInvoiceIndicator>true</InvoiceCancellationInvoiceIndicator>.

The structure of GDT InvoiceCancellationInvoiceIndicator 14300 is depicted in FIG. 143. For the GDT Invoice Cancellation Invoice Indicator 14300, the Object Class Invoice is 14302, the Property is Cancellation Invoice Indicator 14304, the Representation/Association is Indicator 14306, the Type is CCT 14308, and the Type Name is Indicator 14310.

The GDT InvoiceCancellationInvoiceIndicator 14300 can have the values true or false. True indicates that the invoice is a cancellation invoice. False indicates that the invoice is not a cancellation invoice.

A cancellation invoice is a newly created invoice that renders a previously generated invoice or parts of it invalid. This is done by marking the new invoice with the GDT InvoiceCancellationInvoiceIndicator 14300 (value 'true'). Marking an invoice using the GDT InvoiceCancellationInvoiceIndicator 14300 is specific to invoices. If an invoice contains errors, is incorrect, or has been created for services that have not been provided, it may not be canceled itself. The correction may be made via an additional, appropriately marked invoice. A cancellation invoice may not be equated with a credit memo, even if from an accounting point of view the original invoiced amount can be credited using the invoice marked as a cancellation invoice.

For example, the distinction is made in R/3 using the sales document type. In particular, the distinction between 'cancellation invoice' and 'cancellation credit memo' needs to be observed here.

(eeeee) InvoiceIntraCorporateIndicator

A GDT InvoiceIntraCorporateIndicator 14400 indicates whether or not an invoice is between independent companies in a corporate group. An example of GDT InvoiceIntraCorporateIndicator 14400 is: <InvoiceIntraCorporateIndicator>true</InvoiceIntraCorporateIndicator>.

The structure of GDT InvoiceIntraCorporateIndicator 14400 is depicted in FIG. 144. For the GDT Invoice Corporate Indicator 14400, the Object Class is Invoice 14402, the Property is Intra Corporate Indicator 14404, the Representation/Association is Indicator 14406, the Type is CCT 14408, the Type Name is Indicator 14410. The Indicator may have the values true or false. True indicates the invoice is between two companies within a corporate group. False indicates the invoice is to a company that does not belong to the corporate group or is an invoice to an end customer.

The creation of invoices between companies in a corporate group is sometimes also referred to as "Intercompany Billing." For example, a customer places an order with company C1, which also sends the invoice to the customer. Delivery of goods, however, is performed by company C2 of the same group. C1 gathers all revenue, while C2 incurs the costs. This makes a settlement between the two companies necessary, which may require an invoice in the case of legally independent companies.

Therefore, two invoices may be created for one business transaction (in the example of the customer order), whose differing semantics are made explicit by the indicator. Distinction between the two is necessary, since different prices are applied in invoicing and the invoice to the customer affects the status of the order item.

If more than two companies in one corporate group are involved in a business transaction, further invoices can result—this is known as Chain Invoicing. However, differentiation of invoices between these companies may not be required in that case.

In an example, the distinction is made in R/3 using the sales document type.

(fffff) LanguageCode

The GDT LanguageCode 14500 is a coded representation for the language. An example of GDT LanguageCode 14500 is: <OrderLanguageCode>de</OrderLanguageCode>.

The structure of GDT LanguageCode 14500 is depicted in FIG. 145. The GDT Language Code 14500, the Object Class is Language 14502, the Property is Identification 14504, the Representation is Code 14506, the Type is xsd 14508, the Type Name is language 14510, the Length is from two to nine 14512.

GDT LanguageCode 14500 is from the Core Component Type "Code." GDT LanguageCode 14500 is based on the W3C "built-in" data type xsd:language. The language code of GDT LanguageCode 14500 is represented according to IETF RFC 3066. RFC 3066 includes two parts: a primary language code and a series of sub-codes. The primary language code can be an ISO 639-1-compliant (ISO 639:1988) two-character code or an ISO 639-2-compliant (ISO 639:1998) three-character code. If the language code is to occur in both standards, the two-character language code (ISO 639-1) may be used. The sub-codes can be used for differentiating the language according to special criteria or for different dialects within a single country. If the ISO 639-1 or 639-2-compliant codes are not sufficient, the ISO 3166-1-compliant two-character code is usually used as the first sub-code. Regional differences in a language within a single country can be defined by using the second ISO 3116-2-compliant two-character sub-code "Country Subdivision Code."

A GDT LanguageCode 14500 is represented as aa, anm, aa-CC, aaa-CC, aa-CC-RR, aaa-CC-RR. The literal aa/aaa stands for ISO 639-1 or ISO 639-2-compliant language code, CC stands for ISO 3166-1-compliant country code, and RR stands for ISO 3166-2-compliant "Country Subdivision Code".

GDTLanguageCode 14500 is used to identify the language for business documents or business partners. Furthermore, it enables a business partner to request a particular language. There is also a difference between inbound and outbound in the implementation of "LanguageCode." Outbound, mapping from, for example, the SAP language key to the ISO 639-1-compliant two-character ISO language code always occurs without language differentiation. Inbound, most SAP applications work internally with the SAP language key. These applications support the ISO 639-1-compliant two-character language code without a sub-code. Other language codes may be mapped to ISO 639-1 for these applications; otherwise an error may occur during inbound processing.

(ggggg) LanguageDependencyIndicator

A GDT LanguageDependencyIndicator 14600 indicates whether or not there is a language dependency. An example of GDT LanguageDependencyIndicator 14600 is: <LanguageDependencyIndicator>true</LanguageDependencyIndicator>.

The structure of GDT LanguageDependencyIndicator 14600 is depicted in FIG. 146. The GDT Language Dependency Indicator 14600, the Property is Language Dependency 14602, the RepresentationlAssociation is Indicator 14604, and the Type is CCT: Indicator 14606.

The GDT LanguageDependencyIndicator 14600 can have the values true (or 1) or false (or 0). True indicates language dependency. False indicates no language dependency.

The GDTLanguageDependencyIndicator 14600 is used in GDT PropertyDataType to indicate that values in character strings are language dependent.

(hhhhh) LegalEventTypeCode

The GDT LegalEventTypeCode 14700 is the coded representation of a legal transaction or an official or legal event. An example of GDT LegalEventTypeCode 14700 is:

```
<LegalEvent>
    <TypeCode>01</TypeCode>
</LegalEvent>.
```

The structure of GDT LegalEventTypeCode 14700 is depicted in FIG. 147. The GDT Legal Event Type Code 14700, the Object Class is Legal Event 14702, the Property is Type 14704, Representation/Association is Code 14706, the Type is CCT 14708, the Type Name is Code 14710, the Length is two 14712.

Values permitted for GDT LegalEventTypeCode 14700 are 01-20 and ZZ. 01 stands for foreclosure, 02 stands for Law suit, 03 stands for Outstanding Judgment, 04 stands for Tax Lien, 05 stands for Support Debt, 06 stands for Bankruptcy, 07 stands for Garnishment, 08 stands for Repossession, 09 stands for Collection, 10 stands for Divorce Decree, 11 stands for Custody Agreement, 12 stands for Financing Statement (Secured Loan), 13 stands for Lien, 14 stands for Non-responsibility, 15 stands for Financial Counseling, 16 stands for Fictitious Name, 17 stands for Notice of Default, 18 stands for Forcible Detainer, 19 stands for Unlawful Detainer, 20 stands for an other Public Record or Obligation Type, and ZZ stands for a mutually defined code.

(iiiii) LocationID

A GDT LocationID 14800 is a unique identifier for a location. A location is a logical or a physical place. An example of GDT LocationID 14800 is:

```
<LocationID schemeID="myLocations"
            schemeAgencyID="065055766"
                schemeAgencySchemeID="DUNS"
                schemeAgencySchemeAgencyID="016">
    LOC_4711
</LocationID>.
```

In the above example, 065055766 is the DUNS number for Bosch, and 016 is the DUN & Bradstreet Corporation from code list UN/EDIFACT DE 3055.

The structure of GDT LocationID 14800 is depicted in FIG. 148. For GDT ID 14800, the Object Class is Location 14802, the Property is Indemnification 14804, the Representation/Association is Identifier 14806, the Type is CCT 14808, the Type Name is Identifier 14810, and the Length is twenty 14812. The GDT LocationID 14800 may be a restricted GDT.

For the scheme ID 14816, the Category is Attribute 14818, the Object Class is Identification Scheme 14820, the Property is Identification 14822, the Representation/Association is Identifier 14824, the Type is xsd 14826, the Type Name is Token 14828, and the Length is from zero to sixty 14830. The Cardinality is zero or one 14852.

For the schemeAgency ID 14834, the Category is Attribute 14836, the Object Class is Identification Scheme Agency 14838, the Property is Identification 14840, the Representation/Association is Identifier 14842, the Type is xsd 14844, the Type Name is Token 14846, and the Length is from zero to sixty 14850. The Cardinality is zero or one 14852.

For the Scheme Agency-Scheme ID 14854, the Category is Attribute 14856, the Object Class is Identification Scheme Agency 14858, the Property is Scheme 14860, the Representation/Association is Identifier 14862, the Type is xsd 14864, the Type Name is Token 14866, and the Length is three 14868. The Cardinality is zero or one 14870.

For the Scheme Agency-Scheme Agency ID 14872, the Category is Attribute 14874, the Object Class is Identification Scheme Agency 14876, the Property is Scheme Agency 14878, the Representation/Association is Identifier 14880, the Type is xsd 14882, the Type Name is Token 14884, the Length is three 14886. The Cardinality is zero or one 14888.

For standardized and proprietary GDT LocationID 14800, there is the CDT: LocationStandardID and CDT: LocationPartyID.

(jjjjj) LocationInternalID

A CDT LocationInternalID 14900 is a proprietary identifier for a location. A location is a logical or a physical place. An example of CDT LocationInternalID 14900 is:

GUID of a location:

<LocationInternalID schemeID="LocationGUID"schemeAgencyID="MPL__002">1C743CEC501F6A4D8826C7EC5A8554B9</LocationInternational ID>.

In the above example, schemeID="LocationGUID" indicates that the scheme "LocationGUID" was used to identify the location, and schemeAgencyID="MPL__002" indicates that the scheme was assigned by the business system "MPL__002."

The following is another example of LocationInternalID:

ID of a location:

<LocationInternalID schemeID="LocationID" schemeAgencyID="MPL__002">CU000000001</LocationInternalID>.

The structure of CDT LocationInternalID 14900 is depicted in FIG. 149. For GDT Location Internal ID 14902, the Object Class is Location 14904, the Property is Internal 14906, the Representation/Association is Identifier 13308, the Type is GDT 14910, the Type Name is Location ID 14912, and the Length is from one to thirty-two 14914. The CDT LocationInternalID 14900 may be a restricted CDT.

For the scheme ID 14918, the Category is Attribute 14320, the Object Class is Identification Scheme 14920, the Property is Identification 14922, the Representation/Association is Identifier 14924, the Type is xsd 14926, the Type Name is Token 14928, the Length is from one to sixty 14930. The Cardinality is zero or one 14932.

For the schemeAgency ID 14934, the Category is Attribute A 14936, the Object Class is Identification Scheme Agency 14936, the Property is Identification 14938, the Representation/Association is Identifier 14940, the Type is xsd 14942, the Type Name is Token 14944, the Length is from one to sixty 14946. The Cardinality is zero or one 14948.

LocationGUID and Location ID are both schemes provided for schemeID. LocationGUID identifies a location using a Global Unique Identifier, and LocationID identifies a location using an identifier. SchemeAgencyID identifies a business system in which the identifier was assigned.

The CDT LocationInternalID represents a projection of the GDT LocationID, in which the attributes "schemeID" and "schemeAgencyID" are contained for describing an internally assigned ID. If an attribute is not explicitly assigned in the use of the CDT, it may be clearly specified through the context.

The CDT LocationInternalID 14900 is used when both sender and recipient can access shared master data.

(kkkkk) LocationPartyID

A CDT LocationPartyID 15000 is an identifier for a location assigned by a party. A location is a logical or a physical place. An example of CDT LocationPartyID 15000 is: <LocationBuyerID>4711</LocationBuyerID>.

The structure of CDT LocationPartyID 15000 is depicted in FIG. 150. For the CDT Location Party ID 15000, the Object Class is location 15002, the Property Quality is Party 15004, the Property is Identification 15006, the Representation/Assocation is Identifier 15008, the Type is GDT 15010, the Type Name is Location ID 15012, the Length is from one to twenty 15014. The CDT LocationPartyID 15000 may be a restricted CDT.

The PartyPartyID is the proprietary identifier assigned by a party. The party that assigned this identifier may derive from the context of the message that the LocationPartyID uses.

The CDT LocationPartyID 15000 represents a projection of the GDT LocationID, which may not contain attributes. In the XML instance, "Party" is replaced with "Partner Role Type" (e.g., LocationBuyerID, and the like). In contrast to LocationStandardID, the use of the CDT LocationPartyID 15000 is role-dependent (e.g., as an ID assigned by the Buyer). SchemeID and VersionID may be included as attributes to differentiate between several schemes.

(lllll) LocationStandardID

A CDT LocationStandardID 15100 is a standardized identifier for a location, whereby the identification scheme used is controlled by an agency from the code list DE 3055. A location is a logical or a physical place. An example of CDT LocationStandardID 15100 is:

```
<LocationStandardID
        schemeAgencyID ="009">
4012345678910
</LocationStandardID>.
```

In the above example, 009 stands for EAN.UCC (International Article Numbering association) from the code list UN/EDIFACT DE 3055.

The structure of CDT LocationStandardID 15100 is depicted in FIG. 151. The CDT Location Standard ID 15100 includes attribute schemeAgencyID. For the CDT LocationStandardID 15100, the Object Class is Location 15102, Property Quality is Standard 15104, the Property is Identification 15106, the Representation/Assocation is Identifier 15108, the Type is GDT 15110, the Type Name is Location ID 15112, and the Length is thirteen 15114. The CDT LocationStandardID 15100 may be a restricted CDT.

For the Scheme Agency ID 15118, the Category is Attribute 15120, the Object Class is Identification Scheme Agency 15122, the Property is Identification 15124, the Representation/Assocation is Identifier 15126, the Type is xsd 15128, the Type Name is Token 15130, and the Length is three 15132. The Cardinality is one 15134. The schemeAgencyID 15118 identifies the agency that manages an identification scheme. The agencies from DE 3055 may be used as the default, but the roles defined in DE 3055 may not be used. In an embodiment, the supported codes are 009 (EAN.UCC) for the 13-character Global Location Number (GLN), and 116 (ANSI ASC X12) for the 13-character DUNS+4, an enhancement to DUNS (Data Universal Numbering System from Dun & Bradstreet) for location identification.

The CDT LocationStandardID 15100 represents a projection of the GDT LocationID, in which the attribute schemeAgencyID is contained. This indicates the standardization organization that assigned the ID.

In an embodiment, the attribute schemeAgencyID is a mandatory attribute. SchemeID and VersionID may be included as attributes to differentiate between several schemes.

(mmmmm) LogItem

A GDT LogItem 15200 is a log message that is generated when an application is executed. An example of GDT LogItem 15200 is:

```
<LogItem>
<TypeID>001(/CCM/)</TypeID>
<SeverityCode>3</SeverityCode>
<Note>Catalog CAMERAS could not be published</Note>
<WebAddress>http://pgwdf0123.sap.corp:12345/sap/ccm/
messagedetail&language=EN&id=001(/CCM/)&param1=CAMERAS
</WebAddress>
</LogItem>.
```

The structure of GDT LogItem 15200 is depicted in FIG. 152. The GDT LogItem 15200 includes elements TypeID, SeverityCode, Note, and WebAddress. For the GDT LogItem 15200, the Representation/Association is Details 15202. The GDT LogItemTypeID 15200 may not be confused with sequential numbering for the messages in a log. The GDT LogItemTypeID 15200 does not require the attributes to be listed for the CCT Identifier, since these are taken from the context.

TypeID is a unique identification of the type of a log entry (within the application that generates the log). For example, when a catalog is published, a log can be generated containing several items concerning the successful publication of a catalog item. Since these log entries may be similar, they all have the same TypeID, although the respective catalog items are inserted dynamically in a text pattern that corresponds to the message type. For the Type ID 15204, the Category is Element 15206, the Object Class is Log Item 15208, the Property is Type Identification 15210, the Representation/Association is Identifier 15212, the Type is CCT 15214, the Type Name is Identifier 15216, and the Length is from one to forty 15218. The Cardinality is zero or one 15220. The GDT LogItem 15200 may be a restricted 15222.

Severity Code is the severity of the log message. For the Severity Code, the Category is Element 15226, the Object Class is Log Item 15228, the Property is Severity 15230, the Representation/Association is Code 15232, the Type is GDT 15234, the Type Name is Log Item Severity Code 15236, and the Cardinality is zero or one 15238.

Note is a short text for the log message. The GDT LogItemNote 15200 restricts the length permitted in the GDT Note. For the Note 15240, the Category is Element 15242, the Object Class is Log Item 15244, the Property is Note 15246, the Representation/Association is Note 15248, the Type is GDT 15250, the Type Name is 15252, the Length is from one to two-hundred 15254. The Cardinality is one 15256. The Remarks may be restricted 15258.

WebAddress is the address for a document available on the Internet that contains more information about the log entry. For the Web Address, the Category is Element 15262, the Object Class is Log Item 15264, the Property is Web Address 15266, the Representation/Association is Web Address 15268, the Type is CCT 15270, the Type Name is Web Address 15272, and the Cardinality is zero or one 15274.

The URI schemas, for example "http" and "https," are permitted.

The use of the elements TypeID and WebAddress (with or without a specified language) may be optional depending on the business context. It may not be useful to use the SeverityCode for all types of log. The GDT LogItem 15200 can therefore be extended in the future by specifying an attack level, for instance, in the area of Internet security, or for user interaction in the area of e-learning.

In ABAP applications, the element TypeID corresponds to the combination of message class (also known as application area) and message number. These are listed consecutively in accordance with the pattern for the LogItemTypeID: <message number>(/<message class>/).

(nnnnn) LogItemSeverityCode

The GDT LogItemSeverityCode 15300 is the coded representation of the severity in a log message on the execution of an application. An example of GDT LogItemSeverityCode 15300 is: <SeverityCode>2</SeverityCode>.

The structure of GDT LogItemSeverityCode 15300 is depicted in FIG. 153. The GDT Log Item Severity Code 15300, the Object Class is Log Item 15302, the Property is Severity 15304, the Representation/Association Code is 15306, the Type is CCT 15308, the Type Name is Code 15310, and the Length is one 15312.

The GDT LogItemSeverityCode 15300 can have the values 1 through 4. 1 refers to a notification of the execution of an application or an application step if no errors or error possibilities have occurred. 2 refers to a warning of the possibility of an error or an error source in the execution of an application or an application step. 3 refers to a notification of the occurrence of an error during the execution of an application or an application step—for, example with a more precise description of the type of error. 4 refers to a notification of a premature or unforeseen termination of the execution of an application.

The values of the ServiceProcessingLogItemSeverityCode follow the UN/EDIFACT code list 0331 "Report function," with regard to naming and additional values. This code list also focuses on the dialog with a system.

The following linear order applies for the severity: 1<2<3<4. During the execution of an application, log messages may be created that are classified by the severity of the GDT LogItemSeverityCode 15300 (e.g., as an error message).

The ServiceProcessingLogItemSeverityCode may be a proprietary code list with fixed predefined values. Changes to the permitted values involve changes to the interface.

(ooooo) Measure

A GDT Measure 15400 is a physical measurement with the corresponding unit of measurement. An example of GDT Measure 15400 is: <NetWeightMeasure unitCode="KGM">420.5</NetWeightMeasure>, where KGM means kilogram.

The structure of GDT Measure 15400 is depicted in FIG. 154. The GDT Measure 15400 includes attribute unitCode 15410. For the GDT Measure 15400, the Representation/Association is Measure 15402, the Type is xsd 15404, the Type Name is decimal 15406, and the Length is maximum thirteen predecimal units and six decimal units 15408.

For the unitCode 15410, the Category is Attribute 15412, the Object Class is Measure 15414, the Property is Unit 15416, the Representation/Association is Code 15418, the Type is xsd 15420, the Type Name is token 15422, and the Length is from one to three 15424. The Cardinality is one 15426.

GDT Measure 15400 is the result of the measurement of a physical size in relation to a standard size, which may be the standard against which everything else is measured. Positive and negative entries are possible by using the built-in data type "xsd:decimal." Negative entries may be prefixed with a negative sign ("–"). Positive entries do not have to be prefixed with a positive sign ("+").

GDT Measure 15400 can be used to specify physical business sizes. Examples of such measurements are the height, width, length, weight, and volume of a handling unit, or the latitude or longitude of a geographic location.

(ppppp) MeasureUnitCode

The GDT MeasureUnitCode 15500 is the coded representation of a non-monetary unit of measurement. A unit of measurement is, for example, a quantity that is either defined by a standard or established by conventions as a particular type of unit. This unit quantity may be the standard of comparison for determining and specifying other quantities of the same type. An example of GDT MeasureUnitCode 15500 is: <MeasureUnitCode>BX</MeasureUnitCode>, where BX stands for box.

The structure of GDT MeasureUnitCode 15500 is depicted in FIG. 155. The GDT Measure Unit Code 15500, the Object Class is Measure Unit 15502, the Representation/Association is Code 15504, the Type is xsd 15506, the Type Name is token 15508, and the Length is from one to three 15510.

The permitted values for GDT MeasureUnitCode 15500 are the "Common Codes" specified in UN/CEFACT Recommendation #20. The Common Code is a sequence of a maximum of three alphanumerical characters. The recommendation is divided into three levels. Each unit belongs to a level. Levels 1 and 2 contain physical units: level 1 contains SI units and level 2 contains SI-equivalent units. Level 3 contains other "informative" units of measurement that are not assigned to level 1 or 2.

In particular, UN/CEFACT Recommendation #20 contains codes for physical units (Physical Measure Units) such as meters, kilograms, or seconds and units that derive from them such as cubic meters, hours, and Newtons, as well as country-specific and industry-specific physical units.

A distinction may be made between Common Code and the representation symbol of a unit. A standardized representation symbol may be available.

(qqqqq) MeasureUnitMeaningCode

The GDT MeasureUnitMeaningCode 15600 is a coded representation of the meaning of a physical unit of measurement. An example of GDT MeasureUnitMeaningCode 15600 is: <MeasureUnitMeaningCode>E17</MeasureUnitMeaningCode>.

The structure of GDT MeasureUnitMeaningCode 15600 is depicted in FIG. 156. The GDT Measure Unit Meaning Code 15600, the Object Class is Measure Unit 15602, the Property is Meaning 15604, the Representation/Association is Code 15606, the Type is CCT 15608, the Type Name is Code 15610, and the Length is three 15612. The GDT MeasureUnitMeaningCode 15600 may be restricted.

The possible values may be taken from the IEC61360 standard. For example, the unit 5 kA/m can be derived in different ways and describes different properties, such as longitudinal currents, magnetic field strength, or magnetization.

(rrrrr) MessageTypeCode

The GDT MessageTypeCode 15700 is a coded representation of the (business) type of a message. A message type describes the nature of (business) messages of the same kind. An example of GDT MessageTypeCode 15700 is: <MessageTypeCode>0101</MessageTypeCode>.

The structure of GDT MessageTypeCode 15700 is depicted in FIG. 157. For the GDT Message Type Code 15700, the Object Class is Message 15702, the Property is Type Code 15704, the Representation/Association is Code 15706, the Type is CCT 15708, the Type Name is Code 15710, and the Length is four 15712. The GDT MessageTypeCode 15700 may be a restricted GDT.

The permitted values for the GDT MessageTypeCode 15700 are described in the table below.

| Code | Name | Description |
|---|---|---|
| 0060 | PurchaseContractLegal-DocumentRequest | A PurchaseContractLegalDocumentRequest is a request from Purchase Contract Management to Document Builder to create from purchase contract data a contract text conforming to legal standards. |
| 0061 | PurchaseContractLegal-DocumentNotification | A PurchaseContractLegalDocumentNotification is a notification from Document Builder to Purchase Contract Management about a legal contract. |
| 0062 | PurchaseContractUse-Request | A PurchaseContractUseRequest is a request from Purchase Contract Management to Purchasing to use the transmitted purchase contract or to take into account transmitted changes of the purchase contract. |
| 0063 | PurchaseContractUse-Confirmation | A PurchaseContractUseConfirmation is a confirmation from Purchasing to Purchase Contract Management about the use or change, respectively, of a transmitted purchase contract. |
| 0064 | PurchaseContractRelease-Notification | A PurchaseContractReleaseNotification is a notification from Purchasing to Purchase Contract Management about a purchase contract release. |
| 0077 | SourceOfSupplyNotification | A SourceOfSupplyNotification is a notice to Supply Chain Planning about available sources of supply. |
| 0080 | CatalogueUpdateNotification | A CatalogueUpdateNotification is a notice from a catalogue provider to an interested party about a new catalogue transmitted in the message or about changes to an existing catalogue transmitted in the message. |
| 0081 | CataloguePublicationRequest | A CataloguePublicationRequest is a request from catalogue authoring to the Catalogue Search Engine (the publishing system) to publish a new or changed catalogue or to delete an already published catalogue (the catalogue is possibly split into several transmission packages). |
| 0082 | CataloguePublicationTransmission PackageNotification | A CataloguePublicationTransmissionPackage otification is the notification of the Catalogue Search Engine (the publishing system) to Catalogue Authoring about a package of a catalogue publication transmission and information about the reception of this package and the validity of its content. |
| 0083 | CataloguePublication-Confirmation | A CataloguePublicationConfirmation is the confirmation of the Catalogue Search Engine (the publishing system) to the Catalogue Authoring whether the publication or deletion of a Catalogue requested by a CataloguePublicationRequest was successful or not. |
| 0084 | CataloguePublication-TransmissionCancelation-Request | A CataloguePublicationTransmissionCancellation equest is the request of Catalogue Authoring to Catalogue Search Engine (the publishing system) to cancel the transmission of a Catalogue and to restore an earlier published state (if such exists) of the Catalogue. Moreover, no more packages are sent for this transmission. |
| 0085 | CataloguePublication-TransmissionCancelation-Confirmation | A CataloguePublicationTransmissionCancellation onfirmation is the confirmation of Catalogue Search Engine (the publishing system) whether the transmission of a Catalogue has been cancelled successfully and an earlier published state of this catalogue (if such exists) has been restored or not. |
| 0086 | CataloguePublication-TransmissionItemLock-Request | A CataloguePublicationTransmissionItemLock equest is the request of Catalogue Authoring to lock single items of the catalogue contained in the catalogue publication transmission. |
| 0087 | CataloguePublication-TransmissionItemLockConfirmation | A CataloguePublicationTransmissionItemLock onfirmation is the confirmation of Catalogue Search Engine (the publishing system) to Catalogue Authoring whether single items of the catalogue contained in the catalogue publication transmission could be locked or not. To lock means: If the catalogue is not yet published the items must not be published. If the catalogue is already published, the publication of these items must be revoked. |

-continued

| Code | Name | Description |
|---|---|---|
| 0101 | PurchaseOrderRequest | A PurchaseOrderRequest is a request from a purchaser to a seller to deliver goods or provide services. |
| 0102 | PurchaseOrderChange-Request | A PurchaseOrderChangeRequest is a change to a purchaser's request to the seller to deliver goods or provide services. |
| 0103 | PurchaseOrderCancellation-Request | A PurchaseOrderCancellationRequest is the cancellation of a purchaser's request to the seller to deliver goods or provide services. |
| 0104 | PurchaseOrderConfirmation | A PurchaseOrderConfirmation is a confirmation, partial confirmation, or change from a seller to the purchaser, regarding the requested delivery of goods or provision of services. |
| 0120 | PurchaseOrderInformation | A PurchaseOrderInformation is information from a purchasing system for interested recipients about the current state of a purchase order when making, changing, confirming, or cancelling a purchase order. |
| 0121 | PurchaseOrderPlanning-Notification | A PurchaseOrderPlanningNotification is a message by means of which planning applications are notified about those aspects of a purchase order that are relevant for planning. |
| 0130 | PurchaseRequirementRequest | A PurchaseRequirementRequest is a request from a requestor to a purchaser to (externally) procure products (materials, services) (external procurement). |
| 0131 | PurchaseRequirement-Confirmation | A PurchaseRequirementConfirmation is a notice from the purchaser to the requestor about the degree of fulfillment of a requirement. |
| 0140 | ProductDemandInfluencing-EventNotification | A ProductDemandInfluencingEventNotification is a notification about an event that influences the supply or demand of products. |
| 0141 | ProductForecastNotification | A ProductForecastNotification is a notification about future product supply or demand (forecasts). |
| 0142 | ProductForecastRevision-Notification | A ProductForecastRevisionNotification is a notification about the revision of future product supply or demand (forecasts). |
| 0145 | ProductActivityNotification | A ProductActivityNotification is a notice from a buyer to a vendor about product-related activities. Based on this, the vendor can perform supply planning for the buyer. |
| 0151 | RFQRequest | An RFQRequest is the request from a purchaser to a bidder to participate in a request for quotation for a product. |
| 0152 | RFQChangeRequest | An RFQChangeRequest is a change to the purchaser's request to a bidder to participate in the request for quotation for a product. |
| 0153 | RFQCancellationRequest | An RFQCancellationRequest is a cancellation by the purchaser of a request for quotation for a product. |
| 0154 | RFQResultNotification | An RFQResultNotification is a notification by a purchaser to a bidder about the type and extent of the acceptance of a quote or about the rejection of the quote. |
| 0155 | Quote Notification | A QuoteNotification is the quote of a bidder communicated to a purchaser concerning the request for quotation for a product by the purchaser. |
| 0160 | SalesOrderFulfillment-Request | A SalesOrderFulfillmentRequest is a request (or change and cancellation of such a request) from a selling component to a procuring component, to fulfill the logistical requirements (available-to-promise check, scheduling, requirements planning, procurement, delivery, . . . ) of a sales order. |
| 0161 | SalesOrderFulfillment-Confirmation | A SalesOrderFulfillmentConfirmation is a confirmation, partial confirmation, or change from the procuring component to the selling component, regarding a sales order with respect to which procurement has been requested. |
| 0185 | OrderIDAssignment-Notification | An OrderIDAssignmentNotification is a notice from a buyer to a vendor that contains order IDs to be used by the latter for identifying "purchase orders generated by the vendor". |
| 0200 | DeliveryExecutionRequest | A DeliveryExecutionRequest is a request to a warehouse or supply chain execution to prepare and execute the outbound delivery of goods or the acceptance of an expected or announced inbound delivery. |
| 0201 | DeliveryInformation | A DeliveryInformation is a notice about the creation, change, and execution status of a delivery. |
| 0202 | DespatchedDelivery-Notification | A DespatchedDeliveryNotification is a notification communicated to a product recipient about the |

-continued

| Code | Name | Description |
|---|---|---|
| | | planned arrival, pickup, or issue date of a ready-to-send delivery, including details about the content of the delivery. |
| 0203 | ReceivedDeliveryNotification | A ReceivedDeliveryNotification is a notification communicated to a vendor about the arrival of the delivery sent by him to the product recipient, including details about the content of the delivery. |
| 0206 | ReturnDeliveryInstruction-Notification | A ReturnDeliveryInstructionNotification is a notice to a vendor which contains instructions for the return delivery to be executed by him. |
| 0210 | DeliveryScheduleNotification | A DeliveryScheduleNotification is the notification to a vendor about the quantity of a product to be delivered with a certain liability at a certain date in accordance with a given scheduling aggreement between buyer and vendor. |
| 0213 | VendorGeneratedOrder-Notification | A VendorGeneratedOrderNotification is a notification to a customer/buyer about a replenishment order initiated and planned by a vendor/seller so that the former can create a corresponding purchase order. |
| 0214 | VendorGeneratedOrder-Confirmation | VendorGeneratedOrderConfirmation is the confirmation from a customer/buyer that a purchase order has been created for the replenishment order initiated and planned by his vendor/seller. |
| 0216 | Replenishment Order Notification | A ReplenishmentOrderNotification is a notification from Logistics Planning (SCP, vendor) to Logistics Execution (SCE, vendor) about a replenishment order planned for a customer/buyer in order to trigger further processing for the order and prepare the outbound delivery. |
| 0217 | ReplenishmentOrderConfirmation | A ReplenishmentOrderConfirmation is a confirmation from Logistics Execution (SCE, vendor) to Logistics Planning (SCP, vendor) that a replenishment order that is planned for a customer/buyer can be fulfilled. |
| 0235 | CustomsVendorDeclaration-CompleteRequest | A CustomsVendorDeclarationCompleteRequest is the request a buyer makes to a vendor to complete a long-term vendor declaration for customs purposes. |
| 0236 | CustomsVendorDeclaration-Notification | A CustomsVendorDeclarationNotification is a notification from a vendor to inform a buyer of a long-term vendor declaration for customs purposes. A vendor declaration refers to goods that are delivered from the vendor to the buyer. |
| 0240 | ServiceAcknowledgement-Request | A ServiceAcknowledgementRequest is a request by a seller to a purchaser to confirm the services recorded. |
| 0241 | ServiceAcknowledgement-Confirmation | A ServiceAcknowledgementConfirmation is a confirmation (or rejection) of the services recorded. |
| 0250 | InventoryChangeNotification | An InventoryChangeNotification is a notice with detailed information about inventory changes in inventory management, which is used, e.g., by logistics planning. |
| 0251 | InventoryChangeAccounting Notification | An InventoryChangeAccountingNotification is a notice with aggregated information about inventory changes in inventory management, which is tailored to financials. |
| 0252 | InventoryChangeAccounting CancellationRequest | An InventoryChangeAccountingCancellationRequest is a request for the full cancellation of posting information previously sent to financials with respect to a goods movement. |
| 0290 | BillingDueNotification | A BillingDueNotification is a notification about billing-relevant data communicated to an application in which the subsequent operative processing of billing takes place. |
| 0291 | InvoicingDueNotification | An InvoicingDueNotification is a notification about invoicing-relevant data communicated to an application in which the operative verification and creation of invoices takes place, and/or in which "self billing" invoices (evaluated receipt settlement) are created. |
| 0292 | BillingDueCancellation-Request | A BillingDueCancellationRequest is a request for the full cancellation of a BillingDueNotification previously sent to billing. |
| 0293 | InvoicingDueCancellation-Request | An InvoicingDueCancellationRequest is a request for the full cancellation of a InvoicingDueNotification previously sent to invoice verification. |
| 0401 | InvoiceRequest | An InvoiceRequest is a legally binding notice about accounts receivable or accounts payable for delivered goods or provided services - typically a request that payment be made for these goods or services. |

-continued

| Code | Name | Description |
|---|---|---|
| 0402 | InvoiceConfirmation | An InvoiceConfirmation is the respose of a recipient of an invoice to the bill-from-party by which the invoice as a whole is confirmed, rejected, or classified as 'not yet decided'. |
| 0409 | SupplierInvoiceInformation | A SupplierInvoiceInformation is an information from Invoicing about an accepted supplier invoice or its cancelation. |
| 0410 | InvoiceIssuedInformation | An InvoiceIssuedInformation contains information on the following:<br>Which items of an invoice have been billed<br>Which rendered services, delivered products, or credit or debit memo request items have been billed<br>The extent to which the above items have been billed. |
| 0411 | InvoiceAccounting-Notification | An InvoiceAccountingNotification is a notification tailored to financials about incoming or outgoing invoices. |
| 0412 | InvoiceAccounting-CancellationRequest | An InvoiceAccountingCancellationRequest is a request for the full cancellation of posting information previously sent to financials, regarding an incoming or outgoing invoice or credit memo. |
| 0420 | TaxDueNotification | A TaxDueNotification is a notice from tax determination and calculation to the tax register of a company about data relevant for tax reports and tax payments. |
| 0421 | VATDeclarationRequest | A VATDeclarationRequest is a request to a tax authority to handle a tax return for tax on sales/purchases. |
| 0422 | VATDeclarationConfirmation | A VATDeclarationConfirmation is a confirmation about the receipt, completeness, formal correctness and, if necessary, consistency of a tax return for tax on sales/purchases. |
| 0426 | SupplierInvoiceCancellation-ExecutionRequest | A SupplierInvoiceCancellationExecutionRequest is request to execute the cancellation of a supplier invoice. |
| 0427 | SupplierInvoiceSettlement-ReleaseRequest | A SupplierInvoiceSettlementReleaseRequest is the request to release an accepted supplier invoice for settlement. |
| 0430 | PaymentDueNotification | A PaymentDueNotification is a notification about due payments (accounts receivable and accounts payable). |
| 0450 | CreditAgencyReportQuery | A CreditAgencyReportQuery is an inquiry to a credit agency concerning the credit report for a business partner. |
| 0451 | CreditAgencyReport-Response | A CreditAgencyReportResponse is a response from a credit agency concerning the inquiry about the credit report for a business partner. |
| 0452 | CreditWorthinessQuery | A CreditWorthinessQuery is an inquiry to credit management concerning the credit worthiness of a business partner. |
| 0453 | CreditWorthinessResponse | A CreditWorthinessResponse is a response from credit management concerning the inquiry about the credit worthiness of a business partner. |
| 0454 | CreditWorthinessChange-Information | A CreditWorthinessChangeInformation is information about changes of the credit worthiness of a business partner. |
| 0455 | CreditCommitmentQuery | A CreditCommitmentQuery is an inquiry from credit management concerning existing payment obligations of a business partner. |
| 0456 | CreditCommitmentResponse | A CreditCommitmentResponse is a response concerning an inquiry from credit management about existing payment obligations of a business partner. |
| 0457 | CreditCommitmentRecord-Notification | A CreditCommitmentRecordNotification is a notice to credit management about existing payment obligations of business partners. |
| 0458 | CreditWorthinessCritical-PartiesQuery | A CreditWorthinessCriticalPartiesQuery is an inquiry to credit management about business partners, for which the credit worthiness has been rated as critical. |
| 0459 | CreditWorthinessCritical-PartiesResponse | A CreditWorthinessCriticalPartiesResponse is a response from credit management concerning an inquiry about business partners, for which the credit worthiness has been rated as critical. |
| 0460 | CreditPaymentBehaviour-SummaryNotification | A CreditPaymentRecordNotification is a notification to credit management about the payment behavior (payments made, open items, dunning notices) of a business partner. |
| 0601 | PersonnelTimeSheet-Information | A PersonnelTimeSheetInformation is a notice to personnel time management.about personnel times |

-continued

| Code | Name | Description |
|---|---|---|
| | | and personnel time events recorded by an upstream personnel time recording system. |

Message types may be collected in this code list.

(sssss) Name

A GDT Name 15800 is a word or word combination used to name or identify an object. An example of GDT Name 15800 is: <ProductName>NW Feezer SJ-450</ProductName>.

The structure of GDT Name 15800 is depicted in FIG. 158. For the GDT Name 15800, the Object Class is 15802, the Representation/Association is Text 15804, the Type is CCT 15806, and the Type Name is Text 15808.

For the Language Code 15810, the Category is Attribute 15812, the Object Class is Name 15814, the Property is Language Code 15816, the Representation/Association Code 15818, the Type is xsd 15820, the Type Name is Language 15822, the Length is from two to five 15824, and the Cardinality is zero or one 15826. GDT Name 15800 is from the Core Component Type "Text."

The GDT Name 15800 can be language-specific. If the name is language-specific, the attribute "languageCode" can be used to determine the relevant language of the name according to RFC 3066.

GDT Name 15800 may be used for the object label that is typically used in a natural language context. This may be the name of a person, location, service or product, for example.

The GDT Name 15800 can be language-specific. For example, an object can have a different name in different languages. In this case, the language may be specified using the "languageCode" attribute.

(ttttt) Note

A GDT Note 15900 is a brief communication, the language of which is not explicitly specified. An example of GDT Note 15900 is: <DocumentNote>Order 04.04.2002</DocumentNote>.

The structure of GDT Note 15900 is depicted in FIG. 159. For the GDT Note 15900, the Property is Note 15902, the Representation/Association is Text 15904, the Type is CCT 15906, and the Type Name is Text 15908. The GDT Note 15900 may be a restricted GDT. GDT Note 15900 is from the Core Component Type "Text":

GDT Note 15900 may be used to title or briefly describe a complex object. In an embodiment, GDT Note 15900 may not be used as a placeholder when there is no other appropriate global type for an individual element. GDT Note 15900 may not have its own language. Either the language is known from the context or GDT Note 15900 is language-independent.

(uuuuu) ObjectStructureRelationshipTypeCode

The GDT ObjectStructureRelationshipTypeCode 16000 is a coded representation of the type of a business relationship between objects of the same object type, and is used to create structures (hierarchies or networks) on these objects. An example of GDT ObjectStructureRelationshipTypeCode 16000 is: <ObjectStructureRelationshipTypeCode>001</ObjectStructureRelationshipTypeCode>.

The structure of GDT ObjectStructureRelationshipTypeCode 16000 is depicted in FIG. 160. The GDT Object Structure Relationship Type Code 16000, the Object Class is Object Structure Relationship 16002, the Property is Type Code 16004, the Representation/Association is Code 16006, the Type is CCT 16008, the Type Name is Code 16010, and the Length is three 16012. The GDT ObjectStructureRelationshipTypeCode 16000 may be a restricted GDT.

ObjectStructureHierarchyRelationshipTypeCode can have the values 001 through 006. 001 means the relationship is a bill of materials relationship. 002 means the relationship is a grouping relationship. The object involved in this relationship is part of a logical grouping to the other object. 003 means the relationship is a discount-in-kind relationship. 004 means the relationship is a spare-part relationship. 005 means the relationship is an accessories relationship. 006 means the relationship is a substitute-product relationship.

GDT ObjectStructureRelationshipTypeCode 16000 is used for typing relationships between objects of a single object type, for example, relationships between products (e.g., a spare-part relationship), relationships between (document) items (e.g., a discount-in-kind relationship), or relationships between project plans.

The typing of relationships between objects of different object types may not be covered by this GDT. This includes relationships between a product and a business document, between a marketing plan and a marketing campaign, between a business document and an item of a document, or between a project plan and a project plan element.

Furthermore, the GDT ObjectStructureRelationshipTypeCode 16000 may be restricted to the typing of relationships from a purely business perspective. In an embodiment, technical typings (e.g., "implemented by" or "generated from") may not be covered.

(vvvvv) OrdinalNumberValue

A GDT OrdinalNumberValue 16100 is a number that indicates the position of an element in a linearly ordered set that is ordered according to particular factors. An example of GDT OrdinalNumberValue 16100 is: <OrdinalNumberValue>4</OrdinalNumberValue>.

The structure of GDT OrdinalNumberValue 16100 is depicted in FIG. 161. The GDT Ordinal Number Value 16100, the Representation/Assocation Quality is Ordinal Number 16102, the Representation/Association is Value 16104, the Type is xsd 16106, the Type Name is Positive Integer 16108, an the Length is from one to nine 16110.

Positive, whole numbers smaller than one billion are permitted. GDT OrdinalNumberValue 16100 may be used in a catalog to specify the order of characteristics in a list of characteristics.

(wwwww) PartialDelivery

A GDT PartialDelivery 16200 is the maximum number of partial deliveries that may/can be carried out to deliver the ordered quantity of an item. An example of GDT PartialDelivery 16200 is:

```
<PartialDelivery>
        <MaximalNumber>
            9
        <\MaximalNumber>
<\ PartialDelivery>.
```

The structure of GDT PartialDelivery 16200 is depicted in FIG. 162. For the GDT Partial Delivery 16200, the Object Class is Partial Delivery 16202 and the Representation/Association is Details 16204.

For Category Element 16206, the Object Class is Partial Delivery 16208, the Property is Maximal Number 16210, the Representation/Association is Integer 16212, the Type is GDT 16214, the Type Name is Integer Value 16216, the Length is one 16218. The Cardinality is zero or one 16220. For Category Element 16206, zero not allowed 16222. A length of 1 in the MaximalNumber field means that a maximum of up to 9 partial deliveries will be accepted to fulfill the ordered quantity. The specification is made as a whole number without any plus/minus sign (e.g., 9). No entry in this field means that complete delivery is wanted and no partial delivery is allowed even if the UnlimitedIndicator is not set.

For Category Element 16224, the Object Class is Partial Delivery 16226, the Property is Unlimited Indicator 16228, the Representation/Association is Indicator 16230, the Type is GDT 16232, the Type Name is Value Unlimited Indicator 16234, and the Length is one 16236. The Cardinality is zero or one 16238. The UnlimitedIndicator can have the values 1 (true) or 0 (false). True means that a number of partial deliveries will be accepted. False means that a number of partial deliveries will not be accepted. The fields MaximalNumber and UnlimitedIndicator are mutually exclusive, i.e., entering “true” or “1” in the UnlimitedIndicator and simultaneously making an entry in Number is not logical.

PartialDelivery comprises two child elements, Number from the CCT: Numeric and UnlimitedIndicator from the CCT: Indicator.

GDT PartialDelivery 16200 indicates the maximum number of partial deliveries (including the first delivery) that may be performed to deliver the ordered quantity of an item.

(xxxxx) PartyID

A GDT PartyID 16300 is a unique identifier for a party. A party is a natural person, organization, or group in which a company has a business or intra-enterprise interest. This could be a person, organization, or group within or outside of the company. An example of GDT PartyID 16300 is:

Example 1

Standard ID, Standard Agency

```
<PartyID     schemeID=“DUNS”
                 schemeAgencyID=“016”>
      065055766
</PartyID>
065055766 = Bosch at DUNS
016 = DUNS from Code List DE 3055
Example 2: Proprietary ID, Proprietary Agency
<PartyID     schemeID=“PartyID”
                 schemeAgencyID=“BPL_300”>
                 schemeAgencySchemeAgencyID=“ZZZ”>
      4711
</PartyID>.
```

In the above examples, 4711 refers to the business partner in system BPL__300 with SAP CMDMm and ZZZ refers to a proprietary agency from Code List DE 3055.

The structure of GDT PartyID 16300 is depicted in FIG. 163. The GDT PartyID 16300 includes attributes schemeID 16316, schemeAgencyID 16334, schemeAgencySchemeID 16352, and schemeAgencySchemeAgencyID 16370. For the GDT PartyID 16300, the Object Class is Party 16302, the Property is Identification 16304, the Representation/Association term is Identifier 16306, the Type term is CCT 16308, the Type Name term is Identifier 16310, and the Length is from one to sixty 16312. The GDT PartyID 16300 may be a restricted GDT.

For the schemeID 16316, the Category is Attribute 16318, the Object Class is IdentificationScheme 16320, the Property tem is Identification 16322, the Representation/Association term is Identifier, the Type term is xsd 16326, the Type Name term is Token 16328, and the Length is from one to sixty 16330. The Cardinality between the GDT PartyID 16300 and the schemeID 16316 is zero or one 16332.

For the schemeAgencyID 16334, the Category is Attribute 16336, the Object Class is IdentificationSchemeAgency 16338, the Property is Identification 16340, the Representation/Association term is Identifier 16342, the Type term is xsd 16344, the Type Name term is Token 16346, and the Length is from one to sixty 16348. The Cardinality between the GDT PartyID 16300 and the schemeAgencyID 16334 is zero or one 16350.

For the schemeAgencySchemeID 16352, the Category is Attribute 16354, the Object Class is IdentificationSchemeAgency 16356, the Property is Scheme 16358, the Representation/Association term is Identifier 16360, the Type term is xsd 16362, the Type Name term is Token 16364, and the Length is from one to sixty 16366. The Cardinality between the GDT PartyID 16300 and the schemeAgencySchemeID 16352 is zero or one 16368.

For the schemeAgencySchemeAgencyID 16370, the Category is Attribute 16372, the Object Class is IdentificationSchemeAgency 16374, the Property is SchemeAgency 16376, the Representation/Association term is Identifier 16378, the Type term is xsd 16380, the Type Name term is Token 16382, and the Length is three 16384. The Cardinality between the GDT PartyID 16300 and the schemeAgencySchemeAgencyID 16370 is zero or one 16386.

The definition of the GDT PartyID 16300 includes persons, organizations, and party groups. The name GDT PartyID 16300 was intentionally chosen instead of BusinessPartnerID in order to be able to use the GDT for parties in which there is no direct business interest (e.g., employees' partners or children). The GDT is intended to cover roles which a party might assume. IDs that identify a party are permitted. IDs that identify a location may not be permitted.

GDT PartyID 16300 is used for software representation of a natural person, a legal person (organization), or a grouping of natural persons, legal persons, and their groupings (business partner group). The different roles of a party (e.g., Buyer, Vendor, Supplier) can be used in accordance with the LBL standard to enhance element names (e.g., BuyerPartyID).

(yyyyy) PartyInternalID

A CDT PartyInternalID 16400 is a proprietary identifier for a party. A party is a natural person, organization, or group in which a company has a business or intra-enterprise interest. This could be a person, organization, or group within or outside of the company. An example of a GUID of a party is:

<PartyInternalID schemeID=“PartyGUID” schemeAgencyID=“MPL-002”>1C743CEC501F6A4D8826C7EC5A8554B9</PartyInternalID>

In the example, schemeID=“PartyGUID” indicates that the scheme “PartyGUID” was used to identify the party, and schemeAgencyID=“MPL__002” indicates that the scheme was assigned by the business system “MPL__002.”

The following is an example of a party ID of a party:

<PartyInternalID schemeID=“PartyID” schemeAgencyID=“MPL__002”>4711</PartyInternalID>.

The structure of CDT PartyInternalID 16400 is depicted in FIG. 164. The CDT PartyInternalID 16400 includes attributes schemeID 16418 and schemeAgencyID 16436. For the CDT PartyInternalID 16400, the Object Class is Party 16402, the Property Qualifier term is Internal 16404, the Property is Identification 16406, the Representation/Association term is Identifier 16408, the Type term is GDT 16410, the Type Name term is PartyID 16412, and the Length is from one to thirty-two 16414. The CDT PartyInternalID 16400 may be a restricted CDT.

For the schemeID 16418, the Category is Attribute 16420, the Object Class is IdentificationScheme 16422, the Property is Identification 16424, the Representation/Association term is Identifier 16426, the Type term is xsd 16428, the Type Name term is Token 16430, and the Length is from one to sixty 16432. The Cardinality between the CDT PartyInternalID 16400 and the schemeID 16418 is zero or one 16434.

For the schemeAgencyID 16436, the Category is Attribute 16438, the Object Class is IdentificationSchemeAgencyID 16440, the Property is Identification 16442, the Representation/Association term is Identifier 16444, the Type term is xsd 16446, the Type Name term is Token 16448, and the Length is from one to sixty 16450. The Cardinality between the CDT PartyInternalID 16400 and the schemeAgencyID 16436 is zero or one 16452.

PartyGUID and PartyID are schemes provided for scheme ID. PartyGUID identifies a party via a Global Unique Identifier, and PartyID identifies a party via an identification number. ShemeAgencyID identifies a business system in which the identifier was assigned.

The CDT PartyInternalID 16400 represents a projection of the GDT "PartyID," in which the attributes "schemeID" and "schemeAgencyID" are contained for describing an internally assigned ID. If an attribute is not explicitly assigned in the use of the CDT, it may be determined through the context.

The CDT PartyInternalID 16400 is used when both sender and recipient can access shared master data, e.g., during internal communication.

(zzzzz) PartyPartyID

A CDT PartyPartyID 16500 is an identifier for a party assigned by a party. A party is a natural person, organization, or group in which a company has a business or intra-enterprise interest. This could be a person, organization, or group within or outside of the company. An example is:

<BuyerPartySellerID>ABC</BuyerPartySellerID>

(the ID assigned by the seller for the Buyer).

The structure of CDT PartyPartyID 16500 is depicted in FIG. 165. For the CDT PartyPartyID 16500, the Object Class is Party 16502, the Property Qualifier term is Party 16504, the Property is Identification 16506, the Representation/Association term is Identifier 16508, the Type term is GDT 16510, the Type Name term is PartyID 16512, and the Length is from one to sixty 16514. The CDT PartyPartyID 16500 may be a restricted CDT.

The CDT PartyPartyID 16500 is the proprietary identifier assigned by a party. The party (in its role) that assigned this identifier may derive from the context of the message that the CDT PartyPartyID 16500 uses. The CDT PartyPartyID 16500 limits the general identifier PartyID. In contrast to "PartyStandardID," the use of the "PartyPartyID" is role-dependent (e.g., as an ID assigned by the Buyer). The party that assigns the ID is indicated by its role. The "Party" is replaced with the "partner role type" (e.g., PartySellerID). The SchemeID and schemeVersionID may be included as attributes to differentiate between several schemes. (See also PartyID and PartyStandardID).

(aaaaaa) PartyStandardID

A CDT PartyStandardID 16600 is a standardized identifier for a party, and the identification scheme used is controlled by an agency from the code list DE 3055. A party is a natural person, organization, or business partner group in which a company has a business or intra-enterprise interest. This could be a person, organization, or group within or outside of the company. An example is:

```
<BuyerParty>
        ...
        <StandardID schemeAgencyID="016">123456789
        </PartyStandardID>
        ...
</BuyerParty>
```

(the standardID assigned for the buyer).

The structure of PartyStandardID is depicted in FIG. 166. The CDT PartyStandardID 16600 includes attribute schemeAgencyID 16618. For the CDT PartyStandardID 16600, the Object Class is Party 16602, the Property Qualifier term is Standard 16604, the Property is Identification 16606, the Representation/Association term is Identifier 16608, the Type term is GDT 16610, the Type Name term is PartyID 16612, and the Length is from one to thirteen. The CDT PartyStandardID 16600 may be a restricted CDT.

For the schemeAgencyID 16618, the Category is Attribute 16620, the Object Class is IdentificationSchemeAgency 16622, the Property is Identification 16624, the Representation/Association term is Identifier 16626, the Type term is xsd 16628, the Type Name term is Token 16630, and the Length is three 16632. The Cardinality between the CDT PartyStandardID 16600 and the schemeAgencyID 16618 is one 16634.

The attribute 'schemeAgencyID' can contain values from the code list DE 3055. The codes which are supported for schemeAgencyID are: 1) 009 (EAN.UCC) for the 13-character Global Location Number (GLN); 2) 016 (Dun&Bradstreet Corporation) for the 9-character DUNS (Data Universal Numbering System); and 3) 182 (US, Standard Carrier Alpha Code (Motor) Organization) for the 2-to-4-character SCAC (Standard Carrier Alpha Code).

CDT PartyStandardID 16600 limits the general identifier PartyID to standard identifiers, whose scheme was assigned by a standardization organization from code list DE 3055. IDs that identify a party are permitted. IDs that identify a location may not be permitted. In contrast to PartyPartyID, use of CDT PartyStandardID 16600 is not role dependent. See also PartyID and PartyPartyID.

(bbbbbb) PaymentCard

A GDT PaymentCard 16700 is an identification card that authorizes the holder to settle invoices without cash with contract companies connected to the payment system. An example is:

```
CreditCard VISA:
<PaymentCard>
        <ID schemeAgencyID="XYZ"
schemeAgencySchemeID="9362"schemeAgencySchemeAgencyID="5">
5555222200008888</ID>
        <ReferenceID>8765432</ReferenceID>
        <SequenceID>01</SequenceID>
        <HolderName>Mayermann</HolderName>
        <ExpiryDate>2005-05-31</ExpiryDate>
</PaymentCard>
CustomerCard IKEAGold:
<PaymentCard>
```

-continued

```
        <ID schemeID="IKEAGold" schemeAgencyID="124224"
schemeAgencySchemeID="DUNS"
schemeAgencySchemeAgencyID="16">
                AEIBDEFXXXX
        </ID>
        <ReferenceID>8765432</ReferenceID>
        <HolderName>Mayermann</HolderName>
        <ExpiryDate>2005-05-31</ExpiryDate>
    </PaymentCard>.
```

The structure of GDT PaymentCard 16700 is depicted in FIG. 167. The GDT PaymentCard 16700 includes elements ID 16706, ReferenceID 16722, SequenceID 16740, Holder 16760, and ExpirationDate 16778. For the GDT Payment Card 16700, the Object Class is Payment Card 16702, and the Representation/Association term is Details 16704.

The ID is an unique identifier for a payment card. For the ID 16706, the Category is Element 16708, the Object Class is Payment Card 16710, the Property is Identification 16712, the Representation/Association term is Identifier 16714, the Type term is GDT 16716, and the Type Name term is PaymentCardID 16718. The Cardinality between the GDT PaymentCard 16700 and the ID 16706 is one 16720.

The ReferenceID is an additional reference number that is required for certain credit cards or customer cards for security purposes to guarantee error-free processing. For the ReferenceID 16722, the Category is Element 16724, the Object Class is PaymentCard 16726, the Property is Reference Identification 16728, the Representation/Association term is Identifier 16730, the Type term is CCT 16732, the Type Name term is Identifier 16734, and the Length is from one to twenty-five 16736. The Cardinality between the GDT PaymentCard 16700 and the ReferenceID 16722 is zero or one 16738. The ReferenceID 16722 may be restricted 16740.

The SequenceID is a sequence number of the payment card that indicates that the bank has issued more than one card for an account, and identifies which card is being used in this case.

For the SequenceID 16740, the Category is Element 16742, the Object Class is PaymentCard 16744, the Property is Sequence Identification 16746, the Representation/Association term is Identifier 16748, the Type term is CCT 16750, the Type Name term is Identifier 16752, and the Length is from one to ten 16754. The Cardinality between the GDT PaymentCard 16700 and the SequenceID 16740 is zero or one 16756. The SequenceID 16740 may be restricted 16758.

The Holder is the name of the cardholder (name of a person or company; for a person's name, both first and last names are usually included). For the Holder 16760, the Category is Element 16762, the Object Class is Payment Card 16764, the Property is Holder 16766, the Representation/Association term is Text 16768, the Type term is CCT 16770, the Type Name term is text 16772, and the Length is from one to forty 16774. The Cardinality between the GDT PaymentCard 16700 and the Holder 16760 is zero or one 16776.

The ExpirationDate is an expiration date of the payment card. For the ExpirationDate 16778, the Category is Element 16780, the Object Class is Payment Card 16782, the Property is Expiration Date 16784, the Representation/Association term is Date 16786, the Type term is GDT 16788, and the Type Name term is Date 16790. The Cardinality between the GDT PaymentCard 16700 and the ExpirationDate 16778 is one 16792.

No restriction is placed on company-specific customer cards in terms of the possible identifications based on UN/CEFACT code list DE 3055. The GDT PaymentCard 16700 is used when the payment card is a credit card that belongs to one of the listed standard types, or a company-specific customer card.

(cccccc) PaymentCardID

A GDT PaymentCardID 16800 is a unique identifier for a payment card. An example is:

```
    CreditCard VISA:
    <PaymentCardID
        schemeAgencyID="XYZ" schemeAgencySchemeID="9362"
schemeAgencySchemeAgencyID="5">5555222200008888
    </IPaymentCardID>
    CustomerCard IKEAGold:
    <PaymentCardId>
        schemeID="IDEAGold" schemeAgencyID="124224"
schemeAgencySchemeID="DUNS" schemeAgencySchemeAgencyID="16"> AEIBDEFXXXX
    </PaymentCardID>
```

CustomerCard IKEA Gold:

The structure of GDT PaymentCardID 16800 is depicted in FIG. 168. The GDT PaymentCardID 16800 includes attributes schemeID 16820, schemeAgencyID 16838, schemeAgencySchemeID 16856, and schemeAgencySchemeAgencyID 16874. For the GDT PaymentCardID 16800, the Category is Element 16802, the Object Class is Payment Card 16804, the Property is Identification 16806, the Representation/Association term is Identifier 16808, the Type term is CCT 16810, the Type Name term is Identifier 16812, and the Length is from one to twenty-five 16814. The Cardinality of the GDT PaymentCardID 16800 is one 16816. The GDT PaymentCardID 16800 may be a restricted GDT.

For the schemeID 16820, the Category is Attribute 16822, the Object Class is Identification Scheme 16824, the Property is Identification 16826, the Representation/Association term is Identifier 16828, the Type term is xsd 16830, the Type Name term is token 16832, and the Length is from one to sixty 16834. The Cardinality between the GDT PaymentCardID 16800 and the schemeID 16820 is one 16836.

For the schemeAgencyID 16838, the Category is Attribute 16840, the Object Class is Identification Scheme Agency 16842, the Property is Identification 16844, the Representation/Association term is Identifier 16846, the Type term is xsd 16848, the Type Name term is token 16850, and the Length is from one to sixty 16852. The Cardinality between the GDT PaymentCardID 16800 and the schemeAgencyID 16838 is one 16854.

For the schemeAgencySchemeID 16856, the Category is Attribute 16858, the Object Class is Identification Scheme Agency 16860, the Property is Scheme 16862, the Representation/Association term is Identifier 16864, the Type term is xsd 16866, the Type Name term is token 16868, and the Length is from one to sixty 16870. The Cardinality between the GDT PaymentCardID 16800 and the schemeAgencySchemeID 16856 is zero or one 16872.

For the schemeAgencySchemeAgencyID 16874, the Category is Attribute 16876, the Object Class is Identification Scheme Agency 16878, the Property is Scheme Agency 16880, the Representation/Association term is Identifier 16882, the Type term is xsd 16886, the Type Name term is token 16886, and the Length is three 16888. The Cardinality between the GDT PaymentCardID 16800 and the schemeAgencySchemeAgencyID 16874 is zero or one 16890.

No restriction is placed on company-specific customer cards in terms of the possible identifications based on UN/CEFACT code list DE 3055. In an embodiment, the identifier for the standard types is based on the BIC (Bank Identification Code), whose scheme is standardized according to ISO 9362:1994. Therefore, the attribute "schemeAgencySchemeID" is set to 9362 for standard types, and the attribute "schemeAgencySchemeAgencyID" is set to '5' for ISO. Standard types are registered using SWIFT. These standard types can be queried at the following link: http://www.swift.com/biconline/index.cfm Then, e.g., "XYZ" is the result for attribute "schemeAgencyID."

The responsible organizations for the company-specific customer cards are identified via a generally valid and standardized identification, like that of Dun & Bradstreet. For this, the attribute "schemeID" may contain the identifier of the corresponding identification list (e.g., IKEAGold). In the attribute "schemeAgencyID," the particular unique identification may correspond to the responsible organization according to the international standardized identifier list (for example, DUNS). The attribute "schemeAgencySchemeID" contains the identification of the scheme on which the organization identifier is based, and the attribute "schemeAgencySchemeAgencyID" contains the particular identification according to the DE 3055 code list, which is responsible for the international and standardized identification scheme for the responsible organization of the company-specific customer card.

(dddddd) PaymentFormCode

The CDT PaymentFormCode 16900 is a coded representation of the payment form. The payment form is the way in which, e.g., goods or services are paid for. An example is: <PaymentFormCode>01</PaymentFormCode>.

The structure of CDT PaymentFormCode 16900 is depicted in FIG. 169. For the CDT PaymentFormCode 16900, the Object Class is Payment 16902, the Property is FormCode 16904, the Representation/Association term is Code 16906, the Type term is CCT 16908, the Type Name term is Code 16910, and the Length is two 16912. The CDT PaymentFormCode 16900 may be a restricted CDT.

CDT PaymentFormCode 16900 can have the following values: 01) Invoice, which means that the selling company issues an invoice to the buyer; 02) PaymentCard, which means that the buyer pays with credit card, customer card, or generally a payment card; 03) CashOnDelivery, which means that the payment is made on delivery; and 04) BankCollection, which means that the payment is carried out using automatic debit.

Existing standardized code lists (e.g., UN/EDIFACT code list '4461', Payment Means Code) may not cover these values. Consequently, the above code list may be used for this GDT, and this code list is submitted to the responsible standardization body. The CDT PaymentFormCode 16900 is used to determine the payment form when goods or services are ordered. The code "Invoice" is the default value.

The CDT PaymentFormCode 16900 does not contain additional information needed for payment processing, e.g., the type and number of the credit card or the number of the bank account from which the payment should be debited. Some of this information is transmitted in other parts of the message, and some is transmitted in separate messages. The CDT PaymentFormCode 16900 should not be confused with the PaymentMethod, which describes in detail how a payment is carried from FI, HR, or the Treasury.

Some parts of the UN/EDIFACT code list 4461 (Payment Means Code) (or ASC X12 107) can also be used for the PaymentMethodCode, including 1) Domestic bank transfer; 2) Foreign bank transfer; 3) Postal transfer; 4) Bank direct debit; 5) Check; 6) Order check; 7) Bank check; and 8) Bill of exchange.

A suitable payment method is determined based on the payment form. These two terms cannot be placed together in one list, as shown below.

| PaymentFormCode | >>> | PaymentMethodCode |
|---|---|---|
| Invoice | | BankTransfer, Check |
| PaymentCard | | PaymentCard |
| CashOnDelivery | | Check, Cash |
| BankCollection | | DirectDebit |

Up until CRM 4.0, three values (PaymentCard, CashOnDelivery, Per Invoice) are used. If a payment is to be made per invoice, it is not necessary to specify a payment form. To use a new value, an implementation for the new code may be made; therefore, CRM may not accept other values.

(eeeeee) Percent

A GDT Percent 17000 is a number that relates to the comparison FIG. 100. An example is: <ProductTaxPercent>16</ProductTaxPercent>.

The structure of GDT Percent 17000 is depicted in FIG. 170. GDT Percent 17000 is given as a percent value. For the GDT Percent 17000, the Category is Element 17002, the Representation/Association term is Percent 17004, the Type term is xsd 17006, the Type Name term is decimal 17008, and the Length is maximum ten predecimal values and 6 decimal values 17010.

Positive and negative values can be used by using the built-in data type "xsd:decimal." Negative values may be prefixed with a negative sign ("−"). However, positive values do not require a positive sign "+" prefix.

No measurements or currencies are specified in GDT Percent 17000.

GDT Percent 17000 can be used to represent a percentage that indicates how many hundredths of a basic value are to be calculated. The result of the calculation is the proportion in percent of, e.g., amounts, values, rates, discounts, and taxes. Further examples for the application of Percent are proportion and comparison information, such as dividends and earnings, or a percentage comparison of target and actual business results, or trade or amount margins.

Information on measurements or currencies may be expressed in the basic value, for example:

```
<Total>
<Amount currencyCode="EUR">777.95</Amount>
<ProductTaxPercent>16</ProductTaxPercent>
</Total>
```

Here the value added tax rate of 16 percent is specified for the basic value of 777.95 EUR.

(ffffff) PersonName

A GDT PersonName 17100 contains the parts of a natural person's name. An example is:

```
<PersonName>
    <FormattedName>Mr. Paul John Tester</FormattedName>
    <LegalName>Paul John Tester</LegalName>
    <GivenName></GivenName>
    <PreferredGivenName>Paul</PreferredGivenName>
    <MiddleName>John</MiddleName>
    <Family>
        <FamilyName>Tester</FamilyName>
        <PrimaryIndicator>true</PrimaryIndicator>
        <FamilyNamePrefix></FamilyNamePrefix>
    </Family>
    <Affix>
        <AffixName>Mr.</AffixName>
        <AffixCode>FormOfAddress</AffixCode>
    </Affix>
</PersonName>
```

The structure of GDT PersonName 17100 is depicted in FIG. 171. The GDT PersonName 17100 includes elements FormattedName 17108, LegalName 17126, GivenName 17144, PreferredGivenName 17162, MiddleName 17180, Family 17198, FamilyName 17111, PrimaryIndicator 17127, FamilyNamePrefix 17147, Affix 17167, AffixName 17179, and AffixCode 17197. For the GDT PersonName 17100, the Category is Element 17102, the Object Class is PersonName 17104, and the Representation/Association term is Details 17106.

The attribute FormattedName 17108 contains, in one string, a formatted name with its pieces in their places. This includes the necessary punctuation. For the FormattedName 17108, the Category is Element 17110, the Object Class is PersonName 17112, the Property is FormattedName 17114, the Representation/Association term is Name 17116, the Type term is xsd 17118, the Type Name term is string 17120, and the Length is eighty 17122. The Cardinality between the GDT PersonName 17100 and the FormattedName 17108 is zero or one 17124.

The attribute LegalName 17126 is the legal name used for legal documentation or other legal purposes. LegalName 17126 contains, in one string, a formatted name with its pieces in their places. This includes the necessary punctuation. For the LegalName 17126, the Category is Element 17128, the Object Class is PersonName 17130, the Property is LegalName 17132, the Representation/Association term is Name 17134, the Type term is xsd 17136, the Type Name term is string 17138, and the Length is eighty 17140. The Cardinality between the GDT PersonName 17100 and the LegalName 17126 is zero or one 17142.

The attribute GivenName 17144 contains the given or chosen name. Also known as a person's first name. If multiple givenNames are used, the order is implied. For the GivenName 17144, the Category is Element 17146, the Object Class is PersonName 17148, the Property is GivenName 17150, the Representation/Association term is Name 17152, the Type term is xsd 17154, the Type Name term is string 17156, and the Length is forty 17158. The Cardinality between the GDT PersonName 17100 and the GivenName 17144 is zero or unbounded 17160.

The attribute PreferredGivenName 17162 contains the chosen name by which the person prefers to be addressed. Note: This name may be a name other than a given name, such as a nickname. For the PreferredGivenName 17162, the Category is Element 17164, the Object Class is PersonName 17166, the Property is PreferredGivenName 17168, the Representation/Association term is Name 17170, the Type term is xsd 17172, the Type Name term is string 17174, and the Length is from one to forty 17176. The Cardinality between the GDT PersonName 17100 and the PreferredGivenName 17162 is zero or one 17178.

The attribute MiddleName 17180 contains a person's middle name or initial. For the MiddleName 17180, the Category is Element 17182, the Object Class is PersonName 17184, the Property is MiddleName 17186, the Representation/Association term is Name 17188, the Type term is xsd 17190, the Type Name term is string 17192, and the Length is from one to forty 17194. The Cardinality between the GDT PersonName 17100 and the MiddleName 17180 is zero or unbounded 17196.

The attribute Family 17198 contains the non-chosen or inherited name. Also known as a person's last name in the Western context. For the Family 17198, the Category is Element 17101, the Object Class is PersonName 17103, the Property is Family 17105, and the Representation/Association term is Detail 17107. The Cardinality between the GDT PersonName 17100 and the Family 17198 is zero or unbounded 17109.

The element FamilyName 17111 describes the non-chosen or inherited name. For the FamilyName 17111, the Category is Element, the Object Class is Family 17113, the Property is FamilyName 17115, the Representation/Association term is Name 17117, the Type term is xsd 17119, the Type Name term is string 17121, and the Length is from one to forty 17123. The Cardinality between the GDT PersonName 17100 and the FamilyName 17111 is one 17125.

The element PrimaryIndicator 17127 allows you to mark one family name to be printed or shown first. For the PrimaryIndicator 17127, the Category is Element 17129, the Object Class is Family 17131, the Property is FamilyNamePrimaryCode 17133, the Representation/Association term is Code 17135, the Type is CCT 17137, the Type Name term is Indicator 17139, and the Length is one 17141. The Cardinality between the GDT PersonName 17100 and the PrimaryIndicator 17127 is zero or one 17143. The PrimaryIndicator 17127 is a no default value 17145.

The element FamilyNamePrefix 17147 contains the PersonName prefix, such as an aristocratic prefix. For the FamilyNamePrefix 17147, the Category is Element 17149, the Object Class is Family 17151, the Property is FamilyNamePrefix 17153, the Representation/Association term is Text 17155, the Type term is xsd 17157, the Type Name term is string 17159, and the Length is from one to twenty 17161. The Cardinality between the GDT PersonName 17100 and the FamilyNamePrefix 17147 is zero or one 17163. The FamilyNamePrefix 17147 may be different from the HR-XML Proposal 17165.

The attribute Affix 17167 contains the remaining parts of the PersonName as defined by the elements AffixName and AffixCode. For the Affix 17167, the Category is Element 17169, the Object Class is PersonName 17171, the Property is Affix 17173, and the Representation/Association term is Detail 17175. The Cardinality between the GDT PersonName 17100 and the Affix 17167 is zero or unbounded 17177.

The element AffixName 17179 contains the affix. For the AffixName 17179, the Category is Element 17181, the Object Class is Affix 17183, the Property is Affix 17185, the Representation/Association term is Name 17187, the Type term is xsd 17189, the Type Name term is string 17191, and the Length is from one to twenty 17193. The Cardinality between the GDT PersonName 17100 and the AffixName 17179 is one 17195.

The element AffixCode 17197 defines the context for the affix. For the AffixCode 17197, the Category is Element 17199, the Object Class is Affix 17102*a*, the Property is AffixCode 17104*a*, the Representation/Association term is Code 17106*a*, the Type is CCT 17108*a*, the Type Name term is Code 17110*a*, and the Length is from one to twenty 17112*a*. The Cardinality between the GDT PersonName 17100 and the AffixCode 17197 is one 17114*a*.

The code=aristocraticTitle, contains titles, such as, Baron, Earl, and so on. The code=formOfAddress, contains the form of address, for example Mr., Mrs., Hon., Dr., or Major. The code=generation, contains terms such as, Sr., Jr., III (the third). The code=qualification, contains the letters used to describe academic or other type qualifications held by a person and/or the distinctions conferred upon them, for example PhD, MD, CPA, or MCSD.

GDT PersonName 17100 is used to identify actual people.

(gggggg) PersonnelTimeEventID

A GDT PersonnelTimeEventID 17200 is a unique ID for a personnel time event. A personnel time event is a change in the execution of services of a personnel resource with which one personnel time ends and another personnel time begins. Such changes can include, e.g., the start of work, interruption of work or end of work. A personnel time event is characterized by a type such as, e.g., "clock-in entry," "clock-out entry," or "start of break." A personnel time event can include additional information (e.g., reference to project, order, cost center) for different target applications (e.g., project system or Controlling). An example is: <PersonnelTimeEventID>1234567890123456</PersonnelTimeEventID>.

The structure of GDT PersonnelTimeEventID 17200 is depicted in FIG. 172. The GDT PersonnelTimeEventID 17200 includes attributes schemeID 17216 and schemeAgencyID 17234. For the GDT PersonnelTimeEventID 17200, the Object Class is Personnel Time Event 17202, the Property is Identification 17204, the Representation/Association term is Identifier 17206, the Type term is GDT 17208, the Type Name term is Identifier 17210, and the Length is from one to forty 17212. The GDT PersonnelTimeEventID 17200 may be a restricted GDT.

The schemeID specifies the scheme according to which the ID was assigned. Currently, the following schemes are provided: 1) PersonnelTimeEventGUID, which identifies the personnel time event via a Global Unique Identifier; and 2) PersonnelTimeTypeID: Identifies the personnel time event via an internal identifier of the scheme agency. For the schemeID 17216, the Category is Attribute 17218, the Object Class is IdentificationScheme 17220, the Property is Identification 17222, the Representation/Association term is Identifier 17224, the Type term is xsd 17226, the Type Name term is Token 17227, and the Length is from one to sixty 17230. The Cardinality between the GDT PersonnelTimeEventID 17200 and the schemeID 17216 is zero or one 17232.

The schemeAgencyID 17234 identifies the business system in which the ID was assigned. For the schemeAgencyID 17234, the Category is Attribute 17236, the Object Class is IdentificationSchemeAgency 17238, the Property is Identification 17240, the Representation/Association term is Identifier 17242, the Type term is xsd 17244, the Type Name term is Token 17246, and the Length is from one to sixty 17248. The Cardinality between the GDT PersonnelTimeEventID 17200 and the schemeAgencyID 17234 is zero or one 17250.

If PersonnelTimeEventGUID is used for schemeID, PersonnelTimeEventID may comprise 1-40 characters. If "PersonnelTimeEventID" is used, PersonnelTimeEventID may comprise 1-16 characters and may be alphanumeric. If schemeID and schemeAgencyID have not been specified, they may be determined from the context.

(hhhhhh) PersonnelTimeEventTypeID

A GDT PersonnelTimeEventTypeID 17300 is a unique ID for a personnel time event type. A personnel time event type is a classification of personnel time events according to personnel time management criteria. A typical criterion is whether the employee is at work or not. Examples are "clock-in entry," "clock-out entry," or "start of break." An example is:

<PersonnelTimeEventTypeID>1234567890123456</PersonnelTimeEventTypeID>

The structure of GDT PersonnelTimeEventTypeID 17300 is depicted in FIG. 173. The GDT PersonnelTimeEventTypeID 17300 includes attributes schemeID 17316 and schemeAgencyID 17334. For the GDT PersonnelTimeEventTypeID 17300, the Object Class is Personnel Time Event Type 17302, the Property is Identification 17304, the Representation/Association term is Identifier 17306, the Type term is GDT 17308, the Type Name term is Identifier 17310, and the Length is from one to forty 17312. The GDT PersonnelTimeEventTypeID 17300 may be a restricted GDT.

SchemeID 17316 identifies the scheme according to which the ID was assigned. For example, the following schemes may be supported: 1) PersonnelTimeEventTypeGUID, which identifies the personnel time event type using a Global Unique Identifier; and 2) PersonnelTimeEventTypeID: Identifies the personnel time event type using an internal identifier for the scheme agency. For the schemeID 17316, the Category is Attribute 17318, the Object Class is IdentificationScheme 17320, the Property is Identification 17322, the Representation/Association term is Identifier 17324, the Type term is xsd 17326, the Type Name term is Token 17328, and the Length is from one to sixty 17330. The Cardinality between the GDT PersonnelTimeEventTypeID 17300 and the schemeID 17316 is zero or one 17332.

The schemeAgencyID 17334 specifies the business system in which the ID was assigned. For the schemeAgencyID 17334, the Category is Attribute 17336, the Object Class is IdentificationSchemeAgency 17338, the Property is Identification 17340, the Representation/Association term is Identifier 17342, the Type term is xsd 17344, the Type Name term is Token 17346, and the Length is from one to sixty 17348. The Cardinality between the GDT PersonnelTimeEventTypeID 17300 and the schemeAgencyID 17334 is zero or one 17350.

If the PersonnelTimeEventTypeGUID is used for schemeID, the PersonnelTimeEventTypeID may comprise 1-40 characters. If the PersonnelTimeEventTypeID is used, the GDT PersonnelTimeEventTypeID 17300 may comprise 1-16 characters and may be alphanumeric. If the schemeID 17316 or the schemeAgencyID 17334 have not been specified, they may be determined from the context.

(iiiiii) PersonnelTimeID

A GDT PersonnelTimeID 17400 is a unique ID for a personnel time. A personnel time is a period of a personnel resource that is characterized by business, pay scale, or legal criteria. The period can be entered as a duration (e.g., 8 hours on Oct. 11, 2003) or as clock times (e.g., from 8:10 to 17:30 on Oct. 11, 2003). A personnel time is characterized by a personnel time type (e.g., "working time," "leave," "overtime," "availability for work," "illness," or "work break"). A personnel time can include additional information (e.g., reference to project, order, cost center) for different target applications (e.g., project system or Controlling). An example is: <PersonnelTimeID>1234567890123456</PersonnelTimeID>.

The structure of GDT PersonnelTimeID 17400 is depicted in FIG. 174. The GDT PersonnelTimeID 17400 includes attributes schemeID 17416 and schemeAgencyID 17434. For the GDT PersonnelTimeID 17400, the Object Class is Personnel Time 17402, the Property is Identification 17404, the Representation/Association term is Identifier 17406, the Type term is GDT 17408, the Type Name term is Identifier 17410, and the Length is from one and forty 17412. The GDT PersonnelTimeID 17400 may be a restricted GDT.

The schemeID 17416 specifies the scheme according to which the identifier was assigned. For example, the following schemes may be provided: 1) PersonnelTimeGUID, which identifies the personnel time using a Global Unique Identifier; and 2) PersonnelTimeID: Identifies the personnel time using an internal identifier for the scheme agency. For the schemeID 17416, the Category is Attribute 17418, the Object Class is IdentificationScheme 17420, the Property is Identification 17422, the Representation/Association term is Identifier 17424, the Type term is xsd 17426, the Type Name term is Token 17428, and the Length is from one to sixty 17430. The Cardinality between the GDT PersonnelTimeID 17400 and the schemeID 17416.

The SchemeAgencyID 17434 indicates the business system in which the identifier was assigned. For the schemeAgencyID 17434, the Category is Attribute 17436, the Object Class is IdentificationSchemeAgency 17438, the Property is Identification 17440, the Representation/Association term is Identifier 17442, the Type term is xsd 17444, the Type Name term is Token 17446, and the Length is from one to sixty 17448. The Cardinality between the GDT PersonnelTimeID 17400 and the schemeAgencyID 17434 is zero or one 17450.

If the PersonnelTimeGUID is used for the schemeID, the PersonnelTimeID may comprise 1-40 characters. If the PersonnelTimeID" is used, the PersonnelTimeID may comprise 1-16 characters and may be alphanumeric. If the schemeID or the schemeAgencyID have not been specified, they may be determined from the context.

(jjjjjj) PersonnelTimeTypeID

A GDT PersonnelTimeType ID 17500 is a unique identifier for a personnel time type. The PersonnelTimeType is a classification of personnel times according to business, pay scale, or legal criteria. Depending on whether the employee is at work or absent, the classification can be made according to payment-relevant or further personnel time management criteria. Examples include "working time," "leave," "overtime," "availability for work," "illness" or "work break." An example is: <PersonnelTimeTypeID>1234567890123456</PersonnelTimeTypeID>.

The structure of GDT PersonnelTimeTypeID 17500 is depicted in FIG. 175. The GDT PersonnelTimeTypeID 17500 includes attributes schemeID 17516 and schemeAgencyID 17534. For the GDT PersonnelTimeTypeID 17500, the Object Class is Personnel Time Type 17502, the Property is Identification 17504, the Representation/Association term is Identifier 17506, the Type term is GDT 17508, the Type Name term is Identifier, and the Length is from one to forty 17512. The GDT PersonnelTimeTypeID 17500 may be a restricted GDT.

The schemeID 17516 indicates the scheme according to which the identifier was assigned. For example, the following schemes may be provided: 1) PersonnelTimeTypeGUID, which identifies the personnel time type using a Global Unique Identifier; and 2) PersonnelTimeTypeID, which identifies the personnel time type using an internal identifier for the scheme agency. For the schemeID 17516, the Category is Attribute 17518, the Object Class is IdentificationScheme 17520, the Property is Identification 17522, the Representation/Association term is Identifier 17524, the Type term is xsd 17526, the Type Name term is Token 17528, and the Length is from one to sixty 17530. The Cardinality between the GDT PersonnelTimeTypeID 17500 and the schemeID 17516 is zero or one 17532.

The SchemeAgencyID 17534 specifies the business system in which the ID was assigned. For the schemeAgencyID 17534, the Category is Attribute 17536, the Object Class is IdentificationSchemeAgency 17538, the Property is Identification 17540, the Representation/Association term is Identifier 17542, the Type term is xsd 17544, the Type Name term is Token 17546, and the Length is from one to sixty 17548. The Cardinality between the GDT PersonnelTimeTypeID 17500 and the schemeAgencyID is zero or one 17550.

If the PersonnelTimeTypeGUID is used for the schemeID, the PersonnelTimeTypeID may comprise 1-40 characters. If the PersonnelTimeTypeID is used, the PersonnelTimeTypeID may comprise 1-16 characters and may be alphanumeric. If the schemeID or the schemeAgencyID have not been specified, it may be possible to determine them from the context.

(kkkkkk) PhoneNumber

A GDT PhoneNumber 17600 is a telephone number that comprises the international dialing code, regional area code, number, and extension. An example is:

```
<PhoneNumber>
    <AreaID>6227</AreaID>
    <SubscriberID>7</SubscriberID>
    <ExtensionID>47474</ExtensionID>
    <CountryCode>DE</ CountryCode>
</PhoneNumber>
```

The structure of GDT PhoneNumber 17600 is depicted in FIG. 176. The GDT PhoneNumber 17600 contains one telephone number. The GDT PhoneNumber 17600 includes elements AreaID 17606, SubscriberID 17626, ExtensionID 17646, and CountryCode 17666. For the GDT PhoneNumber 17600, the Object Class is PhoneNumber 17602 and the Representation/Association term is Details 17604.

The AreaID 17606 indicates the area code if known separately. It may be displayed in standardized format, i.e., without a leading zero or the like. Alternatively, the area code can be displayed together with the telephone number in SubscriberID 17626. When using a mobile phone number, the AreaID 17606 contains the prefix for the mobile phone network (also without a leading zero or the like). The synonym for AreaID 17606 is AreaCodeNumber. For the AreaID 17606, the Category is Element 17608, the Object Class is PhoneNumber 17610, the Property is PhoneNumberArea 17612, the Representation/Association term is Identifier 17614, the Type term is CCT 17616, the Type Name term is Identifier 17618, and the Length is from one to ten 17620. The Cardinality between the GDT PhoneNumber 17600 and the AreaID 17606 is zero or one 17622. The AreaID 17606 may be restricted 17624.

The SubscriberID 17626 may indicate the telephone number without the regional area code and without the international dialing code. Alternatively, SubscriberID 17626 can also contain the telephone number together with the regional area code, extension, or both. SubscriberID 17626 is displayed in a standardized format that can contain numbers or letters and cannot contain blanks or special characters. A synonym for SubscriberID 17626 is SubscriberNumber. For the SubscriberID 17626, the Category is Element 17628, the Object Class is PhoneNumber 17630, the Property is PhoneNumberSubscriber 17632, the Representation/Association term is Identifier 17634, the Type term is CCT 17636, the Type Name term is Identifier 17638, and the Length is from one to thirty 17640. The Cardinality between the GDT PhoneNumber 17600 and the SubscriberID 17626 is zero or one 17642. The SubscriberID 17626 may be restricted 17644.

The ExtensionID 17646 indicates the extension if the telephone number comprises a telephone number and an extension. Alternatively, the extension can be included in SubscriberID 17626 together with the telephone number. ExtensionID 17646 may be empty if the telephone number is a cell phone number. A synonym for ExtensionID 17646 is ExtensionTelephoneNumber. For the ExtensionID 17646, the Category is Element 17648, the Object Class is PhoneNumber 17650, the Property is PhoneNumberExtension 17652, the Representation/Association term is Identifier 17654, the Type term is CCT 17656, the Type Name term is Identifier 17658, and the Length is from one to ten 17660. The Cardinality between the GDT PhoneNumber 17600 and the ExtensionID 17646 is zero or one 17662. The ExtensionID 17646 may be restricted 17664.

The CountryCode 17666 identifies the country code in accordance with ISO 3166-1. It is used to determine the international dialing code. If it is empty, the country can be derived from the address instead. The country entered in the address and the country for the telephone number can also be different if the telephone number is provided in the context of an address. The country code is more appropriate for determining the international dialing code than the standardized format (e.g., +49). For the CountryCode 17666, the Category is Element 17668, the Object Class is PhoneNumber 17670, the Property is PhoneNumberCountry 17672, the Representation/Association term is Code 17674, the Type term is GDT 17676, and the Type Name is CountryCode 17678. The Cardinality between the GDT PhoneNumber 17600 and the CountryCode 17666 is zero or one 17680.

The telephone number is divided into components based on the Microsoft TAPI specification and ITU guidelines (International Telecommunication Union). The GDT PhoneNumber 17600 is used to describe the sequence of numbers that may be dialed to establish a connection. The GDT PhoneNumber 17600 is used for Telephone, MobilePhone, and Facsimile (fax), all of which have a similar structure.

(llllll) Price

A GDT Price 17700 is the exchange value, expressed in a monetary unit, of a product or a service in relation to a basic amount. An example is:

```
<NetPrice>
    <Amount currencyCode="EUR">32.14</Amount>
    <BaseQuantity unitCode="C62">1</BaseQuantity>
</NetPrice>
```

(Note: According to UN/ECE Recommendation 20, C62 is a piece)

The structure of GDT Price 17700 is depicted in FIG. 177. The GDT Price 17700 includes elements Amount 17706 and BaseQuantity 17720. For the GDT Price 17700, the Object Class is Price 17702 and the Representation/Association term is Details 17704.

For the Amount 17706, the Category is Element 17708, the Object Class is Price 17710, the Property is Amount 17712, the Representation/Association term is Amount 17714, the Type term is GDT 17716, and the Type Name term is Amount 17718. The Cardinality between the GDT Price 17700 and the Amount 17706 is one. For more on the Amount 17706, see GDT Amount.

For the BaseQuantity 17720, the Category is Element 17722, the Object Class is Price 17724, the Property is Base 17726, the Representation/Association term is Quantity 17728, the Type term is GDT 17730, and the Type Name term is Quantity 17732. The Cardinality between the GDT Price 17700 and the BaseQuantity 17720 is one. For more on the BaseQuantity 17720, see GDT Quantity.

GDT Price 17700 is used for the price of goods, products, and services. See the following examples: 1) Natural price; 2) Market price; 3) Unit price; 4) Total price; and 5) Recommended price.

(mmmmmm) PriceComponent

A GDT PriceComponent 17800 is a non-fiscal part of a price that was calculated for the quantity of a product. An example is:

```
<PriceComponent>
    <TypeCode>0001</TypeCode >
    <Description languageCode="EN">Product Base Price</
    Description >
    <Amount currencyCode="EUR">250</Amount>
</PriceComponent >
<PriceComponent >
    <TypeCode>0004</TypeCode >
    <Description languageCode="EN">Customer Discount</
    Description >
    <BaseAmount currencyCode="EUR">250</BaseAmount>
    <Percent>5</Percent>
    <Amount currencyCode="EUR">12.5</Amount>
</PriceComponent>
```

The structure of GDT PriceComponent 17800 is depicted in FIG. 178. The GDT PriceComponent 17800 includes elements TypeCode 17808, Description 17826, BaseAmount 17842, Percent 17858, and Amount 17874. For the GDT PriceComponent 17800, the Category is Complex 17802, the Object Class is PriceComponent 17804, and the Representation/Association term is Details 17806.

The TypeCode 17808 is the coded representation of a type of price component according to GDT PriceComponentTypeCode. For the TypeCode 17808, the Category is Element 17810, the Object Class is PriceComponent 17812, the Property is Type Code 17814, the Representation/Association term is Code 17816, the Type term is GDT 17818, the Type Name term is PriceComponentTypeCode 17820, and the Length is four 17822. The Cardinality between the GDT PriceComponent 17800 and the TypeCode 17808 is one 17824.

The Description 17826 is additional natural language information on price component, which may be optional. For the Description 17826, the Category is Element 17828, the Object Class is PriceComponent 17830, the Property is Description 17832, the Representation/Association term is Text 17834, the Type term is GDT 17836, and the Type Name term is Description 17838. The Cardinality between the GDT PriceComponent 17800 and the Description 17826 is zero or one 17840.

The BaseAmount 17842 is the base amount from which a price component is calculated using a percentage, which may be optional. For the BaseAmount 17842, the Category is Element 17844, the Object Class is PriceComponent 17846, the Property is Base Amount 17848, the Representation/Association term is Amount 17850, the Type term is GDT 17852, and the Type Name term is Amount 17854. The Cardinality between the GDT PriceComponent 17800 and the BaseAmount 17842 is zero or one 17856.

The Percent 17858 is the percentage which is used to calculate a price component from a base amount, which may be optional. For the Percent 17858, the Category is Element 17860, the Object Class is PriceComponent 17862, the Property is Percent 17864, the Representation/Association term is Percent 17866, the Type term is GDT 17868, and the Type Name term is Percent 17870. The Cardinality between the GDT PriceComponent 17800 and the Percent 17858 is zero or one 17872.

The Amount 17874 is the amount of a price component. For the Amount 17874, the Category is Element 17876, the Object Class is PriceComponent 17878, the Property is Amount 17880, the Representation/Association term is Amount 17882, the Type term is GDT 17884, and the Type Name term is Amount 17886. The Cardinality between the GDT PriceComponent 17800 and the Amount 17874 is one 17888.

If GDT PriceComponents 17800 are specified for a quantity of a product, the PriceComponentTypeCode for the base price may be used once here. The two optional elements BaseAmount and Percent may either both be specified or not specified in each instance of PriceComponent. Manual changes to a percentage price component for the quantity of a product in the original document lead to the value calculated from the elements BaseAmount and Percent varying from the content of the element Amount. The element BaseAmount always has a non-negative value. The elements Percent and Amount can both be either positive or negative at the same time, e.g., to express a surcharge or discount.

The GDT PriceComponent 17800 is used to make the net price specified or to be specified in an invoice for an ordered or delivered quantity of products comprehensible by specifying price components. Therefore, it may be used in invoice items. Results of price calculations are preferably transmitted, not the exact calculation method, which can be complex due to, e.g., proprietary Customizings, user exits in the form of coding, scales, rounding difference clearing, price date or reference steps. Therefore, the GDT can be used for automated control of calculation results using a recipient system in a limited way (e.g., invoice verification). Different types of price components may be represented by "condition types" which are defined in customer-specific Customizing.

(nnnnnn) PriceComponentTypeCode

The GDT PriceComponentTypeCode 17900 is the coded representation of a non-fiscal price element type that was calculated for the quantity of a product. An example is: <PriceComponentTypeCode>0001</PriceComponentTypeCode>.

The structure of GDT PriceComponentTypeCode 17900 is depicted in FIG. 179.

The possible illustrative values of the PriceComponentTypeCode are:

1) Code 0001, which represents a Base Price, for example, for a price from a price list calculated as (quantity*unit price) or (weight*price per kg);

2) Code 0002, which represents a surcharge or discount based on a special product configuration, for example, a surcharge for the color 'red', surcharge for size "XL," discount for smaller model;

3) Code 0003, which represents a surcharge or discount based on sales promotion over a limited period of time, for example, a Christmas discount, Easter sale, summer surcharge;

4) Code 0004, which represents a surcharge or discount based on special group membership; typically a product belonging to a product group, the customer belonging to a customer group, or a combination of both, for example, an OEM surcharge for a product, corporate customer discount;

5) Code 0005, which represents a surcharge or discount for a quantity of the product based on a special agreement made when the order was taken or at the acquisition of the sales contract (manual entries);

6) Code 0006, which represents a surcharge or discount for a total order based on a special agreement made when the order was taken or at the acquisition of the sales contract (manual entries);

7) Code 0007, which represents a surcharge or discount for a quantity of the product based on deviations from standard business processing, for example, a minimum price, pallet discount, surcharge for incomplete pallet, mixed pallet discount, surcharge for incomplete mixed pallet, free-goods discount;

8) Code 0008, which represents a surcharge or discount for a total order based on deviations from standard business processing, for example, a minimum sales order value, minimum value surcharge;

9) Code 0009, which represents a surcharge or discount for a quantity of the product based on special calculation processing, for example, a 100% discount, rounding difference;

10) Code 0010, which represents a shipment costs/packaging/customs for a quantity of the product;

11) Code 0011, which represents a shipment costs/packaging/customs for a total order;

12) code 0012, which represents a cash discount.

The GDT PriceComponentTypeCode 17900 may be a proprietary code list with fixed predefined values. Changes to the permitted values involve changes to the interface. In an embodiment, related standardized code lists such as Price.Type.Code (UN/CEFACT 5375) or Price.Specification.Code (UN/CEFACT 5387) may not be used, since they contain a different semantic that is also worked out at a much greater level of detail. In the first case, e.g., the classifying of prices into different types according to special information for the quantity of products takes up a large amount of space. In the second case, however, the business circumstances determining the prices take up more space. For the GDT Price Component Type Code 17900, the Object Class is Price Component 17902, the Property is Type Code 17904, the Representation/Association term is Code 17906, the Type term is CCT 17908, the Type Name term is Code 17910, and the Length is four 17912.

(oooooo) PriceTimeSeries

A CDT PriceTimeSeries 18000 is time series information that consists of items that each contain a period with a start time and end time and a period-based price. An example is:

```
<PriceTimeSeries>
    <Item>
        <ValidityPeriod>
        <StartDateTime>2002-04-19T15:00:00Z</StartDateTime>
```

-continued

<EndDateTime>2002-04-19T17:00:00Z</EndDateTime>
</ValidityPeriod>
<Price>
<Amount currencyCode="EUR">32.14</Amount>
<BaseQuantity unitCode="C62">1</BaseQuantity>
</Price>
</Item>
</PriceTimeSeries>.

The structure of CDT PriceTimeSeries 18000 is depicted in FIG. 180. The CDT PriceTimeSeries 18000 includes elements Item 18014, Validity-Period 18026, Price 18040, and Fixed-Indicator 18054. For the CDT PriceTimeSeries 18000, the Object Class Qual. term is Price 18002, the Object Class is TimeSeries 18004, the Representation/Association term is Details 18006, the Type term is GDT 18008, the Type Name term is TimeSeries 18010. The CDT PriceTimeSeries 18000 may be a restricted CDT 18012.

The PriceTimeSeriesItem 18014 is an item in a time series and can be repeated as often as required. For the Item 18014, the Category is Element 18016, the Object Class is TimeSeries 18018, the Property is Item 18020, and the Representation/Association term is Details 18022. The Cardinality between the CDT PriceTimeSeries 18000 and the Item 18014 is from one to n 18024. The ValidityPeriod 18026 describes the validity period of the time series item with a start time stamp and an end time stamp. For the Validity-Period 18026, the Category is Element 18028, the Object Class is TimeSeries 18030, the Property is ValidityPeriod 18032, the Representation/Association term is Details 18034, the Type term is 18036, and the Type Name term is DateTime-Period 18038. The Cardinality between the CDT Price-TimeSeries 18000 and the Validity-Period 18026 is one 18040.

The Price 18040 describes the price connected to the time series item. For the Price 18040, the Category is Element 18042, the Object Class is TimeSeries 18042, the Property is Price 18044, the Representation/Association term is Price 18046, the Type term is GDT 18048, and the Type Name term is Price 18050. The Cardinality between the CDT Price-TimeSeries 18000 and the Price 18040 is one 18052. The FixedIndicator 18054 describes whether the corresponding item for changes is blocked or not. For the Fixed-Indicator 18054, the Category is Element 18056, the Object Class is TimeSeries 18058, the Property is FixedIndicator 18060, the Representation/Association term is Indicator 18062, the Type term is GDT 18064, and the Type Name term is Fixed Indicator 18066. The Cardinality between the CDT Price-TimeSeries 18000 and the Fixed-Indicator 18054 is zero or one 18068.

The CDT PriceTimeSeries 18000 is used as a generic data type that can have various specifications in one interface, depending on the context category being used.

(pppppp) ProcurementCostUpperLimit

A GDT ProcurementCostUpperLimit 18100 is the cost upper limit for different types of procurement costs. An example is:

<ProcurementCostUpperLimit>
<OverallLimit>
<Amount currencyCode="EUR">10000.00</Amount>
<AmountUnlimitedIndicator>false</AmountUnlimitedIndicator>
<ExpectedAmount currencyCode="EUR">7500.00</
ExpectedAmount>

-continued

<OverallLimit>
<ContractPartialLimit>
<Amount currencyCode="EUR">0.00</Amount>
<AmountUnlimitedIndicator>true</AmountUnlimitedIndicator>
<ContractReference>
<ID>4000008599</ID>
<ItemID>148</ItemID>
</ContractReference>
</ContractPartialLimit>
<MiscellaneousPartialLimit>
<Amount currencyCode="EUR">500.00</Amount>
<AmountUnlimitedIndicator>false</AmountUnlimitedIndicator>
</MiscellaneousPartialLimit>
</ProcurementCostUpperLimit>.

The structure of GDT ProcurementCostUpperLimit 18100 is depicted in FIG. 181. The GDT Procurement Cost Upper Limit 18100 includes elements OverallLimit 18108, Amount 18120, Amount Unlimited Indicator 18134, Expected Amount 18150, Contract Partial Limit 18166, Amount 18178, Amount Unlimited Indicator 18194, ContractReference 181110, Miscellaneous Partial Limit 181126, Amount 181138, and Amount Unlimited Indicator 181154. For the GDT Procurement Cost Upper Limit 18100, the Object Class is Procurement Cost 18102, the Property is Upper Limit 18104, and the Representation/Association term is Details 18106.

The OverallLimit 18108 is the limit for the total costs in a procurement process. For the OverallLimit 18108, the Category is Element 18110, the Object Class is Procurement Cost Upper Limit 18112, the Property is Overall Limit 18114, and the Representation/Association term is Details 18116. The Cardinality between the GDT Procurement Cost Upper Limit 18100 and the OverallLimit 18108 is one 18118.

The OverallLimit/Amount 18120 is the cost upper limit that may not be exceeded in a procurement process. For the Amount 18120, the Category is Element 18122, the Object Class is Overall Limit 18124, the Property is Amount 18124, the Representation/Association term is Amount 18126, the Type term is GDT 18128, and the Type Name term is Amount 18130. The Cardinality between the GDT Procurement Cost Upper Limit 18100 and the Amount 18120 is zero or one 18132.

The OverallLimit/AmountUnlimitedIndicator 18134 indicates whether the amount in OverallLimit/Amount is unlimited. For the Amount Unlimited Indicator 18134, the Category is Element 18136, the Object Class is Overall Limit 18138, the Property is Amount Unlimited Indicator 18140, the Representation/Association term is Indicator 18142, the Type term is GDT 18144, and the Type Name term is Value-UnlimitedIndicator 18146. The Cardinality between the GDT Procurement Cost Upper Limit 18100 and the Amount Unlimited Indicator 18134 is zero or one 18148.

The OverallLimit/ExpectedAmount 18150 is the costs that are expected. The expected costs may be less than the maximum permitted costs. For the Expected Amount 18150, the Category is Element 18152, the Object Class is 18154, the Property is Expected Amount 18156, the Representation/Association term is Amount 18158, the Type term is GDT 18160, and the Type Name term is Amount 18162. The Cardinality between the GDT Procurement Cost Upper Limit 18100 and the Expected Amount 18150 is zero or one 18164.

The ContractPartialLimit 18166 is the partial limit for costs relating to a contract. For the Contract Partial Limit 18166, the Category is Element 18168, the Object Class is Procurement Cost Upper Limit 18170, the Property is Contract Partial Limit 18172, and the Representation/Association term is Details 18174. The Cardinality between the GDT Procurement Cost Upper Limit 18100 and the Contract Partial Limit 18166 is from zero to n 18176.

The ContractPartialLimit/Amount 18178 is the cost upper limit for a particular contract that may not be exceeded in a procurement process. For the Amount 18178, the Category is Element 18180, the Object Class is Contract PartialLimit 18182, the Property is Amount 18184, the Representation/Association term is Amount 18186, the Type term is GDT 18188, and the Type Name term is Amount 18190. The Cardinality between the GDT Procurement Cost Upper Limit 18100 and the Amount 18178 is zero or one 18192.

The ContractPartialLimit/AmountUnlimitedIndicator 18194 indicates whether the amount in ContractLimit/Amount is unlimited. For the Amount Unlimited Indicator 18194, the Category is Element 18196, the Object Class is Contract PartialLimit 18198, the Property is Amount Unlimited Indicator 181100, the Representation/Association term is Indicator 181102, the Type term is GDT 181104, and the Type Name term is ValueUnlimitedIndicator 181106. The Cardinality between the GDT Procurement Cost Upper Limit 18100, and the Amount Unlimited Indicator 18194 is zero or one 181108.

The ContractPartialLimit/ContractReference 181110 is the reference to a contract. For the ContractReference 181110, the Category is Element 181112, the Object Class is Contract PartialLimit 181114, the Property is Contract Reference 181116, the Representation/Association term is Business Transaction Document Reference 181118, the Type term is GDT 181120, and the Type Name is Business Transaction Document Reference 181122. The Cardinality between the GDT Procurement Cost Upper Limit 18100 and the ContractReference 181110 is one 181124. The ContractPartialLimit/ContractReference/ID 181126 is the contract number. The ContractPartialLimit/ContractReference/ItemID an item within the contract. If no item number is specified, the partial limit applies for all the items in the contract.

The MiscellaneousPartialLimit 181126 is the partial limit for the overall limit for miscellaneous costs. For the Miscellaneous Partial Limit 181126, the Category is Element 181128, the Object Class is Procurement Cost Upper Limit 181130, the Property is Miscellaneous PartialLimit 181132, and the Representation/Association term is Details 181134. The Cardinality between the GDT Procurement Cost Upper Limit 18100 and the Miscellaneous Partial Limit 181126 is zero or one 181136.

The MiscellaneousPartialLimit/Amount 181138 is the cost upper limit for miscellaneous costs. For the Amount 181138, the Category is Element 181140, the Object Class is Miscellaneous PartialLimit 181142, the Property is Amount 181144, the Representation/Association term is 181146, the Type term is GDT 181148, and the Type Name is Amount 181150. The Cardinality between the GDT Procurement Cost Upper Limit 18100 and the Amount 181138 is zero or one 181152.

The MiscellaneousPartialLimit/AmountUnlimitedIndicator 181154 indicates whether the amount in MiscellaneousLimit/Amount is unlimited. For the Amount Unlimited Indicator 181154, the Category is Element 181156, the Object Class is Miscellaneous PartialLimit 181158, the Property is Amount Unlimited Indicator 181160, the Representation/Association term is Indicator 181162, the Type term is GDT 181164, and the Type Name term is ValueUnlimitedIndicator 181181. The Cardinality between the GDT Procurement Cost Upper Limit 18100 and the Amount Unlimited Indicator 181154 is zero or one 181168.

The rules for the GDT AmountUnlimitedIndicator apply for Amount and AmountUnlimitedIndicator. Currencies within a ProcurementCostUpperLimit may be identical. The OverallLimit/Amount may be greater than or equal to the OverallLimit/ExpectedAmount. If no ExpectedAmount is specified, the Amount is used as the ExpectedAmount. If no ExpectedAmount is specified and the Amount is unlimited, an ExpectedAmount of 0.00 is assumed. In an embodiment, the same contract/same contract item may not be referenced in different limits which refer to contracts.

A ProcurementCostUpperLimit is used to define the type and amount of costs that are permitted for limit items within an ordering process. Limit items are used as placeholders in purchase orders if the requirements are unknown at the time of ordering. This can be the case, e.g., for repairs, where the time and spare parts required are not known until the repair has been made.

Regarding the costs in a procurement process and the limits, the total of all the costs may not exceed the overall limit, though the total of all the partial limits may well exceed the overall limit. This can lead to mistakes, for example: 1) Overall limit of EUR 10,000; 2) Partial limit of EUR 8,000 for contract 4711; and 3) Miscellaneous partial limit of EUR 4,000. The total of the partial limits is EUR 12,000, which is greater than the overall limit of EUR 10,000. This makes sense when costs of EUR 8,000 and miscellaneous costs of EUR 3,000 (=total costs of EUR 11,000) are to be identified as too high for contract 4711.

(qqqqqq) ProductCategoryID

A GDT ProductCategoryID 18200 is a unique identifier for a product category. A product category is a division of products according to objective business-specific criteria. An example or instance is:

1. Reference to a category using a standard ID:

<ProductCategoryID schemeID="eClass"
schemeAgencyID="ZZZ">AAA650001</ProductCategoryID>

2. Reference to a category using a version-dependent, hierarchical standard ID:

<ProductCategoryID schemeID="UNSPSC" schemeVersionID="11.0"
schemeAgencyID="257">10.10.15.17.00</ProductCategoryID>

3. Reference to a category using a proprietary ID:

<ProductCategoryID schemeID='ProductCategories'
schemeAgencyID='123456789'
schemeAgencySchemeAgencyID='16'>0006</ProductCategoryID>

The structure of GDT ProductCategoryID 18200 is depicted in FIG. 182. The GDT ProductCategoryID 18200 is from the Core Component Type Identifier. The GDT ProductCategoryID 18200 includes attributes schemeID 18216, SchemeVersionID 18238, schemeAgencyID 18256, schemeAgencySchemeID 18274, and schemeAgencySchemeAgencyID 18292. For the GDT ProductCategoryID 18200, the Object Class is ProductCategory 18202, the Property is Identification 18204, the Representation/Association term is Identifier 18206, the Type term is CCT 18208, the Type Name term is Identifier 18210, and the Length is from one to forty 18212. The GDT ProductCategoryID 18200 may be a restricted GDT.

The following classifications are supported for standard IDs: 1) schemeID 18216 of 'UNSPSC'; 2) schemeAgencyID 18256 of '257'; 3) schemeID of 'eClass'; and 4) schemeAgencyID of 'ZZZ'. The following classifications are supported for version-dependent, hierarchical standard IDs: 1) schemeID of 'UNSPSC'; 2) schemeVersionID of nn.m; 3) schemeAgencyID of '257'; 4) schemeID of 'eClass'; 5) schemeVersionID: nn.m; and 6) schemeAgencyID: 'ZZZ'.

For the schemeID 18216, the Category is Attribute 18218, the Object Class is IdentificationScheme 18220, the Property is Identification 18222, the Representation/Association term is Identifier 18228, the Type term is xsd 18230, the Type Name term is Token 18232, and the Length is from one to sixty 18234. The Cardinality between the GDT ProductCategoryID 18200 and the schemeID 18216 is zero or one 18236.

For the SchemeVersionID 18238, the Category is Attribute 18240, the Object Class is IdentificationScheme 18242, the Property is Version 18244, the Representation/Association term is Identifier 18246, the Type term is xsd 18248, the Type Name term is Token 18250, and the Length is from one to fifteen 18252. The Cardinality between the GDT ProductCategoryID 18200 and the SchemeVersionID 18238 is zero or one 18254.

For the schemeAgencyID 18256, the Category is Attribute 18258, the Object Class is IdentificationSchemeAgency 18260, the Property is Identification 18262, the Representation/Association term is Identifier 18264, the Type term is xsd 18266, the Type Name term is Token 18268, and the Length is from one to sixty 18270. The Cardinality between the GDT ProductCategoryID 18200 and the schemeAgencyID 18256 is zero or one 18272.

For the schemeAgencySchemeID 18274, the Category is Attribute 18276, the Object Class is IdentificationSchemeAgency 18278, the Property is Scheme 18280, the Representation/Association term is Identifier 18282, the Type term is xsd 18284, the Type Name term is Token 18286, and the Length is from one to sixty 18288. The Cardinality between the GDT ProductCategoryID 18200 and the schemeAgencySchemeID 18274 is zero or one 18290.

For the schemeAgencySchemeAgencyID 18292, the Category is Attribute 18294, the Object Class is IdentificationSchemeAgency 18296, the Property is SchemeAgency 18298, the Representation/Association term is Identifier 18201, the Type term is xsd 18203, the Type Name term is Token 18205, and the Length is three 18207. The Cardinality between the GDT ProductCategoryID 18200 and the schemeAgencySchemeAgencyID 18292 is zero or one 18209.

Product CategoryID can be used, for example, in three ways:

1) For identifying a product category using a globally-unique, non-versioned, standardized ID. The ID is generally not structured hierarchically, i.e., it references one product category and does not contain information about how this category is based on several other general categories. The attribute schemeID and schemeAgencyID are used in the same way as planned in the CCT identifier for standard IDs. Other attributes are not specified.

2) For identifying a product category within a tree of product categories that build on one another and using a globally unique, standardized ID that contains information on the location of the category within the tree structure. The ID is generally version-dependent. The attribute schemeID and schemeVersionID and schemeAgencyID are used in the same way as planned in the CCT identifier for standard IDs. Other attributes are not specified.

3) For identifying a product category using a proprietary ID. The attributes schemeID, schemeAgencyID, schemeAgencySchemeID and schemeAgencySchemeAgencyID are used as planned for the CCT identifier in order to define the context for which a CategoryPartyID is guaranteed to be unique. Other attributes are not specified.

(rrrrrr) ProductCategoryInternalID

A CDT ProductCategoryInternalID 18300 is a proprietary identifier for a product category. A product category is a division of products according to objective criteria. Illustrative examples of ProductCategoryInternalID (SAP MDM) are:

The GUID of a product category:

<ProductCategoryInternalID schemeID="ProductCategoryGUID"schemeAgencyID="MPL__002">

1C743CEC501F6A4D8826C7EC5A8554B9</ProductCategoryInternalID> schemeID="ProductCategoryGUID" indicates that the scheme "ProductCategoryGUID" was used to identify the product category.

schemeAgencyID="MPL__002" indicates that the scheme was assigned by the business system "MPL__002."

ProductCategoryID of a product category:

<ProductCategoryInternalID schemeID="ProductCategoryID" schemeAgencyID="MPL__002">Private Car Vehicles MPLCNT002</ProductCategoryInternalID>

The structure of CDT ProductCategoryInternalID 18300 is depicted in FIG. 183. The CDT ProductCategoryInternalID 18300 includes attributes schemeID 18316 and schemeAgencyID 18334. For the CDT ProductCategoryInternalID 18300, the Object Class is ProductCategory 18302, the Property is Internal Identification 18304, the Representation/Association term is Identifier 18306, the Type term is GDT 18308, the Type Name term is ProductCategoryID 18310, and the Length is from one to forty 18312. The CDT ProductCategoryInternalID 18300 may be a restricted CDT.

The attributes of a CDT ProductCategoryInternalID 18300 are filled, for example, as follows in SAP MDM:

1) The schemeID 18316, in which the following schemes are provided for:

1) The ProductCategoryGUID, which identifies a product category using a Global Unique Identifier, and 2) The ProductCategoryID, which identifies a product category using an identifier.

For the schemeID 18316, the Category is Attribute 18318, the Object Class is IdentificationScheme 18320, the Property is Identification 18322, the Representation/Association term is Identifier 18324, the Type term is xsd 18326, the Type Name term is Token 18328, and the Length is from one to sixty 18330. The Cardinality between the CDT ProductCategoryInternalID 18300 and the schemeID 18316 is zero or one 18332.

2) The schemeAgencyID 18334 for a Business system in which the number was assigned. For the schemeAgencyID 18334, the Category is Attribute 18336, the Object Class is IdentificationSchemeAgency 18338, the Property is Identification 18340, the Representation/Association term is Identifier 18342, the Type term is xsd 18344, the Type Name term is Token 18346, and the Length is from one to sixty 18348. The Cardinality between the CDT ProductCategoryInternalID 18300 and the schemeAgencyID 18334 is zero or one 18350.

The GDT ProductCategoryInternalID 18300 represents a projection of the GDT ProductCategoryID, in which the attributes schemeID and schemeAgencyID are contained for describing an internally assigned ID. If an attribute is not explicitly assigned in the use of the GDT, it may be determined through the context.

The ProductCategoryInternalID 18300 is used when both sender and recipient can access shared master data, e.g., during internal communication.

If the product category is identified using the ProductCategoryID scheme (schemeID), the product category may be uniquely identified using a combined key (e.g., the product category at an entity level can be uniquely identified (semantically) using ProductCategoryID, ProductHierarchyID and the logical system).

(ssssss) ProductCategoryPartyID

A CDT ProductCategoryPartyID 18400 is an identifier for a product category assigned by a party. A product category is a division of products according to objective criteria. An example is: <ProductCategorySellerID>0006</ProductCategorySellerID>.

The structure of CDT ProductCategoryPartyID 18400 is depicted in FIG. 184.

The CDT ProductCategoryPartyID 18400 is the proprietary identifier assigned by a party. The party (in its role) that assigned this identifier may derive from the business context of the message that uses the CDT ProductCategoryPartyID 18400. For the CDT Product Category Party ID 18400, the Object Class is Product Category 18402, the Property Quality term is Party 18404, the Property is Identification 18406, the Representation/Association term is Identifier 18408, the Type term is GDT 18410, the Type Name term is ProductCategoryID 18412, and the Length is from one to forty 18414. The CDT Product Category Party ID 18400 may be a restricted CDT 18416.

In contrast to CDT ProductCategoryStandardID 18500, the use of the CDT ProductCategoryPartyID 18400 is role-dependent (e.g., as an ID assigned by the Buyer).

The party is specified by its role. The Party is replaced with the partner role type (e.g., ProductCategorySellerID). SchemeID and SchemeVersionID are to be included as attributes as soon as there is a need to differentiate between several schemes. (See GDT ProductCategoryID).

(tttttt) ProductCategoryStandardID

A CDT ProductCategoryStandardID 18500 is a standardized identifier for a product category, whereby the identification scheme used may be managed by an agency from the code list DE 3055. A product category is a division of products according to objective criteria. An example is:

<ProductCategoryStandardID schemeID="UNSPSC" schemeVersionID="11.0" schemeAgencyID="113">10.10.15.17</ProductCategoryStandardID>

The structure of CDT ProductCategoryStandardID 18500 is depicted in FIG. 185. The CDT Product Category Standard ID 18500 includes attributes schemeID 18518, SchemeVersionID 18536, and schemeAgencyID 18554. For the CDT Product Category Standard ID 18500, the Object Class is Product Category 18502, the Property Qual. is Standard 18504, the Property is Identification 18506, the Representation/Association term is Identifier 18508, the Type term is GDT 18510, the Type Name is ProductCategoryID 18512, and the Length is from one to forty 18514. The CDT Product Category Standard ID 18500 may be a restricted CDT 18516.

For the schemeID 18518, the Category is Attribute 18520, the Object Class is IdentificationScheme 18522, the Property is Identification 18524, the Representation/Association term is Identifier 18526, the Type term is xsd 18528, the Type Name term is Token 18530, and the Length is from one to sixty 18532. The Cardinality between the CDT Product Category Standard ID 18500 and the scheme ID 18518 is zero or one 18534.

For the SchemeVersionID 18536, the Category is Attribute 18538, the Object Class is IdentificationScheme 18540, the Property is Version 18542, the Representation/Association term is Identifier 18544, the Type term is xsd 18546, the Type Name term is Token 18548, and the Length is from one to fifteen 18550. The Cardinality between CDT Product Category Standard ID 18500 and the SchemeVersionID 18536 is zero or one 18552.

The schemeAgencyID 18554 identifies the agency that manages an identification scheme. The agencies from DE 3055 are used as the default, but the roles defined in DE 3055 cannot be used. For the schemeAgencyID 18554, the Category is Attribute 18556, the Object Class is IdentificationSchemeAgency 18558, the Property is Identification 18560, the Representation/Association term is Identifier 18562, the Type term is xsd 18564, the Type Name term is Token 18566, and the Length is three 18568. The Cardinality between CDT Product Category Standard ID 18500 and the schemeAgencyID 18554 is one 18570. The following illustrative code is supported for a version-dependent hierarchical standard ID:

1) SchemeAgencyID="113"—UCC (Uniform Code Council) with 1) SchemeID="UNSPSC" (United Nations Standard Product and Services Classification Code); and 2) SchemeVersionID=nn.m (e.g. 11.0).

The GDT ProductCategoryStandardID 18500 represents a projection of the GDT ProductCategoryID, in which the attributes schemeID, schemeVersionID, and schemeAgencyID are contained for describing an ID assigned by a standardization organization (i.e., an organization registered in the DE 3055). The attribute schemeAgencyID may be a mandatory attribute.

In contrast to ProductCategoryPartyID, the use of ProductCategoryStandardID may not be role-dependent.

The SchemeID is another standardized identification scheme (for material classification and material groups) is "eClass" (current release status 5.0). The German Institute for Economics in Cologne provides the classification as an independent platform and central point of contact, free of charge, in the Internet under www.eClass.de (For the specification see www.eclass.de/informationen/download/eclassMerkmalleisten5_00.doc).

The version of eClass is a 2-digit number.

Illustrative usages of the SchemeID include: 1) SchemeAgencyID for the German Institute for Economics Cologne (not contained in DE 3055), wherein the SchemeID equals "eClass," and the SchemeVersionID equals nn (e.g. 42). If necessary, the SchemeID ETIM (www.etim.de) can also be examined for its applicability. (See also GDT ProductCategoryID).

(uuuuuu) ProductChangeID

A GDT ProductChangeID 18600 is a unique identifier for a change to a product which leaves the product unchanged in terms of its properties that are relevant for the user. Changes in terms of this definition may occur, e.g., due to changed manufacturing processes or the use of other modules/component batches. An example is:

<ProductChangeID>31337KSK/4711</ProductChangeID>.

The structure of GDT ProductChangeID 18600 is depicted in FIG. 186. For the GDT ProductChangeID 18600, the Category is Element 18602, the Object Class is Product Change 18604, the Property is Identification 18606, the Representation/Association term is Identifier 18608, the Type term is CCT 18610, the Type Name term is Identifier 18612, and the Length is from one to thirty-two 18614. The GDT ProductChangeID 18600 may be a restricted GDT.

ProductChangeIDs may be used, e.g., for a recall activity: Assuming the transistors installed in a product are replaced with other similar ones, then the features of the product are not changed and it should still have the same ProductID. However, if the transistors turn out to be faulty, it may be ensured that the serial numbers of the product affected are logged using ProductChangeIDs in case there is a resulting recall activity. If a change is made using change management, the ProductChangeID as a rule contains the ID of the relevant change order (ChangeOrderID).

In an example, in the R/3, GDT ProductChangeID 18600 is the change number that uniquely identifies a change master record for a product. A change identified here is neither a version nor a variant. For example, A yellow VW Golf C with leather seats would be "yellow with leather seats," a variant of version "C" of product "VW Golf."

(vvvvvv) ProductDemandInfluencingEventStatusCode

The GDT ProductDemandInfluencingEventStatusCode 18700 is a coded representation for the status of an event that influences the demand for products. The event might be, e.g., a promotional event. An example is: <ProductDemandInfluencingEventStatusCode>PLANNED </ProductDemandInfluencingEventSt atusCode>.

The structure of GDT ProductDemandInfluencingEventStatusCode 18700 is depicted in FIG. 187. For the GDT Product Demand Influencing Event Status Code 18700, the Object Class is Product Demand Influencing Event 18702, the Property is Status 18704, the Representation/Association term is Code 18706, the Type term is CCT 18708, the Type Name term is Code 18710, and the Length is from one to thirty-five 18712. The GDT Product Demand Influencing Event Status Code 18700 may be a restricted GDT.

The possible code values are a subset of the "Retail Event Status Code List" of the "EAN.UCC XML Business Message Standards, Version 1.3 (July 2003)." These are: 1) CANCELED; 2) COMPLETED; 3) PLANNED; 4) PROPOSED; and 5) TERMINATED.

(wwwwww) ProductDemandInfluencingEventTypeCode

The GDT ProductDemandInfluencingEventTypeCode 18800 is a coded representation for the type of an event that influences the demand for products. An example is: <ProductDemandInfluencingEventTypeCode>HOLIDAY</ProductDemandInfluencingEventTy peCode>.

The structure of GDT ProductDemandInfluencingEventTypeCode 18800 is depicted in FIG. 188. For the GDT Product Demand Influencing Event Type Code 18800, the Object Class is Product Demand Influencing Event 18802, the Property is Type 18804, the Representation/Association term is Code 18806, the Type term is CCT 18808, the Type Name term is Code 18810, and the Length is from one to thirty-five 18812. The GDT Product Demand Influencing Event Type Code 18800 may be a restricted GDT.

The GDT groups several partial quantities of standard code lists, whereby the supported partial quantities are disjunctive. Therefore no attributes, or supplementary components, are needed to identify the relevant standard code list.

The illustrative code values may be subsets of the union of the "Miscellaneous Event Type Code List" and "Promotional Event Type Code List" of the "EAN.UCC XML Business Message Standards, version 1.3 (July 2003)." These are: (From the "Miscellaneous Event Type Code List"): 1) The code ASSORTMENT_CHANGE is used when the set of items that the location carries for this category is changing, affecting one or more items; 2) The code DISASTER is used when a hurricane, tornado, accident, attack, or some other catastrophic, unexpected event affecting supply or demand; 3) The code FREIGHT_FLOW_ALLOCATION is used when an item availability may be restricted, due to unexpected demand, transportation issues, production problems, or some other reason; 4) The code INVENTORY_POLICY_CHANGE is used when the inventory policy at the store or retail distribution center is changing, resulting in changes to the estimated supply of the item; 5) The code LABOR is used when a strike or other labor issue affects supply; 6) The code LOCATION_CLOSING is used when one or more locations that carry the item are closing. No promotion is associated with the item during the closing; 7) The code LOCATION_OPENING is used when one or more new locations is opening that will carry the item. No promotion is associated with the item during the opening; 8) The code PACKAGING_LABELING_CHANGE is used when the packaging or labeling of the item is changing, possibly affecting demand or distribution; 9) The code PRICE_DECREASE is used when the price is decreasing for the item at the retail location(s); 10) The code PRICE_INCREASE is used when the price is increasing for the item at the retail location(s); 11) The code STORE_FORMAT_OR_PLANOGRAM_CHANGE is used when the store format or planogram is changing, affecting one or more items; 12) The code TEST_MARKET is used when selling a new item at a limited set of locations to gauge consumer interest, or testing an existing item in a new channel or location; and 13) The code WEATHER is used when a heat wave, cold front, snow storm, or other weather phenomenon affecting supply or demand. (From the "Promotional Event Type Code List"): 1) The code COMMUNITY_EVENT is used when a promotional activity timed to coincide with a local, regional, or national event (charity drive, Indy 500, Grammy Awards); 2) The code HOLIDAY is used when a promotional activity timed to coincide with a national, regional, or religious holiday; 3) The code SEASONAL_EVENT is used when a promotional activity timed to coincide with a change in the season, or an annual cultural phenomenon (such as "back to school"); 4) The code STORE_CLOSING is used when a promotional activity timed to coincide with the elimination of one or more store locations (e.g. going-out-of-business sale); 5) The code STORE_OPENING is used when a promotional activity timed to coincide with the opening of one or more new store locations (e.g. grand opening sale); 6) The code TRADE_ITEM_DISCONTINUATION is used when a promotional activity timed to coincide with the elimination of a product from a location or market (e.g. clearance sale); and 7) The code TRADE_ITEM_INTRODUCTION is used when a promotional activity timed to coincide with the introduction of a new product to a location or market (xxxxxx) ProductDiscontinuationIndicator A GDT ProductDiscontinuationIndicator 18900 indicates whether a product is to be discontinued, i.e., removed from the product line, or not. An example, <ProductDiscontinuationIndicator>true</ProductDiscontinuationIndicator>.

The structure of GDT ProductDiscontinuationIndicator 18900 is depicted in FIG. 189. For the GDT ProductDiscontinuationIndicator 18900, the Object Class is Product 18902, the Property is Discontinuation 18904, the Representation/Association term is Indicator 18906, the Type term is CCT 18908, and the Type Name term is Indicator 18910. Valid values for 18900 are: 1) true, meaning that the product is discontinued; or 2) false, meaning that the product is not discontinued. (See CCT:Indicator for the value range).

(yyyyyy) ProductID

A GDT ProductID 19000 is a unique identifier for a product. A product is either a tangible or intangible good, and is a part of the business activities of a company. It can be traded and contributes directly or indirectly to value added. An example and instance is:

```
<ProductID schemeID="Domestic Appliances"
        schemeAgencyID="065055766"
```

-continued

```
                        schemeAgencySchemeID="DUNS"
                        schemeAgencySchemeAgencyID="016">
    B 1165 HS
</ProductID>
```

The structure of GDT ProductID 19000 is depicted in FIG. 190. ProductID connotes the type of product, instead of a concrete object. Thus, in the above example: B1165HS means a type of appliance, not an actual appliance with the serial number XY. The GDT ProductID 19000 includes attributes schemeID 19016, the schemeAgencyID 19034, schemeAgencySchemeID 19052, and schemeAgencySchemeAgencyID 19070. For the GDT ProductID 19000, the Object Class is Product 19002, the Property is Identification 19004, the Representation/Association term is Identifier 19006, the Type term is CCT 19008, the Type Name is Identifier 19010, and the Length is from one to sixty 19012. The GDT ProductID 19000 may be a restricted GDT.

A product contributes directly to the value creation if it is salable. A product contributes indirectly to value creation if it is necessary for selling another product, it supports the salability of another product, or it occurs in the business activity of a company and it is in the company's interest that this product adds value.

For the schemeID 19016, the Category is Attribute 19018, the Object Class is IdentificationScheme 19020, the Property is Identification 19022, the Representation/Association term is Identifier 19024, the Type term is xsd 19026, the Type Name term is Token 19028, and the Length is from one to sixty 19030. The Cardinality between the GDT ProductID 19000 and the schemeID 19016 is zero or one 15732. For the schemeAgencyID 19034, the Category is Attribute 19036, the Object Class is IdentificationSchemeAgency 19038, the Property is Identification 19040, the Representation/Association term is Identifier 19042, the Type term is xsd 19044, the Type Name term is Token 19046, and the Length is from one to sixty 19048. The Cardinality between the GDT ProductID 19000 and the schemeAgencyID 19034 is zero or one 19050. For the schemeAgencySchemeID 19052, the Category is Attribute 19054, the Object Class is IdentificationSchemeAgency 19056, the Property is Scheme 19058, the Representation/Association term is Identifier 19060, the Type term is xsd 19062, the Type Name term is Token 19064, and the Length is from one to sixty 19066. The Cardinality between the GDT ProductID 19000 and the schemeAgencySchemeID 19052 is zero or one 19068. For the schemeAgencySchemeAgencyID 19070, the Category is Attribute 19072, the Object Class is IdentificationSchemeAgency 19074, the Property is SchemeAgency 19076, the Representation/Association term is Identifier 19078, the Type term is xsd 19080, the Type Name term is Token 19082, and the Length is three 19084. The Cardinality between the GDT ProductID 19000 and the schemeAgencySchemeAgencyID 19070 is zero or one 19086.

(zzzzzz) ProductInternalID

A CDT ProductInternalID 19100 is a proprietary identifier for a product. A product is either a tangible or intangible good, and is a part of the business activities of a company. It can be traded and contributes directly or indirectly to value added. Examples (in SAP MDM)

GUID of a product:

<ProductInternalID schemeID="ProductGUID" schemeAgencyID="MPL__002">1C743CEC501F6A4D8826C7EC5A8554B9</ProductInternalI D> schemeID="PartyGUID" indicates that the scheme "ProductGUID" was used to identify the product.

schemeAgencyID="MPL-002" indicates that the scheme was assigned by the business system "MPL__002."

Product ID of a product:

<ProductInternalID schemeID="ProductID" schemeAgencyID="MPL__002">VWPassat 01 0601 MPLCNT002</ProductInternalID>

The structure of CDT ProductInternalID 19100 is depicted in FIG. 191. The CDT ProductInternalID 19100 includes attributes schemeID 19118 and schemeAgencyID 19136. For the CDT ProductInternalID 19100, the Object Class is Product 19102, the Property Qualifier term is Internal 19104, the Property is Identification 19106, the Representation/Association term is Identifier 19108, the Type term is GDT 19110, the Type Name term is ProductID 19112, and the Length is from one to sixty 19114. The CDT ProductInternalID 19100 may be a restricted CDT.

The attributes of a CDT ProductInternalID 19100 may be filled as follows in an SAP MDM example.

For the schemeID 19118, the following schemes are provided: 1) ProductGUID, which identifies a product category via a Globally Unique Identifier; and 2) ProductID, which identifies a product category using an identifier. For the schemeID 19118, the Category is Attribute 19120, the Object Class is IdentificationScheme 19122, the Property is Identification 19124, the Representation/Association term is Identifier 19126, the Type term is xsd 19128, the Type Name term is Token 19130, and the Length is from one to sixty 19132. The Cardinality between the CDT ProductInternalID 19100 and the schemeID 19118 is zero or one 19134.

The schemeAgencyID 19136 is the business system in which the identifier was assigned. For the schemeAgencyID 19136, the Category is Attribute 19138, the Object Class is IdentificationSchemeAgency 19140, the Property is Identification 19140, the Representation/Association term is Identifier 19142, the Type term is xsd 19144, the Type Name term is Token 19146, and the Length is from one to sixty 19148. The Cardinality between the CDT ProductInternalID 19100 and the schemeAgencyID 19136 is zero or one 19150.

The CDT ProductInternalID 19100 represents a projection of the GDT ProductID, in which the attributes schemeID and schemeAgencyID are contained for describing an internally assigned ID. If an attribute is not explicitly assigned in the use of the GDT, it may be determined through the context.

The CDT ProductInternalID 19100 is used when both sender and recipient can access shared master data, e.g., during internal communication.

A product contributes directly to the value creation if it is salable. A product contributes indirectly to value creation if
- it is necessary for selling another product,
- it supports the salability of another product, or
- it occurs in the business activity of a company and it is in the company's interest that this product adds value.

In case the product is identified via the schema (schemeID), it should be noted that the product category may first be capable of being uniquely identified via a combined key (for example, the product category at an entity level can be uniquely identified (semantically) by using the ProductID, the ProductTypeID, the ObjectFamily and the logical system).

(aaaaaaa) CDT ProductPartyID

A CDT ProductPartyID 19200 is an identifier for a product assigned by a party. A product is either a tangible or intangible good, and is a part of the business activities of a company. It can be traded and contributes directly or indirectly to value added. An example of a CDT ProductPartyID 19200 is: <ProductSellerID>B 1165 HS</ProductSellerID>

The structure of ProductPartyID is depicted in FIG. 192. The CDT ProductPartyID 19200 is the proprietary identifier assigned by a business partner. The business partner, in its role, that assigned this identifier may derive from the business context of the message that the ProductPartyID uses. For the CDT ProductPartyID 19200, the Object Class is Product 19202, the Property Quality term is Party 19204, the Property is Identification 19206, the Representation/Association term is Identifier 19208, the Type term is GDT 19210, the Type Name term is ProductID 19212, and the Length is from one to sixty 19214. The CDT ProductPartyID 19200 may be a restricted CDT.

The use of the CDT ProductPartyID 19200, unlike the ProductStandardID, is role-dependent for example, as an ID assigned by the Buyer. The party is specified by its role. The term "Party" is replaced with the term "partner role type" for example, ProductSellerID. SchemeID and schemeVersionID are to be included as attributes as soon as there is a need to differentiate between several schemes. (See GDT ProductID 17500).

(bbbbbbb) ProductStandardID

A CDT ProductStandardID 19300 is a standardized identifier for a product, and the identification scheme may be managed by an agency from the code list DE 3055. A product is either a tangible or intangible good, and is a part of the business activities of a company. The product can be traded and contributes directly or indirectly to value added. An example of a CDT ProductStandardID 19300 is: <ProductStandardID schemeAgencyID="009">B 1165 HS</ProductStandardID>, wherein 009 is the EAN (International Article Numbering association) code.

The structure of GDT ProductStandardID 19300 is depicted in FIG. 193. The structure of GDT ProductStandard ID 19300 is depicted in FIG. 193. The GDT ProductStandard ID 19300 includes attributes schemeID 19318 and schemeAgencyID 19336. For the GDT ProductStandard ID 19300, the Object Class is Product 19302, the Property Qualifier term is Standard 19304, the Property is Identification 19306, the Representation/Association term is Identifier 19308, the Type term is GDT 19310, the Type Name term is ProductID 19312, and the Length is from one to fourteen 19314. The GDT ProductStandard ID 19300 may be a restricted GDT.

For the schemeID 19318, the Category is Attribute 19320, the Object Class is Identification Scheme 19322, the Property is Identification 19324, the Representation/Association term is Identifier 19326, the Type term is xsd 19328, the Type Name term is Token 19330, and the Length is from one to sixty 19332. The Cardinality between the GDT ProductStandard ID 19300 and the schemeID 19318 is zero or one 19334.

The "schemeAgencyID" 19336 identifies the agency that manages an identification scheme. The agencies from DE 3055 may be used as the default, but in an embodiment the roles defined in DE 3055 may no be used. At least the following two codes may be supported: 1) 009, which is the EAN.UCC, International Numbering Association code for the GTIN (Global Trade Item Number), which can have up to 14 characters; and 2) 005, which is the ISO, International Organization for Standardization code for the 13-character ISBN (International Standard Book Number). For ISBN, the code "005" (ISO) is entered for the schemeAgencyID 19336 along with the schemeID 19318 of "ISO 2108: 1992," which indicates that it is an ISBN. The ISBN scheme is managed by http://isbn-international.org/. Specifying a schemeID 19318 is not necessary if a scheme exists for an agency.

For the schemeAgencyID 19336, the Category is Attribute 19338, the Object Class is Identification Scheme Agency 19340, the Property is Identification 19342, the Representation/Association term is Identifier 19344, the Type term is xsd 19346, the Type Name term is Token 19348, and the Length is three 19350. The Cardinality between the CDT ProductStandard ID 19300 and the schemeAgencyID 19336 is one 19352.

Another standardized identification scheme is the pharmaceutical central number. There is no SchemeAgencyID 19336 for this in the code list DE 3055. How this will be represented may still be clarified. The structure of the GDTs HandlingUnit may be compatible with the "packaging" in the DELVRY03 IDoc.

The GDT ProductStandardID 19300 represents a projection of the GDT ProductID 19000, in which the attributes schemeID 19318 and schemeAgencyID 19336 are contained for describing an ID assigned by a standardization organization (i.e., an organization registered in DE 3055). The attribute schemeAgencyID 19336 may be a mandatory attribute.

Contrary to the ProductPartyID 19200, use of the ProductStandardID 19300 is not role dependent. SchemeVersionID is to be included as an attribute as soon as there is a need to differentiate between several schemes. (See GDT ProductID 19000).

(ccccccc) GDT ProductTax

A GDT ProductTax 19400 is a tax that is incurred during the sale, purchase, and consumption of products and during other related business transactions. An example of a ProductTax GDT 19400 used in TaxDueNotification, is as follows:

```
<ProductTax>
    <CountryCode>DE</CountryCode>
    <TypeCode>VAT</TypeCode>
    <TypeDescription>Value added tax</TypeDescription>
    <BaseAmount currencyCode="EUR">100</BaseAmount>
        <Percent>16</Percent>
        <Amount currencyCode="EUR">116</Amount>
        <BusinessTransactionDocumentItemGroupID>1</
BusinessTransactionDocument ItemGroupID>
    </ProductTax>.
```

The structure of the GDT ProductTax 19400 is depicted in FIG. 194. The structure of GDT ProductTax 19400 is depicted in FIG. 194. The GDT ProductTax 19400 includes elements CountryCode 19403, JurisdictionCode 19411, Type Code 19419, TypeDescription 19427, BaseAmount 19435, Percent 19443, Amount 19452, NonDeductiblePercent 19460, NonDeductibleAmount 19468, BusinessTransactionDocument ItemGroupID 19476, TriangulationIndicator 19484, and LegallyRequiredPhrase 19492. For the GDT ProductTax 19400, the Object Class is ProductTax 19401, and the Representation/Association term is Details 19402.

The CountryCode 19406 (ISO 3166-1) defines the country in which the tax is incurred. For the CountryCode 19403, the Category is Element 19404, the Object Class is ProductTax 19405, the Property is Country Code 19406, the Representation/Association term is Cod 19407, the Type term is GDT 19408, and the Type Name term is CountryCode 19409. The Cardinality between the GDT ProductTax 19400 and the CountryCode 19403 is zero or one 19410.

The JurisdictionCode 19422 is used for some countries (in particular the US) to identify the responsible tax authorities.

For the JurisdictionCode 19411, the Category is Element 19412, the Object Class is ProductTax 19413, the Property is Tax Jurisdiction Code 19414, the Representation/Association term is Code 19415, the Type term is GDT 19416, and the Type Name term is TaxJurisdictionCode 19417. The Cardinality between the GDT ProductTax 19400 and the JurisdictionCode 19411 is zero or one 19418.

The TypeCode 19438 is a tax code, see GDT ProductTaxTypeCode. For the TypeCode 19419, the Category is Element 19420, the Object Class is ProductTax 19421, the Property is Type Code 19422, the Representation/Association term is Code 19423, the Type term is GDT 19424, and the Type Name term is ProductTaxTypeCode 19425. The Cardinality between the GDT ProductTax 19400 and the TypeCode 19419 is zero or one 19426.

The TypeDescription 19454 is a short description of tax, such as for the tax code "OTH—Other taxes, unspecified, miscellaneous tax charges." For the TypeDescription 19427, the Category is Element 19428, the Property is Type Description 19430, the Representation/Association term is Text 19431, the Type term is GDT 19432, and the Type Name term is Description 19433. The Cardinality between the GDT ProductTax 19400 and the TypeDescription 19427 is zero or one 19434.

The BaseAmount 19470 is a Base amount on which tax was calculated (assessment basis). For the BaseAmount 19435, the Category is Element 19436, the Object Class is ProductTax 19437, the Property is Base Amount 19438, the Representation/Association term is Amount 19439, the Type term is GDT 19440*m*, and the Type Name term is Amount 19441. The Cardinality between the GDT ProductTax 19400 and the BaseAmount 19435 is zero or one 19442.

The Percent 19486 is a tax rate, or level of tax in percent. For the Percent 19443, the Category is Element 19444, the Object Class is ProductTax 19445, the Property is Percent 19446, the Representation/Association term is Percent 19447, the Type term is GDT 19448, and the Type Name term is Percent 19449. The Cardinality between the GDT ProductTax 19400 and the Percent 19443 is either zero or one 19450.

The Amount 19403 is a tax amount that is due for the underlying base amount. For the Amount 19451, the Category is Element 19452, the Object Class is ProductTax 19453, the Property is Amount 19454, the Representation/Association term is Amount 19455, the Type term is GDT 19456, and the Type Name term is Amount 19457. The Cardinality between the GDT ProductTax 19400 and the Amount 19451 is either zero or one 19458.

The NonDeductiblePercent 19419 is a percentage rate, portion, of tax that is non-deductible. For the NonDeductiblePercent 19459, the Category is Element 19460, the Object Class is ProductTax 19461, the Property is NonDeductiblePercent 19462, the Representation/Association term is Decimal 19463, the Type term is GDT 19464, and the Type Name term is Percent 19465. The Cardinality between the GDT ProductTax 19400 and the NonDeductiblePercent 19459 is zero or one 19466.

The NonDeductibleAmount 19435 is an amount of tax that is non-deductible. For the NonDeductibleAmount 19467, the Category is Element 19468, the Object Class is ProductTax 19469, the Property is NonDeductibleAmount 19470, the Representation/Association term is Amount 19471, the Type term is GDT 19472, and the Type Name term is Amount 19473. The Cardinality between the GDT ProductTax 19400 and the NonDeductibleAmount 19467 is zero or one 19474.

The BusinessTransactionDocumentItemGroupID 19451 groups items of a BusinessTransactionDocument that may be taxed in the same way. There is no global code list for the BusinessTransactionDocumentItemGroupID 19451, the possible values are arbitrary and may be used consistently within a document (e.g., an invoice). The BusinessTransactionDocumentItemGroupID 19451 can optionally be used to relate the taxes at item level to the summary tax lines at document level. The BusinessTransactionDocumentItemGroupID 19451 assists during invoice verification. For the BusinessTransactionDocument ItemGroupID 19475, the Category is Element 19476, the Object Class is ProductTax 19477, the Property is Business Transaction Document Item Group Identification 19478, the Representation/Association term is Identifier 19479, the Type term is GDT 19480, and the Type Name term is BusinessTransactionDocumentItemGroupID 19481. The Cardinality between the GDT ProductTax 19400 and the BusinessTransactionDocument ItemGroupID 19475 is zero or one 19482.

The TriangulationIndicator 19467 is a yes or no indicator that specifies whether the transaction is a triangular transaction. For the TriangulationIndicator 19483, the Category is Element 19484, the Object Class is ProductTax 19485, the Property is Triangulation 19486, the Representation/Association term is Indicator 19487, the Type term is CCT 19488, and the Type Name term is Indicator 19489. The Cardinality between the GDT ProductTax 19400 and the TriangulationIndicator 19483 is zero or one 19490.

The LegallyRequiredPhrase 19438 is a legally required phrase that may be printed on the invoice. For the LegallyRequiredPhrase 19491, the Category is Element 19492, the Object Class is ProductTax 19493, the Property is Legally Required Phrase 19494, the Representation/Association term is Text 19495, the Type term is CCT 19496, the Type Name term is Text 19497, and the Length is one to two hundred fifty-six 19498. The Cardinality between the GDT ProductTax 19400 and the LegallyRequiredPhrase 19491 is zero or one 19499.

The segment GDT ProductTax 19400 is connected with an amount from which the base amount to be taxed is calculated. Rules on which taxes may be reported in summary form or at item level are country-dependent and are derived from the relevant legal requirements. For example, German sales tax may be reported in an invoice in summarized form for each tax rate. Non-deductible taxes are relevant for incoming invoices and credit memos. When a tax rate or tax amount is reported, the tax type the TypeCode 19438, may also be specified.

It is possible to tell from the BusinessTransactionDocumentItemGroupID 19451 how the individual items are taxed. If the items also report tax rate and tax amount, then the BusinessTransactionDocumentItemGroupID 19451 is superfluous. An example of an invoice with 3 items with German sales tax is shown in the following table:

| | Country | Type Code | Description | Base Amount | Percent | Amount | Item Group ID |
|---|---|---|---|---|---|---|---|
| Item 1 | | | | 100.00 EUR | | | A |
| Item 2 | | | | 200.00 EUR | | | B |
| Item 3 | | | | 300.00 EUR | | | A |

-continued

| | Country | Type Code | Description | Base Amount | Percent | Amount | Item Group ID |
|---|---|---|---|---|---|---|---|
| Total A | DE | VAT | Sales Tax | 400.00 EUR | 16 | 64.00 EUR | A |
| Total B | DE | VAT | Sales Tax | 200.00 EUR | 7 | 14.00 EUR | B |

The GDT ProductTax 19400 is used to report different tax portions in invoice amounts or to initiate tax returns and payments of a company to the responsible tax authorities. A tax is a mandatory public payment that a community levies on natural and legal persons in its territory at a unilaterally fixed level (unlike fees and contributions) without providing a service in return. The tax jurisdiction code of a natural or legal person is part of the address data. The tax calculation depends on the tax jurisdiction code of the ship-from or ship-to party in certain countries, e.g., the US and Brazil.

(ddddddd) ProductTaxEventTypeCode

The GDT ProductTaxEventTypeCode 19500 is a coded representation of the tax event type that is linked to the purchase, sale or consumption of products. A tax event type refers to a combination of characteristics that are the basis for tax liability, tax relief measures, or tax exemptions of specific types and amounts, from the point of view of country-specific tax laws. An example or Instance of GDT ProductTaxEventTypeCode 19500 is:

<ProductTaxEventTypeCode>
DE101
</ProductTaxEventTypeCode>.

The structure of GDT ProductTaxEventTypeCode 19500 is depicted in FIG. 195.

Characteristics of the tax event types in terms of tax legislation are the subject of taxation, the legal entity that may pay tax, and the taxation object, the object, transaction or status of taxation. The type and number of tax event types to be taken into account for product taxes derive from the tax laws of a country. These laws or their provisions generally do not stipulate any specific codes, however. The codes may therefore be individually defined by the respective software manufacturers. The structure of GDT Product Tax Event Type Code 19500 is depicted in FIG. 195. For the GDT Product Tax Event Type Code 19500, the Object Class is Product Tax Event 19502, the Property is Type Code 19504, the Representation/Association term is Code 19506, the Type term is CCT 19508, the Type Name term is Code 19510, and the Length is from three to six 19512. The GDT Product Tax Event Type Code 19500 may be a restricted GDT.

In the GDT ProductTaxEventTypeCode 19500, the first two figures consist of the two-character ISO code 3166-1 for the country for which the tax matter is relevant, and is generally followed by a three-digit number from 100 to 999. The GDT ProductTaxEventTypeCodes 19500 for Germany and the USA are listed in the following table:

| ProductTaxEventTypeCode | Description |
|---|---|
| DE100 | Non-taxable delivery |
| DE101 | Domestic delivery |
| DE102 | Intra-community delivery to recipient with VAT reg. no. |
| DE103 | Intra-community delivery of new vehicles to recipient without VAT reg. no. |
| DE104 | Intra-community delivery of new vehicles outside a company |
| DE105 | Tax-free delivery according to § 4 nos. 2 to 7 UStG (German taxation law) |
| DE106 | Tax-free delivery according to § 4 nos. 8 to 28 UStG (German taxation law) |
| DE107 | Domestic delivery according to § 3c(3) UStG (German taxation law) (Distance selling) |
| DE110 | Export delivery (export to third country) |
| DE151 | Delivery by an agricultural or forestry company to the remaining community area to recipients with VAT reg. no. |
| DE152 | Domestic delivery by an agricultural or forestry company according to § 24(1)2 UStG (German taxation law) |
| DE200 | Non-taxable acquisition |
| DE201 | Domestic acquisition |
| DE202 | Tax-free intra-community acquisition according to § 4b UStG (German taxation law) |
| DE203 | Taxable intra-community acquisition of objects |
| DE204 | Taxable intra-community acquisition of other services |
| DE205 | Taxable intra-community acquisition of new vehicles from deliverers without VAT reg. no. |
| DE206 | Taxable intra-community acquisition according to delivery to first recipient in intra-community triangular transaction according to § 25b(2) UStG (German taxation law) |
| DE207 | Acquisition according to § 13b(2) UStG (German taxation law) (beneficiary owes tax) |
| DE210 | Import (import from third country) |
| DE301 | Posttax for taxed payments due to increased tax rate |
| DE302 | Authorization for input tax deduction according to § 15a UStG (German taxation law) |
| US100 | Non-taxable domestic sale |

-continued

| ProductTaxEventTypeCode | Description |
|---|---|
| US101 | Taxable domestic sale |
| US110 | Export (not taxable) |
| US200 | Non-taxable domestic acquisition |
| US201 | Domestic acquisition use tax |
| US202 | Domestic acquisition sales tax |
| US210 | Import (taxable) |

The GDT ProductTaxEventTypeCode 19500 is used in tax calculation to determine the type and percentage rate of tax to be taken into account. Furthermore, based on the GDT ProductTaxEventTypeCode 19500, the tax register decides how and when the reported tax may be declared and paid to the tax authorities.

The GDT ProductTaxEventTypeCode 19500 may be a proprietary code list with fixed predefined values. Changes to the permitted values involve changes to the interface. In an embodiment, the GDT ProductTaxEventTypeCode 19500 is similar to the tax code in R/3 from a semantic point of view. In contrast to the tax code, however, the GDT ProductTaxEventTypeCode 19500 is independent of tax rates.

(eeeeeee) ProductTaxTypeCode

The GDT ProductTaxTypeCode 19600 is a coded representation of the type of a tax that is incurred during the sale, purchase, and consumption of products and during other related business transactions. An example of 19600 is: <ProductTaxTypeCode>VAT</ProductTaxTypeCode>

The structure of 19600 is depicted in FIG. 196. The structure of GDT Product Tax Type Code 19600 is depicted in FIG. 196. For the GDT Product Tax Type Code 19600, the Object Class is ProductTaxType 19602, the Property is Code 19604, the Representation/Association term is Code 19606, the Type term is CCT 19608, the Type Name term is Code 19610, and the Length is three 19612. The GDT Product Tax Type Code 19600 may be a restricted GDT.

The complete UN/EDIFACT code list "Duty or tax or fee Type code" is used for the values of the GDT ProductTaxTypeCode 19600. The GDT ProductTaxTypeCode 19600 is used for entering taxes, e.g., in invoices. The relevant types of product taxes for Germany and the US are, for example:

1) A Value added tax (VAT), which is a sales tax levied in Germany. The VAT also applies to all other EU countries and countries with comparable sales tax.

2) A State/provincial sales tax (STT), which is a sales tax levied by federal states in the USA; also applies to other federal countries with comparable tax.

3) Local sales tax (LOC), which is a sales tax levied by tax authorities in a state in the US, e.g., county sales tax, city sales tax. The LOC also applies to other federal countries with comparable tax.

(fffffff)ProductTypeCode

The GDT ProductTypeCode 19700 is a coded representation of the product type. A product type describes the nature of products and establishes the basic properties for products of this type. An example of 19700 is: <ProductTypeCode>1</ProductTypeCode>. The structure of GDT ProductTypeCode 19700 is depicted in FIG. 197. The structure of GDT ProductTypeCode 19700 is depicted in FIG. 197. For the GDT ProductTypeCode 19700, the Category is Element 19702, the Object Class is Product 19704, the Property is Type 19706, the Representation/Association term is Code 19708, the Type term is CCT 19710, the Type Name term is Code 19712, and the Length is from one to two 19714. The GDT ProductTypeCode 19700 may be a restricted GDT.

Some illustrative examples of the GDT ProductTypeCode 19700 are:

1) The number 1, which represents a Material. A material is a tangible product that can be created and thus represents a commercial value. A material's manufacture/production is time-independent from its consumption/use. A material can be traded; used in manufacture, consumed, or produced.

2) The number 2, which represents a Service product. A service product is an intangible product that describes the rendering of service. The rendering of a service coincides in time with its use.

The GDT ProductTypeCode 19700 determines the type of a product in more detail. It can be used in the context of a product instance or of a reference to a product instance in order to qualify this product instance, and can also be used in its own right. The GDT ProductTypeCode 19700 may be a proprietary code list with fixed predefined values. Changes to the permitted values involve changes to the interface.

The ProductTypeCode can be expanded with other product types if necessary, including for example:

3) The number 3, which represents a Financial Product. A financial product may be a series of incoming and outgoing payments based on a contract and for the purposes of investment or financing. Examples of a financial product are: Shares, bonds, loans, foreign exchange transactions or financial derivatives.

4) The number 4, which represents an Intellectual Property. Intellectual Property may be an intangible product of creative work. Intellectual Property includes, for example, a media title, if it is (art)work that is to be conveyed to a wide audience through the media.

5) The number 5, which represents a Warranty. A warranty may be a guarantee within a specified time period to be responsible for flaws or defects in a product sold. The type and scope of this service are specified in the warranty.

(ggggggg) PromotionID

A GDT PromotionID 19800 is a unique identifier for a promotion. A promotion is a marketing activity between the consumer goods industry and retail over a limited timeframe to increase brand capital, name recognition, and market share, to boost sales volumes, or to position new products or product groups. An example of 19800 is: <PromotionID>72318</PromotionID>.

The structure of GDT PromotionID 19800 is depicted in FIG. 198. For the GDT PromotionID 19800, the Object Class is Promotion 19802, the Property is Identification 19804, the Representation/Association term is Identifier 19806, the Type term is CCT 19808, the Type Name term is Identifier 19810, and the Length is from one to thirty-five 19812. The GDT PromotionID 19800 may be a restricted GDT.

Role-based IDs (e.g., BuyerPromotionID, SellerPromotionID) based on the CCT identifier are used without additional attributes; they may be unique in connection with the identification of the business partner described by the role (e.g., BuyerID, SellerID). A promotion can have different objectives, e.g., to generate awareness of a new product, selectively increase demand for a certain brand, retain loyal customers, or fight competition, with various characteristics, e.g., price reductions, retail promotion, and promotional rebates.

GDT PromotionID 19800 is used in connection with cooperative business processes, in particular Vendor Managed Inventory (VMI) and Collaborative Planning, Forecasting and Replenishment (CPFR) to clearly identify a promotion between the business partners involved. Initially, one business partner, such as a retail company or a consumer goods manufacturer, informs the other partner of his identification of the promotion with a PromotionID. This identification can then be used as a reference in the downstream message exchange between the business partners.

```
<Property>
    <ID schemeAgencyID="005">PROPERTY_1</ID>
    <DefinitionClassReference>
        <ID schemeAgencyID="005">DEFCLASS_01</ID>
        <VersionID>DEFCLASS_01</VersionID>
    </DefinitionClassReference>
    <PreferredName languageCode="EN">My first property
    </PreferredName>
    <PreferredName languageCode="DE">Mein erstes Merkmal
    </PreferredName>
    <PropertyDataTypeReference>DATATYPE_5
    </PropertyDataTypeReference>
</Property>.
```

The structure of GDT Property 19900 is depicted in FIG. 199. The GDT Property 19900 includes attribute ActionCode 19902, elements ID 19910, VersionID19918, DefinitionClassReference 19926, RevisionID 19934, CreationDateTime 19944, VersionDateTime 19952, RevisionDateTime 19960, SubjectAreaCode 19968, PreferredName 19976, SynonymousName 19985, AbbreviationName 19994, DefiningDescription 19904*a*, AdditionalDescription 19913*a*, UsageDescription 19922*a*, PreferredSymbolNote 19931*a*, SynonymousSymbolNote 19940*a*, DefinitionSourceDocument WebAddress 19949*a*, IconAttachment 19958*a*, FigureAttachment 19966*a*, PropertyDataType 19974*a*, PropertyDataTypeReference 19982*a*, MeasureUnitMeaningCode 19990*a*, DependingPropertyReference 19998*a*, ConstrainingPropertyReference 19908*b*, AspectID 19917*b*, TargetInterfaceElementID 19926*b*, MultipleValueIndicator 19935*b*, TextSearchableIndicator 19944*b*, ParametricSearchableIndicator 19954*b*, and ValuationRequiredIndicator 19963*b*. For the GDT Property 19900, the Representation/Association term is Details 19901.

The ActionCode 19902 is an instruction to the recipient of a message telling it how to process a transmitted property. For the ActionCode 19902, the Category is Attribute 19903, the Object Class is Property 19904, the Property is Action 19905, the Representation/Association term is Code 19906, the Type term is GDT 19907, the Type Name term is ActionCode 19908. The Cardinality between the GDT Property 19900 and the ActionCode 19902 is zero or one 19909.

The ID 19910 is an unique identifier of the property. For the ID 19910, the Category is Element 19911, the Object Class is Property 19912, the Property is Identification 19913, the Representation/Association term is PropertyID 19914, the Type term is GDT 19915, the Type Name term is PropertyID 19916. The Cardinality between the GDT Property 19900 and the ID 19910 is one 19917.

The VersionID 19918 is an unique identifier for a version of the property. For the VersionID 19918, the Category is Element 19919, the Object Class is Property 19920, the Property is Version Identification 19921, the Representation/Association term is VersionID 19922, the Type term is GDT 19923, and the Type Name term is VersionID 19924. The Cardinality between the GDT Property 19900 and the VersionID 19918 is zero or one 19925.

The DefinitionClassReference 19926 is a reference to the definition class (or to a version of the definition class) of the property; if this reference exists, the property is unique within the specified definition class. For the DefinitionClassReference 19926, the Category is Element 19927, the Object Class is Property 19928, the Property is Definition Class Reference 19929, the Representation/Association term is PropertyDefinitionClassReference 19930, the Type term is GDT 19931, and the Type Name term is PropertyDefinitionClassReference 19932. The Cardinality between the GDT Property 19900 and the DefinitionClassReference 19926 is zero or one 19933.

The RevisionID 19934 is a revision number, that is, a sequential number that is assigned when changes are made. For the RevisionID 19934, the Category is Element 19935, the Object Class is Property 19936, the Property is Revision identification 19937, the Representation/Association term is Identifier 19938, the Type term is CCT 19939, the Type Name term is Identifier 19940, and the Length is from one to ten 19941. The Cardinality between the GDT Property 19900 and the RevisionID 19934 is zero or one 19942. The RevisionID may be a restricted CCT.

The CreationDateTime 19944 is a creation date/time stamp. For the CreationDateTime 19944, the Category is Element 19945, the Object Class is Property 19946, the Property is Creation 19947, the Representation/Association term is Date Time 19948, the Type term is GDT 19949, and the Type Name term is Date Time 19950. The Cardinality between the GDT Property 19900 and the CreationDateTime 19944 is zero or one 19951.

The VersionDateTime 19952 is a creation date/time stamp of this property version. For the VersionDateTime 19952, the Category is Element 19945, the Object Class is Property 19954, the Property is Version 19955, the Representation/Association term is Date Time 19956, the Type term is GDT 19957, and the Type Name term is Date Time 19958. The Cardinality between the GDT Property 19900 and the VersionDateTime 19952 is zero or one 19959.

The RevisionDateTime 19960 is a date/time stamp of the last change. For the RevisionDateTime 19960, the Category is Element 19961, the Object Class is Property 19962, the Property is Revision 19968, the Representation/Association term is Date Time 19964, the Type term is GDT 19965, and the Type Name term is Date Time 19966. The Cardinality between the GDT Property 19900 and the RevisionDateTime 19960 is zero or one 19967.

The SubjectAreaCode 19968 is a subject area in which the property can be used. (See GDT SubjectAreaCode). For the SubjectAreaCode 19968, the Category is Element 19969, the Object Class is Property 19970, the Property is Subject Area 19971, the Representation/Association term is Code 19972, the Type term is GDT 19973, and the Type Name term is SubjectAreaCode 19974. The Cardinality between the GDT Property 19900 and the SubjectAreaCode 19968 is zero or n 19975.

The PreferredName 19976 is a name of the property. There may be a maximum of one entry per language for the PreferredName 19976. For the PreferredName 19976, the Category is Element 19977, the Object Class is Property 19978, the Property Quality term is Preferred 19979, the Property is Name 19980, the Representation/Association term is Name 19981, the Type term is GDT 19982, and the Type Name term is Name 19983. The Cardinality between the GDT Property 19900 and the PreferredName 19976 is from one to n 19984.

The SynonymousName 19985 is a synonym name for the property. For the SynonymousName 19985, the Category is Element 19986, the Object Class is Property 19987, the Property Quality term is Synonymous 19988, the Property is Name 19989, the Representation/Association term is Name 19990, the Type term is GDT 19991, and the Type Name term is Name 19992. The Cardinality between the GDT Property 19900 and the SynonymousName 19985 is from zero to n 19993.

The AbbreviationName 19994 is an abbreviated property name. There may be a maximum of one entry per language for the AbbreviationName 19994. For the AbbreviationName 19994, the Category is Element 19995, the Object Class is Property 19996, the Property Quality term is Abbreviation 19997, the Property is Name 19998, the Representation/Association term is Name 19999, the Type term is GDT 19901*a*, and the Type Name term is Name 19902*a*. The Cardinality between the GDT Property 19900 and the AbbreviationName 19994 is from zero to n 19903*a*.

The DefiningDescription 19904*a* is an unique definition of the property's meaning that makes it possible to uniquely distinguish the property from the other properties. A definition may be entered for each language. For the Defining/Description 19904*a*, the Category is Element 19905*a*, the Object Class is Property 19906*a*, the Property Quality term is Defining 19907*a*, the Property is Description 19908*a*, the Representation/Association term is Description 19909*a*, the Type term is GDT 19910*a*, and the Type Name term is Description 19911*a*. The Cardinality between the GDT Property 19900 and the Defining/Description 19904*a* is from zero to n 19912*a*.

The AdditionalDescription 19913*a* is an additional information about parts of the property which aids in the understanding of the property. For the AdditionalDescription 19913*a*, the Category is Element 19914*a*, the Object Class is Property 19915*a*, the Property Quality term is Additional 19916, the Property is Description 19917*a*, the Representation/Association term is Description 19918*a*, the Type term is GDT 19919*a*, and the Type Name term Description 19920*a*. The Cardinality between the GDT Property 19900 and the AdditionalDescription 19913*a* is from zero to n 19921*a*.

The UsageDescription 19922*a* is a free-text comment. The 19922*a* can be used to add explanatory text or general/individual notes. The comment may not supplement the definition; the description is used for this. The comment clarifies particular aspects concerning the use of a property. For the UsageDescription 19922*a*, the Category is Element 19923*a*, the Object Class is Property 19924*a*, the Property Quality term is Usage 19925*a*, the Representation/Association term is Description, the Type term is GDT 19928*a*, and the Type Name term is Description 19929*a*. The Cardinality between the GDT Property 19900 and the UsageDescription 19922*a* is from zero to n 19930*a*.

The PreferredSymbol 19931*a* is a symbol for the property, such as "d" for diameter. For the PreferredSymbolNote 19931*a*, the Category is Element 19932*a*, the Object Class is Property 19933*a*, the Property Quality term is Preferred 19934*a*, the Property is Symbol 19935*a*, the Representation/Association term is Note 19936*a*, the Type term is GDT 19937*a*, and the Type Name term is Note 19938*a*. The Cardinality between the GDT Property 19900 and the PreferredSymbolNote 19931*a* is zero or one 19939*a*.

The SynonymousSymbolNote 19940*a* is a synonymous symbol for the property. For the SynonymousSymbolNote 19940*a*, the Category is Element 19941*a*, the Object Class is Property 19942*a*, the Property Quality term is Synonymal 19943*a*, the Property is Symbol 19944*a*, the Representation/Association term is Note 19945*a*, the Type term is GDT 19946*a*, and the Type Name term is Note 19947*a*. The Cardinality between the GDT Property 19900 and the SynonymousSymbolNote 19940*a* is zero or n 19948*a*.

The DefinitionSourceDocumentWebAddress 19949*a* is a reference to the original document from which the complete property definition or its meaning was taken. For the DefinitionSourceDocument WebAddress 19949*a*, the Category is Element 19950*a*, the Object Class is Property 19951*a*, the Property Quality term is DefinitionSource 19952*a*, the Property is Document 19953*a*, the Representation/Association term is WebAddress 19954*a*, the Type term is GDT 19955*a*, and the Type Name term is WebAddress 19956*a*. The Cardinality between the GDT Property 19900 and the DefinitionSourceDocument WebAddress 19949*a* is zero or one 19957*a*.

The IconAttachment 19958*a* is a preferred icon, that is, a character (alphanumeric character, symbol, or combination thereof) that conforms to international standards and that, particularly in formulas, represents the property in place of the property name. For the IconAttachement 19958*a*, the Category is Element 19959*a*, the Object Class is Property 19960*a*, the Property is Icon 19961*a*, the Representation/Association term is Attachment 19962*a*, the Type term is GDT 19963*a*, and the Type Name term is Attachment 19964*a*. The Cardinality between the GDT Property 19900 and the IconAttachment 19958*a* is zero or one 19965*a*.

The FigureAttachment 19966*a* is a link to a figure. For the FigureAttachment 19966*a*, the Category is Element 19967*a*, the Object Class is Property 19968*a*, the Property is FIG. 19969*a*, the Representation/Association term is Attachment 19970*a*, the Type term is GDT 19971*a*, and the Type Name term is Attachement 19972*a*. The Cardinality between the GDT Property 19900 and the FigureAttachment 19966*a* is zero or one 19973*a*.

The PropertyDataType 19974*a* is used if the data type of the property is defined for this property (local), then the GDT is embedded here. In this case, GlobalPropertyDataType is not used. For the PropertyDataType 19974*a*, the Category is Element 19975*a*, the Object Class is Property 19976*a*, the Property is Property Data Type 19977*a*, the Representation/Association term is PropertyDataType 19978*a*, the Type is GDT 19979*a*, and the Type Name term is PropertyDataType 19980*a*. The Cardinality between the GDT Property 19900 and the PropertyDataType 19974*a* is zero or one 19981*a*.

The PropertyDataTypeReference 19982*a* is used if an independent data type (global) is to be used for this property, then its identifier is specified here. In this case, LocalPropertyDataType is not used. For the PropertyDataTypeReference 19982*a*, the Category is Element 19983*a*, the Object Class is Property 19984*a*, the Property is Property Data Type Reference 19985*a*, the Representation/Association term is PropertyDataTypeReference 19986*a*, the Type term is GDT 19987*a*, and the Type Name term is PropertyDataTypeReference 19988*a*. The Cardinality between the GDT Property 19900 and the PropertyDataTypeReference 19982*a* is zero or one 19989*a*.

The MeasureUnitMeaningCode 199909*a* indicates the meaning of a physical unit. (See GDT MeasureUnitMeaningCode). For the MeasureUnitMeaningCode 19990*a*, the Category is Element 19991*a*, the Object Class is Property 19992*a*, the Property is Measure Unit Meaning 19993*a*, the Representation/Association term is Code 19994*a*, the Type term is GDT 19995*a*, and the Type Name term is MeasureUnitMeaningCode 19996*a*. The Cardinality between the GDT Property 19900 and the MeasureUnitMeaningCode 19990*a* is zero or one 19997*a*.

The DependingPropertyReference 19998*a* is, for a constraining property, the reference to the depending properties. For examples, the "temperature" property, which affects the measurement of a length, contains the key for the "length" property here, in the evaluation, the "temperature" property contains the temperature at which the length is to be measured. For the DependingPropertyReference 19998*a*, the Category is Element 19999*a*, the Object Class is Property 19901*b*, the Property Quality term is Depending 19902*b*, the Property is Property Identification 19903*b*, the Representation/Association term is PropertyIdentifcation 19904*b*, the Type term is GDT 19905*b*, and the Type Name term is PropertyReference 19906*b*. The Cardinality between the GDT Property 19900 and the DependingPropertyReference 19998*a* is from zero to n 19907*b*.

The ConstrainingPropertyReference 19908*b* is, for a depending property, the reference to the constraining properties. For example, the "length" property, which is dependent on the temperature, contains the key for the "temperature" property here; in the evaluation, the "temperature" property contains the temperature at which the length is to be measured. For the ConstrainingPropertyReference 19908*b*, the Category is Element 19909*b*, the Object Class is Property 19910*b*, the Property Quality term is Constraining 19911*b*, the Property is Property Identification 19912*b*, the Representation/Association term is PropertyIdentification 19913*b*, the Type term is GDT 19914*b*, and the Type Name term is PropertyReference 19915*b*. The Cardinality between the GDT Property 19900 and the ConstrainingPropertyReference 19908*b* is from zero to n 19916*b*.

The following elements may be used in the context of a catalogue:

The AspectID 19917*b* identifies an aspect for which the property is relevant. For the AspectID 19917*b*, the Category is Element 19918*b*, the Object Class is Property 19919*b*, the Property is Aspect Identification 19920*b*, the Representation/Association term is Identifier 19921*b*, the Type term is GDT 19922*b*, and the Type Name term is AspectID 19923*b*. The Cardinality between the GDT Property 19900 and the AspectID 19917*b* is form zero to n 19924*b*. The AspectID 19917 may be for the catalogue 19925*b*.

The TargetInterfaceElementID 48426*b* is the unique identifier of an element in an interface to which element the property can be assigned. For the TargetInterfaceElementID 19926*b*, the Category is Element 19927*b*, the Object Class is Property 19928*b*, the Property is Target Interface Element Identification 19929*b*, the Representation/Association term is Identifier 19930*b*, the Type term is GDT 19931*b*, and the Type Name term is InterfaceElementID 19932*b*. The Cardinality between the GDT Property 19900 and the TargetInterfaceElementID 19926*b* is from zero to n 19933*b*. The TargetInterface ElementID 19926*b* may be for the catalogue 19934*b*.

The MultipleValueIndicator 19935*b* indicates whether a property can contain a list of values or not. For the MultipleValueIndicator 19935*b*, the Category is Element 19936*b*, the Object Class is Property 19937*b*, the Property is Multiple Value Indication 19938*b*, the Representation/Association term is Indicator 19939*b*, the Type term is GDT 19940*b*, and the Type Name term is PropertyMultipleValueIndicator 19941*b*. The Cardinality between the GDT Property 19900 and the MultipleValueIndictor 19935*b* is zero or one 19942*b*. The MultipleValueIndictor 19935*b* may be for the catalogue 19943*b*.

The TextSearchableIndicatorm 19944 indicates whether a property is suitable for a text search or not. For the TextSearchableIndicator 19944*b*, the Category is Element 19946*b*, the Object Class is Property 19947*b*, the Property is TextSearchableIndication 19948*b*, the Representation/Association term is Indicator 19949*b*, the Type term is GDT 19950*b*, the Type Name term is TextSearchableIndicator 19951*b*. The Cardinality between the GDT Property 19900 and the TextSearchableIndicator 19944*b* is zero or one 19952*b*. The TextSearchableIndicator 19944*b* may be for the catalogue 19953*b*.

The ParametricSearchableIndicator 19954*b* indicates, whether a property is suitable for a parametric search or not. For the ParametricSearchableIndicator 19954*b*, the Category is Element 19955*b*, the Object Class is Property 19956*b*, the Property is Parametric Searchable Indication 19957*b*, the Representation/Association term is Indicator 19958*b*, the Type term is GDT 19959*b*, and the Type Name term is PropertyParametric SearchableIndicator 19960*b*. The Cardinality between the GDT Property 19900 and the ParametricSearchableIndicator 19954*b* is zero or one 19961*b*. The ParametricSearchableIndicator 19954*b* may be for the catalogue 19962*b*.

The ValuationRequiredIndicator 19963*b* indicates whether a value may be assigned for the property or not. For the ValuationRequiredIndicator 19963*b*, the Category is Element 19964*b*, the Object Class is Property 19965*b*, the Property is Valuation Required Indication 19966*b*, the Representation/Association term is Indicator 19967*b*, the Type term is GDT 19968*b*, and the Type Name term is PropertyValuationRequiredIndicator 19969*b*. The Cardinality between the GDT Property 19900 and the ValuationRequiredIndicator 19963*b* is zero or one 19970*b*. The ValuationRequiredIndicator 19963*b* may be for the catalogue 19971*b*.

See, for example, ISO13584/42 (Definition of data model for properties) available from the GDT owner, for illustrative Integrity Conditions for the PropertyDataType 19900.

The property may have a data type. The data type can either be embedded under PropertyDataType 19900 or specified as a reference under PropertyDataType 19900.

The ISO13584/42 specifies that a property cannot be depending and constraining at the same time. This means that, in an embodiment, DependingPropertyReference 19998*a* and ConstrainingPropertyReference 19908*b* are not both be filled out.

Properties can be used for classification, for example.

Some elements that are mandatory in ISO13584/42 are optional in this scheme. This is intended to enable wider use of the scheme.

The attribute AdditionalDescription 19913*a* corresponds to the attribute Note in ISO; the attribute UsageDescription 19922*a* corresponds to the attribute Remark in ISO. ISO also contains an attribute that contains a formula describing the property. The GDT may not contain this attribute.

(iiiiii) PropertyDataType

A CDT PropertyDataType 20000 is the data type of a property. It describes the syntax of the values and can contain a list of permitted values. An example or instance of 20000 is as follows and describes a typical data type in character format and with a fixed length.

```
<PropertyDataType>
  <ID schemeAgencyID="005">MY__DATATYPE__01</ID>
  <VersionID>5</VersionID>
  <PreferredName languageCode='EN'>My first data
```

-continued

```
type</PreferredName>
        <Format>02</Format>
        <MaximumTotalDigits>13</MaximumTotalDigits>
        <LowerCaseAllowedIndicator>true</LowerCaseAllowedIndicator>
    </PropertyDataType>
```

The following example of 20000 describes a data type in numeric format and with decimal places. Negative numbers are permitted, as are intervals. The following format is used:

```
    <PropertyDataType>
        <ID schemeAgencyID="005">MY__DATATYPE__01</ID>
        <VersionID>5</VersionID>
        <PreferredName languageCode='EN'>My first data
type</PreferredName>
        <FormatCode>06</FormatCode>
        <MaximumTotalDigitsNumeric>13
        </MaximumTotalDigitsNumeric>
        <FractionalDigitsNumeric>5</FractionalDigitsNunmeric>
  <NegativeValuesAllowedIndicator>true
  </NegativeValuesAllowedIndicator>
        <IntervalValuesAllowedIndicator>true
        </IntervalValuesAllowedIndicator>
    </PropertyDataType>.
```

The structure of CDT PropertyDataType 20000 is depicted in FIG. 200. The CDT PropertyDataType 20000 includes attribute ActionCode 20002 and elements ID 20010, VersionID 20018, PreferredName 20026, SynonymousName 20035, ShortName 20044, IconAttachment 20053, Description 20061, UsageDescription 20069, FormatCode 20078, LanguageDependencyIndicator 20086, MaximumTotalDigitNumberValue 20094, FractionalDigitNumberValue 20005*a*, LowerCaseAllowedIndicator 20015*a*, NegativeValueAllowedIndicator 20023*a*, MeasureUnitCode, CurrencyCode, ExponentialRepresentationTypeCode 20047*a*, ExponentintegerValue 20055*a*, IntervalValueIndicator 20064*a*, FractionalDigitPresentationAccuracyIndicator 20073*a*, RegularExpression 20082*a*, SeparatorUsageIndicator 20090*a*, TupelLengthValue 20098*a*, ComponentPropertyDefinition Class Reference 20008*b*, ComponentProperty 20017*b*, AllowedPropertyValueElement 20042*b*, and AllowedPropertyValuation 20084*b*. For the PropertyDataType 20000, the Representation/Association term is Details 20001.

The ActionCode 20002 is an instruction to the recipient of a message telling it how to process a transmitted property data type. For the ActionCode 20002, the Category is Attribute 20003, the Object Class is PropertyDataType 20004, the Property is Action 20005, the Representation/Association term is Code 20006, the Type term is GDT 20007, and the Type Name term is ActionCode 20008. The Cardinality between the PropertyDataType 20000 and the ActionCode 20002 is zero or one 20009.

The ID 20010 is an unique identifier of the data type. A data type can either be embedded in a property or defined as a dependent object, in which case, no identifier or names are specified. If a data type is to be used for several properties, it may have its own key and can have a name. For the ID 20010, the Category is Element 20011, the Object Class is PropertyDataType 20012, the Property is Identification 20013, the Representation/Association term is Identifier 20014, the Type term is GDT 20015, and the Type Name term is PropertyDataTypeID 20016. The Cardinality between the PropertyDataType 20000 and the ID 20010 is zero or one 20017.

The VersionID 20018 is an unique identifier for a version of the data type. For the VersionID 20018, the Category is Element 20019, the Object Class is PropertyDataType 20020, the Property is Version Identification 20021, the Representation/Association term is VersionID 20022, the Type term is GDT 20023, and the Type Name term is VersionID 20024. The Cardinality between the PropertyDataType 20000 and the VersionID is zero or one 20025.

The PreferredName 20026 is a name with, for example, one entry per language. For the Preferred Name 20026, the Category is Element 20027, the Object Class is PropertyDataType 20028, the Property Quality term is Preferred 20029, the Property is Name 20030, the Representation/Association term is Name 20031, the Type term is GDT 20032, and the Type Name term is Name 20033. The Cardinality between the PropertyDataType 20000 and the Preferred Name 20026.

The SynonymousName 20035 is a synonym for the data type. Several synonyms can be specified for each language. For the SynonymousName 20035, the Category is Element 20036, the Object Class is PropertyDataType 20037, the Property Quality term is Synonymous 20038, the Property is Name 20039, the Representation/Association term is Name 20040, the Type term is GDT 20041, and the Type Name term is Name 20042. The Cardinality between the PropertyDataType 20000 and the Preferred Name 20026 is from zero to n 20043.

The ShortName 20044 is a short name of the data type. One short name can be entered for each language. For the ShortName 20044, the Category is Element 20045, the Object Class is PropertyDataType 20047, the Property Quality term is Short 20047, the Property is Name 20048, the Representation/Association term is Name 20049, the Type term is GDT 20050, and the Type Name term is Name 20051. The Cardinality between the PropertyDataType 20000 and the ShortName 20044 is from zero to n 20052.

The IconAttachment 20053 is a preferred icon. A character (alphanumeric character, symbol, or combination thereof) that conforms to international standards and that, particularly in formulas, represents the data type in place of the data Type. For the IconAttachment 20053, the Category is Element 20054, the Object Class is PropertyDataType 20055, the Property is Icon 20056, the Representation/Association term is Attachment 20057, the Type term is GDT 20058, and the Type Name term is Attachment 20059. The Cardinality between the PropertyDataType 20000 and the IconAttachment is zero or one 20060.

The Description 20061 is an additional description for any parts of the definition class and that aids the understanding of the definition class. The description can supplement the definition. For the Description 20061, the Category is Element 20062, the Object Class is PropertyDataType 20063, the Property is Description 20064, the Representation/Association term is Description 20065, the Type term is GDT 20066, and the Type Name term is Description 20067. The Cardinality between the PropertyDataType 20000 and the Description 20061 is from zero to n 20068.

The UsageDescription 20069 is a description of aspects concerning the usage of the property. This can be an explanatory text or general/individual notes. For the Usage Description 20069, the Category is Element 20070, the Object Class is PropertyDataType 20071, the Property Quality term is Usage 20072, the Property is Description 20073, the Representation/Association term is Description 20074, the Type term is GDT 20075, and the Type Name term is Description 20076. The Cardinality between the PropertyDataType 20000 and the Usage Description 20069 is from zero to n 20077.

The FormatCode 20078 is a format of the data type; see GDT PropertyDataTypeFormatCode. For the FormatCode 20078, the Category is Element 20079, the Object Class is PropertyDataType 20080, the Property is Format 20081, the Representation/Association term is Code 20082, the Type term is GDT 20083, and the Type Name term is PropertyDataTypeFormatCode 20084. The Cardinality between the PropertyDataType 20000 and the FormatCode 20078 is zero or one 20085.

The LanguageDependencyIndicator 20086 values may not be language neutral. The default value is "false," i.e., values are language neutral. For the LanguageDependencyIndicator 20086, the Category is Element 20087, the Object Class is PropertyDataType 20088, the Property is Language Dependency 20089, the Representation/Association term is Indicator 20090, the Type term is GDT 20091, and the Type Name term is LanguageDependencyIndicator 20092. The Cardinality between the PropertyDataType 20000 and the LanguageDependencyIndicator 20086 is zero or one 20093.

The MaximumTotalDigitNumber 20094 is a total length, including decimal places. For the MaximumTotalDigitNumberValue 20094, the Category is Element 20095, the Object Class is PropertyDataType 20096, the Property Quality term is Maximum Total 20097, the Property is Digit Number 20098, the Representation/Association Quality term is Digit Number 20099, the Representation/Association term is Value 20001*a*, the Type term is GDT 20002*a*, and the Type Name term is DigitNumberValue 20003*a*. The Cardinality between the PropertyDataType 20000 and the MaximumTotalDigitNumberValue 20094 is zero or one 20004*a*.

The FractionalDigitNumber 20005*a* is a number of decimal places. For the FractionalDigitNumberValue 20005*a*, the Category is Element 20006, the Object Class is PropertyDataType 20007*a*, the Property Quality term is Fractional 20008*a*, the Property is Digit Number 20009*a*, the Representation/Association Quality term is Digit Number 20010*a*, the Representation/Association term is Value 20011*a*, the Type term is GDT 20012*a*, and the Type Name term is DigitNumberValue 20013*a*. The Cardinality between the PropertyDataType 20000 and the FractionalDigitNumberValue 20005*a* is zero or one 20014*a*.

The LowerCaseAllowedIndicator 20015*a* indicates whether or not lowercase entries are allowed. The default value is "false," i.e., lowercase values are not allowed. For the LowerCaseAllowedIndicator 20015*a*, the Category is Element 20016*a*, the Object Class is PropertyDataType 20017*a*, the Property is Lower Case Allowed 20018*a*, the Representation/Association term is Indicator 20019*a*, the Type term is GDT 20020*a*, and the Type Name term is Indicator 20021*a*. The Cardinality between the PropertyDataType 20000 and the LowerCaseAllowedIndicator 20015*a* is zero or one 20022*a*.

The NegativeValueAllowedIndicator 20023*a* indicates whether or not negative values are allowed. The default value is "false," i.e., negative values are not allowed. For the NegativeValueAllowedIndicator 20023*a*, the Category is Element 20024*a*, the ObjectClass term is PropertyDataType 20025*a*, the Property is Negative Value Allowed 20026*a*, the Representation/Association term is Indicator 20027*a*, the Type term is GDT 20028*a*, and the Type Name term is Indicator 20029*a*. The Cardinality between the PropertyDataType 20000 and the NegativeValueAllowedIndicator 20015*a* is zero or one 20030*a*.

The MeasureUnitCode 20031*a* is a coded representation of a non-monetary unit of measurement; see GDT MeasureUnitCode. For the MeasureUnitCode 20031*a*, the Category is Element 20032*a*, the Object Class is PropertyDataType 20033*a*, the Property is Measure Unit 20034*a*, the Representation/Association term is Code 20035*a*, the Type term is GDT 20036*a*, and the Type Name term is MeasureUnitCode 20037*a*. The Cardinality between the PropertyDataType 20000 and the MeasureUnitCode 20031*a* is zero or one 20038*a*.

The CurrencyCode 20039*a* is a currency of the data type; see GDT CurrencyCode. For the CurrencyCode 20039*a*, the Category is Element 20040*a*, the Object Class is PropertyDataType 20041*a*, the Property is Currency 20042*a*, the Representation/Association term is Code 20043*a*, the Type term is GDT 20044*a*, and the Type Name term is CurrencyCode 20045*a*. The Cardinality between the PropertyDataType 20000 and the CurrencyCode 20039*a* is zero or one 20046*a*.

The ExponentialRepresentationTypeCode 20047*a* is a type of exponential representation; see GDT ExponentialRepresentationTypeCode. For the ExponentialRepresentationTypeCode 20047*a*, the Category is Element 20048*a*, the Object Class is PropertyDataType 20049*a*, the Property is ExponentialRepresentationType 20049*a*, the Representation/Association term is Code 20051*a*, the Type term is GDT 20052*a*, and the Type Name term is ExponentialRepresentationTypeCode 20053*a*. The Cardinality between the PropertyDataType 20000 and the ExponentialRepresentationTypeCode 20047*a* is zero or one 20054*a*.

The ExponentIntegerValue 20055*a* is an exponent value for exponential representation with predefined exponents. For the ExponentIntegerValue 20055*a*, the Category is Element 20056*a*, the Object Class is PropertyDataType 20057*a*, the Property is Exponent 20058*a*, the Representation/Association Quality term is Integer 20059*a*, the Representation/Association term is Value 20060*a*, the Type term is GDT 20061*a*, and the Type Name term is IntegerValue 20062*a*. The Cardinality between the PropertyDataType 20000 and the ExponentIntegerValue 20055*a* is zero or one 20063*a*.

The IntervalValueAllowedIndicator 20064*a* indicates whether or not interval values are allowed (the interval is classed as one value in the value list.) The default value may be "false," i.e., interval values are not allowed. For the IntervalValueAllowedIndicator 20064*a*, the Category is Element 20065*a*, the Object Class PropertyDataType 20066*a*, the Property Quality term is Interval 20067*a*, the Property is Value Allowed 20068*a*, the Representation/Association term is Indicator 20069*a*, the Type term is GDT 20070*a*, and the Type Name term is Indicator 20071*a*. The Cardinality between the PropertyDataType 20000 and the IntervalValueAllowedIndicator 20064*a* is zero or one 20072*a*.

The FractionalDigitPresentationAccuracyIndicator 20073*a* indicates whether or not the number of decimal places of numeric values follows the entry under FractionalDigitsNumeric or the actual user entry. Example: three decimal places, entry 2.40; if this switch is not set, the entry is formatted as 2.400, if the switch is set, the format remains as 2.40. The default value may be "false," i.e. FractionalDigitsNumeric is deciding. For the FractionalDigitPresentationAccuracyIndicator 20073*a*, the Category is Element 20074*a*, the Object Class is PropertyDataType 20075*a*, the Property Quality term is Fractional Digit 20076*a*, the Property is Presentation Accuracy 20077*a*, the Representation/Association term is Indicator 20078*a*, the Type term is GDT 20079*a*, and the Type Name term is Indicator 20080*a*. The Cardinality between the PropertyDataType 20000 and the FractionalDigitPresentationAccuracyIndicator 20073*a* is zero or one 20081*a*.

The RegularExpression 20082*a* is a formula that describes the data type, e.g., for a data type for density, this could indicate that the density is the quotient of mass and volume. For the RegularExpression 20082*a*, the Category is Element 20083*a*, the Object Class is PropertyDataType 20084*a*, the Property is Regular Expression 20085*a*, the Representation/Association term is Text 20086*a*, the Type term is GDT 20087*a*, and the Type Name term is Note 20088*a*. The Cardinality between the PropertyDataType 20000 and the RegularExpression 20082*a* is zero or one 20089*a*.

The SeparatorUsageIndicator 20090*a* indicates whether or not thousand separators are to be used in numeric formats. The default value is "true"—thousand separators are used. For the SeparatorUsageIndicator 20090*a*, the Category is Element 20091*a*, the Object Class is PropertyDataType 20092*a*, the Property is Separator Usage 20093*a*, the Representation/Association term is Indicator 20094*a*, the Type term is GDT 20095*a*, and the Type Name term is Indicator 20096*a*. The Cardinality between the PropertyDataType 20000 and the SeparatorUsageIndicator 20090*a* is zero or one 20097*a*.

The TupelLengthValue 20098*a* if the data type is used to record measured values, minimum, maximum, and average values, e.g., need to be recorded, since a single value is generally not sufficient; these values have the same format. In this case, the TupelLengthValue can be used to specify that a value data set is required. In the example, a 3-tupel is required for specifying values. If this attribute is not specified, the values are single values. For the TupelLengthValue 20098*a*, the Category is Element 20099*a*, the Object Class is PropertyDataType 20001*b*, the Property is Tupel Length 20002*b*, the Representation/Association Quality term is Tupel Length 20003*b*, the Representation/Association term is Value 20004*b*, the Type term is GDT 20005*b*, and the Type Name is TupelLengthValue 20006*b*. The Cardinality between the PropertyDataType 20000 and the TupelLengthValue 20098*a* is zero or one 20007*b*.

The ComponentPropertyDefinitionClassReference 20008*b* is used in the case of complex data types. This is the reference to the definition class (or to a version of the definition class) that contains the sub properties of the complex data type. If a definition class is not used, the properties contained are specified under ComponentPropertyReference instead. For the ComponentPropertyDefinition ClassReference 20008*b*, the Category is Element 20009*b*, the Object Class is PropertyDataType 20010*b*, the Property Quality term is Component 20011*b*, the Property is Property Definition Class Reference 20012*b*, the Representation/Association term is PropertyDefinition ClassReference 20013*b*, the Type term is GDT 20014*b*, and the Type Name term is PropertyDefinition ClassReference 20015*b*. The Cardinality between the PropertyDataType 20000 and the ComponentPropertyDefinition ClassReference 20008*b* is zero or one 20016*b*.

The ComponentProperty 20017*b* is in the case of complex data types, these are the properties that form the components of the complex data type and the attributes related to this assignment. For the ComponentProperty 20017*b*, the Category is Element, the Object Class is PropertyDataType 20019*b*, the Property Quality term is Component 20020*b*, the Property is Property Reference 20021*b*, the Representation/Association term is PropertyReference 20022*b*, the Type term is GDT 20023*b*, and the Type Name is PropertyReference 20024*b*. The Cardinality between the PropertyDataType 20000 and the ComponentProperty 20017*b* is zero or n 20025*b*.

The ComponentPropertyReference 20026*b* is if a complex data type is modeled, but no definition class is used, these are the identifiers of the properties that form the complex data type. A complex data type may contain at least two properties. For the ComponentProperty 20017*b* Reference 20026*b*, the Category is Element 20027*b*, the Object Class is ComponentProperty 20028*b*, the Property is Property Reference 20029*b*, the Representation/Association term is PropertyReference 20030*b*, the Type term is GDT 20031*b*, and the Type Name term is PropertyReference 20032*b*. The Cardinality between the PropertyDataType 20000 and the ComponentProperty 20017*b* Reference 20026*b* is one 20033*b*.

The PropertyOrdinalNumberValue 20034*b* is a position of a given property in the list of component properties. The sequence of this property list is specified by the required display sequence of the properties. For the ComponentProperty 20017*b* OrdinalNumberValue 20034*b*, the Category is Element 20035*b*, the Object Class is ComponentProperty 20036, the Property is Ordinal Number 20037*b*, the Representation/Association term is Value 20038*b*, the Type term is GDT 20039*b*, and the Type Name term is OrdinalNumberValue 20040*b*. The Cardinality between the PropertyDataType 20000 and the ComponentProperty 20017*b* OrdinalNumberValue 20034*b* is zero or one 20041*b*.

The AllowedPropertyValueElement 20042*b* is a data type value that is allowed in an evaluation of the associated property. If no value is specified, there are no restrictions in terms of the values allowed in an evaluation (with the exception of the format specifications for the data type). For the AllowedPropertyValueElement 20042*b*, the Category is Element 20043*b*, the Object Class is PropertyDataType 20044*b*, the Property Quality term is Allowed 20045*b*, the Property is PropertyValueStructure 20046*b*, and the Representation/Association term is Details 20047*b*. The Cardinality between the PropertyDataType 20000 and the AllowedPropertyValueElement 20042*b* is from zero to n 20048*b*.

The AllowedPropertyValue 20049*b* is the value allowed. For the AllowedPropertyValueElement 20042*b* PropertyValue 20049*b*, the Category is Element 20050*b*, the Object Class is PropertyValueStructure 20051*b*, the Property is PropertyValue 20052*b*, the Representation/Association term is PropertyValue 20053*b*, the Type term is GDT 20054*b*, and the Type Name term is PropertyValue 20055*b*. The Cardinality between the PropertyDataType 20000 and the AllowedPropertyValueElement 20042*b* PropertyValue 20049*b* is one 20056*b*.

The DefaultValueIndicator 20057*b* indicates whether or not the value or value interval is a standard value or standard value interval. The format and value range are defined by the GDT Indicator. The default value may be "false," i.e., the value is not a standard value. For the AllowedPropertyValueElement 20042*b* DefaultValueIndicator 20057*b*, the Category is Element 20058*b*, the Object Class is PropertyValueStructure 20059*b*, the Property is DefaultValue 20060*b*, the Representation/Association term is Indicator 20061*b*, the Type term is GDT 20062*b*, and the Type Name term is Indicator 20063*b*. The Cardinality between the PropertyDataType 20000 and the AllowedPropertyValueElement 20042*b* DefaultValueIndicator 20057*b* is zero or one 20064*b*.

The NetElementID 20065*b* identifies the current value or value interval in a value hierarchy. The ID is allocated sequentially in whole numbers in the value list. NetElementID is type CCT: Identifier. For the AllowedPropertyValueElement 20042*b* NetElementID 20065*b*, the Category is Element 20066*b*, the Object Class is PropertyValueStructure 20067*b*, the Property is NetElementIndentification 20068*b*, the Representation/Association term is Identifier 20069*b*, the Type term is CCT 20070*b*, and the Type Name term is Identifier 20071*b*. The Length is five 20072. The Cardinality between the PropertyDataType 20000 and the AllowedPropertyValueElement 20042*b* NetElementID 20065*b* is zero or one 20073*b*.

The PreceedingNetElementID 20074*b* identifies a preceding value or preceding value interval in the value hierarchy. There can be several preceding values or value intervals. PreceedingNetElementID is type CCT: Identifier. For the PreceedingNetElementID 20074*b*, the Category is Element, the Object Class is PropertyValueStructure 20076*b*, the Property Quality term is Preceding 20077*b*, the Property is NetelementIdentification 20078*b*, the Representation/Association term is Identifier 20079*b*, the Type term is CCT 20080*b*, and the Type Name term is Identifier 20081*b*. The Length is five 20082*b*. The Cardinality between the PropertyDataType 20000 and the AllowedPropertyValueElement 20042*b* PreceedingNetElementID 20074*b* is from zero to n 20083*b*.

The AllowedPropertyValuation 20084*b* is used if the data type is a complex data type. It may not have a direct value list. The values allowed result from the valuation of the components of the complex data type. This valuation is specified in AllowedPropertyValuation. For the AllowedPropertyValuation 20084*b*, the Category is Element 20085*b*, the Object Class is PropertyDataType 20086*b*, the Property Quality term is Allowed 20087*b*, the Property is Property Valuation 20088*b*, the Representation/Association term is PropertyValuation 20089*b*, the Type term is GDT 20090*b*, and the Type Name is PropertyValuation 20091*b*. The Cardinality between the PropertyDataType 20000 and the AllowedPropertyValuation 20084*b* is from zero to n 20092*b*.

See ISO13584/42 (Definition of data model for properties), available from the GDT owner, for illustrative Integrity Conditions for 20000.

There are a number of consistency conditions for the individual fields; illustrative consistency conditions are: 1) a LanguageDependencyIndicator, which is for character format; 2) a MaximumTotalDigitNumber, which is exactly 1 for Boolean values and not set for character strings of unlimited length and complex data types; 3) a FractionalDigitsNumber for decimal numbers and exponential numbers. The FractionalDigitsNumber is shorter than the total length; 4) a LowerCaseAllowedIndicator for character format; 5) a NegativeValueAllowedIndicator for whole numbers, decimal numbers, exponential numbers, and currency format; 6) aExponentialRepresentationTypeCode for exponential format; 7) a ExponentInteger for ExponentialRepresentationTypeCode equal to 02; 8) a IntervalValueAllowedIndicator for whole numbers, decimal numbers, exponential numbers, and currency format; 9) a FactionalDigitsPresentationAccuracyIndicator for decimal numbers and exponential numbers; 10) a SeparatorUsageIndicator for whole numbers, decimal numbers, exponential numbers, and currency format; 11) a TupelLengthNumber for integers, decimal numbers, and exponential numbers; 12) an AllowedPropertyValue which can be filled for simple data types; and 13) an AllowedPropertyValuation can be filled for complex data types. If the data type contains a value list, the values contained in the list may satisfy the value syntax defined in the data type. In the case of complex data types, either the identifier for the area of application (ComponentPropertyDefinitionClassReference) or the list of the components contained (ComponentPropertyReference) is used.

The data type is specified for a property in order to define its format and allowed values. If the data type does not contain a value list, any value that satisfies the format described in the data type is allowed for the assigned property. A data type can be created explicitly with an external key. Such data types can be assigned to several properties. Alternatively, a data type can be created implicitly when a property is created; in this case, the data type can be used for this particular property and that it can be changed on the basis of this particular property.

The data type defined here is not to be confused with a DDIC data type. In an embodiment, it contains particular properties, does not cover all of the attributes of a DDIC data type, and is linked to ISO13584/42. Some elements that are mandatory in ISO13584/42 are optional in this scheme (such as, the optional use of the definition class in the case of complex data types). This is provides wider use of the scheme. The attribute Description corresponds to the attribute Note in ISO and the attribute UsageDescription 20069 corresponds to the attribute Remark in ISO.

For the NetElementID 20065*b* and the PreceedingNetElementID 20074*b*, when the values allowed for the property are defined, they can be arranged in hierarchies in order to simplify navigation and value selection. A value can have several predecessors. For example, the values of the property ‘country’ are to be arranged by continent. For example, Great Britain is to be grouped under North America as well as under Europe. In an example, this would appear as shown in the following table:

| Value Index | Value | ID of Predecessor |
|---|---|---|
| 1 | Europe | |
| 2 | North America | |
| 3 | Germany | 1 |
| 4 | US | 2 |
| 5 | Great Britain | 1, 2 |

(jjjjjjj) PropertyDataTypeFormatCode

The GDT PropertyDataTypeFormatCode 20100 is a coded representation of the format of a property data type. An example of 20100 is:

<PropertyDataTypeFormatCode>date</PropertyDataTypeFormatCode>.

The structure of GDT PropertyDataTypeFormatCode 20100 is depicted in FIG. 201. For the GDT PropertyDataTypeFormatCode 20100, the Object Class is Property Data Type 20102, the Property is Format 20104, the Representation/Association term is Code 20106, the Type term is CCT 20108, the Type Name term is Code 20110, and the Length is ten 20112. The GDT PropertyDataTypeFormatCode 20100 may be a restricted GDT.

The values for 20100 may come from the data type system defined by W3C (http://www.w3.org/TR/xmlschema-2/#built-in-datatypes). The list contains those data types of the W3C data type system that are used for classification purposes.

The Code Boolean has the Name Boolean and has the value space to support the mathematical concept of binary-valued logic: {true, false}.

The Code complex has the Name complex and is a data type comprising several simple or complex data types.

The Code date has the Name date and represents a calendar date. The value space of date is the set of Gregorian calendar dates as defined in §5.2.1 of [ISO 8601]. For example it may be a set of one-day long, non-periodic instances e.g. lexical Oct. 26, 1999 to represent the calendar date Oct. 26, 1999, independent of how many hours this day has.

The Code decimal has the Name decimal and represents arbitrary precision decimal numbers. The value space of decimal is the set of the values i×10^−n, where i and n are integers such that n>=0. The order-relation on decimal is: x<y iff y−x is positive.

The Code float has the Name float and corresponds to the IEEE single-precision 32-bit floating point type [IEEE 754-1985]. The basic value space of float consists of the values m×2^e, where m is an integer whose absolute value is less than 2^24, and e is an integer from 149 to 104, inclusive. In addition to the basic value space described above, the value space of float also contains the following special values: positive and negative zero, positive and negative infinity and not-a-number. The order-relation on float is: x<y iff y−x is positive. Positive zero is greater than negative zero. Not-a-number equals itself and is greater than all float values including positive infinity.

The Code integer has the Name integer and is derived from decimal by fixing the value of fraction digits to be 0. This results in the standard mathematical concept of the integer numbers. The value space of integer is the infinite set {. . . , −2, −1, 0, 1, 2, . . . }. The base type of integer is decimal.

The Code string has the Name string and represents character strings in XML. The value space of string is the set of finite-length sequences of characters (as defined in [XML 1.0 (Second Edition)]) that •match• the Char production from [XML 1.0 (Second Edition)]. A character is an atomic unit of communication; it is not further specified except to note that every character has a corresponding Universal Character Set code point, which is an integer.

The Code time has the Name time and represents an instant of time that recurs every day. The value space of time is the space of time of day values as defined in §5.3 of [ISO 8601]. Specifically, it may be a set of zero-duration daily time instances.

The Code dateTime has the Name dateTime and represents a specific instant of time. The value space of dateTime is the space of Combinations of date and time of day values as defined in §5.4 of [ISO 8601].

The Code anyURI has the Name anyURI and represents a Uniform Resource Identifier Reference (URI). An anyURI value can be absolute or relative, and may have an optional fragment identifier (i.e., it may be a URI Reference). This type should be used to specify the intention that the value fulfills the role of a URI as defined by [RFC 2396], as amended by [RFC 2732].

The type is used in the GDT PropertyDataType 20100. The Code establishes which formats are possible for a data type entry and how associated values are transferred and stored. The valuations for the formats (e.g., the number of decimal places) are specified in the GDT PropertyDataType 20100.

(kkkkkkk) PropertyDataTypeID

A GDT PropertyDataTypeID 20200 is a unique identifier for a property data type. PropertyDataType is the data type of a property. It describes the syntax of the property values and can contain a list of permitted values. An example of 20200 is: <PropertyDataTypeID schemeAgencyID=‘005’>MY_DATATYPE_01</PropertyDataTypeID>.

The structure of GDT PropertyDataTypeID 20200 is depicted in FIG. 202. (See CCT Identifier). The GDT PropertyDataTypeID 20200 includes attributes SchemeAgencyID 20216, SchemeAgencySchemeID 20234, and schemeAgencySchemeAgencyID 20252. For the GDT PropertyDataTypeID 20200, the Object Class is Property Data Type 20202, the Property is Identification 20204, the Representation/Association term is Identifier 20206, the Type term is CCT 20208, the Type Name term is Identifier 20210, and the Length is from one to fifty 20212. The GDT PropertyDataTypeID 20200 may be a restricted GDT.

For the SchemeAgencyID 20216, the Category is Attribute 20218, the Object Class is Identification Scheme-Agency 20220, the Property is Identification 20222, the Representation/Association term is Identifier 20224, the Type term is xsd 20226, the Type Name term is Token 20228, and the Length is from one to sixty 20230. The Cardinality between the GDT PropertyDataTypeID 20200 and the SchemeAgencyID 20216 is one 20232. For the SchemeAgencySchemeID 20234, the Category is Attribute 20236, the Object Class is Identification Scheme-Agency 20238, the Property is Scheme 20240, the Representation/Association term is Identifier 20242, the Type term is xsd 20244, the Type Name term is Token 20246, and the Length is from one to sixty 20248. The Cardinality between the GDT PropertyDataTypeID 20200 and the SchemeAgencySchemeID 20234 is zero or one 20250.

For the schemeAgencySchemeAgencyID 20252, the Category is Attribute 20254, the Object Class is Identification Scheme-Agency 20256, the Property is Scheme Agency 20258, the Representation/Association term is Identifier 20260, the Type term is xsd 20262, the Type Name term is Token 20264, and the Length is three 20266. The Cardinality between the GDT PropertyDataTypeID 20200 and the schemeAgencySchemeAgencyID 20252 is zero or one 20268.

The GDT is used to assign an independently defined data type to a property. The concept is defined in ISO13584/42.

The GDT PropertyDataTypeReference 20200 is used to reference a version of a property data type.

Related GDTs are: PropertyID, Property, DefinitionClassID, DefinitionClass, PropertyValues, and PropertyValuation (lllllll) PropertyDataTypeReference A GDT PropertyDataTypeReference 20300 is a unique reference to a property data type or a version of a property data type. PropertyDataType is the data type of a property. It describes the syntax of the property values and can contain a list of permitted values. An example of the 20300 is:

```
<PropertyDataTypeReference>
    <ID schemeAgencyID="005">MY_DATATYPE_01</ID>
    <VersionID>1</VersionID>
</PropertyDataTypeReference>
    (005=ISO).
```

The structure of GDT PropertyDataTypeReference 20300 is depicted in FIG. 203. The GDT PropertyDataTypeReference 20300 includes elements ID and VersionID. For the GDT PropertyDataTypeReference 20300, the Object Class is Property Data Type Reference 20302 and the Representation/Association term is Details 20304.

The ID 20306 is the identifier of the property data type. For the ID 20306, the Category is Element 20308, the Object Class is Property Data Type Reference 20310, the Property is Identification 20312, the Representation/Association term is Identifier 20314, the Type term is GDT 20316, and the Type Name term is PropertyDataTypeID 20318. The Cardinality between the GDT PropertyDataTypeReference 20300 and the ID 20306 is one.

The VersionID 20320 is the version of the property data type. For the VersionID 20320, the Category is Element 20322, the Object Class is Property Data Type Reference 20324, the Property is Version Identification 20326, the Representation/Association term is Identifier 20328, the Type term is GDT 20330, and the Type Name term is VersionID 20332. The Cardinality between the GDT PropertyDataTypeReference 20300 and the VersionID 20320 is zero or one 20334.

For information about the property data type, see GDT PropertyDataType 20000.

(mmmmmmm) PropertyDefinitionClass

A GDT PropertyDefinitionClass 20400 is a class for defining properties in a classification system. A PropertyDefinitionClass 20400 defines a subject area. The properties defined in a PropertyDefinitionClass represent the attributes of this subject area. The PropertyDefinitionClass 20400 is not used directly for classifying objects. For this purpose, classes are defined that use the properties defined in a PropertyDefinitionClass 20400.

The PropertyValuation environment, and relationships to other objects, is discussed below.

"Simple" properties are described first. A property definition class can contain one or more properties. A property can have property valuations, each of which assigns one or more property values to a property. A property is typed by a property data type, which specifies the possible property values for the property valuations. The values permitted by the property data type can be specified by listing the values in "PropertyValue."

Complex properties can also be defined. A complex property data type can be used to define a complex property by referencing to a property definition class. The property definition class contains several properties that structure the complex property data type. The properties are then typed by property data types. Properties can also be defined without a property definition class. In this case, each property is defined globally, i.e., the "area of application" of the properties is not specified by the property definition class. A PropertyValuation is used to valuate properties for any objects, or to assign values to properties.

An example or instance is:

```
<PropertyDefinitionClass>
  <ID schemeAgencyID="005">SCREW__PROPERTIES</ID>
  <VersionID>1</VersionID>
  <PreferredName languageCode='EN'>
    'Properties for screw description'
  </PreferredName>
  <ShortName languageCode='EN'>
    'Screws'
  </ShortName>
  <DefinedProperty>
    <Reference>
      <ID schemeAgencyID="005">LENGTH</ID>
      <VersionID>1</VersionID>
      <DefinitionClassReference>
        <ID>SCREW__PROPERTIES</ID>
        <VersionID>1</VersionID>
      </DefinitionClassReference>
    </Reference>
  </DefinedProperty>
  <DefinedProperty>
    <Reference>
      <ID schemeAgencyID="005">HEAD__TYPE</ID>
      <VersionID>1</VersionID>
      <DefinitionClassReference>
        <ID>SCREW__PROPERTIES</ID>
        <VersionID>1</VersionID>
```

-continued

```
      </DefinitionClassReference>
    </Reference>
  <SubHierarchyDefinitionIndicator>true
  </SubHierarchyDefinitionIndicator>
  </DefinedProperty>
</PropertyDefinitionClass>.
```

The structure of GDT PropertyDefinitionClass 20400 is depicted in FIG. 204. The GDT PropertyDefinitionClass 20400 includes attributes ActionCode 20402 and elements ID 20410, VersionID 20418, RevisionID 20427, CreationDateTime 20436, VersionDateTime 20444, RevisionDateTime 20452, PreferredName 20460, SynonymousName 20469, ShortName 20478, IconAttachement 20487, DefiningDescription 20496, SourceDocumentWebAddress 20406*a*, AdditionalDescription 20415*a*, UsageDescription 20424*a*, TypeCode 20433*a*, SimplifiedGraphicAttachement 20441*a*, SubjectAreaCode 20450*a*, ParentPropertyDefinitionClassReference 20459*a*, Defined Property 20468*a*, and HierarchyPropertyValuation 20407*b*. For the GDT PropertyDefinitionClass 20400, the Representation/Association term is Details 20401.

The ActionCode 20402 is an instruction to the recipient of a message telling it how to process a transmitted business object. For the ActionCode 20402, the Category is Attribute 20403, the Object Class is Property Definition Class 20404, the Property is Action 20405, the Representation/Association term is Code 20406, the Type term is GDT 20407, and the Type Name term is ActionCode 20408. The Cardinality between the GDT PropertyDefinitionClass 20400 and the ActionCode 20402 is zero or one 20409.

The ID 20410 is an unique identifier of the definition class (see GDT PropertyDefinitionClassID). For the ID 20410, the Category is Element 20411, the Object Class is Property Definition Class 20412, the Property is Identification 20413, the Representation/Association term is PropertyDefinitionClassID 20414, the Type term is GDT 20415, and the Type Name term is PropertyDefinitionClassID 20416. The Cardinality between the GDT PropertyDefinitionClass 20400 and the ID 20410 is zero or one 20417.

The VersionID 20418 is an unique identifier for a version of the definition class. For the VersionID 20418, the Category is Element 20419, the Object Class is Property Definition Class 20420, the Property is Version Identification 20421, the Representation/Association term is VersionID 20422, the Type term is GDT 20423, and the Type Name term is VersionID 20424. The Cardinality between the GDT PropertyDefinitionClass 20400 and the VersionID 20418 is zero or one 20425.

The RevisionID 20426 is an unique identifier for a revision of the definition class. The RevisionID is a sequential number that is assigned when changes are made. For the RevisionID 20426, the Category is Element 20427, the Object Class is Property Definition Class 20428, the Property is Revision Identification 20429, the Representation/Association term is Identifier 20430, the Type term is CCT 20431, the Type Name term is Identifier 20432, and the Length is from one to ten 20433. The Cardinality between the GDT PropertyDefinitionClass 20400 and the RevisionID 20426 is zero or one 20434. The RevisionID 20426 may be restricted.

The CreationDateTime 20436 is a creation date/time of the definition class. For the CreationDateTime 20436, the Category is Element 20437, the Object Class is Property Definition Class 20438, the Property is Creation Date Time 20439, the Representation/Association term is DateTime 20440, the Type term is GDT 20441, and the Type Name term is DateTime 20442. The Cardinality between the GDT PropertyDefinitionClass 20400 and the CreationDateTime 20436 is zero or one 20443.

The VersionDateTime 20444 is a creation date/time of the definition class version. For the VersionDateTime 20444, the Category is Element 20445, the Object Class is Property Definition Class 20446, the Property is Version Date Time 20447, the Representation/Association term is DateTime 20448, the Type term is GDT 20449, and the Type Name term is DateTime 20450. The Cardinality between the GDT PropertyDefinitionClass 20400 and the VersionDateTime 20444 is zero or one 20451.

The RevisionDateTime 20452 is a date/time of the last change to the definition class that resulted in a RevisionID. For the RevisionDateTime 20452, the Category is Element 20453, the Object Class is Property Definition Class 20454, the Property is Revision Date Time 20455, the Representation/Association term is DateTime 20456, the Type term is GDT 20457, and the Type Name term is DateTime 20458. The Cardinality between the GDT PropertyDefinitionClass 20400 and the RevisionDateTime 20452 is zero or one 20459.

The PreferredName 20460 is a name of the definition class with, for example, maximum one entry per language. For the PreferredName 20460, the Category is Element 20461, the Object Class is Property Definition Class 20462, the Property Quality term is Preferred 20463, the Property is Name 20464, the Representation/Association term is Name 20465, the Type term is GDT 20466, and the Type Name term is Name 20467. The Cardinality between the GDT PropertyDefinitionClass 20400 and the PreferredName 20460 is one or n 20468.

The SynonymousName 20469 is a synonym for the definition class. Several synonyms can be specified for each language. For the SynonymousName 20469, the Category is Element 20470, the Object Class is Property Definition Class 20471, the Property Quality term is Synonymous 20472, the Property is Name 20473, the Representation/Association term is Name 20474, the Type term is GDT 20475, the Type Name term is Name 20476. The Cardinality between the GDT PropertyDefinitionClass 20400 and the SynonymousName 20469 is from zero to n 20477.

The ShortName 20478 is a short name for definition class. A short name can be entered for each language. For the ShortName 20478, the Category is Element 20479, the Object Class is Property Definition Class 20480, the Property Quality term is Short 20481, the Property is Name 20482, the Representation/Association term is Name 20483, the Type term is GDT 20484, and the Type Name term is Name 20485. The Cardinality between the GDT PropertyDefinitionClass 20400 and the ShortName 20478 is from zero to n 20486.

The IconAttachment 20487 is a preferred symbol or character (alphanumeric character, symbol, or combination thereof) for the definition class that represents the definition class in conformance with international standards, particularly as "symbols" in formulas. For the IconAttachement 20487, the Category is Element 20488, the Object Class is Property Definition Class 20489, the Property Quality term is Icon 20490, the Property is Attachement 20491, the Representation/Association term is Attachement 20492, the Type term is GDT 20493, and the Type Name term is Attachement 20494. The Cardinality between the GDT PropertyDefinitionClass 20400 and the IconAttachement 20487 is zero or one 20495.

The DefiningDescription 20496 is an unique definition of the definition class's meaning makes it possible to uniquely distinguish the definition class from other definition classes. A definition can be entered for each language. For the DefiningDescription 20496, the Category is Element 20497, the Object Class is Property Definition Class 20498, the Property Quality term is Defining 20499, the Property is Description 20401*a*, the Representation/Association term is Description 20402*a*, the Type term is GDT 20403*a*, and the Type Name term is Description 20404*a*. The Cardinality between the GDT PropertyDefinitionClass 20400 and the DefiningDescription 20496 is from zero to n 20405*a*.

The SourceDocumentWebAddress 20406*a* is an address of a document available on the Internet in which the definition of the definition class or its meaning can be found. For example, the URI schemes "http" and "https" may be permitted. For the SourceDocumentWebAddress 20406*a*, the Category is Element 20407*a*, the Object Class is Property Definition Class 20408*a*, the Property Quality term is Source 20409*a*, the Property is Document 20410*a*, the Representation/Association term is WebAddress 20411*a*, the Type is CCT 20412*a*, and the Type Name term is WebAddress 20413*a*. The Cardinality between the GDT PropertyDefinitionClass 20400 and the SourceDocumentWebAddress 20406*a* is zero or one 20414*a*.

The AdditionalDescription 20415*a* is an additional information about parts of the definition class; aids the understanding of the definition class. The description can extend the definition. For the AdditionalDescription 20415*a*, the Category is Element 20416*a*, the Object Class is Property Definition Class 20417*a*, the Property Quality term is Additional 20418*a*, the Property is Description 20419*a*, the Representation/Association term is Description 20420*a*, the Type term is GDT 20421*a*, and the Type Name term is Description 20422*a*. The Cardinality between the GDT PropertyDefinitionClass 20400 and the AdditionalDescription 20415*a* is from zero to n 20423*a*.

The UsageDescription 20424*a* is a description of special aspects concerning the usage of the property. This can be explanatory text of general/individual notes. For the UsageDescription 20424*a*, the Category is Element 20425*a*, the Object Class is Property Definition Class 20426*a*, the Property Quality term is Usage 20427*a*, the Property is Description 20428*a*, the Representation/Association term is Description 20429*a*, the Type term is GDT 20430*a*, and the Type Name term is Description 20431*a*. The Cardinality between the GDT PropertyDefinitionClass 20400 and the UsageDescription 20424*a* is from zero to n 20432*a*.

A TypeCode 20433*a* is similar in its general description to GDT PropertyDefinitionClassTypeCode. For the TypeCode 20433*a*, the Category is Element 20434*a*, the Object Class is Property Definition Class 20435*a*, the Property is Type 20436*a*, the Representation/Association term is Code 20437*a*, the Type term is GDT 20438*a*, and the Type Name term is PropertyDefinitionClassTypeCode 20439*a*. The Cardinality between the GDT PropertyDefinitionClass 20400 and the TypeCode 20433*a* is zero or one 20440*a*.

The SimplifiedGraphicAttachment 20441*a* is a reference to a graphic that illustrates the meaning of the definition class. For the SimplifiedGraphicAttachement 20441*a*, the Category is Element 20442*a*, the Object Class is Property Definition Class 20443*a*, the Property Quality term is Simplified Graphic 20444*a*, the Property is Attachement 20445*a*, the Representation/Association term is Attachement 20446*a*, the Type term is GDT 20447*a*, and the Type Name term is Attachement 20448*a*. The Cardinality between the GDT PropertyDefinitionClass 20400 and the SimplifiedGraphicAttachement 20441*a* is zero or one 20449*a*.

The SubjectAreaCode 20450*a* is a subject area in accordance with the International Classification of Standards (see GDT SubjectAreaCode). For the SubjectAreaCode 20450*a*, the Category is Element 20451*a*, the Object Class is Property Definition Class 20452*a*, the Property Quality term is Topic 20453*a*, the Property is SubjectArea 20454*a*, the Representation/Association term is Code 20455*a*, the Type term is GDT 20456*a*, and the Type Name term is SubjectAreaCode 20457*a*. The Cardinality between the GDT PropertyDefinitionClass 20400 and the SubjectAreaCode 20450*a* is from zero to n 20458*a*.

The ParentPropertyDefinitionClassReference 20459*a* is an assignment to the parent property definition class. In the case of versioning, the version of this definition class is specified in the reference. For the ParentPropertyDefinitionClassReference 20459*a*, the Category is Element 20460*a*, the Object Class is Property Definition Class 20461*a*, the Property Quality term is Parent 20462*a*, the Property is Definition Class Reference 20463*a*, the Representation/Association term is PropertyDefinitionClassReference 20464*a*, the Type term is GDT 20465*a*, and the Type Name term is PropertyDefinitionClassReference 20466*a*. The Cardinality between the GDT PropertyDefinitionClass 20400 and the ParentPropertyDefinitionClassReference 20459*a* is zero or one 20467*a*.

The DefinedProperty 20468*a* is the property defined in this definition class. For the DefinedProperty 20468*a*, the Category is Element 20469*a*, the Object Class is Property Definition Class 20470*a*, the Property is Defined Property 20471*a*, and the Representation/Association term is Details 20472*a*. The Cardinality between the GDT PropertyDefinitionClass 20400 and the DefinedProperty 20468*a* is from zero to n 20473*a*.

The Reference 20474*a* is an assignment to the parent property definition class. In versioning, the version of this definition class is indicated in the reference. For the Reference 20474*a*, the Category is Element 20475*a*, the Object Class is Defined Property 20476*a*, the Property is Reference 20477*a*, the Representation/Association term is PropertyReference 20478*a*, the Type term is GDT 20479*a*, and the Type Name term is PropertyReference 20480*a*. The Cardinality between the GDT PropertyDefinitionClass 20400 and the DefinedProperty 20468*a* Reference 20474*a* is one or one 20481*a*.

The OrdinalNumberValue 20482*a* is the position of a property in the property list of a definition class. The sequence of the property list is given by the desired display sequence of the properties. For the Ordinal Number Value 20482*a*, the Category is Element 20475*a*, the Object Class is Defined Property 20476*a*, the Property is Ordinal Number 20485*a*, the Representation/Association term is Value 20486*a*, the Type term is GDT 20487*a*, and the Type Name term is OrdinalNumberValue 20488*a*. The Cardinality between the GDT PropertyDefinitionClass 20400 and the DefinedProperty 20468*a* Ordinal Number Value 20482 is zero or one 20489*a*.

The SubHierarchyDefinitionIndicator 20490*a* indicates whether or not the property creates hierarchies for the subordinate hierarchy level (see "Constraints"). For the SubHierarchy DefinitionIndicator 20490*a*, the Category is Element 20491*a*, the Object Class is Defined Property 20492*a*, the Property is SubHierarchy 20493*a*, the Representation/Association term is Definition 20494*a*, the Type term is CCT 20495*a*, and the Type Name term is Indicator 20496*a*. The Cardinality between the GDT PropertyDefinitionClass 20400 and the DefinedProperty 20468*a* SubHierarchy DefinitionIndicator 20490*a* is zero or one 20497*a*.

The VisibilityIndicator 20498*a* indicates whether the property can be used at the current hierarchy level or not. For the VisibilityIndicator 20498*a*, the Category is Element 20499*a*, the Object Class is Defined Property 20401*b*, the Property is Visibility 20402*b*, the Representation/Association term is Indicator 20403*b*, the Type term is CCT 20404*b*, and the Type Name term is Indicator 20405*b*. The Cardinality between the GDT PropertyDefinitionClass 20400 and the DefinedProperty 20468*a* VisibilityIndicator 20498*a* is zero or one 20406*b*.

The HierarchyPropertyValuation 20407*b* is the value restriction for the properties indicated in the parent definition class as able to create hierarchies (see Integrity Conditions). For the HierarchyPropertyValuation 20407*b*, the Category is Element 20408*b*, the Object Class is Property Definition Class 20409*b*, the Property Quality term is Hierarchy 20410*b*, the Property is Property Valuation 20411*b*, the Representation/Association term is PropertyValuation 20412*b*, the Type term is GDT 20413*b*, and the Type Name term is PropertyValuation 20414*b*. The Cardinality between the GDT PropertyDefinitionClass 20400 and the HierarchyPropertyValuation 20407*b* is from zero to n 20415*b*.

See ISO13584/42 (Definition of data model for properties), available from the GDT owner, for illustrative Integrity Conditions.

In particular with regard to the hierarchy, Integrity Conditions may be observed in accordance with ISO13584/42. This form of hierarchy creation may be used to formalize the creation rules and to store these rules in the form of properties and their values. This prevents information from becoming lost and enables the hierarchies to be created both explicitly and transparently. The hierarchy may be strict (i.e., one predecessor) and without cycles.

- If a definition class is to contain subordinate definition classes, at least one of the properties contained in the class may be indicated as able to create hierarchies. The data types for these properties may contain value ranges. Value ranges may be specified for all the properties that have been indicated in the parent definition class as able to create hierarchies. Value ranges of subordinate definition classes that are created in this way for such a property may represent a decomposition of the value range for the data type of the property that creates hierarchies.
- Properties can be created for a definition class, but should first be available at lower hierarchy levels. In this case, the VisibilityIndicator is set just at the desired hierarchy level. Once the indicator has been set once for a given property, it cannot be reset at lower hierarchy levels.
- The ID of the definition class may be identical to the definition class ID of the properties contained in the class—this involves two different views for the same subject.
- The definition class is used to group together related business properties. Since the definition class belongs to the property key, the definition class 'AUTOLACKE' (car paint) and the definition class 'TEXTILFARBEN' (textile colors) can contain, e.g., the 'FARBE' (color) property, this then involves two different properties that can have different attributes.
- The definition class is also used as a technical aid to group together properties implicitly by business topic; e.g., the properties of a Knowledge Base in the Internet Pricing Configurator can each be mapped to one definition class. This prevents conflicts between data with the same name but from different Knowledge Bases. Another example of this would be different instances of an SAP catalog that group together different properties with the same name in different definition classes. The definition class is the starting point for distributing properties. The properties of given definition class are distributed.
- In contrast to ISO13584/42 and the Classification Management Engine, the definition class is optional in the GDTs for properties. This enables the GDTs to also be used in simple scenarios and to connect external users who are new to this data model. Some elements that are mandatory in ISO13584/42 are optional in this scheme. This is intended to enable wider use of the schema. In an embodiment, the definition class does not correspond to the R/3 class in R/3 classification (see Comment). The R/3 class can also group together the properties of a subject area. However, a property may be used in different classes. In that case, a property is defined in one definition class. This means that properties cannot be mapped between the concepts.

(nnnnnnn) PropertyDefinitionClassID

A GDT PropertyDefinitionClassID 20500 is a unique identifier for a property definition class. A GDT PropertyDefinitionClass 20500 is a class for defining properties (in a classification system). A PropertyDefinitionClass defines a subject area. The properties defined in a PropertyDefinitionClass represent the attributes of this subject area. An example or instance is:

```
<PropertyDefinitionClassID
schemeAgencyID="005">MY__DEF__CLASS__01
</PropertyDefinitionClassID>
(005=ISO).
```

The structure of GDT PropertyDefinitionClassID 20500 is depicted in FIG. 205. The GDT PropertyDefinitionClassID 20500 includes attributes schemeAgencyID 20516, schemeAgencySchemeID 20532, and schemeAgencySchemeAgencyID 20550. For the GDT PropertyDefinitionClassID 20500, the Object Class is Property Definition Class 20502, the Property is Identification 20504, the Representation/Association term is Identifier 20506, the Type term is CCT 20508, the Type Name term is Identifier 20510, and the Length is from one to fifty 20512. The GDT PropertyDefinitionClassID 20500 may be a restricted GDT.

For the schemeAgencyID 20516, the Category is Attribute 20518, the Object Class is IdentificationSchemeAgency 20520, the Property is Identification 20522, the Representation/Association term is Identifier 20524, the Type term is xsd 20526, the Type Name term is Token 20528, and the Length is from one to sixty 20530. The Cardinality between the GDT PropertyDefinitionClassID 20500 and the schemeAgencyID 20516 is one 20531.

For the schemeAgencySchemeID 20532, the Category is Attribute 20534, the Object Class is IdentificationSchemeAgency 20536, the Property is Scheme 20538, the Representation/Association term is Identifier 20540, the Type term is xsd 20542, the Type Name term is Token 20544, and the Length is from one to sixty 20546. The Cardinality between the GDT PropertyDefinitionClassID 20500 and the schemeAgencySchemeID 20532 is zero or one 20548.

For the schemeAgencySchemeAgencyID 20550, the Category is Attribute 20552, the Object Class is IdentificationSchemeAgency 20554, the Property is SchemeAgency 20556, the Representation/Association term is Identifier 20558, the Type term is xsd 20560, the Type Name term is Token 20562, and the Length is three 20564. The Cardinality between the GDT PropertyDefinitionClassID 20500 and the schemeAgencySchemeAgencyID 20550 is zero or one 20566.

If there are several schemes for an Agency (e.g., the organization "ISO," "DIN," or "Siemens"), the GDT may be extended to include the schemeID attribute. The concept is defined, for example, in ISO13584/42. The GDT PropertyDefinitionClassReference is used to reference a version of a property definition class.

(ooooooo) PropertyDefinitionClassReference

A GDT PropertyDefinitionClassReference 20600 is a unique reference to a property definition class or to a version of a property definition class. A GDT PropertyDefinitionClass 20600 is a class for defining properties (in a classification system). A GDT PropertyDefinitionClass 20600 establishes a subject area. The properties defined in a GDT PropertyDefinitionClass 20600 map the attributes of this subject area. An example or instance is:

```
<PropertyDefinitionClassReference>
    <ID schemeAgencyID="005">SCREW__PROPERTIES</ID>
    <VersionID>1</VersionID>
</PropertyDefinitionClassReference>
(005=ISO).
```

The structure of GDT PropertyDefinitionClassReference 20600 is depicted in FIG. 206. The GDT PropertyDefinitionClassReference 20600 includes elements ID and VersionID. For GDT PropertyDefinitionClassReference 20600, the Object Class is Property Definition Class Reference 20602 and the Representation/Association term is Details 20604.

The ID 20606 is the identifier for the property definition class. For the ID 20606, the Category is Element 20606, the Object Class is Property Definition Class Reference 20610, the Property is Identification 20612, the Representation/Association term is Identifier 20614, the Type term is GDT 20616, and the Type Name term is PropertyDefinitionClassID 20618. The Cardinality between the GDT PropertyDefinitionClassReference 20600 and the ID 20606 is one 20620.

The VersionID 20622 is the version for the property definition class. For the VersionID 20622, the Category is Element 20624, the Object Class is Property Definition Class Reference 20626, the Property is Version Identification 20628, the Representation/Association term is Identifier 20630, the Type term is GDT 20632, and the Type Name term is VersionID 20634. The Cardinality between the GDT PropertyDefinitionClassReference 20600 and the VersionID 20622 is zero or one 20636.

For information about the property definition class, see the GDT PropertyDefinitionClass.

(ppppppp) PropertyDefinitionClassTypeCode

The DefinitionClassTypeCode 20700 is a coded representation of the nature of a definition class. This may be determined based on its business purpose, from which the attributes may be derived. An example or instance is: <DefinitionClassTypeCode>M</DefinitionClassTypeCode>.

The structure of GDT DefinitionClassTypeCode 20700 is depicted in FIG. 207. For the GDT DefinitionClassTypeCode 20700, the Object Class is Definition Class Type 20702, the Representation/Association term is Code 20704, the Type term is CCT 20706, the Type Name term is Code 20708, and the Length is one 20710. The GDT DefinitionClassTypeCode 20700 may be a restricted GDT.

In an embodiment, the illustrative Codes in accordance with ISO13584/42 that are permitted are as follows:

The Code I has the Name Item class. A definition class of this type can contain properties of all the specializations described below.

The Code C has the Name Component class, which is an 'Item class' specialization; the properties that are contained in this type of definition class are used to describe assemblies based on their assignment relationships.

The Code M has the Name Material class, which is an 'Item class' specialization; the properties that are contained in this type of definition class are used to describe basic materials, materials, and the like, based on their physical attributes.

The Code F has the Name Feature class, which is an 'Item class' specialization; the properties that are contained in this type of definition class are used to describe objects based on their geometry, form, and function.

(qqqqqqq) PropertyID

A GDT PropertyID 20800 is a unique identifier for a property. A property is an object attribute. An example is: <PropertyID schemeAgencyID="005">LENGTH</PropertyID>rue, (005=ISO).

The structure of GDT PropertyID 20800 is depicted in FIG. 208. The GDT PropertyID 20800 includes attributes schemeAgencyID 20816, schemeAgencySchemeID 20834, and schemeAgencySchemeAgencyID 20852. For the GDT PropertyID 20800, the Object Class is Property 20802, the Property is Identification 20804, the Representation/Association term is Identifier 20806, the Type term is CCT 20808, the Type Name term is Identifier 20810, and the Length is from one to fifty 20812. The GDT PropertyID 20800 may be a restricted GDT.

For schemeAgencyID 20816, the Category is Attribute 20818, the Object Class is Identification Scheme-Agency 20820, the Property is Identification 20822, the Representation/Association term is Identifier 20824, the Type term is xsd 20826, the Type Name term is Token 20828, and the Length is from one to sixty 20830. The Cardinality between the GDT PropertyID 20800 and the schemeAgencyID 20816 is one or one 20832.

For the schemeAgencySchemeID 20834, the Category is Attribute 20836, the Object Class is Identification Scheme-Agency 20838, the Property is Scheme 20840, the Representation/Association term is Identifier 20842, the Type term is xsd 20844, the Type Name term is Token 20846, and the Length is from one to sixty 20848. The Cardinality between the GDT PropertyID 20800 and the schemeAgencySchemeID 20834 is zero or one 20850.

For the schemeAgencySchemeAgencyID 20852, the Category is Attribute 20854, the Object Class is Identification Scheme-Agency 20856, the Property is SchemeAgency 20858, the Representation/Association term is Identifier 20860, the Type term is xsd 20862, the Type Name term is Token 20864, and the Length is three 20866. The Cardinality between the GDT PropertyID 20800 and the schemeAgencySchemeAgencyID 20852 is zero or one 20868.

If a definition class is used, the schemeAgency may be identical to the schemeAgency of the identifier for the property definition class in which the property was defined (see GDT PropertyDefinitionClassID).

The concept is defined in ISO13584/42. Related GDTs to 20800 are Property, PropertyDataTypeIdentification, PropertyDataType, DefinitionClassIdentification, DefinitionClass, PropertyValues, and PropertyValuation. The object corresponds to the BOR object BUS 1088 (characteristic) and to the Characteristic Management Engine property (CME property) from the new classification.

(rrrrrrr)PropertyMultipleValueIndicator

A GDT PropertyMultipleValueIndicator 20900 indicates whether or not a property can incorporate a list of values. An example is: <PropertyMultipleValueIndicator>true</PropertyMultipleValueIndicator>.

The structure of GDT PropertyMultipleValueIndicator 20900 is depicted in FIG. 209. For the GDT PropertyMultipleValueIndicator 20900, the Object Class is Property 20902, the Property is Multiple Value 20904, the Representation/Association term is Indicator 20906, and the Type term is Indicator 20908.

Valid illustrative values for 20900 are:

1) true, meaning several values can be assigned to the property; and
2) false, meaning one value can be assigned to the property. (For the value range, see CCT:Indicator)

(sssssss) PropertyParametricSearchableIndicator

A GDT PropertyParametricSearchableIndicator 21000 indicates whether a property is suitable for a parametric search or not. A parametric search (also called an 'attribute search') is a search for an object using explicit information about which values a property in the object is to contain. For example, in the case of a parametric search for a red vehicle with 100 HP, the illustrative properties are:

1) a Color equal to "red;" and
2) a Performance equal to "100 HP," which are specified explicitly.

An example is: <PropertyParametricSearchableIndicator>true</PropertyParametricSearchableIndicator>.

The structure of GDT PropertyParametricSearchableIndicator 21000 is depicted in FIG. 210. For the GDT PropertyParametricSearchableIndicator 21000, the Object Class is Property 21002, the Property is Parametric Searchable 21004, the Representation/Association term is Indicator 21006, the Type term is CCT 21008, and the Type Name term is Indicator 21010.

Valid illustrative values for 21000 are:

1) true, meaning the property is suitable for a parametric search; and
2) false, meaning the property is not suitable for a parametric search. The GDT PropertyParametricSearchableIndicator 21000 is used in the context of the property definition.

(ttttttt) PropertyReference

A GDT PropertyReference 21100 is a unique reference to a property or a version of a property. The referenced property can have been defined in a property definition class. An example is:

```
<PropertyReference>
    <ID schemeAgencyID="005">LENGTH</ID>
    <VersionID>1</VersionID>
    <DefinitionClassReference>
        <ID schemeAgencyID="005">SCREW_PROPERTIES</ID>
    </DefinitionClassReference>
</PropertyReference>
(005 = ISO).
```

The structure of GDT PropertyReference 21100 is depicted in FIG. 211. The GDT PropertyReference 21100 includes elements ID 21106, VersionID 21122, and DefinitionClassReference 21138. For the GDT PropertyReference 21100, the Object Class is Property Reference 21102 and the Representation/Association term is Details 21104.

The ID 21106 is the identifier for the property. For the ID 21106, the Category is Element 21108, the Object Class is PropertyReference 21110, the Property is Identification 21112, the Representation/Association term is Identifier 21114, the Type term is GDT 21116, and the Type Name is PropertyID 21118. The Cardinality between the GDT PropertyReference 21100 and the ID 21106 is one or one 21120.

The VersionID 21122 is the version of the property. For the VersionID 21122, the Category is Element 21124, the Object Class is PropertyReference 21126, the Property is Version Identification 21128, the Representation/Association term is VersionID 21130, the Type term is GDT 21132, and the Type Name term is VersionID 21134. The Cardinality between the GDT PropertyReference 21100 and the VersionID 21122 is zero or one 21136.

The DefinitionClassReference 21138 is the reference to the definition class (or to a version of the definition class) of the property. If a reference exists, the property is unique within the specified definition class. For the DefinitionClassReference 21138, the Category is Element 21140, the Object Class is PropertyReference 21142, the Property is Definition Class Reference 21144, the Representation/Association term is DefinitionClassReference 21146, the Type term is GDT 21148, and the Type Name term is DefinitionClassReference 21150. The Cardinality between the GDT PropertyReference 21100 and the DefinitionClassReference 21138 is zero or one 21152.

If a definition class is used, the property issuer may be identical to the issuer of the property definition class. The conceptual context of the PropertyReference is defined in ISO13584/42. Related GDTs for 21100 are: Property, PropertyDataTypeIdentification, PropertyDataType, PropertyDefinitionClass, PropertyDefinitionClassID, PropertyValues, and PropertyValuation.

PropertyReference corresponds to the BOR object BUS 1088 "Characteristic" and to the CME property from the new classification.

(uuuuuuu) PropertyValuation

The GDT PropertyValuation 21200 is the assignment of values to a property. A property valuation is performed for an object as part of the classification procedure in order to describe its attributes. An example or instance is:

Valuation of a property with a simple data type:

```
<PropertyValuation>
  <PropertyReference>
    <ID>LENGTH</ID>
    <DefinitionClassReference>
      <ID>SCREW__PROPERTIES</ID>
      <Version>1</Version>
    <DefinitionClassReference>
  <PropertyReference>
  <PropertyValue>
    <MeasureSpecification>
      <Measure unitCode="12">3</Measure>
    </MeasureSpecification>
  <PropertyValue>
</PropertyValuation>
```

unitCode="12" corresponds to centimeters in accordance with UN/CEFACT Rec. #20 (Units of Measure)

Valuation of a property with a complex data type:

The 'VERBRAUCHSPROFIL' (consumption profile) property consists of the 'STRASSENTYP' (street type) and 'VERBRAUCH' (consumption) properties. The data type of the 'VERBRAUCHSPROFIL' property has a complex format and references the 'AUTOS' (cars) definition class that contains the component properties.

Complex (grouping) property 'VERBRAUCHSPROFIL':

```
  <PropertyValuation>
    <ID>1</ID>
    <PropertyReference>
      <ID>VERBRAUCHSPROFIL</ID>
      <DefinitionClassReference>
        <ID>AUTOS</ID>
      </DefinitionClassReference>
    </PropertyReference>
  </PropertyValuation>
Property 'STRASSENTYP':
  <PropertyValuation>
    <ID>2</ID>
    <ParentID>1</ParentID>
    <PropertyReference>
      <ID>STRASSENTYP</ID>
      <DefinitionClassReference>
        <ID>VERBRAUCHSTYP</ID>
      </DefinitionClassReference>
    </PropertyReference>
    <PropertyValue>
      <NameSpecification>
        <Name>LANDSTRASSE</Name>
      </NameSpecification>
    </PropertyValue>
  </PropertyValuation>
Property 'VERBRAUCH':
  <PropertyValuation>
    <ID>3</ID>
    <ParentID>1</ParentID>
    <PropertyReference>
      <ID>VERBRAUCH</ID>
      <DefinitionClassReference>
        <ID>VERBRAUCHSTYP</ID>
      </DefinitionClassReference>
    </PropertyReference>
    <PropertyValue>
      <MeasureSpecification>
        <Measure unitCode"49">5</Measure>
      </MeasureSpecification>
    </PropertyValue>
  </PropertyValuation>
```

unitCode="49" corresponds to liters in accordance with UN/CEFACT Rec. #20 (Units of Measure)

The structure of GDT PropertyValuation 21200 is depicted in FIG. 212. The GDT Property Valuation 21200 includes attribute ActionCode 21206 and elements ID 21222, ParentID 21240, PropertyReference 21258, and PropertyValue 21274. For the GDT Property Valuation 21200, the Object Class is Property Valuation 21202*a* and the Representation/Association term is Details 21204.

The ActionCode 21206 is an instruction to the recipient of a message about how to process a transmitted property. For the ActionCode 21206, the Category is Attribute 21208, the Object Class is Property Valuation 21210, the Property is Action 21212, the Representation/Association term is Code 21214, the Type term is GDT 21216, and the Type Name term is ActionCode 21218. The Cardinality between the GDT Property Valuation 21200 and the ActionCode 21206 is zero or one 21220.

The ID 21222 is an unique identifier of the property valuation. The attribute may be used for valuating properties with a complex data type. ID is unique in the context of the valuated object. For the ID 21222, the Category is Element 21224, the Object Class is Property Valuation 21226, the Property is Identification 21228, the Representation/Association term is Identifier 21230, the Type term is CCT 21232, the Type Name term is Identifier 21234, and the Length is from one to ten 21236. The Cardinality between the GDT Property Valuation 21200 and the ID 21222 is zero or one 21238.

The ParentID 21240 is an identifier for the property valuation (for the valuation of a complex data type) that is a parent to the current property valuation. For the ParentID 21240, the Category is Element 21242, the Object Class is Property Valuation 21244, the Property is Parent Identification 21246, the Representation/Association term is Identifier 21248, the Type term is CCT 21250, the Type Name term is Identifier 21252, and the Length is from one to ten 21254. The Cardinality between the GDT Property Valuation 21200 and the ParentID 21240 is zero or one 21256.

The PropertyReference 21258 is a reference to the underlying property for which the property valuation is mapped. For the PropertyReference 21258, the Category is Element 21260, the Object Class is Property Valuation 21262, the Property is Property Reference 21264, the Representation/Association term is Reference 21266, the Type term is GDT 21268, and the Type Name term is PropertyReference 21270. The Cardinality between the GDT Property Valuation 21200 and the PropertyReference 21258 is one 21272.

The PropertyValue 21274 is a value of the above property. For the PropertyValue 21274, the Category is Element 21276, the Object Class is Property Valuation 21278, the Property is Property Value 21280, the Representation/Association term is Property Value 21282, the Type term is GDT 21284, and the Type Name term is PropertyValue 21286. The Cardinality between the GDT Property Valuation 21200 and the PropertyValue 21274 is from zero to n 21288.

See ISO13584/42 (Definition of data model for properties) available from the GDT owner, for illustrative integrity conditions for 21200. The valuations may correspond to the formats specified by the data type (see GDT: PropertyDataType) of the valuated property (see GDT: Property). If the data type contains a value list, valuations may be included in this value list. The number of property values in the valuation may generally correspond to the value assignment type (any, as required) defined in the property. These integrity conditions apply in the case of a final actual valuation and not in the case of specifications for a final valuation. In this case, the valuation restricts the permitted value range of the property. An example of this is the valuation of a batch material that merely specifies the valuation range for the actual batches. Several valuations can also be specified for single-value properties. In an embodiment, a property with a complex data type may not be valuated directly. However, the components of its data type can be. In this case, PropertyValue 21274 is empty. PropertyValue 21274 is filled for the relevant components and the ParentID 21240 contains the ID 21222 of the parent property with the complex data type.

PropertyValuation is used by classified objects such as, e.g., batch: a property valuation consists of the key of the property to be valuated and the associated values. Thus, e.g., if the 'color' (property) of a batch is 'red' (value) or its 'weight' (property) is '5 kg' (value,) the combination of property and value constitutes the property valuation. PropertyValuation is also used for a formal description of the creation of definition class hierarchies (See GDT PropertyDefinitionClass).

(vvvvvvv) PropertyValuationRequiredIndicator

A GDT PropertyValuationRequiredIndicator 21300 indicates whether or not a value has to be specified for a property. An example is:

<PropertyValuationRequiredIndicator>true</PropertyValuationRequiredIndicator>.

The structure of GDT PropertyValuationRequiredIndicator 21300 is depicted in FIG. 213. For the GDT PropertyValuationRequiredIndicator 21300, the Object Class is Property 21302, the Property is Valuation Required 21304, the Representation/Association term is Indicator 21306, the Type term is CCT 21308, and the Type Name term is Indicator 21310.

Valid illustrative values for 21300 are 1) true, meaning that a value may be specified; or 2) false, meaning that a value does not have to be specified. For the value range, see CCT: Indicator.

(wwwwwww) PropertyValue

A GDT PropertyValue 21400 describes a value that can be assigned to a property. The value can also be an interval. An example is:

```
<PropertyValue>
        <IntegerSpecification>
                <Value>1</Value>
        </IntegerSpecification>
        <PreferredName languageCode="DE">Eins</PreferedName>
        <PreferredName languageCode="EN">one</PreferedName>
</PropertyValue>.
```

The structure GDT Property Value 21400 is depicted in FIG. 214. The GDT Property Value 21400 includes elements AmountSpecification21404, QuantitySpecification 21436, Decimal Specification 21468, FloatSpecification 21404*a*, IntegerSpecification 21439*a*, DateSpecification 21474*a*, TimeSpecification 21404*b*, DateTimeSpecification 21433*b*, NameSpecification 21462*b*, IndicatorSpecification 21476*b*, and IntervalTypeCode 21490*b*. For the GDT Property Value 21400, the Category is Element 21401, the Object Class is Property Value 21402, and the Representation/Association term is Details 21403.

The AmountSpecification 21404 contains the specification of currency-based values (amounts). For the AmountSpecification 21404, the Category is Element 21405, the Object Class is Property Value 21406, the Property is Amount Specification 21407, and the Representation/Association term is Details 21408. The Cardinality between the GDT Property Value 21400 and the AmountSpecification 21404 is zero or one 21409.

The Amount 21410 is a discrete, currency-based single value or amount. The Amount 21410 is of type GDT: Amount. For the Amount 21410, the Category is Element 21411, the Object Class is Amount Specification 21412, the Property is Amount 21413, the Representation/Association term is Amount 21414, the Type term is GDT 21415, and the Type Name term is Amount 21416. The Cardinality between the GDT Property Value 21400 and the AmountSpecification 21404 Amount 21410 is between zero or one 21417.

The LowerAmount 21418 is a lower limit in a currency-based value interval. The LowerAmount 21418 is of type GDT: Amount. For the LowerAmount 21418, the Category is Element 21419, the Object Class is Amount Specification 21420, the Property Quality term is Lower 21421, the Property is Amount 21422, the Representation/Association term is Amount 21423, the Type term is GDT 21424, and the Type Name term is Amount 21425. The Cardinality between the GDT Property Value 21400 and the AmountSpecification 21404 LowerAmount 21418 is zero or one 21426.

The UpperAmount 21427 is an upper limit in a currency-based value interval. The UpperAmount is of type GDT: Amount. For the UpperAmount 21427, the Category is Element 21428, the Object Class is amount Specification 21429, the Property Quality term is Upper 21430, the Property is Amount 21431, the Representation/Association term is Amount 21432, the Type term is GDT 21433, and the Type Name term is Amount 21434. The Cardinality between the GDT Property Value 21400 and the AmountSpecification 21404 UpperAmount 21427 is zero or one 21435.

The QuantitySpecification 21436 contains the specification of quantities in a unit of measurement/measure. For the QuantitySpecification 21436, the Category is Element 21437, the Object Class is Property Value 21438, the Property is Quantity Specification 21439, and the Representation/Association term is Details 21440. The Cardinality between the GDT Property Value 21400 and the QuantitySpecification 21436 is zero or one 21441.

The Quantity 21442 is an individual quantity in a unit of measurement. The Quantity 21442 is of type GDT: Quantity. For the Quantity 21442, the Category is Element 21443, the Object Class is Quantity Specification 21444, the Property is Quantity 21445, the Representation/Association term is Quantity 21446, the Type term is GDT 21447, and the Type Name term is Quantity 21448. The Cardinality between the GDT Property Value 21400 and the QuantitySpecification 21436 Quantity 21442 is zero or one 21449.

The LowerQuantity 21450 is a lower limit in a quantity interval. The LowerQuantity 21450 is of type GDT:Quantity. For the LowerQuantity 21450, the Category is Element 21451, the Object Class is Quantity Specification 21452, the Property Quality term is Lower 21453, the Property is Quantity 21454, the Representation/Association term is Quantity 21455, the Type term is GDT 21456, and the Type Name term is Quantity 21457. The Cardinality between the GDT Property Value 21400 and the LowerQuantity 21450 is zero or one 21458.

The UpperQuantity 21459 is an upper limit in a quantity interval. The UpperQuantity 21459 is of type GDT:Quantity. For the UpperQuantity 21459, the Category is Element 21460, the Object Class is Quantity Specification 21461, the Property Quality term is Upper 21462, the Property is Quantity 21463, the Representation/Association term is Quantity 21464, the Type term is GDT 21465, and the Type Name term is Quantity 21466. The Cardinality between the GDT Property Value 21400 and the UpperQuantity 21459 is zero or one 21467.

The DecimalSpecification 21468 contains the specification of decimal numbers. For the DecimalSpecification 21468, the Category is Element 21469, the Object Class is Property Value 21470, the Property is Numeric Specification 21471, and the Representation/Association term is Details 21472. The Cardinality between the GDT Property Value 21400 and the DecimalSpecification 21468 is zero or one 21473.

The DecimalValue 21474 is a discrete decimal value. The DecimalValue 21474 is of type GDT: DecimalValue. For the DecimalValue 21474, the Category is Element 21475, the Object Class is Decimal Specification 21476, the Property is Decimal Value 21477, the Representation/Association Quality term is Decimal 21478, the Representation/Association term is Value 21479, the Type term is GDT 21480, and the Type Name term is DecimalValue 21481. The Cardinality between the GDT Property Value 21400 and the DecimalValue 21474 is zero or one 21482.

The LowerDecimalValue 21483 is a lower limit in a value interval of decimal values. The LowerDecimalValue 21483 is of type GDT: DecimalValue. For the LowerDecimalValue 21483, the Category is Element 21484, the Object Class is Decimal Specification 21485, the Property Quality term is Lower 21486, the Property is Decimal Value 21487, the Representation/Association Quality term is Decimal 21488, the Representation/Association term is Value 21489, the Type term is GDT 21490, and the Type Name term is DecimalValue 21491. The Cardinality between the GDT Property Value 21400 and the LowerDecimalValue 21483 is zero or one 21492.

The UpperDecimalValue 21493 is an upper limit in a value interval of decimal values. The UpperDecimalValue 21493 is of type GDT: DecimalValue. For the UpperDecimalValue 21493, the Category is Element 21494, the Object Class is Decimal Specification 21495, the Property Quality term is Upper 21496, the Property is Decimal Value 21497, the Representation/Association Quality term is Decimal 21498, the Representation/Association term is Value 21499, the Type term is GDT 21401, and the Type Name term is DecimalValue **21402*a*. The Cardinality between the GDT Property Value 21400 and the UpperDecimalValue 21493 is zero or one 21403*a***.

The FloatSpecification **21404*a* contains the specification of the floating point values. For the FloatSpecification 21404*a*, the Category is Element 21405*a*, the Object Class is Property Value 21406*a*, the Property is Float Specification 21407*a*, and the Representation/Association term is Details 21408*a*. The Cardinality between the GDT Property Value 21400 and the FloatSpecification 21404*a* is zero or one 21409*a***.

The FloatValue **21410*a* is a discrete floating point value. The FloatValue is type GDT: FloatValue. For the FloatValue 21410*a*, the Category is Element 21411*a*, the Object Class is Float Specification 21412*a*, the Property is FloatValue 21413*a*, the Representation/Association Quality term is Float 21414*a*, the Representation/Association term is Value 21415*a*, the Type term is GDT 21416*a*, and the Type Name term is FloatValue 21417*a*. The Cardinality between the GDT Property Value 21400 and the FloatValue 21410*a* is zero or one 21418*a***.

The LowerFloatValue **21419*a* is a lower limit in a value interval of floating point values. The LowerFloatValue 21419*a* is of type GDT: FloatValue. For the LowerFloatValue 21419*a*, the Category is Element 21420*a*, the Object Class is Float Specification 21421*a*, the Property Quality term is Lower 21422*a*, the Property is Float Value 21423*a*, the Representation/Association Quality term is Float 21424*a*, the Representation/Association term is Value 21425*a*, the Type term is GDT 21426*a*, and the Type Name term is FloatValue 21427*a*. The Cardinality between the GDT Property Value 21400 and the LowerFloatValue 21419*a* is zero or one 21428*a***.

The UpperFloatValue **21429*a* is an upper limit in a value interval of floating point values. The UpperFloatValue 21429*a* is of type GDT: FloatValue. For the UpperFloatValue 21429*a*, the Category is Element 21430*a*, the Object Class is Float Specification 21431*a*, the Property Quality term is Upper 21432*a*, the Property is Float Value 21433*a*, the Representation/Association Quality term is Float 21434*a*, the Representation/Association term is Value 21435*a*, the Type term is GDT 21436*a*, and the Type Name term is FloatValue 21437*a*. The Cardinality between the GDT Property Value 21400 and the UpperFloatValue 21429*a* is zero or one 21438*a***.

The IntegerSpecification **21439*a* contains the specification of integer values. For the IntegerSpecification 21439*a*, the Category is Element 21440*a*, the Object Class is Property Value 21441*a*, the Property is Integer Specification 21442*a*, and the Representation/Association term is Details 21443*a*. The Cardinality between the GDT Property Value 21400 and the IntegerSpecification 21439*a* is zero or one 21444*a***.

The IntegerValue **21445*a* is a discrete integer value. The IntegerValue 21445*a* is of type GDT: IntegerValue. For the IntegerValue 21445*a*, the Category is Element 21446*a*, the Object Class is Integer Specification 21447***a*, the Property is Integer Value 21448*a*, the Representation/Association Quality term is Integer 21449*a*, the Representation/Association term is Value 21450*a*, the Type term is GDT 21451*a*, and the Type Name term is IntegerValue 21452*a*. The Cardinality between the GDT Property Value 21400 and the IntegerValue 21445*a* is zero or one 21453*a*.

The LowerIntegerValue 21454*a* is a lower limit in a value interval of integer values. The LowerIntegerValue 21454*a* is of type GDT: IntegerValue. For the LowerIntegerValue 21454*a*, the Category is Element 21455*a*, the Object Class is Integer Specification 21456*a*, the Property Quality term is Lower 21457*a*, the Property is Integer Value 21458*a*, the Representation/Association Quality term is Integer 21459*a*, the Representation/Association term is Value 21460*a*, the Type term is GDT 21461*a*, and the Type Name term is IntegerValue 21462*a*. The Cardinality between the GDT Property Value 21400 and the LowerIntegerValue 21454*a* is zero or one 21463*a*.

The UpperIntegerValue 21464*a* is an upper limit in a value interval of integer values. The UpperIntegerValue 21464*a* is of type GDT: IntegerValue. For the UpperIntegerValue 21464*a*, the Category is Element 21465*a*, the Object Class is Integer Specification 21466*a*, the Property Quality term is Upper 21467*a*, the Property is Integer Value 21468*a*, the Representation/Association Quality term is Integer 21469*a*, the Representation/Association term is Value 21470*a*, the Type term is GDT 9971, and the Type Name term is IntegerValue 21472*a*. The Cardinality between the GDT Property Value 21400 and the UpperIntegerValue 21464*a* is zero or one 21473*a*.

The DateSpecification 21474*a* contains the specification of calendar days or date intervals. For the DateSpecification 21474*a*, the Category is Element 21475*a*, the Object Class is Property Value 21476*a*, the Property is Date Specification 21477*a*, and the Representation/Association term is Details 21478*a*. The Cardinality between the GDT Property Value 21400 and the DateSpecification 21474*a* is zero or one 21479*a*.

The Date 21480*a* is a calendar day. The Date 21480*a* is of type GDT: Date. For the Date 21480*a*, the Category is Element 21481*a*, the Object Class is Date Specification 21482*a*, the Representation/Association term is Date 21483*a*, the Type term is GDT 21484*a*, and the Type Name term is Date 21485*a*. The Cardinality between the GDT Property Value 21400 and the Date 21480*a* is zero or one 21486*a*.

The StartDate 21487*a* is a date that defines the start of a daily time interval. The StartDate 21487*a* is of type GDT: Date. For the StartDate 21487*a*, the Category is Element 21488*a*, the Object Class is Date Specification 21489*a*, the Property is Start 21490*a*, the Representation/Association term is Date 21491*a*, the Type term is GDT 21492*a*, and the Type Name term is Date 21493*a*. The Cardinality between the GDT Property Value 21400 and the StartDate 21487*a* is zero or one 21494*a*.

The EndDate 21495*a* is a date that defines the end of a daily time interval. The EndDate 21495*a* is of type GDT: Date. For the EndDate 21495*a*, the Category is Element 21496*a*, the Object Class is Date Specification 21497*a*, the Property is End 21498*a*, the Representation/Association term is Date 21499*a*, the Type term is GDT 21401*b*, and the Type Name term is Date 21402*b*. The Cardinality between the GDT Property Value 21400 and the EndDate 21495*a* is zero or one 21403*b*.

The TimeSpecification 21404*b* contains the specification, accurate to the second, of a particular time or time interval (time span). For the TimeSpecification 21404*b*, the Category is Element 21405*b*, the Object Class is PropertyValue 21406*b*, the Property is Time Specification 21407*b*, and the Representation/Association term is Details 21408*b*. The Cardinality between the GDT Property Value 21400 and the TimeSpecification 21404*b* is zero or one 21409*b*.

The Time 21410*b* is a particular time, accurate to the second. The Time 21410*b* is of type GDT: Time. For the Time 21410*b*, the Category is Element 21411*b*, the Object Class is Time Specification 21412*b*, the Representation/Association term is Time 21413*b*, the Type term is GTD 21414*b*, and the Type Name term is Time 21415*b*. The Cardinality between the GDT Property Value 21400 and the Time 21410*b* is zero or one 21416*b*.

The StartTime 21417*b* is a time that defines the start of a particular time interval, accurate to the second. The StartTime 21417*b* is of type GDT: Time. For the StartTime 21417*b*, the Category is Element 21418*b*, the Object Class is Time Specification 21419*b*, the Property is Start 21420*b*, the Representation/Association term is Time 21421*b*, the Type term is GDT 21422*b*, and the Type Name term is Time 21423*b*. The Cardinality between the GDT Property Value 21400 and the StartTime 21417*b* is zero and one 21424*b*.

The EndTime 21425*b* is a time that defines the end of a particular time interval, accurate to the second. The EndTime 21425*b* is of type GDT: Time. For the EndTime 21425*b*, the Category is Element 21426*b*, the Object Class is Time Specification 21427*b*, the Property is End 21428*b*, the Representation/Association term is Time 21429*b*, the Type term is GDT 21430*b*, and the Type Name term is Time 21431*b*. The Cardinality between the GDT Property Value 21400 and the EndTime 21425*b* is zero or one 21432*b*.

The DateTimeSpecification 21433*b* contains the specification of time stamps (date and time), accurate to the second, or the specification of a timeframe, accurate to the second. For the DateTimeSpecification 21433*b*, the Category is Element 21434*b*, the Object Class is Property Value 21435*b*, the Property is Date Time Specification 21436*b*, and the Representation/Association term is Details 21437. The Cardinality between the GDT Property Value 21400 and the DateTimeSpecification 21433*b* is zero or one 21438*b*.

The DateTime 21439*b* is a time stamp (date and time), accurate to the second. The DateTime 21439*b* is of type GDT: DateTime. For the DateTime 21439*b*, the Category is Element 21440*b*, the Object Class is Date Time Specification 21441*b*, the Representation/Association term is Date Time 21442*b*, the Type term is GDT 21443*b*, and the Type Name term is DateTime 21444*b*. The Cardinality between the GDT Property Value 21400 and the DateTime 21439*b* is zero or one 21445*b*.

The StartDateTime 21446*b* is a time stamp that defines the start of a time interval or timeframe. The StartDateTime 21446*b* is of type GDT: DateTime. For the StartDateTime 21446*b*, the Category is Element 21447*b*, the Object Class is Date Time Specification 21448*b*, the Property is Start 21449*b*, the Representation/Association term is Date Time 21450*b*, the Type term is GDT 21451*b*, and the Type Name is DateTime 21452*b*. The Cardinality between the GDT Property Value 21400 and the StartDateTime 21446*b* is zero or one 21453*b*.

The EndDateTime 21454*b* is a time stamp that defines the end of a time interval or timeframe. The EndDateTime 21454*b* is of type GDT: DateTime. For the EndDateTime 21454*b*, the Category is Element 21455*b*, the Object Class is Date Time Specification 21456*b*, the Property is End 21457*b*, the Representation/Association term is Date Time 21458*b*, the Type term is GDT 21459*b*, and the Type Name term is DateTime 21460*b*. The Cardinality between the GDT Property Value 21400 and the EndDateTime 21454*b* is zero or one 21461*b*.

The NameSpecification 21462*b* contains the specification of qualitative and human-readable values. For the NameSpecification 21462*b*, the Category is Element 21463*b*, the Object Class is Property Value 21464*b*, the Property is Name Specification 21465*b*, and the Representation/Association term is Details 21466*b*. The Cardinality between the GDT Property Value 21400 and the NameSpecification 21462*b* is zero or one 21467*b*.

The Name 21468*b* is an individual qualitative and human-readable value. The Name 21468*b* is of type GDT: Name. For the Name 21468*b*, the Category is Element 21469*b*, the Object Class is Name Specification 21470*b*, the Property is Name 21471*b*, the Representation/Association term is Name 21472*b*, the Type term is GDT 21473*b*, and the Type Name term is Name 21474*b*. The Cardinality between the GDT Property Value 21400 and the Name 21468*b* is zero or one 21475*b*.

The IndicatorSpecification 21476*b* contains the specification of binary logical values (such as, yes and no). For the IndicatorSpecification 21476*b*, the Category is Element 21477*b*, the Object Class is Property Value 21478*b*, the Property is Indicator Specification 21479*b*, and the Representation/Association term is Details 21480*b*. The Cardinality between the GDT Property Value 21400 and the IndicatorSpecification 21476*b* is zero or one 21481*b*.

The Indicator 21482*b* is an individual binary logical value. The Indicator 21482*b* is of type GDT: Indicator. For the Indicator 21482*b*, the Category is Element 21483*b*, the Object Class is Indicator Specification 21484*b*, the Property is Indicator 21485*b*, the Representation/Association term is Indicator 21486*b*, the Type term is GDT 21487*b*, and the Type Name term is Indicator 21488*b*. The Cardinality between the GDT Property Value 21400 and the Indicator 21482*b* is zero or one 21489*b*.

The IntervalTypeCode 21490*b* is a coded representation for typing intervals. The IntervalTypeCode 21490*b* is of type GDT: IntervalTypeCode. For the IntervalTypeCode 21490*b*, the Category is Element 21491*b*, the Object Class is Property Value 21492*b*, the Property is Interval Type 21493*b*, the Representation/Association term is Code 21494*b*, the Type term is GDT 21495*b*, and the Type Name term is IntervalTypeCode 21496*b*. The Cardinality between the GDT Property Value 21400 and the IntervalTypeCode 21490*b* is zero or one 21497*b*.

The PreferredName 21498*b* is a name of the value or value interval, if one exists. The PreferredName 21498*b* is of type GDT: Name. For the PreferredName 21498*b*, the Category is Element 21499*b*, the Object Class is Property Value 21401*c*, the Property is Preferred Name 21402*c*, the Representation/Association term is Name 21403*c*, the Type term is GDT 21404*c*, and the Type Name is Name 21405*c*. The Cardinality between the Property Value 21400 and the PreferredName 21498*b* is from zero to n 21406*c*.

The SynonymousName 21407*c* is a synonymous term for the PreferredName. The SynonymousName 21407*c* is of type GDT: Name. For the SynonymousName 21407*c*, the Category is Element 21408*c*, the Object Class is Property Value 21409*c*, the Property is Synonymous Name 21410*c*, the Representation/Association term is Name 21411*c*, the Type term is GDT 21412*c*, and the Type Name term is Name 21413*c*. The Cardinality between the Property Value 21400 and the SynonymousName 21407*c* is from zero to n 21414*c*.

The AbbreviationName 21415*c* is an abbreviation of the PreferredName. The AbbreviationName 21415*c* is of type GDT: Name. For the AbbreviationName 21415*c*, the Category is Element 21416*c*, the Object Class is Property Value 21417*c*, the Property is Abbreviation Name 21418*c*, the Representation/Association term is Name 21419*c*, the Type term is GDT 21420*c*, and the Type Name term is Name 21421*c*. The Cardinality between the Property Value 21400 and the AbbreviationName 21415*c* is from zero to n 21422*c*.

The IconAttachment 21423*c* is a graphic that illustrates the meaning of the value or value interval. The IconAttachment 21423*c* is of type GDT: Attachment. For the IconAttachment 21423*c*, the Category is Element 21424*c*, the Object Class is Property Value 21425*c*, the Property is Icon 21426*c*, the Representation/Association term is Attachment 21427*c*, the Type term is GDT 21428*c*, and the Type Name term is Attachment 21429*c*. The Cardinality between the Property Value 21400 and the IconAttachment 21423*c* is zero or one 21430*c*.

The AttachmentWebAddress 21431*c* is a reference to a WebAddress on the basis of which the value was defined. This attachment could be an explanatory drawing or a colored pattern. The AttachmentWebAddress 21431*c* is of type GDT: WebAddress. For the AttachmentWebAddress 21431*c*, the Category is Element 21432*c*, the Object Class is Property Value 21433*c*, the Property is Attachment 21434*c*, the Representation/Association term is Web Address, the Type term is GDT 21436*c*, and the Type Name term is WebAddress 21437*c*. The Cardinality between the Property Value 21400 and the AttachmentWebAddress 21431*c* is zero or one 21438*c*.

Illustrative integrity conditions for 21400 are as follows. When AmountSpecification, QuantitySpecification, DecimalSpecification, FloatSpecification, IntegerSpecification, DateSpecification, TimeSpecification, or DateTimeSpecification are used, single values may be specified by Amount, Measure, Quantity, Value, Date, Time, or DateTime. Single values and intervals cannot be specified at the same time. When LowerAmount or UpperAmount, LowerQuantity or UpperQuantity, LowerDecimal or UpperDecimal, LowerFloat or UpperFloat, LowerInteger or UpperInteger, StartDate or EndDate, StartTime or EndTime, or StartDateTime or EndDateTime are used, the respective complementary Upper or Lower field or Start or End field may be filled. The PreferredName and AbbreviationName fields may be filled once per language. IntervalTypeCode may be specified when the value is an interval (also <, <=, and the like). See for example, ISO13584/42.

Examples of AmountSpecification include defining a price interval, either a LowerAmount or UpperAmount for a product.

Examples of QuantitySpecification include valuating properties whose data types are in units, e.g., 5 pieces, 7 kg.

Examples of DecimalSpecification/FloatSpecification include valuating nondimensional, numeric properties e.g., ratios, calculation indexes, key figures, and so on.

Examples of IntegerSpecification include valuating nondimensional, integer properties, e.g., codes, indexes, and sequential numbers.

Examples of DateSpecification include an expiration date or best-before date, a date of manufacture, a filling date, a packaging date, a release date, a lock date, an order date, a delivery date, a storage period, and the like.

Examples of TimeSpecification/DateTimeSpecification include time stamp, accurate to the second, for specifying a filling time, production time, inspection time, and the like.

Examples of NameSpecification include red, green, and the like, for the color of the property.

Examples of Indicator Specification include properties that can have one of two statuses as their valuation, e.g., yes/no, on/off.

(xxxxxxx) PurchaseOrderOrderedIndicator

A GDT PurchaseOrderOrderedIndicator 21500 indicates whether a purchase order has been sent to a vendor or not. An example is: (In the context of the PurchaseOrder)

<OrderedIndicator>true</OrderedIndicator>.

The structure of GDT Purchase Order Ordered Indicator 21500 is depicted in FIG. 215. For the GDT Purchase Order Ordered Indicator 21500, the Object Class is Purchase Order 21502, the Property is Ordered Indicator 21504, the Representation/Association term is Indicator 21506, and the Type term is CCT: Indicator 21508.

The PurchaseOrderOrderedIndicator 21500 can have the following values, either 1) true, meaning that the purchase order has been sent to a vendor; or 2) false, meaning that the purchase order has not yet been sent to a vendor.

For value range, see CCT Indicator.

The PurchaseOrderOrderedIndicator 21500 indicates whether or not a purchase order has been sent to a vendor. This makes it possible to distinguish between purchase orders that have already been sent to a vendor and purchase orders that are still being processed.

(yyyyyyy) PurchasingGroupID

A GDT PurchasingGroupID 21600 is a unique identifier for a group of buyers who are responsible for certain purchasing activities. An example is: <PurchasingGroupID>1234567</PurchasingGroupID>.

The structure of GDT Purchasing Group ID 21600 is depicted in FIG. 216. For the GDT Purchasing Group ID 21600, the Object Class is Purchasing Group 21602, the Property is Identification 21604, the Representation/Association term is Identifier 21606, the Type term is CCT 21608, the Type Name term is Identifier 21610, and the Length is from one to twenty 21612.

An in-house purchasing group may be responsible for procuring a product or class of products. Externally, the group acts as a contact for vendors. The PurchasingGroupID 21600 can be a maximum of 20 alphanumerical characters long. For the external representation, role-based IDs (e.g., BuyerPurchasingGroupID) based on the CCT: Identifier can be used without additional attributes—they are unique in conjunction with the identification of the party described by the role (e.g., BuyerID). The PurchasingGroupID 21600 is used externally in cooperative business processes, in particular in the vendor-managed inventory (VMI) business process, to uniquely identify the purchasing group of the party involved. In this scenario, the buyer, such as a retail company, sends purchase order numbers to the vendor, together with its PurchasingGroupID (i.e., the "BuyerPurchasingGroupID," from the vendor's point of view) so that the purchase orders created by the vendor can be generated depending on the buyer's purchasing group identification.

(zzzzzzz) Quantity

A GDT Quantity 21700 is the non-monetary numerical specification of an amount in a unit of measurement. An example is: <OrderedQuantity unitCode="CT">100</OrderedQuantity>(CT=Carton).

The structure of GDT Quantity 21700 is depicted in FIG. 217. A quantity is the result of the numerical comparison of the number, amount, or size of a given item or attribute and a standard number, amount, or size. Depending on the item or attribute to be qualified and the business context, the comparison can be made by physically measuring or counting. Positive and negative entries are possible using the built-in data type "xsd:decimal." Negative entries may be prefixed with a negative sign ("–"). However, positive entries do not have to be prefixed with a positive sign ("+"). The GDT Quantity 21700 includes attribute unitCode 21710. For the GDT Quantity 21700, the Representation/Association term is Quantity 21702, the Type term is xsd 21704, the Type Name term is Decimal 21706, and the Length is thirteen six 21708. For the unitCode 21710, the Category is Attribute 21712, the Object Class is Quantity 21714, the Property is Unit 21716, the Representation/Association term is Coe 21718, the Type term is xsd 21720, the Type Name term is Token 21722, and the Length is from one to three 21724. The Cardinality between the GDT Quantity 21700 and the unitCode 21710 is one 21726.

The permitted variations of the "unitCode" attribute are described in more detail in the "MeasureUnitCode" GDT.

Quantity 21700 may be used to specify the amount of a (manufactured, ordered, transported, delivered, and the like) product. In each given context, a decision may be made as to whether an amount (Quantity) or a physical measurement (Measure) is being specified. For this purpose, the physical units (PhysicalMeasureUnits) used in Measure form a subset of the measurement units (MeasureUnits) used in Quantity.

MeasureUnitCode helps to determine the "unitCode 21710" attribute.

(aaaaaaaa) QuantityDiscrepancyCode

The GDT QuantityDiscrepancyCode 21800 is a coded representation of the cause of or reason for a quantity discrepancy. An example is:

<QuantityDiscrepancyCode>AE</QuantityDiscrepancyCode>.

The structure of GDT QuantityDiscrepancyCode 21800 is depicted in FIG. 218. For the GDT QuantityDiscrepancyCode 21800, the Object Class is Quantity 21802, the Property is Discrepancy 21804, the Representation/Association term is Code 21806, the Type term is CCT 21808, the Type Name term is Code 21810, and the Length is from one to four 21812. The GDT QuantityDiscrepancyCode 21800 may be a restricted GDT.

Illustrative GDT QuantityDiscrepancyCode 21800 values in the "goods receipt process" are as follows: 1) AC, which represents an over delivery (on receipt of the goods, a surplus quantity was established in relation to the previously notified delivery); 2) AE, which represents goods delivered but not notified (on receipt of the goods, quantities of goods were established that were delivered without prior notification in the form of a shipping notification); 3) AF, which represents delivered goods are damaged (on receipt of the goods, damaged quantities were found); and 4) AG, which represents goods delivered too late (on receipt of the goods, quantities of goods were established that were already notified in an earlier delivery).

The GDT QuantityDiscrepancyCode 21800 refers to UN/EDIFACT 4221 (Discrepancy nature identification code) and contains the codes from this list that are relevant for quantity discrepancies. The GDT QuantityDiscrepancyCode 21800 describes the cause of a quantity discrepancy in a delivery that was established in the goods receipt process (generally with regard to a location product.) This coded information may be returned to the sender of the goods by means of a goods receipt notification. The codes for indicating under deliveries of goods and goods that are delivered too late could not be found in the current UN/EDIFACT code list. These two codes may still need to be requested and added as list values.

(bbbbbbbb) QuantityTimeSeries

A CDT QuantityTimeSeries 21900 is time series information that consists of items that each contain a period with a start time and end time and a period-based quantity. An example is:

<QuantityTimeSeries>
<Item>
<ValidityPeriod>
<StartDateTime>2002-04-19T15:00:00Z</StartDateTime>
<EndDateTime>2002-04-19T17:00:00Z</EndDateTime>
</ValidityPeriod>
<Quantity unitCode="PC" >150</Quantity>
</Item>
</QuantityTimeSeries>.

The structure of GDT Quantity-TimeSeries 21900 is depicted in FIG. 219. The GDT Quantity-TimeSeries 21900 includes element Item 21914. For the GDT Quantity-TimeSeries 21900, the Object Class Quality term is Quantity 21902, the Object Class is TimeSeries 21904, the Representation/Association term is Details 21906, the Type term is GDT 21908, and the Type Name term is TimeSeries 21910. The GDT Quantity-TimeSeries 21900 may be a restricted GDT.

The QuantityTimeSeriesItem 21914 is an item in a time series and can be repeated as often as required. For the Item 21914, the Category is Element 21916, the Object Class is TimeSeries 21918, the Property is Item 21920, and the Representation/Association term is Details 21922. The Cardinality between the GDT Quantity-TimeSeries 21900 and the Item 21914 is from one ton 21924.

The ValidityPeriod 21926 describes the validity period of the time series item with a start time stamp and an end time stamp. For the Validity Period 21926, the Category is Element 21928, the Object Class is TimeSeries 21930, the Property is ValidityPeriod 21932, the Representation/Association term is Details 21934, the Type term is GDT 21936, and the Type Name term is DateTimePeriod 21938. The Cardinality between the GDT Quantity-TimeSeries 21900 and the Item 21914 Validity Period 21926 is one 21940.

The Quantity 21942 describes the quantity connected with the time series item. For the Quantity 21942, the Category is Element 21944, the Object Class is TimeSeries 21946, the Property is Quantity 21948, the Representation/Association term is Quantity 21950, the Type term is GDT 21952, and the Type Name term is Quantity 21954. The Cardinality between the GDT Quantity-TimeSeries 21900 and the Quantity 21942 is one 21956.

The FixedIndicator 21958 describes whether the corresponding item is blocked for changes or not. For the Fixed-Indicator 21958, the Category is Element 21960, the Object Class is TimeSeries 21962, the Property is FixedIndicator 21964, the Representation/Association term is Indicator 21966, the Type term is GDT 21968, and the Type Name term is FixedIndicator 21970. The Cardinality between the GDT Quantity-TimeSeries 21900 and the Fixed-Indicator 21958 is zero or one 21972.

CDT QuantityTimeSeries 21900 is used as a generic data type that can have various specifications in an interface depending on the context category used, e.g., "Sales," to describe sales quantities; "Consumption," to describe consumption quantities, and the like.

(cccccccc) QuantityTolerance

A GDT QuantityTolerance 22000 is the tolerated difference between a requested and an actual quantity (e.g., a delivery quantity) as a percentage. An example is:

<QuantityTolerance>
<OverPercent>33.0</OverPercent>
<UnderPercent>1.0</UnderPercent>
</QuantityTolerance>.

The structure of GDT QuantityTolerance 22000 is depicted in FIG. 220. The GDT QuantityTolerance 22000 includes elements OverPercent 22008, OverPercentUnlimitedIndicator 22024, and UnderPercent 22040. For the GDT QuantityTolerance 22000, the Object Class is QuantityTolerance 22002, the Property is Details 22004, and the Representation/Association term is Details 22006. GDT QuantityTolerance 22000 comprises the three elements OverPercent 22008 and UnderPercent 22040 from "CCT: Numeric" and OverPercentUnlimitedIndicator from the CCT: Indicator.

For the OverPercent 22008, the specification of a value x in this field means that for an ordered quantity of Y, up to x % of Y are accepted additionally. Therefore, the specification in this field is to be understood as a percentually relative specification. The specification is made as a decimal with a total of 4 digits, including one position after the decimal point, without plus/minus sign (e.g., 15.5). A specification of 0 in OverPercent 22008 means that the ordered quantity may not be exceeded. If the OverPercent 22008 and also the OverPercentUnlimitedIndicator 22024 are not specified, this also means that the ordered quantity may not be exceeded. For example, for an ordered quantity of 50 pieces and an OverPercent 22008 entry equal to 10, up to 5 more pieces would be accepted, thus altogether a maximum quantity of 55 pieces. For the OverPercent 22008, the Category is Element 22010, the Object Class is QuantityTolerance 22012, the Property is Over 22014, the Representation/Association term is Percent 22016, the Type term is GDT 22018, and the Type Name term is GDT: Percent 22020. The Cardinality between the GDT QuantityTolerance 22000 and the OverPercent 22008 is zero or one 22022.

For the OverPercentUnlimitedIndicator 22024, making an entry in this field means that no limitations may be made regarding the degree of fulfillment upwards. The OverPercentUnlimitedIndicator 22024 applies to the upper limit. The OverPercent 22008 and the OverPercentUnlimitedIndicator 22024 cannot be specified at the same time; however, the UnderPercent 22040 and the OverPercentUnlimitedIndicator 22024 can be set simultaneously. For the OverPercentUnlimitedIndicator 22024, the Category is Element 22026, the Object Class is QuantityTolerance 22028, the Property is OverPercentUnlimited 22030, the Representation/Association term is Indicator 22032, the Type term is GDT 22034, and the Type Name term is GDT: ValueUnlimitedIndicator 22036. The Cardinality between the GDT QuantityTolerance 22000 and the OverPercentUnlimitedIndicator 22024 is zero or one 22038.

If no OverPercentUnlimitedIndicator 22024 is set, the default value may be "false." The specification is made as a Boolean entry of length 1. The following illustrative values are allowed: 1) true, meaning that any overrun is accepted; and 2) false, meaning that overruns are not accepted.

For the UnderPercent 22040, the entry of a value x in this field means that for an ordered quantity of Y, up to x % of Y less are accepted. Therefore, the specification in this field is to be understood as a percentually relative specification. The specification is made as a decimal with a total of 4 digits, including one position after the decimal point, without plus/minus sign (e.g., 15.5). A specification of 0 in UnderPercent 22040 means that the ordered quantity may not be short. If the UnderPercent 22040 is not entered, this also means that the ordered quantity may not be short. For example: For an ordered quantity of 50 pieces and an UnderPercent 22040 entry=10, up to 5 pieces less would be accepted, so altogether at least 45 pieces. Using a separate entry of OverPercent 22008 and UnderPercent 22040, it is possible, e.g., to accept too high a quantity as this could perhaps be covered by a particular stock, but to reject the delivery of too small a quantity, e.g., to avoid a production standstill. For the UnderPercent 22040, the Category is Element 22042, the Object Class is QuantityTolerance 22044, the Property is Under 22046, the Representation/Association term is Percent 22048, the Type term is GDT 22050, and the Type Name term is GDT: Percent 22052. The Cardinality between the GDT QuantityTolerance 22000 and the UnderPercent 22040 is zero or one 22054.

The fields OverPercent and OverPercentUnlimitedIndicator are mutually exclusive, i.e., entering "true" in the OverPercentUnlimitedIndicator and, at the same time, filling the OverPercent does not make sense.

The QuantityTolerance specifies (as a percentage) the difference to be/that can be tolerated between a required or requested quantity and an actual quantity (delivery quantity). The specification is made separately for an over quantity or shortfall.

See, for example, UN/EDIFACT: Segment QVR (QUANTITY VARIANCES)—Data Elements 6064 (Quantity variance value): n . . . 15 (up to 15 numeric characters), and R/3: DEC 3.1 (calculation or amount field with comma and plus/minus sign).

(dddddddd) Recurrence

A GDT Recurrence 22100 is a representation for the repeated occurrence of an event within a time period or within a timeframe. There may be four types of recurrence: 1) a number of recurrences within a time period; 2) the recurrences each take place after a determined period duration within a time period; 3) a number of recurrences within a timeframe; and 4) the recurrences each take place after a determined period duration within a timeframe.

The structure of GDT Recurrence 22100 is depicted in FIG. 221. The GDT Recurrence 22100 includes Duration 22106 and Value 22120. For GDT Recurrence 22100, the Object Class is Recurrence 22102 and the Representation/Association term is Details 22104.

A timeframe (duration) is a time without reference to a specific starting point or end point. Examples of a time frame include: "Day," "Week," or "Year." A time period (period) is a concrete time in terms of a starting point and/or an end point. Examples of a time period include: "10.1.2003 to 20.01.2003" or "40 days starting on 2.1.2004." The 4 cases listed in the definition of 22100 differ in terms of the type of basic range that the recurrences refer to (time period or timeframe), and the type in which the recurrences are specified (fixed number or specification of a period duration for which a recurrence occurs).

In summary, the Time period has a Fixed number of Case a) and a Period duration of Case b). The Timeframe has a Fixed number of Case c) and a Period duration of Case d). See the table below.

| | Fixed number | Period duration |
|---|---|---|
| Time period | Case a) | Case b) |
| Timeframe | Case c) | Case d) |

Examples of the 4 types of Recurrence 22100 are as follows:

Type 1: "4 recurrences between 1.7.2003 and 15.10.2003."

Type 2: "weekly recurrences between 12.4.2004 and 6.6.2004."

Type 3: "2 recurrences in one month," "8 recurrences in 50 days."

Type 4: "weekly recurrences in one month," "daily recurrences in 50 days."

The timeframe as "abstract" time specification should not be confused with time period as the "concrete" time specification. The number of recurrences in a timeframe is valid for each "occurrence" of this timeframe. For example, after one week, the same number of recurrences also takes place in the following week.

Since a time period is a concrete time and may not occur more than once, the number of recurrences relates to this time period. A recurrence does not have to be regular. The Recurrence 22100 covers both regular and irregular recurrences.

Below is an example (instance):

```
<Recurrence>
    <Duration>P7D</Duration>
    <Value>1</Value>
</Recurrence>
```

The structure of GDT Recurrence 22100 is depicted in FIG. 221. The GDT first supports type 3 from the types of recurrence specified in the definition. The GDT Recurrence 22100 includes Duration 22106 and Value 22120. For GDT Recurrence 22100, the Object Class is Recurrence 22102 and the Representation/Association term is Details 22104.

The Duration 22106 specifies the timeframe within which the specified number of recurrences takes place. For the Duration 22106, the Object Class is Recurrence 22108, the Property is Duration 22110, the Representation/Association term is Duration 22112, the Type term is GDT 22114, and the Type Name term is Duration 22116. The Cardinality between the GDT Recurrence 22100 and the Duration 22106 is one 22118.

The Value 22120 specifies the number of recurrences (in terms of the timeframe). For the Value 22120, the Object Class is Recurrence 22122, the Property is Value 22124, the Representation/Association term is Value 22126, the Type term is GDT 22128, the Type Name is IntegerValue 22130, and the Length is from one to three 22132. The Cardinality between the GDT Recurrence 22100 and the Value 22120 is one 22134.

The timeframe, or duration, may not be a timeframe in the sense of a validity duration.

(eeeeeeee) RegionCode

The GDT RegionCode 22200 is a coded representation of logically or physically linked geographical or political regions that have one or more attributes in common. An example is: <RegionCode>BW</RegionCode>.

The structure of GDT RegionCode 22200 is depicted in FIG. 222. The default setting of RegionCode is the list of Country Subdivision Codes according to ISO 3166-2. If the region is not available within ISO 3166-2, the code list from the relevant country or the issuing agency should be used instead. The GDT RegionCode 22200 includes attributes listID 22212, listVersionID 22230, listAgencyID 22248, listAgencySchemeID 22266, and listAgencySchemeAgencyID 22284. For the GDT RegionCode 22200, the Object Class is Region 22202, the Property is Identification 22204, the Representation/Association term is Code 22206, the Type term is CCT 22208, and the Type Name term is Code 22210.

The listID 22212 identifies a list of the codes that belong together. The listID 22212 is unique within the agency that manages this code list. For the listID 22212, the Category is Attribute 22214, the Object Class is CodeList 22216, the Property is Identification 22218, the Representation/Association term is Identifier 22220, the Type term is xsd 22222, the Type Name term is Token 22224, and the Length is from one to sixty 22226. The Cardinality between the GDT RegionCode 22200 and the listID 22212 is zero or one 22228.

The listVersionID 22230 identifies the version of a code list. For the listVersionID 22230, the Category is Attribute 22232, the Object Class is CodeList 22234, the Property is Version 22236, the Representation/Association term is Identifier 22238, the Type term is xsd 22240, the Type Name term is Token 22242, and the Length is from one to fifteen 22244. The Cardinality between the GDT RegionCode 22200 and the listVersionID 22230 is zero or one 22246.

The listAgencyID 22248 identifies the agency that manages the code list. The agencies from DE 3055 may be used as the default, but in an embodiment the roles defined in DE 3055 may not be used. For the listAgencyID 22248, the Category is Attribute 22250, the Object Class is CodeListAgency 22252, the Property is Identification 22254, the Representation/Association term is Identifier 22256, the Type term is xsd 22258, the Type Name term is Token 22260, and the Length is from one to sixty 22262. The Cardinality between the GDT RegionCode 22200 and the listAgencyID 22248 is zero or one 22264.

The listAgencySchemeID 22266 identifies the identification scheme that represents the context for agency identification. For the listAgencySchemeID 22266, the Category is Attribute 22268, the Object Class is CodeListAgency 22270, the Property is Scheme 22272, the Representation/Association term is Identifier 22274, the Type term is xsd 22276, the Type Name term is Token 22278, and the Length is from one to sixty 22280. The Cardinality between the GDT RegionCode 22200 and the listAgencySchemeID 22266 is zero or one 22282.

The listAgencySchemeAgencyID 22284 identifies the agency that manages the listAgencySchemeID. This attribute can contain values from DE 3055 (excluding roles). For the listAgencySchemeAgencyID 22284, the Category is Attribute 22286, the Object Class is CodeListAgency 22288, the Property is SchemeAgency 22290, the Representation/Association term is Identifier 22292, the Type term is xsd 22294, the Type Name term is Token 22296, and the Length is three 22298. The Cardinality between the GDT RegionCode 22200 and the listAgencySchemeAgencyID 22284 is zero or one 22201.

Examples of the RegionCode are: structure regions (e.g., Munich metropolitan area); program regions (e.g., promotion programs), settlements, administrative regions (e.g., federal states), grid squares, economic regions, and the like.

The RegionCode may be restricted to ISO 3166-2. However, to ensure that further code lists can be used, the optional attributes "listID 22212," "listVersionID 22230," "listAgency 22248," "listAgencySchemeID 22266," and "listAgencySchemeAgencyID 22284" are also included in that illustrative case. For more details, see the "SAP Core Component Types" specification document.

(ffffffff) RequiredIndicator

A GDT RequiredIndicator 22300 indicates whether something is required or not. The word "something" generally stands for specific procedures, operations or events. An example is: <SeparatorSignRequiredIndicator>true</SeparatorSignRequiredIndicator>.

The structure of GDT RequiredIndicator 22300 is depicted in FIG. 223.

The RequiredIndicator can have the following values, either 1) true, meaning that something is required; or 2) false, meaning that something is not required. (For value range, see CCT:Indicator.)

For each GDT RequiredIndicator 22300, what is required or not required is specified. This is reflected in an appropriate name prefix. For example, a SeparatorSignRequiredIndicator indicates whether a separator is required or not. The GDT RequiredIndicator 22300 can be used, e.g., to indicate whether prices always have to be specified with a thousands separator. In the context of an interface, the business significance of "what is required" may be described for the GDT RequiredIndicator 22300 in addition to its name prefix (see Integrity Conditions).

(gggggggg) RevisionQuantityTimeSeries

A GDT RevisionQuantityTimeSeries 22400 is revised time series information that consists of items that each contain a period with a start time and end time, a period-based quantity, and the reason for the changes. An example or instance is:

```
<RevisionQuantityTimeSeries>
    <Item>
        <ValidityPeriod>
        <StartDateTime>2002-04-19T15:00:00Z
        </StartDateTime>
        <EndDateTime>2002-04-19T17:00:00Z
        </EndDateTime>
        <ValidityPeriod>
        <Quantity unitCode="PC" >150</Quantity>
<AdjustmentReasonCode>Cancelled_Promotion
</AdjustmentReasonCode>
    <Item>
</RevisionQuantityTimeSeries>.
```

The structure of GDT RevisionQuantityTimeSeries 22400 is depicted in FIG. 224. The GDT RevisionQuantityTimeSeries 22400 includes elements Item 22414, Validity Period 22426, StartDateTime 22442, EndDateTime 22458, Quantity 22474, Fixed-Indicator 22490, Adjustment-ReasonCode 22407, and Note 22423. For the GDT RevisionQuantityTimeSeries 22400, Object Class Quality term is RevisionQuantity 22402, the Object Class is TimeSeries 22404, the Representation/Association term is Details 22406, the Type term is GDT 22408, and the Type Name term is TimeSeries 22410. The GDT RevisionQuantityTimeSeries 22400 may be a restricted GDT.

RevisionQuantityTimeSeriesItem 22414 is an item in a time series and can be repeated as often as required. For the Item 22414, the Category is Element 22416, the Object Class is TimeSeries 22418, the Property is Item 22420, and the Representation/Association term is Details 22422. The Cardinality between the GDT RevisionQuantityTimeSeries 22400 and the Item 22414 is from one to n 22424.

ValidityPeriod 22426 describes the validity period of the time series item. For the Validity Period 22426, the Category is Element 22428, the Object Class is TimeSeries 22430, the Property is ValidityPeriod 22432, the Representation/Association term is Details 22434, the Type term is GDT 22436, and the Type Name term is DateTimePeriod 22438. The Cardinality between the GDT RevisionQuantityTimeSeries 22400 and the Validity Period 22426 is one 22440. For the StartDateTime 22442, the Category is Element 22444, the Object Class is TimeSeries 22446, the Property is ValidityPeriodStart 22448, the Representation/Association term is DateTime 22450, the Type term is GDT 22452, and the Type Name term is DateTime 22454. The Cardinality between the GDT RevisionQuantityTimeSeries 22400 and the StartDateTime 22442 is one 22456. For the EndDateTime 22458, the Category is Element 22460, the Object Class is TimeSeries 22462, the Property is ValidityPeriodEnd 22464, the Representation/Association term is DateTime 22466, the Type term is GDT 22468, and the Type Name term is DateTime 22470. The Cardinality between the GDT RevisionQuantityTimeSeries 22400 and the EndDateTime 22458 is one 22472.

Quantity 22474 describes the quantity connected with the time series item. For the Quantity 22474, the Category is Element 22476, the Object Class is TimeSeries 22478, the Property is Quantity 22480, the Representation/Association term is Quantity 22482, the Type term is GDT 22484, and the Type Name term is Quantity 22486. The Cardinality between the CDT RevisionQuantityTimeSeries 22400 and the Quantity 22474 is one 22488.

FixedIndicator 22490 indicates whether the corresponding item is blocked for changes or not. For the Fixed-Indicator 22490, the Category is Element 22492, the Object Class is TimeSeries 22494, the Property is FixedIndicator 22496, the Representation/Association term is Indicator 22498, the Type term is CDT 22401, and the Type Name term is FixedIndicator 22403. The Cardinality between the CDT RevisionQuantityTimeSeries 22400 and the Fixed-Indicator 22490 is zero or one 22405.

AdjustmentReasonCode 22407 describes the reason for a change to the item, if there is one. For the Adjustment-ReasonCode 22407, the Category is Element 22409, the Object Class is TimeSeries 22411, the Property is AdjustmentReason 22413, the Representation/Association term is Code 22415, the Type term is CDT 22415, the Type Name term is AdjustmentReasonCode 22419. The Cardinality between the CDT RevisionQuantityTimeSeries 22400 and the Adjustment-ReasonCode 22407 is zero or one 22421.

For the Note 22423, the Category is Element 22425, the Object Class is TimeSeries 22427, the Property is Note 22429, the Representation/Association term is Note 22431, the Type term is CDT 22433, the Type Name term is Note 22435. The Cardinality between the CDT RevisionQuantityTimeSeries 22400 and the Note 22423 is zero or one 22437.

RevisionQuantityTime Series is used for the revision of a QuantityTimeSeries or of a RevisionQuantityTimeSeries itself. In an interface, the data type can have various specifications, depending on the context category used, e.g., "Sales," to describe sales quantities; "Consumption," to describe consumption quantities, and the like.

(hhhhhhhh) ScaleAxisIntervalBoundaryTypeCode

The CDT ScaleAxisIntervalBoundaryTypeCode 22500 is a coded representation of the typing of the discrete values in a scale axis as interval boundaries. An example is: <ScaleAxisIntervalBoundaryTypeCode>2</ScaleAxisIntervalBoundaryTypeCode>.

The structure of GDT Scale Axis Interval Boundary Type Code 22500 is depicted in FIG. 225. For the GDT Scale Axis Interval Boundary Type Code 22500, the Object Class is Scale Axis 22502, the Property is Interval Boundary Type Code 22504, the Representation/Association term is Code 22506, the Type term is CCT 22508, the Type Name term is Code 22510, and the Length is one 22512. The GDT Scale Axis Interval Boundary Type Code 22500 may be a restricted GDT.

An element of type GDT ScaleAxisIntervalBoundaryTypeCode 22500 can have the following illustrative values:

1) The value 1 represents the "lower boundary of an interval" from the current scale axis value to the next highest scale axis value, but excluding the next higher scale axis value; and
2) The value 2 represents the "upper boundary of an interval" to the current scale axis value from the next lowest scale axis value, but excluding the next lower scale axis value.

The scale axis values of a scale may be of the same GDT ScaleAxisIntervalBoundaryTypeCode 22500. It may be possible to arrange the scale axis values of a scale axis uniquely.

The meaning of scale axis values, determined via the ScaleAxisIntervalBoundaryTypeCode, is described as "scale axis type" in the context of pricing scales. It is used in this context in the following way. A scale axis is used to determine the "domain" of a (one-dimensional) pricing scale. In this context, the values of the scale axis are described as scale levels. The pricing scale defines a scale rate for each scale level (e.g., net price, or discount). Consequently, a pricing scale comprises the scale levels as "input values" and the scale rates defined for the levels as "output values." The "output values" of a pricing scale are accessed using the scale level(s) to determine conditions in the context of pricing, on values such as, e.g., the order quantity.

A scale level and the scale axis type jointly determine the interval to which the scale rate applies, either 1) from the current scale level up to the next higher level, but excluding the subsequent next level, or 2) up to the current scale level, from the next lowest level, but excluding the next lower level. In the first case, the pricing scale is called the "from-pricing scale," in the second case it is called the "to-pricing scale". Scales axes for pricing scales may explicitly have a minimum and maximum scale axis value.

The scale levels of a pricing scale may be defined in terms of a pricing scale base type. The scale levels for the scale base types quantity, gross value, and number are scale quantity with scale quantity unit, scale rate with scale currency, and scale quantity without unit, respectively. Scale levels are divided into the scale axis of a pricing scale (or the dimension of the pricing scale represented by it). The scale type is valid for all scale levels of a pricing scale, i.e., the different scale levels of a (one-dimensional) pricing scale are always interpreted in the same way as interval boundaries.

The scale levels of a pricing scale may imply disconnected and consuming intervals. For variations of the input value, a scale level (and therefore, the interval implied) is relevant for determining the scale amount when using scale types "lower boundary" and "upper boundary."

The following is an example of a one-dimensional pricing scale of scale type "2" or "upper boundary" with scale base type quantity.

| Scale level as "input value" | | Scale rate with currency, price unit and unit of measure as |
|---|---|---|
| Scale quantity | Scale unit | "output value" |
| 10 | Pieces | 10 €/1 piece |
| 100 | Pieces | 9 €/1 piece |

-continued

| Scale level as "input value" | | Scale rate with currency, price unit and unit of measure as |
|---|---|---|
| Scale quantity | Scale unit | "output value" |
| 1000 | Pieces | 8 €/1 piece |
| 10000 | Pieces | 8 €/1 piece |

When determining a pricing condition for an order quantity of, e.g., 150 pieces, the third scale level is used and the price (150 ST×8 €/1 pc) equal to 1200 € is determined based on the scale type "upper boundary."

The ScaleAxisIntervalBoundaryTypeCode may be a proprietary code list with fixed predefined values. Changes to the permitted values involve changes to the interface. The focus here is on one-dimensional pricing scales, even if multi-dimensional pricing scales can be used for the scale type and possess one scale type per dimension. The same concepts as for pricing conditions are used for scales for free goods and rebate conditions, i.e., the ScaleAxisIntervalBoundaryTypeCode can also be used for these scales. (See also pricing conditions and pricing scales.)

(iiiiiii) ScheduleLineCommitmentCode

The GDT ScheduleLineCommitmentCode 22600 is a coded representation that describes the planning-related meaning of the schedule line information for a purchase order, such as a delivery schedule, and thus determines the (legal) binding nature for the ordered quantity and specified delivery dates for a material/product. An example is: <ScheduleLineCommitmentCode>AE</ScheduleLineCommitmentCode>.

The structure of GDT ScheduleLineCommitmentCode 22600 is depicted in FIG. 226. For the GDT ScheduleLineCommitmentCode 22600, the Object Class is ScheduleLine 22602, the Property is Commitment 22604, the Representation/Association term is Code 22606, the Type term is CCT 22608, the Type term is Code 22610, and the Length is from one to three 22612. The GDT ScheduleLineCommitmentCode 22600 may be a restricted GDT.

The following illustrative values of the ScheduleLineCommitmentCode are in the framework of "scheduling-agreement-based release order":

1) Fixed dates and quantities, which indicates that the schedule line information regarding the specified product quantities and dates is fixed.

2) Production and material go-ahead, which authorizes the vendor to start manufacturing the required products.

3) Material go-ahead, which authorizes the vendor to order the required material for the products to be delivered.

4) Forecast/preview, which represents a non-binding forecast of future purchase orders that currently depend on planned requirements.

5) Shortfall quantity/backlog, which represents a product quantity that has already been ordered but did not arrive by the planned delivery date and therefore may be delivered subsequently.

10) Immediate requirement, which represents an immediately required product quantity that may be included immediately in the next delivery.

The ScheduleLineCommitmentCode refers to the representation UN/EDIFACT 4017: Delivery plan commitment level code. The ScheduleLineCommitmentCode is used to inform a vendor about the binding nature and the meaning of the schedule line information of a release order/forecast delivery schedule. It may be used, for example, in the automotive industry.

(jjjjjjj) ScoreCardID

A GDT ScoreCardID 22700 is the identification of a scorecard. A scorecard is a procedure for assessing a party or subject using different characteristics. An example is: <ScoreCardID>A</ScoreCardID>.

The structure of GDT ScoreCardID 22700 is depicted in FIG. 227. For the GDT ScoreCardID 22700, the Object Class is Score Card 22702, the Property is Identification 22704, the Representation/Association term is Identifier 22706, the Type term is CCT 22708, the Type Name is Identifier 22710, and the Length is from one to twenty 22712. The GDT ScoreCardID 22700 may be a restricted GDT.

The following may apply to 22700:

1) Scorecards are internal to a company and confidential; and

2) The company that specifies the scorecard assigns an ID.

ScoreCardID is unique in the context of the company that specifies the scorecard. Scorecards are used, e.g., by credit agencies to rate companies. In this case, the credit agency assigns the IDs; ScoreCardID is then unique in the context of a credit agency. Another possible use is the company internal identification of a scorecard that is created as part of the "Balanced Scorecard" concept for determining business performance.

(kkkkkkkk) SubContractingIndicator

A GDT SubContractingIndicator 22800 indicates whether the transaction form is subcontracting or not. An example is: <SubContractingIndicator>true</SubContractingIndicator>.

The structure of GDT SubContractingIndicator 22800 is depicted in FIG. 228. The GDT SubcontractingIndicator 22800 is from the core component type Indicator. For the GDT SubContracting Indicator 22800, the Object Class is Sub Contracting 22802, the Property is Indicator 22804, the Representation/Association term is 22806, the Type term is CCT 22808, and the Type Name term is Indicator 22810.

The SubContractingIndicator can have the following illustrative values, either 1) true, meaning that the transaction is subcontracting; or 2) false, meaning that the transaction is not subcontracting. "Subcontracting" is a transaction form in which the vendor receives an order to produce the final product from the delivered materials components.

(llllllll) SubHierarchyDefinitionIndicator

A GDT SubHierarchyDefinitionIndicator 22900 indicates whether something is used to establish a subhierarchy or not. The word "something" as used in this context may generally relate to specific properties or facts. An example is: <PropertySubHierarchyDefinitionIndicator>true</PropertySubHierarchyDefinitionIndicator>.

The structure of GDT SubHierarchyDefinitionIndicator 22900 is depicted in FIG. 229. For the GDT SubHierarchyDefinitionIndicator, the Property is SubHierarchyDefinition 22902, the Representation/Association term is Indicator 22904, the Type term is CCT 22906, and the Type Name term is Indicator 22908.

The GDT SubHierarchyDefinitionIndicator 22900 can have the following illustrative values, either 1) true, meaning that something is used to establish a subhierarchy; or 2) false, meaning that something is not used to establish a subhierarchy. (For value range, see CCT:Indicator.)

For each SubHierarchyDefinitionIndicator, there may be defined what is used or not used to define a subhierarchy. This may be reflected in an appropriate name prefix. For example, a PropertySubHierarchyDefinitionIndicator indicates whether a property is used to define a subhierarchy. The SubHierarchyDefinitionIndicator can be used, for example, with a training catalog to indicate which of the properties "Training Contents," "Training Location," "Training Language," and the like, are used to define a subhierarchy of the training offering.

(mmmmmmmm) SubjectAreaCode

The GDT SubjectAreaCode 23000 is a coded representation of a subject area. An example is: <SubjectAreaCode>25.040.40</SubjectAreaCode>. 25.040.40 stands for 'Industrial process measurement and control'; this classifies ISO13584/42, e.g., where the property is defined.

The structure of GDT SubjectAreaCode 23000 is depicted in FIG. 230. For GDT SubjectAreaCode 23000, the Object Class is Subject Area 23002, the Representation/Association term is Code 23004, the Type term is CCT 23006, the Type Name term is DCode 23008, and the Length is nine 23010. The GDT SubjectAreaCode 23000 is a restricted. GDT.

The possible illustrative values for the GDT SubjectAreaCode 23000 can be found in the 'International Classification for Standards' (ICS). These standards were created under the overall control of ISO. For explanations and values, see the "World Standards Service Network" at http://www.wssn.net/WSSN/RefDocs/ics2001-en.pdf. For a comprehensive alphabetical index of subject areas, go to http://www.wssn.net/WSSN/RefDocs/ics01index-en.pdf.

GDT SubjectAreaCode 23000 is used for classifying normative documents and standardized objects, and for classifying an object, e.g., a property, into subject areas (nnnnnnnn) TaxJurisdictionCode The GDT TaxJurisdictionCode 23100 is the tax jurisdiction code part of the address. This code is used in various countries and can be derived uniquely from the address. However, it may depend on the code list of the provider. A country can have multiple code-list providers. An example is: <TaxJurisdictionCode listID="VeraZip System," listVersionID="," listAgencyID="Taxware," listAgencySchemeID=","
listAgencySchemeAgencyID="">PA1914101</TaxJurisdictionCode>.

The structure of GDT TaxJurisdictionCode 23100 is depicted in FIG. 231. The GDT TaxJurisdictionCode 23100 includes attributes listID 23116, listVersionID 23136, listAgencyID 23156, listAgencySchemeID 23176, and listAgencySchemeAgencyID 23196. For the GDT TaxJurisdictionCode 23100, the Category is Element 23102, the Object Class is TaxJurisdictionCode 23104, the Property is Tax-JurisdictionCode 23106, the Representation/Association term is Code 23108, the Type term is CCT 23110, the Type Name term is Code 23112, and the Length is from one to fifteen 23114. For the listID 23116, the Category is Attribute 23118, the Object Class is CodeList 23120, the Property is Identification 23122, the Representation/Association term is Identifier 23124, the Type term is xsd 23126, the Type Name term is Token 23128, and the Length is from one to sixty 23130. The Cardinality between the GDT TaxJurisdictionCode 23100 and the listID 23116 is zero or one 23132. The listID 23116 may be optional 23134. For the listVersionID 23136, the Category is Attribute 23138, the Object Class is CodeList 23140, the Property is Version 23142, the Representation/Association term is Identifier 23144, the Type term is xsd 23146, the Type Name term is Token 23148, and the Length is from one to fifteen 23150. The Cardinality between the GDT TaxJurisdictionCode 23100 and the listVersionID 23136 is zero or one 23152. The listVersionID 23136 may be optional 23154. For the listAgencyID 23156, the Category is Attribute 23158, the Object Class is CodeListAgency 23160, the Property is Identification 23162, the Representation/Association term is Identifier 23164, the Type term is xsd 23166, the Type Name term is Token 23188, and the Length is from one to sixty 23170. The Cardinality between the GDT TaxJurisdictionCode 23100 and the listAgencyID 23156 is zero or one 23172. The listAgencyID 23156 may be optional 23174. For the listAgencySchemeID 23176, the Category is Attribute 23178, the Object Class is CodeListAgency 23180, the Property is Scheme 23182, the Representation/Association term is Identifier 23184, the Type term is xsd 23186, the Type Name term is Token 23188, and the Length is from one to sixty 23190. The Cardinality between the GDT TaxJurisdictionCode 23100 and the listAgencySchemeID 23176 is zero or one 23192. The listAgencySchemeID 23176 may be optional 23194. For the listAgencySchemeAgencyID 23196, the Category is Attribute 23198, the Object Class is CodeListAgency 23101, the Property is SchemeAgency 23103, the Representation/Association term is Identifier 23105, the Type term is xsd 23107, the Type Name term is Token 23109, and the Length is three 23111. The Cardinality between the GDT TaxJurisdictionCode 23100 and the listAgencySchemeAgencyID 23196 is zero or one 23113. The listAgencySchemeAgencyID 23196 may be optional 23115.

The GDT TaxJurisdictionCode 23100 specifies the tax jurisdiction code and has a maximum length of 15 characters. The meaning of the attributes listID, listVersionID, listAgencyID, listAgencySchemeID, and listAgencySchemeAgencyID is described in the definition of the CCT Code. For example, in the USA there are many providers of software for calculating taxes that manage TaxJurisdictionCodes. The name of one of these providers is specified in the listAgencyID attribute. The GDT TaxJurisdictionCode 23100 specifies the tax jurisdiction code for a physical address.

(oooooooo) TextSearchableIndicator

A GDT TextSearchableIndicator 23200 indicates whether or not an object is available for text search. A search is performed for a text that is contained either entirely or in part in objects indicated by the indicator. An example is: <TextSearchableIndicator>true</TextSearchableIndicator>.

The structure of GDT TextSearchIndicator 23200 is depicted in FIG. 232. For the GDT TextSearchIndicator 23200, the Property is Text Searchable 23202, the Representation/Association term is Indicator 23204, the Type term is CCT 23206, and the Type Name term is Indicator 23208.

Valid illustrative values for the 23200 are either: 1) true, meaning that the object is suitable for "text search," or 2) false, meaning that the object is not suitable for "text search."

Both parametric searches and text searches can be possible for an object and one does not preclude the other.

(pppppppp) Time

A GDT Time 23300 represents the time in a 24 hour day. An example is: <WakeUpTime>08:00:00+01:00</WakeUpTime>.

The structure of GDT Time 23300 is depicted in FIG. 233. For the GDT Time 23300, the Property is Time 23302, the Representation/Association term is DateTime 23304, the Type term is CCT 23306, and the Type Name term is Time 23308.

GDT Time 23300 uses the W3C "built-in data type" xsd:time. This is structured according to the extended representation of ISO 8601(see http://www.w3.org/TR/NOTE-datetime).

The extended representation is as follows: 1) hh:mm:ss(.sss)Z; or 2) hh:mm:ss(.sss)(+/−)hh:mm. An example for GDT Time 23300 is: 1) 15:30:00Z; or 2) 10:30:00+05:00.

The extended representation for GDT Time 21800 uses the following literals:

1) "hh" for hours, 00-23;

2) "mm" for minutes, 00-59;

3) “ss” for seconds, 00-59;
4) “.sss” where one or more characters after the decimal point represent fractions of a second, where the representation is limited to a maximum of three decimal places, i.e., it is possible to be accurate up to one hundredth of a second;
5) “:” where there may be a colon between the hours, minutes, and seconds;
6) “Z” which may be specified when the represented time is also the UTC time;
7) “+hh:mm” which may be specified when the represented time is a local time that is ahead of UTC time; and
8) “−hh:mm” which may be specified when the represented time is a local time that is behind UTC time.

The following value ranges are defined for GDT Time 21800:
1) Time, which represents exactly 24 hours (0-23);
2) Minutes, which represents exactly 60 minutes (0-59);
3) Seconds, which represents exactly 60 seconds (0-59); and
4) Time zone, which is usually expressed in UTC (Coordinated Universal Time). If GDT Time 23300 represents a local time, the time difference with respect to UTC time may be specified.

Time is used to represent a time on any day. Examples of times are wake-up times each day or the time start and end time of a period of time such as the working day or lunch hour.

The time can also be specified without the additional information (Z, +hh:mm, −hh:mm) relating to the coordinated world time (UTC time).

(qqqqqqqq) TimePeriod

A GDT TimePeriod 23400 is a period that is defined by two points in time. These points in time are expressed by a time of day. This time period is determined by a start time and an end time, a start time with a duration, or a duration with an end time. An example is:

```
<WorkingTimePeriod>
        <StartTime>08:00:00</StartTime>
        <EndTime>16:00:00</EndTime>
</WorkingTimePeriod>
```

The structure GDT TimePeriod 23400 is depicted in FIG. 234. The GDT TimePeriod 23400 includes elements StartTime 23406, EndTime 23422, and Duration 23438. For the GDT TimePeriod 23400, the Object Class is Time Period 23402 and the Property is Details 23404.

The GDT TimePeriod 23400 is an aggregation and includes the following sub-elements: 1) StartTime 23406, 2) EndTime 23422, and 3) Duration 23438.

The StartTime 23406 represents the start time in the time period according to the extended representation of ISO 8601. For the StartTime 23406, the Category is Element 23408, the Object Class is Time Period 23410, the Property is Start Time 23412, the Representation/Association term is Time 23414, the Type term is GDT 23416, and the Type Name term is Time 23418. The Cardinality between the GDT TimePeriod 23400 and the StartTime 23406 is zero or one 23420.

The EndTime 23422 represents the end time in the time period according to the extended representation of ISO 8601. For the EndTime 23422, the Category is Element 23424, the Object Class is Time Period 23426, the Property is End Time 23428, the Representation/Association term is Time 23430, the Type term is GDT 23432, and the Type Name term is Time 23434. The Cardinality between the GDT TimePeriod 23400 and the EndTime 23422 is zero or one 23436.

The Duration 23438 may represent the relative duration according to the ISO 8601 convention. The following time conventions may be used: hours (nH), minutes (nM), and seconds (n.nnnS). For the Duration 23438, the Category is Element 23440, the Object Class is Time Period 23442, the Property is Duration 23444, the Representation/Association term is Duration 23446, the Type term is GDT 23448, and the Type Name term is Duration 23450. The Cardinality between the GDT TimePeriod 23400 and the Duration 23438 is zero or one 23452. An example of Duration 23438 is as follow: <Duration>P12H10M13.3S</Duration>.

The GDT TimePeriod 23400 may contain, for example, two different times. The following illustrative combinations are possible: 1) StartTime 23406+EndTime 23422; 2) StartTime 23406+Duration 23438; and 3) EndTime 23422+Duration 23438. StartTime 23406 and EndTime 23422 cannot be more than 24 hours apart. For example, if StartTime 23406 is “18:00” and EndTime 23422 “06:00,” then the value in EndTime automatically refers to the next day.

An example of StartTime 23406 and EndTime 23422 is as follows: <StartTime>18:00:00</StartTime><EndTime>06:00:00</EndTime>.

The period of time represented by Duration 23438 can be more than 24 hours. Note that the largest value that can be specified is, for example, hours (nH). In other words, multiple days can be expressed in terms of hours.

An example of Duration 23438 is as follows: <Duration>P76H</Duration>. P76H corresponds to a duration of 3 days and 4 hours.

GDT TimePeriod 23400 can be used to express periods of time in hours, minutes, and seconds. For example, it can define the daily start time and end time for the working day or the start time and duration of a transport.

The value in GTD TimePeriod 23400 is a relative value and is not a day-related representation of a time period that is determined by a time. If the optional reference to coordinated world time (UTC time) is not specified, then the time should be either in the same time zone or implicitly interpreted in the same way by the business partner so as to avoid confusion. The term “Time” in the “Object Class” of the CDT is redundant. Therefore, it consists of the term “Period.” This is because the term “Time” is given by the “Property” of the sub-elements. As a result, the semantic of this CDT is unique.

(rrrrrrrr) TimeSeries

A GDT TimeSeries 23500 is time series information that consists of items that each contain a period with a start time and an end time, and a period-based quantity or price. An example is:

```
<TimeSeries>
    <Item>
            <ValidityPeriod>
            <StartDateTime>2002-04-19T15:00:00Z</StartDateTime>
            <EndDateTime>2002-04-19T17:00:00Z</EndDateTime>
            </ValidityPeriod>
            <Quantity unitCode="PC" >150</Quantity>
    </Item>
</TimeSeries>.
```

The structure of GTD TimeSeries 23500 is depicted in FIG. 235.

The TimeSeriesItem 23506 is an item in a time series and can be repeated as often as required.

The ValidityPeriod 23518 describes the validity period of the time series item with a start time stamp and an end time stamp.

The Quantity 23534 is of type GDT:Quantity and describes the quantity connected with the time series item.

The Price 23550 describes the price connected with the time series item.

The FixedIndicator 23566 describes whether the corresponding item is blocked for changes or not.

The AdjustmentReasonCode 23582 describes the reason for a change that has been made.

The Note 23596 is a short note for the time series item. This can be a note for the entire time series item or a note for a part of the time series item, e.g., a more detailed explanation of an AdjustmentReasonCode.

For the Integrity Conditions for 23500, a element Quantity or Price may be filled. The TimeSeries 23500 is used as a generic data type that can have various specifications in an interface depending on the context category used, e.g., "Sales," to describe sales quantities; "Consumption," to describe consumption quantities, and the like.

(ssssssss) TimeZoneDifferenceValue

A GDT TimeZoneDifferenceValue 23600 is the difference (in hours) between the local time zone and UTC (Coordinated Universal Time), which is given as a point of reference. An example is: <TimeZoneDifferenceValue>4.5</TimeZoneDifferenceValue>.

The structure of GDT TimeZoneDifferenceValue 23600 is depicted in FIG. 236. For the GDT TimeZoneDifferenceValue 23600, the Property is Time Zone Difference 23602, the Representation/Association term is Value 23604, the Type term is GDT 23606, the Type Name term is DecimalValue 23608, and the Length is two 23610. The GDT TimeZoneDifferenceValue 23600 has, for example, a maximum value of twelve and a minimum value of twelve 23612.

Since the W3C built-in data type "xsd:decimal" is used for TimeZoneDifference, the hours precede the comma and the minutes follow it. Positive values do not need to be prefixed with a positive sign (+). However, negative values may be prefixed with a negative sign (−). The minutes after the comma are expressed in hundredths of a minute. For example, the value "0.5" corresponds to 30 minutes. A facet "xsd: enumeration" is created for each valid time zone value. In this way, values in valid time zones are supported.

TimeZoneDifferenceValue is used to determine the local time zone of the relevant business partner or to determine the current time zone. Minutes are also displayed in the time difference. This is because some countries or regions are divided into half-hour or three-quarters of an hour time zones. For example, Afghanistan (4.5), northern Australia (9.5), southern Australian (10.5), India (5.5), Nepal (5.75), and the like.

(tttttttt) TotalNumberValue

A GDT TotalNumberValue 23700 is the total number of elements contained in a set. An example is: <TotalNumberValue>20</TotalNumberValue>.

The structure of GDT TotalNumberValue 23700 is depicted in FIG. 237. In an embodiment, non-negative, whole numbers smaller than one billion are permitted (0-999999999) for GDT TotalNumberValue 23700. TotalNumberValue can be used, e.g., to specify the number of objects contained in a list. The structure of GDT TotalNumberValue 23700 is depicted in FIG. 237. For the GDT TotalNumberValue 23700, the Representation/Association Quality term is Total Number 23702, the Representation/Association term is Value 23704, the Type term is xsd 23706, the Type Name term is nonNegativeInteger 23708, and the Length is from one to nine 23710.

(uuuuuuuu) TransmissionID

A GDT TransmissionID 23800 is a unique identifier for a transmission. Transmission is the transfer of information that belongs together by a sequence of (sub) messages. The sequence can comprise a single message. An example is: <TransmissionID>4/7_CatalogXYZ</TransmissionID>.

The structure of GDT TransmissionID 23800 is depicted in FIG. 238.

GDT TransmissionID 23800 is a string with a maximum of forty characters. The following illustrative values are permitted: 1) Upper case letters from A to Z (without German umlauts); 2) Digits from 0 to 9; 3) – (minus sign); 4) (underscore); 5) / (forward slash); 6) (back slash); and 7) . (period). It may be ensured that the sender and receiver use the same GDT TransmissionID 23800 once in the communication. The structure of GDT TransmissionID 23800 is depicted in FIG. 238. For the GDT TransmissionID 23800, the Object Class is Transmission 23802, the Property is Identification 23804, the Representation/Association term is Identifier 23806, the Type term is CCT 23808, the Type Name term is Identifier 23810, and the Length is from one to forty 23812. The GDT TransmissionID 23800 may be a restricted GDT.

GDT TransmissionID 22300 is used to transfer objects that can be divided up and sent in multiple messages due to their large size. GDT TransmissionID can be used in such cases in the following illustrative messages: 1) In the (sub) messages, which actually transmit the object, to identify uniquely a sequence of (sub) messages that belong together; 2) In messages that confirm the receipt and processing of individual (sub) messages; 3) In messages that confirm the receipt and processing of the complete sequence of (sub) messages and therefore of the complete object; and 4) In messages that display the cancellation of the transmission.

(vvvvvvvv) TransportMeans

A GDT TransportMeans 23900 is the description of a means of transport and can also include information for a more detailed identification. An example is:

```
<TransportMeans>
        <ID>HD - ES 1234</ID>
        <DescriptionCode>31</DescriptionCode>
</TransportMeans>.
```

The structure of GDT TransportMeans 23900 is depicted in FIG. 239. GDT TransportMeans 23900 is composed of the two sub-elements TransportMeansID 23908 and TransportMeansDescriptionCode 23928 from the Global Data Type TransportMeansDescriptionCode 23928. The GDT TransportMeans 23900 includes elements ID 23908 and DescriptionCode 23928. For the GDT TransportMeans 23900, the Object Class is Transport-Means 23902, the Property is Details 23904, and the Representation/Association term is Details 23906.

The TransportMeansID 23908 is used to identify the means of transport. The TransportMeansID 23908 can be, e.g., a license number for a truck or the identification number of a container. For the ID 23908, the Category is Element 23910, the Object Class is Transport-Means 23912, the Property is Identification 23914, the Representation/Association term is Identifier 23916, the Type term is CCT 23918, the Type Name term is Identifier 23920, and the Length is from one to twenty 23922. The Cardinality between the GDT TransportMeans 23900 and the ID 23908 is zero or one 23924. The ID 23908 may be restricted.

The TransportMeansDescriptionCode 23928 is a coded representation of the transport means description (see also GDT:TransportMeansDescriptionCode). For the DescriptionCode 23928, the Category is Element 23930, the Object Class is Transport-Means 23932, the Property is Description 23934, the Representation/Association term is Code 23936, the Type term is GDT 23938, and the Type Name term is TransportMeansDescriptionCode 23940. The Cardinality between the GDT TransportMeans 23900 and the DescriptionCode 23928 is one 23942.

The TransportMeansID 23908 can have a maximum of 20 characters, taking into account the restrictions defined in the xsd:token. The TransportMeansID 23908 refers to the transport means description specified using the TransportMeansDescriptionCode 23928. For the Integrity Conditions for TransportMeansDescriptionCode 23928, see its documentation.

The GDT:TransportMeans 23900 is used within the shipping notification to provide a goods recipient the description and exact identification of the means of transport with which the goods are delivered. The TransportMeansID 23908 corresponds to the "Means of transport ID" (TRAID) used in the R/3 in the IDOC DELVRY03. The TransportMeansDescriptionCode 23928 corresponds with the "Means of Transport Type" (TRATY) used in the R/3 in the IDOC DELVRY03.

(wwwwwwww) TransportMeansDescriptionCode

The GDT TransportMeansDescriptionCode 24000 is a coded representation of the transport means type with which goods or persons are to be transported (e.g., road tanker, barge, airplane, or refrigerated road tanker.) An example is:

```
<TransportMeansDescriptionCode>
    1
<TransportMeansDescriptionCode>.
```

Transportation per barge with equipment for loading and transportation of liquid chemicals.

The structure of GDT TransportMeansDescriptionCode 24000 is depicted in FIG. 240. The GDT TransportMeansDescriptionCode 24000 is of the CoreComponentType "Code." For the GDT TransportMeansDescriptionCode 24000, the Object Class is TransportMeans 24002, the Property is Description 24004, the Representation/Association term is Code 24006, the Type term is CCT 24008, the Type Name term is Code 24010, and the Length is from one to four 24012. The GDT TransportMeansDescriptionCode 24000 may be a restricted GDT.

According to the UN/EDIFACT: Data Element 8179 is the "Transport means description code" allowing up to 8 alphanumeric characters. The Code Values for the 24000 (as copied from UN/EDIFACT) are as follows:

1) 1 Barge chemical tanker—

A barge equipped to transport liquid chemicals;

2) 2 Coaster chemical tanker—

A coaster vessel equipped to transport liquid chemicals;

3) 3 Dry bulk carrier—

Vessel designed to carry dry bulk (expellers);

4) 4 Deep sea chemical tanker—

An ocean-going vessel equipped to transport liquid chemicals;

5) 5 Gas tanker—

A vessel equipped to transport gas;

6) 6 Aircraft—

A machine capable of flight;

7) 7 Car with caravan—

A caravan towed by a car;

8) 8 Container ship—

Vessel capable of carrying containers and other cargo;

9) 9 Exceptional transport—

Transport for which common characteristics are not applicable (e.g. big transformers requiring special wagons, special tackles, special routing and the like.);

10) 10 Bus—

To specify that the means of transportation is a bus;

11) 11 Ship—

A large vessel navigating deep water;

12) 12 Ship tanker—

A large vessel equipped to transport liquids;

13) 13 Ocean vessel—

An ocean-going vessel that is not a ship;

14) 14 Flatbed trailer—

A means of transport identification code indicating a flatbed trailer; Note:

1. This code value will be removed effective with directory D.02B;

15) 15 Taxi—

A means of transport identification code indicating a taxi;

16) 16 Barge—

A category of boat used to transport material over water;

17) 17 Customer determined means of transport—

The type of means of transport is to be determined by the customer;

18) 18 Seller determined means of transport—

The type of means of transport is to be determined by the seller;

19) 19 Tip-up truck—

A truck capable of tipping up in order to deliver its load;

20) 20 Furniture truck—

A truck used explicitly for the conveyance of furniture;

21) 21 Rail tanker—

A rail wagon equipped to transport liquids;

22) 22 Rail silo tanker—

Self explanatory;

Note:

1. This code value will be removed effective with directory D.04B;

23) 23 Rail bulk car—

A rail wagon equipped to transport bulk cargo;

24) 24 Customer rail tanker—

A customer-owned rail wagon equipped to transport liquids;

25) 25 Rail express—

Description to be provided;

Note:

1. This code value will be removed effective with directory D.04B;

26) 26 Tip-up articulated truck—

An articulated truck capable of tipping up in order to deliver its load;

27) 27 Rigid truck with tank—

A rigid truck fitted with a tank capable of carrying liquids or bulk goods;

28) 28 Refrigerated truck and trailer—

A combined truck and trailer equipped to maintain refrigerated temperatures;

29) 29 Freezer truck and trailer—

A combined truck and trailer equipped to maintain freezing temperatures;

30) 30 Tautliner 25 ton, combined with 90 cubic meter trailer with removable roof—

A truck with non-ridged sides, 25 ton capacity combined with a 90 cubic meter trailer with removable roof;

31) 31 Truck—

An automotive vehicle for hauling goods;

32) 32 Road tanker—

An over-the-road tank trucker or trailer;

33) 33 Road silo tanker—

Description to be provided;

Note:

1. This code value will be removed effective with directory D.04B;

34) 34 Tautliner truck—

A truck with non-ridged sides;

35) 35 Truck/trailer with tilt—

A truck and trailer combination with a tilting capability;

36) 36 Pipeline—

A line of pipes for conveying water, gas, oil, and the like.;

37) 37 Hydrant cart—

Vehicle used at large airports with installed distribution systems to make into-plane deliveries of fuel; distinguished from other types of fuelling vehicles;

38) 38 Car—

Car;

39) 39 Tautliner truck with removable roof—

A truck with non-ridged sides and removable roof;

40) 40 Truck with opening floor—

A truck with an opening floor mechanism which is used to discharge the cargo;

41) 41 Freezer truck—

A truck equipped to maintain freezing temperatures;

42) 42 Isothermic truck—

A truck equipped to maintain controlled temperatures;

43) 43 Refrigerated truck—

A truck equipped to maintain refrigerated temperatures;

44) 44 Freezer van—

A small rigid covered vehicle for conveying frozen goods;

45) 45 Isothermic van—

A small rigid covered vehicle for conveying temperature controlled goods;

46) 46 Refrigerated van—

A small rigid covered vehicle for conveying refrigerated goods;

47) 47 Bulk truck—

A truck suitable for transporting bulk goods;

48) 48 Van—

A small vehicle suitable for carrying small volume loads;

49) 49 Roadrailer—

Used for shipments that travel by multimodal rail or highway trailer (roadrailer);

50) 50 Passenger vessel—

Vessel for carrying passengers;

51) 51 Cargo and passenger vessel—

Vessel for carrying cargo and passengers;

52) 52 General cargo vessel—

Vessel for carrying general cargo;

53) 53 Crude oil tanker—

Vessel for carrying crude oil;

54) 54 Liquefied Petroleum Gas (LPG) carrier—

Vessel for carrying Liquefied Petroleum Gas (LPG);

55) 55 Liquefied Natural Gas (LNG) carrier—

Vessel for carrying Liquefied Natural Gas (LNG);

56) 56 Grain carrier—

Vessel for carrying grain;

57) 57 Timber or log carrier—

Vessel for carrying timber or logs;

58) 58 Wood chip carrier—

Vessel for carrying wood chips;

59) 59 Steel products vessel—

Vessel for carrying steel products;

60) 60 Gravel vessel—

Vessel for carrying gravel;

61) 61 Cement vessel—

Vessel for carrying cement in bulk;

62) 62 Coal vessel—

Vessel for carrying coal;

63) 63 Ore carrier—

Vessel for carrying ore in bulk;

64) 64 Car carrier—

Vessel for carrying complete cars and/or their knock-down parts;

65) 65 Container only vessel—

Vessel for carrying containers only;

66) 66 Roll on-roll off vessel—

A vessel capable of carrying roll on-roll off cargo;

67) 67 Ferry—

A means of transport for carrying passengers and/or vehicles on a regular basis;

68) 68 Fishing vessel—

Vessel used in the catching of fish;

69) 69 Work vessel;

A vessel engaged in "port and harbor work," which means construction, improvement, maintenance or rehabilitation of port and harbor facilities. Dredger, floating crane, sand carrier with grab bucket are included in this type of the means of transport.

70) 70 Patrol vessel—

A vessel to patrol port or coastal area;

71) 71 Tug and/or push boat—

A vessel to push and/or pull other vessels;

72) 72 Train with one wagon—

A train with a single wagon used to carry goods;

73) 73 Train with more than one and less than 20 wagons—

A train with more than one and less than 20 wagons used to carry goods;

74) 74 Train with 20 or more wagons—

A train with 20 or more wagons used to carry goods;

75) 75 Oil products tanker—

A vessel for carrying products derived from crude oil;

76) 76 Training vessel—

A vessel for learning maritime skills;

77) 77 Freezer truck and isothermic trailer—

A combined freezer truck and isothermic trailer;

78) 78 Isothermic truck and isothermic trailer—

A truck and a trailer equipped to maintain controlled temperatures;

79) 79 Refrigerated truck and isothermic trailer—

A combined refrigerated truck and isothermic trailer;

80) 80 Freezer truck and refrigerated trailer—

A combined freezer truck and refrigerated trailer;

81) 81 Isothermic truck and refrigerated trailer—

A combined isothermic truck and refrigerated trailer;

82) 82 Rigid truck with tank and tank trailer—

A combined rigid truck with tank and tank trailer;

83) 83 Bulk truck and tank trailer—

A combined truck capable of carrying liquids or bulk goods and a tank trailer;

84) 84 Rigid truck with tank and bulk trailer—

A combined rigid truck with tank and a trailer capable of carrying liquids or bulk goods;

85) 85 Bulk truck and bulk trailer—

A combined truck and a trailer both capable of carrying liquids or bulk goods;

86) 86 Tautliner truck and extendable trailer—

A combined tautliner truck and extendable trailer;

87) 87 Tautliner truck with removable roof and extendable trailer—

A combined tautliner truck with removable roof and extendable trailer;

88) 88 Truck with opening floor and extendable trailer—

A combined truck with opening floor and extendable trailer;

89) 89 Bulk truck and extendable trailer—

A combined truck capable of carrying liquids or bulk goods and an extendable trailer;

90) 90 Isothermic truck and freezer trailer—

A combined isothermic truck and freezer trailer;

91) 91 Refrigerated truck and freezer trailer—

A combined refrigerated truck and freezer trailer;

92) 92 Tip-up truck and gondola trailer—

A combined tip-up truck and gondola trailer. A gondola trailer is a split level trailer suitable for the transport of heavy machinery;

93) 93 Tautliner truck and gondola trailer—

A combined tautliner truck and gondola trailer. A gondola trailer is a split level trailer suitable for the transport of heavy machinery;

94) 94 Tautliner truck with removable roof and gondola trailer—

A combined tautliner truck with removable roof and gondola trailer. A gondola trailer is a split level trailer suitable for the transport of heavy machinery;

95) 95 Truck with opening floor and gondola trailer—

A combined truck with opening floor and gondola trailer. A gondola trailer is a split level trailer suitable for the transport of heavy machinery;

96) 96 Bulk truck and gondola trailer—

A combined truck capable of carrying liquids or bulk goods and a gondola trailer. A gondola trailer is a split level trailer suitable for the transport of heavy machinery;

97) 97 Tip-up truck and extendable gondola trailer—

A combined tip-up truck with extendable gondola trailer. An extendable gondola trailer is a trailer fitted with a rear axle which can be extended to cater for variable length and is suitable for the transport of heavy machinery;

98) 98 Tautliner truck and extendable gondola trailer—

A combined tautliner truck and extendable gondola trailer. An extendable gondola trailer is a trailer fitted with a rear axle that can be extended to cater for variable length and is suitable for the transport of heavy machinery;

99) 99 Tautliner truck with removable roof and extendable gondolatrailer—

A combined tautliner truck with removable roof and extendable gondola trailer. An extendable gondola trailer is a trailer fitted with a rear axle that can be extended to cater for variable length and is suitable for the transport of heavy machinery;

100) 100 Truck with opening floor and extendable gondola trailer—

A combined truck with opening floor and extendable gondola trailer. An extendable gondola trailer is a trailer fitted with a rear axle that can be extended to cater for variable length and is suitable for the transport of heavy machinery;

101) 101 Bulk truck and extendable gondola trailer—

A combined truck capable of carrying liquids or bulk goods and a extendable gondola trailer. An extendable gondola trailer is a trailer fitted with a rear axle that can be extended to cater for variable length and is suitable for the transport of heavy machinery;

102) 102 Tip-up truck and trailer with opening floor—

A combined tip-up truck and trailer with opening floor;

103) 103 Tautliner truck and trailer with opening floor—

A combined tautliner truck and trailer with opening floor;

104) 104 Tautliner truck with removable roof and trailer with opening floor—

A combined tautliner truck with removable roof and trailer with opening floor;

105) 105 Truck and trailer with opening floor—

A combined truck and a trailer with an opening floor;

106) 106 Bulk truck and trailer with opening floor—

A combined truck capable of carrying liquids or bulk goods and a trailer with opening floor;

107) 107 Removal truck and trailer—

A combined truck and trailer capable of carrying household effects;

108) 108 Tautliner truck and removal trailer—

A combined tautliner truck and trailer capable of carrying household effects;

109) 109 Tautliner truck with removable roof and removal trailer—

A combined tautliner truck with a removable roof and a trailer capable of carrying household effects; and 110) 110 Vessel, temperature controlled cargo—

A vessel to carry temperature controlled cargo.

The TransportMeansDescriptionCode is used to determine concrete means of transportation. (See R/3: Means-of-Transport Type: CHAR 4).

(xxxxxxxx) TransportModeCode

The GDT TransportModeCode 24100 is a coded representation of the mode of transportation used for delivery. An example is:

```
<TransportModeCode>
1
<\TransportModeCode>
```

Conveyance Per Transportation by Sea

The structure of GDT TransportModeCode 24100 is depicted in FIG. 241. For the GDT TransportModeCode 24100, the Object Class is Transport Mode 24102, the Property is Code 24104, the Representation/Association term is Code 24106, the Type term is CCT 24108, the Type Name term is Code 24110, and the Length is from one to two 24112. The GDT TransportModeCode 24100 may be a restricted GDT.

See UN/EDIFACT: Data Element 8067 ("Transport mode name code"): an . . . 3 (up to 3 alpha-numeric characters), Code values as UN/EDIFACT Recommendation 19 ("Code for Modes of Transport").

This code list can be represented in a 2-character field. Therefore, the field is defined here as a 2-character field using the corresponding R/3 applications to avoid mapping problems.

The GDT TranportModeCode 24100 can contain codes that are included in the following code list.

| | |
|---|---|
| 0 | Transport mode not specified<br>Transport mode has not been specified<br>Notes:<br>1) This code can be used when the mode is not known or when information on it is not available at the time of issuing the document concerned. |
| 1 | Maritime transport<br>Transport of goods and/or persons is by sea. |
| 2 | Rail transport<br>Transport of goods and/or persons is by rail. |
| 3 | Road transport<br>Transport of goods and/or persons is by sea. |
| 4 | Air transport<br>Transport of goods and/or persons is by air. |
| 5 | Mail<br>Method to convey goods is by mail<br>Notes:<br>1) This code is provided for practical reasons, despite the fact that mail is not a genuine mode of transport. In many countries, the value of merchandise exported and imported by mail is considerable, but the exporter or importer concerned would be unable to state by which mode postal items had been conveyed. |
| 6 | Multimodal transport<br>Method to convey goods and/or persons is by multimodal transport.<br>Notes:<br>1) This code is provided for practical reasons, despite the fact that multimodal transport is not a genuine mode of transport. It can be used when goods are carried by at least two different modes from a place at which the goods are taken in charge by a transport operator to a place designated for delivery, on the basis of one transport contract. (Operations of pick-up and delivery of goods carried out in the performance of a single mode of transport, as defined in such a contract, shall not be considered as multimodal transport). |
| 7 | Fixed transport installation<br>Transport of item is via a fixed transport installation.<br>Notes:<br>1) This code applies to installations for continuous transport such as pipelines, ropeways and electric power lines. |
| 8 | Inland water transport<br>Transport of goods and/or persons is by inland water. |
| 9 | Transport mode not applicable<br>The mode of transport is not applicable. |

With the specification of the TransportMode, other conditions are usually linked in the general business conditions that are implicitly agreed upon/defined by specifying a TransportMode (e.g., price, time during which delivery can be made, or any service agent. The TransportModeCode acts for the executing partner/vendor as a criterion for grouping deliveries into transports and for route determination in R/3, for example. Furthermore, it is the basis for determining concrete transportation routes, means of transport, and responsible organization units (e.g., materials planning point). The TransportMode "MaritimeTransport" implies a sea route and the necessity of customs/port procedures, for example. These specifications may also be required for contractual reasons. In many countries, they are required for customs clearance and statistical purposes.

The 24100 illustratively corresponds to R/3: Shipping Type: CHAR 2. The GDT TranportModeCode 24100 is included in the ordered service. It may not define any concrete route or means of transportation.

(yyyyyyyy) TransportServiceLevelCode

The GDT TransportServiceLevelCode 24200 is a coded representation of the agreed/defined services in terms of the delivery of goods with respect to the speed of the delivery (as part of the ordered service). An example or instance is:

<TransportServiceLevelCode>01<TransportServiceLevel Code>.

Customer wants express transportation and accepts the associated increased cost of transport. Delivery made in 24 hours by the latest."

The structure of GDT TransportServiceLevelCode 24200 is depicted in FIG. 242. For the GDT TransportServiceLevelCode 24200, the Object Class is Transport 24202, the Property is ServiceLevelCode 24204, the Representation/Association term is Code 24206, the Type term is CCT 24208, the Type Name term is Code 24210, and the Length is from one to two 24212. The GDT TransportServiceLevelCode 24200 may be a restricted GDT. (Comment: Length 2 using the analogous field in R/3)

The GDT TransportServiceLevelCode 24200 is represented by a 2-character string and can include codes from the following code list:. (UN/EDIFACT: Data Element 4219 ("Transport service priority code"): an . . . 3 (up to 3 alphanumeric characters) BUT). This code list can be represented in a 2-character field. Therefore, the field is defined here as a 2-character field in accordance with the corresponding R/3 applications to avoid mapping problems. The code list includes the following codes:

1) 1-Express which is for express treatment (if by rail, legal express regime for parcels transport).
2) 2-High speed which is for transport under legal international rail convention (CIM) concluded between rail organizations and based on fast routing and specified timetables.
3) 3-Normal speed which is for Transport under legal international rail convention (CIM) concluded between rail organizations.
4) 4-Post service which is for Transport under conditions specified by UPU (Universal Postal Union) and Rail organizations (parcels transport only).

With the specification of the GDT TranportServiceLevelCode 24200, other conditions may be linked in the general business conditions that are implicitly agreed on/defined by specifying a TransporServiceLevel (e.g., price, guaranteed time during which delivery may be made, any agent, entitlements in case of non-compliance).

The buyer and seller/service agent use the GDT TransportServiceLevelCode 24200 to agree on the modalities to be used for delivery and the buyer accepts the corresponding conditions.

Using this specification, the seller can determine (depending on the business process) the internal shipping point to be used for this delivery, which service agent is to be used under what conditions, and the like.

In the framework of this agreement, the service agent/seller guarantees the customer a maximum period (e.g., 24 hours) within which delivery is to be made, and the like. If these conditions are breached, liability claims against the seller may arise.

In R/3, a TransportServiceLevelCode is assigned either to a sales document type or to a sold-to party.

Depending on the specified TransportServiceLevelCode (along with loading group and plant), a suitable shipping point can be determined that is responsible for the corresponding process.

Along with the country and the geographic zone of the shipping point, the ship-to party and the transportation group, a suitable route can be determined. (The same applies to deliveries—the geography of the seller and the goods receiving point determines the transportation group and shipping conditions.)

The 24200 may correspond to R/3: Shipping Condition: CHAR 2. The difference between PriorityCode and TransportServiceLevelCode is that when using the PriorityCode an urgency, from the buyer's perspective, is assigned to an object (e.g., an item) in terms of delivery, e.g., from which a ServiceLevel may be derived within the business process at the seller. When specifying a TransportServiceLevel, a business agreement with the partner occurs. For example, when the buyer gives his seller a priority. Seller agrees on a Service Level with his transportation service provider according to buyer's priority.

(zzzzzzzz) TransportTracking

A GDT TransportTracking 24300 contains transport-related information that can be used for tracking deliveries, e.g., in the framework of goods deliveries. An example or instance is:

```
<TransportTracking>
<ID>4711</ID>
    <WebAddress>http://www.mayerexpressdienst.com/
TrackingHomePage.htm</Web Address>
  </TransportTracking>.
```

The structure of GDT TransportTracking 24300 is depicted in FIG. 243. The GDT TransportTracking 24300 includes elements ID 24308 and WebAddress 24326. For the GDT TransportTracking 24300, the Object Class is TransportTracking 24302, the Property is Details 24304, and the Representation/Association term is Details 24306.

The GDT TransportTrackingID 24308 is a unique identifier of a shipment, for example, a package or a container. For the ID 24308, the Category is Element 24310, the Object Class is TransportTracking 24312, the Property is Identification 24314, the Representation/Association term is Identifier 24316, the Type term is CCT 24318, the Type Name term is Identifier 24320, and the Length is from one to thirty-five 24322. The Cardinality between the GDT TransportTracking 24300 and the ID 24308 is one 24323. The ID 24308 may be restricted 24324. The TransportTrackingWebAddress 24326 specifies an address in the World Wide Web that can be used to track delivery with the TransportTrackingID. For the WebAddress 24326, the Category is Element 24328, the Object Class is TransportTracking 24330, the Property is WebAddress 24332, the Representation/Association term is ElectronicAddress 24334, the Type term is GDT 24336, and the Type Name term is WebAddress 24338. The Cardinality between the GDT TransportTracking 24300 and the WebAddress 24326 is zero or one 24340.

If a courier, express, and package service provider is responsible for the goods delivery, it may determine the format of the TransportTrackingID. The TransportTrackingWebAddress includes, e.g., the homepage of the supplier of the delivery tracking service.

The TransportTrackingID can have a maximum of 35 characters, taking into account the restrictions defined in the xsd:token. The TransportTrackingID is unique in connection with the business partner providing the delivery tracking service. The identification of the business partner is carried out as context information in the message. It can also take place using the TransportTrackingWebAddress.

The TransportTrackingWebAddress can include every URI (see also the definition of GDT:WebAddress) and can have a maximum 255-character string.

The GDT TransportTracking is used in the framework of the shipping notification to provide a goods recipient an identification and an Internet address for the online delivery tracking of the current delivered goods. The TransportTrackingID corresponds to the Tracking Number (TRACKN) used in the R/3 in the IDOC DELVRY03. The TransportTrackingWebAddress may correspond to the "URL for Forwarding Agent" (XSIURL_MULTI_TRACK) used in the R/3 in the IDOC DELVRY03.

(aaaaaaaaa) TupleLengthValue

A GDT TupleLengthValue 24400 is the number of entries in a tuple. A tuple is a linear set with a fixed number of elements. The elements of a tuple are also referred to as entries and can be of different types. An example is: <TupleLengthValue>7</TupleLengthValue>.

The structure of GDT TupleLengthValue 24400 is depicted in FIG. 244. For the GDT TupleLengthValue 24400, the Represenation/Association Quality term is Tuple Length 24402, the Representation/Association term is Value 24404, the Type term is xsd 24406, the Type Name term is nonNegativeInteger 24408, and the Length is from one to two 24410.

The GDT TupleLengthValue 24400 is a qualified basic GDT based on the secondary Representation/Association Value of the CCT Numeric and a restriction of xsd:decimal. In an embodiment, non-negative whole numbers less than one hundred are permitted. The tuple length indicates whether a tuple is a pair (length=2), triple (length=3), quadruple (length=4), quintuple (length=5), and the like. Tuple lengths greater than 3 are usually referred to as 4-tuples, 5-tuples, and so on (or generally as n-tuples). A list differs from a tuple in that its length is flexible. An array is different from a tuple in that its elements can be indexed and in that it can have a higher dimension (2-dimensional arrays, 3-dimensional arrays, and the like). Furthermore, the entries in a list and the elements in an array are usually of the same type. A vector is a special instance of a one-dimensional array that is subject to additional mathematical rules (such as, e.g., vector addition).

(bbbbbbbbb) UnplannedItemPermissionCode

The GDT UnplannedItemPermissionCode 24500 is a coded representation of the permission to enter additional, unplanned items in a business follow-up document. An example is: <UnplannedItemPermissionCode>01</UnplannedItemPermissionCode>.

The structure of GDT Unplanned Item Permission Code 24500 is depicted in FIG. 245. For the GDT Unplanned Item Permission Code 24500, the Object Class is Unplanned Item 24502, the Property is Permission Code 24504, the Representation/Association term is Code 24506, the Type term is CCT 24508, the Type Name term is Code 24510, and the Length is two 24512. The GDT Unplanned Item Permission Code 24500 may be a restricted GDT.

UnplannedItemPermissionCode can have the following illustrative values: 1) "01" which means NotAllowed. In follow-up documents, unplanned items are not allowed to refer to an item indicated in this way. 2) "02" which means WithContractReferenceOnly. In follow-up documents, unplanned items with a contract reference are allowed to refer to an item indicated in this way. 3) "03" which means Allowed. In follow-up documents, unplanned items are allowed to refer to an item indicated in this way.

The GDT UnplannedItemPermissionCode 24500 is used to show business partners whether or not they are allowed to enter additional items for an item in a document in a subsequent process. For example, in a purchase order, the buyer informs the seller whether or not it can specify additional unplanned items for a purchase order item in the invoice. This is useful if the requirements are unknown at the time of ordering. This can be the case for repairs, where the spare parts required are not known until the repair has been made. The GDT UnplannedItemPermissionCode 24500 may be a proprietary code list with fixed predefined values. Changes to the permitted values may involve changes to the interface.

(cccccccc) ValueDifferenceIndicator

A GDT ValueDifferenceIndicator 24600 indicates whether or not a value-related difference exists. An example is: <ValueDifferenceIndicator>true</ValueDifferenceIndicator>.

The structure of GDT ValueDifferenceIndicator 24600 is depicted in FIG. 246. For the GDT ValueDifferenceIndicator 24600, the Property is ValueDifference 24602, the Representation/Association term is Indicator 24604, the Type term is CCT 24606, and the Type Name term is Indicator 246808.

The GDT ValueDifferenceIndicator 24600 can have the following illustrative values: 1) true, which means the difference is value-related; or 2) false, which means the difference is not value-related. (See CCT:Indicator for value range).

Each ValueDifferenceIndicator may refer to a business object or to a list of similar business objects. This relationship is reflected in a corresponding refinement of the "value" name prefix. This name prefix is omitted when actually used in tag names. For example, an AmountDifferenceIndicator is the specification of whether there is a value-related difference for a money amount. Other possible forms are QuantityDifferenceIndicator, MeasureDifferenceIndicator, and PriceDifferenceIndicator.

The ValueDifferenceIndicator can be used to display whether the current value is specified for a business variable or the difference to an earlier value. Another possible use is the specification of whether it is an actual or a target value or the difference between the two. In the context of an interface, the business meaning of the values for the ValueDifferenceIndicator may be described in addition to the name prefix (see Integrity Conditions) being specified.

(dddddddd) ValueUnlimitedIndicator

A GDT ValueUnlimitedIndicator 24700 indicates whether a value is unlimited or not. An example is: <ValueUnlimitedIndicator>true</ValueUnlimitedIndicator>.

The structure of GDT Value Unlimited Indicator 24700 is depicted in FIG. 247. For the GDT Value Unlimited Indicator 24700, the Object Class is Value 24702, the Property is Unlimited Indicator 24704, the Representation/Association term is Indicator 24706, the Type term is CCT 24708, and the Type Name term is Indicator 24710.

The ValueUnlimitedIndicator can have the following illustrative values: 1) true, which means a value is unlimited; or 2) false, which means a value is not unlimited. (See CCT Indicator for value range).

The default for a ValueUnlimitedIndicator may be 'false' so that when ValueUnlimitedIndicator is not present it is equal to a ValueUnlimitedIndicator with the value 'false'. If a ValueUnlimitedIndicator has the value 'true', then the corresponding numerical element may be nonexistent, empty or initial. A ValueUnlimitedIndicator is used with reference to a numerical element if this element can have values that are unlimited in size. The reference to a particular element may be apparent when using ValueUnlimitedIndicator. The relationship to a numerical element is reflected in a corresponding refinement of the "value" name prefix. This name prefix is omitted when actually used in tag names. A good example of the use of the ValueUnlimitedIndicator is the QuantityTolerance GDT. The ValueUnlimitedIndicator is used in this GDT to display any size tolerance.

(eeeeeeee) VersionID

A GDT VersionID 24800 is a unique identifier for a version. A version is a differentiation of objects of an object type in accordance with the sequence in which they were created. An example is: <VersionID>1.1.5</VersionID>.

The structure of GDT VersionID 24800 is depicted in FIG. 248. For the GDT VersionID 24800, the Category is Element 24802, the Object Class is Version 24804, the Property is Identification 24806, the Representation/Association term is Identifier 24808, the Type term is CCT 24810, the Type Name term is Identifier 24812, and the Length is from one to thirty-two 24814. The GDT VersionID 24800 may be a restricted GDT.

Versions can be differentiated using the criteria before-after. They are sorted "in turn." A version can be referenced directly externally by specifying the object and its GDT VersionID 23300. It has the following characteristics: 1) It describes different characteristics of an object for external users; 2) It represents a significant change compared to other versions from a user perspective; 3) It is independent and self-contained, i.e., changes to one version do not affect other versions; 4) Versions can be developed further in parallel; and 5) The format of the version is up to the application in which the object is located. Examples are X.Y.Z or a time stamp. A variant is the differentiation of objects of an object type at the same point in time.

(ffffffff) VisibleIndicator

A GDT VisibleIndicator 24900 indicates whether something is visible or not. The word "something" generally stands for specific characters, documents, properties, or facts. An example is: <PropertyVisibleIndicator>true</PropertyVisibleIndicator>.

The structure of GDT VisibleIndicator 24900 is depicted in FIG. 249. For the GDT VisibleIndicator 24900, the Property is Visible 24902, the Representation/Association term is Indicator 24904, the Type term is CCT 24906, and the Type Name term is Indicator 24908.

The GDT VisibleIndicator 24900 can have the following values: 1) true, which means something is visible; or 2) false, which means something is not visible. (For value range, see CCT:Indicator)

For each GDT VisibleIndicator 24900, there may be specified what is visible or not visible. This is reflected in an appropriate name prefix. For example, a PropertyVisibleIndicator indicates whether a property is visible or not. The GDT VisibleIndicator 24900 can be used, e.g., to indicate whether certain properties of a product are to be visible to a customer. In the context of an interface, the business significance of "what is visible" may be described in greater detail for the GDT VisibleIndicator 24900 in addition to its name prefix (see Integrity Conditions).

(ggggggggg) WebAddress

A GDT WebAddress 25000 is a unique digital address for a document that is available on the World Wide Web. The document contains information required by the user and is based on hypertext technology. An example is:

```
<WebAddress>
        http://www.sap.com/GlobalDataTypes.htm
</WebAddress>
```

The structure of GDT Web Address 25000 is depicted in FIG. 250. The GDT Web Address 25000 includes attribute language Code 25016. For the GDT Web Address 25000, the Object Class is WebAddress 25002, the Property is Address 25004, the Representation/Association term is Electronic Address 13506, the Type term is CCT 25008, the Type Name term is Electronic Address 25010, and the Length is from one to two-hundred fifty-five 25012.

The syntax of the built-in data type "xsd:anyURI" is defined in the IETF RFC 2396 recommendation. For more details, see the "SAP Core Component Types" specification document.

The following URI schemes can be used from the list of available URI schemes (see also Uniform Resource Identifier (URI) Schemes):

| Scheme Name | Description | Reference |
|---|---|---|
| ftp | File Transfer Protocol | [IETF RFC 1738] |
| http | Hypertext Transfer Protocol | [IETF RFC 2616] |
| Gopher | The Gopher Protocol | [IETF RFC 1738] |
| News | USENET news | [IETF RFC 1738] |
| nntp | USENET news using NNTP access | [IETF RFC 1738] |
| wais | Wide Area Information Servers | [IETF RFC 1738] |
| File | Host-specific file names | [IETF RFC 1738] |
| prospero | Prospero Directory Service | [IETF RFC 1738] |
| Service | service location | [IETF RFC 2609] |
| Nfs | network file system protocol | [IETF RFC 2224] |
| https | Hypertext Transfer Protocol Secure | [IETF RFC 2818] |

The following attribute can be used for the GDT WebAddress 25000:

languageCode, which defines the language of the hypertext contents in accordance with the RFC 3066 recommendation. The language code can also be included if a translation service is to be automatically triggered at the receiver. For the language Code 25016, the Category is Attribute 25018, the Object Class is WebAddress 25020, the Property is Language Code 25022, the Representation/Association term is code 25024, the Type term is xsd 25026, the Type Name term is Language 25028, and the Length is from two to nine 25030. The Cardinality between the GDT Web Address 25000 and the language Code 25016 is zero or one 25032.

GDT WebAddress 25000 may be used for linking to further information for the user. For example, the information might be detailed, hypertext-based information about a product, organization, or company. In an embodiment, the hypertext documents linked to by means of WebAddress may not be used for further process-dependent processing.

(hhhhhhhhh) WorkAgreementID

A GDT WorkAgreementID 25100 is a unique ID for a work agreement. A work agreement is an agreement between an employee and an employer. The employee agrees to perform work and the employer agrees to provide remuneration for the work performed. A work agreement comprises numerous other obligations, in addition to the main obligation (remuneration for work), e.g., obligations in terms of loyalty, reporting, and benefits. Examples of work agreements include employment contracts, placement contracts, traineeships, and training contracts. An example is: <WorkAgreementID>1234567890123456</WorkAgreementID>.

The structure of GDT WorkAgreementID 25100 is depicted in FIG. 251.

The schemeID indicates the scheme according to which the identifier was assigned. Currently, the following illustrative schemes are supported: 1) WorkAgreementGUID, which identifies the work agreement using a Global Unique Identifier, and 2) WorkAgreementID, which identifies the work agreement using an internal identifier of the schemeAgency.

The schemeAgencyID specifies the business system in which the ID was assigned. If the "WorkAgreementGUID" is used for the schemeID, the WorkAgreementID may comprise one to forty places. If the WorkAgreementID is used, the WorkAgreementID may comprise 1 to 16 places and may be alphanumeric.

If the schemeID or schemeAgencyID have not been specified, it may be possible to determine them from the context. The WorkAgreementID may be used in the same way as the personnel number in the R/3 System.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

A list of entities that are contained in the illustrative business object model, along with a description of each of these entities, is provided below. The entities that do not have a corresponding global data type may be derived from the global data type of a related entity. For example AddressCommunication and AddressOffice are defined within and can be derived from the Address global data type. This is easily discernable from the global data type previously described.

| Entity | Definition | Global Data Type |
|---|---|---|
| Accounting Cancellation | ACCOUNTINGCANCELLATION is the complete cancellation of posting information previously sent to Accounting. | |

-continued

| Entity | Definition | Global Data Type |
|---|---|---|
| Address | ADDRESS contains structured information about the types of addresses. This information includes details about addressees, the postal address, and the physical location and communication connections. | Address |
| Address Communication | ADDRESSCOMMUNICATION contains details about the ways of contacting a person or organization. | |
| AddressGeo Coordinates | ADDRESSGEOCOORDINATES contain the geographical data, in other words longitude and latitude specified as per the WGS84 reference system, which enables you to determine a position on the globe. | GeoCoordinates |
| AddressOffice | ADDRESSOFFICE contains details that describe the working environment of a contact person as well as details for addressing or identifying this person within the organization. | |
| AddressPerson Name | ADDRESSPERSONNAME contains the parts of a legal person's name. | PersonName |
| Address Physical Address | ADDRESSPHYSICALADDRESS contains the postal address data of a physical location. | |
| Attachment | An ATTACHMENT is a document of arbitrary type that is assigned to an interface object as an attachment. | Attachment |
| BTD Accounting ObjectSet | BTDAccountingObjectSet is a set of different account assignment objects. An account assignment object is a business object to which changes in value from business transactions are assigned in accounting. | AccountingObject Set |
| BTD Attachment | An ATTACHMENT is a document of arbitrary type that is assigned to a BUSINESSTRANSACTIONDOCUMENT or a BTDITEM as an appendix. | Attachment |
| BTD AttachmentWeb Address | A BTDInternalAttachmentWebAddress is a Web address for a document of any type that is assigned to a BUSINESSTRANSACTIONDOCUMENT or a BTDITEM as an attachment. | AttachmentWeb Address |
| BTDBidder Party | A BTDBidderParty is a party that bids for goods or services. | Business Transaction DocumentParty |
| BTDBidder PortalProvider Party | A BTDBidderPortalProviderParty is a party that runs a portal that brings business partners together for a business transaction. | BTDParty |
| BTDBillFrom Party | A BTDBillFromParty is the company or person executing the invoicing process for a product or service. | Business Transaction DocumentParty |
| BTDBillTo Party | A BTDBillToParty is the company or person to which/whom the invoice is to be sent for deliveries received or services provided. | Business Transaction DocumentParty |
| BTDBuyerParty | A BTDBuyerParty is the company or person authorizing the deliveries or services. | Business Transaction DocumentParty |
| BTDBuyer Product Catalogue Reference | A BTDBuyerProductCatalogueReference is a reference to a product catalog of a buyer or to an item within such a catalog. | Catalogue Reference |
| BTDCarrier Party | A BTDCarrierParty is the company or person that transports the goods. | Business Transaction DocumentParty |
| BTDCash DiscountTerms | BTDCASHDISCOUNTTERMS are payment conditions for goods and services. | CashDiscount Terms |
| BTDCash DiscountTerms Maximum Discount | BTDCashDiscountTermsMaximumDiscount is the maximum cash discount in the context of payment conditions that is granted during a sales transaction when payment takes place within a certain number of days after the baseline date for payment has passed. | CashDiscount |
| BTDCash DiscountTerms Normal Discount | BTDCashDiscountTermsNormalDiscount is the usual cash discount in the context of payment conditions that is granted during a sales transaction. | CashDiscount |
| BTDCatalogue ProviderParty | A BTDCATALOGUEPROVIDERPARTY is a party that compiles a catalogue. | Business Transaction DocumentParty |
| BTD Confirmation Description | BTDConfirmationDescription is a text in natural language which is visible for parties and is related to a confirmation. | Description |
| BTDConfirmed Price | A BTDCONFIRMEDPRICE is a price which has been confirmed. | |
| BTDContract Release AuthorisedParty | The BTDContractReleaseAuthorisedParty is a party that is authorized to effect releases from a purchasing contract. | BTDParty |

-continued

| Entity | Definition | Global Data Type |
|---|---|---|
| BTDCreation Log | BTDCreationLog is a sequence of log messages about the creation of a BusinessTransactionDocument. | |
| BTDCreation LogItem | BTDCreationLogItem is a log message about the creation of a BusinessTransactionDocument. | LogItem |
| BTDCredit AgencyReport Scoring | A BTDCreditAgencyReportScoring is the result of the rating of a party with regard to their creditworthiness using a scorecard specified by a credit agency. A scorecard is a schema for rating a party using different characteristics. | CreditAgency ReportScoring |
| BTDCredit Limit | BTDCREDITLIMIT is the credit limit valid for a business partner for a specific period of validity. | |
| BTDCreditor Party | A BTDCreditorParty is a party that, due to an obligation, is authorized to claim goods, services or payment. | Business Transaction DocumentParty |
| BTDCredit Rating | BTDCREDITRATING is the score determined by a credit agency or a credit management for a party for a specific period of validity. | |
| BTDCreditRisk Class | BTDCREDITRISKCLASS is the risk class of a party determined by a credit agency or a credit management for a party for a specific period of validity. | |
| BTDDebtor Party | A BTDDebtorParty is a party that, due to an obligation, is obliged to provide goods, services or payment. | Business Transaction DocumentParty |
| BTDDelivery Control | The BTDDeliveryControl is the set of internal controlling delivery parameters for one or more requested deliveries in a delivery process. | |
| BTDDelivery Reference | A BTDDeliveryReference is a reference to a delivery (delivery note ID) or to an item within a delivery. | Business Transaction Document Reference |
| BTDDelivery Terms | The BTDDeliveryTerms are the conditions and agreements that are to be valid for executing the delivery and transporting the ordered goods and for the necessary services and activities. | DeliveryTerms |
| BTDDelivery Terms Description | A BTDDeliveryTermsDescription is a text in natural language for specification of legible additional information for delivery terms. | Description |
| BTDDelivery TermsIncoterms | BTDDeliveryTermsIncoterms are commercial contract formulae for the delivery conditions that correspond with the rules compiled by the International Chamber of Commerce (ICC). | Incoterms |
| BTDDelivery TermsPartial Delivery | BTDDeliveryTermsPartialDelivery is the maximum number of partial deliveries that may/can be carried out to deliver the ordered quantity of an item. | PartialDelivery |
| BTDDelivery TermsQuantity Tolerance | BTDDeliveryTermsQuantityTolerance is the tolerated difference between a requested and an actual quantity (for example, a delivery quantity) as a percentage. | Quantity Tolerance |
| BTDDelivery TermsTransport | BTDDeliveryTermsTransport provides information for the transport of goods. This includes, for example, speed of delivery, the way of doing the transport, the transportation mode, and the transport category. | |
| BTD Description | BTDConfirmationDescription is a text in natural language which is visible for parties. | Description |
| BTD Despatched Delivery Notification Reference | A BTDDespatchedDeliveryNotificationReference is the reference to a shipping notification. | Business Transaction Document Reference |
| BTDFollowUp BillingDue Notification | The BTDFollowUpBillingDueNotification is information about whether an invoice is to be created during the subsequent process and whether the delivery data is required for invoice creation. | |
| BTDFollowUp Despatched Delivery Notification | The BTDFollowUpDespatchedDeliveryNotification is information about how and if the buyer would like to be informed by the seller of a delivery and specifies if an advanced shipping notification (ASN) is expected or is to be sent. | |
| BTDFollowUp InvoiceRequest | BTDFollowUpInvoiceRequest is information about whether the buyer expects to receive an invoice from the seller. | |
| BTDFollowUp InvoicingDue Notification | The BTDFollowUpInvoicingDueNotification is information about whether an invoice is expected during the subsequent process and if the delivery data is required for invoice verification. | |
| BTDFollowUp Purchase Contract | A BTDFollowUpPurchaseContract is information about whether the buyer expects a purchase contract as the result of the request for quotation process. | |

-continued

| Entity | Definition | Global Data Type |
|---|---|---|
| BTDFollowUp PurchaseOrder | A BTDFollowUpPurchaseOrder is information about whether the buyer expects a purchase order as a result of the request for quotation process. | |
| BTDFollowUp PurchaseOrder Confirmation | BTDFollowUpPurchaseOrderConfirmation is information about whether and in what form the buyer expects to receive confirmation of the purchase order from the seller. | |
| BTDFollowUp Purchasing Contract | A BTDFollowUpPurchasingContract is information about whether the buyer expects a purchase contract as the result of the request for quotation process. | |
| BTDFollowUp SalesOrder Fulfillment Confirmation | A BTDFollowUpSalesOrderFulfillmentConfirmation is information about whether the seller expects a confirmation of a SalesOrderFulfiliment from the procurement planning component. | |
| BTDFollowUp Service Acknowledge-mentReguest | BTDFollowUpServiceAcknowledgementRequest is information about whether the buyer wants to be informed by the seller of any services provided. | |
| BTDHandling Unit | BTDHandlingUnit is a physical unit of packaging materials (load carrier, additional packaging materials) and the packaged products (of type "Material"). | HandlingUnit |
| BTDIBatch | BTDIBatch is a batch with its properties. A batch is a non-reproducible, homogeneous subset of a product. The subset's chracteristics lie within the batch characteristics defined for the product. | Batch |
| BTDI Consignment Inventory | BTDConsignmentInventory is the consignment store stock of a product; in other words, the part of the stock that remains the property of the vendor until it is procured (and paid for). | |
| BTDIInventory | BTDInventory is the warehouse stock of a product. | |
| BTDInbound Delivery Reference | BTDDeliveryReference is the reference to an incoming delivery or one of its items. | Business Transaction Document Reference |
| BTDIntemal AttachmentWeb Address | A BTDInternalAttachmentWebAddress is a Web address for a document of any type that is assigned to a BUSINESSTRANSACTIONDOCUMENT or a BTDITEM as an attachment. It is not visible for parties. | AttachmentWeb Address |
| BTDInternal Description | A BTDINTERNALDESCRIPTION is a text in natural language which is not visible for external parties. It is intended for internal use only. | Description |
| BTDInvoice Reference | A BTDInvoiceReference is the reference to the invoice of the invoicing party. | Business Transaction Document Reference |
| BTDI Preferential Statement | A BTDIPreferentialStatement is the legally binding statement of vendors on goods they have delivered, which allows the buyer to claim customs tariff preferences for these goods. | |
| BTDI Preferential Statement NonPreferential Product Constituent | A NonPreferentialProductConstituent is a specification on parts or precursor materials of a product for which no customs tariff preferences can be claimed. | |
| BTDIPrevious Release | A BTDIPreviousRelease is a statement about the identification and validity of the last release instance previously transferred in a delivery schedule. | |
| BTDIPromotion | A BTDIPromotion is a marketing activity between the consumer goods industry and retail over a limited time frame to increase brand capital, name recognition, and market share, to boost sales volumes, or to position new products or product groups. | |
| BTDIRelease | A BTDIRelease is a statement about the identification and validity of a release instance transferred in a delivery schedule item. | |
| BTDItem | BTDITEM is an Item of a BusinessTransactionDocument. In general it describes a product or subject of business activities. Quantities and/or dates are specified by means of the BTDItemScheduleLine. | |
| BTDItem Confirmed ScheduleLine | A BusinessTransactionDocumentItemScheduleLine is a confirmed subdivision of items of a business transaction document according to dates and the product quantity associated with each date. | PurchaseOrder ItemScheduleLine SalesOrder FulfillmentItem ScheduleLine |

-continued

| Entity | Definition | Global Data Type |
|---|---|---|
| BTDItem Hierarchy Relationship | BTDHierarchyRelationship is the relationship between a subitem and a higher-level parent item in an item hierarchy. | |
| BTDItem ScheduleLine | A BusinessTransactionDocumentItemScheduleLine is a subdivision of items of a business transaction document according to dates and the product quantity associated with each date. | PurchaseOrder ItemScheduleLine SalesOrder FulfillmentItem ScheduleLine |
| BTDItem ScheduleLine DeliveryPeriod | The BTDItemScheduleLineDeliveryPeriod is the date or the period for the delivery of goods or the provision of services. | DateTimePeriod |
| BTDLegal Document Attachment | A LegalDocumentAttachment is an attachment that contains the legal text of a business transaction document. | Attachment |
| BTDLegal Event | A BTDLEGALEVENT is a legal transaction or a legal event. | |
| BTDLoan Amortizement Condition | A BTDLoanAmortizementCondition is a repayment condition for a loan. It regulates the conditions to which a loan is to be repaid. | Loan Amortizement Condition |
| BTDLoaniFee Condition | A BTDLoanFeeCondition is the fee condition for a loan. | LoanFee Condition |
| BTDLoan Interest Condition | A BTDLoanInterestCondition is a condition for calculating the interest on a loan. | LoanInterest Condition |
| BTDLoan PaymentPlan | A BTDLoanPaymentPlan contains the planned payments for a loan. | |
| BTDLoan PaymentPlan Item | A BTDLoanPaymentPlanItem is a payment planned for a key date for a loan. | LoanPaymentPlan Item |
| BTDLocation | A BusinessTransactionDocumentLocation contains the information that is exchanged in business documents about a location relevant for business transactions. These specifications contain the identification of the location and its address. The identification may be a company-internal ID, a standardized ID, or one or several partner-specific IDs. A location is a logical or a physical place. | Business Transaction Document Location |
| BTDLocation Address | A BTDLocationAddress assigns an address to a BTDLocation. | |
| BTD Manufacturer Party | A ManufacturerParty is a party that manufactures goods. | Business Transaction DocumentParty |
| BTDNet PurchasePrice | The BTDNetPurchasePrice refers to the net purchase price specified by the requester or the buyer (relating to the quantity ordered) for the product or service. This price forms the basis for order optimizing in the planning system. | Price |
| BTD Operational Purchasing Contract Reference | The BTDOperationalPurchasingContractReference is the reference to an operational purchasing contract or to an item within an operational purchasing contract. | Business Transaction Document Reference |
| BTDOrigin Invoice Reference | A BTDOriginInvoiceReference is a reference to an origin invoice. | Business Transaction Document Reference |
| BTDOrigin PrimaNota Reference | BTDOriginPrimaNotaReference is the reference to the origin document of the sender on which posting information previously sent to Accounting - and now to be cancelled - is based. | Business Transaction Document Reference |
| BTDOrigin PurchaseOrder Reference | A BTDOriginPurchaseOrderReference is a reference an origin purchase order or to an item within an origin purchase order. | to Business Transaction Document Reference |
| BTDOrigin VendorInvoice Reference | A BTDOriginVendorInvoiceReference is the reference to an origin vendor invoice. | Business Transaction Document Reference |
| BTDOwner Party | An BTDOwnerParty is a party that has tangible or intangible commodity as property. | Business Transaction DocumentParty |
| BTDParty | A BusinessTransactionDocumentParty contains the information that is exchanged - in accordance with common business understanding a in business documents about a party involved in business transactions. This information is used to identify the party and the | Business Transaction DocumentParty |

-continued

| Entity | Definition | Global Data Type |
|---|---|---|
| | party's address, as well as the party's contact person and the contact person's address. This identification can take place using an internal ID, a standardized ID, or IDs assigned by the involved parties. | |
| BTDParty Address | A BTDPartyAddress assigns an address to a BTDParty. | Address |
| BTDParty ContactPerson | A BTDPARTYCONTACTPERSON is a contact person of a party. A ContactPerson is a natural person who acts as a contact person during the processing of business processes. The ContactPerson includes details of the ContactPerson's identification as well as the ContactPerson's address. Identification can take place using an internal ID and using ID's assigned by the involved parties. | Business Transaction DocumentParty |
| BTDParty ContactPerson Address | A BTDPartyContactPersonAddress assigns an address to a BTDPartyContactPerson. | |
| BTDPayeeParty | A BTDPayeeParty is a party that receives a payment for goods or services. | Business Transaction DocumentParty |
| BTDPayerParty | A BTDPayerParty is a party that pays for goods or services. | Business Transaction DocumentParty |
| BTDPayment Form | A BTDPAYMENTFORM is the way in which, for example, goods or services are paid for. | |
| BTDPayment FormPayment Card | A BTDPAYMENTFORMPAYMENTCARD is an identification card suited for a certain payment form. It authorizes the holder to settle invoices without cash with contract companies connected to the payment system. | PaymentCard |
| BTDPending Delivery Reference | PendingDeliveryReference is the reference to an item in a delivery that is to be executed or is expected. | Business Transaction Document Reference |
| BTDPortal ProviderParty | A BTDPortalProviderParty is a party that runs a portal that brings business partners together for a business transaction. | Business Transaction DocumentParty |
| BTDPrice | A BTDPrice is a remuneration for a product, which is valid for a base quantity, for a certain period and ship-to location, and which can be scaled according to quantity. | |
| BTDPrice Component | A BTDPriceComponent is a non-fiscal part of a price that was calculated for the quantity of a product. | PriceComponent |
| BTDPriceScale | A BTDPriceScale is a set of price scale lines arranged linearly in accordance with a scale (axis) base type. | |
| BTDPriceScale Line | A PriceScaleLine is the price of a product depending on the quantity. | |
| BTDPrice Specification Element | A BTDPriceSpecificationElement is the definition of a price, a discount or a surcharge that is dependent on a combination of properties and that is valid for a certain period of time. | PriceSpecification Element |
| BTDPrimaNota Reference | BTDPrimaNotaReference is the reference to the document of the sender which represents the cancellation request to Accounting. | Business Transaction Document Reference |
| BTD Procurement CostUpperLimit | A ProcurementCostUpperLimit is a cost upper limit for different types of procurement costs. | ProcurementCost UpperLimit |
| BTDProduct | A BusinessTransactionDocumentProduct contains the information that is exchanged - in accordance with common business understanding - in business documents about a product. These are the details for identifying a product, product type as well as the description of the product. This identification can take place using an internal ID, a standardized ID, or IDs assigned by the involved parties. | Business Transaction DocumentProduct |
| BTDProduct Category | A BusinessTransactionDocumentProductCategory contains the information that is exchanged - in accordance with common business understanding - in business documents about a product category. It includes details for identifying the product category using an internal ID, a standard ID along with IDs assigned by involved parties. | Business Transaction DocumentProduct Category |
| BTDProduct RecipientParty | A BTDProductRecipientParty is a party to which goods are delivered or services are provided. | Business Transaction DocumentParty |

-continued

| Entity | Definition | Global Data Type |
|---|---|---|
| BTDProduct Tax | A BTDProductTax is a tax that is incurred when products are purchased, sold, or consumed. | ProductTax |
| BTDProposed SellerParty | A ProposedSellerParty is a preferred party for selling goods or services. | BTDParty |
| BTDPurchase Order Reference | A BTDPurchaseOrderReference is a reference to a purchase order or item in a purchase order. | Business Transaction Document Reference |
| BTDPurchasing Contract Reference | A BTDPurchasingContractReference is a reference to a purchase contract or item in a purchase contract. | Business Transaction Document Reference |
| BTDQuote Reference | A BTDQUOTEREFERENCE is a reference to a quotation or item in a quotation. | Business Transaction Document Reference |
| BTDRequest ForQuotation Reference | A BTDRequestForQuotationReference is a reference to a request for quotation or item in a request for quotation. | Business Transaction Document Reference |
| BTDRequestor Party | A BTDRequestorParty is a party that requests the procurement of goods or services. | Business Transaction DocumentParty |
| BTDSales Contract Reference | A BTDSALESCONTRACTREFERENCE is a reference to a sales contract or item in a sales contract. | Business Transaction Document Reference |
| BTDSalesOrder Reference | A BTDSalesOrderReference is a reference to a sales order or item of a sales order. | Business Transaction Document Reference |
| BTDScheduling | A BTDSCHEDULING groups together time intervals in order to define a schedule, for example, for ordering, delivering, or picking up products. | |
| BTDScheduling Agreement Reference Reference | A BTDSchedulingAgreementReference is a reference to a scheduling agreement or item in a scheduling agreement. | Business Transaction Document |
| BTDSellerParty | A BTDSELLERPARTY is a party that sells goods or services. | Business Transaction DocumentParty |
| BTDSeller Product Catalogue Reference | A BTDSellerProductCatalogueReference is a reference to a seller product catalogue or item in a seller product catalogue. | Catalogue Reference |
| BTDService Acknowledge-mentReference | A BTDServiceAcknowledgementReference is a reference to a service acknowledgement or item in a service acknowledgement. | Business Transaction Document Reference |
| BTDShipFrom Location | A BTDShipFromLocation contains the information that is exchanged in business documents about a location relevant for business transactions, and from where goods or services are shipped. These specifications contain the identification of the location, its address and, if necessary, a different loading location. The identification may be a company-internal ID, a standardized ID, or one or several partner-specific IDs. | Business Transaction DocumentShip FromLocation |
| BTDShipment Reference | A BTDShipmentReference is a reference to a shipment or item in a shipment. | Business Transaction Document Reference |
| BTDShipTo Location | A BTDShipToLocation contains the information that is exchanged in business documents about a location relevant for business transactions, and to which goods or services are shipped. These specifications contain the identification of the location, its address and, if necessary, a different unloading location. The identification may be a company-internal ID, a standardized ID, or one or several partner-specific IDs. | Business Transaction DocumentShipTo Location |
| BTDTax AuthorityParty | A TaxAuthorityParty is a party that collects and manages taxes. | TaxAuthority Party |
| BTDTax OperatorParty | A BTDTaxOperatorParty is a party that processes tax affairs for a BTDTaxPayerParty. | BTDParty |
| BTDTaxPayer Party | A BTDTaxPayerParty is a party that is liable to tax. | BTDParty |

-continued

| Entity | Definition | Global Data Type |
|---|---|---|
| BTDTransport Means | BTDTransportMeans is the description of a means of transport and also can include information for a more detailed identification. | TransportMeans |
| BTDTransport Tracking | BTDTransportTracking contains transport-related information that can be used for tracking deliveries, for example, in goods deliveries. | Transport Tracking |
| BTD Transshipment Location | A BusinessTransactionDocumentTransshipment Location contains the information that is exchanged in business documents about a relevant location for business transactions where goods are transshipped (unloaded and reloaded). This information identifies the location, its address, a loading location, and an unloading location. The identification may be a company-internal ID, a standardized ID, or one or more partner-specific IDs. | BTD Transshipment Location |
| BTD Validation Log | A BTDValidationLog is a series of log messages from the tax authority that is has received and validated a tax return for tax on sales/purchases. | |
| BTD Validation LogItem | A ValidationLogItem is a log message on the receipt and validation of a tax return for tax on sales/purchases. | LogItem |
| BTD Vendor Party | A BTD VendorParty is a party which delivers goods or provides services. | Business Transaction DocumentParty |
| BTD Vendor Product Category | A BTDVendorProductCategory is a company-specific or vendor-specific schedule line for a vendor's entire range of products (vendor subrange). The VendorProductCategory provides the vendor view. | Business Transaction Document ProductCategory |
| BusinessPartner | A BusinessPartner is a person, an organization, or a group of persons in which a company has a business interest. | |
| Business Transaction Document | A BUSINESSTRANSACTIONDOCUMENT is a document that occurs or is created in the context of a business transaction. It represents for a point in time information about<br>- Planning<br>- Execution / fulfillment<br>- Negotiations or agreements<br>- Flows of values or goods<br>regarding the involved parties and products, or subjects of a business activity.<br>This can be planned information, targeted information, or actual information.<br>The BUSINESSTRANSACTIONDOCUMENT contains the structures required for business transactions. In general, the basic structure of a BUSINESSTRANSACTIONDOCUMENT is subdivided into items, which in turn are subdivided into schedule lines according to dates and the product quantity associated with each date. | |
| BuyerProduct Catalogue | A BUYERPRODUCTCATALOGUE is a product catalogue of a buyer. | |
| Catalogue | A Catalogue is a structured directory of Catalogue items. Each item represents an object, and provides information about it. The Catalogue consists of global-model- and content information. The global information provides information relevant to the entire Catalogue. The model information defines the structure of the Catalogue content and the properties used to describe this content. Content information contains the items of the Catalogue and their structural assignment within the Catalogue structure. It also can be the confirmation whether the publication of a Catalogue or the deletion of an already published Catalogue was successful or not. | |
| Catalogue Content | A CatalogueContent specifies the list of business objects included in the catalogue, together with their relationships and descriptions according to the catalogue's schemas, and the views that are used to restrict the catalogue's information content for certain purposes. The Catalogue content specifies the items contained in the Catalogue and their classification (that is, their assignment to Catalogue sections). The items can be arranged by defining relationships with a specific semantics between them. Specific (usage- | CatalogueContent |

-continued

| Entity | Definition | Global Data Type |
|---|---|---|
| | dependent) Catalogue views can be defined for a Catalogue. Such a view specifies a subset of the Catalogue structure andior the Catalogue content. | |
| Catalogue Content CatalogueItem | A CatalogueContentCatalogueItem specifies information about an object included and to be classified within the Catalogue, and in a way according to the Catalogue's schema. A CatalogueContentCatalogueItem can contain one or more Descriptions which describe the item. The item can be classified by one or more Classifications. Furthermore, it can contain one or more Property Valuations valid for this item. | CatalogueItem |
| Catalogue Content CatalogueItem Classification | A CatalogueContentCatalogueItemClassification classifies an item by assigning it to a Section within one of the Catalogue's schemas which the item belongs to. | CatalogueItem Classification |
| Catalogue Content CatalogueItem Description | A CatalogueContentCatalogueItemDescription provides a description for an item in a locale (language). | Description |
| Catalogue Content CatalogueItem Property Valuation | A CatalogueContentCatalogueItemPropertyValuation specifies the value of a property that can be attributed to the object the item represents, according to one of the Catalogue schemas. | Property Valuation |
| Catalogue Content CatalogueItem Relationship | A CatalogueContentCatalogueItemRelationship specifies a relationship with certain semantics between any two Catalogue items. | CatalogueItem Relationship |
| Catalogue Content CatalogueView | A CatalogueContentCatalogueView defines a restricted subset of a Catalogue by specifying schemas, sections, Catalogue items and item relationship types to be included and properties to be excluded. A CatalogueContentCatalogueView can contain one or more CatalogueViewSchemas, CatalogueViewItems and CatalogueViewItemRelationshipTypes which specify schemas, items and item relationship types included in the view. In addition, a CatalogueContentCatalogueView can contain one or more CatalogueViewExcludedProperty which specify properties not included in the view. | CatalogueView |
| Catalogue Content CatalogueView Excluded Property | A CatalogueContentCatalogueViewExcludedProperty specifies a property that is not included in the Catalogue view. | CatalogueView ExcludedProperty |
| Catalogue Content Catalogue View Item | A CatalogueContentCatalogueViewItem specifies a Catalogue item to be included in the Catalogue view. | CatalogueView Item |
| Catalogue Content Catalogue View ItemRelation-shipType | A CatalogueContentCatalogueViewItemRelationship Type specifies a Catalogue item relationship type. All Catalogue item relationships of this type are to be included in the Catalogue view. | CatalogueView ItemRelationship Type |
| Catalogue Content CatalogueView Schema | A CatalogueContentCatalogueViewSchema specifies a schema and a list of sections belonging to the schema that are to be included in a Catalogue view. A CatalogueContentCatalogueViewSchema is subdivided into one or more CatalogueViewSchemaSections which specify Sections included in the view. | CatalogueView Schema |
| Catalogue Content CatalogueView SchemaSection | A CatalogueContentCatalogueViewSchemaSection specifies a Section of the referenced Catalogue schema to be included in the Catalogue view. | CatalogueView SchemaSection |
| Catalogue Model | A CatalogueModel describes and structures the catalogue content using systems of categories to group catalogue items and properties that can be attributed to the catalogue items or the categories themselves (or both). The CatalogueModel is the infonnation concerning how the catalogue content is structured and defined. The CatalogueModel defines properties, their (technical) data types and allowed values, which are used to describe Catalogue sections and/or the items contained in the Catalogue. Additionally the CatalogueModel specifies one or more schemas, which define the structural composition of the Catalogue | CatalogueModel |

-continued

| Entity | Definition | Global Data Type |
|---|---|---|
| | content by means of sections and relationships between these sections. The Sections of a schema are a dividing up of Catalogue items and they specify properties which are used to describe the items assigned to the section. Schemas are defined for a specific purpose. Therefore, multiple schemas for one Catalogue can exist. | |
| Catalogue Model CatalogueItem Property | A CatalogueModelCatalogueItemProperty specifies a property pertaining to each catalogue item together with its position in the full list of properties attributed to a catalogue item. | |
| Catalogue Model Catalogue Schema | A CatalogueModelCatalogueSchema defines a structural composition of the Catalogue content regarding a certain purpose. A CatalogueModelCatalogueSchema can contain one or more ItemProperty for the description of catalogue items of this schema. In addition, a Schema is subdivided into one or more Sections and SectionRelationships which define its structure. | CatalogueSchema |
| Catalogue Model Catalogue Schema CatalogueItem Property | A CatalogueModelCatalogueSchemaCatalogueItem Property specifies a property pertaining to a Catalogue item together with its position in the full list of properties attributed to a Catalogue item. | Property |
| Catalogue Model Catalogue Schema Catalogue Section | A CatalogueModelCatalogueSchemaCatalogueSection is a dividing up of Catalogue items according to the schema. A section specifies properties which can be used to describe such Items. A CatalogueModelCatalogueSchemaSection can contain one ore more Property Valuations which describe the section. In addition it can contain one or more ItemProperty for the description of catalogue items of this section. | |
| Catalogue Model Catalogue Schema Catalogue Section CatalogueItem Property | A CatalogueModelCatalogueSchemaSectionItem Property specifies a property pertaining to the Catalogue items (objects) belonging to the Section, together with the property's position in the full list of properties attributed to a Catalogue item. | Property |
| Catalogue Model Catalogue Schema Catalogue SectionProperty Valuation | A CatalogueModelCatalogueSchemaCatalogueSection Property Valuation contains the value of a property that can be attributed to or is used to describe the Section according to its Section type. | Property Valuation |
| Catalogue Model Catalogue Schema Catalogue Section Relationship | A CatalogueModelCatalogueSchemaCatalogueSection Relationship specifies a connection between two catalogue sections within a Catalogue schema. | |
| Catalogue Model Catalogue SectionType | A CatalogueModelCatalogueSectionType describes the nature of Catalogue sections by defining properties for the description of sections of this type. A CatalogueModelCatalogueSectionType can contain one or more SectionProperty for the description of sections of this type. | CatalogueSection Type |
| Catalogue Model Catalogue SectionType SectionProperty | A CatalogueModelCatalogueSectionTypeSectionProperty specifies a property pertaining to a Section type together with its position in the list of properties. This property has to be attributed to all sections of this Section type. | CatalogueSection TypeSection Property |
| Catalogue Model Property | A CatalogueModelProperty specifies a property and additional information for it that can be used to describe and differentiate between items contained or sections used within the Catalogue. | Property |
| Catalogue Model Property DataType | A CatalogueModelPropertyDataType defines the data type of properties (and information about its change) used in the Catalogue. | PropertyData Type |

-continued

| Entity | Definition | Global Data Type |
|---|---|---|
| Catalogue ModelProperty DefinitionClass | A CatalogueModelPropertyDefinitionClass defines the scope of properties used in the Catalog. | Property DefinitionClass |
| Catalogue Provider Property Valuation | A CatalogueProviderProperty Valuation valuates properties provided by the Catalogue provider to provide additional information about the Catalogue (e.g., any information about the vendor's, Catalogue creation date, or Note.). | Property Valuation |
| Catalogue Publication | A CataloguePublication is a new, changed or deleted catalogue for publishing. | Transmission Catalogue |
| Catalogue Publication Confirmation | A CataloguePublicationConfirmation is the confirmation whether the publication of a Catalogue or the deletion of a (published) Catalogue was successful or not. | Catalogue Publication Confirmation |
| Catalogue Publication Transmission | A CATALOGUEPUBLICATIONTRANSMISSION is information concerning the transmission of a catalogue publication. This can be information about the reception of a package of the catalogue publication transmission and the validity of its content or the request to cancel the transmission of a catalogue publication or the confirmation of such a request or the request to lock single items of a catalogue publication transmission or the confirmation of such a lock request. | |
| Catalogue Publication Transmission Cancellation Confirmation | The CataloguePublicationTransmissionCancellation Confirmation is the confirmation whether the transmission of a Catalogue has been cancelled successfully and an earlier published state of this catalogue (if such exists) has been restored or not. The entity CataloguePublicationTransmission contains information about a catalogue | Catalogue Publication Transmission Cancellation Confirmation |
| Catalogue Publication Transmission Cancellation Request | A CataloguePublicationTransmissionCancellationRequest is the request to cancel the transmission of a Catalogue and to restore an earlier published state (if such exists) of the Catalogue. Moreover, no more packages are sent for this transmission. | Catalogue Publication Transmission Cancellation Request |
| Catalogue Publication Transmission ContentChange Confirmation | A CataloguePublicationTransmissionContentChange Confinnation is the confirmation of Catalog Search Engine (the publishing system) to Catalog Authoring whether a limited number of catalog items contained in the catalog publication transmission could be changed, created or deleted as requested by a CataloguePublicationTransmissionContentChange Request or not. | |
| Catalogue Publication Transmission ContentChange Request | A CataloguePublicationTransmissionContentChange Request is the request of Catalog Authoring to Catalog Search Engine to change, create or to delete a limited number of catalog items contained in the catalog publication transmission. | |
| Catalogue Publication Transmission ItemLock Confirmation | A CataloguePublicationTransmissionItemLock Confirmation is the confirmation whether single items of the catalogue contained in the catalogue publication transmission could be locked or not. To lock means: If the catalogue is not yet published the items must not be published. If the catalogue is already published, the publication of these items must be revoked. | Catalogue Publication TransmissionItem Lock Confirmation |
| Catalogue Publication Transmission ItemLock Request | A CataloguePublicationlransmissionItemLockRequest is the request to lock single items of the catalogue contained in the catalogue publication transmission. To lock means: If the catalogue is not yet published the items must not be published. If the catalogue is already published, the publication of these items must be revoked. | Catalogue Publication TransmissionItem LockRequest |
| Catalogue Publication Transmission Package | A CataloguePublicationTransmissionPackage specifies a package of a Catalogue publication transmission and information about the reception of this package and the validity of its content. | Catalogue Publication Transmission Package |
| Catalogue Update | A CatalogueUpdate is a new, changed or deleted catalogue. | Transmission Catalogue |
| CreditAgency Report | A CREDITAGENCYREPORT is the credit information issued by the credit agency for a party. CREDLTAGENCYREPORT contains the credit information required about a party, with details about the creation of this information. | CreditAgency Report |
| CreditAgency ReportQuery | A CREDITAGENCYREPORTQUERY is the query to a credit agency for credit information about a party. CREDITAGENCYREPORTQUERY contains details | CreditAgency ReportQuery |

-continued

| Entity | Definition | Global Data Type |
|---|---|---|
| | about the party for whom credit information is required, together with a specification of the service required by the agency. | |
| CreditAgency ReportQuery Service | A CREDITAGENCYREPORTQUERYSERVICE specifies the type and scope of the service required from the credit agency. | |
| Credit Worthiness | CREDITWORTHINESS specifies the creditworthiness of a business partner, if required with details of the score, risk class, and credit limit. | CreditWorthiness |
| Credit Worthiness Query | A CREDITWORTHINESSQUERY is the query regarding the creditworthiness of a business partner. | CreditWorthiness Query |
| Cumulative Delivery | A CumulativeDelivery contains the cumulated quantities of all the deliveries for a product in the specified validity period. | |
| CustomsVendor Declaration | A CustomsVendorDeclaration is the legally binding declaration of the vendors concerning the goods they delivered to a buyer which allows the buyer to claim customs tariff preferences. A vendor declaration can be made as an individual declaration for an individual delivery or as a long-term declaration that is, in general, valid for one year. | |
| CustomsVendor DeclarationItem | A CustomsVendorDeclarationItem is the summary of all the specifications that vendors make in the CustomsVendorDeclaration on a product they deliver. | |
| Delivery | A Delivery is a collection of goods that is to be staged for shipment or is to be received - after shipment - for further use within a company. Delivery specifies when and where certain quantities of products are delivered. It also may inform about the status of execution of a delivery. | Delivery |
| Delivery Execution Period | A DELIVERYEXECUTIONPERIOD is the planned or current period or time at which a particular step of the delivery process is to be completed or has been completed. | |
| Delivery Execution Request | A DeliveryExecutionRequest is a request to supply chain execution (Logistics, the warehouse) to stage goods and to deliver them or prepare goods arrivals and receive incoming goods. DeliveryExecutionRequest contains request items with the requested products, partners, locations, and schedule lines. This specifies when and where, and by whom, products are to be staged and delivered (from and to) and received. | Delivery ExecutionRequest |
| Delivery Execution RequestItem | A DeliveryExecutionRequestItem is the part of a delivery request that contains an actual product, its quantities, and dates as well as the location to which the product is to be delivered. | Delivery ExecutionRequest Item |
| Delivery ExecutionStatus | A DELIVERYEXECUTIONSTATUS specifies the type and execution status of delivery processing reached for all the items or the delivery as a whole. | |
| Delivery Information | A DeliveryInformation is a message about the creation of a delivery, changes made to a delivery, and the execution status of a delivery. DeliveryInformation is divided into delivery items (DeliveryItems), which describe the execution status and execution period for delivering a particular quantity of a product or batch. References to relevant business documents can be specified for a delivery item. For the delivery as a whole, the ship-from/to location, shipment details, and references to any relevant business documents can be specified alongside the delivering party, recipient, and shipping party. | |
| Delivery Information Item | A DeliveryInformationItem is a quantity of a product in the delivery and contains additional information about its delivery processing status along with any references to previous business documents. | |
| DeliveryItem | A DELIVERYITEM is an item that specifies a quantity of a product to be delivered and contains additional information about its delivery processing status along with any references to previous business documents. | DeliveryItem |
| DeliveryItem Variance | DeliveryItemVariance describes a variance in the received quantity of a product and type of and reason for the variance. | |
| Delivery Schedule | A DeliverySchedule is a tool that is used by a customer to notify a vendor about the quantity of a material from a scheduling agreement item that is to be delivered and at what time. | |

-continued

| Entity | Definition | Global Data Type |
|---|---|---|
| Delivery ScheduleItem | DeliveryScheduleItem is a statement regarding the requirement for a specific product at a ship-to location with reference to a scheduling agreement ("Scheduling Agreement"). | |
| Despatched DeliveryItem | DespatchedDeliveryItem describes what quantity of a product is to be delivered/picked up. | |
| Despatched Delivery Notification | A DespatchedDeliveryNotification is a notice for a goods recipient about the planned arrival/pickup/issue date for a ready-to-send delivery including details about the contents of the delivery. In general, a DespatchedDeliveryNotification contains several items, which refer to the specifications for the quantity, weight, and volume for each delivered product, as well as preceding documents and/or outline agreements. | Despatched Delivery |
| Inbound Delivery | An InboundDelivery is an incoming delivery. | |
| Incoterms | Incoterms are commercial contract formulae for the delivery conditions that correspond with the rules compiled by the International Chamber of Commerce (ICC). | Incoterms |
| Inventory Change | InventoryChange summarizes changes in warehouse stock. An InventoryChange consists of individual changes in warehouse stock which Accounting or Logistics Planning must be informed of. All of the stock changes summarized in a message are of the same transaction type (goods receipt, goods issue, physical stock, transfer posting, and so on). | InventoryChange |
| Inventory Change Accounting Cancellation | An INVENTORYCHANGEACCOUNTING CANCELLATION is the full cancellation of posting information previously sent to Accounting with respect to a goods movement. | |
| Inventory ChangeItem | An InventoryChangeItem is an individual warehouse stock change. | InventoryChange Item |
| Inventory ChangeItem Inbound | An InventoryChangeItemInbound characterizes a receipt of warehouse stock by means of the receiving location, receiving owner, received quantity, and received material. | InventoryChange ItemInbound |
| Inventory ChangeItem Outbound | An InventoryChangeItemOutbound characterizes an issue of warehouse stock by means of the ship-from location, issuing owner, issued quantity, and issued material. | InventoryChange ItemOutbound |
| Invoice | An Invoice is a binding request from an invoicing party (such as vendor) to an invoice recipient (such as a sold-to-party) to make payment for the type and quantity of products or services received as a result of previous business transactions by a predefined date. Invoice not only specifies the remuneration and tax to be paid by the participating business partners for products and services provided, but also gives detailed information about the payment conditions and delivery terms. | Invoice |
| Invoice Accounting | An InvoiceAccounting is the preparation of an invoice or credit memo for Accounting. For an invoice or credit memo uniquely identified as the underlying business document, InvoiceAccounting contains item information about receivables and payables, taxes on sales and purchases, and expenses and revenues. In addition, the business partners involved are named. | Invoice Accounting |
| Invoice Accounting Cancellation | An 1NVOICEACCOUNTINGCANCELLATION is the full cancellation of posting information previously sent to Accounting for an incoming or outgoing invoice or credit memo. | |
| Invoice AccountingDue Item | An InvoiceAccountingDueItem is the information relevant for Accounting about receivables or payments from deliveries and services that are listed in an invoice or credit memo item. | Invoice AccountingDue Item |
| Invoice Accounting Expense RevenueItem | An InvoiceAccountingExpenseRevenueItem is the information relevant for Accounting about an expense or revenue that was listed in an invoice or credit memo item. | Invoice Accounting ExpenseRevenue Item |
| Invoice AccountingItem | An InvoiceAccountingItem is the information relevant for Accounting about an account receivable or payable from deliveries and services that are listed in an invoice or credit memo item. | |

-continued

| Entity | Definition | Global Data Type |
|---|---|---|
| Invoice AccountingTax Item | An InvoiceAccountingTaxItem is the information relevant for Accounting about an account receivable or payable from taxes on sales and purchases that are listed in an invoice or credit memo item. | Invoice AccountingTax Item |
| InvoiceDue | An InvoiceDue summarizes the details regarding a business transaction that are relevant for settling (creating billing documents and checking and creating incoming invoices) this business transaction. InvoiceDue consists of InvoiceDueItems, which represent items of the base business document for the future settlement. An InvoiceDueItem usually consists of information about the quantity of a product that has been ordered or delivered, as well as the business partners, locations, terms of delivery and payment involved and the other business documents to be taken into account when the product is settled. | InvoiceDue |
| InvoiceDue Cancellation | An InvoiceDueCancellation is a request to exclude business document data that has already been sent from the settlement. | |
| InvoiceDueItem | An InvoiceDueItem summarizes the information from a business document item that is to be taken into account in the future settlement. An InvoiceDueItem usually consists of information about the quantity of a product that has been ordered or delivered, as well as the business partners, locations, terms of delivery and payment conditions involved, and the other business documents to be taken into account when the product is settled. | InvoiceDueItem |
| InvoiceIssued | An InvoiceIssued summarizes the invoice information relevant for contract managementlsales. InvoiceIssued contains information about which order items, items in credit and debit memo requests or delivery items have been billed and to what extent. | InvoiceIssued |
| InvoiceIssued Item | An InvoiceIssuedItem specifies the quantity or the partial value of a product billed with respect to a business transaction. | InvoiceIssued Item |
| InvoiceItem | An InvoiceItem is part of an invoice containing the prices and taxes for the quantity of a product that has been delivered or for a service that has been provided. In addition, to the information about prices and taxes, InvoiceItem comprises information about the participating business partners, the payment conditions, and the delivery terms, if they differ from the information provided in the invoice header. | InvoiceItem |
| Loan Calculation | A LoanCalculation describes the results of a loan calculation. | |
| Loan Calculation Query | A LoanCalculationQuery describes the query requesting a loan calculation. It contains information about the loan to be calculated, loan conditions, and type of calculation to be made. | |
| LoanContract | A LoanContract contains all of the information that is required for creating a loan contract. The loan is based on loan conditions. These define the interest rate, repayment, and fees. Structurally speaking the loan contract is made up as follows:<br>- Description of parties to the contract (lender, borrower, and possibly PayerParty, LoanBrokerParty, and GuarantorParty).<br>- Key loan attributes such as start and end of loan as well as reason for loan, and so on.<br>- Payment information<br>- Conditions (Interest, Repayment, Fees)<br>- Fundamental agreements and documents such as general termS and conditions, financial statements, personal information, information about the financing object, collateral agreement. | |
| LoanContract Item | A LoanContractItem defines the conditions of a loan. Conditions can be:<br>- Interest conditions<br>- Repayment conditions<br>- Fees | |
| Location | A location is a physical place. | |
| OrderID Assignment | An OrderlDAssignment represents an assignment of order numbers to a vendor/seller by a buyer or, more generally, to an agent by an ordering party. | |

-continued

| Entity | Definition | Global Data Type |
|---|---|---|
| OrderID Assignment Item | An OrderIDAssignmentItem describes the order numbers that are permissible and should be used to identify orders created by the seller for a specific combination of delivery location, marketing promotion, and purchasing group at the buyer. | |
| Organisational Centre | Building block of the enterprise model, which represents a node in an organizational structure of the extended enterprise. It incorporates different business roles that are defined in detail by specializing the org centre into business characters. | |
| PaymentDue | PaymentDue indicates the type of due payments (for payment or expected) and their amounts. For each invoice or credit memo that is uniquely identified as the base business document, PaymentDue receives one or more due date items (PaymentDueItems) with details of the type and amount of the payment due, the payment terms and the business partners involved. | PaymentDue |
| PaymentDue Item | A PaymentDueItem describes a due date item (receivable or payable). PaymentDueItem can contain additional details on payment terms and participating business partners as well as the type and amount of a ment due. | PaymentDueItem |
| Pending Delivery | A PENDINGDELIVERY is a planned delivery. | |
| PersonnelTime Sheet | PersonnelTimeSheet groups together the personnel times or personnel time events recorded for a personnel resource. The PersonnelTimeSheet includes one or more PersonnelTimeSubsheets, which contain the personnel times and personnel time events for one work agreement. | PersonnelTime Sheet |
| PersonnelTime Subsheet | A PersonnelTimeSubsheet is a set of personnel times and personnel time events that have been recorded during a particular period for a personnel resource regarding a work agreement. | PersonnelTime Subsheet |
| PersonnelTime Subsheet PersonnelTime | A PersonnelTimeSubsheetPersonnelTime is a period of a personnel resource that is characterized by business, pay scale, or legal criteria. | PersonnelTime |
| PersonnelTime Subsheet PersonnelTime Event | A personnel time event is a change in the execution of services of a personnel resource with which one personnel time ends and another personnel time begins. Such changes can include, for example, the start of work, interruption of work, or end of work. A personnel time event is characterized by a type such as “clock-in entry”, “clock-out entry”, or “start of break”. | PersonnelTime Event |
| Previous Delivery | PreviousDelivery contains data about the physical delivery that was last received. | |
| Product | A product is a commodity that is the object of the business of a company and serves to create value for this company. A product can be tangible or intangible, and can contain other products or belong to another product (such as a set). A product can have relationships to other products or objects. For example, a service can exist for a product that is specially manufactured or financing for a particular category of products. | |
| ProductActivity | ProductActivity contains specifications about the stock, demand, and consumption of products of a buyer (retailers, wholesalers, or manufacturers) at a ship-to location, and about the involved parties, for other relevant business documents and (optionally) for a ship-from location. | ProductActivity |
| ProductActivity Item | A ProductActivityItem contains specifications about the stock, demand, and/or consumption of a product in reference to a ship-to location and (optionally) a ship from location. | ProductActivity Item |
| Product Category | A product category is a division of products according to objective business-specific criteria. | |
| Product Category Hierarchy | A Product Category Hierarchy is a hierarchy for structuring product categories. Depending on the business context, products are assigned to categories and arranged in hierarchies in order to group similar products. | |
| ProductDemand Influencing Event | A ProductDemandInfluencingEvent describes a demand influencing event and its effects on the demand. A ProductDemandInfluencingEvent specifies event dates and participating business partners. It is divided up into items that each contain the effects of | |

-continued

| Entity | Definition | Global Data Type |
|---|---|---|
| | the event on the expected sales quantities with regard to a ship-to party location and a product. | |
| ProductDemand Influencing EventItem | A ProductDemandInfluencingEventItem specifies for a ship-from location (optional), a ship-to location, and a product the sales quantities expected on the basis of the demand influencing event in the form of a time series. | |
| ProductForecast | A ProductForecast is a forecast (or the revision of such a forecast) of the sale/demand of products in the form of time series between business partners. A ProductForecast consists of several items which can contain information about the sales quantities predicted by the forecast for each ship-to location and product. | ProductForecast |
| ProductForecast Item | A ProductForecastitem specifies (or revises) for a ship-from location (optional), a ship-to location, and a product the forecasted sales quantities in the form of a time series. | ProductForecast Item |
| ProductForecast Notification | A ProductForecastNotification is a notice about future product sales or demands (forecasts). | ProductForecast |
| ProductForecast Notification Item | A ProductForecastNotificationItem specifies for a ship-from location (optional), a ship-to location, and a product the forecasted sales quantities in the form of a time series. | ProductForecast Item |
| ProductForecast Revision | A ProductForecastRevision is a revision of a forecast of the sale/demand of products in the form of time series between business partners. A ProductForecastRevision consists of several items, which can contain information about the sales quantities predicted by the forecast for each ship-to location and product. | ProductForecast |
| ProductForecast RevisionItem | A ProductForecastRevisionItem specifies for a ship-from location (optional), a ship-to location, and a product the revision of the forecasted sales and purchase order quantities in the form of a time series. | |
| Property | A PROPERTY is an object attribute. | Property |
| PropertyData Type | PROPERTYDATATYPE is the data type of a property. It describes the syntax of the values and can contain a list of permitted values. | PropertyData Type |
| Property DefinitionClass | A PROPERTYDEFINITIONCLASS is a class for defining properties (in a classification system). | Property DefinitionClass |
| PurchaseOrder | A PurchaseOrder is a buyer's request to a seller to provide or deliver certain quantities of products at one or several dates. This can include a change (including confirmation or cancellation) of a purchase order or information about the status of the purchase order. The PurchaseOrder is divided into PurchaseOrderItems that each specify an ordered product or additional information relevant for such a product, such as information about bills of material (BOMs) or discount or value limits. In addition, to the buying party and the seller, additional parties can be involved in the PurchaseOrder. Locations can be specified for the purchase order delivery. Delivery and payment terms also are agreed. Notes or references to attachments can be specified for the PurchaseOrder. The types of follow-up documents that are expected with regard to the PurchaseOrder package also can be specified. | |
| PurchaseOrder Cancellation | A PurchaseOrderCancellation is a buying party's (buyer's) request to a provider (seller) to cancel a purchase order. | PurchaseOrder Cancellation |
| PurchaseOrder Change | A PurchaseOrderChange is a change made to the buyer's request to the seller to deliver goods or provide services. | PurchaseOrder |
| PurchaseOrder Confirmation | A PurchaseOrderConfirmation is a confirmation, partial confirmation, or a change sent from the seller to the buyer concerning the requested delivery of goods or provision of services. | PurchaseOrder |
| PurchaseOrder Information | A PurchaseOrderInformation is the information about the status of a purchase order. This includes a purchase order change, confirmation, or cancellation. | PurchaseOrder Information |
| PurchaseOrder Information Item | A PurchaseOrderInformationItem specifies a product ordered by the purchase order or additional information about ordered products. This information includes specifications on discounts in kind, substitute products, and value limits. The PurchaseOrderInformationItem contains detailed information about a particular product and its price. The quantity of the product and (delivery) dates are specified in the schedule line. For | PurchaseOrder InformationItem |

-continued

| Entity | Definition | Global Data Type |
|---|---|---|
| | the PurchaseOrderInformationItem (compared to the information of the PurchaseOrderInformation), deviating parties, locations, and delivery terms can be defined. The PurchaseOrderInformationItem can contain references to other business documents that are relevant for the item. Notes or references to attachments also can be specified for the PurchaseOrderInformationItem. A PurchaseOrderInformationItem can be subordinate to another PurchaseOrderInformationItem within a hierarchy to represent a business relationship between the two items. This could be information about a discount in kind or substitute product for an ordered product, for example. This relationship also can be used to group together purchase order items; that is, a PurchaseOrderInformationItem can group together other PurchaseOrderInformationItems. | |
| PurchaseOrder Item | A PurchaseOrderItem specifies a product ordered by the PurchaseOrder or additional information about such a product. This information includes specifications on discounts in kind, substitute products, and value limits. The Purchase OrderItem contains detailed information about a particular product and its price. The quantity of the product and (delivery) dates are specified in the schedule line. For the PurchaseOrderItem (compared to the information of the PurchaseOrder), deviating parties, locations, and delivery terms can be defined. The PurchaseOrderItem can contain references to other business documents that are relevant for the item. Notes or references to attachments also can be specified for the item. A PurchaseOrderItem can be subordinate to another PurchaseOrderInformationItem within a hierarchy to represent a business relationship between the two items. This could be information about a discount in kind or substitute product for an ordered product, for example. This relationship also can be used to group together PurchaseOrder items; that is, a PurchaseOrderItem can group together other PurchaseOrderItems. | PurchaseOrder Item |
| PurchaseOrder Request | A PurchaseOrderRequest is a buyer's request to the seller to deliver goods or provide services. | PurchaseOrder |
| PurchaseOrder Update | A PurchaseOrderUpdate is a buyer's request to a seller to provide or deliver certain quantities of products on one or several dates. This can include a change or a confirmation of such a purchase order. | PurchaseOrder |
| Purchase Requirement | A PurchaseRequirement is a requirement for procuring products (materials or services). The PurchaseRequirement is subdivided into PurchaseRequirementItems that each specify an ordered product or additional information relevant for such a product, such as information about product category or value limits. In addition, to the buying party and the seller as well as the proposed seller, additional parties can be involved in the PurchaseRequirement. Locations can be specified for the PurchaseRequirement delivery. | Purchase Requirement |
| Purchase Requirement Confirmation | A PurchaseRequirementConfirmation is a confirmation of the buyer that informs the requester of the extent to which a requisition has been fulfilled. | |
| Purchase Requirement Confirmation Item | A PurchaseRequirementConfirmationItem provides the extent to which an item of a requisition has been fulfilled. | Purchase Requirement ConfirmationItem |
| Purchase Requirement Confirmation ItemExecuting PurchaseOrder | A PurchaseRequirementConfirmationItemExecuting PurchaseOrder is information on a PurchaseOrderItem, which originates from a PurchaseRequirementItem. | |
| Purchase Requirement Item | A PurchaseRequirementItem specifies a product requested by the PurchaseRequirement or provides additional information about such a product. The PurchaseRequirementItem contains detailed information about a particular product and its price. The quantity of the product and (delivery) dates/times are specified in the schedule line. For the PurchaseRequirementItem (compared to the information of the PurchaseRequirement), deviating | Purchase RequirementItem |

-continued

| Entity | Definition | Global Data Type |
|---|---|---|
| | parties or locations can be defined. The PurchaseRequirementItem can contain references to other business documents that are relevant for the item. Notes or references to attachments also can be specified for the item. A PurchaseRequirementItem can be subordinate to another PurchaseRequirementItem within a hierarchy to represent a business relationship between the two items. This could be information about a substitute product for an ordered product, for example. This relationship also can be used to group together PurchaseRequirement items; that is, a PurchaseRequirementItem can group together other PurchaseRequirementItems. | |
| Purchasing Contract | A PurchasingContract is a framework agreement with a seller regarding the supply of products in acertain period of time. | |
| Purchasing ContractRelease | A PurchasingContractRelease (purchasing contract release) is a notification from purchasing to con-tract management regarding a performed release with reference to a purchasing contract. | |
| Purchasing ContractRelease Item | A PurchasingContractReleaseItem specifies a certain item in a PurchasingContractRelease item or provides additional information on such an item. This includes information on release quantities and release amounts. | |
| Quote | A Quote is a quotation submitted by a bidder to a buyer in response to a request for quotation (RFQ) issued for a product by the buyer. The Quote is subdivided into QuoteItems, which contain the concrete quotation submitted by the bidder with reference to the relevant item in the buyer's RFQ. | Quote |
| QuoteItem | A QuoteItem contains the bidder's quotation for a product tendered in an item of a request for quotation (RFQItem) or additional information about this product. Quantities and delivery dates also can be specified here. | QuoteItem |
| Received Delive | A ReceivedDelivery is the detailed confirmation of the receipt of a delivery. | ReceivedDelivery |
| Received DeliveryItem | A ReceivedDeliveryItem describes which quantity of a product was received. | |
| Replenishment Order | A ReplenishmentOrder is an order that is planned by a vendor with the objective of replenishing products for a customer. | |
| Replenishment OrderItem | A ReplenishmentOrderItem is an item in a replenishment order that is planned and executed by a vendor for his or her customer. The dates and quantities for delivering a certain product are described in the individual items and schedule lines. The business partners involved and (where applicable) references to other relevant business documents are also listed. | |
| Replenishment OrderProposal | A ReplenishmentOrderProposal is a proposal for a source location (for example, a vendor) to deliver cer-tain quantities of products to a target location (goods recipient, for example, distribution center) at a spe-cific time, for replenishment purposes. | |
| Replenishment OrderProposal Item | A ReplenishmentOrderProposalItem groups all information, the type, quantity and dates for the products proposed for the replenishment purchase order. | |
| RequestFor Quotation (RFQ) | A RequestForQuotation (RFQ) is a request from a buyer to a bidder to submit a quotation for the products (goods or services) specified in the RFQ. This can include a change or a cancellation of such a RFQ. The RFQ is subdivided into RFQItems, which each contain a product specified for the RFQ or additional information for this product. In addition, to the buying party and the bidder, additional parties can be involved in the RFQ. The delivery ldcation also can be specified. Delivery and payment terms also are agreed upon. The RFQ can contain a reference to a Quote if the bidder has a question or if the buyer has changed the RFQ. Notes or references to attachments can be specified for the RFQ. | |
| RequestFor QuotationItem | An RFQItem specifies a product tendered by an RFQ (request for quotation) with additional information on such a product. The RFQItem contains detailed information about a particular product. The quantity of | RFQItem |

-continued

| Entity | Definition | Global Data Type |
|---|---|---|
| | the product and (delivery) dates/times are specified in the schedule line. For the RFQItem (compared to the information of the RFQ), deviating parties, locations, and delivery terms can be defined. The RFQItem can contain references to other business documents that are relevant for the item. Notes or references to attachments also can be specified for the REQItem. An RFQItem can be subordinate to another RFQItem within a hierarchy in order to represent a business relationship between the two items. | |
| RFQ Cancellation | An RFQCancellation is a cancellation of an RFQ (request for quotation) to a bidder by a buyer. | RFQCancellation |
| RFQChange | An RFQChange is a change to the buyer's request to a bidder to submit a quotation for the products (goods or services) specified in the REQ (request for quotation). | RFQ |
| RFQRequest | An RFQRequest is a request from a buyer to a bidder to submit a quotation for the products (goods or services) specified in the RFQ (request for quotation). | RFQ |
| RFQResult | An RFQResult is the acceptance or the rejection of a bidder's quotation by the buyer. | RFQResult |
| RFQResultItem | An RFQResultItem specifies the rejection or the extent of the acceptance of a bidder's quotation for a product of an REQ item. | REQResultItem |
| REQUpdate | An REQ Update is a request (or a change to a request) from a buyer to a bidder to submit a quotation for the products (goods or services) specified in the REQ (request for quotation). | REQ |
| SalesContract | A SalesContract is a framework agreement with a customer concerning the supply of products in a certain period. | |
| SalesOrder | A SalesOrder is the request (or change or confirmation of such a request) to deliver certain quantities of products to a customer at one or several points in time. | |
| SalesOrder Fulfillment | A SalesOrderFulfihimentRequest is a request (or change and cancellation of such a request) to fulfill a sales order and in doing so to take into account the logistical requirements (availability check, scheduling, requirements planning, procurement, delivery, ...) of a sales order. The SalesOrderFulfillment is divided up into SalesOrderFulfillmentItems that each specify the product that is to be fulfilled or additional information for such a product such as BOM information. Alongside the purchasing party and the seller, other parties can be involved in the SalesOrderFulfillment. For the fulfillment of the SalesOrderFulfillment, locations can be determined and delivery methods can be agreed upon. Notes or references to attachments can be added to the SalesOrderFulfillment. Furthermore, it is possible to specify which types of follow-up documents are expected with regard to the SalesOrderFulfillment. | SalesOrder Fulfillment |
| SalesOrder FulfillmentItem | A SaleOrderFulfilimentItem specifies a product transferred by the SalesOrderFulfiliment or additional information on such a product. The SalesOrderFulfillmentItem contains detailed information on a product and its batch. The quantity of the product and the (delivery) dates are specified in the schedule line. Deviating parties, locations and delivery methods can be specified for the SalesOrderFulfillmentItem (compared to the information of the SalesOrderFulfillment). The SalesOrderFulfillmentItem can contain references to other business documents that are relevant for the item. Furthermore, notes or references to attachments can be added. A SalesOrderFulfillmentItem can be subordinate to another SalesOrderFulfillmentItem within a hierarchy in order to represent a business connection between the two items. This might, for example, be the addition of a free-goods discount or a substitute product to an ordered product. | SalesOrder FulfillmentItem |
| Scheduling Agreement | SchedulingAgreement is an outline agreement between the customer and vendor that sets out the conditions regarding quantities, time periods and prices for the purchasing and delivery of goods. | |
| SellerProduct Catalogue | A SELLERPRODUCTCATALOGUE is a product catalogue of a seller. | |
| Service | A ServiceAcknowledgement is a request from the | Service |

-continued

| Entity | Definition | Global Data Type |
|---|---|---|
| Acknowledge-ment | seller asking the buyer to acknowledge a service that has been entered (or the buyer's acknowledgement of the entered service). The ServiceAcknowledgement is subdivided into ServiceAcknowledgementItems, each of which specifies a service that has been entered or additional information relevant for this service, such as hierarchy information. In addition, to the buyer and seller, other parties can participate in the ServiceAcknowledgement. Locations can be defined for entering the ServiceAcknowledgement. Notes or references to attachments can be included in the ServiceAcknowledgement. | Acknowledge-ment |
| Service Acknowledge-mentItem | A ServiceAcknowledgementItem specifies a service (service product) entered by the ServiceAcknowledgement or additional information about the service (service product). In addition, to service products, materials that are required for fulfilling a service can be specified. The ServiceAcknowledgementItem contains detailed information about a product, its price, quantity, and date. For the ServiceAcknowledgementItem (compared to the infonnation of the ServiceAcknowledgement), deviating parties and locations can be defined. The ServiceAcknowledgementItem can contain references to other business documents relevant for the item. Notes or references to attachments also can be specified. A ServiceAcknowledgementItem can be subordinate to another ServiceAcknowledgementItem within a hierarchy, thereby establishing a business relationship between the two items. This relationship also can be used to group together ServiceAcknowledgement items; that is, a ServiceAcknowledgementItem can group together other ServiceAcknowledgementItems. | Service Acknowledge-mentItem |
| Shipment | A Shipment is a collection of products that are transported together from a ship-from location to ship-to location. | |
| SourceOf Supply | A SourceOfSupply is a procurement option for a particular product or product category. In particular, it includes information about prices and ship-to/ship from locations. | SourceOfSupply |
| TaxDue | A TaxDue is information from a business document that is required in order to report or pay tax due to the tax authorities. TaxDue contains information about the business partners subject to tax, the tax events based to which the business partners are subject to tax/tax exempt, and about the type and amount of tax due. | TaxDue |
| TaxDueItem | A TaxDueItem is information from an item of a business document that is required in order to report or pay tax due to the tax authorities. TaxDueItem contains information about the business partners subject to tax, the tax events based on which the business partners are subject to tax/tax exempt, and about the type and amount of tax due. | TaxDueItem |
| Transmission Catalogue | A TRANSMISSIONCATALOGUE is a new, changed or deleted Catalogue for the purpose of transmission. | Transmission Catalogue |
| VAT Declaration | A VATDeclaration is a tax return for tax on sales/purchases to a tax authority. | |
| VAT DeclarationItem | A VATDeclarationItem is detailed information on the type and scope of reported taxes on sales/purchases. | |
| Vendor GeneratedOrder | A VendorGeneratedOrder is a purchase order that is planned and initiated by a vendor for a customer and is intended to trigger a replenishment delivery for the customer. | |
| Vendor GeneratedOrder Item picked up. | A VendorGeneratedOrderItem describes when and where certain quantities of a product that is listed in a VendorGeneratedOrder will be delivered or can be | |
| VendorInvoice | A VendorInvoice is an incoming invoice. | |

c) Packages

Packages group the entities in the business object model and the resulting interfaces into groups of semantically associated information. Packages also may include "sub"-packages, i.e., the packages may be nested.

Figure 252:
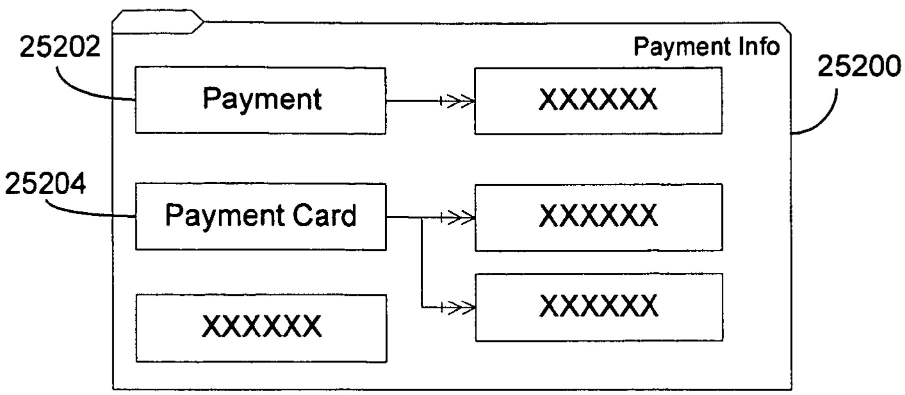
FIG. 252 depicts an example of a package in accordance with methods and systems consistent with the present invention.

Packages may group elements together based on different factors, such as elements that occur together as a rule with regard to a business-related aspect. For example, as depicted in FIG. 252, in a Purchase Order, different information regarding the purchase order, such as the type of payment 25202, and payment card 25204, are grouped together via the PaymentInformation package 25200.

Figure 253:
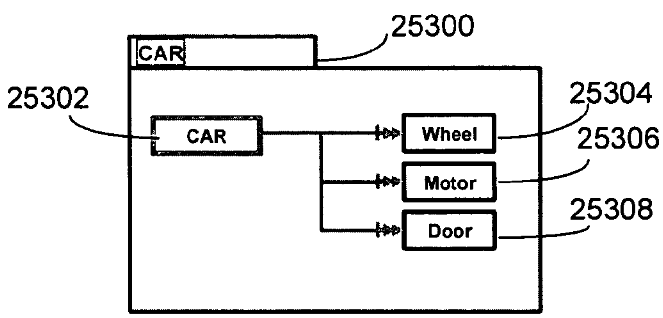
FIG. 253 depicts another example of a package in accordance with methods and systems consistent with the present invention.

Packages also may combine different components that result in a new object. For example, as depicted in FIG. 253, the components wheels 25304, motor 25306, and doors 25308 are combined to form a composition "Car" 25302. The "Car" package 25300 includes the wheels, motor and doors as well as the composition "Car."

Figure 254:
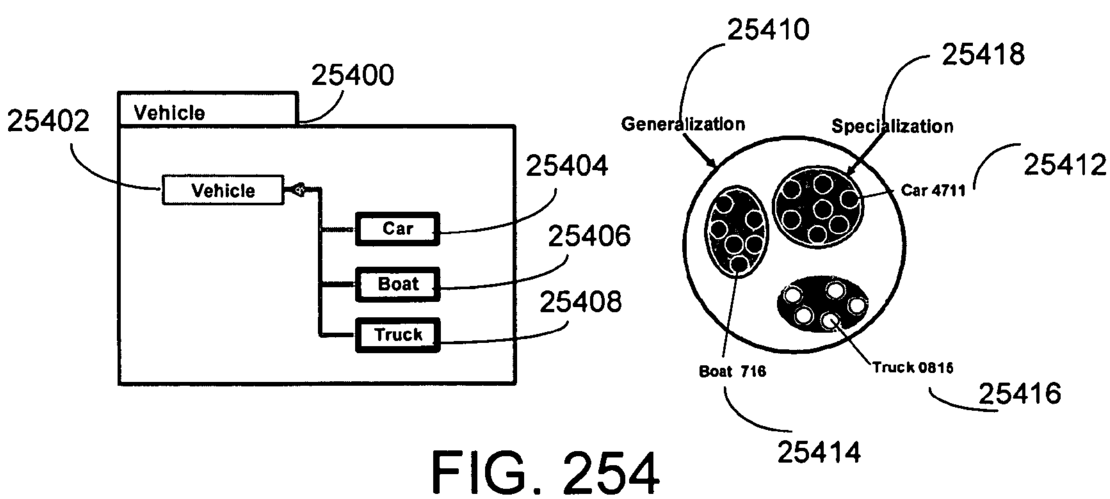
FIG. 254 depicts a third example of a package in accordance with methods and systems consistent with the present invention.

Another grouping within a package may be subtypes within a type. In these packages, the components are specialized forms of a generic package. For example, as depicted in FIG. 254, the components Car 25404, Boat 25406, and Truck 25408 can be generalized by the generic term Vehicle 25402 in Vehicle package 25400. Vehicle in this case is the generic package 25410, while Car 25412, Boat 25414, and Truck 25416 are the specializations 25418 of the generalized vehicle 25410.

Figure 255:
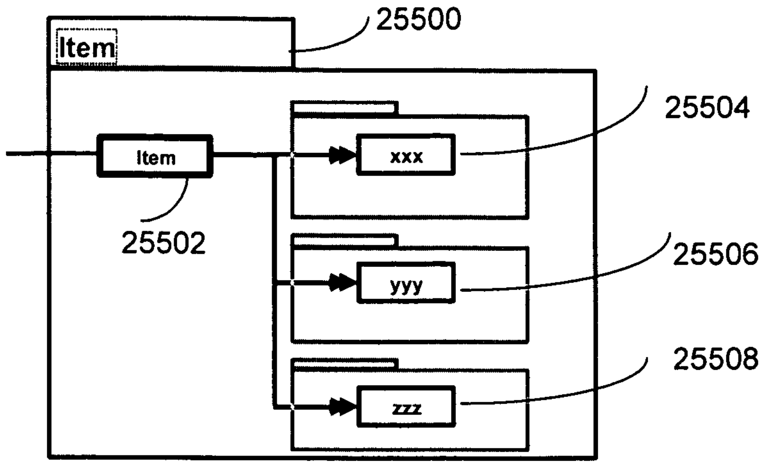
FIG. 255 depicts a fourth example of a package in accordance with methods and systems consistent with the present invention.

Packages also may be used to represent hierarchy levels. For example, as depicted in FIG. 255, the Item Package 25500 includes Item 25502 with subitem xxx 25504, subitem yyy 25506, and subitem zzz 25508.

Figure 256:
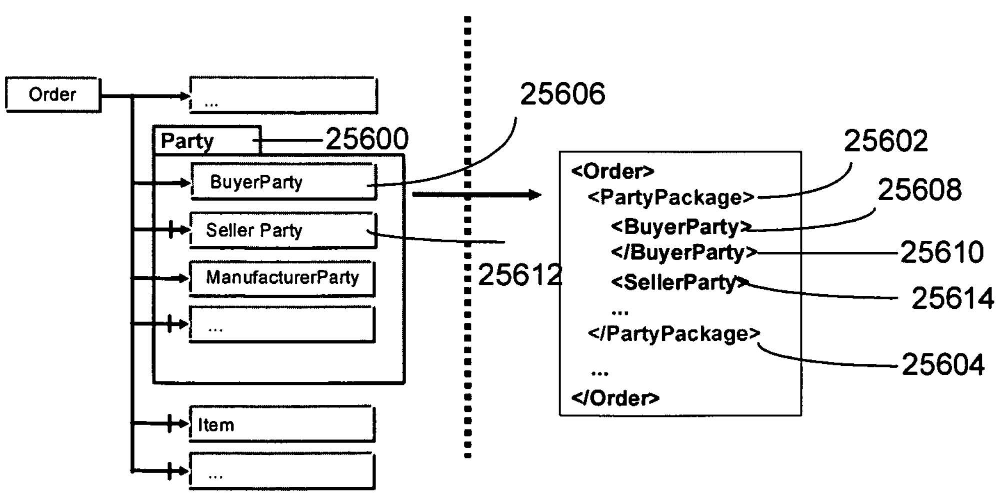
FIG. 256 depicts the representation of a package in the XML schema in accordance with methods and systems consistent with the present invention.

Packages can be represented in the XML schema as a comment. One advantage of this grouping is that the document structure is easier to read and is more understandable. The names of these packages are assigned by including the object name in brackets with the suffix "Package." For example, as depicted in FIG. 256, Party package 25600 is enclosed by <PartyPackage> 25602 and </PartyPackage> 25604. Party package 25600 illustratively includes a Buyer Party 25606, identified by <BuyerParty> 25608 and </BuyerParty> 25610, and a Seller Party 25612, identified by <SellerParty> 25614 and </SellerParty>, etc.

d) Relationships

Relationships describe the interdependencies of the entities in the business object model, and are thus an integral part of the business object model.

(1) Cardinality of Relationships

Figure 257:
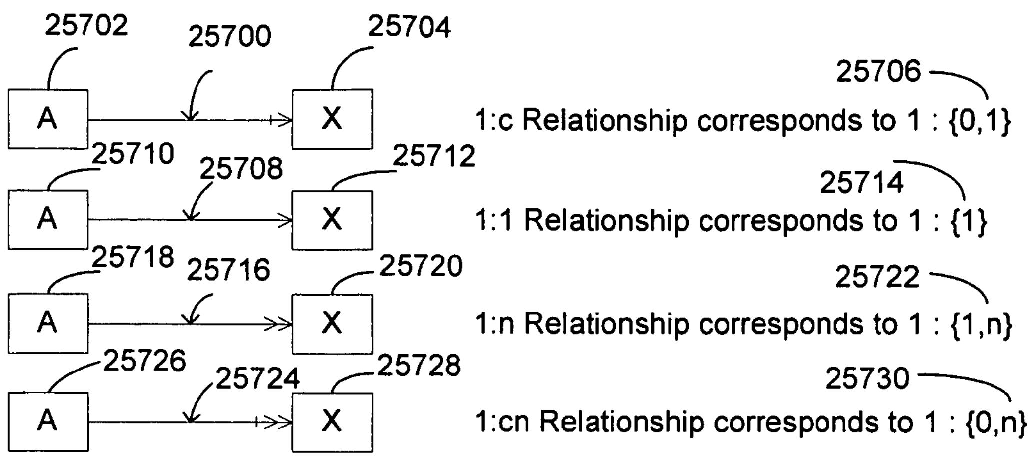
FIG. 257 depicts a graphical representation of the cardinalities between two entities in accordance with methods and systems consistent with the present invention.

FIG. 257 depicts a graphical representation of the cardinalities between two entities. The cardinality between a first entity and a second entity identifies the number of second entities that could possibly exist for each first entity. Thus, a 1:c cardinality 25700 between entities A 25702 and X 25704 indicates that for each entity A 25702, there is either one or zero 25706 entity X 25704. A 1:1 cardinality 25708 between entities A 25710 and X 25712 indicates that for each entity A 25710, there is exactly one 25714 entity X 25712. A 1:n cardinality 25716 between entities A 25718 and X 25720 indicates that for each entity A 25718, there are one or more 25722 entity Xs 25720. A 1:cn cardinality 25724 between entities A 25726 and X 25728 indicates that for each entity A 25726, there are any number 25730 of entity Xs 25728 (i.e., 0 through n Xs for each A).

(2) Types of Relationships (a) Composition

Figure 258:
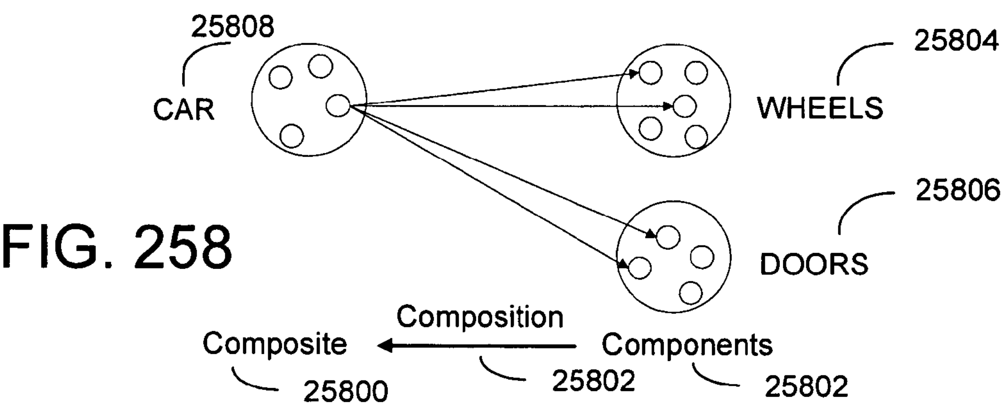
FIG. 258 depicts an example of a composition in accordance with methods and systems consistent with the present invention.
Figure 259:
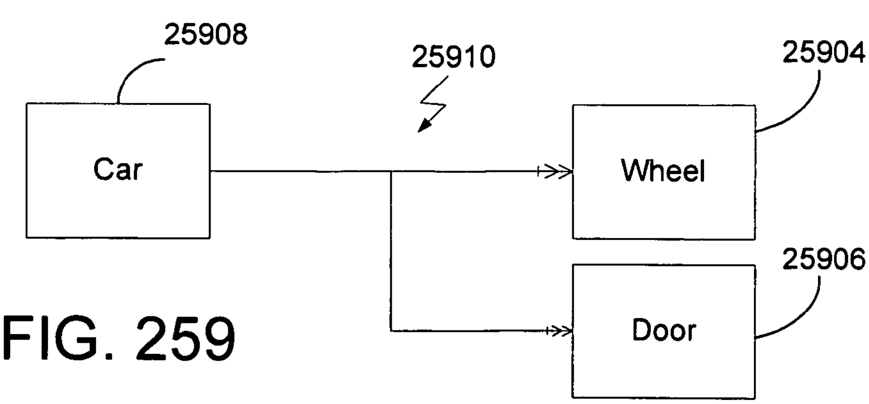
FIG. 259 depicts an example of a hierarchical relationship in accordance with methods and systems consistent with the present invention.

A composition or hierarchical relationship type is a strong whole-part relationship which is used to describe the structure within an object. The parts, or dependent entities, represent a semantical refinement or partition of the whole, or less dependent entity. For example, as depicted in FIG. 258, the components 25802 wheels 25804 and doors 25806 may be combined to form the composite 25800 "Car" 25808 using the composition 25810. FIG. 259 depicts a graphical representation of the composition 25910 between composite Car 25908 and components wheel 25904 and door 25906.

(b) Aggregation

Figure 260:
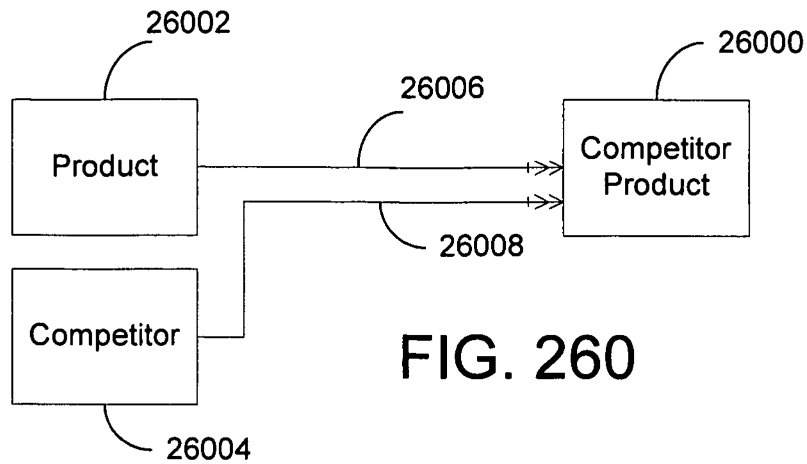
FIG. 260 depicts an example of an aggregating relationship in accordance with methods and systems consistent with the present invention.

An aggregation or an aggregating relationship type is a weak whole-part relationship between two objects. The dependent object is created by the combination of one or several less dependent objects. For example, as depicted in FIG. 260, the properties of a competitor product 26000 are determined by a product 26002 and a competitor 26004. A hierarchical relationship 26006 exists between the product 26002 and the competitor product 26000 because the competitor product 26000 is a component of the product 26002. Therefore, the values of the attributes of the competitor product 26000 are determined by the product 26002. An aggregating relationship 26008 exists between the competitor 26004 and the competitor product 26000 because the competitor product 26000 is differentiated by the competitor 26004. Therefore the values of the attributes of the competitor product 26000 are determined by the competitor 26004.

(c) Association

Figure 261:
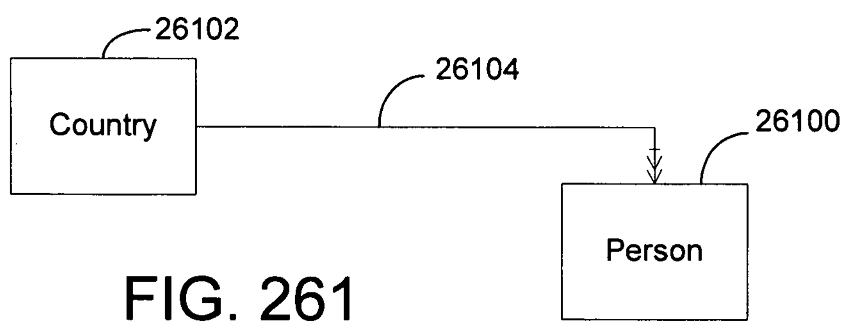
FIG. 261 depicts an example of an association in accordance with methods and systems consistent with the present invention.

An association or a referential relationship type describes a relationship between two objects in which the dependent object refers to the less dependent object. For example, as depicted in FIG. 261, a person 26100 has a nationality, and thus, has a reference to its country 26102 of origin. There is an association 26104 between the country 26102 and the person 26100. The values of the attributes of the person 26100 are not determined by the country 26102.

(3) Specialization

Figure 262:
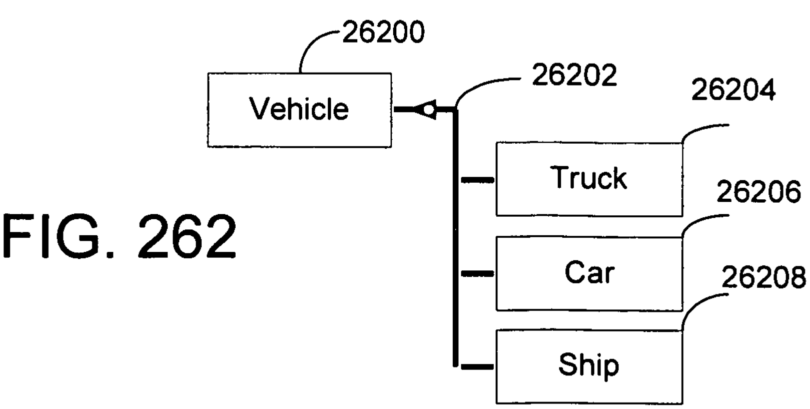
FIG. 262 depicts an example of a specialization in accordance with methods and systems consistent with the present invention.

Entity types may be divided into subtypes based on characteristics of the entity types. For example, FIG. 262 depicts an entity type "vehicle" 26200 specialized 26202 into subtypes "truck" 26204, "car" 26206, and "ship" 26208. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 263:
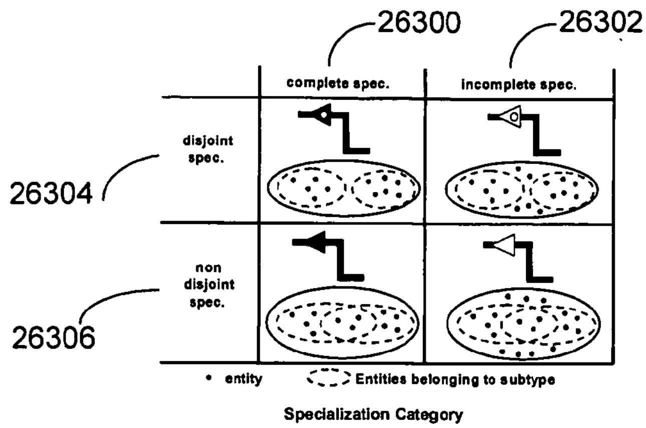
FIG. 263 depicts the categories of specializations in accordance with methods and systems consistent with the present invention.

As depicted in FIG. 263, specializations may further be characterized as complete specializations 26300 or incomplete specializations 26302. There is a complete specialization 26300 where each entity of the generalized type belongs to at least one subtype. With an incomplete specialization 26302, there is at least one entity that does not belong to a subtype. Specializations also may be disjoint 26304 or nondisjoint 26306. In a disjoint specialization 26304, each entity of the generalized type belongs to a maximum of one subtype. With a nondisjoint specialization 26306, one entity may belong to more than one subtype. As depicted in FIG. 263, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is either 1:n or 1:cn. In the case of the entity type chart of accounts, there is a hierarchical relationship of the cardinality 1:n with the entity type chart of accounts item since a chart of accounts has at least one item in all cases.

(2) Hierarchy

Figure 264:
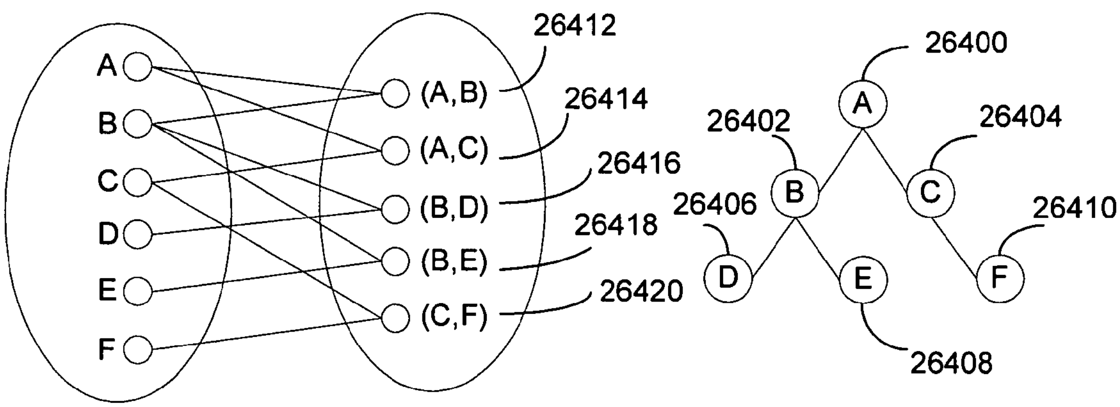
FIG. 264 depicts an example of a hierarchy in accordance with methods and systems consistent with the present invention.

A hierarchy describes the assignment of subordinate entities to superordinate entities and vice versa, where several entities of the same type are subordinate entities that have, at most, one directly superordinate entity. For example, in the hierarchy depicted in FIG. 264, entity B 26402 is subordinate to entity A 26400, resulting in the relationship (A,B) 26412. Similarly, entity C 26404 is subordinate to entity A 26400, resulting in the relationship (A,C) 26414. Entity D 26406 and entity E 26408 are subordinate to entity B 26402, resulting in the relationships (B,D) 26416 and (B,E) 26418, respectively. Entity F 26410 is subordinate to entity C 26404, resulting in the relationship (C,F) 26420.

Figure 265:
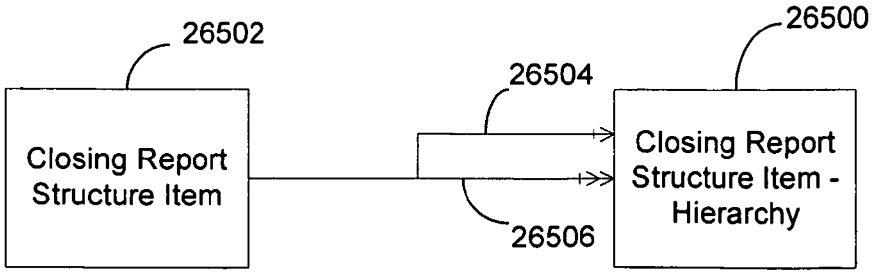
FIG. 265 depicts a graphical representation of a hierarchy in accordance with methods and systems consistent with the present invention.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 265 depicts a graphical representation of a Closing Report Structure Item hierarchy 26500 for a Closing Report Structure Item 26502. The hierarchy illustrates the 1:c cardinality 26504 between a subordinate entity and its superordinate entity, and the 1:cn cardinality 26506 between a superordinate entity and its subordinate entity.

3. Creation of the Business Object Model

Figure 266A:
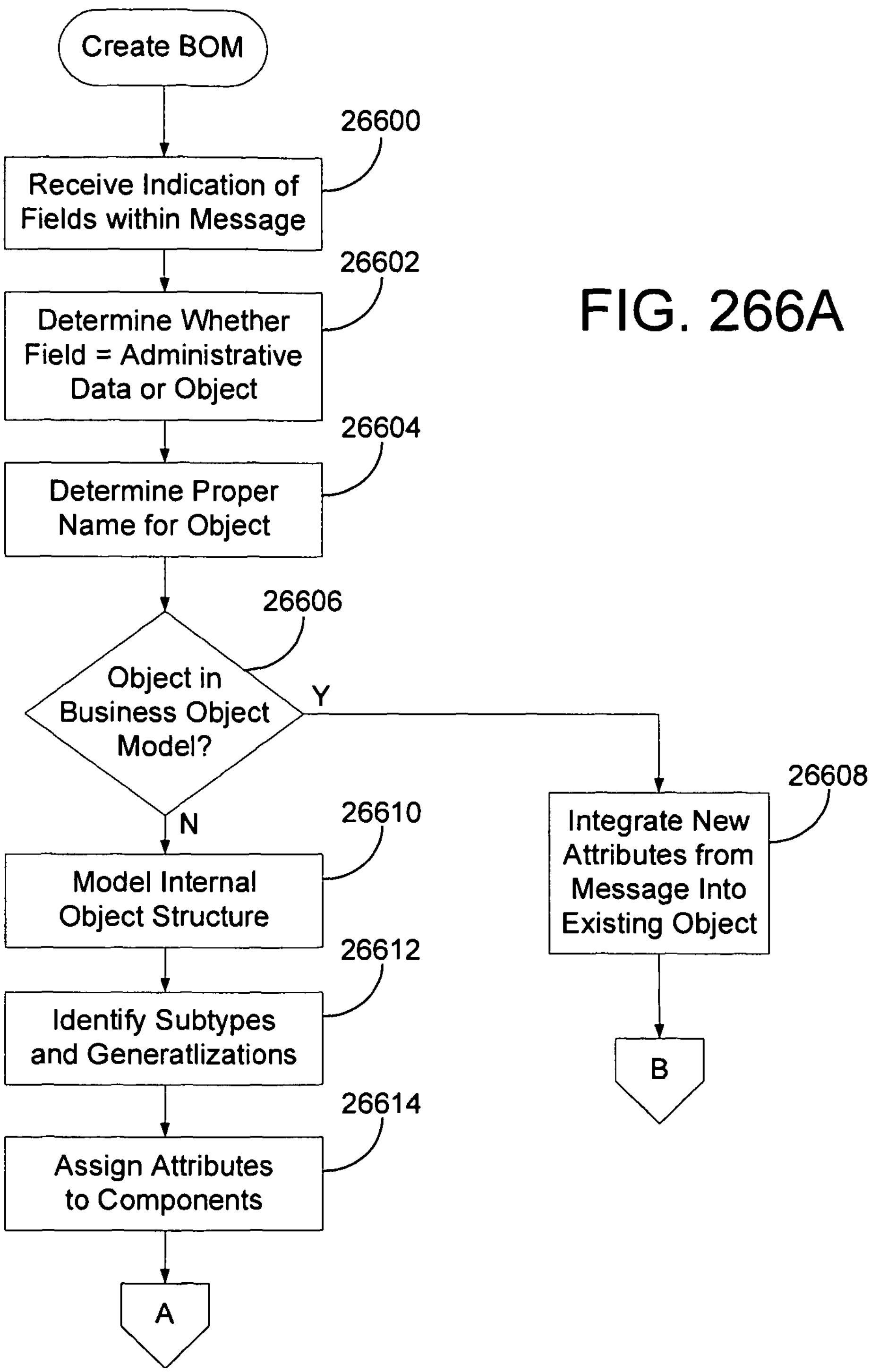
FIGS. 266A-B depict a flow diagram of the steps performed to create a business object model in accordance with methods and systems consistent with the present invention.
Figure 266B:
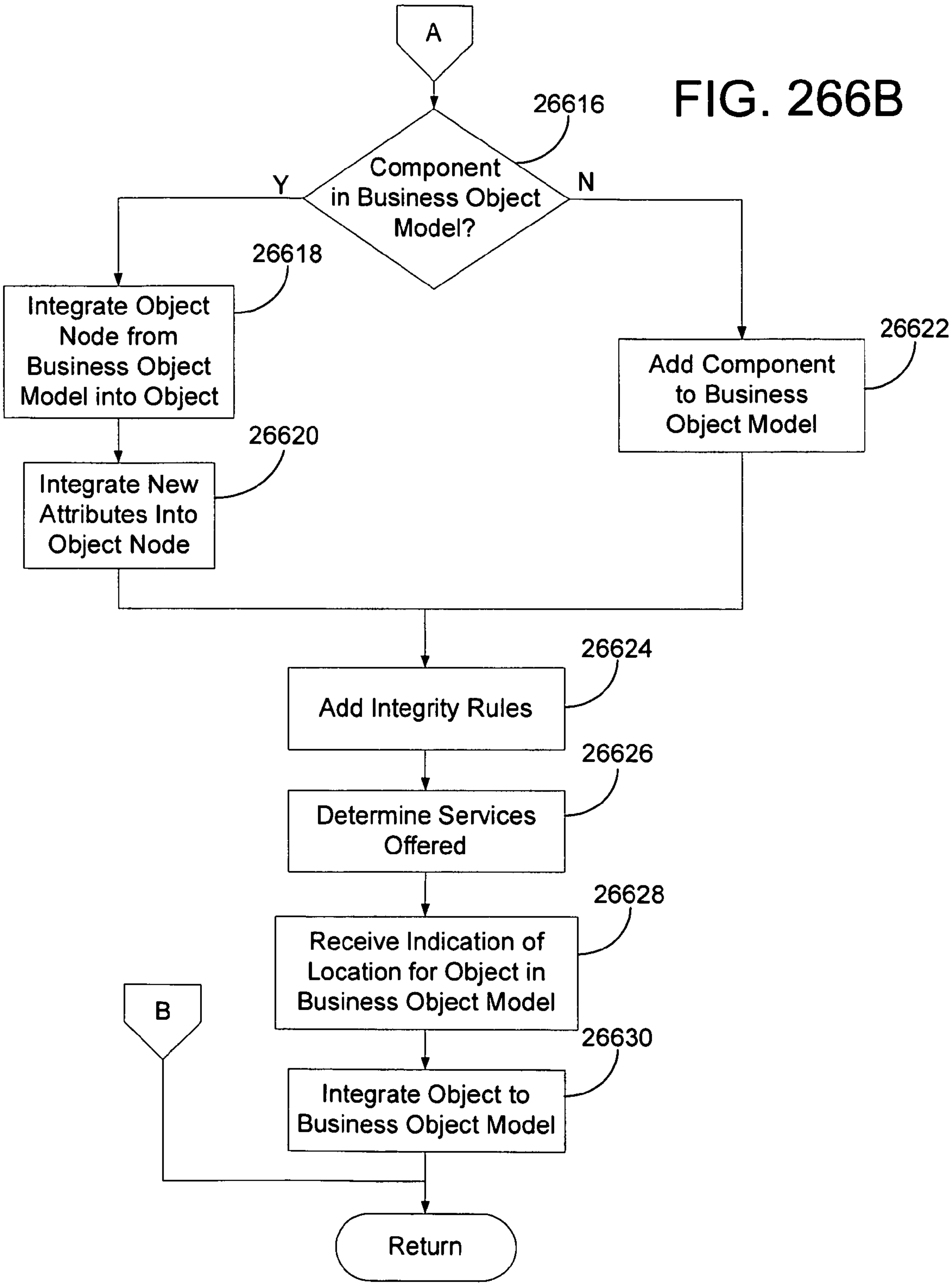

FIGS. 266A-B depict the steps performed using methods and systems consistent with the present invention to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 26600, FIG. 266A). The designers then determine whether each field relates to administrative data or is part of the object (step 26602). Thus, the first eleven fields identified below in the left column are related to administrative data, while the remaining fields are part of the object.

| | |
|---|---|
| Message ID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |

-continued

| | |
|---|---|
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |

-continued

| |
|---|
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 26604). In the example above, the proper name for the "Main Object" is "Purchase Order." After naming the object, the system that is creating the business object model determines whether the object already exists in the business object model (step 26606). If the object already exists, the system integrates new attributes from the message into the existing object (step 26608), and the process is complete.

If at step 26606 the system determines that the object does not exist in the business object model, the designers model the internal object structure (step 26610). To model the internal structure, the designers define the components. For the above example, the designers may define the components identified below.

| | | |
|---|---|---|
| ID | Pur- | |
| AdditionalID | chase | |
| PostingDate | Order | |
| LastChangeDate | | |
| AcceptanceStatus | | |
| Note | | |
| CompleteTransmission | | |
| Indicator | | |
| Buyer | | Buyer |
| BuyerOrganisationName | | |
| Person Name | | |
| FunctionalTitle | | |
| DepartmentName | | |

-continued

| | | |
|---|---|---|
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof | | |
| Message | | |
| FollowUpActivity | | |
| ItemID | Purchase Order | |
| ParentItemID | Item | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation | | |
| Name | | |
| Person Name | | |
| FunctionalTitle | | |
| DepartmentName | | |
| CountryCode | | |
| StreetPostalCode | | |
| POBox Postal Code | | |
| Company Postal Code | | |

-continued

| | |
|---|---|
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |

-continued

| | |
|---|---|
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscountTerms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation | | | 0 . . . 1 |
| | Description | | | |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetUnitPrice | 0 . . . 1 |
| | | ConfirmedPrice | | 0 . . . 1 |
| | | | NetUnitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 26612). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetUnitPrice | | 0 . . . 1 |
| | | ConfirmedPrice | | | 0 . . . 1 |
| | | | NetUnitPrice | | 0 . . . 1 |
| | | Party | | | |
| | | | BuyerParty | | 0 . . . 1 |
| | | | SellerParty | | 0 . . . 0 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 26614). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 26616, FIG. 266B). If the system determines that the component is one of the object nodes in the business object model, the system integrates a reference to the corresponding object node from the business object model into the object (step 26618). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 26620). If at step 26616, the system determines that the component is not in the business object model, the system adds the component to the business object model (step 26622).

Regardless of whether the component was in the business object model at step 26616, the next step in creating the business object model is to add the integrity rules (step 26624). There are several levels of integrity rules and constraints which should be described. These levels include consistency rules between attributes, consistency rules between components, and consistency rules to other objects. Next, the designers determine the services offered, which can be accessed via interfaces (step 26626). The services offered in the example above include PurchaseOrderCreateRequest, PurchaseOrderCancellationRequest, and PurchaseOrderReleaseRequest. The system then receives an indication of the location for the object in the business object model (step 26628). After receiving the indication of the location, the system integrates the object into the business object model (step 26630).

4. Structure of the Business Object Model

The business object model, which serves as the basis for the process of generating consistent interfaces, includes the elements contained within the interfaces. These elements are arranged in a hierarchical structure within the business object model.

Figure 267A:
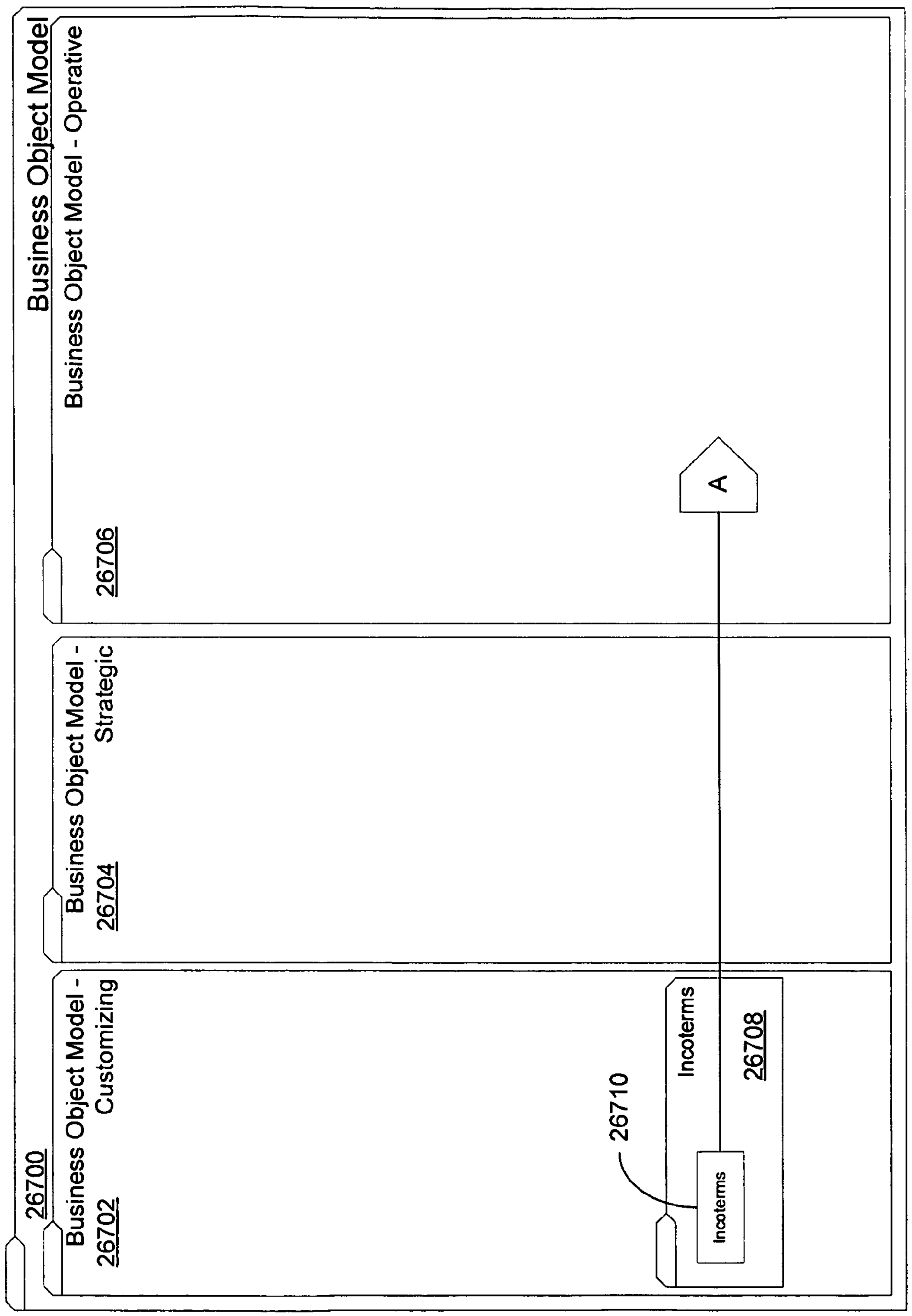
FIGS. 267A-NN depict the business object model in accordance with methods and systems consistent with the present invention.
Figure 267B:
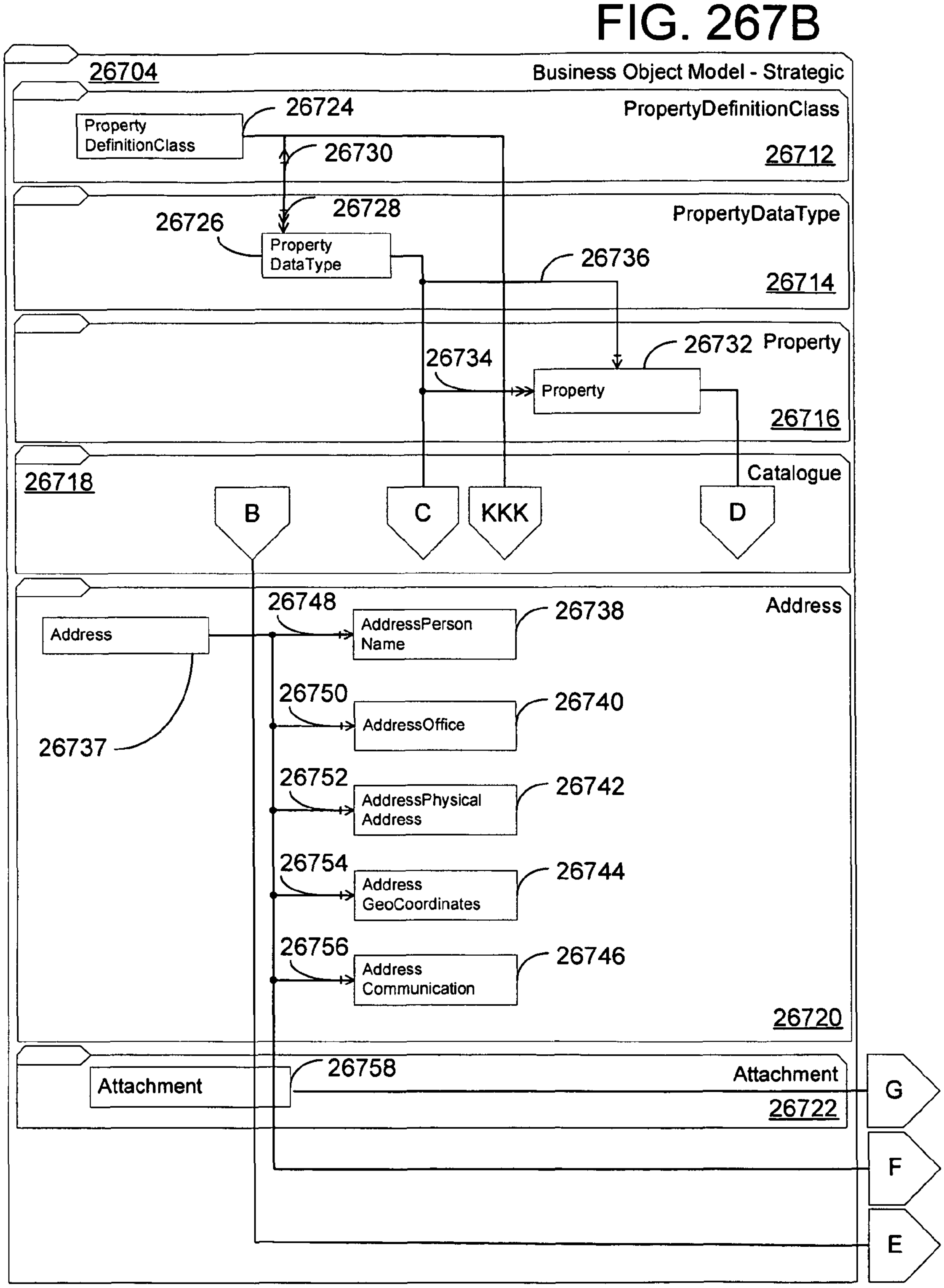
Figure 267C:
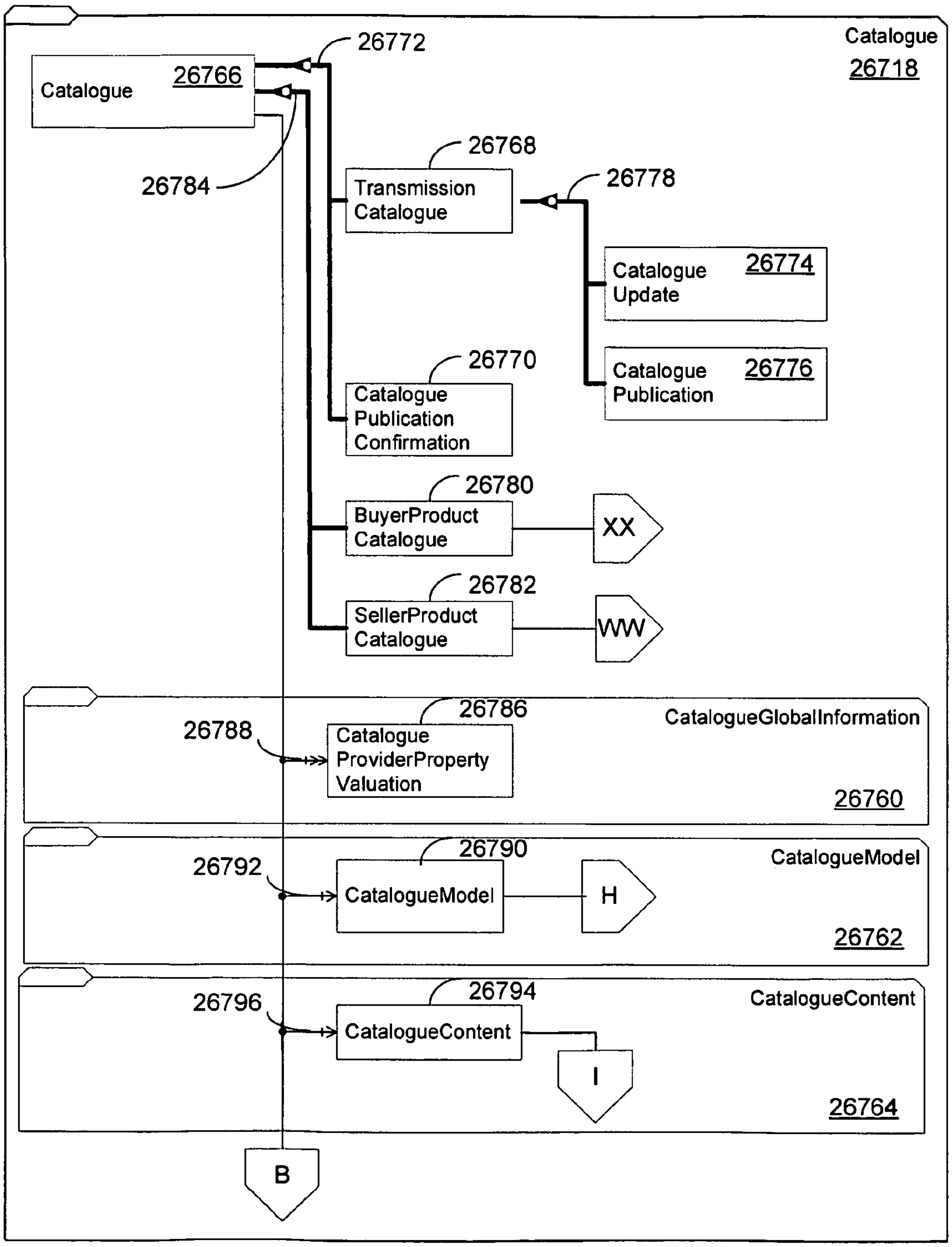
Figure 267D:
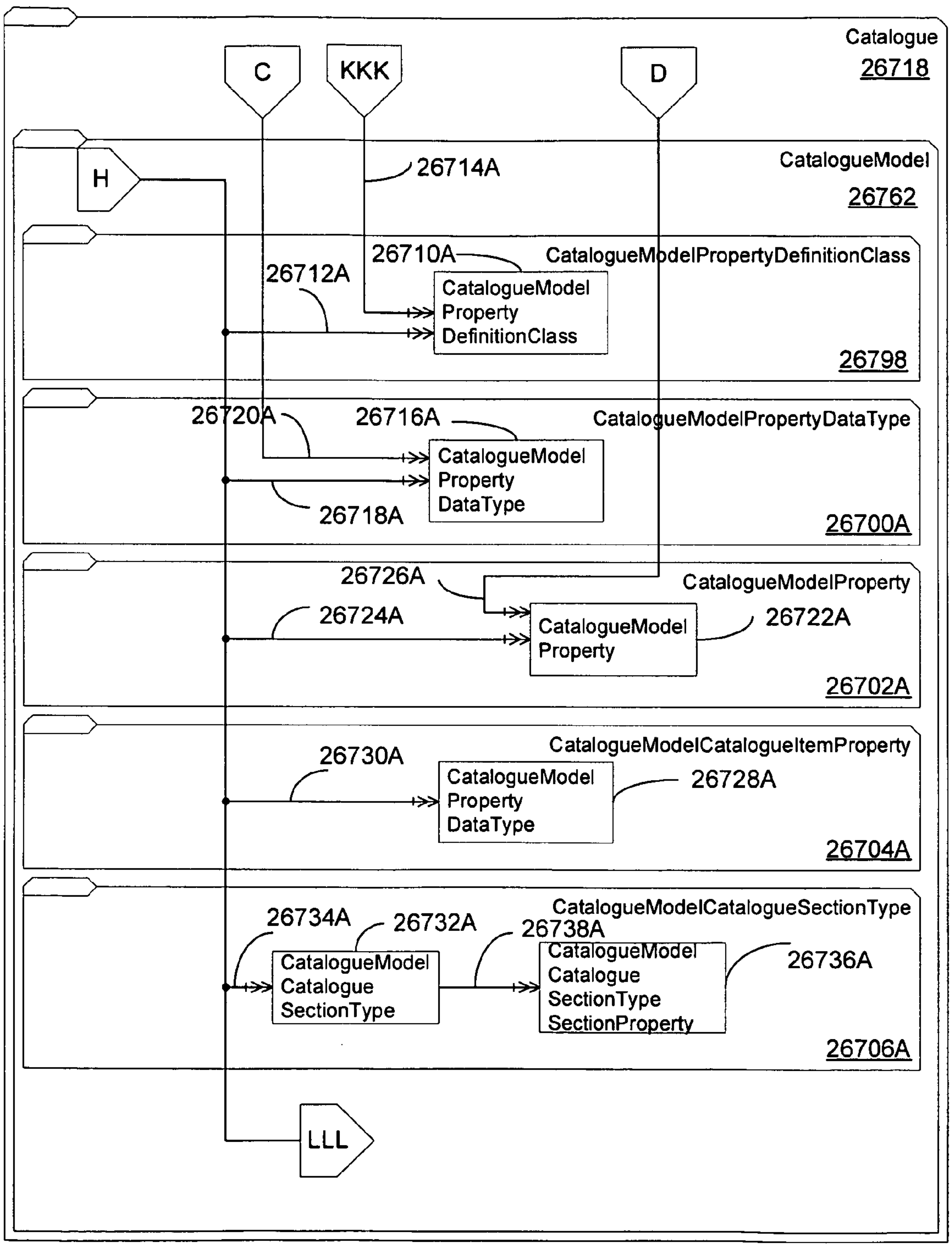
Figure 267E:
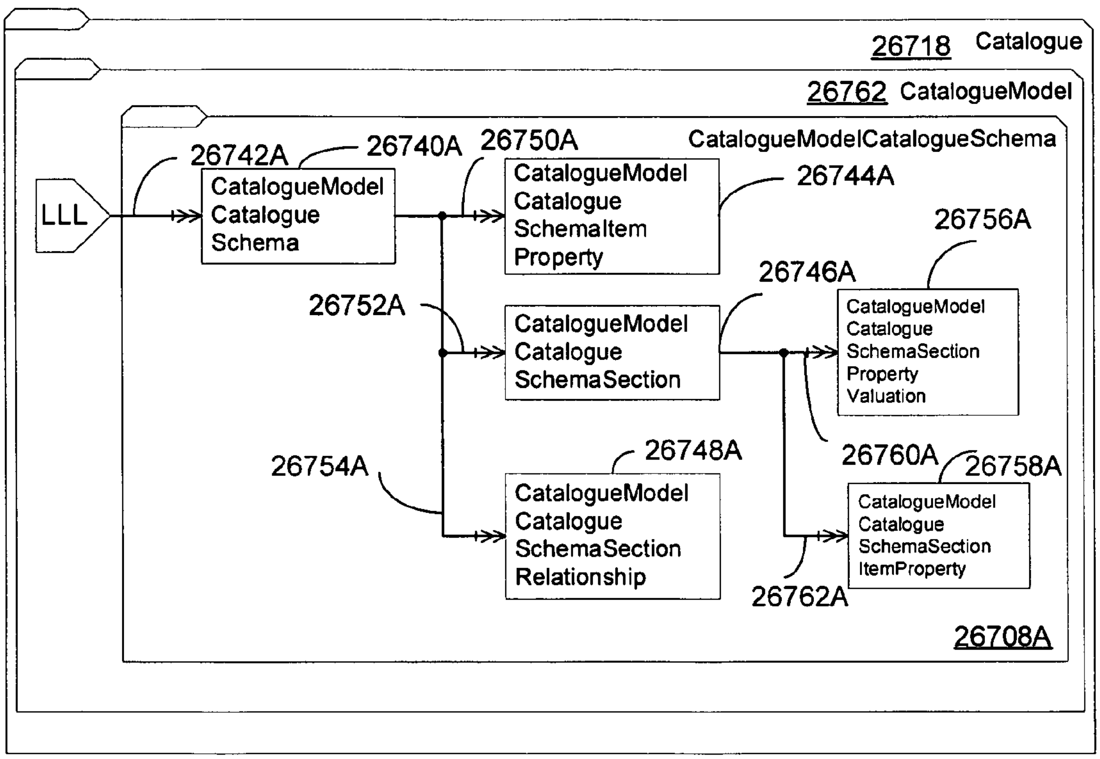

FIGS. 267A-NN depict an exemplary Business Object Model in accordance with methods and systems consistent with the present invention. The business object model includes a BusinessObjectModel package 26700, which includes a BusinessObjectModel—Customizing package 26702, a BusinessObjectModel—Strategic package 26704, and a BusinessObjectModel—Operative package 26706.

The BusinessObjectModel—Customizing package 26702 includes an Incoterms package 26708. The Incoterms package 26708 includes an Incoterms entity 26710.

The BusinessObjectModel—Strategic package 26704 includes a PropertyDefinitionClass package 26712, a PropertyDataType package 26714, a Property package 26716, a Catalogue package 26718, an Address package 26720, and an Attachment package 26722. The PropertyDefinitionClass package 26712 includes a PropertyDefinitionClass entity 26724. The PropertyDataType package 26714 includes a PropertyDataType entity 26726. There is a 1:n relationship 26728 between the PropertyDefinitionClass entity 26724 and the PropertyDataType entity 26726. There is a 1:c relationship 26730 between the PropertyDataType entity 26728 and the PropertyDefinitionClass entity 26724. Thus, in some cases, there is an instance of the PropertyDataType entity 26728 with a reference to the PropertyDefinitionClass entity 26724.

The Property package includes a Property entity 26734. There is a 1:cn relationship 26734 between the PropertyDataType entity 26728 and the Property entity 26732. There is also a 1:c referential relationship 26736 between the PropertyDataType entity 26728 and the Property entity 26736.

The Address package 26720 includes an Address entity 26737. The Address entity 26737 includes an AddressPersonName entity 26738, an AddressOffice entity 26740, an AddressPhysicalAddress entity 26742, an AddressGeoCoordinates entity 26744, and an AddressCommunication entity 26746. There is a 1:c relationship 26748 between the Address entity 26737 and the AddressPersonName entity 26738. There is a 1:c relationship 26750 between the Address entity 26737 and the AddressOffice entity 26740. There is a 1:c relationship 26752 between the Address entity 26737 and the AddressPhysicalAddress entity 26742. There is a 1:c relationship 26754 between the Address entity 26737 and the AddressGeoCoordinates entity 26744. There is a 1:c relationship 26756 between the Address entity 26737 and the AddressCommunication entity 26746.

The Attachment package 26722 includes an Attachment entity 26758.

The Catalogue package 26718 includes a CatalogueGlobalInformation package 26760, a CatalogueModel package 26762, and a CatalogueContent package 26764. The Catalogue package 26718 also includes a Catalogue entity 26766. The Catalogue entity 26766 is specialized into a TransmissionCatalogue entity 26768 and a CataloguePublicationConfirmation entity 26770, which are disjoint complete specializations 26772 of the Catalogue entity 26766. The TransmissionCatalogue entity 26768 is specialized into a CatalogueUpdate entity 26774 and a CataloguePublication entity 26776, which are disjoint complete specializations 26778 of the TransmissionCatalogue entity 26768. The Catalogue entity 26766 is also specialized into a BuyerProductCatalogue entity 26780 and a SellerProductCatalogue entity 26782, which are disjoint complete specializations 26784 of the Catalogue entity 26766.

The CatalogueGlobalInformation package 26760 includes a CatalogueProviderPropertyValuation entity 26786. There is a 1:cn relationship 26788 between the Catalogue entity 26766 and the CatalogueProviderPropertyValuation entity 26786.

The CatalogueModel package 26762 includes a CatalogueModel entity 26790. There is a 1:c relationship 26792 between the Catalogue entity 26766 and the CatalogueModel entity 26790.

The CatalogueContent package 26764 includes a CatalogueContent entity 26794. There is a 1:c relationship 26796 between the Catalogue entity 26766 and the CatalogueContent entity 26794.

The CatalogueModel package 26762 includes a CatalogueModelPropertyDefinitionClass package 26798, a CatalogueModelPropertyDataType package 26700A, a CatalogueModelProperty package 26702A, a CatalogueModelCatalogueItemProperty package 26704A, a CatalogueModelCatalogueSectionType package 26706A, and a CatalogueModelCatalogueSchema package 26708A.

The CatalogueModelPropertyDefinitionClass package 26798 includes a CatalogueModelPropertyDefinitionClass entity 26710A. There is a 1:cn relationship 26714A between the PropertyDefinitionClass entity 26724 and the CatalogueModelPropertyDefinitionClass entity 26710A, and a 1:cn relationship 26712A between the CatalogueModel entity 26790 and the CatalogueModelPropertyDefinitionClass entity 26710A.

The CatalogueModelPropertyDataType package 26700A includes a CatalogueModelPropertyDataType entity 26716A. There is a 1:cn relationship 26718A between the CatalogueModel entity 26790 and the CatalogueModelPropertyDataType entity 26716A. There is a 1:cn relationship 26720A between the PropertyDataType entity 26726 and the CatalogueModelPropertyDataType entity 26716A.

The CatalogueModelProperty package 26702A includes a CatalogueModelProperty entity 26722A. There is a 1:cn relationship 26726A between the Property entity 26732 and the CatalogueModelProperty entity 26722A. There is a 1:cn relationship 26724A between the CatalogueModel entity 26790 and the CatalogueModelProperty entity 26722A.

The CatalogueModelCatalogueItemProperty package 26704A includes a CatalogueModelPropertyDataType entity 26728A. There is a 1:cn relationship 26730A between the CatalogueModel entity 26790 and the CatalogueModelPropertyDataType entity 26728A.

The CatalogueModelCatalogueSectionType package 26706A includes a CatalogueModelCatalogueSectionType entity 26732A. There is a 1:cn relationship 26734A between the CatalogueModel entity 26790 and the CatalogueModelCatalogueSectionType entity 26732A. The CatalogueModelCatalogueSectionType entity 26732A includes a CatalogueModelCatalogueSectionTypeSectionProperty entity 26736A. There is a 1:cn relationship 26738A between the CatalogueModelCatalogueSectionType entity 26732A and the CatalogueModelCatalogueSectionTypeSectionProperty entity 26736A.

The CatalogueModelCatalogueSchema package 26708A includes a CatalogueModelCatalogueSchema entity 26740A. There is a 1:cn relationship 26742A between the CatalogueModel entity 26790 and the CatalogueModelCatalogueSchema entity 26740A. The CatalogueModelCatalogueSchema entity 26740A includes a CatalogueModelCatalogueSchemaItemProperty entity 26744A, a CatalogueModelCatalogueSchemaSection entity 26746A, and a CatalogueModelCatalogueSchemaSectionRelationship entity 26748A. There is a 1:cn relationship 26750A between the CatalogueModelCatalogueSchema entity 26740A and the CatalogueModelCatalogueSchemaItemProperty entity 26744A. There is a 1:cn relationship 26752A between the CatalogueModelCatalogueSchema entity 26740A and the CatalogueModelCatalogueSchemaSection entity 26746A. There is a 1:cn relationship 26754A between the CatalogueModelCatalogueSchema entity 26740A and the CatalogueModelCatalogueSchemaSectionRelationship entity 26748A.

The CatalogueModelCatalogueSchemaSection entity 26746A includes a CatalogueModelCatalogueSchemaSectionPropertyValuation entity 26756A and a CatalogueModelCatalogueSchemaSectionItemProperty entity 26758A. There is a 1:cn relationship 26760A between the CatalogueModelCatalogueSchemaSection entity 26746A and the CatalogueModelCatalogueSchemaSectionPropertyValuation entity 26756A. There is a 1:cn relationship 26762A between the CatalogueModelCatalogueSchemaSection entity 26746A and the CatalogueModelCatalogueSchemaSectionItemProperty entity 26758A.

The CatalogueContent package 26764 includes a CatalogueContentCatalogueItem package 26764A and a CatalogueContentCatalogueView package 26766A.

The CatalogueContentCatalogueItem package 26764A includes a CatalogueContentCatalogueItem entity 26768A and a CatalogueContentCatalogueItemRelationship entity 26774A. There is a 1:cn relationship 26772A between the CatalogueContent entity 26794 and the CatalogueContent-CatalogueItem entity 26768A. There is a 1:cn relationship 26774A between the CatalogueContent entity 26794 and the CatalogueContentCatalogueItemRelationship entity 26770A. The CatalogueContentCatalogueItem entity 26768A includes a CatalogueContentCatalogueItemDescription entity 26776A, a CatalogueContent-CatalogueItemPropertyValuation entity 26778A, and a CatalogueContentCatalogueItemClassification entity 26780A. There is a 1:cn relationship 26782A between the Catalogue-ContentCatalogueItem entity 26768A and the Catalogue-ContentCatalogueItemDescription entity 26776A. There is a 1:cn relationship 26784A between the CatalogueContent-CatalogueItem entity 26768A and the CatalogueContent-CatalogueItemPropertyValuation entity 26778A. There is a 1:cn relationship 26786A between the CatalogueContent-CatalogueItem entity 26768A and the CatalogueContent-CatalogueItemClassification entity. 26780A.

The CatalogueContentCatalogueView package 26766A includes a CatalogueContentCatalogueView entity 26788A. There is a 1:cn relationship 26790A between the Catalogue-Content entity 26794 and the CatalogueContentCatalogue-View entity 26788A.

The CatalogueContentCatalogueView entity 26788A includes a CatalogueContentCatalogueViewSchema entity 26792A, a CatalogueContentCatalogueViewItem entity 26794A, a CatalogueContentCatalogueViewItemRelationshipType entity 26796A, and a Catalogue-ContentCatalogueViewExcludedProperty entity 26798A. There is a 1:cn relationship 26700B between the Catalogue-ContentCatalogueView entity 26788A and the Catalogue-ContentCatalogueViewSchema entity 26792A. There is a 1:cn relationship 26702B between the CatalogueContent-CatalogueView entity 26788A and the CatalogueContent-CatalogueViewItem entity 26794A. There is a 1:cn relationship 26704B between the CatalogueContentCatalogueView entity 26788A and the CatalogueContentCatalogueViewItemRelationshipType entity 26796A. There is a 1:cn relationship 26706B between the CatalogueContentCatalogue-View entity 26788A and the CatalogueContentCatalogueViewExcludedProperty entity 26798A.

The CatalogueContentCatalogueViewSchema entity 26792A includes a CatalogueContentCatalogue-ViewSchemaSection entity 26780A. There is a 1:cn relationship 26710B between the CatalogueContentCatalogue-ViewSchema entity 26792A and the CatalogueContentCatalogueViewSchemaSection entity 26780A.

The Business Object Model Operative package 26706 includes a BusinessTransactionDocument package 26712B, and a CataloguePublicationTransmission package 26714B.

The BusinessTransactionDocument package 26712B includes a BTDCreditWorthinessInformation package 26718B, a BTDCreditAgencyReportQueryService package 26720B, a BTDLegalInformation package 26722B, a BTD-Scheduling package 26724B, a BTDTransportInformation package 26726B, a BTDHandlingUnit package 26728B, a BTDLog package 26730B, a BTDFollowUpBusinessTransactionDocument package 26732B, a BTDFollowUpMessage package 26734B, a BTDLoanPaymentPlan pakcage 26735B, a BTDItem package 26736B, a BTDPriceInformation package 26738B, a BTDPaymentInformation package 26740B, a BTDTax package 26742B, a BTDDeliveryInformation package 26744B, a BTDDeliveryExecutionInformation package 26746B, a BTDAccountingObjectSet package 26748B, a BTDBusinessDocumentObjectReference package 26750B, a BTDAttachment package 26752B, a BTDDescription package 26754B, a BTDParty package 26756B, a BTDLocation package 26758B, a BTDProductInformation package 26759B, a BTDLoanConditionInformation package 26760B, and a PersonnelTimeSubsheet package 26761B.

The BusinessTransactionDocument package 26712B also includes a BusinessTransactionDocument entity 26762B. The BusinessTransactionDocument entity 26762B is specialized into an InventoryChange entity 26764B, a SourceOfSupply entity 26766B, a CreditAgencyReportQuery entity 26768B, a CreditAgencyReport entity 26770B, a CreditWorthinessQuery entity 26772B, a CreditWorthiness entity 26774B, a ProductActivity entity 26776B, a ProductDemandInfluencingEvent entity 26778B, a ProductForecast entity 26780B, a RequestForQuotation (RFQ) entity 26782B, an RFQResult entity 26784B, a Quote entity 26786B, a SalesContract entity 26788B, a PurchaseContract entity 26790B, a SchedulingAgreement entity 26792B, a PurchaseRequirement entity 26794B, a PurchaseRequirementConfirmation entity 26796B, a PurchaseOrder entity 26798B, a SalesOrder entity 26700C, a SalesOrderFulfillment entity 26702C, a ServiceAcknowledgement entity 26704C, a DeliveryExecution-Request entity 26706C, a Delivery entity 26708C, a Shipment entity 26710C, a PaymentDue entity 26712C, an InvoiceDue entity 26714C, an InvoiceDueCancellation entity 26716C, an Invoice entity 26718C, an InvoiceIssued entity 26720C, an InvoiceAccounting entity 26722C, an AccountingCancellation entity 26724C, a VendorInvoice entity 26726C, and a TaxDue entity 26728C, which are disjoint complete specializations 26730C of the BusinessTransactionDocument entity 26762B.

The ProductForecast entity 26780B is specialized into a ProductForecastNotification entity 26732C and a Product-ForecastRevision entity 26734C, which are disjoint complete specializations 26736C of the ProductForecast entity 26780B.

The RFQ entity 26782B is specialized into a RFQUpdate entity 26738C and a RFQCancellation entity 26740C, which are nondisjoint complete specializations 26742C of the RFQ entity 26782B. The RFQUpdate entity 26738C is specialized into a RFQRequest entity 26744C and a RFQCharge entity 26746C, which are nondisjoint complete specializations 26748C of the RFQUpdate entity 26738C.

The PurchaseOrder entity 26798B is specialized into a PurchaseOrderUpdate entity 26750C, a PurchaseOrderCancellation entity 26752C, and a PurchaseOrderInformation entity 26754C, which are nondisjoint complete specializations 26756C of the PurchaseOrder entity 26798B. The PurchaseOrderUpdate entity 26750C is specialized into a PurchaseOrderRequest entity 26758C, a PurchaseOrderChange entity 26760C, and a PurchaseOrderConfirmation entity 26762C, which are nondisjoint complete specializations 26764C of the PurchaseOrderUpdate entity 26750C.

The Delivery entity 26708C is specialized into a PendingDelivery entity 26766C, an InboundDelivery entity 26768C, a ReceivedDelivery entity 26770C, a DeliveryInformation entity 26772C, and a DespatchedDeliveryNotification entity 26774C, which are nondisjoint complete specializations 26776C of the Delivery entity 26708C.

The AccountingCancellation entity 26724C is specialized into an InventoryChargeAccountingCancellation entity 26778C and an InvoiceAccountingCancellation entity 26780C, which are disjoint complete specializations 26782C of the AccountingCancellation entity 26724C.

The BTDCreditWorthinessInformation package 26718B includes a BTDCreditRating entity 26784C, a BTDCreditRiskClass entity 26786C, a BTDCreditAgencyReportScoring entity 26788C, and a BTDCreditLimit entity 26790C. There is a 1:1 relationship 26792C between the BusinessTransactionDocument entity 26762B and the BTDCreditRating entity 26784C. There is a 1:c relationship 26794C between the BusinessTransactionDocument entity 26762B and the BTDCreditRiskClass entity 26786C. There is a 1:cn relationship 26796C between the BusinessTransactionDocument entity 26762B and the BTDCreditAgencyReportScoring entity 26788C. There is a 1:cn relationship 26798C between the BusinessTransactionDocument entity 26762B and the BTDCreditLimit entity 26790C.

The BTDCreditAgencyReportQueryService package 26720B includes a CreditAgencyReportQueryService entity 26700D. There is a 1:1 relationship 26702D between the BusinessTransactionDocument entity 26762B and the CreditAgencyReportQueryService entity 26700D.

The BTDLegalInformation package 26722B includes a BTDLegalEvent entity 26704D. There is a 1:cn relationship 26706D between the BusinessTransactionDocument entity 26762B and the BTDLegalEvent entity 26704D.

The BTDScheduling package 26724B includes a BTDScheduling entity 26708D. There is a 1:c relationship 26710D between the BusinessTransactionDocument entity 26762B and the BTDScheduling entity 26708D.

The BTDTransportInformation package 26726B includes a BTDTransportMeans entity 26712D and a BTDTransportTracking entity 26714D. There is a 1:c relationship 26716D between the BusinessTransactionDocument entity 26762B and the BTDTransportMeans entity 26712D. There is a 1:c relationship 26718D between the BusinessTransactionDocument entity 26762B and the BTDTransportTracking entity 26714D.

The BTDHandlingUnit package 26728B includes a BTDHandlingUnit entity 26720D. There is a 1:cn relationship 26722D between the BusinessTransactionDocument entity 26762B and the BTDHandlingUnit entity 26720D.

The BTDLog package 26730B includes a BTDCreationLog entity 26724D. There is a 1:c relationship 26726D between the BusinessTransactionDocument entity 26762B and the BTDCreationLog entity 26724D. The BTDCreationLog entity 26724D includes a BTDCreationLogItem entity 26728D. There is a 1:n relationship 26730D between the BTDCreationLog entity 26724D and the BTDCreationLogItem entity 26728D.

The BTDFollowUpBusinessTransactionDocument package 26732B includes a BTDFollowUpPurchaseOrder entity 26732D and a BTDFollowUpPurchasingContract entity 26734D. There is a 1:c relationship 26736D between the BusinessTransactionDocument entity 26762B and the BTDFollowUpPurchaseOrder entity 26732D. There is a 1:c relationship 26738D between the BusinessTransactionDocument entity 26762B and the BTDFollowUpPurchasingContract entity 26734D.

The BTDFollowUpMessage package 26734B includes a BTDFollowUpPurchaseOrderConfirmation entity. 26740D, a BTDFollowUpSalesOrderFulfillmentConfirmation entity 26742D, a BTDFollowUpServiceAcknowledgementRequest entity 26744D, a BTDFollowUpDespatchedDeliveryNotification entity 26746D, a BTDFollowUpInvoiceRequest entity 26748D, a BTDFollowUpBillingDueNotification entity 26750D, and a BTDFollowUpInvoiceDueNotification entity 26752D. There is a 1:c relationship 26754D between the BusinessTransactionDocument entity 26762B and the BTDFollowUpPurchaseOrderConfirmation entity 26740D. There is a 1:c relationship 26756D between the BusinessTransactionDocument entity 26762B and the BTDFollowUpSalesOrderFulfillmentConfirmation entity 26742D. There is a 1:c relationship 26758D between the BusinessTransactionDocument entity 26762B and the BTDFollowUpServiceAcknowledgementRequest entity 26744D. There is a 1:c relationship 26760D between the BusinessTransactionDocument entity 26762B and the BTDFollowUpDespatchedDeliveryNotification entity 26746D. There is a 1:c relationship 26761D between the BusinessTransactionDocument entity 26762B and the BTDFollowUpInvoiceRequest entity 26748D. There is a 1:c relationship 26762D between the BusinessTransactionDocument entity 26762B and the BTDFollowUpBillingDueNotification entity 26750D. There is a 1:c relationship 26763D between the BusinessTransactionDocument entity 26762B and the BTDFollowUpInvoiceDueNotification entity 26752D.

The BTDLoanPaymentPlan package 26735B includes a BTDLoanPaymentPlan entity 26764D. There is a 1:c relationship 26765D between the BusinessTransactionDocument entity 26762B and the BTDLoanPaymentPlan entity 26764D. The BTDLoanPaymentPlan entity 26764D includes a BTDLoanPaymentPlanItem entity 26766D. There is a 1:n relationship between the BTDLoanPaymentPlan entity 26764D and the BTDLoanPaymentPlanItem entity 26766D.

The BTDItem package 26736B includes a BTDItem entity 26768D. There is a 1:cn relationship between the BusinessTransactionDocument entity 26762B and the BTDItem entity 26768D. BTDItems are arranged hierarchically using a Hierarchy Relationship 26772D. The Hierarchy Relationship 26772D is the relationship between a sub-item and a higher-level parent item in an item hierarchy. There is a 1:cn relationship between the BTDItem entity 26768D and its subordinate entities, and a 1:c relationship between the BTDItem entity 26768D and its superordinate entities.

The BTDItem entity 26768D is specialized into an InventoryChangeItem entity 26778D, a ProductActivityItem entity 26780D, an InvoiceAccountingItem entity 26782D, a ProductDemandInfluencingEventItem entity 26784D, a ProductForecastItem entity 26786D, a RequestForQuotationItem entity 26788D, an RFQResultItem entity 26790D, a QuoteItem entity 26792D, a PurchaseRequirementItem entity 26794D, a PurchaseRequirementConfirmationItem entity 26796D, a PurchaseOrderItem entity 26798D, a SalesOrderFulfillmentItem entity 26700E, a ServiceAcknowledgementItem entity 26702E, a DeliveryExecutionRequestItem entity 26704E, a DeliveryItem entity 26706E, a PaymentDueItem entity 26708E, an InvoiceDueItem entity 26710E, an InvoiceItem entity 26712E, a TaxDueItem entity 26714E, an InvoiceIssuedItem entity 26716E, which are disjoint complete specializations 26718E of the BTDItem entity 26768D.

The InvoiceAccountingItem entity 26782D is specialized into an InvoiceAccountingExpenseRevenueItem entity 26720E, an InvoiceAccountingDueItem entity 26722E, and an InvoiceAccountingTaxItem entity 26724E, which are disjoint complete specializations 26726E of the InvoiceAccountingItem entity 26782D.

The ProductForecastItem entity 26786D is specialized into a ProductForecastNotificationItem entity 26728E and a ProductForecastRevisionItem entity 26730E, which are disjoint complete specializations 26732E of the ProductForecastItem entity 26786D.

The PurchaseOrderItem entity 26798D is specialized into a PurchaseOrderInformationItem entity 26734E, which is a disjoint complete specialization 26736E of the ProductForecastItem entity 26798D.

The DeliveryItem entity 26706E is specialized into a DespatchedDeliveryItem entity 26738E, a ReceivedDeliveryItem entity 26740E, and a DeliveryInformationItem entity 26742E, which are disjoint complete specializations 26744E of the DeliveryItem entity 26706E.

The BTDItem package 26736B includes a BTDItemScheduleLine package 26746E. The BTDItemScheduleLine package 26746E includes a BTDItemScheduleLine entity 26762E. There is a 1:cn relationship 26764E between the BTDItem entity 26768D and the BTDItemScheduleLine entity 26762E.

The BTDItemScheduleLine entity 26762E includes a BTDItemScheduleLineDeliveryPeriod entity 26770E. There is a 1:c relationship 26772E between the BTDItemScheduleLine entity 26762E and the BTDItemScheduleLineDeliveryPeriod entity 26770E. The BTDItemScheduleLine entity 26762E is specialized into a BTDConfirmedScheduleLine entity 26766E, which is a disjoint incomplete specialization 26768E of the BTDItemScheduleLine entity 26762E.

The BTDItem package 26736B also includes a BTDIBatch package 26748E, a BTDIRelease package 26750E, a BTDIPromotion package 26752E, a BTDIInventory package 26754E, a PurchaseRequirementConfirmationItemExecutingPurchaseOrder package 26756E, an InventoryChangeItemInbound package 26758E, and an InventoryChangeItemOutbound package 26760E. The BTDIBatch package 26748E includes a BTDIBatch entity 26774E. There is a 1:c relationship 26776E between the BTDItem entity 26768D and the BTDIBatch entity 26774E. The BTDIRelease package 26750E includes a BTDIRelease entity 26778E and a BTDIPreviousRelease entity 26780E. There is a 1:c relationship 26782E between the BTDItem entity 26768D and the BTDIRelease entity 26778E. There is a 1:c relationship 26784E between the BTDItem entity 26768D and the BTDIPreviousRelease entity 26780E. The BTDIPromotion entity 26752E includes a BTDIPromotion entity 26786E. There is a 1:c relationship 26788E between the BTDItem entity 26768D and the BTDIPromotion entity 26786E. The BTDIInventory package 26754E includes a BTDIInventory entity 26790E and a BTDIConsignmentInventory entity 26792E. There is a 1:c relationship 26794E between the BTDItem entity 26768D and the BTDIInventory entity 26790E. There is a 1:c relationship 26796E between the BTDItem entity 26768D and the BTDIConsignmentInventory entity 26792E. The PurchaseRequirementConfirmationItemExecutingPurchaseOrder package 26756E includes a PurchaseRequirementConfirmationItemExecutingPurchaseOrder entity 26798E. There is a 1:cn relationship 26700F between the BTDItem entity 26768D and the PurchaseRequirementConfirmationItemExecutingPurchaseOrder entity 26798E. The InventoryChangeItemInbound package 26758E includes an InventoryChangeItemInbound entity 26702F. There is a 1:c relationship 26704F between the BTDItem entity 26768D and the InventoryChangeItemInbound entity 26702F. The InventoryChangeItemOutbound package 26760E includes an InventoryChangeItemOutbound entity 26706F. There is a 1:c relationship 26708F between the BTDItem entity 26768D and the InventoryChangeItemOutbound entity 26706F.

The BTDPriceInformation package 26738B includes a BTDProcurementCostUpperLimit entity 26710F, a BTDPrice entity 26712F and a BTDConfirmedPrice entity 26714F. There is a 1:c relationship 26716F between the BTDItem entity 26768D and the BTDProcurementCostUpperLimit entity 26710F. There is a 1:c relationship 26718F between the BTDItem entity 26768D and the BTDPrice entity 26712F. There is a 1:cn relationship 26720F between the BusinessTransactionDocument entity 26762B and the BTDPrice entity 26712F. There is a 1:c relationship 26722F between the BTDItem entity 26768D and the BTDConfirmedPrice entity 26714F. The BTDPrice entity 26712F includes a BTDPriceComponent entity 26724F and a BTDPriceScale entity 26726F. There is a 1:cn relationship 26728F between the BTDPrice entity 26712F and the BTDPriceComponent entity 26724F. There is a 1:c relationship 26730F between the BTDPrice entity 26712F and the BTDPriceScale entity 26726F. The BTDPriceScale entity 26726F includes a BTDPriceScaleLine entity 26732F. There is a 1:n relationship 26734F between the BTDPriceScale entity 26726F and the BTDPriceScaleLine entity 26732F.

The BTDPaymentInformation package 26740B includes a BTDCashDiscountTerms entity 26736F and a BTDPaymentForm entity 26738F. There is a 1:c relationship 26740F between the BTDItem entity 26768D and the BTDCashDiscountTerms entity 26736F. There is a 1:c relationship 26742F between the BTDCashDiscountTerms entity 26736F and the BTDItem entity 26768D. There is a 1:c relationship 26744F between the BusinessTransactionDocument entity 26762B and the BTDCashDiscountTerms entity 26736F. There is a 1:c relationship 26746F between the BTDItem entity 26768D and the BTDPaymentForm entity 26738F. There is a 1:c relationship 26748F between the BTDPaymentForm entity 26738F and the BTDItem entity 26768D. There is a 1:c relationship 26750F between the BusinessTransactionDocument entity 26762B and the BTDPaymentForm entity 26738F.

The BTDTax package 26742B includes a BTDProductTax entity 26764F. There is a 1:cn relationship 26766F between the BTDItem entity 26768D and the BTDProductTax entity 26764F. There is a 1:cn relationship 26768F between the BusinessTransactionDocument entity 26762B and the BTDProductTax entity 26764F.

The BTDDeliveryInformation package 26744B includes a BTDDeliveryTerms entity 26770F, a DeliveryItemVariance entity 26772F, and a BTDDeliveryControl entity 26774F. There is a 1:c relationship 26776F between the BTDItem entity 26768D and the BTDDeliveryTerms entity 26770F. There is a 1:c relationship 26778F between the BTDDeliveryTermns entity 26770F and the BTDItem entity 26768D. There is a 1:c relationship 26780F between the BusinessTransactionDocument entity 26762B and the BTDDeliveryTerms entity 26770F. There is a 1:cn relationship 26782F between the BTDItem entity 26768D and the DeliveryItemVariance entity 26772F. There is a 1:c relationship 26784F between the BTDItem entity 26768D and the BTDDeliveryControl entity 26774F. There is a 1:c relationship 26786F between the BTDDeliveryControl entity 26774F and the BTDItem entity 26768D. There is a 1:c relationship 26788F between the BusinessTransactionDocument entity 26762B and the BTDDeliveryControl entity 26774F.

The BTDDeliveryTerms entity 26770F includes a BTDDeliveryTermsIncoterms entity 26790F, a BTDDeliveryTermsPartialDelivery entity 26792F, a BTDDeliveryTermsQuantityTolerance entity 26794F, a BTDDeliveryTermsTransport entity 26796F, and a BTDDeliveryTermsDescription entity 26798F. There is a 1:cn relationship 26700G between the Incoterms entity 26710 and the BTDDeliveryTermsIncoterms entity 26790F. There is a 1:c relationship 26702G between the BTDDeliveryTerms entity 26770F and the BTDDeliveryTermsIncoterms entity 26790F. There is a 1:c relationship 26704G between the BTDDeliveryTerms entity 26770F and the BTDDeliveryTermsPartialDelivery entity 26792F. There is a 1:c relationship 26706G between the BTDDeliveryTerms entity 26770F and the BTDDeliveryTermsQuantityTolerance entity 26794F. There is a 1:c relationship 26708G between the BTDDeliveryTerms entity 26770F and the BTDDeliveryTermsTransport entity 26796F. There is a 1:c relationship 26710G between the BTDDeliveryTerms entity 26770F and the BTDDeliveryTermsDescription entity 26798F.

The BTDDeliveryExecutionInformation package 26746B includes a DeliveryExecutionPeriod entity 26712G and a DeliveryExecutionStatus entity 26714G. There is a 1:cn relationship 26716G between the BTDItem entity 26768D and the DeliveryExecutionPeriod entity 26712G. There is a 1:c relationship 26718G between the DeliveryExecutionPeriod entity 26712G and the BTDItem entity 26768D. There is a 1:cn relationship 26720G between the BusinessTransactionDocument entity 26762B and the DeliveryExecutionPeriod entity 26712G. There is a 1:cn relationship 26722G between the BTDItem entity 26768D and the DeliveryExecutionStatus entity 26714G. There is a 1:c relationship 26723G between the DeliveryExecutionStatus entity 26714G and the BTDItem entity 26768D. There is a 1:cn relationship 26724G between the BusinessTransactionDocument entity 26762B and the DeliveryExecutionStatus entity 26714G.

The BTDAccountingObjectSet package 26748B includes a BTDAccountingObjectSet entity 26726G. There is a 1:c relationship 26728G between the BTDItem entity 26768D and the BTDAccountingObjectSet entity 26726G.

The BTDBusinessDocumentObjectReference package 26750B includes a BTDRequestForQuotationReference entity 26730G, a BTDSchedulingAgreementReference entity 26732G, a BTDSellerProductCatalogueReference entity 26734G, a BTDBuyerProductCatalogueReference entity 26736G, a BTDPurchasingContractReference entity 26738G, a BTDSalesContractReference entity 26740G, a BTDOriginPurchaseOrderReference entity 26742G, a BTDQuoteReference entity 26744G, a BTDPurchaseOrderReference entity 26746G, a BTDSalesOrderReference entity 26748G, a BTDServiceAcknowledgementReference entity 26750G, a BTDPendingDeliveryReference entity 26752G, a BTDDeliveryReference entity 26754G, a BTDInboundDeliveryReference entity 26756G, a BTDDespatchedDeliveryNotificationReference entity 26758G, a BTDShipmentReference entity 26760G, a BTDOriginInvoiceReference entity 26762G, a BTDOriginVendorInvoiceReference entity 26764G, a BTDPrimaNotaReference entity 26766G, and a BTDOriginPrimaNotaReference entity 26768G. There is a 1:c relationship 26770G between the BusinessTransactionDocument entity 26762B and the BTDRequestForQuotationReference entity 26730G. There is a 1:cn association 26772G between the RFQ Specialization 26782B and the BTDRequestForQuotationReference entity 26730G. There is a 1:c relationship 26774G between the BTDItem entity 26768D and the BTDSchedulingAgreementReference entity 26732G, and a 1:c relationship 26776G between the BTDSchedulingAgreementReference entity 26732G and the BTDItem entity 26768D. There is a 1:c relationship 26778G between the BusinessTransactionDocument entity 26762B and the BTDSchedulingAgreementReference entity 26732G. There is a 1:cn association 26780G between the SchedulingAgreement entity 26792B and the BTDSchedulingAgreementReference entity 26732G. There is a 1:c relationship 26782G between the BTDItem entity 26768D and the BTDSellerProductCatalogueReference entity 26734G. There is a 1:cn association 26784G between the SellerProductCatalogue entity 26782 and the BTDSellerProductCatalogueReference entity 26734G. There is a 1:c relationship 26786G between the BTDItem entity 26768D and the BTDBuyerProductCatalogueReference entity 26736G. There is a 1:cn association 26788G between the BuyerProductCatalogue entity 26780 and the BTDBuyerProductCatalogueReference entity 26736G. There is a 1:cn relationship 26790G between the BTDItem entity 26768D and the BTDPurchasingContractReference entity 26738G, and a 1:c relationship 26792G between the BTDPurchasingContractReference entity 26738G and the BTDItem entity 26768D. There is a 1:c relationship 26794G between the BusinessTransactionDocument entity 26762B and the BTDPurchasingContractReference entity 26738G. There is a 1:cn association 26796G between the PurchaseContract entity 26790B and the BTDPurchasingContractReference entity 26738G. There is a 1:cn relationship 26798G between the BTDItem entity 26768D and the BTDSalesContractReference entity 26740G. There is a 1:cn association 26700H between the SalesContract entity 26788B and the BTDSalesContractReference entity 26740G. There is a 1:c relationship 26702H between the BTDItem entity 26768D and the BTDOriginPurchaseOrderReference entity 26742G. There is a 1:cn association 26704H between the PurchaseOrderRequest entity 26758C and the BTDOriginPurchaseOrderReference entity 26742G.

There is a 1:c relationship 26706H between the BTDItem entity 26768D and the BTDQuoteReference entity 26744G, and a 1:c relationship 26708H between the BTDQuoteReference entity 26744G and the BTDItem entity 26768D. There is a 1:c relationship 26710H between the BusinessTransactionDocument entity 26762B and the BTDQuoteReference entity 26744G. There is a 1:cn association 26712H between the Quote entity 26786B and the BTDQuoteReference entity 26744G. There is a 1:cn relationship 26714H between the BTDItem entity 26768D and the BTDPurchaseOrderReference entity 26746G. There is a 1:cn association 26716H between the PurchaseOrderRequest entity 26758C and the BTDPurchaseOrderReference entity 26746G. There is a 1:cn relationship 26718H between the BTDItem entity 26768D and the BTDSalesOrderReference entity 26748G. There is a 1:cn association 26720H between the SalesOrder entity 26700C and the BTDSalesOrderReference entity 26748G. There is a 1:c relationship 26722H between the BTDItem entity 26768D and the BTDServiceAcknowledgementReference entity 26750G. There is a 1:cn association 26724H between the ServiceAcknowledgement entity 26704C and the BTDServiceAcknowledgementReference entity 26750G. There is a 1:cn relationship 26726H between the BTDItem entity 26768D and the BTDPendingDeliveryReference entity 26752G. There is a 1:cn association 26728H between the PendingDelivery entity 26766C and the BTDPendingDeliveryReference entity 26752G. There is a 1:c relationship 26730H between the BTDItem entity 26768D and the BTDDeliveryReference entity 26754G. There is a 1:cn association 26732H between the Delivery Specialization 26708C and the BTDDeliveryReference entity 26754G. There is a 1:cn relationship 26734H between the BusinessTransactionDocument entity 26762B and the BTDInboundDeliveryReference entity 26756G. There is a 1:cn association 26736H between the InboundDelivery entity 26768C and the BTDInboundDeliveryReference entity 26756G.

There is a 1:c relationship 26738H between the BTDItem entity 26768D and the BTDDespatchedDeliveryNotificationReference entity 26758G, and a 1:c relationship 26740H between the BTDDespatchedDeliveryNotificationReference entity 26758G and the BTDItem entity 26768D. There is a 1:c relationship 26742H between the BusinessTransactionDocument entity 26762B and the BTD- DespatchedDeliveryNotificationReference entity 26758G. There is a 1:cn association 26744H between the Despatched-DeliveryNotification entity 26774C and the BTDDespatchedDeliveryNotificationReference entity 26758G. There is a 1:c relationship 26746H between the BTDItem entity 26768D and the BTDShipmentReference entity 26760G, and a 1:c relationship 26748H between the BTDShipmentReference entity 26760G and the BTDItem entity 26768D. There is a 1:c relationship 26750H between the BusinessTransactionDocument entity 26762B and the BTDShipmentReference entity 26760G. There is a 1:cn association 26752H between the Shipment entity 26710C and the BTDShipmentReference entity 26760G. There is a 1:c relationship 26754H between the BTDItem entity 26768D and the BTDOriginInvoiceReference entity 26762G. There is a 1:cn association 26756H between the Invoice entity 26718C and the BTDOriginInvoiceReference entity 26762G. There is a 1:c relationship 26758H between the BusinessTransactionDocument entity 26762B and the BTDOriginVendorInvoiceReference entity 26764G. There is a 1:c association 26760H between the VendorInvoice entity 26726C and the BTDOriginVendorInvoiceReference entity 26764G. There is a 1:c relationship 26762H between the BusinessTransactionDocument entity 26762B and the BTDPrimaNotaReference entity 26766G. There is a 1:c relationship 26764H between the BusinessTransactionDocument entity 26762B and the BTDOriginPrimaNotaReference entity 26768G.

The BTDAttachment package 26752B includes a BTDAttachment entity 26766H, a BTDAttachmentWebAddress entity 26768H, and a BTDInternetAttachmentWebAddress entity 26770H. There is a 1:cn relationship 26772H between the BTDItem entity 26768D and the BTDAttachment entity 26766H, and a 1:c relationship 26774H between the BTDAttachment entity 26766H and the BTDItem entity 26768D. There is a 1:cn relationship 26776H between the BusinessTransactionDocument entity 26762B and the BTDAttachment entity 26766H. There is a 1:cn association 26778H between the Attachment entity 26758 and the BTDAttachment entity 26766H. There is a 1:cn relationship 26780H between the BTDItem entity 26768D and the BTDAttachmentWebAddress entity 26768H. There is a 1:cn relationship 26782H between the BusinessTransactionDocument entity 26762B and the BTDAttachmentWebAddress entity 26768H. There is a 1:cn relationship 26784H between the BTDItem entity 26768D and the BTDInternetAttachmentWebAddress entity 26770H. There is a 1:cn relationship 26786H between the BusinessTransactionDocument entity 26762B and the BTDInternetAttachmentWebAddress entity 26770H.

The BTDDescription package 26754B includes a BTDDescription entity 26788H, a BTDInternalWebAddress entity 26790H, and a BTDConfirmationDescription entity 26792H. There is a 1:cn relationship 26794H between the BTDItem entity 26768D and the BTDDescription entity 26788H. There is a 1:c relationship 26796H between the BTDDescription entity 26788H and the BTDItem entity 26768D. There is a 1:cn relationship 26798H between the BusinessTransactionDocument entity 26762B and the BTDDescription entity 26788H. There is a 1:c relationship 26700I between the BTDItem entity 26768D and the BTDInternalWebAddress entity 26790H. There is a 1:c relationship 267021 between the BTDInternalWebAddress entity 26790H and the BTDItem entity 26768D. There is a 1:c relationship 267041 between the BusinessTransactionDocument entity 26762B and the BTDInternalWebAddress entity 26790H. There is a 1:c relationship 267061 between the BTDItem entity 26768D and the BTDConfirmationDescription entity 26792H. There is a 1:c relationship 267081 between the BTDConfirmationDescription entity 26792H and the BTDItem entity 26768D. There is a 1:c relationship 267101 between the BusinessTransactionDocument entity 26762B and the BTDConfirmationDescription entity 26792H.

Figure 267F:
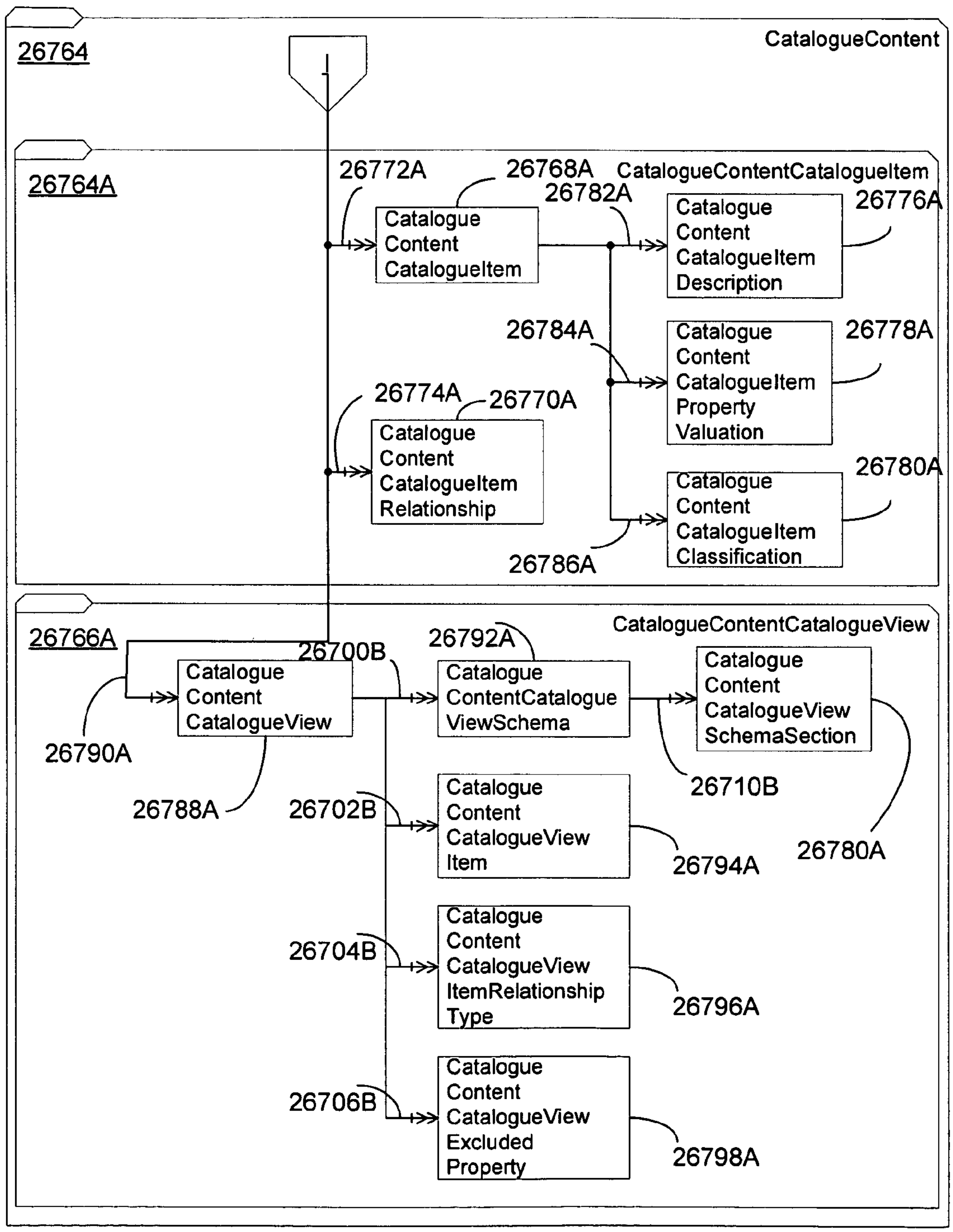
Figure 267G:
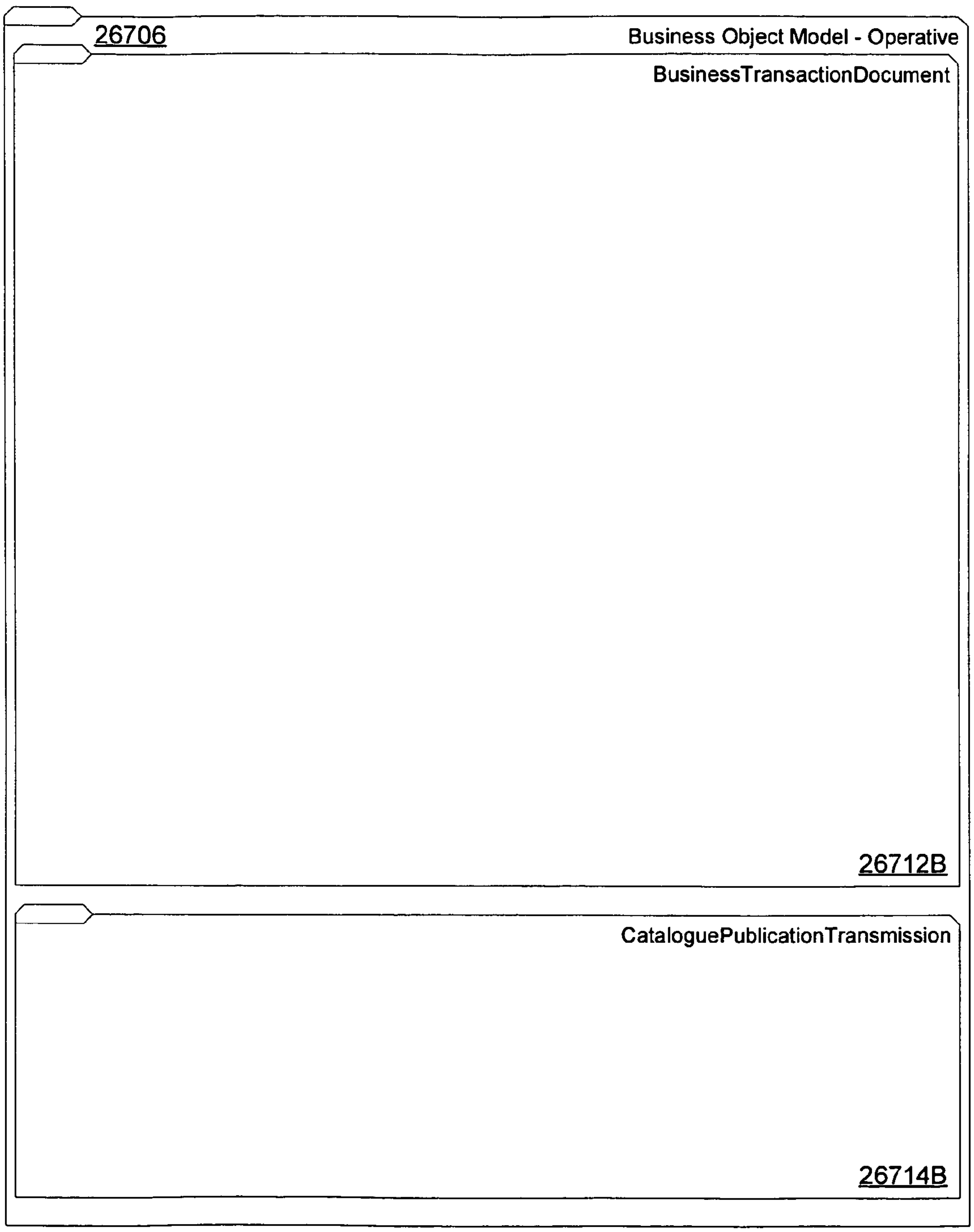
Figure 267H:
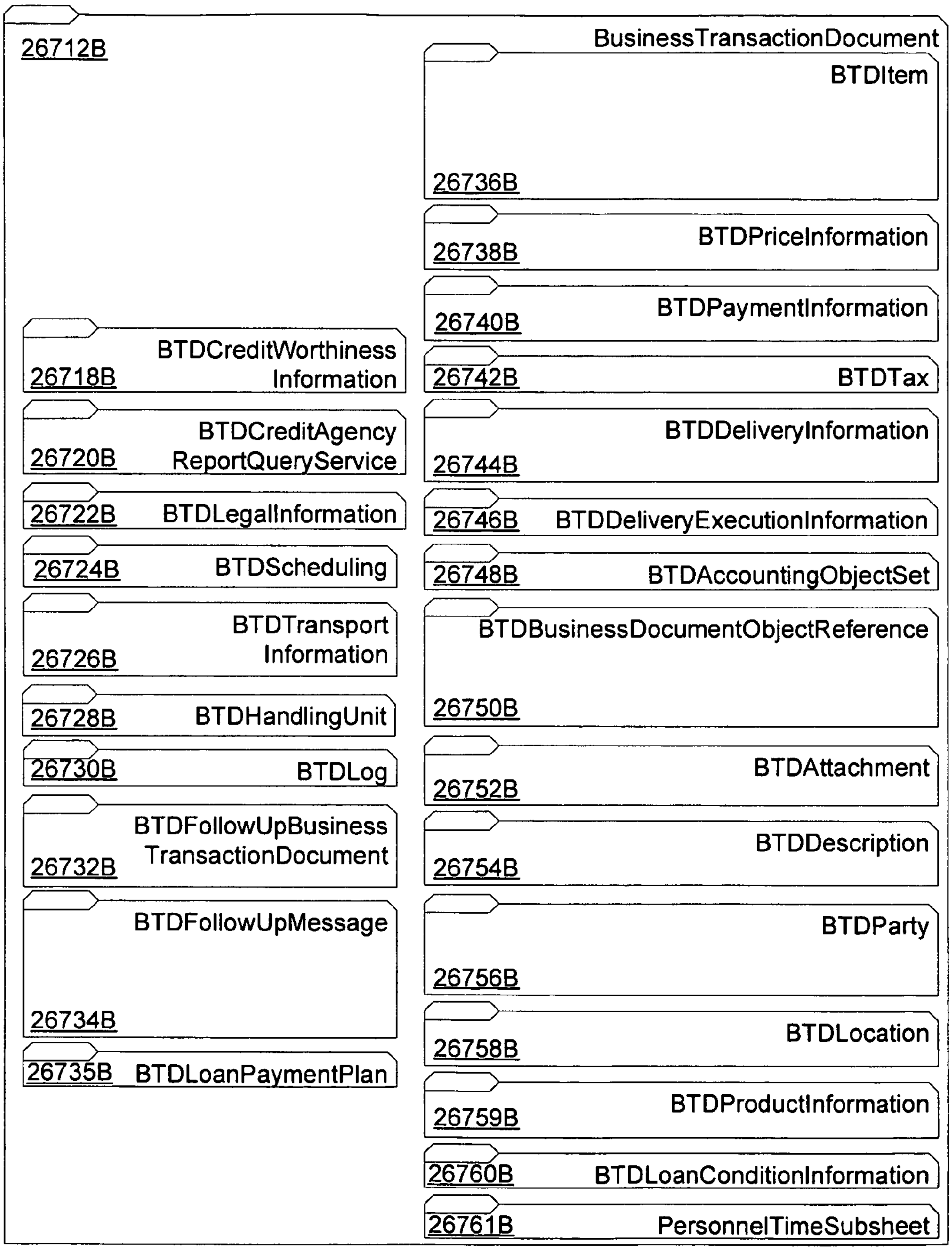

The BTDParty package 26756B includes a BTDParty entity 26712I. The details regarding the relationships 26713I to the BTDParty entity 26712I are depicted in FIG. 267FF. There is a 1:1 relationship 26714I between the InventoryChangeItemInbound entity 26702F and the BTDParty entity 26712I, and a 1:c relationship 26716I between the BTDParty entity 26712I and the InventoryChangeItemInbound entity 26702F. There is a 1:1 relationship 26718I between the InventoryChangeItemOutbound entity 26706F and the BTDParty entity 26712I, and a 1:c relationship 26720I between the BTDParty entity 26712I and the InventoryChangeItemOutbound entity 26706F. There is a 1:cn relationship 26722I between the BTDItem entity 26768D and the BTDParty entity 26712I, and a 1:c relationship 26724I between the BTDParty entity 26712I and the BTDItem entity 26768D. There is a 1:cn relationship 26726I between the BusinessTransactionDocument entity 26762B and the BTDParty entity 26712I.

The BTDParty entity 26712I includes a BTDPartyContactPerson entity 26728I and a BTDPartyAddress entity 26730I. There is a 1:c relationship 26732I between the BTDParty entity 26712I and the BTDPartyContactPerson entity 26728I. There is a 1:c relationship 26734I between the BTDParty entity 26712I and the BTDPartyAddress entity 26730I. There is a 1:cn relationship 26736I between the BusinessTransactionDocument entity 26762B and the BTDPartyAddress entity 26730I.

The BTDParty entity 26712I is specialized into a BTDBuyerParty entity 26744I, a BTDCreditorParty entity 26746I, a BTDSellerParty entity 26748I, a BTDDebtorParty entity 26750I, a BTDProductRecipientParty entity 26752I, a BTDVendorParty entity 26754I, a BTDManufacturerParty entity 26756I, a BTDPayerParty entity 26758I, a BTDPayeeParty entity 26760I, a BTDBillToParty entity 26762I, a BTDBillFromParty entity 26764I, a BTDCarrierParty entity 26766I, a BTDRequestorParty entity 26767I, a BRDPortalProviderParty entity 26768I, a BTDCatalogueProvider entity 26769I, a BTDBidderParty entity 26770I, a BTDOwnerParty entity 26771I, a BTDTaxPayerParty entity 26772I, a BTDTaxAuthorityParty 26773I, a BTDTaxOperatorParty 26774I, a BTDContractReleaseAuthorisedParty 26775I, a BTDProposedSellerParty 26776I, and a BTDBidderPortalProviderParty 26777I, which are nondisjoint complete specializations 26778I of the BTDParty entity 26712I.

Figure 267I:
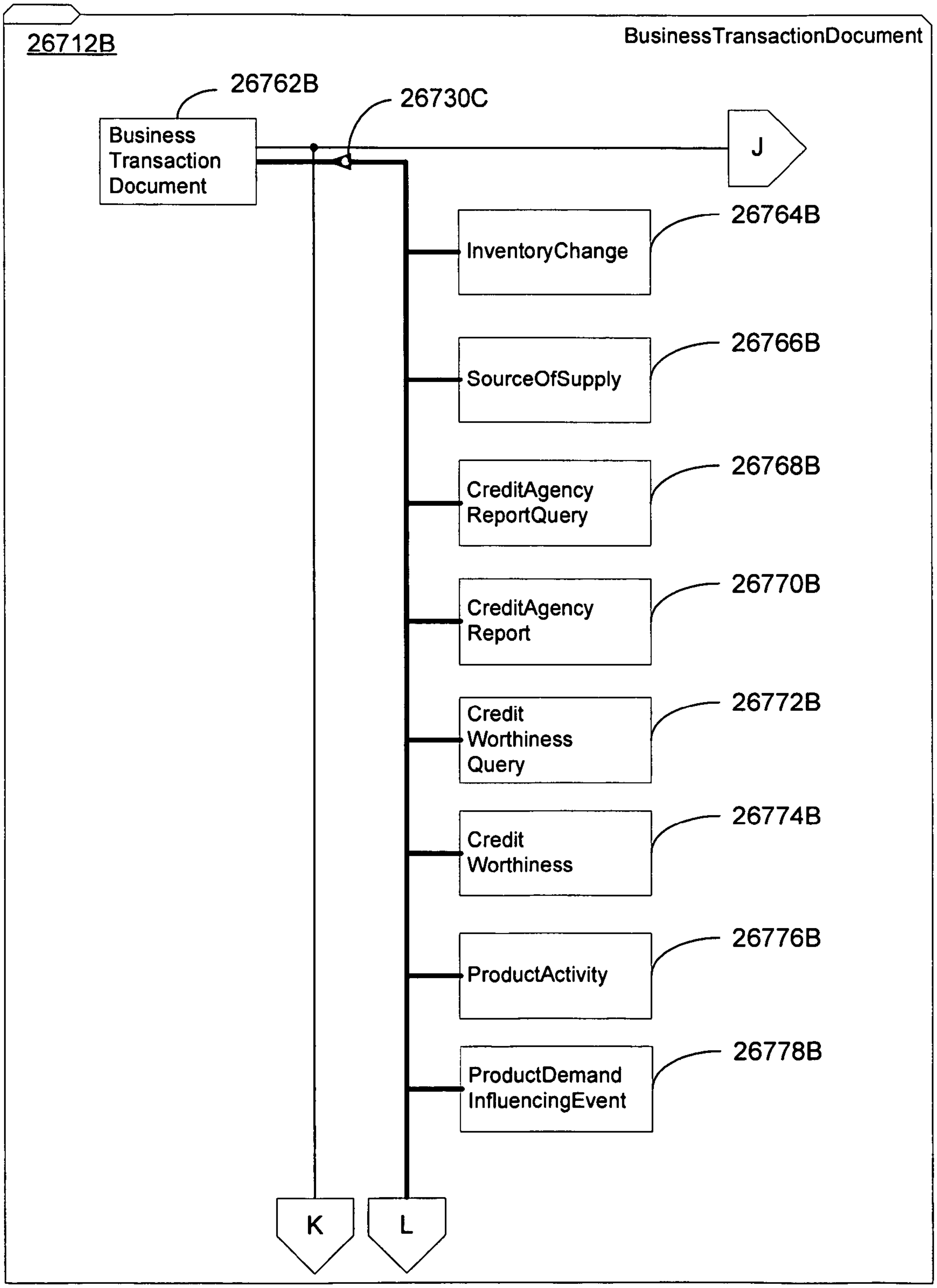

The BTDLocation package 26758B includes a BTDLocation entity 26780I. The details regarding the relationships 26781I to the BTDLocation entity 26780I are depicted in FIG. 267II. There is a 1:cn relationship 26782I between the InventoryChangeItemInbound entity 26702F and the BTDLocation entity 26780I, and a 1:c relationship 26742I between the BTDLocation entity 26780I and the InventoryChangeItemInbound entity 26702F. There is a 1:cn relationship 26786I between the InventoryChangeItemOutbound entity 26706F and the BTDLocation entity 26780I, and a 1:c relationship 26788I between the BTDLocation entity 26780I and the InventoryChangeItemOutbound entity 26706F. There is a 1:cn relationship 26790I between the BTDItem entity 26768D and the BTDLocation entity 26780I, and a 1:c relationship 26792I between the BTDLocation entity 26780I and the BTDItem entity 26768D. There is a 1:cn relationship 26794I between the BusinessTransactionDocument entity 26762B and the BTDLocation entity 26780I.

The BTDLocation entity 26780I includes a BTDLocationAddress entity 26796I. There is a 1:cn relationship 26798I between the Address entity 26737 and the BTDLocationAddress entity 26796I. There is a 1:c relationship 26700J between the BTDLocation entity 26780I and the BTDLocationAddress entity 26796I. The BTDLocation entity 26780I is specialized into a BTDShipToLocation entity 26702J and a BTDShipFromLocation entity 26704J, which are nondisjoint incomplete specializations 26706J of the BTDLocation entity 26780I.

Figure 267J:
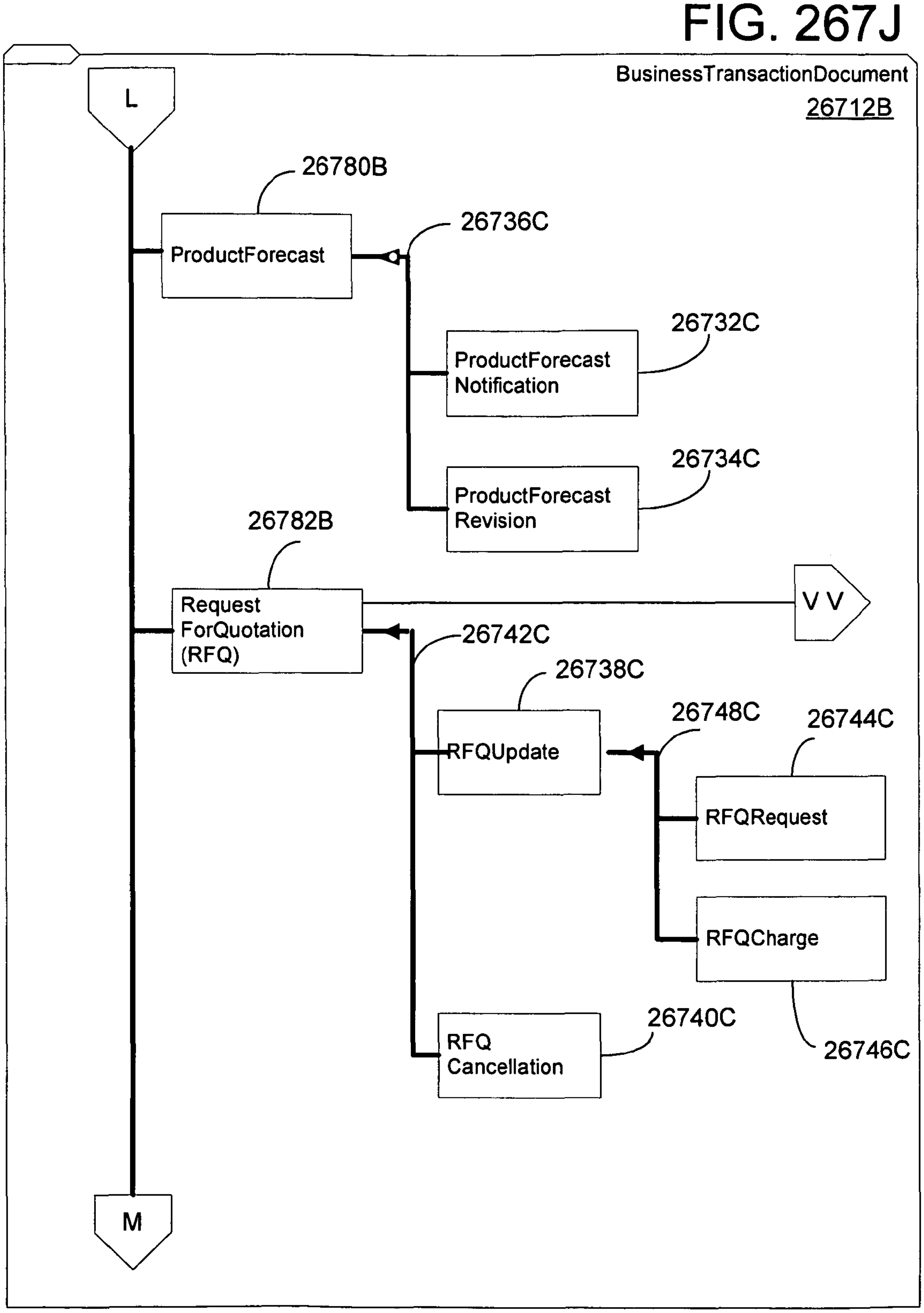
Figure 267K:
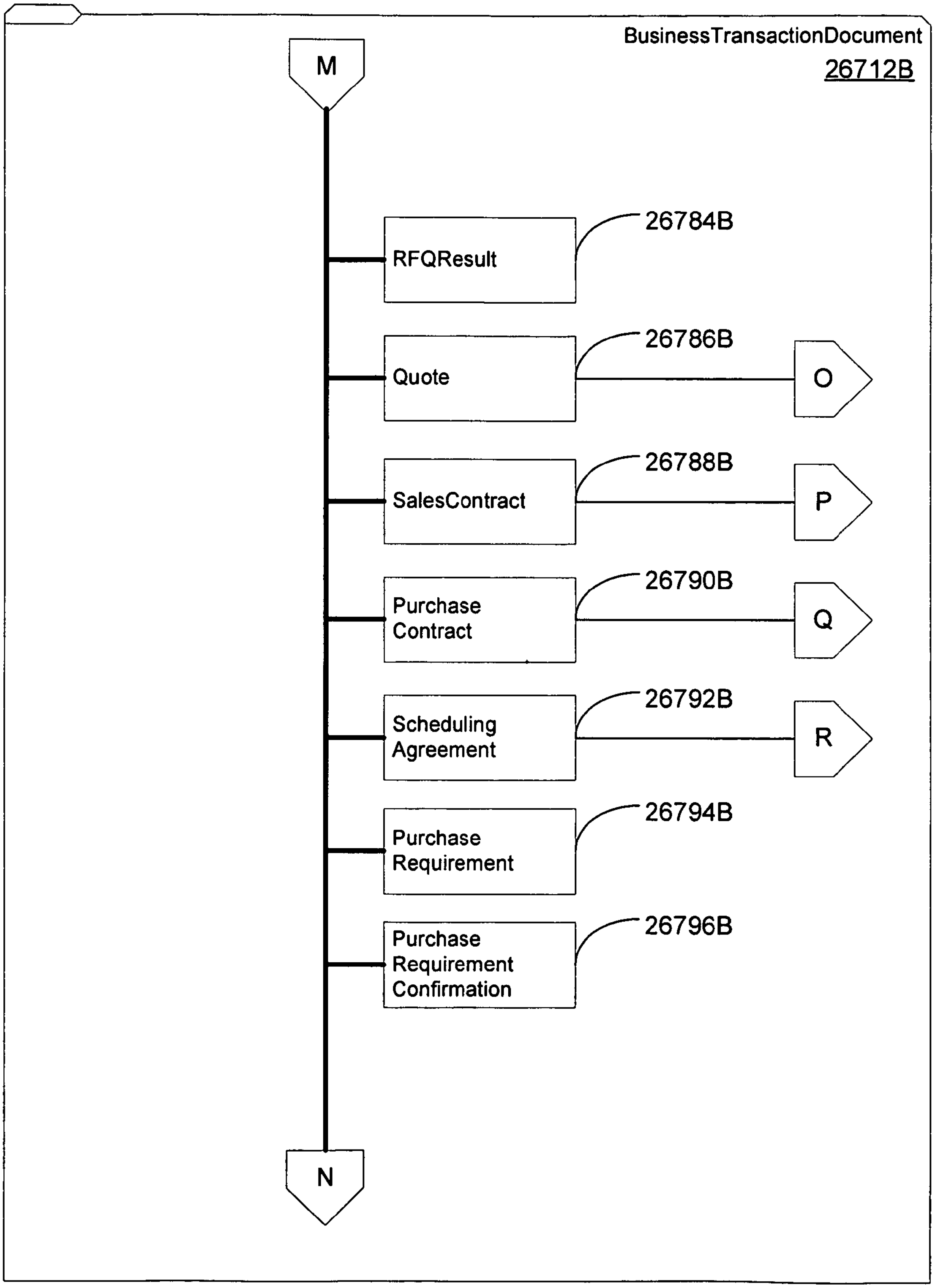
Figure 267L:
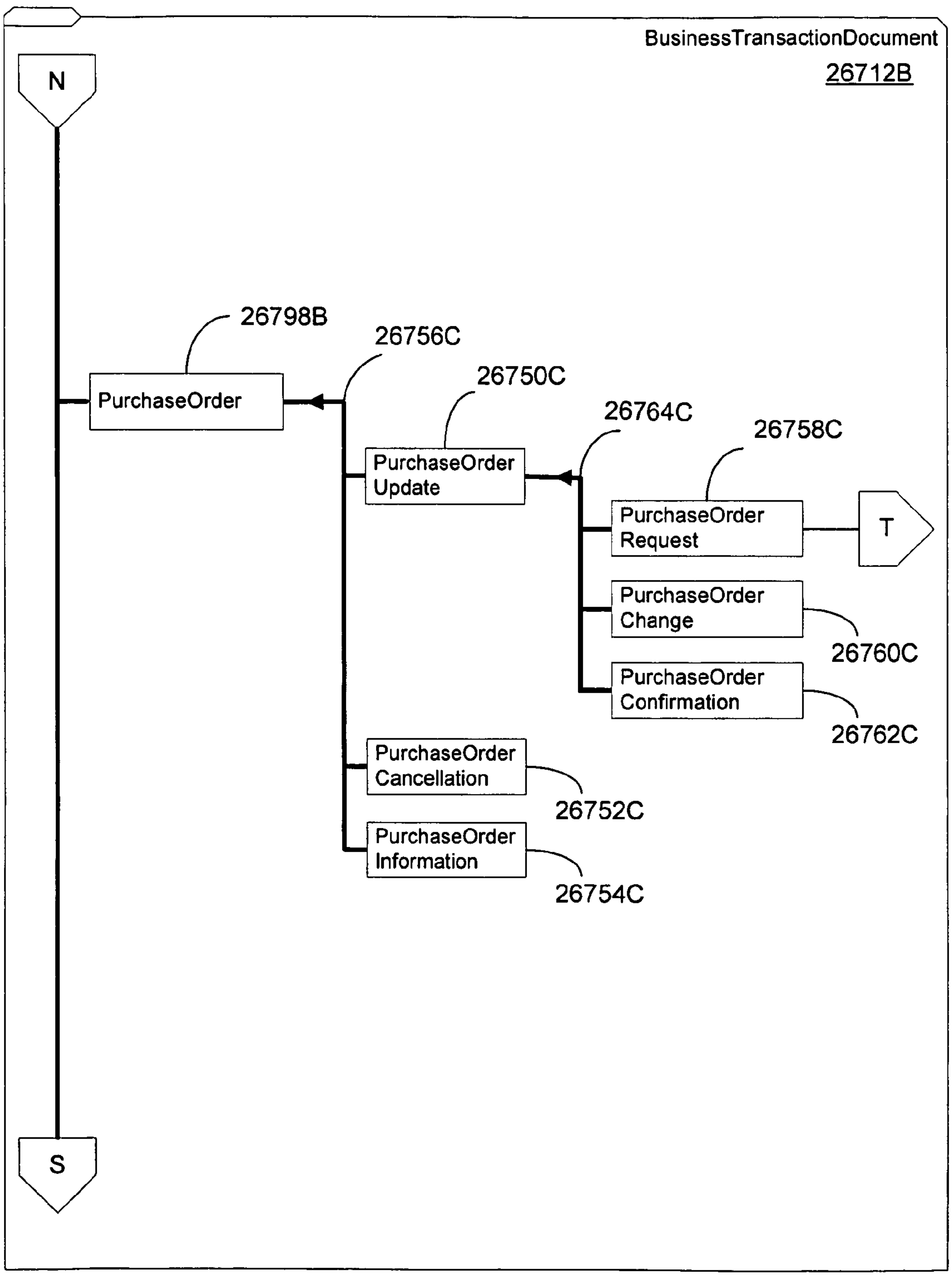
Figure 267M:
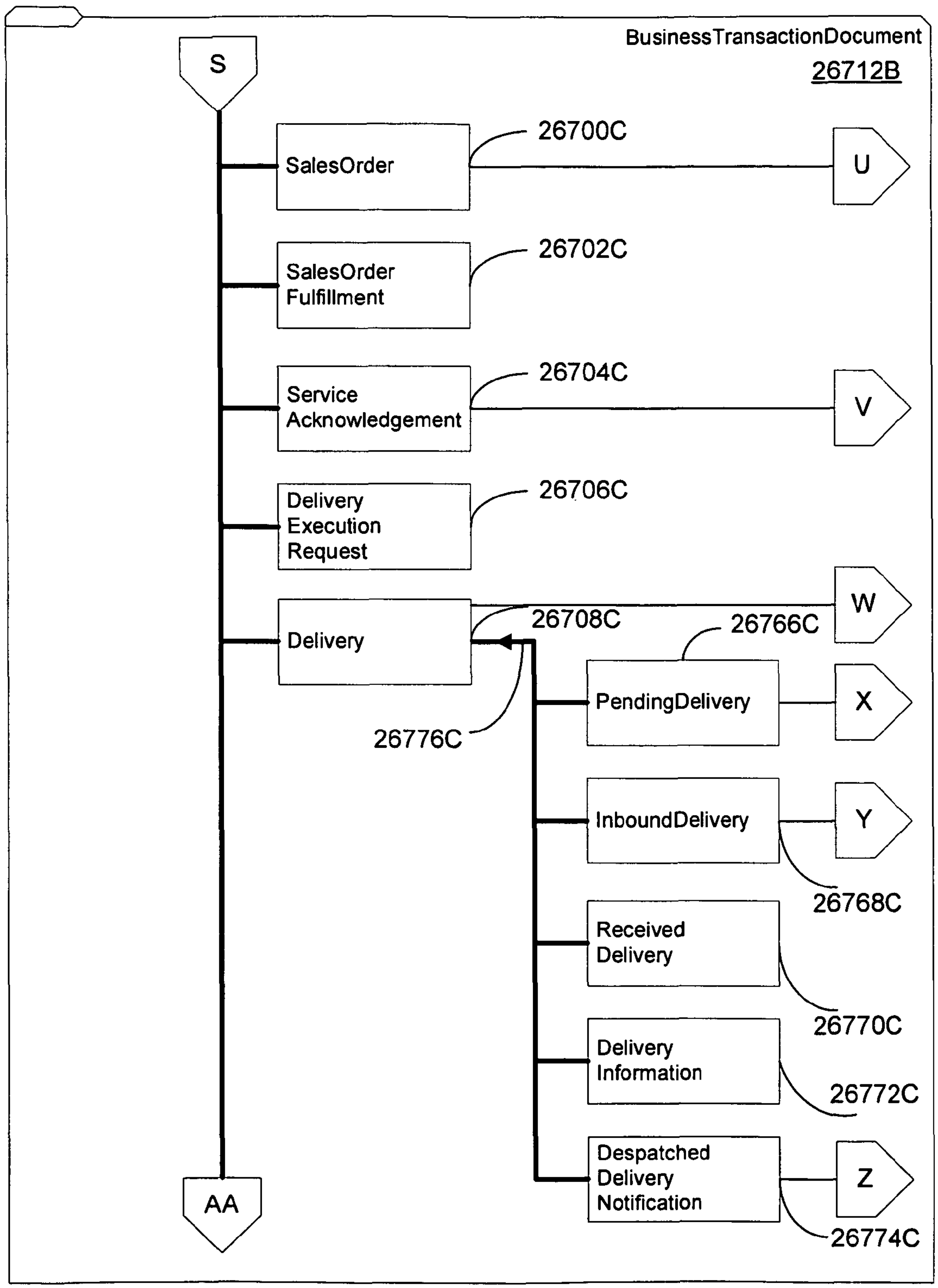
Figure 267N:
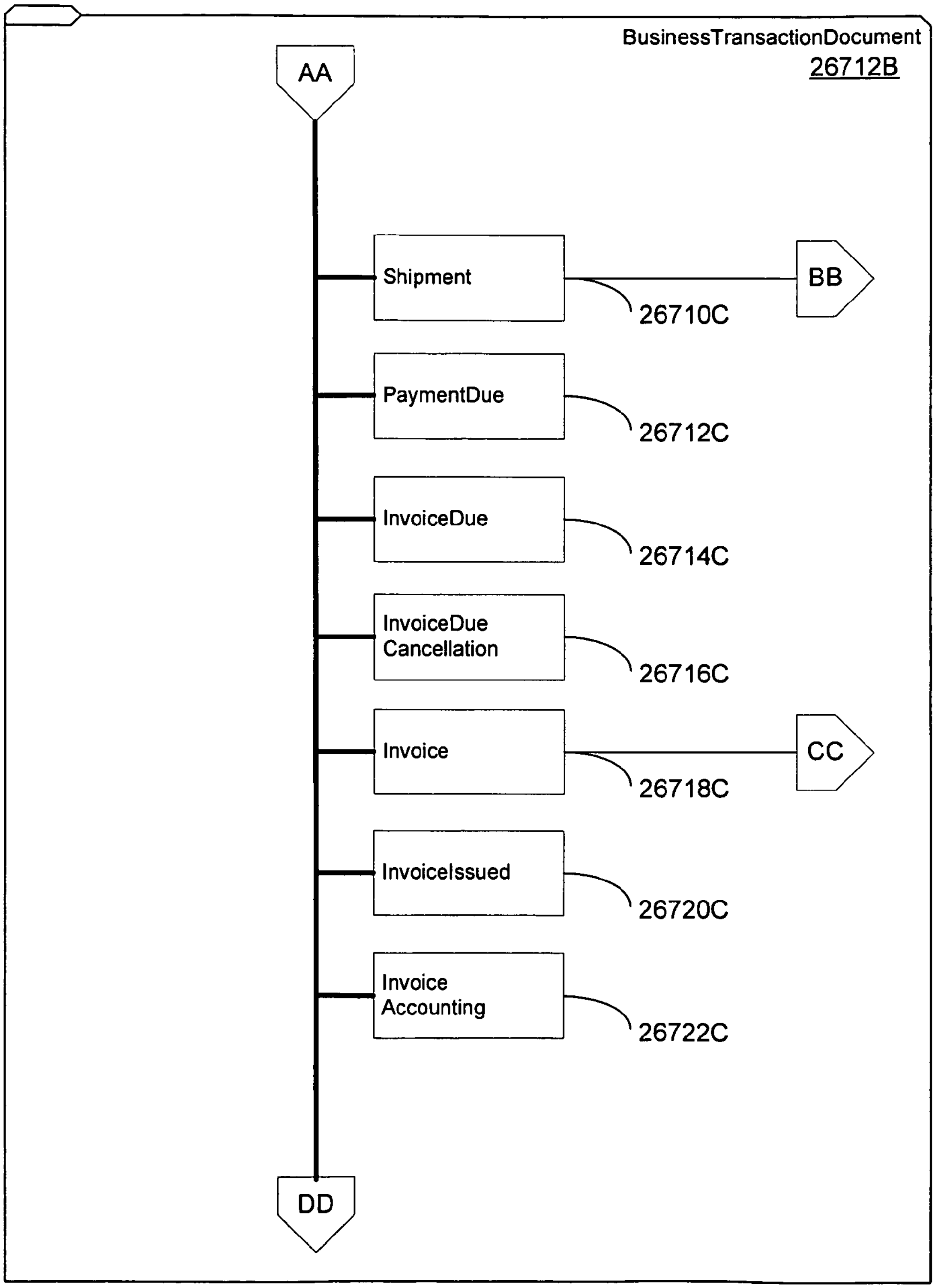
Figure 267O:
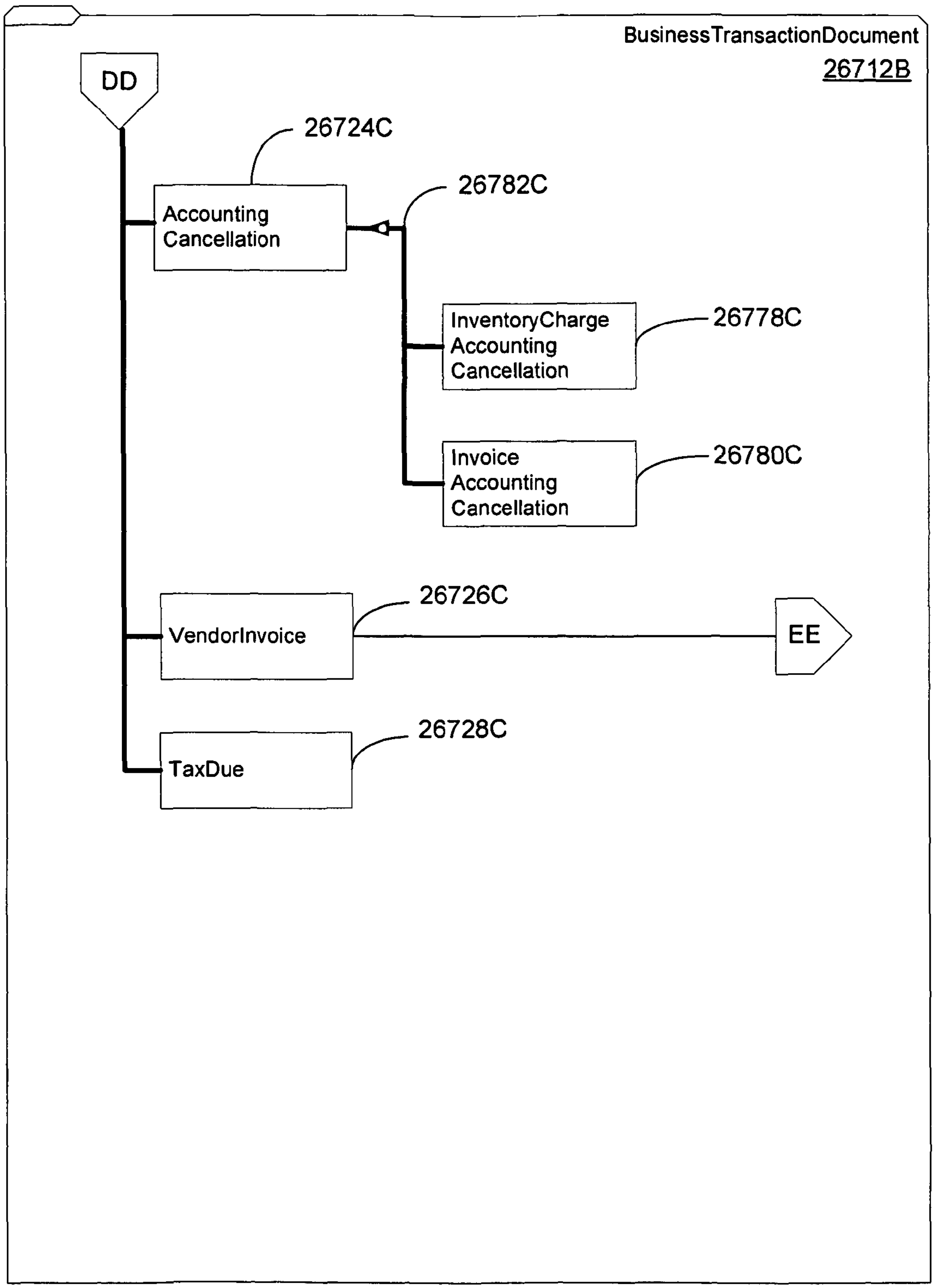
Figure 267P:
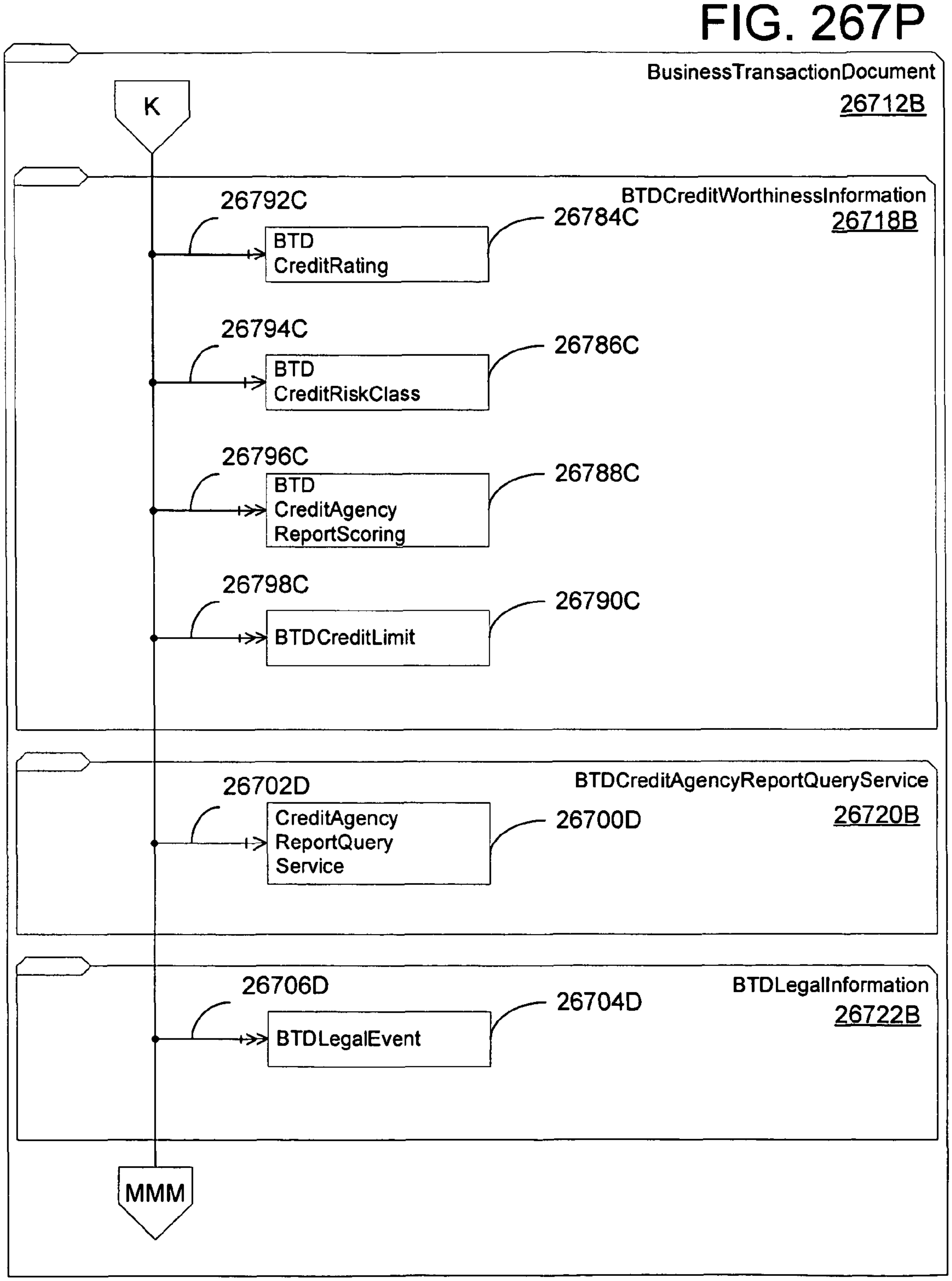
Figure 267Q:
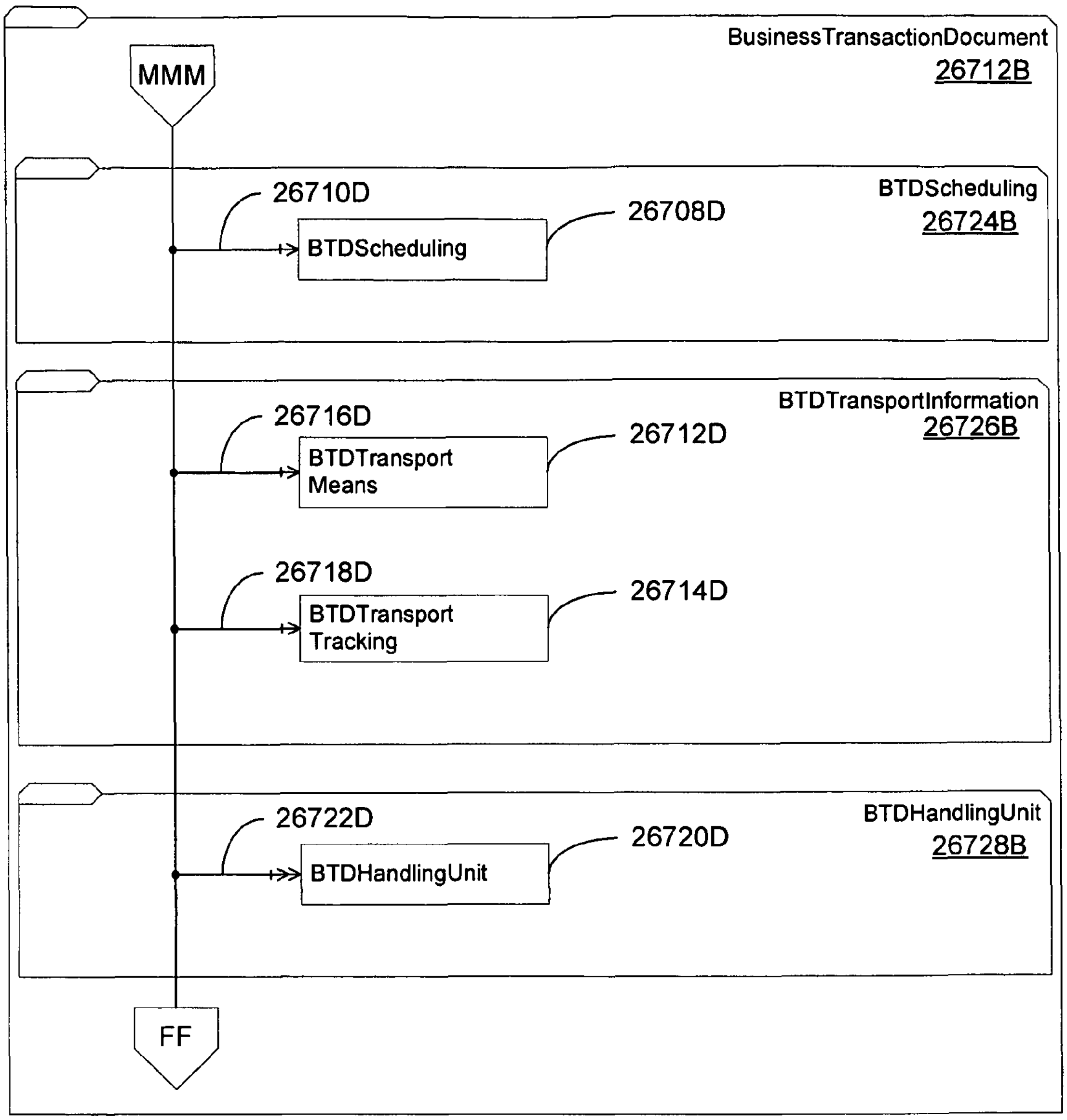
Figure 267R:
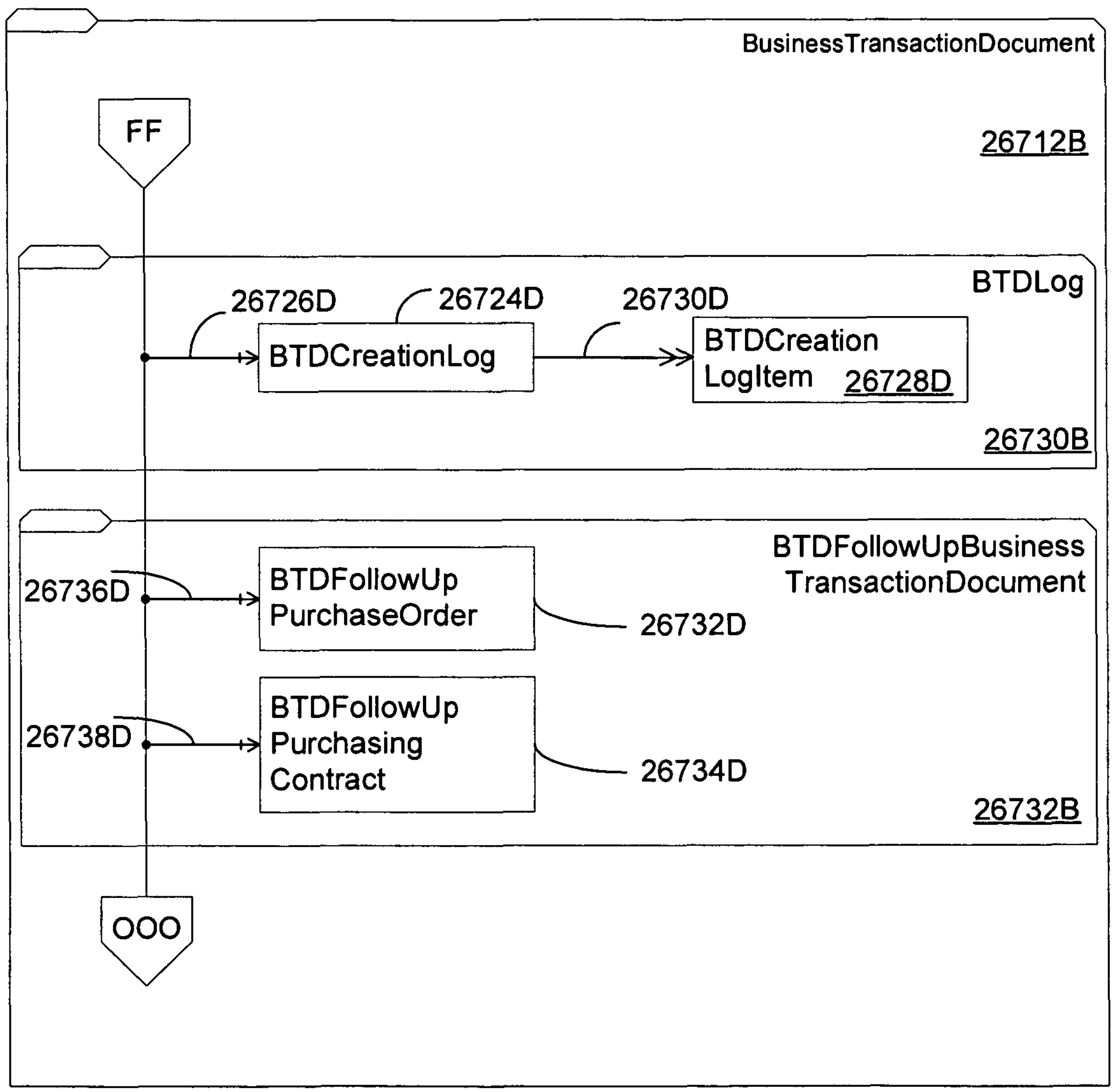
Figure 267S:
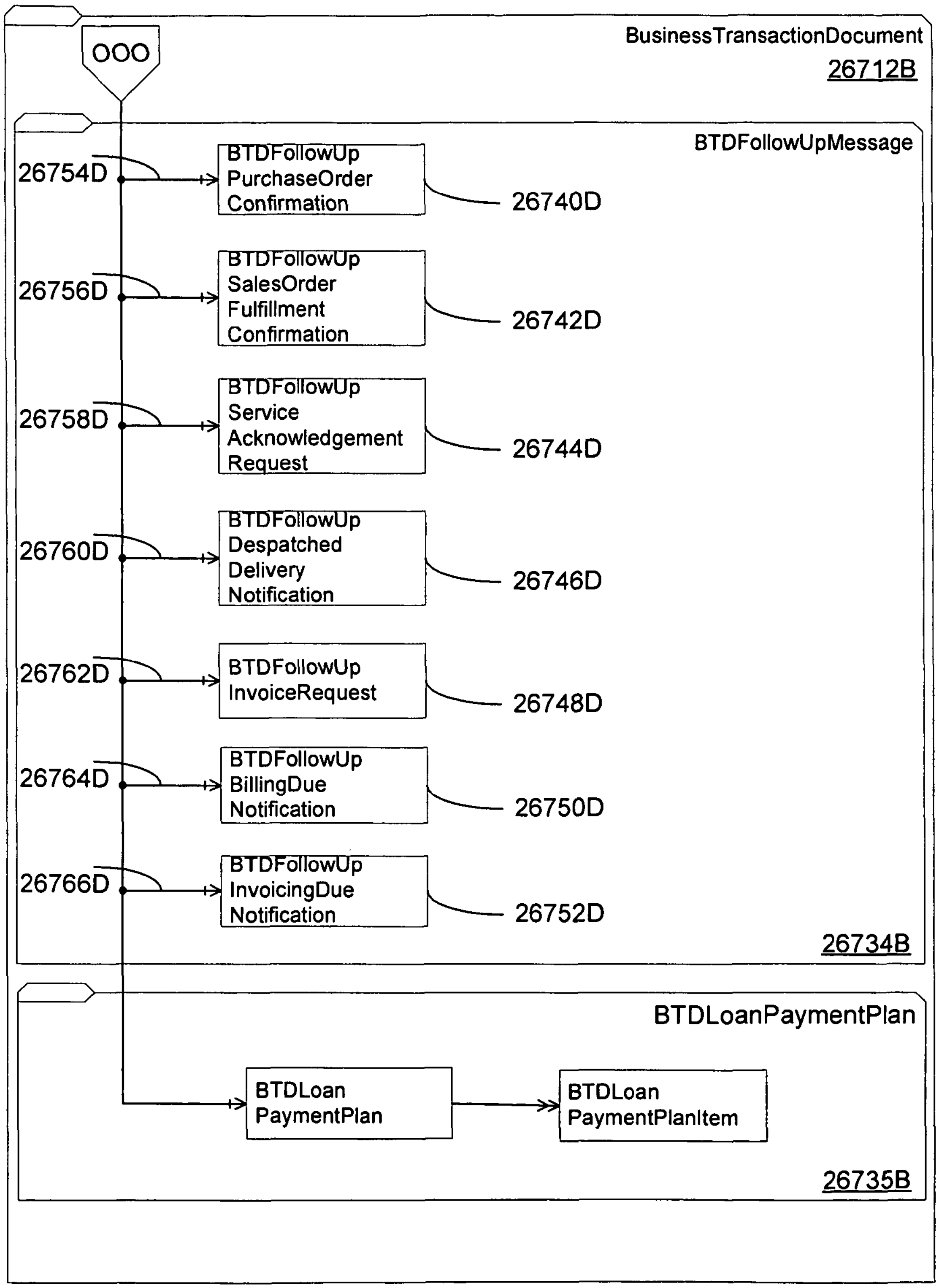
Figure 267T:
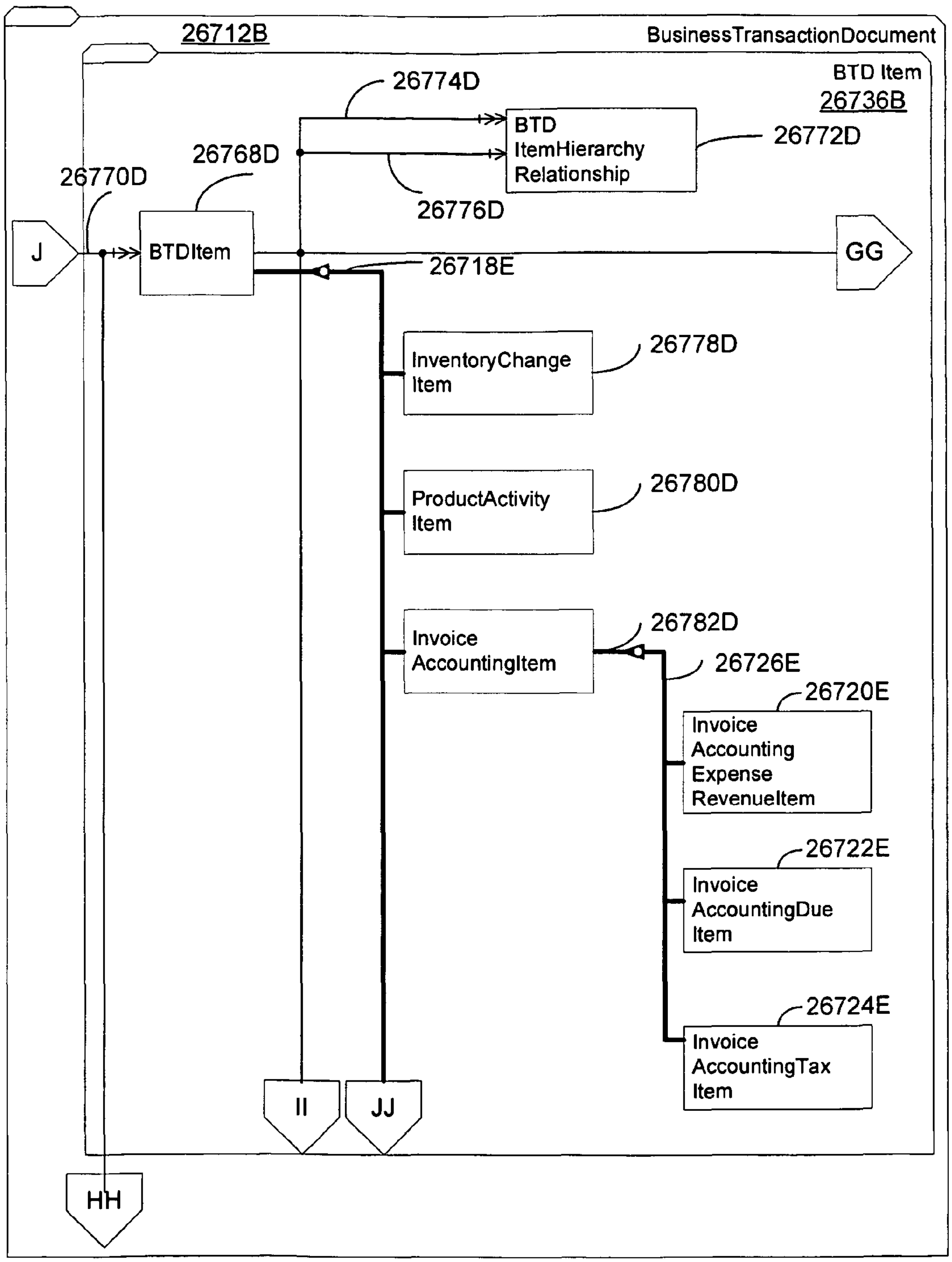
Figure 267U:
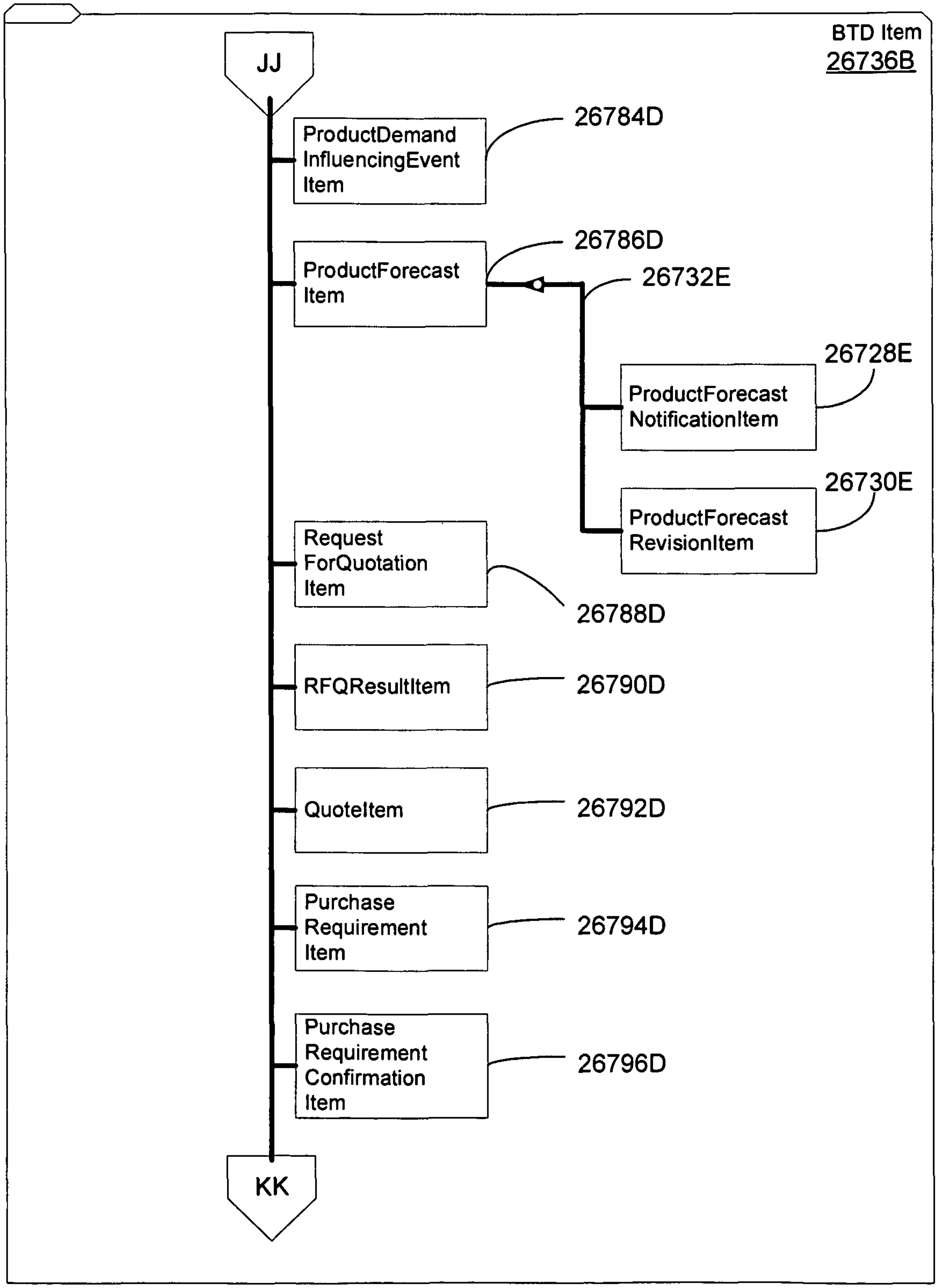
Figure 267V:
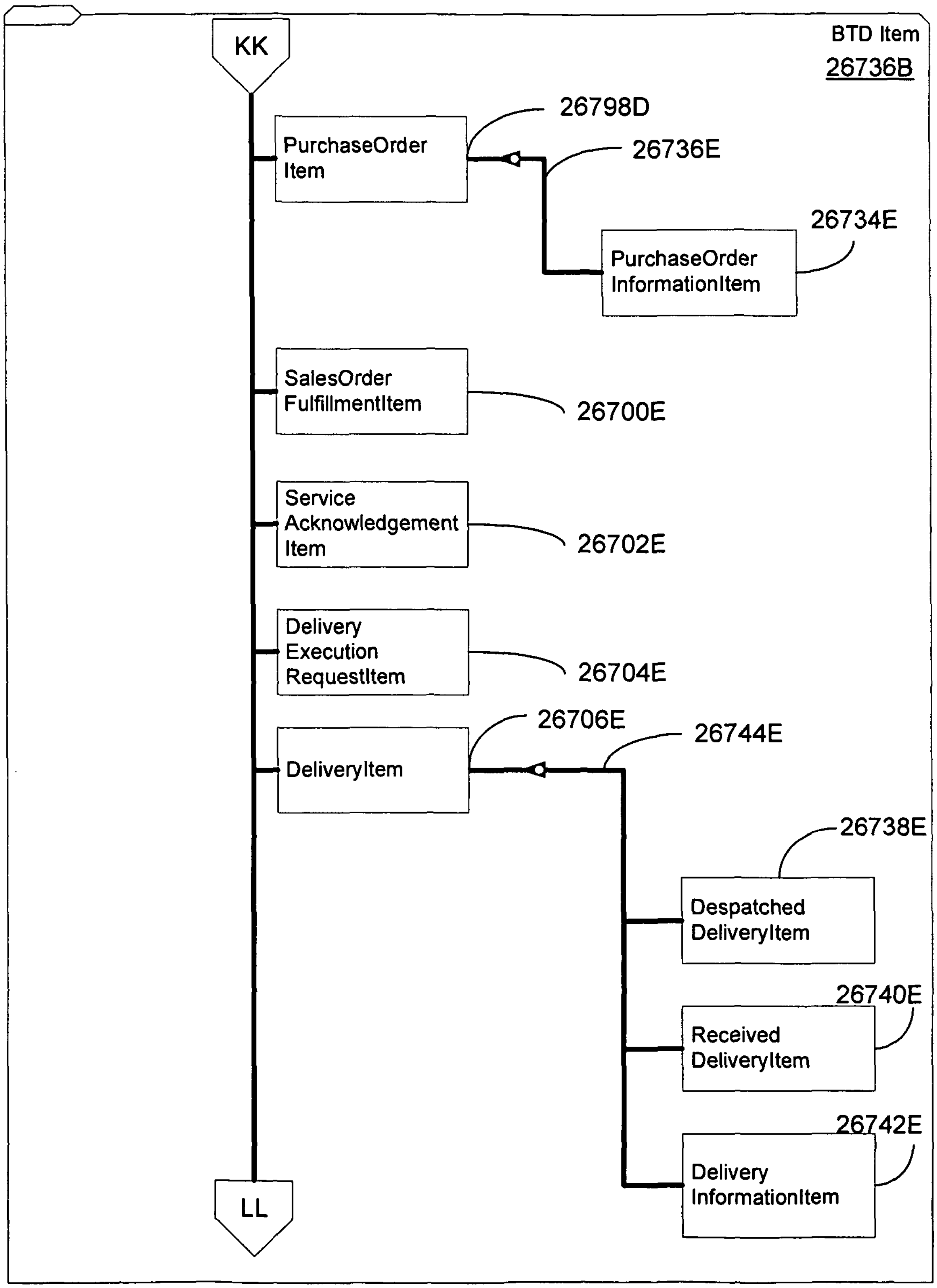
Figure 267W:
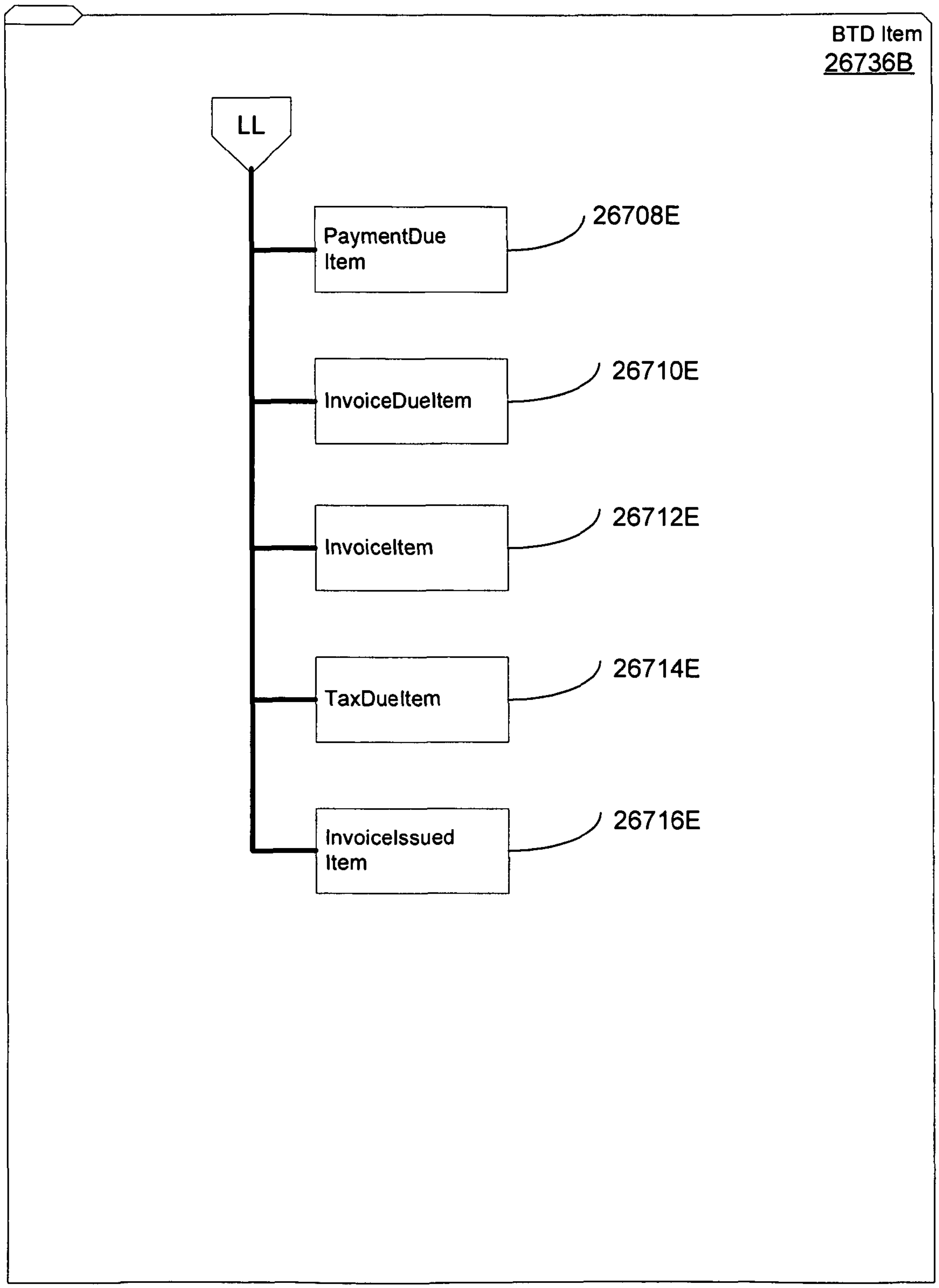
Figure 267X:
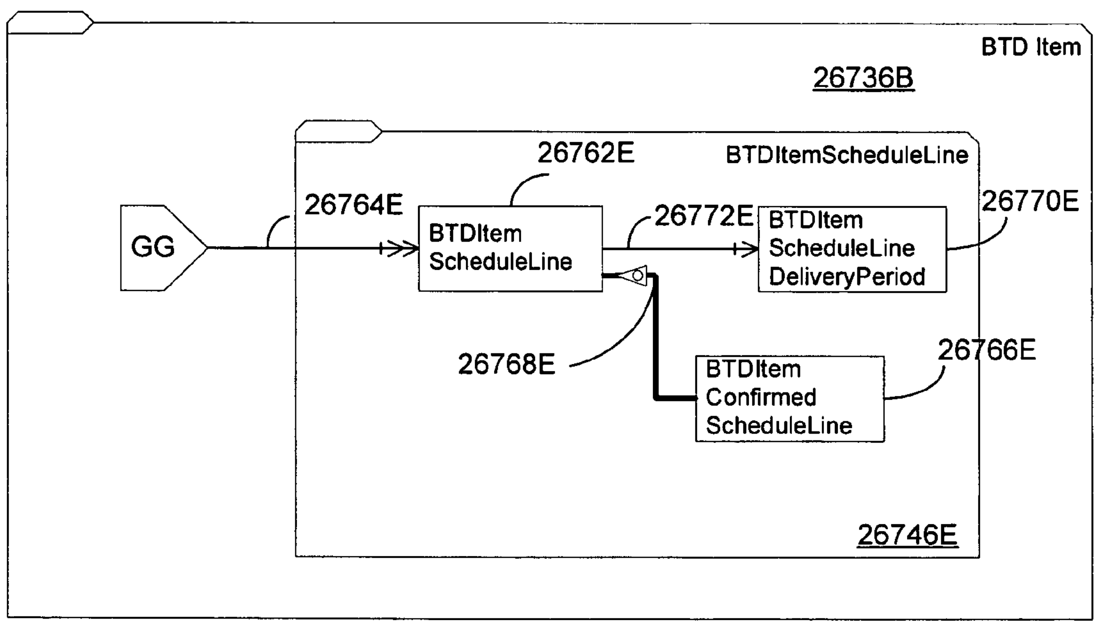
Figure 267Y:
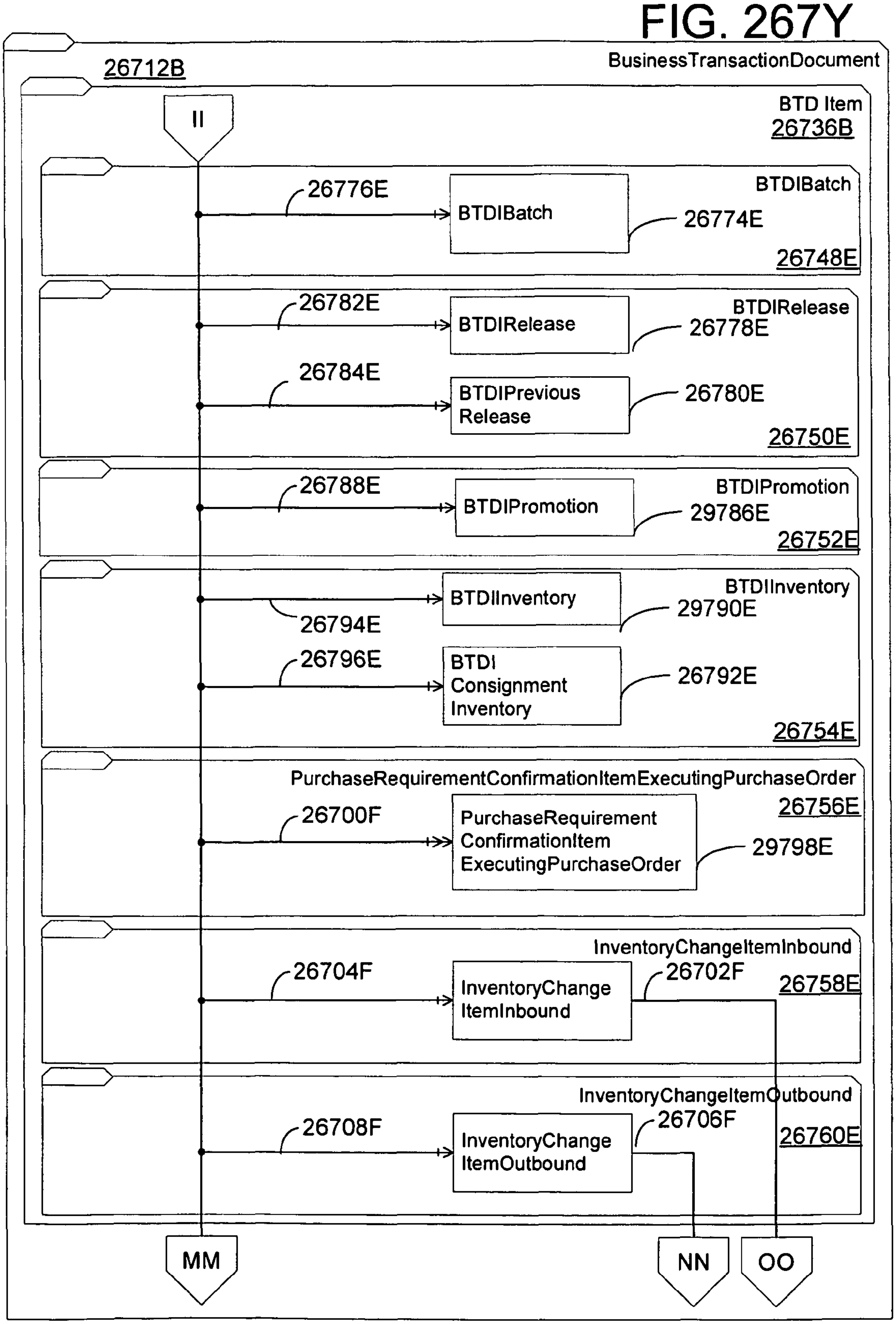
Figure 267Z:
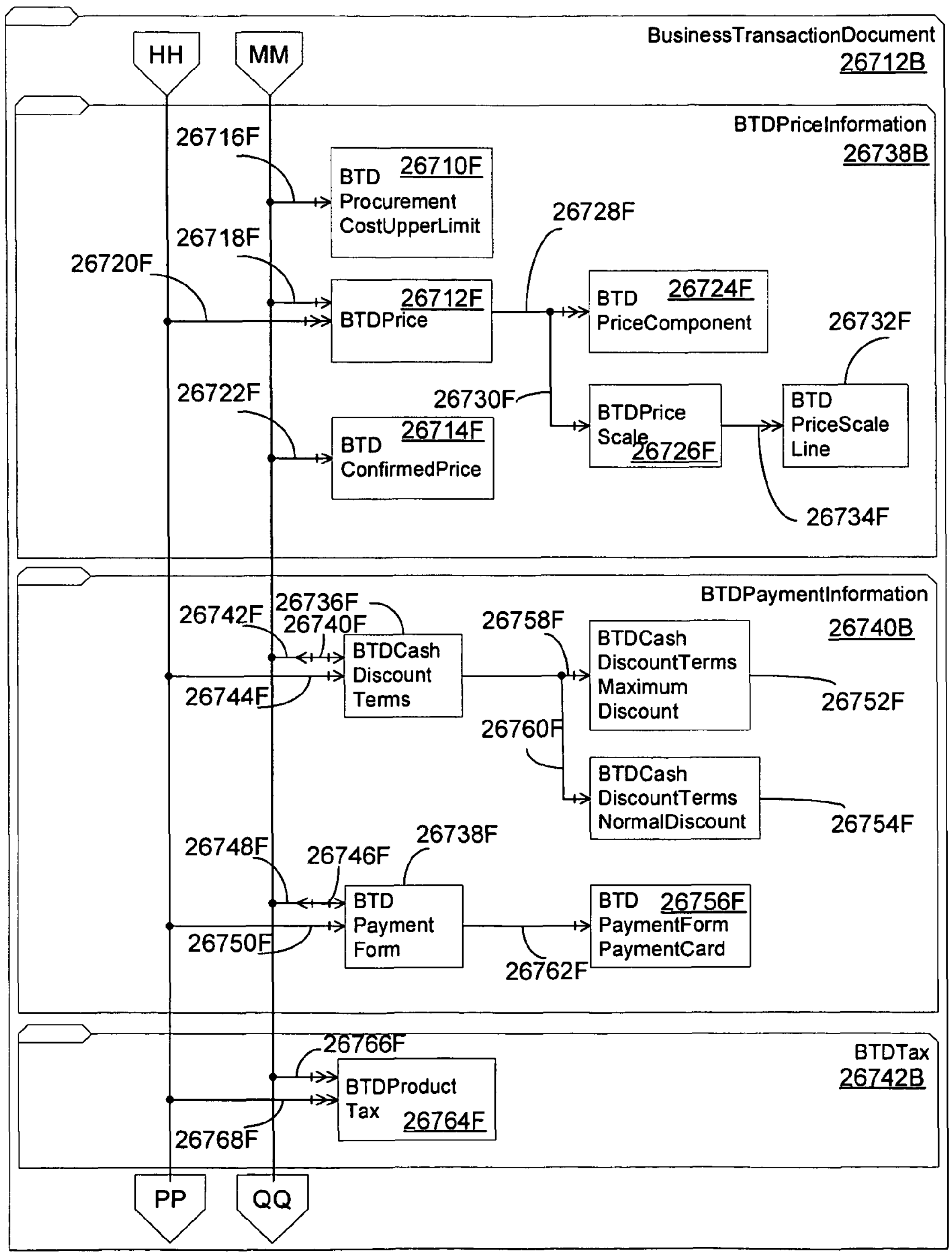
Figure 267A:
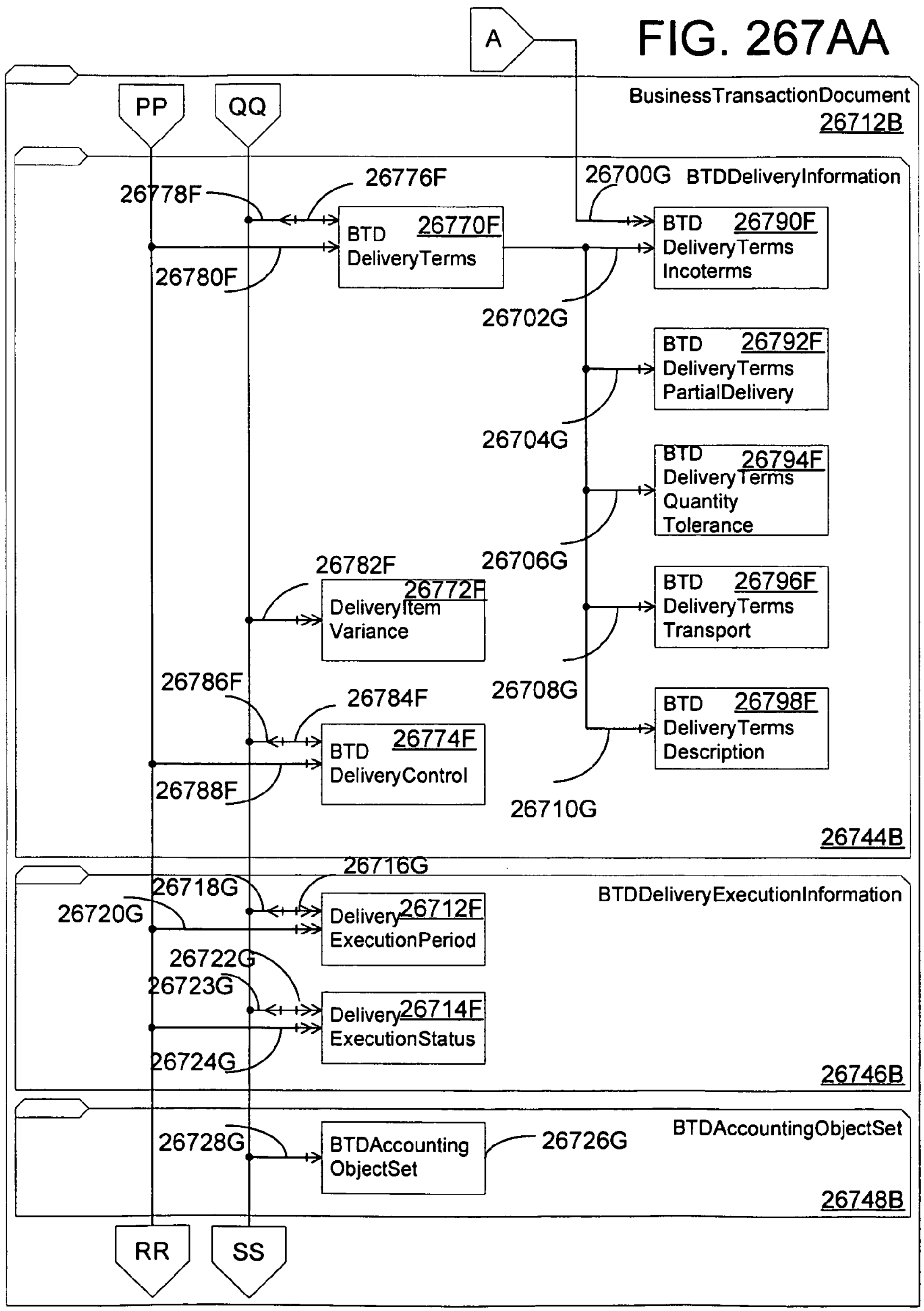
Figure 267B:
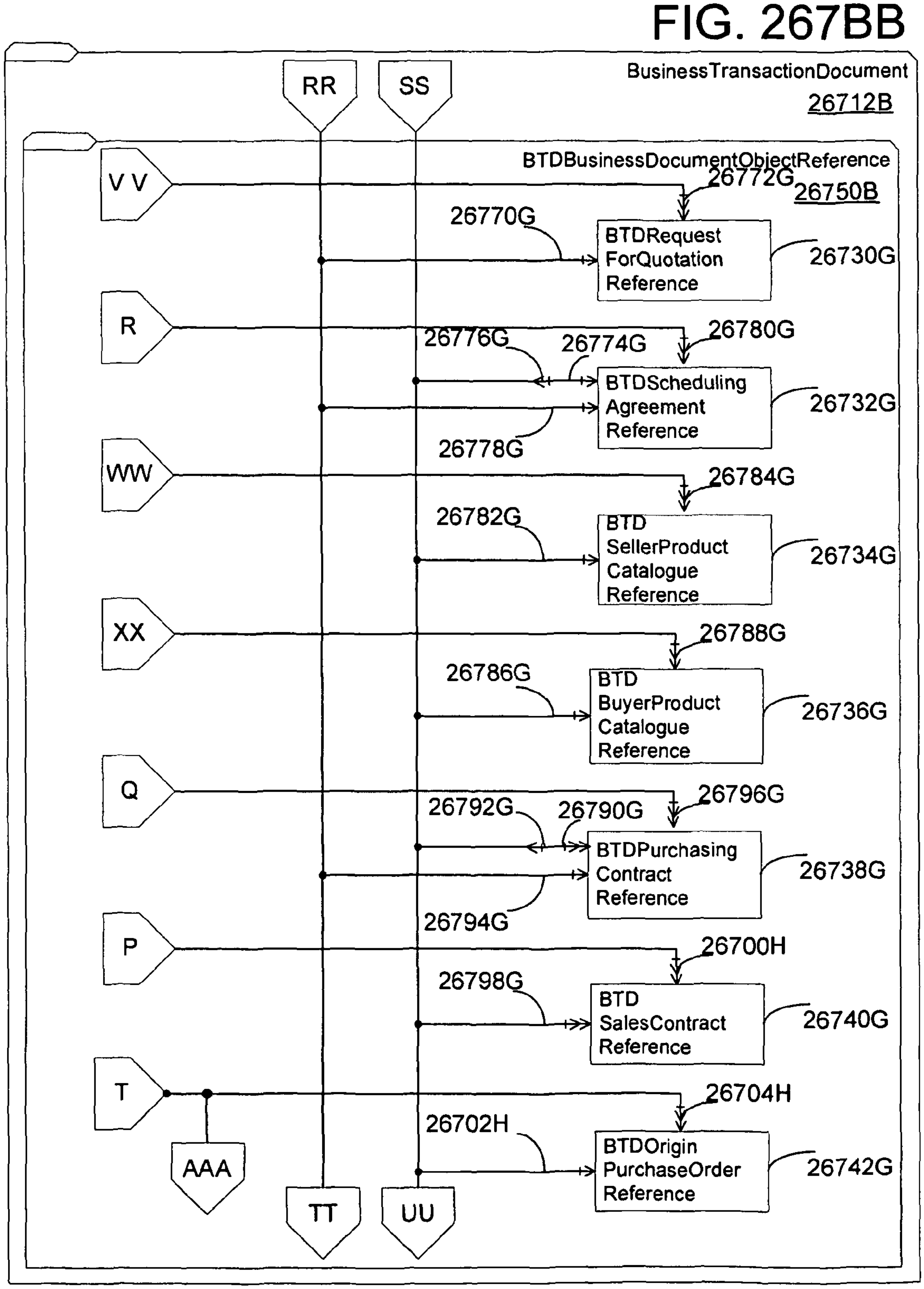
Figure 267C:
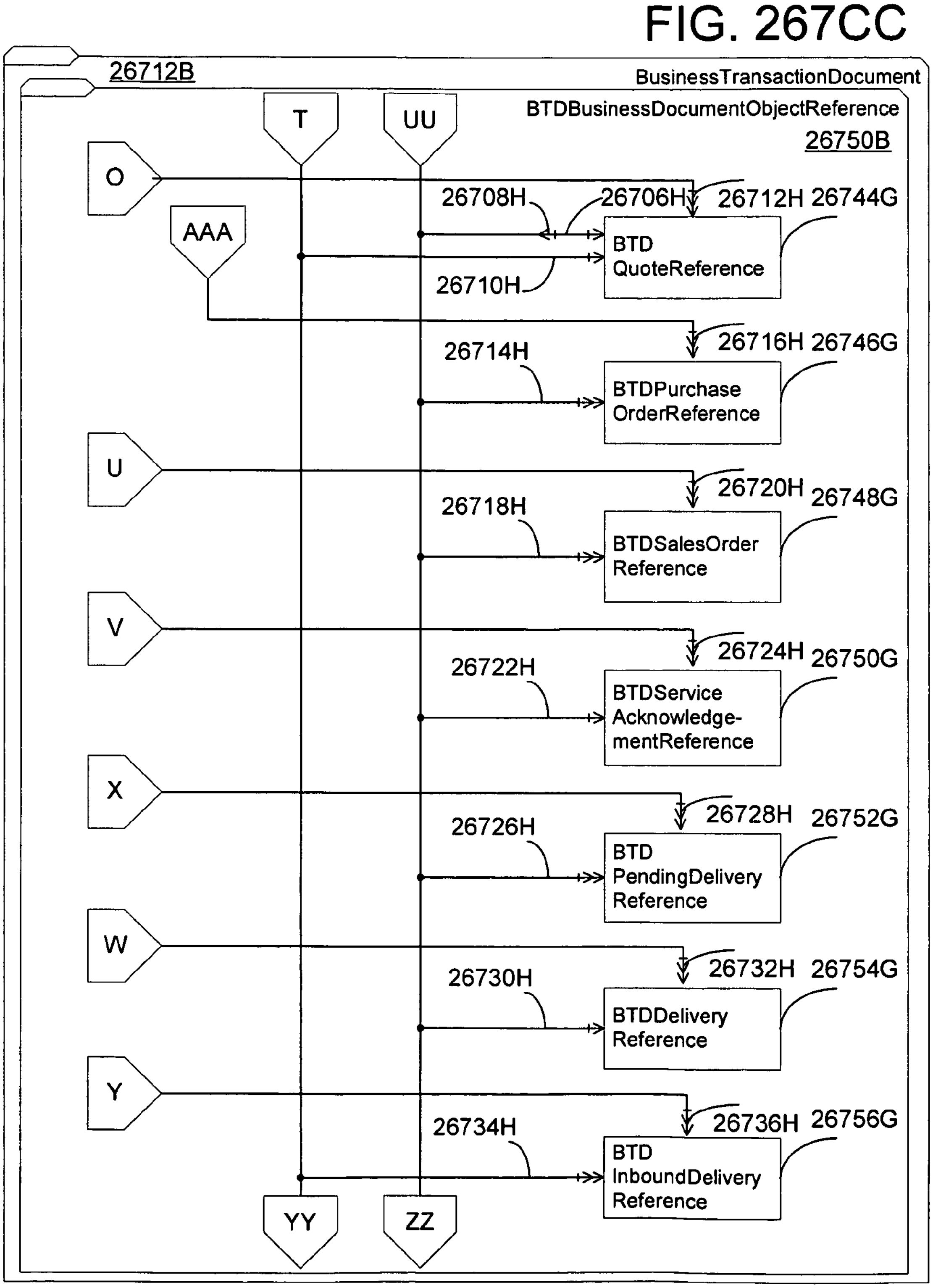
Figure 267D:
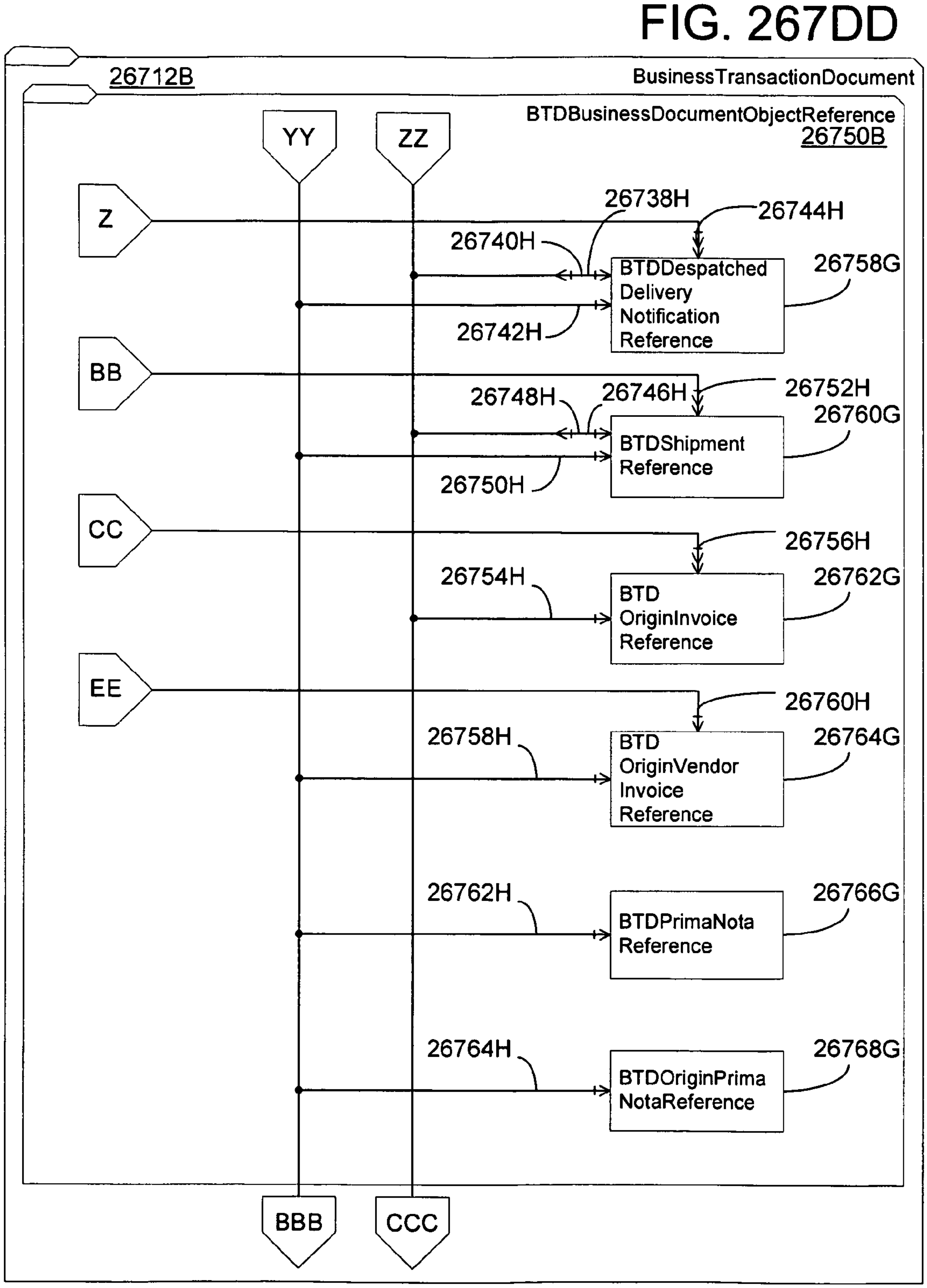
Figure 267E:
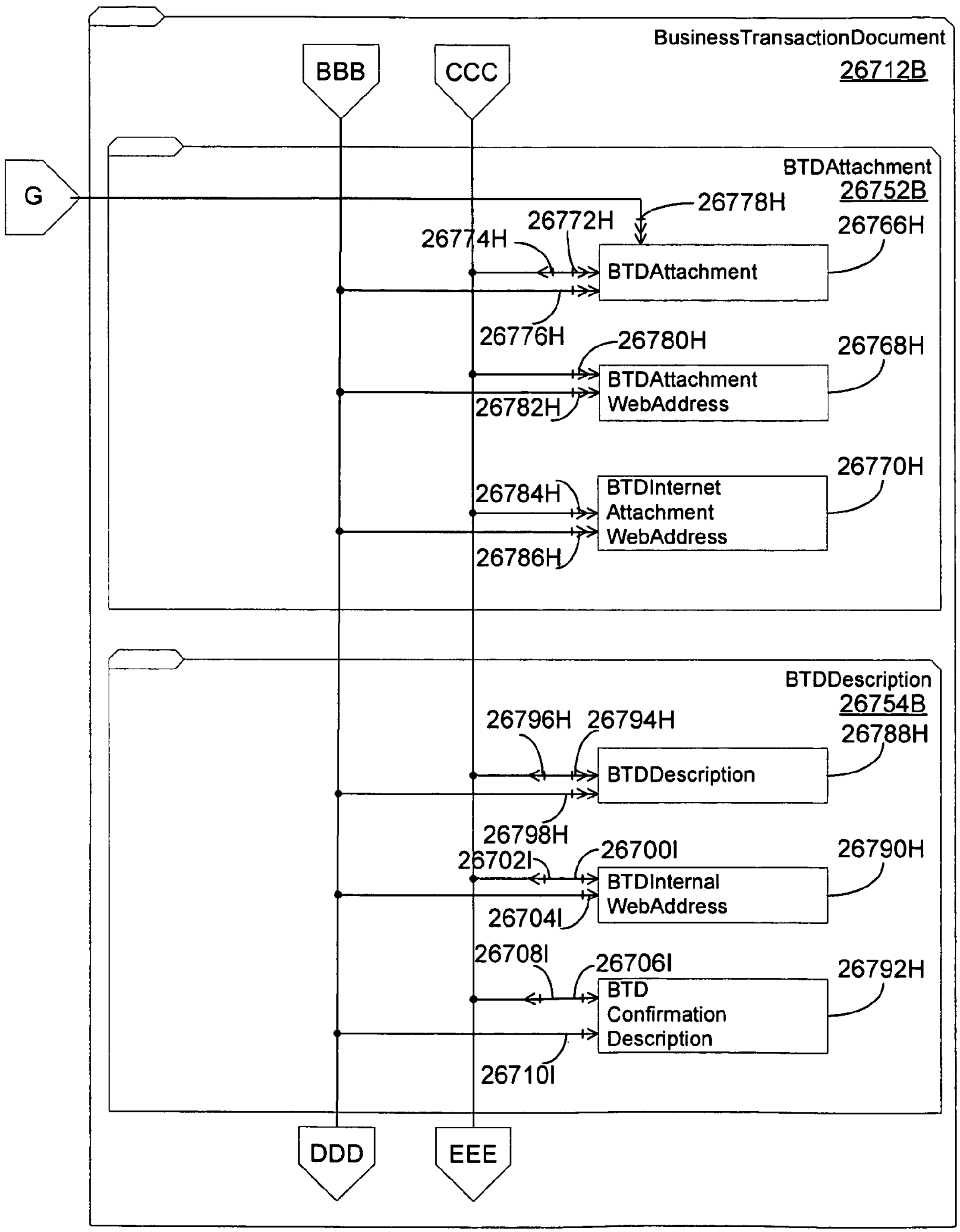
Figure 267F:
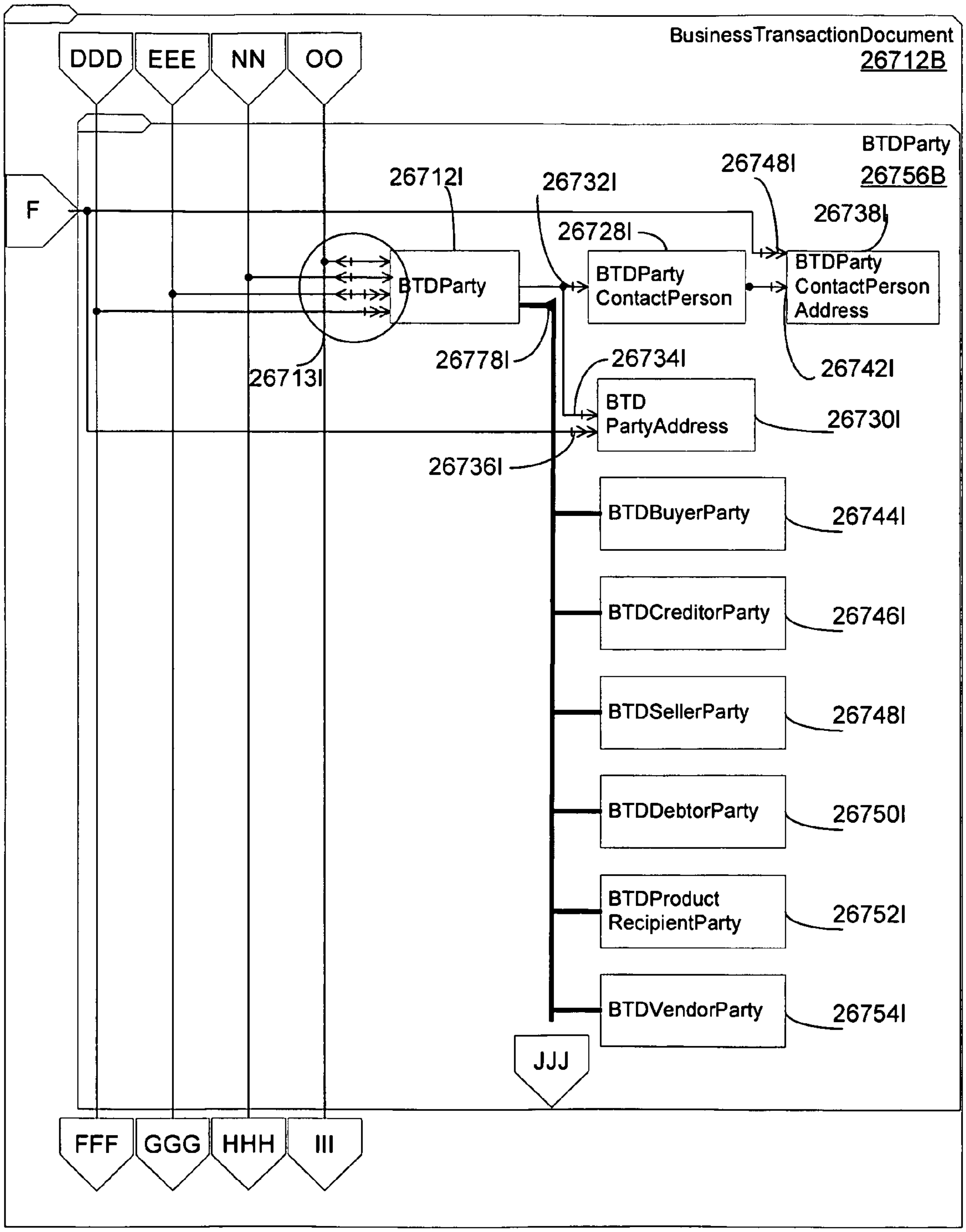
Figure 267G:
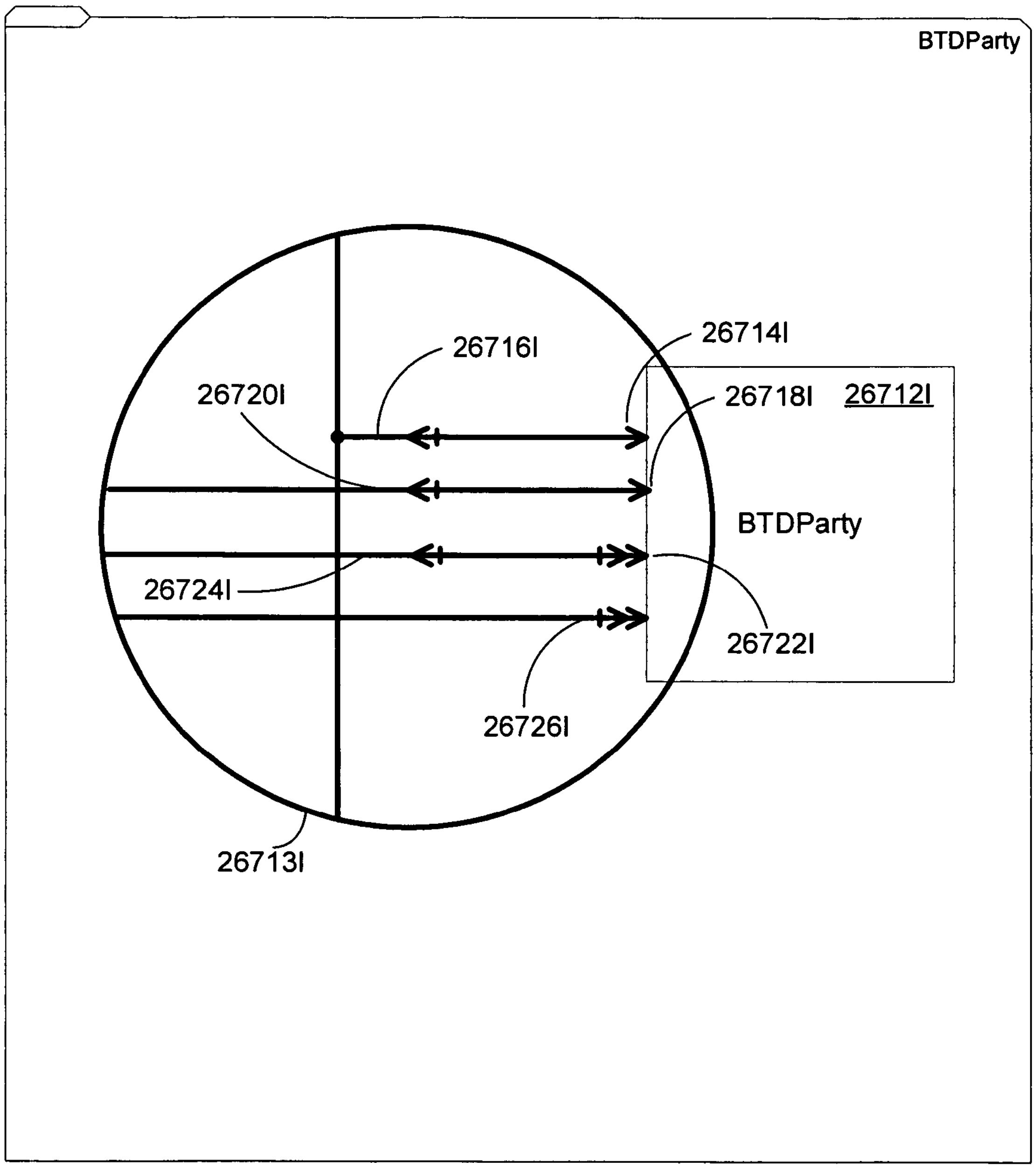
Figure 267H:
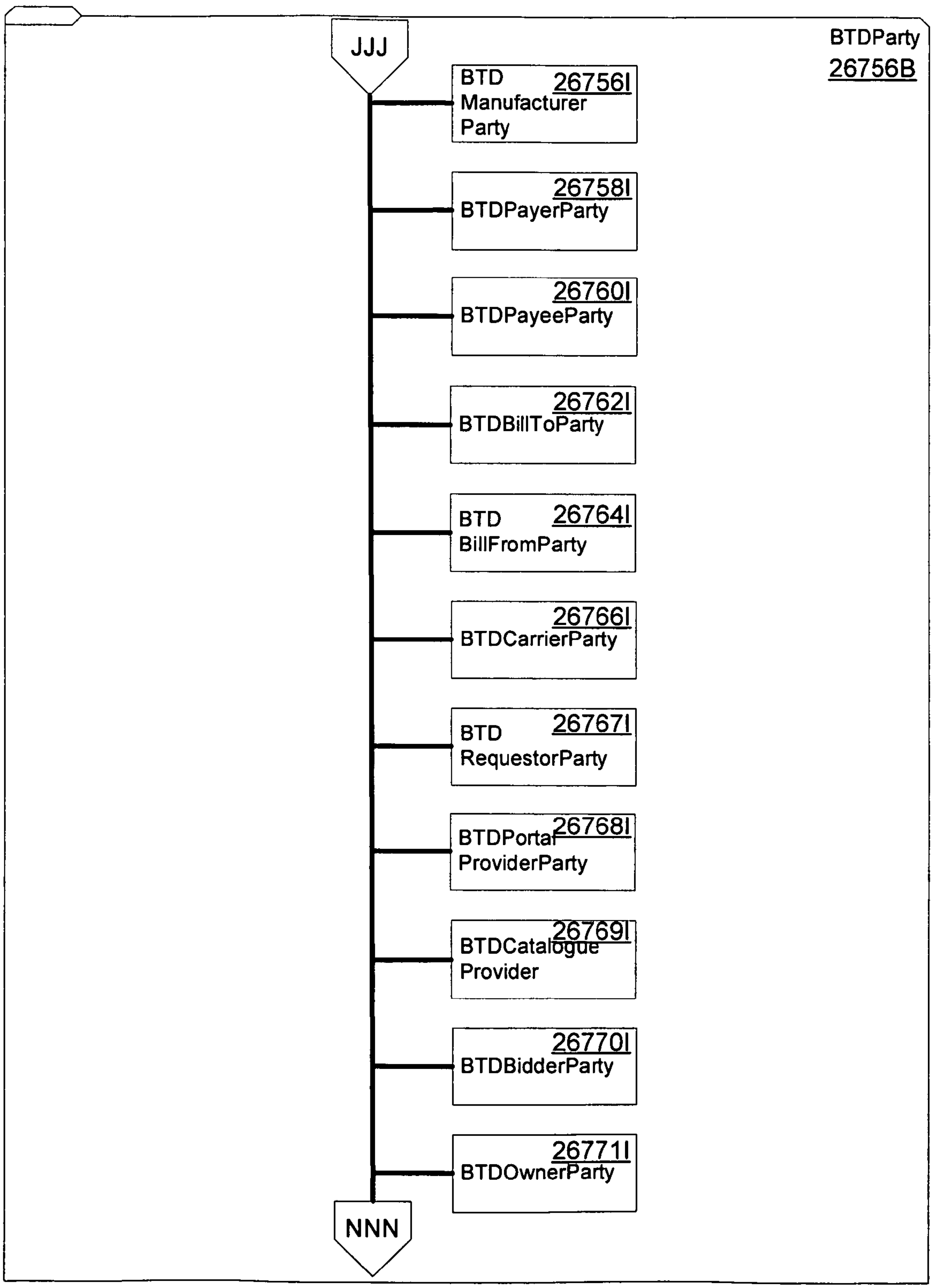
Figure 267I:
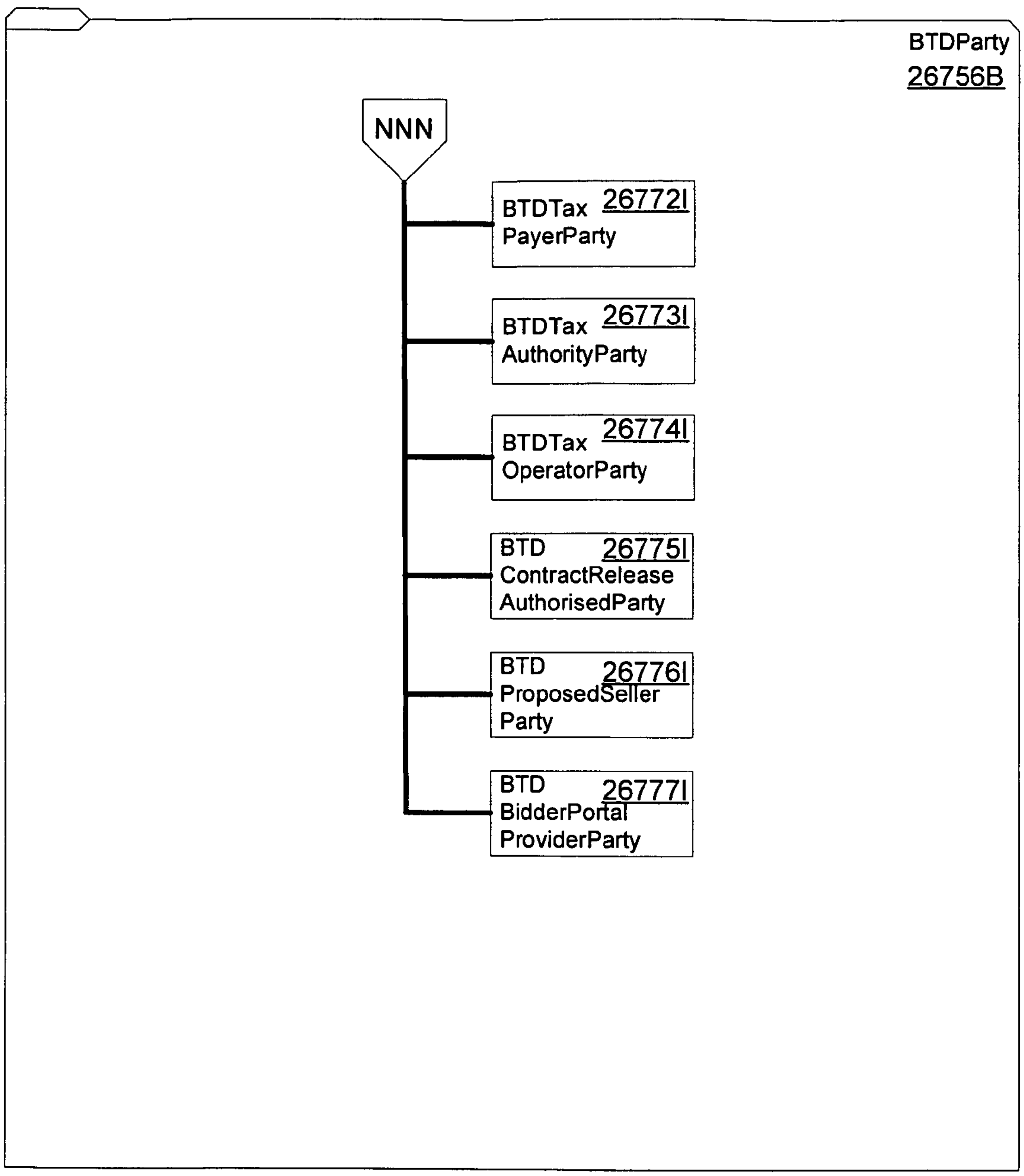
Figure 267J:
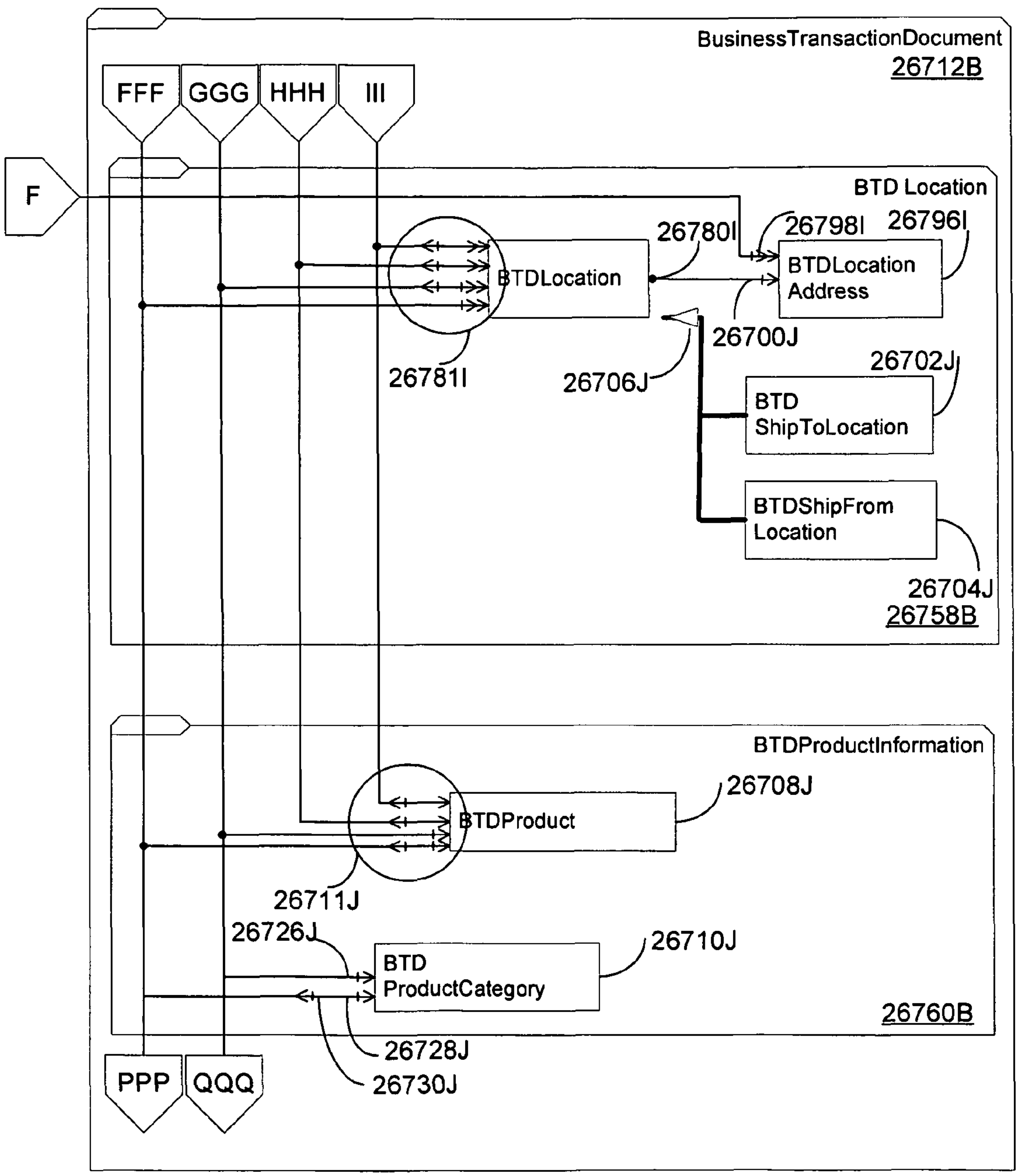
Figure 267K:
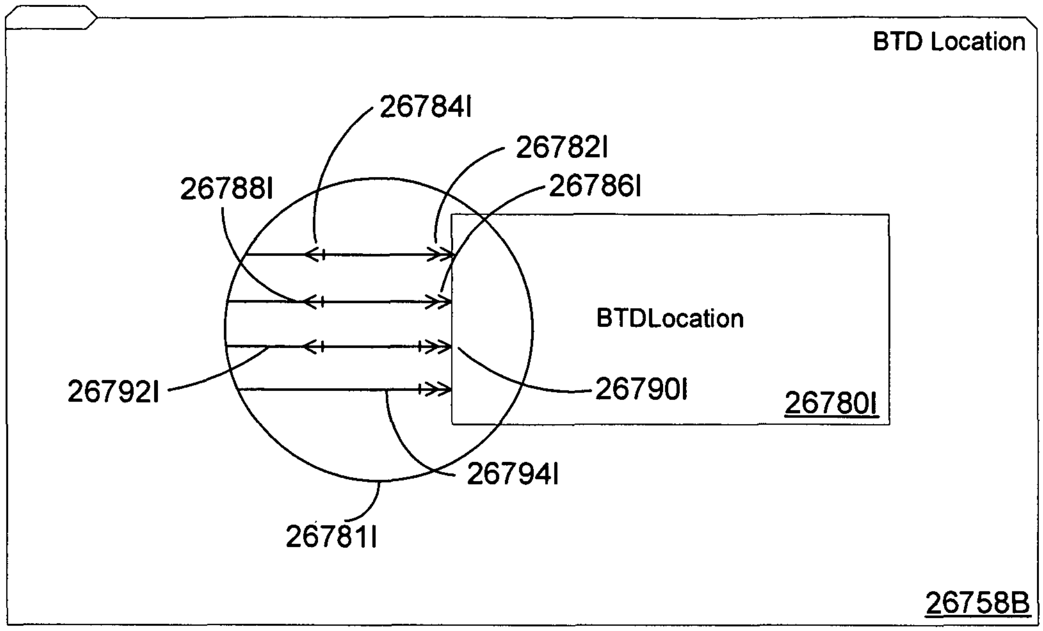
Figure 267L:
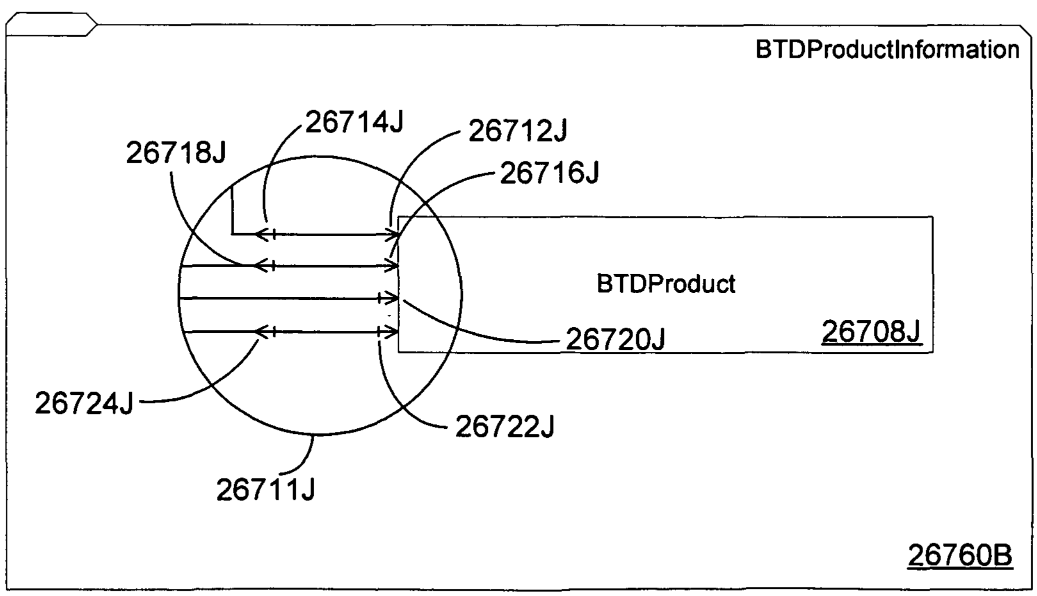
Figure 267M:
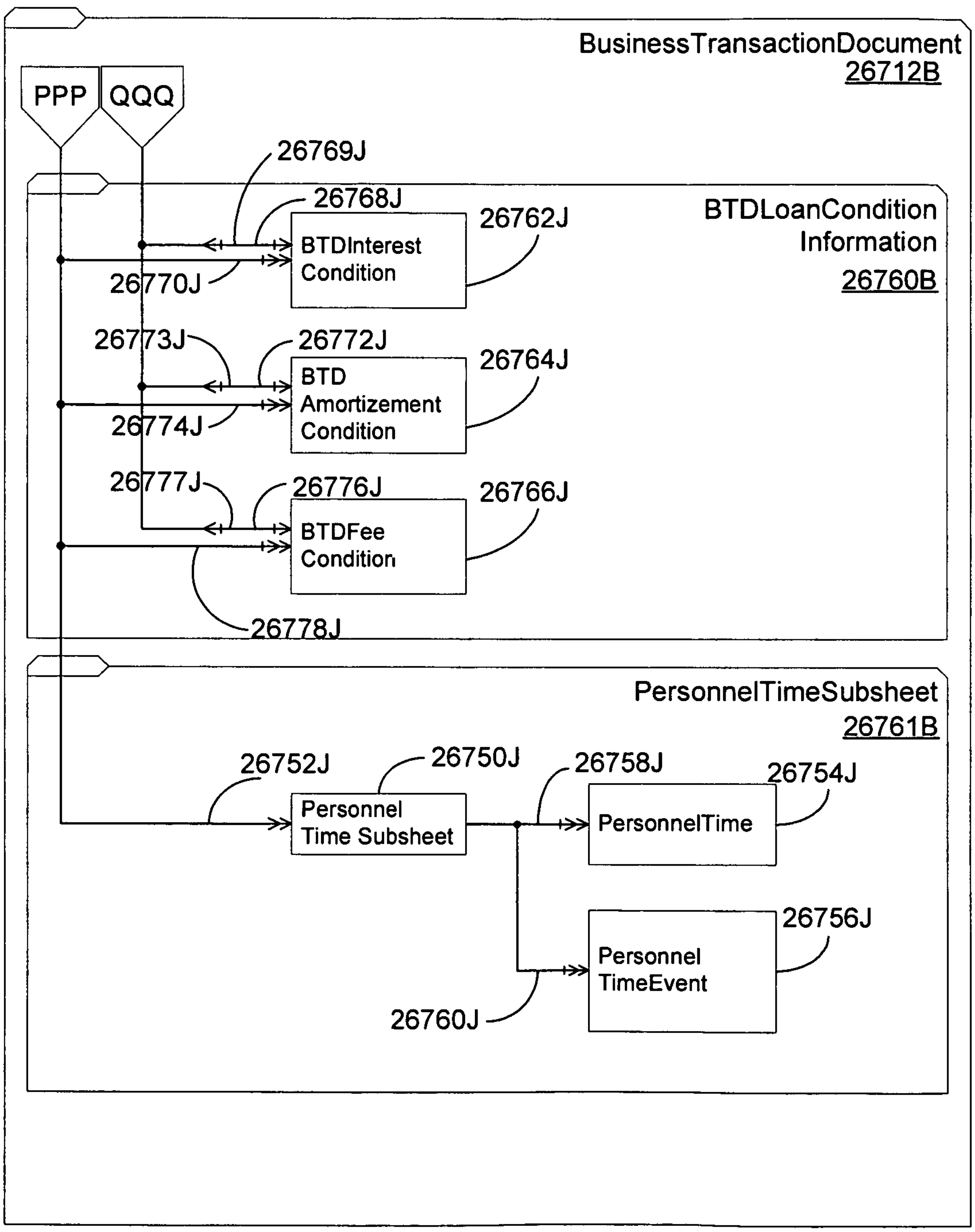
Figure 267N:
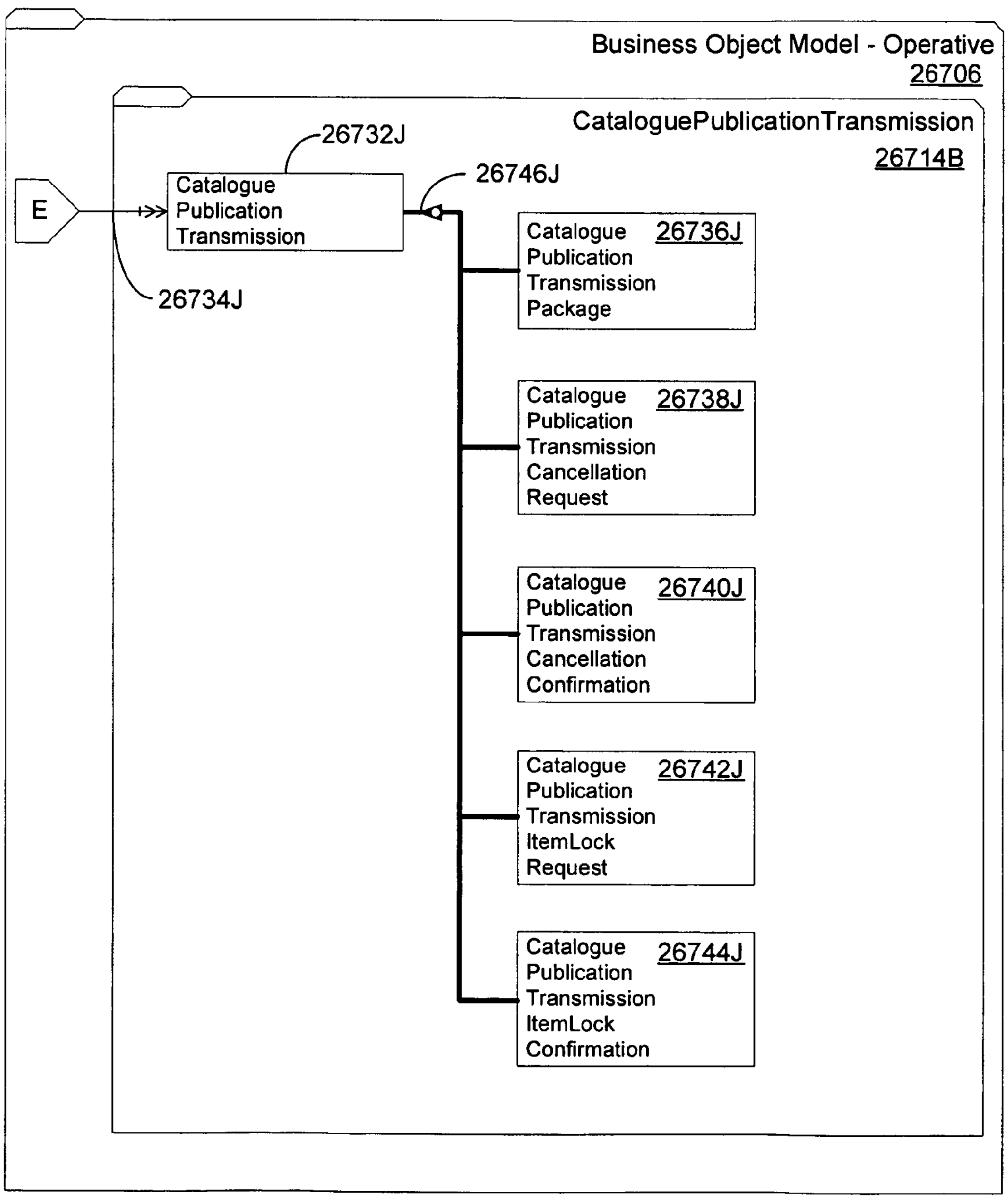

The BTDProductInformation package 26759B includes a BTDProduct entity 26708J and a BTDProductCategory entity 26710J. The details regarding the relationships 26711J to the BTDProduct entity 26708J are depicted in FIG. 267JJ. There is a 1:1 relationship 26712J between the InventoryChangeItemInbound entity 26702F and the BTDProduct entity 26708J, and a 1:c relationship 26714J between the BTDProduct entity 26708J and the InventoryChangeItemInbound entity 26702F. There is a 1:1 relationship 26716J between the InventoryChangeItemOutbound entity 26706F and the BTDProduct entity 26708J, and a 1:c relationship 26718J between the BTDProduct entity 26708J and the InventoryChangeItemOutbound entity 26706F. There is a 1:c relationship 26720J between the BTDItem entity 26768D and the BTDProduct entity 26708J. There is a 1:c relationship 26722J between the BusinessTransactionDocument entity 26762B and the BTDProduct entity 26708J, and a 1:c relationship 26724J between the BTDProduct entity 26708J and the BusinessTransactionDocument entity 26762B. There is a 1:c relationship 26726J between the BTDItem entity 26768D and the BTDProductCategory entity 26710J. There is a 1:c relationship 26728J between the BusinessTransactionDocument entity 26762B and the BTDProductCategory entity 26710J, and a 1:c relationship 26730J between the BTDProductCategory entity 26710J and the BusinessTransactionDocument entity 26762B.

The BTDLoanConditionInformation package includes a BTDInterestCondition entity 26762J, a BTDAmortizementCondition entity 26764J, and a BTDFeeCondition entity 26766J. There is a 1:c relationship 26768J between the BTDItem entity 26768D and the BTDInterestCondition entity 26762J, and a 1:c relationship 26769J between the BTDInterestCondition entity 26762J and the BTDItem entity 26768D. There is a 1:cn relationship 26770J between the BusinessTransactionDocument entity 26762B and the BTDInterestCondition entity 26762J. There is a 1:c relationship 26772J between the BTDItem entity 26768D and the BTDAmortizementCondition entity 26764J, and a 1:c relationship 26773J between the BTDAmortizementCondition entity 26764J and the BTDItem entity 26768D. There is a 1:cn relationship 26774J between the BusinessTransactionDocument entity 26762B and the BTDAmortizementCondition entity 26764J. There is a 1:c relationship 26776J between the BTDItem entity 26768D and the BTDFeeCondition entity 26766J, and a 1:c relationship 26777J between the BTDFeeCondition entity 26766J and the BTDItem entity 26768D. There is a 1:cn relationship 26778J between the BusinessTransactionDocument entity 26762B and the BTDFeeCondition entity 26766J.

The PersonnelTimeSubheet package 26761B includes a PersonnelTimeSubSheet entity 26750J. There is a 1:n relationship 26752J between the BusinessTransactionDocument entity 26762B and the PersonnelTimeSubSheet entity 26750J. The PersonnelTimeSubSheet entity 26750J includes a PersonnelTime entity 26754J and a PersonnelTimeEvent entity 26756J. There is a 1:cn relationship 26758J between the PersonnelTimeSubSheet entity 26750J and the PersonnelTime entity 26754J. There is a 1:cn relationship 26760J between the PersonnelTimeSubSheet entity 26750J and the PersonnelTimeEvent entity 26756J.

The CataloguePublicationTransmission package 26714B includes a CataloguePublicationTransmission entity 26732J. There is a 1:cn relationship 26734J between the Catalogue entity 26766 and the CataloguePublicationTransmission entity 26732J. The CataloguePublicationTransmission entity 26732J is specialized into a CataloguePublicationTransmissionPackage entity 26736J, a CataloguePublicationTransmissionCancellationRequest entity 26738J, a CataloguePublicationTransmissionCancellationConfirmation entity 26740J, a CataloguePublicationTransmissionItemLockRequest entity 26742J and a CataloguePublicationTransmissionItemLockConfirmation entity 26744J, which are disjoint complete specializations 26746J of the CataloguePublicationTransmission entity 26732J.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface.

Figure 313:
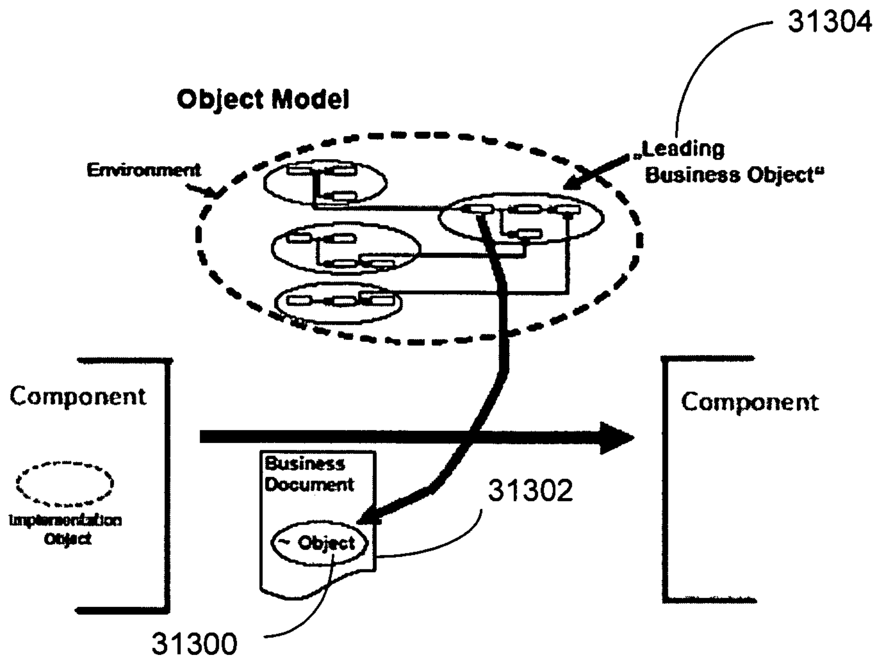
FIGS. 313-317 depict the hierarchization process in accordance with methods and systems consistent with the present invention.

Communication between components takes place via messages that contain business documents. The business document ensures a holistic business-related understanding for the recipient of the message. As depicted in FIG. 313, the object 31300 contained in the business document 31302 (i.e., the "business document object") refers in its semantics to a "leading" business object 31304, which represents a view of the business object and its environment.

The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 314:
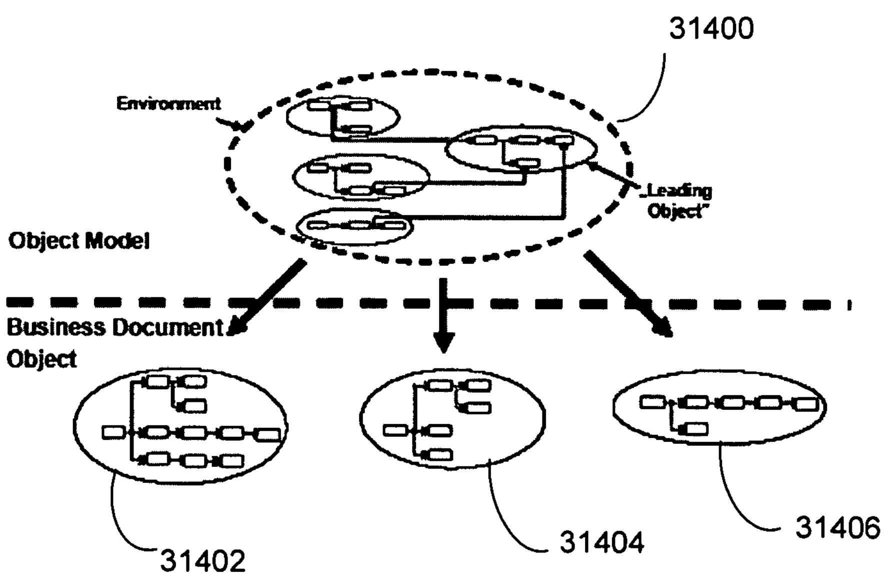

As illustrated in FIG. 314, several business document objects 31402, 31404, and 31406 as overlapping views may be derived for a given leading object 31400. Each business document object results from the object model by hierarchization.

Figure 315:
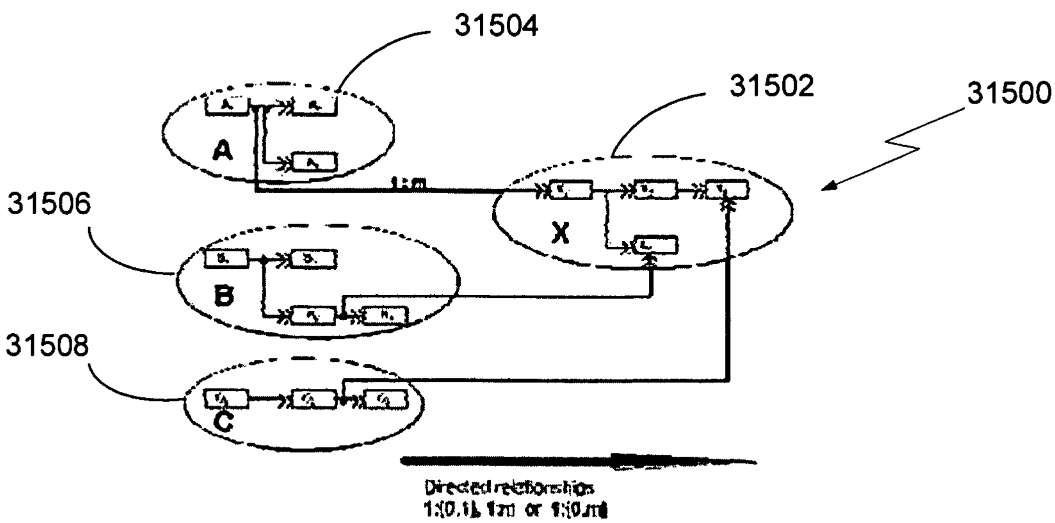

To illustrate the hierarchization process, FIG. 315 depicts an example of an object model 31500 (i.e., a portion of the business object model) that is used to derive an interface. As depicted, leading object X 31502 in the object model 31500 is integrated in a net of object A 31504, object B 31506, and object C 31508. Initially, the parts of the leading object 31502 that are required for the business object document are adopted. Based on these parts, the relationships to the superordinate objects (i.e., objects A, B, and C from which object X depends) are inverted. In other words, these objects are adopted as dependent or subordinate objects in the new business object document.

When creating the interface structure, the internal structure of an object, which may be complex, is strictly hierarchized. Thus, dependent parts keep their dependency structure, and relationships between the parts within the object that do not represent the hierarchical structure are resolved by prioritizing one of the relationships.

For example, object A 31504, object B 31506, and object C 30508 have information that characterize object X. Because object A 31504, object B 31506, and object C 30508 are superordinate to leading object X 31502, the dependencies of these relationships change so that object A 31504, object B 31506, and object C 30508 become dependent and subordinate to leading object X 31502. This procedure is known as "derivation of the business document object by hierarchization."

Figure 316:
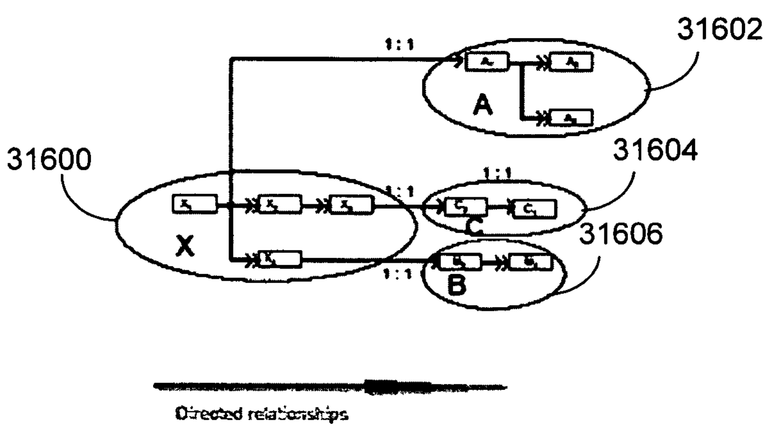
Figure 317:
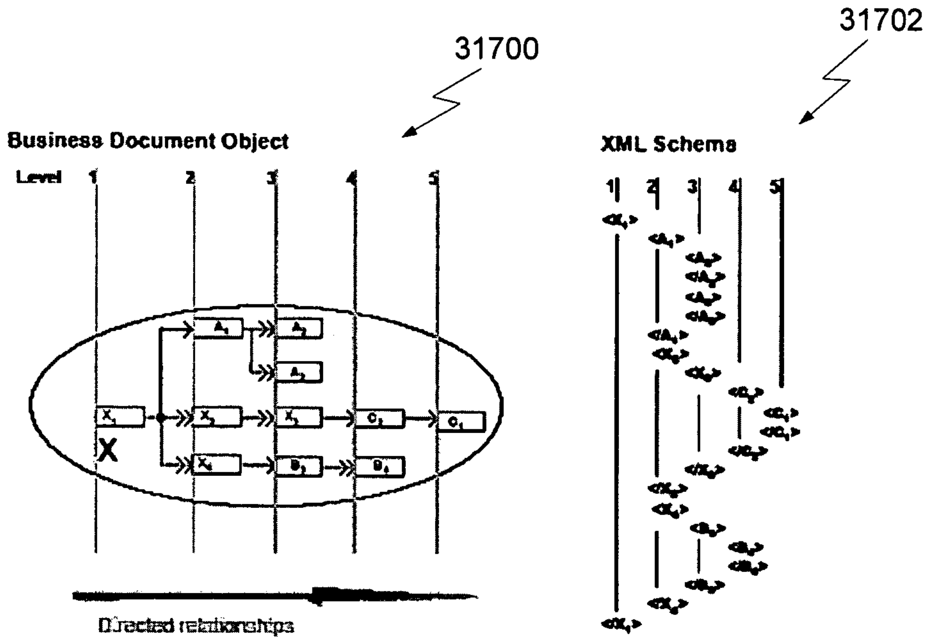

The newly created business document object contains all required information, including the incorporated master data information of the referenced objects. As depicted in FIG. 316, components $X_i$ in leading object X 31600 are adopted directly. The relationship of object X 31600 to object A 31602, object B 31604, and object C 31606 are inverted, and the parts required by these objects are added as objects that depend from object X 31600. As depicted, all of object A 31602 is adopted. $B_3$ and $B_4$ are adopted from object B 31604, but $B_1$ is not adopted. From object C 31606, $C_2$ and $C_1$ are adopted, but $C_3$ is not adopted. FIG. 317 depicts the business document object X 31700 created by this hierarchization process. As shown, the arrangement of the elements corresponds to their dependency levels, which directly leads to a corresponding representation as an XML structure 31702.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Figure 268:
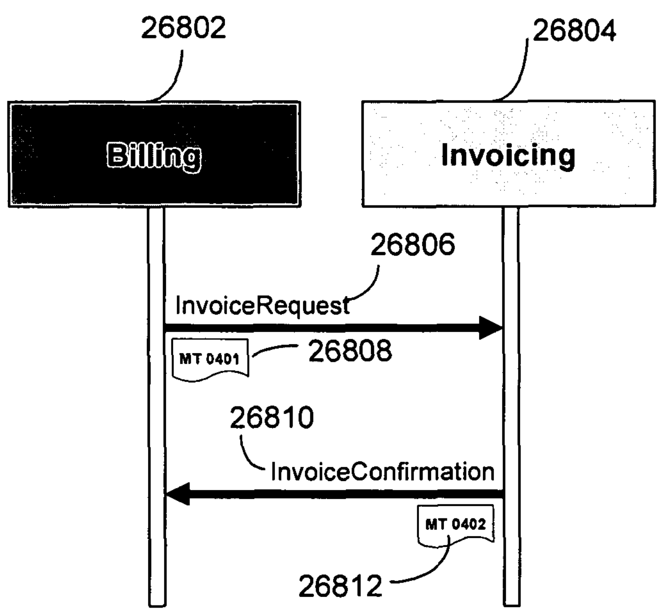
FIG. 268 depicts the message choreography for the Invoice interfaces in accordance with methods and systems consistent with the present invention.

FIG. 268 depicts the message choreography for the Invoice interface. The choreography involves two business entities: Billing 26802 and Invoicing 26804. Billing 26802 sends an InvoiceRequest message 26806 to Invoicing 26804. The message type 26808 of the InvoiceRequest message 26806 is 0401. Invoicing 26804 then sends Billing 26802 an InvoiceConfirmation message 26810. The message type 26812 of the Confirmation message 26810 is 0402.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 269A-F depict a flow diagram of the steps performed by methods and systems consistent with the present invention to generate an interface from the business object model. Although described as being performed by a computer, these steps may alternatively be performed manually, or using any combination thereof. The process begins when the system receives an indication of a package template from the designer, i.e., the designer provides a package template to the system (step 26900).

Package templates specify the arrangement of packages within a business transaction document. Package templates are used to define the overall structure of the messages sent between business entities. Methods and systems consistent with the present invention use package templates in conjunction with the business object model to derive the interfaces.

The system also receives an indication of the message type from the designer (step 26902). The system selects a package from the package template (step 26904), and receives an indication from the designer whether the package is required for the interface (step 26906). If the package is not required for the interface, the system removes the package from the package template (step 26908). The system then continues this analysis for the remaining packages within the package template (step 26910).

Figure 269A:
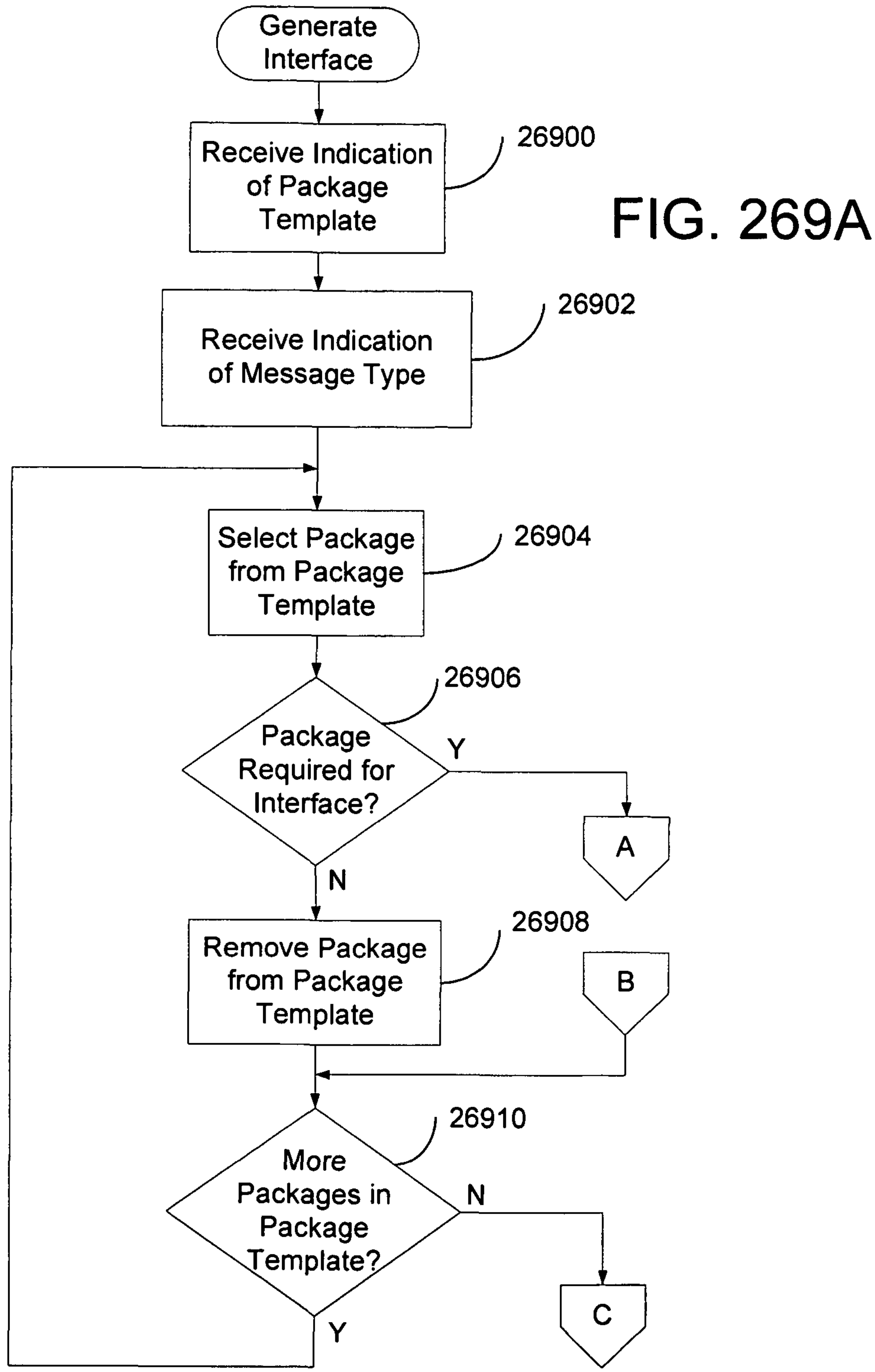
FIGS. 269A-F depict a flow diagram of the steps performed to generate an interface from the business object model in accordance with methods and systems consistent with the present invention.
Figure 269B:
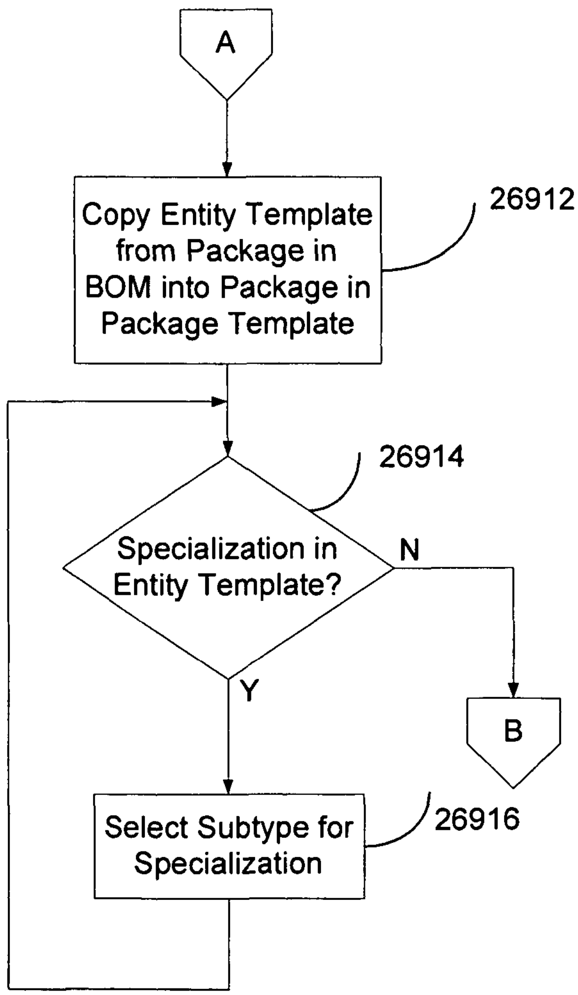
Figure 269C:
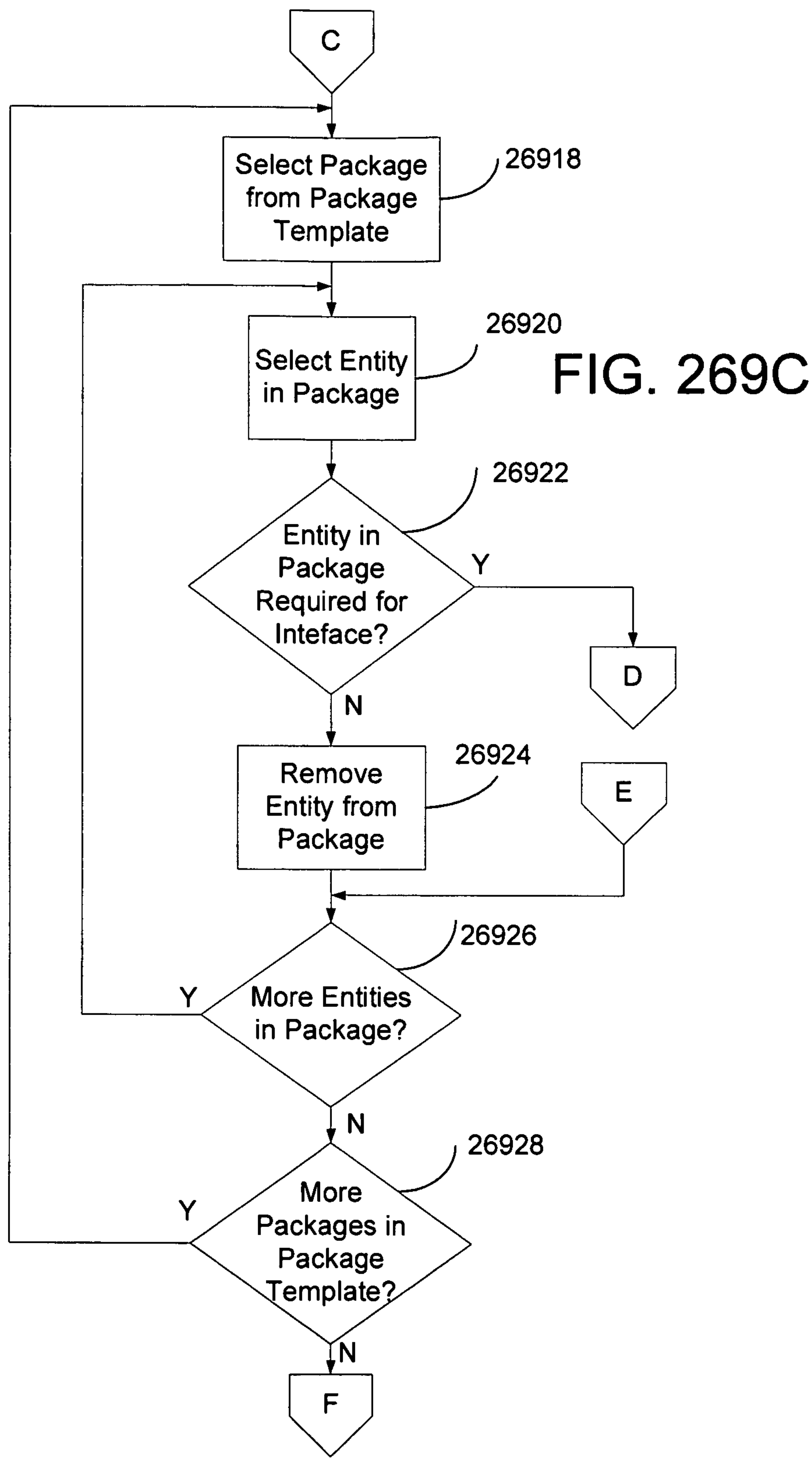

If, at step 26906, the package is required for the interface, the system copies the entity template from the package in the business object model into the package in the package template (step 26912, FIG. 269B). The system determines whether there is a specialization in the entity template (step 26914). If the system determines that there is a specialization in the entity template, the system selects a subtype for the specialization (step 26916). The system may either select the subtype for the specialization based on the message type, or it may receive this information from the designer. The system then determines whether there are any other specializations in the entity template (step 26914). When the system determines that there are no specializations in the entity template, the system continues this analysis for the remaining packages within the package template (step 26910, FIG. 269A).

At step 26910, after the system completes its analysis for the packages within the package template, the system selects one of the packages remaining in the package template (step 26918, FIG. 269C), and selects an entity from the package (step 26920). The system receives an indication from the designer whether the entity is required for the interface (step 26922). If the entity is not required for the interface, the system removes the entity from the package template (step 26924). The system then continues this analysis for the remaining entities within the package (step 26926), and for the remaining packages within the package template (step 26928).

Figure 269D:
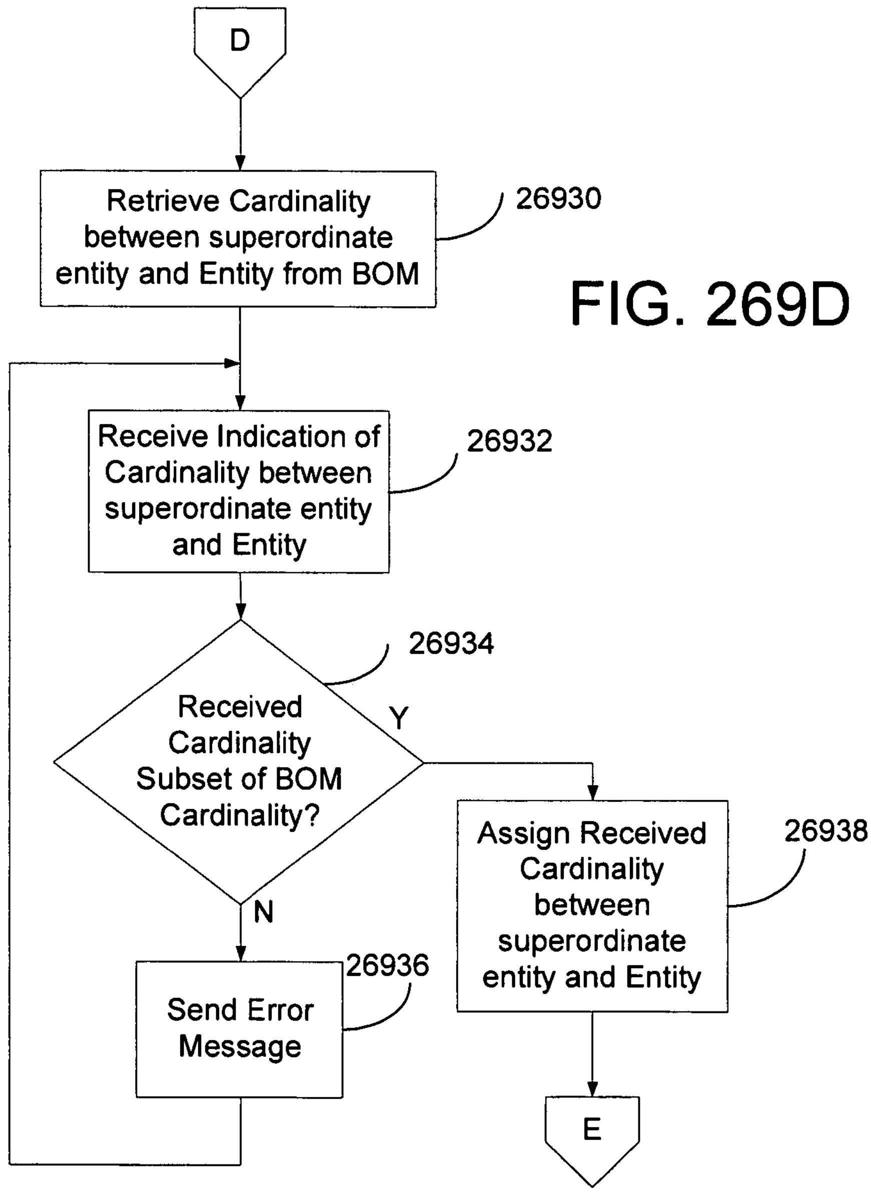
Figure 269E:
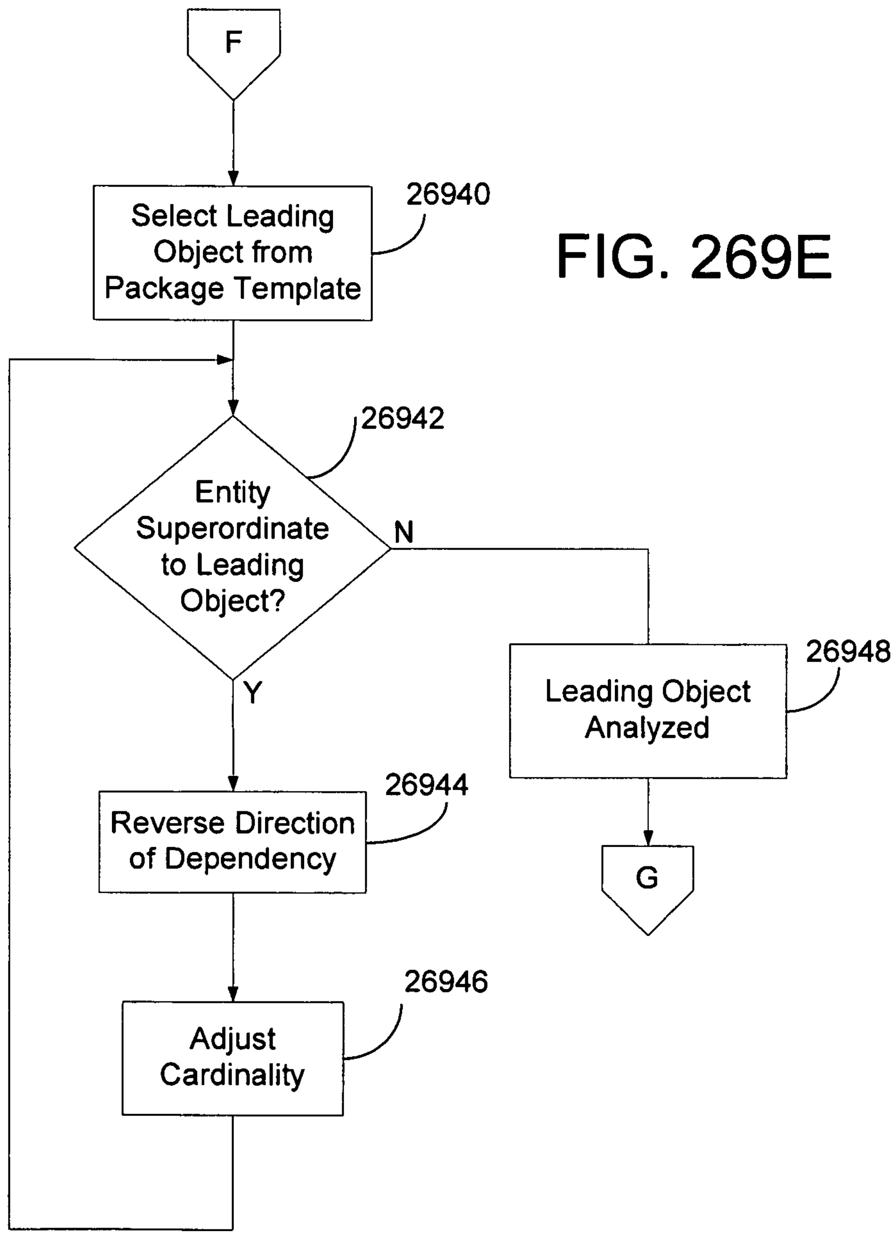
Figure 269F:
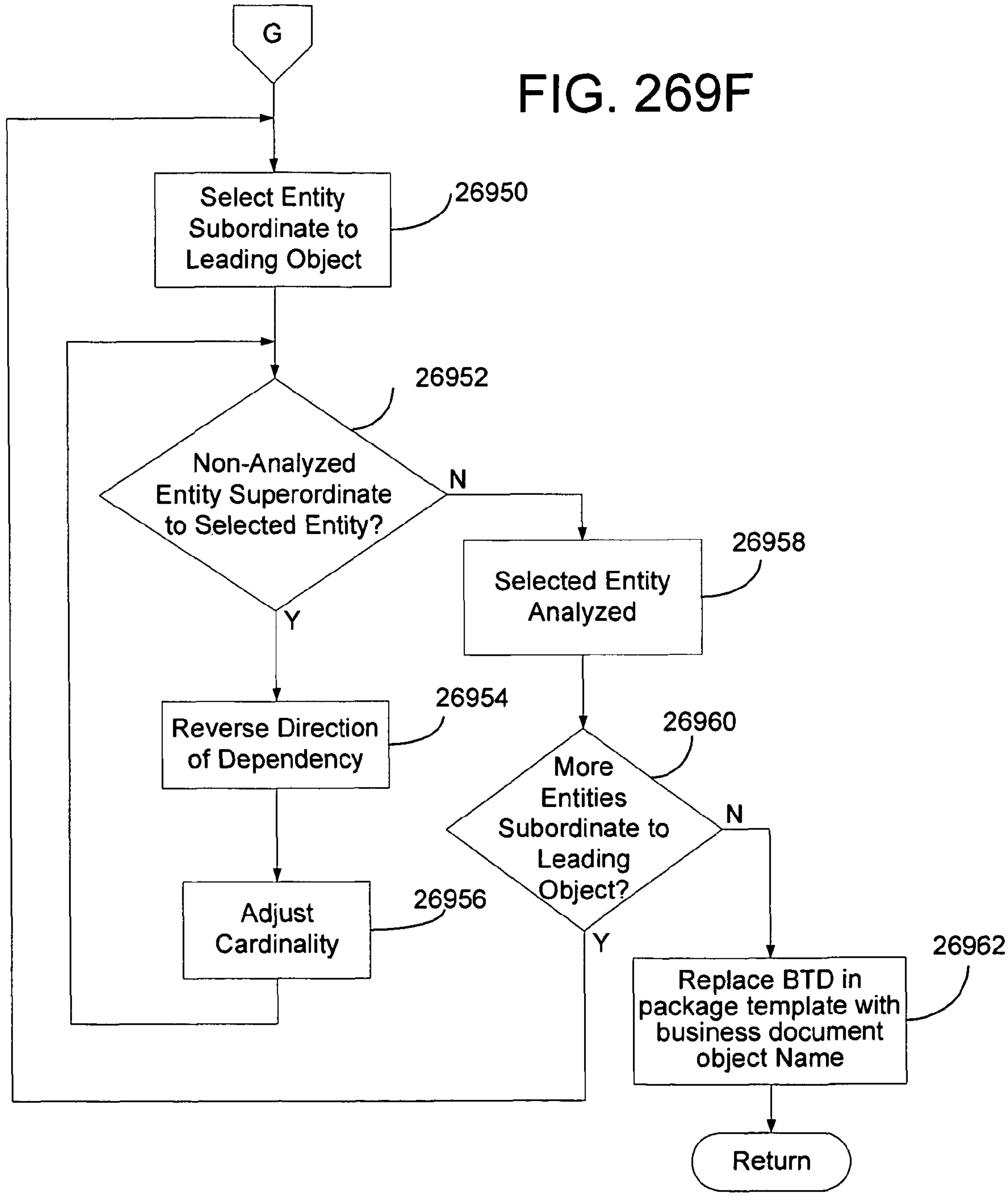

If, at step 26922, the entity is required for the interface, the system retrieves the cardinality between a superordinate entity and the entity from the business object model (step 26930, FIG. 269D). The system also receives an indication of the cardinality between the superordinate entity and the entity from the designer (step 26932). The system then determines whether the received cardinality is a subset of the business object model cardinality (step 26934). If the received cardinality is not a subset of the business object model cardinality, the system sends an error message to the designer (step 26936). If the received cardinality is a subset of the business object model cardinality, the system assigns the received cardinality as the cardinality between the superordinate entity and the entity (step 26938). The system then continues this analysis for the remaining entities within the package (step 26926, FIG. 269C), and for the remaining packages within the package template (step 26928).

The system then selects a leading object from the package template (step 26940, FIG. 269E) The system determines whether there is an entity superordinate to the leading object (step 26942). If the system determines that there is an entity superordinate to the leading object, the system reverses the direction of the dependency (step 26944) and adjusts the cardinality between the leading object and the entity (step 26946). The system performs this analysis for entities that are superordinate to the leading object (step 26942). If the system determines that there are no entities superordinate to the leading object, the system identifies the leading object as analyzed (step 26948).

The system then selects an entity that is subordinate to the leading object (step 26950). The system determines whether any non-analyzed entities are superordinate to the selected entity (step 26952). If a non-analyzed entity is superordinate to the selected entity, the system reverses the direction of the dependency (step 26954) and adjusts the cardinality between the selected entity and the non-analyzed entity (step 26956). The system performs this analysis for non-analyzed entities that are superordinate to the selected entity (step 26952). If the system determines that there are no non-analyzed entities superordinate to the selected entity, the system identifies the selected entity as analyzed (step 26958), and continues this analysis for entities that are subordinate to the leading object (step 26960). After the packages have been analyzed, the system substitutes the BusinessTransactionDocument ("BTD") in the package template with the name of the interface (step 26962). This includes the "BTD" in the BTDItem package and the "BTD" in the BTDItemScheduleLine package.

Figure 270A:
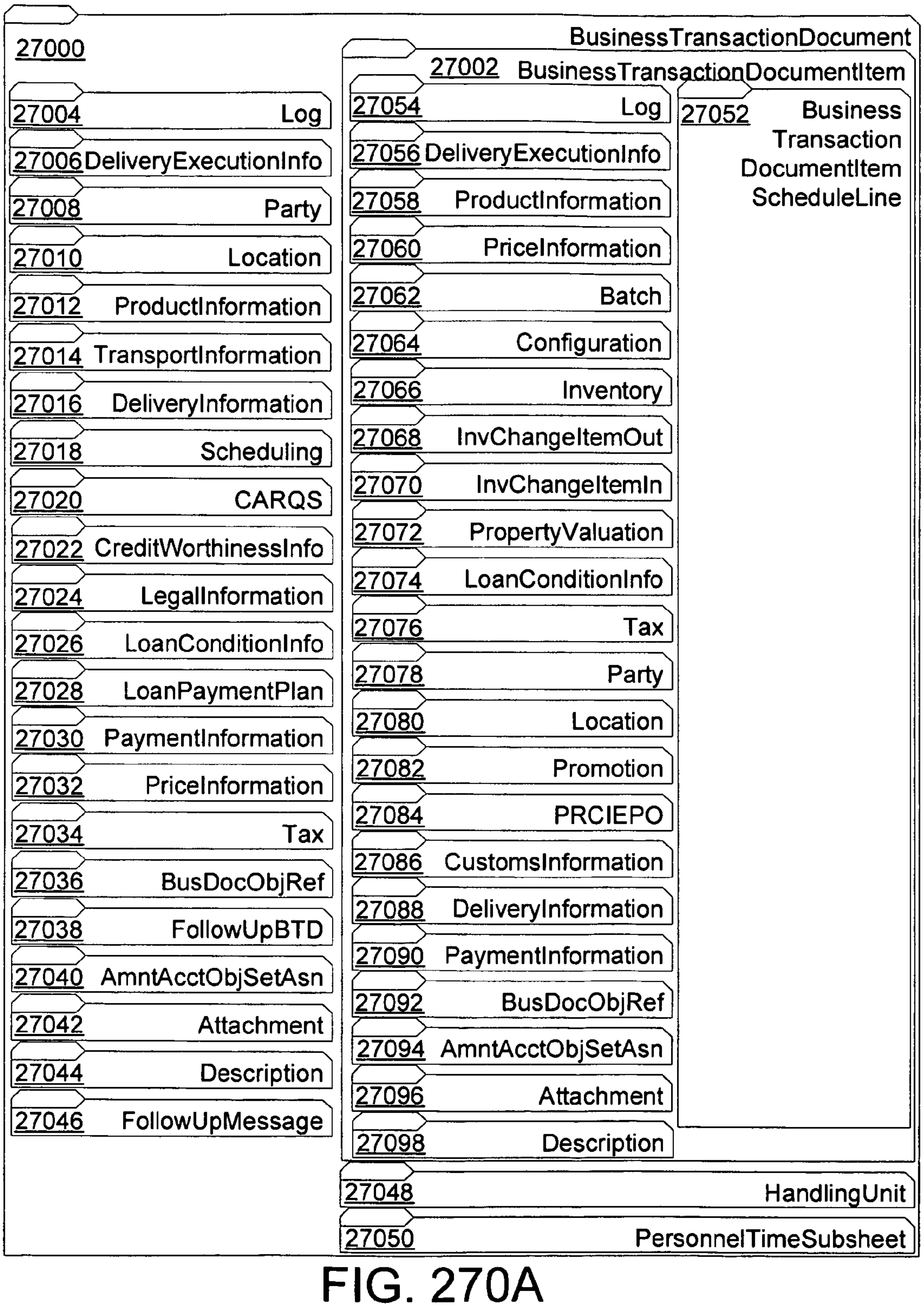
FIGS. 270A-C depict examples of package templates in accordance with methods and systems consistent with the present invention.

For example, FIG. 270A depicts an illustrative package template for a BusinessTransactionDocument 27000. The package template includes a BusinessTransactionDocumentItem package 27002, a Log package 27004, a DeliveryExecutionInformation package 27006, a Party package 27008, a Location package 27010, a ProductInformation package 27012, a TransportInformation package 27014, a DeliveryInformation package 27016, a Scheduling package 27018, a CreditAgencyReportQueryService package 27020, a CreditWorthinessInformation package 27022, a LegalInformation package 27024, a LoanConditionInformation package 27026, a LoanPaymentPlan package 27028, a PaymentInformation package 27030, a PriceInformation package 27032, a Tax package 27034, a BusinessDocumentObjectReference package 27036, a FollowUpBusinessTransactionDocument package 27038, an AmountAccountingObjectSetAssignment package 27040, an Attachment package 27042, a Description package 27044, a FollowUpMessage package 27046, a HandlingUnit package 27048, and a PersonnelTimeSubsheet package 27050. The BusinessTransactionDocumentItem package 27002 includes a BusinessTransactionDocumentItemScheduleLine package 27052, a Log package 27054, a DeliveryExecutionInformation package 27056, a ProductInformation package 27058, a PriceInformation package 27060, a Batch package 27062, a Configuration package 27064, an Inventory package 27066, an InventoryChangeItemOutbound package 27068, an InventoryChangeItemInbound package 27070, a PropertyValuation package 27072, a LoanConditionInformation package 27074, a Tax package 27076, a Party package 27078, a Location package 27080, a Promotion package 27082, a PurchaseRequirementConfirmationItemExecutingPurchaseOrder package 27084, a CustomsInformation package 27086, a DeliveryInformation package 27088, a PaymentInformation package 27090, a BusinessDocumentObjectReference package 27092, an AmountAccountingObjectSetAssignment package 27094, an Attachment package 27096, and a Description package 27098.

Figure 270B:
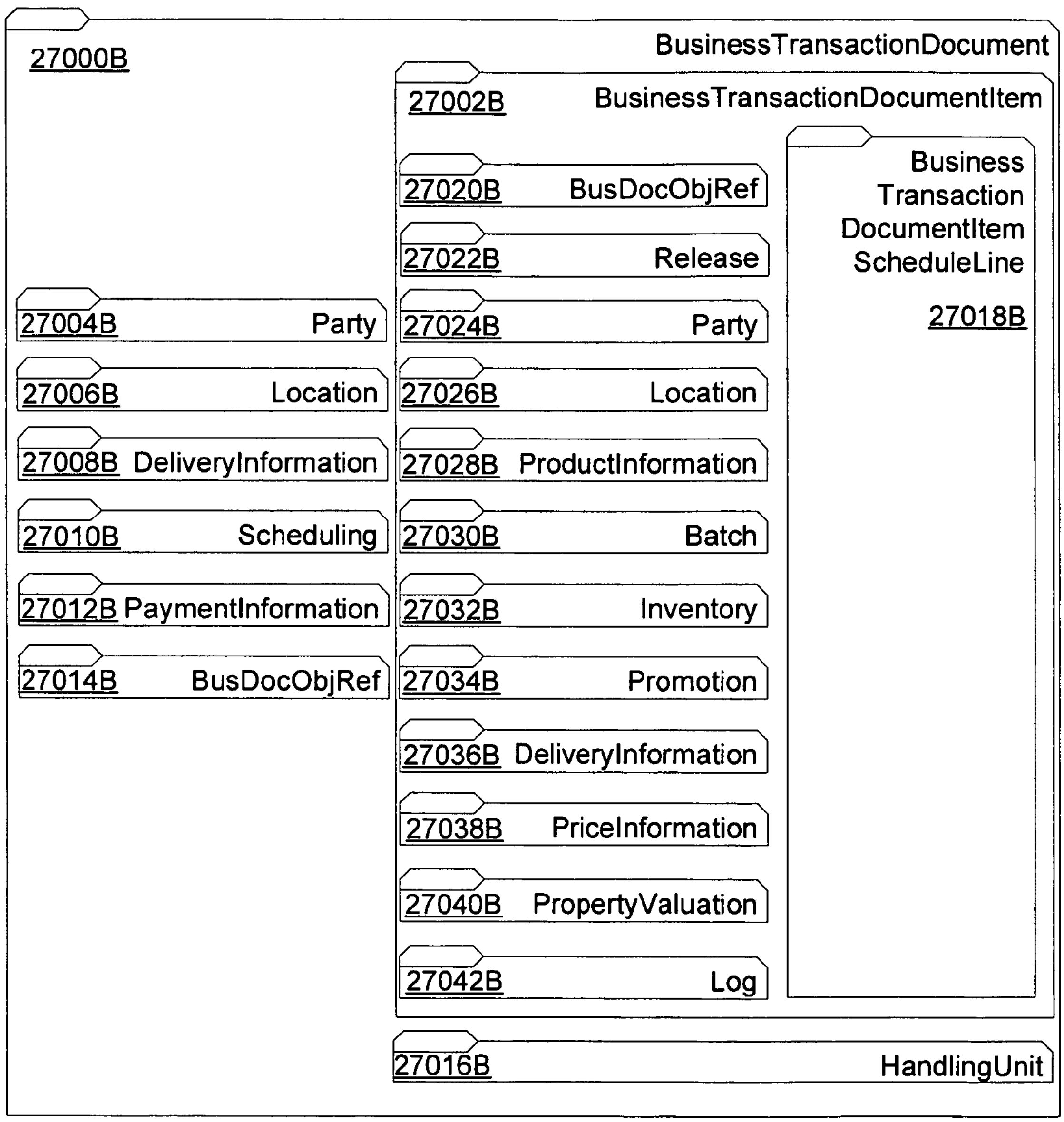

FIG. 270B depicts an illustrative package template for a BusinessTransactionDocument 27000B for an SCM. The package template includes a BusinessTransactionDocumentItem package 27002B, a Party package 27004B, a Location package 27006B, a DeliveryInformation package 27008B, a Scheduling package 27010B, a PaymentInformation package 27012B, a BusinessDocumentObjectReference package 27014B, and a HandlingUnit package 27016B. The BusinessTransactionDocumentItem package 27002B includes a BusinessTransactionDocumentItemScheduleLine package 27018B, a BusinessTransactionDocumentItemScheduleLine package 27020B, a Release package 27022B, a Party package 27024B, a Location package 27026B, a ProductInformation package 27028B, a Batch package 27030B, an Inventory package 27032B, a Promotion package 27034B, a DeliveryInformation package 27036B, a PriceInformation package 27038B, a PropertyValuation package 27040B, and a Log package 27042B.

Figure 270C:
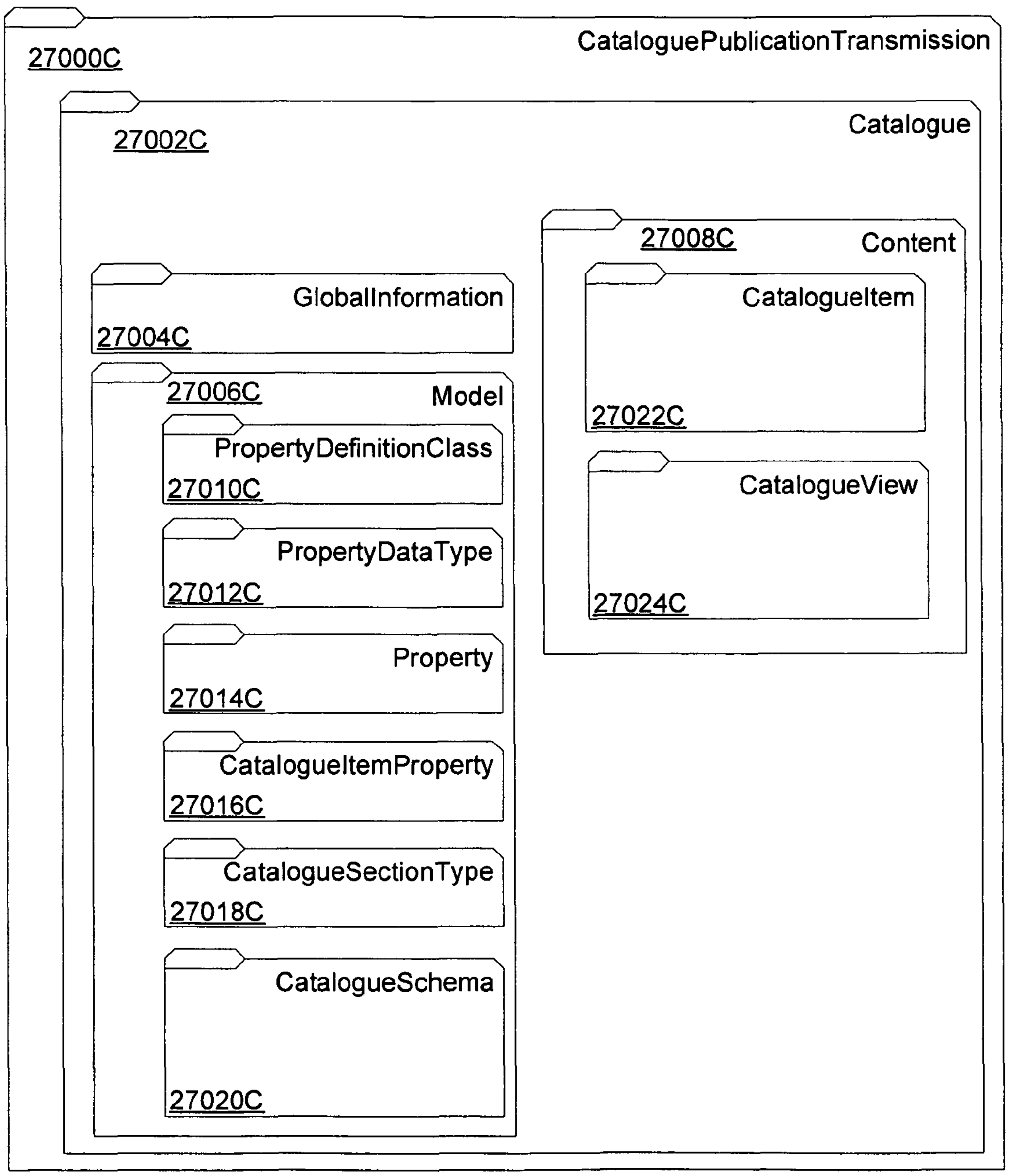

FIG. 270C depicts an illustrative package template for Master Data. The CataloguePublicationTransmission package template 27000C includes a Catalogue package 27002C. The Catalogue package 27002C includes a GlobalInformation package 27004C, a Model package 27006C, and a Content package 27008C. The Model package 27006C includes a PropertyDefinitionClass package 27010C, a PropertyDataType package 27012C, a Property package 27014C, a CatalogueItemProperty package 27016C, a CatalogueSectionType package 27018C, and a CatalogueSchema package 27020C. The Content package 27008C includes a CatalogueItem package 27022C and a CatalogueView package 27024C.

For example, to generate an Invoice Request using the BusinessTransactionDocument package template 27000 in FIG. 270A, the system initially selects the Log package 27004. After receiving an indication from the designer that the Log package 27004 is not required for the Invoice Request, the system removes the package from the package template. The system then selects the DeliveryExecutionInformation package 27006. After receiving an indication from the designer that the DeliveryExecutionInformation package 27006 is not required for the Invoice Request, the system removes this package from the package template, resulting in the BusinessTransactionDocument package depicted in FIG. 271. The system then selects the Party package 27008. After receiving an indication from the designer that the Party package 27008 is required for an Invoice Request, the system copies the entity template from the business object model into the Party package, as depicted in FIG. 272. The Party package entity template 27200 includes a BTDParty entity 27202, which is specialized into subtypes BTDBuyerParty entity 27204, BTDCreditorParty entity 27206, BTDSellerParty entity 27208, BTDDebtorParty entity 27210, BTDProductRecipientParty entity 27212, BTDVendorParty entity 27214, BTDManfacturerParty entity 27216, BTDPayerParty entity 27218, BTDPayeeParty entity 27220, BTDBillToParty entity 27222, BTDBillFromParty entity 27224, BTDCarrierParty entity 27226, BTDRequestorParty entity 27228, BTDPortalProviderParty entity 27230, BTDCatalogueProviderParty entity 27232, BTDBidderParty entity 27234, and BTDOwnerParty entity 27236.

Figure 273:
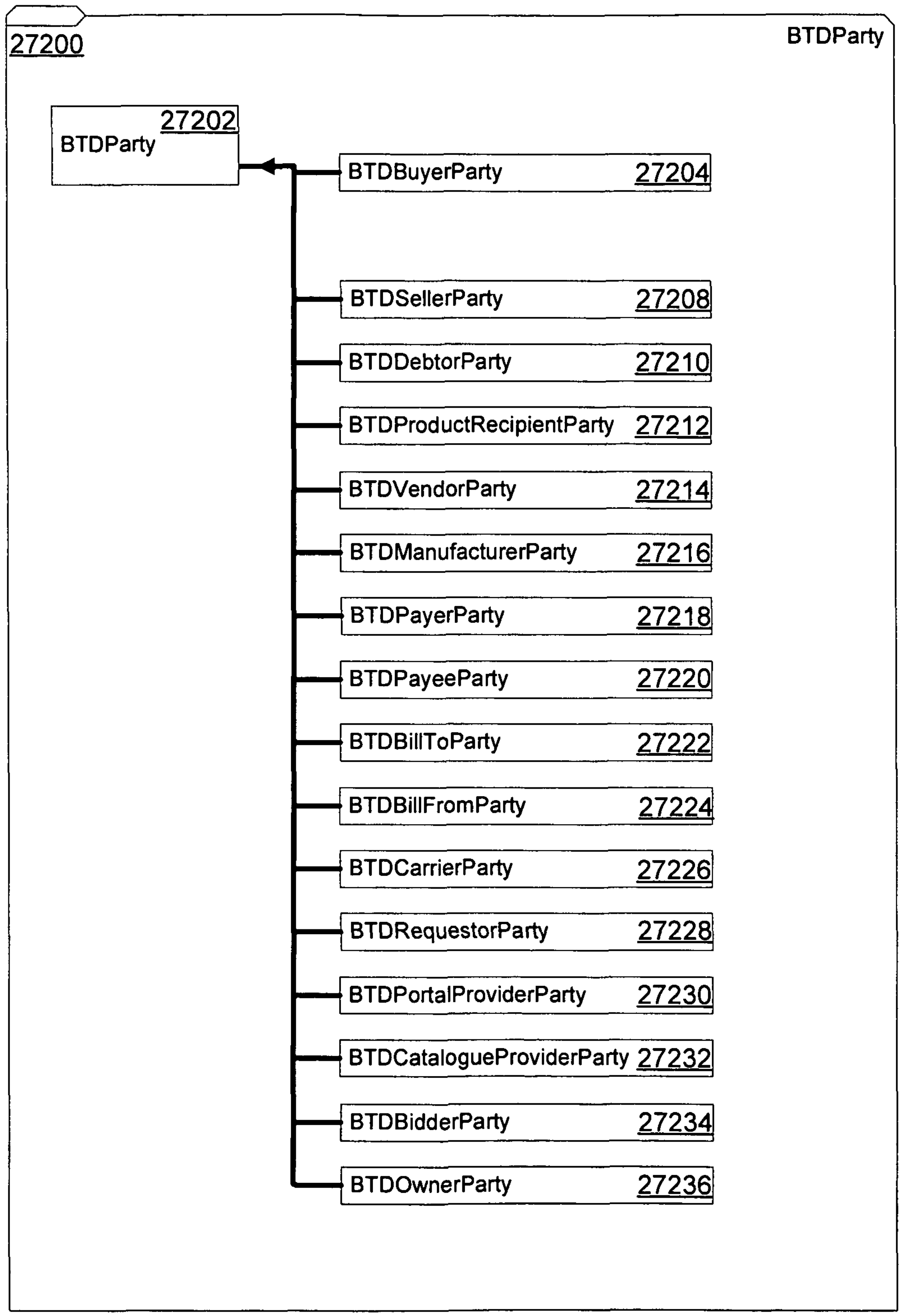
FIG. 273 depicts the entity template for the party package of FIG. 272 after removal of an entity in accordance with methods and systems consistent with the present invention.
Figure 274:
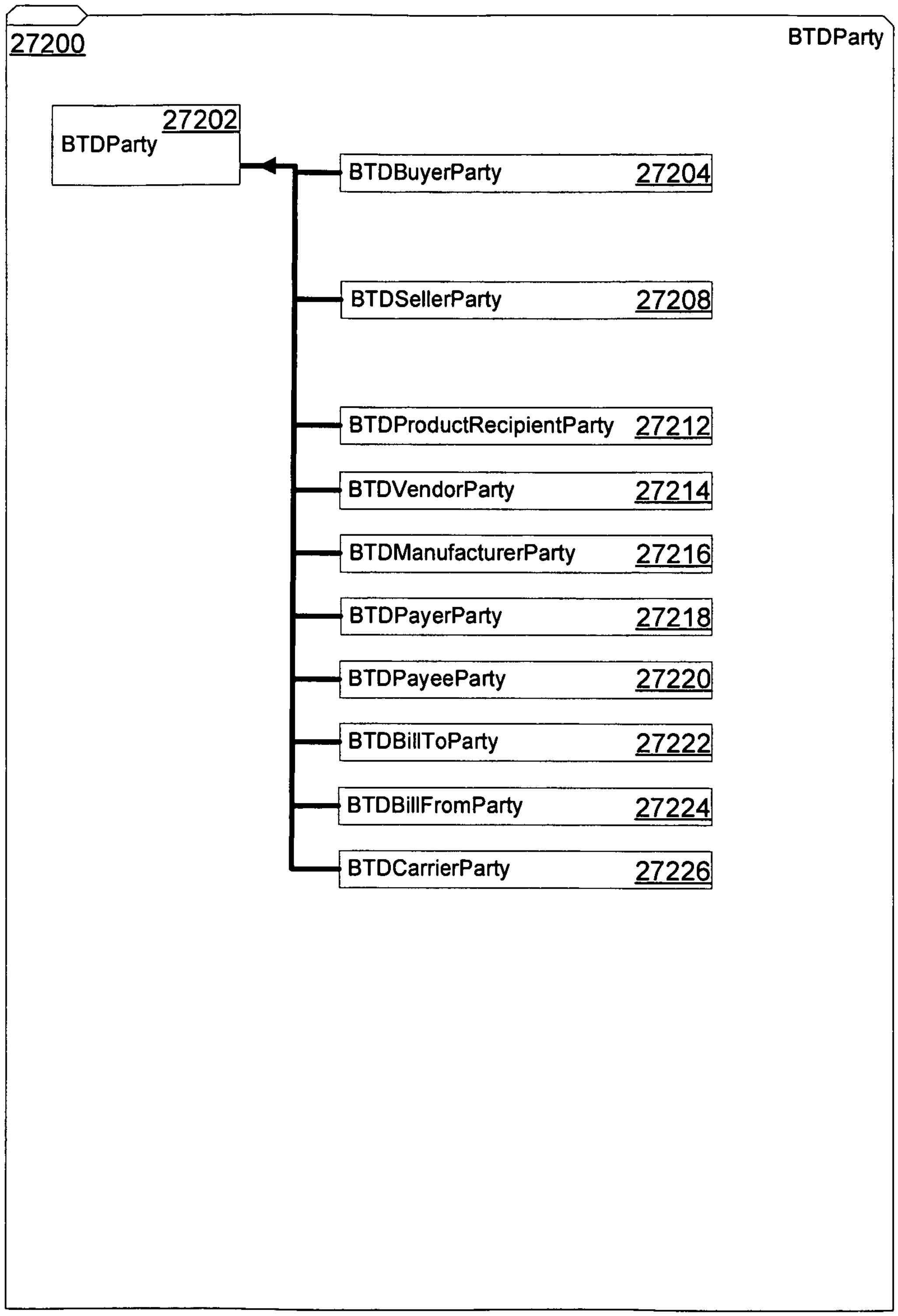
FIG. 274 depicts the party package of FIG. 272 after removal of the nonessential entities for the Invoice Request in accordance with methods and systems consistent with the present invention.

The system starts by selecting the BTDBuyerParty entity 27204. After receiving an indication from the designer that the BTDBuyerParty entity 27204 is required in the Invoice Request, the system proceeds to the next entity, the BTD-Creditorparty entity 27206. After receiving an indication from the designer that the BTDCreditorParty entity 27206 is not required for the Invoice Request, the system removes this entity from the Party package, resulting in the Party package depicted in FIG. 273. The system continues with the remaining entities of the Party package, and ultimately removes the BTDCreditorParty entity 27206, the BTDDebtorParty entity 27210, the BTDRequestorParty entity 27228, the BTDPortalProviderParty entity 27230, the BTDCatalogueProviderParty entity 27232, the BTDBidderParty entity 27234, and the BTDOwnerParty entity 27236. FIG. 274 depicts the Party package after the system removes the nonessential entities for the Invoice Request.

Figure 275:
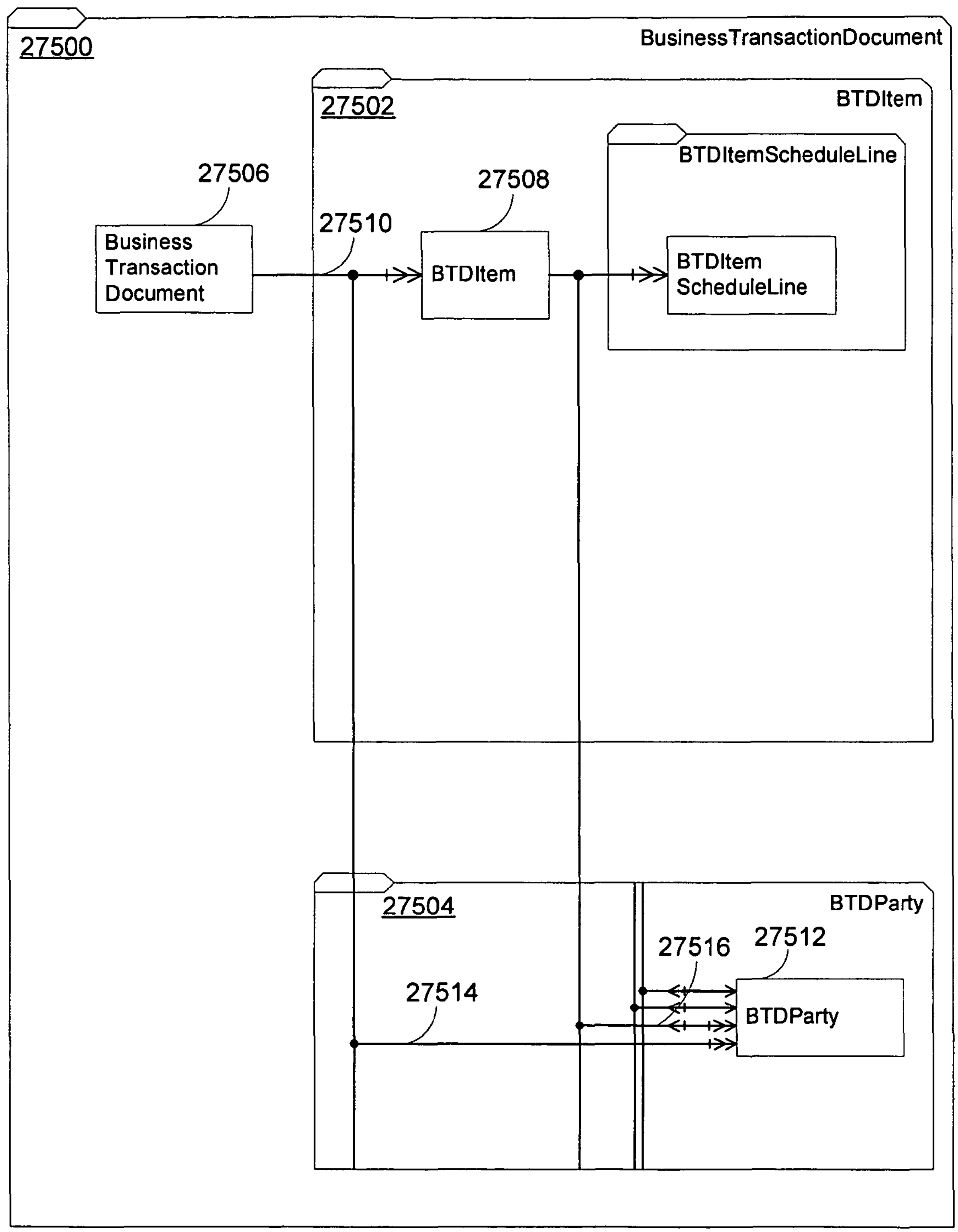
FIG. 275 depicts a portion of the business object model in accordance with methods and systems consistent with the present invention.
Figure 276:
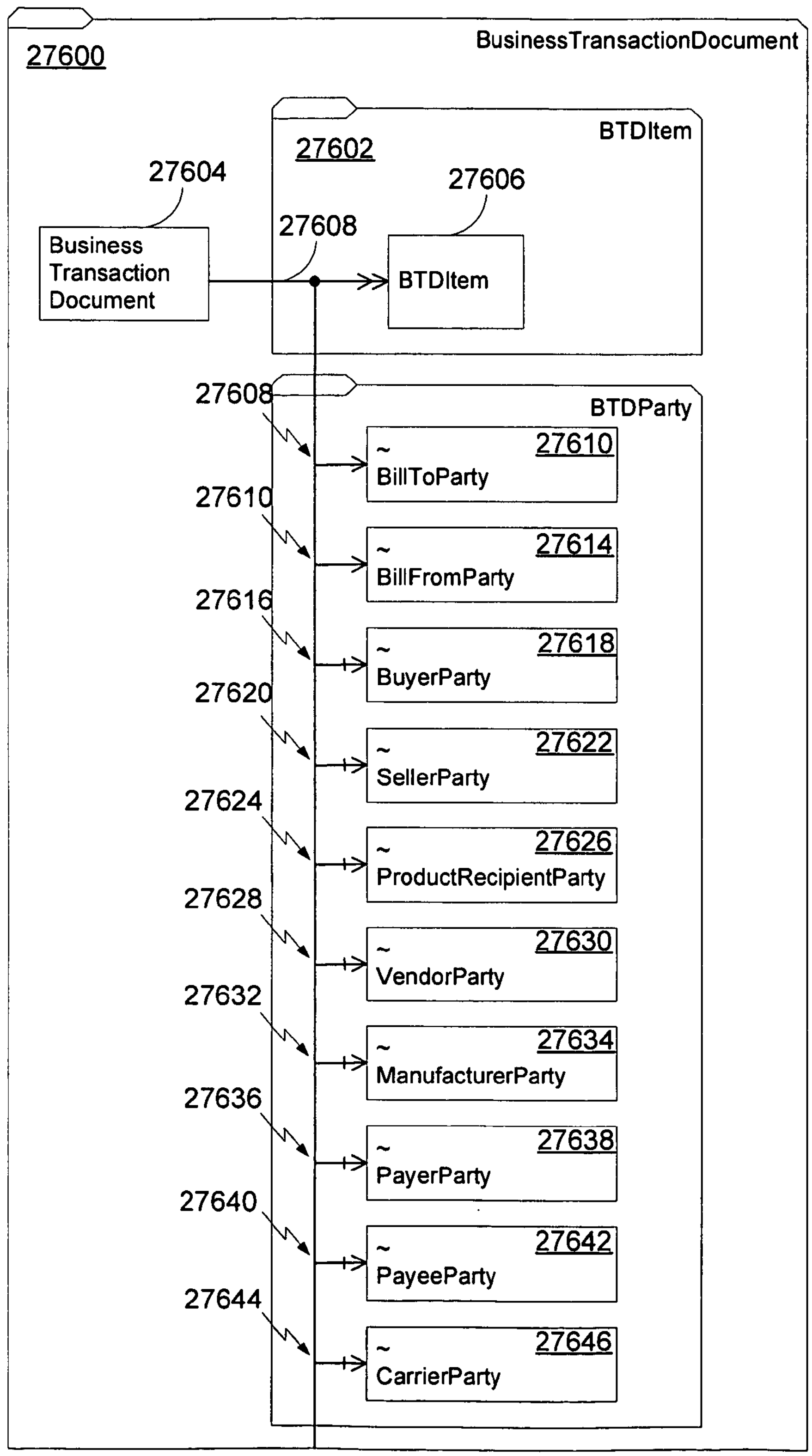
FIG. 276 depicts another portion of the business object model in accordance with methods and systems consistent with the present invention.

The system then retrieves the cardinality between the business transaction document and the entity from the business object model. In this example, the relevant portions of the business object model are depicted in FIG. 275. As depicted, the BusinessTransactionDocument package 27500 includes a BTDItem package 27502 and a BTDParty package 27504. The cardinality between the BusinessTransactionDocument entity 27506 and the BTDItem entity 27508, depicted by line 27510, indicates that there is a 1:cn relationship between the BusinessTransactionDocument entity 27506 and the BTDItem entity 27508 in the business object model. Because the designer may select a subset of this cardinality, the designer may select any cardinality between the BusinessTransactionDocument entity 27506 and the BTDItem entity 27508 in the Invoice Request. For the Invoice Request, the designer selects a 1:n relationship between the BusinessTransactionDocument entity 27604 and the BTDItem entity 27606, as depicted by the cardinality 27608, as depicted in FIG. 276.

The cardinality between the BusinessTransactionDocument entity 27506 and the BTDParty entity 27512, depicted by line 27514, indicates that there is a 1:cn relationship between the BusinessTransactionDocument entity 27506 and the BTDParty entity 27512. Thus, the designer may select any cardinality between the BusinessTransactionDocument entity 27506 and the BTDParty entity 27512 in the Invoice Request. As depicted in FIG. 276, the designer selects a 1:1 relationship between the BusinessTransactionDocument entity 27604 and the BillToParty entity 27610, as depicted by the cardinality 27608. The designer also selects a 1:1 relationship between the BusinessTransactionDocument entity 27604 and the BillFromParty entity 27614, as depicted by the cardinality 27610. The designer selects a 1:c relationship between the BusinessTransactionDocument entity 27604 and the BuyerParty entity 27618, the SellerParty entity 27622, the ProductRecipientParty entity 27626, the VendorParty entity 27630, the ManufacturerParty entity 27634, the PayerParty entity 27638, the PayeeParty entity 27642, and the CarrierParty entity 27646 as depicted by the cardinalities 27616, 27620, 27624, 27628, 27632, 27636, 27640, and 27644, respectively.

Figure 271:
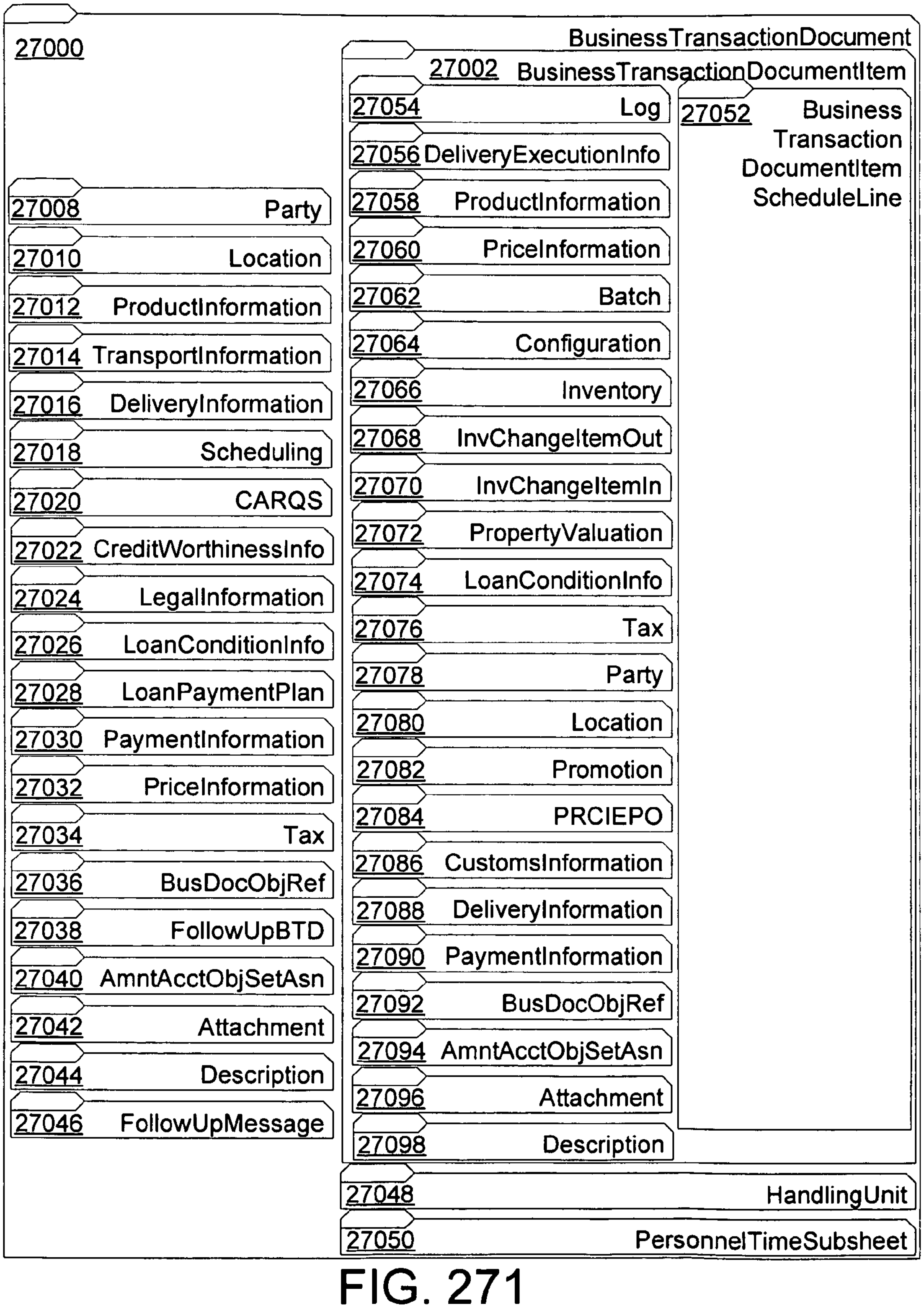
FIG. 271 depicts the package template of FIG. 270A after the removal of a package in accordance with methods and systems consistent with the present invention.
Figure 272:
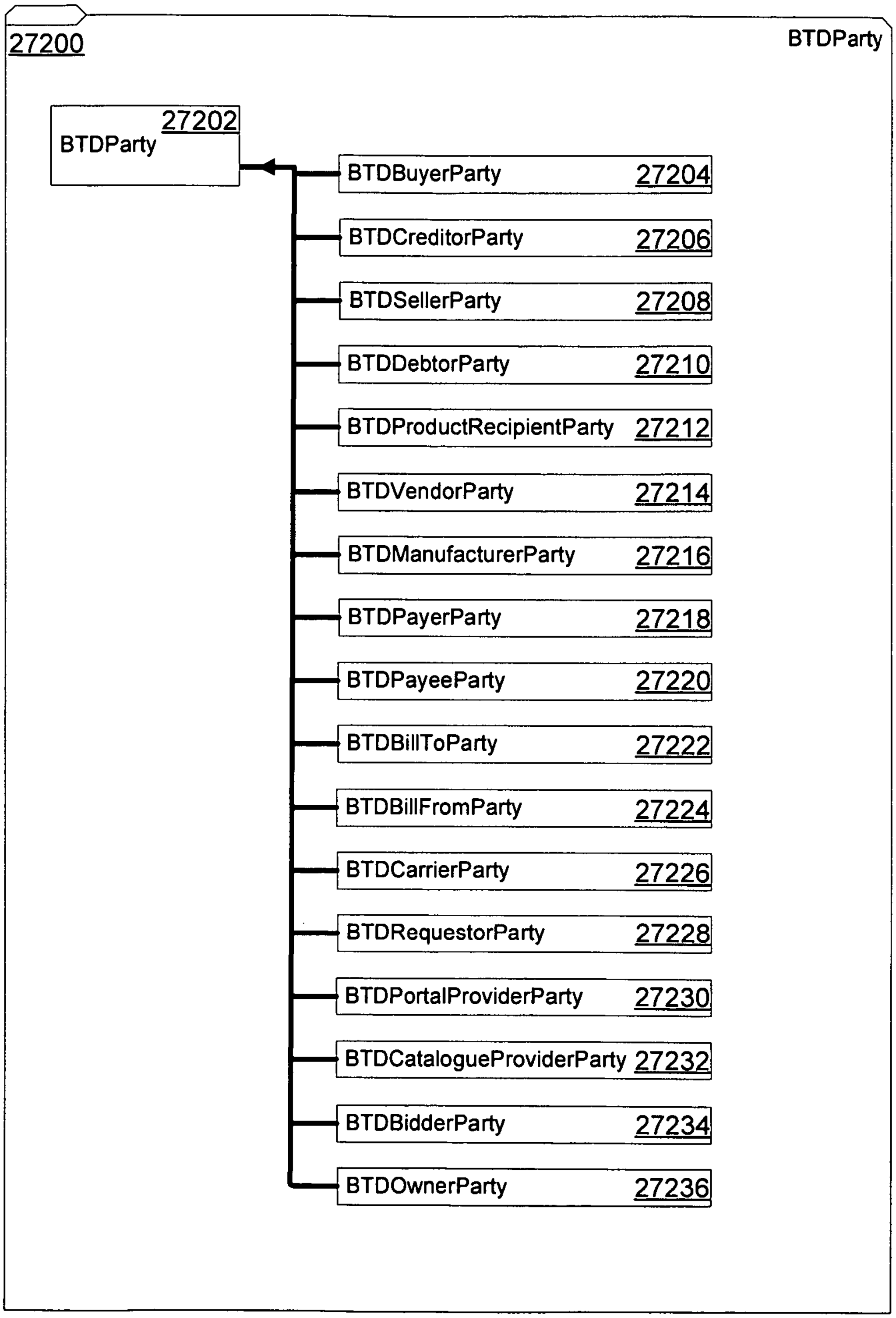
FIG. 272 depicts the entity template for the party package from the business object model in accordance with methods and systems consistent with the present invention.
Figure 277:
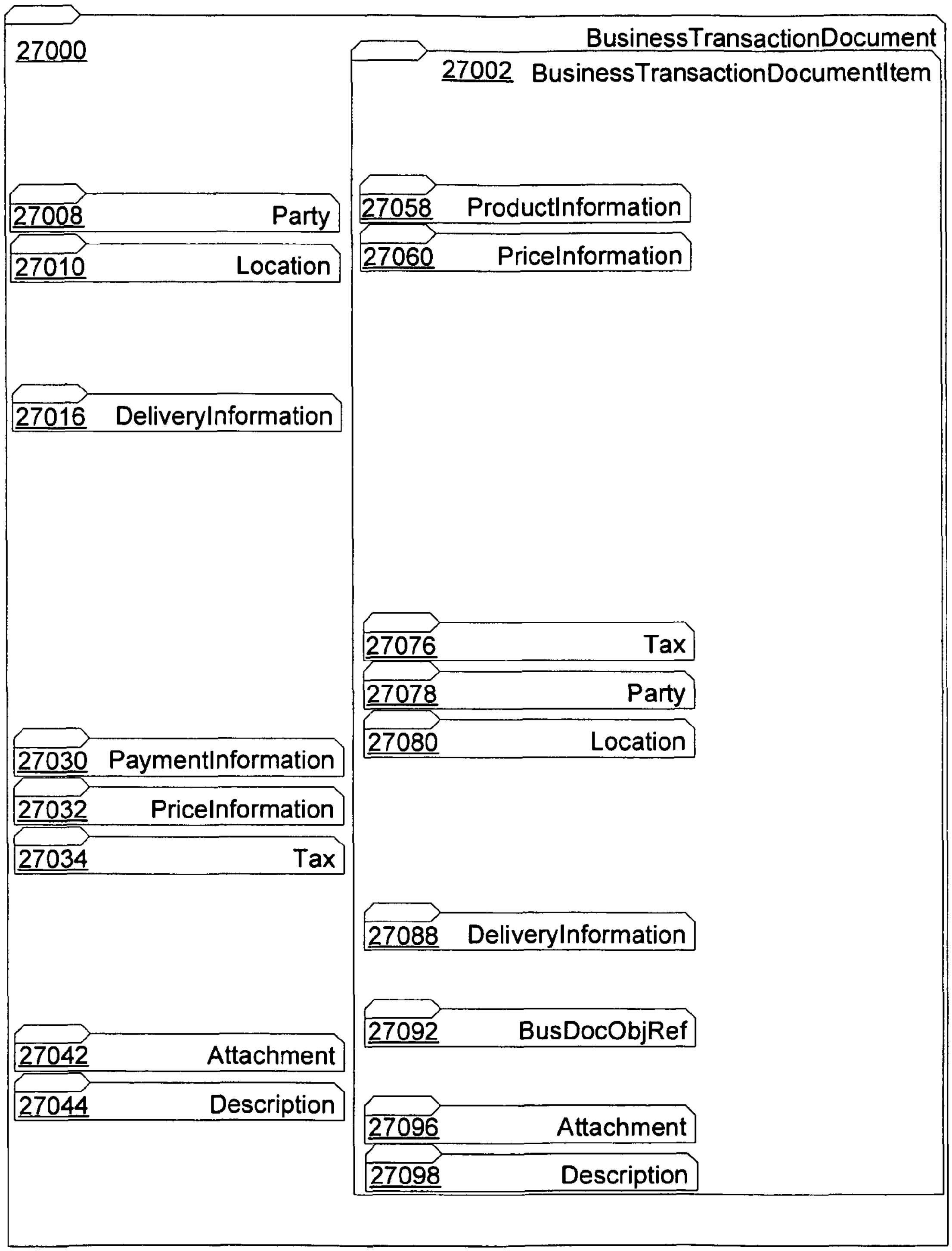
FIG. 277 depicts the package template of FIG. 270A after the removal of the nonessential packages for the Invoice Request in accordance with methods and systems consistent with the present invention.
Figure 278:
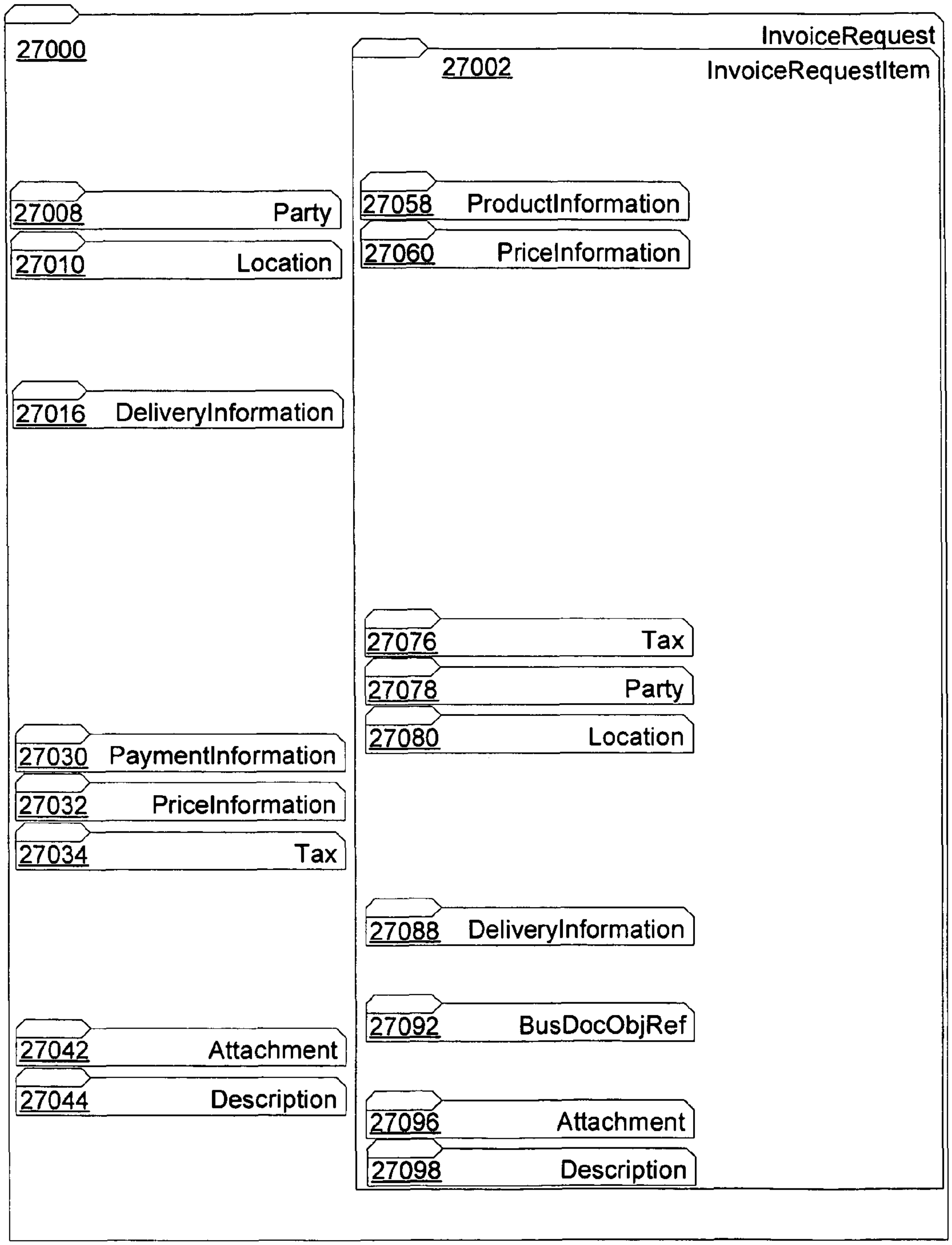
FIG. 278 depicts package template of FIG. 277 after the "business transaction document" is changed in accordance with methods and systems consistent with the present invention.

The system then selects the next package from the package template 27000 depicted in FIG. 271, i.e., the Location package 27010, and continues removing packages that are not required in an Invoice Request. The system ultimately removes the Log package 27004, the DeliveryExecutionInformation package 27006, the ProductInformation package 27012, the TransportInformation package 27014, the Scheduling package 27018, the CreditAgencyReportQueryService package 27020, the CreditWorthinessInformation package 27022, the LegalInformation package 27024, the LoanConditionInformation package 27026, the LoanPaymentPlan package 27028, the BusinessDocumentObjectReference package 27036, the FollowUpBusinessTransactionDocument package 27038, the AmountAccountingObjectSetAssignment package 27040, the FollowUpMessage package 27046, the HandlingUnit package 27048, and the PersonnelTimeSubsheet package 27050 from the BusinessTransactionDocument package 27000, and the Log package 27054, the DeliveryExecutionInformation package 27056, the Batch package 27062, the Configuration package 27064, the Inventory package 27066, the InventoryChangeItemOutbound package 27068, the InventoryChangeItemInbound package 27070, the PropertyValuation package 27072, the LoanConditionInformation package 27074, the Promotion package 27082, the PurchaseRequirementConfirmationItemExecutingPurchaseOrder package 27084, the CustomsInformation package 27086, the PaymentInformation package 27090, the AmountAccountingObjectSetAssignment package 27094, and the BusinessTransactionDocumentItemScheduleLine package 27052, from the BusinessTransactionDocumentItem package 27002. FIG. 277 depicts the package template after the system removes nonessential packages for the Invoice Request. FIG. 278 depicts the InvoiceRequest package after the system substitutes the "BusinessTransactionDocument" in the package template with "Invoice Request," i.e., the name of the interface.

Each interface may be represented either as a data model or an element structure. The data model depicts the layout of the interface. Thus, the data model illustrates the arrangement of the various elements within the interface. The element structure, on the other hand, provides the details regarding each of the elements of the interface.

Figure 279A:
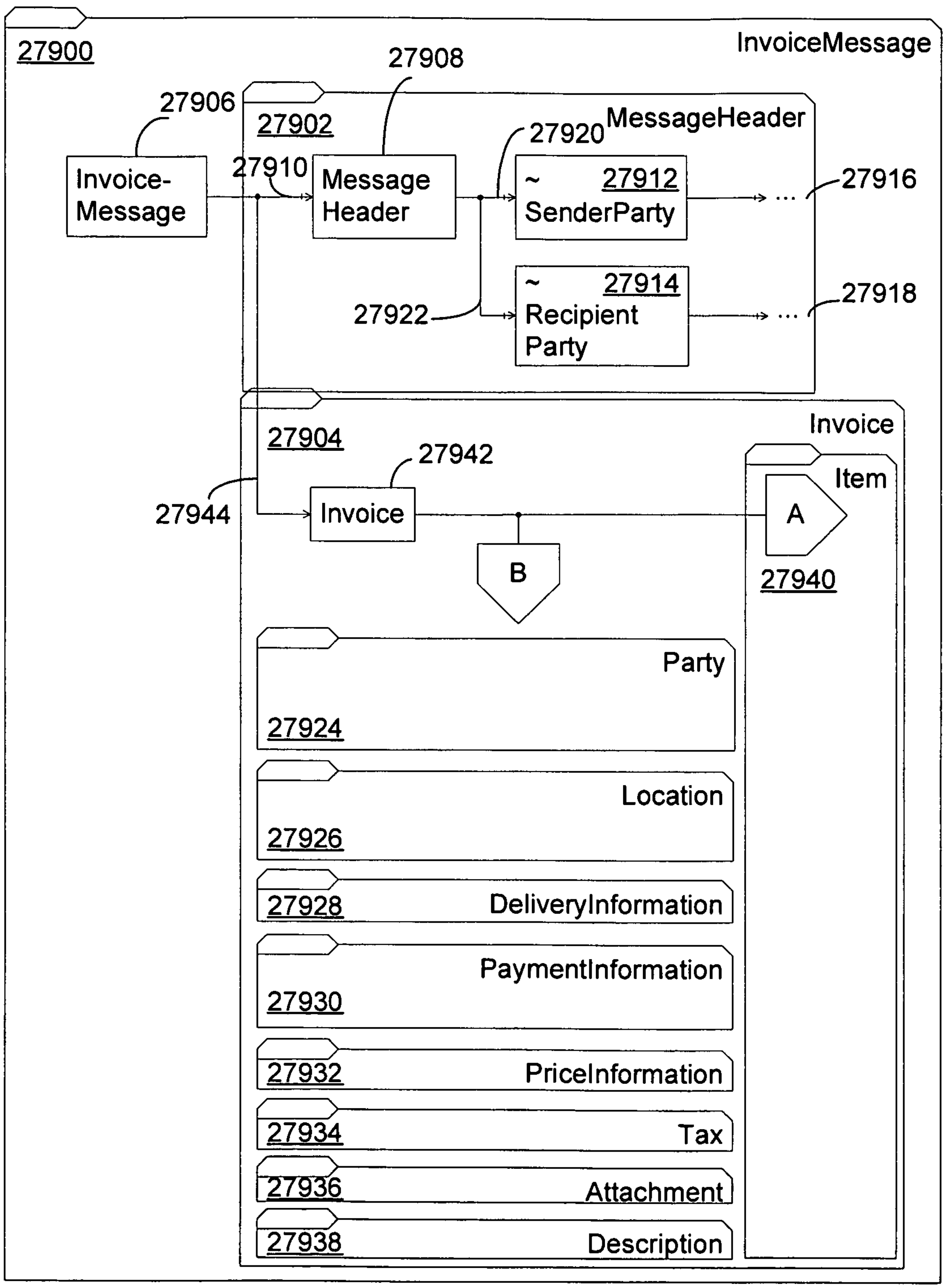
FIGS. 279A-N depict the data model for the Invoice interfaces in accordance with methods and systems consistent with the present invention.
Figure 279B:
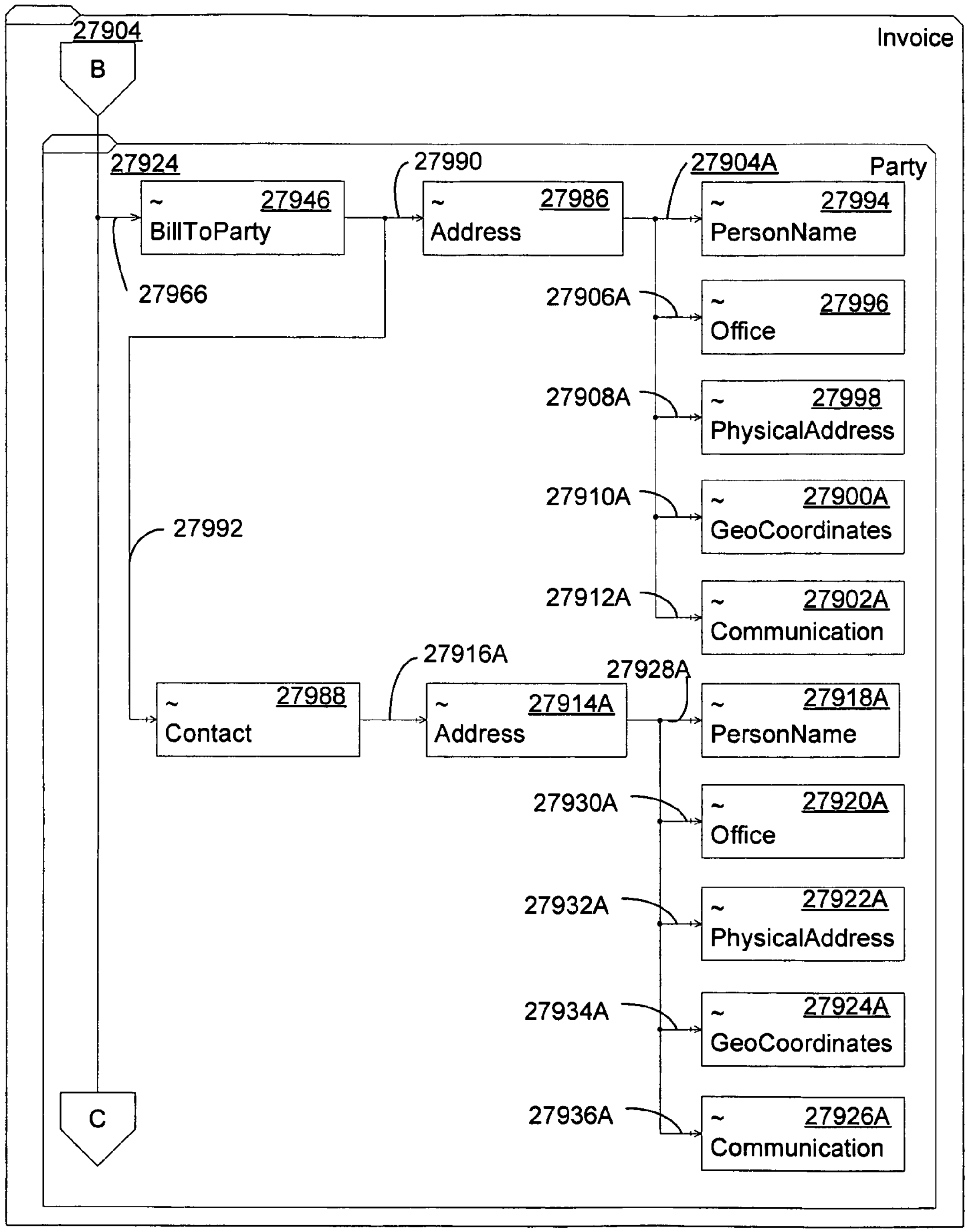
Figure 279C:
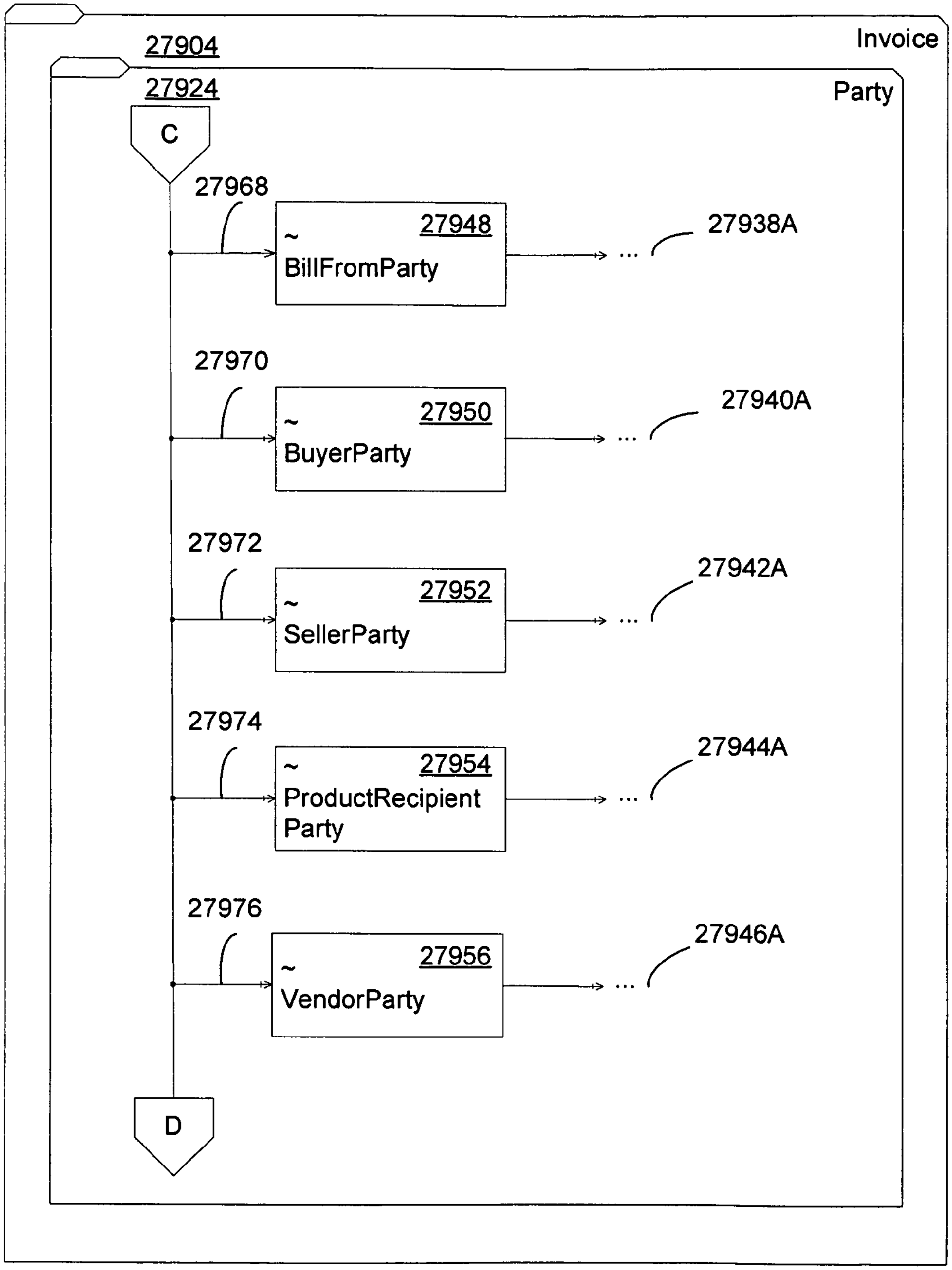
Figure 279D:
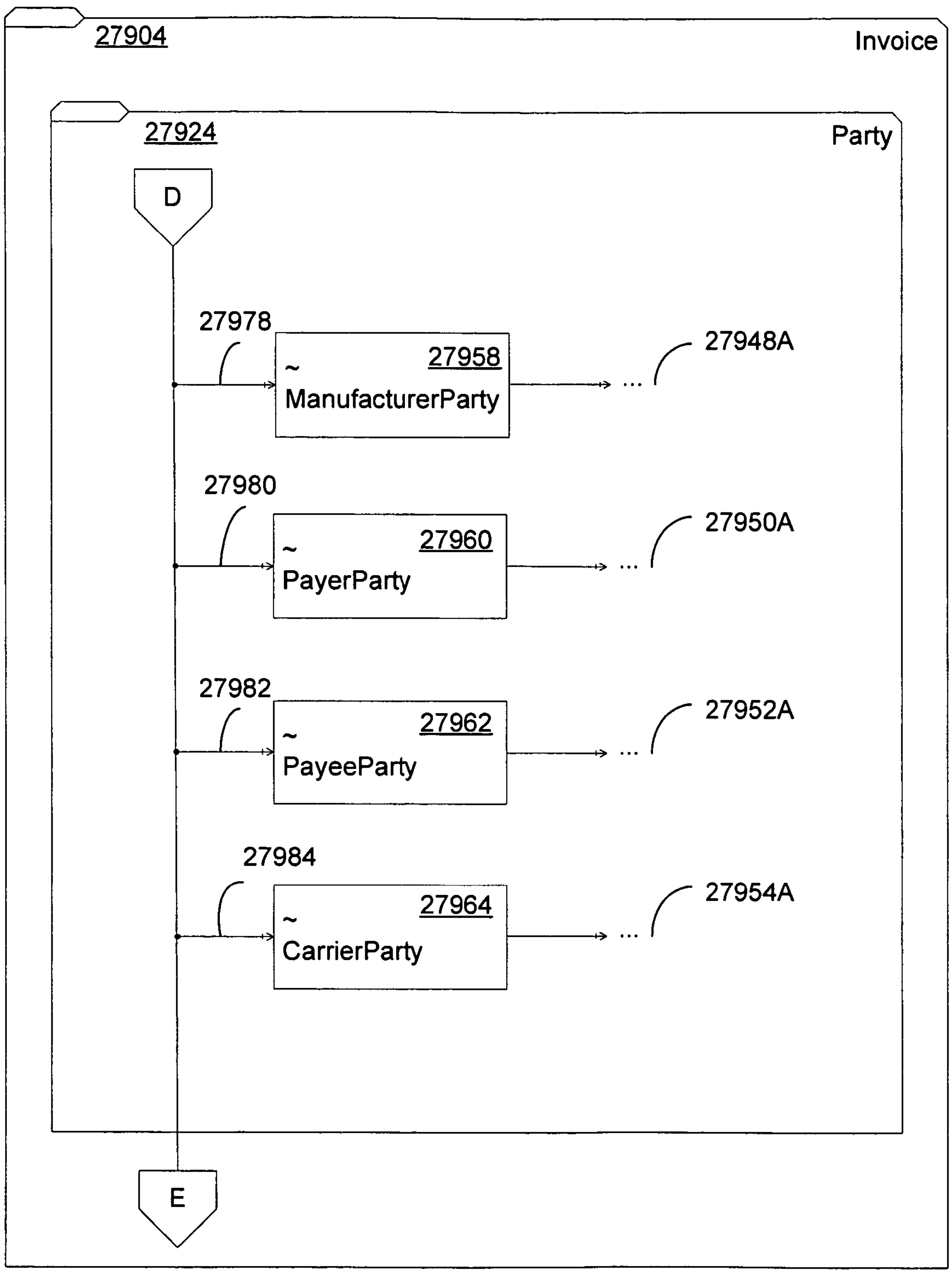
Figure 279E:
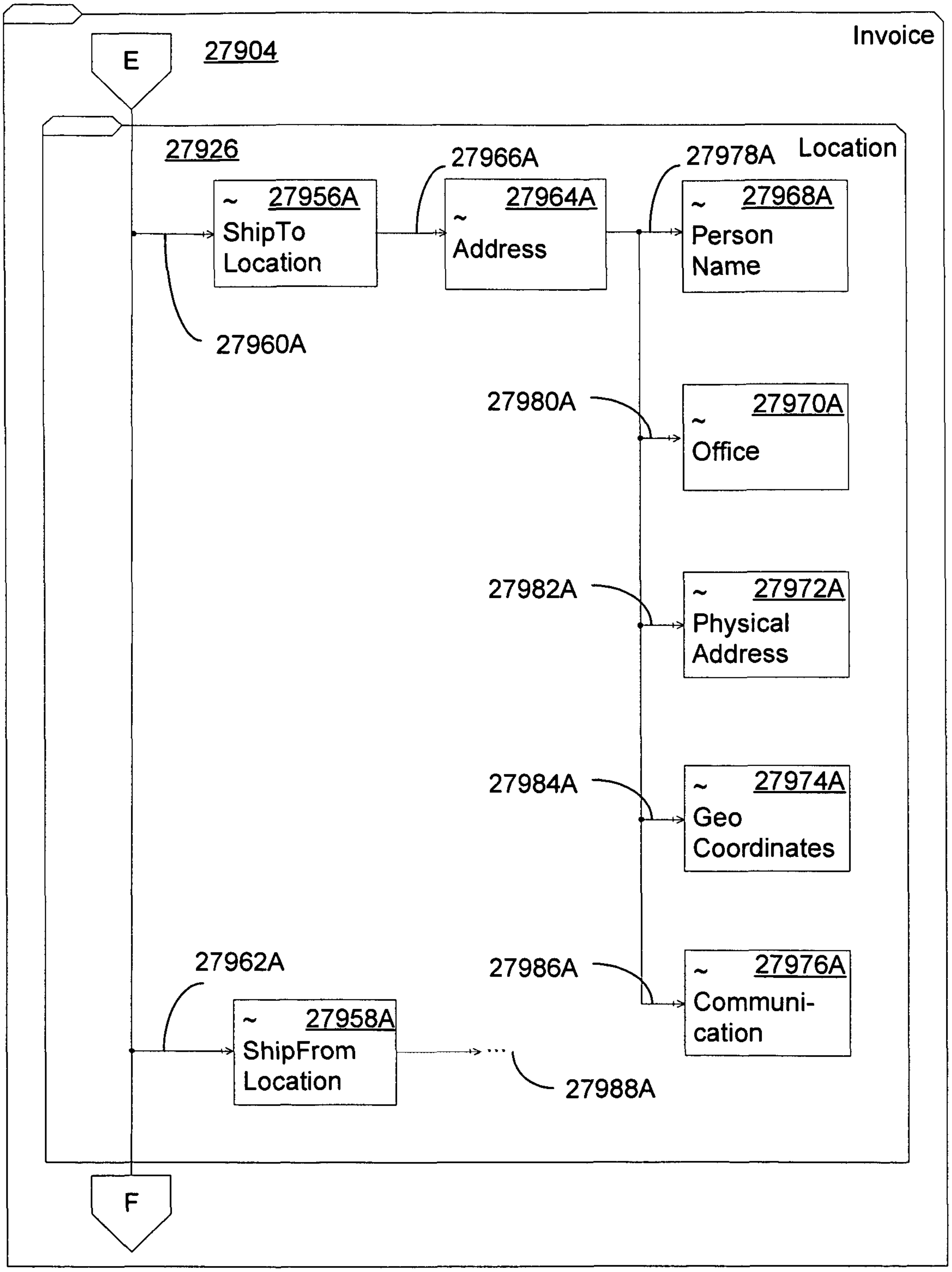
Figure 279F:
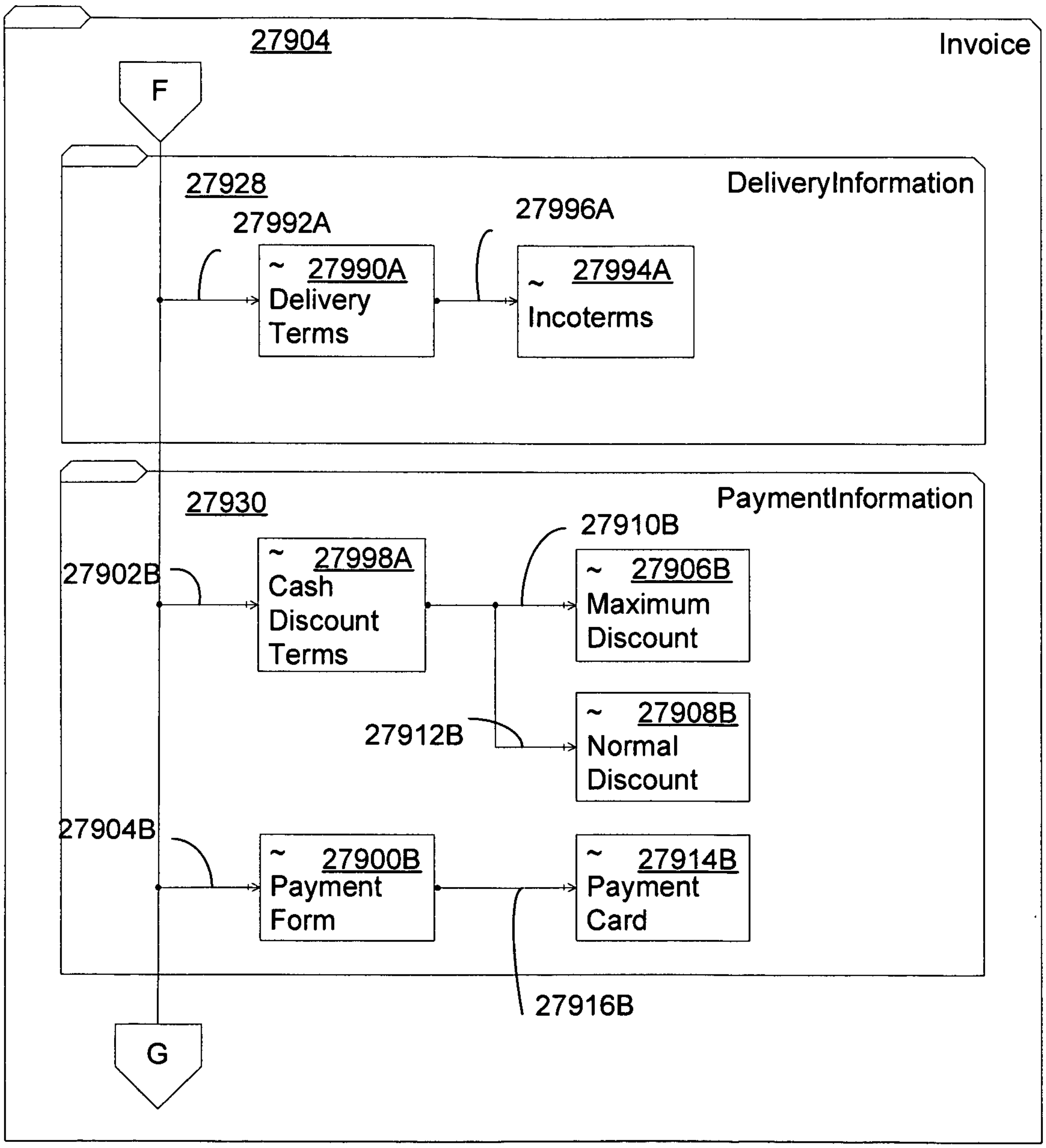
Figure 279G:
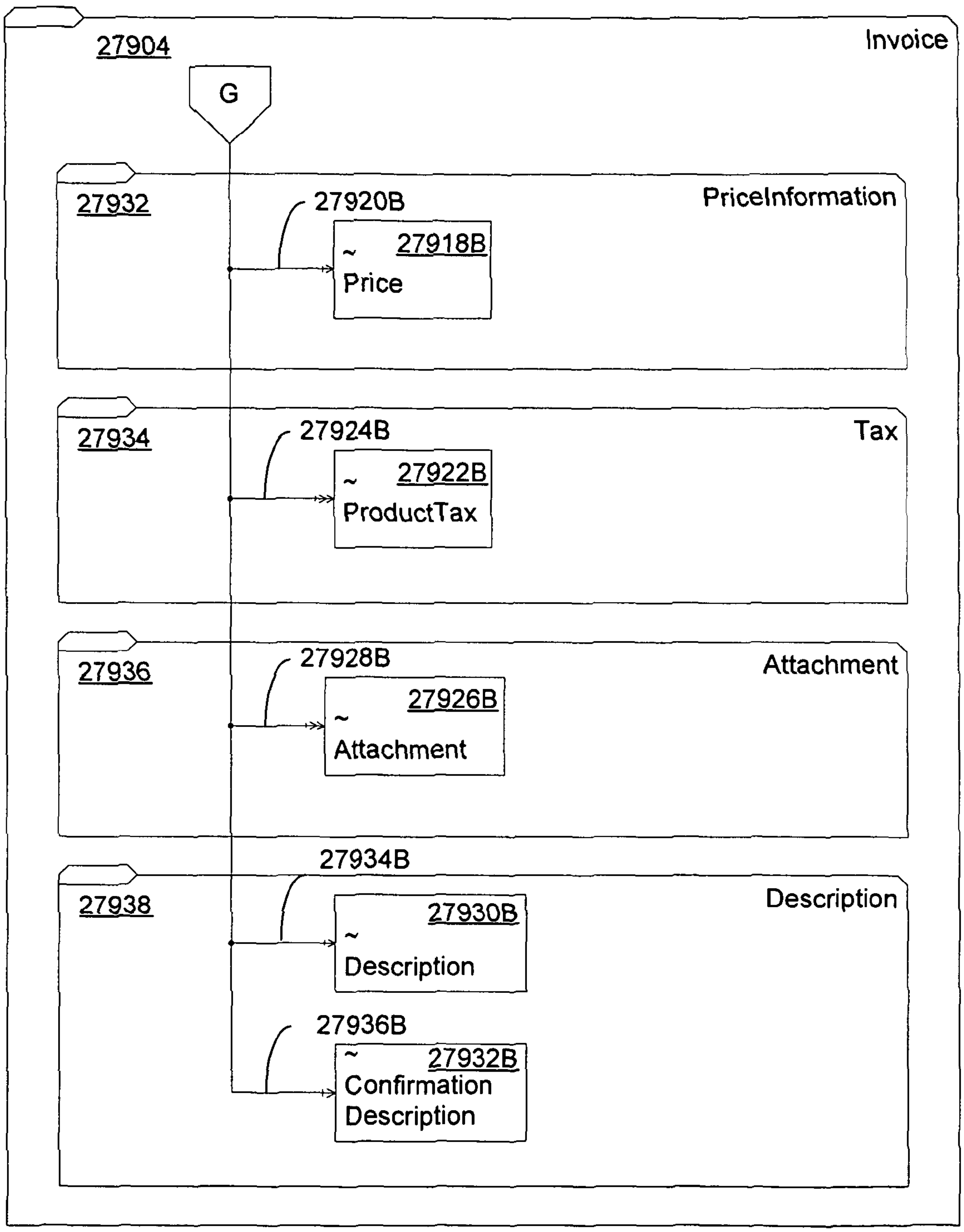
Figure 279H:
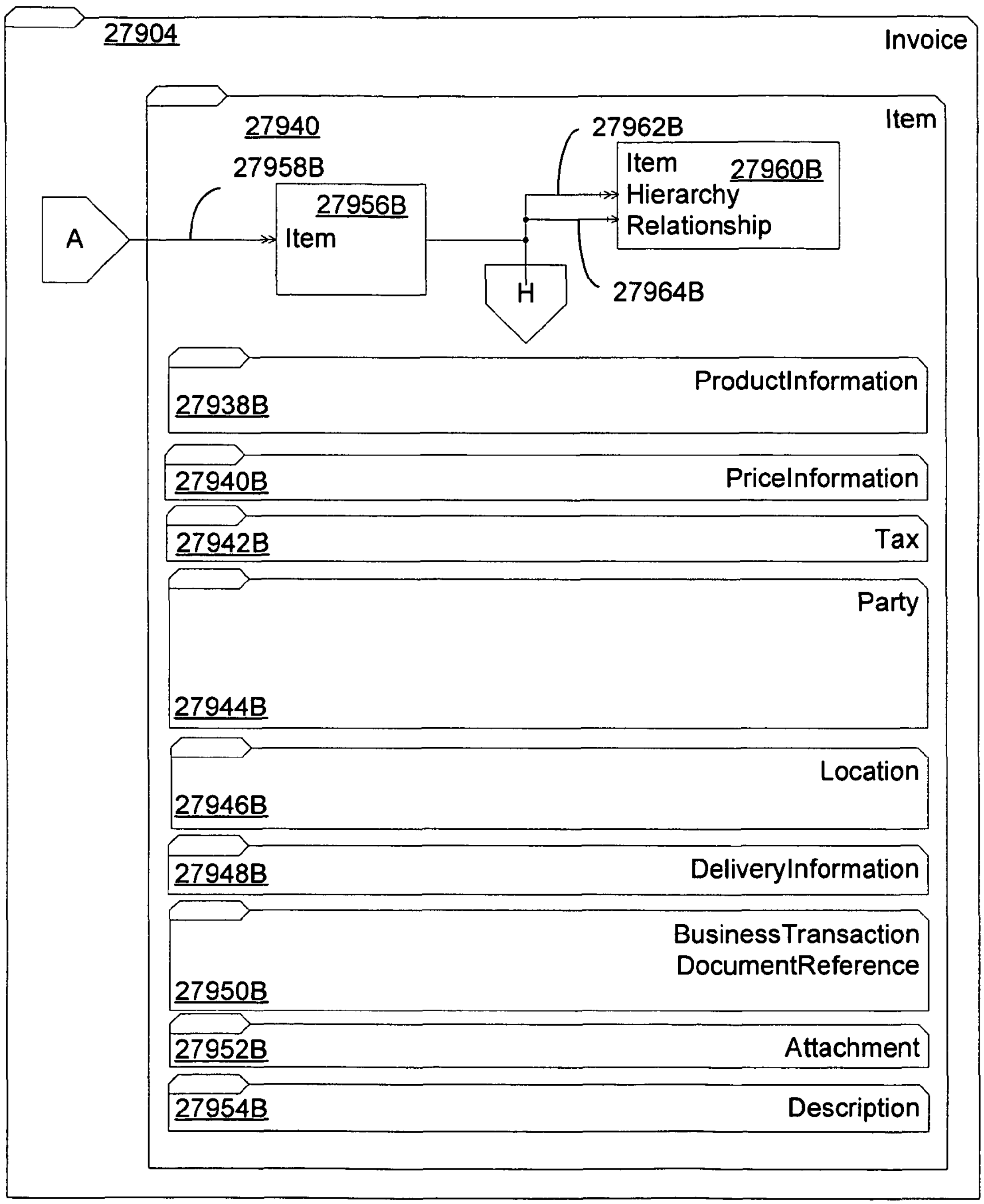
Figure 279I:
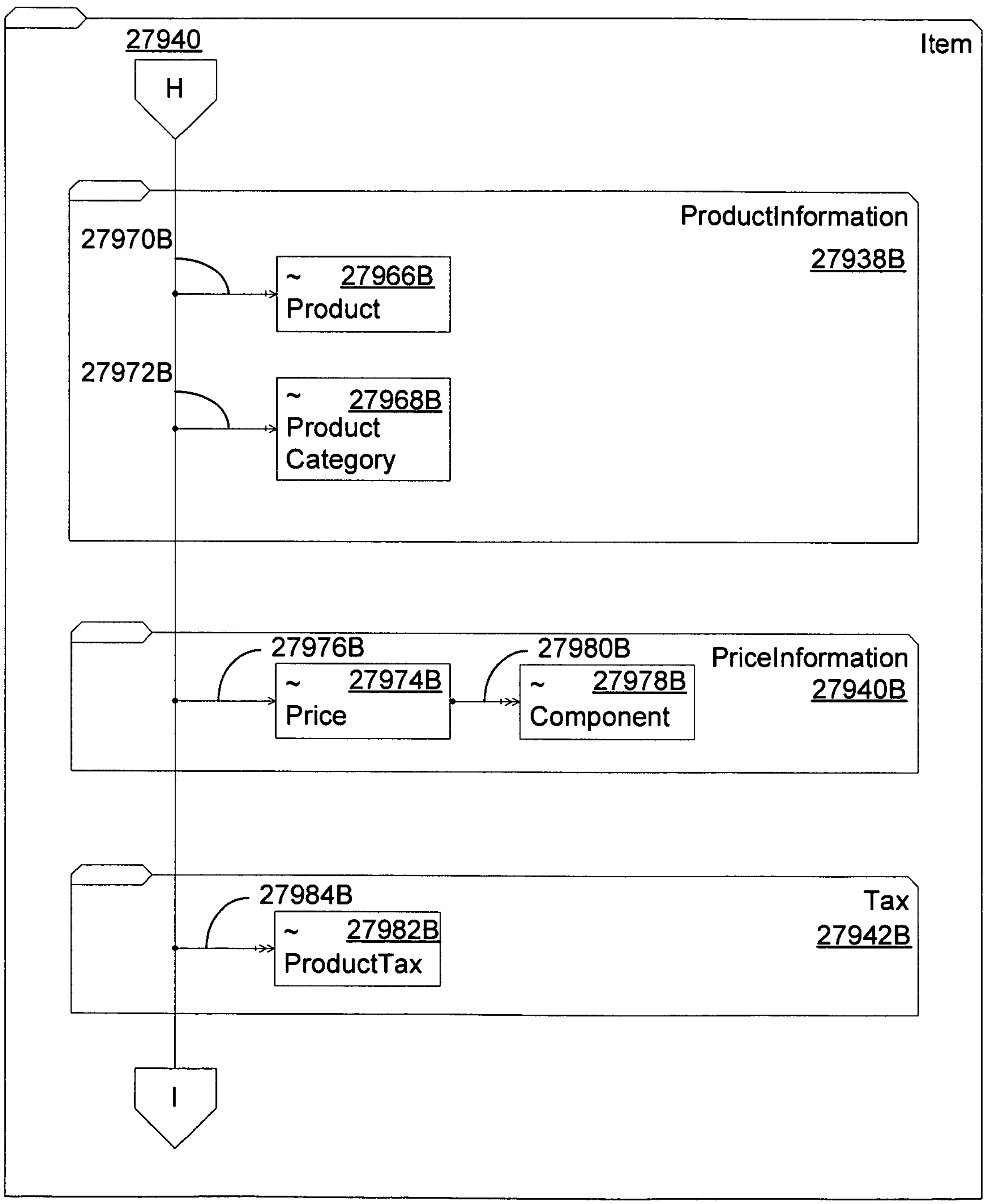
Figure 279J:
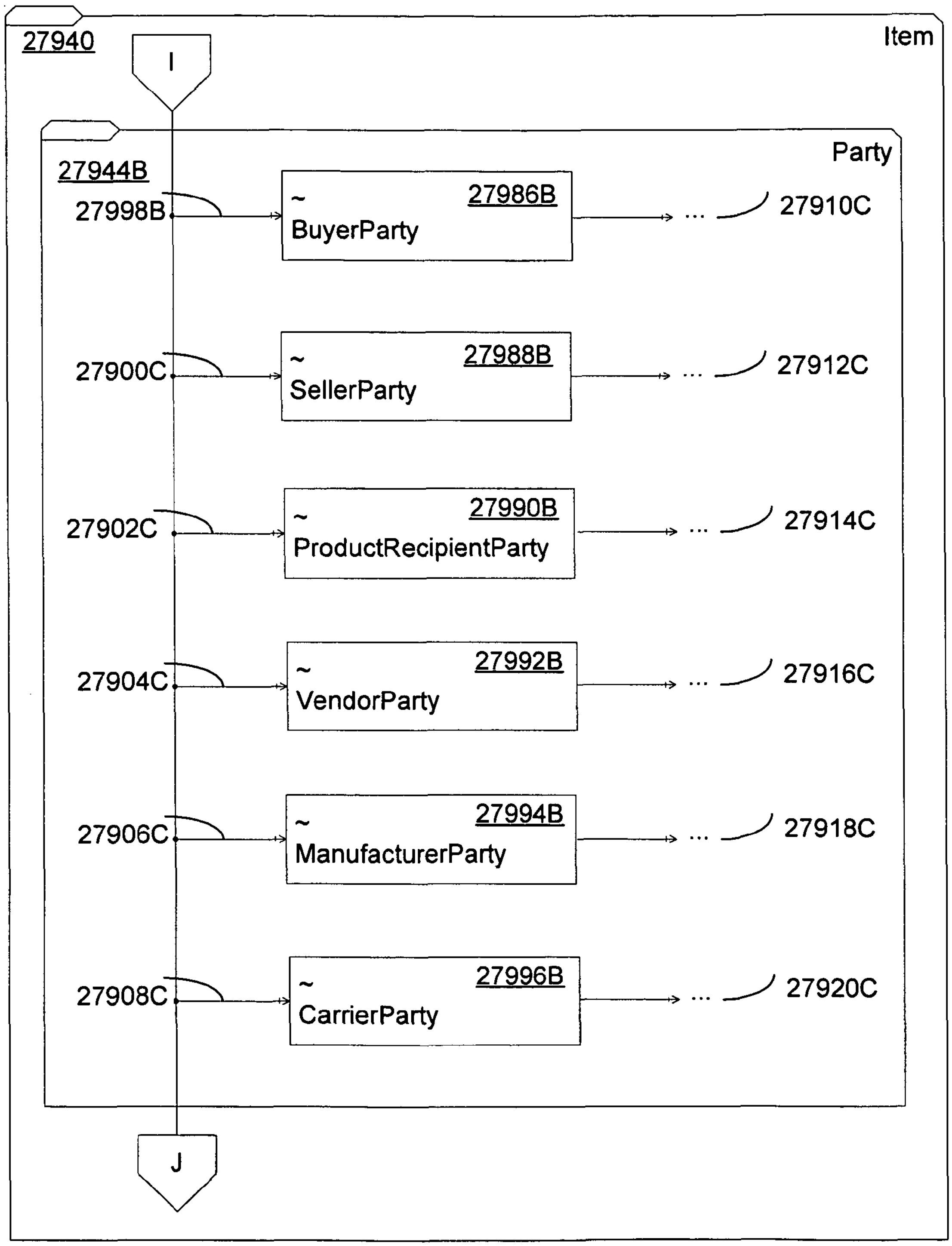
Figure 279K:
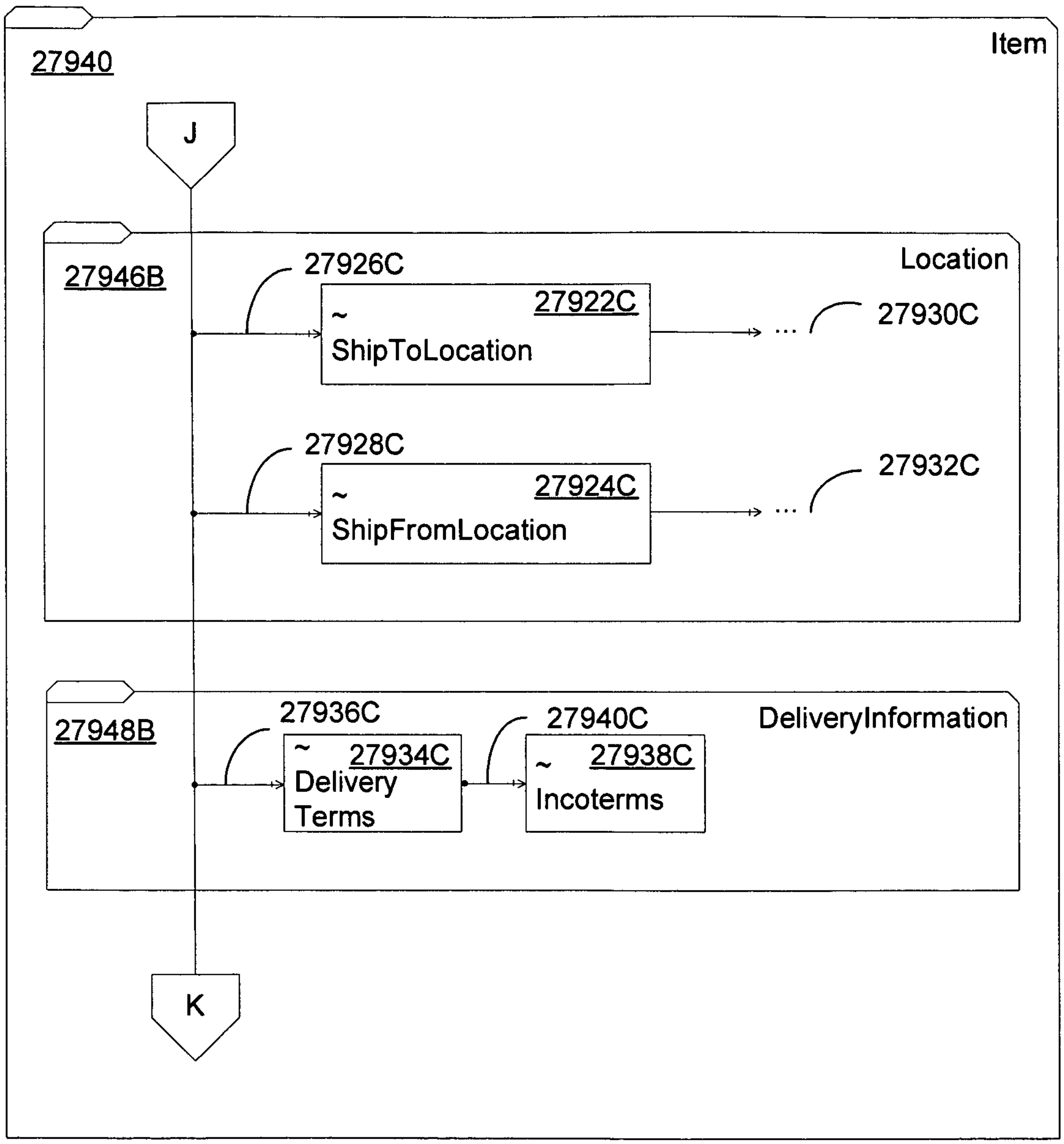
Figure 279L:
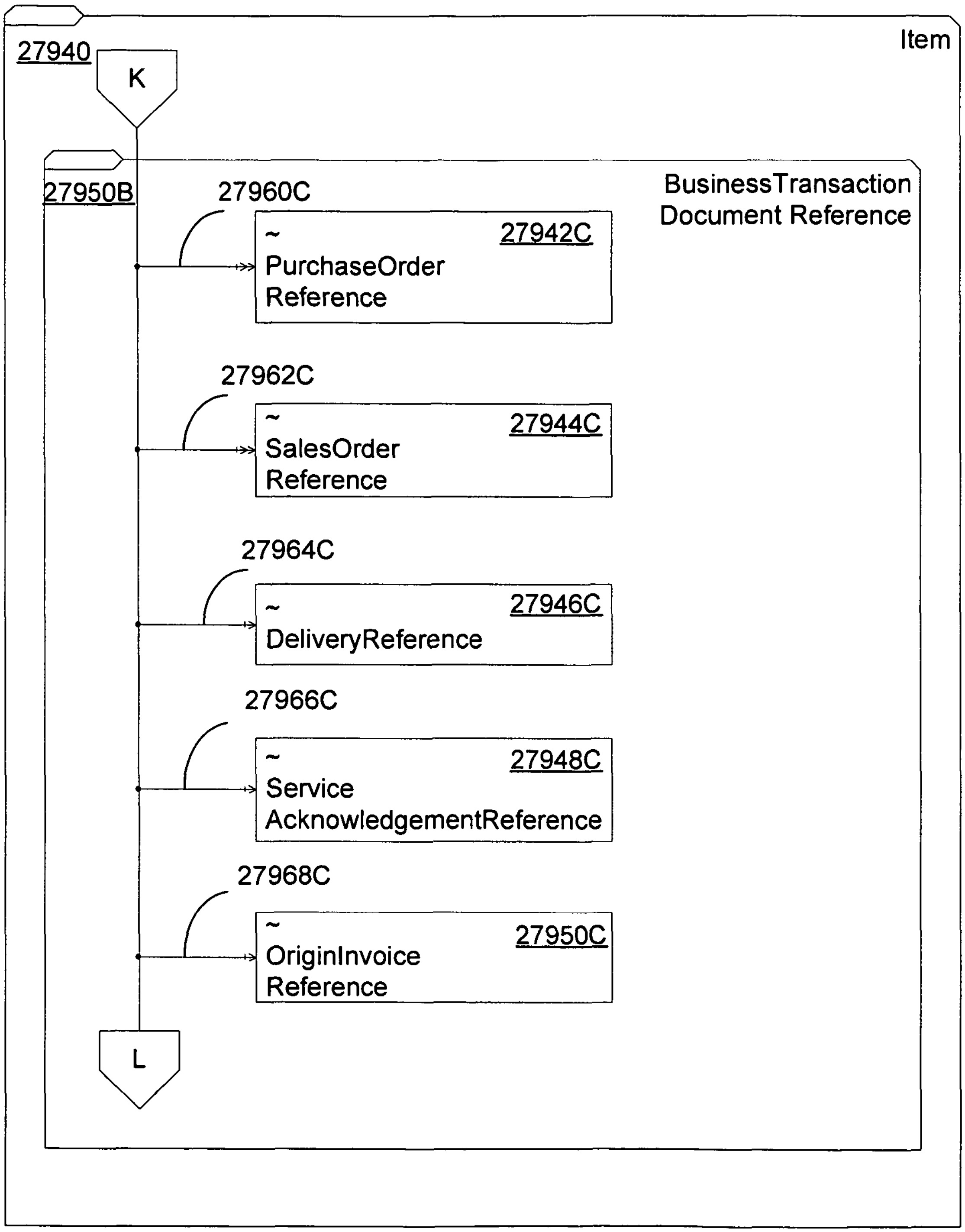
Figure 279M:
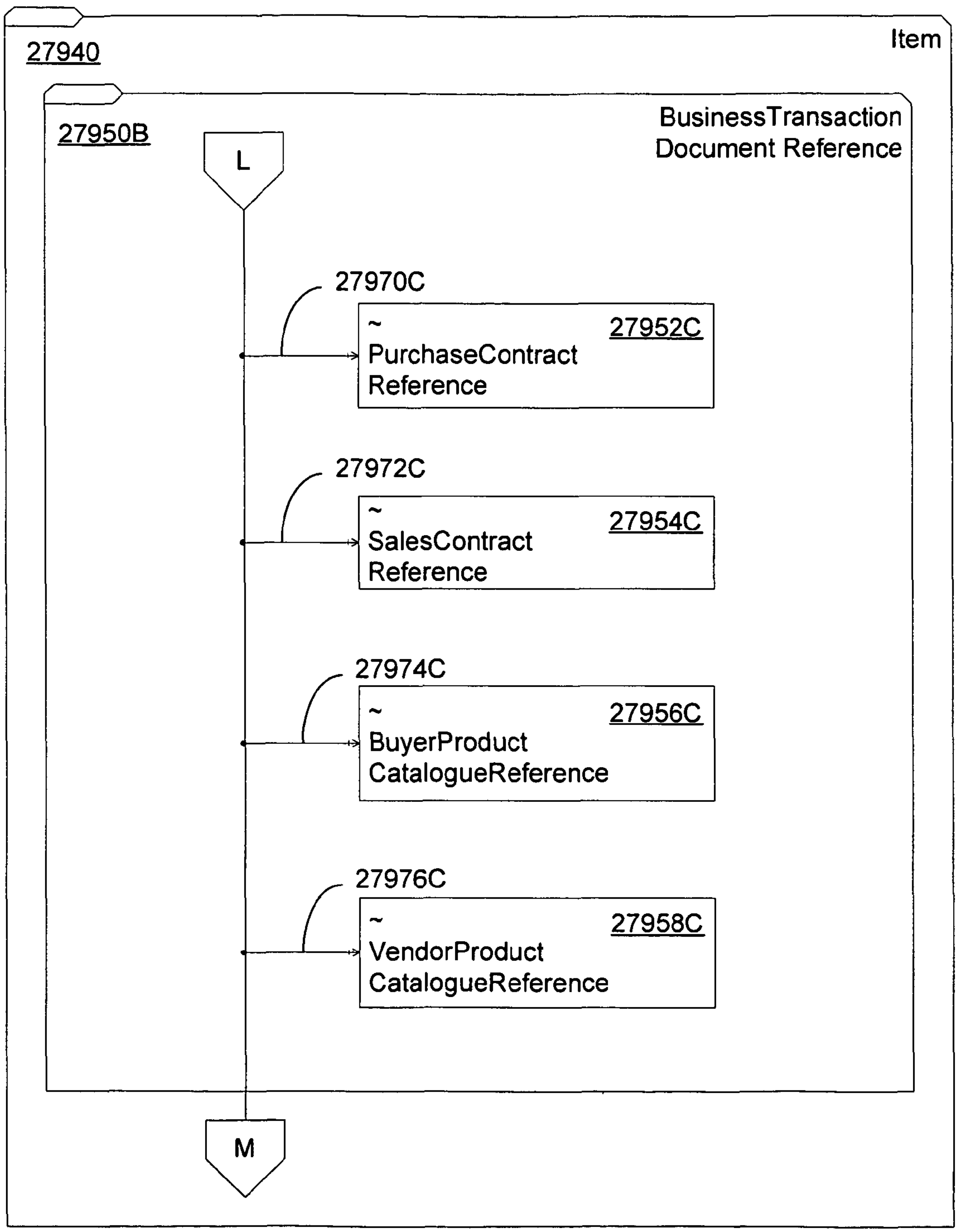
Figure 279N:
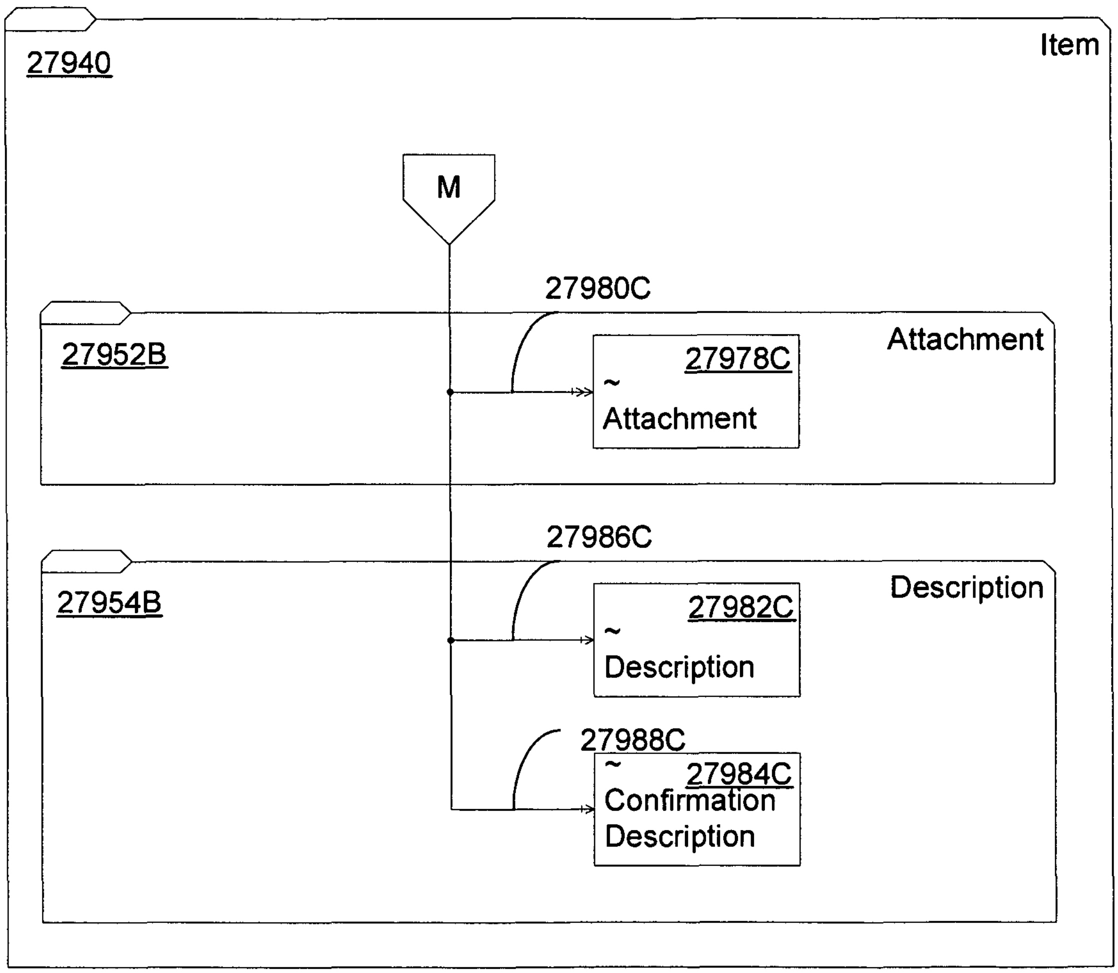
Figure 280K:
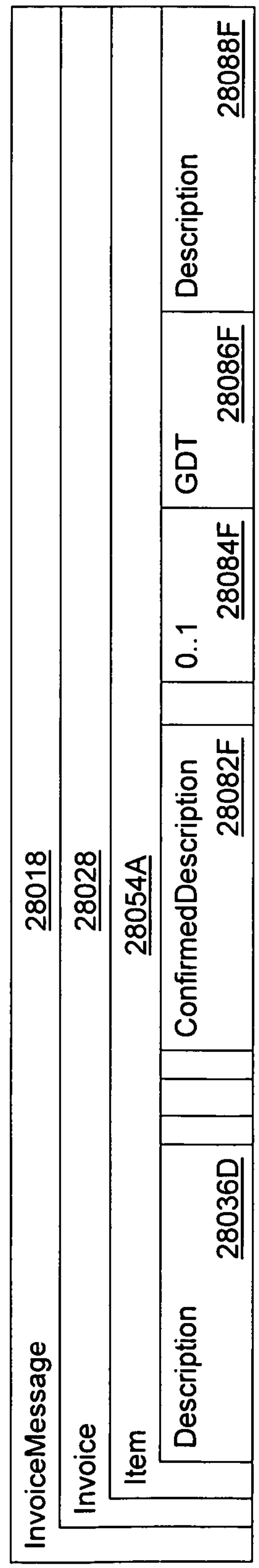

The complete data model for the Invoice Request and Invoice Confirmation is depicted in FIGS. 279A-N. The data model includes an InvoiceMessage package 27900. The InvoiceMessage package 27900 includes a MessageHeader package 27902 and an Invoice package 27904. The InvoiceMessage package 27900 also includes an InvoiceMessage entity 27906. The message data type InvoiceMessage makes the structure available for the message types InvoiceRequest and InvoiceConfirmation, and the relevant interfaces.

A MessageHeader package groups together the business information that is relevant for sending a business document in a message. The MessageHeader package 27902 includes a MessageHeader entity 27908. There is a 1:c relationship 27910 between the InvoiceMessage entity 27906 and the MessageHeader entity 27908.

A MessageHeader entity 27908 groups business information from the perspective of the sending application to identify the business document in a message, to provide information about the sender, and to provide any information about the recipient. The MessageHeader entity 27908 is of type GDT BusinessDocumentMessageHeaderParty. The MessageHeader entity 27908 includes an ID, a ReferenceID, and a CreationDateTime. The ID is the identifier of a business document in a technical message, and is of type GDT BusinessDocumentMessageID. The ReferenceID is the identifier of another instance of a business document in a technical message that the business document references, and is of type GDT BusinessDocumentMessageID. The CreationDateTime is the creation date of a business document in the technical message, and is of type GDT DateTime. The MessageID is set by the sending application.

The MessageHeader entity 27908 also includes a SenderParty entity 27912 and a RecipientParty entity 27914. The SenderParty entity 27912 is the party responsible for sending a business document at the business application level. The SenderParty entity 27912 is of type GDT BusinessDocumentMessageHeaderParty. A RecipientParty entity 27914 is the party responsible for receiving a business document at business application level. The RecipientParty entity 27914 is of type GDT BusinessDocumentMessageHeaderParty. The SenderParty entity 27912 and the RecipientParty 27914 entity include additional information required by the parties 27916, 27918, as discussed in detail below. There is a 1:c relationship 27920 between the MessageHeader entity 27908 and the SenderParty entity 27912A, and a I:c relationship 27922 between the MessageHeader entity 27908 and the RecipientParty entity 27914.

The Invoice package 27904 is a summary of the invoicing information required for the invoicing process. The Invoice package 27904 includes a Party package 27924, a Location package 27926, a DeliveryInformation package 27928, a PaymentInformation package 27930, a PriceInformation package 27932, a Tax package 27934, an Attachment package 27936, a Description package 27938, and an Item package 27940. The Invoice package 27904 also includes an Invoice entity 27942. There is a 1:1 relationship 27944 between the InvoiceMessage entity 27906 and the Invoice entity 27942.

The Invoice entity 27942 is a binding request from an invoicing party (such as vendor) to an invoice recipient (such as a sold-to-party) to make payment for the type and quantity of products or services received as a result of previous business transactions by a predefined date. The Invoice entity 27942 does not only specify the remuneration and tax to be paid by the participating business partners for products and services provided, but also gives detailed information about the payment conditions and delivery terms.

The Invoice entity 27942 includes an ID, a BillToID, a TypeCode, a DateTime, a CancellationInvoiceIndicator, an AcceptanceStatusCode, and a Note. The ID is the invoice number; a unique identifier that is assigned to the invoice by the invoicing party, and is of type GDT BusinessTransactionDocumentID. The BillToID is a unique identifier that is assigned to the invoice by the invoice recipient, and is of type GDT BusinessTransactionDocumentPartyID. The TypeCode is a coded representation for the invoice type (a specific invoice/payment request, debit memo, or credit memo), and is of type GDT BusinessTransactionDocumentTypeCode. The DateTime is the invoice date, and is of type GDT DateTime. The CancellationInvoiceIndicator is an indicator that specifies whether the invoice is a cancellation invoice or not, and is of type GDT InvoiceCancellationInvoiceIndicator. The AcceptanceStatusCode is a coded representation for the status of the invoice recipient's acceptance of the invoice, and is of type GDT AcceptanceStatusCode. The Note is a short description/name of the invoice, and is of type GDT Note. The Invoice is of type GDT Invoice.

The Party package 27924 groups together the business partners that can be involved in an invoicing process. The Party package 27924 includes a BillToParty entity 27946, a BillFromParty entity 27948, a BuyerParty entity 27950, a SellerParty entity 27952, a ProductRecipientParty entity 27954, a VendorParty entity 27956, a ManufacturerParty entity 27958, a PayerParty entity 27960, a PayeeParty entity 27962, and a CarrierParty entity 27964. There is a 1:1 relationship 27966 between the Invoice entity 27942 and the BillToParty entity 27946. There is a 1:1 relationship 27968 between the Invoice entity 27942 and the BillFromParty entity 27948. There is a 1:c relationship 27970 between the Invoice entity 27942 and the BuyerParty entity 27950. There is a 1:c relationship 27972 between the Invoice entity 27942 and the SellerParty entity 27952. There is a 1:c relationship 27974 between the Invoice entity 27942 and the ProductRecipientParty entity 27954. There is a 1:c relationship 27976 between the Invoice entity 27942 and the VendorParty entity 27956. There is a 1:c relationship 27978 between the Invoice entity 27942 and the ManufacturerParty entity 27958. There is a 1:c relationship 27980 between the Invoice entity 27942 and the PayerParty entity 27960. There is a 1:c relationship 27982 between the Invoice entity 27942 and the PayeeParty entity 27962. There is a 1:c relationship 27984 between the Invoice entity 27942 and the CarrierParty entity 27964.

The BillToParty is the company or person to which/whom the invoice is to be sent for deliveries received or services provided. The BillToParty entity 27946 is of type GDT BusinessTransactionDocumentParty. The BillToParty also can fulfill the functions of the BuyerParty, ProductRecipientParty, and PayerParty. The BillToParty entity 27946 includes an Address entity 27986 and a Contact entity 27988. There is a 1:c relationship 27990 between the BillToParty entity 27946 and the Address entity 27986. There is a 1:c relationship 27992 between the BillToParty entity 27946 and the Contact entity 27988.

The Address entity 27986 includes a PersonName entity 27994, an Office entity 27996, a PhysicalAddress entity 27998, a GeoCoordinates entity 27900A, and a Communication entity 27902A. There is a 1:c relationship 27904A between the Address entity 27986 and the PersonName entity 27994. There is a 1:c relationship 27906A between the Address entity 27986 and the Office entity 27996. There is a 1:c relationship 27908A between the Address entity 27986 and the PhysicalAddress entity 27998. There is a 1:c relationship 27910A between the Address entity 27986 and the GeoCoordinates entity 27900A. There is a 1:c relationship 27912A between the Address entity 27986 and the Communication entity 27902A.

The Contact entity 27988 includes an Address entity 27914A. There is a 1:c relationship 27916A between the Contact entity 27988 and the Address entity 27914A. Similar to the Address entity in the BillToParty entity 27946 discussed above, the Address entity 27914A in the Contact entity 27988 includes a PersonName entity 27918A, an Office entity 27920A, a PhysicalAddress entity 27922A, a GeoCoordinates entity 27924A, and a Communication entity 27926A. There is a 1:c relationship 27928A between the Address entity 27914A and the PersonName entity 27918A. There is a 1:c relationship 27930A between the Address entity 27914A and the Office entity 27920A. There is a 1:c relationship 27932A between the Address entity 27914A and the PhysicalAddress entity 27922A. There is a 1:c relationship 27934A between the Address entity 27914A and the GeoCoordinates entity 27924A. There is a 1:c relationship 27936A between the Address entity 27914A and the Communication entity 27926A.

Each of the BillFromParty entity 27948, the BuyerParty entity 27950, the SellerParty entity 27952, the ProductRecipientParty entity 27954, the VendorParty entity 27956, the ManufacturerParty entity 27958, the PayerParty entity 27960, the PayeeParty entity 27962, and the CarrierParty entity 27964 includes the same elements as that described for the BillToParty entity 27946 as denoted by ellipses 27938A, 27940A, 27942A, 27944A, 27946A, 27948A, 27950A, 27952A, and 27954A.

The BillFromParty is the company or person executing the invoicing process. The BillFromParty entity 27948 is of type GDT BusinessTransactionDocumentParty. The BillFromParty also can fulfill the function of the SellerParty, VendorParty, and PayeeParty.

The BuyerParty is the company or person authorizing the deliveries or services. The BuyerParty entity 27950 is of type GDT BusinessTransactionDocumentParty. If a BuyerParty is not specified explicitly in an invoice, the BillToParty also acts as the BuyerParty.

The SellerParty is the company or person selling (sales/service area). The SellerParty entity 27952 is of type GDT BusinessTransactionDocumentParty. If a SellerParty is not specified explicitly in an invoice, the BillFromParty also acts as the SellerParty.

The ProductRecipientParty is the company or person to which/whom goods are delivered or for which/whom services are provided. The ProductRecipientParty entity 27954 is of type GDT BusinessTransactionDocumentParty. If a ShipToLocation is not specified explicitly in an invoice, the address of the ProductRecipientParty is the delivery address. If a ProductRecipientParty is not specified explicitly in an invoice, the BuyerParty is also the ProductRecipientParty.

The VendorParty is the company or person delivering the goods or providing the service. The VendorParty entity 27956 is of type GDT BusinessTransactionDocumentParty. If a ShipFromLocation is not specified explicitly in an invoice, the address of the VendorParty is the ship-from address. If a VendorParty is not explicitly specified in an invoice, the SellerParty is also the VendorParty. The CarrierParty, not the VendorParty, is the company or person that is solely responsible for transporting the goods.

The ManufacturerParty is the company or person which/who produced the goods being invoiced. The ManufacturerParty entity 27958 is of type GDT BusinessTransactionDocumentParty. The ManufacturerParty can be used for invoice items relating to materials, and can be used to uniquely define the context of a ManufacturerProductID.

The PayerParty is the company or person that pays for the goods or services provided. The PayerParty entity 27960 is of type GDT BusinessTransactionDocumentParty. If a PayerParty is not specified explicitly in an invoice, the BillToParty also acts as the PayerParty.

The PayeeParty is the company or person that receives payment for the goods or services provided. The PayeeParty entity 27962 is of type GDT BusinessTransactionDocumentParty. If a PayeeParty is not specified explicitly in an invoice, the BillFromParty also acts as the PayeeParty.

The CarrierParty is the company or person that transported the goods. The CarrierParty entity 27964 is of type GDT BusinessTransactionDocumentParty. The CarrierParty is to be used for invoice items relating to materials; it can be ignored by the recipient in the case of items relating to services. In certain business transactions involving delivery across countries, the CarrierParty is required for fiscal law purposes.

The Location package 27926 groups together the of the locations that can occur in an invoicing process. The Location package 27926 includes a ShipToLocation entity 27956A and a ShipFromLocation entity 27958A. There is a 1:c relationship 27960A between the Invoice entity 27942 and the ShipToLocation entity 27956A. There is also a 1:c relationship 27962A between the Invoice entity 27942 and the ShipFromLocation entity 27958A.

The invoicing system uses locations that are specified at the Invoice level for the items for which corresponding locations are not explicitly transferred. The invoicing system can use the ShipToLocation entity 27956A and the ShipFromLocation entity 27958A to provide a more detailed description of the flow of goods between the delivery point and the dispatch point. In certain countries, such as the United States, this detailed information is required for calculating taxes.

The ShipToLocation is the location to which goods were delivered or where services were provided. The ShipToLocation entity 27956A is of type GDT BusinessTransactionDocumentLocation. For example, if a BuyerParty headquartered in California orders steel beams for a building located in Arizona, the tax amount is calculated using the tax rates that are valid in Arizona.

The ShipToLocation entity 27956A includes an Address entity 27964A. There is a 1:c relationship 27966A between the ShipToLocation entity 27956A and the Address entity 27964A. The Address entity 27964A includes a PersonName entity 27968A, an Office entity 27970A, a PhysicalAddress entity 27972A, a GeoCoordinates entity 27974A, and a Communication entity 27976A. There is a 1:c relationship 27978A between the Address entity 27964A and the PersonName entity 27968A. There is a 1:c relationship 27980A between the Address entity 27964A and the Office entity 27970A. There is a 1:c relationship 27982A between the Address entity 27964A and the PhysicalAddress entity 27972A. There is a 1:c relationship 27984A between the Address entity 27964A and the GeoCoordinates entity 27974A. There is a 1:c relationship 27986A between the Address entity 27964A and the Communication entity 27976A.

The ShipFromLocation 27958A is the location from which goods were shipped. The ShipFromLocation entity 27958A is of type GDT BusinessTransactionDocumentLocation. The ShipFromLocation entity 27958A includes the same entities 27988A as the ShipToLocation entity 27956A.

The DeliveryInformation package 27928 summarizes the information for a delivery in the invoicing process. The Delivery Information package 27928 includes a DeliveryTerms entity 27990A. There is a 1:c relationship 27992A between the Invoice entity 27942 and the DeliveryTerms entity 27990A. The DeliveryTerms are the conditions and agreements that are valid for executing the delivery and transporting the ordered goods and for the necessary services and activities. The DeliveryTerms entity 27990A is of type GDT DeliveryTerms.

The DeliveryTerms entity 27990A includes an Incoterms entity 27994A. There is a 1:c relationship 27996A between the DeliveryTerms entity 27990A and the Incoterms entity 27994A.

The PaymentInformation package 27930 summarizes the payment information in the invoicing process. The PaymentInformation package 27930 includes a CashDiscountTerms entity 27998A and a PaymentForm entity 27900B. There is a 1:c relationship 27902B between the Invoice entity 27942 and the CashDiscountTerms entity 27998A. There is a 1:c relationship 27904B between the Invoice entity 27942 and the PaymentForm entity 27900B.

The CashDiscountTerms includes the payment conditions (cash discount rates and payment deadlines). The CashDiscountTerms entity 27998A is of type GDT CashDiscountTerms. The CashDiscountTerms entity 27998A includes a MaximumDiscount entity 27906B and a NormalDiscount entity 27908B. There is a 1:c relationship 27910B between the CashDiscountTerms entity 27998A and the MaximumDiscount entity 27906B. There is a 1:c relationship 27912B between the CashDiscountTerms entity 27998A and the NormalDiscount entity 27908B.

The PaymentForm specifies the method of payment for a product. The PaymentForm entity 27900B includes the element PaymentFormCode, which is the coded representation of the payment form and is of type GDT PaymentFormCode. The PaymentForm entity 27900B includes a PaymentCard entity 27914B. There is a 1:c relationship 27916B between the PaymentForm entity 27900B and the PaymentCard entity 27914B.

The PriceInformation package 27932 summarizes the information about the total amount invoiced for the provided products or services, which are listed at item level. The Price is the total amount invoiced for products and services delivered or provided, including the tax and net portions. The Price entity includes a GrossAmount, a NetAmount, and a TaxAmount. The GrossAmount is the gross amount of an invoice (net amount plus tax amount), and is of type GDT Amount. The NetAmount is the net amount of an invoice, and is of type GDT Amount. The TaxAmount is the tax amount of an invoice, and is of type GDT Amount. The PriceInformation package 27932 includes a Price entity 27918B. There is a 1:c relationship 27920B between the Invoice entity 27942 and the Price entity 27918B.

The Tax package 27934 summarizes the information about the tax price components in the total amount invoiced for products delivered or services provided. The Tax package 27934 includes a ProductTax entity 27922B. There is a 1:cn relationship 27924B between the Invoice entity 27942 and the ProductTax entity 27922B. The ProductTax is the tax amount invoiced for products or services delivered or provided, cumulated for the invoice items. The ProductTax entity 27922B is of type GDT ProductTax.

The Attachment package 27936 groups together the attachment information relating to the invoice. The Attachment package 27936 includes an Attachment entity 27926B. There is a 1:cn relationship 27928B between the Invoice entity 27942 and the Attachment entity 27926B. The Attachment entity 27926B is a document of any type that relates to the invoice and is transferred with it, and is of type GDT Attachment.

The Description package 27938 groups together the explanatory texts relating to an invoice. The Description package 27938 includes a Description entity 27930B and a ConfirmationDescription entity 27932B. There is a 1:c relationship 27934B between the Invoice entity 27942 and the Description entity 27930B, and a 1:c relationship 27936B between the Invoice entity 27942 and the ConfirmationDescription entity 27932B. The Description is a natural language text relating to the invoice, which is visible to business parties. The Description entity 27930B is of type GDT Description. The Description can be used for the textual information relating to the invoice transferred. An example of this would be information stating that the Sales employee responsible is on vacation as of a specific date and indicating the name and telephone number of a substitute as of this date.

The ConfirmationDescription is a natural language text relating to the invoice confirmation, which is visible to business parties. The ConfirmationDescription entity 27932B is of type GDT Description. The invoicing system does not use ConfirmationDescription in an InvoiceRequest. The invoicing system can use the ConfirmationDescription for the textual information relating to the invoice confirmation. An example of this would be the invoice recipient's justification for rejecting a particular invoice.

The InvoiceItem package ("Item package") 27940 groups together the information about the amounts invoiced or credited for products, broken down according to the type and scope of the goods delivered or the services provided. The Item package 27940 includes a ProductInformation package 27938B, a PriceInformation package 27940B, a Tax package 27942B, a Party package 27944B, a Location package 27946B, a DeliveryInformation package 27948B, a BusinessTransactionDocumentReference package 27950B, an Attachment package 27952B, and a Description package 27954B. The Item package 27940 also includes an Item entity 27956B. There is a 1:n relationship 27958B between the Invoice entity 27942 and the Item entity 27956B. InvoiceItems 27956B are arranged hierarchically using a HierarchyRelationship 27960B. The HierarchyRelationship 27960B is the relationship between a sub-item and a higher-level parent item in an item hierarchy. There is a 1:cn relationship 27962B between the Item entity 27956B and its subordinate entities. There is a 1:c relationship 27964B between the Item entity 27956B and its superordinate entities. HierarchyRelationship includes a ParentItemID, a ParentItemBillToID, and a TypeCode. The ParentItemID is the reference to a parent item with the item number assigned by the invoicing party. InvoiceItemHierarchyRelationshipParentItemID is of type GDT BusinessTransactionDocumentItemID. The ParentItemBillToID is the reference to a parent item with the item number assigned by the invoice recipient. InvoiceItemHierarchyRelationshipParentItemID is of type GDT BusinessTransactionDocumentItemID. The TypeCode is a coded representation of the hierarchical relationship between the sub-item and its higher-level parent item. InvoiceItemHierarchyRelationshipTypeCode is of type GDT BusinessTransactionDocumentItemHierarchyRelationshipTypeCode.

The InvoiceItem is part of an invoice containing the prices and taxes for the quantity of a product that has been delivered or for a service that has been provided. In addition, to the information about prices and taxes, the InvoiceItem includes information about the participating business partners, the payment conditions, and the delivery terms, if they differ from the information provided in the invoice header.

The InvoiceItem entity 27956B includes an ID, a BillToID, a TypeCode, a DeliveryPeriod, and a Quantity. The ID is an invoice item number; a unique identifier that is assigned to the invoice item by the invoicing party, and is of type GDT BusinessTransactionDocumentItemID. The BillToID is a unique identifier that is assigned to the invoice item by the invoice recipient, and is of type GDT BusinessTransactionDocumentItemPartyID. The TypeCode is a coded representation for the invoice item type (a specific invoice item, credit memo item, or shipping costs item), and is of type GDT BusinessTransactionDocumentItemTypeCode. The DeliveryPeriod is the delivery date of the products invoiced or the time period in which the service was provided, and is of type GDT DateTimePeriod. The Quantity is the quantity invoiced, and is of type GDT Quantity.

The InvoiceItemProductInformation package ("ProductInformation package") 27938B summarizes the information for identifying, describing, and classifying a product in an invoice item. The ProductInformation package 27938B includes a Product entity 27966B and a ProductCategory entity 27968B. There is a 1:c relationship 27970B between the Item entity 27956B and the Product entity 27966B. There is a 1:c relationship 27972B between the Item entity 27956B and the ProductCategory entity 27968B.

The Product identifies, describes, and classifies the product that has been invoiced. The Product entity 27966B is of type GDT BusinessTransactionDocumentProduct. With the exception of grouping hierarchy items, at least either the product number or product description (note) is specified when a new item is created. If both the product number and description are specified, the description is merely additional information in the message and can be ignored by the recipient.

The ProductCategory is the assignment of an invoiced product to a higher-level, business-specific category. The ProductCategory entity 27968B is of type GDT BusinessTransactionDocumentProductCategory. The product category is derived directly from the product if a product number is specified for the product. It can differ for the buyer and seller if they have classified the same product differently. This is allowed and should be tolerated by the systems involved.

The InvoiceItemPriceInformation package ("PriceInformation package") 27940B summarizes the information about the amount invoiced for a product delivered or a service provided, including the price components. The PriceInformation package 27940B includes a Price entity 27974B. There is a 1:1 relationship 27976B between the Item entity 27956B and the Price entity 27974B. The Price is the amount invoiced for a delivered product or a service provided, including the tax and net portions. The Price includes a GrossAmount, a NetAmount, a TaxAmount, a NetUnitPrice, an ExchangeRate, and a PricingDate. The GrossAmount is the gross amount of an item (net amount plus tax amount), and is of the type GDT Amount. The NetAmount is the net amount of an item, and is of the type GDT Amount. The TaxAmount is the tax amount of an item, and is of the type GDT Amount. The NetUnitPrice is the net price for the base quantity of a product and that was used to calculate the net amount. For example: E10 for 5 pieces. The NetUnitPrice is of the type GDT Price. The ExchangeRate is information about the exchange rate, and is of the type GDT ExchangeRate. The PricingDate is the date on which the price is calculated, and is of the type GDT Date.

The Price entity 27974B also includes a Component entity 27978B. There is a 1:cn relationship 27980B between the Price entity 27974B and the Component entity 27978B. The invoicing system specifies the elements NetAmount and GrossAmount if the invoice item specified is not a grouping hierarchy item.

The Component is a non-fiscal part of a price in an invoice item. The Component entity 27978B is of type GDT PriceComponent. An invoice item can contain several price components. A detailed list of the price components (including, for instance, rounding difference clearing) is provided to help the invoice recipient understand the composition of the amount invoiced. In B2B standards, such as RosettaNet (PIP 3C3 version 1.1) or xCBL 3.0, price components are not available in this form. As a result, the usual elements in B2B standards, namely, GrossAmount and NetAmount, are stressed explicitly and are shown redundantly alongside the detailed list that includes price components. Taxes also are price components that are shown explicitly because of legal aspects. Tax information (ProductTax) is not shown redundantly. The Price entity includes a Component entity. There is a 1:cn relationship between the Price entity and the Component entity.

The InvoiceItemTax package ("Tax package") 27942B summarizes the information about the tax price components in the total amount invoiced for delivered products or services provided. The Tax package 27942B includes a ProductTax entity 27982B. There is a 1:cn relationship 27984B between the Item entity 27956B and the ProductTax entity 27982B. The ProductTax is a tax price component of an invoice item that is incurred for each tax type and rate. The ProductTax entity 27982B is of type GDT ProductTax.

The InvoiceItemParty package ("Party package") 27944B groups together the business partners that can be involved in an invoice item. These parties are different from the partners specified at the Invoice level. The Party package 27944B in the Item package 27940 includes a BuyerParty entity 27986B, a SellerParty entity 27988B, a ProductRecipientParty entity 27990B, a VendorParty entity 27992B, a ManufacturerParty entity 27994B, and a CarrierParty entity 27996B. There is a 1:c relationship 27998B between the Item entity 27956B and the BuyerParty entity 27986B. There is a 1:c relationship 27900C between the Item entity 27956B and the SellerParty entity 27988B. There is a 1:c relationship 27902C between the Item entity 27956B and the ProductRecipientParty entity 27990B. There is a 1:c relationship 27904C between the Item entity 27956B and the VendorParty entity 27992B. There is a 1:c relationship 27906C between the Item entity 27956B and the ManufacturerParty entity 27994B. There is a 1:c relationship 27908C between the Item entity 27956B and the CarrierParty entity 27996B. Each of these parties includes the same elements as those described for the BillToParty entity 27946 as denoted by ellipses 27910C, 27912C, 27914C, 27916C, 27918C, 27920C.

The Location package 27946B in the Item package 27940 includes a ShipToLocation entity 27922C and a ShipFromLocation entity 27924C. There is a 1:c relationship 27926C between the Item entity 27956B and the ShipToLocation entity 27922C. There is a 1:c relationship 27928C between the Item entity 27956B and the ShipFromLocation entity 27924C. The ShipToLocation entity 27922C and the ShipFromLocation entity 27924C include the same elements as those described for the ShipToLocation entity 27956A as denoted by ellipses 27930C, 27932C.

The DeliveryInformation package 27948B in the Item package 27940 includes a DeliveryTerms entity 27934C. There is a 1:c relationship 27936C between the Item entity 27956B and the DeliveryTerms entity 27934C. The DeliveryTerms entity 27934C includes an Incoterms entity 27938C. There is a 1:c relationship 27940C between the DeliveryTerms entity 27934C and the Incoterms entity 27938C.

The InvoiceItemBusinessTransactionDocumentReference package ("BusinessTransactionDocumentReference package") 27950B groups together the references to business documents that can be required in the invoicing process at item level. The BusinessTransactionDocumentReference package 27950B in the Item package 27940 includes a PurchaseOrderReference entity 27942C, a SalesOrderReference entity 27944C, a DeliveryReference entity 27946C, a ServiceAcknowledgementReference entity 27948C, an Origin- InvoiceReference entity 27950C, a PurchaseContractReference entity 27952C, a SalesContractReference entity 27954C, a BuyerProductCatalogueReference entity 27956C, and a VendorProductCatalogueReference entity 27958C. There is a 1:cn relationship 27960C between the Item entity 27956B and the PurchaseOrderReference entity 27942C. There is a 1:cn relationship 27962C between the Item entity 27956B and the SalesOrderReference entity 27944C. There is a 1:c relationship 27964C between the Item entity 27956B and the DeliveryReference entity 27946C. There is a 1:c relationship 27966C between the Item entity 27956B and the ServiceAcknowledgementReference entity 27948C. There is a 1:c relationship 27968C between the Item entity 27956B and the OriginInvoiceReference entity 27950C. There is a 1:c relationship 27970C between the Item entity 27956B and the PurchaseContractReference entity 27952C. There is a 1:c relationship 27972C between the Item entity 27956B and the SalesContractReference entity 27954C. There is a 1:c relationship 27974C between the Item entity 27956B and the BuyerProductCatalogueReference entity 27956C. There is a 1:c relationship 27976C between the Item entity 27956B and the VendorProductCatalogueReference entity 27958C.

The PurchaseOrderReference is the reference to a purchase order or an item within a purchase order. The PurchaseOrderReference entity 27942C is of type GDT BusinessTransactionDocumentReference. The PurchaseOrderReference includes the purchase order number and purchase order item number assigned by the buyer. There can be more than one PurchaseOrderReference.

The SalesOrderReference is the reference to an order or an item within an order. The SalesOrderReference entity 27944C is of type GDT BusinessTransactionDocumentReference. The SalesOrderReference includes the order number and order item number assigned by the seller. There can be more than one SalesOrderReference.

The DeliveryReference is the reference to a delivery. The DeliveryReference entity 27946C is of type GDT BusinessTransactionDocumentReference. The DeliveryReference includes the delivery note number assigned by the seller.

The ServiceAcknowledgementReference is the reference to a confirmation that a service has been provided, which was created by the seller (for example, in the service entry system). The ServiceAcknowledgementReference entity 27948C is of type GDT BusinessTransactionDocumentReference. ServiceAcknowledgementReference includes the service acknowledgment number assigned by the service provider.

The OriginInvoiceReference is the reference to an invoice previously sent. The OriginInvoiceReference entity 27950C is of type GDT BusinessTransactionDocumentReference. An OriginInvoiceReference includes the invoice number assigned by the invoicing party. This reference is required if a credit memo is issued for an amount that has been invoiced.

The PurchaseContractReference is the reference to a purchase contract or an item within a purchase contract. The PurchaseContractReference entity 27952C is of type GDT BusinessTransactionDocumentReference. Provided it has not been agreed otherwise, the seller is responsible for determining the correct SalesContractReference for a specified PurchaseContractReference.

The SalesContractReference is the reference to a sales contract or an item within a sales contract. The SalesContractReference entity 27954C is of type GDT BusinessTransactionDocumentReference.

The BuyerProductCatalogueReference is the reference to a buyer's product Catalogue or an item within such a catalogue. The BuyerProductCatalogueReference entity 27956C is of type GDT CatalogueReference. The BuyerProductCatalogueReference is filled if an invoice item refers to a Catalogue whose number and item numbers were assigned by the buyer.

The VendorProductCatalogueReference is the reference to a seller's product Catalogue or an item within such a catalogue. The VendorProductCatalogueReference entity 27958C is of type GDT CatalogueReference. The invoicing system always fills VendorProductCatalogueReference if an invoice item refers to a Catalogue whose number and item numbers were assigned by the seller.

The Attachment package 27952B in the Item package 27940 includes an Attachment entity 27978C. There is a 1:cn relationship 27980C between the Item entity 27956B and the Attachment entity 27978C.

The Description package 27954B in the Item package 27940 includes a Description entity 27982C and a ConfirmationDescription entity 27984C. There is a 1:c relationship 27986C between the Item entity 27956B and the Description entity 27982C and a 1:c relationship 27988C between the Item entity 27956B and the ConfirmationDescription entity 27984C.

FIGS. 280A-K depict the element structure for the Invoice interfaces. The element structure is similar to the data model, but provides additional information regarding the details of the interface. The element structure identifies the different packages 28000 in the interface, and represents the entities at various levels within the interface. As depicted in FIGS. 280A-K, the Interface interfaces include five levels 28002, 28004, 28006, 28008, 28010. The element structure identifies the cardinality or occurrence 28012 between the entities and/or attributes of the interface, and provides information (i.e., type 28014 and name 28016) regarding the data type that provides the basis for the entity and/or attribute. The outermost package of this interface is an InvoiceMessage package 28018, which includes an InvoiceMessage entity 28020 at the first level 28002. The InvoiceMessage entity 28020 is of type message data type ("MDT") 28022 "InvoiceMessage" 28024.

The InvoiceMessage package 28018 includes a MessageHeader package 28026 and an Invoice package 28028. The MessageHeader package 28026 includes a MessageHeader entity 28030, which is of type generic data type ("GDT") 28034 "MessageHeader" 28036. There is one or zero 28032 MessageHeader entity 28030 for each InvoiceMessage entity 28020.

The MessageHeader entity 28030 includes a MessageID 28038, a ReferenceMessageID 28046, and a CreationDateTime 28054. The MessageID 28038 is of type GDT 28042 MessageID 28044. The ReferenceMessageID 28046 is of type GDT 28050 MessageID 28052. The CreationDateTime 28054 is of type GDT 28058 DateTime 28060. There is one 28040 MessageID 28038 for each MessageHeader entity 28030, one or zero 28048 ReferenceMessageID 28046 for each MessageHeader entity 28030, and one 28056 CreationDateTime 28054 for each MessageHeader entity 28030.

The MessageHeader entity 28030 also includes a SenderParty entity 28062 and a RecipientParty entity 28070. The SenderParty entity 28062 is of type GDT 28066 BusinessDocumentMessageHeaderParty 28068. The RecipientParty entity 28070 is also of type GDT 28074 BusinessDocumentMessageHeaderParty 28076. There is one or zero 28064 SenderParty entity 28062 for each MessageHeader entity 28030, and there is one or zero 28072 RecipientParty entity 28070 for each MessageHeader entity 28030.

The Invoice package 28028 includes an Invoice entity 28078. The Invoice entity 28078 is of type GDT 28080 Invoice 28081. There is one 28079 Invoice entity 28078 for each InvoiceMessage entity 28020. The Invoice entity 28078 includes an ID 28082, a BillToID 28090, a TypeCode 28098, a DateTime 28006A, a CancellationInvoiceIndicator 28014A, an AcceptanceStatusCode 28022A, and a Note 28030A. The ID 28082 is of type GDT 28086 BusinessTransactionDocumentID 28088. The BillToID 28090 is of type GDT 28094 BusinessTransactionDocumentID 28096. The TypeCode 28098 is of type GDT 28002A BusinessTransactionDocumentTypeCode 28004A. The DateTime 28006A is of type GDT 28010A DateTime 28012A. The CancellationInvoiceIndicator 28014A is of type GDT 28018A InvoiceCancellationInvoiceIndicator 28020A. The AcceptanceStatusCode 28022A is of type GDT 28026A AcceptanceStatusCode 28028A. The Note 28030A is of type GDT 28034A Note 28036A. There is one 28084 ID 28082 for each Invoice entity 28078. There is one or zero 28092 BillToID 28090 for each Invoice entity 28078. There is one 28000A TypeCode 28098 for each Invoice entity 28078. There is one 28008A DateTime 28006A for each Invoice entity 28078. There is one or zero 28016A CancellationInvoiceIndicator 28014A for each Invoice entity 28078. There is one or zero 28024A AcceptanceStatusCode 28022A for each Invoice entity 28078. There is one or zero 28032A Note 28030A for each Invoice entity 28078.

The Party package 28038A includes a BillToParty entity 28056A, a BillFromParty entity 28064A, a BuyerParty entity 28072A, a SellerParty entity 28080A, a ProductRecipientParty entity 28088A, a VendorParty entity 28096A, a ManufacturerParty entity 28004B, a PayerParty entity 28012B, a PayeeParty entity 28020B, and a CarrierParty entity 28028B. The BillToParty entity 28056A is of type GDT 28060A BusinessTransactionDocumentParty 28062A. There is one 28058A BillToParty entity 28056A for each Invoice entity 28078. The BillFromParty entity 28064A is of type GDT 28068A BusinessTransactionDocumentParty 28070A. There is one 28066A BillFromParty entity 28064A for each Invoice entity 28078. The BuyerParty entity 28072A is of type GDT 28076A BusinessTransactionDocumentParty 28078A. There is one or zero 28074A BuyerParty entity 28072A for each Invoice entity 28078. The SellerParty entity 28080A is of type GDT 28084A BusinessTransactionDocumentParty 28086A. There is one or zero 28082A SellerParty entity 28080A for each Invoice entity 28078. The ProductRecipientParty entity 28088A is of type GDT 28092A BusinessTransactionDocumentParty 28094A. There is one or zero 28090A ProductRecipientParty entity 28088A for each Invoice entity 28078. The VendorParty entity 28096A is of type GDT 28000B BusinessTransactionDocumentParty 28002B. There is one or zero 28098A VendorParty entity 28096A for each Invoice entity 28078. The ManufacturerParty entity 28004B is of type GDT 28008B BusinessTransactionDocumentParty 28010B. There is one or zero 28006B ManufacturerParty entity 28004B for each Invoice entity 28078. The PayerParty entity 28012B is of type GDT 28016B BusinessTransactionDocumentParty 28018B. There is one or zero 28014B PayerParty entity 28012B for each Invoice entity 28078. The PayeeParty entity 28020B is of type GDT 28024B BusinessTransactionDocumentParty 28026B. There is one or zero 28022B PayeeParty entity 28020B for each Invoice entity 28078. The CarrierParty entity 28028B is of type GDT 28032B BusinessTransactionDocumentParty 28034B. There is one or zero 28030B CarrierParty entity 28028B for each Invoice entity 28078.

The Location package 28040A includes a ShipToLocation entity 28036B and a ShipFromLocation entity 28044B. The ShipToLocation entity 28036B is of type GDT 28040B BusinessTransactionDocumentLocation 28042B. There is one or zero 28038B ShipToLocation entity 28036B for each Invoice entity 28078. The ShipFromLocation entity 28044B is of type GDT 28048B BusinessTransactionDocumentLocation 28050B. There is one or zero 28046B ShipFromLocation entity 28044B for each Invoice entity 28078.

The DeliveryInformation package 28042A includes a DeliveryTerms entity 28052B, which is of type GDT 28056B DeliveryTerms 28058B. There is one or zero 28054B DeliveryTerms entity 28052B for each Invoice entity 28078.

The PaymentInformation package 28044A includes a CashDiscountTerms entity 28060B, which is of type GDT 28064B CashDiscountTerms 28066B. There is one or zero 28062B CashDiscountTerms entity 28060B for each Invoice entity 28078. The PaymentInformation package 28044A also includes a PaymentForm entity 28068B, which if of type GDT 28071B PaymentForm 28072B. There is one or zero 28070B PaymentForm entity 28068B for each Invoice entity 28078.

The PriceInformation package 28046A includes a Price entity 28088B. There is one 28090B Price entity 28088B for each Invoice entity 28078. The Price entity 28088B includes a GrossAmount 28092B, a NetAmount 28000C, a TaxAmount 28008C and an ExchangeRate 28016C. The GrossAmount 28092B is of type GDT 28096B Amount 28098B. There is one 28094B GrossAmount 28092B for each Price entity 28088B. The NetAmount 28000C is of type GDT 28004C Amount 28006C. There is one or zero 28002C NetAmount 28000C for each Price entity 28088B. The TaxAmount 28008C is of type GDT 28012C Amount 28014C. There is one or zero 28010C TaxAmount 28008C for each Price entity 28088B. The ExchangeRate 28016C is of type GDT 28020C ExchangeRate 28022C. There is one or zero 28018C ExchangeRate 28016C for each Price entity 28088B.

The Tax package 28048A includes a ProductTax entity 28024C, which is of type GDT 28028C ProductTax 28030C. There are any number 28026C of ProductTax entities 28024C for each Invoice entity 28078.

The Attachment package 28050A includes an Attachment entity 28032C, which is of type GDT 28036C Attachment 28038C. There are any number 28034C of Attachment entities 28032C for each Invoice entity 28078.

The Description package 28052A includes a Description entity 28040C and a ConfirmedDescription entity 28048C. The Description entity 28040C is of type GDT 28044C Description 28046C. There is one or zero 28042C Description entity 28040C for each Invoice entity 28078. The ConfirmedDescription entity 28048C is of type GDT 28052C Description 28054C. There is one or zero 28050C ConfirmedDescription entity 28048C for each Invoice entity 28078.

The Item package 28054A includes an Item entity 28056C, which is of type GDT 28058C InvoiceItem 28059C. There is one or more 28057C Item entities 28056C for each Invoice entity 28078. The Item entity 28056C includes an ID 28060C, a BillToID 28068C, a TypeCode 28076C, a Quantity 28084C, a HierarchyRelationship 28092C, and a DeliveryPeriod 28012D. The ID 28060C is of type GDT 28064C BusinessTransactionDocumentItemID 28066C, and there is one 28062C ID 28060C for each Item entity 28056C. The BillToID 28068C is of type GDT 28072C BusinessTransactionDocumentItemPartyID 28074C, and there is one or zero 28070C BillToID 28068C for each Item entity 28056C. The TypeCode 28076C is of type GDT 28080C BusinessTransactionDocumentItemTypeCode 28082C, and there is one 28078C TypeCode 28076C for each Item entity 28056C. The Quantity 28084C is of type GDT 28088C Quantity 28090C, and there is one or zero 28086C Quantity 28090C for each Item entity 28056C. There is one or zero 28094C HierarchyRelationship 28092C for each Item entity 28056C. The HierarchyRelationship 28092C includes a ParentItemID 28096C, which is of type GDT 28000D BusinessTransactionDocumentItemID 28002C, and a TypeCode 28004D, which is of type CDT 28008D ItemHierarchyRelationshipTypeCode 28010D. There is one 28098C ParentItemID 28096C for each HierarchyRelationship 28092C, and there is one 28006D TypeCode 28004D for each HierarchyRelationship 28092C. The DeliveryPeriod entity 28012D is of type GDT 28016D DateTimePeriod 28018D, and there is one or zero 28014D DeliveryPeriod entity 28012D for each Item entity 28056C. The Item package 28054A also includes a ProductInformation package 28020D, a PriceInformation package 28022D, a Tax package 28024D, a Party package 28026D, a Location package 28028D, a DeliveryInformation package 28030D, a BusinessTransactionDocumentReference package 28032D, an Attachment package 28034D and a Description package 28036D.

The ProductInformation package 28020D includes a Product entity 28038D and a Product Category entity 28046D. The Product entity 28038D is of type GDT 28042D Product 28044D. There is one or zero 28040D Product entity 28038D for each Item entity 28056C. The ProductCategory entity 28046D is of type GDT 28050D ProductCategory 28052D. There is one or zero 28048D ProductCategory entity 28046D for each Item entity 28056C.

The PriceInformation package 28022D includes a Price entity 28054D. There is one or zero 28056D Price entity 28054D for each Item entity 28056C. The Price entity 28054D includes a GrossAmount 28058D, a NetAmount 28066D, a TaxAmount 28074D, and a NetUnitPrice 28082.

The GrossAmount 28058D is of type GDT 28062D Amount 28064D, and there is one or zero 28060D GrossAmounts 28058D for each Price entity 28054D. The NetAmount 28066D is of type GDT 28070D Amount 28072D, and there is one 28068D NetAmount 28066D for each Price entity 28054D. The TaxAmount 28074D is of type GDT 28078D Amount 28080D, and there is one or zero 28076D TaxAmount 28074D for each Price entity 28054D. The NetUnitPrice 28082D is of type GDT 28086D Price 28088D, and there is one or zero 28084D NetUnitPrice 28082D for each Price entity 28054D. The Price entity 28054D also includes a Component entity 28006E. There are any number 28008E of Component entities 28006E for each Price entity 28054D.

The Tax package 28024D includes a ProductTax entity 28014E, which is of type GDT 28018E ProductTax 28020E. There are any number 28016E of ProductTax entities 28014E for each Item entity 28056C.

The Party package 28026D includes a BuyerParty entity 28022E, a SellerParty entity 28030E, a ProductRecipientParty entity 28038E, a VendorParty entity 28046E, a ManufacturerParty entity 28054E, and a CarrierParty entity 28062E. The BuyerParty entity 28022E is of type GDT 28026E BusinessTransactionDocumentParty 28028E. There is one or zero 28024E BuyerParty entity 28022E for each Item entity 28056C. The SellerParty entity 28030E is of type GDT 28034E BusinessTransactionDocumentParty 28036E. There is one or zero 28032E SellerParty entity 28030E for each Item entity 28056C. The ProductRecipientParty entity 28038E is of type GDT 28042E BusinessTransactionDocumentParty 28044E. There is one or zero 28040E ProductRecipientParty entity 28038E for each Item entity 28056C. The VendorParty entity 28046E is of type GDT 28050E BusinessTransactionDocumentParty 28052E. There is one or zero 28048E VendorParty entity 28046E for each Item entity 28056C. The ManufacturerParty entity 28054E is of type GDT 28058E BusinessTransactionDocumentParty 28060E. There is one or zero 28056E ManufacturerParty entity 28054E for each Item entity 28056C. The CarrierParty entity 28062E is of type GDT 28066E BusinessTransactionDocumentParty 28068E. There is one or zero 28064E CarrierParty entity 28062E for each Item entity 28056C.

The Location package 28028D includes a ShipToLocation entity 28070E and a ShipFromLocation entity 28078E. The ShipToLocation entity 28070E is of type GDT 28074E BusinessTransactionDocumentLocation 28076E, and there is one or zero 28072E ShipToLocation entity 28070E for each Item entity 28056C. The ShipFromLocation entity 28078E is of type GDT 28082E BusinessTransactionDocumentLocation 28084E, and there is one or zero 28080E ShipFromLocation entity 28078E for each Item entity 28056C.

The DeliveryInformation package 28030D includes a DeliveryTerms entity 28086E, which is of type GDT 28090E DeliveryTerms 28092E. There is one or zero 28088E DeliveryTerms entity 28086E for each Item entity 28056C.

The BusinessTransactionDocumentReference package 28032D includes a PurchaseOrderReference entity 28094E, a SalesOrderReference entity 28002F, a DeliveryReference entity 28010F, a ServiceAcknowledgementReference entity 28018F, an OriginInvoiceReference entity 28026F, a PurchaseContractReference entity 28034F, a SalesContractReference entity 28042F, a BuyerProductCatalogueReference entity 28050F, and a SellerProductCatalogueReference entity 28058F. The PurchaseOrderReference entity 28094E is of type GDT 28098E BusinessTransactionDocumentReference 28000F. There are any number 28096E of PurchaseOrderReference entities 28094E for each Item entity 28056C. The SalesOrderReference entity 28002F is of type GDT 28006F BusinessTransactionDocumentReference 28008F. There are any number 28004F of SalesOrderReference entities 28002F for each Item entity 28056C. The DeliveryReference entity 28010F is of type GDT 28014F BusinessTransactionDocumentReference 28016F. There is one or zero 28012F DeliveryReference entity 28010F for each Item entity 28056C. The ServiceAcknowledgementReference entity 28018F is of type GDT 28022F BusinessTransactionDocumentReference 28024F. There is one or zero 28020F ServiceAcknowledgementReference entity 28018F for each Item entity 28056C. The OriginInvoiceReference entity 28026F is of type GDT 28030F BusinessTransactionDocumentReference 28032F. There is one or zero 28028F OriginInvoiceReference entity 28026F for each Item entity 28056C. The PurchaseContractReference entity 28034F is of type GDT 28038F BusinessTransactionDocumentReference 28040F. There is one or zero 28036F PurchaseContractReference entity 28034F for each Item entity 28056C. The SalesContractReference entity 28042F is of type GDT 28046F BusinessTransactionDocumentReference 28048F. There is one or zero 28044F SalesContractReference entity 28042F for each Item entity 28056C. The BuyerProductCatalogueReference entity 28050F is of type GDT 28054F CatalogueReference 28056F. There is one or zero 28052F BuyerProductCatalogueReference entity 28050F for each Item entity 28056C. The SellerProductCatalogueReference entity 28058F is of type GDT 28062F CatalogueReference 28064F. There is one or zero 28060F SellerProductCatalogueReference entity 28058F for each Item entity 28056C.

The Attachment package 28034D includes an Attachment entity 28066F, which is of type GDT 28070F Attachment 28072F. There are any number 28068F of Attachment entities 28066F for each Item entity 28056C.

The Description package 28038D includes a Description entity 28074F and a ConfirmedDescription entity 28082F.

The Description entity 28074F is of type GDT 28078F Description 28080F. There is one or zero 28076F Description entity 28074F for each Item entity 28056C. The ConfirmedDescription entity 28082F is of type GDT 28086F Description 28088F. There is one or zero 28084F ConfirmedDescription entity 28082F for each Item entity 28056C.

An example of an Invoice Request message in XML is provided below:

```
<?xml version="1.0" encoding="utf-8" ?>
- <nr1:InvoiceRequest xmlns:nr1="http://sap.com/xi/SAPGlobal/Global">
- <MessageHeader>
  <ID schemeID="0402">000000044400000000020040723063339</ID>
  <CreationDateTime>2004-07-23T06:33:39Z</CreationDateTime>
- <SenderParty>
  <InternalID schemeID="PartnerID" schemeAgencyID="E5S__300">6</InternalID>
  </SenderParty>
- <RecipientParty>
  <InternalID schemeID="PartnerID" schemeAgencyID="E5S__300">1000</InternalID>
  </RecipientParty>
  </MessageHeader>
- <Invoice>
  <ID>NB1__LIM2</ID>
  <TypeCode>004</TypeCode>
  <DateTime>2004-06-30T12:00:00Z</DateTime>
  <Note>Nachbelastung zu Rechnung 442</Note>
- <BillToParty>
  <BillToID>6</BillToID>
  </BillToParty>
- <BillFromParty>
  <BillToID>1999</BillToID>
  </BillFromParty>
- <SellerParty>
  <BillToID>1000</BillToID>
  </SellerParty>
- <ProductRecipientParty>
  <BillToID>10754</BillToID>
  </ProductRecipientParty>
- <Price>
  <GrossAmount currencyCode="EUR">1.16</GrossAmount>
  </Price>
- <ProductTax>
  <TypeCode>VAT</TypeCode>
  <TypeDescription languageCode="de">16 %</TypeDescription>
  <BaseAmount currencyCode="EUR">1.0</BaseAmount>
     <Percent>16.0</Percent>
  <Amount currencyCode="EUR">0.16</Amount>
  <BusinessTransactionDocumentItemGroupID>V1</BusinessTransactionDocumentItem
GroupID>
  </ProductTax>
- <Item>
  <ID>1</ID>
  <TypeCode>002</TypeCode>
- <Product>
  <TypeCode>1</TypeCode>
  <Note>a1</Note>
  </Product>
- <ProductCategory>
  <BillToID>LOC01</BillToID>
  </ProductCategory>
  <Quantity unitCode="PCE">1.0</Quantity>
- <Price>
  <NetAmount currencyCode="EUR">1.0</NetAmount>
- <NetUnitPrice>
  <Amount currencyCode="EUR">1.0</Amount>
  <BaseQuantity unitCode="PCE">1.0</BaseQuantity>
  </NetUnitPrice>
- <ExchangeRate>
  <UnitCurrency>EUR</UnitCurrency>
  <QuotedCurrency>USD</QuotedCurrency>
  <Rate>1.16</Rate>
  </ExchangeRate>
  </Price>
- <ProductTax>
  <TypeCode>VAT</TypeCode>
  <TypeDescription languageCode="de">16 %</TypeDescription>
  <BaseAmount currencyCode="EUR">0.0</BaseAmount>
  <Amount currencyCode"EUR">0.0</Amount>
  <BusinessTransactionDocumentItemGroupID>V1</BusinessTransactionDocumentItem
GroupID>
  </ProductTax>
- <PurchaseOrderReference>
  <ID>6500000123</ID>
```

-continued

```
<ItemID>1</ItemID>
</PurchaseOrderReference>
</Item>
</Invoice>
</nr1:InvoiceRequest
```

6. Use of an Interface

Figure 281:
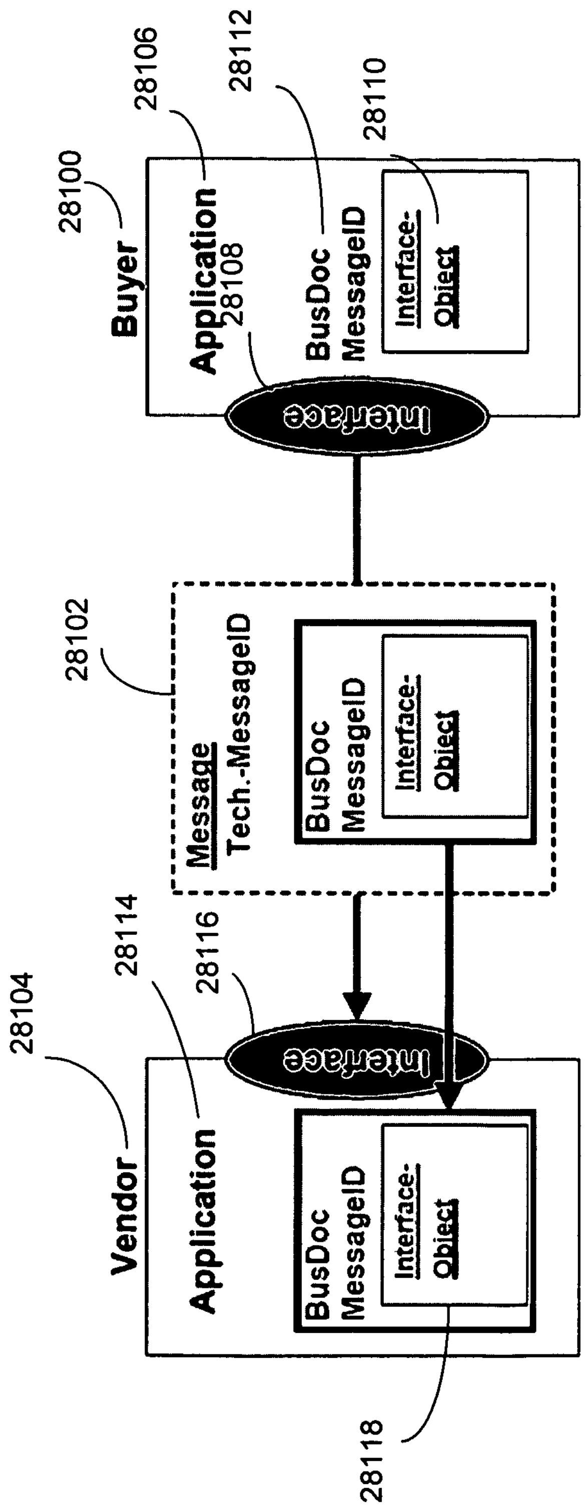
FIG. 281 depicts an example illustrating the transmittal of a business document in accordance with methods and systems consistent with the present invention.

The XI stores the interfaces (as an interface type). At runtime, the sending party's program instantiates the interface to create a business document, and sends the business document in a message to the recipient. The messages are preferably defined using XML. In the example depicted in FIG. 281, the Buyer 28100 uses an application 28106 in its system to instantiate an interface 28108 and create an interface object or business document object 28110. The Buyer's application 28106 uses data that is in the sender's component-specific structure and fills the business document object 28110 with the data. The Buyer's application 28106 then adds message identification 28112 to the business document and places the business document into a message 28102. The Buyer's application 28106 sends the message 28102 to the Vendor 28104. The Vendor 28104 uses an application 28114 in its system to receive the message 28102 and store the business document into its own memory. The Vendor's application 28114 unpacks the message 28102 using the corresponding interface 28116 stored in its XI to obtain the relevant data from the interface object or business document object 28118.

Figure 282:
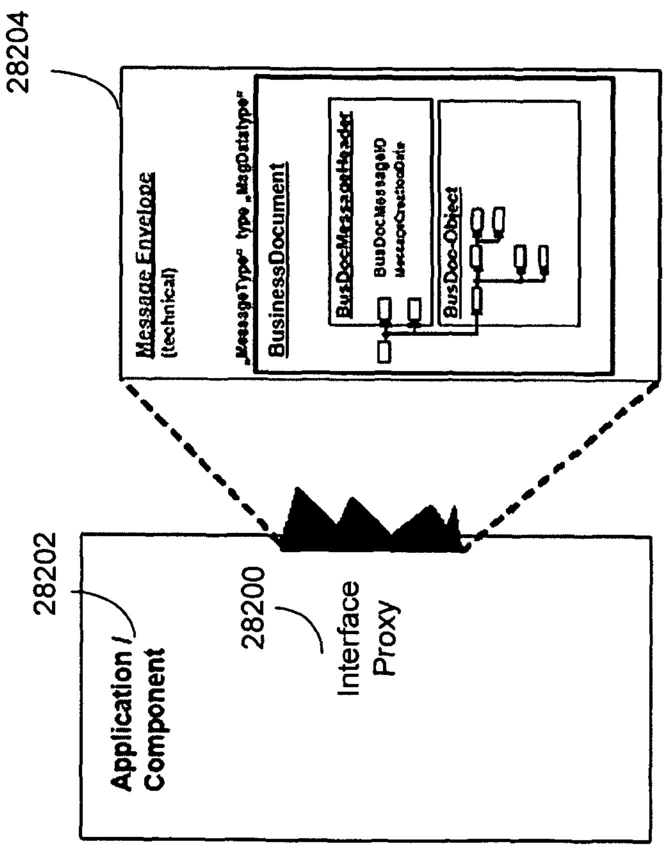
FIG. 282 depicts the interface proxy in accordance with methods and systems consistent with the present invention.
Figure 283:
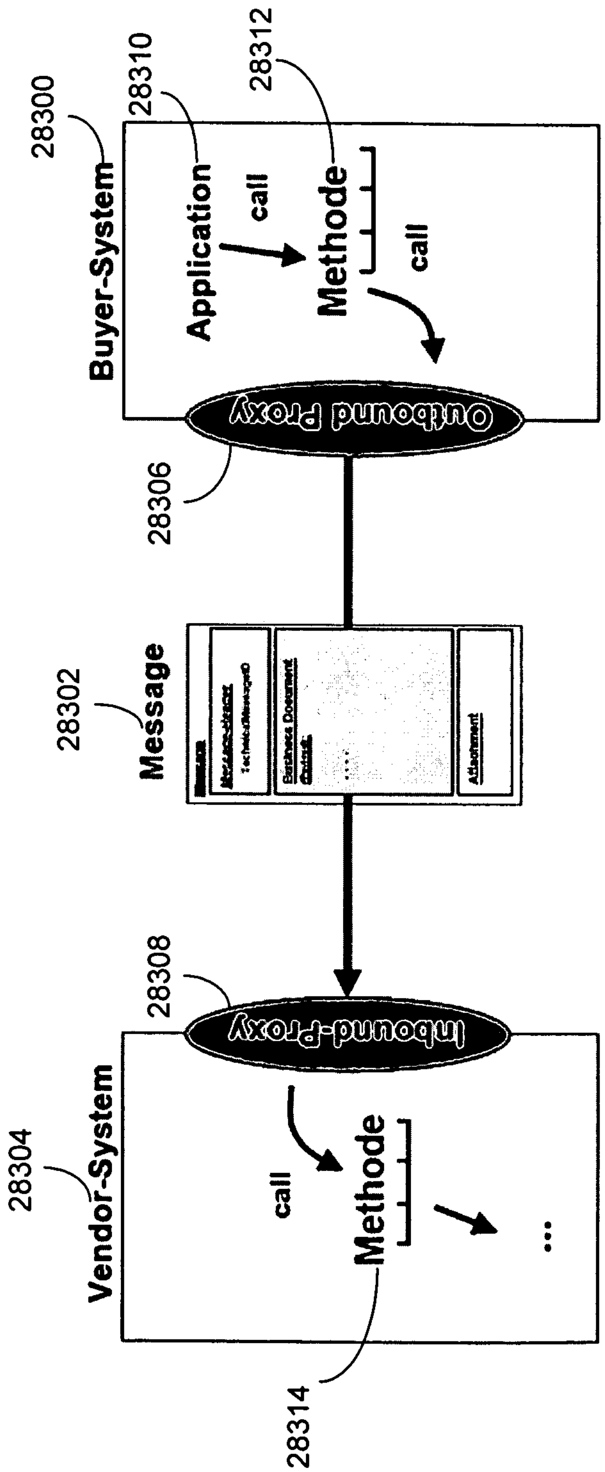
FIG. 283 depicts an example illustrating the transmittal of a message using proxies in accordance with methods and systems consistent with the present invention.

From the component's perspective, the interface is represented by an interface proxy 28200, as depicted in FIG. 282. The proxies 28200 shield the components 28202 of the sender and recipient from the technical details of sending messages 28204 via XI. In particular, as depicted in FIG. 283, at the sending end, the Buyer 28300 uses an application 28310 in its system to call an implemented method 28312, which generates the outbound proxy 28306. The outbound proxy 28306 parses the internal data structure of the components and converts them to the XML structure in accordance with the business document object. The outbound proxy 28306 packs the document into a message 28302. Transport, routing and mapping the XML message to the recipient 28304 is done by the routing system (XI, Netweaver, etc.).

When the message arrives, the recipient's inbound proxy 28308 calls its component-specific method 28314 for creating a document. The proxy 28308 at the receiving end downloads the data and converts the XML structure into the internal data structure of the recipient component 28304 for further processing.

Figure 284:
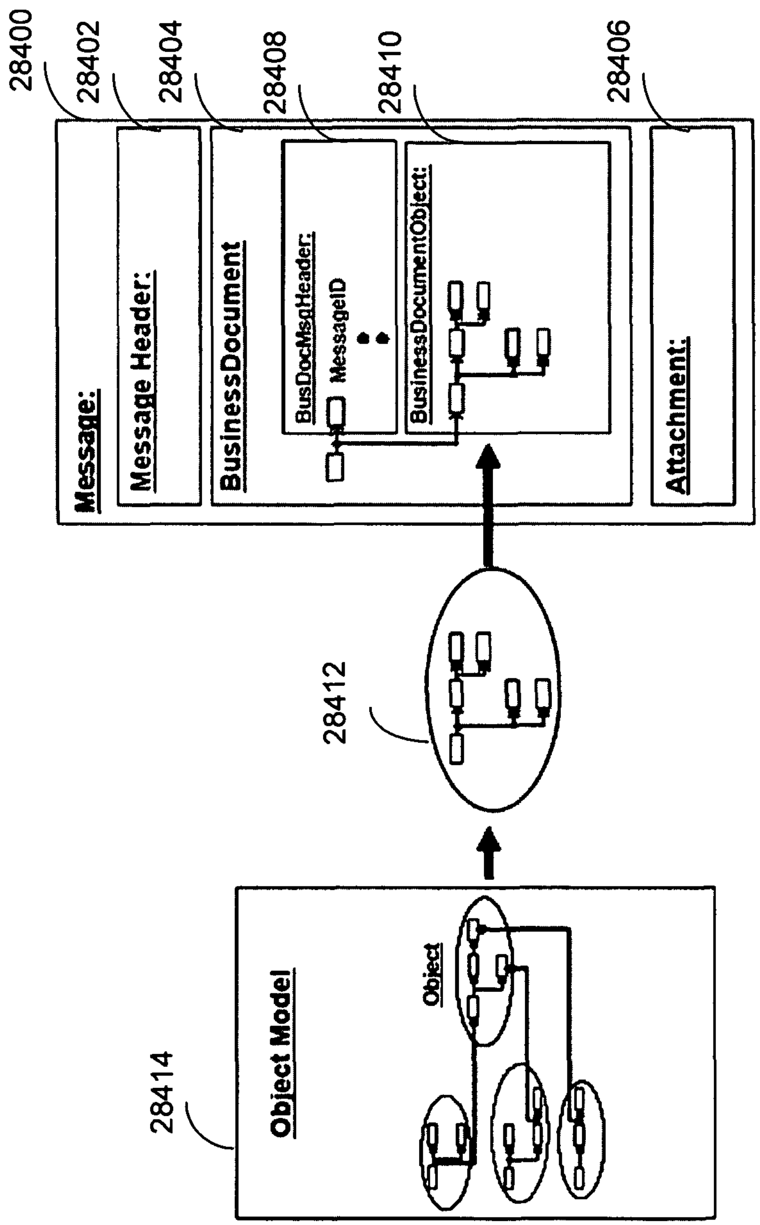
FIG. 284 depicts the components of a message in accordance with methods and systems consistent with the present invention.

As depicted in FIG. 284, a message 28400 includes a message header 28402 and a business document 28404. The message 28400 also may include an attachment 28406. For example, the sender may attach technical drawings, detailed specifications or pictures of a product to a purchase order for the product. The business document 28404 includes a business document message header 28408 and the business document object 28410. The business document message header 28408 includes administrative data, such as the message ID and a message description. As discussed above, the structure 28412 of the business document object 28410 is derived from the business object model 28414. Thus, there is a strong correlation between the structure of the business document object and the structure of the business object model. The business document object 28410 forms the core of the message 28400.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 285:
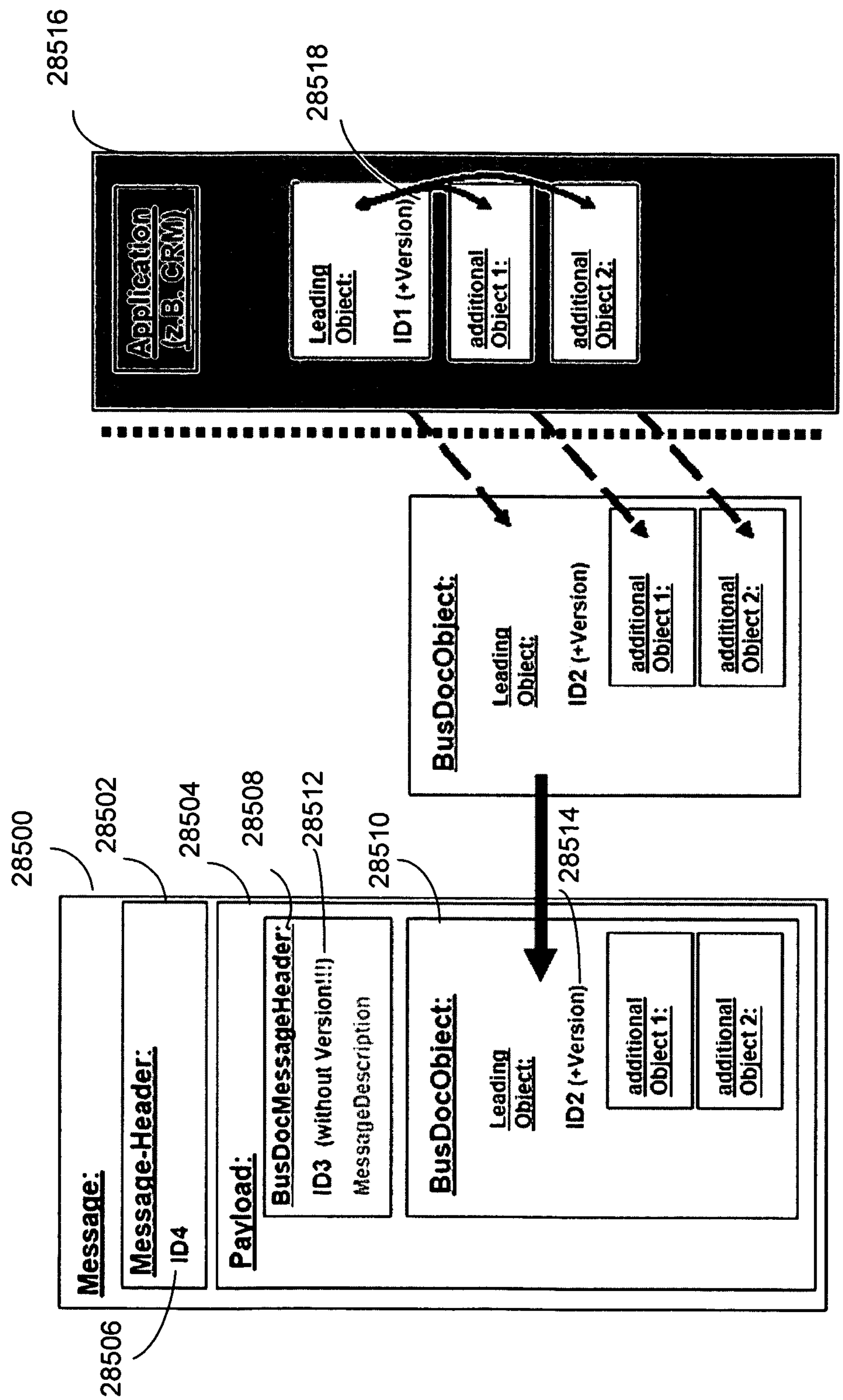
FIG. 285 depicts the IDs used in a message in accordance with methods and systems consistent with the present invention.

As depicted in FIG. 285, the message header 28502 in message 28500 includes a technical ID ("ID4") 28506 that identifies the address for a computer to route the message. The sender's system manages the technical ID 28506.

The administrative information in the business document message header 28508 of the payload or business document 28504 includes a BusinessDocumentMessageID ("ID3") 28512. The business entity or component 28516 of the business entity manages and sets the BusinessDocumentMessageID 28512. The business entity or component 28516 also can refer to other business documents using the BusinessDocumentMessageID 28512. The receiving component 28516 requires no knowledge regarding the structure of this ID. The BusinessDocumentMessageID 28512 is, as an ID, unique. Creation of a message refers to a point in time. No versioning is expressed by the ID. Besides the BusinessDocumentMessageID 28512, there also is a business document object ID 28514, which may include versions.

The component 28516 also adds its own component object ID 28518 when the business document object is stored in the component. The component object ID 28518 identifies the business document object when it is stored within the component. However, not all communication partners may be aware of the internal structure of the component object ID 28518. Some components also may include a versioning in their ID 28518.

Figure 286:
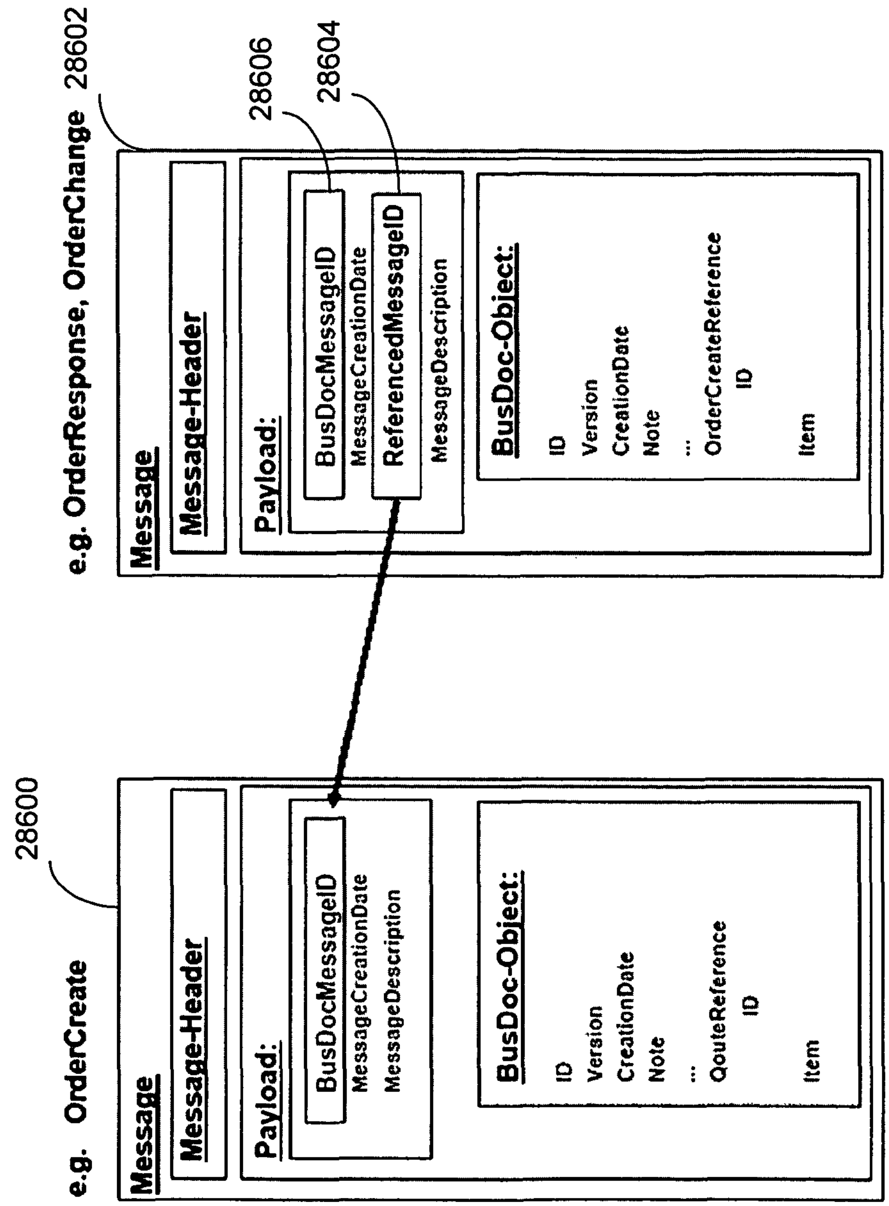
FIG. 286 depicts the reference to previous messages in accordance with methods and systems consistent with the present invention.
Figure 287:
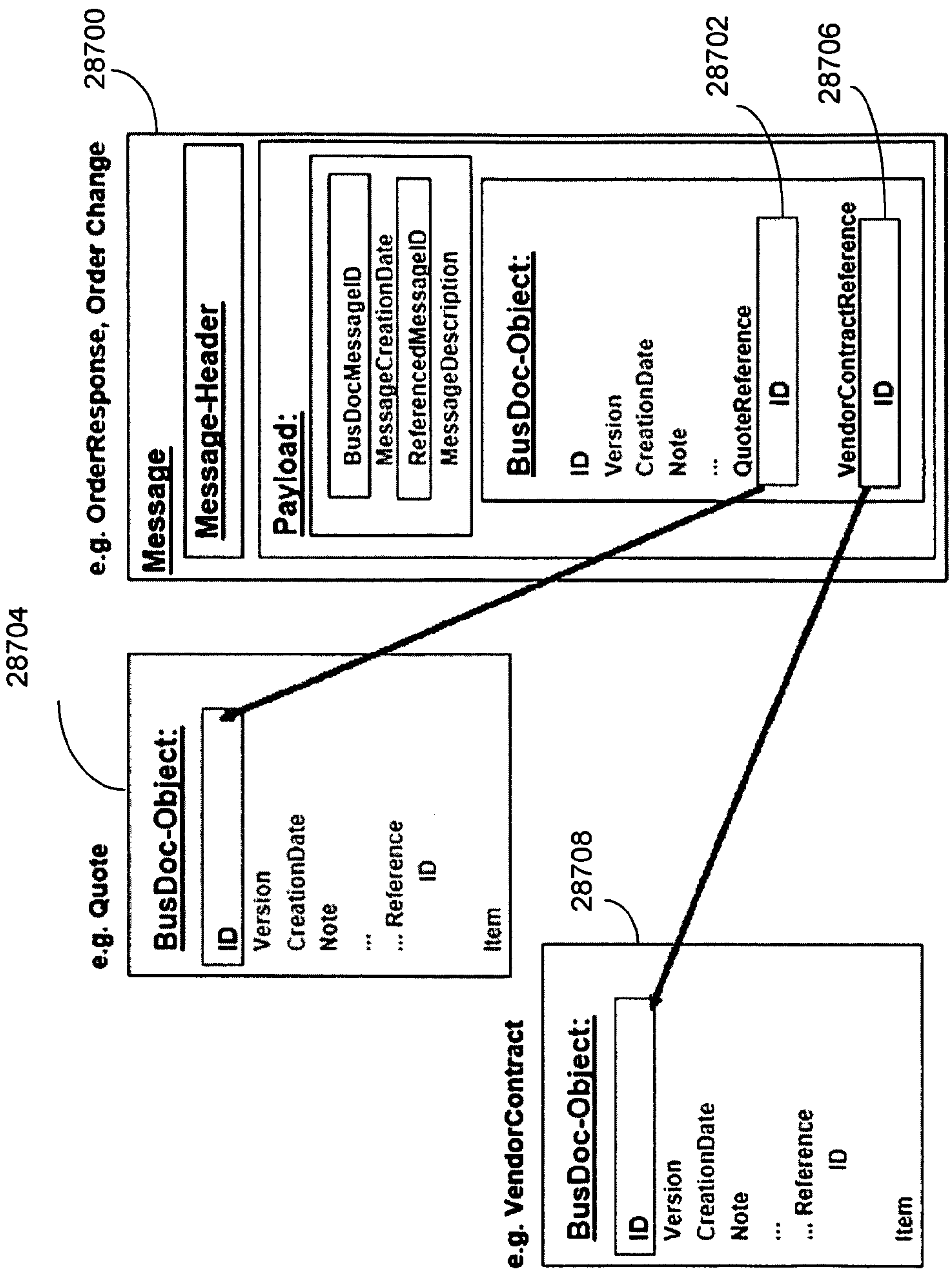
FIG. 287 depicts the reference to business documents from previous transactions in accordance with methods and systems consistent with the present invention.

The ReferencedMessageID refers to a previous message. For example, as depicted in FIG. 286, a response 28602 to a message 28600 includes a referenced message ID 28604 referring to the original message. Moreover, documents from previous transactions may be referenced in a message. The BusinessDocumentMessageID 28606 refers to such documents. For example, as depicted in FIG. 287, an order response or order change 28700 includes an ID 28702 referring to the original Quote 28704 or an ID 28706 referring to the original Vendor Contract 28708 within the Business Transaction Document ID.

7. Use of Interfaces Across Industries

Figure 310:
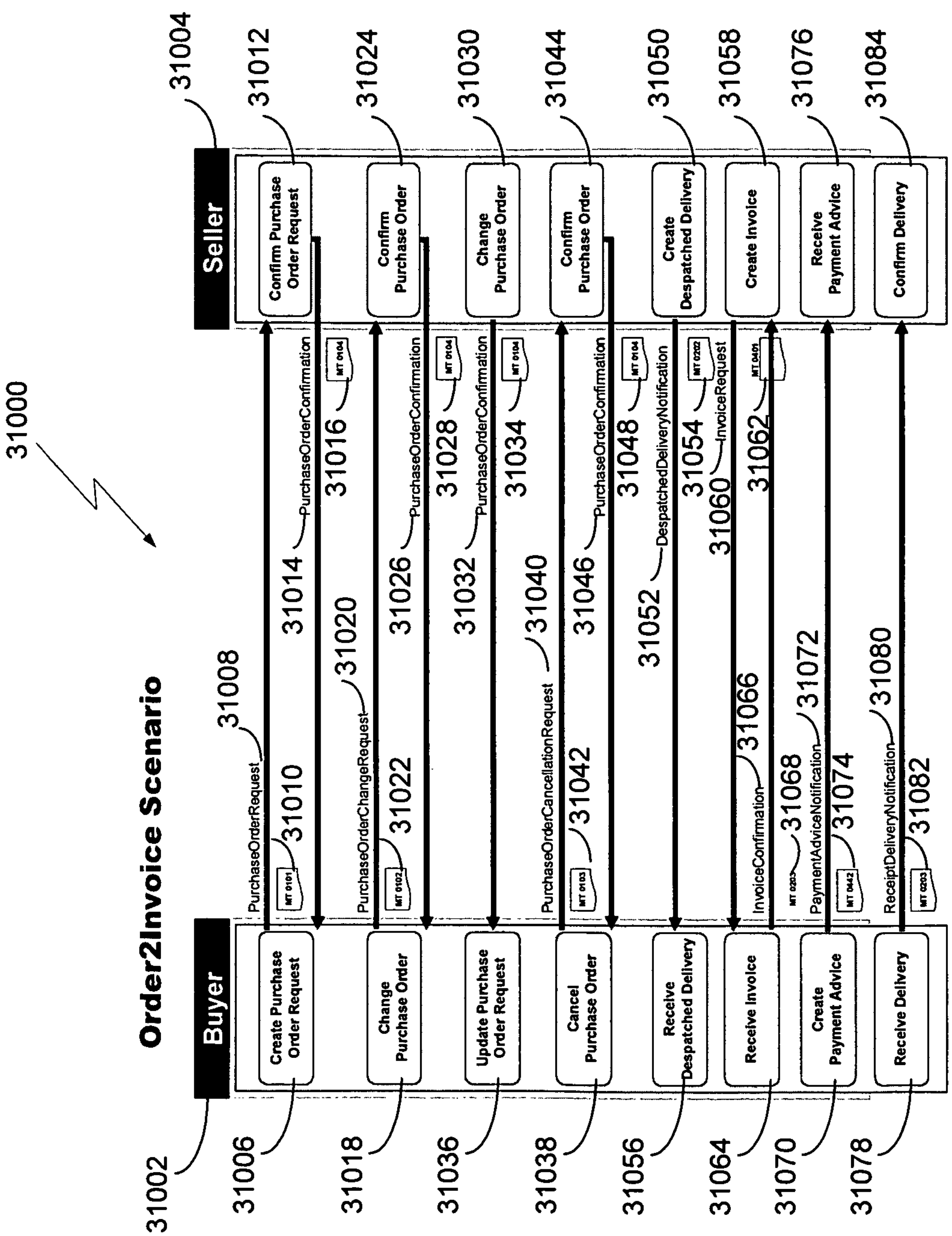
FIG. 310 depicts the message choreography for the Order to Invoice in accordance with methods and systems consistent with the present invention.

Methods and systems consistent with the present invention provide interfaces that may be used across different business areas for different industries. For example, FIG. 310 depicts the message choreography 31000 for an Order to Invoice scenario between a buyer 31002 and seller 31004. The buyer 31002 creates a purchase order request 31006, and sends a PurchaseOrderRequest 31008 to the seller 31004 to deliver goods or render services. The message type 31010 of the PurchaseOrderRequest 31008 is 0101, as defined above. In response, the seller 31004 confirms the purchase order request 31012, and sends a PurchaseOrderConfirmation 31014 to the buyer 31002. The message type 31016 of the PurchaseOrderConfirmation 31014 is 0104.

The buyer 31002 may change the purchase order 31018 by sending a PurchaseOrderChangeRequest 31020 to the seller 31004. The message type 31022 of the PurchaseOrderChangeRequest 31020 is 0102. In response, the seller 31004 may confirm the purchase order 31024 by sending a PurchaseOrderConfirmation 31026 to the buyer 31002. The message type 31028 of the PurchaseOrderConfirmation 31026 is 0104.

The seller 31004 may change a purchase order 31030 by sending a PurchaseOrderConfirmation 31032 to the buyer 31002. The message type 31034 of the PurchaseOrderConfirmation 31032 is 0104. In response, the buyer updates the purchase order request 31036.

The buyer 31002 may cancel a purchase order 31038 by sending a PurchaseOrderCancellationRequest 31040 to the seller 31004. The message type 31042 of the PurchaseOrderCancellationRequest 31040 is 0103. In response, the seller 31004 may confirm the purchase order cancellation 31044 by sending a PurchaseOrderConfirmation 31046 to the buyer 31002. The message type 31048 of the PurchaseOrderConfirmation 31046 is 0104.

The seller 31004 may create a despatched delivery 31050 and send a DespatchedDeliveryNotification 31052 to the buyer 31002. The message type 31054 of the DespatchedDeliveryNotification 31052 is 0202. In response the buyer 31002 receives the despatched delivery 31056.

The seller 31004 may create an invoice 31058 and send an InvoiceRequest 31060 to the buyer 31002. The message type 31062 of the InvoiceRequest 31060 is 0401. In response, the buyer 31002 receives the invoice 31064, and may send an InvoiceConfirmation 31066 to the seller 31004. The message type 31068 of the InvoiceConfirmation 31066 is 0401.

The buyer 31002 may create payment advice 31070 and send a PaymentAdviceNotification 31072 to the seller 31004, who receives the payment advice 31076. The message type 31074 of the PaymentAdviceNotification 31072 is 0442. The buyer 31002, after receiving delivery 31078, may send a ReceiptDeliveryNotification 31080 to the seller 31004 to confirm delivery 31084. The message type 31082 of the ReceiptDeliveryNotification 31080 is 0203.

Figure 311:
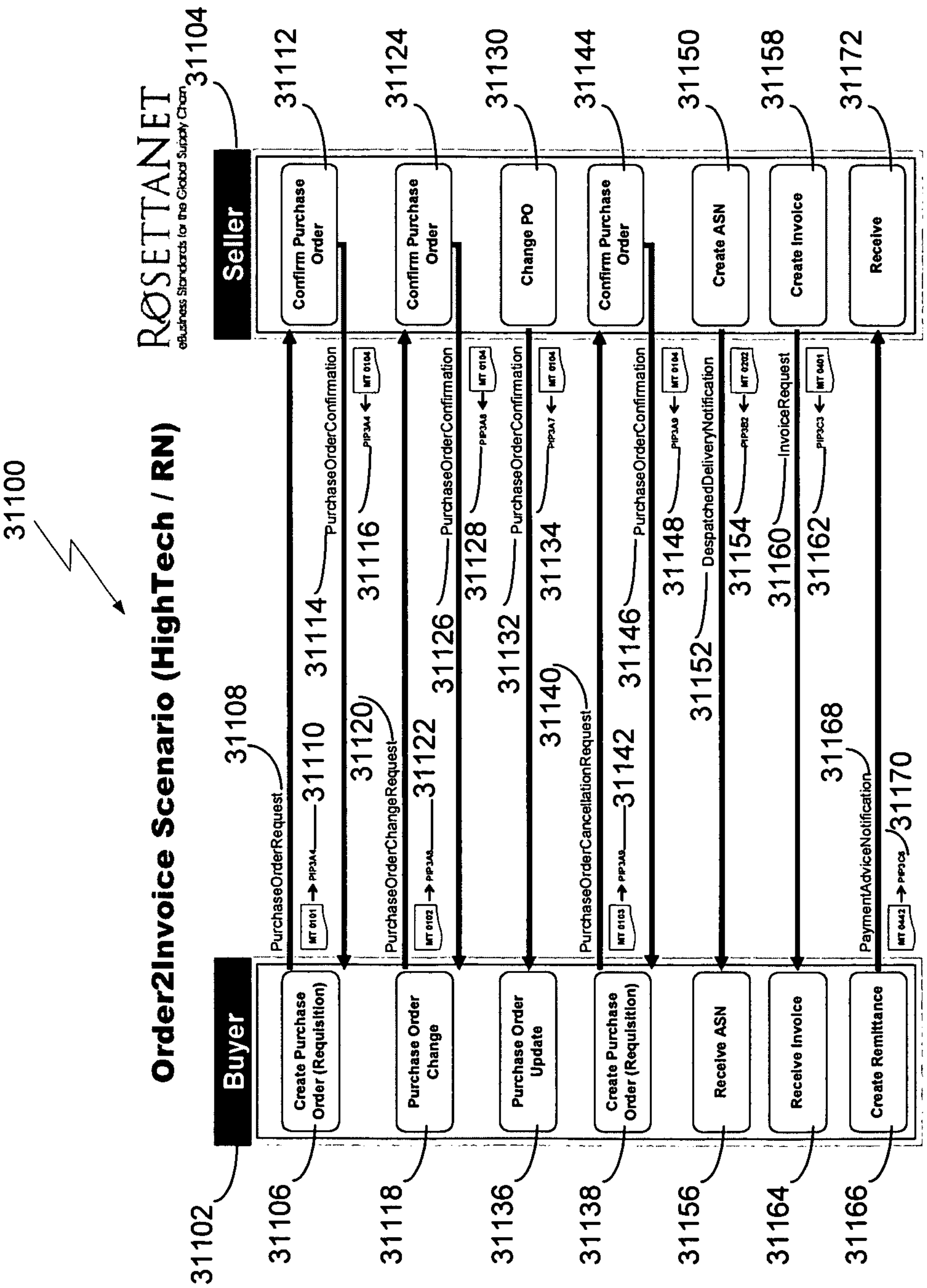
FIG. 311 depicts the message choreography for the Order to Invoice provided by RosettaNet.

The interfaces derived using methods and systems consistent with the present invention also may be mapped for use under various standards. For example, FIG. 311 depicts the message choreography 31100 for an Order to Invoice scenario provided by RosettaNet, i.e., the high tech industry standard. As shown, the buyer 31102 creates a purchase order (requisition) 31106, and sends a PurchaseOrderRequest 31108 to the seller 31104. The message type of the PurchaseOrderRequest 31108 is 0101, which corresponds to RosettaNet's PIP3A4 message type 31110. In response, the seller 31104 confirms the purchase order request 31112, and sends a PurchaseOrderConfirmation 31114 to the buyer 31102. The message type of the PurchaseOrderConfirmation 31114 is 0104, which corresponds to RosettaNet's PIP3A4 message type 31116.

The buyer 31102 may then change the purchase order 31118 by sending a PurchaseOrderChangeRequest 31120 to the seller 31104. The message type of the PurchaseOrderChangeRequest 31120 is 0102, which corresponds to RosettaNet's PIP3A8 message type 31122. In response, the seller 31104 may confirm the purchase order 31124 by sending a PurchaseOrderConfirmation 31126 to the buyer 31102. The message type of the PurchaseOrderConfirmation 31126 is 0104, which corresponds to RosettaNet's PIP3A8 message type 31128.

The seller 31104 may change a purchase order 31130 by sending a PurchaseOrderConfirmation 31132 to the buyer 31102. The message type of the PurchaseOrderConfirmation 31132 is 0104, which corresponds to RosettaNet's PIP3A7 message type 31134. In response, the buyer 31102 updates the purchase order request 31136.

The buyer 31102 may cancel a purchase order 31138 by sending a PurchaseOrderCancellationRequest 31140 to the seller 31104. The message type of the PurchaseOrderCancellationRequest 31140 is 0103, which corresponds to RosettaNet's PIP3A9 message type 31142. In response, the seller 31104 may confirm the purchase order cancellation 31144 by sending a PurchaseOrderConfirmation 31146 to the buyer 31102. The message type of the PurchaseOrderConfirmation 31146 is 0104, which corresponds to RosettaNet's PIP3A9 message type 31148.

The seller 31104 may create an ASN 31150 and send a DespatchedDeliveryNotification 31152 to the buyer 31102. The message type of the DespatchedDeliveryNotification 31152 is 0202, which corresponds to RosettaNet's PIP3B2 message type 31154. In response, the buyer 31102 receives the ASN 31156.

The seller 31104 may create an invoice 31158 and send an InvoiceRequest 31160 to the buyer 31102. The message type of the InvoiceRequest 31160 is 0401, which corresponds to RosettaNet's PIP3C3 message type 31162. In response, the buyer 31102 receives the invoice 31164.

The buyer 31102 may create a remittance 31166 and send a PaymentAdviceNotification 31168 to the seller 31104, who receives the payment advice 31172. The message type of the PaymentAdviceNotification 31168 is 0442, which corresponds to RosettaNet's PIP3C6 message type 31170.

Figure 312:
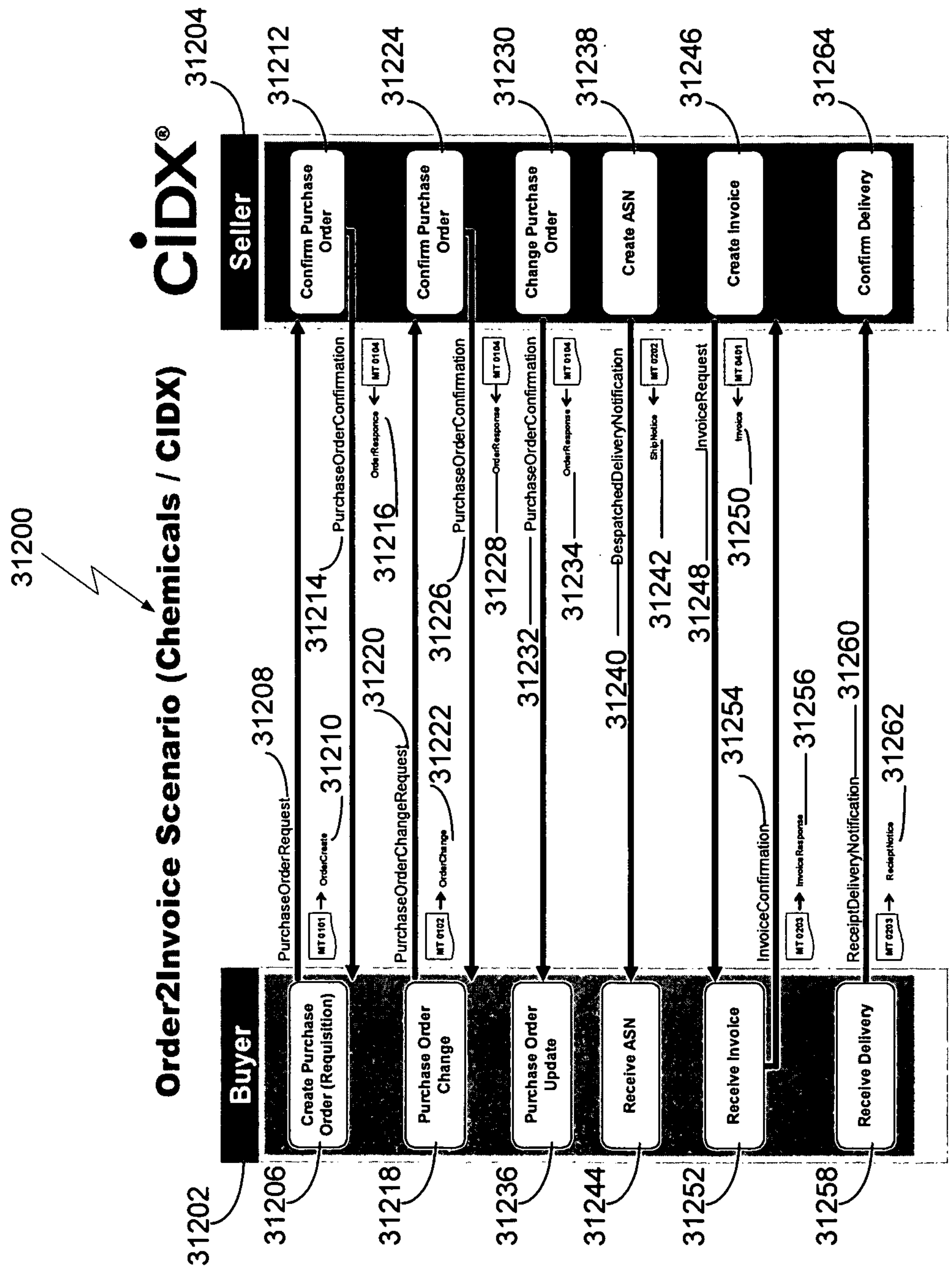
FIG. 312 depicts the message choreography for the Order to Invoice provided by CIDX.

FIG. 312 depicts the message choreography 31200 for an Order to Invoice scenario provided by CIDX, i.e., the chemical industry standard. As shown, the buyer 31202 creates a purchase order (requisition) 31206, and sends a PurchaseOrderRequest 31208 to the seller 31204. The message type of the PurchaseOrderRequest 31208 is 0101, which corresponds to CIDX's OrderCreate message 31210. In response, the seller 31204 confirms the purchase order 31212, and sends a PurchaseOrderConfirmation 31214 to the buyer 31202. The message type of the PurchaseOrderConfirmation 31214 is 0104, which corresponds to CIDX's OrderResponse message 31216.

The buyer 31202 may change the purchase order 31218 by sending a PurchaseOrderChangeRequest 31220 to the seller 31204. The message type of the PurchaseOrderChangeRequest 31220 is 0102, which corresponds to CIDX's OrderChange message 31222. In response, the seller 31204 may confirm the purchase order 31224 by sending a PurchaseOrderConfirmation 31226 to the buyer 31202. The message type of the PurchaseOrderConfirmation 31226 is 0104, which corresponds to CIDX's OrderResponse message 31228.

The seller 31204 may change a purchase order 31230 by sending a PurchaseOrderConfirmation 31232 to the buyer 31202. The message type of the PurchaseOrderConfirmation 31232 is 0104, which corresponds to CIDX's OrderResponse message 31234. In response, the buyer 31202 updates the purchase order request 31236.

The seller may create an ASN 31238 and send a DespatchedDeliveryNotification 31240 to the buyer 31202. The message type of the DespatchedDeliveryNotification 31240 is 0202, which corresponds to CIDX's ShipNotice message 31242. In response the buyer 31202 receives the ASN 31244.

The seller 31204 may create an invoice 31246 and send an InvoiceRequest 31248 to the buyer 31202. The message type of the InvoiceRequest 31248 is 0401, which corresponds to CIDX's Invoice message 31250. In response, the buyer 31202 receives the invoice 31252, and may send an InvoiceConfirmation 31254 to the seller 31204. The message type of the InvoiceConfirmation 31254 is 0203, which corresponds to CIDX's InvoiceResponse message 31256.

After receiving delivery 31258, the buyer 31202 may send a ReceiptDeliveryNotification 31260 to the seller 31204, who confirms delivery 31264. The message type of the ReceiptDeliveryNotification 31260 is 0203, which corresponds to CIDX's ReceiptNotice message 31262.

A table identifying the relationship between the interfaces derived using methods and systems consistent with the present invention and the interfaces provided by RosettaNet and CIDX is shown below. The number in the brackets identifies the number of fields within the interface.

| Interface | RosettaNet | CIDX |
|---|---|---|
| MT101 PurchaseOrderRequest | PIP3A4 PurchaseOrder Request (557) | OrderCreate (1030) |
| MT102 PurchaseOrderChangeRequest | PIP3A8 PurchaseOrder ChangeRequest (627) | OrderChange (1000) |
| MT103 PurchaseOrderCancellationRequest | PIP3A9 PurchaseOrder CancellationRequest (31) | OrderChange (all Items deleted) |
| MT104 PurchaseOrderConfirmation | PIP3A4 PurchaseOrder Confirmation (712) | OrderResponse (1020) |
| MT104 PurchaseOrderConfirmation | PIP3A8 PurchaseOrder ChangeConfirmation (743) | |
| MT104 PurchaseOrderConfirmation | PIP3A7 PurchaseOrder UpdateNotification (745) | |
| MT104 PurchaseOrderConfirmation | PIP3A9 PurchaseOrder CancellationConfirmation (34) | |
| MT202 DespatchedDeliveryNotification | PIP3B2 AdvanceShipment otification (253) | ShipNotice (1000) |
| MT203 ReceivedDeliveryNotification | | ReceiptNotice (640) (Delivery Receipt, Delivery Receipt Response) |
| MT401 InvoiceRequest | PIP3C3 InvoiceNotification (391) | Invoice (800) |
| MT402 InvoiceConfirmation | | InvoiceResponse (350) |
| MT442 PaymentAdviceNotification | PIP3C6 RemittanceAdvice otification (117) | |

As illustrated above, the interfaces derived using methods and systems consistent with the present invention may be mapped onto the interfaces of different industry standards. Unlike the interfaces provided by any given standard that do not include the interfaces required by other standards, methods and systems consistent with the present invention provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the present invention include most of the fields provided by the interfaces of different industry standards. Any missing fields may easily be included into the business object model. Thus, by derivation, the interfaces can be extended consistently by these fields. Thus, methods and systems consistent with the present invention provide consistent interfaces that can be used across different industry standards.

C. Exemplary Interfaces a) Purchase Requirement Interfaces

Purchase requirement interfaces are used to exchange purchase requisitions for products (materials, services) between a requester (in the PTS scenario, an MRP controller, for example) and a buyer, and confirmations that these requisitions have been fulfilled.

The motivating business scenario for the PurchaseRequirementRequest and PurchaseRequirementConfirmation interfaces is the Procure to Stock (PTS) scenario. In the PTS scenario, a planning system (SCP) or the "requester," generates purchase requisitions that are procured externally by a procurement system (SRM) or the "buyer."

(1) Message Types

Two messages types are available for mapping an A2A requisition process: (1) the message type PurchaseRequirementRequest is sent from the requester (a requirements planner in the PTS scenario or a planning/requirements system, for example) to the buyer and is used to start a new requirements process. From now on, this document will simply use the terms 'requester' and 'buyer'; and (2) the message type PurchaseRequirementConfirmation is sent from the buyer to the requester. It informs the requester of the extent to which the requirement has been fulfilled.

(a) Purchase Requirement Request

A PurchaseRequirementRequest is a request from a requester asking a buyer to procure products (materials or services) externally. The structure of the message type PurchaseRequirementRequest is specified by the message data type PurchaseRequirementMessage. A PurchaseRequirementRequest message results in the relevant requisition being created or changed in the procurement system. The procurement system accepts changes made to a requisition (except for technical errors). If the procurement system (buyer) cannot procure a requisition or partial quantity of a requisition (rejection), the procurement system indicates this by outputting the PurchaseRequirementConfirmation message.

(b) Purchase Requirement Confirmation

A PurchaseRequirementConfirmation is a confirmation of the buyer that informs the requester of the extent to which a requisition has been fulfilled. The structure of the message type PurchaseRequirementConfirmation is specified by the message data type PurchaseRequirementMessage. If a procurement system (buyer) cannot fulfil a requisition or partial quantity of a requisition, the buyer indicates this by outputting the PurchaseRequirementConfirmation message. The buyer cannot cancel a rejection of a requisition.

(2) Message Choreography

Figure 288:
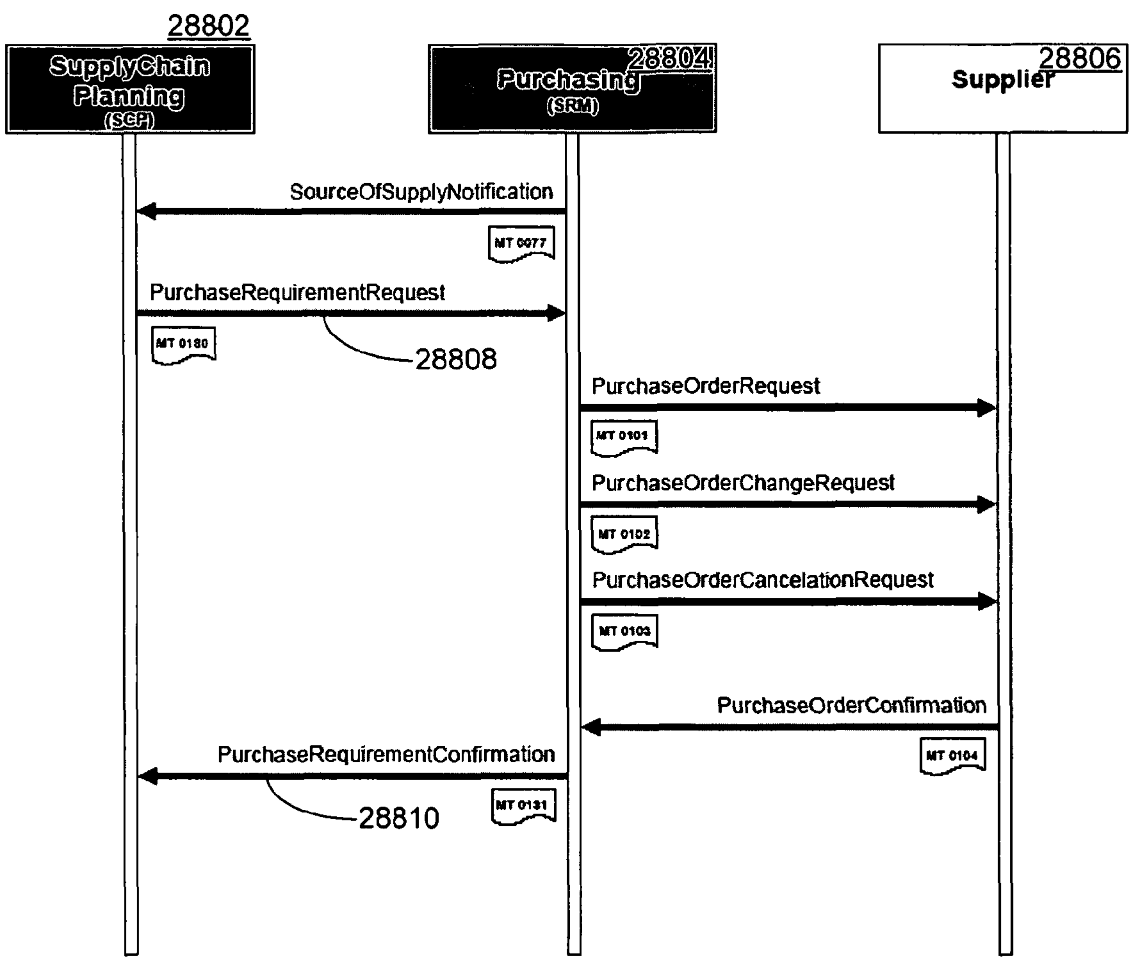
FIG. 288 depicts the message choreography for the Purchase Requirement interfaces in accordance with methods and systems consistent with the present invention.
Figure 289A:
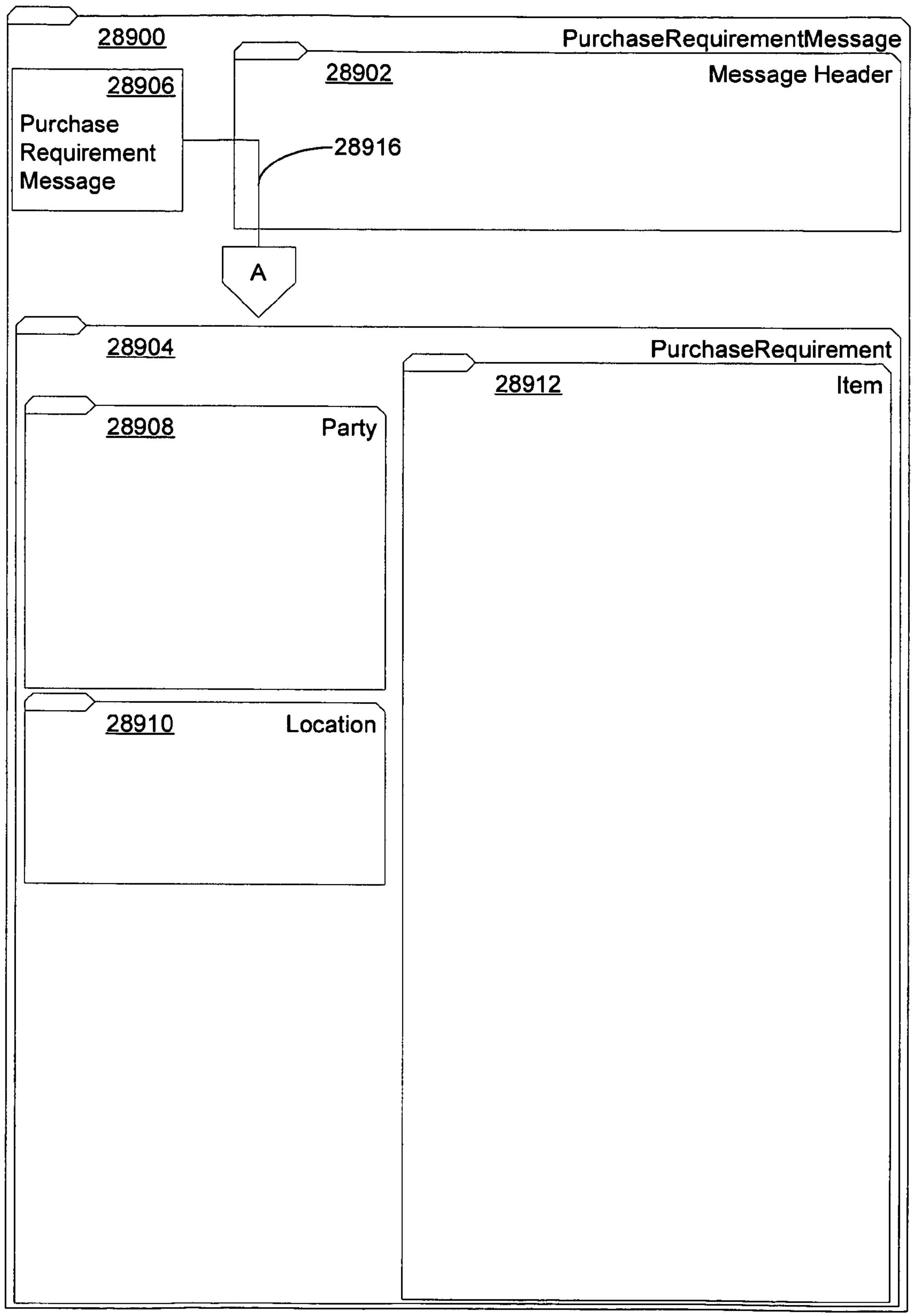
FIGS. 289A-H depict the data model for the Purchase Requirement interfaces in accordance with methods and systems consistent with the present invention.
Figure 289B:
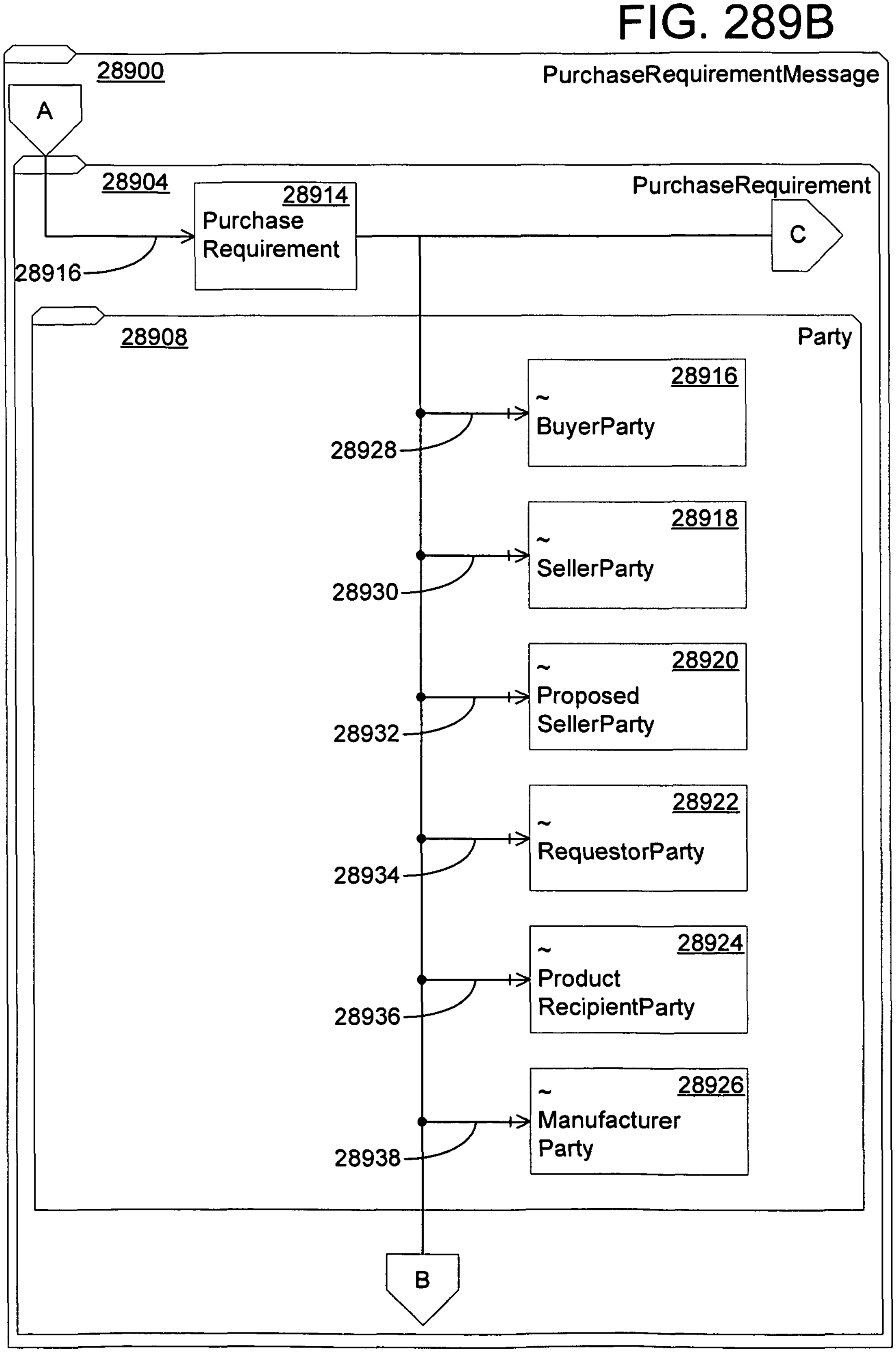
Figure 289C:
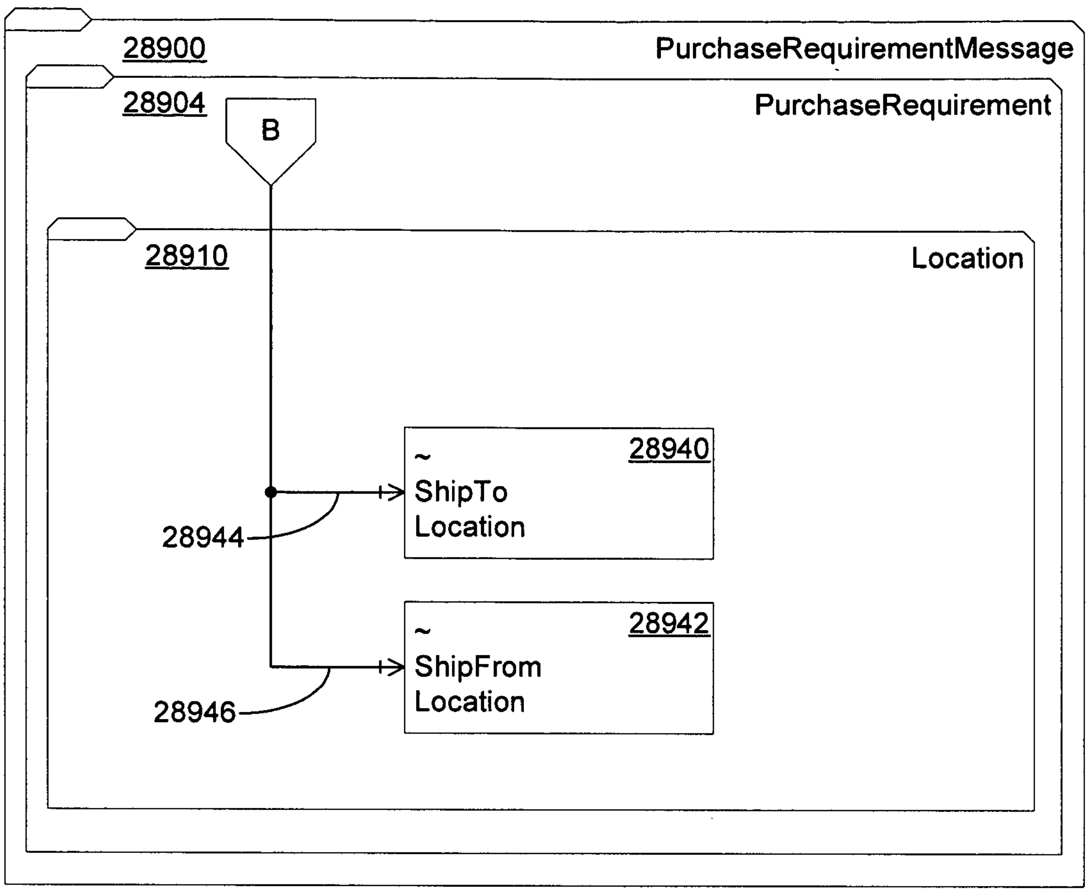
Figure 289D:
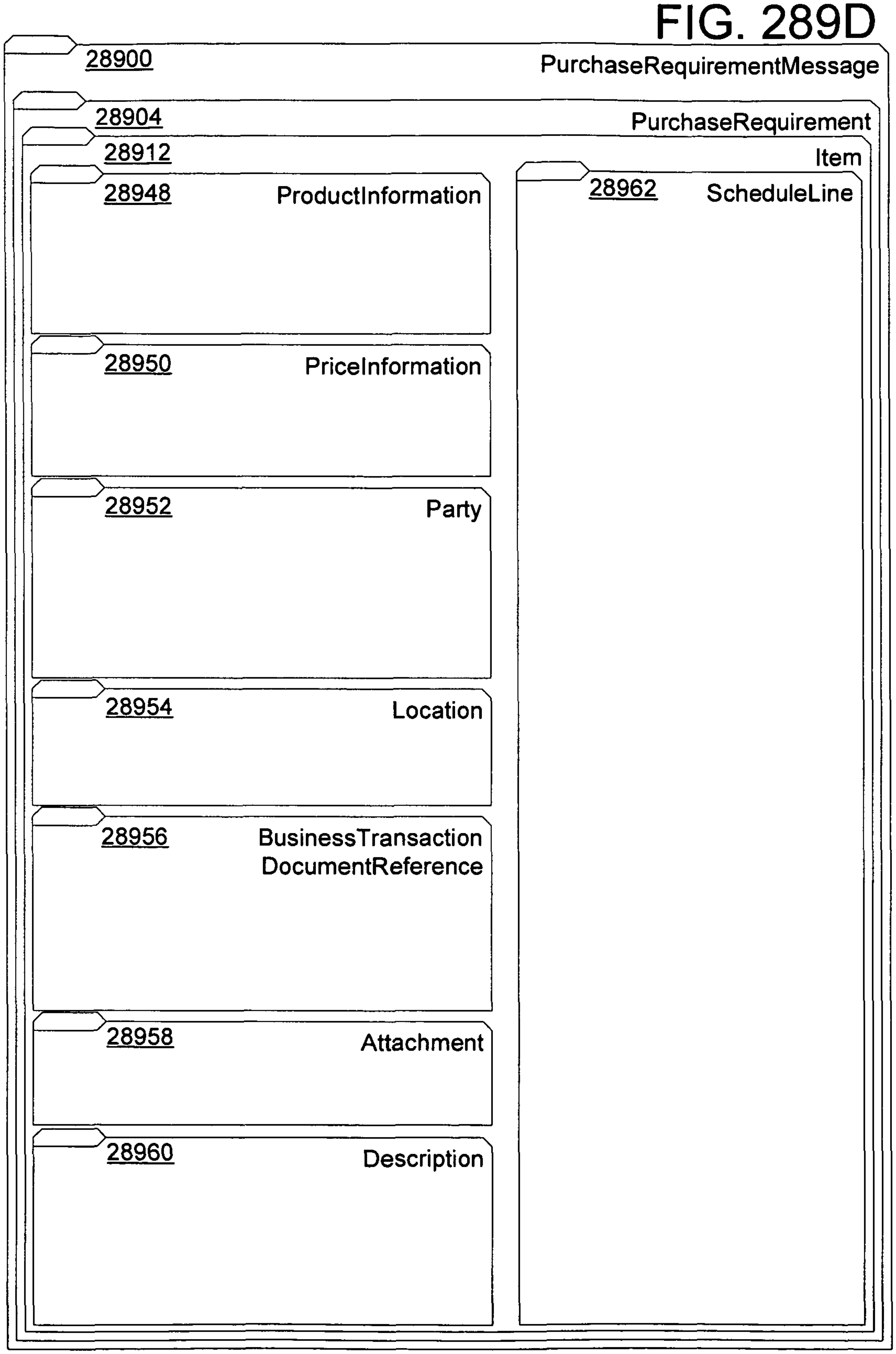
Figure 289E:
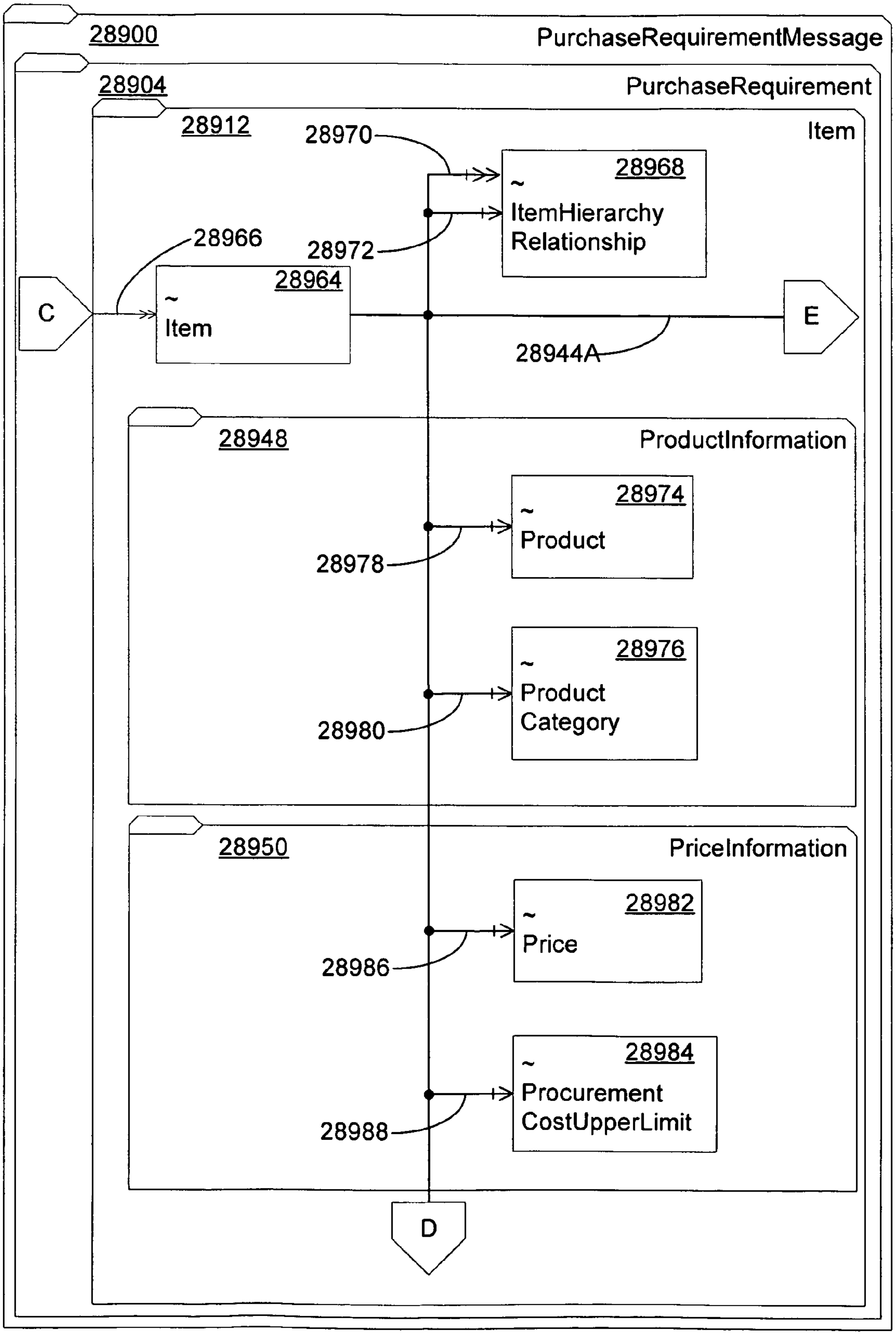
Figure 289F:
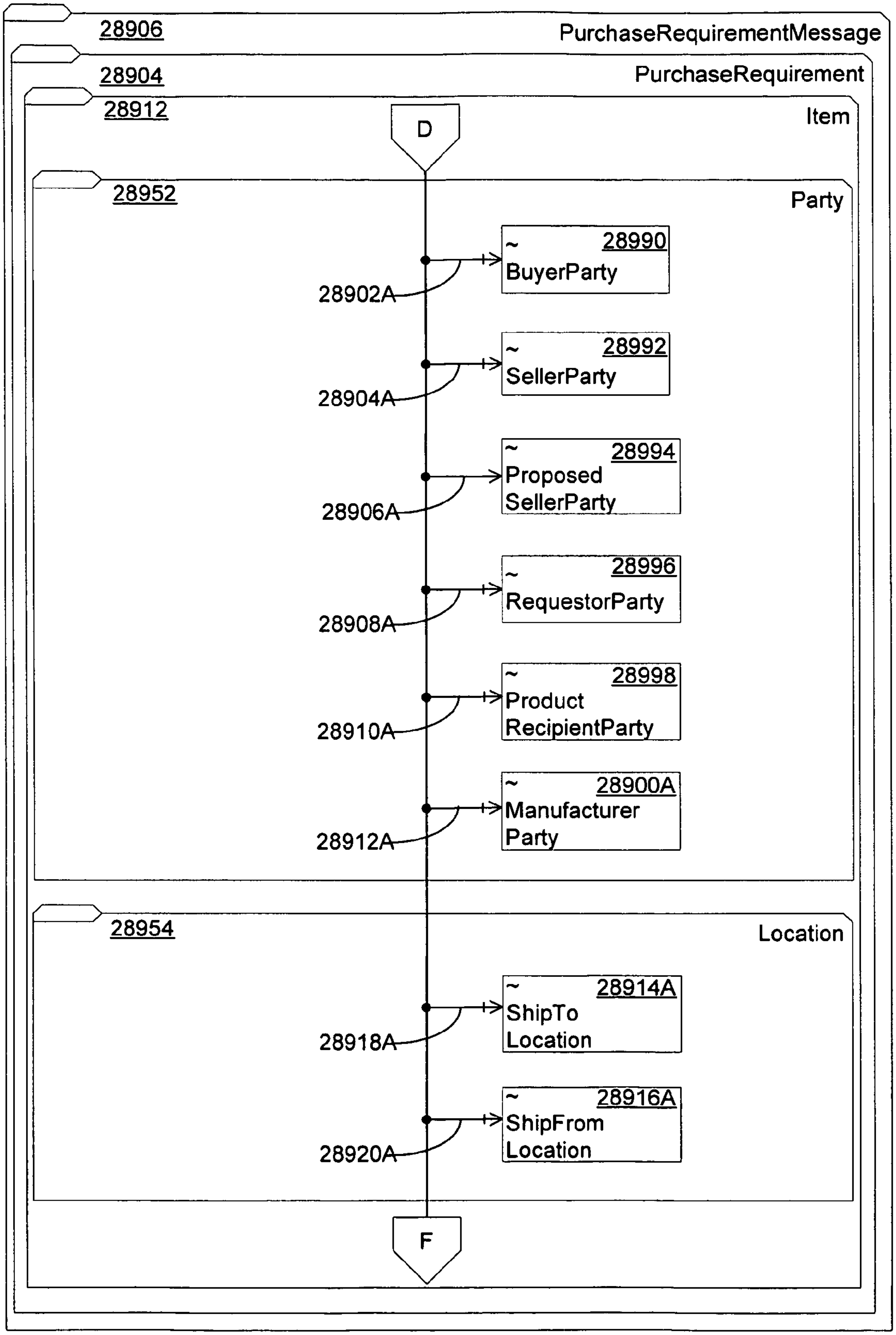
Figure 289G:
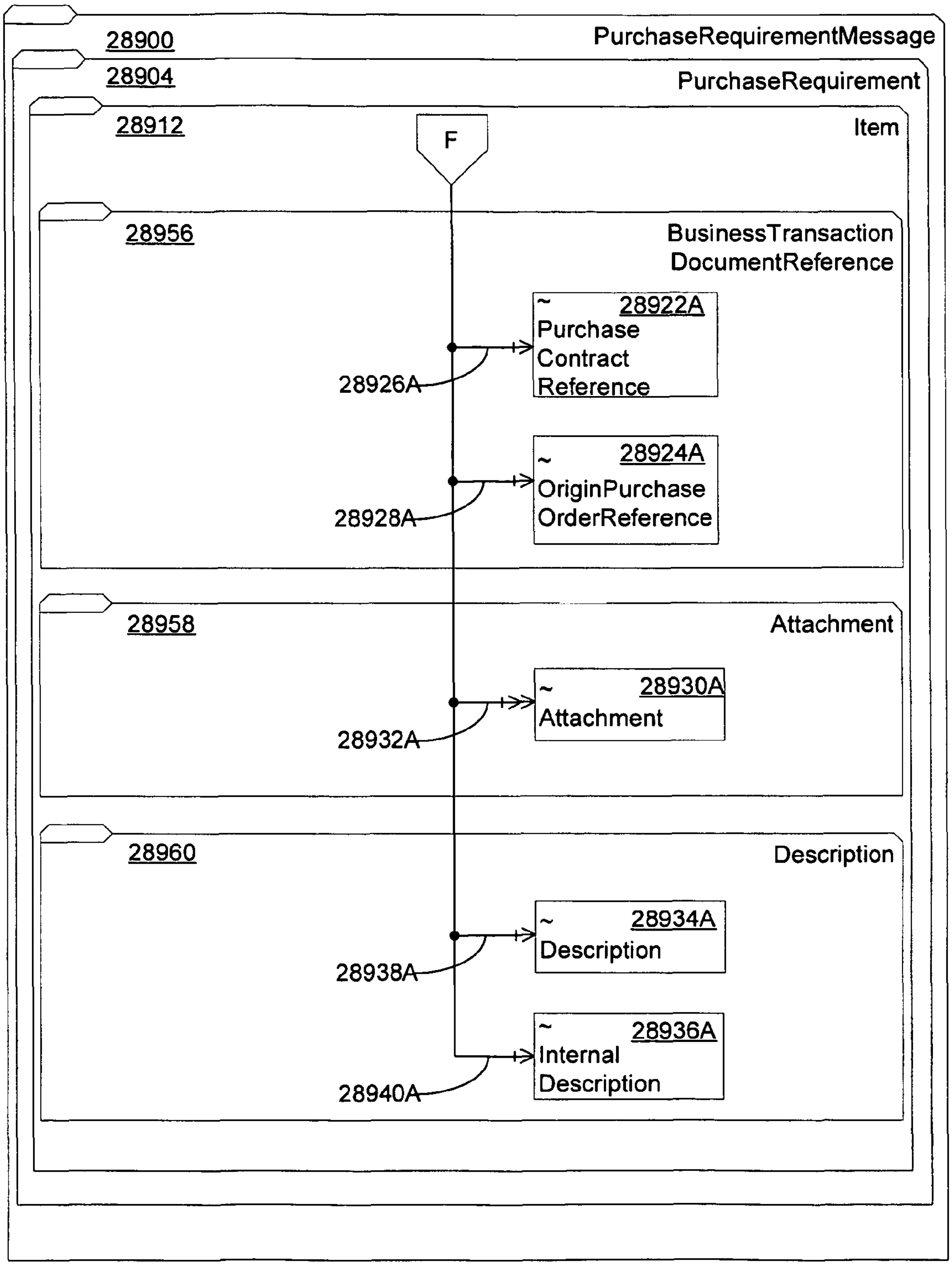
Figure 289H:
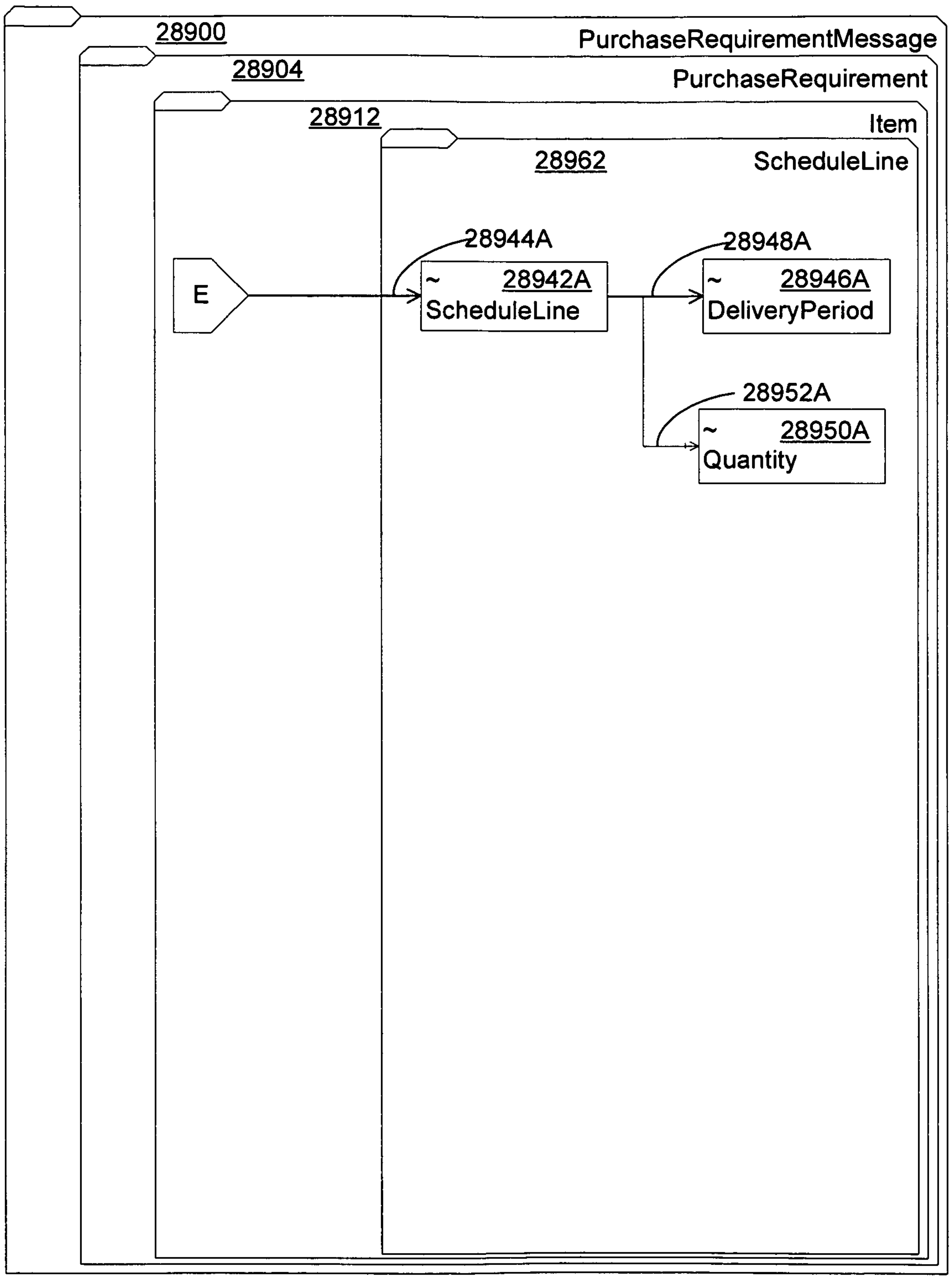

FIG. 288 depicts the message choreography for an exemplary purchase requisition process. The purchase requisition process uses purchase requirement interfaces to exchange purchase requisitions for products (such as materials and/or services) between a requester 28802 (such as, an MRP controller, for example in the PTS scenario) and a buyer 28804, and to exchange confirmations that these requisitions have been fulfilled. The buyer 28804 may then interface with a supplier 28806 for actual purchase of the requested products.

The requester 28802 starts the requisition process by sending a PurchaseRequirementRequest message 28808 to the buyer 28804. The PurchaseRequirementRequest message 28808 requests the buyer 28804 to fulfil a requisition generated by the requester 28802. The requisition system uses the PurchaseRequirementRequest message 28808 when requisitions are created or changed. The buyer 28804 uses the PurchaseRequirementConfirmation message 28810 to tell the requester 28802 the status of the requisition. For example, the PurchaseRequirementConfirmation message 28810 may indicate which follow-on documents for each item have been created and how much of the required quantity has been procured. The PurchaseRequirementConfirmation message 28810 may also include information regarding whether a requisition or partial quantity of a requisition can no longer be fulfilled.

The PurchaseRequirementConfirmation message 28810 may need to be communicated in specified circumstances. If the requirements-generating system manages the relevant follow-on documents itself or receives a copy of them and can carry out quantity offsetting in the requisition (as in the PTS scenario), the requirements-generating system requires the PurchaseRequirementConfirmation message 28810 if the requisition or a remaining quantity can no longer be procured. The procurement system sends the PurchaseRequirementConfirmation message 28810 if a purchase requisition item has been changed (once a purchase order with reference to a requisition has been created or changed, for example). The current procurement status may be transferred in full with every PurchaseRequirementRequest message 28808.

(3) Message Data Type Purchase Requirement Message

FIG. 289 shows a data model for the Purchase Requirement Request. The message data type PurchaseRequirementMessage includes a PurchaseRequirementMessage package 28900 that groups together the business information relevant for sending a business document in a message and the PurchaseRequirement object in the business document. It includes a MessageHeader package 28902, a PurchaseRequirement package 28904, and a PurchaseRequirementMessage entity 28906.

The MessageHeader package 28902 groups together the business information relevant for sending a business document in a message. This package is typically not used and, therefore, typically remains empty.

The PurchaseRequirement package 28904 groups together a Party package 28908, a Location package 28910, an Item package 28912, and a PurchaseRequirement entity 28914. There is a 1:1 relationship between the PurchaseRequirementMessage entity 28906 and the PurchaseRequirement entity 28914.

A PurchaseRequirement entity 28914 is a requirement for procuring products (materials or services). The PurchaseRequirement entity 28914 is subdivided into PurchaseRequirementItems entities 28964 that each specify an ordered product or additional information relevant for such a product, such as information about product category or value limits. In addition to the buying party and the seller as well as the proposed seller, additional parties can be involved in the PurchaseRequirement. Locations can be specified for the PurchaseRequirement delivery. PurchaseRequirement entity 28914 is of type GDT: PurchaseRequirement.

The PurchaseRequirement entity 28914 includes an ID, a CreationDateTime, and a Note. The ID is a unique identifier assigned by the requisition system for the requisition. The ID is of type GDT: BusinessTransactionDocumentID. The CreationDateTime is the time at which the requisition was created in the requisition system. The CreationDateTime is of type GDT: DateTime. The Note is a short description/name for the requisition. The Note is of type GDT: Note.

(a) Purchase Requirement Party Package

Party package 28908 groups together the business parties involved in the PurchaseRequirement. It includes a BuyerParty entity 28916, a SellerParty entity 28918, a ProposedSellerParty entity 28920, a RequestorParty entity 28922, a ProductRecipientParty entity 28924, and a ManufacturerParty entity 28926. There is a 1:c relationship 28928 between the PurchaseRequirement entity 28914 and the BuyerParty entity 28916. There is a 1:c relationship 28930 between the PurchaseRequirement entity 28914 and the SellerParty entity 28918. There is a 1:c relationship 28932 between the PurchaseRequirement entity 28914 and the ProposedSellerParty entity 28920. There is a 1:c relationship 28934 between the PurchaseRequirement entity 28914 and the RequestorParty entity 28922. There is a 1:c relationship 28936 between the PurchaseRequirement entity 28914 and the ProductRecipientParty entity 28924. There is a 1:c relationship 28938 between the PurchaseRequirement entity 28914 and the ManufacturerParty entity 28926.

Either the ID or the ID and address can be transferred for each party. If the ID is transferred, the ID address defined in the master data is used. If the ID and address are transferred, the ID identifies the party and the address is deemed to be a document address that is different to the master data address. Where possible, the ID and address should be sent to avoid misunderstandings. The receiving application should implement a suitable optimization strategy to prevent many identical document addresses from being created.

A default logic is used for parties: from the header to the items and within item hierarchies. Parties specified in the header are valid for the items for which a corresponding party is not explicitly transferred and that are directly assigned to the header. In accordance with the same logic, parties transferred at item level are used for subitems assigned to the relevant item in an item hierarchy. The default logic applies for the party as a whole, including the contact person. Parts of a party specified at header level or for a hierarchy item cannot be specified in more detail at item level. The default logic is a simplified version of the transferred message. As regards logic, parties at header level and for hierarchy items behave as if they have been explicitly transferred for the subitems of the message.

(i) Buyer Party

A BuyerParty entity 28916 is a party that buys goods or services. The BuyerParty entity 28916 is of type GDT: BusinessTransactionDocumentParty, although it includes the StandardID and InternalID elements, as well as the Address and ContactPerson entities. The ContactPerson includes the InternalID element and the Address entity.

The BuyerParty is specified if more than one company processes its purchases in the recipient system (hosting scenario). In the other cases, the BuyerParty is unique and does not need to be specified. Changes can be made to the BuyerParty/Contact and a different BuyerParty/Contact can exist for each item. Changes can be made to the address of the BuyerParty, but different addresses are not permitted for each item. If the ShipToLocation, ShipToParty, and RequestorParty have not been explicitly specified in the requisition process, the address of the BuyerParty is used as the ship-to address.

(ii) Seller Party

A SellerParty entity 28918 is a party that sells goods or services. The SellerParty entity 28918 is of type GDT: BusinessTransactionDocumentParty, although it includes the StandardID and InternalID elements, as well as the Address and ContactPerson entities. The ContactPerson includes the InternalID element and the Address entity. If the SellerParty and ShipFromLocation have not been explicitly specified in the requisition process, the address of the SellerParty is used as the ship-from address. If the SellerParty is specified, it is used as the vendor when the requirement is generated in the procurement system (unlike the preferred vendor). The SellerParty is normally specified when the vendor was identified in the requirements system by a source of supply. In this case, the relevant source of supply is also specified in the corresponding BusinessTransactionDocumentReferencePackage entity.

(iii) Proposed Seller Party

A ProposedSellerParty entity 28920 is a preferred party for selling goods or services. The ProposedSellerParty entity 28920 is of type GDT: BusinessTransactionDocumentParty, although it includes the StandardID and InternalID elements, as well as the Address and ContactPerson entities. The ContactPerson includes the InternalID element and the Address entity. When a requisition is created, a user can specify a preferred vendor. In the procurement system, the professional buyer can use the preferred vendor as the actual vendor.

(iv) Requestor Party

A RequestorParty entity 28922 is a party that requests the procurement of goods or services. The RequestorParty entity 28922 is of type GDT: BusinessTransactionDocumentParty, although it includes the StandardID and InternalID elements, as well as the Address and ContactPerson entities. The ContactPerson includes the InternalID element and the Address entity. If a ShipToLocation and ProductRecipientParty are not explicitly specified in the requisition process, the RequestorParty address is used as the ship-to address. In the purchasing process, the RequestorParty (requester) carries out different follow-up actions. For this reason, it is specified explicitly (and not just as the Contact). In a SelfService process, the RequestorParty could enter and approve a goods receipt and invoice, for example.

(v) Product Recipient Party

A ProductRecipientParty entity 28924 is a party to which goods are delivered or for whom services are provided. The ProductRecipientParty entity 28924 is of type GDT: BusinessTransactionDocumentParty, although it includes the StandardID and InternalID elements, as well as the Address and ContactPerson entities. The ContactPerson includes the InternalID element and the Address entity. If a ShipToLocation is not specified explicitly in a requisition process, the address of the ProductRecipientParty is used as the delivery address. If the ProductRecipientParty (goods recipient) is not specified at item or header level, the RequestorParty is also used as the ProductRecipientParty. For a direct material item, the ProductRecipientParty is optional. The ShipToLocation, however, is mandatory. In the third-party process (see BusinessTransactionDocumentItemThirdPartyDealIndicator), the ProductRecipientParty is the customer. The ProductRecipientParty is not synonymous with the ShipToLocation and is to be used when the ProductRecipientParty (company or person) is actually different from the BuyerParty.

(vi) Manufacturer Party

A ManufacturerParty entity 28926 is a party that manufactures goods. The ManufacturerParty entity 28926 is of type GDT: BusinessTransactionDocumentParty, although it includes the StandardID and InternalID elements, as well as the Address and ContactPerson entities. The ContactPerson includes the InternalID element and the Address entity. The ManufacturerParty can be used for Material items with regard to the ManufacturerParty, the default logic (from header to item to subitems) is used for material items; for other items, the ManufacturerParty is ignored. The ManufacturerParty can be used to uniquely define the context of a ManufacturerProductID.

(b) Purchase Requirement Location Package

The Location package 28910 groups together the locations that are relevant for the requisition. The Location package 28910 includes a ShipToLocation entity 28940 and a ShipFromLocation entity 28942. There is a 1:c relationship 28944 between the PurchaseRequirement entity 28914 and the ShipToLocation entity 28940. There is a 1:c relationship 28946 between the PurchaseRequirement entity 28914 and the ShipFromLocation entity 28942.

A similar default logic to that used for Parties is also used for locations. Either the ID or the address, or both can be transferred for each location. If the ID is transferred, the ID address defined in the master data is used (if necessary, a new master record is created for the message recipient). If the address is transferred, it is this address that is used (if necessary, a location is assigned at the address recipient). If the ID and address are transferred, the ID identifies the location and the address is deemed to be a document address that is different to the master data address. Where possible, the ID and address should be sent to avoid misunderstandings. The receiving application should implement a suitable optimization strategy to prevent many identical document addresses from being created.

(i) Ship To Location

A ShipToLocation entity 28940 is the location to which goods are to be delivered or where services are to be provided. The ShipToLocation entity 28940 is of type GDT: BusinessTransactionDocumentLocation, although it includes the StandardID and InternalID elements, as well as the Address entity. In a direct material item, the ShipToLocation ID is specified.

(ii) Ship From Location

A ShipFromLocation entity 28942 is the location from where goods are to be shipped. The ShipFromLocation entity 28942 is of type GDT: BusinessTransactionDocumentLocation, although it includes the StandardID and InternalID elements, as well as the Address entity. The ShipFromLocation can be used for material items the default logic from header to item to subitems is used for the ShipFromLocation for material items; for the other items, the ShipFromLocation is ignored.

(c) Purchase Requirement Package

A PurchaseRequirementItem package 28912 includes a ProductInformation package 28948, a PriceInformation package 28950, a Party package 25952, a Location package 28954, a BusinessTransactionDocumentReference package 28956, an Attachment package 28958, a Description package 28960, a ScheduleLine package 28962, and a PurchaseRequirementItem (or Item) entity 28964. There is a 1:n relationship 28966 between the PurchaseRequirement entity 28914 and the Item entity 28964. PurchaseRequirementItem entities 28964 are arranged hierarchically using a HierarchyRelationship 28968. The HierarchyRelationship 28968 is the relationship between a sub-item and a higher-level parent item in an item hierarchy. There is a 1:cn relationship 28970 between the Item entity 28964 and its subordinate entities. There is a 1:c relationship 28972 between the Item entity 28964 and its superordinate entities.

(i) Purchase Requirement Item

A PurchaseRequirementItem entity 28964 specifies a product requested by the PurchaseRequirement or provides additional information about such a product. The PurchaseRequirementItem entity 28964 includes detailed information about a particular product (see ProductInformation package 28948) and its price (see PriceInformation package 28950). The quantity of the product and (delivery) dates/times are specified in the schedule line (see ScheduleLine package). For the PurchaseRequirementItem entity 28964 (compared to the information of the PurchaseRequirement entity 28914), deviating parties or locations can be defined (see Party package 28952 and Location package 28954). The PurchaseRequirementItem entity 28964 can contain references to other business documents that are relevant for the item (see BusinessTransactionDocumentReference package 28956). Notes or references to attachments can also be specified for the item (see Description package 28960 and Attachment package 28958). A PurchaseRequirementItem entity 28964 can be subordinate to another PurchaseRequirementItem entity 28964 within a hierarchy to represent a business relationship between the two items. This could be information about a substitute product for an ordered product, for example. This relationship can also be used to group together PurchaseRequirement items, that is, a PurchaseRequirementItem can group together other PurchaseRequirementItems. The PurchaseRequirementItem entity 28964 is of type GDT: PurchaseRequirementItem.

The PurchaseRequirementItem entity 28964 includes an ID, a ThirdPartyDealIndicator, and a DirectMaterialIndicator. The ID is the requisition item number; a unique identifier assigned by the requester for the purchase requisition item. The ID is of type GDT: BusinessTransactionDocumentItemID. The ThirdPartyDealIndicator specifies that the purchase requisition item is used as part of a third-party process. The ThirdPartyDealIndicator is of type GDT: BusinessTransactionDocumentItemThirdPartyDealIndicator. The DirectMaterialIndicator specifies whether the material in the purchase requisition item is used as part of a direct material process. The DirectMaterialIndicator is of type GDT: DirectMaterialIndicator.

From a semantic point of view, items can contain other items. Item hierarchies are mapped in this way. From a technical point of view, the item type is not defined recursively, since this cannot be handled by some commonly-used XML tools. The hierarchies are mapped using the entity HierarchyRelationship. There are various item categories, which are governed by a variety of constraints. An item can have several constraint types. In this case, the item satisfies the constraints of its constraint types. Which constraint types can be combined with one another and how, is specified in the description of the constraint types. The following constraint types exist:

(1) Standard items are the items to which no lower-level items have been assigned in the hierarchy. An item that is not referenced by the ParentItemID of another item is a standard item.

(2) Hierarchy items are items to which at least one other lower-level item has been assigned in the hierarchy. An item that is referenced by the ParentItemID of at least one other item is a hierarchy item. Items are either standard or hierarchy items.

(3) Subitems are items that are assigned below a hierarchy item and not directly assigned to the requisition header. Subitems can be both standard items and hierarchy items. Each item that references another item by the ParentItemID is a subitem.

(4) Material items are items whose product is a material. Items whose ProductTypeCode is "1" (Material) are Material items.

(5) DirectMaterial items are material items that are used as part of a direct material process (see DirectMaterialIndicator).

(6) Service items are items whose product is a service. Items whose ProductTypeCode is "2" (service) are service items.

(7) Limit items are items with a cost limit. Limit items are used as placeholders in a requisition if the exact requirements are unknown at the time the requisition is issued. This can be the case for repairs, where the time and spare parts required are not known until the repair has been made.

(8) Grouping hierarchy items are hierarchy items that logically group together other items. Multilevel grouping hierarchies are permitted, that is, a grouping hierarchy item can contain subitems that are also grouping hierarchy items. Hierarchy items whose subitems have HierarchyRelationshipTypeCode "002" (group) are grouping hierarchy items; subitems with a different HierarchyRelationshipTypeCode are not permitted. Grouping hierarchy items are not permitted as subitems of other types of hierarchy items.

(9) BOM hierarchy items are hierarchy items that group together other items in a BOM. Multilevel BOM hierarchies are permitted. Hierarchy items with at least one subitem with HierarchyRelationshipTypeCode "001" (bill of material) are BOM hierarchy items; additional subitems are permitted with the HierarchyRelationshipTypeCode "003" (discount in kind).

(10) Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more subitems in the discount in kind hierarchy item. Hierarchy items with at least one subitem with HierarchyRelationshipTypeCode "003" (discount in kind) are discount in kind hierarchy items; additional subitems are permitted with the HierarchyRelationshipTypeCode "001" (bill of material). Hierarchy items are grouping, BOM, or discount in kind hierarchy items. A hierarchy item can be both BOM and a discount in kind hierarchy item, if a discount in kind has been granted for a BOM.

(ii) Hierarchy Relationship

A HierarchyRelationship is the relationship between a subitem and a higher-level parent item in an item hierarchy. The HierarchyRelationship includes a ParentItemID and a TypeCode. The ParentItemID is a reference to a parent item. The ParentItemID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode.

The ParentItemID is not changed once an item has been created. The TypeCode is not changed once an item has been created.

(iii) Purchase Requirement Item Product Information Package

A ProductInformation package 28948 groups together the information for identifying, describing, and classifying a product in a purchase requisition item. It includes a Product entity 28974 and a ProductCategory entity 28976. There is a 1:c relationship 28978 between the Item entity 28964 and the Product entity 28974. There is a 1:c relationship 28980 between the Item entity 28964 and the ProductCategory entity 28976. The ProductInformation package 28948 is not used in grouping hierarchy items.

(a) Product

A Product entity 28974 includes the details about a product as generally understood from a commercial point of view in business documents. These are the details for identifying a product and product type, and the description of the product. The Product entity 28974 is of type GDT: BusinessTransactionDocumentProduct, although it includes the StandardID, InternalID, TypeCode, and Note elements.

For limit items, the description (note) can be used in the Product entity 28974; the product number and ProductTypeCode are not used. Except in limit items, either a product number or a description along with the ProductTypeCode (material or service) is always specified. The ProductTypeCode is not changed once an item has been created. With the exception of grouping hierarchy items, at least the product number or the product description (Note) is specified when a new item is created. If both the product number and description are specified, the description is merely additional information in the message and can be ignored by the recipient. In substitution product subitems, the ProductTypeCode does not differ from the parent item ProductTypeCode.

(b) Product Category

A ProductCategory entity 28976 includes the details about a product category as generally understood from a commercial point of view in business transaction documents. It includes details for identifying the product category using an internal ID, a standard ID, and IDs assigned by involved parties. The ProductCategory entity 28976 is of type GDT: BusinessTransactionDocumentProductCategory, although it includes the StandardID and InternalID elements. The product category is derived directly from the product if a product number is specified for the product.

(iv) Purchase Requirement Item Price Information Package

A PriceInformation package 28950 groups together price-relevant information. It includes a Price entity 28982 and a ProcurementCostUpperLimit entity 28984. There is a 1:c relationship 28986 between the Item entity 28964 and the Price entity 28982. There is a 1:c relationship 28988 between the Item entity 28964 and the ProcurementCostUpperLimit entity 28984. The Price package for a purchase requisition item includes prices; it does not contain any information about how the prices are calculated (pricing scales, and so on).

(a) Price

A Price entity 28982 is the purchase order price specified by the requester or buyer. The Price entity 28982 includes a NetUnitPrice, which is the net price (without tax or cash discount) specified by the buyer for the base quantity of the service or material. The NetUnitPrice is of type GDT: Price.

In BOM hierarchies, the following rules apply for the Price entity 28982: (1) if the price is specified for the item at the top of the BOM hierarchy and not the subitems, this price applies; (2) if the price is specified for standard items (end nodes in the hierarchy tree) in the BOM hierarchy, these prices apply. The price of the entire BOM is the total of the individual prices; and (3) if a price is specified at different levels in the BOM hierarchy, the price that appears above the others in the tree always applies. Differences between the total of the individual prices and the price at the next highest hierarchy level are permissible. These may be caused by discounts for the entire BOM.

(b) Procurement Cost Upper Limit

A ProcurementCostUpperLimit entity 28984 is the cost upper limit for different types of procurement costs. The ProcurementCostUpperLimit entity 28984 is of type GDT: ProcurementCostUpperLimit. If a limit is specified, this implies that the purchase requisition item is a limit item; in other words, the requisition item indicates a requirement for a certain quantity of a particular product or service within a certain period. Limit items are used as placeholders in a requisition if the exact requirements are unknown at the time the requisition is issued. This can be the case for repairs, where the time and spare parts required are not known until the repair has been made.

(v) Purchase Requirement Item Party Package

The ItemParty package 28952 is similar to the Party package 28908 in the PurchaseRequirement package 28904. The ItemParty package 28952 also includes a BuyerParty entity 28990, a SellerParty entity 28992, a ProposedSellerParty entity 28994, a RequestorParty entity 28996, a ProductRecipientParty entity 28998, and a ManufacturerParty entity 28900A. There is a 1:c relationship 28902A between the Item entity 28964 and the BuyerParty entity 28990. There is a 1:c relationship 28904A between the Item entity 28964 and the SellerParty entity 28992. There is a 1:c relationship 28906A between the Item entity 28964 and the ProposedSellerParty entity 28994. There is a 1:c relationship 28908A between the Item entity 28964 and the RequestorParty entity 28996. There is a 1:c relationship 28910A between the Item entity 28964 nd the ProductRecipientParty entity 28998. There is a 1:c relationship 28912A between the Item entity 28964 and the ManufacturerParty entity 28900A.

(vi) Purchase Requirement Item Location Package

The ItemLocation package 28954 is similar to the Location package 28910 in the PurchaseRequirement package 28904. The ItemLocation package 28954 also includes a ShipToLocation entity 28914A and a ShipFromLocation entity 28916A. There is a 1:c relationship 28918A between the Item entity 28964 and the ShipToLocation entity 28914A. There is a 1:c relationship 28920A between the Item entity 28964 and the ShipFromLocation entity 28916A.

(vii) Purchase Requirement Item Business Transaction Document Reference Package

A BusinessTransactionDocumentReference package 28956 groups together references to business documents that are relevant for the PurchaseRequirementItem and have a business relationship with the item. It includes a PurchaseContractReference entity 28922A and an OriginPurchaseOrderReference entity 28924A. None of the entities in the BusinessTransactionDocumentReference package 28956 can be used in grouping hierarchy items.

If possible, individual items in business documents should be referenced in the requisition message from item level (contract item 10 is directly referenced from purchase requisition item 1, for example). If an item assignment is not recognized, an entire document can be referenced (contract 4711 is referenced in its entirety from purchase requisition item 1, for example). In this case, the recipient cannot demand that the item numbers in both documents be the same (that item 1 in requisition 4712 be the same as item 1 in contract 4711, for example). It is the responsibility of the recipient to try this assignment using other criteria that are not necessarily unique, such as the product number.

(a) Purchase Contract Reference

A PurchaseContractReference entity 28922A is a reference to a purchase contract or item in a purchase contract. The PurchaseContractReference entity 28922A is of type GDT: BusinessTransactionDocumentReference.

Contract references are not permitted in limit items; these are included in the ProcurementCostUpperLimit entity. A PurchaseContractReference entity 28922A can reference one item, that is, one ItemID is permissible.

(b) Origin Purchase Order Reference

The OriginPurchaseOrderReference entity 28924A is a reference to the origin purchase order or to an item within the origin purchase order in a third-party process. The OriginPurchaseOrderReference entity 28924A is of type GDT: BusinessTransactionDocumentReference.

The OriginPurchaseOrderReference entity 28924A can reference one item, that is, one ItemID is permissible. The OriginPurchaseOrderReference entity 28924A is used for third-party purchase orders.

The OriginPurchaseOrderReference entity 28924A is passed on to the purchase orders in a third-party deal, so that the seller can reference the original purchase order of the ShipToParty with the OriginPurchaseOrderReference.

(viii) Purchase Requirement Item Attachment Package

The Attachment package 28958 groups together the relevant attachments with reference to the purchase requisition item. It includes an AttachmentWebAddress entity 28930A. There is a 1:cn relationship 28932A between the Item entity 28964 and the AttachmentWebAddress entity 28930A.

The AttachmentWebAddress entity 28930A is a Web address for a document of any type that is related to the transmitted message or a part of the message, but is not itself transferred as part of the message. The AttachmentWebAddress entity 28930A is of type GDT: AttachmentWebAddress.

(ix) Purchase Requirement Item Description Package

A Description package 28960 groups together the texts relating to the purchase requisition item. It includes a Description entity 28934A and an InternalDescription entity 28936A.

The Description entity 28934A is a natural-language text regarding the purchase requisition item, which is visible to the parties. The Description entity 28934A is of type GDT: Description. The Description entity 28934A can be used for the textual information about the transferred requisition and not just the current message. An example of this would be information that the Purchasing employee responsible is on vacation as of a specific date, and indicating the name and telephone number of a substitute as of this date.

An InternalDescription entity 28936A is a natural-language text regarding the purchase requisition item, which is visible to the parties within the company. The InternalDescription entity 28936A is of type GDT: Description. The InternalDescription entity 28936A can be used for the textual information about the transferred requisition and not just the current message. An example of this is a note indicating that the requisition is required for a particular internal purpose. Unlike the Description, the InternalDescription is not included in a message that would be sent to the vendor.

(x) Purchase Requirement Item Schedule Line Package

A ScheduleLine package 28962 groups the quantity and date information about a PurchaseRequirementItem entity 28964. The ScheduleLine package 28962 includes a ScheduleLine entity 28942A. There is a 1:1 relationship 28944A between the Item entity 28964 and the ScheduleLine entity 28942A.

A ScheduleLine entity 28942A is a line containing the quantity and dates of the performance period requested in a requisition. The ScheduleLine entity 28942A includes a DeliveryPeriod 28946A and a Quantity 28950A. The DeliveryPeriod is the period in which the requester expects a product to be delivered or service provided. The DeliveryPeriod is of type GDT: DateTimePeriod. The Quantity is the required quantity. The Quantity is of type GDT: Quantity. The quantity is specified, unless the item in question is a limit item, in which case it can be left empty. Exactly one ScheduleLine is provided in the PurchaseRequirementItem.

(4) Message Data Type Element Structure

FIG. 290 depicts the element structure for PurchaseRequirementRequest. The element structure identifies the different packages 29000 in the interface, and represents the entities at various levels within the interface. As shown in FIG. 290, the interface for PurchaseRequirementRequest includes five levels 29002, 29004, 29006, 29008, 29010. The element structure identifies the number of occurrences 29012 of each element and provides a Datatype name 29014 for each element.

The outermost package of this interface is PurchaseRequirementMessage package 29016, which includes a PurchaseRequirementMessage entity 29018 at the first level 29002. The PurchaseRequirementMessage entity 29018 is of data type MDT: PurchaseRequirementMessage 29020.

The PurchaseRequirementMessage package 29016 includes a PurchaseRequirement package 29022, which includes a PurchaseRequirement entity 29024. The PurchaseRequirement entity 29024 has one occurrence 29026 and is of data type PurchaseRequirement 29028.

The PurchaseRequirement entity 29024 includes an ID 29030, a CreationDateTime 29036 and a Note 29042. The ID 29030 has one occurrence 29032 and is of data type BusinessTransactionDocumentID 29034. The CreationDateTime 29036 has one occurrence 29038 and is of data type DateTime 29040. The Note 29042 has one or zero occurrences 29044 and is of data type Note 29046.

The PurchaseRequirement entity 29024 also includes a Party package 29048, a Location package 29050, and an Item package 29052. The Party package 29048 includes a BuyerParty entity 29054, a SellerParty entity 29096, a ProposedSellerParty entity 29002A, a RequestorParty entity 29008A, a ShipToParty entity 29014A, and a ManufacturerParty entity 29020A.

The BuyerParty entity 29054 has one or zero occurrences 29056 and is of data type BusinessTransactionDocumentParty 29058. The BuyerParty entity 29054 also includes a StandardID 29060, an InternalID 29066, an Address 29072, and a ContactPerson 29078.

The StandardID 29060 of the BuyerParty entity 29054 has zero or n occurrences 29062 and having a data type of PartyStandardID 29064. The InternalID 29066 has zero or one occurrences 29068 and a data type of PartyStandardID 29070. The Address 29072 has zero or one occurrences 29074 and a data type of Address 29076. The ContactPerson 29078 also includes an InternalID 29084 and an Address 29090. The InternalID 29084 of the ContactPerson 29078 has zero or n occurrences 29086 and a data type of ContactPersonID 29088. The Address 29090 of the ContactPerson 29078 has one or zero occurrences 29092 and a data type of Address 29094.

The SellerParty 29096 of the PurchaseRequirement entity 29024 has one or zero occurrences 29098 and a data type of BusinessTransactionDocumentParty 29000A. The ProposedSellerParty 29002A has one or zero occurrences 29004A and a data type of BusinessTransactionDocumentParty 29006A. The RequestorParty 29008A has one or zero occurrences 29010A and a data type of BusinessTransactionDocumentParty 29012A. The ShipToParty 29014A has one or zero occurrences 29016A and a data type of BusinessTransactionDocumentParty 29018A. The Manufacturer- Party 29020A has one or zero occurrences 29022A and a data type of BusinessTransactionDocumentParty 29024A.

The Location package 29050 includes a ShipToLocation entity 29026A and a ShipFromLocation entity 29050A. The ShipToLocation entity 29026A has zero or one occurrences 29028A with a data type of BusinessTransactionDocumentLocation 29030A. The ShipToLocation entity 29026A also includes a StandardID 29032A, an InternalID 29038A and an Address 29044A. The StandardID 29032A has zero or one occurrences 29034A with a data type of LocationStandardID 29036A. The InternalID 29038A has zero or one occurrences 29040A with a data type of LocationStandardID 29042A. The Address 29044A has zero or one occurrences 29046A with a data type of Address 29048A. The ShipFromLocation entity 29050A has zero or one occurrences 29052A with a data type of BusinessTransactionDocumentLocation 29054A.

The Item package 29052 of the PurchaseRequirement entity 29024 includes a Product package 29096A, a Price package 29098A, a Party package 29000B, a Location package 29002B, a BusinessTransactionDocumentReference package 29004B, an Attachment package 29006B, a Description package 29008B, and a ScheduleLine package 29010B. The Item entity 29056A has a one or n occurrences 29058A with a data type of PurchaseRequirementItem 29060A.

The Item package 29052 also includes an Item entity 29056A, which includes an ID 29062A, a ThirdPartyDealIndicator 29068A, a DirectMaterialIndicator 29074A, and a HierarchyRelationship 29080A. The ID 29062A has one occurrence 29064A with a data type of BusinessTransactionDocumentItemID 29066A. The ThirdPartyDealIndicator 29068A has one or zero occurrences 29070A with a data type of BusinessTransactionDocumentItemThirdPartyDealIndicator 29072A. The DirectMaterialIndicator 29074A has a zero or one occurrence 29076A with a data type of DirectMaterialIndicator 29078A. The HierarchyRelationship 29080A includes a ParentItemID 29084A and a TypeCode 29090A. The HierarchyRelationship 29080A has a zero or one occurrence 29082A. The ParentItemID 29084A has one occurrence 29086A with a data type of BusinessTransactionDocumentItemID 29088A. The TypeCode 29090A has one occurrence 29092A with a data type of BusinessTransactionDocumentItemHierarchyRelationshipTypeCode 29094A.

The Product Package 29096A includes a Product entity 29012B and a ProductCategory entity 29042B. The Product entity 29012B has one or zero occurrences 29014B with a data type of BusinessTransactionDocumentProduct 29016B. The Product entity 29012B also includes a StandardID 29018B, an InternalID 29024B, a TypeCode 29030B, and a Note 29036B. The StandardID 29018B has one or n occurrences 29020B with a data type of ProductStandardID 29022B. The InternalID 29024B has zero or one occurrences 29026B with a data type of ProductInternalID 29028B. The TypeCode 29030B has zero or one occurrences 29032B with a data type of ProductTypeCode 29034B. The Note 29036B has zero or one occurrences 29038B with a data type of Note 29040B.

The ProductCategory entity 29042B has zero or one occurrences 29044B with a data type of BusinessTransactionDocumentProductCategory 29046B. The ProductCategory entity 29042B also has a StandardID 29048B and an InternalID 29054B. The StandardID 29048B has zero or n occurrences 29050B with a data type of ProductCategoryStandardID 29052B. The InternalID 29054B has zero or n occurrences 29056B with a data type of ProductCategoryInternalID 29058B.

The Product package 29096A also includes a Price package 29098A, a Party package 29000B, a Location package 29002B, a BusinessTransactionDocumentReference package 29004B, an Attachment package 29006B, a Description package 29008B and a ScheduleLine package 29010B.

The Price package 29098A has one or zero occurrences 29062B and includes a NetUnitPrice 29064B. The NetUnitPrice 29064B has one or zero occurrences 29066B with a data type of Price 29068B. The Price package 29098A also includes a ProcurementCostUpperLimit entity 29070B having zero or one occurrences 29072B and a data type of ProcurementUpperLimit 29074B.

The Party package 29000B includes a BuyerParty 29076B, a SellerParty 29082B, a ProposedSellerParty 29088B, a RequestorParty 29094B, a ShipToParty 29000C and a Manufacturer 29006C. The BuyerParty 29076B has a one or zero occurrences 29078B with a data type of BusinessTransactionDocumentParty 29080B. The SellerParty 29082B has zero or one occurrences 29084B with a data type of BusinessTransactionDocument Party 29086B. The ProposedSellerParty 29088B has zero or one occurrences 29090B with a data type of BusinessTransactionDocumentParty 29092B. The RequestorParty 29094B has one or zero occurrences 29096B with a data type of BusinessTransactionDocumentParty 29098B. The ShipToParty 29000C has a zero or one occurrences 29002C with a data type of BusinessTransactionDocumentParty 29004C. The Manufacturer 29006C has zero or one occurrences 29008C with a data type of BusinessTransactionDocumentParty 29010C.

The Location package 29002B includes a ShipFromLocation entity 29012C and a ShipToLocation entity 29018C. The ShipFromLocation entity 29012C has one or zero occurrences 29014C with a data type of BusinessTransactionDocumentLocation 29016C. The ShipToLocation 29018C has one or zero occurrences 29020C with a data type of BusinessTransactionDocumentLocation 29022C.

The BusinessTransactionDocumentReference package 29004B includes a PurchaseContractReference entity 29024C and an OriginPurchaseOrderReference entity 29030C. The PurchaseContractReference entity 29024C has zero or one occurrence 29026C with a data type of BusinessTransactionDocumentReference 29028C. The OriginPurchaseOrderReference entity 29030C has one or zero occurrences 29032C with a data type of BusinessTransactionDocumentReference 29034C.

The Attachment package 29006B has an AttachmentWebAddress entity 29036C having one or zero occurrences 29038C with a data type of AttachmentWebAddress 29040C.

The Description package 29008B has a Description entity 29042C and an InternalDescription entity 29048C. The Description entity 29042C has zero or one occurrences 29044C with a data type of Description 29046C. The InternalDescription entity 29048C has zero or one occurrences 29050C with a data type of Description 29052C.

The ScheduleLine package 29010B includes a ScheduleLine entity 29054C having a DeliveryPeriod 29058C and a Quantity 29064C. The ScheduleLine entity 29054C has one occurrence 29056C. The DeliveryPeriod 29058C has one occurrence 29060C with a data type of DateTimePeriod 29062C. The Quantity 29064C has zero or one occurrences 29066C with a data type of Quantity 29068C.

b) Source of Supply Notification Interface

A SourceOfSupplyNotification is a message sent to supply planning (Supply Chain Planning) about the available sources of supply. The motivating business scenario for the source of supply notification is the Procure to Stock (PTS) scenario. Once a purchase contract has been released in Supplier Relationship Management (SRM), a message with sources of supply resulting from the purchase contract data is sent to Supply Chain Planning (SCP) so that it can be taken into account during sourcing.

A SourceOfSupplyNotification is a message sent to SCP about the available sources of supply. The message type SourceOfSupplyNotification is based on the message data type SourceOfSupplyMessage. Information about sources of supply and changes to sources of supply is sent in its entirety (CompleteTransmission).

(1) Message Choreography

Figure 291:
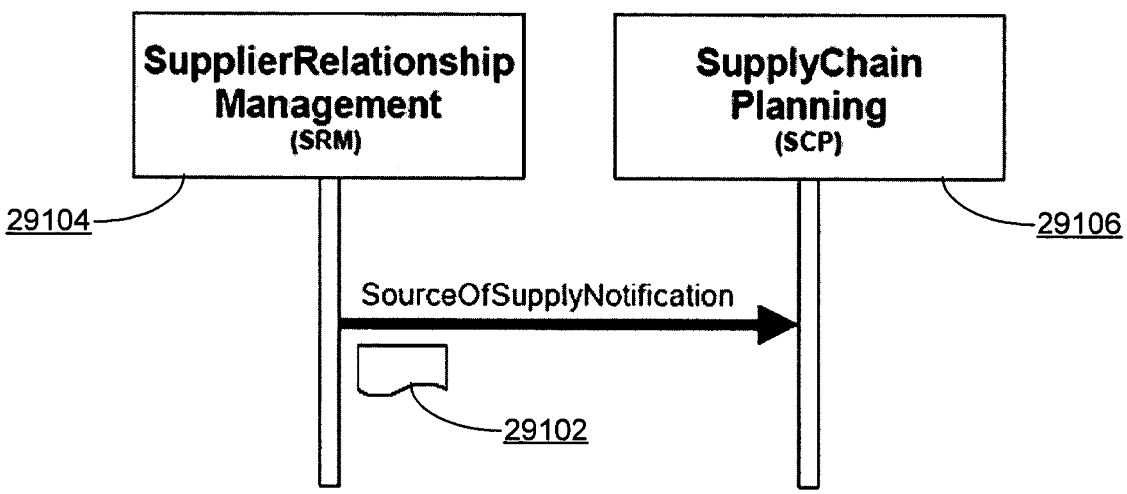
FIG. 291 depicts the message choreography for the Source of Supply interface in accordance with methods and systems consistent with the present invention.

FIG. 291 depicts a graphical representation 29100 of a Source Of Supply Notification 29102 between two business entities in accordance with methods and systems consistent with the present invention. In the implementation shown in FIG. 291, the first business entity is a supply source manager (or Supplier Relationship Management 29104) and the second business entity is a supply planner (or Supply Chain Planning 29106). The Source Of Supply Notification 29102 is a message sent from the Supplier Relationship Management 29104 to Supply Chain Planning 29106 about the available sources of supply. The Source of Supply Notification 29102 may identify a Procure to Stock (PTS) scenario to the Supply Chain Planning 29106. For example, once a purchase contract (not shown in FIG. 291) has been released in or to Supplier Relationship Management 29104, a message 29102 with sources of supply resulting from the purchase contract data is sent to Supply Chain Planning 29106 so that Supply Chain Planning 29106 is able to take into account the sources of supply during the stocking or sourcing process. In this implementation, the Source Of Supply Notification 29102 is sent once a purchase contract has been released.

Figure 292A:
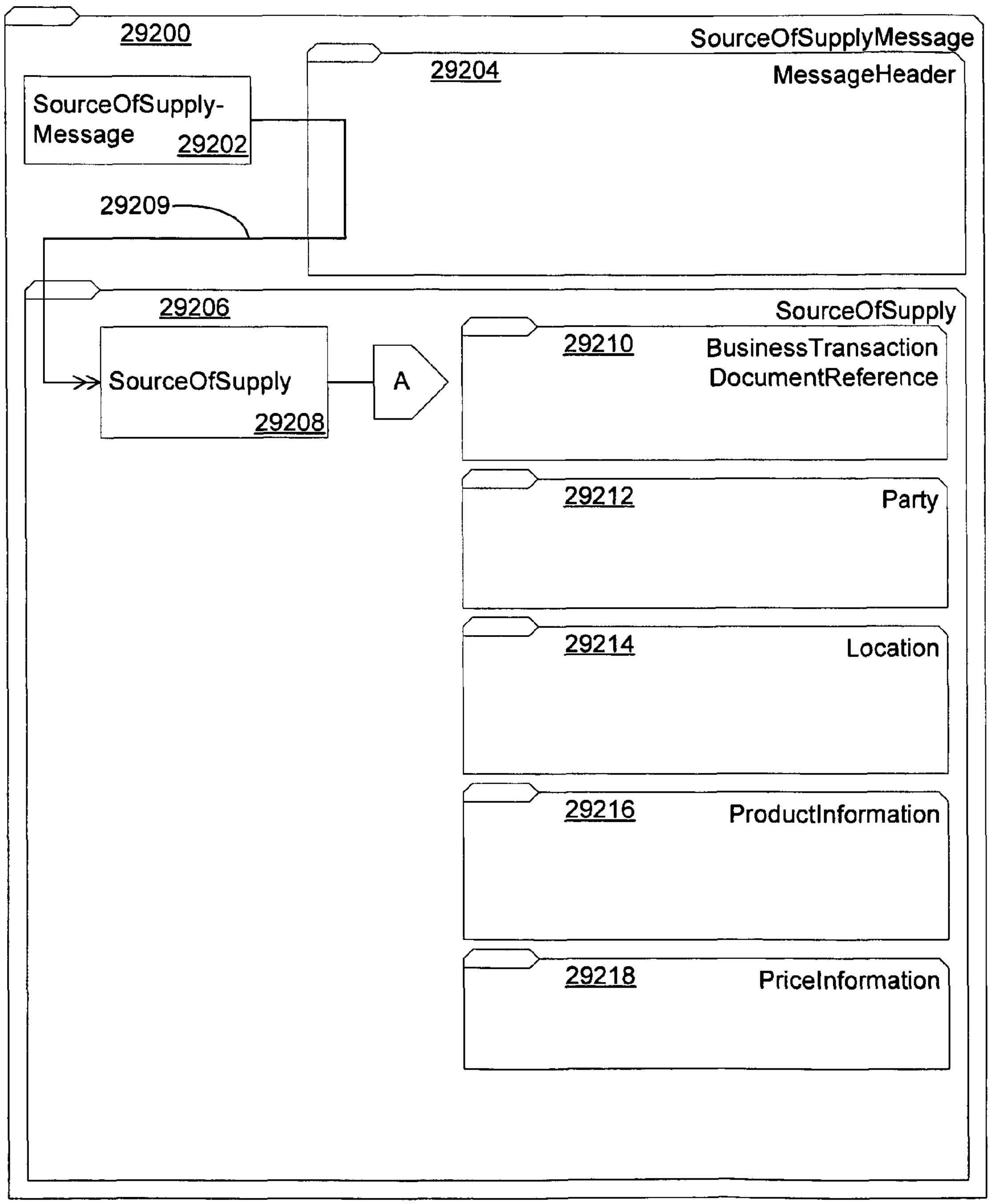
FIGS. 292A-C depict the data model for the Source of Supply interface in accordance with methods and systems consistent with the present invention.
Figure 292B:
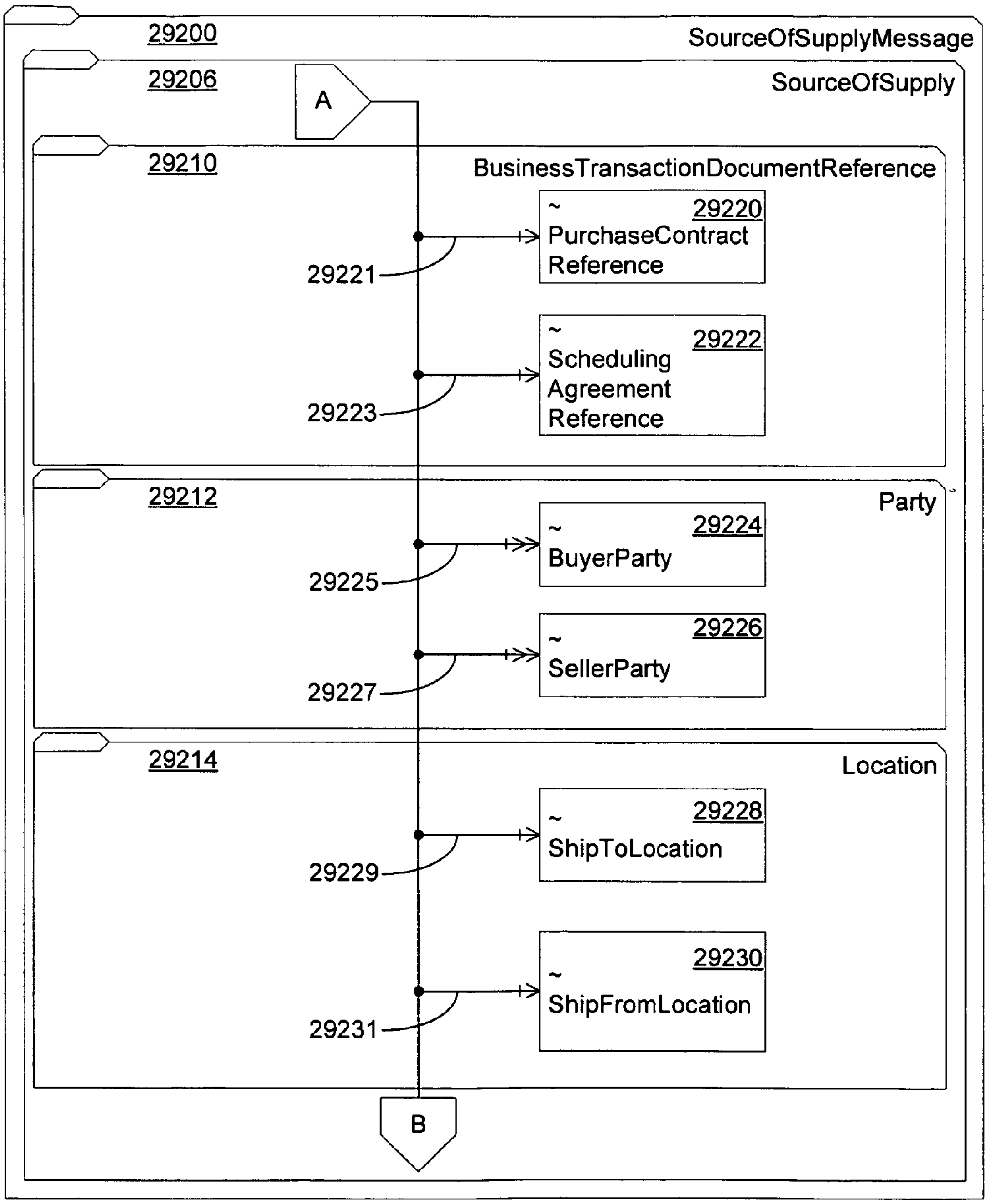
Figure 292C:
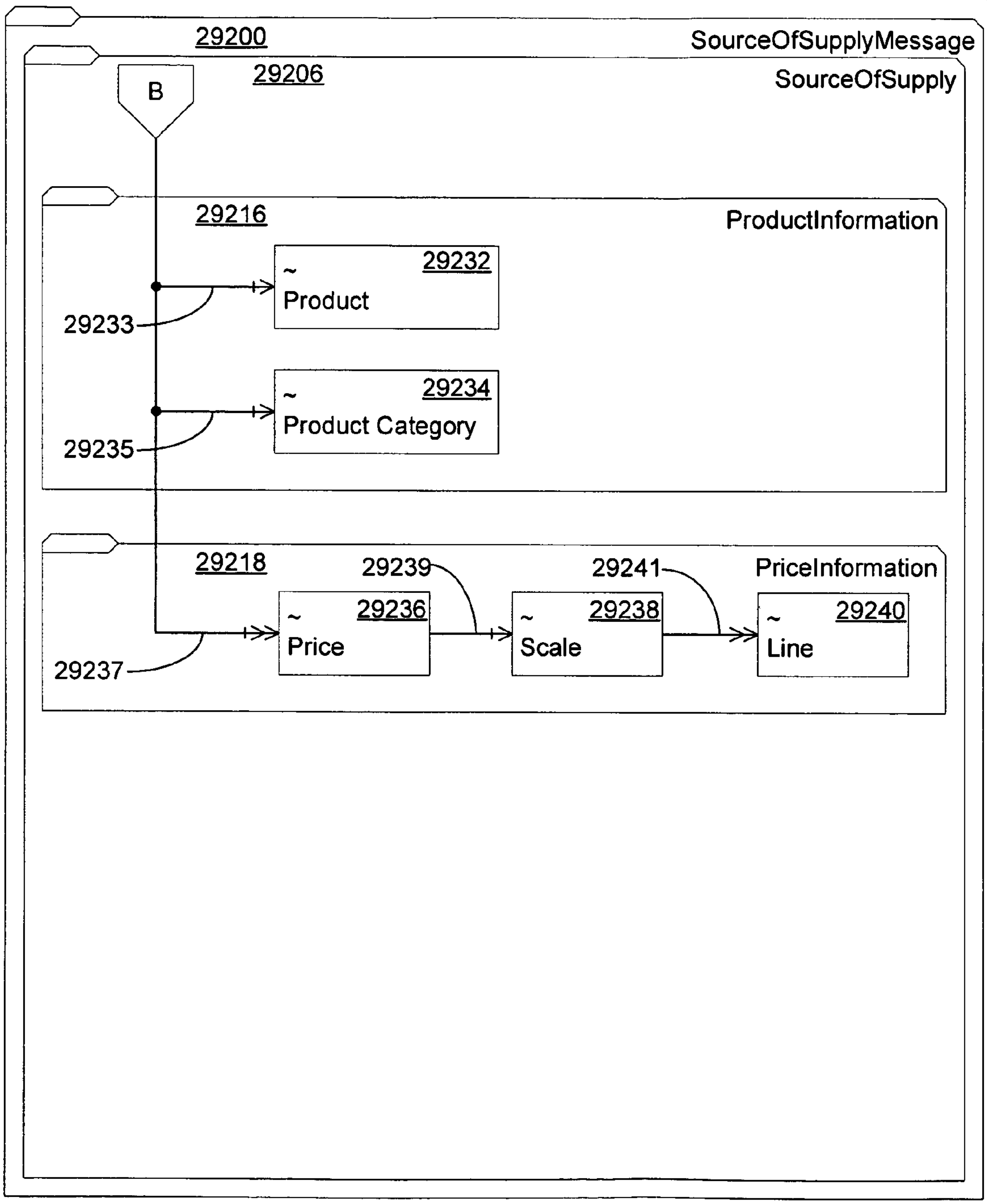

The Source Of Supply Notification 29102 is a message type based on the message data type SourceOfSupplyMessage 29200 shown in FIG. 292. A message based on the message data type SourceOfSupplyMessage 29200 is implemented by two message operations: a SourceOfSupplyNotification_Out operation and a SourceOfSupplyNotification_In operation. The SourceOfSupplyNotification_Out operation is in Supplier Relationship Management 29104, and the SourceOfSupplyNotification_In operation is in Supply Chain Planning 29106.

(2) Message Data Type Source of Supply Message

The message data type SourceOfSupplyMessage 29200 includes the SourceOfSupply Message entity 29202 in the business document or the business information that is relevant for sending a business document in a message. As shown in FIG. 292, the message data type SourceOfSupplyMessage 29200 includes a MessageHeader package 29204 and a SourceOfSupply package 29206. The message data type SourceOfSupplyMessage 29200 provides the structure for the message type SourceOfSupplyNotification 29102.

(a) Message Header Package

A MessageHeader package 29204 groups the business information that is relevant for sending a business document in a message. In one implementation, the MessageHeader package 29204 may not be relevant for implementing the SourceOfSupplyNotification 29102.

(b) Source of Supply Package

The SourceOfSupply package 29206 groups information about one or more sources of supply, and includes a SourceOfSupply entity 29208, a BusinessTransactionDocumentReference package 29210, a Party package 29212, a Location package 29214, a ProductInformation package 29216, and a PriceInformation package 29218. There is a 1:n relationship 29209 between the SourceOfSupplyMessage object 29202 and the SourceOfSupply entity 29208.

The SourceOfSupply entity 29208 identifies the procurement option for a particular product or product category. In particular, the SourceOfSupply entity 29208 includes information about prices and ship-to/ship-from locations. The SourceOfSupply 29208 is of type GDT: SourceOfSupply.

As discussed in further detail below, the SourceOfSupply entity 29208 includes an ActiveIndicator, a DeletedIndicator, a SourcingPriorityCode, a ValidityPeriod, a TargetQuantity, a TargetAmount, a GoodsReceiptProcessingDuration, and a PlannedDeliveryDuration. The ActiveIndicator indicates whether a source of supply may be used for supply planning, and is of type GDT: ActiveIndicator. The DeletedIndicator indicates whether or not a source of supply is logically deleted, and is of type GDT: DeletedIndicator. The SourcingPriorityCode indicates the priority of a source of supply during sourcing. The sourcing priority may be defined in the purchase contract so that, for example, reference sources of supply may be determined. The SourcingPriorityCode is of type GDT: BusinessTransactionPriorityCode. The ValidityPeriod indicates the period in which a source of supply is valid, and is of type GDT: DateTimePeriod. The TargetQuantity identifies the notified total quantity of a product. The Buyer and Seller agreed upon this quantity as part of a purchase contract for a source of supply. The TargetQuantity is of type GDT: Quantity. The TargetAmount identifies the notified total value of a product. The Buyer and Seller agreed upon this amount as part of a purchase contract for a source of supply. The TargetAmount is of type GDT: Amount. The GoodsReceiptProcessingDuration indicates the time that elapses from when a product is received to when it is made available for the purpose of procurement. The goods receipt processing duration is required for checking the product and placing it in storage, for example. It is taken into account during scheduling. The GoodsReceiptProcessingDuration is of type GDT: Duration. The PlannedDeliveryDuration indicates the planned time required for delivering the product from an external source of supply. The planned delivery duration may be specified in the purchase contract so that the earliest availability date may be checked and the release date for a purchase requisition calculated. The PlannedDeliveryDuration is of type GDT: Duration.

A source of supply 29208 determines which quantities of which products may be procured from which locations, at what price, and when. The source of supply 29208 may be external (e.g., a vendor) or internal (e.g., a firm's own plant). The source of supply is used for supply planning. The sources of supply listed in a SourceOfSupplyNotification 29102 are derived from one base business document. The sources of supply 29208 normally correspond to the purchase contract items for individual products or product categories.

The following example will be used to clarify the information included in the SourceOfSupply 29208. DaimlerChrysler and Bosch conclude a purchase contract for the delivery of servo pumps. They agree to a total purchase quantity of 500,000 items totalling EUR 50 million. Bosch may offer a price of EUR 90 for purchase orders for more than 500 items. The agreement is valid for DaimlerChrysler ship-to locations in Stuttgart and Boblingen. DaimlerChrysler and Bosch agree to the special price of EUR 90 for Stuttgart. With the conclusion of the purchase contract, DaimlerChrysler has a procurement option for servo pumps.

(i) Business Transaction Document Reference

The BusinessTransactionDocumentReference package 29210 groups the references to business documents on which a source of supply may be based. The Business Transaction- DocumentReference package 29210 includes a PurchaseContractReference entity 29220 and a SchedulingAgreementReference entity 29222.

(c) Purchase Contract Reference

The PurchaseContractReference entity 29220 is a reference to an outline agreement governing the supply of materials or services by the supplier as required within a certain period. The PurchaseContractReference entity 29220 is of type GDT: BusinessTransactionDocumentReference. There is a 1:c relationship 29221 between the SourceOfSupply entity 29208 and the PurchaseContractReference entity 29220. In the example above, the number of the purchase contract concluded between DaimlerChrysler and Bosch is specified by the PurchaseContractReference entity 29220.

(a) Scheduling Agreement Reference

The SchedulingAgreementReference entity 29222 is a reference to an outline agreement governing the procurement of materials on predefined dates within a certain period. The SchedulingAgreementReference entity 29222 is of type GDT: BusinessTransactionDocumentReference. There is also a 1:c relationship 29223 between the SourceOfSupply entity 29208 and the SchedulingAgreementReference entity 29222.

(ii) Party

The Party package 29212 groups the business partners who may be involved with a base business document of a source of supply. The Party package 29212 includes a BuyerParty entity 29224 and a SellerParty entity 29226. If the flow of goods does not take place between the locations defined for the BuyerParty entity 29224 and the SellerParty entity 29226, the source of supply 29208 may be specified with ShipToLocation 29228 and ShipFromLocation 29230 entities in the location package 29214. If a source of supply 29208 refers to a purchase contract, the contract partners are listed in the respective BuyerParty entity 29224 and SellerParty entity 29226. Continuing with the previous example, DaimlerChrysler as the buyer is listed in the BuyerParty entity 29224 and Bosch as the seller is listed in the SellerParty entity 29226.

(a) Buyer Party

The BuyerParty entity 29224 identifies the company or person that purchases goods or services. The BuyerParty entity 29224 is of type GDT: BusinessTransactionDocumentParty, where the "InternalID" is used. A BuyerParty 29224 does not have to be listed for an internal source of supply 29208. There is a 1:c relationship 29225 between the SourceOfSupply entity 29208 and the BuyerParty entity 29224.

(b) Seller Party

The SellerParty entity 29226 identifies the company or person that sells goods or services. The SellerParty entity 29226 is of type GDT: BusinessTransactionDocumentParty, where the "InternalID" is used. A SellerParty 29226 does not have to be listed for an internal source of supply 29208. There is a 1:c relationship 29227 between the SourceOfSupply entity 29208 and the SellerParty entity 29226.

(iii) Location

The Location package 29214 includes information about the locations between which goods may flow. The Location package 29214 includes a ShipToLocation entity 29228 and a ShipFromLocation entity 29230. If more than one ship-to or ship-from location is specified, the source of supply 29208 is valid for all combinations of these locations. In other words, the ship-from locations listed are valid sources of supply for the ship-to locations. In the example above, for DaimlerChrysler, Stuttgart and Boblingen are listed as ship-to locations 29228 for a source of supply 29208. In this example, if servo pumps are required for the production location in Hungary, the specified source of supply 29208 cannot be used.

The ShipToLocation entity 29228 identifies the location to which goods are to be delivered or where services are to be provided. The ShipToLocation entity 29228 is of type GDT: BusinessTransactionDocumentLocation, where the "InternalID" is used. The ship-to location 29228 is specified if the ship-to address differs from the BuyerParty address and is required for accurately specifying the source of supply 29208. There is a 1:cn relationship 29229 between the SourceOfSupply entity 29208 and the ShipToLocation entity 29228.

The ShipFromLocation entity 29230 identifies the location from which goods may be shipped. The ShipFromLocation entity 29230 is of type GDT: BusinessTransactionDocumentLocation, where the "InternalID" is used. The ship-from location 29230 is specified if the ship-from address differs from the SellerParty address and is required for accurately specifying the source of supply. There is also a 1:cn relationship 29231 between the SourceOfSupply entity 29208 and the ShipFromLocation entity 29230.

(iv) Product Information

The ProductInformation package 29216 groups the information required for identifying, describing, and classifying a product that may be procured from a source of supply 29208. The ProductInformation package 29216 includes a Product entity 29232 and a ProductCategory entity 29234. In one implementation, either a product 29232 or product category 29234 is specified in a source of supply 29208.

The Product entity 29232 identifies, describes, and classifies the product or service. The Product entity 29232 is of type GDT: BusinessTransactionDocumentProduct, where the "InternalID" is used. There is a 1:c relationship 29233 between the SourceOfSupply entity 29208 and the Product entity 29232.

The ProductCategory entity 29134 identifies the product category for the product or service. The ProductCategory entity 29134 is of type GDT: BusinessTransactionDocumentProduct Category, where the "InternalID" is used. There is a 1:c relationship 29235 between the SourceOfSupply entity 29208 and the ProductCategory entity 29234.

(v) Price Information

The PriceInformation package 29218 groups the information required for calculating the payment due for a product that may be procured from a source of supply 29208. The PriceInformation package 29218 includes a Price entity 29236, a Scale entity 29238, and a Line entity 29240. The PriceInformation package 29218 may be used to transfer an effective price function for a source of supply 29208. During sourcing, this information may be used in Supply Chain Planning 29106 to determine the cheapest source of supply if a decision has to be made between more than one SourceOfSupply 29208.

(a) Price

The Price entity 29236 identifies the remuneration for a product, which is valid for a certain period and ship-to location, and may be scaled according to quantity. The price entity 29136 includes a ShipToLocation (e.g., in the ShipToLocation entity 29228), a ValidityPeriod, a FixedCostsAmount, and a NetUnitPrice. The ShipToLocation identifies the ship-to location for which the pricing scale is valid, and is of type GDT: BusinessTransactionDocumentLocation. The ValidityPeriod identifies the validity period for the pricing scale, and is of type GDT: DateTimePeriod. The FixedCostsAmount identifies the fixed costs for a procurement transaction, and is of type GDT: Amount. The NetUnitPrice identifies the net price for a base quantity of a product, and is of type GDT:

Price. As shown in FIG. 292, there is a 1:cn relationship 29237 between the SourceOfSupply entity 29208 and the Price entity 29236.

The Price entity 29236 may reference or include a PriceScale or Scale entity 29238 and a PriceScaleLine or Line entity 29240. The NetUnitPrice is specified as an element of the Price entity 29236 if a pricing scale has not been specified. If a ship-to location-specific price is specified, the ship-to location is also listed in the Location package 29214 and specified with the same identifiers (such as "InternalID"). As shown in FIG. 292, there is a 1:c relationship 29239 between the Price entity 29236 and the Scale entity 29238.

(b) Price Scale

The PriceScale entity 29238 includes a set of price scale lines arranged linearly in accordance with a scale (axis) base type. The Scale 29238 includes a AxisIntervalBoundaryTypeCode, which is a coded representation for typing the discrete values on a scale as interval boundaries. The PriceScale entity 29238 delivers the interpretation of scale axis values (scale levels) in a price scale. The AxisIntervalBoundaryTypeCode is of type GDT: ScaleAxisIntervalBoundaryTypeCode. The PriceScale 29238 may also reference or include a Line entity 29240.

(c) Price Scale Line

The PriceScaleLine entity (or Line entity 29240) identifies the price of a product depending on the quantity. The Line entity 29240 includes a Quantity and a NetUnitPrice. The Quantity is the quantity of the product in the base unit of measure (scale quantity), and is of type GDT: Quantity. The NetUnitPrice is the net price for the quantity of the product, in the base unit of measure, which is defined in Quantity, and is of type GDT: Price. A PriceScaleLine 29240 consists of a price scale axis value or price scale level ("Quantity") and a price scale rate ("NetUnitPrice"). As shown in FIG. 292, there is a 1:n relationship 29241 between the Scale entity 29238 and the Line entity 29240.

(3) Message Data Type Element Structure

FIGS. 293A-D depict the element structure for the Source Of Supply Notification 29102. The element structure is similar to the above described data model of the Source Of Supply Notification as reflected in FIG. 292, but provides additional information regarding the details for interfacing with or implementing a Source Of Supply Notification. As shown in FIGS. 293A-D, the element structure identifies the different packages 29300 that may be in a respective Source Of Supply Notification 29102. The element structure for the Source Of Supply Notification includes six levels 29302, 29304, 29306, 29308, 29310, and 29312 associated with a respective package 29300. The element structure for a Source Of Supply Notification also identifies the cardinality 29314 and data type 29316 for the elements at respective levels 29302, 29304, 29306, 29308, 29310, and 29312 in a package 29300.

The outermost package of this interface is a SourceOfSupplyMessage package 29318, which includes a SourceOfSupplyMessage entity 29320 at the first level 29302. The SourceOfSupplyMessage entity is of message data type SourceOfSupplyMessage 29322.

The SourceOfSupplyMessage package 29318 includes a SourceOfSupply package 29324 that has a SourceOfSupply entity 29326. There is one or more 29328 SourceOfSupply entities 29326, each being of global data type ("GDT"): SourceOfSupply. As shown in FIGS. 293A-B, each SourceOfSupply entity 29326 includes an ActiveIndicator 29332, a DeletedIndicator 29338, a SourcingPriorityCode 29344, a ValidityPeriod 29350, a TargetQuantity 29356, a TargetAmount 29362, a GoodsReceiptProcessingDuration 29368, and a PlannedDeliveryDuration 29374. The ActiveIndicator 29332 is of type GDT: ActiveIndicator. The DeletedIndicator 29338 is of type GDT: DeletedIndicator 29342. The SourcingPriorityCode 29344 is of type GDT: BusinessTransactionPriorityCode 29348. The ValidityPeriod 29350 is of type GDT: DateTimePeriod 29354. The TargetQuantity 29356 is of type GDT: Quantity 29360. The TargetAmount 29364 is of type GDT: Amount 29366. The GoodsReceiptProcessing Duration 29368 is of type GDT: Duration 29372. The PlannedDeliveryDuration 29374 is also of type GDT: Duration 29378. For each SourceOfSupply entity 29326, there is as follows: one 29334 ActiveIndicator 29332; one 29340 DeletedIndicator 29338; zero or one 29346 SourcingPriorityCode 29344; one 29352 ValidityPeriod 29350; zero or one 29358 TargetQuantity 29356; zero or one 29364 TargetAmount 29364; zero or one 29370 GoodsReceiptProcessing Duration 29368; and zero or one 29376 PlannedDeliveryDuration 29374.

The SourceOfSupply package 29324 also includes a BusinessTransactionDocument Reference package 29380, a Party package 29382, a Location package 29386, a Product Information package 29388, and a Price Information package 29388.

The BusinessTransactionDocumentReference package 29380 includes a PurchaseContractReference entity 29390 of type GDT: BusinessTransactionDocumentReference 29394 and a SchedulingAgreementReference entity 29396 of type GDT: BusinessTransactionDocumentReference 29300A. There is zero or one 29392 PurchaseContractReference entity 29390 for each SourceOfSupply entity 29324. Similarly, there is zero or one 29398 SchedulingAgreementReference entity 29396 for each SourceOfSupply entity 29324.

The Party package 29382 includes a BuyerParty entity 29302A of type GDT: BusinessTransactionDocumentParty 29306A and a SellerParty entity 29308A of type GDT: BusinessTransactionDocumentParty 29312A. There is zero or one 29304A BuyerParty entity 29390 for each SourceOfSupply entity 29324. Similarly, there is zero or one 29310A SellerParty entity 29396 for each SourceOfSupply entity 29324.

The Location package 29384 includes a ShipToLocation entity 29314A of type GDT: BusinessTransactionDocumentLocation 29318A and a ShipFromLocation entity 29320A of type GDT: BusinessTransactionDocumentLocation 29324A. There is any number 29316A of ShipToLocation entities 29314A for each SourceOfSupply entity 29324. Similarly, there is any number 29322A of ShipFromLocation entities 29320A for each SourceOfSupply entity 29324.

The Product Information package 29386 includes a Product entity 29326A of type GDT: BusinessTransactionDocumentProduct 29330A and a ProductCategory entity 29332A of type GDT: ProductCategory 29336A. There is zero or one 29328A Product entities 29329114A and zero or one 29334A Product Categories 29332A for each SourceOfSupply entity 29324.

As shown in FIG. 293C, the Price Information package 29388 includes a Price entity 29338. There is any number 29340A of Price entities 38A for each SourceOfSupply entity 29324. Each Price entity 29236 includes: a ShipToLocation entity 29342A of a type GDT: BusinessTransactionDocumentLocation 29346A; a ValidityPeriod 29348A of a type GDT:DateTimePeriod 29352A; a FixedCostsAmount entity 29354A of a type GDT: Amount 29358A; and a NetUnitPrice 29360A of a type GDT: Price 29364A. For each SourceOfSupply entity 29324, there is zero or one 29344A ShipToLocation 29342A, one 29350A ValidityPeriod 29348A, zero or one 29356A FixedCostsAmount 29354A, and zero or one 29360A NetUnitPrice 29360A.

Each Price entity 29338 also includes zero or one 29368A PriceScales or Scale entities 29368A. Each Scale 29366A includes one 29172A AxisIntervalBoundary Type Code 29370A of a type GDT: ScaleAxisIntervalBoundaryTypeCode 29374A. Each Price entity 29338 may also include one or more 29378A of Price Scale Line entities 29376A. Each Line entity 29376A includes a Quantity 29380A of a type GDT:Quantity 29384A and a NetUnitPrice 29386A of a type GDT: Price 29390A.

c) Purchase Order Interfaces

PurchaseOrder interfaces are the interfaces that are required in a B2B process to exchange purchase orders and order confirmations between a buyer and a seller. Traditional methods of communication during an ordering process, such as via mail or fax, are cost intensive, prone to error, and relatively slow, since the data has to be entered manually. Electronic communication between the procurement system and a sales system eliminates such problems. Purchase order interfaces directly integrate the applications that implement the interfaces and form a basis for mapping data to widely-used standard formats, such as RosettaNet. More than just a simple interface structure, the purchase order interfaces define the underlying corporate significance and, at the same time, dispense with the need to exchange proprietary information during straightforward ordering processes. In this way, applications that implement purchase order interfaces can be integrated without the need for complex project work.

(1) Message Types

There are a total of four message types for mapping a B2B ordering process: (1) PurchaseOrderRequest; (2) PurchaseOrderChangeRequest; (3) PurchaseOrderCancellationRequest; and (4) PurchaseOrderConfirmation. The PurchaseOrderRequest is sent from a buyer to a seller, and is used to initiate a new ordering process. The PurchaseOrderChangeRequest is sent from a buyer to a seller, and is used to change a purchase order during an ordering process. Changing a purchase order includes creating new items, changing existing items, and cancelling items. The PurchaseOrderCancellationRequest is sent from a buyer to a seller, and is used to cancel a purchase order. The PurchaseOrderConfirmation is sent from a buyer to a seller, and is used to confirm a purchase order. It can be sent in direct response to a PurchaseOrderRequest, a PurchaseOrderChangeRequest, or a PurchaseOrderCancellationRequest message, or without an immediately preceding message to display changes to the purchase order or its confirmation status. The seller can change a purchase order by creating new items or by changing or rejecting existing items.

(a) Purchase Order Request

A PurchaseOrderRequest is a buyer's request to the seller to deliver goods or provide services. The structure of the message type PurchaseOrderRequest is specified in the message data type PurchaseOrderMessage. Only parts of the maximum PurchaseOrderMessage structure are used. The PurchaseOrderRequest is the message that a buyer uses to start a new ordering process with a seller.

(b) Purchase Order Change Request

A PurchaseOrderChangeRequest is a change made to the buyer's request to the seller to deliver goods or provide services. The structure of the message type PurchaseOrderChangeRequest is specified in the message data type PurchaseOrderMessage. Only parts of the maximum PurchaseOrderMessage structure are used. The PurchaseOrderChangeRequest is the message that a buyer uses to inform the seller of change requests during an ordering process. In a PurchaseOrderChangeRequest, the buyer can change header data, add new items, and change or cancel existing items.

(c) Purchase Order Cancellation Request

A PurchaseOrderCancellationRequest is a cancellation of the buyer's request to the seller to deliver goods or provide services. The structure of the message type PurchaseOrderCancellationRequest is specified in the message data type PurchaseOrderCancellationMessage. The PurchaseOrderCancellationRequest is the message that a buyer uses to inform the seller of a purchase order cancellation request during an ordering process.

(d) Purchase Order Confirmation

A PurchaseOrderConfirmation is a confirmation, partial confirmation, or a change sent from the seller to the buyer concerning the requested delivery of goods or provision of services. The structure of the message type PurchaseOrderConfirmation is specified in the message data type PurchaseOrderMessage. Only parts of the maximum PurchaseOrderMessage structure are used. The PurchaseOrderConfirmation is the message that a seller uses to confirm a purchase order with the buyer, or to inform the buyer of any purchase order change requests during an ordering process.

The seller can use the PurchaseOrderConfirmation message in three ways. First, the seller can explicitly confirm planned delivery dates/times, quantities, and prices with the buyer and propose substitute products. Second, the seller can inform the buyer of any purchase order change requests. Third, the seller can inform the buyer of the confirmation status of the purchase order. Possible statuses include "AP" (Accepted), "AJ" (Pending), and "RE" (Rejected). The confirmation status can be set at the header or item level. Rejection at the header level also signifies rejection of all items. Acceptance at the header level signifies general acceptance of the purchase order, while individual items can be accepted, open, or rejected. The same logic applies from items to subitems in item hierarchies. There are no restrictions for changes to the confirmation status, e.g., a change from "AP" (Accepted) to "RE" (Rejected) is permitted. The confirmation status indicates whether a seller will fulfil a purchase order. Accordingly, the seller has to confirm cancellation of a purchase order with the status "RE" (Rejected). If the confirmation status "AP" (Accepted) is set for a purchase order but no additional information is provided about confirmed delivery dates/times, quantities, etc., the purchase order is regarded as "confirmed as ordered."

Each PurchaseOrderConfirmation reflects the status of an item. Thus, if the status of a given PurchaseOrderConfirmation item is "AP" (Accepted), the relevant purchase order ("PURCHASE ORDER") item is confirmed "as ordered." If a change was requested for this item in a different PurchaseOrderConfirmation message, that change request is invalid.

(2) Message Choreography

Figure 294:
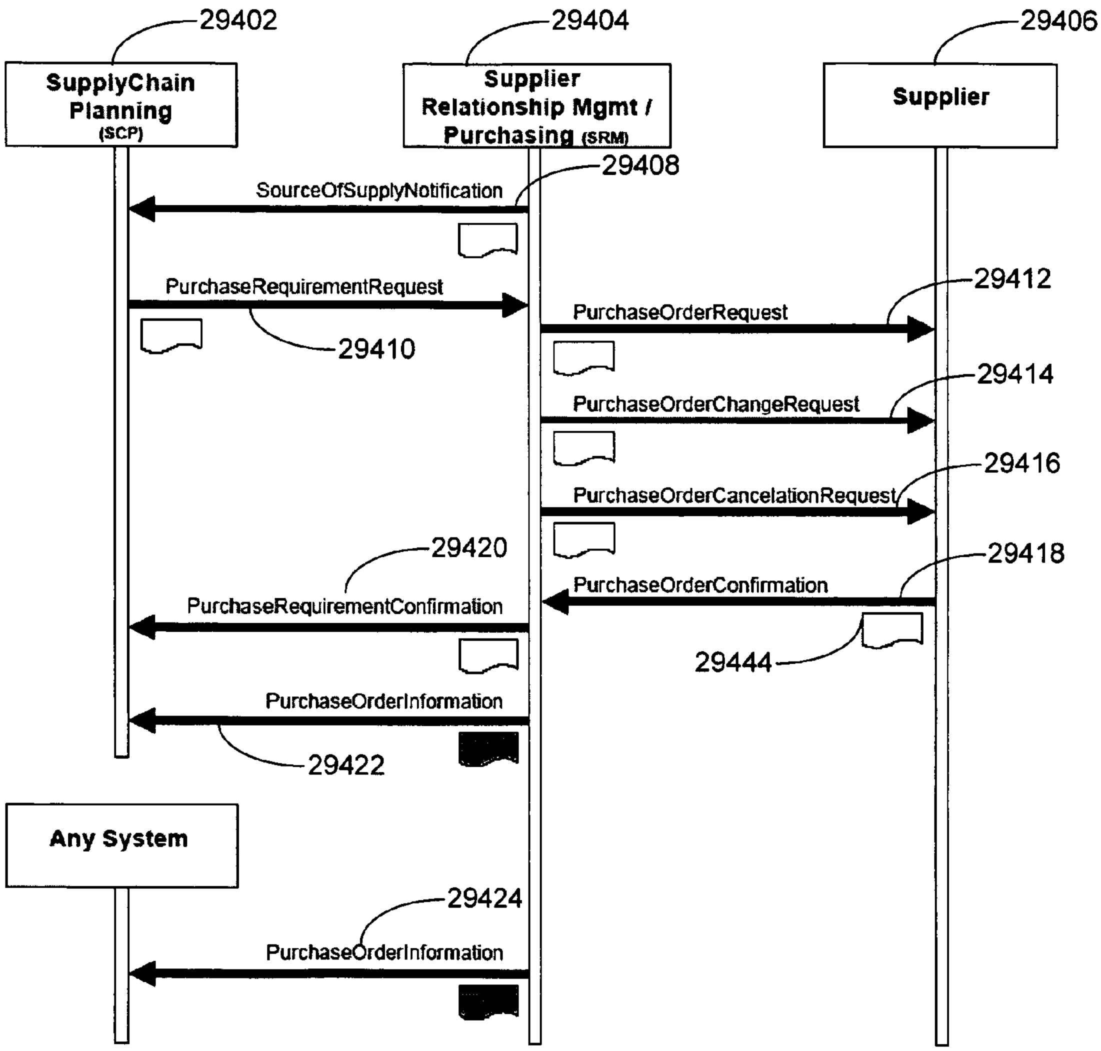
FIG. 294 depicts the message choreography for the Purchase Order interfaces in accordance with methods and systems consistent with the present invention.

The interaction between the purchase order interfaces in an ordering process is described in detail below. FIG. 294 depicts the message choreography for the purchase order interface. The choreography involves three business entities: Supply Chain Planning 29402, Supplier Relationship Mgmt Purchasing 29404, and Supplier 29406. The Supplier Relationship Mgmt Purchasing 29404 sends a SourceOfSupplyNotification 29408 to SupplyChain Planning 29402. SupplyChain Planning 29402 sends a PurchaseRequirementRequest 29410 to Supplier Relationship Mgmt Purchasing 29404. Supplier Relationship Mgmt Purchasing 29404 sends a PurchaseOrderRequest 29412, a PurchaseOrderChangeRequest 29414, and/or a PurchaseOrderCancellationRequest 29416 to Supplier 29406. Supplier 29406 sends a PurchaseOrderConfirmation 29418 to Supplier Relationship Mgmt Purchasing 29404. Supplier Relationship Mgmt Purchasing 29404 sends a PurchaseRequirementConfirmation 29420 and a PurchaseOrder Information 29422 to SupplyChain Planning 29402. Supplier Relationship Mgmt Purchasing 29404 sends a PurchaseOrder Information 29424 to Any System 29426.

(a) Process Flow

The buyer starts an ordering process by sending a PurchaseOrderRequest message. Once the ordering process has been started, the buyer can use a PurchaseOrderChangeRequest message to send a change request or a PurchaseOrderCancellationRequest message to send a purchase order cancellation request to the seller at any time. After receiving the PurchaseOrderRequest message, the seller can use a PurchaseOrderConfirmation message to inform the buyer of the status of the purchase order or to send change requests at any time. Once an ordering process has been started, there are no restrictions with regard to the order in which particular messages have to be sent. The buyer does not have to wait for confirmation from the seller before being allowed to send purchase order change requests, using a PurchaseOrderChangeRequest message.

In each PurchaseOrderRequest or PurchaseOrderChangeRequest message, the buyer can explicitly request a PurchaseOrderConfirmation message from the vendor by setting the FollowUpPurchaseOrderConfirmation/RequirementCode to "Expected." In this case, the seller should send a PurchaseOrderConfirmation in response to the receipt of a PurchaseOrderRequest, PurchaseOrderChangeRequest, or PurchaseOrderCancellationRequest message. To ensure that the response is sent as promptly as possible, no user interaction is required on the seller side. If a buyer's request cannot be automatically accepted or rejected, the confirmation status "AJ" (Pending) can be set. A PurchaseOrderConfirmation in response to a PurchaseOrderChangeRequest reconfirms all the items that were transferred with the PurchaseOrderChangeRequest. The seller should also send a PurchaseOrderConfirmation if the confirmation status of the entire purchase order or of a particular item is changed or if quantities, prices, or deadlines can be explicitly confirmed, or if changes are made to confirmations that have already been sent.

A PurchaseOrderConfirmation is sent by the seller if the seller rejects individual items or the entire purchase order, or if the seller requests changes to the purchase order.

The buyer uses a PurchaseOrderChangeRequest message to confirm the seller's change requests (by accepting the seller's requests as changes) or to reject them (by not accepting the seller's requests). To avoid endless loops, the buyer should not be permitted to use a PurchaseOrderChangeRequest message to automatically respond to mere changes to the confirmation status or to the explicit confirmation of delivery dates/times, quantities, and prices.

(b) Error Handling

A recipient system accepts every formally correct incoming purchase order message. The buyer resolves business problems using a PurchaseOrderChangeRequest or PurchaseOrderCancellationRequest message, and the seller resolves business problems using a PurchaseOrderConfirmation message. It is up to the recipient system to distinguish between technical and business errors. Borderline cases include incorrect ISO codes for currencies, or languages.

A procurement system cannot reject a PurchaseOrderConfirmation automatically. Instead, the procurement system uses a PurchaseOrderChangeRequest or provide other suitable mechanisms to avoid endless loops, i.e., to avoid having the procurement system continuously reject every confirmation of each rejection.

In order to restart an ordering process that is corrupt as a result of a failed message, the procurement system may provide an option for transferring the current status of the purchase order, together with all of the associated data, at any time using a PurchaseOrderChangeRequest message. In this message, the ItemCompleteTransmissionIndicator may be set to "true." The sales and distribution ("SD") system may provide the same functions for the PurchaseOrderConfirmation. In order to restart a process following a failed PurchaseOrderRequest message, the procurement system should be able to restart an ordering process at any time using a PurchaseOrderRequest message.

(c) Message Operations

The purchase order messages are implemented by eight message operations, four on the buyer side and four on the seller side. The buyer side operations are PurchaseOrderRequest_Out, PurchaseOrderChangeRequest_Out, PurchaseOrderCancellationRequest_Out, and PurchaseOrderConfirmation_In, and the seller side operations are PurchaseOrderRequest_In, PurchaseOrderChangeRequest_In, PurchaseOrderCancellationRequest_In, and PurchaseOrderConfirmation_Out.

(3) Message Data Type Purchase Order Message

The message data type PurchaseOrderMessage groups together the business information that is relevant for sending a business document in a message and the PurchaseOrder object in the business document. This message data type groups together the MessageHeader package and the PurchaseOrder package, described in detail below.

To ensure that all the elements and entities in the message data type PurchaseOrderMessage are used correctly with regard to their changeability in an ordering process, if no additional information is provided about the relevant element or the entity under "Use/Notes," both the buyer and the seller are allowed to change the element or entity as required. The receiving system is able to respond appropriately to such changes at the business level.

If it is specified under "Use/Notes" that the element or entity can be changed by either the buyer or the seller only, the other party should not be permitted to make any changes. Deletion of an element or entity is classed as a change, as is the initial transfer of an element or entity when a purchase order or new item within a purchase order is created. Exceptions to this are explicitly specified under "Use/Notes."

If it is specified under "Use/Notes" that the element or entity is not changed, changes should not be permitted once the element or entity has been created. The element or entity can be assigned a new value only when a purchase order or a new item within a purchase order is created; this value is no longer changed in all other messages.

A "change" is always an actual change and not a different way of representing the same situation. For example, a proprietary or standard ID can be used to reference the same product; both options are simply different ways of representing the same situation and therefore can be used alternatively without being considered a change. Different IDs for the same object and different sequences for elements that occur more than once are always considered as representing the same situation.

The message data type PurchaseOrderMessage is the structural basis for the message types PurchaseOrderRequest, PurchaseOrderChangeRequest, and PurchaseOrderConfirmation. If certain elements or entities in the message data type PurchaseOrderMessage are not used in all the message types based on the message data type PurchaseOrderMessage, this is specified explicitly under "Notes."

Figure 295A:
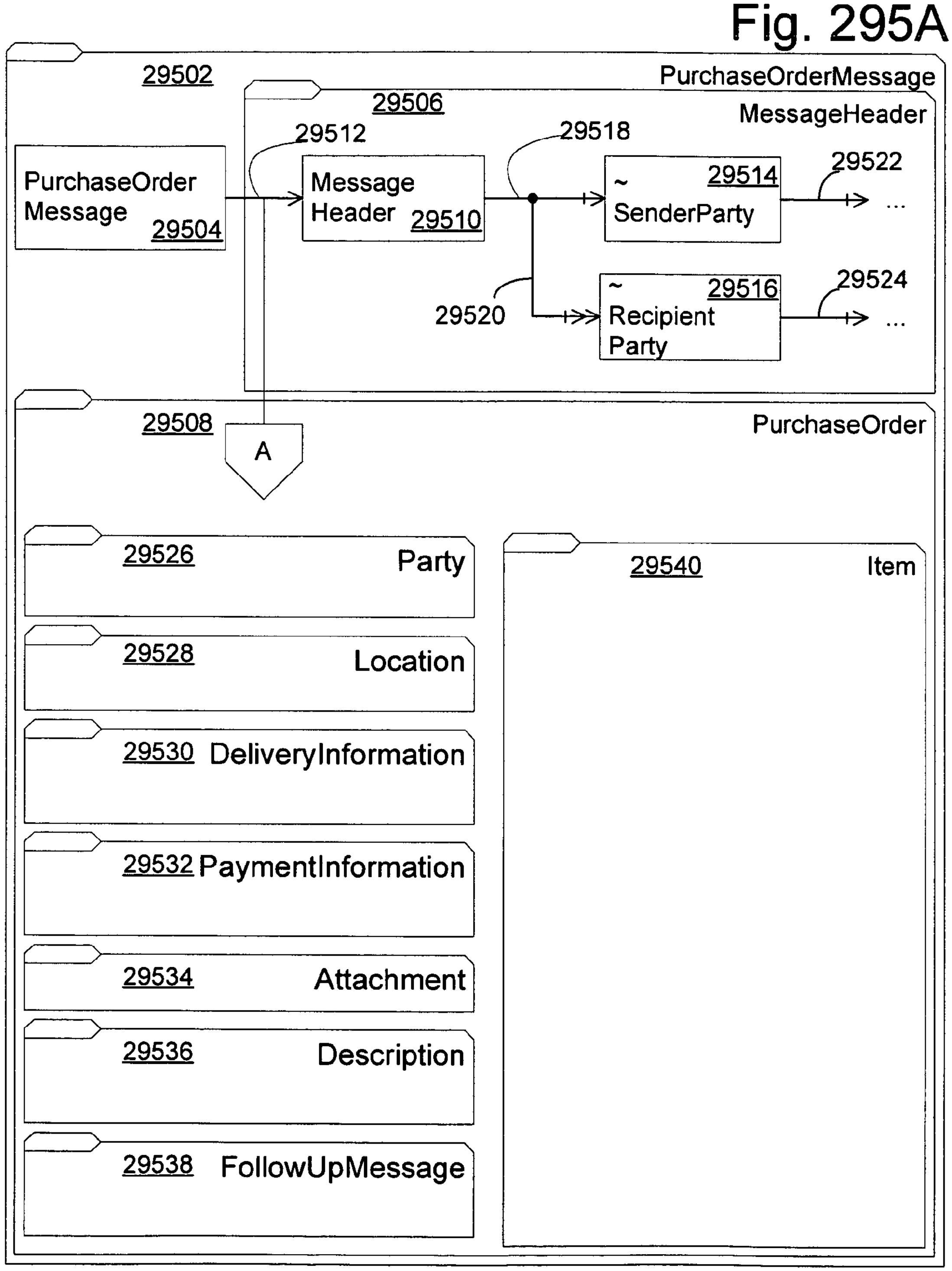
FIGS. 295A-P depict the data model for the Purchase Order interfaces in accordance with methods and systems consistent with the present invention.
Figure 295B:
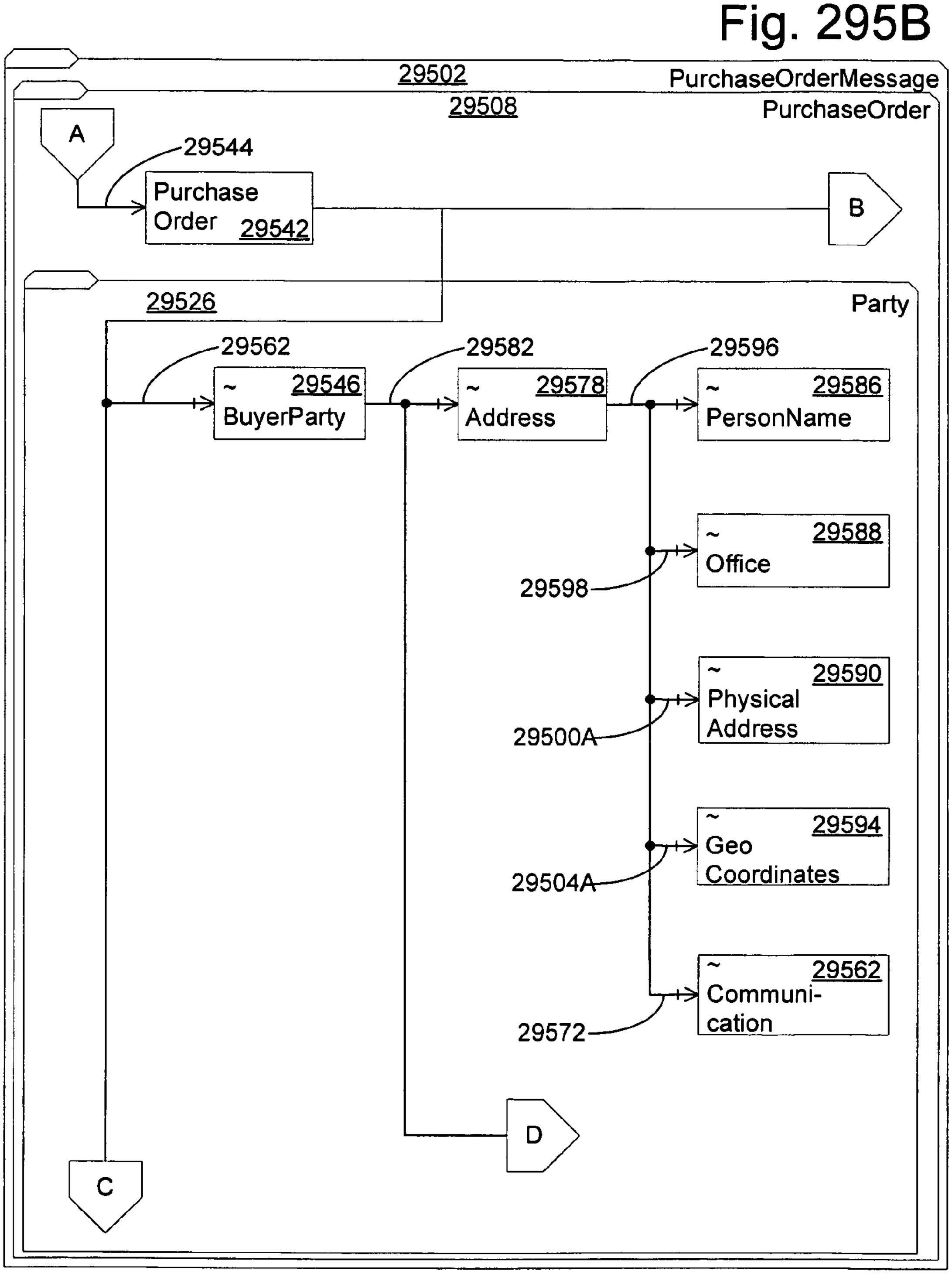
Figure 295C:
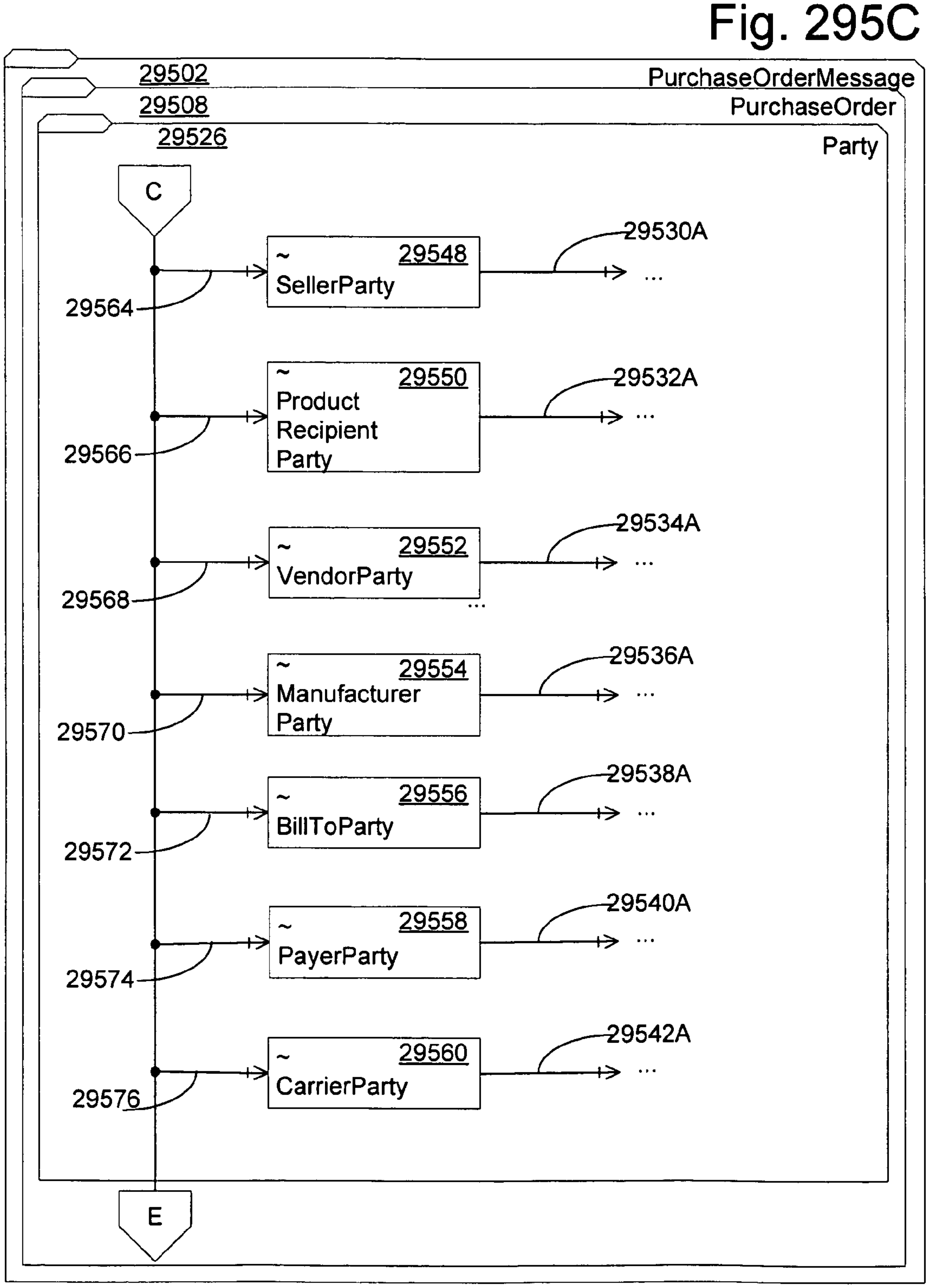
Figure 295D:
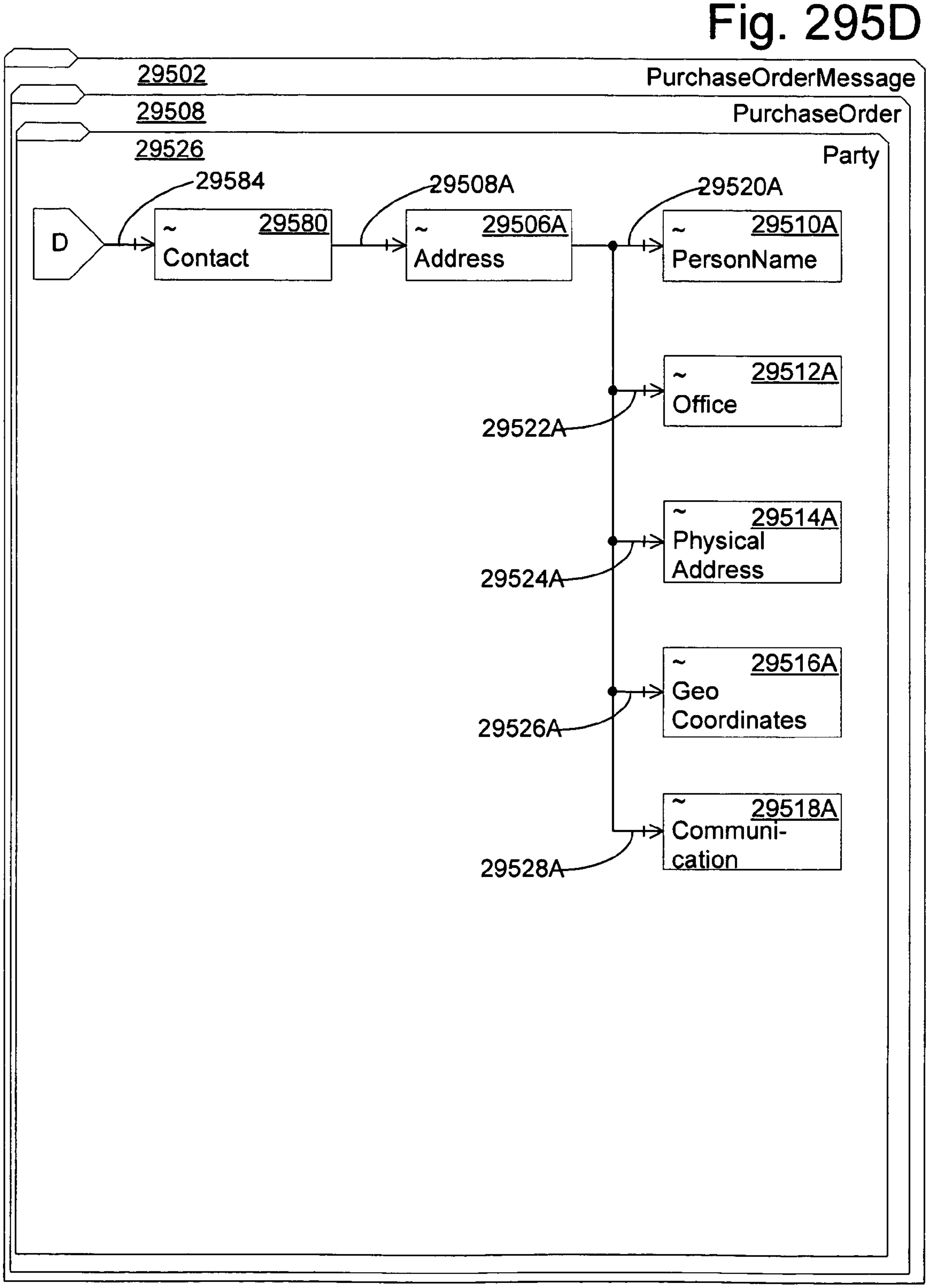
Figure 295E:
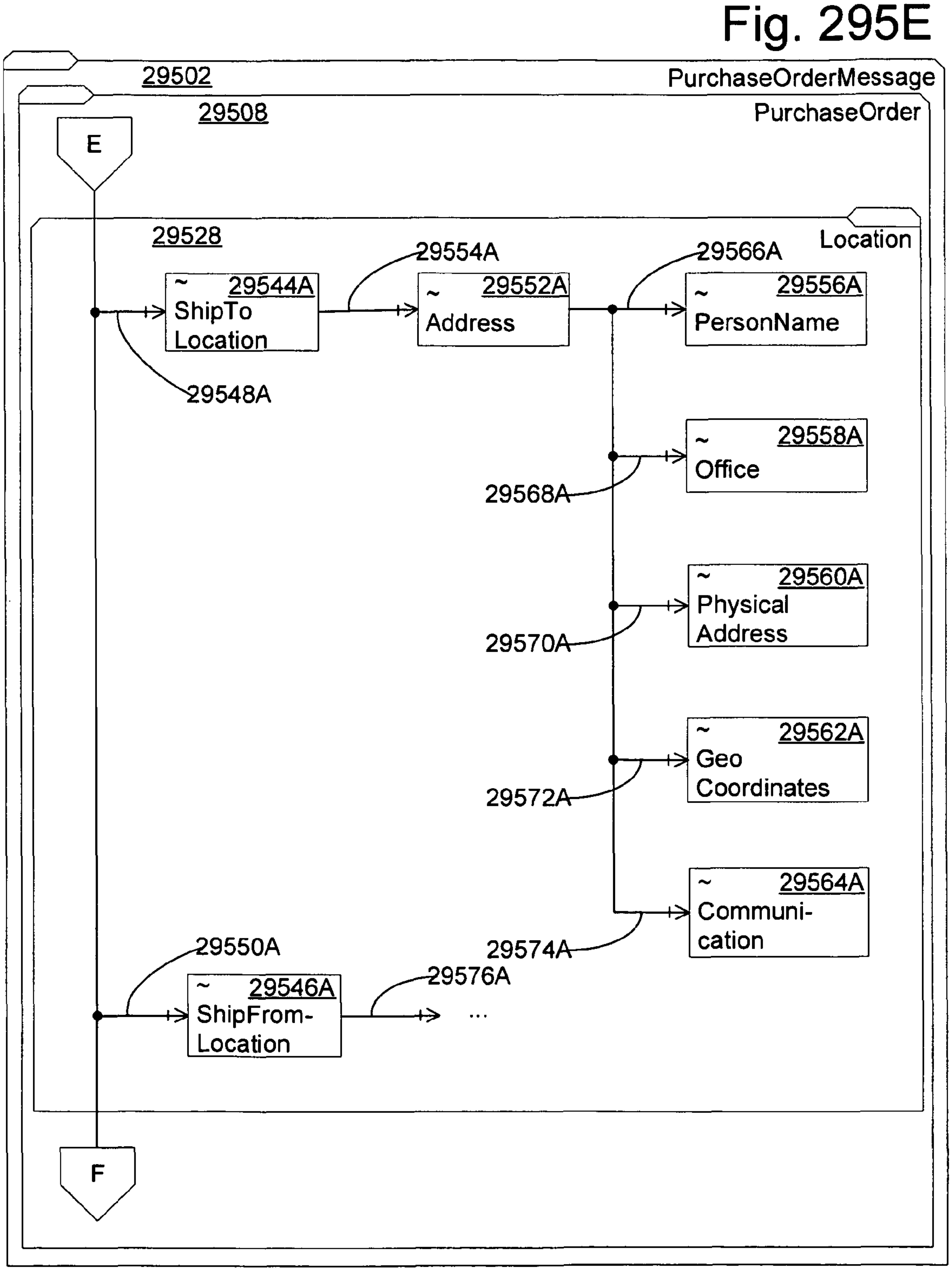
Figure 295F:
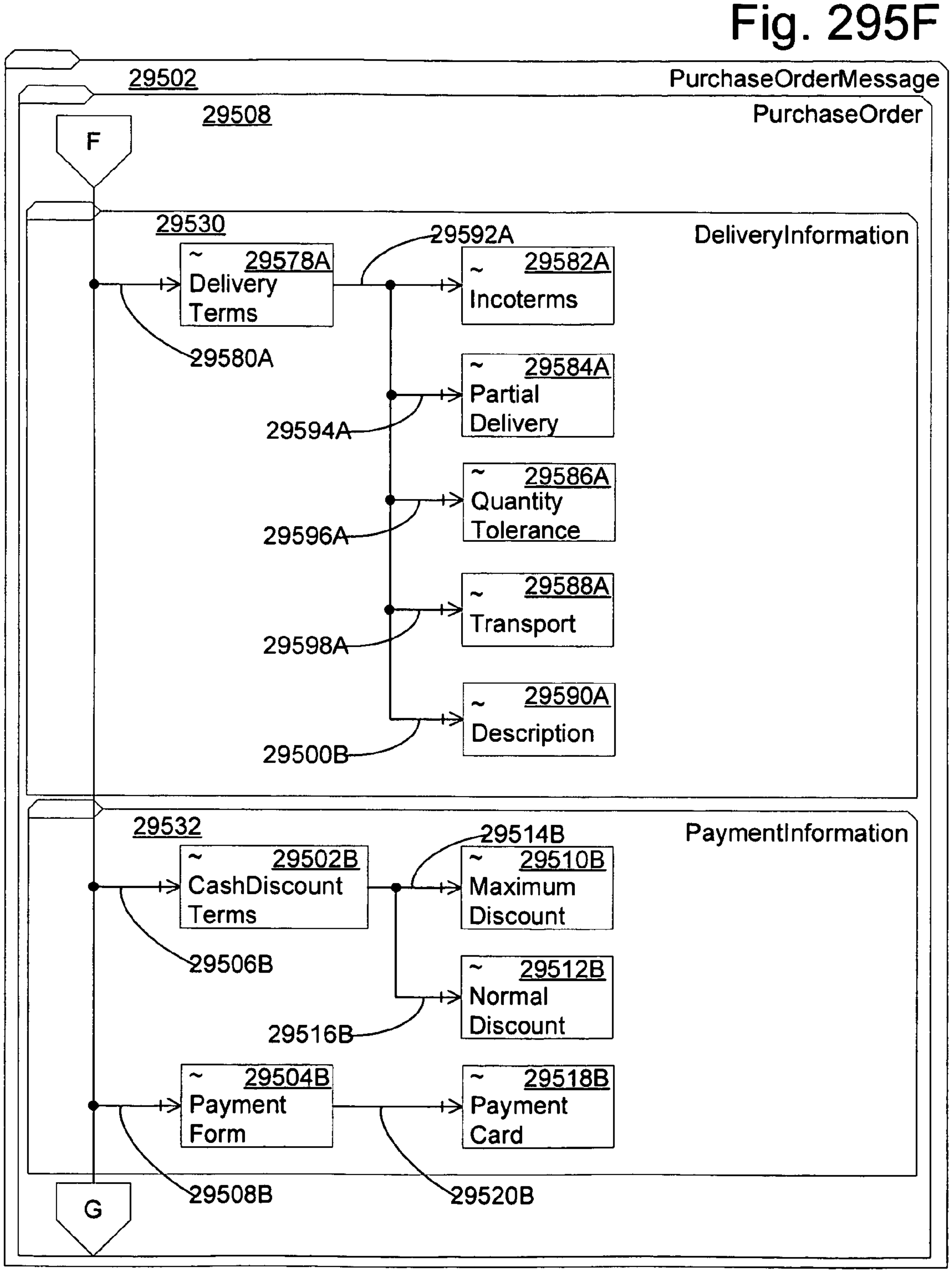
Figure 295G:
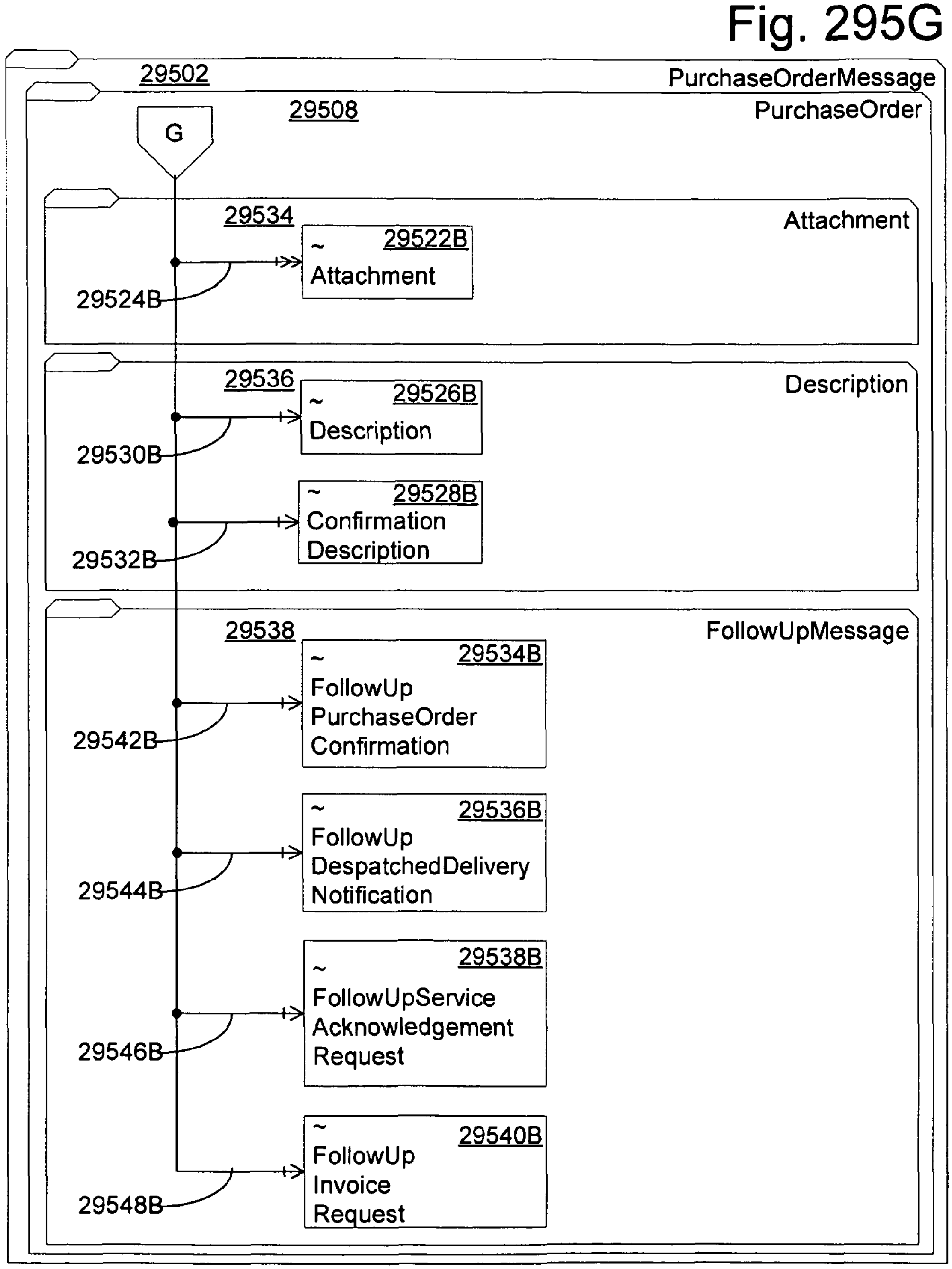
Figure 295H:
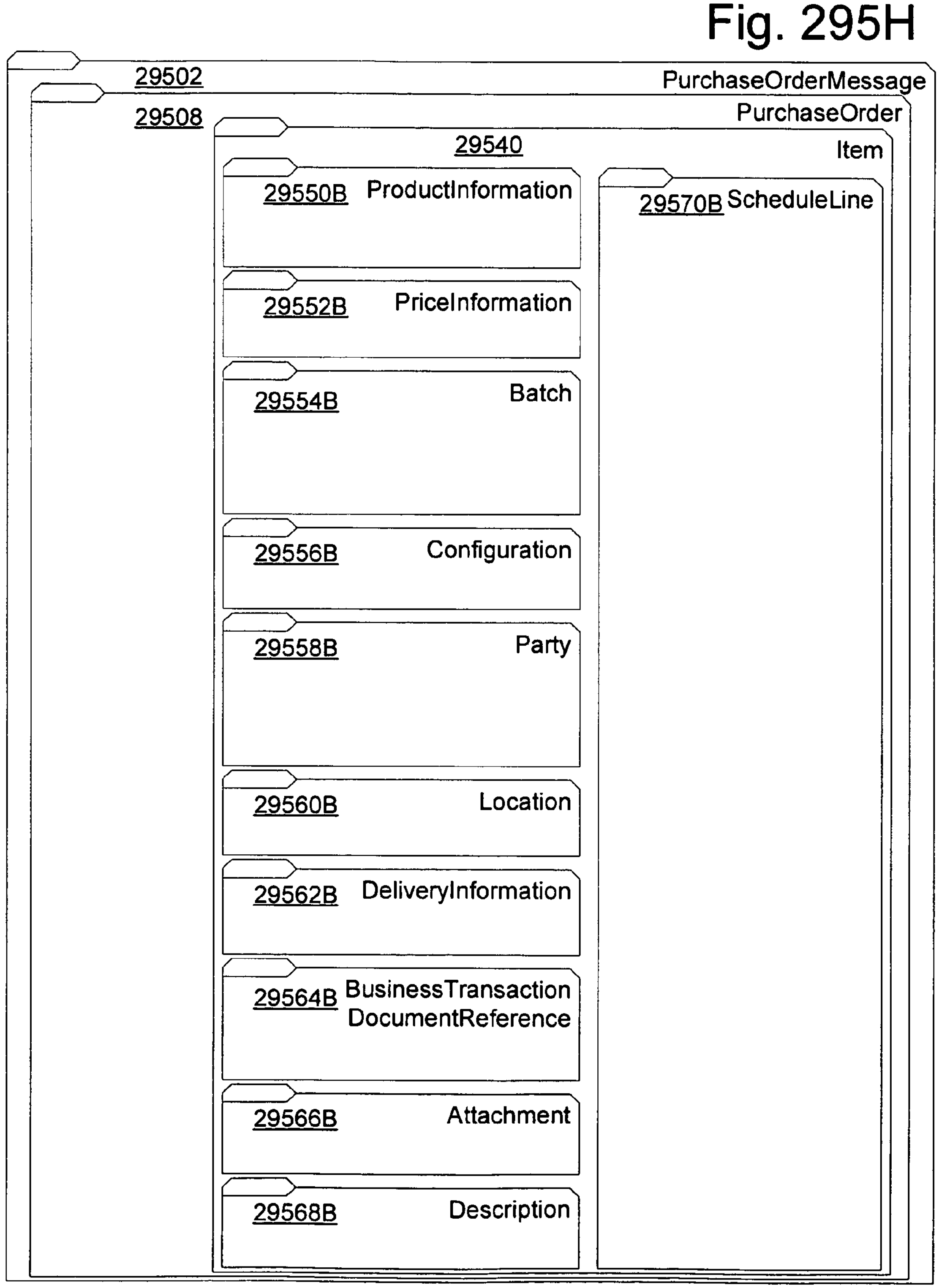
Figure 295I:
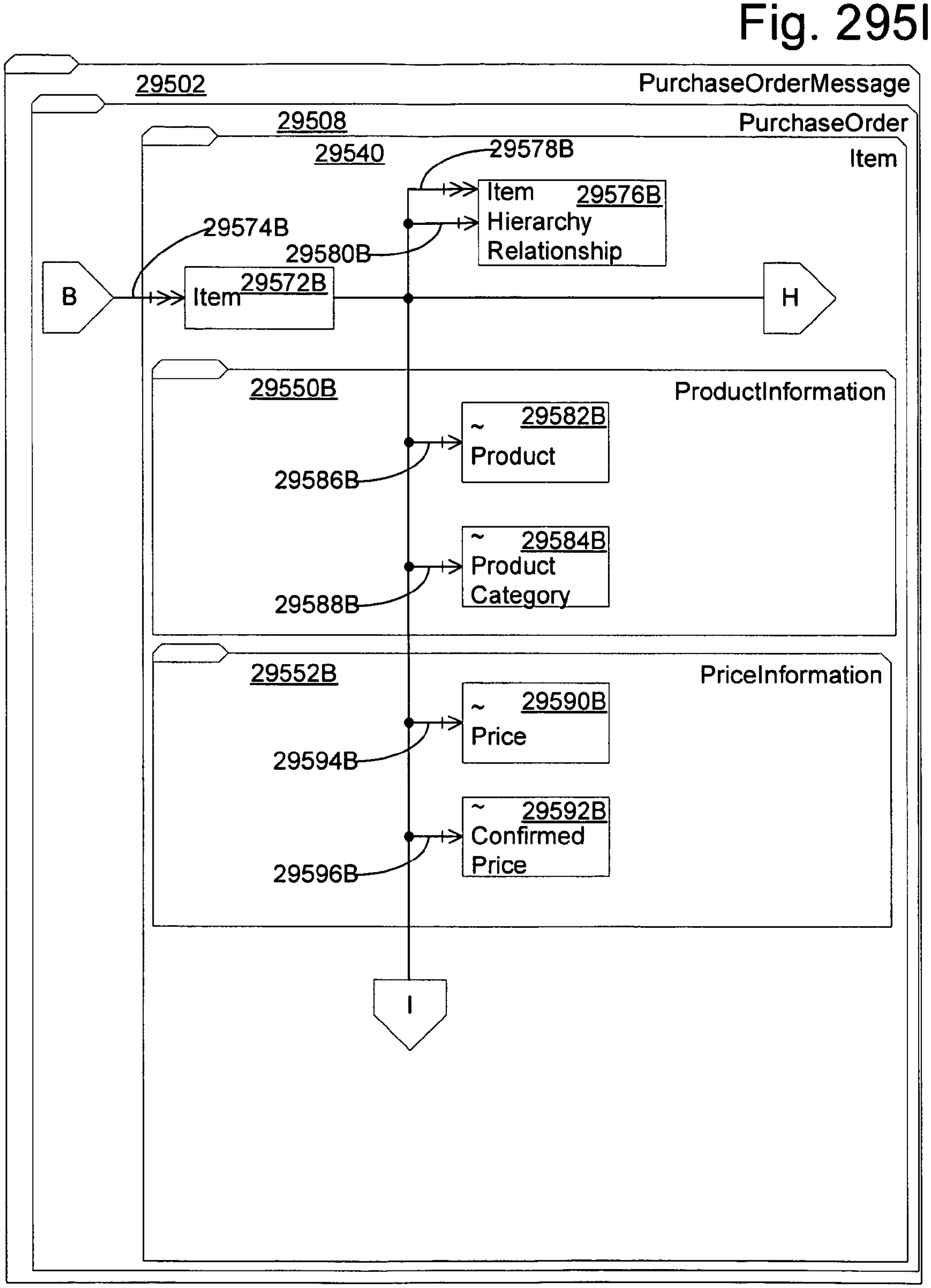
Figure 295J:
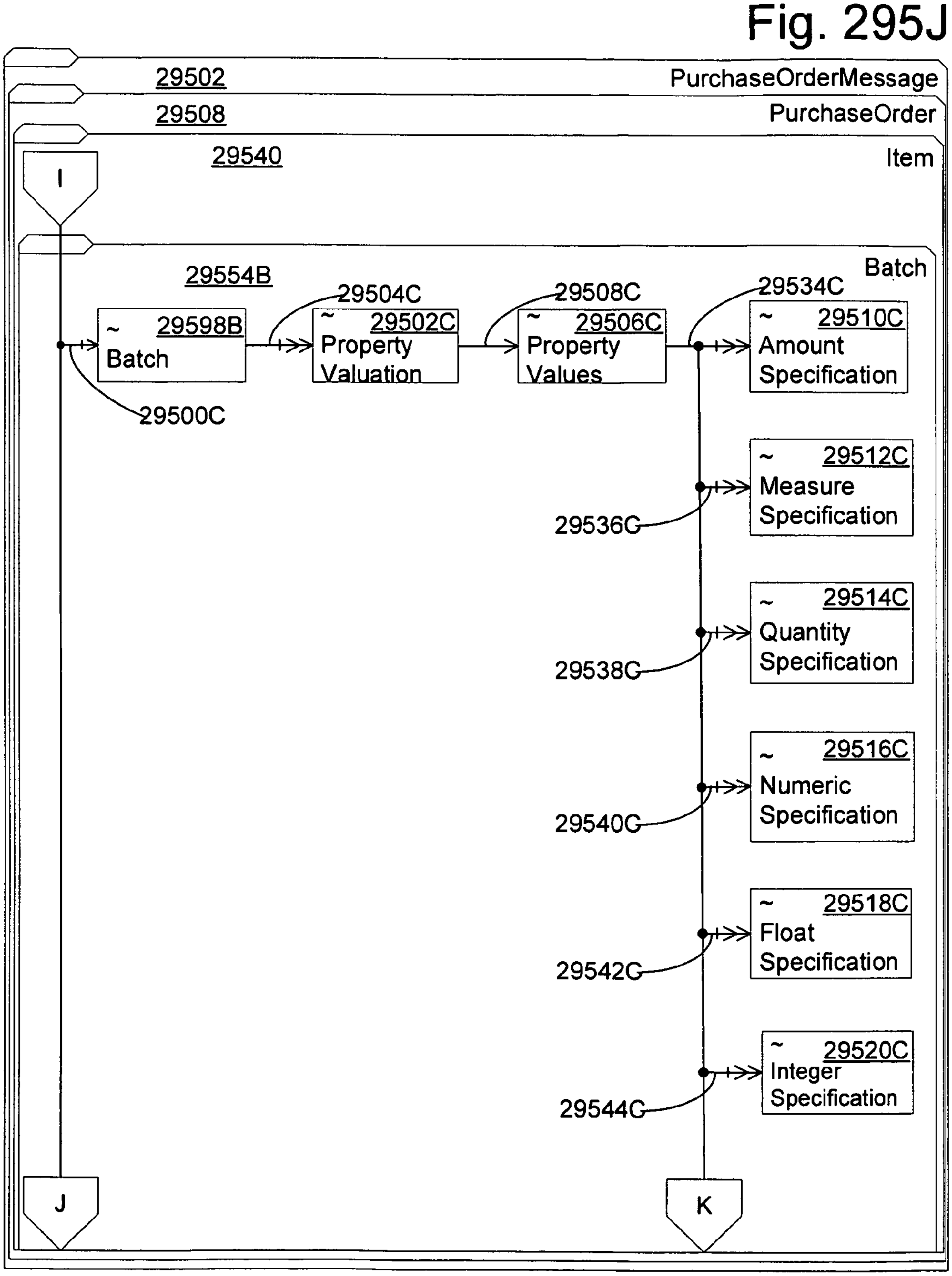
Figure 295K:
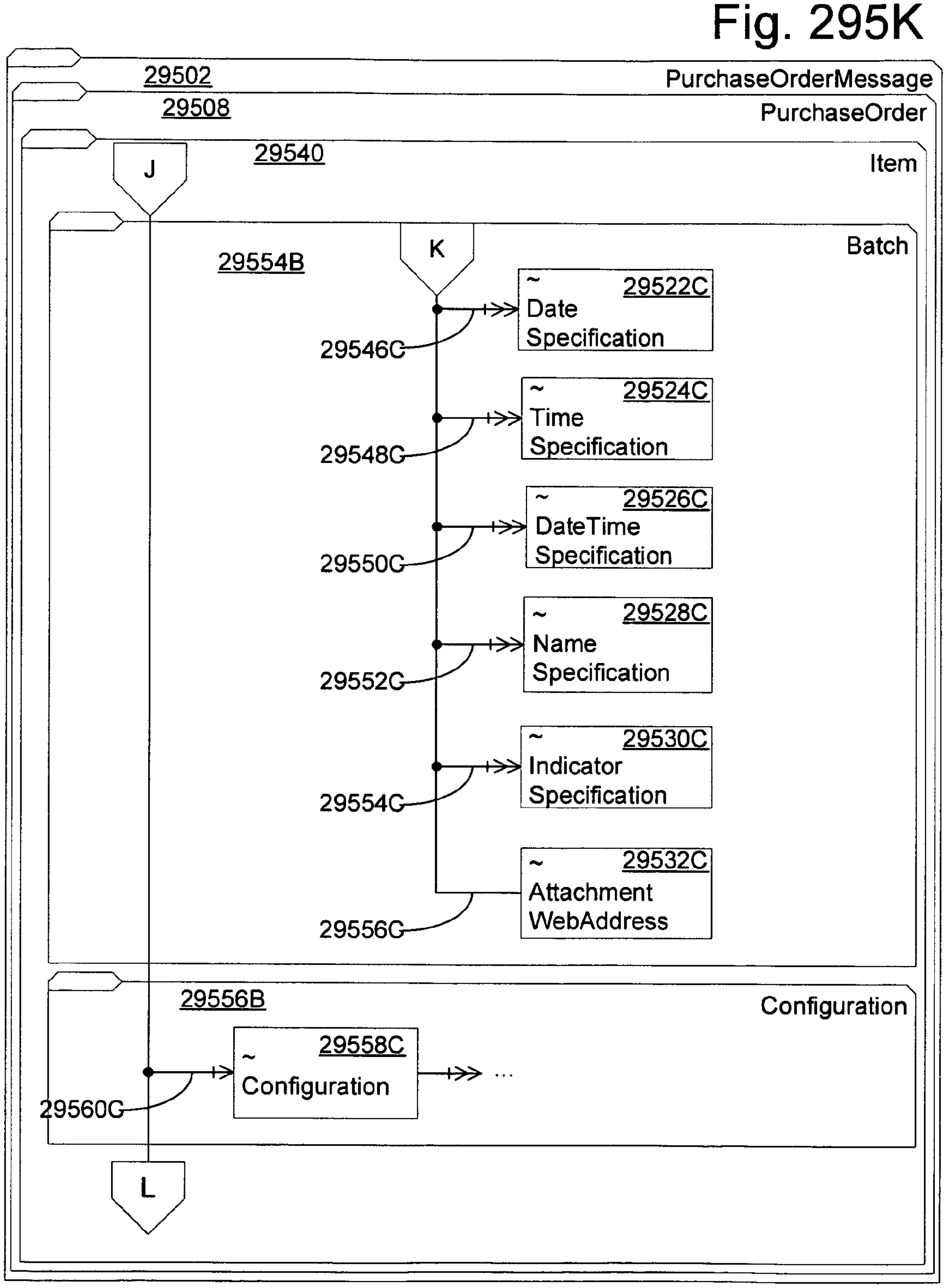
Figure 295L:
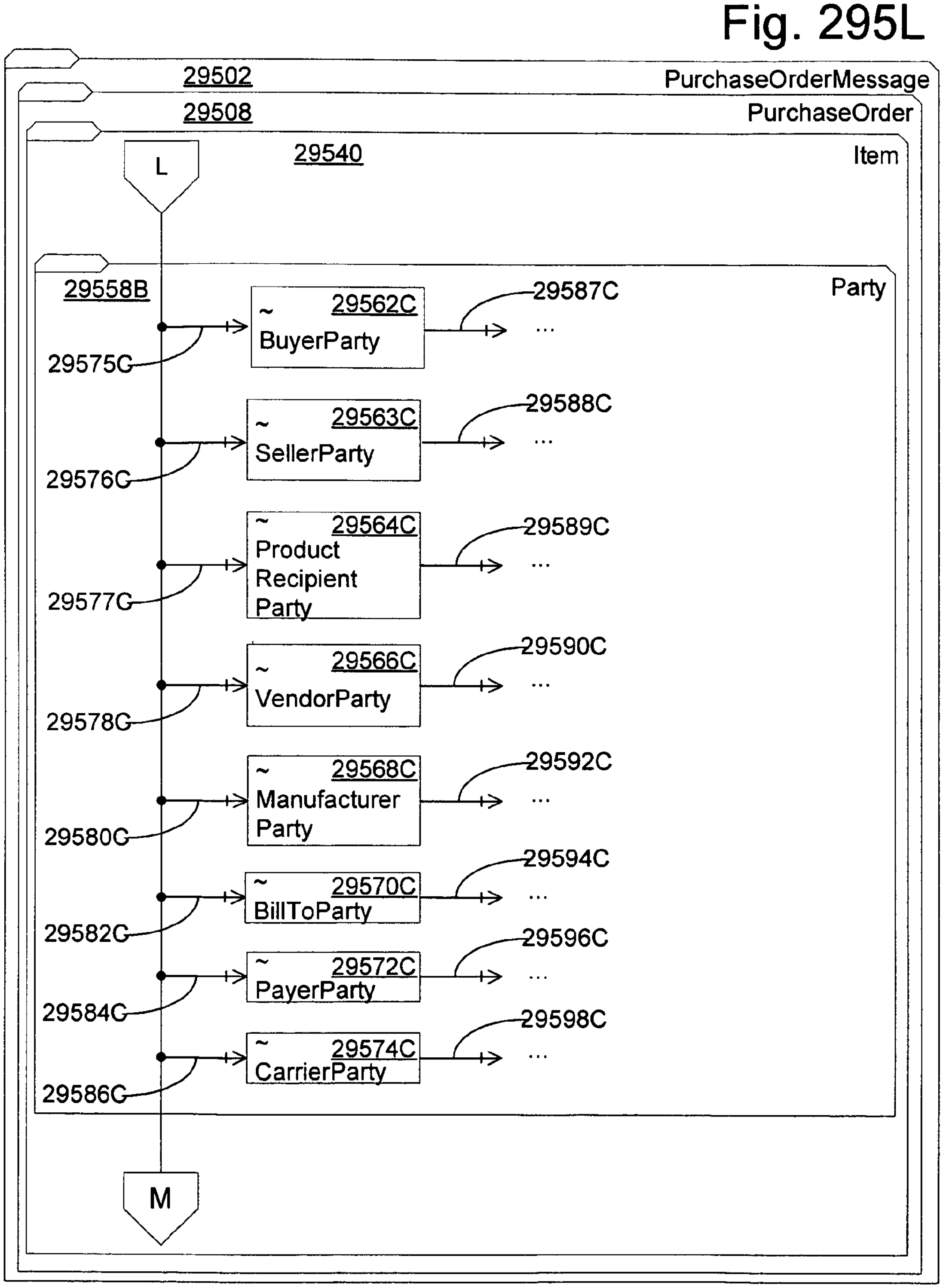
Figure 295M:
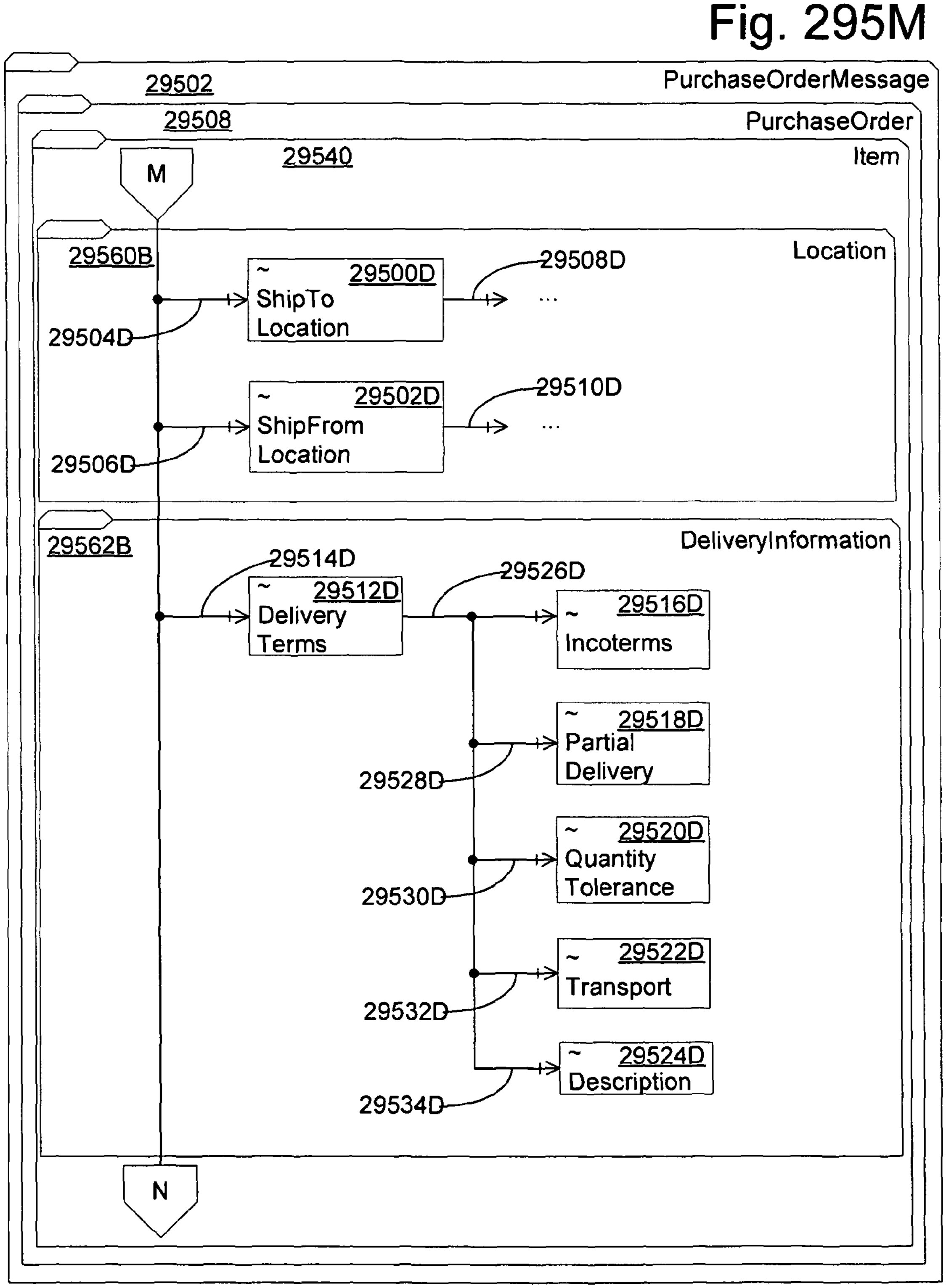
Figure 295N:
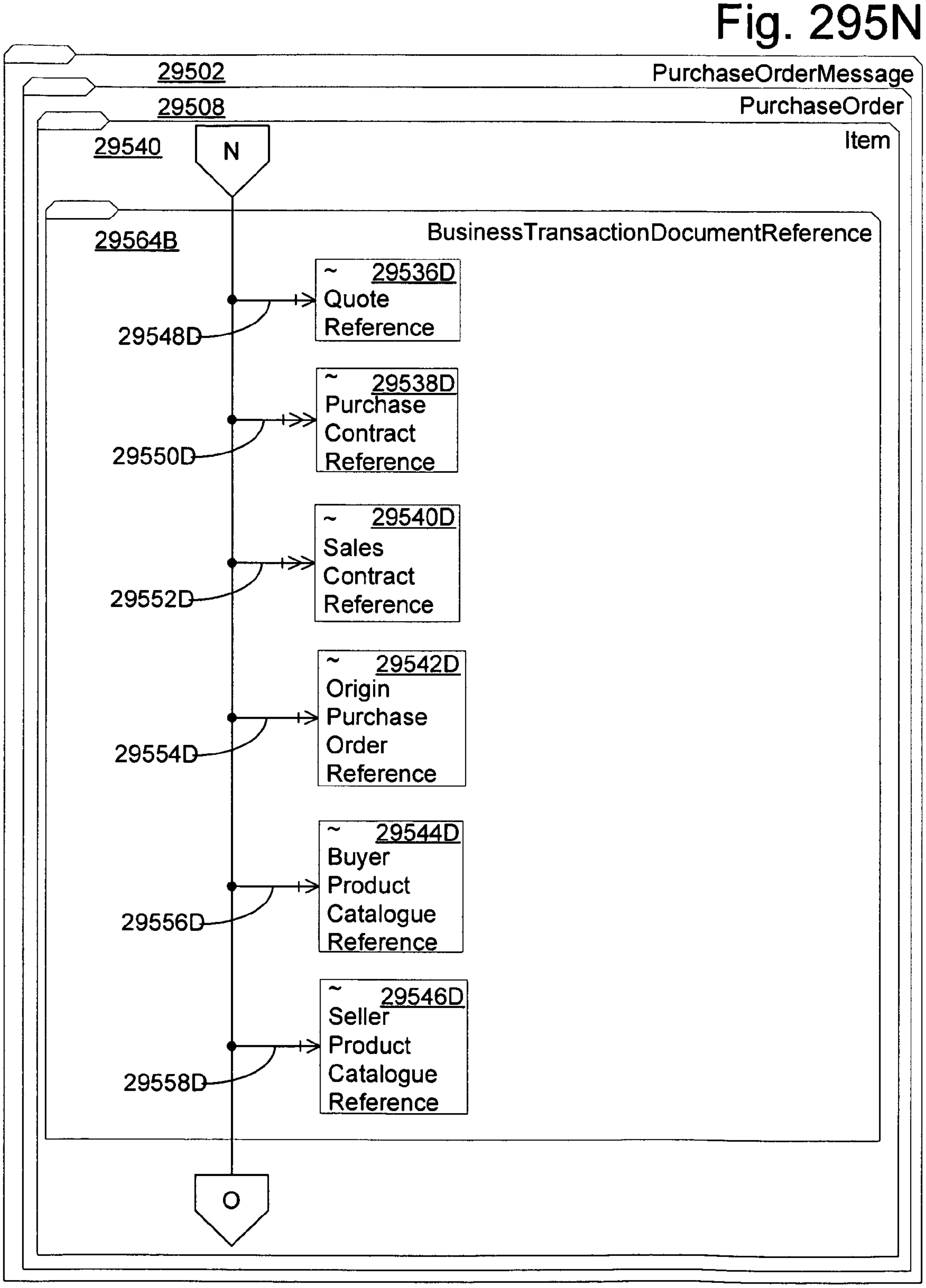
Figure 295O:
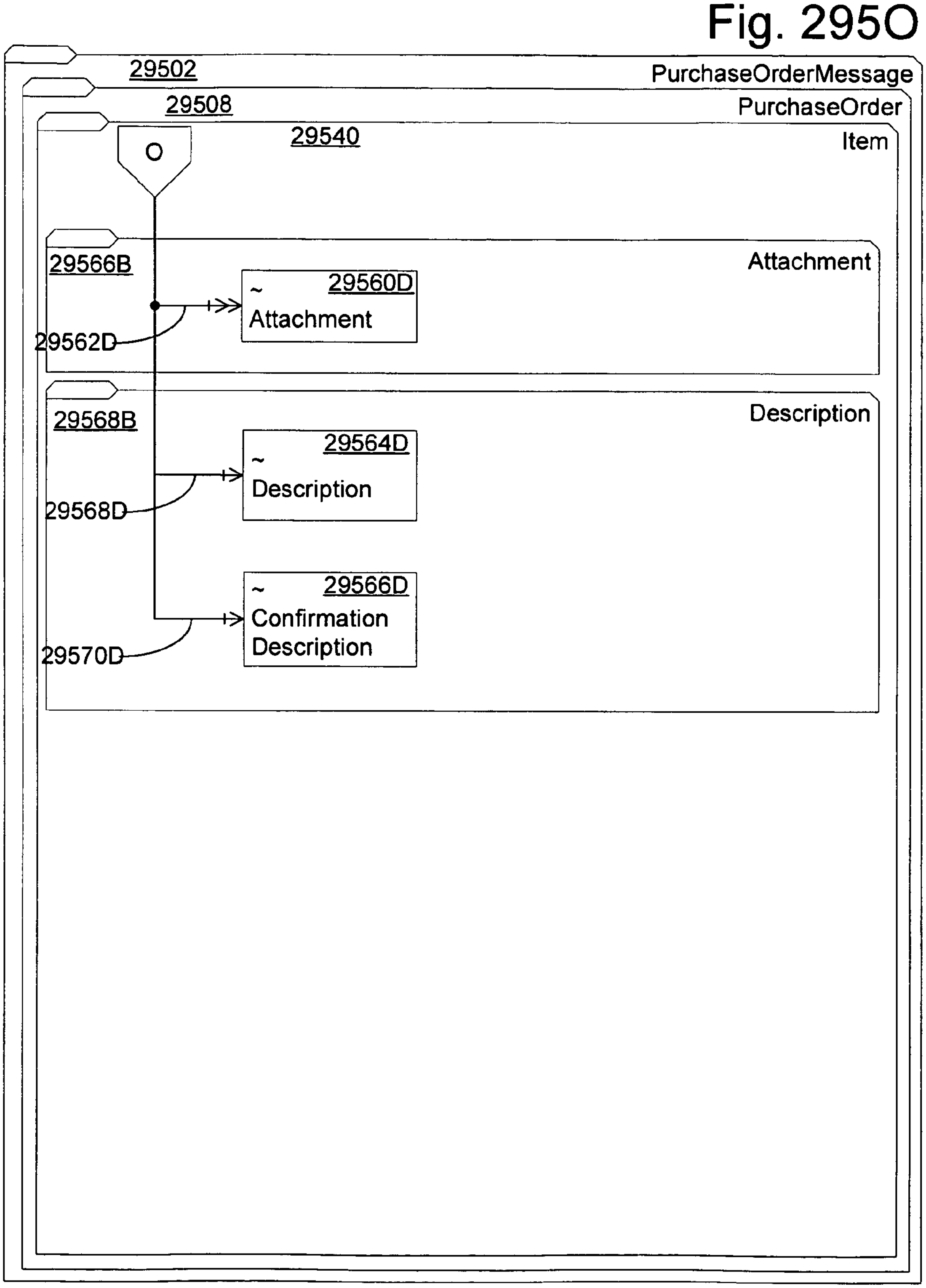
Figure 295P:
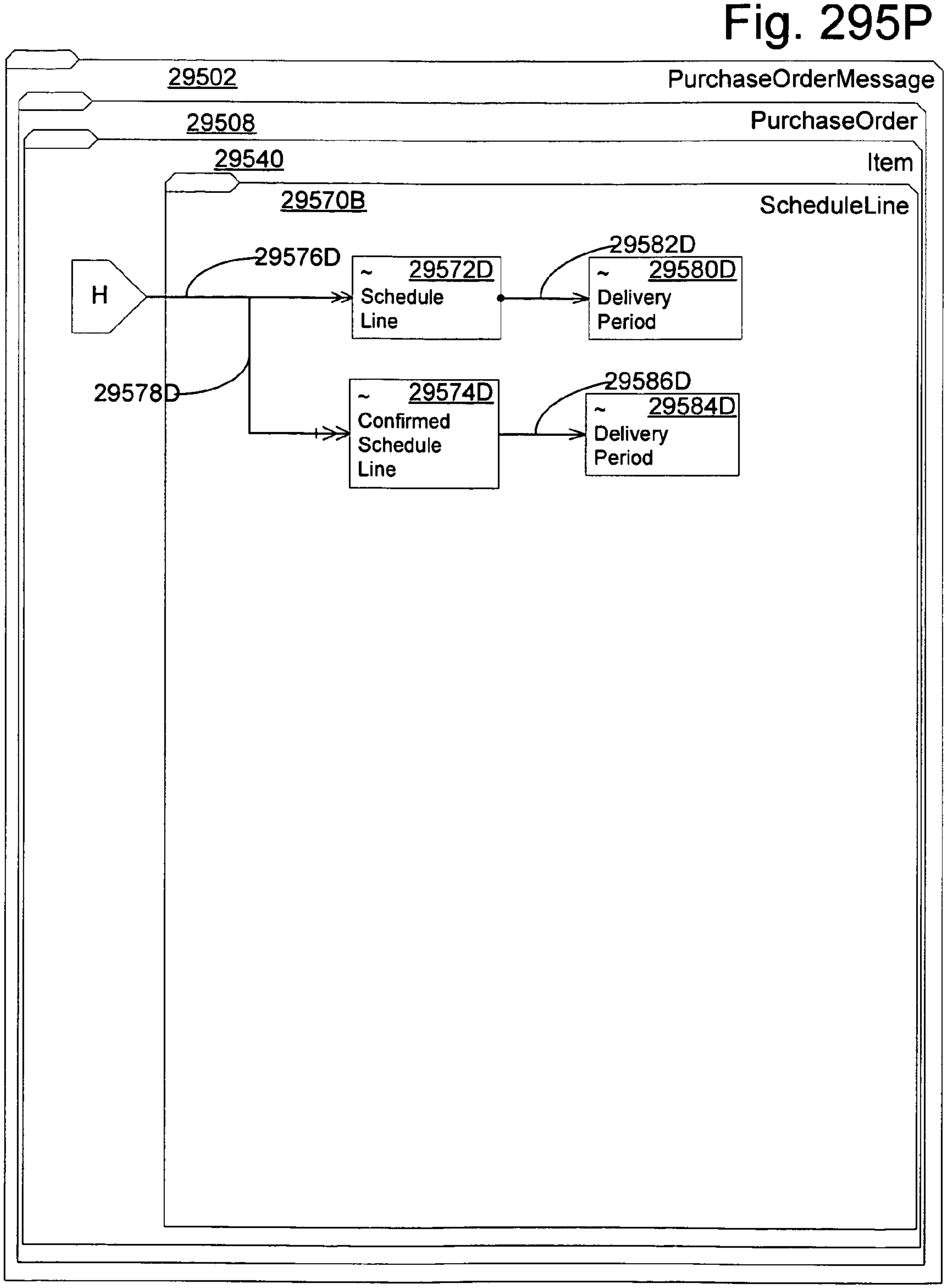
Figure 296:
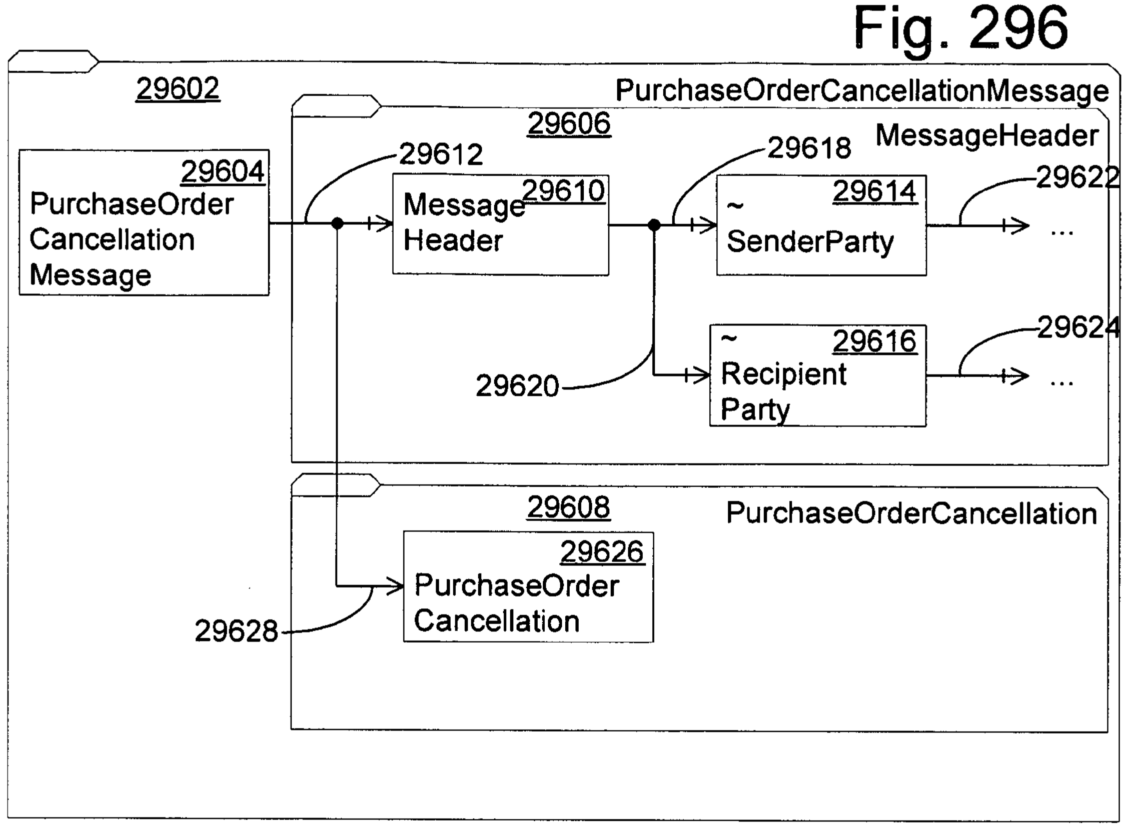
FIG. 296 depicts the data model for the Purchase Order Cancellation interfaces in accordance with methods and systems consistent with the present invention.

As shown in FIGS. 295A-P, PurchaseOrderMessage package 29502 includes MessageHeader package 29506, PurchaseOrder package 29508, and PurchaseOrderMessage entity 29504.

(a) Message Header Package

The MessageHeader package 29506 groups together the business information that is relevant for sending a business document in a message. The MessageHeader package 29506 includes a MessageHeader entity 29510, which groups together the business information from the perspective of the sending application to identify the business document in a message, to provide information about the sender, and to provide any information about the recipient. There is a 1:1 relationship 29512 between the PurchaseOrderMessage entity 29504 and the MessageHeader entity 29510.

The MessageHeader entity 29510 includes a SenderParty entity 29514 and a RecipientParty entity 29516, and is of type GDT BusinessDocumentMessageHeader. There is a 1:c relationship 29518 between the MessageHeader entity 29510 and the SenderParty entity 29514. There is a 1:cn relationship 29520 between the MessageHeader entity 29510 and the RecipientParty entity 29516. Both the SenderParty entity 29514 and the RecipientParty entity 29516 include the same elements as those described below for the BuyerParty entity 29546, as denoted by ellipses 29522 and 29524. The MessageHeader entity 29510 also includes a MessageID, a ReferencedMessageID, and a CreationDateTime. The sending application sets the MessageID. With the ReferencedMessageID, reference is made in the current BusinessDocument to a previous BusinessDocument.

The SenderParty identifies the party responsible for sending a business document at business application level. The SenderParty entity 29514 is of type GDT: BusinessDocumentMessageHeaderParty. The SenderParty entity 29514 may include the name of a contact person for any problems with the message. This is particularly useful if an additional infrastructure (such as a marketplace) is located between the sender and the recipient. The SenderParty entity 29514 is simply used to transfer the message and can be ignored by the receiving application. It should be filled by the sender particularly if the participating parties are not transferred with the PurchaseOrder package.

The RecipientParty identifies the party responsible for receiving a business document at the business application level. The RecipientParty entity 29516 is of type GDT: BusinessDocumentMessageHeaderParty. The RecipientParty entity 29516 may includes the name of a contact person for any problems that occur with the message. This is particularly useful if an additional infrastructure (such as a marketplace) is located between the sender and the recipient. The RecipientParty entity 29516 is simply used to transfer the message and can be ignored by the receiving application. It should be filled by the sender if the PurchaseOrder package cannot be used to transfer the participating parties.

(b) Purchase Order Package

The PurchaseOrder identifies a buyer's request (or a change to or confirmation of such a request) to a seller to provide or deliver certain quantities of products. The PurchaseOrder is divided into PurchaseOrderItems that each specify an ordered product or additional information relevant for such a product, such as information about bills of material ("BOMs") or discount or value limits (see PurchaseOrderItem package). In addition to the buying party and the seller, additional parties can be involved in the PurchaseOrder (see Party package). Locations can be specified for the purchase order delivery (see Location package). Delivery and payment terms are also agreed (see DeliveryInformation package and PaymentInformation package). Notes or references to attachments can be specified for the PurchaseOrder (see Description package and Attachment package). The types of follow-up documents that are expected with regard to the PurchaseOrder package can also be specified (see FollowUpBusinessTransactionDocument package).

The PurchaseOrder package 29508 includes a Party package 29526, a Location package 29528, a DeliveryInformation package 29530, a PaymentInformation package 29532, an Attachment package 29534, a Description package 29536, a FollowUpMessage package 29538, and an Item package 29540. The PurchaseOrder package 29508 also includes a PurchaseOrder entity 29542. There is a 1:1 relationship 29544 between the PurchaseOrderMessage entity 29504 and the PurchaseOrder entity 29542.

The PurchaseOrder entity 29542 is of type GDT: PurchaseOrder, and includes an ID, a SellerID, a BuyerPostingDateTime, a BuyerLastChangeDateTime, a SellerPostingDateTime, a SellerLastChangeDateTime, an AcceptanceStatusCode, a Note and an ItemListCompleteTransmissionIndicator. The ID is a unique identifier specified by the buyer for the purchase order. The SellerID is a unique identifier specified by the seller for the purchase order. The BuyerPostingDateTime is the creation date/time of the purchase order by the buyer, and is of type GDT: DateTime. The BuyerLastChangeDateTime is the date/time of the last change made to the purchase order by the buyer, and is of type GDT: DateTime. The SellerPostingDateTime is the creation date/time of the sales order by the seller, and is of type GDT: DateTime. The SellerLastChangeDateTime is the date/time of the last change made to the sales order by the seller, and is of type GDT: DateTime. The AcceptanceStatusCode is the coded representation for the status of the seller's acceptance of a purchase order, and is of type GDT: AcceptanceStatusCode. The Note is a short description or the title of the purchase order. It is generally used to provide the user with a simple method for searching for a particular purchase order. The Note is of type GDT: Note. The ItemListCompleteTransmissionIndicator specifies whether all purchase order items are always to be transmitted (items that are not transmitted are implicitly classed as cancelled) or whether only new, changed purchase order items that have been cancelled since the last transmission are to be transmitted. The ItemListCompleteTransmissionIndicator is of type GDT: CompleteTransmissionIndicator.

Within any given purchase order, the monetary amounts and prices are in the same currency. The ID is not changed once a purchase order has been created. The SellerID is not changed once a purchase order has been created. The BuyerPostingDateTime is not changed once a purchase order has been created. The BuyerLastChangeDateTime can be changed by the buyer only. The SellerPostingDateTime is not changed once a purchase order has been created. The Note can be changed by the buyer only.

For the message type PurchaseOrderRequest, the SellerID, the SellerPostingDateTime, the SellerLastChangeDateTime, and the AcceptanceStatusCode are not used. In addition, the ItemListCompleteTransmissionIndicator is set to "true," and the ActionCode for all items is set to "01" (Create). The header and all the items that are to be ordered are transmitted, together with all the associated data. Items that were deleted at the buyer before the purchase order was first sent to the seller are not transmitted.

For the message type PurchaseOrderChangeRequest, the SellerID, the SellerPostingDateTime, the SellerLastChangeDateTime, and the AcceptanceStatusCode are not used. If an ItemListCompleteTransmissionIndicator is set to "true," the ActionCode for all items is set to "01" (Create). The header and all the items are transmitted, together with all the associated data. Items that are not transmitted are implicitly classed as cancelled. If an ItemListCompleteTransmissionIndicator is set to "false," the ActionCode for the transmitted items is set to "01" (Create), "02" (Change), or"03" (Delete). The ActionCode "01" (Create) is set if the item is being transmitted for the first time, "02" (Change) if the item has been changed since the last transmission, and "03" (Delete) if the item has been cancelled since the last transmission. The header is transmitted, together with all the associated data. New or changed items are transmitted, together with all the associated data. Cancelled items are transmitted, together with the ID and ActionCode, and should be transmitted without any additional data. Items that are not transmitted are classed as unchanged and are not implicitly classed as cancelled.

For the message type PurchaseOrderConfirmation, the AcceptanceStatusCode at header and item level is set to "AP" (Accepted), "AJ" (Pending), or "RE" (Rejected). If an ItemListCompleteTransmissionIndicator is set to "true," the ActionCode for all items is set to "01" (Create). The header and all items are transmitted, together with all the associated data. Items that are not transmitted are implicitly classed as cancelled. If an ItemListCompleteTransmissionIndicator is set to "false," the ActionCode for the transmitted items is set to "01" (Create) or "02" (Change). The ActionCode "01" (Create) is set if the item is being transmitted for the first time and "02" (Change) if the item has been changed by the seller since the last transmission. The seller cannot cancel items by setting the ActionCode to "03" (Delete), but can reject items by setting the AcceptanceStatusCode "RE" (Rejected). If the header includes changes, it is transmitted, together with all the associated data. Otherwise, the ID and the AcceptanceStatusCode are transmitted, but not the header data. If an item includes changes, it is transmitted, together with all the associated data, including the ID, ActionCode, AcceptanceStatusCode, ConfirmedNetUnitPrice, and ConfirmedScheduleLines. If the confirmed values in ConfirmedNetUnitPrice or ConfirmedScheduleLine have changed, an item is transmitted, together with the ID, ActionCode, AcceptanceStatusCode, ConfirmedNetUnitPrice, and ConfirmedScheduleLines; the item data should not be transmitted. If the confirmation status has changed, an item is transmitted, together with the ID, ActionCode, and AcceptanceStatusCode. ConfirmedNetUnitPrice and ConfirmedScheduleLines should be transmitted, but not the item data. An unchanged item should not be transmitted. Items that are not transmitted are classed as unchanged and are not implicitly classed as cancelled. If items are not transmitted, the confirmation status "AP" (Accepted) or "RE" (Rejected) is copied from the header to all items, that is, to accept or reject an entire purchase order, only the purchase order number and the AcceptanceStatusCode have to be transmitted at header level.

The PurchaseOrder object in the message data type PurchaseOrderMessage provides a structure that is not used only for purchase order messages but also for changing and confirming a purchase order. The semantic of the PurchaseOrder object is, therefore, more generic in order to cover these aspects.

(i) Purchase Order Party Package

The Party package 29526 groups together all the business parties involved in the PurchaseOrder, and includes a BuyerParty entity 29546, a SellerParty entity 29548, a ProductRecipientParty entity 29550, a VendorParty entity 29552, a ManufacturerParty entity 29554, a BillToParty entity 29556, a PayerParty entity 29558, and a CarrierParty entity 29560. There is a respective 1:c relationship 29562, 29564, 29566, 29568, 29570, 29572, 29574, and 29576 between the PurchaseOrder entity 29542 and the BuyerParty entity 29546, the SellerParty entity 29548, the ProductRecipientParty entity 29550, VendorParty entity 29552, the ManufacturerParty entity 29554, the BillToParty entity 29556, the PayerParty entity 29558, and the CarrierParty entity 29560.

Either only the ID or the ID and address can be transferred for each party. If only the ID is transferred, the ID address defined in the master data is used. If the ID and address are transferred, the ID identifies the party and the address is deemed to be a document address that is different to the master data address. Where possible, the ID and address are to be sent to avoid misunderstandings. The receiving application should implement a suitable optimization strategy to ensure that the system does not create many identical document addresses.

A default logic is used for all business parties: from the header to the items and within item hierarchies. Business parties specified in the header are used for all the items for which a corresponding party is not explicitly transferred and that are directly assigned to the header. In accordance with the same logic, business parties transferred at item level are used for all sub-items assigned to the relevant item in an item hierarchy. The default logic is used for the party as a whole, including the contact party. Parts of a party specified at header level or for a hierarchy item cannot be specified in more detail at item level. The default logic is only a simplified version of the transferred message. As regards logic, parties at header level and for hierarchy items behave as if they have been explicitly transferred for all the sub-items of the message. This also means that if only changed items are transferred rather than all items, the parties are used for the transferred items only. Changes made to parties also always apply to all items relevant for the party in question.

The BuyerParty entity 29546 includes an Address entity 29578 and a Contact entity 29580. There is a 1:c relationship 29582 between the BuyerParty entity 29546 and the Address entity 29578, and a 1:c relationship 29584 between the BuyerParty entity 29546 and the Contact entity 29580.

The Address entity 29578 includes a PersonName entity 29586, an Office entity 29588, a PhysicalAddress entity 29590, a GeoCoordinates entity 29592, and a Communication entity 29594. There is a respective 1:c relationship 29596, 29598, 29500A, 29502A, and 29504A between the Address entity 29578 and the PersonName entity 29586, the Office entity 29588, the PhysicalAddress entity 29590, the GeoCoordinates entity 29592, and the Communication entity 29594.

The Contact entity 29580 includes an Address entity 29506A. There is a 1:c relationship 29508A between the Contact entity 29580 and the Address entity 29506A. The Address entity 29506A includes a PersonName entity 29510A, an Office entity 29512A, a PhysicalAddress entity 29514A, a GeoCoordinates entity 29516A, and a Communication entity 29518A. There is a respective 1:c relationship 29520A, 29522A, 29524A, 295226A, and 29528A between the Address entity 29506A and the PersonName entity 29510A, the Office entity 29512A, the PhysicalAddress entity 29514A, the GeoCoordinates entity 29516A, and the Communication entity 29518A.

The BuyerParty is a party that buys goods or services. The BuyerParty entity 29546 is of type GDT: BusinessTransactionParty. The same BuyerParty entity 29546 is used for all the items in a purchase order, and the BuyerParty entity 29546 is not changed once a purchase order has been created. For the message type PurchaseOrderRequest, the BuyerParty is specified.

Changes can be made to the BuyerParty/Contact and a different BuyerParty/Contact is permitted for each item. Changes can be made to the address of the BuyerParty, but different addresses are not permitted for each item. If a ProductRecipientParty is not explicitly specified in the ordering process, the BuyerParty is also used as the ProductRecipientParty. If a ProductRecipientParty and ShipToLocation are not explicitly specified in the ordering process, the BuyerParty address is used as the ship-to address. If a BillToParty is not explicitly specified in the ordering process, the BuyerParty is also used as the BillToParty. If a BillToParty and PayerParty are not explicitly specified in the ordering process, the BuyerParty is also used as the PayerParty.

The SellerParty is a party that sells goods or services. The SellerParty entity 29548 is of type GDT: BusinessTransactionDocumentParty. The same SellerParty is used for all the items in a purchase order, and the SellerParty is not changed once a purchase order has been created. For the message type PurchaseOrderRequest, the SellerParty is specified. The SellerParty entity 29548 includes the same elements as that described above for the BuyerParty entity 29546 as denoted by ellipse 29530A.

Changes can be made to the SellerParty/Contact and a different SellerParty/Contact is permitted for each item. Changes can be made to the address of the SellerParty, but different addresses are not permitted for each item. If a VendorParty is not explicitly specified in the ordering process, the SellerParty is also used as the VendorParty. If a VendorParty and ShipFromLocation are not explicitly specified in the ordering process, the address of the SellerParty is also used as the ship-from address for the material items.

The ProductRecipientParty is a party to which goods are delivered or for whom services are provided. The ProductRecipientParty entity 29550 is of type GDT: BusinessTransactionDocumentParty. If a ShipToLocation is not explicitly specified in the ordering process, the ProductRecipientParty address is used as the ship-to address. The ProductRecipientParty is not synonymous with the ShipToLocation and should be used only when the ProductRecipientParty (company or person) is actually different than the BuyerParty. The ProductRecipientParty entity 29550 includes the same elements as that described above for the BuyerParty entity 29546 as denoted by ellipse 29532A.

The VendorParty is a party that delivers goods or provides services. The VendorParty entity 29552 is of type GDT: BusinessTransactionDocumentParty. If a ShipFromLocation is not explicitly specified in the ordering process, the address of the VendorParty is used as the ship-from address for the material items. The VendorParty is not the company or person that is solely responsible for transporting the goods. The CarrierParty is responsible for this. The VendorParty is not synonymous with the ShipFromLocation and should be used only when the VendorParty (company or person) is actually different than the SellerParty. The VendorParty entity 29552 includes the same elements as that described above for the BuyerParty entity 29546 as denoted by ellipse 29534A.

The ManufacturerParty is a party that manufactures goods. The ManufacturerParty entity 29554 is of type GDT: BusinessTransactionDocumentParty. The ManufacturerParty entity 29554 can be used for material items only. With regard to the ManufacturerParty entity 29554, the default logic (from header to item to sub-items) is used for material items only; for other items, the ManufacturerParty is ignored. The ManufacturerParty entity 29554 can be used to uniquely define the context of a ManufacturerProductID. The ManufacturerParty entity 29554 includes the same elements as that described above for the BuyerParty entity 29546 as denoted by ellipse 29536A.

The BillToParty is a party to which the invoice for goods or services is sent. The BillToParty entity 29556 is of type GDT: BusinessTransactionDocumentParty. If a PayerParty is not explicitly specified in the ordering process, the BillToParty is also used as the PayerParty. Conversely, the BillToParty is not explicitly derived from the PayerParty. The BillToParty entity 29556 includes the same elements as that described above for the BuyerParty entity 29546 as denoted by ellipse 29538A.

The PayerParty is a party that pays for goods or services. The PayerParty entity 29558 is of type GDT: BusinessTransactionDocumentParty. The PayerParty entity 29558 includes the same elements as that described above for the BuyerParty entity 29546 as denoted by ellipse 29540A.

The CarrierParty is a party that transports goods. The CarrierParty entity 29560 is of type GDT: BusinessTransactionDocumentParty. The CarrierParty entity 29560 can be used for material items. With regard to the CarrierParty entity 29560, the default logic (from header to item to sub-items) is used for material items only. The CarrierParty entity 29560 includes the same elements as that described above for the BuyerParty entity 29546 as denoted by ellipse 29542A.

(ii) Purchase Order Location Package

A Location package 29528 groups together all the locations relevant for the PurchaseOrder, and includes a ShipToLocation entity 29544A and a ShipFromLocation entity 29546A. There is a 1:c relationship 29548A between the PurchaseOrder entity 29542 and the ShipToLocation entity 29544A, and a 1:c relationship 29550A between the PurchaseOrder entity 29542 and the ShipFromLocation entity 29546A.

The ShipToLocation entity 29544A includes an Address entity 29552A. There is a 1:c relationship 29554A between the ShipToLocation entity 29544A and the Address entity 29552A. The Address entity 29552A includes a PersonName entity 29556A, an Office entity 29558A, a PhysicalAddress entity 29560A, a GeoCoordinates entity 29562A, and a Communication entity 29564A. There is a respective 1:c relationship 29566A, 29568A, 29570A, 29572A, and 29574A between the Address entity 29552A and the PersonName entity 29556A, the Office entity 29558A, the PhysicalAddress entity 29560A, the GeoCoordinates entity 29562A, and the Communication entity 29564A. The ShipFromLocation entity 29546A includes the same elements as that described above for the ShipToLocation 29544A as denoted by ellipse 29576A.

A similar default logic to that used for Parties is also used for all locations. Either only the ID or only the address, or both can be transferred for each location. If only the ID is transferred, the ID address defined in the master data is used. If only the address is transferred, it is this address that is used (if necessary, a location is assigned at the address recipient). If the ID and address are transferred, the ID identifies the location and the address is deemed to be a document address that is different to the master data address. Where possible, the ID and address are to be sent to avoid misunderstandings. The receiving application should implement a suitable optimization strategy to prevent many identical document addresses from being created.

The ShipToLocation is the location to which goods are to be delivered or where services are to be provided. The ShipToLocation entity 29544A is of type GDT: BusinessTransactionDocumentShipToLocation.

The ShipFromLocation is the location from which goods are to be shipped. The ShipFromLocation entity 29546A is of type GDT: BusinessTransactionDocument-ShipFromLocation. The ShipFromLocation entity 29546A can be used for material items. With regard to the ShipFromLocation entity 29546A, the default logic (from header to item to sub-items) is used for material items only; for all other items, the ShipFromLocation entity 29546A is ignored.

(iii) Purchase Order Delivery Information Package

A DeliveryInformation package 29530 groups together all the information for a delivery required for a purchase order. A similar default logic to that used for Parties is also used for DeliveryTerms. The DeliveryInformation package 29530 includes a DeliveryTerms entity 29578A. There is a 1:c relationship 29580A between the PurchaseOrder entity 29542 and the DeliveryTerms entity 29578A. The DeliveryTerms entity 29578A includes an Incoterms entity 29582A, a PartialDelivery entity 29584A, a QuantityTolerance entity 29586A, a Transport entity 29588A, and a Description entity 29590A. There is a respective 1:c relationship 29592A, 29594A, 29596A, 29598A, and 29500B between the DeliveryTerms entity 29578A and the Incoterms entity 29582A, the PartialDelivery entity 29584A, the QuantityTolerance entity 29586A, the Transport entity 29588A, and the Description entity 29590A.

The DeliveryTerms include the conditions and agreements that are valid for executing the delivery and transporting the ordered goods and for the necessary services and activities. The DeliveryTerms entity 29578A are type GDT: DeliveryTerms. Of the DeliveryTerms, Incoterms and transport can be used for material items. The default logic takes Incoterms and transport into account for material items only. For all other items, Incoterms and transport are ignored.

(iv) Purchase Order Payment Information Package

A PaymentInformation package 29532 groups together all the payment information about the purchase order. The PaymentInformation package 29532 includes a CashDiscountTerms entity 29502B and a PaymentForm entity 29504B. There is a 1:c relationship 29506B between the PurchaseOrder entity 29542 and the CashDiscountTerms entity 29502B, and a 1:c relationship 29508B between the PurchaseOrder entity 29542 and the PaymentForm entity 29504B.

The CashDiscountTerms include the terms of payment in an ordering process. The CashDiscountTerms entity 29502B is of type GDT: CashDiscountTerms. The CashDiscountTerms entity 29502B includes a MaximumDiscount entity 295101B and a NormalDiscount entity 29512B. There is a 1:c relationship 29514B between the CashDiscountTerms entity 29502B and the MaximumDiscount entity 29510B, and a 1:c relationship 29516B between the CashDiscountTerms entity 29502B and the NormalDiscount entity 29512B.

The PaymentForm is the payment form together with the data required. The PaymentForm entity 29504B includes a PaymentFormCode, which is the coded representation of the payment form. The PaymentFormCode entity 29504B is of type GDT: PaymentFormCode. The PaymentFormCode entity 29504B includes a PaymentCard entity 29518B. There is a 1:c relationship 29520B between the PaymentFormCode entity 29504B and the PaymentCard entity 29518B.

The PaymentCard is a credit card or a customer card. The PaymentCard entity 29518B is of type GDT: PaymentCard. The PaymentCard entity 29518B can be used for the payment form PaymentCard (Payment Form Code "02").

(v) Purchase Order Attachment Package

The Attachment package 29534 groups together all the attachment information regarding the purchase order. The Attachment package 29534 includes an Attachment entity 29522B, which is any document that refers to the purchase order. There is a 1:cn relationship 29524B between the PurchaseOrder entity 29542 and the Attachment entity 29522B. The Attachment entity 29522B is of type GDT: Attachment.

(vi) Purchase Order Description Package

The Description package 29536 groups together all the texts regarding the purchase order. The Description package 29536 includes a Description entity 29526B and a ConfirmationDescription entity 29528B. There is a 1:c relationship 29530B between the PurchaseOrder entity 29542 and the Description entity 29526B, and a 1:c relationship 29532B between the PurchaseOrder entity 29542 and the ConfirmationDescription entity 29528B.

The Description is a natural-language text regarding the purchase order, which is visible to business parties. The Description entity 29526B is of type GDT: Description. The Description entity 29526B can be used for all types of textual information about the transferred purchase order and not just the current message. An example of this would be information stating that the Purchasing employee responsible is on vacation as of a specific date, and indicating the name and telephone number of a substitute as of this date.

The ConfirmationDescription is a natural-language text regarding the order confirmation, which is visible to business parties. The ConfirmationDescription entity 29528B is of type GDT: Description. The ConfirmationDescription entity 29528B in the message type PurchaseOrderRequest is not used. The ConfirmationDescription entity 29528B in the message type PurchaseOrderChangeRequest is not used. The ConfirmationDescription entity 29528B can be used for all types of textual information about the order confirmation. An example of this would be the seller's justification for rejecting a particular purchase order.

(vii) Purchase Order Follow Up Message Package

The FollowUpMessage package 29538 groups together all the information about subsequent messages that the buyer expects to receive from the seller with regard to the purchase order. The FollowUpMessage package 29538 includes a FollowUpPurchaseOrderConfirmation entity 29534B, a FollowUpDespatchedDeliveryNotification entity 29536B, a FollowUpServiceAcknowledgementRequest entity 29538B, and a FollowUpInvoiceRequest entity 29540B. There is a respective 1:c relationship 29542B, 29544B, 29546B, and 29548B between the PurchaseOrder entity 29542 and the FollowUpPurchaseOrderConfirmation entity 29534B, the FollowUpDespatchedDeliveryNotification entity 29536B, the FollowUpServiceAcknowledgementRequest entity 29538B, and the FollowUpInvoiceRequest entity 29540B.

The FollowUpPurchaseOrderConfirmation includes information about whether and in what form the buyer expects to receive confirmation of the purchase order from the seller. The FollowUpPurchaseOrderConfirmation entity 29534B includes a RequirementCode, which is a coded representation of information about whether the buyer expects to receive confirmation of the purchase order from the seller. The RequirementCode is of type GDT: FollowUpMessageRequirementCode. The values "02" (Expected) and "04" (Unexpected) are permitted for the RequirementCode, and the RequirementCode can be changed by the buyer. If the buyer changes the RequirementCode from "Unexpected" to "Expected" during an ordering process, the seller should send the current confirmation status, even for purchase order items that have already been delivered or invoiced. If the buyer changes the RequirementCode from "Expected" to "Unexpected," the seller should not send any more confirmations, except if the purchase order is cancelled or if the seller changes it. The seller can transfer the order confirmation either electronically using a PurchaseOrderConfirmation message or by traditional methods of communication, such as e-mail or fax.

The FollowUpDespatchedDeliveryNotification includes information about whether the buyer wants to be informed by the seller of any outbound deliveries, and includes a RequirementCode. The RequirementCode is a coded representation of information about whether the buyer expects the seller to send notification of any outbound deliveries of the ordered goods. The RequirementCode is of type GDT: FollowUpMessageRequirementCode. Only the values “02” (Expected) and “04” (Unexpected) are permitted for the RequirementCode, and the RequirementCode can be changed by the buyer only. If the buyer changes the RequirementCode from “Unexpected” to “Expected” during an ordering process, the seller should inform the buyer of all the new outbound deliveries for the purchase order once the change has been received. If the buyer changes the RequirementCode from “Expected” to “Unexpected,” the seller should not send any further information about outbound deliveries. The seller can transfer the confirmation of the outbound delivery either electronically using a DespatchedDeliveryNotification message or by traditional methods of communication, such as e-mail or fax. Confirmation of the outbound delivery can be sent for material items only, that is, the RequirementCode “Expected” can be ignored for service items.

The FollowUpServiceAcknowledgementRequest includes information about whether the buyer wants to be informed by the seller of any services provided, and includes a RequirementCode. The RequirementCode is a coded representation of information about whether the buyer wants to be informed by the seller of any services provided. The RequirementCode is of type GDT: FollowUpMessageRequirementCode. Only the values “02” (Expected) and “04” (Unexpected) are permitted for the RequirementCode, and the RequirementCode can be changed by the buyer only. If the buyer changes the RequirementCode from “Unexpected” to “Expected” during an ordering process, the seller should inform the buyer of all the new services provided once the change has been received. If the buyer changes the RequirementCode from “Expected” to “Unexpected,” the seller should not send any further information about services provided. The seller can transfer the confirmation of the services either electronically using a ServiceAcknowledgementRequest message or by traditional methods of communication, such as e-mail or fax. In addition to service items, a confirmation of a service can also contain planned or unplanned material items for materials that were required when the service was provided.

The FollowUpInvoiceRequest includes information about whether the buyer expects to receive an invoice from the seller, and includes a RequirementCode and an EvaluatedReceiptSettlementIndicator. The RequirementCode is a coded representation of information about whether the buyer expects to receive an invoice from the seller. The RequirementCode is of type GDT: FollowUpMessageRequirementCode. The EvaluatedReceiptSettlementIndicator indicates whether or not the purchase order settlement is to be processed automatically by the goods receipt, without an invoice. The EvaluatedReceiptSettlement Indicator is of type GDT: EvaluatedReceiptSettlementIndicator. Only the values “01” (Required) and “05” (Forbidden) are permitted for the RequirementCode. If the Evaluated ReceiptSettlementIndicator is set to “true,” the RequirementCode is set to “Forbidden.” The RequirementCode and the EvaluatedReceiptSettlementIndicator can be changed by the buyer only. If the buyer changes the RequirementCode from “Forbidden” to “Required” during an ordering process, the buyer and seller agree upon what exactly has to be invoiced. If the buyer changes the RequirementCode from “Required” to “Forbidden,” the seller cannot send any further invoices once the change has been received. The seller can transfer the invoice either electronically using an InvoiceRequest message or by traditional methods of communication, such as mail or fax. Whether or not the buyer expects to receive an invoice from the seller does not depend on the type of payment method. There are two typical cases in which the buyer does not expect to receive an invoice from the seller: (1) the purchase orders for goods that are free-of-charge, such as test samples; and (2) the purchase orders that are to be settled using the evaluated receipt settlement (ERS) procedure.

(viii) Purchase Order Item Package

The PurchaseOrderItem package 29540 includes a ProductInformation package 29550B, a PriceInformation package 29552B, a Batch package 29554B, a Configuration package 29556, a Party package 29558B, a Location package 29560B, a DeliveryInformation package 29562B, a BusinessTransactionDocumentReference package 29564B, an Attachment package 29566B, a Description package 29568B, and a ScheduleLine package 29570B.

The Item package 29540 includes an Item entity 29572B. There is a 1:cn relationship 29574B between the PurchaseOrder entity 29542 and the Item entity 29572B. The Item entities are arranged hierarchically using a Hierarchy Relationship 29576B. The Hierarchy Relationship 29576B is the relationship between a sub-item and a higher-level parent item in an item hierarchy. There is a 1:cn relationship 29578B between the Item entity 29572B and its subordinate entities, and there is a 1:c relationship 29580B between the Item entity 29572B and its superordinate entities.

The Item specifies a product ordered by the PurchaseOrder or additional information about such a product. This information includes specifications on discounts in kind, substitute products, and value limits. The PurchaseOrderntem entity 29572B includes detailed information about a particular product (see ProductInformation package) and its price (see Price Information package). The quantity of the product and (delivery) dates are specified in the schedule line (see ScheduleLine package). For the PurchaseOrderItem (compared to the information of the PurchaseOrder), deviating parties, locations, and delivery terms can be defined (see Party package, Location package, and DeliveryInformation package). The PurchaseOrderntem can contain references to other business documents that are relevant for the item (see BusinessTransactionDocumentReference package). Notes or references to attachments can also be specified for the item (see Description package and Attachment package).

The PurchaseOrderItem entity 29572B can be subordinate to another PurchaseOrderInformationItem within a hierarchy to represent a business relationship between the two items. This could be information about a discount in kind or substitute product for an ordered product, for example. This relationship can also be used to group together PurchaseOrder items, that is, a PurchaseOrderItem can group together other PurchaseOrderItems. The PurchaseOrderItem entity 29572B is of type GDT: PurchaseOrderItem.

The PurchaseOrderItem entity 29572B includes an ID, a SellerID, and ActionCode, an AcceptanceStatusCode, and an UnplannedItemPermissionCode. The ID is the identifier assigned by the buyer to a purchase order item. The identifier is unique within a particular purchase order. The ID is of type GDT: BusinessTransactionDocumentItemID. The SellerID is the identifier assigned by the seller to a purchase order item. The identifier is unique within a particular purchase order. The SellerID is of type GDT: BusinessTransactionDocumentItemID. The ActionCode is the coded representation of the actions used to create, change, and delete items in an ordering process at the message recipient. The ActionCode is of type GDT: ActionCode. The AcceptanceStatusCode is the coded representation for the status of the seller's acceptance of a purchase order. The UnplannedItemPermissionCode specifies whether unplanned service entry, goods receipt, and invoice items are permitted for a purchase order item later on in the process. The UnplannedItemPermissionCode is of type GDT: UnplannedItemPermissionCode. The PurchaseOrderItem includes a HierarchyRelationship.

The ID is not changed once an item has been created. The SellerID is not changed once an item has been created. The UnplannedItemPermissionCode is not changed once an item has been created.

For the message type PurchaseOrderRequest, the SellerID and the AcceptanceStatusCode are not used. For the message type PurchaseOrderChangeRequest, the AcceptanceStatusCode is not used.

From a semantic point of view, items can contain other items. This enables item hierarchies to be mapped. From a technical point of view, the item type is not defined recursively, since this cannot be handled by some commonly-used XML tools. The hierarchies are mapped using the entity HierarchyRelationship.

There are various item categories, which are governed by a variety of constraints. An item can have several constraint types. In this case, the item satisfies all the constraints of all its constraint types. Which constraint types can be combined with one another and how, is specified in the description of the constraint types. The constraint types are the Standard items, the Hierarchy items, the Sub-items, the Material items, the Service items, the Unspecified product items, the Grouping hierarchy items, the BOM hierarchy items, the BOM hierarchy items, the Discount in kind hierarchy items, and the Limit items.

Standard items are all the items to which no lower-level items have been assigned in the hierarchy. An item that is not referenced by another item, using the ParentItemID is a standard item.

Hierarchy items are items to which at least one other lower-level item has been assigned in the hierarchy. An item that is referenced by at least one other item, using the ParentItemID is a hierarchy item. All items are either standard or hierarchy items.

Sub-items are items that have been assigned below a hierarchy item and not directly to the purchase order header. Sub-items can be both standard items and hierarchy items. A sub-item is an item that references another item, using the ParentItemID.

Material items are items whose product is a material. Items whose ProductTypeCode is "1" (Material) are material items. Service items are items whose product is a service. Items whose ProductTypeCode is "2" (Service) are service items.

Unspecified product items are items for which it is not specified whether they refer to a material or a service. Items whose ProductTypeCode is not specified are unspecified product items. All items are either material, service, or unspecified product items. An unspecified product item satisfies all the constraints of a material, service, or limit item.

Grouping hierarchy items are hierarchy items that logically group together other items. Multilevel grouping hierarchies are permitted, that is, a grouping hierarchy item can contain sub-items that are also grouping hierarchy items. Hierarchy items whose sub-items all have HierarchyRelationshipTypeCode "002" (Group) are grouping hierarchy items; sub-items with a different HierarchyRelationshipTypeCode are not permitted. Grouping hierarchy items are not permitted as sub-items of other types of hierarchy items.

Substitute product hierarchy items are hierarchy items for which at least one sub-item with a substitute product exists. Multilevel substitute product hierarchies are not permitted, that is, a substitute product cannot be substituted. Hierarchy items whose sub-items all have the HierarchyRelationshipTypeCode "006" (Substitute Product) are substitute product hierarchy items; sub-items with a different HierarchyRelationshipTypeCode are not permitted. Substitute product hierarchy items can be used as sub-items in grouping hierarchies only. Substitute product sub-items can be transferred in the PurchaseOrderConfirmation message only. The buyer can reject proposed substitute products only by cancelling the entire associated substitute product hierarchy item.

BOM hierarchy items are hierarchy items that group together other items in a BOM. Multilevel BOM hierarchies are permitted. Hierarchy items with at least one sub-item with HierarchyRelationshipTypeCode "001" (Bill of Material) are BOM hierarchy items; additional sub-items are permitted with the HierarchyRelationshipTypeCode "003" (Discount in Kind) only.

Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more sub-items in the discount in kind hierarchy item. Hierarchy items with at least one sub-item with HierarchyRelationshipTypeCode "003" (discount in Kind) are discount in kind hierarchy items; additional sub-items are permitted with the HierarchyRelationshipTypeCode "001" (Bill of Material) only. All hierarchy items are grouping, BOM, or discount in kind hierarchy items. A hierarchy item can be both a BOM and discount in kind hierarchy item, if a discount in kind has been granted for a BOM.

Limit items are both standard and unspecified product items for which the exact requirements are unknown at the time of ordering. Items with an UnplannedItemPermissionCode set to "02" (WithContractReferenceOnly) or "03" (Allowed) are limit items. Limit items are not permitted to be sub-items of BOM or discount in kind hierarchy items. No substitute product sub-items are permitted for limit items.

Dependencies between elements or entities of this item category are described under "Notes" for the relevant element or entity. If a BOM or discount in kind hierarchy item is cancelled in an ordering process, all the sub-items are automatically classed as cancelled. If a grouping hierarchy item is cancelled, only the grouping is classed as cancelled; the sub-items remain valid and are explicitly cancelled individually, if required.

(a) Hierarchy Relationship

A HierarchyRelationship is the relationship between a sub-item and a higher-level parent item in an item hierarchy, and includes a ParentItemID, a ParentItemSellerID, and a TypeCode. The ParentItemID is the reference to the parent item with the item number assigned by the buyer. The ParentItemID is of type GDT: BusinessTransactionDocumentItemID. The ParentItemSellerID is the reference to the parent item with the item number assigned by the seller. The ParentItemSellerID is of type GDT: BusinessTransactionDocumentItemID. The TypeCode represents the hierarchical relationship between the sub-item and its higher-level parent item. The TypeCode is of type GDT: BusinessTransactionDocumentItemHierarchyRelationshipTypeCode.

The ParentItemID is not changed once an item has been created. The ParentItemSellerID is not changed once an item has been created. Either the ParentItemID or the ParentItemSellerID is specified. The TypeCode is not changed once an item has been created.

(b) Purchase Order Item Product Information Package

The ProductInformation package 29550B groups together all the information for identifying, describing, and classifying a product in an ordering process. The ProductInformation package 29550B includes a Product entity 29582B and a ProductCategory entity 29584B. There is a 1:c relationship 29586B between the Item entity 29572B and the Product entity 29582B, and a 1:c relationship 29588B between the Item entity 29572B and the ProductCategory entity 29584B. The ProductInformation package 29550B is not used in grouping hierarchy items.

The Product includes the details about a product as generally understood from a commercial point of view in business documents. These are the details for identifying a product and product type, and the description of the product. The Product entity 29582B is of type GDT: BusinessTransactionDocumentProduct.

For limit items, the description (Note) can be used in the Product; the product number and ProductTypeCode are not used. The ordered product can be changed by the buyer only. The seller can only add a product number to a product description without product number or specify a product for a new item that he/she has proposed. The ProductTypeCode is not changed once an item has been created. With the exception of grouping hierarchy items, at least the product number or the product description (Note) is specified when a new item is created. If both the product number and description are specified, the description is merely additional information in the message and can be ignored by the recipient. In substitute product sub-items, the ProductTypeCode is the same as the parent item ProductTypeCode.

A product is either a tangible or intangible good, and is a part of the business activities of a company. It can be traded and contributes directly or indirectly to value added. In substitute product sub-items, the product is the substitute product proposed by the vendor for the product ordered in the associated substitute product hierarchy item.

The ProductCategory includes the details about a product category as generally understood from a commercial point of view in business transaction documents. The ProductCategory entity 29584B includes details for identifying the product category using an internal ID, a standard ID, and IDs assigned by involved parties. The ProductCategory entity 29584B is of type GDT: BusinessTransactionDocumentProductCategory. A product category is a division of products according to objective criteria. The product category is derived directly from the product if a product number is specified for the product. It can differ for the buyer and seller if they have classified the same product differently. This is allowed and should be tolerated by the systems involved.

(c) Purchase Order Item Price Information Package

The PriceInformation package 29552B groups together all the price information in a purchase order item. The PriceInformation package 29552B includes a Price entity 29590B and a ConfirmedPrice entity 29592B. There is a 1:c relationship 29594B between the Item entity 29572B and the Price entity 29590B, and a 1:c relationship 29596B between the Item entity 29572B and the ConfirmedPrice entity 29592B. The PriceInformation package 29552B is not used in grouping hierarchy, limit, and discount in kind items. The PriceInformation package 29552B for a purchase order item includes only prices; it does not contain any information about how the prices are calculated (pricing scales, and so on).

The Price is the purchase order price specified by the buyer. The Price entity 29590B includes the NetUnitPrice. The NetUnitPrice is the net price specified by the buyer for the base quantity (without tax or cash discount) of the product. The NetUnitPrice is of type GDT: Price.

The Price entity 29590B can be changed by the buyer. In BOM hierarchies, the following rules apply for the Price: (1) If the price is specified for the item at the top of the BOM hierarchy and not for the sub-items, this price applies; (2) If the price is specified for standard items (end nodes in the hierarchy tree) in the BOM hierarchy, these prices apply. The price of the entire BOM is the total of the individual prices; and (3) If a price is specified at different levels in the BOM hierarchy, the price that appears above all the others in the tree always applies. Differences between the total of the individual prices and the price at the next highest hierarchy level are permissible. These may be caused by discounts for the entire BOM. In substitute product sub-items, the Price can be used to transfer substitute product prices. The same rules apply here as for the Price in BOM hierarchies.

The ConfirmedPrice is the purchase order price confirmed by the seller. The ConfirmedPrice entity 29592B includes a NetUnitPrice, which is the net price (without tax or cash discount) confirmed by the seller for the base quantity of the product. The NetUnitPrice is of type GDT: Price. The ConfirmedPrice for the message type PurchaseOrderRequest is not used. The ConfirmedPrice for the message type PurchaseOrderChangeRequest is not used. In BOM and substitute product hierarchies, the same rules apply for the ConfirmedPrice as for the Price.

(d) Purchase Order Item Batch Package

The Batch package 29554B includes Batch entity 29598B. There is a 1:c relationship 29500C between the Item entity 29572B and the Batch entity 29598B. The Batch entity 29598B includes a PropertyValuation entity 29502C. There is a 1:cn relationship 29504C between the Batch entity 29598B and the PropertyValuation entity 29502C. The PropertyValuation entity 29502C includes a PropertyValues entity 29506C. There is a 1:1 relationship 29508C between the PropertyValuation entity 29502C and the PropertyValues entity 29506C.

The PropertyValues entity 29506C includes an AmountSpecification entity 29510C, a MeasureSpecification entity 29512C, a QuantitySpecification entity 29514C, a NumericSpecification entity 29516C, a FloatSpecification entity 29518C, an IntegerSpecification entity 29520C, a DateSpecification entity 29522C, a TimeSpecification entity 29524C, a DateTimeSpecification entity 29526C, a NameSpecification entity 29528C, an IndicatorSpecification entity 29530C, and an AttachmentWebAddress entity 29532C. There is a respective 1:cn relationship 29534C, 29536C, 29538C, 29540C, 29542C, 29544C, 29546C, 29548C, 29550C, 29552C, and 29554C between the PropertyValues entity 29506C and the AmountSpecification entity 29510C, the MeasureSpecification entity 29512C, the QuantitySpecification entity 29514C, the NumericSpecification entity 29516C, the FloatSpecification entity 29518C, the IntegerSpecification entity 29520C, the DateSpecification entity 29522C, the TimeSpecification entity 29524C, the DateTimeSpecification entity 29526C, the NameSpecification entity 29528C, and the IndicatorSpecification entity 29530C. There is a 1:c relationship 29556C between the PropertyValues entity 29506C and the AttachmentWebAddress entity 29532C.

(e) Purchase Order Item Configuration Package

The Configuration package 29556B includes a Configuration entity 29558C. There is a 1:c relationship 29560C between the Item entity 29572B and the Configuration entity 29558C.

(f) Purchase Order Item Party Package

The PurchaseOrderItemParty package 29558B includes a BuyerParty entity 29562C, a SellerParty entity 29563C, a ProductRecipientParty entity 29564C, a VendorParty entity 29566C, a ManufacturerParty entity 29568C, a BillToParty entity 29570C, a PayerParty entity 29572C, and a CarrierParty entity 29574C. There is a respective 1:c relationship 29575C, 29576C, 29577C, 29578C, 29580C, 29582C, 29584C and 29586C between the Item entity 29572B and the ProductRecipientParty entity 29564C, the VendorParty entity 29566C, the ManufacturerParty entity 29568C, the BillToParty entity 29570C, the PayerParty entity 29572C, and the CarrierParty entity 29574C. Each of the ProductRecipientParty entity 29564C, the VendorParty entity 29566C, the ManufacturerParty entity 29568C, the BillToParty entity 29570C, the PayerParty entity 29572C, and the CarrierParty entity 29574C includes the same elements as those described above for the BuyerParty entity 29546 as denoted by ellipses 29587C, 29588C, 29589C, 29590C, 29592C, 29594C, 29596C and 29598C.

(g) Purchase Order Item Location Package

The PurchaseOrderItemLocation package 29560B includes a ShipToLocation entity 29500D and a ShipFromLocation entity 29502D. There is a 1:c relationship 29504D between the Item entity 29572B and the ShipToLocation entity 29500D, and a 1:c relationship 29506D between the Item entity 29572B and the ShipFromLocation entity 29502D. Each of the ShipToLocation entity 29500D and the ShipFromLocation entity 29502D includes the same elements as those described above for the ShipToLocation 29544A as denoted by ellipses 29508D and 29510D.

(h) Purchase Order Item Delivery Information Package

The PurchaseOrderItemDeliveryInformation package 29562B includes a DeliveryTerms entity 29512D. There is a 1:c relationship 29514D between the Item entity 29572B and the DeliveryTerms entity 29512D. The DeliveryTerms entity 29512D includes an Incoterms entity 29516D, a PartialDelivery entity 29518D, a QuantityTolerance entity 29520D, a Transport entity 29522D, and a Description entity 29524D. There is a respective 1:c relationship 29526D, 29528D, 29530D, 29532D and 29534D between the DeliveryTerms entity 29512D and the Incoterms entity 29516D, the PartialDelivery entity 29518D, the QuantityTolerance entity 29520D, the Transport entity 29522D, and the Description entity 29524D.

(i) Purchase Order Item Business Transaction Document Reference Package

The BusinessTransactionDocumentReference package 29564B groups together all the references to business documents that are relevant for the PurchaseOrderItem and have a business relationship with the item, and includes a QuoteReference, a PurchaseContractReference, a SalesContractReference, an OriginPurchaseOrderReference, a BuyerProductCatalogueReference, and a SellerProductCatalogueReference. None of the entities in the BusinessTransactionDocumentReference package can be used in grouping hierarchy items.

If possible, individual items in business documents should be referenced in the purchase order messages from item level (quotation item 10 in quotation 4711 is directly referenced from purchase order item 1, for example). If an item assignment is not recognized, an entire document can be referenced (quotation 4711 is referenced in its entirety from purchase order item 1, for example). In this case, the recipient cannot demand that the item numbers in both documents be the same (that item 1 in purchase order 4712 be the same as item 1 in quotation 4711, for example). It is the responsibility of the recipient to try to make this assignment using other criteria that are not necessarily unique, such as the product number. References are only used for establishing relationships between different documents. If a reference has been provided, all the data relevant to the purchase order is still transferred from the document referenced in the purchase order message (the product number in a purchase order item is transferred even if the product number can be derived directly from a bid reference). The data in the purchase order message can differ in any number of ways from the referenced documents. The recipient is able to respond appropriately to such deviations.

The BusinessTransactionDocumentReference package 29564B includes a QuoteReference entity 29536D, a PurchaseContactReference entity 29538D, a SalesContractReference entity 29540D, an OriginPurchaseOrderReference entity 29542D, a BuyerProductCatalogueReference entity 29544D, and a SellerProductCatalogueReference entity 29546D. There is a 1:c relationship 29548D between the Item entity 29572B and the QuoteReference entity 29536D. There is a 1:cn relationship 29550D between the Item entity 29572B and the PurchaseContactReference entity 29538D. There is a 1:cn relationship 29552D between the Item entity 29572B and the SalesContractReference entity 29540D. There is a 1:c relationship 29554D between the Item entity 29572B and the OriginPurchaseOrderReference entity 29542D. There is a 1:c relationship 29556D between the Item entity 29572B and the BuyerProductCatalogueReference entity 29544D. There is a 1:c relationship 29558D between the Item entity 29572B and the SellerProductCatalogueReference entity 29546D.

A QuoteReference is a reference to a quotation or an item within a quotation. The QuoteReference entity 29536D is of type GDT: BusinessTransactionDocumentReference. A QuoteReference can reference one item, that is, one ItemID is permissible.

A PurchaseContractReference is a reference to a purchase contract or item in a purchase contract. The PurchaseContractReference entity 29538D is of type GDT: BusinessTransactionDocumentReference. In limit items, multiple contract references are possible; a maximum of one contract reference is permissible in all other item types. A PurchaseContractReference can reference one item only, that is, only one ItemID is permissible. Unless otherwise agreed, the seller is responsible for determining the correct SellerContractReference for a specified PurchaseContractReference.

A SalesContractReference is a reference to a sales contract or an item within a sales contract. The SalesContractReference entity 29540D is of type GDT: BusinessTransactionDocumentReference. A SalesContractReference can reference one item, that is, one ItemID is permissible. In limit items, multiple contract references are possible; a maximum of one contract reference is permissible in all other item types.

An OriginPurchaseOrderReference is a reference to the origin purchase order or to an item within the origin purchase order in a third-party deal. The OriginPurchaseOrderReference entity 29542D is of type GDT: BusinessTransactionDocumentReference. An OriginPurchaseOrderReference can reference one item, that is, one ItemID is permissible. The OriginPurchaseOrderReference is used only for third-party purchase orders. The OriginPurchaseOrderReference is used in all the purchase orders in a third-party deal, so that the seller can reference the original purchase order of the ProductRecipientParty with the OriginPurchaseOrderReference when the delivery is made.

A BuyerProductCatalogueReference is a reference to the buyer's product Catalogue or an item within the buyer's product catalogue. The BuyerProductCatalogueReference entity 29544D is of type GDT: CatalogueReference. A BuyerProductCatalogueReference can reference one item, that is, one ItemID is permissible. The BuyerProductCatalogueReference should be filled if a purchase order item refers to a Catalogue whose number and item numbers were assigned by the buyer. In the ordering process, the BuyerProductCatalogueReference can be used as a substitute product number if the product is defined in a Catalogue only rather than having its own master record.

A SellerProductCatalogueReference is a reference to the seller's product Catalogue or an item within the seller's product catalogue. The SellerProductCatalogueReference entity 29546D is of type GDT: CatalogueReference. A SellerProductCatalogueReference can reference one item, that is, one ItemID is permissible. The SellerProductCatalogueReference should always be filled if a purchase order item refers to a Catalogue whose number and item numbers were assigned by the seller. In the ordering process, the SellerProductCatalogueReference can be used as a substitute product number if the product is defined in a Catalogue only rather than having its own master record.

(j) Purchase Order Item Attachment Package

The PurchaseOrderItemAttachment package 29566B includes an Attachment entity 29560D. There is a 1:cn relationship 29562D between the Item entity 29572B and the Attachment entity 29560D.

(k) Purchase Order Item Description Package

The Description package 29568B groups together all the explanatory texts regarding a purchase order item. The Description package 29568B includes a Description entity 29564D and a ConfirmationDescription entity 29566D. There is a 1:c relationship 29568D between the Item entity 29572B and the Description entity 29564D, and there is a 1:c relationship 29570D between the Item entity 29572B and the ConfirmationDescription entity 29566D.

The Description is a natural-language text regarding a purchase order item, which is visible to business parties. The Description entity 29564D is of type GDT: Description. The Description can be used for all types of textual information about the purchase order item. An example is an accurate description of a fault in need of repair.

The ConfirmationDescription is a natural-language text regarding a purchase order item, which is visible to business parties. The ConfirmationDescription entity 29566D for the message type Purchase Order Request is of type GDT: Description. The ConfirmationDescription entity 29566D for the Message Type PurchaseOrderRequest is not used. The ConfirmationDescription entity 29566D for the message type PurchaseOrderChangeRequest is not used. The ConfirmationDescription can be used for all types of textual information about an item in an order confirmation. An example of this would be the seller's justification for rejecting a particular purchase order item.

(l) Purchase order Item Schedule Line Package

The ScheduleLine package 29570B groups together all the quantity and date information about a PurchaseOrderItem, and includes a ScheduleLine entity 29572D and a ConfirmedScheduleLine entity 29574D. There is a 1:n relationship 29576D between the Item entity 29572B and the ScheduleLine entity 29572D, and a 1:cn relationship 29578D between the Item entity 29572B and the ConfirmedScheduleLine entity 29574D.

ScheduleLine entity 29572D includes a DeliveryPeriod entity 29580D. There is a 1:1 relationship 29582D between the ScheduleLine entity 29572D and the DeliveryPeriod entity 29580D.

ConfirmedScheduleLine entity 29574D includes a DeliveryPeriod entity 29584D. There is a 1:1 relationship 29586D between the ConfirmedScheduleLine entity 29574D and the DeliveryPeriod entity 29584D.

There is no direct relationship between a ScheduleLine and a ConfirmedScheduleLine. This has the advantage that the case "10 pieces for 01/01 and 10 pieces for 02/01" ordered as "20 pieces for 02/01" can be confirmed simply and without interpretation on the part of the applications.

The ScheduleLine is a line containing the quantity and date of a performance schedule required by the buyer for a purchase order. The ScheduleLine entity 29572D is of type GDT: PurchaseOrderItemScheduleLine. The ScheduleLine includes an ID, a SellerID, a DeliveryPeriod and a Quantity. The ID is the ScheduleLine number assigned by the procurement system. The ID is of type GDT: ScheduleLineID. The SellerID is the ScheduleLine number assigned by the sales system. The SellerID is of type GDT: ScheduleLineID. The DeliveryPeriod is the period in which the buyer expects a product to be delivered or service provided. The DeliveryPeriod is of type GDT: DateTimePeriod. The Quantity is the purchase order quantity. The Quantity is of type GDT: Quantity.

Multiple ScheduleLines for a purchase order item with identical DeliveryPeriod are not permitted. All the ScheduleLines for a particular item use the same unit of measure. ScheduleLines is not used for grouping hierarchy items. In this case, the ScheduleLines is explicitly specified for all sub-items. ScheduleLines do not have to be specified for limit items. At least one ScheduleLine is specified for all other item types. Within a ScheduleLine, the quantity is not used for limit items; for all other types of items, the quantity is specified. In the ScheduleLines of sub-items for discount in kind and BOM hierarchy items, the DeliveryPeriod of all the sub-items is identical to the DeliveryPeriod of the relevant parent items. The DeliveryPeriod can be changed by buyers only. Sellers can specify a DeliveryPeriod only for new items they have proposed. In the ScheduleLines of substitute product sub-items, the DeliveryPeriod of all the sub-items is identical to the DeliveryPeriod of the relevant parent items. The quantities and confirmed quantities of the sub-items should be added to the quantities of the parent items; where deviations occur, the quantities of sub-items are regarded as the valid quantities. The ID is optional; a procurement system does not have to number the ScheduleLines. The SellerID is optional; a sales system does not have to number the ScheduleLines. The Quantity can be changed explicitly by the buyer and the seller.

The ConfirmedScheduleLine is a line containing the quantity and date of a performance schedule confirmed by the seller for a purchase order. The ConfirmedScheduleLine entity 29574D is of type GDT: PurchaseOrderItemScheduleLine. The ConfirmedScheduleLine includes an ID, a SellerID, a DeliveryPeriod, and a Quantity. The ID is the ConfirmedScheduleLine number assigned by the procurement system. The ID is of type GDT: ScheduleLineID. The SellerID is the ConfirmedScheduleLine number assigned by the sales system. The SellerID is of type GDT: ScheduleLineID. The DeliveryPeriod is the period in which the seller provides the buyer with confirmation of a delivery or the provision of a service. The DeliveryPeriod is of type GDT: DateTimePeriod. The Quantity is the quantity confirmed by the seller. The Quantity is of type GDT: Quantity.

Multiple ConfirmedScheduleLines are not permitted for a purchase order item with identical DeliveryPeriod. All the ConfirmedScheduleLines for a particular item use the same unit of measure. The same rules apply for the use of the ConfirmedScheduleLine for the various item types as described for the ScheduleLine.

For the message type PurchaseOrderRequest, the ConfirmedScheduleLine is not used. For the message type PurchaseOrderChangeRequest, the ConfirmedScheduleLine is not used.

Confirmation of a partial quantity does not mean cancellation of the remaining quantity. It simply means that the seller has agreed to this partial quantity only and has not yet made a decision about the remaining quantity. In order to explicitly cancel a remaining quantity, the seller reduces the quantity of the ScheduleLine (not that of the ConfirmedScheduleLine) accordingly. The SellerID is optional; a sales system does not have to number the ConfirmedScheduleLines.

(4) Message Data Type Purchase Order Cancellation Message

The message data type PurchaseOrderCancellationMessage groups together the business information that is relevant for sending a business document in a message and the PurchaseOrderCancellation object in the business document. The message data type PurchaseOrderCancellationMessage includes a PurchaseOrderCancellationMessage package 29602, which includes a PurchaseOrderCancellationMessage entity 29604, a BusinessDocumentMessageHeader package 29606 and a PurchaseOrderCancellation package 29608. The message data type PurchaseOrderMessage makes the structure available for the message types PurchaseOrderCancellationRequest and the relevant interfaces.

The MessageHeader package 29606 includes a MessageHeader entity 29610. There is a 1:c relationship 29612 between the PurchaseOrderCancellationMessage entity 29604 and the MessageHeader entity 29610. The ReferenceID element of the BusinessDocumentMessageHeader entity establishes the reference to the purchase order to be cancelled.

The MessageHeader entity 29610 includes a SenderParty entity 29614 and a RecipientParty entity 29616. There is a 1:c relationship 29618 between the MessageHeader entity 29610 and the SenderParty entity 29614. There is a 1:c relationship 29620 between the MessageHeader entity 29610 and the RecipientParty entity 29616. The SenderParty entity 29614 and the RecipientParty entity 29616 include the same elements as those described for the Party entity in the Purchase Order Message as denoted by ellipses 29622 and 29624.

A PurchaseOrderCancellation package 29608 groups together the PurchaseOrderCancellation data type, which is a buyer's request to a seller to cancel a purchase order. PurchaseOrderCancellation package 29608 includes a PurchaseOrderCancellation entity 29626. There is a 1:1 relationship 29628 between the PurchaseOrderCancellationMessage entity 29604 and the PurchaseOrderCancellation entity 29626. The PurchaseOrderCancellation entity 29626 includes an ID, which is a unique identifier specified by the buyer for the purchase order.

Figure 297Y:
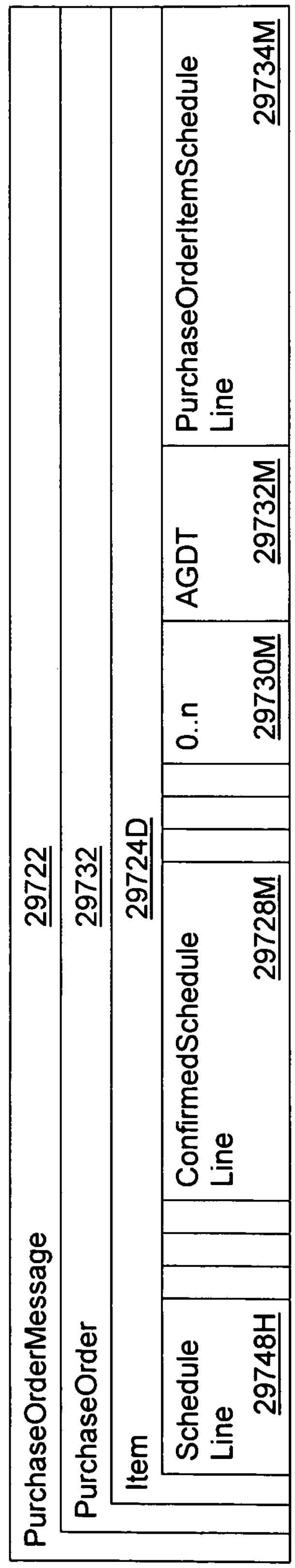

FIGS. 297A-Y depict the element structure for Purchase Order Interfaces. The element structure is similar to the data model, but provides additional information regarding the details of the interface. The element structure identifies the different packages 29700 in the interface, and represents the entities and/or attributes at various levels within the interface. As depicted in FIGS. 297A-Y, the interface for Purchase Order Interface includes seven levels 29702, 29704, 29706, 29708, 29710, 29712, and 29714. The element structure identifies the cardinality or occurrence 29716 between the entities and/or attributes of the interface, and provides information (i.e., type 29718 and name 29720) regarding the data type that provides the basis for the entity and/or attributes. The outermost package of this interface is an PurchaseOrderMessage package 29722, which includes PurchaserOrderMessages entity 29724 at the first level 29702. The PurchaserOrderMessages entity 29724 is of type message data type ("MDT") 29726 "Purchase Order Message" 29728.

The PurchaseOrderMessage package 29722 includes a MessageHeader package 29730 and a PurchaseOrder package 29732. The MessageHeader package 29730 includes MessageHeader entity 29734, which is of type AGDT 29738 BusinessDocumentMessageHeader 29740. There is one 29736 MessageHeader entity 29734 for each PurchaseOrderMessage entity 29724.

The MessageHeader entity 29734 includes a MessageID 29742, a ReferenceID 29750, and a CreationDateTime 29758. MessageID 29742 is of type GDT 29746 BusinessDocumentMessageID 29748. ReferenceID 29750 is of type GDT 29754 BusinessDocumentMessageID 29756. CreationDateTime 29758 is of type GDT 29762 DateTime 29764. There is one 29744 MessageID 29742 for each MessageHeader entity 29734, one or zero 29752 ReferenceID for each MessageHeader entity 29734, and one 29760 CreationDateTime 29758 for each MessageHeader entity 29734.

The MessageHeader entity 29734 also includes a SenderParty entity 29766 and a RecipientParty entity 29722A. The SenderParty entity 29766 is of type AGDT 29770 BusinessDocumentMessageHeaderParty 29772, and RecipientParty entity 29722A is of type AGDT 29726A BusinessDocumentMessageHeaderParty 29728A. There is one or zero 29768 SenderParty entity 29766 for each MessageHeader entity 29734. There is any number 29724A of RecipientParty entities 29722A for each MessageHeader entity 29734.

The SenderParty entity 29766 includes an InternalID 29774, a StandardID 29782, and a ContactPerson 29790. The InternalID 29774 is of type CDT 29778 PaymentInternalID 29780. StandardID 29782 is of type CDT 29786 PartyStandardID 29788. ContactPerson 29790 is of type CDT 29794 ContactPerson 29796. There is zero or one 29776 InternalID 29774 for each SenderParty entity 29766. There is any number 29784 of StandardID 29782 for each SenderParty entity 29766. There is zero or one 29792 ContactPerson 29790 for each SenderParty entity 29766.

The ContactPerson 29790 includes a BuyerID 29798, a SellerID 29706A, and an Address 29714A. The BuyerID 29798 is of type CDT 29702A ContactPersonPartyID 29704A. The SellerID 29706A is of type CDT 29710A ContactPersonPartyID 29712A. The Address 29714A is of type AGDT 29718A Address 29720A. There is respectively one or zero 29700A, 29708A, and 29716A BuyerID 29798, SellerID 29706A, and Address 29714A for each ContactPerson 29790.

The PurchaseOrder package 29732 includes a Party package 29710B, a Location package 29712B, a DeliveryInformation package 29714B, a PaymentInformation package 29716B, an Attachment package 29718B, a Description package 29720B, a FollowUpBusinessTransactionDocument package 29722B, and an Item package 29724B. The PurchaseOrder package 29732 also includes a PurchaseOrder entity 29730A. The PurchaseOrder entity 29730A is of type AGDT 29734A PurchaseOrder 29736A. There is one 29732A PurchaseOrder entity 29730A for each PurchaseOrderMessage entity 29724.

The PurchaseOrder entity 29730A includes an ID 29738A, a SellerID 29746A, a BuyerPostingDateTime 29754A, a BuyerLastChangeDateTime 29762A, a SellerPostingDateTime 29770A, a SellerLastChangeDateTime 29778A, an AcceptanceStatusCode 29786A, a Note 29794A, and an ItemListCompleteTransmissionIndicator 29702B. ID is of type GDT 29742A BusinessTransactionDocumentID 29744A. SellerID 29746A is of type GDT 29750A BusinessTransactionDocumentID 29752A. BuyerPostingDateTime 29754A is of type GDT 29758A DateTime 29760A. BuyerLastChangeDateTime 29762A is of type GDT 29766A DateTime 29768A. SellerPostingDateTime 29770A is of type GDT 29774A DateTime 29776A. SellerLastChangeDateTime 29778A is of type GDT 29782A DateTime 29784A. AcceptanceStatusCode 29786A is of type GDT 29790A AcceptanceStatusCode 29792A. Note 29794A is of type GDT 29798A Note 29700B. ItemListCompleteTransmissionIndicator 29702B is of type GDT 29706B CompleteTransmissionIndicator 29708B. There is one 29740A ID 29738A for each PurchaseOrder entity 29730A. There is respectively zero or one 29748A, 29756A, 29764A, 29772A, 29780A, 29788A, 29796A, and 29704B SellerID 29746A, BuyerPostingDateTime 29754A, BuyerLastChangeDateTime 29762A, SellerPostingDateTime 29770A, SellerLastChangeDateTime 29778A, AcceptanceStatusCode 29786A, Note 29794A, and ItemListCompleteTransmissionIndicator 29702B for each PurchaseOrder entity 29730A.

The Party package 29710B includes a BuyerParty entity 29726B, a SellerParty entity 29714C, a ProductRecipientParty entity 29724C, a VendorParty entity 29732C, a ManufacturerParty entity 29740C, a BillToParty entity 29748C, a PayerParty entity 29756C, and a CarrierParty entity 29764C.

The BuyerParty entity 29726B is of type AGDT 29730B BusinessTransactionDocumentParty 29732B. The SellerParty entity 29714C is of type AGDT 29720C BusinessTransactionDocumentParty 29722C. The ProductRecipientParty entity 29724C is of type AGDT 29728C BusinessTransactionDocumentParty 29730C. The VendorParty entity 29732C is of type AGDT 29736C BusinessTransactionDocumentParty 29738C. The ManufacturerParty entity 29740C is of type AGDT 29744C BusinessTransactionDocumentParty 29746C. The BillToParty entity 29748C is of type AGDT 29752C BusinessTransactionDocumentParty 29754C. The PayerParty entity 29756C is of type AGDT 29760C BusinessTransactionDocumentParty 29762C. The CarrierParty entity 29764C is of type AGDT 29768C BusinessTransactionDocumentParty 29770C. There is zero or one 29728B BuyerParty entity 29726B for each PurchaseOrder entity 29730A. There is zero or one 29716C SellerParty entity 29714C for each PurchaseOrder entity 29730A. There is zero or one 29726C ProductRecipientParty entity 29724C for each PurchaseOrder entity 29730A. There is zero or one 29734C VendorParty entity 29732C for each PurchaseOrder entity 29730A. There is zero or one 29742C ManufacturerParty entity 29740C for each PurchaseOrder entity 29730A. There is zero or one 29750C BillToParty entity 29748C for each PurchaseOrder entity 29730A. There is zero or one 29758C PayerParty entity 29756C for each PurchaseOrder entity 29730A. There is zero or one 29766C CarrierParty entity 29764C for each PurchaseOrder entity 29730A.

The BuyerParty entity 29726B includes a StandardID 29734B, a BuyerID 29742B, a SellerID 29750B, an Address 29758B, and a ContactPerson 29766B. The StandardID 29734B is of type CDT 29738B PartyStandardID 29740B. The BuyerID 29742B is of type CDT 29746B PartyPartyID 29748B. The SellerID 29750B is of type CDT 29754B PartyPartyID 29756B. The Address 29758B is of type AGDT 29762B Address 29764B. The ContactPerson 29766B is of type CDT 29770B ContactPerson 29772B. There are any number 29736B of StandardID 29734B for each BuyerParty 29726B. There is zero or one 29744B BuyerID 29742B for each BuyerParty 29726B. There is zero or one 29752B SellerID 29750B for each BuyerParty 29726B. There is zero or one 29760B Address 29758B for each BuyerParty 29726B. There is zero or one 29768B ContactPerson 29766B for each BuyerParty 29726B.

The ContactPerson 29766B includes a BuyerID 29790B, a SellerID 29798B, and an Address 29706C. The BuyerID is of type CDT 29794B ContactPersonPartyID 29796B. The SellerID 29798B is of type CDT 29702C ContactPersonPartyID 29704C. The Address 29706C is of type AGDT 29710C Address 29712C. There is zero or one 29792B BuyerID 29790B for each ContactPerson 29766B. There is zero or one 29700C SellerID 29798B for each ContactPerson 29766B. There is zero or one 29708C Address 29706C for each ContactPerson 29766B.

The Location package 29712B includes a ShipToLocation entity 29772C and a ShipFromLocation entity 29712D. The ShipToLocation entity 29772C is of type AGDT 29776C BusinessTransactionDocumentShipToLocation 29778C, and the ShipFromLocation entity 29712D is of type AGDT BusinessTransactionDocumentShipFromLocation 29718D. There is zero or one 29774C ShipToLocation entity 29772C for each PurchaseOrder entity 29730A, and zero or one 29714D ShipFromLocation entity 29712D for each PurchaseOrder entity 29730A.

The ShipToLocation entity 29772C includes a StandardID 29780C, a BuyerID 29788C, a SellerID 29796C, and an Address 29704D. There are any number 29782C of Standard ID 29780C for each ShipToLocation entity 29772C, zero or one 29790C BuyerID 29788C for each ShipToLocation entity 29772C, zero or one 29798C SellerID 29796C for each ShipToLocation entity 29772C, and zero or one 29706D Address 29704D for each ShipToLocation entity 29772C. The StandardID 29780C is of type CDT 29784C LocationStandardID 29786C. The BuyerID 29788C is of type CDT 29792C LocationPartyID 29794C. The SellerID 29796C is of type CDT 29700D LocationPartyID 29702D. The Address 29704D is of type AGDT 29708D Address 29710D.

The DeliveryInformation package 29714B includes a DeliveryTerms entity 29720D. The DeliveryTerms entity 29720D includes a DeliveryItemGroupID 29728D, a DeliveryPriorityCode 29736D, an Incoterms 29744D, a PartialDelivery 29760D, a QuantityTolerance 29780D, a MaximumLeadTimeDuration 29712E, a Transport 29720E, and a Description 29748E. The DeliveryItemGroupID 29728D has an occurrence of zero or one 29730D for each DeliveryTerms entity 29720D, and is of type GDT 29732D BusinessTransactionDocumentItemGroupID 29734D. The DeliveryPriorityCode 29736D has an occurrence of zero or one 29738D for each DeliveryTerms entity 29720D, and is of type GDT 29740D BusinessTransactionPriorityCode 29742D. The Incoterms 29744D has an occurrence of zero or one 29746D for each DeliveryTerms entity 29720D, and is of type GDT 29748D Incoterms 29750D. The PartialDelivery 29760D has an occurrence of zero or one 29762D for each DeliveryTerms entity 29720D, and is of type AGDT 29764D PartialDelivery 29766D. The QualityTolerance 29780D has an occurrence of zero or one 29782D for each DeliveryTerms entity 29720D, and is of type AGDT 29784D QuantityTolerance 29786D. The MaximumLeadTimeDuration 29712E has an occurrence or zero or one 29714E for each DeliveryTerms entity 29720D, and is of type GDT 29716E Duration 29718E. The Transport 29720E has an occurrence of zero or one 29722E for each DeliveryTerms entity 29720D. The Description 29748E has an occurrence of zero or one 29750E for each DeliveryTerms entity 29720D, and is of type GDT 29752E Description 29754E.

The Incoterms entity 29744D includes a ClassificationCode 29752D and a TransferLocationName 29756D. There is one 29754D ClassificationCode 29752D for each Incoterm 29744D, and zero or one 29758D TransferLocationName 29756D for each Incoterm 29744D.

The PartialDelivery 29760D includes a MaximalNumber 29768D and an UnlimitedIndicator 29772D. There is zero or one 29770D MaximalNumber 29768D for each PartialDelivery 29760D, and zero or one 29774D UnlimitedIndicator 29772D for each PartialDelivery 29760D. The UnlimitedIndicator 29772D is of type GDT 29776D UnlimitedIndicator 29778D.

The QualityTolerance 29780D includes an OverPercent 29788D, an OverPercentUnlimitedIndicator 29796D, and an UnderPercent 29704E. The OverPercent 29788D is of type GDT 29792D Percent 29794D, the OverPercentUnlimitedIndicator 29796D is of type GDT 29700E UnlimitedIndicator 29702E, and the UnderPercent 29704E is of type GDT 29708E Percent 29710E. There is zero or one 29790D Overpercent 29788D for each QualityTolerance 29780D, zero or one 29798D OverPercentUnlimitedIndicator 29796D for each QualityTolerance 29780D, and zero or one 29706E UnderPercent 29704E for each QualityTolerance 29780D.

The Transport 29772E includes a ServiceLevelCode 29724E, a ModeCode 29732E, and a MeansDescriptionCode 29740E. The ServiceLevelCode 29724E has an occurrence of zero or one 29726E for each Transport 29720E, and is of type GDT 29728E TransportServiceLevelCode 29730E. The ModeCode 29732E has an occurrence of zero or one 29734E for each Transport 29720E, and is of type GDT 29736E TransportModeCode 29738E. The MeansDescriptionCode 29740E has an occurrence of zero or one 29742E for each Transport 29720E, and is of type GDT 29744E TransportMeansDescriptionCode 29746E.

The Description 29748E includes a LanguageCode 29756E. There is one 29758E LanguageCode 29756E for each Description 29748E.

The DeliveryInformation package 29714B also includes a CashDiscountTerms 29758E. The CashDiscountTerms 29758E is of type AGDT 29762E CashDiscountTerms 29764E. There is zero or one 29760E CashDiscountTerms 29758E for each PurchaseOrder 29730A.

The CashDiscountTerms 29758E includes a PaymentBaseLineDate 29766E, a MaximumCashDiscount 29774E, a NormalCashDiscount 29790E, and a FullPaymentDueDaysValue 29710F. The PaymentBaseLineDate 29766E is of type GDT 29770E Date 29772E. There is zero or one 29768E PaymentBaseLineDate 29766E for each CashDiscountTerms 29758E. The MaximumCashDiscount 29774E is of type GDT 29778E CashDiscount 29780E. There is zero or one 29776E MaximumCashDiscount 29774E for each CashDiscountTerms 29758E. The NormalCashDiscount 29790E is of type GDT 29794E CashDiscount 29796E. There is zero or one 29792E NormalCashDiscount 29790E for each CashDiscountTerms 29758E. There is zero or one 29712F FullPaymentDueDaysValue 2971OF for each CashDiscountTerms 29758E.

The MaximumCashDiscount 29774E includes a DaysValue 29782E and a Percent 29784E. There is one 29783E DaysValue 29782E for each MaximumCashDiscount 29774E, and one 29785E Percent 29784E for each MaximumCashDiscount 29774E. Percent 29784E is of type GDT 29786E Percent 29788E.

The NormalCashDiscount 29790E includes a DaysValue 29798E and a Percent 29702F. There is one 29700F DaysValue 29798E for each NormalCashDiscount 29790E, and one 29704F Percent 29702F for each NormalCashDiscount 29790E. Percent 29702F is of type GDT 29706F Percent 29708F.

The PaymentInformation package 29716B includes a PaymentForm entity 29714F. There is one or zero 29716F PaymentForm entity 29714F for each PurchaseOrder entity 29730A.

The PaymentForm entity 29714F includes a Code 29718F and a PaymentCard 29726F. There is one occurrence 29720F of Code 29718F for each PaymentForm entity 29714F, and there is zero or one occurrence 29728F of PaymentCard 29726F for each PaymentForm entity 29714F. The Code 29718F is of type GDT 29722F PaymentFormCode 29724F. The PaymentCard 29726F is of type AGDT 29730F PaymentCard 29732F.

The PaymentCard 29732F includes an ID 29734F, a ReferenceID 29742F, a SequenceID 29746F, a Holder 29750F, and an ExpirationDate 29754F. There is one 29736F ID 29734F for each PaymentCard 29726F, zero or one 29744F ReferenceID 29742F for each PaymentCard 29726F, zero or one 29748F SequenceID 29746F for each PaymentCard 29726F, zero or one 29752F Holder 29750F for each PaymentCard 29726F, and one 29756F ExpirationDate 29754F for each PaymentCard 29726F. The ID is of type GDT 29738F PaymentCardID 29740F. The ExpirationDate 29754F is of type GDT 29758F Date 29760F.

The Attachment package 29718B includes an Attachment entity 29762F, of type GDT 29766F Attachment 29768F. There are any number 29764F of Attachment entities 29762F for each PurchaseOrder entity 29730A.

The Attachment entity 29762F includes an ID 29770F and a Filename 29774F. There is one 29772F ID 29770F for each Attachment entity 29762F, and zero or one 29776F Filename 29774F for each Attachment entity 29762F.

The Description package 29720B includes a Description entity 29778F and a ConfirmationDescription entity 29790F. There is zero or one occurrence 29780F of the Description entity 29778F for each PurchaseOrder entity 29730A, and zero or one 29792F ConfirmationDescription entity 29790F for each Attachment entity 29762F. The Description 29778F is of type GDT 29782F Description 29784F. The ConfirmationDescription 29790F is of type GDT 29794F Description 29796F. The Description 29778F includes a LanguageCode 29786F, and there is one LanguageCode 29786F for each Description 29778F. Similarly, the ConfirmationDescription 29790F includes a LanguageCode 29798F, and there is one LanguageCode 29798F for each ConfirmationDescription 29790F.

The FollowUpBusinessTransactionDocument 29722B includes a FollowUpPurchaseOrderConfirmation 29702G, a FollowUpDespatchedDeliveryNotification 29714G, a FollowUpServiceAcknowledgementRequest 29726G, and a FollowUpInvoiceRequest 29742G. There is zero or one 29704G FollowUpPurchaseOrderConfirmation 29702G for each PurchaseOrder 29730A. There is zero or one 29716G FollowUpDespatchedDeliveryNotification 29714G for each PurchaseOrder 29730A. There is zero or one 29728G FollowUpServiceAcknowledgementRequest 29726G for each PurchaseOrder 29730A. There is zero or one 29744G FollowUpInvoiceRequest 29742G for each PurchaseOrder 29730A.

The FollowUpPurchaseOrderConfirmation 29702G includes a RequirementCode 29706G, which is of type GDT 29710G FollowUpMessageRequirementCode 29712G. There is one RequirementCode 29706G for each FollowUpPurchaseOrderConfirmation 29702G.

The FollowUpDespatchedDeliveryNotification 29714G includes a RequirementCode 29718G, which is of type GDT 29722G FollowUpMessageRequirementCode 29724G. There is one 29720G RequirementCode 29718G for each FollowUpDespatchedDeliveryNotification 29714G.

The FollowUpServiceAcknowledgementRequest 29726G includes a RequirementCode 29734G, which is of type GDT 29738G FollowUpMessageRequirementCode 29740G. There is one 29736G RequirementCode 29734G for each FollowUpServiceAcknowledgementRequest 29726G.

The FollowUpInvoiceRequest 29742G includes a RequirementCode 29746G, which is of type GDT 29750G FollowUpMessageRequirementCode 29752G. There is one 29748G RequirementCode 29746G for each FollowUpInvoiceRequest 29742G. The FollowUpInvoiceRequest 29742G also includes an EvaluatedReceiptSettlementIndicator 29754G, which is of type GDT 29758G EvaluatedReceiptSettlementIndicator 29760G. There is zero or one 29756G EvaluatedReceiptSettlementIndicator 29754G for each FollowUpInvoiceRequest 29742G.

The Item package 29724B includes an Item entity 29762G, which is of type AGDT 29766G PurchaseOrderItem 29768H. There are any number 29764G of Item entities 29762 for each PurchaseOrder entity 30A. The Item entity 29762G includes an ID 29770G, a SellerID 29778G, an ActionCode 29778G, an AcceptanceStatusCode 29794G, an UnplannedItemPermissionCode 29702H, and a HierarchyRelationship 29710H. ID 29770G has an occurrence of zero or one 29772G for each Item entity 29762G, and is of type GDT 29774G BusinessTransactionDocumentItemID 29776G. SellerID 29778G has an occurrence of zero or one 29780G for each Item entity 29762G, and is of type GDT 29782G BusinessTransactionDocumentItemID 29784G. ActionCode 29786G has an occurrence of one 29788G for each Item entity 29762G, and is of type GDT 29790G ActionCode 29792G. AcceptanceStatusCode 29794G has an occurrence of zero or one 29796G for each Item entity 29762G, and is of type GDT 29798G AcceptanceStatusCode 29700H. UnplannedItemPermissionCode 29702H has an occurrence of zero or one 29704H for each Item entity 29762G, and is of type GDT 29706H UnplannedItemPermissionCode 29708H. HierarchyRelationship 29710H has an occurrence of zero or one 29712H.

The HierarchyRelationship 29710H includes a ParentItemID 29714H, a ParentItemSellerID 29722H, and a TypeCode 29730H. There is zero or one 29716H ParentItemID 29714H for each HierarchyRelationship 29710H. There is zero or one 29724H ParentItemSellerID 29722H for each HierarchyRelationship 29710H. There is one 29732H TypeCode 29730H for each HierarchyRelationship 29710H. ParentItemID 29714H is of type GDT 29718H BusinessTransactionDocumentItemID 29720H. ParentItemSellerID 29722H is of type GDT 29726H BusinessTransactionDocumentItemID 29728H. TypeCode 29730H is of type GDT 29734H BusinessTransactionDocumentItemHierarchyRelationshipTypeCode 29736H.

The Item package 29724B includes a ProductInformation package 29738H, a PriceInfonnation package 29739H, a Party package 29740H, a Location package 29741H, a DeliveryInformation package 29742H, a BusinessTransactionDocumentReference package 29743H, an Attachment package 29744H, a Description package 29746H, and a ScheduleLine package 29748H.

The ProductInformation package 29738H includes a Product entity 29750H and a ProductCategory entity 29790H. The Product entity 29750H is of type GDT 29754H BusinessTransactionDocumentProduct 29756H, and there is one or zero 29752 Product entity 29750H for each Item entity 29762G. The ProductCategory entity 29790H is of type GDT 29794H BusinessTransactionDocumentProductCategory 29796H, and there is one or zero 29792H ProductCategory entity 29790H for each Item entity 29762G.

The Product entity 29750H includes a StandardID 29754H, a BuyerID 29758H, a SellerID 29762H, a ManufacturerID 29766H, a TypeCode 29774H, and a Note 29782H. The StandardID 29754 is of type CDT 29756H ProductStandardID 29757H. The BuyerID 29758H is of type CDT 29760H ProductPartyID 29761H. The SellerID 29762H is of type CDT 29764H ProductPartyID 29765H. The ManufacturerID 29766H is of type CDT 29770H ProductPartyID 29772H. The TypeCode 29774H is of type GDT 29778H ProductTypeCode 29780H. The Note 29782H is of type GDT 29786H Note 29788H. There are any number 29755H of StandardID 29754H for each Product entity 29750H. There is zero or one 29759H BuyerID 29758H for each Product entity 29750H. There is zero or one 29763H SellerID 29762H for each Product entity 29750H. There is zero or one 29768H ManufacturerID 29766H for each Product entity 29750H. There is zero or one 29776H TypeCode 29774H for each Product entity 29750H. There is zero or one 29784H Note 29782H for each Product entity 29750H.

The ProductCategory entity 29790H includes a StandardID 29798H, a BuyerID 29706I, and a SellerID 29714I. There is any number of StandardID 29798H for each ProductCategory entity 29790H. There is zero or one 29708I BuyerID 29706I for each ProductCategory entity 29790H. There is zero or one 29716I SellerID 29714I for each ProductCategory entity 29790H. The StandardID is of type CDT 29702I ProductCategoryStandardID 29704I. The BuyerID 29706I is of type CDT 29710I ProductCategoryPartyID 29712I. The SellerID 29714I is of type CDT 29718I ProductCategoryPartyID 29710I.

The PriceInformation package 29739H includes a Price entity 29722I. There is zero or one 29728I Price entity 29722I for each Item entity 29762G.

The Price entity 29722I includes a NetUnitPrice 29726I. There is zero or one 29728I NetUnitPrice 29726I for each Price entity 29722I. The NetUnitPrice 29726I is of type AGDT 29730I Price 29732I.

The NetUnitPrice 29726I includes an Amount 29734I and a BaseQuantity 29744I. There is one 29736I Amount 29734I for each NetUnitPrice 29726I, and one 29746I BaseQuantity 29744I for each NetUnitPrice 29726I. Amount 29734I is of type GDT 29738I Amount 29740I, and BaseQuantity 29744I is of type GDT 29748I Quantity 29750I. Amount 29734I includes a CurrencyCode 29742I, and there is one CurrencyCode 29742I for each Amount 29734I. BaseQuantity 29744I includes a UnitCode 29752I, and there is one UnitCode 29752I for each BaseQuantity 29744I.

The PriceInformation package 29739H also includes a ConfirmedPrice entity 29756I. There is zero or one 29758I ConfirmedPrice 29756I for each Item entity 29762G. The ConfirmedPrice entity 29756I includes a NetUnitPrice 29760I, which is of type AGDT 29764I Price 297766I. There is zero or one 29762I NetUnitPrice 29760I for each ConfirmedPrice entity 29756I.

The NetUnitPrice 29760I includes an Amount 29768I and a BaseQuality 29782I. The Amount is of type GDT 29772I Amount & 74I, and there is one 29770I Amount & 68I for each NetUnitPrice 29760I. The BaseQuality 29782I is of type GDT 29786I Quantity 29788I, and there is one 29784I BaseQuality 29782I for each NetUnitPrice 29760I. The Amount 29768 includes a CurrencyCode 29776I, and there is one 29778I CurrencyCode 29776I for each Amount 29768I. The BaseQuality 29782I includes a UnitCode 29790I, and there is one 29792I UnitCode 29790I for each BaseQuality 29782I.

The Party package 29740H includes a BuyerParty entity 29794I, a SellerParty entity 29702J, a ProductRecipientParty entity 29710J, a VendorParty entity 29718J, a ManufacturerParty entity 29726J, a BillToParty entity 29734J, a PayerParty entity 29742J, and a CarrierParty entity 29750J. The BuyerParty entity 29794I has an occurrence of zero or one 29796I for each Item entity 29762G, and is of type AGDT 29798I BusinessTransactionDocumentParty 29700J. The SellerParty entity 29702J has an occurrence of zero or one 29704J for each Item entity 29762G, and is of type AGDT 29706J BusinessTransactionDocumentParty 29708J. The ProductRecipientParty entity 29710J has an occurrence of zero or one 29712J for each Item entity 29762G, and is of type AGDT 29714J BusinessTransactionDocumentParty 29716J. The VendorParty entity 29718J has an occurrence of zero or one 29720J for each Item entity 29762G, and is of type AGDT 29722J BusinessTransactionDocumentParty 29724J. The ManufacturerParty entity 29726J has an occurrence of zero or one 29728J for each Item entity 29762G, and is of type AGDT 29730J BusinessTransactionDocumentParty 29732J. The BillToParty entity 29734J has an occurrence of zero or one 29736J for each Item entity 29762G, and is of type AGDT 29738J BusinessTransactionDocumentParty 29740J. The PayerParty entity 29742J has an occurrence of zero or one 29744J for each Item entity 29762G, and is of type AGDT 29746J BusinessTransactionDocumentParty 29748J. The CarrierParty entity 29750J has an occurrence of zero or one 29752J for each Item entity 29762G, and is of type AGDT 29754J BusinessTransactionDocumentParty 29756J.

The Location package 29741H includes a ShipToLocation 29758H and a ShipFromLocation 29766J. The ShipToLocation 29758J is of type AGDT 29762J BusinessTransactionDocumentShipToLocation 29764J, and there is zero or one 29760J ShipToLocation 29764J for each Item entity 29762G. The ShipFromLocation 29766J is of type AGDT 29770J BusinessTransactionDocumentShipFromLocation 29772J, and there is zero or one 29768H ShipFromLocation 29766J for each Item entity 29762G.

The DeliveryInformation package 29742H includes DeliveryTerms 29774J. There is zero or one 29776J DeliveryTerms 29774J for each Item entity 29762G. The DeliveryTerms 29774J is of type AGDT 29778J DeliveryTerms 29780J.

The BusinessTransactionDocumentReference package 29743H includes a QuoteReference 29782J, a PurchaseContractReference 29706K, a SalesContractReference 29730K, an OriginPurchaseOrderReference 29754K, a BuyerProductCatalogueReference 29778K, and a SellerProductCatalogueReference 29702L. There is one or zero 29784J QuoteReference 29782J for each Item entity 29762G. There is any number of PurchaseContractReference 29706K for each Item entity 29762G. There is any number of SalesContractReference 29730K for each Item entity 29762G. There is zero or one 29756K OriginPurchaseOrderReference 29754K for each Item entity 29762G. There is zero or one 29780K BuyerProductCatalogueReference 29778K for each Item entity 29762G. There is zero or one 29704L SellerProductCatalogueReference 29702L for each Item entity 29762G.

QuoteReference 29782J is of type AGDT 29786J BusinessTransactionDocumentReference 29788J. QuoteReference 29782J includes an ID 29790J and an ItemID 29798J. There is one ID for each QuoteReference 29782J, and any number of ItemID 29798J for each QuoteReference 29782J. The ID is of type GDT 29794J BusinessTransactionDocumentID 29796J, and the ItemID 29798J is of type GDT 29702K BusinessTransactionDocumentItemID 29704K.

PurchaseContractReference 29706K is of type AGDT 29710K BusinessTransactionDocumentReference 29712K. PurchaseContractReference 29706K includes an ID 29714K, which is of type GDT 29718K BusinessTransactionDocumentID, and an ItemID 29722, which is of type BusinessTransactionDocumentItemID 29728K. There is one 29716K ID for each PurchaseContractReference 29706K, and any number of ItemID 29722K for each PurchaseContractReference 29706K.

SalesContractReference 29730K is of type AGDT 29734K BusinessTransactionDocumentReference 29736K. SalesContractReference 29730K includes an ID 29738K and an ItemID 29746K. There is one ID 29738K for each SalesContractReference 29730K, and any number of ItemID 29746K for each SalesContractReference 29730K. ID is of type GDT 29742K BusinessTransactionDocument ID 29744K, and ItemID 29746K is of type BusinessTransactionDocumentReference 29760K.

OriginPurchaseOrderReference 29754K is of type AGDT 29758K BusinessTransactionDocumentReference 29760K. OriginPurchaseOrderReference 29754K includes an ID 29762K, which is of type GDT BusinessTransactionDocumentID, and an ItemID 29770K, which is of type GDT 29774K BusinessTransactionDocumentItemID 29776K. There is one 29764K ID 29762K for each OriginPurchaseOrderReference 29754K, and any number 29772K of ItemID 29770K for each OriginPurchaseOrderReference 29754K.

BuyerProductCatalogueReference 29778K is of type AGDT 29782K CatalogueReference 29784K. BuyerProductCatalogueReference 29778K includes an ID 29786K and an ItemID 29794K. There is one 29788K ID 29786K for each BuyerProductCatalogueReference 29778K, and any number 29796K of ItemID 29794K for each BuyerProductCatalogueReference 29778K. ID is of type GDT 29790K CatalogueID 29792K, and ItemID 29794K is of type GDT 29798K CatalogueItemID 29700L.

SellerProductCatalogueReference 29702L is of type AGDT 29706L CatalogueReference 29708L. SellerProductCatalogueReference 29702L includes an ID 29710L and an ItemID 29718L. There is one 29712L ID 29710L for each SellerProductCatalogueReference 29702L, and any number 29720L of ItemID 29718L for each SellerProductCatalogueReference 29702L. ID is of type GDT 29714L CatalogueID 29716L, and ItemID 29718L is of type GDT 29722L CatalogueItemID 29724L.

The Attachment package 29744H includes an Attachment entity 29726L, which is of type AGDT 29732L Attachment 29734L. There is any number 29728L of Attachment entities 29726L for each Item entity 29762G.

The Description package 29746H includes a Description entity 29736L and a ConfirmationDescription entity 29748L. There is one or zero 29738L Description entity 29736L for each Item entity 29762G, and one or zero 29750L ConfirmationDescription entity 29748L for each Item entity 29762G. Description 29736L is of type GDT 29740L Description 29742L, and ConfirmationDescription 29748L is of type GDT 29752L Description 29754L. Description 29736L includes a LanguageCode 29744L, and there is one 29746L LanguageCode 29744L for each Description 29736L. ConfirmationDescription 29748L includes a LanguageCode 29756L, and there is one 29758L LanguageCode 29756L for each ConfirmationDescription 29748L.

The ScheduleLine package 29748H includes a ScheduleLine entity 29760L and a ConfirmedScheduleLine entity 29728M. There is any number 29762L of ScheduleLine entity 29760L for each Item entity 29762G, and any number 29730M of ConfirmedScheduleLine entity 29728M for each Item entity 29762G. ScheduleLine entity 29760L is of type AGDT 29764L PurchaseOrderItemScheduleLine 29766L, and ConfirmedScheduleLine entity 29728M is of type AGDT 29732M PurchaseOrderItemScheduleLine 29734M. ScheduleLine entity 29760L includes an ID 29768L, a SellerID 29776L, a DeliveryPeriod 29784L, and a Quantity 29716M. ID 29768L is of type GDT 29772L BusinessTransactionDocumentItemScheduleLineID 29774L. There is one or zero 29770L ID 29768L for each ScheduleLine 29760L. SellerID 29776L is of type GDT 29780L BusinessTransactionDocumentItemScheduleLineID 29782L. There is one or zero 29778L SellerID 29776L for each ScheduleLine 29760L. DeliveryPeriod 29784L is of type AGDT 29788L DateTimePeriod 29790L. There is one 29786L DeliveryPeriod 29784L for each ScheduleLine 29760L. Quantity 29716M is of type GDT 29720M Quantity 29722M. There is one or zeero 29718M Quantity 29716M for each ScheduleLine 29760L.

DeliveryPeriod 29784L includes a StartDateTime 29792L, an EndDateTime 29700M, and a Duration 29708M. StartDateTime 29792L is of type GDT 29796L DateTime 29798L, EndDateTime 29700M is of type GDT 29704M DateTime 29706M, and Duration 29708M is of type GDT 29712M Duration 29714M. There is a respective one or zero 29794L, 29702M, and 29710M StartDateTime 29792L, EndDateTime 29700M, and Duration 29708M for each DeliveryPeriod 29784L.

d) Service Acknowledgement Interfaces

In B2B processes, service acknowledgement interfaces are required for sending services entered by the seller so that they may be acknowledged by the buyer. Traditional methods of communication in an ordering process, such as mail or fax, are cost intensive, prone to error, and relatively slow, since data has to be entered manually. Electronic communication between the procurement and sales system largely eliminates such problems. Service acknowledgement interfaces directly integrate the applications that implement the interfaces and form a basis for mapping data to widely-used standard formats, such as PIDX. More than just a simple interface structure, the service acknowledgement interfaces define underlying corporate significance and, at the same time, dispense with the need to exchange proprietary information in straightforward purchasing processes. In this way, applications that implement the service acknowledgement interfaces may be integrated without the need for complex project work.

(1) Message Choreography

Figure 298:
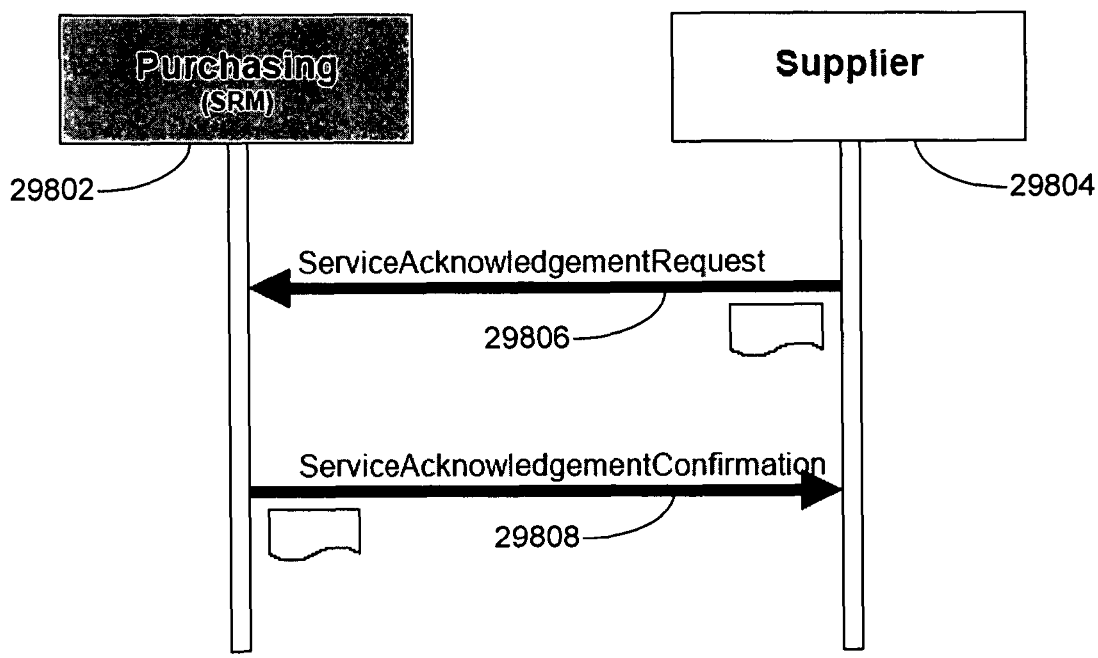
FIG. 298 depicts the message choreography for the Service Acknowledgement interfaces in accordance with methods and systems consistent with the present invention.
Figure 299A:
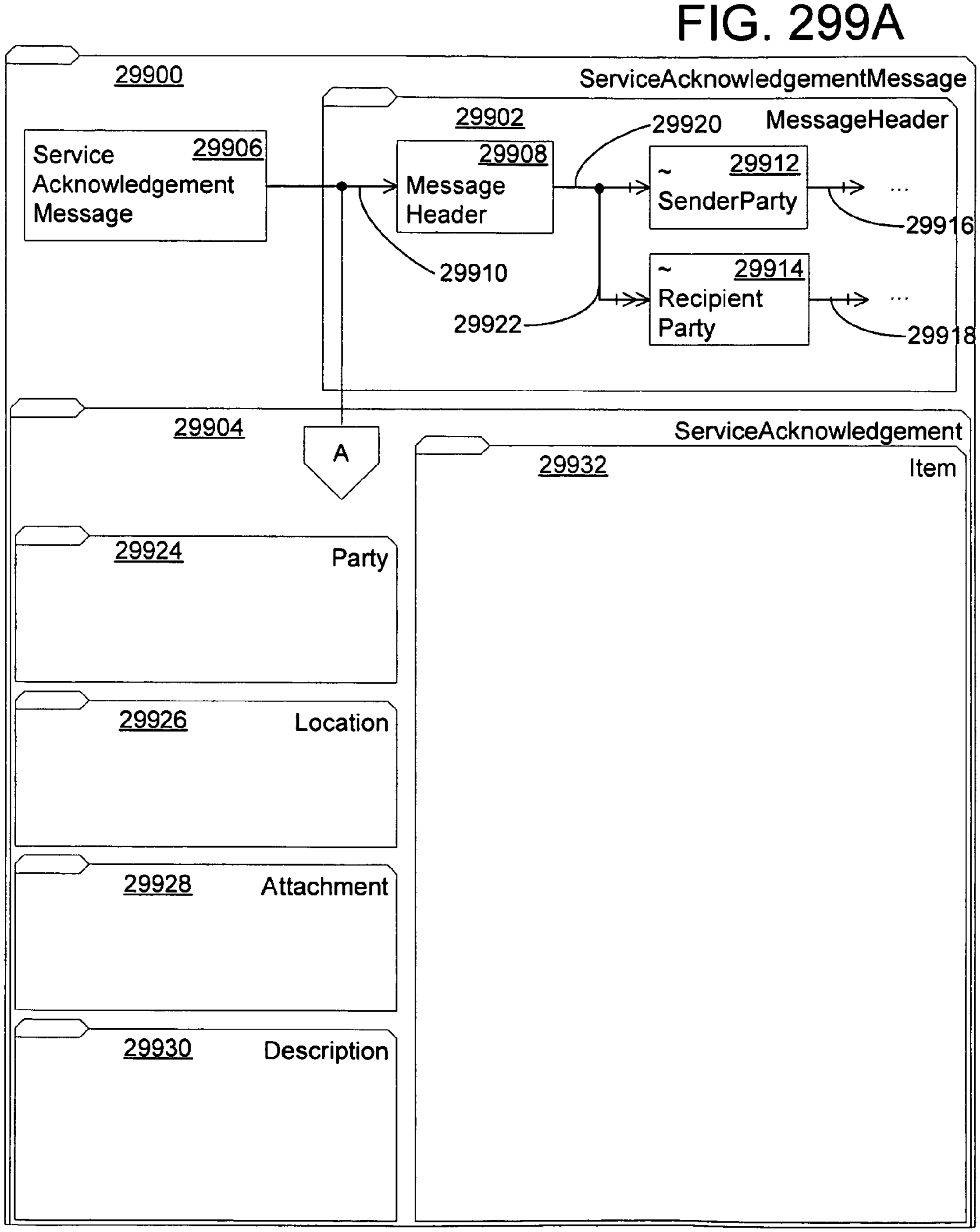
FIGS. 299A-J depict the data model for the Service Acknowledgement interfaces in accordance with methods and systems consistent with the present invention.
Figure 299B:
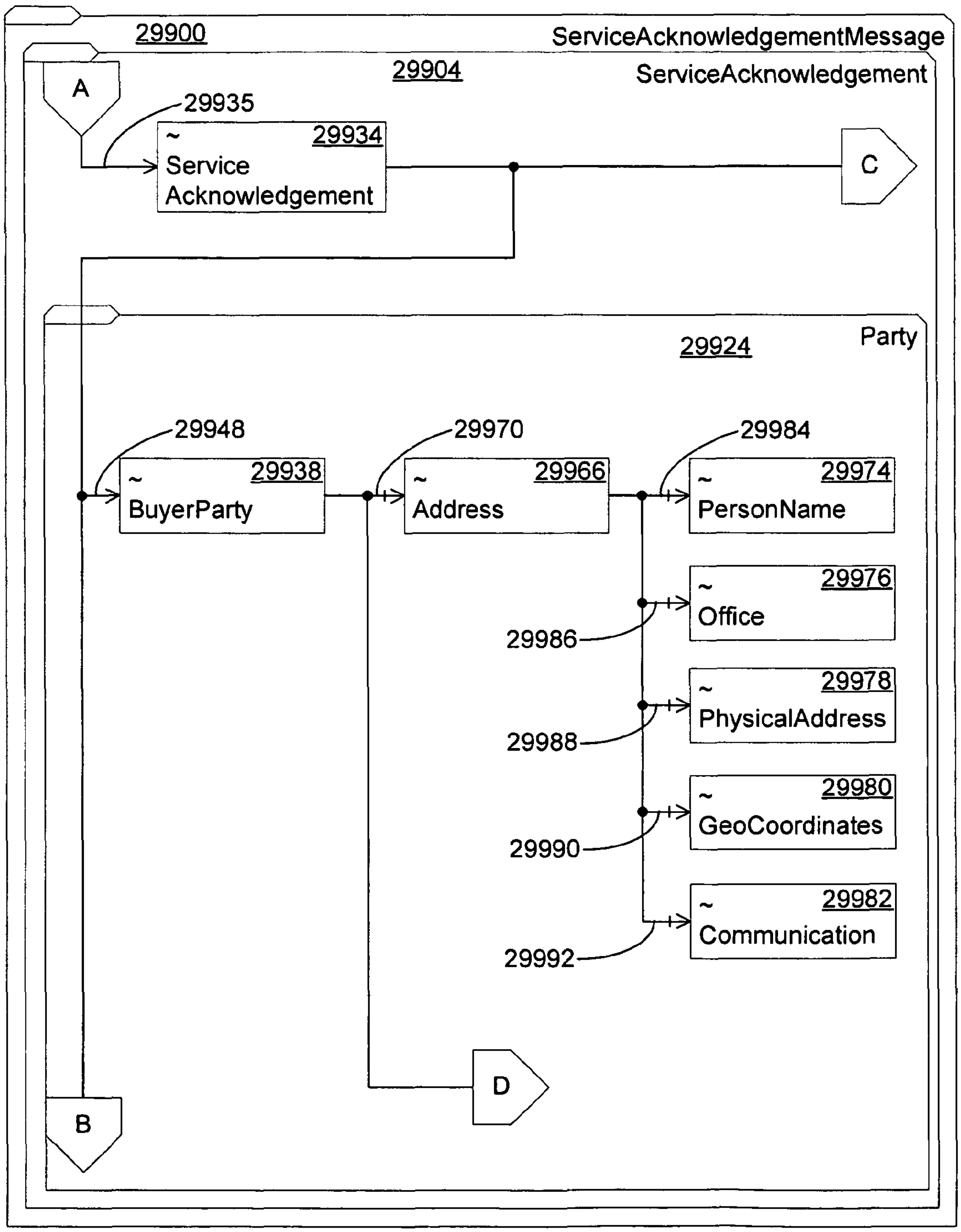
Figure 299C:
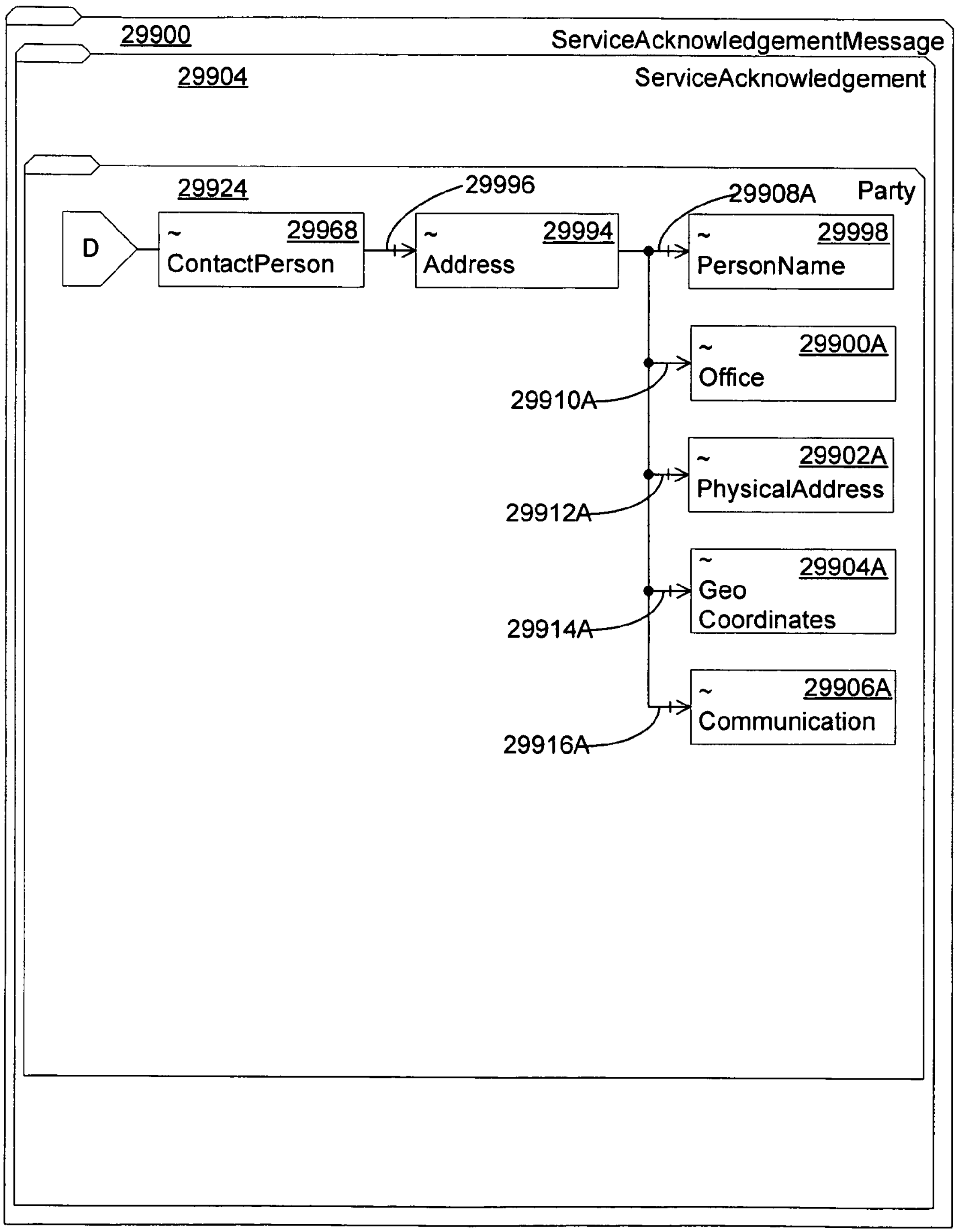
Figure 299D:
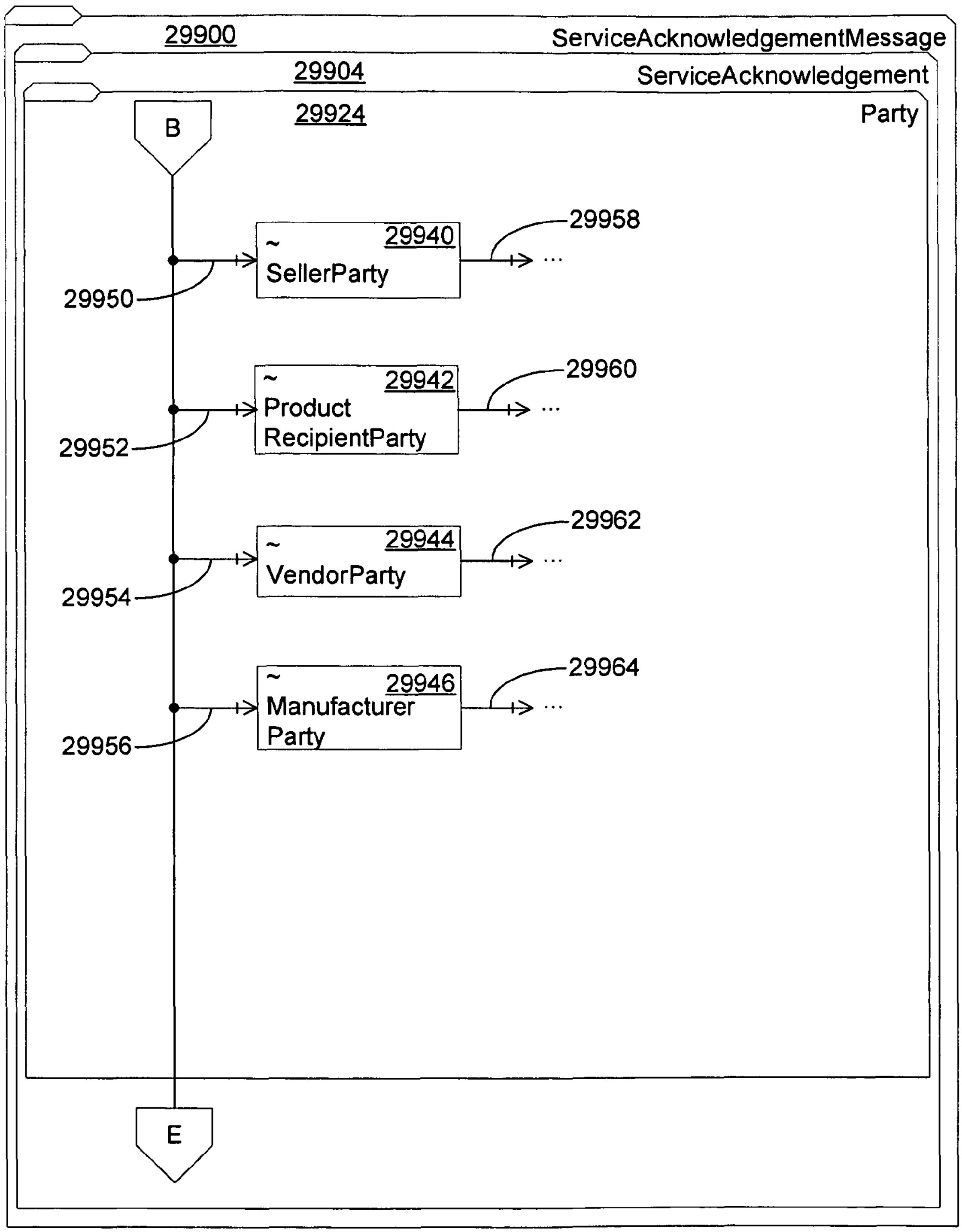
Figure 299E:
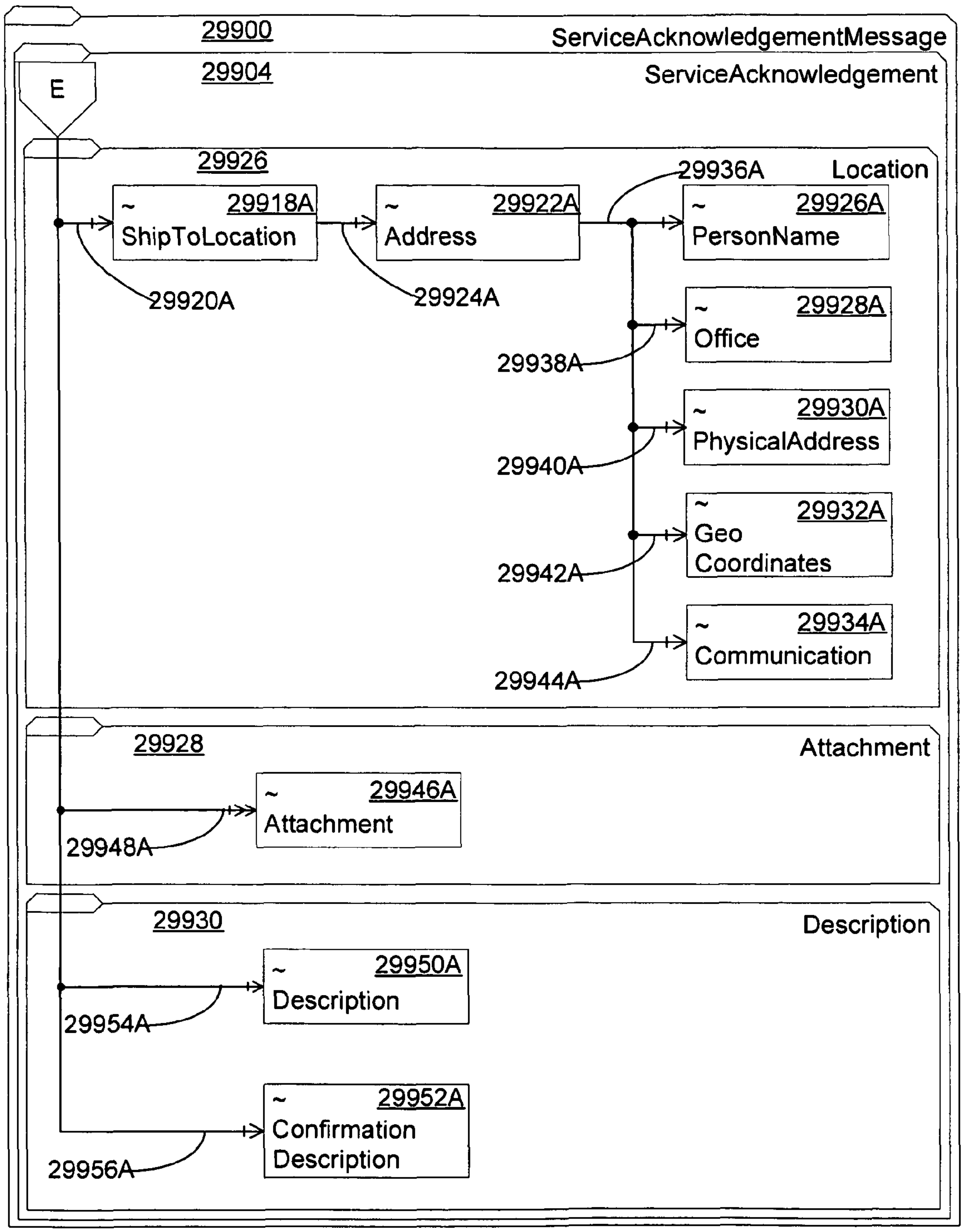
Figure 299F:
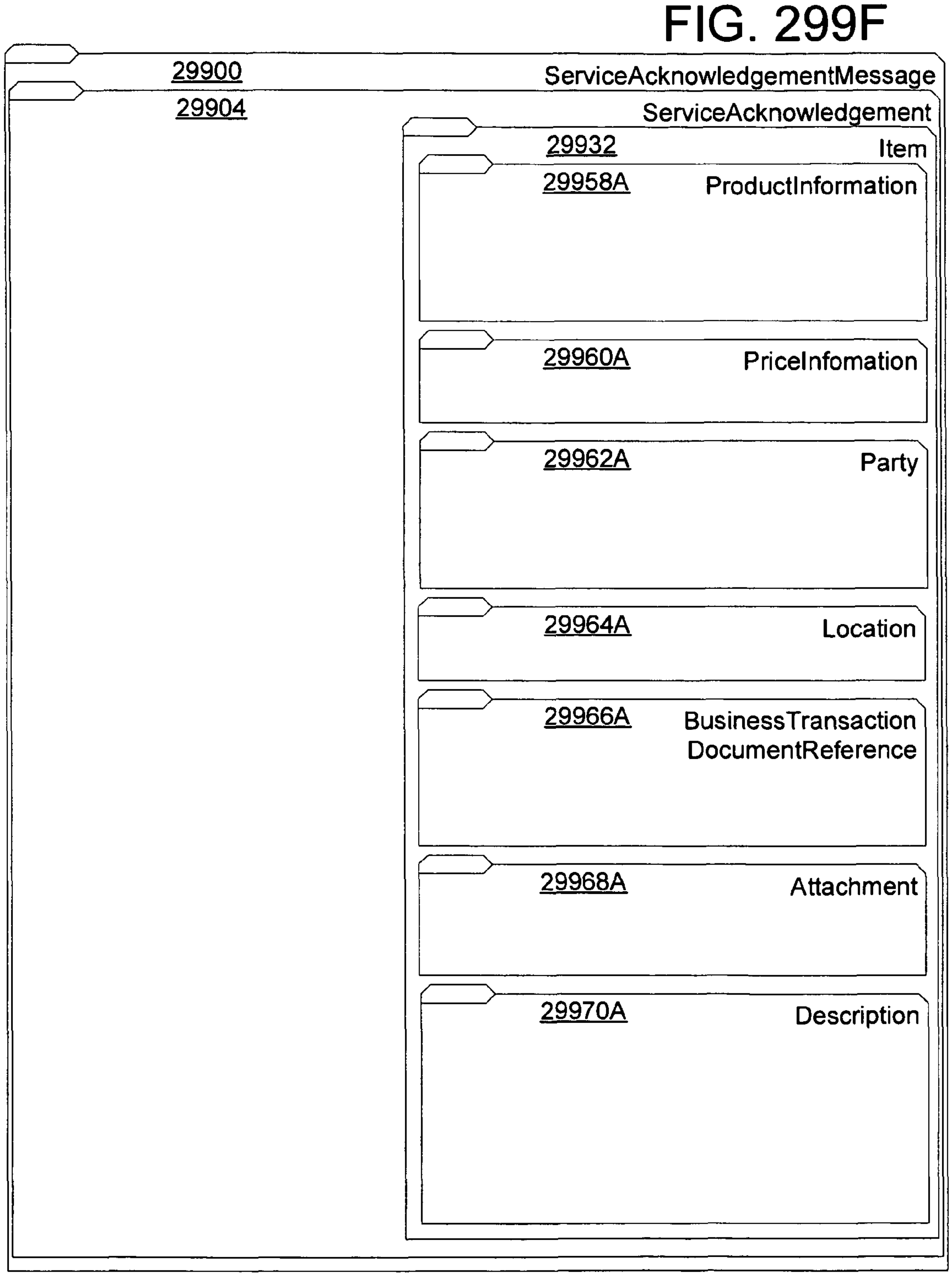
Figure 299G:
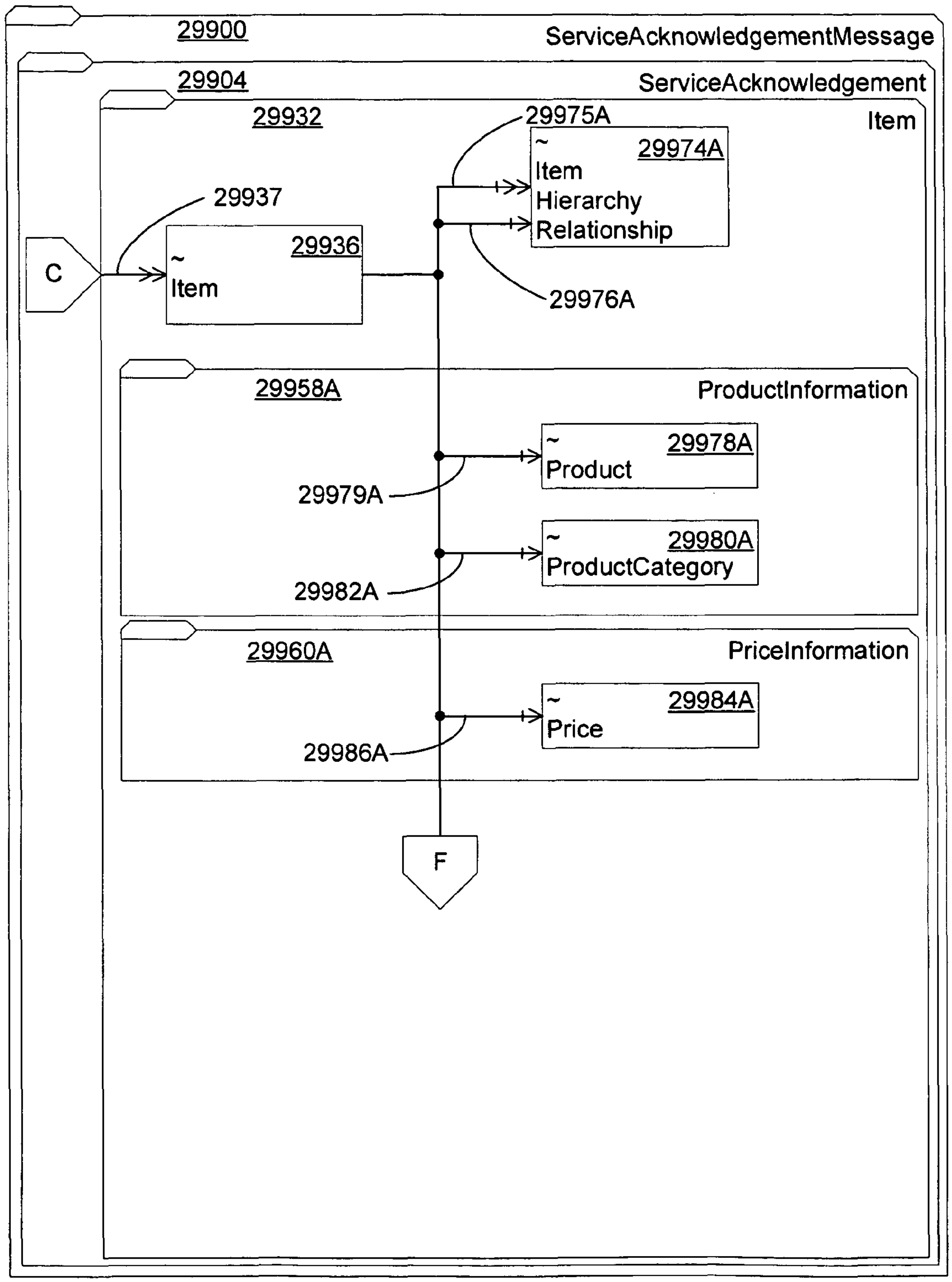
Figure 299H:
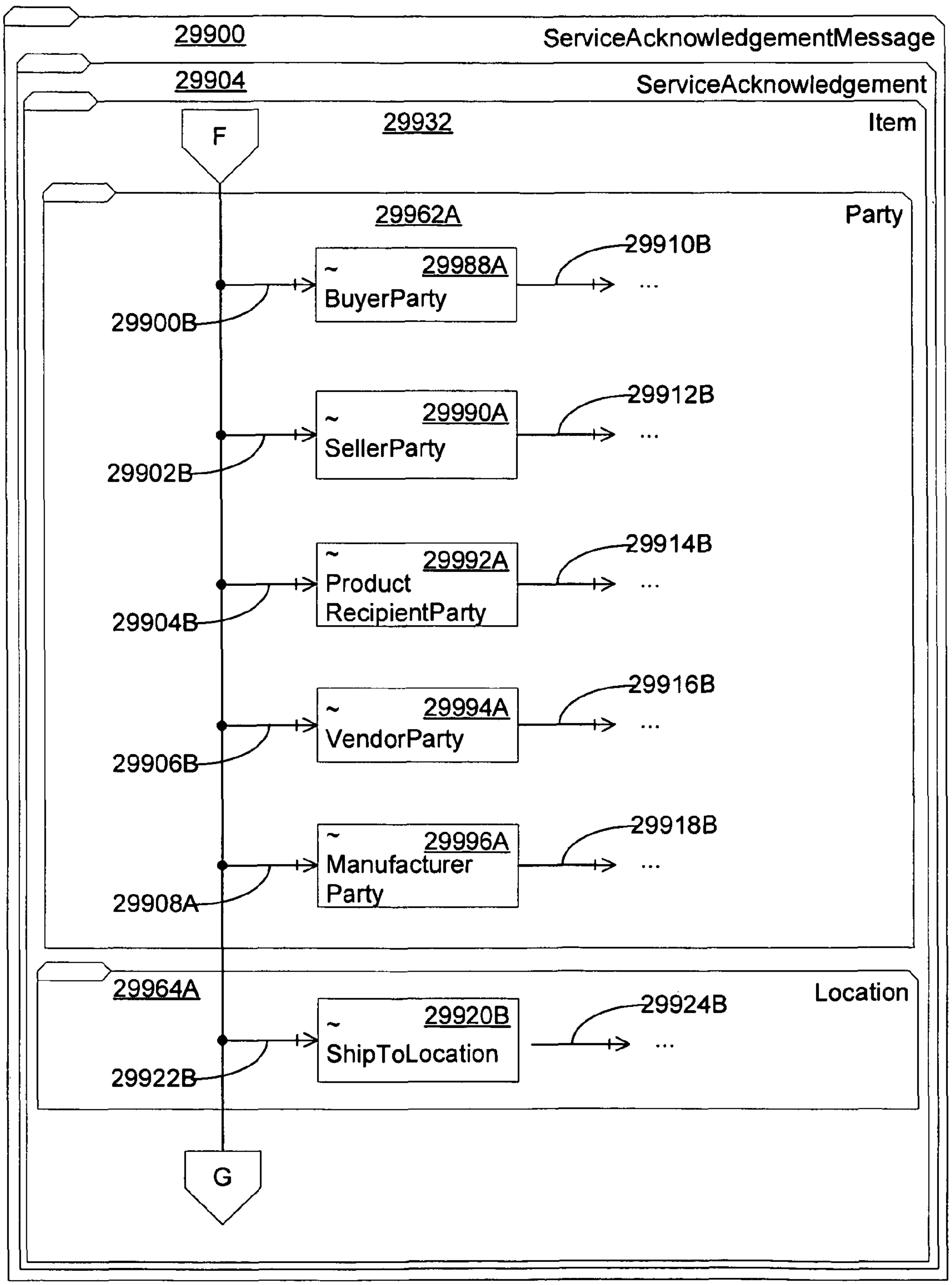
Figure 299I:
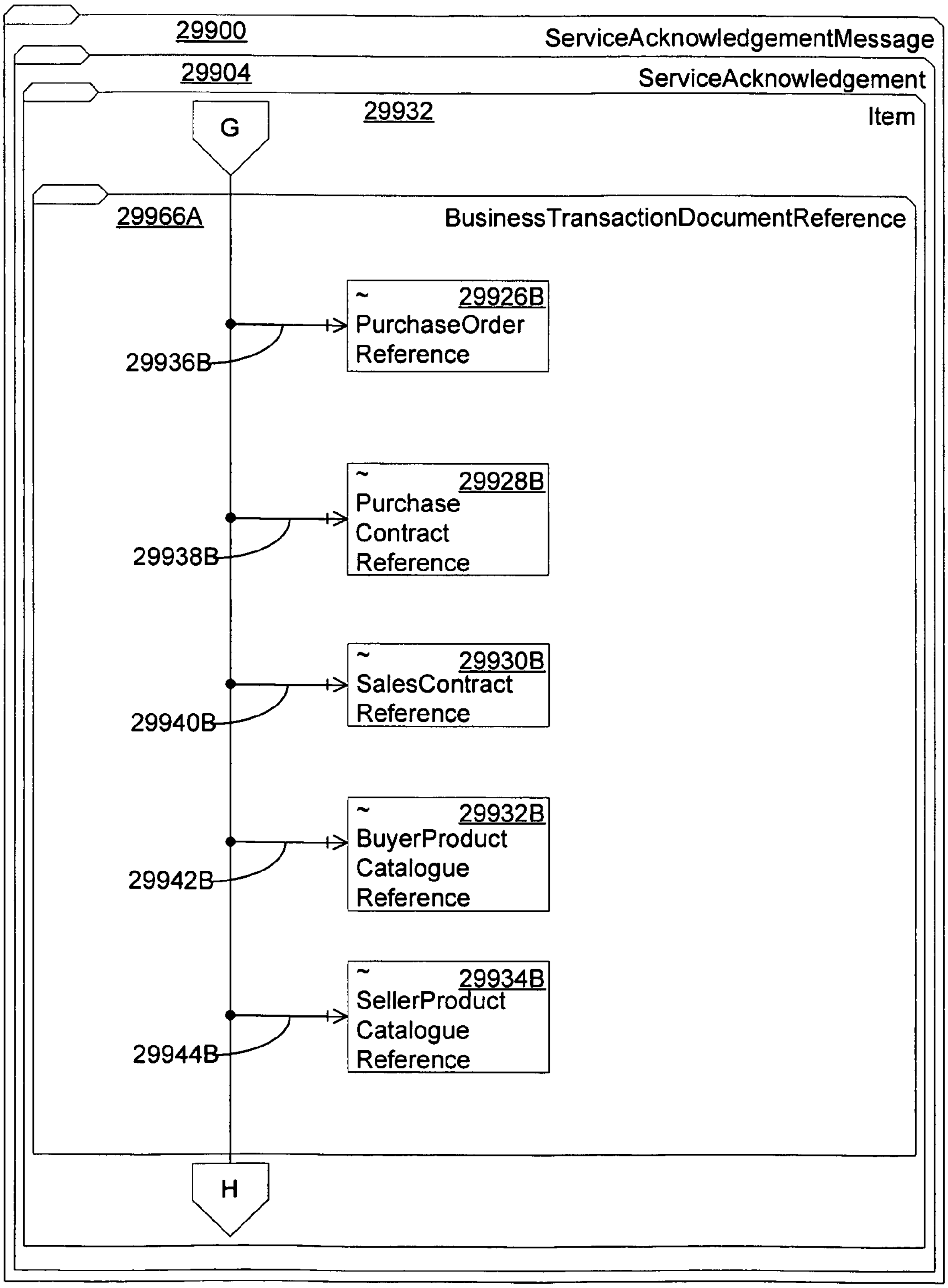
Figure 299J:
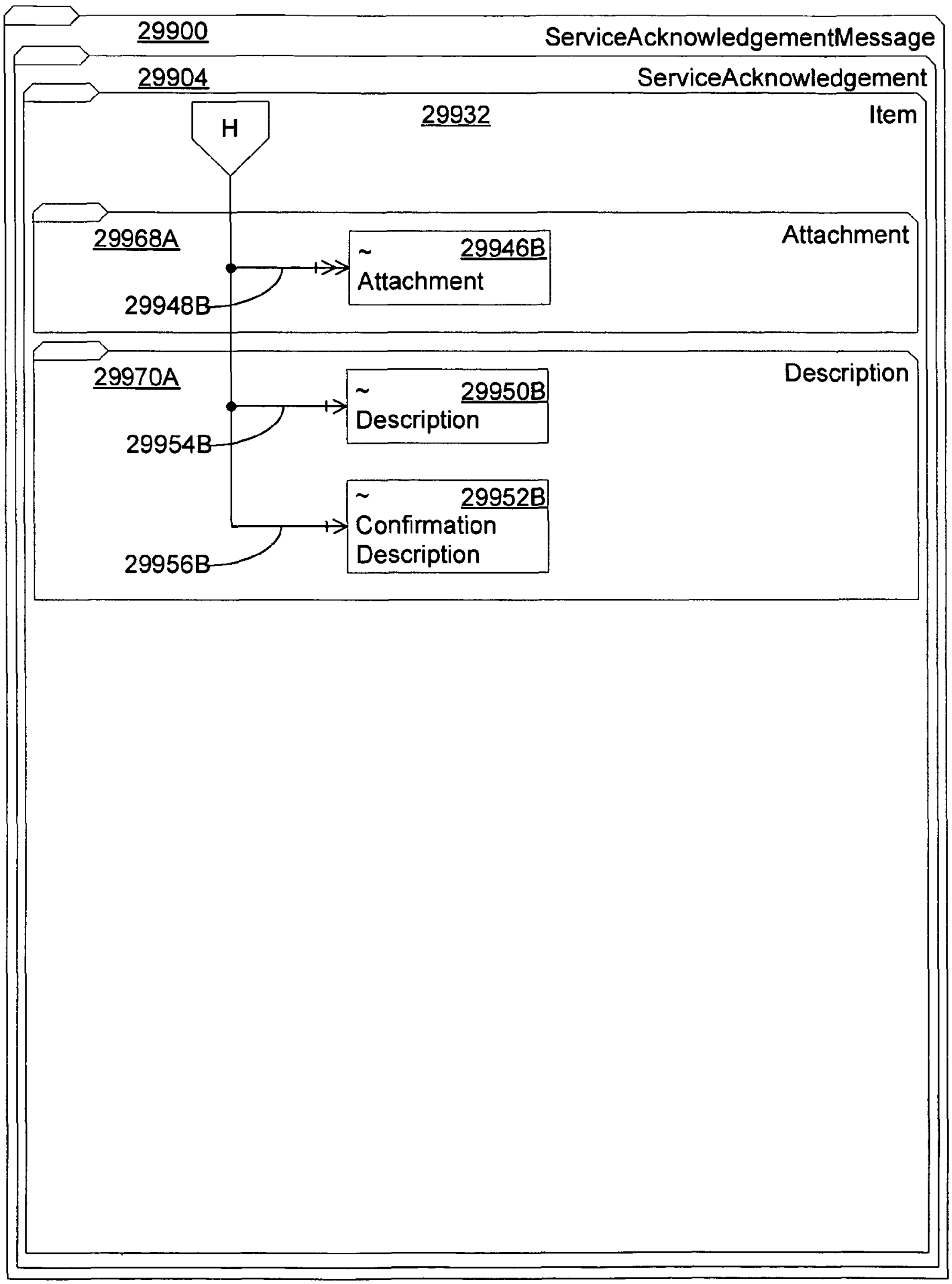

FIG. 298 depicts the message choreography for Service Acknowledgement Interfaces. The choreography involves two business entities: a seller or service provider (Purchasing or SRM) 29802 and a buyer (Supplier) 29804. In the implementation shown in FIG. 298, the seller 29802 sends a "ServiceAcknowledgementRequest" message 29806 to the buyer 29804. The ServiceAcknowledgementRequest message 29806 is used for sending one or more entered services. The buyer 29804 then sends a "ServiceAcknowledgementConfirmation" message 29808 to the seller 29802. The ServiceAcknowledgementConfirmation message 29808 is a direct response to a ServiceAcknowledgementRequest 29806 message and is used to acknowledge a service that has been entered.

Both the ServiceAcknowledgementRequest 29806 and the ServiceAcknowledgementConfirmation message 29808 use the same structure of message data type ServiceAcknowledgementMessage. As discussed below, however, each message 29806 and 29808 may use parts of the ServiceAcknowledgementMessage structure.

In one implementation, the ServiceAcknowledgementRequest 29806 is a request from the seller or Purchasing 29802 asking the buyer or Supplier 29804 to acknowledge one or more services that have been entered. The ServiceAcknowledgementRequest 29806 is used for ServiceAcknowledgement verification and for automatically settling a purchase order without the seller's ServiceAcknowledgement.

In one implementation, the ServiceAcknowledgementConfirmation 29808 is a confirmation (or rejection) of the service entered. The ServiceAcknowledgementConfirmation 29808 is the message used by the buyer or Supplier 29804 to inform the seller or Purchasing 29802 that the service acknowledgement is confirmed, pending decision, or rejected. The buyer 29804 may use the ServiceAcknowledgementConfirmation message 29808 as follows.

(1) The buyer 29804 may inform the seller 29802 of the confirmation status of the service. Possible statuses are "AP" (accepted), "AJ" (pending), and "RE" (rejected). The confirmation status may be set at header level only. Rejection at header level also signifies rejection of the items.

(2) The data in the ServiceAcknowledgementRequest 29806 is not changed. In addition to the confirmation status, a free text (ConfirmedDescription) may be entered at the header and item level as further explained below.

In one implementation, the ServiceAcknowledgementConfirmation 29808 is not required to be sent in response to the ServiceAcknowledgementRequest 29806 in the B2B service acknowledgement process.

In accordance with methods and systems consistent with the present invention, a service entry sheet is normally entered once an ordered service has been provided. The seller 29802 then sends a ServiceAcknowledgementRequest message 29806 requesting the buyer 29804 to acknowledge this service, which begins the service acknowledgement process. Once the ServiceAcknowledgementRequest message 29806 has been received by the buyer 29804, the buyer 29804 may use the ServiceAcknowledgementConfirmation message 29808 to accept or reject the service provided, or to assign it the temporary status "pending." The ServiceAcknowledgement Confirmation 29808 is not a negotiation tool (as is the case with order management), since the entire service may be accepted or rejected. The primary function of the ServiceAcknowledgement Confirmation message 29808 is to confirm that the service acknowledgement request has been sent correctly; providing information about required changes to the service acknowledgement is a secondary function. The ServiceAcknowledgementConfirmation 29808, therefore, includes the data received and checked by the buyer 29804. When a ServiceAcknowledgementRequest 29806 is rejected, however, the seller 29802 may be informed about change requests in free texts at header and item level in the ServiceAcknowledgementConfirmation message 29808. If the buyer 29804 rejects a service acknowledgement, the seller 29802 may send a new ServiceAcknowledgementRequest 29806. If the seller 29802 does not receive a response (e.g., another ServiceAcknowledgementConfirmation message 29808) from the buyer 29804, the service is considered to have been accepted.

(2) Message Data Type Service Acknowledgement Message

The data model for the message data type ServiceAcknowledgementMessage used to implement a ServiceAcknowledgementRequest message 29806 and a ServiceAcknowledgementConfirmation message 29808 is depicted in FIGS. 299A-J. The message data type ServiceAcknowledgementMessage includes a ServiceAcknowledgementMessage package 29900. The ServiceAcknowledgement Message package 29900 includes a MessageHeader package 29902, a ServiceAcknowledgement package 29904, and a ServiceAcknowledgementMessage object or entity 29906.

The following rules may be followed to ensure that the elements and entities in the ServiceAcknowledgementMessage package 29900 are used correctly with regard to their respective changeability in the acknowledgement process:

(1) In a ServiceAcknowledgementConfirmation message 29808 having the structure of the message data type ServiceAcknowledgementMessage, no data is changed by the buyer 29802 vis-à-vis the ServiceAcknowledgementRequest 29806. The service acknowledgement status and a description of the buyer are specified in the ServiceAcknowledgementConfirmation 29808 in addition to the ServiceAcknowledgementRequest 29806.

(a) Message Header Package

A MessageHeader package 29902 groups together the business information that is relevant for sending a business document in a message. The MessageHeader package 29902 includes a MessageHeader entity 29908. There is a 1:1 relationship 29910 between the ServiceAcknowledgementMessage entity 29906 and the MessageHeader entity 29908.

A MessageHeader entity 29908 groups together business information from the perspective of the sending application to identify the business document in a message, to provide information about the sender, and to provide any information about the recipient. The MessageHeader entity 29908 is of type GDT: BusinessDocumentMessageHeader. The MessageHeader entity 29908 includes an ID, a ReferencedID, and a CreationDateTime. The MessageHeader entity 29908 includes a SenderParty entity 29912 and a RecipientParty 29914. There is a 1:c relationship 29920 between the MessageHeader entity 29908 and the SenderParty entity 29912 and a 1:cn relationship 29922 between the MessageHeader entity 29908 and the RecipientParty entity 29914.

The SenderParty is the party responsible for sending a BusinessDocument at business application level. The SenderParty entity 29912 is of type GDT: BusinessDocumentMessageHeaderParty. The SenderParty entity 29912 may be filled by the sending application to name a contact person for any problems with the message. This is particularly useful if an additional infrastructure (such as a marketplace) is located between the SenderParty entity 29912 and the RecipientParty entity 29914.

The RecipientParty is the party responsible for receiving a business document at business application level. The RecipientParty entity 29914 is of type GDT: BusinessDocumentMessageHeaderParty. The RecipientParty entity 29914 may be filled by the sending application to name a contact person for any problems with the message. The SenderParty entity 29912 and the RecipientParty entity 29914 include additional information required by the parties 29916 and 29918 as discussed in detail below.

(b) Service Acknowledgement Package

The ServiceAcknowledgement package 29904 includes a Party package 29924, a Location package 29926, an Attachment package 29928, a Description package 29930, and an Item package 29932. The ServiceAcknowledgement package 29904 also includes a ServiceAcknowledgement entity 29934. There is a 1:1 relationship 29935 between the ServiceAcknowledgementMessage entity 29906 and the ServiceAcknowledgement entity 29934. The ServiceAcknowledgement is a request from the seller asking the buyer to acknowledge a service that has been entered (or the buyer's acknowledgement of the entered service).

In addition to the buyer and seller, other parties identified in the Party package 29924 may participate in the ServiceAcknowledgement. The ServiceAcknowledgement entity 29934 is of type GDT: ServiceAcknowledgement and includes an ID, a BuyerID, a CreationDateTime, a AcceptanceStatusCode, and a Note. The ID is a unique identifier assigned by the seller for the service acknowledgement and is of type GDT: BusinessTransactionDocumentID. The BuyerID is a unique identifier assigned by the buyer for the service acknowledgement and is of type GDT: BusinessTransactionDocumentID. The CreationDateTime is the time at which the seller created the service acknowledgement and is of type GDT: DateTime. The AcceptanceStatusCode is the coded representation for the status of the seller's agreement to the service acknowledgement and is of type GDT: AcceptanceStatusCode. The Note is a short description or the title of the service acknowledgement. It is generally used to provide the user with a simple method for searching for a particular service acknowledgement. The Note is of type GDT: Note.

(i) Service Acknowledgement Party Package

The Party package 29924 groups together the business parties involved in the service acknowledgement. The Party package 29924 includes a BuyerParty entity 29938, a SellerParty entity 29940, a ProductRecipientParty entity 29942, a VendorParty entity 29944, and a ManufacturerParty entity 29946. There is a 1:1 relationship 29948 between the ServiceAcknowledgement entity 29934 and the BuyerParty entity 29938. There is a 1:c relationship 29950 between the ServiceAcknowledgement entity 29934 and the SellerParty entity 29940. There is a 1:c relationship 29952 between the ServiceAcknowledgement entity 29934 and the ProductRecipientParty entity 29942. There is a 1:c relationship 29954 between the ServiceAcknowledgement entity 29934 and the VendorParty entity 29944. There is also a 1:c relationship 29956 between the ServiceAcknowledgement entity 29934 and the ManufacturerParty entity 29946. Each of the SellerParty entity 29940, the ProductRecipientParty entity 29942, the VendorParty entity 29944, and the ManufacturerParty entity 29946 includes the same elements as those described below for the BuyerParty entity 29938 as denoted by ellipses 29958, 29960, 29962, and 29964.

Either the ID or the ID and address may be transferred for each party 29938, 29940, 29942, 29944, and 29946. If the ID is transferred, the ID address defined in the master data is used. If the ID and address are transferred, the ID identifies the party and the address is deemed to be a document address that is different to the master data address. For the parties 29938, 29940, 29942, 29944, and 29946, a default logic applies for transferring data from the document header to the items and within item hierarchies. Parties specified in the header are used for the items for which a corresponding party is not explicitly transferred and that are directly assigned to the header. In accordance with the same logic, parties, transferred at item level are used for the subitems assigned to the relevant item in an item hierarchy. The default logic applies for the party as a whole, including the contact person. Parts of a party specified at header level or for a hierarchy item cannot be specified in more detail at item level.

The BuyerParty is a party that buys goods or services. The BuyerParty entity 29938 is of type GDT: BusinessTransactionParty. The BuyerParty entity 29938 includes an Address entity 29966 and a ContactPerson entity 29968. There is a 1:1 relationship 29970 between the BuyerParty entity 29938 and the Address entity 29966. There is a 1:c relationship 29972 between the BuyerParty entity 29938 and the ContactPerson entity 29968.

The Address entity 29966 includes a PersonName entity 29974, an Office entity 29976, a PhysicalAddress entity 29978, a GeoCoordinates entity 29980, and a Communication entity 29982. There is a respective 1:c relationship 29984, 29986, 29988, 29990, and 29992 between the Address entity 29966 and the PersonName entity 29974, the Office entity 29976, the PhysicalAddress 29978, the GeoCoordinates entity 29980, and the Communication entity 29982.

The ContactPerson entity 29968 includes an Address entity 29994. There is a 1:c relationship 29996 between the ContactPerson entity 29968 and the Address entity 29994. Similar to the Address entity in the BuyerParty 29938 discussed above, the Address entity 29994 includes a PersonName entity 29998, an Office entity 29900A, a PhysicalAddress 29902A, a GeoCoordinates entity 29904A, and a Communication entity 29906A. There is a respective 1:c relationship 29908A, 29910A, 29912A, 29914A, and 29916A between the Address entity 29994 and the PersonName entity 29998, the Office entity 29900A, the PhysicalAddress 29902A, the GeoCoordinates entity 29904A, and the Communication entity 29906A.

The same BuyerParty entity 29938 may be used for the ServiceAcknowledgement items. In one implementation, the Contact for BuyerParty entity 29938 is permitted to change from item to item and different addresses in each item are not permitted.

The SellerParty is the party that sells goods or services. The SellerParty entity 29940 is of type GDT: BusinessTransactionParty. In one implementation, the same SellerParty entity 29940 is used for the service acknowledgement items. A different SellerParty entity 29940 may be used in each item. If a VendorParty entity 29944 is not explicitly specified in an ordering process, the SellerParty entity 29940 may also be used as the VendorParty entity 29944.

The ProductRecipientParty is a party to which goods are delivered or for whom services are provided. The ProductRecipientParty entity 29942 is of type GDT: BusinessTransactionDocumentParty. If a ShipToLocation is not explicitly specified in a service acknowledgement process, the ProductRecipientParty entity 29942 address is used as the ship-to address. The ProductRecipientParty is not synonymous with the ShipToLocation and in one implementation is to be used when the ProductRecipientParty (company or person) is actually different from the BuyerParty entity 29938.

The VendorParty is a party that delivers goods or provides services. The VendorParty entity 29944 is of type GDT: BusinessTransactionDocumentParty.

The ManufacturerParty is a party that manufactures goods. The ManufacturerParty entity 29946 is of type GDT: BusinessTransactionDocumentParty. The ManufacturerParty entity 29946 may be used for Material items. The ManufacturerParty entity 29946 may be used for uniquely defining the context of a ManufacturerProductID. Since material items may also appear in this message, they may also be specified in the message (although the messages are within the service process).

(ii) Service Acknowledgement Location Package

The Location package 29926 groups together the locations relevant for the service acknowledgement. The Location package 29926 includes a ShipToLocation entity 29918A. There is a 1:c relationship 29920A between the ServiceAcknowledgement entity 29934 and the ShipToLocation entity 29918A. The ShipToLocation entity 29918A is the location at which goods have been delivered or a service provided. The ShipToLocation entity 29918A is of type GDT: BusinessTransactionDocumentLocation.

The ShipToLocation entity 29918A includes an Address entity 29922A. There is a 1:c relationship 29924A between the ShipToLocation entity 29918A and the Address entity 29922A.

The Address entity 29922A includes a PersonName entity 29926A, an Office entity 29928A, a PhysicalAddress 29930A, a GeoCoordinates entity 29932A, and a Communication entity 29934A. There is a respective 1:c relationship 29936A, 29938A, 29940A, 29942A, and 29944A between the Address entity 29922A and the PersonName entity 29926A, the Office entity 29928A, the PhysicalAddress 29930A, the GeoCoordinates entity 29932A, and the Communication entity 29934A.

(iii) Service Acknowledgement Attachment Package

The Attachment package 29928 groups together the attachments relevant for the service acknowledgement. The Attachment package 29928 includes an Attachment entity 29946A. There is a 1:cn relationship 29948A between the ServiceAcknowledgement entity 29934 and the Attachment entity 29946A. The Attachment entity 29946A is any document that refers to the service acknowledgement. The Attachment entity 29946A is of type GDT: Attachment.

(iv) Service Acknowledgement Description Package

The Description package 29930 groups together the texts relevant for the service acknowledgement. The Description package 29930 includes a Description entity 29950A and a ConfirmationDescription entity 29952A. There is a 1:cn relationship 29954A between the ServiceAcknowledgement entity 29934 and the Description entity 29950A. There is also a 1:c n relationship 29956A between the ServiceAcknowledgement entity 29934 and the ConfirmationDescription entity 29956A.

The Description is a natural-language text regarding the service acknowledgement, which is visible to the business partner. The Description entity 29950A is of type GDT: Description. The Description entity 29950A may be used for the textual information about the transferred purchase order and not just the current message. An example of this is a note stating that the Purchasing employee responsible is on vacation as of a specific date and indicating the name and telephone number of a substitute as of this date.

The ConfirmationDescription is a natural-language text regarding the service acknowledgement confirmation, which is visible to the business partner. The ConfirmationDescription entity 29952A is of type GDT: Description. The ConfirmationDescription entity 29952A may be used for the textual information about the service acknowledgement confirmation. Reasons may be specified in the ConfirmationDescription entity 29952 as to why the entry has been rejected, for example.

(v) Service Acknowledgement Item Package

The Item package 29932 includes a ProductInformation package 29958A, a PricingInformation package 29960A, a Party package 29962A, a Location package 29964A, a BusinessTransactionDocumentReference package 29966A, an Attachment package 29968A, and a Description package 29970A. The Item package 29932 also includes the Item entity 29936. There is a 1:n relationship 29937 between the ServiceAcknowledgement entity 29934 and the ServiceAcknowledgement Item entity 29936. ServiceAcknowledgement Item entities are arranged hierarchically using a Hierarchy Relationship 29974A. The Item Hierarchy Relationship 28874A is the relationship between a sub-item and a higher-level parent item in an item hierarchy. There is a 1:cn relationship 29975A between the Item entity 29936 and its subordinate entities, and there is a 1:c relationship 29976A between the Item entity 29936 and its superordinate entities. The Item entity 29936 is of type GDT: ServiceAcknowledgementItem.

The ServiceAcknowledgement Item specifies a service (service product) entered by the ServiceAcknowledgement or additional information about the service (service product). The Item entity 29936 includes detailed information about a product, the price of the product, quantity, and date. The Item entity 29936 may contain references to other business documents relevant for the item. As described above, a Item entity 29936 may be subordinate to another Item entity 29936 within a hierarchy, thereby establishing a business relationship between the two items.

The Item entity 29936 includes an ID, a BuyerID, a ServiceEntryCompletedIndicator, a DeliveryPeriod, and a Quantity. The ID is an identifier assigned by the seller to a service acknowledgement item. The ID identifier is unique within a particular service acknowledgement and is of type GDT: BusinessTransactionDocumentItemID. The BuyerID is an identifier assigned by the buyer to a service acknowledgement item. The BuyerID identifier is unique within a particular service acknowledgement and is of type GDT: BusinessTransactionDocumentItemID. The ServiceEntryCompletedIndicator specifies whether or not confirmation for the referenced service acknowledgement item is complete and is of type GDT: BusinessTransactionCompletedIndicator. The DeliveryPeriod is a period for which the service was entered and is of type GDT: DateTimePeriod. The Quantity is the quantity entered and is of type GDT: Quantity.

Item entities 29936 are arranged hierarchically using a HierarchyRelationship 29974A. There are various item categories, which are governed by a variety of constraints. An item entity 29936 may have several constraint types. The description of the constraint types specifies which constraint types may be combined with each other and how.

Methods and systems consistent with the present invention contemplate the following constraint types: (1) Standard items; (2) Hierarchy items; (3) Subitems; (4) Material items; (5) Service items; (6) Unspecified product items; (7) Grouping hierarchy items; and (8) BOM hierarchy items.

Standard items are the items to which no lower-level items have been assigned in the hierarchy. An item that is not referenced by the ParentItemID of another item is a standard item.

Hierarchy items are items to which at least one other lower-level item has been assigned in the hierarchy. An item that is referenced by the ParentItemID of at least one other item is a hierarchy item. The items are either standard or hierarchy items.

Subitems are items that have been assigned below a hierarchy item and not directly to the purchase order header. Subitems may be both standard items and hierarchy items. Each item that references another item by the ParentItemID is a subitem.

Material items are items whose product is a material. Items whose ProductTypeCode is "1" (Material) are Material items.

Service items are items whose product is a service. Items whose ProductTypeCode is "2" (service) are service items.

Unspecified product items are items for which it is not specified whether they refer to a material or a service. Items whose ProductTypeCode is not specified are unspecified product items. The items are either material, service, or unspecified product items. An unspecified product item fulfills the constraints of a material or service.

Grouping hierarchy items are hierarchy items that logically group together other items. Multilevel grouping hierarchies are permitted, that is, a grouping hierarchy item may contain subitems that are also grouping hierarchy items. Hierarchy items whose subitems have HierarchyRelationshipTypeCode "002" (group) are grouping hierarchy items; subitems with a different HierarchyRelationshipTypeCode are not permitted. Grouping hierarchy items are not permitted as subitems of other types of hierarchy items.

BOM hierarchy items are hierarchy items that group together other items in a BOM. Multilevel BOM hierarchies are permitted. Hierarchy items with at least one subitem with HierarchyRelationshipTypeCode "001" (BOM) are BOM hierarchy items; other subitems are permitted with HierarchyRelationshipTypeCode "003" (discount in kind).

(a) Hierarchy Relationship

The HierarchyRelationship 29974A is the relationship between a subitem and a higher-level parent item in an item hierarchy. The HierarchyRelationship 29974A includes a ParentItemID, a ParentItemBuyerID, and a TypeCode. The ParentItemID is the reference to a parent item with the item number assigned by the seller, and is of type GDT: BusinessTransactionDocumentItemID. The ParentItemBuyerID is the reference to a parent item with the item number assigned by the buyer, and is of type GDT: BusinessTransactionDocumentItemID. The TypeCode represents the hierarchical relationship between the subitem and its higher-level parent item, and is of type GDT: BusinessTransactionDocumentItemHierarchyRelationshipTypeCode.

(b) Service Acknowledgement Item Product Information Package

The ProductInformation package 29958A groups together the information required for identifying, describing, and classifying a product or service acknowledgement item. The ProductInformation package 29958A includes a Product entity 29978A and a ProductCategory entity 29980A. In one implementation, the ProductInformation package 29958A is not used in grouping hierarchy items.

The Product entity 29978A includes the details about a product as generally understood from a commercial point of view in business documents. The Product entity 29978A is of type GDT: BusinessTransactionDocumentProduct. There is a 1:c relationship 29979A between the Item entity 29936 and the Product entity 29978A. With the exception of grouping hierarchy items, at least the product number or the product description is specified when a new item is created. If both the product number and description are specified, the description is merely additional information in the message and may be ignored by the recipient.

The ProductCategory entity 29980A includes the details about a product category as generally understood from a commercial point of view in business transaction documents. The ProductCategory entity 29980A includes details for identifying the product category using an internal ID, a standard ID, and IDs assigned by involved parties. The ProductCategory entity 29980A is of type GDT: BusinessTransactionDocumentProductCategory. There is a 1:c relationship 29982A between an Item entity 29936 and the ProductCategory entity 29980A. The product category is derived directly from the product if a product number is specified for the product. It may differ for the buyer and seller if they have classified the same product differently.

(c) Service Acknowledgement Item Price Information Package

The PriceInformation package 29960A groups together the price information for a service acknowledgement item. The PriceInformation package 29960A includes a Price entity 29984A. There is a 1:c relationship 29986A between an Item entity 29936 and the Price entity 29984A. The PriceInformation package 29960A is not used in the grouping hierarchy. In one implementation, the PriceInformation package 29960A for a service item includes prices only; it does not contain any information about how the prices are calculated.

The Price entity 29984A is the price specified by the seller for the service provided or material used. The Price entity 29984A includes a NetUnitPrice, which is the net price (without tax or cash discount) specified by the seller for the base quantity of the service or material, and is of type GDT: Price.

In BOM hierarchies, the following rules may apply for the Price:

(1) If the price is specified for the item at the top of the BOM hierarchy and not the subitems, this price applies.

(2) If the price is specified for standard items (end nodes in the hierarchy tree) in the BOM hierarchy, these prices apply. The price of the entire BOM is the total of the individual prices.

(3) If a price is specified at different levels in the BOM hierarchy, the price that appears above the others in the tree applies. Differences between the total of the individual prices and the price at the next highest hierarchy level are permissible. These may be caused by discounts for the entire BOM.

(d) Service Acknowledgement Item Party Package

The SeviceAcknowledgementItem Party package 29962A includes elements similar at header level to the ServiceAcknowledgement Party package 29924, such as a BuyerParty entity 29988A, a SellerParty entity 29990A, a ProductRecipientParty entity 29992A, a VendorParty entity 29994A, and a ManufacturerParty entity 29996A. There is a 1:c relationship 29900B between the Item entity 29936 and the BuyerParty entity 29988A. There is a 1:c relationship 29902B between the Item entity 29936 and the SellerParty entity 29990A. There is a 1:c relationship 29904B between the Item entity 29936 and the ProductRecipientParty entity 29992A. There is a 1:c relationship 29906B between the Item entity 29936 and the VendorParty entity 29994A. There is also a 1:c relationship 29908B between the Item entity 29936 and the ManufacturerParty entity 29996A.

Each of the BuyerParty entity 29988A, the SellerParty entity 29990A, the ProductRecipientParty entity 29992A, the VendorParty entity 29994A, and the ManufacturerParty entity 29996A includes the same elements as those described above for the BuyerParty entity 29938 as denoted by ellipses 29910B, 29912B, 29914B, 29916B and 29918B.

(e) Service Acknowledgement Item Location Package

The SeviceAcknowledgementItem Location package 29964A includes elements similar at header level to the ServiceAcknowledgement Location package 29926, such as a ShipToLocation entity 29920B. There is a 1:c relationship 29922B between the Item entity 29936 and the ShipToLocation entity 29920B. The ShipToLocation entity 29920B is of type GDT: BusinessTransactionDocumentLocation. ShipToLocation entity 29920B includes the same elements as those described above for the ShipToLocation entity 29926 as denoted by ellipse 29924B.

(f) Service Acknowledgement Item Business Transaction Document Reference Package The ServiceAcknowledgementItem-BusinessTransactionDocumentReference package ("BusinessTransactionDocumentReference package") 29966A groups together references to business documents that are relevant for the Item entity 29936 and have a business relationship with the item. The BusinessTransactionDocumentReference package 29966A includes a PurchaseOrderReference entity 29926B, a PurchaseContractReference entity 29928B, a SalesContractReference entity 29930B, a BuyerProductCatalogueReference entity 29932B, and a SellerProductCatalogueReference entity 29934B. In one implementation, none of the entities in the BusinessTransactionDocumentReference package may be used in grouping hierarchy items. There is a 1:c relationship 29936B between the Item entity 29936 and the PurchaseOrderReference entity 29926B. There is a 1:c relationship 29938B between the Item entity 29936 and the PurchaseContractReference entity 29928B. There is a 1:c relationship 29940B between the Item entity 29936 and the SalesContractReference entity 29930B. There is a 1:c relationship 29942B between the Item entity 29936 and the BuyerProductCatalogueReference entity 29932B. There is a 1:c relationship 29944B between the Item entity 29936 and the SellerProductCatalogueReference entity 29934B.

The PurchaseOrderReference is a reference to a purchase order or item in a purchase order. The PurchaseOrderReference entity 29926B is of type GDT: BusinessTransactionDocumentReference. In one implementation, the PurchaseOrderReference entity 29926B references one item such that one ItemID is required.

The PurchaseContractReference is a reference to a purchase contract or item in a purchase contract. The PurchaseContractReference entity 29928B is of type GDT: BusinessTransactionDocumentReference. In one implementation, the PurchaseContractReference entity 29928B references one item such that one ItemID is required. Provided it has not been agreed otherwise, the seller is responsible for determining the correct SalesContractReference entity 29930B for a specified PurchaseContractReference entity 29928B.

The SalesContractReference is a reference to a sales contract or an item within a sales contract. The SalesContractReference entity 29930B is of type GDT: BusinessTransactionDocumentReference. In one implementation, the SalesContractReference entity 29930B references one item such that one ItemID is required.

The BuyerProductCatalogueReference is a reference to the buyer's product catalog or an item within the buyer's product catalog. The BuyerProductCatalogueReference entity 29932B is of type GDT: CatalogueReference. In one implementation, the BuyerProductCatalogueReference entity 29932B references one item such that one ItemID is required. The BuyerProductCatalogueReference entity 29932B is filled when a service acknowledgement item refers to a catalog whose number and item numbers were assigned by the buyer. In the service acknowledgement process, the BuyerProductCatalogueReference entity 29932B may be used as a substitute product number if a separate master record has not been created for a product and the product is defined in a catalog.

The SellerProductCatalogueReference entity 29934B is a reference to the seller's product catalog or an item within the seller's product catalog. The SellerProductCatalogueReference entity 29934B is of type GDT: CatalogueReference. The SellerProductCatalogueReference entity 29934B references one item such that one ItemID is required. The SellerProductCatalogueReference entity 29934B is filled when a service acknowledgement item refers to a catalog whose number and item numbers were assigned by the seller. In the service acknowledgement process, the SellerProductCatalogueReference entity 29934B may be used as a substitute product number if a separate master record has not been created for a product and the product is defined in a catalog.

(g) Service Acknowledgement Item Attachment Package

The SeviceAcknowledgementItem Attachment package 29968A includes elements similar at header level to the ServiceAcknowledgement Attachment package 29928, such as an Attachment entity 29946B. There is a 1:cn relationship 29948B between the Item entity 29936 and the Attachment entity 29946B. The Attachment entity 29946B is of type GDT: BusinessTransactionDocumentLocation.

(h) Service Acknowledgement Item Description Package

The Description package 29970A groups together the explanatory texts regarding a service acknowledgement item. The Description package 29970A includes a Description entity 29950B and a ConfirmationDescription entity 29952B. There is a 1:c relationship 29954B between the Item entity 29936 and the Description entity 29950B. There is also a 1:c relationship 29956B between the Item entity 29936 and the ConfirmationDescription entity 29952B.

The Description is a natural-language text regarding a service acknowledgement that may be visible to the business partner. The Description entity 29950B is of type GDT: Description. The Description may be used for the types of textual information about the service acknowledgement item. An example is an accurate description of a fault in need of repair.

A ConfirmationDescription is a natural-language text regarding the confirmation of a service acknowledgement item that may be visible to the business partner. The ConfirmationDescription entity 29952A is of type GDT: Description. The ConfirmationDescription entity 29952A may be used for the textual information about the confirmation of a service acknowledgement item. An example of this would be the seller's justification for rejecting a particular service acknowledgement item.

(3) Message Data Type Element Structure

FIGS. 300A-L depict the element structure for a SeviceAcknowledgementRequest and a ServiceAcknowledgementConfirmation. The element structure is similar to the above described data model of the message data type ServiceAcknowledgementMessage as reflected in FIGS. 299A-J, but provides additional information regarding the details for interfacing with or implementing a ServiceAcknowledgementMessage, such as a SeviceAcknowledgementRequest and a ServiceAcknowledgementConfirmation. As shown in FIGS. 300A-L, the element structure identifies the different packages 30000 that may be in a respective ServiceAcknowlegementRequest and ServiceAcknowledgementConfirmation. The element structure for the ServiceAcknowlegementRequest and ServiceAcknowledgementConfirmation includes five levels 30002, 30004, 30006, 30008 and 30010 each of associated with a respective package 30000. The element structure identifies the cardinality 30012 and data type information (i.e., type 30014 and name 30016) for the elements at the respective levels 30002, 30004, 30006, 30008 and 30010 in a package 30000.

The outermost package of this interface is a ServiceAcknowledgement package 30020, which includes a ServiceAcknowledgementMessage entity 30022 at the first level 30002. The ServiceAcknowledgementMessage entity 30022 is of message data type ("MDT") 30024 ServiceAcknowledgementMessage 30026.

The ServiceAcknowledgementMessage package 30020 includes a MessageHeader package 30028 and a ServiceAcknowledgement package 30030. The MessageHeader package 30028 includes a MessageHeader entity 30032, which is of type generic data type ("AGDT") 30036 "BusinessDocumentMessageHeader" 30038. There is one 30034 MessageHeader entity for each ServiceAcknowledgementMessage entity 30022.

The MessageHeader entity 30032 includes an ID 30040, a Reference ID 30048, and a CreationDateTime 30056. The ID 30040 is of type GDT 30044 BusinessDocumentMessageID 30046. The ReferenceID 30048 is of type GDT 30052 BusinessDocumentMessageID 30054. The CreationDateTime 30056 is of type GDT 30060 DateTime 30062. There is one 30042 ID 30040 for each MessageHeader entity 30032, one or zero 30050 ReferenceID 30052 for each MessageHeader entity 30032, and one 30058 CreationDateTime 30056 for each MessageHeader entity 30032.

The MessageHeader entity 30032 also includes a SenderParty entity 30064 and a RecipientParty entity 30020A. The SenderParty entity 30064 is of type AGDT 30068 BusinessDocumentMessageHeaderParty 30070. The RecipientParty entity 30020A is also of type AGDT 30024A BusinessDocumentMessageHeaderParty 30026A. There is one or zero 30066 SenderParty entity 30064 for each MessageHeader entity 30032, and there is any number 30022A of RecipientParty entities 30020A for each MessageHeader entity 30032.

The SenderParty entity 30064 includes an InternalID 30072, a StandardID 30080, and a ContactPerson 30088. The InternalID 30072 is of type GDT 30076 PartyInternalID 30078. The StandardID 30080 is of type GDT 30084 PartyStandardlID 30086. The ContactPerston 30088 is of type AGDT 30092 ContactPerson 30094. There is one or zero 30074 InternalID 30072 for each SenderParty entity 30064, any number 30082 of StandardIDs 30080 for each SenderParty entity 30064, and one or zero 30090 ContactPerson 30088 for each SenderParty entity 30064.

The ContactPerson 30088 includes a BuyerID 30096, a VendorID 30004A, and an Address 30012A. The BuyerID 30096 is of type CDT 30000A ContactPersonPartyID 30002A. The VendorID 30004A is of type CDT 30006A ContactPersonPartyID 30010A. The Address 30012A is of type AGDT 30016A Address 30018A. There is one or zero 30098 BuyerID 30096 for each ContactPerson 30088, one or zero 30006A of VendorID 30004A for each ContactPerson 30088, and one or zero 30014A Address 30012A for each ContactPerson 30088.

The ServiceAcknowledgement package 30030 includes a ServiceAcknowledgement entity 30028A. There is one 30030A ServiceAcknowledgement entity 30028A for each ServiceAcknowledgementMessage entity 30022A. The ServiceAcknowledgement entity 30028A is of type AGDT 30032A ServiceAcknowledgement 30034A. The ServiceAcknowledgement entity 30028A includes an ID 30036A, a BuyerID 30046A, a CreationDateTime 30054A, an AcceptanceStatusCode 30064A, and a Note 30074A. The ID 30036A is of type GDT 30040A BusinessTransactionDocumentID 30042. The BuyerID 30046A is of type GDT 30050A BusinessTransactionDocumentID 30052A. The CreationDateTime 30054A is of type GDT 30058A DateTime 30060A. The AcceptanceStatusCode 30064A is of type GDT 30068A AcceptanceStatusCode 30070A. The Note 30074A is of type GDT 30078A Note 30080A. There is one 30038A ID 30036A for each ServiceAcknowledgement entity 30028A. There is one or zero 30048A BuyerID 30046A for each ServiceAcknowledgement entity 30028A. There is zero or one 30056A CreationDateTime 30054A for each ServiceAcknowledgement entity 30028A. There is zero or one 30066A AcceptanceStatusCode 30064A for each ServiceAcknowledgement entity 30028A. There is one or zero 30076A Note 30074A for each ServiceAcknowledgement entity 30028A. ID 30036A may be associated with PIDX element FieldTicketProperties- FieldTicketNumber 30044A. CreationDateTime 30054A may be associated with PIDX element FieldTicketProperties-FieldTicketDate 30062A. AcceptanceStatusCode 30064A may be associated with PIDX element FieldTicketResponse-LineItem-LineStatusCode 30072A.

The ServiceAcknowledgement package 30030 also includes a Party package 30082A, a Location package 30084A, an Attachment package 30086A, a Description package 30088A, and an Item package 30090A.

The Party package 30082A includes a BuyerParty entity 30092A, a SellerParty entity 30066B, a ProductRecipient-Party entity 30076B, a VendorParty entity 30086B, and a ManufacturerParty entity 30096B. The BuyerParty entity 30092A is of type AGDT 30096A BusinessTransactionDocumentParty 30098A. There is one or zero 30094A BuyerParty entity 30092A for each ServiceAcknowledgement entity 30028A. The SellerParty entity 30066B is of type AGDT 30070B BusinessTransactionDocumentParty 30072B. There is one or zero 30068B SellerParty entity 30066B for each ServiceAcknowledgement entity 30028A. The ProductRecipientParty entity 30076B is of type AGDT 30080B BusinessTransactionDocumentParty 30082B. There is one or zero 30078B ProductRecipientParty entity 30076B for each ServiceAcknowledgement entity 30028A. The VendorParty entity 30086B is of type AGDT 30090B BusinessTransactionDocumentParty 30092B. There is one or zero 30088B VendorParty entity 30086B for each ServiceAcknowledgement entity 30028A. The ManufacturerParty entity 30096B is of type AGDT 30000C BusinessTransactionDocumentParty 30002C. There is one or zero 30098B ManufacturerParty entity 30096B for each ServiceAcknowledgement entity 30028A. BuyerParty 30092A may be associated with PIDX element PartnerInformation (all Parties) 30000B. SellerParty 30066B may be associated with PIDX element PartnerInformation 30074B. ProductRecipientParty 30076B may be associated with PIDX element PartnerInformation 30084B. VendorParty 30086B may be associated with PIDX element PartnerInformation and CountryOfOrigin 30094B. ManufacturerParty 30096B may be associated with PIDX element PartnerInformation 30004C.

The BuyerParty entity 30092A includes a StandardID entity 30002B, a BuyerID entity 30010B, a SellerID entity 30018D, an Address entity 30026B and a ContractPerson entity 30034B. The StandardID entity 30002B is of type CDT 30006B PartyStandardID 30008D. The BuyerID entity 30010B is of type CDT 30014B PartyPartyID 30008D. The SellerID entity 30018D is of type CDT 30022B PartyPartyID 30024B. The Address entity 30026B is of type AGDT 30030B Address 30032B. The ContactPerston entity 30034B is of type AGDT 300388B ContractPerson 30040B. There is any number 30004B of StandardID entities 30002B for each BuyerParty entity 30092A, one or zero 30012B BuyerID entity 30010B for each BuyerParty entity 30092A, one or zero 30020B SellerID entity 30018B for each BuyerParty entity 30092A, one or zero 30028B Address entity 30026B for each BuyerParty entity 30092A, and one or zero 30036B ContractPerson entity 30034B for each BuyerParty entity 30092A.

The ContractPerson entity 30034B includes a BuyerID entity 30042B, a SellerID entity 30050B, and an Address entity 30058B. The BuyerID entity 30042B is of type CDT 30046B ContactPersonPartyID 30048B. The SellerID entity 30050B is of type CDT 30054B ContactPersonPartyID 30056B. The Address entity 30058B is of type AGDT 30062B Address 30064B. There is one or zero 30044B BuyerID entity 30042B for each ContractPerson entity 30034A, one or zero 30052B SellerID entity 30050B for each ContractPerson entity 30034B, and one or zero 30060B Address entity 30058B for each ContractPerson entity 30034B.

The Location Package 30084A includes a ShipToLocation entity 30006C. The ShipToLocation entity 30006C is of type AGDT 30010C BusinessTransactionDocumentLocation 30012C. There is one or zero 30008C ShipToLocation entity 30006C for each ServiceAcknowledgement entity 30028A.

The ShipToLocation entity 30006C includes a StandardID entity 30016C, a BuyerID entity 30024C, a SellerID entity 30032C, and an Address entity 30040C. The StandardID entity 30016C is of type CDT 30020C LocationStandardID 30022C. The BuyerID entity 30024C is of type CDT 30028C LocationPartyID 30030C. The SellerID entity 30032C is of type CDT 30036C LocationPartyID 30038C. The Address entity 30040C is of type AGDT 30044C Address 30046C. There is any number 30018C of StandardID entities 30016C for each ShipToLocation entity 30006C, one or zero 30026C BuyerID entity 30024C for each ShipToLocation entity 30006C, one or zero 30034C SellerID entity 30032C for each ShipToLocation entity 30006C, and one or zero 30042C Address entities 30040C for each ShipToLocation entity 30006C. ShipToLocation 30006C may be associated with PIDX element CountryOfFinalDestination 30014C.

The Attachment package 30086A includes an Attachment entity 30048C, which is of type AGDT 30052C Attachment 30054C. There is any number 30050C of Attachment entities 30048C for each ServiceAcknowledgement entity 30028A. Attachment 30048C may be associated with PIDX element FieldTicketProperties-Attachment 30056C.

The Description package 30088A includes a Description entity 30058C and a ConfirmedDescription entity 30068C. The Description entity 30058C is of type GDT 30062C Description 30064C. There is one or zero 30060C Description entity 30058C for each SericeAcknowledgement entity 30028A. The ConfirmedDescription entity 30068C is of type GDT 30072C Description 30074C. There is one or zero 30070C ConfirmedDescription entity 30068C for each ServiceAcknowledgement entity 30028A. Description 30058C may be associated with PIDX element FieldTicketProperties-Comment and -JobSummary 30066C.

The Item package 30090A includes an Item entity 30076C. There is one or more 28060C Item entities 28058C for each ServiceAcknowledgement entity 30028A. The Item entity 30076C is of type AGDT 30080C ServiceAcknowledgement-Item 30082C.

The Item entity 30076C includes an ID 30084C, a BuyerID 30094C, a ServiceEntryCompletedIndicator 30002D, a DeliveryPeriod 30010D, a Quantity 30020D, and a HierarchyRelationship 30030D. The ID 30084C is of type GDT 30088C BusinessTransactionDocumentItemID 30090C, and there is one 30086C ID 30084C for each Item entity 30076C. The BuyerID 30094C is of type GDT 30098C BusinessTransactionDocumentItemPartyID 30000D, and there is one or zero 30096C BuyerID 30094C for each Item entity 30076C. The ServiceEntryCompletedIndicator 30002D is of type GDT 30006D BusinessTransactionCompletedIndicator 30008D, and there is one or zero 30004D ServiceEntryCompletedIndicator 30002D for each Item entity 30076C. The DeliveryPeriod entity 30010D is of type GDT 30014D DateTimePeriod 30016D, and there is one or zero 30012D DeliveryPeriod entity 30010D for each Item entity 30076C. The Quantity 30020D is of type GDT 30024D Quantity 30026D, and there is one or zero 30022D Quantity 30026D for each Item entity 30076C. There is one or zero 30032D HierarchyRelationship 30030D for each Item entity 30076C. The HierarchyRelationship 30030D includes a ParentItemID 30036D, which is of type GDT 30040D BusinessTransactionDocumentItemID 30042D, a ParentItemBuyerID 30044D, which is of type GDT 30048D BusinessTransactionDocumentItemID 30050D, and a TypeCode 30052D, which is of type GDT 30056D BusinessTransactionDocumentItemHierarchyRelationshipTypeCode 30058D. There is one or zero 30038D ParentItemID 30036D for each HierarchyRelationship 30030D. There is one or zero 30046D ParentItemBuyerID 30044C for each HierarchyRelationship 30030D. There is one, 30054D TypeCode 30052D for each HierarchyRelationship 30030D. ID 30084C may be associated with PIDX element FieldTicketLineItem-LineItemNumber 30092C. DeliveryPeriod 30010D may be associated with PIDX element FieldTicketLineItem-ServiceDateTime 30018D. Quantity 30020D may be associated with PIDX element FieldTicketProperties-FieldTicketQuantity 30028D. HierarchyRelationship 30030D may be associated with PIDX element FieldTicketSubLineItem 30034D.

The Item package 30090A also includes a ProductInformation package 30060D, a PriceInformation package 30062D, a Party package 30064D, a Location package 30066D, a BusinessTransactionDocumentReference package 30068D, an Attachment package 30070D and a Description package 30072D.

The ProductInformation package 30060D includes a Product entity 30074D and a ProductCategory entity 30032E. The Product entity 30074D is of type AGDT 30078D BusinessTransactionDocumentProduct 30080D. There is one or zero 30076D Product entity 30074D for each Item entity 30076C. The ProductCategory entity 30032E is of type AGDT 30036E BusinessTransactionDocumentProductCategory 30038E. There is one or zero 30034E ProductCategory entity 30032E for each Item entity 30076C.

The Product entity 30074D includes a StandardID entity 30084D, a BuyerID entity 30092D, a SellerID entity 30000E, a ManufacturerID 30008E, a TypeCode entity 30016E and a Note entity 30024E. The StandardID entity 30084D is of type CDT 30088D ProductStandardID 30090D. The BuyerID entity 30092D is of type CDT 30096D ProductPartyID 30098D. The SellerID entity 30000E is of type CDT 30004E ProductPartyID 30006E. The ManufacturerID entity 30008E is of type CDT 30012E ProductPartyID 30014E. The TypeCode entity 30016E is of type GDT 30020E ProductTypeCode 30022E. The Note entity 30024E is of type GDT 30028E Note 30030E. There is any number 30086D of StandardID entities 30084D for each Product entity 30074D, one or zero 30094D BuyerID entity 30092D for each Product entity 30074D, one or zero 30002E SellerID entity 30000E for each Product entity 30074D, one or zero 30010E The ManufacturerID entity 30008E for each Product entity 30074D, one or zero 30018E TypeCode entity 30016E for each Product entity 30074D and one or zero 30026E Note entity 30024E for each Product entity 30074D.

The ProductCategory entity 30032E includes a StandardID entity 30040E, a BuyerID entity 30048E, and a SellerID entity 30056E. The StandardID entity 30040E is of type CDT 30044E ProductCategoryStandardID 30046E. The BuyerID entity 30048E is of type CDT 30052E ProductCategoryPartyID 30054E. The SellerID entity 30056E is of type CDT 30060E ProductCategoryPartyID 30062E. There is any number 30042E of StandardID entities 30040E for each ProductCategory entity 30032E, one or zero 30050E BuyerID entity 30048E for each ProductCategory entity 30032E, and one or zero 30058E SellerID entity 30056E for each ProductCategory entity 30032E. Product 30074D may be associated with PIDX element FieldTicketProperties-LineItemInformation 30082D.

The PriceInformation package 30062D includes a Price entity 30064E. There is one or zero 30066E Price entity 30064E for each Item entity 30076C. The Price entity 30064E includes a NetUnitPrice 30070E. The NetUnitPrice 30070E is of type AGDT 30074E Price 30076E. There is one or zero 30072E NetUnitPrice 30070E for each Price entity 30064E. Price 30064E may be associated with PIDX element FieldTicketLineItem-Pricing 30068E. NetUnitPrice 30070E may be associated with PIDX element PrimaryCurrency 30078E.

The Party package 30064D includes a BuyerParty entity 30080E, a SellerParty entity 30090E, a ProductRecipientParty entity 30000F, a VendorParty entity 30010F, and a ManufacturerParty entity 30020F. The BuyerParty entity 30080E is of type AGDT 30084E BusinessTransactionDocumentParty 30086E. There is one or zero 30082E BuyerParty entity 30080E for each Item entity 30076C. The SellerParty entity 30090E is of type AGDT 30094E BusinessTransactionDocumentParty 30096E. There is one or zero 30092E SellerParty entity 30090E for each Item entity 30076C. The ProductRecipientParty entity 3000OF is of type AGDT 30004F BusinessTransactionDocumentParty 30006F. There is one or zero 30002F ProductRecipientParty entity 30000F for each Item entity 30076C. The VendorParty entity 3001OF is of type AGDT 30014F BusinessTransactionDocumentParty 30016F. There is one or zero 30012F VendorParty entity 30010F for each Item entity 30076C. The ManufacturerParty entity 30020F is of type AGDT 30024F BusinessTransactionDocumentParty 30026F. There is one or zero 30022F ManufacturerParty entity 30020F for each Item entity 30076C. BuyerParty 30080E may be associated with PIDX element PartnerInformation 30088E. SellerParty 30090E may be associated with PIDX element PartnerInformation 30098E. ProductRecipientParty 30000F may be associated with PIDX element PartnerInformation 30008F. VendorParty 30010F may be associated with PIDX element PartnerInformation and CountryOfOrigin 30018F. ManufacturerParty 30020F may be associated with PIDX element PartnerInformation 30028F.

The Location package 30066D includes a ShipToLocation entity 30030F. The ShipToLocation entity 30030F is of type AGDT 30034F BusinessTransactionDocumentLocation 30036F, and there is one or zero 30032F ShipToLocation entity 30030F for each Item entity 30076C.

The BusinessTransactionDocumentReference package 30068D includes a PurchaseOrderReference entity 30038F, a PurchaseContractReference entity 30048F, a SalesContractReference entity 30058F, a BuyerProductCatalogueReference entity 30066F, and a SellerProductCatalogueReference entity 30074F. The PurchaseOrderReference entity 30038F is of type AGDT 30042F BusinessTransactionDocumentReference 30044F. There one or zero 30040F of PurchaseOrderReference entities 30038F for each Item entity 30076C. The PurchaseContractReference entity 30048F is of type AGDT 30052F BusinessTransactionDocumentReference 30054F. There is one or zero 30050F PurchaseContractReference entity 30048F for each Item entity 30076C. The SalesContractReference entity 30058F is of type AGDT 30062F BusinessTransactionDocumentReference 30064F. There is one or zero 30060F SalesContractReference entity 30058F for each Item entity 30076C. The BuyerProductCatalogueReference entity 30066F is of type AGDT 30070F CatalogueReference 30072F. There is one or zero 30068F BuyerProductCatalogueReference entity 30066F for each Item entity 30076C. The SellerProductCatalogueReference entity 30074F is of type AGDT 30078F CatalogueReference 30080F. There is one or zero 30076F SellerProductCatalogueReference entity 30074F for each Item entity 30076C. PurchaseOrderReference 30028F may be associated with PIDX element FieldTicketLineItem-PurchaseOrderInformation 30046F. PurchaseContractReference 30048F may be associated with PIDX element FieldTicketLineItem-ReferenceInformation 30056F.

The Attachment package 30070D includes an Attachment entity 30082F, which is of type AGDT 30086F Attachment 30088F. There is one or zero 30084F Attachment entities 30082F for each Item entity 30076C. Attachment 30082F may be associated with PIDX element FieldTicketLineItem-Attachment 30090F.

The Description package 30072D includes a Description entity 30092F and a ConfirmedDescription entity 30002G. The Description entity 30092F is of type GDT 30096F Description 30098F. There is one or zero 30094F Description entity 30092F for each Item entity 30076C. The ConfirmedDescription entity 30002G is of type GDT 30006G Description 30008G. There is one or zero 30004G ConfirmedDescription entity 30002G for each Item entity 30076C. Description 30092F may be associated with PIDX element FieldTicketLineItem-Comment and -JobSummary 30000G.

e) RFQ, RFQ Cancellation, RFQ Result, Quote Interfaces

Request for quotation ("RFQ") interfaces are the interfaces that are required in a B2B process to exchange RFQs and quotations between a buyer and a bidder and finally to communicate the quotation acceptance. More than just a simple interface structure, the RFQ interfaces define the underlying business logic and, at the same time, dispense with the need to exchange proprietary information in straightforward RFQ processes. In this way, applications that implement the RFQ interfaces can be integrated without the need for complex project work.

(1) Message Choreography

Figure 301:
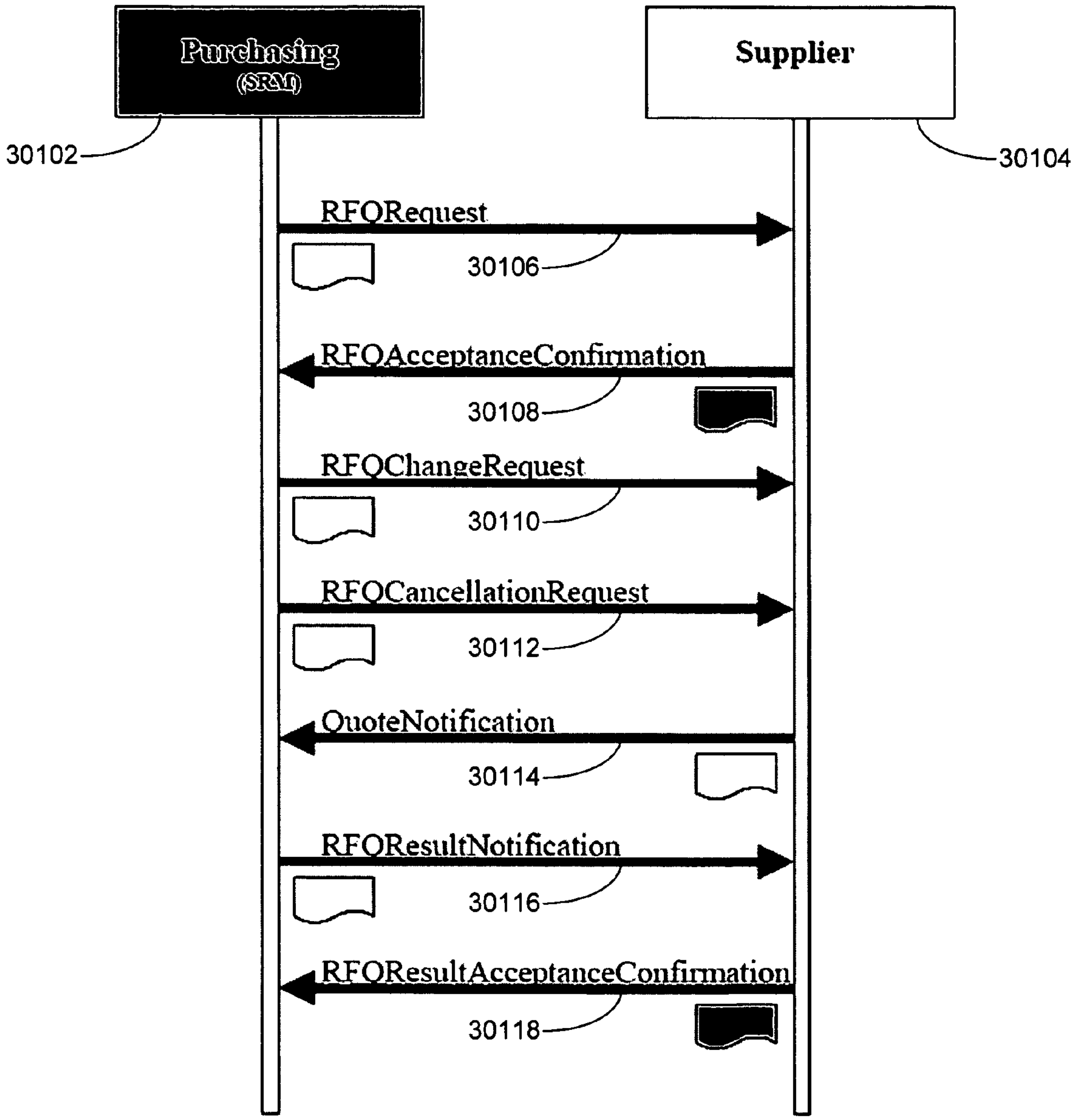
FIG. 301 depicts the message choreography for the RFQ interfaces in accordance with methods and systems consistent with the present invention.
Figure 302A:
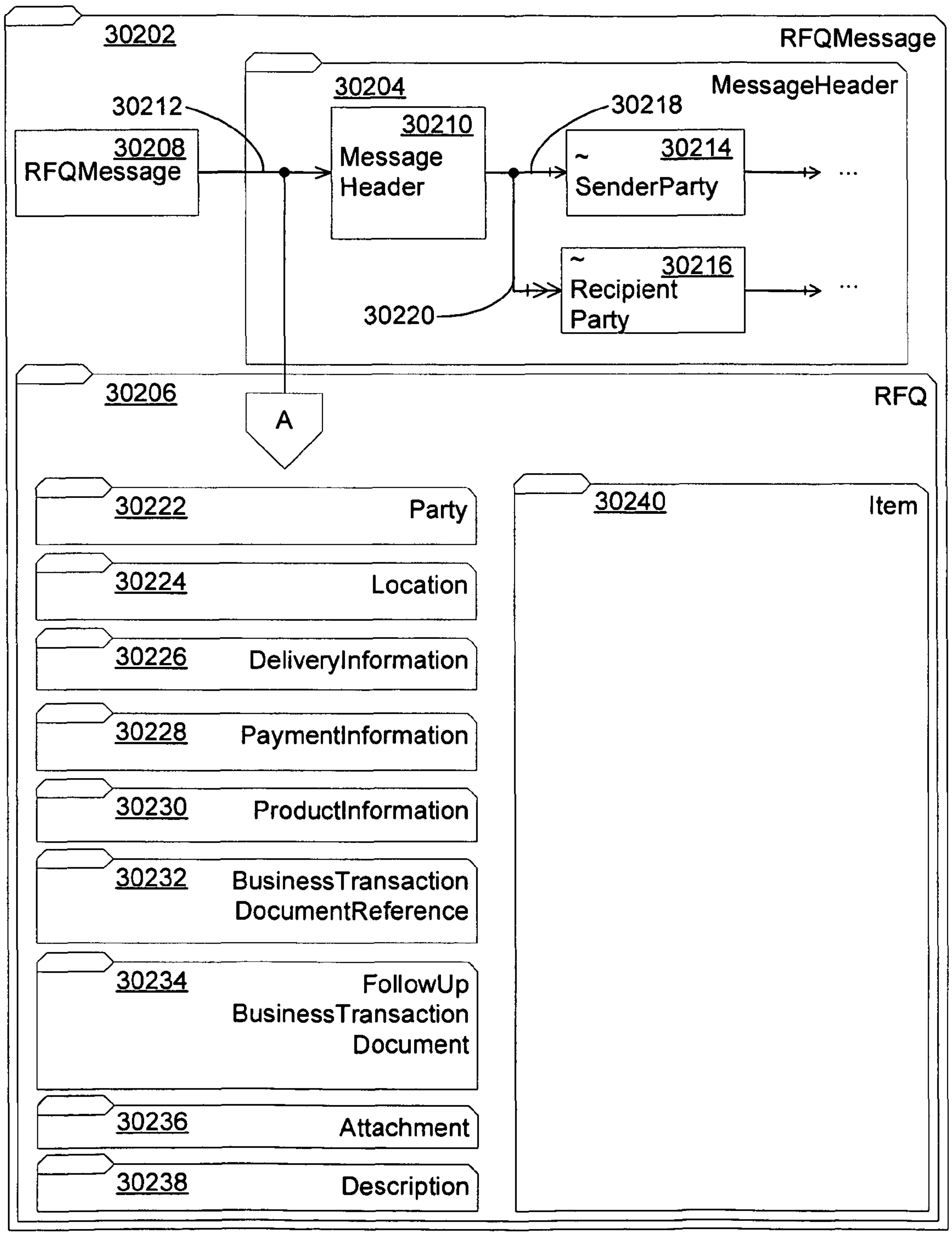
FIGS. 302A-K depict the data model for the RFQ interfaces in accordance with methods and systems consistent with the present invention.
Figure 302B:
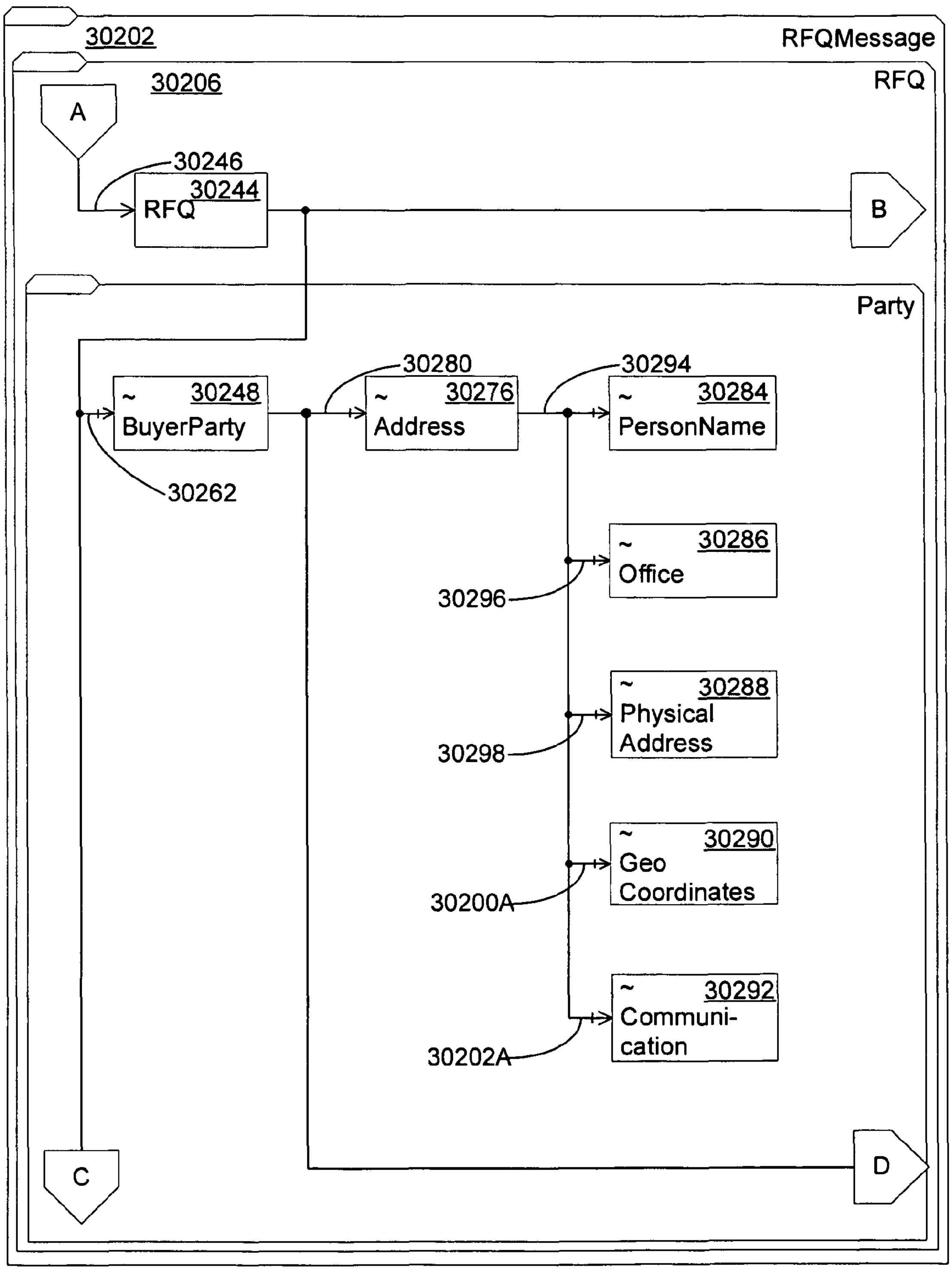
Figure 302C:
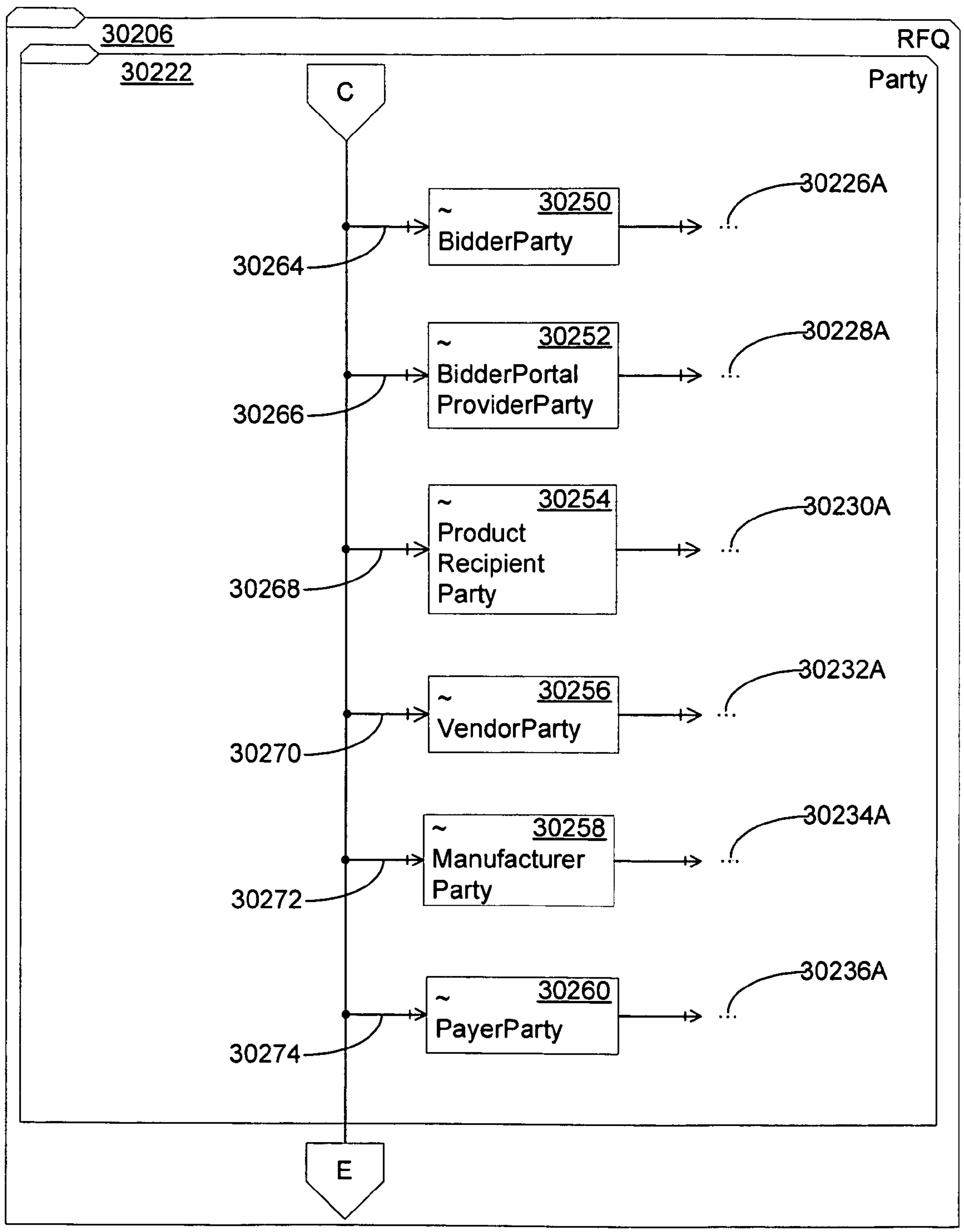
Figure 302D:
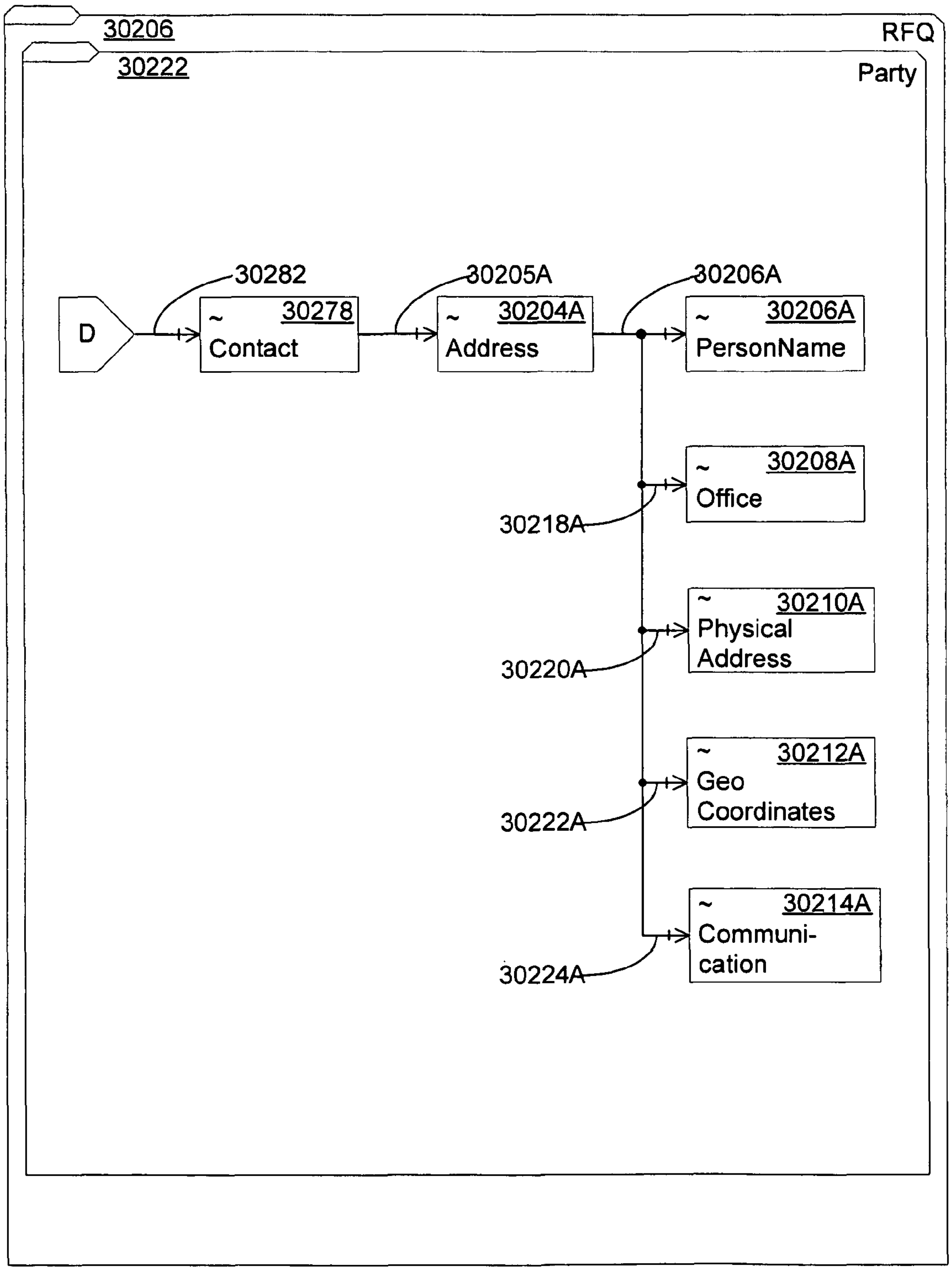
Figure 302E:
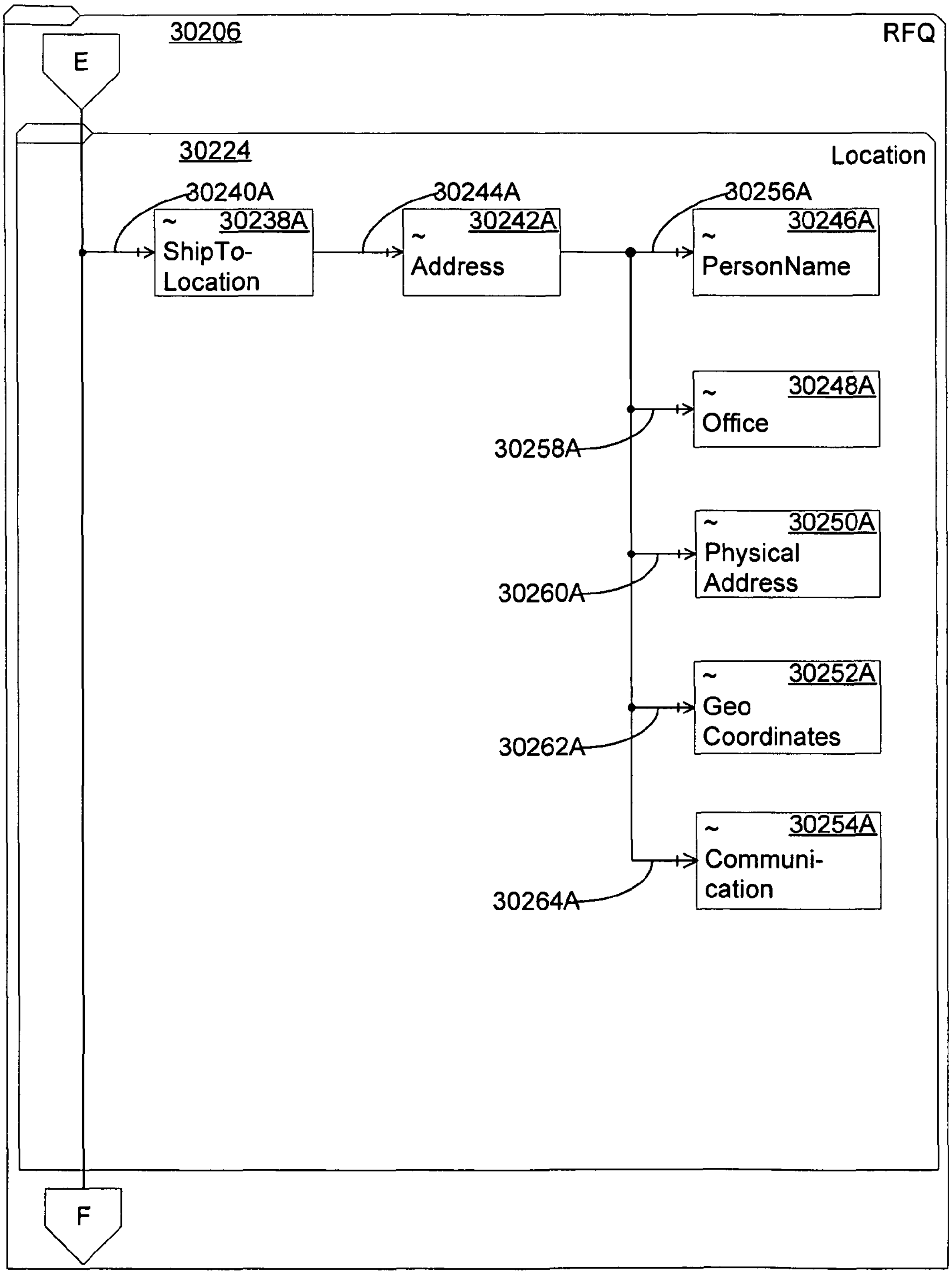
Figure 302F:
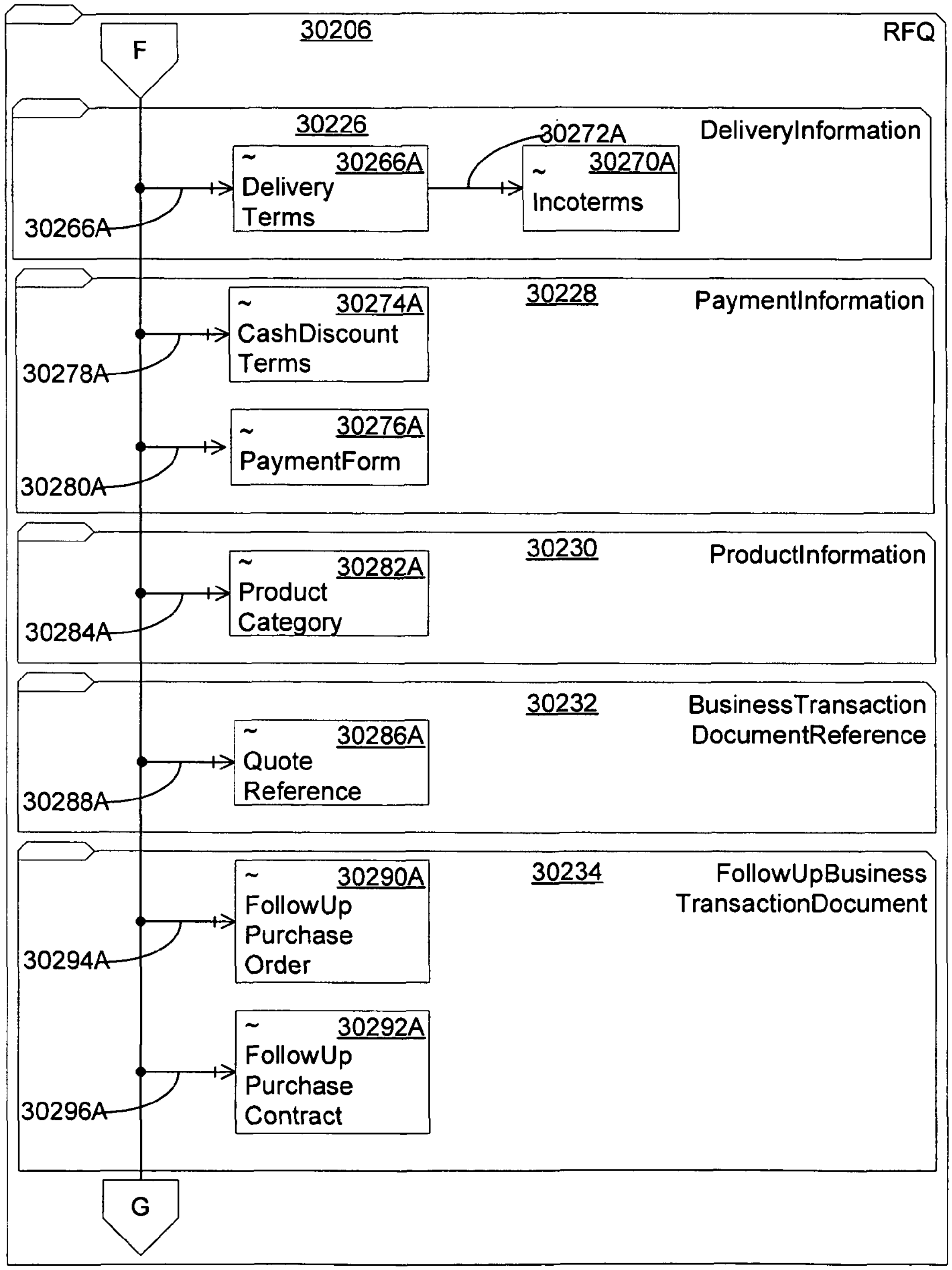
Figure 302G:
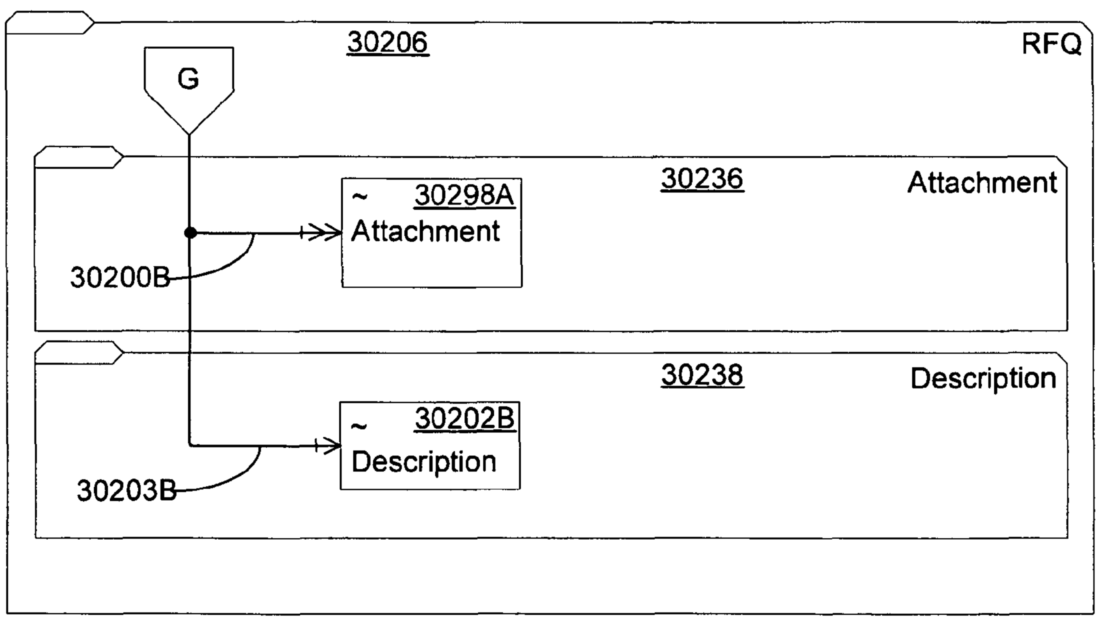
Figure 302H:
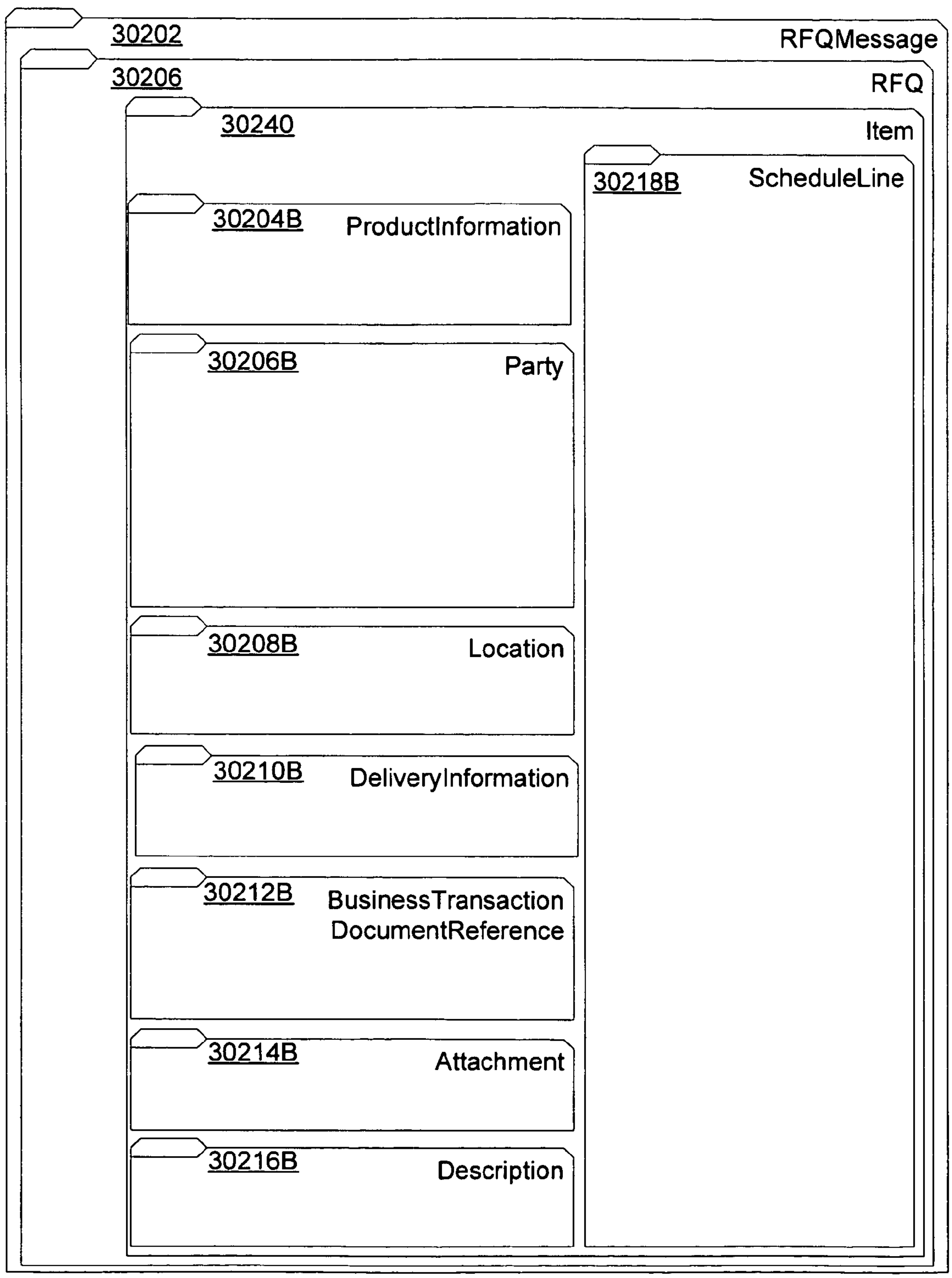
Figure 302I:
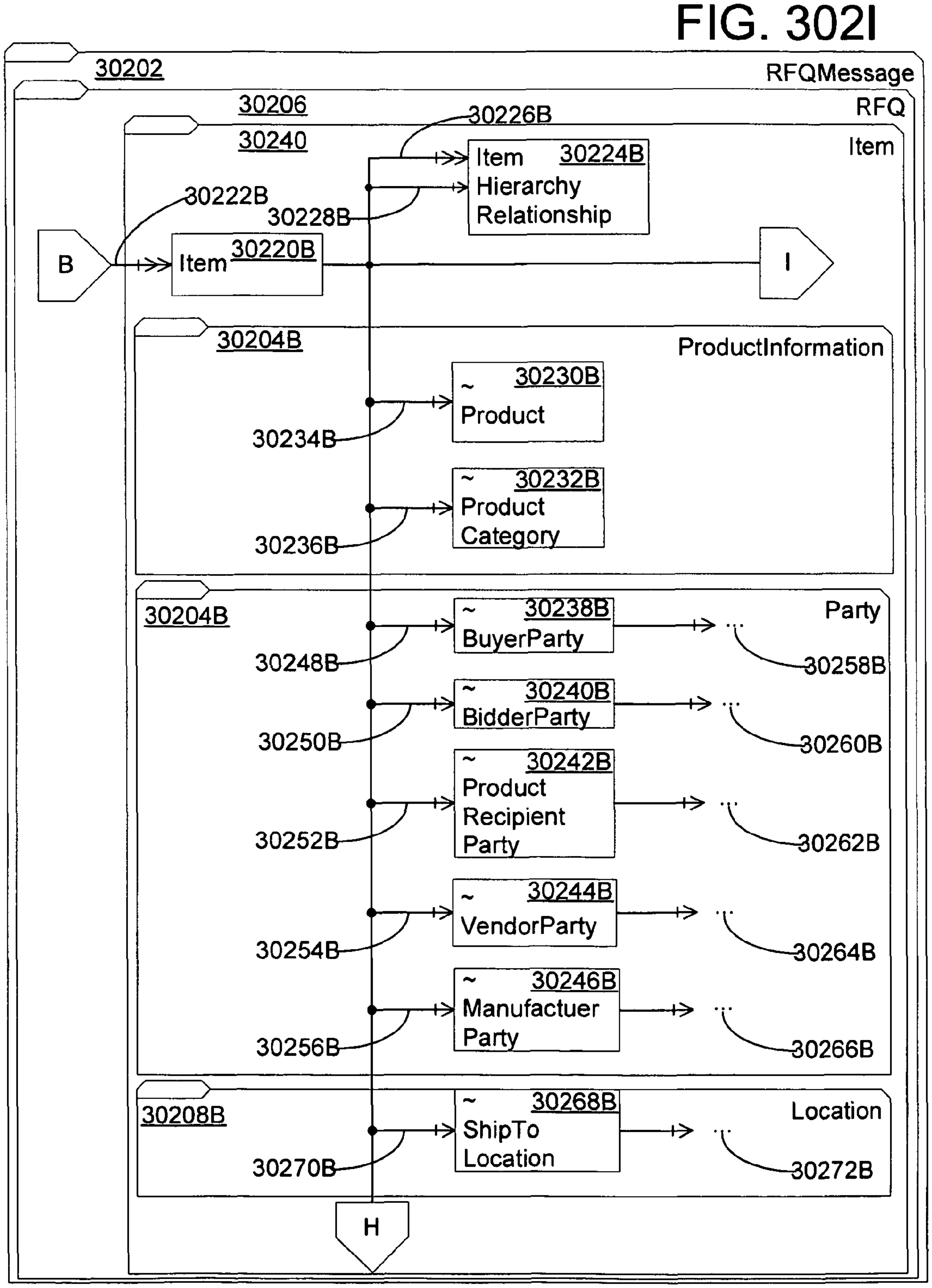
Figure 302J:
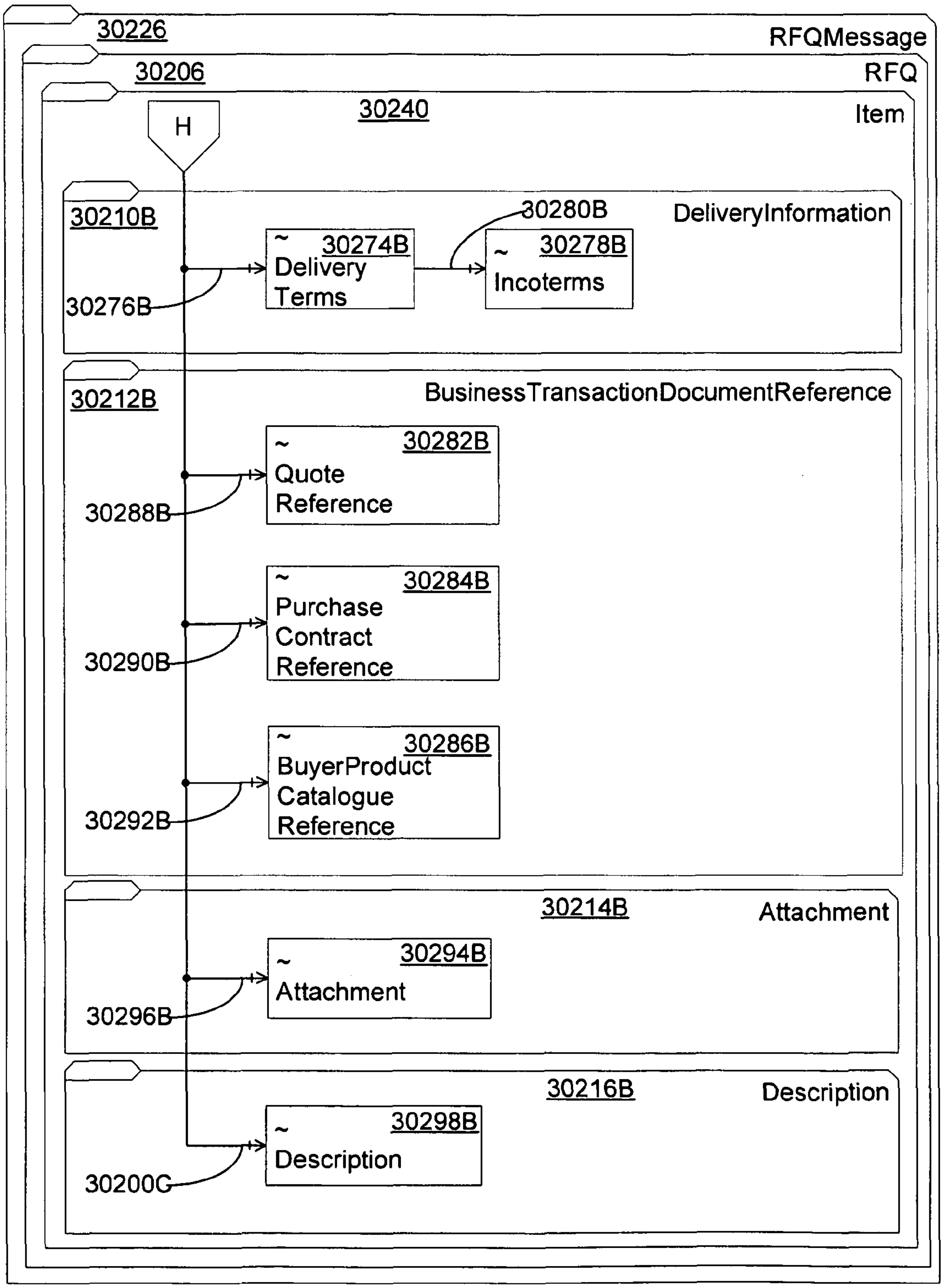
Figure 302K:
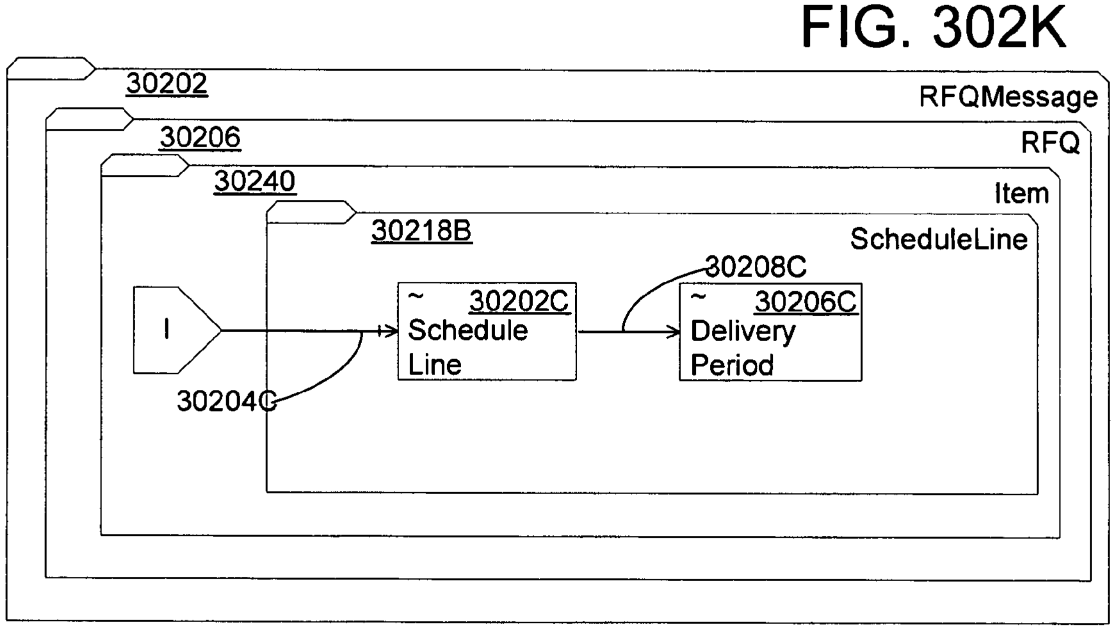

FIG. 301 depicts the message choreography for the RFQ Interfaces. The choreography involves two business entities: a buyer (Purchasing or SRM) 30102 and a bidder (Supplier) 30104. In one implementation, there are five messages that are used to map a B2B RFQ process: (1) RFQRequest; (2) RFQChangeRequest; (3) RFQCancellationRequest; (4) QuoteNotification; and (5) RFQResultNotification. In the implementation shown in FIG. 301, the buyer 30102 sends an RFQRequest message 30106 to the bidder 30104, which is used to start a new RFQ process. In response, the bidder 30104 may send an RFQAcceptanceConfirmation message 30108 to the buyer 30102 to inform the buyer 30102 whether the bidder 30104 intends to submit a quotation. This provides the buyer 30102 with an early indication of whether the bidders that were expected to participate are in fact participating. In the case of a public RFQ process, the bidder 30104 can also use this message to apply to participate and to ask for the RFQ documents to be sent.

The buyer 30102 may send an RFQChangeRequest message 30110 to the bidder 30104, which is used to change an RFQ during an RFQ process. Changing an RFQ includes creating new items, changing existing items, and deleting items. This message is also used when a buyer returns the bidder's quotation for revision.

The buyer 30102 may also send an RFQCancellationRequest message 30112 to the bidder 30104, which is used to cancel an RFQ that is no longer required.

The bidder 30104 may send a QuoteNotification message 30114 to the buyer 30102, which includes the bidder's quotation in response to the buyer's invitation to submit a quotation. The buyer 30102 may send a RFQResultNotification message 30116 to the bidder 30104, which either includes a notification about the RFQ items for which the bidder's quotation has been accepted including the extent of the award or a negative notification if the bidder's quotation was not successful. In response, the bidder 30104 may send an RFQResultAcceptanceConfirmation message 30118 to the buyer 30102 and includes the bidder's acceptance or rejection of the quotation accepted by the buyer 30102. This message may be used particularly if the quotation accepted by the buyer represents a part of the bidder's quotation, since individual items and/or partial quantities in the RFQ are being distributed to several bidders.

The structures of the first five message types to be implemented are specified in the four message data types RFQMessage, RFQCancellationMessage, QuoteMessage, and RFQResultMessage. The structure of the two message types RFQRequest and RFQChangeRequest is specified by the message data type RFQMessage. The parts of the structure that are used differ depending on the message. The description of the RFQMessage below specifies which parts are used in which message.

The structure of the message type RFQCancellationRequest is specified in the message data type RFQCancellationRequest, which has a relatively simple structure. In one implementation, this message type includes the RFQ number. The structure of the message type QuoteNotification is specified in the message data type QuoteMessage. The structure of the message type RFQResultNotification is specified in the message data type RFQResultMessage.

An RFQRequest is a request from a buyer to a bidder to participate in an RFQ process for a product. The structure of the message type RFQRequest is specified in the message data type RFQMessage. The RFQRequest is sent once for each invited bidder. Since the RFQ can be used for contractual negotiations, the structure may also include contract-specific fields. These fields contain information for creating a contract from a successful quotation. The addressee for a message can also be a tendering platform, for example, which means that the actual bidders are not known when the RFQRequest is issued. RFQs issued by public authorities are published with general access. Rather than being invited directly, bidders may apply to participate, via the platform. One aim of the platform may be to avoid giving certain bidders preferential treatment as a result of not inviting or informing, or by implicitly excluding, other bidders.

An RFQChangeRequest is a change to the buyer's request to a bidder to participate in an RFQ process for a product. The structure of the message type RFQChangeRequest is specified in the message data type RFQMessage. The RFQChangeRequest is sent once for each invited bidder in one implementation. This is independent of whether a quotation has already been submitted. In the case of a publication platform (such as a bulletin board), which is used to publish an RFQ, the RFQChangeRequest is sent to the platform and to the bidders who have already submitted a quotation. In the case of a tendering platform, in one implementation, which also manages the quotation process (such as in the public sector), the RFQChangeRequest is sent to the tendering platform. The platform then provides the bidders with information. The scenario that applies depends on the configuration. In one implementation, an RFQChangeRequest can be sent as often as required and at any time, provided that RFQCancellationRequest or RFQResultNotification messages have not been sent. This message can be used to return a quotation from a particular bidder to this bidder for revision. This message asks the bidder in question to revise the quotation and resubmit it, before the buyer can consider it. The RFQChangeRequest is the basis for remaining quotations. Any quotations that have already been submitted are returned to the bidders as a result of this message. Regardless of whether the changes affect the submitted quotation, a quotation is resubmitted in one implementation. The revised quotation might be identical to the quotation that was submitted before the RFQ was changed.

An RFQCancellationRequest is a cancellation of an RFQ for a product by a buyer. The structure of the message type RFQCancellationRequest is specified in the message data type RFQCancellationMessage. The RFQCancellationRequest can be sent at any time up to the submission deadline. After the RFQCancellationRequest has been sent, no further messages are expected. This message is sent to the invited bidders, regardless of whether a quotation already exists. In the case of a tendering platform, the RFQCancellationRequest is sent to the tendering platform and to the bidders who have already submitted a quotation. The RFQCancellationRequest message has its own structure, that is, the structure of the RFQCancellationMessage, with the object ID of the cancelled RFQ.

A QuoteNotification is a quotation submitted by a bidder to a buyer in response to the RFQ for a product issued by the buyer. The structure of the message type QuoteNotification is specified in the message data type QuoteMessage. In one implementation, each invited bidder can submit precisely one quotation. If the bidder wants to make changes to a submitted quotation, the bidder asks the buyer who issued the RFQ to return the quotation for revision. The QuoteNotification can be submitted up to the submission deadline. A quotation can be exchanged between the buyer and the bidder as many times as required, up to the submission deadline. The QuoteNotification message has a separate structure, the QuoteMessage. One reason behind having another structure in addition to the RFQMessage is to encourage bidders to submit quotations on their own initiative, not necessarily in response to an RFQRequest.

An RFQResultNotification is a notification by a buyer to a bidder of the type and extent of the acceptance or rejection of the quotation. The structure of the message type RFQResultNotification is specified in the message data type RFQResultMessage. The RFQResultNotification is sent once for each bidder to the bidders that have submitted a quotation. Successful bidders are sent precise information about the quotation acceptance. Unsuccessful bidders are sent a standard rejection. In the case of a tendering platform, a copy of the RFQResultNotification for the successful bidders can also be sent to the tendering platform so that the result can be published. In the public sector, the decision regarding whose quotation has been accepted is made public.

The interaction between the RFQ interfaces in an RFQ process is described in detail below. Generally, the buyer initiates the RFQ process and invites bidders to submit quotations. Up to the submission deadline, the bidder and buyer exchange quotations, queries, revised quotations, and changes to the RFQ. Once the submission deadline has passed, the buyer compares the quotations and decides to accept the quotation submitted by one particular bidder or several bidders. The buyer can also decide to reject all quotations.

The buyer starts an RFQ process by sending an RFQRequest message. Each invited bidder or addressed public platform receives a separate invitation. Once the RFQ process has been started, the buyer can send change requests at any time, using an RFQChangeRequest message. Quotations that have already been submitted are then resent automatically to the bidder in question. The bidder then resubmits the quotation, in one implementation, before it can be considered by the buyer (even if the RFQChangeRequest does not affect the bidder's quotation).

At any time up to the submission deadline, the buyer can end the RFQ process by sending an RFQCancellationRequest message. If the submission deadline has already passed, the RFQCancellationRequest is no longer used. However, the buyer can decide against all the quotations submitted and therefore reject them. Provided the RFQ has not been set to complete, the buyer can make changes to the RFQ in order to obtain additional quotations or revisions to the submitted quotations by extending the submission deadline. Alternatively, the buyer can create a new RFQ with the same contents or with different contents.

After receiving the RFQRequest message, the bidder can send a quotation to the buyer, using the QuoteNotification message. In one implementation, each invited bidder is allowed to submit one quotation in response to an RFQRequest. To make changes to a submitted QuoteNotification, the bidder asks the buyer who issued the RFQ to return the quotation for revision. The bidder can enter any queries in the quotation and wait for the quotation to be returned, together with a note from the buyer. The quotation can be exchanged any number of times. To withdraw the quotation, the bidder contacts the buyer, who then deletes the quotation.

The buyer can also take the initiative and return a submitted quotation to the bidder, using the RFQChangeRequest, asking for revisions to be made. In this case, the bidder resubmits the quotation for it to be considered in the quotation comparison.

At any time up to the submission deadline, changes and quotations can be exchanged as often as required. However, while the buyer is allowed to send an RFQChangeRequest at any time, or several RFQChangeRequests in succession, an RFQChangeRequest is followed by the QuoteNotification. In one implementation, the QuoteNotification cannot be sent several times in succession.

The quotation process is completed either as a result of the RFQCancellationRequest being sent or the submission deadline passing. Once the submission deadline has passed, the buyer compares the quotations that have been submitted and decides to accept the quotation(s) from one bidder or several bidders. The buyer can also decide to reject all of the submitted quotations. The buyer can split the order quantities as required, up to item level.

In the case of public authority tendering platforms, the steps that stipulate that the buyer is allowed to view the quotations before the submission deadline no longer apply. The quotations are not transferred to the buyer until the opening date of the quotation comparison. Prior to this, the quotations may be kept in encrypted form. In one implementation, the bidder can ask for the quotation to be returned for revision or for it to be deleted because the bidder wants to withdraw it. The result of the RFQ is communicated using the RFQResultNotification message. This message informs the successful bidders which quotation has been accepted and details the specific items and the order quantity involved. Unsuccessful bidders are sent a rejection.

In the RFQ process, messages may be transferred exactly once in order ("EOIO") and serialized using message queues. Each RFQ process may have its own message queue (as opposed to one queue for all RFQ processes) so that one failed message does not block the other RFQ messages in the entire system.

A recipient system may accept every formally correct incoming RFQ message. Business problems are resolved on the buyer side, using an RFQChangeRequest or RFQCancellationRequest message, and on the seller side, using a QuoteNotification message. It is up to the recipient system to distinguish between technical and business errors. Borderline cases may include incorrect ISO codes for currencies, and languages. In order to restart an RFQ process that is corrupt as a result of a failed message, the procurement system provides an option for transferring the current status of the RFQ, together with the associated data, at any time using an RFQChangeRequest message. In order to restart a process following a failed RFQRequest message, the procurement system should be able to restart an RFQ process at any time using an RFQRequest message. The RFQResultNotification has legal implications. Following a failed RFQResultNotification, the procurement system should therefore be able to repeat this message.

(2) Message Data Type RFQ Message

The message data type RFQMessage groups together the business information relevant for sending a business document in a message and the RFQ object in the document. As depicted in FIG. 302, the RFQMessage package 30202 includes a MessageHeader package 30204, an RFQ package 30206 and an RFQMessage entity 30208.

(a) Message Header Package

A MessageHeader package 30208 groups together the business information that is relevant for sending a business document in a message. It includes a MessageHeader entity 30210. There is a 1:1 relationship 30212 between the RFQMessage 30208 and the MessageHeader entity 30210.

A MessageHeader entity 30210 groups the business information from the perspective of the sending application to identify the business document in a message, to provide information about the sender, and to provide any information about the recipient. The MessageHeader entity 30210 includes a SenderParty entity 30214 and a RecipientParty entity 30216. There is a 1:c relationship 30218 between the MessageHeader entity 30210 and the SenderParty entity 30214. There is a 1:cn relationship 30220 between the MessageHeader entity 30210 and the RecipientParty entity 30216. The MessageHeader entity 30210 is of type GDT: BusinessDocumentMessageHeader. The MessageHeader entity 30210 includes an ID, a ReferenceID, and a CreationDateTime.

The MessageID is set by the sending application. With the ReferenceMessageID, reference is made in the current BusinessDocument to a previous BusinessDocument. The ReferenceMessageID should be filled in order to avoid inconsistencies that can arise as a result of sending messages in the pipeline at the same time, e.g., the buyer changes the RFQ and sends the message with the changes (RFQChangeRequest) to the bidders. At the same time, a bidder sends a QuoteNotification. Without the ReferenceMessageID in the message header in the QuoteNotification and in the case of longer transmission times for the messages, it may no longer be possible to determine clearly whether the QuoteNotification sent by the bidder refers to the old RFQ or to the new, changed RFQ.

The SenderParty is the party responsible for sending a business document at business application level. The SenderParty entity 30214 is of type GDT: BusinessDocumentMessageHeader-Party. The SenderParty entity 30214 can be filled by the sending application to name a contact person for any problems with the message. This is particularly useful if an additional infrastructure (such as a marketplace or a tendering platform) is located between the sender and the recipient. The SenderParty entity 30214 is used to transfer the message and can be ignored by the receiving application. It should be filled by the sender particularly if the participating parties are not transferred with the RFQ package 30206.

The RecipientParty is the party responsible for receiving a business document at business application level. The RecipientParty entity 30216 is of type GDT: BusinessDocumentMessageHeaderParty. The RecipientParty entity 30216 can be filled by the sending application to name a contact person for any problems that occur with the message. This is particularly useful if an additional infrastructure (such as a marketplace or a tendering platform) is located between the sender and the recipient. The RecipientParty entity 30216 is used to transfer the message and can be ignored by the receiving application. It should be filled by the sender particularly if the participating parties are not transferred with the RFQ package 30206.

(i) RFQ Package

The RFQ package 30206 includes a Party package 30222, a Location package 30224, a DeliveryInformation package 30226, a PaymentInformation package 30228, a ProductInformation package 30230, a BusinessTransactionDocumentReference package 30232, a FollowUpBusinessTransactionDocument package 30234, an Attachment package 30236, a Description package 30238, and an Item package 30240. The RFQ package 30206 also includes an RFQ entity 30244. There is a 1:1 relationship 30246 between the RFQMessage entity 30208 and the RFQ entity 30244.

The RFQ entity 30244 is a request (or a change to a request) from a buyer to a bidder to submit a quotation for the products (goods or services) specified in the RFQ. In addition to the buying party and the bidder, additional parties can be involved in the RFQ entity 30244 (see Party package 30222 below). The delivery location can also be specified (see Location package 30224 below). Delivery and payment terms are also agreed upon (see DeliveryInformation package 30226 and PaymentInformation package 30228 below). The RFQ entity 30244 can contain a reference to a Quote if the bidder has a question or if the buyer has changed the RFQ entity 30244 (see BusinessTransactionDocumentReference package 30232 and FollowUpBusinessTransactionDocumentReference package 30234 below). Notes or references to attachments can be specified for the RFQ (see Attachment package 30236 and Description package 30238 below). The RFQ entity 30244 is of type GDT: RFQ.

The RFQ entity 30244 includes an ID, a PostingDateTime, a LastChangeDateTime, a PublishDateTime, a DisplayDateTime, a BiddingStartDateTime, a QuoteSubmissionDateTime, a QuoteOpeningDateTime, a QuoteBindingDateTime, a ContractValidityDateTimePeriod, a Note, an RFQPublicIndicator, a QuoteUnplannedItemPermissionCode, a QuotePriceBiddingCondition-Code, a QuoteQuantityBiddingConditionCode, a QuoteItemBiddingConditionCode, and a ContractTargetAmount. The ID is a unique identifier specified by the buyer for the RFQ. The ID is of type GDT: BusinessTransactionDocumentID.

The PostingDateTime is the creation date/time of the RFQ at the buyer. The PostingDateTime is of type GDT: DateTime, as are the following elements in this paragraph. The LastChangeDateTime is the date/time of the last change made to the RFQ by the buyer. The PublishDateTime is the date/time when the RFQ is sent. The DisplayDateTime is the date/time as of which the published RFQ is displayed on a tendering platform. The BiddingStartDateTime is the date/time as of which quotations can be submitted. The QuoteSubmissionDateTime is the date/time after the BiddingStartDateTime up to which quotations can be submitted. The QuoteOpeningDateTime is the date/time when the quotations are opened and displayed for the quotation comparison. The QuoteBindingDateTime is the date/time up to which bidders are bound to the quotations they have submitted.

The ContractValidityDateTimePeriod is the validity period of the contract that is to be assigned using the RFQ. The ContractValidityDateTimePeriod is of type GDT: DateTimePeriod. The Note is a short description or the title of the RFQ. It is generally used to provide the user with a simple method for searching for a particular RFQ. The Note is of type GDT: Note. The RFQPublicIndicator specifies whether the RFQ process is a closed RFQ process with bidders that have been explicitly invited or an open RFQ process in which bidders who have not been explicitly invited can also participate. The RFQPublicIndicator is of type GDT: BusinessTransactionDocumentPublicIndicator. The QuoteUnplannedItem-PermissionCode specifies whether the bidder's quotation is allowed to contain own items with alternative quotations. The QuoteUnplannedItemPermissionCode is of type GDT: UnplannedItemPermissionCode. The QuotePriceBidding-ConditionCode specifies whether the bidder is allowed to specify pricing information. If the RFQ is used to check the bidder's ability to meet certain technical requirements, for example, prices might not be required. The QuoteQuantity-BiddingConditionCode specifies whether the bidder is allowed to enter in the quotation a quantity other than the requested quantity. The QuoteItemBiddingConditionCode specifies whether the bidder has to submit a quotation for all items. The QuotePriceBidding-ConditionCode and QuoteItemBiddingConditionCode are of type GDT: Bidding-ConditionCode. The ContractTargetAmount is the target amount in contractual negotiations. The ContractTargetAmount is of type GDT: Amount.

The ContractTargetAmount in the QuoteNotification is information provided to the buyer by the bidder. The ContractTarget-Amount is used if a contract is to be negotiated and assigned using an RFQ. Differences between the RFQ-ContractTargetAmount and the QuoteContractTargetAmount are allowed and are subject to the business framework of the negotiation process as defined by the buyer and bidder. There are no dependencies between how the ContractTargetAmount is used at header and/or item level. The bidder decides which information to supply to the buyer.

(ii) RFQ Party Package

The Party package 30222 groups together the business parties that occur in one of the RFQ messages. The party package 30222 includes a BuyerParty entity 30248, a BidderParty entity 30250, a BidderPortalProviderParty entity 30252, a ProductRecipientParty entity 30254, a VendorParty entity 30256, a ManufacturerParty entity 30258, and a PayerParty entity 30260. There is a respective 1:c relationship 30262, 30264, 30266, 30268, 30270, 30272, and 30274 between the RFQ entity 30244 and the BuyerParty entity 30248, the BidderParty entity 30250, the BidderPortalProviderParty entity 30252, the ProductRecipientParty entity 30254, the VendorParty entity 30256, the ManufacturerParty entity 30258, and the PayerParty entity 30260.

In one implementation, either the ID or the ID and address can be transferred for each party. If the ID is transferred, the ID address defined in the master data is used. If the ID and address are transferred, the ID identifies the party and the address is deemed to be a document address that is different to the master data address. The ID and address may be sent to avoid misunderstandings. The receiving application may implement a suitable optimization strategy to ensure that the system does not create many identical document addresses.

A default logic is used for the parties: from the header to the items and within item hierarchies. Parties specified in the header are used for the items for which a corresponding party is not explicitly transferred and that are directly assigned to the header. In accordance with the same logic, parties transferred at item level are used for subitems assigned to the relevant item in an item hierarchy. The default logic is used for the party as a whole, including the contact person. In one implementation, parts of a party specified at header level or for a hierarchy item cannot be specified in more detail at item level. The default logic may be a simplified version of the transferred message. As regards logic, parties at header level and for hierarchy items behave as if they have been explicitly transferred for the subitems of the message. This also means that if changed items are transmitted rather than all items, the parties are used for the transmitted items. Changes made to parties also apply to items relevant for the party in question.

A BuyerParty is a party that buys goods or services. The BuyerParty entity 30248 is of type GDT: BusinessTransactionParty. The same BuyerParty entity 30248 is used for all the items in an RFQ in one implementation. The BuyerParty is not changed once an RFQ has been created. Changes can be made to the BuyerParty/Contact entity and a different BuyerParty/Contact entity is permitted for each item. Changes can be made to the address of the BuyerParty, but different addresses are not permitted for each item. If a ProductRecipientParty is not explicitly specified in an RFQ process, the BuyerParty is also used as the ProductRecipientParty. If a ProductRecipientParty and ShipToLocation are not explicitly specified in the RFQ process, the BuyerParty address is also used as the ship-to address. If a PayerParty is not explicitly specified in an RFQ process, the BuyerParty is also used as the PayerParty.

The BuyerParty entity 30248 includes an Address entity 30276 and a Contact entity 30278. There is a 1:c relationship 30280 between the BuyerParty entity 30248 and the Address entity 30276, and there a 1:c relationship 30282 between the BuyerParty entity 30248 and Contact entities 30278. The Address entity 30276 includes a PersonName entity 30284, an Office entity 30286, a PhysicalAddress entity 30288, a GeoCoordinates entity 30290 and a Communication entity 30292. There is a respective 1:c relationship 30294, 30296, 30298, 30200A, and 30202A between the Address entity 30276 and the PersonName entity 30284, the Office entity 30286, the PhysicalAddress entity 30288, the GeoCoordinates entity 30290 and the Communication entity 30292.

The Contact entity 30278 includes an Address entity 30204A. There is a 1:c relationship 30205A between the Contact entity 30278 and the Address entity 30204A. The Address entity 30204A includes a PersonName entity 30206A, an Office entity 30208A, a PhysicalAddress entity 30210A, a GeoCoordinates entity 30212A, and a Communication entity 30214A. There is a respective 1:c relationship 30216A, 30218A, 30220A, 30222A, and 30224A between the Address entity 30204A and the PersonName entity 30206A, the Office entity 30208A, the PhysicalAddress entity 30210A, the GeoCoordinates entity 30212A, and the Communication entity 30214A.

The BidderParty is a party that bids for goods or services. The BidderParty entity 30250 is of type GDT: BusinessTransactionDocumentParty. The same BidderParty entity 30250 may be used for all the items in an RFQ. The BidderParty entity 30250 is not changed once an RFQ has been created. Changes can be made to the BidderParty/Contact entity and a different BidderParty/Contact entity is permitted for each item. Changes can be made to the address of the BidderParty, but different addresses are not permitted for each item. If a VendorParty is not explicitly specified in an RFQ process, the BidderParty is also used as the VendorParty. If a VendorParty and ShipFromLocation are not explicitly specified in an RFQ process, the address of the BidderParty is used as the ship-from address for the material items. The BidderParty entity 30250 includes the same elements as that described above for the BuyerParty entity 30248, as denoted by ellipses 30226A.

A BidderPortalProviderParty is a party that runs a portal that brings business partners together for a business transaction. The BidderPortalProviderParty entity 30252 is of type GDT: BusinessTransactionDocumentParty. The BidderPortalProviderParty entity 30252 is explicitly specified if an RFQ is to be sent to a public tendering platform. The BidderPortalProviderParty entity 30252 includes the same elements as that described above for the BuyerParty entity 30248, as denoted by ellipses 30228A.

The ProductRecipientParty is the party to which goods are delivered or for whom services are provided. The ProductRecipientParty entity 30254 is of type GDT: BusinessTransactionDocumentParty. If a ShipToLocation is not explicitly specified in an RFQ process, the ProductRecipientParty entity 30254 address is used as the ship-to address. The ProductRecipientParty is not synonymous with the ShipToLocation and should be used when the ProductRecipientParty (company or person) is different than the BuyerParty. The ProductRecipientParty entity 30254 includes the same elements as that described above for the BuyerParty entity 30248, as denoted by ellipses 30230A.

A VendorParty is a party that delivers goods or provides services. The VendorParty entity 30256 is of type GDT: BusinessTransactionDocumentParty. If a ShipFromLocation is not explicitly specified in an RFQ process, the address of the VendorParty entity 30256 is used as the ship-from address for the material items. The VendorParty entity 30256 is not the company or person that is responsible for transporting the goods. The CarrierParty entity is responsible for this; however, this party is not typically used in the RFQ interfaces. The VendorParty is not synonymous with the ShipFromLocation and should be used when the VendorParty (company or person) is actually different than the BidderParty. The VendorParty entity 30256 includes the same elements as that described above for the BuyerParty entity 30248, as denoted by ellipses 30232A.

A ManufacturerParty is a party that manufactures goods. The ManufacturerParty entity 30258 is of type GDT: BusinessTransactionDocumentParty. The ManufacturerParty entity 30258 can be used for material items. With regard to the ManufacturerParty entity 30258, the default logic (from header to item to subitems) is used for material items; for other items, the ManufacturerParty entity 30258 is ignored. The ManufacturerParty entity 30258 can be used to uniquely define the context of a ManufacturerProductID entity. The ManufacturerParty entity 30258 includes the same elements as that described above for the BuyerParty entity 30248, as denoted by ellipses 30234A.

A PayerParty is a party that pays for goods or services. The PayerParty entity 30260 is of type GDT: BusinessTransactionDocumentParty. The PayerParty is used for the ContractPayer. The ContractPayer is the party paying for contractual negotiations. The PayerParty entity 30260 includes the same elements as that described above for the BuyerParty entity 30248, as denoted by ellipses 30236A.

(iii) RFQ Location Package

A Location package 30224 groups together the locations that can occur in one of the RFQ messages. The Location package 30224 includes a ShipToLocation entity 30238A. There is a 1:c relationship 30240A between the RFQ entity 30244 and the ShipToLocation entity 30238A. The ShipToLocation entity 30238A includes an Address entity 30242A. There is a 1:c relationship 30244A between the ShipToLocation entity 30238A and the Address entity 30242A.

A similar default logic to that used for Parties is also used for locations. In one implementation, either the ID or the address, or both can be transferred to each location. If the ID is transferred, the ID address defined in the master data is used. If the address is transferred, it is this address that is used (if necessary, a location is assigned at the address recipient). If the ID and address are transferred, the ID identifies the location and the address is deemed to be a document address that is different to the master data address. The ID and address may be sent to avoid misunderstandings. The receiving application should implement a suitable optimization strategy to ensure that the system does not create many identical document addresses.

The ShipToLocation is the location to which goods are to be delivered or where services are to be provided. The ShipToLocation entity 30238A is of type GDT: BusinessTransaction-DocumentLocation.

The Address entity 30242A includes a PersonName entity 30246A, an Office entity 30248A, a PhysicalAddress entity 30250A, a GeoCoordinates entity 30252A, and a Communication entity 30254A. There is a respective 1:c relationship 30256A, 30258A, 30260A, 30262A, and 30264A between the Address entity 30242A and the PersonName entity 30246A, the Office entity 30248A, the PhysicalAddress entity 30250A, the GeoCoordinates entity 30252A, and the Communication entity 30254A.

(iv) RFQ Delivery Information Package

A DeliveryInformation package 30226 groups together the information about a required delivery in an RFQ process. The DeliveryInformation package 30226 includes a DeliveryTerms entity 30266A. There is a 1:c relationship 30268A between the RFQ entity 30244 and the DeliveryTerms entity 30266A.

The DeliveryTerms is the condition and agreement that is valid for executing the delivery and transporting the tendered goods and for the necessary services and activities. The DeliveryTerms entity 30266A is type GDT: DeliveryTerms. It includes an Incoterms entity 30270A. There is a 1:c relationship 30272A between the DeliveryTerms entity 30266A and the Incoterms entity 30270A. The Incoterms is allowed to be used for material items. The default logic takes the Incoterms entity into account for material items. For other items, Incoterms may be ignored.

(v) RFQ Payment Information package

A PaymentInformation package 30228 groups together the payment information in an RFQ process. The PaymentInformation package 30228 includes a CashDiscountTerms entity 30274A and a PaymentForm entity 30276A. There is a 1:c relationship 30278A between the RFQ entity 30244 and the CashDiscountTerms entity 30274A, and a 1:c relationship 30280A between the RFQ entity 30244 and the PaymentForm entity 30276A.

The CashDiscountTerms is the term of payment in an RFQ process. The CashDiscountTerms entity 30274A is type GDT: CashDiscountTerms.

A PaymentForm is the payment form together with the data required. The PaymentForm entity 30276A includes a PaymentFormCode, which is the coded representation of the payment form. The PaymentFormCode is of type GDT: PaymentFormCode.

(vi) RFQ Product Information Package

The ProductInformation package 30230 groups together the product category. The ProductInformation package 30230 includes a ProductCategory entity 30282A. There is a 1:c relationship 30284A between the RFQ entity 30244 and the ProductCategory entity 30282A.

The ProductCategory includes the details about a product category as generally understood from a commercial point of view in business transaction documents. The ProductCategory entity 30282A includes details for identifying the product category using an internal ID, a standard ID, and IDs assigned by involved parties. The ProductCategory entity 30282A is of type GDT: BusinessTransactionDocument-ProductCategory. The product category at header level can be used to classify the RFQ and provide the bidders with an initial indication of what is involved in the RFQ. The product category can differ between the buyer and seller.

(vii) RFQ Business Transaction Document Reference Package

The BusinessTransactionDocumentReference package 30232 groups together business document references that can occur in one of the RFQ messages. The BusinessTransaction-DocumentReference package 30232 includes a QuoteReference entity 30286A. There is a 1:c relationship 30288A between the RFQ entity 30244 and the QuoteReference entity 30286A.

A QuoteReference is a reference to a quotation. The QuoteReference entity 30286A is of type GDT: BusinessTransactionDocument-Reference.

In one implementation, a QuoteReference can reference one quotation, that is, one ID is permissible. As far as the referenced quotation is concerned, there are no conflicts with a QuoteReference at item level. If a reference is used at both header and item level, it refers to one (the same) quotation.

The reference to a quotation is required at both header and item level, since RFQs do not always have item data. The QuoteReference is used when questions and answers are exchanged between the bidder and buyer and if the RFQ is changed.

(viii) RFQ Follow-Up Business Transaction Document Package

A FollowUpBusinessTransactionDocument package 30234 groups together the information about which business transaction documents the buyer is expecting as a result of the RFQ process. The FollowUpBusinessTransactionDocument entity 30234 includes a FollowUpPurchaseOrder entity 30290A and a FollowUpPurchaseContract entity 30292A. There is a 1:c relationship 30294A between the RFQ entity 30244 and the FollowUpPurchaseOrder entity 30290A, and a 1:c relationship 30296A between the RFQ entity 30244 and the FollowUpPurchaseContract entity 30292A. In the FollowUpBusinessTransactionDocument package 30234, the buyer provides the bidders with information about whether the RFQ is to result in a contract or a purchase order. However, the buyer can also leave this open by not providing any information.

The FollowUpPurchaseOrder provides information about whether the buyer expects a purchase order as a result of the RFQ process. The FollowUpPurchaseOrder entity 30290A includes a RequirementCode, which is a coded representation of information about whether the buyer expects a purchase order as a result of the RFQ process. The RequirementCode is of type GDT: FollowUpBusinessTransaction-DocumentRequirementCode. The RequirementCode entity can be changed by the buyer.

The FollowUpPurchaseContract provides information about whether the buyer expects a contract as the result of the RFQ process. The FollowUpPurchaseContract entity 30292A includes a RequirementCode, which is a coded representation of information about whether the buyer expects a contract as a result of the RFQ process. The Requirement-Code is of type GDT: FollowUpBusinessTransaction-DocumentRequirementCode. The RequirementCode can be changed by the buyer.

(ix) RFQ Attachment Package

The Attachment package 30236 groups together the attachment information regarding the RFQ. The Attachment package 30236 includes an Attachment entity 30298A. The Attachment is any document that refers to the RFQ. The Attachment entity 30298A is of type GDT: Attachment. There is a 1:c relationship 30200B between the RFQ entity 30244 and the Attachment entity 30298A.

(x) RFQ Description Package

The Description package 30238 groups together the texts regarding the RFQ. The Description package 30238 includes a Description entity 30202B. The Description is a natural-language text regarding the RFQ, which is visible to parties. The Description entity 30202B is of type GDT: Description. There is a 1:c relationship 30203B between the RFQ entity 30244 and the Description entity 30202B.

The Description can be used for textual information about the transferred RFQ and not just the current message. An example of this would be information stating that the employee responsible in Purchasing will be on vacation as of a specific date, and indicating the name and telephone number of a substitute as of this date. The Description can also be used for communication between the buyer and bidder in order to process queries, for example. In the case of a public tendering platform, measures are taken to ensure that individual communications with individual bidders, which contain explanatory information about the RFQ, are also made available to other RFQ participants. This is ensured by sending a copy of the description to the tendering platform, where it is published.

(xi) RFQ Item Package

An RFQItem package 30240 includes a ProductInformation package 30204B, a Party package 30206B, a Location package 30208B, a DeliveryInformation package 30210B, a BusinessTransactionDocumentReference package 30212B, an Attachment package 30214B, a Description package 30216B, and a ScheduleLine package 30218B. The Item package 30240 also includes an RFQItem entity 30220B. There is a 1:cn relationship 30222B between the RFQ entity 30244 and the RFQItem entity 30220B. RFQItem entities are arranged hierarchically using a Hierarchy Relationship 30224B. The Hierarchy Relationship 30224B is the relationship between a sub-item and a higher-level parent item in an item hierarchy. There is a 1:c n relationship 30226B between the RFQItem entity 30220B and its subordinate entities, and there is a 1:c relationship 30228B between the RFQItem entity 30220B and its superordinate entities.

The RFQItem specifies a product tendered by an RFQ with additional information on such a product. The RFQItem entity 30220B includes detailed information about a particular product (see ProductInformation package 30204B). The quantity of the product and (delivery) dates/times are specified in the schedule line. For the RFQItem (compared to the information of the RFQ), deviating parties, locations, and delivery terms can be defined (see Party package 30206B, Location package 30208B, and DeliveryInformation package 30210B). The RFQItem can contain references to other business documents that are relevant for the item (see BusinessTransactionDocumentReference package 30212B). Notes or references to attachments can also be specified for the RFQItem (see Attachment package 30214B and Description package 30216B). The RFQItem entity 30220B is of type GDT: RFQItem.

The RFQItem entity 30220B includes an ID and a ContractTargetAmount. The ID is a unique identifier specified by the buyer for an item within an RFQ. The ID is of type GDT: BusinessTransactionDocumentItemID. The ContractTargetAmount is the target amount in contractual negotiations. The ContractTargetAmount is of type GDT: Amount.

A HierarchyRelationship 30224B includes a ParentItemBuyerID, a ParentItemVendorID, and a TypeCode. The ParentItemBuyerID is the reference to a parent item with the item number assigned by the buyer. The ParentItemBuyerID is of type GDT: BusinessTransactionDocumentItemID. The ParentItemVendorID is the reference to a parent item with the item number assigned by the seller. The ParentItemVendorID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode. The ParentItemBuyerID, ParentItemVendorID and TypeCode are generally not changed once an item has been created. Either the ParentItemBuyerID or the ParentItemVendorID is specified.

(a) RFQ Item Product Information Package

A ProductInformation package 30204B groups together the product and the product category. The ProductInformation package 30204B includes a Product entity 30230B and a ProductCategory entity 30232B. There is a 1:c relationship 30234B between the Item entity 30220B and the Product entity 30230B, and a 1:c relationship 30236B between the Item entity 30220B and the ProductCategory entity 30232B.

A Product includes the details about a product as generally understood from a commercial point of view in business documents. These are the details for identifying a product and product type, and the description of the product. The Product entity 30230B is of type GDT: BusinessTransactionDocumentProduct.

A ProductCategory includes the details about a product category as generally understood from a commercial point of view in business transaction documents. The ProductCategory entity 30232B includes details for identifying the product category using an internal ID, a standard ID, and IDs assigned by involved parties. The ProductCategory entity 30232B is of type GDT: BusinessTransaction-DocumentProductCategory. The product category is derived directly from the product if a product number is specified for the product. It can differ for the buyer and seller if they have classified the same product differently. This is allowed and should be tolerated by the systems involved. The product category at item level can differ from the product category at header level.

(b) RFQ Item Party Package

The Party package 30206B groups together the business parties that can occur in one of the RFQ messages at the item level and represents part of the Party package 30222 at the header level. The party package 30206B includes a BuyerParty entity 30238B, a BidderParty entity 30240B, a ProductRecipientParty entity 30242B, a VendorParty entity 30244B, and a ManufacturerParty entity 30246B. There is a respective 1:c relationship 30248B, 30250B, 30252B, 30254B, and 30256B between the Item entity 30220B and the BuyerParty entity 30238B, the BidderParty entity 30240B, the ProductRecipientParty entity 30242B, the VendorParty entity 30244B, and the ManufacturerParty entity 30246B. Each of the BuyerParty entity 30238B, the BidderParty entity 30240B, the ProductRecipientParty entity 30242B, the VendorParty entity 30244B, and the ManufacturerParty entity 30246B includes the same elements as that described above for the BuyerParty entity 30248 as denoted by ellipses 30258B, 30260B, 30262B, 30264B, and 30266B.

(c) RFQ Item Location Package

Similar to the Location package 30224 at the header level, the Location package 30208B at the item level includes a ShipToLocation entity 30268B. There is a 1:c relationship 30270B between the Item entity 30220B and the ShipToLocation entity 30268B. The ShipToLocation entity 30268B includes the same elements as that described above for the ShipToLocation entity 30238A as denoted by ellipses 30272B.

(d) RFQ Item Delivery Information Package

Similar to the DeliveryInformation package 30226 at the header level, the DeliveryTerms package 302101B at the item level includes a DeliveryTerms entity 30274B. There is a 1:c relationship 30276B between the Item entity 30220B and the DeliveryTerms entity 30274B. The DeliveryTerms contains a MaximumLeadTimeDuration, which is the maximum lead time from the time of the order to the receipt of the delivery. This duration can be agreed in RFQs or contractual negotiations and represents the basis (that is binding) for the calculation of the received delivery date for an order date. The MaximumLeadTimeDuration is of type GDT: Duration.

The DeliveryTerms entity 30274B includes an Incoterms entity 30278B. There is a 1:c relationship 30280B between the DeliveryTerms entity 30274B and the Incoterms entity 30278B.

(e) RFQ Item Business Transaction Document Reference Package

The BusinessTransactionDocumentReference package 30212B groups together the business document references that can occur in one of the RFQ messages. The BusinessTransaction-DocumentReference package 30212B includes a QuoteReference entity 30282B, a PurchaseContractReference entity 30284B, and a BuyerProductCatalogueReference entity 30286B. There is a respective 1:c relationship 30288B, 30290B, and 30292B between the Item entity 30220B and the QuoteReference entity 30282B, the PurchaseContractReference entity 30284B, and the BuyerProductCatalogueReference entity 30286B.

A QuoteReference is a reference to the quotation or the item within the quotation. The QuoteReference entity 30282B is of type GDT: BusinessTransactionDocumentReference. In one implementation, a QuoteReference entity 30282B can reference one item, that is, one ItemID is permissible. As far as the referenced quotation is concerned, there are no conflicts with a QuoteReference entity 30286A at the header level. If a quotation reference is maintained at both the header and item levels, it refers to one (the same) quotation.

The PurchaseContractReference is a reference to a purchase contract or item in a purchase contract. The PurchaseContractReference entity 30284B is of type GDT: BusinessTransaction-DocumentReference. In one implementation, a PurchaseContractReference entity 30284B can reference one item, that is, one ItemID is permissible. Unless otherwise agreed, the seller is responsible for determining the correct PurchaseContractReference for a specified SellerContractReference.

A BuyerProductCatalogueReference is a reference to the buyer's product catalog or an item within the buyer's product catalog. The BuyerProductCatalogueReference entity 30286B is of type GDT: CatalogueReference. In one implementation, a BuyerProductCatalogueReference entity 30286B can reference one item, that is, one ItemID is permissible. The BuyerProductCatalogueReference entity 30286B should be filled if an RFQItem entity 30220B refers to a catalog whose number and item numbers were assigned by the buyer. In the RFQ process, the BuyerProductCatalogueReference entity 30286B can be used as a substitute product number if the product is defined in a catalog rather than having its own master record.

(f) RFQ Item Attachment Package

The RFQItemAttachment package 30214B includes an Attachment entity 30294B. There is a 1:c relationship 30296B between the Item entity 30220B and the Attachment entity 30294B.

(g) RFQ Item Description Package

The RFQItemDescription package 30216B includes a Description entity 30298B. There is a 1:c relationship 30200C between the Item entity 30220B and the Description entity 30298B.

(h) RFQ Item Schedule Line Package

The ScheduleLine package 30218B groups together the quantity and date information about an RFQItem. The ScheduleLine package 30218B includes a ScheduleLine entity 30202C. There is a 1:c relationship 30204C between the Item entity 30220B and the ScheduleLine entity 30202C.

A ScheduleLine is a line containing the quantity and date of the performance schedule requested by the buyer in an RFQ. The ScheduleLine entity 30202C is of type GDT: RFQItemScheduleLine. The ScheduleLine entity 30202C includes a DeliveryPeriod entity 30206C. There is a 1:1 relationship 30208C between the ScheduleLine entity 30202C and the DeliveryPeriod entity 30206C.

The ScheduleLine entity 30202C includes an ID, a DeliveryPeriod, and a Quantity. The ID is the ScheduleLine number assigned by the procurement system. The ID is of type GDT: BusinessTransactionDocumentItemScheduleLineID. The DeliveryPeriod is the period in which the buyer expects a product to be delivered or service provided. The DeliveryPeriod is of type GDT: DateTimePeriod. The Quantity is the RFQ quantity or the target quantity in contractual negotiations. The Quantity is of type GDT: Quantity.

In one implementation, one ScheduleLine is allowed for each RFQ item. When used more than once, the information in the ScheduleLine and DeliveryInformation is consistent (for example, if used twice, the delivery date is identical in both cases). The ID is optional; a procurement system does not have to number the ScheduleLine entities.

(3) Message Data Type RFQ Cancellation Message

Figure 303:
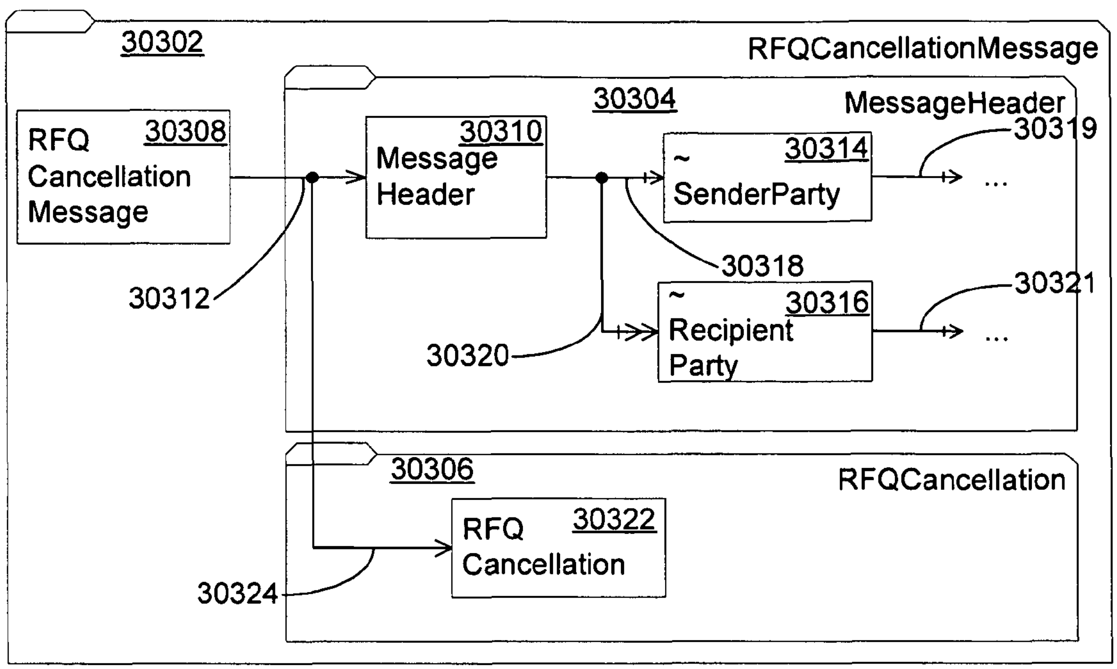
FIG. 303 depicts the data model for the RFQ Cancellation interfaces in accordance with methods and systems consistent with the present invention.
Figure 304A:
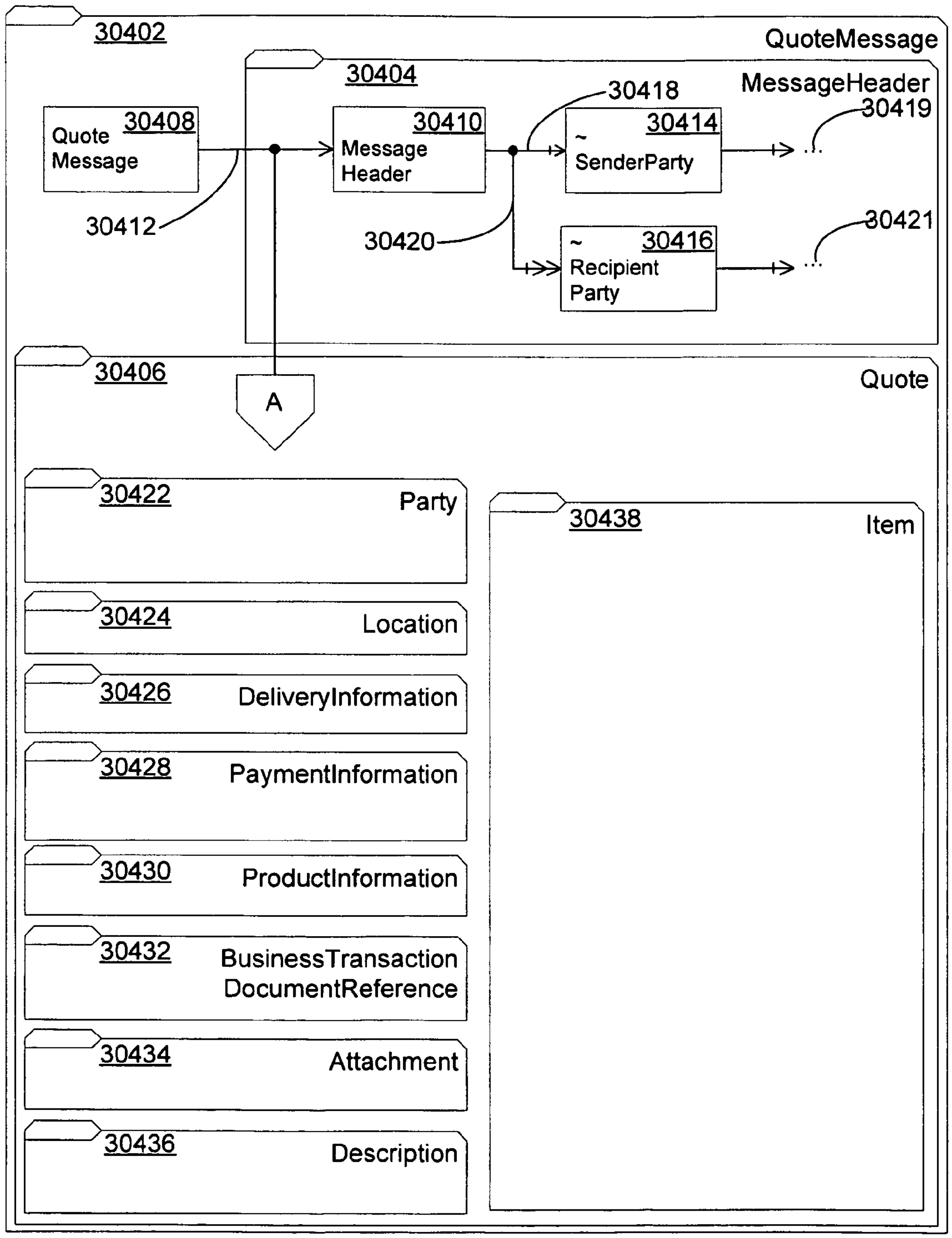
FIGS. 304A-J depict the data model for the Quote interfaces in accordance with methods and systems consistent with the present invention.
Figure 304B:
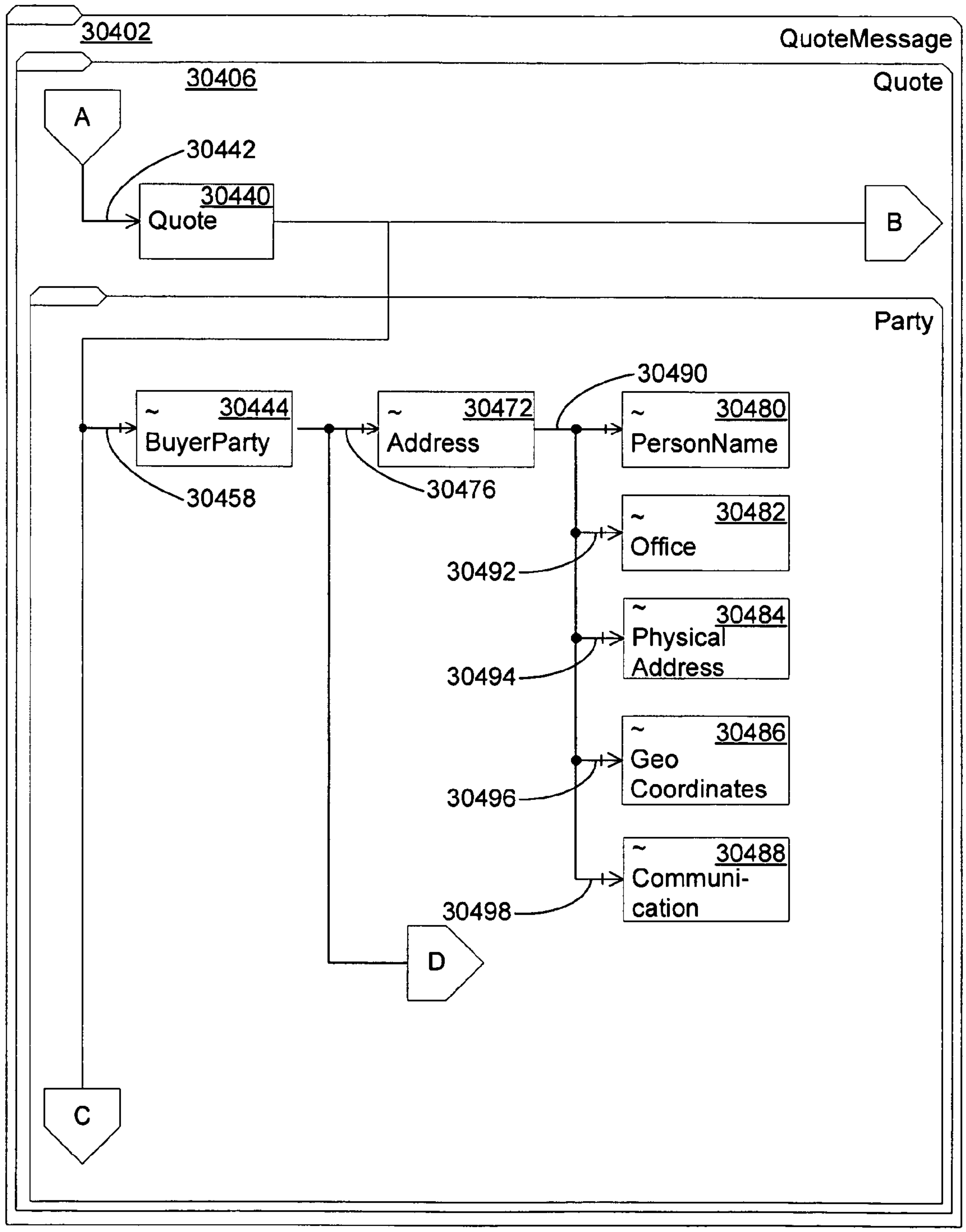
Figure 304C:
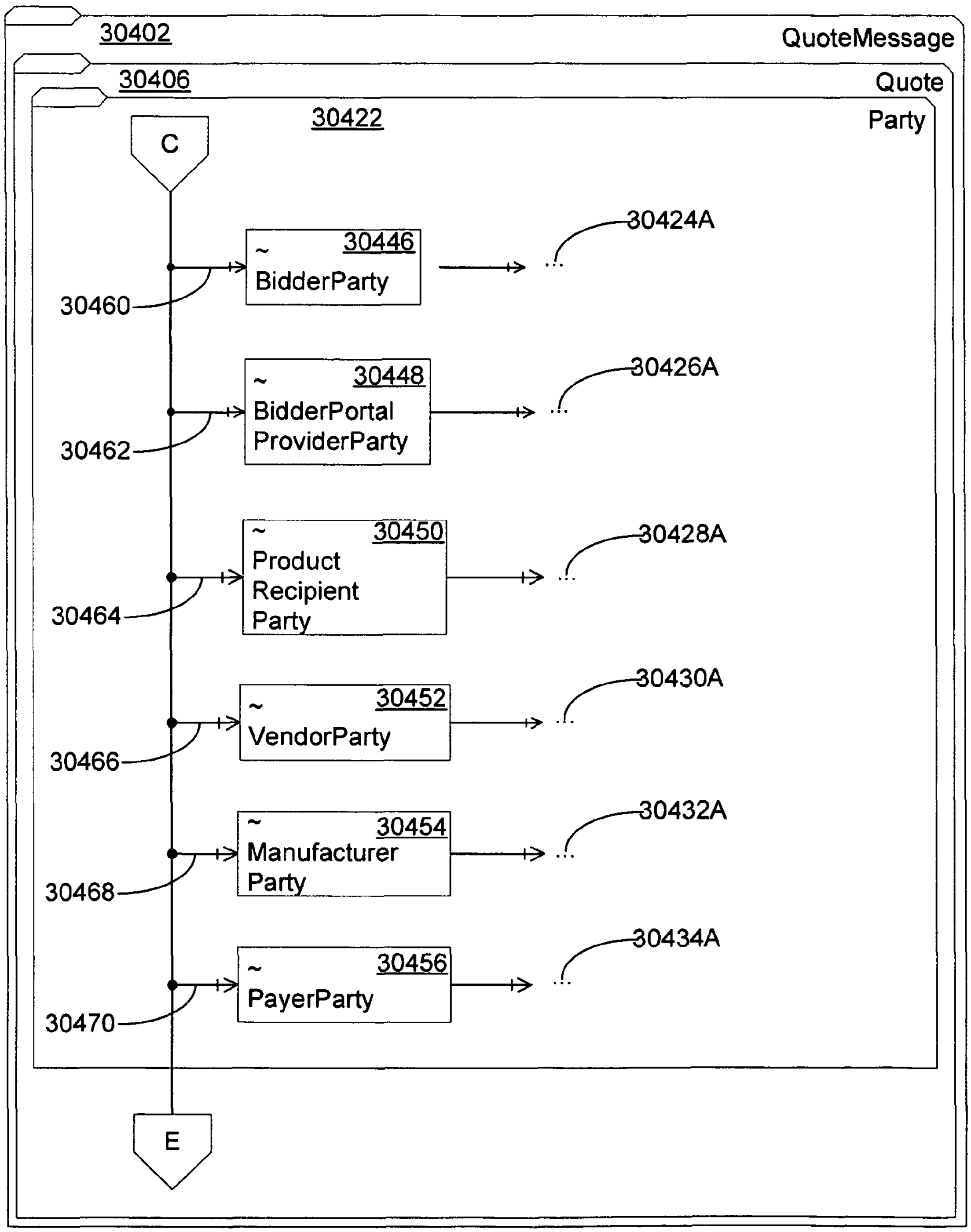
Figure 304D:
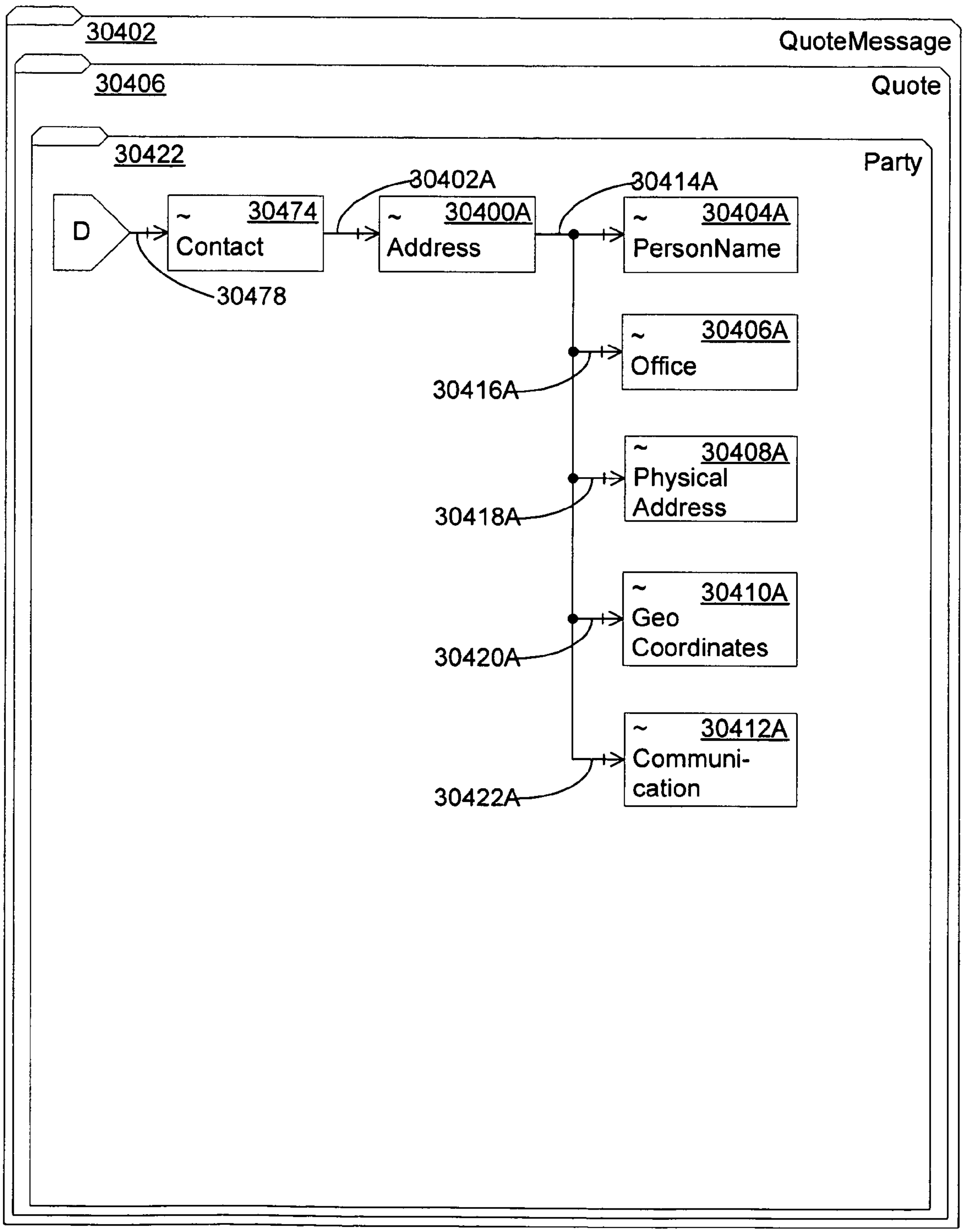
Figure 304E:
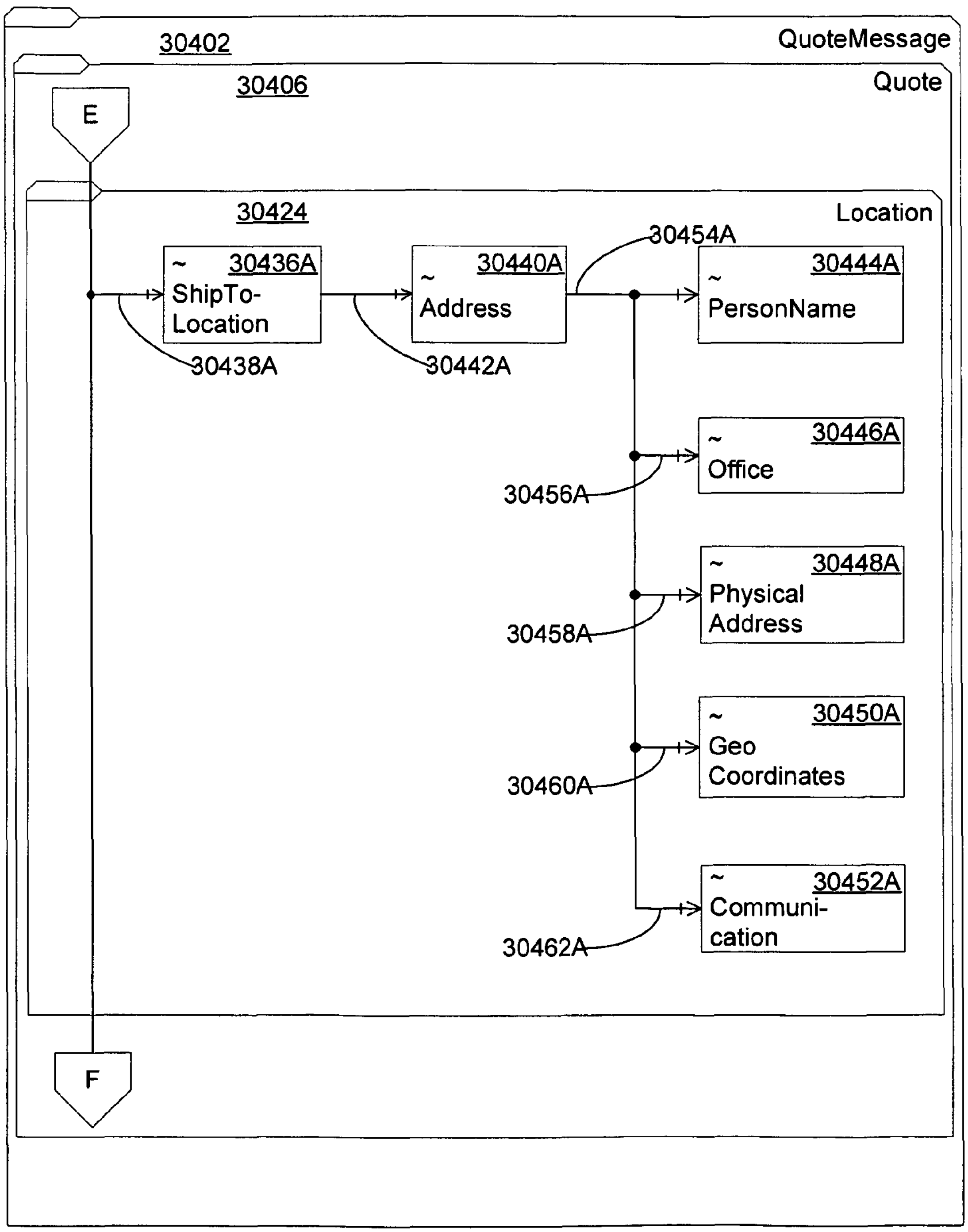
Figure 304F:
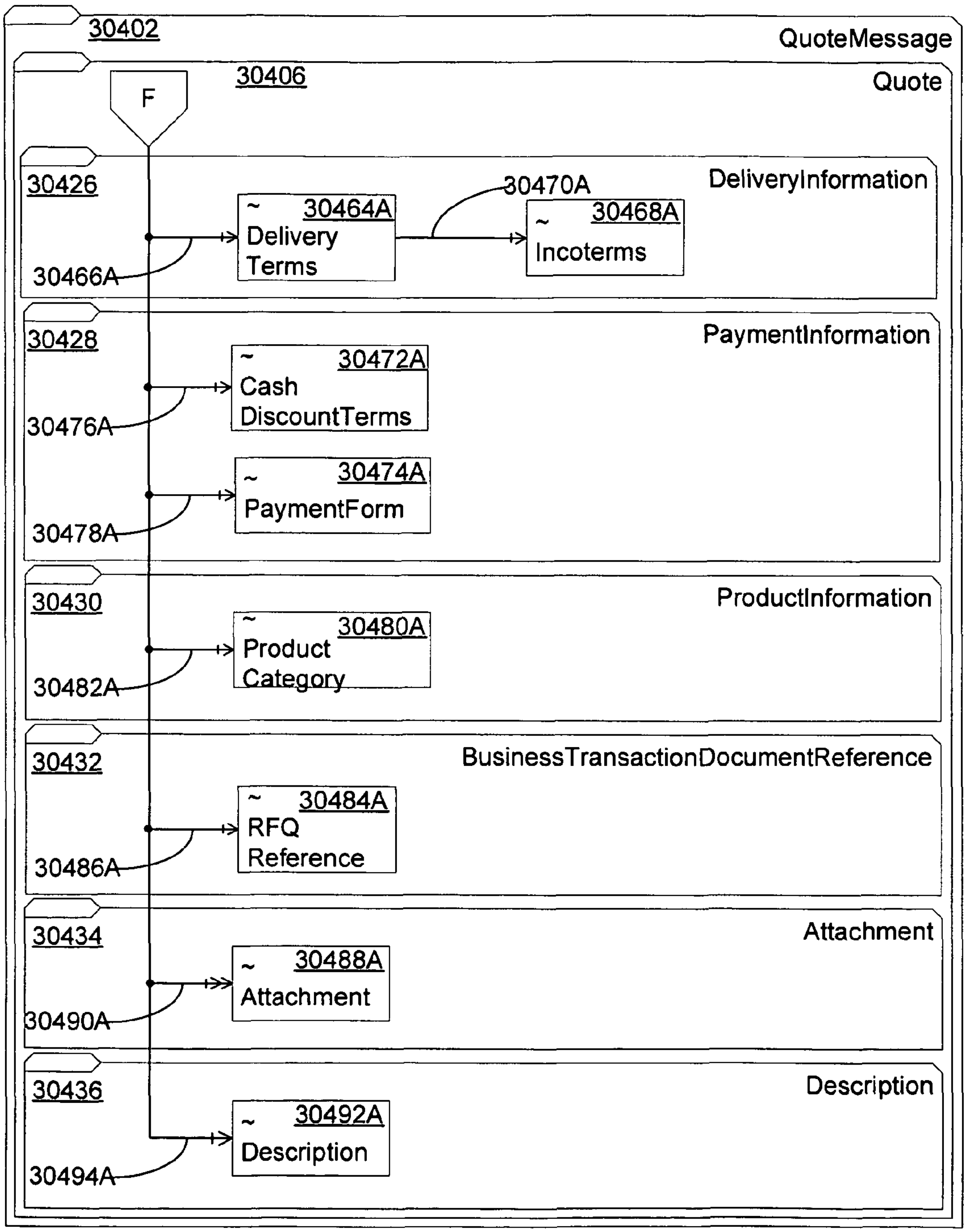
Figure 304G:
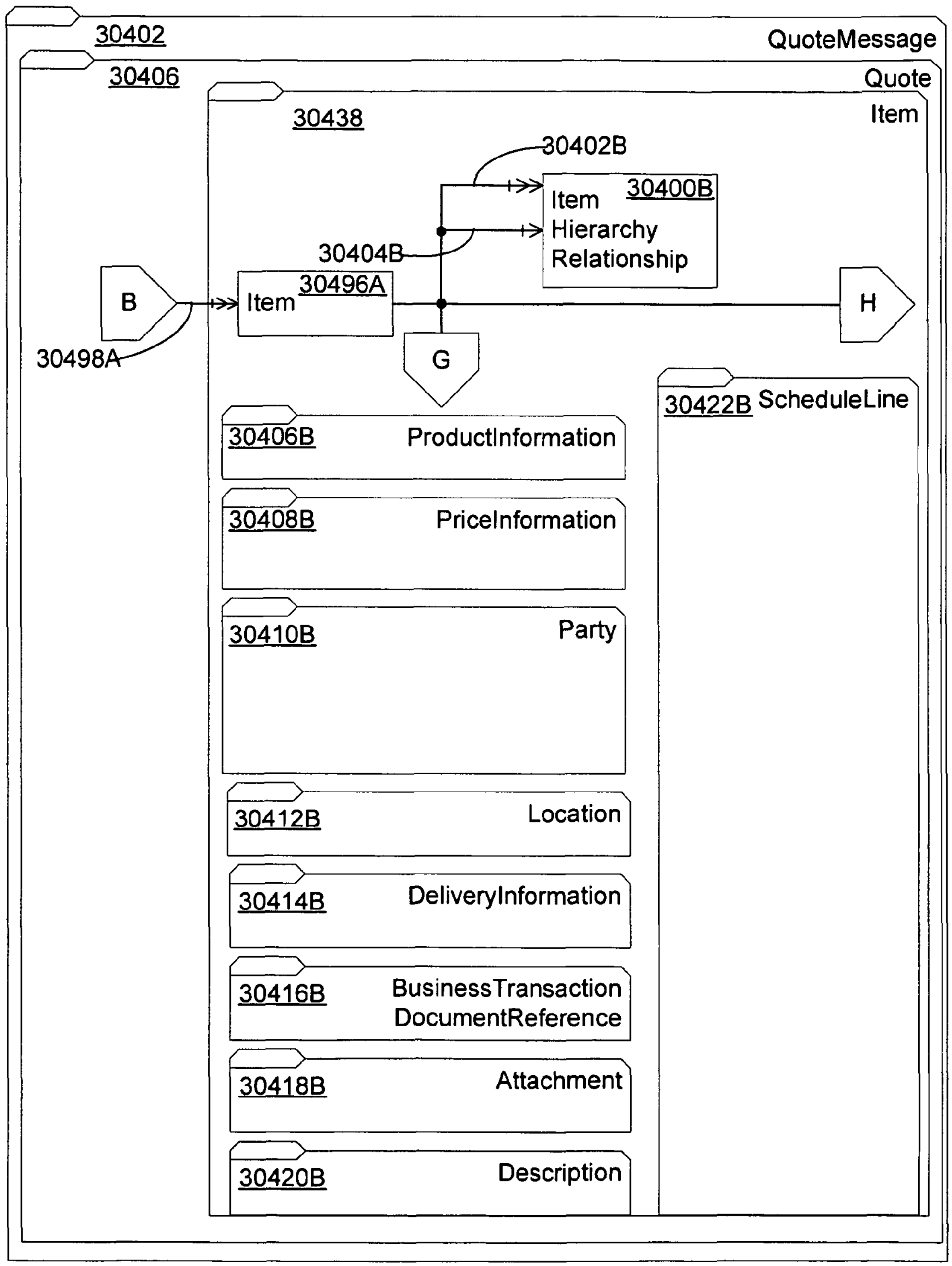
Figure 304H:
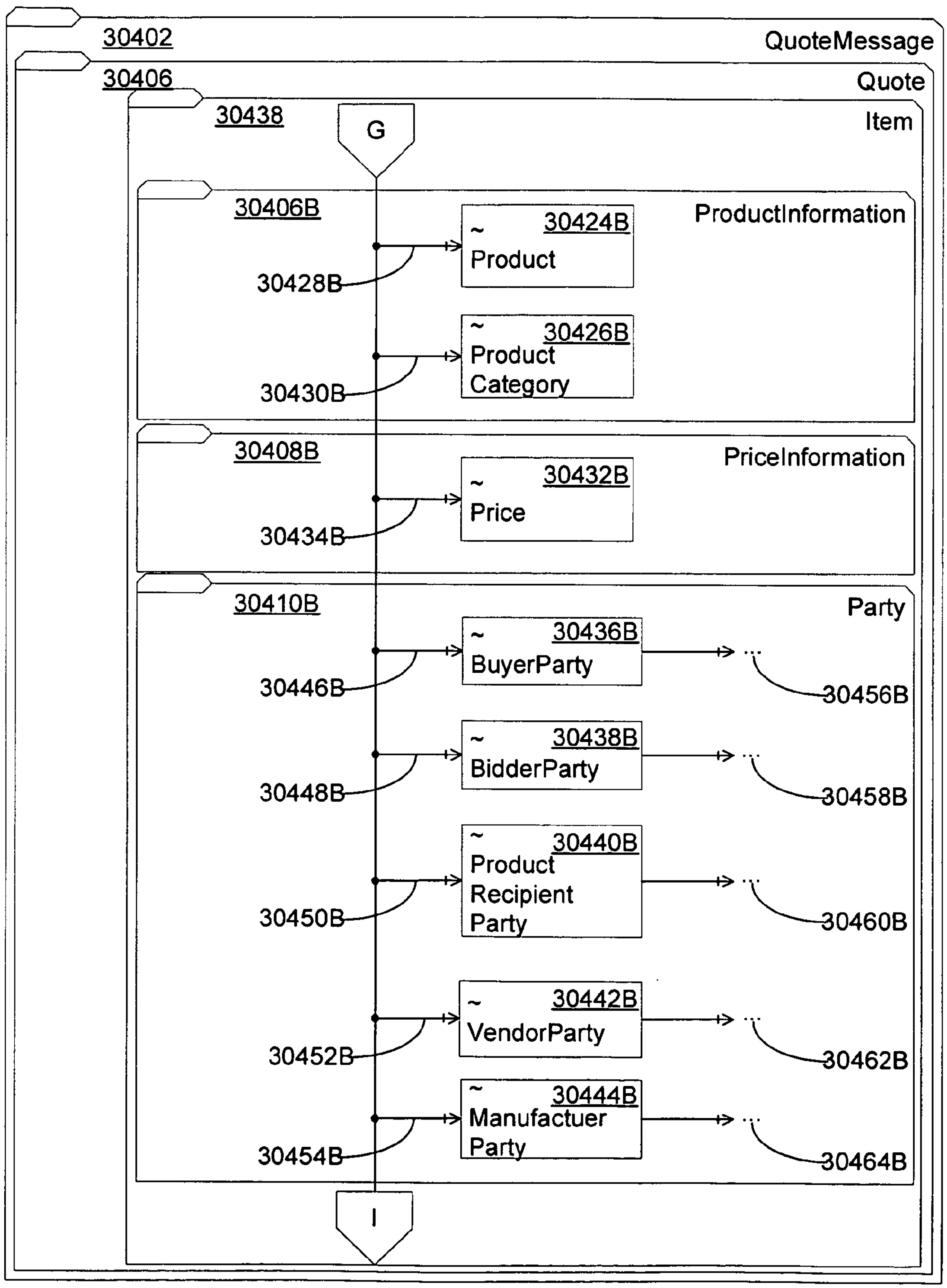
Figure 304I:
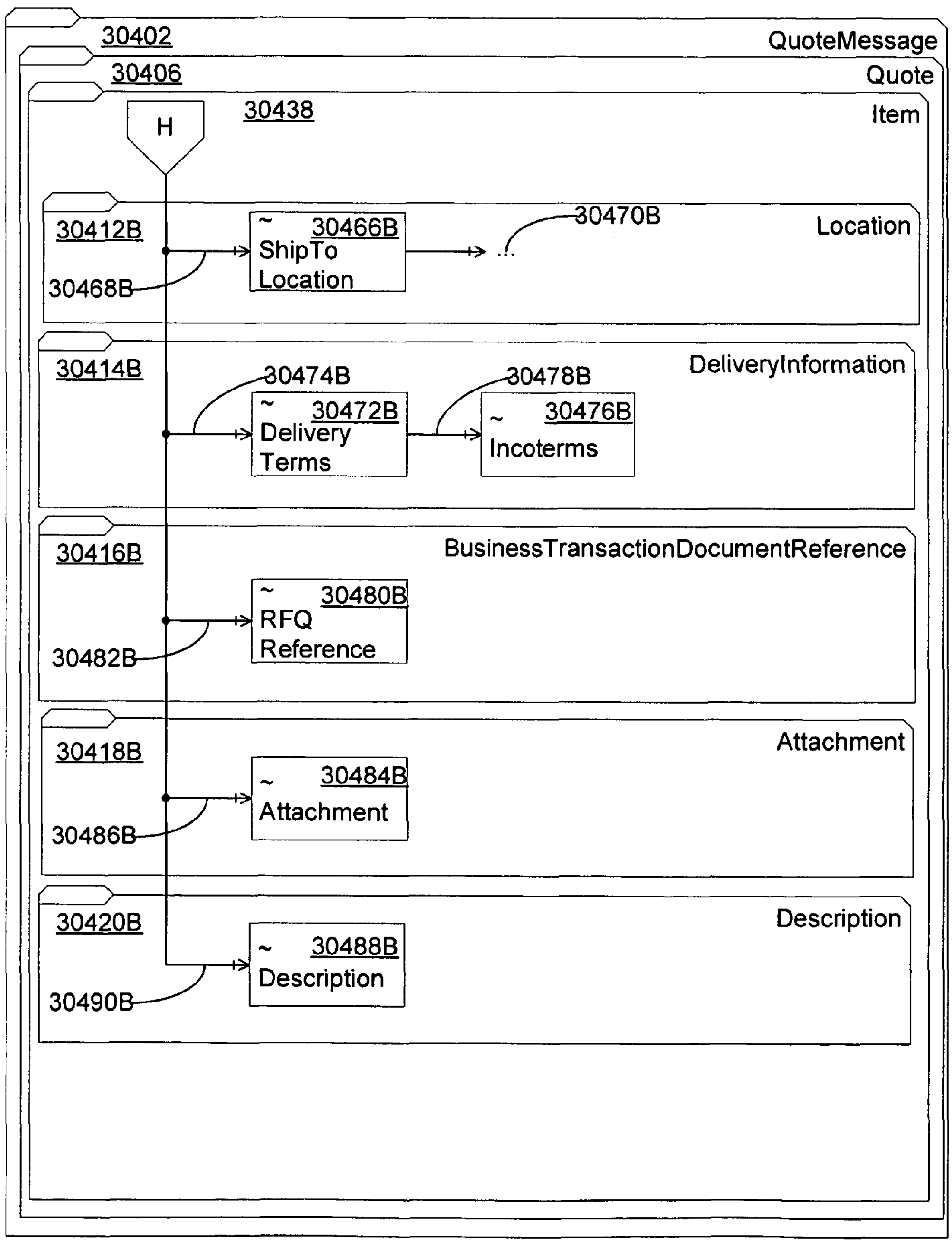
Figure 304J:
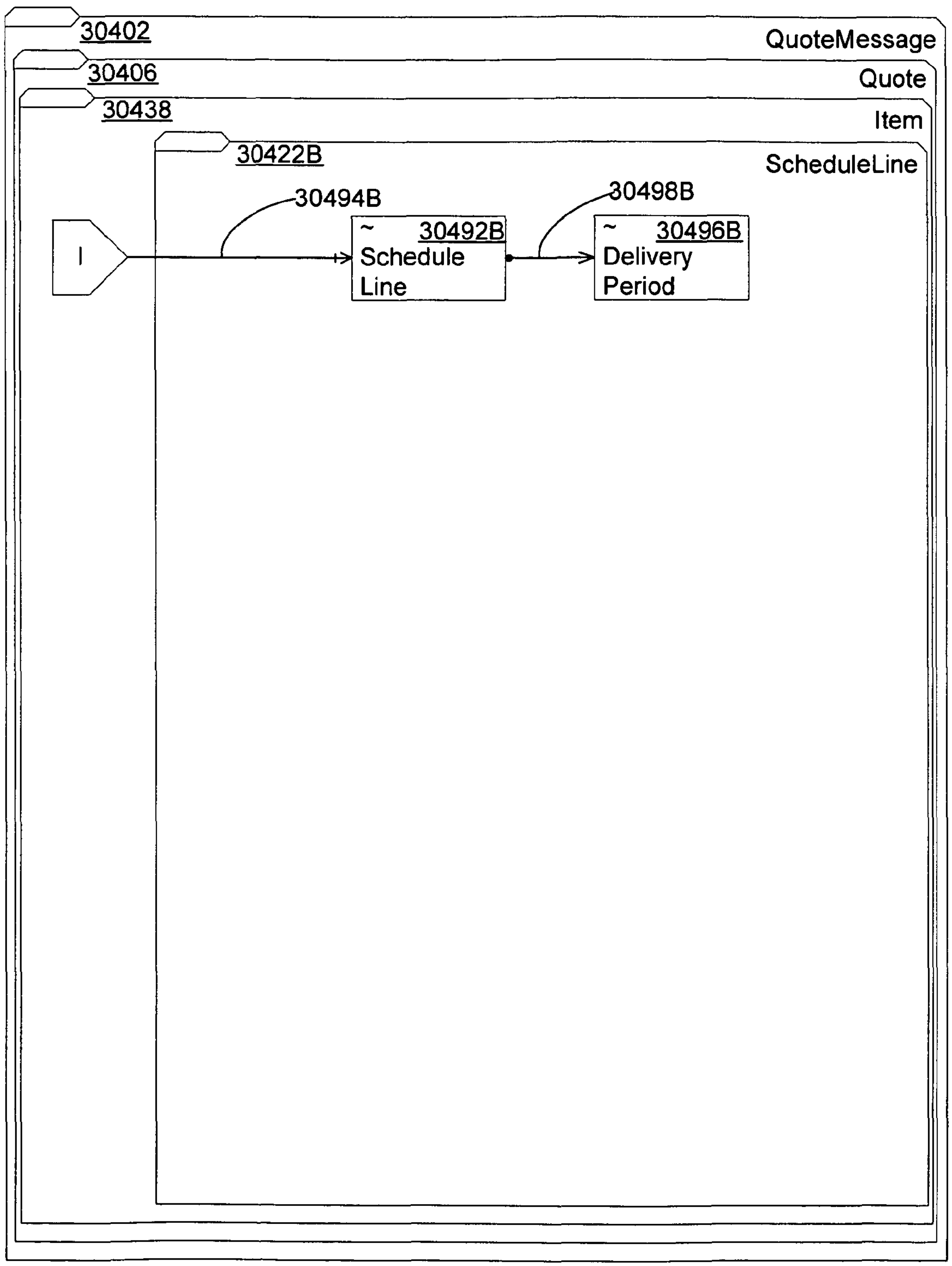
Figure 305A:
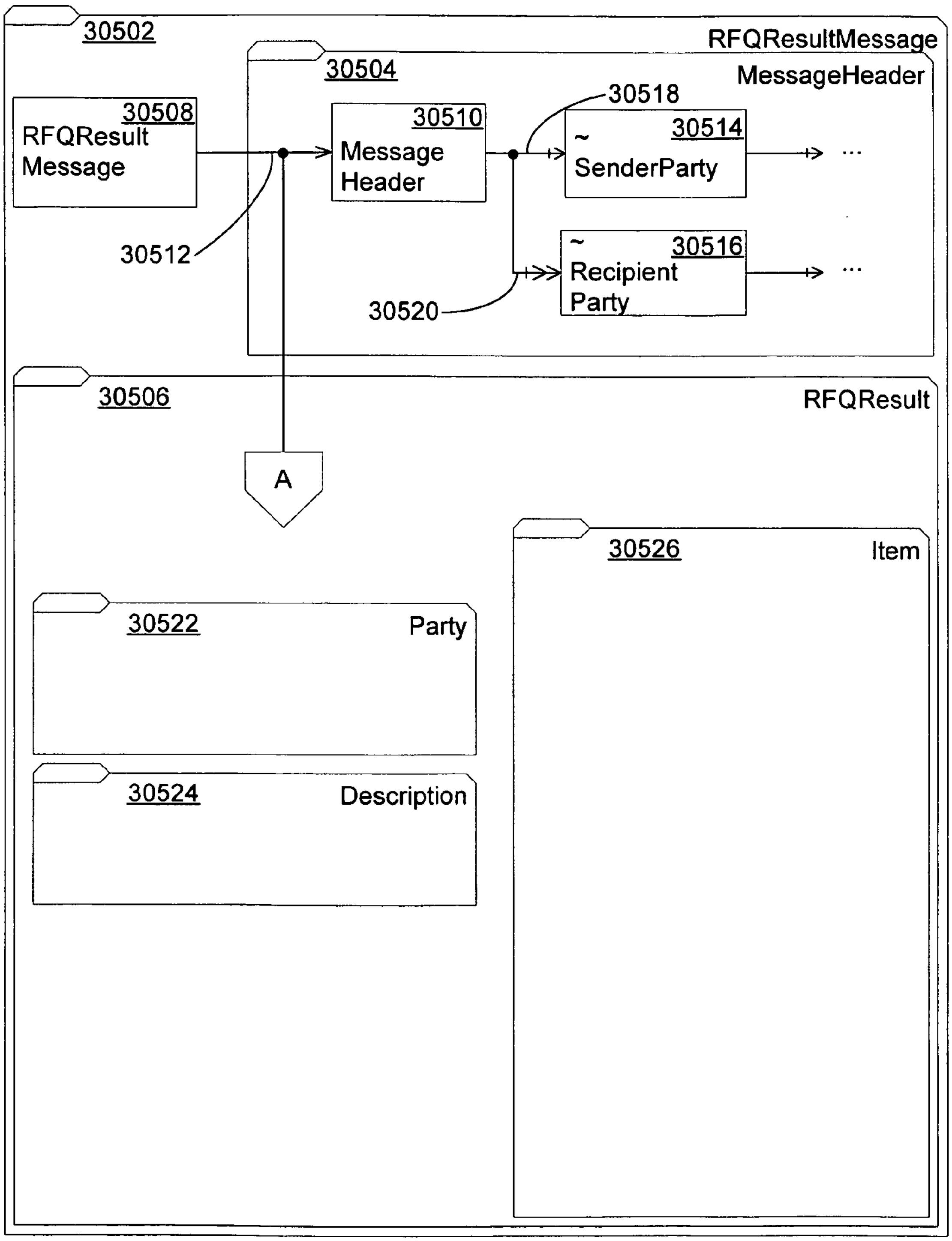
FIGS. 305A-D depict the data model for the RFQ Result interfaces in accordance with methods and systems consistent with the present invention.
Figure 305B:
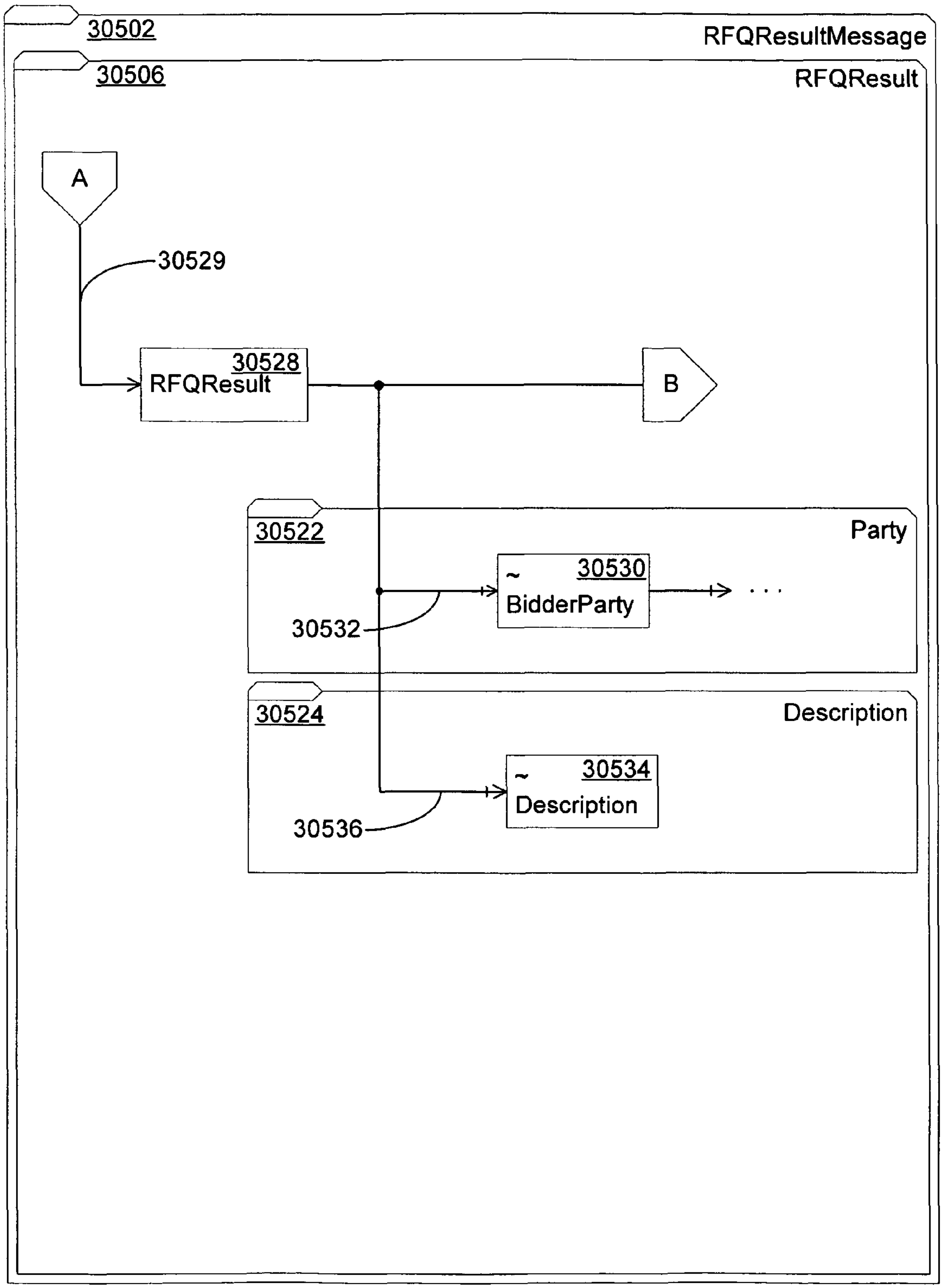
Figure 305C:
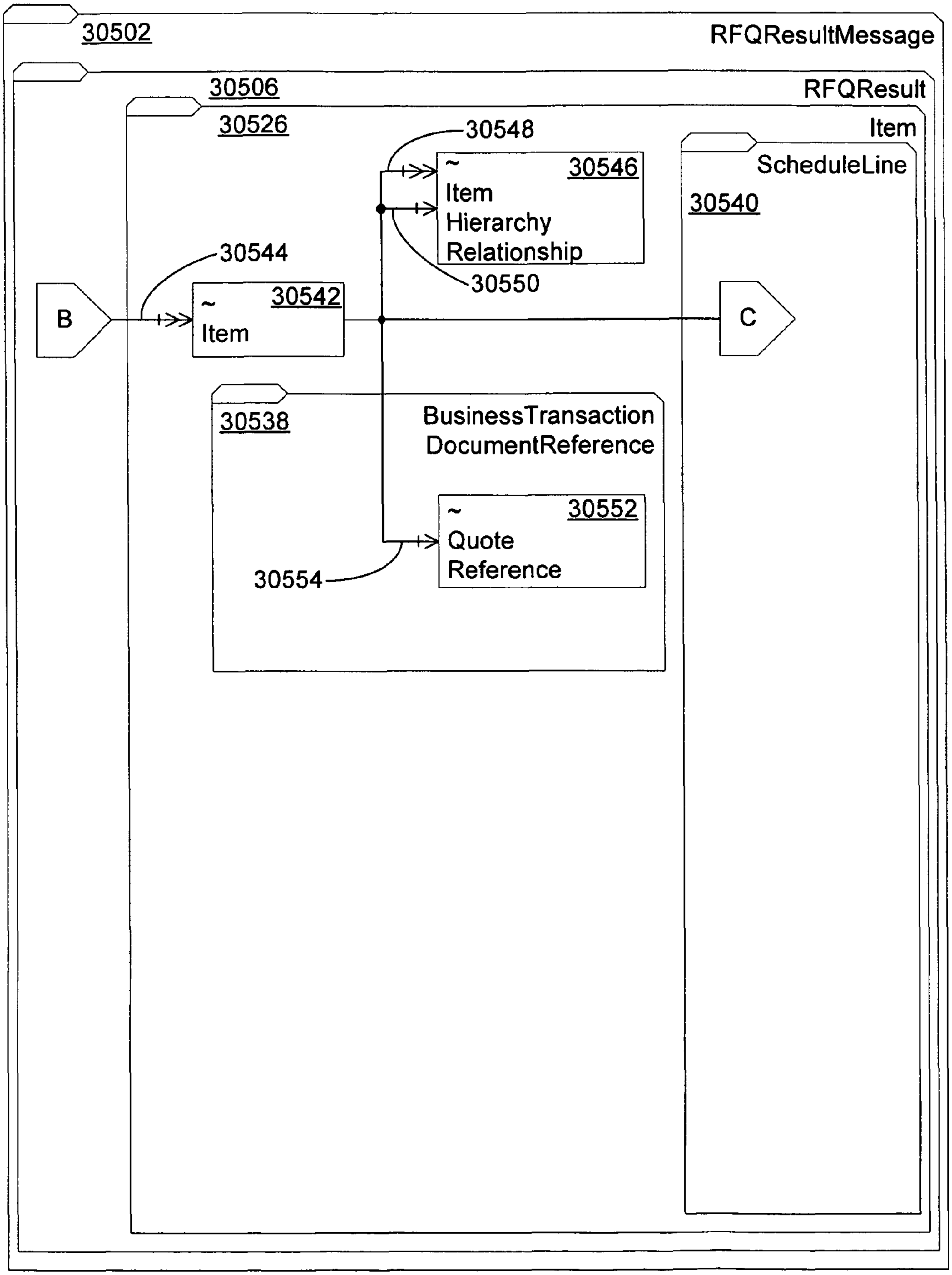
Figure 305D:
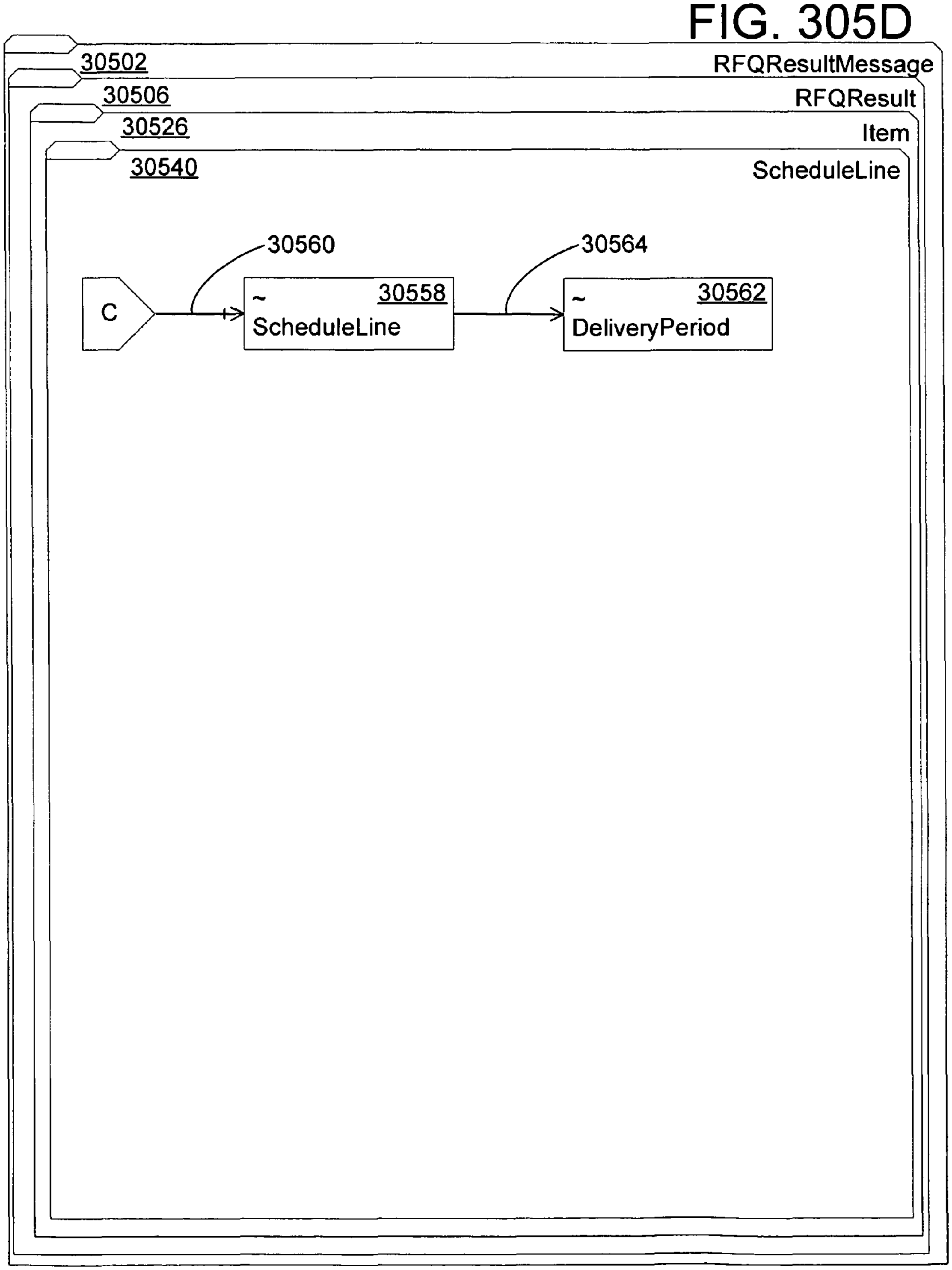

The message data type RFQCancellationMessage groups together the business information relevant for sending a business document in a message and the RFQCancellation object in the document. As depicted in FIG. 303, the RFQMessage package 30302 includes a MessageHeader package 30304, an RFQCancellation package 30306, and an RFQCancellationMessage entity 30308. The message data type RFQCancellationMessage makes the structure available for the message type RFQCancellationRequest and the relevant interfaces.

(a) Message Header Package

The MessageHeader package 30304 includes a MessageHeader entity 30310. There is a 1:1 relationship 30312 between the RFQCancellationMessage entity 30308 and the MessageHeader entity 30310. The MessageHeader entity 30310 includes a SenderParty entity 30314 and a RecipientParty entity 30316. There is a 1:c relationship 30318 between the MessageHeader entity 30310 and the SenderParty entity 30314. There is a 1:cn relationship 30320 between the MessageHeader entity 30310 and the RecipientParty entity 30316.

(b) RFQ Cancellation Package

The RFQCancellation package 30306 groups together the RFQCancellations. The RFQCancellation is a cancellation of an RFQ from a buyer to a bidder.

The RFQCancellation package 30306 includes an RFQCancellation entity 30322. There is a 1:1 relationship 30324 between the RFQCancellationMessage entity 30308 and the RFQCancellation entity 30322. The RFQCancellation entity 30322 is of type GDT: RFQCancellation. The RFQCancellation entity 30322 includes an ID, which is a unique identifier specified by the buyer for the RFQ. The ID is of type GDT: BusinessTransactionDocumentID.

(4) Message Data Type Quote Message

The message data type QuoteMessage groups together the business information relevant for sending a business document in a message and the Quote object in the document. As depicted in FIG. 304, the QuoteMessage package 30402 includes a MessageHeader package 30404, a Quote package 30406, and a QuoteMessage entity 30408. The message data type QuoteMessage makes the structure available for the message type QuoteNotification and the relevant interfaces.

(a) Message Header Package

The MessageHeader package 30404 includes a MessageHeader entity 30410. There is a 1:1 relationship 30412 between the QuoteMessage entity 30408 and the MessageHeader entity 30410. The MessageHeader entity 30410 includes a SenderParty entity 30414 and a RecipientParty entity 30416. There is a 1:c relationship 30418 between the MessageHeader entity 30410 and the SenderParty entity 30414. There is a 1:cn relationship 30420 between the MessageHeader entity 30410 and the RecipientParty entity 30416.

(b) Quote Package

The Quote package 30406 includes a Party package 30422, a Location package 30424, a DeliveryInformation package 30426, a PaymentInformation package 30428, a ProductInformation package 30430, a BusinessTransactionDocumentReference package 30432, an Attachment package 30434, a Description package 30436, and an Item package 30438. The Quote package 30406 also includes a Quote entity 30440. There is a 1:1 relationship 30442 between the QuoteMessage entity 30408 and the Quote entity 30440.

The Quote is a quotation submitted by a bidder to a buyer in response to an RFQ issued for a product by the buyer. The Quote entity 30440 is subdivided into QuoteItems, which contain the concrete quotation submitted by the bidder with reference to the relevant item in the buyer's RFQ. The structure of the packages in the Quote is the same as the structure of the packages in the RFQ. The Quote entity 30440 is of type GDT: Quote. The Quote entity 30440 includes an ID, a PostingDateTime, a LastChangeDateTime, a BindingDateTime, a Note, and a ContractTargetAmount. The ID is a unique identifier specified by the buyer for the quotation. The ID is of type GDT: BusinessTransactionDocumentID. The PostingDateTime is the creation date/time of the quotation at the bidder. The PostingDateTime is of type GDT: DateTime. The LastChangeDateTime is the date/time of the last change made to the quotation by the bidder. The LastChangeDateTime is of type GDT: DateTime. The BindingDateTime is the date/time up to which bidders are bound to the quotations they have submitted. The BindingDateTime is of type GDT: DateTime. The Note is a short description or the title of the quotation. It is generally used to provide the user with a simple method for searching for a particular quotation. The Note is of type GDT: Note. The ContractTargetAmount is the target amount in contractual negotiations. The ContractTargetAmount is of type GDT: Amount. In one implementation, the Quote entity 30440 is used as a quotation from a bidder who has taken the initiative to submit a quotation without an RFQ being issued beforehand.

(i) Quote Party Package

The Party package 30422 groups together the business parties that occur in one of the Quote messages. The Party package 30422 includes a BuyerParty entity 30444, a BidderParty entity 30446, a BidderPortalProviderParty entity

30448, a ProductRecipientParty entity 30450, a VendorParty entity 30452, a ManufacturerParty entity 30454, and a PayerParty entity 30456. There is a respective 1:c relationship 30458, 30460, 30462, 30464, 30466, 30468, and 30470 between the Quote entity 30440 and the BuyerParty entity 30444, the BidderParty entity 30446, the BidderPortalProviderParty entity 30448, the ProductRecipientParty entity 30450, the VendorParty entity 30452, the ManufacturerParty entity 30454, and the PayerParty entity 30456.

The BuyerParty entity 30444 includes an Address entity 30472 and a Contact entity 30474. There is a 1:c relationship 30476 between the BuyerParty entity 30444 and the Address entity 30472, and a 1:c relationship 30478 between the BuyerParty entity 30444 and the Contact entity 30474.

The Address entity 30472 includes a PersonName entity 30480, an Office entity 30482, a PhysicalAddress entity 30484, a GeoCoordinates entity 30486, and a Communication entity 30488. There is a respective 1:c relationship 30490, 30492, 30494, 30496, and 30498 between the Address entity 30472 and the PersonName entity 30480, the Office entity 30482, the PhysicalAddress entity 30484, the GeoCoordinates entity 30486, and the Communication entity 30488.

The Contact entity 30474 includes an Address entity 30400A. There is a 1:c relationship 30402A between the Contact entity 30474 and the Address entity 30400A.

The Address entity 30400A includes a PersonName entity 30404A, an Office entity 30406A, a PhysicalAddress entity 30408A, a GeoCoordinates entity 30410A, and a Communication entity 30412A. There is a respective 1:c relationship 30414A, 30416A, 30418A, 30420A, and 30422A between the Address entity 30400A and the PersonName entity 30404A, the Office entity 30406A, the PhysicalAddress entity 30408A, the GeoCoordinates entity 30410A, and the Communication entity 30412A.

Each of the BidderParty entity 30446, the BidderPortalProviderParty entity 30448, the ProductRecipientParty entity 30450, the VendorParty entity 30452, the ManufacturerParty entity 30454, and the PayerParty entity 30456 includes the same elements as that described above for the BuyerParty entity 30444, as denoted by ellipses 30424A, 30426A, 30428A, 30430A, 30432A, and 30434A.

(ii) Quote Location Package

A Location package 30424 groups together the locations that can occur in one of the Quote messages. The Location package 30424 includes a ShipToLocation entity 30436A. There is a 1:c relationship 30438A between the Quote entity 30440 and the ShipToLocation entity 30436A. The ShipToLocation entity 30436A includes an Address entity 30440A. There is a 1:c relationship 30442A between the ShipToLocation entity 30436A and the Address entity 30440A.

The Address entity 30440A includes a PersonName entity 30444A, an Office entity 30446A, a PhysicalAddress entity 30448A, a GeoCoordinates entity 30450A, and a Communication entity 30452A. There is a respective 1:c relationship 30454A, 30456A, 30458A, 30460A, and 30462A between the Address entity 30440A and the PersonName entity 30444A, the Office entity 30446A, the PhysicalAddress entity 30448A, the GeoCoordinates entity 30450A, and the Communication entity 30452A.

(iii) Quote Delivery Information Package

A DeliveryInformation package 30426 groups together the information about a required delivery in a Quote process. The DeliveryInformation package 30426 includes a DeliveryTerms entity 64A. There is a 1:c relationship 30466A between the Quote entity 30440 and the DeliveryTerms entity 30464A.

The DeliveryTerms entity 30464A includes an Incoterms entity 30468A. There is a 1:c relationship 30470A between the DeliveryTerms entity 30464A and the Incoterms entity 30468A.

(iv) Quote Payment Information Package

A PaymentInformation package 30428 groups together the payment information in a Quote process. The PaymentInformation package 30428 includes a CashDiscountTerms entity 30472A and a PaymentForm entity 30474A. There is a 1:c relationship 30476A between the Quote entity 30440 and the CashDiscountTerms entity 30472A, and a 1:c relationship 30478A between the Quote entity 30440 and the PaymentForm entity 30474A.

(v) Quote Product Information Package

The ProductInformation package 30430 groups together the product category. The ProductInformation package 30430 includes a ProductCategory entity 30480A. There is a 1:c relationship 30482A between the Quote entity 30440 and the ProductCategory entity 30480A.

(vi) Quote Business Transaction Document Reference Package

The BusinessTransactionDocumentReference package 30432 groups together the business document references that can occur in the Quote message. The BusinessTransactionDocumentReference package 30432 includes an RFQReference entity 30484A. There is a 1:c relationship 30486A between the Quote entity 30440 and RFQReference entity 30484A.

The RFQReference is a reference to a request for quotation or item in a request for quotation. The RFQReference entity 30484A is of type GDT: BusinessTransactionDocumentReference. In one implementation, an RFQReference entity 30484A can reference one RFQ, that is, one ID is permissible. As far as the referenced RFQ is concerned, there are no conflicts with an RFQReference at the item level. If a reference is used at both the header and item levels, it refers to one (the same) RFQ.

In one implementation, the reference to an RFQ is required at both the header and item levels, since RFQs do not always have item data. Unless otherwise agreed, the bidder uses the RFQID assigned by the buyer.

(vii) Quote Attachment Package

The Attachment package 30434 groups together the attachment information regarding the Quote. The Attachment package 30434 includes an Attachment entity 30488A. The Attachment is any document that refers to the Quote. The Attachment entity 30488A is of type GDT: Attachment. There is a 1:cn relationship 30490A between the Quote entity 30440 and the Attachment entity 30488A.

(viii) Quote Description Package

The Description package 30436 groups together the texts regarding the Quote. The Description package 30436 includes a Description entity 30492A. The Description entity 30492A is of type GDT: Description. There is a 1:c relationship 30494A between the Quote entity 30440 and the Description entity 30492A.

(ix) Quote Item Package

A QuoteItem package 30438 includes a QuoteItem entity 30496A. There is a 1:cn relationship 30498A between the Quote entity 30440 and the QuoteItem entity 30496A.

QuoteItem entities are arranged hierarchically using a Hierarchy Relationship 30400B. The Hierarchy Relationship 30400B is the relationship between a sub-item and a higher-level parent item in an item hierarchy. There is a 1:cn relationship 30402B between the Item entity 30496A and its subordinate entities, and there is a 1:c relationship 30404B between the Item entity 30496A and its superordinate entities.

The QuoteItem includes the bidder's quotation for a product tendered in an item of a request for quotation (RFQItem) or additional information about this product. Quantities and delivery dates can also be specified here. The structure is the same as the structure of the RFQItem. The QuoteItem entity 30496A is of type GDT: QuoteItem. The QuoteItem entity 30496A includes an ID and a ContractTargetAmount. The ID is a unique identifier specified by the buyer for a quotation item within an RFQ. The ID is of type GDT: BusinessTransactionDocumentItemID. The ContractTargetAmount is the target amount in contractual negotiations. The ContractTargetAmount is of type GDT: Amount.

The QuoteItem package 30438 also includes a ProductInformation package 30406B, a PriceInformation package 30408B, a Party package 30410B, a Location package 30412B, a DeliveryInformation package 30414B, a BusinessTransactionDocumentReference package 30416B, an Attachment package 30418B, a Description package 30420B, and a ScheduleLine package 30422B.

(a) Quote Item Product Information Package

A ProductInformation package 30406B groups together the product and the product category. The ProductInformation package 30406B includes a Product entity 30424B and a ProductCategory entity 30426B. There is a 1:c relationship 30428B between the Item entity 30496A and the Product entity 30424B, and a 1:c relationship 30430B between the Item entity 30496A and the ProductCategory entity 30426B.

(b) Quote Item Price Information Package

The PriceInformation package 30408B groups together price information in a quotation item. The PriceInformation package 30408B includes a Price entity 30432B. There is a 1:c relationship 30434B between the Item entity 30496A and the Price entity 30432B. In one implementation, the PriceInformation package 30408B for an RFQ item includes prices; it does not contain any information about how the prices are calculated, e.g., pricing scales. A Price is a quotation price that has been defined by the bidder in an RFQ.

The Price entity 30432B includes a NetUnitPrice, which is the net price (without tax or cash discount) specified by the bidder for the base quantity for the quotation in an RFQ. The NetUnitPrice is of type GDT: Price.

(c) Quote Item Party Package

The Party package 30410B includes a BuyerParty entity 30436B, a BidderParty entity 30438B, a ProductRecipientParty entity 30440B, a VendorParty entity 30442B, and a ManufacturerParty entity 30444B. There is a respective 1:c relationship 30446B, 30448B, 30450B, 30452B, and 30454B between the Item entity 30496A and the BuyerParty entity 30436B, the BidderParty entity 30438B, the ProductRecipientParty entity 30440B, the VendorParty entity 30442B, and the ManufacturerParty entity 30444B. Each of the BuyerParty entity 30436B, the BidderParty entity 30438B, the ProductRecipientParty entity 30440B, the VendorParty entity 30442B, and the ManufacturerParty entity 30444B includes the same elements as that described above for the BuyerParty entity 30444 as denoted by ellipses 30456B, 30458B, 30460B, 30462B, and 30464B. In one implementation, the Quote is used as a quotation from a bidder who has taken the initiative to submit a quotation without an RFQ being issued beforehand.

(d) Quote Item Location Package

Similar to the Location package 30224 at the header level, the Location package 30412B at the item level includes a ShipToLocation entity 30466B. There is a 1:c relationship 30468B between the Item entity 30496A and the ShipToLocation entity 30466B. The ShipToLocation entity 30488B includes the same elements as that described above for the ShipToLocation entity 36A as denoted by ellipses 30470B.

(e) Quote Item Delivery Information Package

Similar to the DeliveryInformation package 30426 at the header level, the DeliveryTerms package 30414B at the item level includes a DeliveryTerms entity 30472B. There is a 1:c relationship 30474B between the Item entity 30496A and the DeliveryTerms entity 30472B. The DeliveryTerms entity 30472B includes an Incoterms entity 30476B. There is a 1:c relationship 30478B between the DeliveryTerms entity 30472B and the Incoterms entity 30476B.

(f) Quote Item Business Transaction Document Reference Package

A BusinessTransactionDocumentReference package 30416B groups together the business document references that can occur in the QuoteNotification message. It includes an RFQReference entity 30480B. There is a 1:c relationship 30482B between the Item entity 30496A and the RFQReference entity 30480B.

An RFQReference is a reference to the RFQ or the item within the RFQ. The RFQReference entity 30480B is of type GDT: BusinessTransactionDocumentReference.

In one implementation, an RFQReference entity 30480B can reference one item, that is, one ItemID is permissible. As far as the referenced RFQ is concerned, there are no conflicts with an RFQReference at the header level. If an RFQ reference is maintained at both header and item level, it refers to one (the same) RFQ. Unless otherwise agreed, the bidder uses the RFQID and RFQItemID assigned by the buyer.

(g) Quote Item Attachment Package

The QuoteItemAttachment package 30418B includes an Attachment entity 30484B. There is a 1:c relationship 30486B between the Item entity 30496A and the Attachment entity 30484B.

(h) Quote Item Description Package

The QuoteItemDescription package 30420B includes a Description entity 30488B. There is a 1:c relationship 30490B between the Item entity 30496A and the Description entity 30488B.

(i) Quote Item Schedule Line Package

The QuoteItemScheduleLinePackage 30422B includes a ScheduleLine entity 30492B. There is a 1:c relationship 30494B between the Item entity 30496A and the ScheduleLine entity 30492B. The ScheduleLine entity 30492B includes a DeliveryPeriod entity 30496B. There is a 1:1 relationship 30498B between the ScheduleLine entity 30492B and the DeliveryPeriod entity 30496B.

(5) Message Data Type RFQ Result Message

The message data type RFQResultMessage groups together the business information relevant for sending a business document in a message and the RFQResult object in the document. As depicted in FIG. 305, the RFQResultMessage package 30502 includes a MessageHeader package 30504 and a RFQResult package 30506. The RFQResultMessage package 30502 also includes an RFQResultMessage entity 30508. The message data type RFQResultMessage makes the structure available for the message type RFQResultMessage and the relevant interfaces.

(a) Message Header Package

The MessageHeader package 30504 includes a MessageHeader entity 30510. There is a 1:1 relationship 30512 between the RFQResultMessage entity 30508 and the MessageHeader entity 30510. The MessageHeader entity 30510 includes a SenderParty entity 30514 and a RecipientParty entity 30516. There is a 1:c relationship 30518 between the MessageHeader entity 30510 and the SenderParty entity 30514, and a 1:cn relationship 30520 between the MessageHeader entity 30510 and the RecipientParty entity 30516.

(b) RFQ Result Package

The RFQResult package 30506 includes a Party package 30522, a Description package 30524, and an Item package 30526. The RFQResult package 30506 also includes an RFQResult entity 30528. There is a 1:1 relationship 30529 between the RFQResultMessage entity 30508 and the RFQResult entity 30528. The RFQResult is the acceptance or rejection of a bidder's quotation by the buyer. The RFQResult entity 30528 is of type GDT: RFQResult. The RFQResult entity 30528 includes an ID, which is a unique identifier specified by the buyer for the RFQ.

(i) RFQ Result Party Package

The Party package 30522 groups together the parties that can occur in one of the RFQResult messages. The Party package 30522 includes a BidderParty entity 30530. There is a 1:c relationship 30532 between the RFQResult entity 30528 and the BidderParty entity 30530.

A BidderParty is a party that bids for goods or services. The BidderParty entity 30530 is of type GDT: BusinessTransactionDocumentParty. The BidderParty entity 30530 is required for the RFQResult message if the result of the RFQ is to be published on a tendering platform. The configuration determines whether this scenario applies.

(ii) RFQ Result Description Package

The RFQ Result Description package 30524 includes a Description entity 30534. There is a 1:c relationship 30536 between the RFQResult entity 30528 and the Description entity 30534.

(iii) RFQ Result Item Package

The RFQResultItem package 30526 includes a BusinessTransactionDocumentReference package 30538 and a ScheduleLine package 30540. The RFQResultItem package 30526 also includes an RFQResultItem entity 30542. There is a 1:cn relationship 30544 between the RFQResult entity 30528 and the RFQResultItem entity 30542. RFQResultItem entities are arranged hierarchically using a Hierarchy Relationship 30546. The Hierarchy Relationship 30546 is the relationship between a sub-item and a higher-level parent item in an item hierarchy. There is a 1:cn relationship 30548 between the Item entity 30542 and its subordinate entities, and there is a 1:c relationship 30550 between the Item entity 30542 and its superordinate entities.

An RFQResultItem specifies the rejection or the extent of the acceptance of a bidder's quotation for a product of an RFQ item. The RFQResultItem entity 30542 is of type GDT: RFQResultItem. The RFQResultItem entity 30542 includes an ID, which is an identifier assigned by the buyer to an RFQ item. The identifier is unique within a particular RFQ. The ID is of type GDT: BusinessTransactionDocumentItemID.

(a) RFQ Result Item Business Transaction Document Reference Package

A BusinessTransactionDocumentReference package 30538 groups together the business document references that occur in one of the RFQResult messages. The BusinessTransactionDocumentReference package 30538 includes a QuoteReference entity 30552. There is a 1:c relationship 30554 between the Item entity 30542 and the QuoteReference entity 30552.

The QuoteReference is a reference to the quotation or the item within the quotation. The QuoteReference entity 30552 is of type GDT: BusinessTransactionDocumentReference. In one implementation, a QuoteReference entity 30552 can reference one item, that is, one ItemID is permissible.

(b) RFQ Result item Schedule Line Package

The RFQResultItemScheduleLine Package 30540 includes a ScheduleLine entity 30558. There is a 1:c relationship 30560 between the Item entity 30542 and the ScheduleLine entity 30558. The ScheduleLine entity 30558 includes a DeliveryPeriod entity 30562. There is a 1:1 relationship 30564 between the ScheduleLine entity 30558 and the DeliveryPeriod entity 30562.

(6) Message Data Type Element Structure (a) Data Type RFQ Message

FIGS. 306A-O depict the element structure for RFQRequest and RFQChangeRequest. The element structure is similar to the data model, but provides additional information regarding the details of the interface. The element structure identifies the different packages 30600 in the interface, and represents the entities at various levels within the interface. As depicted in FIGS. 306A-O, the interface for RFQRequest and RFQChangeRequest includes six levels 30602, 30604, 30606, 30608, 30610, and 30612. The element structure identifies the cardinality or occurrence 30614 between the entities and/or attributes of the interface, and provides information (i.e., type 30616 and name 30618) regarding the data type that provides the basis for the entity and/or attribute. The outermost package of this interface is an RFQMessage package 30620, which includes an RFQMessage entity 30622 at the first level 30602. The RFQMessage entity 30622 is of type message data type ("MDT") 30624 "RFQMessage" 30626.

The RFQMessage package 30620 includes a MessageHeader package 30628 and an RFQ package 30630. The MessageHeader package 30628 includes a MessageHeader entity 30632, which is of type generic data type ("AGDT") 30636 "BusinessDocumentMessageHeader" 30638. There is one 30634 MessageHeader entity 30632 for each RFQMessage entity 30622.

The MessageHeader entity 30632 includes an ID 30640, a Reference ID 30648, and a CreationDateTime 30656. The ID 30640 is of type GDT 30644 BusinessDocumentMessageID 30646. The ReferenceID 30648 is of type GDT 30652 BusinessDocumentMessageID 30654. The CreationDateTime 30656 is of type GDT 30660 DateTime 30662. There is one 30642 ID 30640 for each MessageHeader entity 30632, one or zero 30650 ReferenceID 30648 for each MessageHeader entity 30632, and one 30658 CreationDateTime 30656 for each MessageHeader entity 30632.

The MessageHeader entity 30632 also includes a SenderParty entity 30664 and a RecipientParty entity 30628A. The SenderParty entity 30664 is of type AGDT 30668 BusinessDocumentMessageHeaderParty 30670. The RecipientParty entity 30628A is also of type AGDT 30632A BusinessDocumentMessageHeaderParty 30634A. There is one or zero 30666 SenderParty entity 30664 for each MessageHeader entity 30632, and there is any number 30630A of RecipientParty entities 30628A for each MessageHeader entity 30632.

The SenderParty entity 30664 includes an InternalID 30672, a StandardID 30680, and a ContactPerson 30688. The InternalID 30672 has zero or one occurrences 30674 for each SenderParty entity 30664 and a data type CDT 30676 of PartyInternalID 30678. The StandardID 30680 has any number of occurrences 30682 for each SenderParty entity 30664 and has a data type of CDT 30684 PartyStandardID 30686. The ContactPerson 30688 has zero or one occurrences 30690 for each SenderParty entity 30664 and is of data type AGDT 30692 ContactPerson 30694. The ContactPerson 30688 also includes an InternalID 30696, BuyerID 30604A, BidderID 30612A, and an Address 30620A. The InternalID 30696 has any number of occurrences 30698 for each ContactPerson 30688 and a data type of CDT 30600A ContactPersonInternalID 30602A. The BuyerID 30604A has zero or one occurrences 30606A for each ContactPerson 30688 and a data type of CDT 30608A ContactPersonPartyID 30610A. The BidderID 30612A has zero or one occurrences 30614A for each ContactPerson 30688 and a data type of CDT 30616A ContactPersonPartyID 30618A. The Address 30620A has one or zero occurrences 30622A for each ContactPerson 30688 and a data type of AGDT 30624A Address 30626A.

The RFQ package 30630 includes an RFQ entity 30636A. There is one 30638A RFQ entity 30636A for each RFQMessage entity 30622. The RFQ entity 30636A has a data type of AGDT 30640A RFQ 30642A. The RFQ entity 30636A includes an ID 30644A, a PostingDateTime 30652A, a LastChangeDateTime 30660A, a PublishDateTime 30668A, a DisplayDateTime 30676A, an BiddingStartDateTime 30684A, a QuoteSubmissionDateTime 30692A, a QuoteOpeningDateTime 30600B, a QuoteBindingDateTime 30608B, a ContractValidityPeriod 30616B, a Note 30624B, an RFQPublicIndicator 30632B, a QuoteUnplannedItemPermissionCode 30640B, a QuotePriceBiddingConditionCode 30648B, a QuoteQuantityBiddingConditionCode 30656B, a QuoteItemBiddingConditionCode 30664B, and a ContractTargetAmount 30672B.

There is one 30646A ID 30644A for each RFQ entity 30636A. The ID 30644A is of type GDT 30648A BusinessTransactionDocumentID 30650A. A PostingDateTime 30652A has zero or one occurrences 30654A for each RFQ entity 30636A and is of type GDT 30656A DateTime 30658A. LastChangeDateTime 30660A has zero or one occurrences 30662A for each RFQ entity 30636A and is of type GDT 30664A DateTime 30666A. PublishDateTime 30668A has zero or one occurrences 30670A for each RFQ entity 30636A and is of type GDT 30672A DateTime 30674A. DisplayDateTime 30676A has zero or one occurrences 30678A for each RFQ entity 30636A and is of type GDT 30680A DateTime 30682A. BiddingStartDateTime 30684A has zero or one occurrences 30686A for each RFQ entity 30636A and is of type GDT 30688A DateTime 30690A. QuoteSubmissionDateTime 30692A has one occurrence 30694A for each RFQ entity 30636A and is of type GDT 30696A DateTime 30698A. QuoteOpeningDateTime 30600B has zero or one occurrences 30602B for each RFQ entity 30636A and is of type GDT 30604B DateTime 30606B. QuoteBindingDateTime 30608B has zero or one occurrences 30610B for each RFQ entity 30636A and is of type GDT 30612B DateTime 30614B. ContractValidityPeriod 30616B has zero or one occurrences 30618B for each RFQ entity 30636A and is of type GDT 30620B DateTimePeriod 30622B. Note 30624B has zero or one occurrences 30626B for each RFQ entity 30636A and is of type GDT 30628B Note 30630B. RFQPublicIndicator 30632B has one occurrence 30634B for each RFQ entity 30636A and is of type GDT 30636B BusinessTransactionDocumentPublicIndicator 30638B. QuoteUnplannedItemPermissionCode 30640B has zero or one occurrences 30642B for each RFQ entity 30636A and is of type GDT 30644B UnplannedItemPermissionCode 30646B. QuoteQuantityBiddingConditionCode 30656B has one occurrence 30658B for each RFQ entity 30636A and is of type GDT 30660B BiddingConditionCode 30662B. The QuoteItemBiddingConditionCode 30664B has one occurrence 30666B for each RFQ entity 30636A and a data type GDT 30668B BiddingConditionCode 30670B, and ContractTargetAmount 30672B has zero or one occurrences 30674B for each RFQ entity 30636A and is of type GDT 30676B Amount 30678B.

The Party package 30680B includes a BuyerParty entity 30600C, a BidderParty entity 30672C, a BidderPortalPartyProvider entity 30680C, a ProductRecipientParty entity 30688C, a VendorParty entity 30696C, a ManufacturerParty entity 30604D, and a PayerParty entity 30612D.

The BuyerParty entity 30600C is of type AGDT 30604C BusinessTransactionDocumentParty 30606C. There is one or zero 30602C BuyerParty entity 30600C for each RFQ entity 30636A. The BidderParty entity 30672C is of type AGDT 30676C BusinessTransactionDocumentParty 30678C. There is zero or one 30674C BidderParty entity 30672C for each RFQ entity 30636A. The BidderPortalProviderParty entity 30680C is of type AGDT 30684C BusinessTransactionDocumentParty 30686C. There is zero or one 30682C BidderPortalPartyProvider entity 30680C for each RFQ entity 30636A. The ProductRecipientParty entity 30688C is of type AGDT 30692C BusinessTransactionDocumentParty 30694C. There is one or zero 30690C ProductRecipientParty entity 30688C for each RFQ entity 30636A. The VendorParty entity 30696C is of type AGDT 30600D BusinessTransactionDocumentParty 30602D. There is one or zero 30698C VendorParty entity 30696C for each RFQ entity 30636A. The ManufacturerParty entity 30604D is of type AGDT 30608D BusinessTransactionDocumentParty 30610D. There is one or zero 30606D ManufacturerParty entity 30604D for each RFQ entity 30636A. The PayerParty entity 30612D is of type AGDT 30616D BusinessTransactionDocumentParty 30618D. There is one or zero 30614D PayerParty entity 30612D for each RFQ entity 30636A.

The BuyerParty entity 30600C includes a StandardID 30608C, a BuyerID 30616C, a BidderID 30624C, an Address 30632C, and a ContactPerson 30640C. The StandardID 30608C has any number of occurrences 30610C for each BuyerParty entity 30600C and a data type of CDT 30612C PartyStandardID 30614C. The BuyerID 30616C has zero or one occurrences 30618C for each BuyerParty entity 30600C and a data type of CDT 30620C PartyPartyID 30622C. The BidderID 30624C has zero or one occurrences 30626C for each BuyerParty entity 30600C and a data type of CDT 30628C PartyPartyID 30630C. The Address 30632C has zero or one occurrences 30634C for each BuyerParty entity 30600C and a data type of AGDT 30636C Address 30638C. The ContactPerson 30640C has zero or one occurrences 30642C for each BuyerParty entity 30600C and a data type of AGDT 30644C ContactPerson 30646C. The ContactPerson 30640C also includes a BuyerID 30648C, BidderID 30656C and an Address 30664C. The BuyerID 30648C has zero or one occurrences 30650C for each ContactPerson 30640C and a data type of CDT 30652C ContactPersonPartyID 30654C. The BidderID 30656C has zero or one occurrences 30658C for each ContactPerson 30640C and a data type of CDT 30660C ContactPersonPartyID 30662C. The Address 30664C has one or zero occurrences 30666C for each ContactPerson 30640C and a data type of AGDT 30668C Address 30670C.

The Location package 30682B includes a ShipToLocation entity 30620D. The ShipToLocation entity 30620D is of type AGDT 30624D BusinessTransactionDocumentLocation 30626D. There is one or zero 30622D ShipToLocation entity 30620D for each RFQ entity 30636A. The ShipToLocation entity 30620D includes a StandardID 30628D, a BuyerID 30636D, a BidderID 30644D, and an Address 30652D. The StandardID 30628D has any number of occurrences 30630D for each ShipToLocation entity 30620D and a data type of CDT 30632D LocationStandardID 30634D. The BuyerID 30636D has zero or one occurrences 30638D for each ShipToLocation entity 30620D and a data type of CDT 30640D LocationPartyID 30642D. The BidderID 30644D has zero or one occurrences 30646D for each ShipToLocation entity 30620D and a data type of CDT 30648D LocationPartyID 30650D. The Address 30652D has zero or one occurrences 30654D for each ShipToLocation entity 30620D and a data type of AGDT 30656D Address 30658D.

The DeliveryInformation package 30684B includes a DeliveryTerms entity 30660D. The DeliveryTerms entity 30660D is of type AGDT 30664D DeliveryTerms 30666D. There is one or zero 30662D Delivery Terms entity 30660D for each RFQ entity 30636A. The DeliveryTerms entity 30660D includes an Incoterms entity 30668D, which is of type GDT 30672D Incoterms 30674D. There is one or zero 30670D Incoterms entity 30668D for each DeliveryTerms entity 30660D.

The PaymentInformation package 30686B includes a CashDiscountTerms entity 30676D, which is of type AGDT 30680D CashDiscountTerms 30682D. There is one or zero 30678D CashDiscountTerms entity 30676D for each RFQ entity 30636A. The CashDiscountTerms entity 30676D includes a MaximumCashDiscount 30684D, a NormalCashDiscount 30692D, and FullPaymentDueDaysValue 30600E. There is one or zero occurrences 30686D of the MaximumCashDiscount 30684D for each CashDiscountTerms entity 30676D. The MaximumCashDiscount 30684D is of type GDT 30688D CashDiscount 30690D. There is one or zero occurrences 30694D of the NormalCashDiscount 30692D for each CashDiscountTerms entity 30676D. The NormalCashDiscount 30692D is of type GDT 30696D CashDiscount 30698D. There is one or zero occurrences 30602E of the FullPaymentDueDaysValue 30600E for each CashDiscountTerms entity 30676D.

The PaymentInformation package 30684B also includes a PaymentForm entity 30604E. There is one or zero 30606E PaymentForm entity 30604E for each RFQ entity 30636A. The PaymentForm entity 30604E includes a Code 30608E that is of type GDT 30612E PaymentFormCode 30614E. There is one 30610E Code 30608E for each PaymentForm entity 30604E.

The ProductInformation package 30688B includes a ProductCategory entity 30616E. The ProductCategory entity 30616E is of type GDT 30620E BusinessTransactionDocumentProductCategory 30622E. There is one or zero 30618E ProductCategory entity 30616E for each RFQ entity 30636A. The ProductCategory entity 30616E includes a StandardID 30624E, a BuyerID 30632E, and a BidderID 30640E. The StandardID 30624E has any number of occurrences 30626E for each ProductCategory entity 30616E and a data type of CDT 30628E ProductCategoryStandardID 30630E. The BuyerID 30632E has zero or one occurrences 30634E for each ProductCategory entity 30616E and a data type of CDT 30636E ProductCategoryPartyID 30638E. The BidderID 30640E has zero or one occurrences 30642E for each ProductCategory entity 30616E and a data type of CDT 30644E ProductCategoryPartyID 30646E.

The BusinessTransactionDocumentReference package 30690B includes a QuoteReference entity 30648E. The QuoteReference entity 30648E is of type GDT 30652E BusinessTransactionDocumentReference 30654E. There is one or zero 30650E QuoteReference entities 30648E for each RFQ entity 30636A. The QuoteReference entity 30648E includes an ID 30656E, and there is one occurrence 30658E of the ID 30656E for each QuoteReference 30648E. The ID 30656E is of type GDT 30660E BusinessTransactionDocumentID 30662E.

The FollowUpBusinessTransactionDocument package 30692B includes a FollowUpPurchaseOrder entity 30664E and a FollowUpPurchaseDocument 30676E. There is zero or one occurrence 30666E of the FollowUpPurchaseOrder entity 30664E for each RFQ entity 30636A and one or zero occurrences 30678E of the FollowUpPurchaseDocument entity 30676E for each RFQ entity 30636A. The FollowUpPurchaseOrder entity 30664E includes a RequirementCode 30668E which has one occurrence 30670E for each FollowUpPurchaseOrder entity 30664E and is of type GDT 30672E FollowUpBusinessTransactionDocumentRequirementCode 30674E. The FollowUpPurchaseDocument entity 30676E includes a RequirementCode entity 30680E which has one occurrence 30682E for each FollowUpPurchaseDocument entity 30676E and is of type GDT 30684E The Attachment package 30694B includes an Attachment entity 30688E, which is of type GDT 30692E Attachment 30694E. There is any number 30690E of Attachment entities 30688E for each RFQ entity 30636A.

The Description package 30696B includes a Description entity 30696E. The Description entity 30696E is of type GDT 30600F Description 30602F. There is one or zero 30698E Description entities 30696E for each RFQ entity 30636A.

The Item package 30698B includes an Item entity 30604F which is of type AGDT 30608F RFQItem 30610F. There is any number 30606F of Item entities 30604F for each RFQ entity 30636A. The Item entity 30604F includes an ID 30612F, a ContractTargetAmount 30620F, and a HierarchyRelationship 30628F. The ID 30612F is of type GDT 30616F BusinessTransactionDocumentItemID 30618F, and there is one 30614F ID 30612F for each Item entity 30604F. The ContractTargetAmount 30620F is of type GDT 30624F Amount 30626F, and there is one or zero 30622F ContractTargetAmount 30620F for each Item entity 30604F. There is one or zero 30630F HierarchyRelationship 30628F for each Item entity 30604F. The HierarchyRelationship 30628F includes a ParentItemID 30632F, which is of type GDT 30636F BusinessTransactionDocumentItemID 30638F, and a TypeCode 30640F, which is of type GDT 30644F BusinessTransactionDocumentHierarchyRelationshipTypeCode 30646F. There is one 30634F ParentItemID 30632F for each HierarchyRelationship 30628F, and there is one 30642F TypeCode 30640F for each HierarchyRelationship 30628F.

The Item package 30698B also includes a ProductInformation package 30648F, a Party package 30650F, a Location package 30652F, a DeliveryInformation package 30654F, a BusinessTransactionDocumentReference package 30656F, an Attachment package 30658F, a Description package 30660F, and a ScheduleLine package 30662F.

The ProductInformation package 30648F includes a Product entity 30664F and a ProductCategory entity 30620G. The Product entity 30664F is of type GDT 30668F BusinessTransactionDocumentProduct 30670F. There is one or zero 30666F Product entity 30664F for each Item entity 30604F. The ProductCategory entity 30620G is of type GDT 30624G BusinessTransactionDocumentProductCategory 30626G. There is one or zero 30622G ProductCategory entity 30620G for each Item entity 30604F.

The Product entity 30664F includes a StandardID 30672F, a BuyerID 30680F, a BidderID 30688F, an ManufacturerID 30696F, TypeCode 30604G and a Note 30612G. The StandardID 30672F has any number of occurrences 30674F for each Product entity 30664F and a data type of CDT 30676F ProductStandardID 30678F. The BuyerID 30680F has zero or one occurrences 30682F for each Product entity 30664F and a data type of CDT 30684F ProductPartyID 30686F. The BidderID 30688F has zero or one occurrences 30690F for each Product entity 30664F and a data type of CDT 30692F ProductPartyID 30694F. The ManufacturerID 30696F has zero or one occurrences 30698F for each Product entity

30664F and a data type of CDT 30600G ProductPartyID 30602G. The TypeCode 30604G has zero or one occurrences 30606G for each Product entity 30664F and a data type of GDT 30608G ProductTypeCode 30610G. The Note 30612G has zero or one occurrences 30614G and a data type of GDT 30616G Note 30618G.

The ProductCategory entity 30620G includes a StandardID 30628G, a BuyerID 30636G, and a BidderID 30644G. The StandardID 30628G has any number of occurrences 30630G for each ProductCategory entity 30620G and a data type of CDT 30632G ProductCategoryStandardID 30634G. The BuyerID 30636G has zero or one occurrences 30638G for each ProductCategory entity 30620G and a data type of CDT 30640G ProductCategoryPartyID 30642G. The BidderID 30644G has zero or one occurrences 30646G for each ProductCategory entity 30620G and a data type of CDT 30648G ProductCategoryPartyID 30650G.

The Party package 30650F includes a BuyerParty entity 30652G, a BidderParty entity 30660G, a ProductRecipientParty entity 30668G, a VendorParty entity 30676G, and a ManufacturerParty entity 30684G.

The BuyerParty entity 30652G is of type AGDT 30656G BusinessTransactionDocumentParty 30658G. There is one or zero 30654G BuyerParty entity 30652G for each Item entity 30604F. The BidderParty entity 30660G is of type AGDT 30664G BusinessTransactionDocumentParty 30666G. There is zero or one 30662G BidderParty entity 30660G for each Item entity 30604F. There is zero or one 30670G ProductRecipientParty entity 30668G for each Item entity 30604F. The ProductRecipientParty entity 30668G is of type AGDT 30672G BusinessTransactionDocumentParty 30674G. The VendorParty entity 30676G is of type AGDT 30680G BusinessTransactionDocumentParty 30682G. There is one or zero 30678G VendorParty entity 30676G for each Item entity 30604F. The ManufacturerParty entity 30684G is of type AGDT 30688G BusinessTransactionDocumentParty 30690G. There is one or zero 30686G ManufacturerParty entity 30684G for each Item entity 30604F.

The Location package 30652F includes a ShipToLocation entity 30692G. The ShipToLocation entity 30692G is of type AGDT 30696G BusinessTransactionDocumentLocation 30698G. There is one or zero 30694G ShipToLocation entity 30692G for each Item entity 30604F. The ShipToLocation entity 30692G includes a StandardID 30600H, a BuyerID 30608H, a BidderID 30616H, and an Address 30624H. The StandardID 30600H has any number of occurrences 30602H for each ShipToLocation entity 30692G and a data type of CDT 30604H LocationStandardID 30606H. The BuyerID 30608H has zero or one occurrences 30610H for each ShipToLocation entity 30692G and a data type of CDT 30612H LocationPartyID 30614H. The BidderID 30616H has zero or one occurrences 30618H for each ShipToLocation entity 30692G and a data type of CDT 30620H LocationPartyID 30622H. The Address 30624H has zero or one occurrences 30626H for each ShipToLocation entity 30692G and a data type of AGDT 30628H Address 30630H.

The DeliveryInformation package 30654F includes a DeliveryTerms entity 30632H, which is of type AGDT 30636H DeliveryTerms 30638H. There is one or zero 30634H DeliveryTerms entity 30632H for each Item entity 30604F. The DeliveryTerms entity 30632H includes an MaximumLeadTimeDuration entity 30640H, which is of type GDT 30644H Duration 30646H, and there is one or zero occurrences 30642 of the MaximumLeadTimeDuration entity 30640H for each The DeliveryTerms entity 30632H. The DeliveryTerms entity 30632H also includes an Incoterms entity 30648H which is of type GDT 30652H Incoterms 30654H. There is one or zero 30650H Incoterms entity 30648H for each of the DeliveryTerms entity 30632H.

The BusinessTransactionDocumentReference package 30656F includes a QuoteReference entity 30656H. The QuoteReference entity 30656H is of type GDT 30660H BusinessTransactionDocumentReference 30662H. There is one or zero 30658H QuoteReference entities 30656H for each Item entity 30604F. The QuoteReference entity 30686H includes an ID 30664H. There is one 30666H ID 30664H for each QuoteReference entity 30656H. The ID 30664H is of type GDT 30668H BusinessTransactionDocumentID 30670H. The QuoteReference entity 30656H also includes an ItemID 30672H. There is any number 30674H of ItemID 30672H for each Quote Reference entity 30656H. The ItemID 30672H is of type GDT 30676H BusinessTransactionDocumentItemID 30678H.

The BusinessTransactionDocumentReference package 30656F also includes a PurchaseContractReference entity 30680H. The PurchaseContractReference entity 30680H is of type GDT 30684H BusinessTransactionDocumentReference 30686H. There is one or zero 30682H PurchaseContractReference entities 30680H for each Item entity 30604F. The PurchaseContractReference entity 30680H includes an ID 30688H. There is one 30690H ID 30688H for each PurchaseContractReference entity 30680H. The ID 30688H is of type GDT 30692H BusinessTransactionDocumentID 30694H. The PurchaseContractReference entity 30680H also includes an ItemID 30696H. There is any number 30698H of ItemID 30696H for each PurchaseContractReference entity 30680H. The ItemID 30696H is of type GDT 30600I BusinessTransactionDocumentItemID 30602I.

The BusinessTransactionDocumentReference package 30656F further includes a BuyerProductCatalogueReference entity 30604I. The BuyerProductCatalogueReference entity 30604I is of type AGDT 30608I CatalogueReference 30610I. There is one or zero 30606I BuyerProductCatalogueReference entities 30604I for each Item entity 30604F. The BuyerProductCatalogueReference entity 30604I includes an ID 30612I. There is one 30614I ID 30612I for each BuyerProductCatalogueReference entity 30604I. The ID 30614I is of type GDT 30616I CatalogueID 30618I. The BuyerProductCatalogueReference entity 30604I also includes an ItemID 30620I. There is any number 30622I of ItemID 30620I for each BuyerProductCatalogueReference entity 30604I. The ItemID 30620I is of type GDT 30624I CatalogueItemID 30626I.

The Attachment package 30658F includes an Attachment entity 30628I, which is of type GDT 30632I Attachment 30634I. There is any number 30630I of Attachment entities 30628I for each Item entity 30604F.

The Description package 30660F includes a Description entity 30636I. The Description entity 30636I is of type GDT 30640I Description 30642I. There is one or zero 30638I Description entity 30636I for each Item entity 30604F.

The ScheduleLine package 30662F includes a ScheduleLine entity 30644I having an ID 30652I, DeliveryPeriod 30660I, and Quantity 30668I. The ScheduleLine entity 30644I has zero or one occurrence 30646I for each Item entity 30604F. The ScheduleLine entity 30644I is of type AGDT 30648I RFQItemScheduleLine 30650I. The ID 30652I has one or zero occurrence 30654I for each ScheduleLine entity 30644I and a data type of GDT 30656I BusinessTransactionDocumentItemScheduleLineID 30658I. The DeliveryPeriod 30660I has one occurrence 30662I for each ScheduleLine entity 30644I and a data type of AGDT 30664I DateTimePeriod 30666I. The Quantity 30668I has one or zero occurrences 30670I for each ScheduleLine entity 30644I and a data type of GDT 30672I Quantity 30674I.

(b) Data Type RFQ Cancellation Message

FIGS. 307A-C depict the element structure for RFQCancellationRequest. The element structure is similar to the data model, but provides additional information regarding the details of the interface. The element structure identifies the different packages 30700 in the interface, and represents the entities at various levels within the interface. As depicted in FIGS. 307A-C, the interface for RFQCancellationRequest includes five levels 30702, 30704, 30706, 30708, and 30710. The element structure identifies the cardinality 30712 between the entities and/or attributes of the interface, and provides information (i.e., type 30714 and name 30716) regarding the data type that provides the basis for the entity and/or attribute. The outermost package of this interface is an RFQCancellationMessage package 30718, which includes an RFQCancellationMessage entity 30720 at the first level 30702. The RFQCancellationMessage entity 30720 is of type message data type ("MDT") 30722 "RFQCancellationMessage" 30724.

The RFQCancellationMessage package 30718 includes a MessageHeader package 30726 and an RFQCancellation package 30728. The MessageHeader package 30726 includes a MessageHeader entity 30730, which is of type generic data type ("AGDT") 30734 "BusinessDocumentMessageHeader" 30736. There is one 30732 MessageHeader entity 30730 for each RFQCancellationMessage entity 30720.

The MessageHeader entity 30730 includes an ID 30738, a ReferenceID 30746, and a CreationDateTime 30754. The ID 30738 is of type GDT 30742 BusinessDocumentMessageID 30744. The ReferenceID 30746 is of type GDT 30750 BusinessDocumentMessageID 30752. The CreationDateTime 30754 is of type GDT 30758 DateTime 30760. There is one 30740 ID 30738 for each MessageHeader entity 30730, one or zero 30748 ReferenceID 30786 for each MessageHeader entity 30730, and one 30756 CreationDateTime 30754 for each MessageHeader entity 30730.

The MessageHeader entity 30730 also includes a SenderParty entity 30762 and a RecipientParty entity 30726A. The SenderParty entity 30762 is of type AGDT 30766 BusinessDocumentMessageHeaderParty 30768. The RecipientParty entity 30726A is also of type AGDT 30730A BusinessDocumentMessageHeaderParty 30732A. There is one or zero 30764 SenderParty entity 30762 for each MessageHeader entity 30730, and there is any number 30728A of RecipientParty entity 30726A for each MessageHeader entity 30730.

The SenderParty entity 30762 includes an InternalID 30770, a StandardID 30778, and a Contact 30786. The InternalID 30770 has zero or one occurrences 30772 for each SenderParty entity 30762 and a data type CDT 30774 of PartyInternalID 30776. The StandardID 30778 has any number of occurrences 30780 for each SenderParty entity 30762 and a data type of CDT 30782 PartyStandardID 30784. The Contact 30786 has zero or one occurrences 30788 for each SenderParty entity 30762 and is of data type GDT 30790 ContactPerson 30792. The Contact 30786 also includes an InternalID 30794, BuyerID 30702A, Bidder ID 30710A and an Address 30718A. The InternalID 30794 Person has any number of occurrences 30796 for each SenderParty entity 30762 and a data type of CDT 30798 ContactPersonInternalID 30700A. The BuyerID 30702A has zero or one occurrences 30704A for each SenderParty entity 30762 and a data type of CDT 30706 ContactPersonPartyID 30708A. The BidderID 30710A has zero or one occurrences 30712A for each SenderParty entity 30714A and a data type of CDT 30714A ContactPersonPartyID 30716A. The Address 30718A has zero or one occurrences 30720A for each SenderParty entity 30762 and a data type of AGDT 30722A Address 30724A.

The RFQCancellation package 30728 includes an RFQCancellation entity 30734A. The RFQCancellation entity 30734A is of type GDT 30738A RFQCancellation 30740A. There is one 30736A RFQCancellation entity 30734A for each RFQCancellationMessage entity 30720. The RFQCancellation entity 30734A includes an ID 30742A. There is one 30744A ID 30742A for each RFQCancellation entity 30734A. The ID 30742A is of type GDT 30746A BusinessTransactionDocumentID 30748A.

(c) Data Type Quote Message

FIGS. 308A-M depict the element structure for QuoteNotification. The element structure is similar to the data model, but provides additional information regarding the details of the interface. The element structure identifies the different packages 30800 in the interface, and represents the entities at various levels within the interface. As depicted in FIGS. 308A-M, the interface for QuoteNotification includes six levels 30802, 30804, 30806, 30808, 30810, and 30812. The element structure identifies the cardinality 30814 between the entities and/or attributes of the interface, and provides information (i.e., type 30816 and name 30818) regarding the data type that provides the basis for the entity and/or attribute. The outermost package of this interface is an QuoteMessage package 30800, which includes an QuoteMessage entity 30822 at the first level 30802. The QuoteMessage entity 30822 is of type message data type ("MDT") 30824 "QuoteMessage" 30826.

The QuoteMessage package 30820 includes a MessageHeader package 30828 and a Quote package 30830. The MessageHeader package 30828 includes a MessageHeader entity 30832, which is of type generic data type ("AGDT") 30836 "BusinessDocumentMessageHeader" 30838. There is one 30834 MessageHeader entity 30832 for each QuoteMessage entity 30822.

The MessageHeader entity 30832 includes an ID 30840, a Reference ID 30848, and a CreationDateTime 30856. The ID 30840 is of type GDT 30844 BusinessDocumentMessageID 30846. The ReferenceID 30848 is of type GDT 30852 BusinessDocumentMessageID 30854. The CreationDateTime 30856 is of type GDT 30860 DateTime 30862. There is one 30842 ID 30840 for each MessageHeader entity 30832, one or zero 30850 ReferenceID 30848 for each MessageHeader entity 30832, and one 30858 CreationDateTime 30856 for each MessageHeader entity 30832.

The MessageHeader entity 30832 also includes a SenderParty entity 30864 and a RecipientParty entity 30828A. The SenderParty entity 30864 is of type AGDT 30868 BusinessDocumentMessageHeaderParty 30870. The RecipientParty entity 30828A is also of type AGDT 30832A BusinessDocumentMessageHeaderParty 30834A. There is one or zero 30866 SenderParty entity 30864 for each MessageHeader entity 30832, and there is any number 30830A of RecipientParty entity 30828A for each MessageHeader entity 30832.

The SenderParty entity 30864 includes an InternalID 30872, a StandardID 30880, and a Contact 30888. The InternalID 30872 has zero or one occurrences 30874 for each SenderParty entity 30864 and a data type CDT 30876 of PartyInternalID 30878. The StandardID 30880 has any number of occurrences 30882 for each SenderParty entity 30864 and a data type of CDT 30884 PartyStandardID 30856. The Contact 30888 has zero or one occurrences 30890 SenderParty entity 30864 and is of data type GDT 30892 Contact 30894. The Contact 30888 also includes an InternalID 30896, BuyerID 30804A, Bidder ID 30812A and an Address 30820A. The InternalID 30896 has any number of occurrences 30898 for each Contact 30888 and a data type of CDT 30800A ContactPersonInternalID 30802A. The BuyerID 30804A has zero or one occurrences 30806A for each Contact 30888 and a data type of CDT 30808A ContactPersonPartyID 30810A. The BidderID 30812A has zero or one occurrences 30814A and a data type of CDT 30816A ContactPersonPartyID 30818A. The Address 30820A has one or zero occurrences 30822A for each Contact 30888 and a data type of AGDT 30824A Address 30826A.

The Quote package 30830 includes a Quote entity 30836A. There is one 30838A Quote entity 30836A for each QuoteMessage entity 30822. The Quote entity 30836A has a data type of AGDT 30840A Quote 30842A. The Quote entity 30836A includes an ID 30844A, a PostingDateTime 30852A, a LastChangeDateTime 30860A, a BindingDateTime 30868A, a Note 30876A, and a ContractTargetAmount 30884A.

There is one 30846A ID 30844A for each Quote entity 30836A. The ID 30844A is of type GDT 30848A BusinessTransactionDocumentID 30850A. A PostingDateTime 30852A has zero or one occurrences 30854A for each Quote entity 30836A and is of type GDT 30856A DateTime 30858A. LastChangeDateTime 30860A has zero or one occurrences 30862A for each Quote entity 30836A and is of type GDT 30864A DateTime 30866A. BindingDateTime 30868A has zero or one occurrences 30870A for each Quote entity 30836A and is of type GDT 30880A DateTime 30874A. Note 30876A has zero or one occurrences 30878A for each Quote entity 30836A and is of type GDT 30880A Note 30882A. ContractTargetAmount 30884A has zero or one occurrences 30886A and is of type GDT 30888A Amount 30890A.

The Party package 30892A includes a BuyerParty entity 30810B, a BidderParty entity 30882B, a BidderPortalPartyProvider entity 30890B, a ProductRecipientParty entity 30898B, a VendorParty entity 30806C, a ManufacturerParty entity 30814C, a PayerParty entity 30822C.

The BuyerParty entity 30810B is of type GDT 30814B BusinessTransactionDocumentParty 30816B. There is one or zero 30812B BuyerParty entity 30810B for each Quote entity 30836A. The BidderParty entity 30882B is of type AGDT 30886B BusinessTransactionDocumentParty 30888B. There is zero or one 30884B BidderParty entity 30882B for each Quote entity 30836A. The BidderPortalPartyProvider entity 30890B is of type AGDT 30894B BusinessTransactionDocumentParty 30896B. There is zero or one 30892B BidderPortalPartyProvider entity 30890B for each Quote entity 30836A. The ProductRecipientParty entity 30898B is of type AGDT 30802C BusinessTransactionDocumentParty 30804C. There is one or zero 30800C ProductRecipientParty entity 30898B for each Quote entity 30836A. The VendorParty entity 30806C is of type AGDT 30810C BusinessTransactionDocumentParty 30812C. There is one or zero 30808C VendorParty entity 30806C for each Quote entity 30836A. The ManufacturerParty entity 30814C is of type AGDT 30818C BusinessTransactionDocumentParty 30820C. There is one or zero 30816C ManufacturerParty entity 30814C for each Quote entity 30836A. The PayerParty entity 30822C is of type AGDT 30826C BusinessTransactionDocumentParty 30828C. There is one or zero 30824C PayerParty entity 30822C for each Quote entity 30836A.

The BuyerParty entity 30810B includes a StandardID 30818B, a BuyerID 30826B, a BidderID 30834B, an Address 30842B, and a Contact 30850B. The StandardID 30818B has any number of occurrences 30820B for each BuyerParty entity 30810B and a data type of CDT 30822B PartyStandardID 30824B. The BuyerID 30826B has zero or one occurrences 30828B for each BuyerParty entity 30810B and a data type of CDT 30830B PartyPartyID 30840B. The BidderID 30834B has zero or one occurrences 30836B for each BuyerParty entity 30810B and a data type of CDT 30838B PartyPartyID 30840B. The Address 30842B has occurrences 30844B for each BuyerParty entity 30810B and a data type of AGDT 30846B Address 30848B. The Contact 30850B has zero or one occurrences 30852B for each BuyerParty entity 30810B and a data type of AGDT 30854B ContactPerson 30856B. The Contact 30850B also includes a BuyerID 30858B, BidderID 30866B and an Address 30874B. The BuyerID 30858B has zero or one occurrences 30860B for each Contact 30850B and a data type of CDT 30862B PartyPartyID 30864B. The BidderID 30866B has zero or one occurrences 30868B for each Contact 30850B and a data type of CDT 30870B PartyPartyID 30872B. The Address 30874B has one or zero occurrences 30876 for each Contact 30850B and a data type of AGDT 30878B Address 30880B.

The Location package 30894A includes a ShipToLocation entity 30830C. The ShipToLocation entity 30830C is of type AGDT 30834C BusinessTransactionDocumentLocation 30836C. There is one or zero 30832C ShipToLocation entity 30830C for each Quote entity 30836A. The ShipToLocation entity 30830C includes a StandardID 30838C, a BuyerID 30846C, a BidderID 30854C, and an Address 30862C. The StandardID 30838C has any number of occurrences 30840C and a data type of CDT 30842C LocationStandardID 30844C. The BuyerID 30846C has zero or one occurrences 30848C for each ShipToLocation entity 30830C and a data type of CDT 30850C LocationPartyID 30852C. The BidderID 30854C has zero or one occurrences 30856C for each ShipToLocation entity 30830C and a data type of CDT 30858C LocationPartyID 30860C. The Address 30862C has zero or one occurrences 30864C for each ShipToLocation entity 30830C and a data type of AGDT 30866C Address 30868C.

The DeliveryInformation package 30896A includes a DeliveryTerms entity 30870C, which is of type AGDT 30874C DeliveryTerms 30876C. There is one or zero 30872C DeliveryTerms entity 30870C for each Quote entity 30836A. The DeliveryTerms entity 30870C includes an Incoterms entity 30878C which is of type GDT 30882C Incoterms 30884C. There is one or zero 308C Incoterms entity 30878C for each DeliveryTerms entity 30870C.

The PaymentInformation package 30898A includes a CashDiscountTerms entity 30886C, which is of type AGDT 30890C CashDiscountTerms 30892C. There is one or zero 30888C CashDiscountTerms entity 30886C for each Quote entity 30836A. The PaymentInformation package 30898A also includes a PaymentForm entity 30814D. There is one or zero 30816D PaymentForm entity 30814D for each Quote entity 30836A. The PaymentForm entity 30814D includes a Code 30818D that is of type GDT 30822D PaymentFormCode 30824D. There is one 30820D Code 30818D for each PaymentForm entity 30814D.

The CashDiscountTerms entity 30886C includes a MaximumCashDiscount 30894C, and a NormalCashDiscount 30862D, and FullPaymentDueDaysValue 30810D. There is one or zero occurrences 30896C of the MaximumCashDiscount entity 30894C is of type GDT 30898C CashDiscount 30800D. There is one or zero occurrences 30896C of the NormalCashDiscount entity 30802D is of type GDT 30806D CashDiscount 30808D. There are one or zero occurrences 30812D of the FullPaymentDueDaysValue entity 30810D for each CashDiscount Terms entity 30886C.

The ProductInformation package 30800B includes a ProductCategory entity 30826D. The ProductCategory entity 30826D is of type GDT 30830D BusinessTransactionDocumentProductCategory 30832D. There is one or zero 30828D ProductCategory entity 30826D for each Quote entity 30836A. The ProductCategory entity 30826D includes a StandardID 30834D, a BuyerID 30840D, and a BidderID 30846D. The StandardID 30834D of has a data type of CDT 30836D ProductCategoryStandardID 30838D. The BuyerID 30840D has a data type of CDT 30842D ProductCategoryPartyID 30844D. The BidderID 30846D has a data type of CDT 30848D ProductCategoryPartyID 30850D.

The BusinessTransactionDocumentReference package 30802B includes a RFQReference entity 30852D. The RFQReference entity 30852D is of type GDT 30856D BusinessTransactionDocumentReference 30858D. There is one or zero 30854D RFQReference entities 30852D for each Quote entity 30836A. The RFQReference entity 30852D includes an ID 30860D, and there is one 30862D ID 30860D RFQReference entity 30852D is of type GDT 30864D BusinessTransactionDocumentID 30866D.

The Attachment package 30804B includes an Attachment entity 30868D, which is of type GDT 30872D Attachment 30874D. There is any number 30870D Attachment entities 30868D for each Quote entity 30836A.

The Description package 30806B includes a Description entity 30876D. The Description entity 30876D is of type GDT 30880D Description 30882D. There is one or zero 30878D Description entities 30876D for each Quote entity 30836A.

The Item package 30808B includes an Item entity 30884D which is of data type AGDT 30888D QuoteItem 30890D. There is any number 30886D of Item entities 30884D for each Quote entity 30836A. The Item entity 30884D includes an ID 30892D, a ContractTargetAmount 30800E, and a HierarchyRelationship 30808E. The ID 30892D is of type GDT 30896D BusinessTransactionDocumentItemID 30898D, and there is one 30894D ID 30892D for each Item entity 30884D. The ContractTargetAmount 30800E is of type GDT 30804E Amount 30806E, and there is one or zero 30802E ContractTargetAmount 30800E for each Item entity 30884D. There is one or zero 30810E HierarchyRelationship 30808E for each Item entity 30884D. The HierarchyRelationship 30808E includes a ParentItemID 30812E, which is of type GDT 30816E BusinessTransactionDocumentItemID 30818E, and a TypeCode 30820E, which is of type GDT 30824E BusinessTransactionDocumentItem-HierarchyRelationshipTypeCode 30826E. There is one 30814E ParentItemID 30812E for each HierarchyRelationship 30808E, and there is one 30822E TypeCode 30820E for each HierarchyRelationship 30808E.

The Item package 30808B also includes a ProductInformation package 30828E, a Party package 30832E, a Location package 30834E, a DeliveryInformation package 30836E, a BusinessTransactionDocumentReference package 30838E, an Attachment package 30840E, a Description package 30842E, and a ScheduleLine package 30844E.

The ProductInformation package 30828E includes a Product entity 30846E and a ProductCategory entity 30800F. The Product entity 30846E is of type BusinessTransactionDocumentProduct 30850E. There is one or zero 30848E Product entity for each Item entity 30884D. The ProductCategory entity 30800F is of type BusinessTransactionDocumentProductCategory 30804F. There is one or zero 30802F ProductCategory entity 30800F for each Item entity 30884D.

The Product entity 30846E includes a StandardID 30852E, a BuyerID 30860E, a BidderID 30868E, an ManufacturerID 30876E, TypeCode 30884E and a Note 30892E. The StandardID 30852E has any number of occurrences 30854E Product entity 30846E and has a data type of CDT 30856E ProductStandardID 30858E. The BuyerID 30860E has zero or one occurrences 30862E for each Product entity 30846E and a data type of CDT 30864E ProductPartyID 30866E. The BidderID 30868E has zero or one occurrences 30870E for each Product entity 30846E and a data type of CDT 30872E ProductPartyID 30874E. The ManufacturerID 30876E has zero or one occurrences 30878E for each Product entity 30846E and a data type of CDT 30880E ProductPartyID 30882E. The TypeCode 30884E has zero or one occurrences 30886E for each Product entity 30846E and a data type of GDT 30888E ProductTypeCode 30890E. The Note 30892E has zero or one occurrences 30894E for each Product entity 30846E and a data type of GDT 30896E Note 30898E.

The ProductCategory entity 30800F includes a StandardID 30806F, a BuyerID 30814F, and a BidderID 30822F. The StandardID 30806F of has any number of occurrences 30808F for each Product entity 30846E and has a data type of CDT 308I 0F ProductCategoryStandardID 30812F. The BuyerID 30814F has zero or one occurrences 30816 for each Product entity 30846E and a data type of CDT 30818F ProductCategoryPartyID 30820F. The BidderID 30822F has a data type of CDT 30824F ProductCategoryPartyID 30826F.

The PriceInformation package 30830E includes a Price entity 30828F. There is one or zero 30830F Price entity 30828F for each Item entity 30884D. The Price entity 30828F includes a NetUnitPrice 30832F. The NetUnitPrice 30832F is of type AGDT 30836F Price 30838F. There is one or zero 30834F NetUnitPrice 30832F for each Price entity 30828F.

The Party package 30832E includes a BuyerParty entity 30840F, a BidderParty entity 30848F, a ProductRecipientParty entity 30856F, a VendorParty entity 30864F, and a ManufacturerParty entity 30872F.

The BuyerParty entity 30840F is of type AGDT 30844F BusinessTransactionDocumentParty 30846F. There is one or zero 30842F BuyerParty entity 30840F for each Item entity 30884D. The BidderParty entity 30848F is of type AGDT 30852F BusinessTransactionDocumentParty 30854F. There is zero or one 30850F BidderParty entity 30848F for each Item entity 30884D. There is zero or one 30858F ProductRecipientParty entity 30856F for each Item entity 30884D. The ProductRecipientParty entity 30856F is of type AGDT 30860F BusinessTransactionDocumentParty 30862F. The VendorParty entity 30864F is of type AGDT 30868F BusinessTransactionDocumentParty 30870F. There is one or zero 30866F VendorParty entity 30864F for each Item entity 30884D. The ManufacturerParty entity 30872F is of type AGDT 30876F BusinessTransactionDocumentParty 30878F. There is one or zero 30874F ManufacturerParty entity 30872F for each Item entity 30884D.

The Location package 30834E includes a ShipToLocation entity 30880F. The ShipToLocation entity 30880F is of type AGDT 30884F BusinessTransactionDocumentLocation 30886F. There is one or zero 30882F ShipToLocation entity 30880F for each Item entity 30884D. The ShipToLocation entity 30880F includes a StandardID 30888F, a BuyerID 30896F, a BidderID 30896F, and an Address 30812G. The StandardID 30888F has any number of occurrences 30890F for each ShipToLocation 30880F and a data type of CDT 30892F LocationStandardID 30894F. The BuyerID 30896F has zero or one occurrences 30898F for each ShipToLocation entity 30880F and a data type of CDT 30800G LocationPartyID 30802G. The BidderID 30804G has zero or one occurrences 30806G for each ShipToLocation 30880F and a data type of CDT 30808G LocationPartyID 30810G. The Address 30812G has zero or one occurrences 30814G for each ShipToLocation 30880F and a data type of AGDT 30816G Address 30818G.

The DeliveryInformation package 30836E includes a DeliveryTerms entity 30820G, which is of type AGDT 30824G DeliveryTerms 30826G. There is one or zero 30822G DeliveryTerms entity 30820G for each Item entity 30884D. The DeliveryTerms entity 30820G includes a MaximumLeadTimeDuration entity 30828G which is of type GDT 30832G Duration 30834G, and there is one or zero occurrences 30830G for each DeliveryTerms entity 30820G. The DeliveryTerms entity 30820G includes an Incoterms entity 30836G which is of type GDT 30840G Incoterms 30842G. There is one or zero 30838G Incoterms entity 30836 for each DeliveryTerms entity 30820G.

The BusinessTransactionDocumentReference package 30838E includes a RFQReference entity 30844G. The RFQReference entity 30844G is of type GDT 30848G BusinessTransactionDocumentReference 30850G. There is one or zero 30846G RFQReference entities 30844G for each Item entity 30884D. The RFQReference entity 30844G includes an ID 30852G. There is one 30854G ID entity 30852 for each RFQReference entity 30844G is of type GDT 30856G BusinessTransactionDocumentID 30858G. The RFQReference entity 30844G includes an ItemID 30860G. There is any number 30862G of ItemID 30860G the ItemID is of type GDT 30864G BusinessTransactionDocumentItemID 30866G.

The Attachment package 30840E includes an Attachment entity 30868G, which is of type GDT 30872G Attachment 30874G. There is any number 30870G of Attachment entities 30868G for each Item entity 30884D.

The Description package 30842E includes a Description entity 30876G. The Description entity 30876G is of type GDT 30880G Description 30882G. There is one or zero 30878G Description entity 30876G for each Item entity 30884D.

The ScheduleLine package 30844E includes a ScheduleLine entity 30884G having an ID 30892G, DeliveryPeriod 30800H, and Quantity 30808H. The ScheduleLine entity 30884G has zero or one occurrence 30886G for each Item entity 30884D, and a data type AGDT 30888G ItemScheduleLine 30890G. The ID 30892G has one or zero occurrence 30894G for each ScheduleLine entity 30884G and a data type of GDT 30896G BusinessTransactionDocumentItemScheduleLineID 30898G. The DeliveryPeriod 30800H has one occurrence 30802H a data type of AGDT 30804H DateTimePeriod 30806H. The Quantity 30808H has one or zero occurrences 30810H for each ScheduleLine entity 30884G a data type of GDT 30812H Quantity 30814H.

(d) Data Type RFQ Result Message

FIGS. 309A-D depict the element structure for RFQResultNotification. The element structure is similar to the data model, but provides additional information regarding the details of the interface. The element structure identifies the different packages 30900 in the interface, and represents the entities at various levels within the interface. As depicted in FIGS. 309A-D, the interface for RFQResultNotification includes six levels 30902, 30904, 30906, 30908, 30910, and 30912. The element structure identifies the cardinality 30914 between the entities and/or attributes of the interface, and provides information (i.e., type 30916 and name 30918) regarding the data type that provides the basis for the entity and/or attributes. The outermost package of this interface is an RFQResultMessage package 30920, which includes an RFQResultMessage entity 30922 at the first level 30902. The RFQResultMessage entity 30922 is of type message data type ("MDT") 30924 "RFQResultMessage" 30926.

The RFQResultMessage package 30920 includes a MessageHeader package 30928 and an RFQResult package 30930. The MessageHeader package 30928 includes a MessageHeader entity 30932, which is of type generic data type ("AGDT") 30936 "BusinessDocumentMessageHeader" 30938. There is one 30934 MessageHeader entity 30932 for each RFQMessageResult entity 30922.

The MessageHeader entity 30932 includes an ID 30940, a Reference ID 30948, and a CreationDateTime 30956. The ID 30940 is of type GDT 30944 BusinessDocumentMessageID 30946. The ReferenceID 30948 is of type GDT 30952 BusinessDocumentMessageID 30954. The CreationDateTime 30956 is of type GDT 30960 DateTime 30962. There is one 30942 ID 30940 for each MessageHeader entity 30932, one or zero 30950 ReferenceID 30948 for each MessageHeader entity 30932, and one 30958 CreationDateTime 30956 for each MessageHeader entity 30932.

The MessageHeader entity 30932 also includes a SenderParty entity 30964 and a RecipientParty entity 30928A. The SenderParty entity 30964 is of type AGDT 30968 BusinessDocumentMessageHeaderParty 30970. The RecipientParty entity 30928A is also of type AGDT 30932A BusinessDocumentMessageHeaderParty 30934A. There is one or zero 30966 SenderParty entity 30964 for each MessageHeader entity 30932, and there any number 30930A of RecipientParty entity 30928A for each MessageHeader entity 30932.

The SenderParty entity 30964 includes an InternalID 30972, a StandardID 30980 and a Contact 30988. The InternalID 30972 has zero or one occurrences 30974 for each SenderParty entity 30964 and a data type CDT 30976 of PartyInternalID 30978. The StandardID 30980 has any number of occurrences 30982 for each SenderParty 30964 and has a data type of CDT 30984 PartyStandardID 30986. The Contact 30988 has zero or one occurrences 30990 for each SenderParty entity 30964 and is of data type GDT 30992 ContactPerson 30994. The Contact 30988 also includes an InternalID 30996, BuyerID 30904A, BidderID 30912A and an Address 30920A. The InternalID 30996 has any number of occurrences 30998 for each Contact 30988 and a data type of CDT 30900A ContactPersonInternalID 30902A. The BuyerID 30904A has any zero or one occurrences 30906A for each Contact 30988 and a data type of CDT 30908A ContactPersonPartyID 30910A. The BidderID 30912A has zero or one occurrences 30914A for each Contact 30988 and a data type of CDT 30916A ContactPersonPartyID 30918A. The Address 30920A has one or zero occurrences 30922A for each Contact 30988 and a data type of AGDT 30924A Address 30926A.

The RFQResult package 30930 includes a party package 30952A, a description package 30954A, and an Item package 30956A. The RFQResult package 30930 also includes an RFQResult entity 30936A. The RFQResult entity 30936A is of type AGDT 30940A RFQ Result 30942A. There is one 30938A RFQResult entity 30936A for each RFQResultMessage entity 30922. The RFQResult entity 30936A includes an ID 30944A. There is one 30946A ID 30944A for each RFQResult entity 30936A. The ID 30944A is of type GDT 30948A BusinessTransactionDocumentID 30950A.

The Party package 30952A includes a BidderParty entity 30958A. The BidderParty entity 30958A is of type AGDT 30962A BusinessTransactionDocumentParty 30964A. There is zero or one 30960A BidderParty entity 30958A for each RFQResult entity 30936A.

The Description package 30954A includes a Description entity 30966A. The Description entity 30966A is of type GDT 30970A Description 30972A. There is one or zero occurrences 30968A of Description entities 30966A for each RFQResult entity 30936A.

The Item package 30956A includes a BusinessTranslationDocumentReference package 30910B 30910B and a ScheduleLine package 30912B. The Item package 30956A also includes an Item entity 30974A. There is any number 30976A of Item entities 30974A for each RFQResult entity 30936A. The Item entity 30974A includes an ID 30982A and a HierarchyRelationship 30990A. The ID 30982A is of type GDT 30986A BusinessTransactionDocumentItemID 30988A, and there is one 30984A ID 30982A for each Item entity 30974A. There is one or zero 30992A HierarchyRelationship 30990A for each Item entity 30974A. The HierarchyRelationship 30990A includes a ParentItemID 30994A, which is of type GDT 30998A BusinessTransactionDocumentItemID 30900B, and a TypeCode 30902B which is of type GDT 30906B BusinessTransactionDocumentItemHierarchyRelationshipTypeCode 30908B. There is one 30996A ParentItemID 30994A for each HierarchyRelationship 30990A, and there is one 30904B TypeCode 30902B for each HierarchyRelationship 30990A.

The BusinessTransactionDocumentReference package 30910B includes a QuoteReference entity 30914B. The QuoteReference entity 30914B is of type GDT 309181B BusinessTransactionDocumentReference 30920B. There is one or zero 30916B QuoteReference entities 30914B for each Item entity 30974A. The QuoteReference entity 30914B includes an ID 30922B, is one 24B ID 30922B for each QuoteReference entity 30914B is of type GDT 3092613 BusinessTransactionDocumentID 30928B. The QuoteReference entity 30914B also includes an ItemID 30930B. There is any number of occurrences 30932B of ItemID entity 30930B for each QuoteReference entity 30914B. The ItemID is of type GDT 30934B BusinessTransactionDocumentItemID 30936B.

The ScheduleLine package 30912B includes a ScheduleLine entity 30938B having an ID 30946B, a DeliveryPeriod 30954B, and a Quantity 30962B. The ScheduleLine entity 30938B has zero or one occurrence 30940B for each Item entity 30974A, and a data type AGDT 30942B RFQResultItemScheduleLine 30944B. The ID 3094613 has one or zero occurrence 30948B for each QuoteReference entity 30914B and a data type of GDT 30950B BusinessTransactionDocumentItemScheduleLineID 30952B. The DeliveryPeriod 30954B has one occurrence 30956B for each QuoteReference entity 30914B a data type of AGDT 30958B DateTimePeriod 30960B. The Quantity 30962B has one or zero occurrences 30964B for each QuoteReference entity 30914B a data type of GDT 30966B Quantity 30968B.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A tangible computer readable medium including program code for providing a message-based interface for exchanging invoices between an invoicing party and an invoice recipient, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing a notification of claims or liabilities for delivered goods and rendered services that includes a first message package derived from the common business object model and hierarchically organized in memory as:

an invoice message entity; and an invoice package comprising an invoice entity, a party package, a price information package, and an item package, where the invoice entity includes an invoice entity ID, an invoice entity type code, and a date time, where the party package includes a bill-to-party entity and a bill-from-party entity, where the price information package includes a price entity, where the price entity further includes a gross amount and a net amount, and where the item package includes at least one item entity, where each item entity further includes an item entity ID and an item entity type code;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the invoice package further comprises at least one of the following: a location package, a tax package, an attachment package, and a description package.

3. The computer readable medium of claim 1, wherein the invoice entity further includes at least one of the following: a bill-to ID and a note.

4. A tangible computer readable medium including program code for providing a message-based interface for exchanging purchase requisitions for products between a requester and a buyer, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting the buyer to procure products externally that includes a first message package derived from the common business object model and hierarchically organized in memory as:

a purchase requirement message entity; and a purchase requirement package comprising a purchase requirement entity and an item package, where the purchase requirement entity includes a purchase requirement entity ID and a creation date time, and where the item package includes at least one item entity and a schedule line package for each item entity, and further where each item entity includes an item entity ID and each schedule line package includes a schedule line entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

5. The computer readable medium of claim 4, wherein the purchase requirement package further comprises at least one of the following: a party package and a location package.

6. A tangible computer readable medium including program code for providing a message-based interface for performing a source of supply notification, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for notifying a supply planner about the available sources of supplies that includes a first message package derived from the common business object model and hierarchically organized in memory as:

a source of supply message entity; and a source of supply package comprising a source of supply entity, where the source of supply entity includes an active indicator, a deleted indicator, and a validity period;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

7. The computer readable medium of claim 6, wherein the source of supply package further comprises at least one of the following: a business transaction document reference package, a party package, a location package, a product information package, and a price information package.

8. The computer readable medium of claim 6, wherein the source of supply entity further includes at least one of the following: a sourcing priority code, a target quantity, a target amount, a goods receipt processing duration, and a planned delivery duration.

9. A tangible computer readable medium including program code for providing a message-based interface for exchanging purchase orders between a buyer and a seller, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting the delivery of goods or provision of services that includes a first message package derived from the common business object model and hierarchically organized in memory as:

a purchase order message entity; and a purchase order package comprising a purchase order entity, where the purchase order entity includes a purchase order entity ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

10. The computer readable medium of claim 9, wherein the purchase order package further comprises at least one of the following: a party package, a location package, a delivery information package, a payment information package, an attachment package, a description package, a follow up message package, and an item package.

11. The computer readable medium of claim 9, wherein the purchase order entity further includes at least one of the following: a seller ID, a buyer posting date time, a note, and an item list complete transmission indicator.

12. A tangible computer readable medium including program code for providing a message-based interface for exchanging purchase orders between a buyer and a seller, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting cancellation of a request for the delivery of goods or provision of services that includes a first message package derived from the common business object model and hierarchically organized in memory as:

a purchase order cancellation message entity; and a purchase order cancellation package comprising a purchase order cancellation entity, where the purchase order cancellation entity includes a purchase order cancellation entity ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

13. A tangible computer readable medium including program code for providing a message-based interface for acknowledging services entered by a seller, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting an acknowledgement that at least one service has been entered that includes a first message package derived from the common business object model and hierarchically organized in memory as:

a service acknowledgement message entity; and a service acknowledgement package comprising a service acknowledgement entity, where the service acknowledgement entity includes a service acknowledgement entity ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

14. The computer readable medium of claim 13, wherein the service acknowledgement package further comprises at least one of the following: a party package, a location package, an attachment package, a description package, and an item package.

15. The computer readable medium of claim 13, wherein the service acknowledgement entity further includes at least one of the following: a buyer ID, a creation date time, an acceptance status code, and a note.

16. A tangible computer readable medium including program code for providing a message-based interface for exchanging request for quotations (RFQs) and quotations between a buyer and a bidder, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting participation in an RFQ process for a product or service that includes a first message package derived from the common business object model and hierarchically organized in memory as:

an RFQ message entity; and an RFQ package comprising an RFQ entity, where the RFQ entity includes an RFQ entity ID, a quote submission date time, an RFQ public indicator, a quote price bidding condition code, a quote quantity bidding condition code, and a quote item bidding condition code;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

17. The computer readable medium of claim 16, wherein the RFQ package further comprises at least one of the following: a party package, a location package, a delivery information package, a payment information package, a product information package, a business transaction document reference package, a follow up business transaction document package, an attachment package, a description package, and an item package.

18. The computer readable medium of claim 16, wherein the RFQ entity further includes at least one of the following: a posting date time, a publish date time, a display date time, a bidding start date time, a quote opening date, a quote binding date time, a contract validity period, a note, a quote unplanned item permission code, and a contract target amount.

19. A tangible computer readable medium including program code for providing a message-based interface for exchanging request for quotations (RFQs) and quotations between a buyer and a bidder, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting cancellation of a request for participation in an RFQ process for a product or service that includes a first message package derived from the common business object model and hierarchically organized in memory as:

an RFQ cancellation message entity; and an RFQ cancellation package comprising an RFQ cancellation entity, where the RFQ cancellation entity includes an RFQ cancellation entity ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

20. A distributed system operating in a landscape of computer systems providing message-based services defined in a service registry, the system comprising:

a graphical user interface comprising computer readable instructions, embedded on tangible media, for providing a notification of claims or liabilities for delivered goods and rendered services using a request;

a first memory storing a user interface controller for processing the request and involving a message including a message package derived from a common business object model, where the common business object model includes business objects having relationships that enable derivation of message-based service interfaces and message packages, the message package hierarchically organized as:

an invoice message entity; and an invoice package comprising an invoice entity, a party package, a price information package, and an item package, where the invoice entity includes an invoice entity ID, an invoice entity type code, and a date time, where the party package includes a bill-to-party entity and a bill-from-party entity, where the price information package includes a price entity, where the price entity further includes a gross amount and a net amount, and where the item package includes at least one item entity, where each item entity further includes an item entity ID and a item entity type code; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

21. The distributed system of claim 20, wherein the first memory is remote from the graphical user interface.

22. The distributed system of claim 20, wherein the first memory is remote from the second memory.

23. A distributed system operating in a landscape of computer systems providing message-based services defined in a service registry, the system comprising:

a graphical user interface comprising computer readable instructions, embedded on tangible media, for requesting the buyer to procure products externally using a request;

a first memory storing a user interface controller for processing the request and involving a message including a message package hierarchically organized as:

a purchase requirement message entity; and a purchase requirement package comprising a purchase requirement entity and an item package, where the purchase requirement entity includes a purchase requirement entity ID and a creation date time, and where the item package includes at least one item entity and a schedule line package for each item entity, and further where each item entity includes an item entity ID and each schedule line package includes a schedule line entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

24. The distributed system of claim 23, wherein the first memory is remote from the graphical user interface.

25. The distributed system of claim 23, wherein the first memory is remote from the second memory.

26. A distributed system operating in a landscape of computer systems providing message-based services defined in a service registry, the system comprising:

a graphical user interface comprising computer readable instructions, embedded on tangible media, for notifying a supply planner about the available sources of supplies using a request;

a first memory storing a user interface controller for processing the request and involving a message including a message package derived from a common business object model, where the common business object model includes business objects having relationships that enable derivation of message-based service interfaces and message packages, the message package hierarchically organized as:

a source of supply message entity; and a source of supply package comprising a source of supply entity, where the source of supply entity includes an active indicator, a deleted indicator, and a validity period; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

27. The distributed system of claim 26, wherein the first memory is remote from the graphical user interface.

28. The distributed system of claim 26, wherein the first memory is remote from the second memory.

29. A distributed system operating in a landscape of computer systems providing message-based services defined in a service registry, the system comprising:

a graphical user interface comprising computer readable instructions, embedded on tangible media, for requesting the delivery of goods or provision of services using a request;

a first memory storing a user interface controller for processing the request and involving a message including a message package derived from a common business object model, where the common business object model includes business objects having relationships that enable derivation of message-based service interfaces and message packages, the message package hierarchically organized as:

a purchase order message entity; and a purchase order package comprising a purchase order entity, where the purchase order entity includes a purchase order entity ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

30. The distributed system of claim 29, wherein the first memory is remote from the graphical user interface.

31. The distributed system of claim 29, wherein the first memory is remote from the second memory.

32. A distributed system operating in a landscape of computer systems providing message-based services defined in a service registry, the system comprising:

a graphical user interface comprising computer readable instructions, embedded on tangible media, for requesting cancellation of a request for the delivery of goods or provision of services using a request;

a first memory storing a user interface controller for processing the request and involving a message including a message package derived from a common business object model, where the common business object model includes business objects having relationships that enable derivation of message-based service interfaces and message packages, the message package hierarchically organized as:

a purchase order cancellation message entity; and a purchase order cancellation package comprising a purchase order cancellation entity, where the purchase order cancellation entity includes a purchase order cancellation entity ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

33. The distributed system of claim 32, wherein the first memory is remote from the graphical user interface.

34. The distributed system of claim 32, wherein the first memory is remote from the second memory.

35. A distributed system operating in a landscape of computer systems providing message-based services defined in a service registry, the system comprising:

a graphical user interface comprising computer readable instructions, embedded on tangible media, for requesting an acknowledgement that at least one service has been entered using a request;

a first memory storing a user interface controller for processing the request and involving a message including a message package derived from a common business object model, where the common business object model includes business objects having relationships that enable derivation of message-based service interfaces and message packages, the message package hierarchically organized as:

a service acknowledgement message entity; and a service acknowledgement package comprising a service acknowledgement entity, where the service acknowledgement entity includes a service acknowledgement entity ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

36. The distributed system of claim 35, wherein the first memory is remote from the graphical user interface.

37. The distributed system of claim 35, wherein the first memory is remote from the second memory.

38. A distributed system operating in a landscape of computer systems providing message-based services defined in a service registry, the system comprising:

a graphical user interface comprising computer readable instructions, embedded on tangible media, for requesting participation in an RFQ process for a product or service using a request;

a first memory storing a user interface controller for processing the request and involving a message including a message package derived from a common business object model, where the common business object model includes business objects having relationships that enable derivation of message-based service interfaces and message packages, the message package hierarchically organized as:

an RFQ message entity; and an RFQ package comprising an RFQ entity, where the RFQ entity includes an RFQ entity ID, a quote submission date time, an RFQ public indicator, a quote price bidding condition code, a quote quantity bidding condition code, and a quote item bidding condition code; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

39. The distributed system of claim 38, wherein the first memory is remote from the graphical user interface.

40. The distributed system of claim 38, wherein the first memory is remote from the second memory.

41. A distributed system operating in a landscape of computer systems providing message-based services defined in a service registry, the system comprising:

a graphical user interface comprising computer readable instructions, embedded on tangible media, for requesting cancellation of a request for participation in an RFQ process for a product or service using a request;

a first memory storing a user interface controller for processing the request and involving a message including a message package derived from a common business object model, where the common business object model includes business objects having relationships that enable derivation of message-based service interfaces and message packages, the message package hierarchically organized as:

an RFQ cancellation message entity; and an RFQ cancellation package comprising an RFQ cancellation entity, where the RFQ cancellation entity includes an RFQ cancellation entity ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

42. The distributed system of claim 41, wherein the first memory is remote from the graphical user interface.

43. The distributed system of claim 41, wherein the first memory is remote from the second memory.

* * * * *